US010735905B2

(12) United States Patent
Gross et al.

(10) Patent No.: US 10,735,905 B2
(45) Date of Patent: Aug. 4, 2020

(54) SYSTEMS AND METHODS FOR PROACTIVELY IDENTIFYING AND SURFACING RELEVANT CONTENT ON AN ELECTRONIC DEVICE WITH A TOUCH-SENSITIVE DISPLAY

(71) Applicant: Apple Inc., Cupertino, CA (US)

(72) Inventors: Daniel C. Gross, San Francisco, CA (US); Patrick L. Coffman, San Francisco, CA (US); Richard R. Dellinger, San Jose, CA (US); Christopher P. Foss, San Francisco, CA (US); Jason J. Gauci, Cupertino, CA (US); Aria D. Haghighi, Seattle, WA (US); Cyrus D. Irani, Los Altos, CA (US); Bronwyn A. Jones, London (GB); Gaurav Kapoor, Santa Clara, CA (US); Stephen O. Lemay, San Francisco, CA (US); Colin C. Morris, Sunnyvale, CA (US); Michael R. Siracusa, Mountain View, CA (US); Lawrence Y. Yang, Bellevue, WA (US); Brent D. Ramerth, San Francisco, CA (US); Jerome R. Bellegarda, Saratoga, CA (US); Jannes G. A. Dolfing, Sunnyvale, CA (US); Giulia P. Pagallo, Cupertino, CA (US); Xin Wang, San Jose, CA (US); Jun Hatori, San Francisco, CA (US); Alexandre R. Moha, Los Altos, CA (US); Kevin D. Clark, San Francisco, CA (US); Karl Christian Kohlschuetter, Monte Sereno, CA (US); Jesper S. Andersen, Portland, OR (US); Hafid Arras, Paris (FR); Alexandre Carlhian, Paris (FR); Thomas Deniau, Paris (FR); Mathieu J. Martel, Paris (FR); Sofiane Toudji, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/147,557

(22) Filed: Sep. 28, 2018

(65) Prior Publication Data

US 2019/0141494 A1 May 9, 2019

Related U.S. Application Data

(63) Continuation of application No. 15/166,226, filed on May 26, 2016, now Pat. No. 10,200,824.

(Continued)

(51) Int. Cl.
*H04W 4/029* (2018.01)
*G06F 9/451* (2018.01)
(Continued)

(52) U.S. Cl.
CPC ............ *H04W 4/029* (2018.02); *G06F 3/016* (2013.01); *G06F 3/0488* (2013.01);
(Continued)

(58) Field of Classification Search
CPC .................................................... H04W 4/029
(Continued)

(56) References Cited

U.S. PATENT DOCUMENTS 5,621,878 A 4/1997 Owens et al.
6,489,921 B1 12/2002 Wilkinson
(Continued)

FOREIGN PATENT DOCUMENTS

CN 103246638 A 8/2013
CN 103543902 A 1/2014
(Continued)

OTHER PUBLICATIONS

Office Action, dated Oct. 12, 2018, received in Australian Patent Application No. 2016268860, which corresponds with U.S. Appl. No. 15/166,226, 7 pages.

(Continued)

*Primary Examiner* — Chuck Huynh
(74) *Attorney, Agent, or Firm* — Morgan, Lewis & Bockius LLP

(57) ABSTRACT

Systems and methods for proactively identifying and surfacing relevant content on an electronic device with a touch-sensitive display are disclosed herein. In one aspect, a (Continued)

method includes executing, on the device, an application in response to an instruction from a user of the electronic device. While executing the application, the method further includes collecting usage data. The usage data at least includes one or more actions performed by the user within the application. The method also includes: automatically, without human intervention, obtaining at least one trigger condition based on the collected usage data and associating the at least one trigger condition with a particular action of the one or more actions performed by the user within the application. Upon determining that the at least one trigger condition has been satisfied, the method includes providing an indication to the user that the particular action associated with the trigger condition is available.

48 Claims, 239 Drawing Sheets

Related U.S. Application Data

(60) Provisional application No. 62/172,019, filed on Jun. 5, 2015, provisional application No. 62/167,265, filed on May 27, 2015.

(51) Int. Cl.
*H04W 4/50* (2018.01)
*G06F 3/0488* (2013.01)
*G06F 3/01* (2006.01)
*H04W 4/40* (2018.01)

(52) U.S. Cl.
CPC .......... *G06F 3/04883* (2013.01); *G06F 9/453* (2018.02); *H04W 4/40* (2018.02); *H04W 4/50* (2018.02); *G06F 2203/04808* (2013.01)

(58) Field of Classification Search
USPC ....................................................... 455/456.3
See application file for complete search history.

(56) References Cited

U.S. PATENT DOCUMENTS

| | | | |
|---|---|---|---|
| 6,553,308 | B1 | 4/2003 | Uhlmann et al. |
| 7,606,706 | B1 | 10/2009 | Rubin et al. |
| 7,689,916 | B1 | 3/2010 | Goel et al. |
| 7,774,753 | B1 | 8/2010 | Reilly et al. |
| 8,078,978 | B2 | 12/2011 | Perry et al. |
| 8,571,528 | B1 | 10/2013 | Channakeshava |
| 8,589,374 | B2 | 11/2013 | Chaudhri |
| 8,976,063 | B1 | 3/2015 | Hawkins et al. |
| 2001/0056327 | A1 | 12/2001 | Jin |
| 2002/0065657 | A1 | 5/2002 | Reding et al. |
| 2003/0191578 | A1* | 10/2003 | Paulauskas ........ G01C 21/3614 701/438 |
| 2004/0180674 | A1 | 9/2004 | Blomqvist et al. |
| 2005/0233730 | A1 | 10/2005 | Snyder |
| 2005/0258632 | A1 | 11/2005 | Currier |
| 2005/0262521 | A1 | 11/2005 | Kesavarapu |
| 2006/0111835 | A1 | 5/2006 | Baker et al. |
| 2006/0259861 | A1 | 11/2006 | Watson |
| 2008/0301581 | A1 | 12/2008 | Baek et al. |
| 2009/0058685 | A1 | 3/2009 | McCall et al. |
| 2009/0060156 | A1 | 3/2009 | Burchart et al. |
| 2009/0156229 | A1 | 6/2009 | Hein et al. |
| 2009/0251333 | A1 | 10/2009 | Itani et al. |
| 2010/0017741 | A1 | 1/2010 | Karp et al. |
| 2010/0073201 | A1* | 3/2010 | Holcomb .............. G08G 1/005 340/990 |
| 2010/0153968 | A1 | 6/2010 | Engel |
| 2010/0191466 | A1 | 7/2010 | Deluca et al. |
| 2010/0192221 | A1 | 7/2010 | Waggoner |
| 2010/0246784 | A1 | 9/2010 | Frazier et al. |
| 2010/0274482 | A1 | 10/2010 | Feng |
| 2010/0287241 | A1 | 11/2010 | Swanburg et al. |
| 2010/0318293 | A1 | 12/2010 | Brush et al. |
| 2010/0323730 | A1 | 12/2010 | Karmarkar |
| 2011/0252108 | A1 | 10/2011 | Morris et al. |
| 2012/0035924 | A1 | 2/2012 | Jitkoff et al. |
| 2012/0136529 | A1 | 5/2012 | Curtis et al. |
| 2012/0316774 | A1 | 12/2012 | Yariv et al. |
| 2012/0316955 | A1 | 12/2012 | Panguluri et al. |
| 2013/0107053 | A1 | 5/2013 | Ozaki |
| 2013/0210492 | A1 | 7/2013 | Chu et al. |
| 2013/0283199 | A1* | 10/2013 | Selig .................... G06F 3/0484 715/781 |
| 2013/0297198 | A1 | 11/2013 | Vande Velde et al. |
| 2013/0322665 | A1 | 12/2013 | Bennett et al. |
| 2014/0028477 | A1 | 1/2014 | Michalske |
| 2014/0222435 | A1 | 8/2014 | Li et al. |
| 2014/0232570 | A1 | 8/2014 | Skinder et al. |
| 2014/0258905 | A1 | 9/2014 | Lee et al. |
| 2014/0278051 | A1 | 9/2014 | McGavran et al. |
| 2014/0279787 | A1 | 9/2014 | Cheng et al. |
| 2014/0282178 | A1 | 9/2014 | Borzello et al. |
| 2014/0343834 | A1 | 11/2014 | DeMerchant et al. |
| 2014/0365505 | A1 | 12/2014 | Clark et al. |
| 2015/0038161 | A1 | 2/2015 | Jakobsen et al. |
| 2015/0046434 | A1 | 2/2015 | Lim et al. |
| 2015/0050923 | A1 | 2/2015 | Tu et al. |
| 2016/0232500 | A1 | 8/2016 | Wang et al. |
| 2016/0360336 | A1 | 12/2016 | Gross et al. |
| 2016/0360382 | A1 | 12/2016 | Gross et al. |
| 2019/0158994 | A1 | 5/2019 | Gross et al. |

FOREIGN PATENT DOCUMENTS

| | | | |
|---|---|---|---|
| EP | 1 271 101 A2 | 1/2003 | |
| EP | 2 120 142 A2 | 11/2009 | |
| EP | 2 393 046 A1 | 7/2011 | |
| EP | 2 393 056 A1 | 12/2011 | |
| EP | 2 672 229 A2 | 12/2013 | |
| EP | 2 672 231 A2 | 12/2013 | |
| EP | 2 675 147 A1 | 12/2013 | |
| EP | 2 743 846 A2 | 6/2014 | |
| EP | 2 770 762 A1 | 8/2014 | |
| GB | 2 412 546 A | 9/2005 | |
| JP | 2002-197566 A | 7/2002 | |
| JP | 2003-085696 A | 3/2003 | |
| JP | 2009-116746 A | 5/2009 | |
| JP | 2009-300195 A | 12/2009 | |
| JP | 2010-078602 A | 4/2010 | |
| JP | 2010-236858 A | 10/2010 | |
| JP | 2012-022478 A | 2/2012 | |
| JP | 2012-150804 A | 8/2012 | |
| JP | 2013-046171 A | 3/2013 | |
| JP | 2013-148419 A | 8/2013 | |
| JP | 2014529137 A | 10/2014 | |
| JP | 2015-504619 A | 2/2015 | |
| JP | 2015-052500 A | 3/2015 | |
| JP | 2015-083938 A | 4/2015 | |
| WO | WO 99/16181 | 4/1999 | |
| WO | WO 2007/057499 A | 5/2007 | |
| WO | WO 2011/123122 A1 | 10/2011 | |
| WO | WO 2012/008434 A1 | 1/2012 | |
| WO | WO 2013/163857 A1 | 11/2013 | |
| WO | WO 2014/028735 A2 | 2/2014 | |
| WO | WO 2014/130194 A1 | 8/2014 | |
| WO | WO 2014/151153 A2 | 9/2014 | |

OTHER PUBLICATIONS

Notice of Acceptance, dated Jan. 9, 2019, received in Australian Patent Application No. 2016268860, which corresponds with U.S. Appl. No. 15/166,226, 3 pages.

Office Action, dated Sep. 21, 2018, received in Chinese Patent Application No. 201810998619.4, which corresponds with U.S. Appl. No. 15/166,226, 3 pages.

(56) References Cited

OTHER PUBLICATIONS

Office Action, dated Sep. 21, 2018, received in Chinese Patent Application No. 201810998574.0, which corresponds with U.S. Appl. No. 15/166,226, 3 pages.
Office Action, dated Oct. 12, 2018, received in European Patent Application No. 16729146.7, which corresponds with U.S. Appl. No. 15/166,226, 4 pages.
Notice of Allowance, dated Sep. 10, 2018, received in Japanese Patent Application No. 2017-561675, which corresponds with U.S. Appl. No. 15/166,226, 5 pages.
Patent, dated Oct. 19, 2018, received in Japanese Patent Application No. 2017-561675, which corresponds with U.S. Appl. No. 15/166,226, 3 pages.
Office Action, dated Sep. 28, 2018, received in Korean Patent Application No. 2017-7037413, which corresponds with U.S. Appl. No. 15/166,226, 6 pages.
Notice of Allowance, dated Aug. 30, 2018, received in Danish Patent Application No. 201670369, which corresponds with U.S. Appl. No. 15/167,713, 2 pages.
Patent, dated Feb. 19, 2019, received in Danish Patent Application No. 201670370, which corresponds with U.S. Appl. No. 15/167,713, 2 pages.
Notice of Allowance, dated Aug. 30, 2018, received in Danish Patent Application No. 201670371, which corresponds with U.S. Appl. No. 15/167,713, 2 pages.
Patent, dated Feb. 19, 2019, received in Danish Patent Application No. 201670371, which corresponds with U.S. Appl. No. 15/167,713, 3 pages.
Extended European Search Report, dated Jan. 17, 2019, received in European Patent Application No. 18190777.5, which corresponds with U.S. Appl. No. 15/166,226, 16 pages.
Extended European Search Report, dated Dec. 13, 2018, received in European Patent Application No. 18191966.3, which corresponds with U.S. Appl. No. 15/166,226, 7 pages.
Office Action, dated Jan. 13, 2017, received in U.S. Appl. No. 15/166,226, 13 pages.
Notice of Allowance, dated Apr. 10, 2018, received in U.S. Appl. No. 15/166,226, 8 pages.
Office Action, dated Aug. 10, 2018, received in U.S. Appl. No. 15/166,226, 13 pages.
Notice of Allowance, dated Oct. 11, 2018, received in U.S. Appl. No. 15/166,226, 8 pages.
Office Action, dated Jan. 12, 2018, received in Australian Patent Application No. 2016268860, which corresponds with U.S. Appl. No. 15/166,226, 3 pages.
Office Action, dated Jun. 20, 2018, received in Australian Patent Application No. 2016268860, which corresponds with U.S. Appl. No. 15/166,226, 4 pages.
Office Action, dated Nov. 1, 2016, received in Danish Patent Application No. 201670368, which corresponds with U.S. Appl. No. 15/166,226, 9 pages.
Office Action, dated Mar. 17, 2017, received in Danish Patent Application No. 201670368, which corresponds with U.S. Appl. No. 15/166,226, 3 pages.
Office Action, dated Sep. 26, 2017, received in Danish Patent Application No. 201670368, which corresponds with U.S. Appl. No. 15/166,226, 2 pages.
Notice of Allowance, dated Jan. 11, 2018, received in Danish Patent Application No. 201670368, which corresponds with U.S. Appl. No. 15/166,226, 2 pages.
Patent, dated Apr. 9, 2018, received in Danish Patent Application No. 201670368, which corresponds with U.S. Appl. No. 15/166,226, 3 pages.
Office Action, dated May 28, 2018, received in Japanese Patent Application No. 2017-561675, which corresponds with U.S. Appl. No. 15/166,226, 8 pages.
Office Action, dated Jul. 26, 2017, received in U.S. Appl. No. 15/167,713, 11 pages.
Notice of Allowance, dated Jun. 1, 2018, received in U.S. Appl. No. 15/167,713, 6 pages.
Office Action, dated Nov. 3, 2016, received in Danish Patent Application No. 201670369, which corresponds with U.S. Appl. No. 15/167,713, 9 pages.
Office Action, dated Sep. 20, 2017, received in Danish Patent Application No. 201670369, which corresponds with U.S. Appl. No. 15/167,713, 2 pages.
Office Action, dated Mar. 15, 2018, received in Danish Patent Application No. 201670369, which corresponds with U.S. Appl. No. 15/167,713, 3 pages.
Office Action, dated Jun. 7, 2018, received in Danish Patent Application No. 201670369, which corresponds with U.S. Appl. No. 15/167,713, 2 pages.
Office Action, dated Nov. 4, 2016, received in Danish Patent Application No. 201670370, which corresponds with U.S. Appl. No. 15/167,713, 10 pages.
Office Action, dated Sep. 20, 2017, received in Danish Patent Application No. 201670370, which corresponds with U.S. Appl. No. 15/167,713, 7 pages.
Office Action, dated Jan. 18, 2017, received in Danish Patent Application No. 201670371, which corresponds with U.S. Appl. No. 15/167,713, 10 pages.
Office Action, dated Aug. 28, 2017, received in Danish Patent Application No. 201670371, which corresponds with U.S. Appl. No. 15/167,713, 3 pages.
Office Action, dated Feb. 22, 2018, received in Danish Patent Application No. 201670371, which corresponds with U.S. Appl. No. 15/167,713, 2 pages.
Office Action, dated Jun. 8, 2018, received in Danish Patent Application No. 201670371, which corresponds with U.S. Appl. No. 15/167,713, 2 pages.
International Search Report and Written Opinion, dated Jan. 4, 2017, received in International Patent Application No. PCT/US2016/034807, which corresponds with U.S. Appl. No. 15/166,226, 45 pages.
International Preliminary Report on Patentability, dated Nov. 28, 2017, received in International Patent Application No. PCT/US2016/034807, 34 pages.
Office Action, dated Sep. 4, 2019, received in Australian Patent Application No. 2018222899, which corresponds with U.S. Appl. No. 15/166,226, 3 pages.
Patent, dated Aug. 7, 2019, received in European Patent Application No. 16729146.7, which corresponds with U.S. Appl. No. 15/166,226, 3 pages.
Office Action, dated Nov. 6, 2019, received in European Patent Application No. 18190777.5, which corresponds with U.S. Appl. No. 15/166,226, 5 pages.
Notice of Allowance, dated Aug. 19, 2019, received in Korean Patent Application No. 2017-7037413, which corresponds with U.S. Appl. No. 15/166,226, 6 pages.
Final Office Action, dated Oct. 17, 2019, received in U.S. Appl. No. 16/147,572, 11 pages.
Certificate of Grant, dated May 9, 2019, received in Australian Patent Application No. 2016268860, which corresponds with U.S. Appl. No. 15/166,226, 4 pages.
Office Action, dated May 23, 2019, received in Australian Patent Application No. 2018222890, which corresponds with U.S. Appl. No. 15/166,226, 4 pages.
Office Action, dated May 24, 2019, received in Australian Patent Application No. 2018222899, which corresponds with U.S. Appl. No. 15/166,226, 3 pages.
Office Action, dated Mar. 21, 2019, received in European Patent Application No. 16729146.7, which corresponds with U.S. Appl. No. 15/166,226, 5 pages.
Intention to Grant, dated May 6, 2019, received in European Patent Application No. 16729146.7, which corresponds with U.S. Appl. No. 15/166,226, 5 pages.
Decision to Grant, dated Jul. 11, 2019, received in European Patent Application No. 16729146.7, which corresponds with U.S. Appl. No. 15/166,226, 1 page.
Notice of Allowance, dated Mar. 8, 2019, received in Korean Patent Application No. 2017-7037413, which corresponds with U.S. Appl. No. 15/166,226, 5 pages.

(56) References Cited

OTHER PUBLICATIONS

Office Action, dated Jun. 20, 2019, received in U.S. Appl. No. 16/147,572, 9 pages.
Anonymous, "iPhone 6 Smart Guide", Full Version for SoftBank, Gijutsu-Hyohron Co., Ltd., vol. 1, Dec. 1, 2014, 5 pages.
Office Action, dated Jan. 28, 2020, received in Australian Patent Application No. 2018222890, which corresponds with U.S. Appl. No. 15/166,226, 4 pages.
Office Action, dated Feb. 3, 2020, received in Australian Patent Application No. 2018222899, which corresponds with U.S. Appl. No. 15/166,226, 3 pages.
Office Action, dated Dec. 6, 2019, received in Japanese Patent Application No. 2018-192102, which corresponds with U.S. Appl. No. 15/166,226, 7 pages.
Patent, dated Nov. 19, 2019, received in Korean Patent Application No. 2017-7037413, which corresponds with U.S. Appl. No. 15/166,226, 7 pages.
Notice of Allowance, dated Jan. 17, 2020, received in Korean Patent Application No. 2019-7034093, which corresponds with U.S. Appl. No. 15/166,226.
Notice of Allowance, dated Mar. 31, 2020, received in U.S. Appl. No. 16/147,572 (7570), 7 pages.
Office Action, dated Mar. 27, 2020, received in Australian Patent Application No. 2018222890 (7276AU01), which corresponds with U.S. Appl. No. 15/166,226, 4 pages.

* cited by examiner

Application 1 Trigger Conditions 402-1

| | Trigger Prereqs ID | Associated Action ID |
|---|---|---|
| Header 414-0 | Trigger Prereqs ID | Associated Action ID |
| Record 414-1 | Prereqs 1 | Action 4 |
| Record 414-2 | Prereqs 2 | Action 2 |
| | ⋮ | |
| Record 414-z | Prereqs z | Action z |

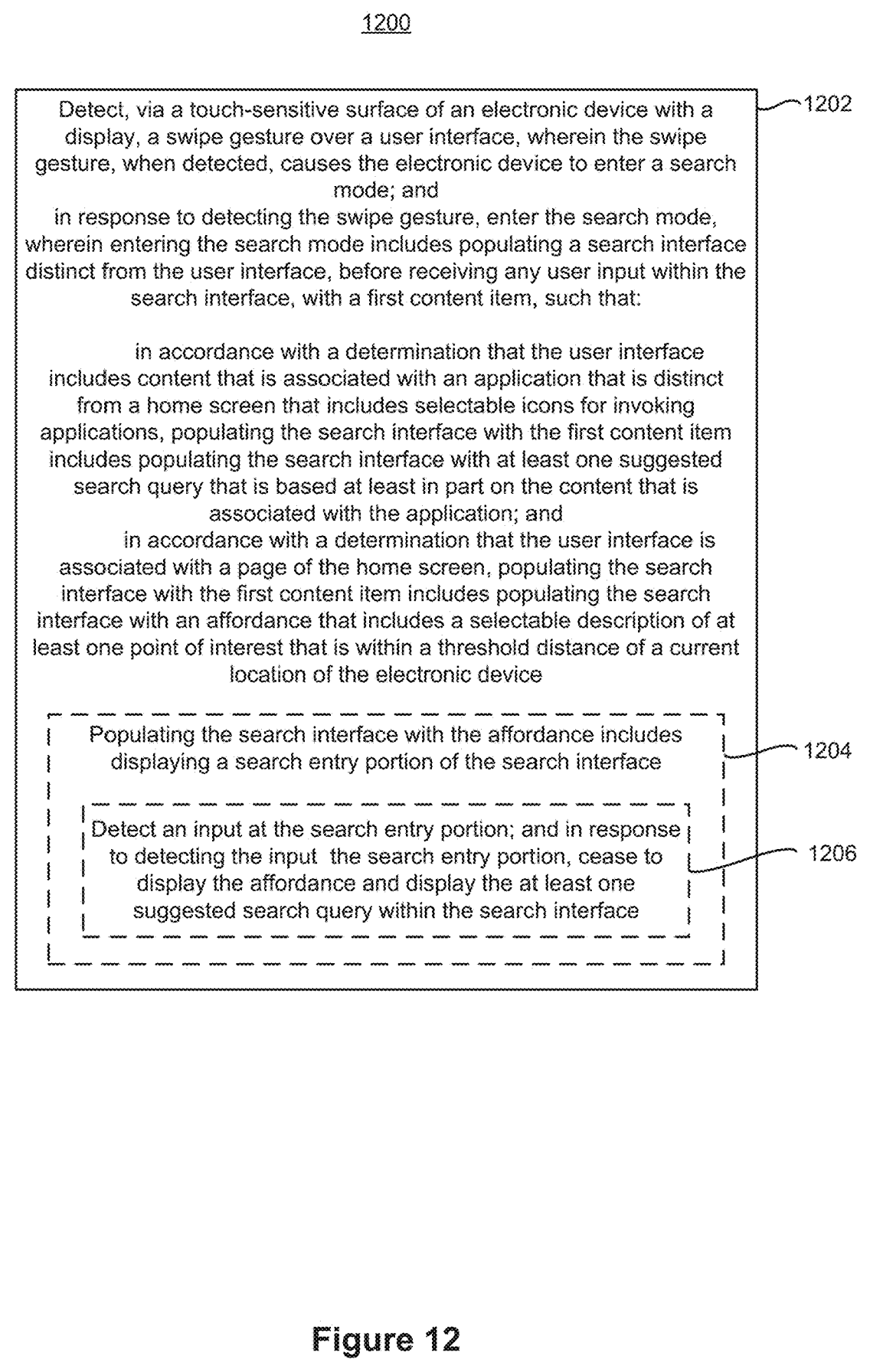

1200

Detect, via a touch-sensitive surface of an electronic device with a display, a swipe gesture over a user interface, wherein the swipe gesture, when detected, causes the electronic device to enter a search mode; and
in response to detecting the swipe gesture, enter the search mode, wherein entering the search mode includes populating a search interface distinct from the user interface, before receiving any user input within the search interface, with a first content item, such that:

in accordance with a determination that the user interface includes content that is associated with an application that is distinct from a home screen that includes selectable icons for invoking applications, populating the search interface with the first content item includes populating the search interface with at least one suggested search query that is based at least in part on the content that is associated with the application; and
in accordance with a determination that the user interface is associated with a page of the home screen, populating the search interface with the first content item includes populating the search interface with an affordance that includes a selectable description of at least one point of interest that is within a threshold distance of a current location of the electronic device 1202

Populating the search interface with the affordance includes displaying a search entry portion of the search interface 1204

Detect an input at the search entry portion; and in response to detecting the input the search entry portion, cease to display the affordance and display the at least one suggested search query within the search interface 1206

Figure 12

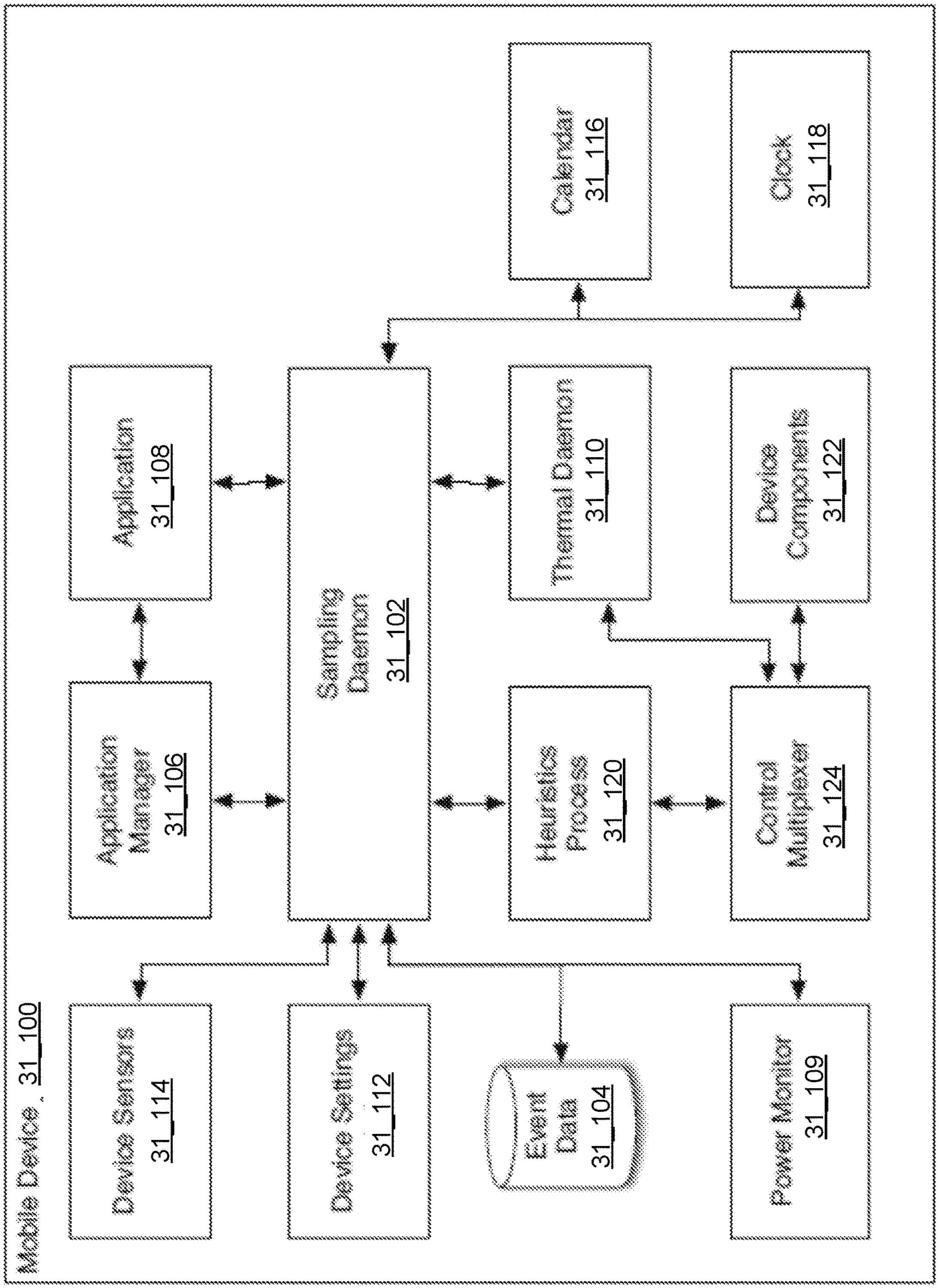
Figure 31_1

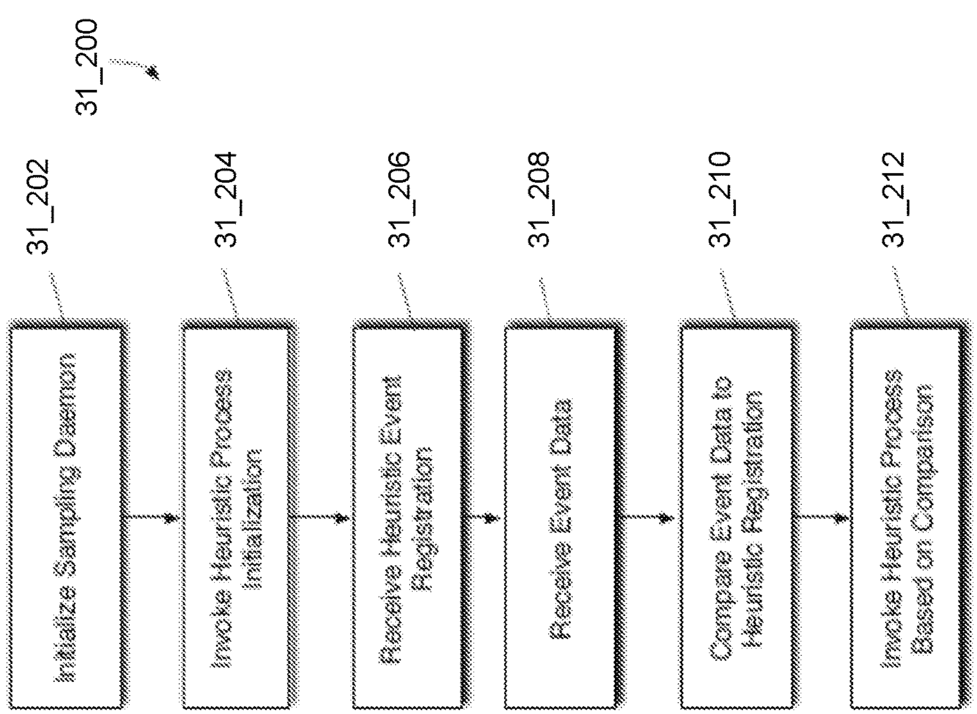
Figure 31_2
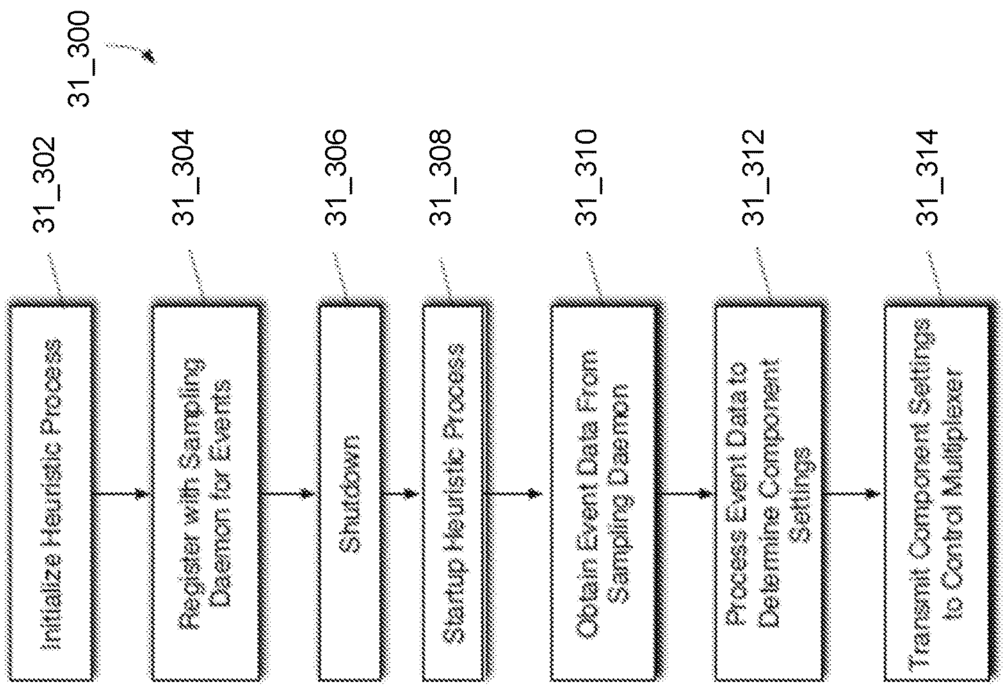
Figure 31_3

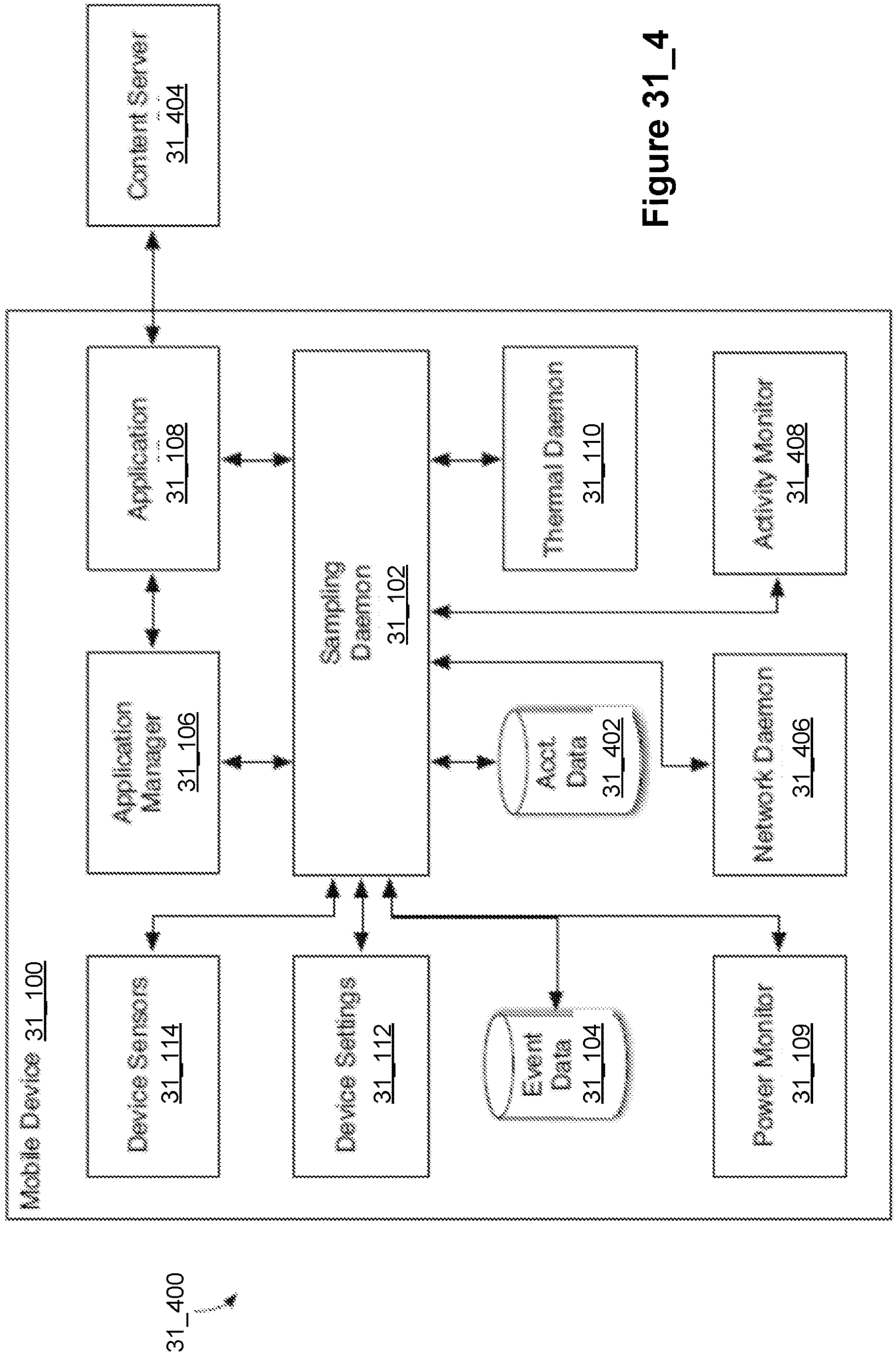
Figure 31_4

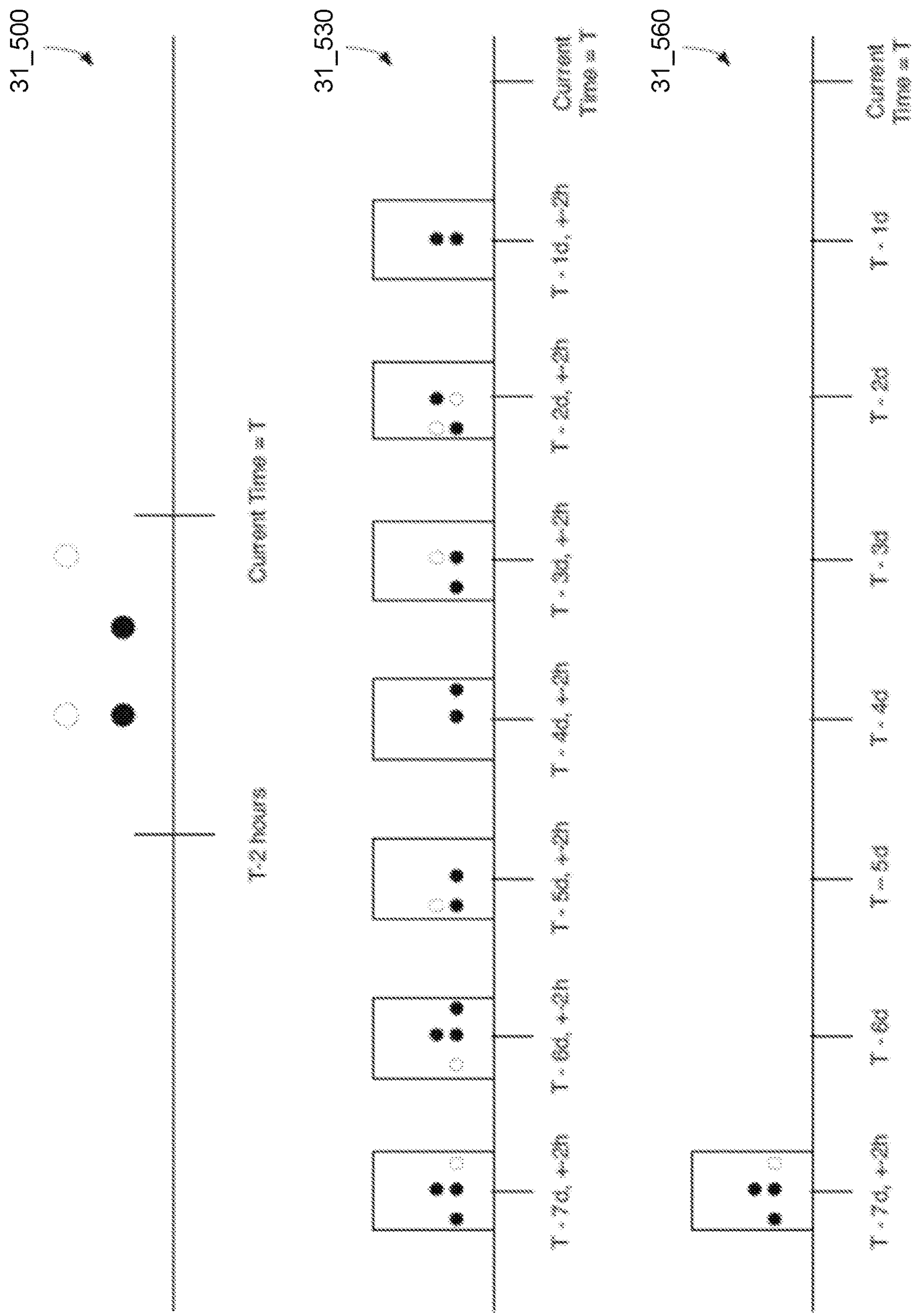
Figure 31_5

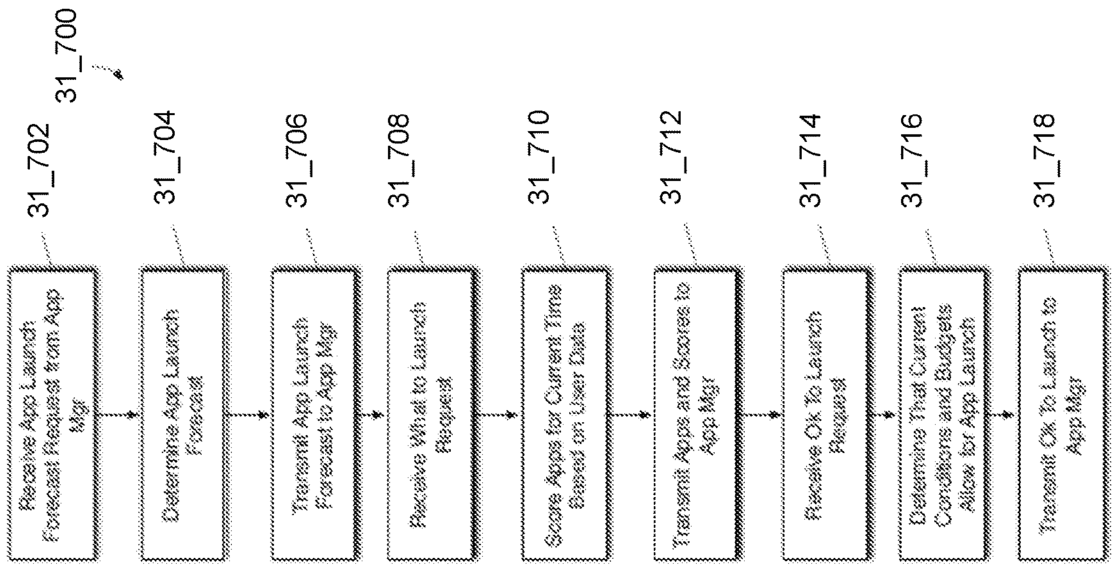
Figure 31_7
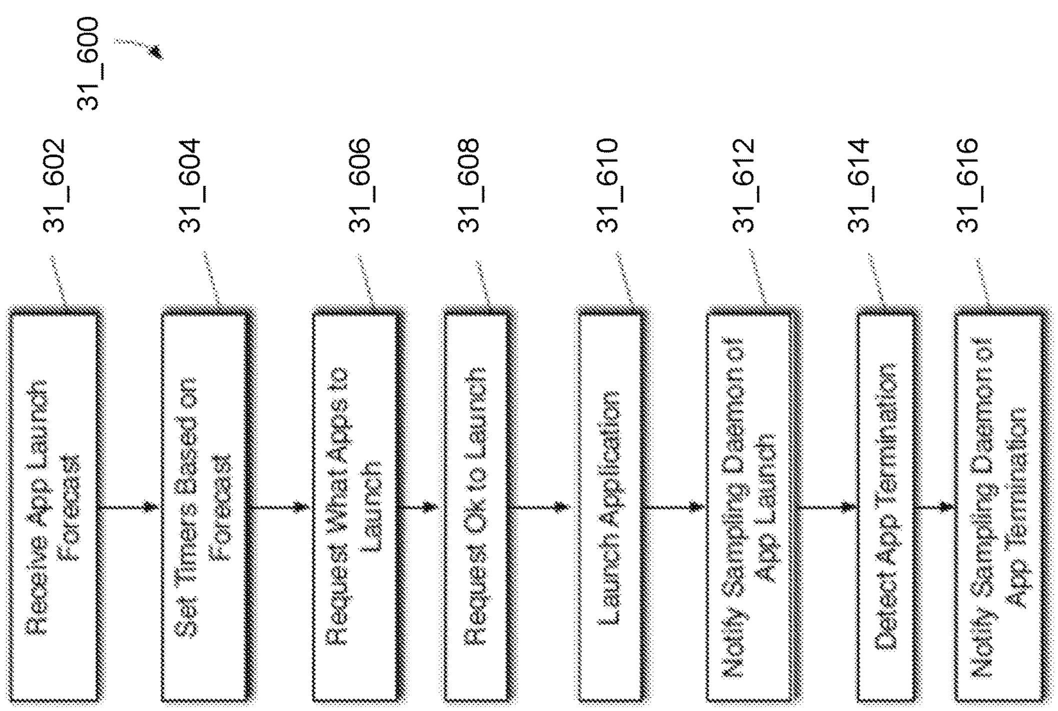
Figure 31_6

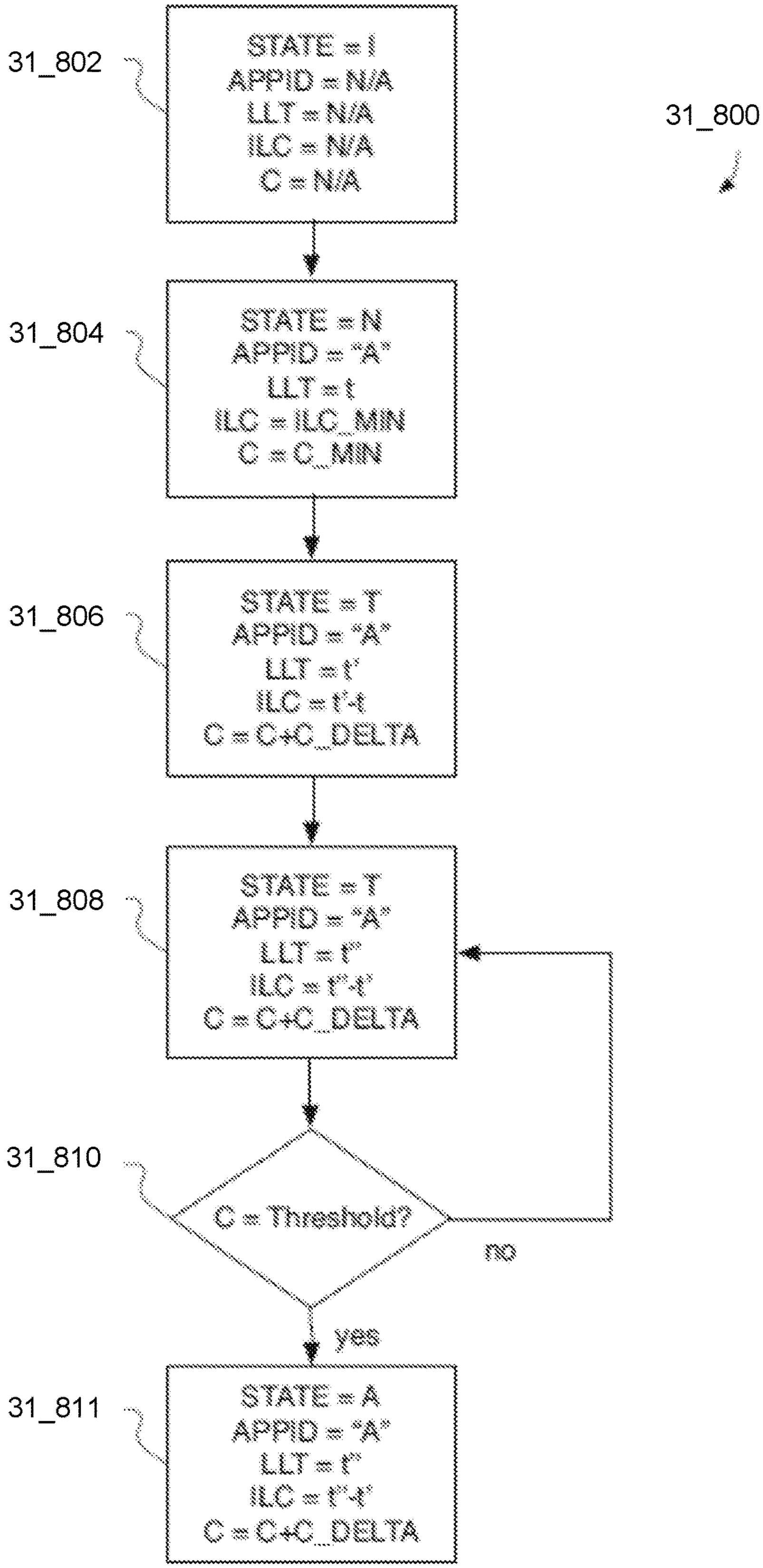
Figure 31_8

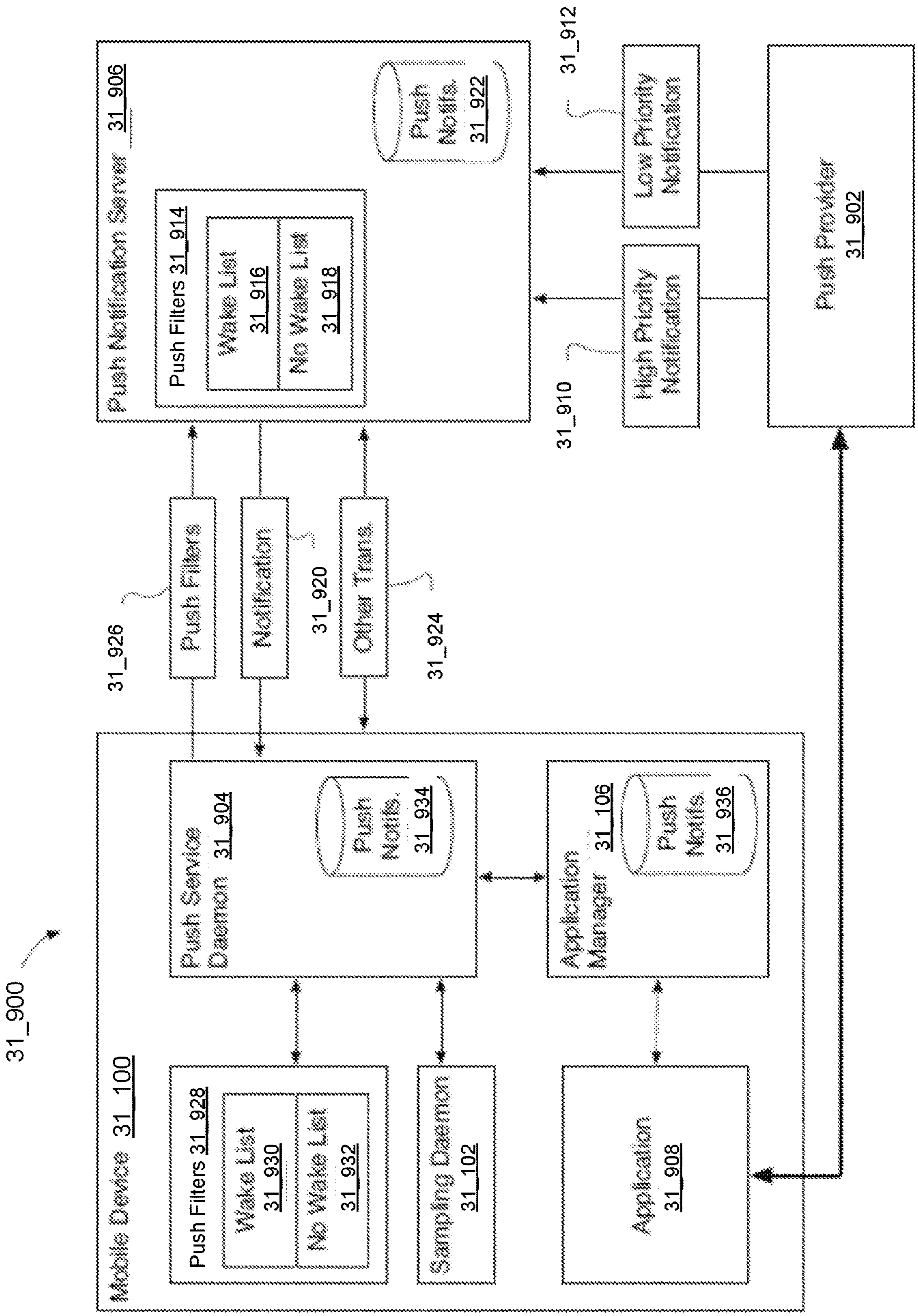
FIG. 31_9

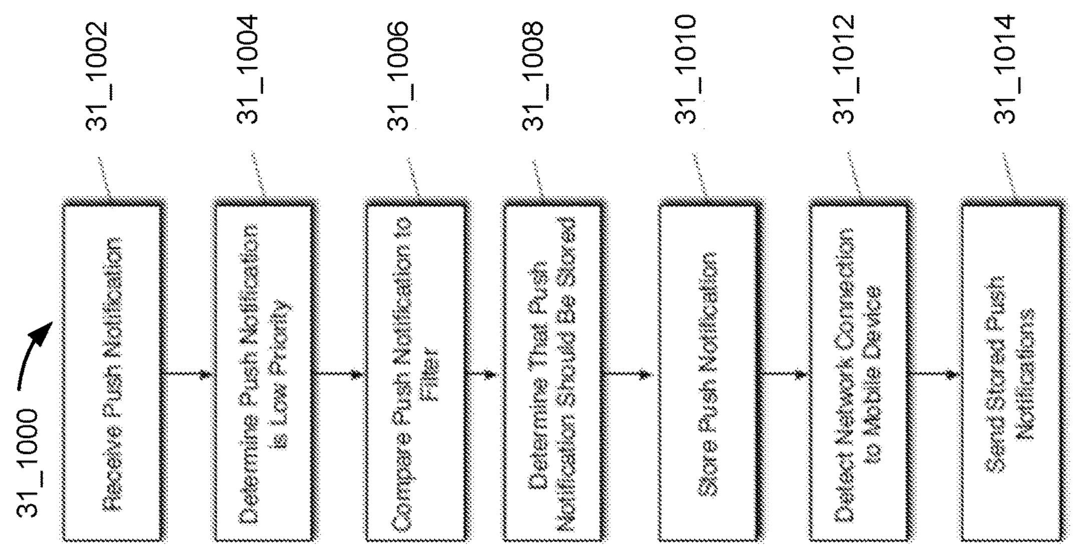
FIG. 31_10
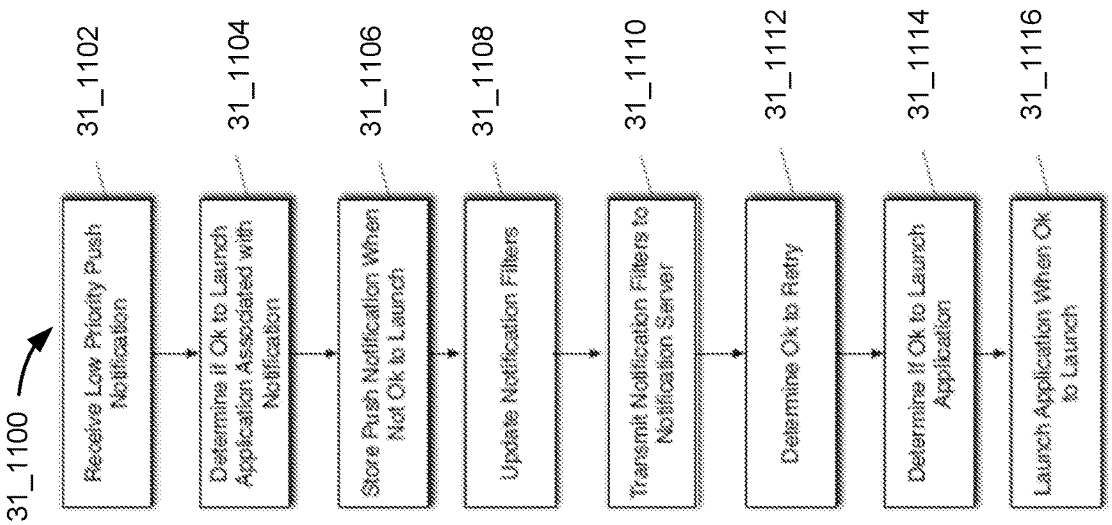
FIG. 31_11
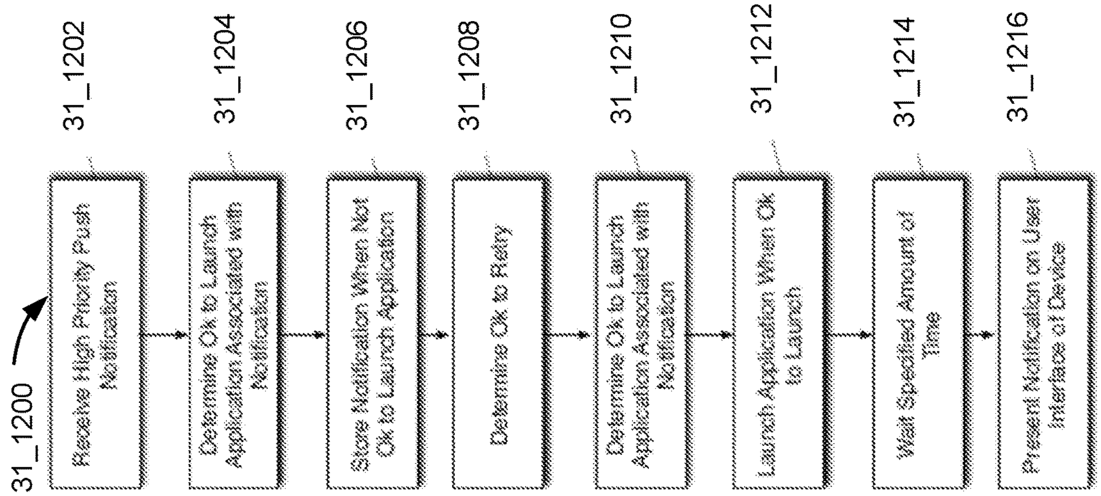
FIG. 31_12

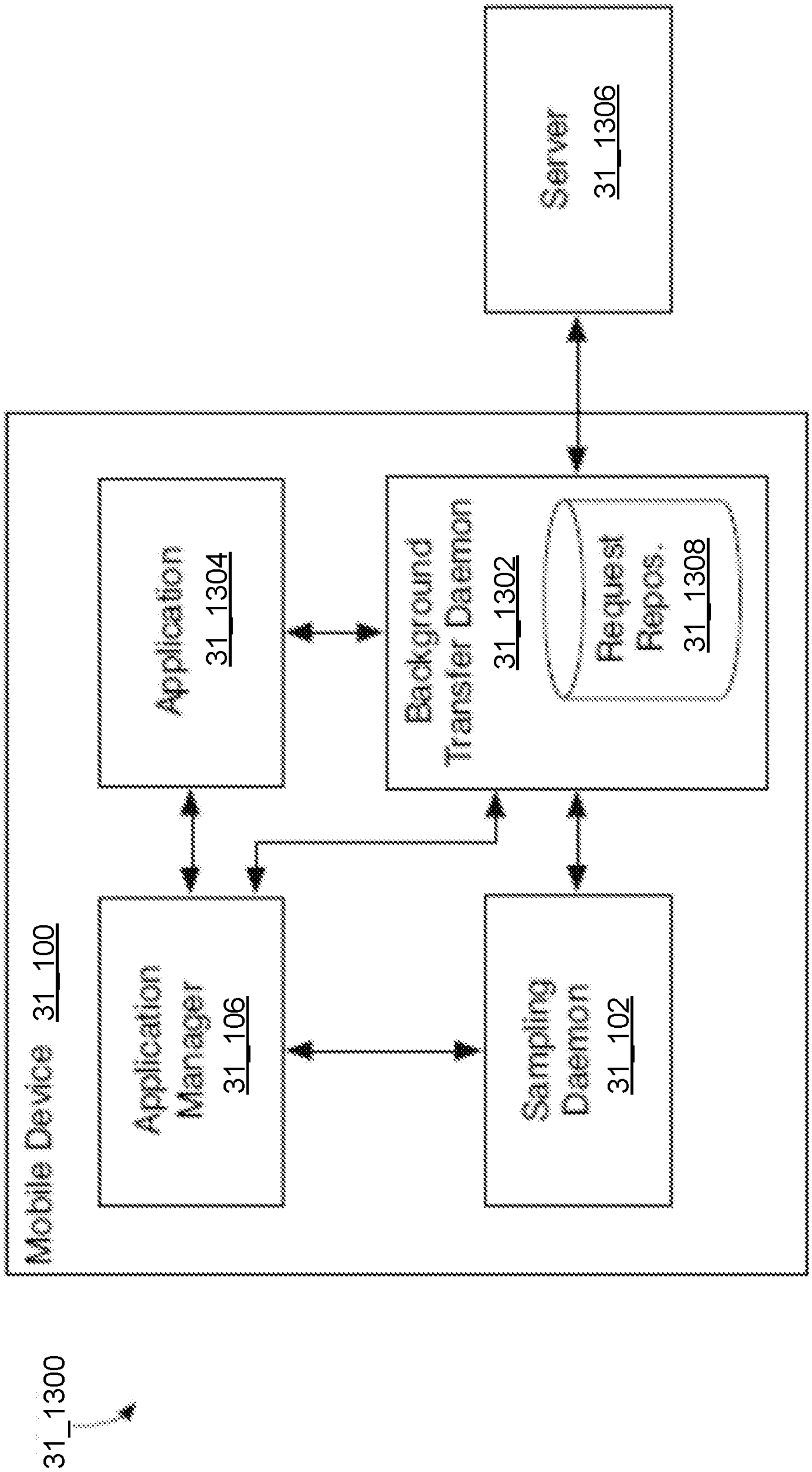
FIG. 31_13

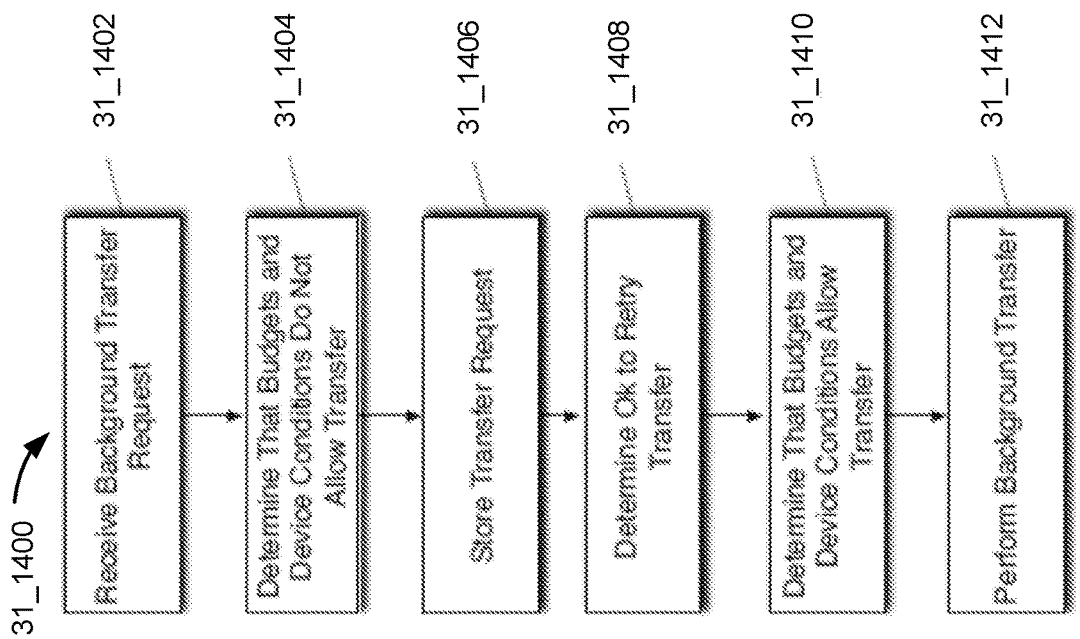
FIG. 31_14
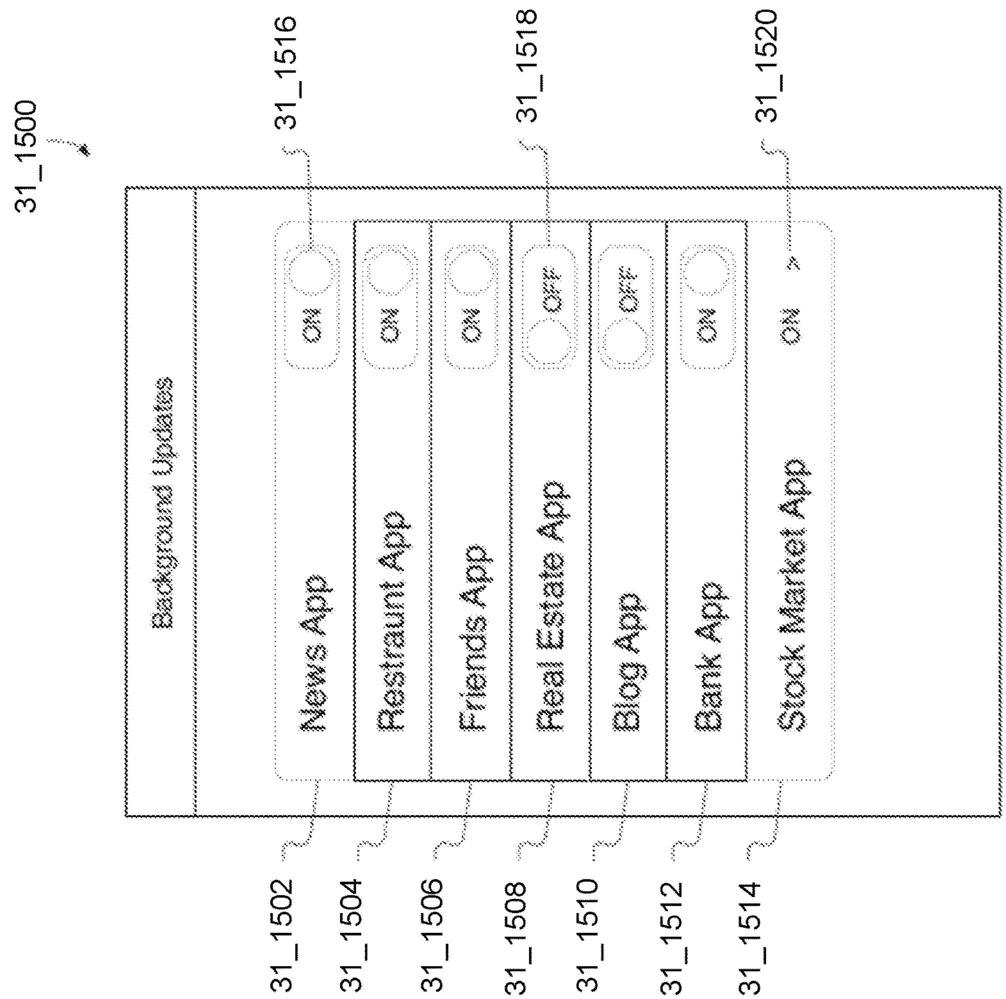
FIG. 31_15

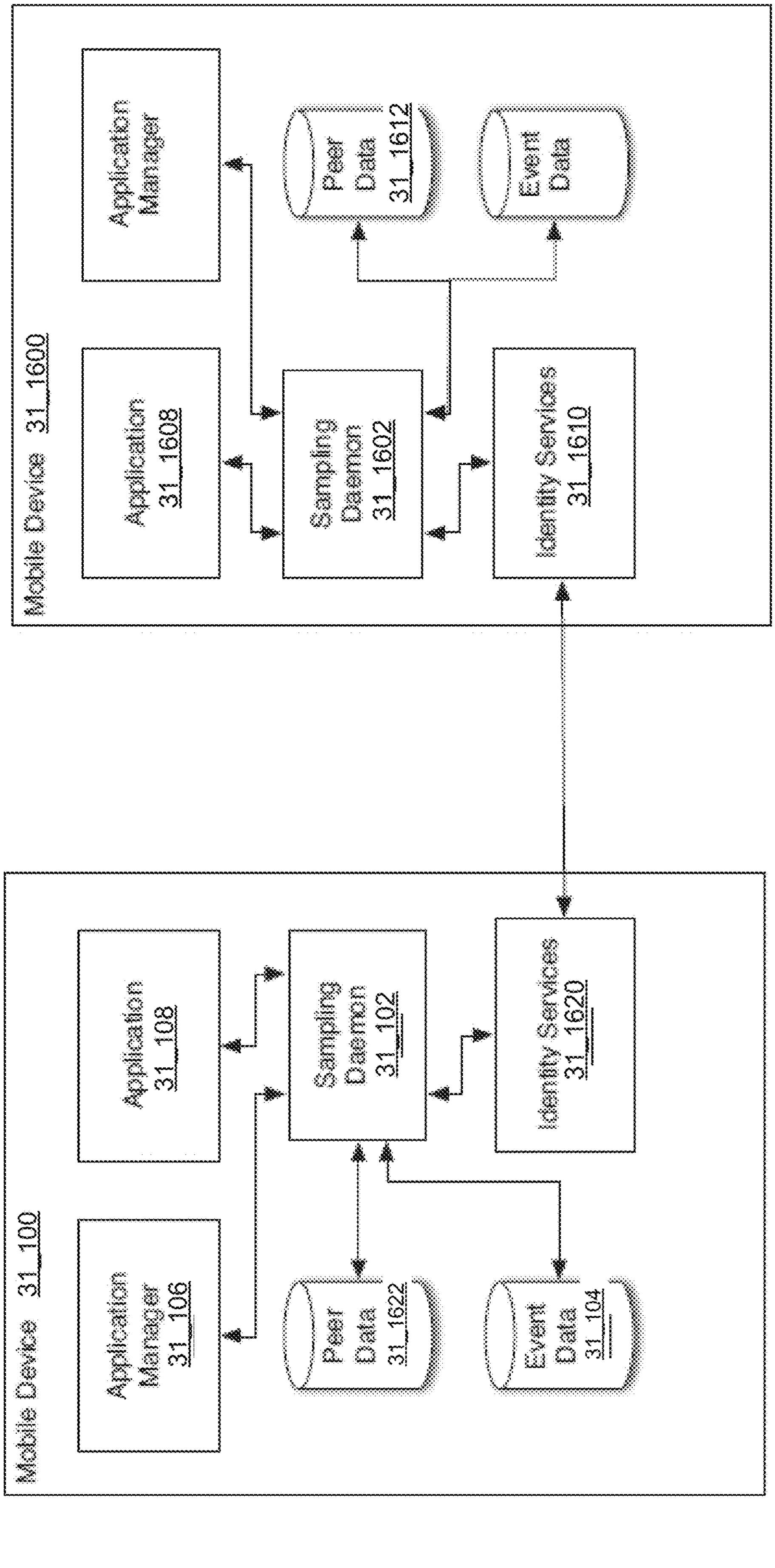
FIG. 31_16

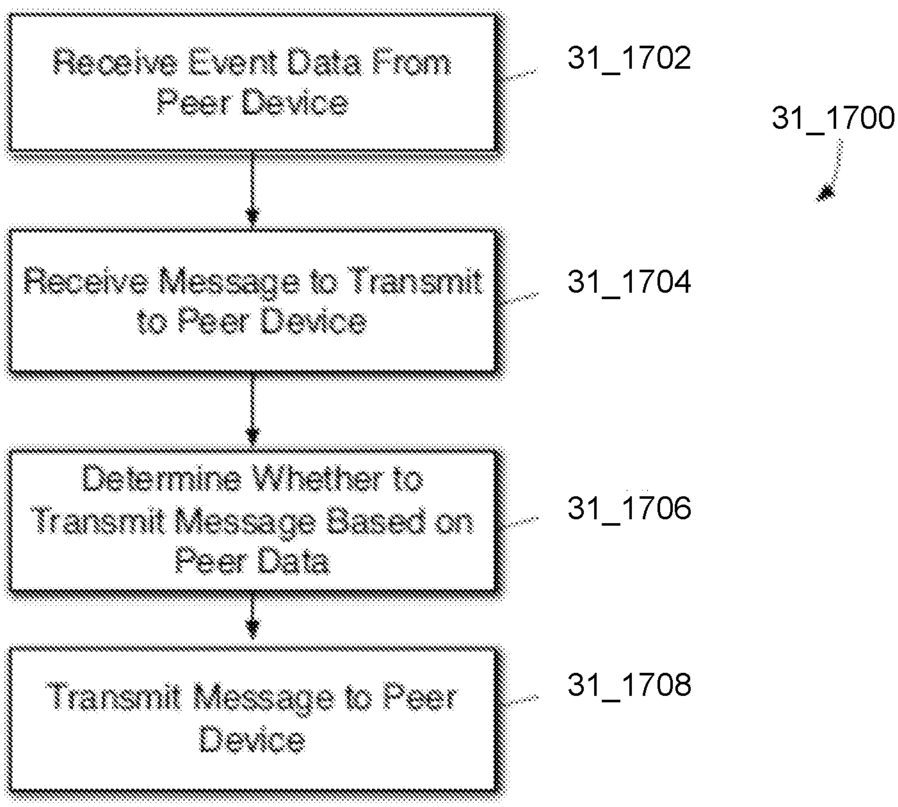
FIG. 31_17

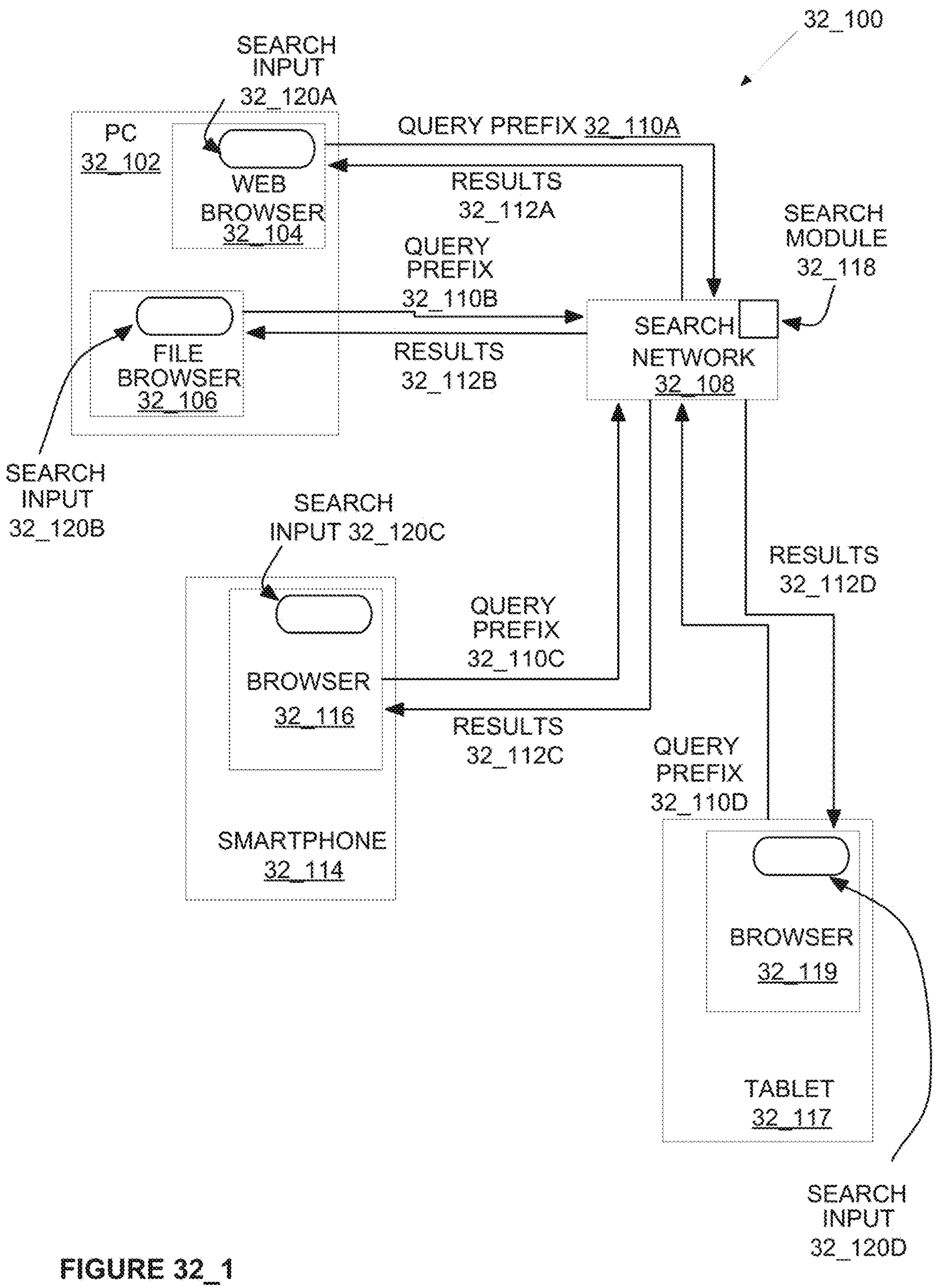
FIGURE 32_1

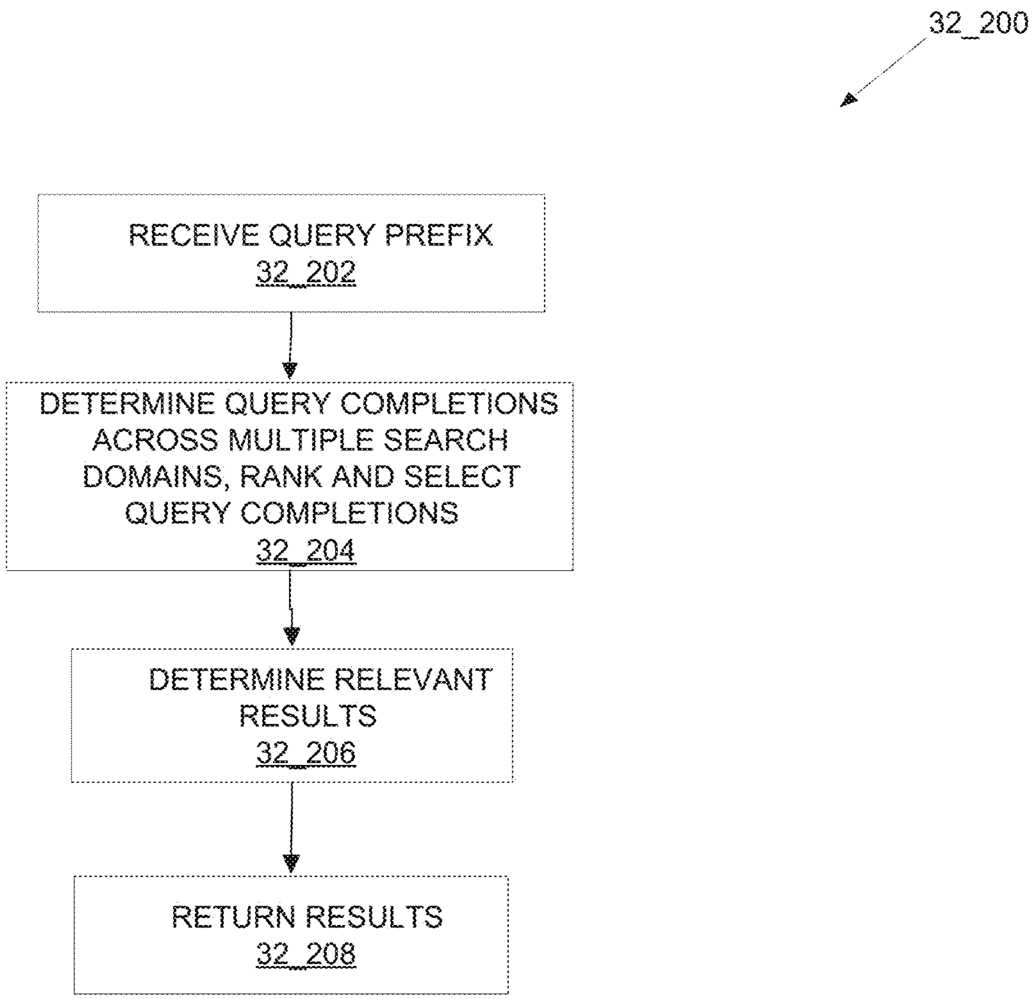
FIGURE 32_2

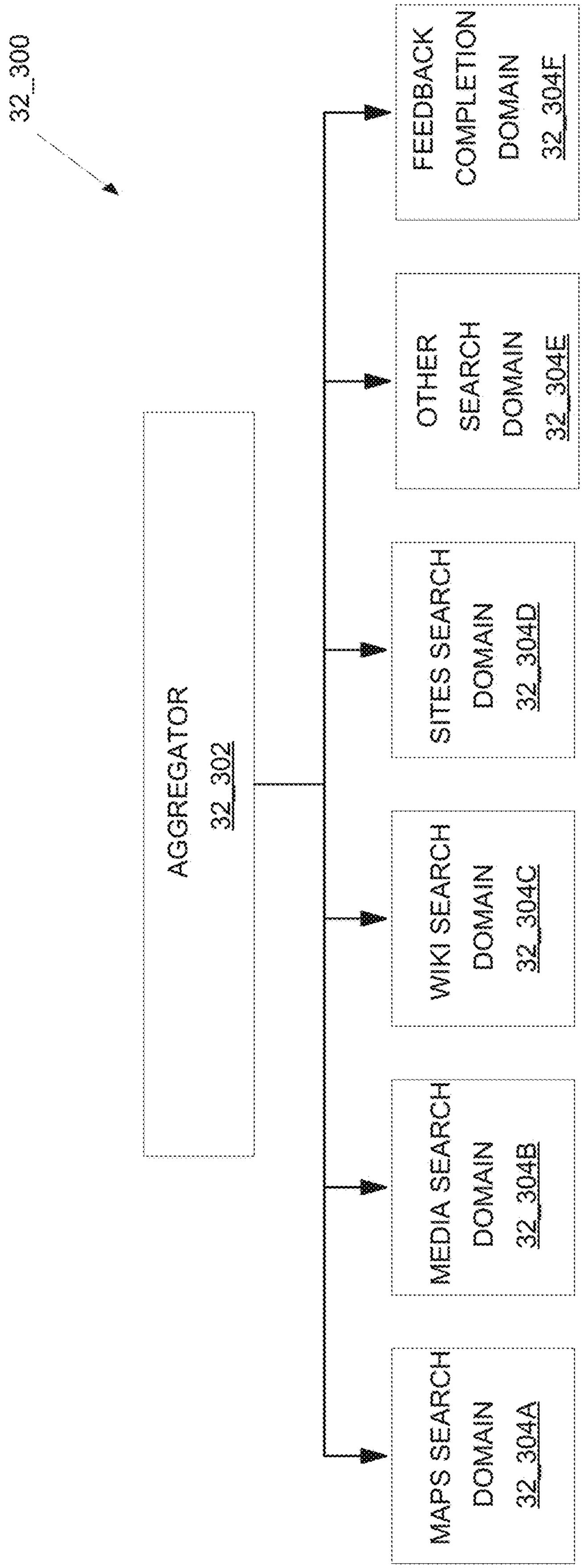
FIGURE 32_3

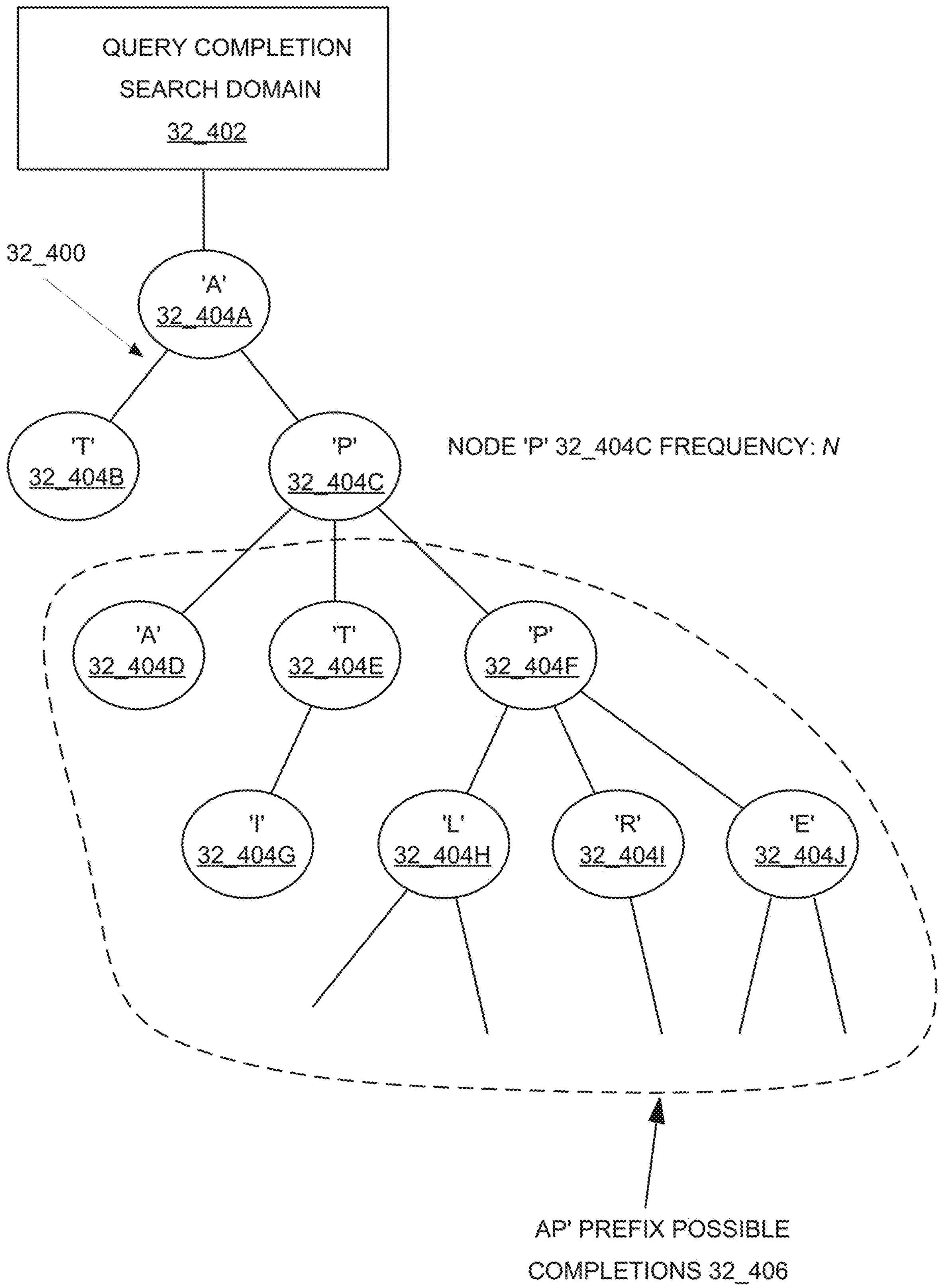
FIGURE 32_4

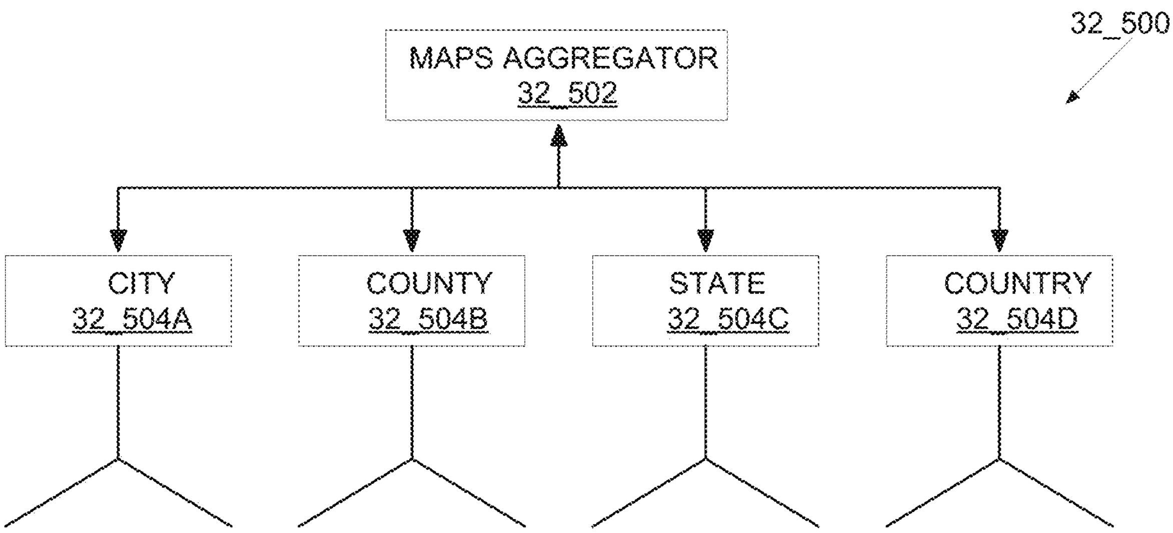
FIGURE 32_5

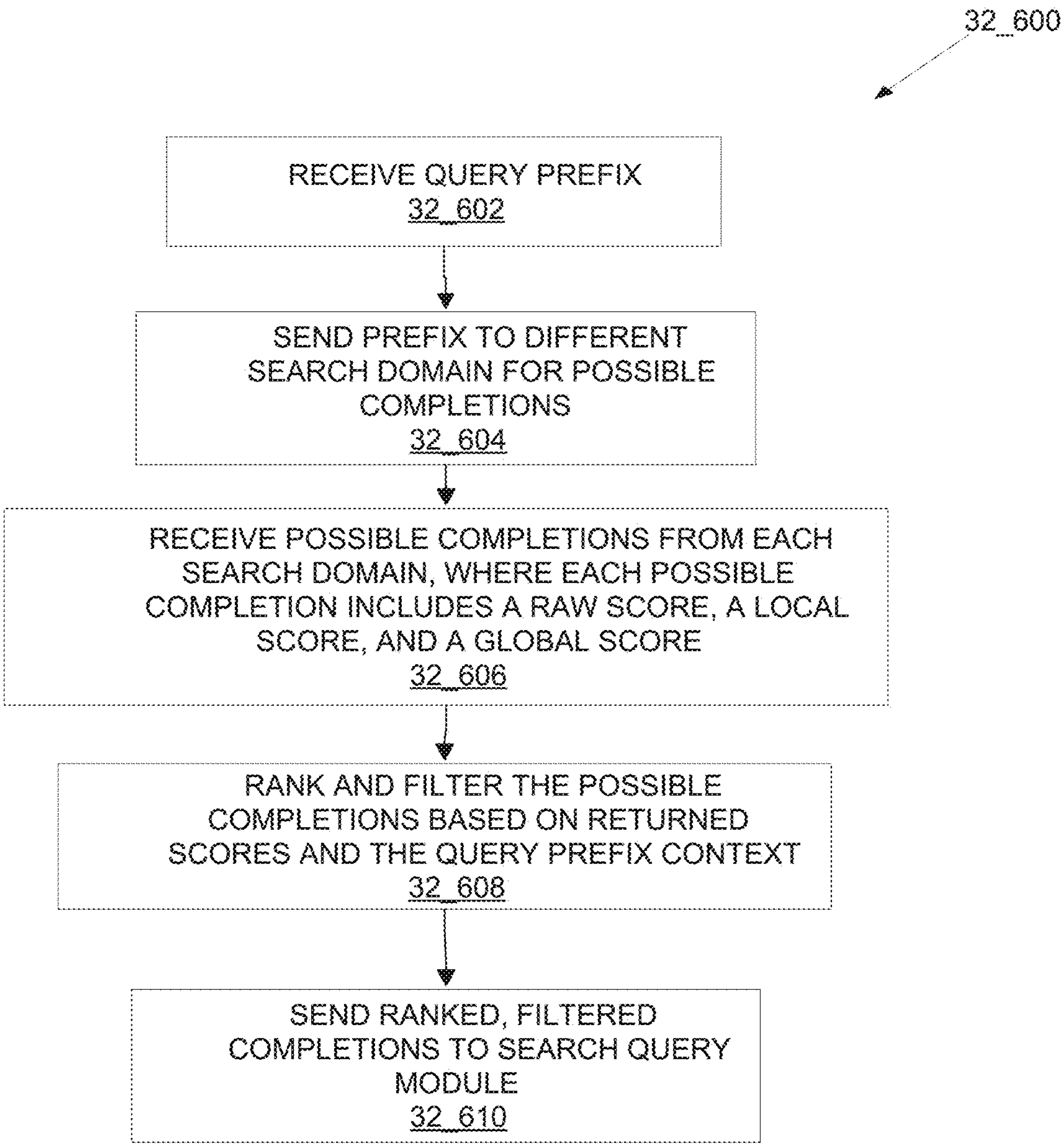
FIGURE 32_6

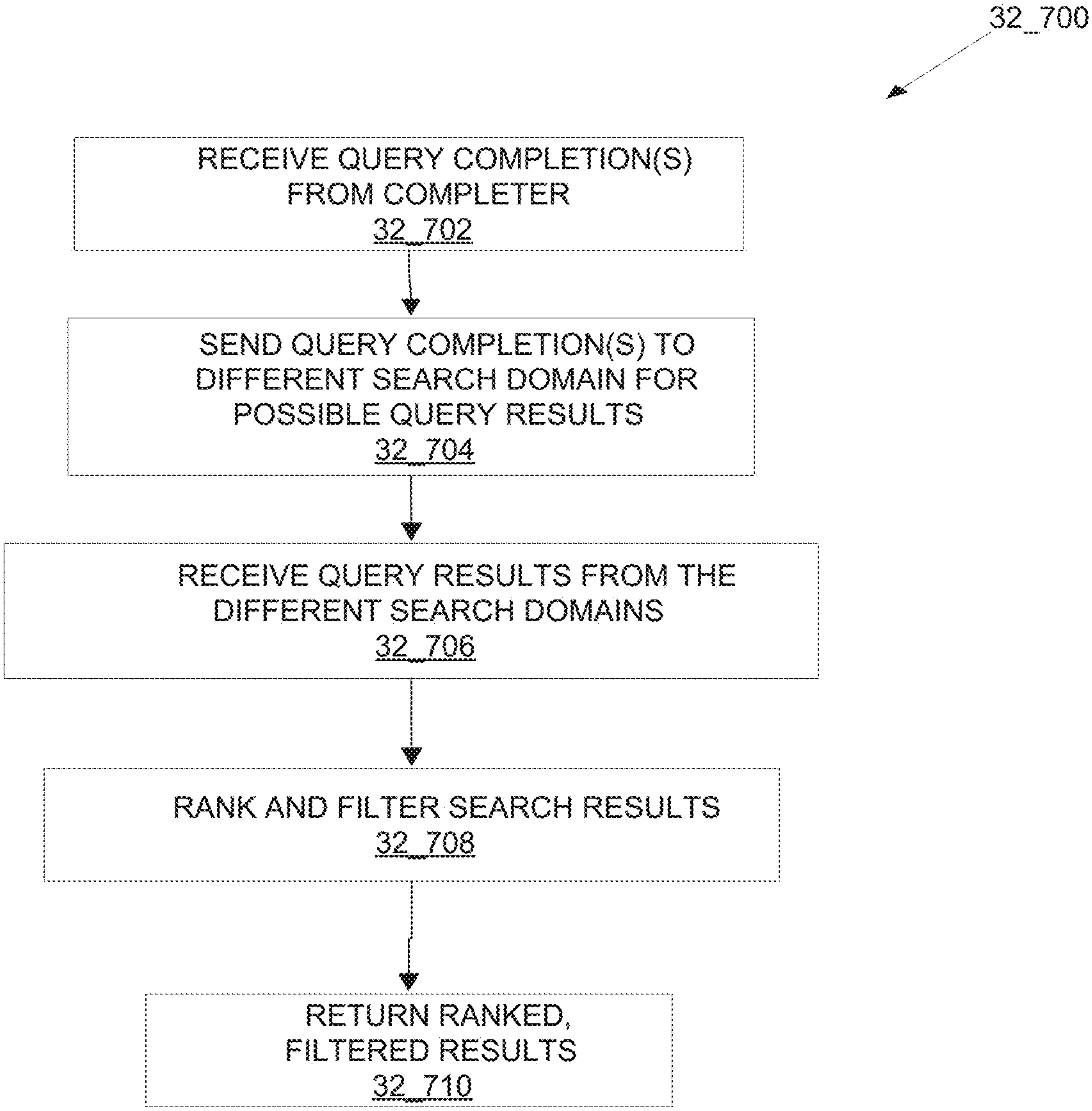
FIGURE 32_7

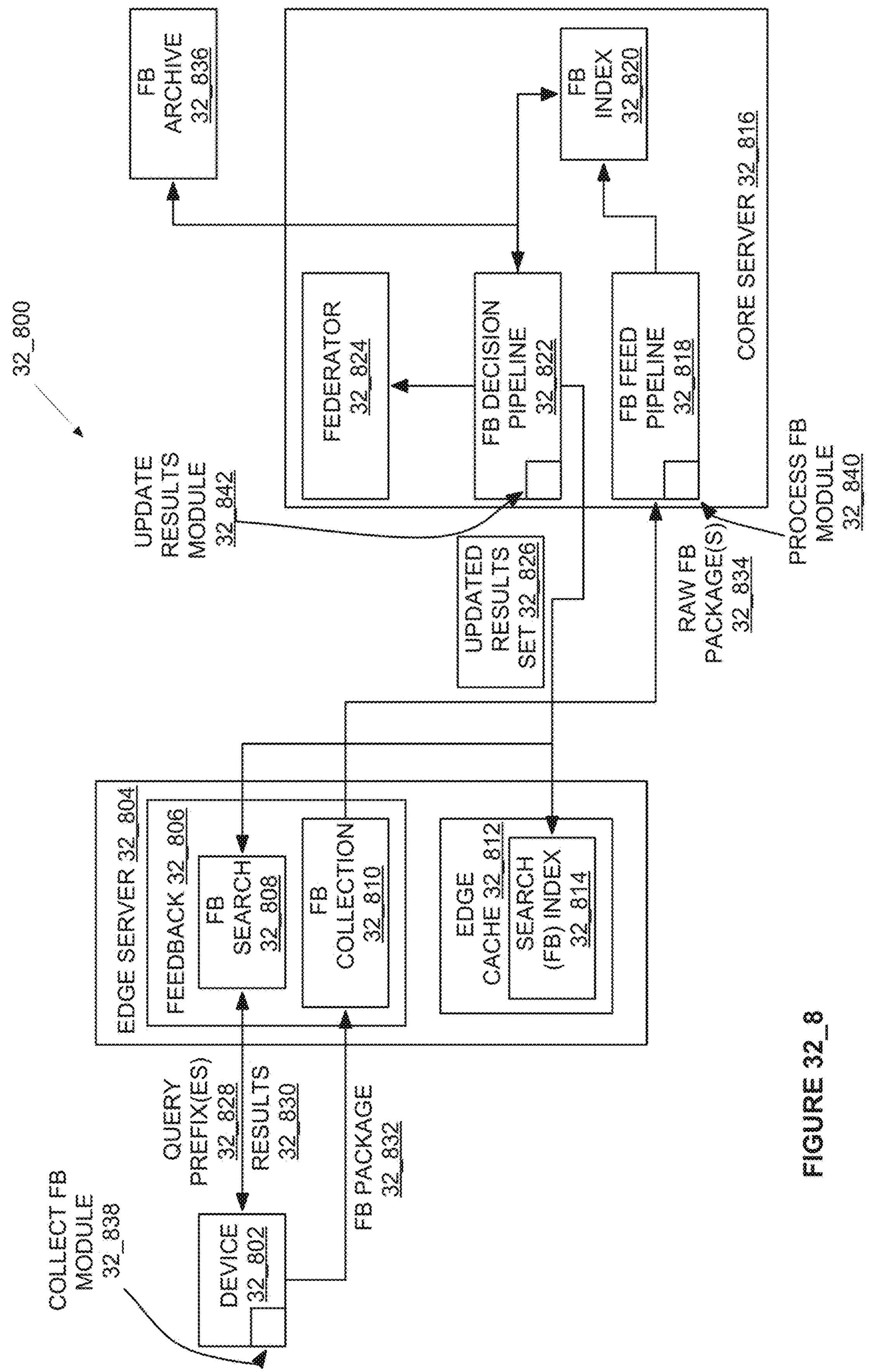
FIGURE 32_8

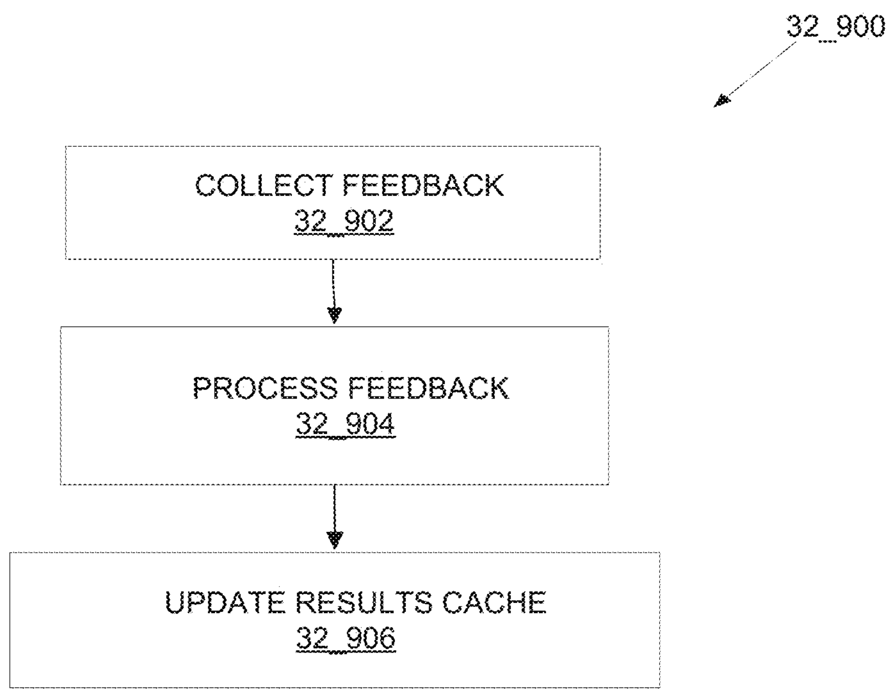
FIGURE 32_9

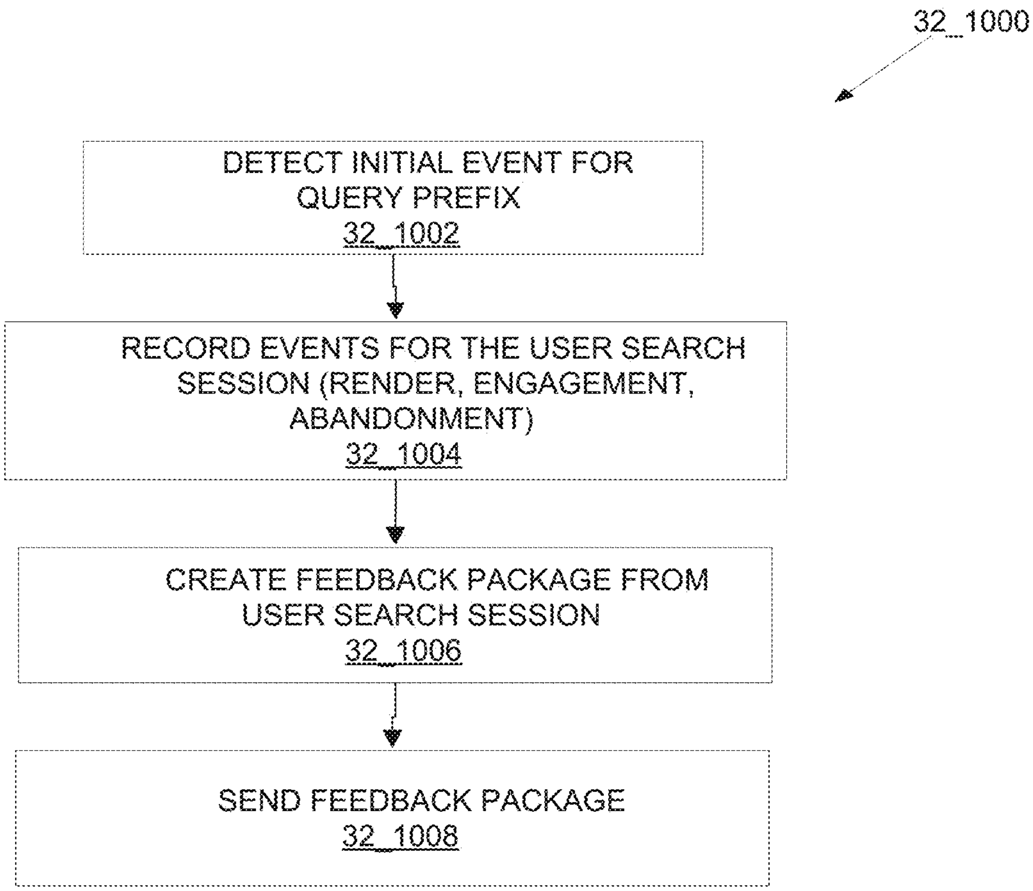
FIGURE 32_10

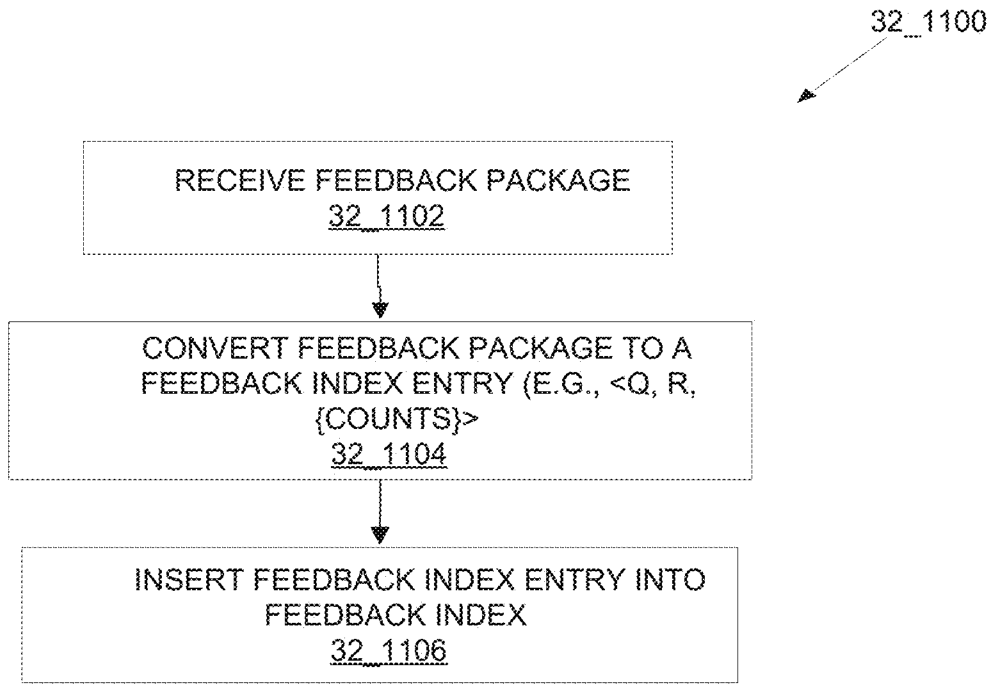
FIGURE 32_11

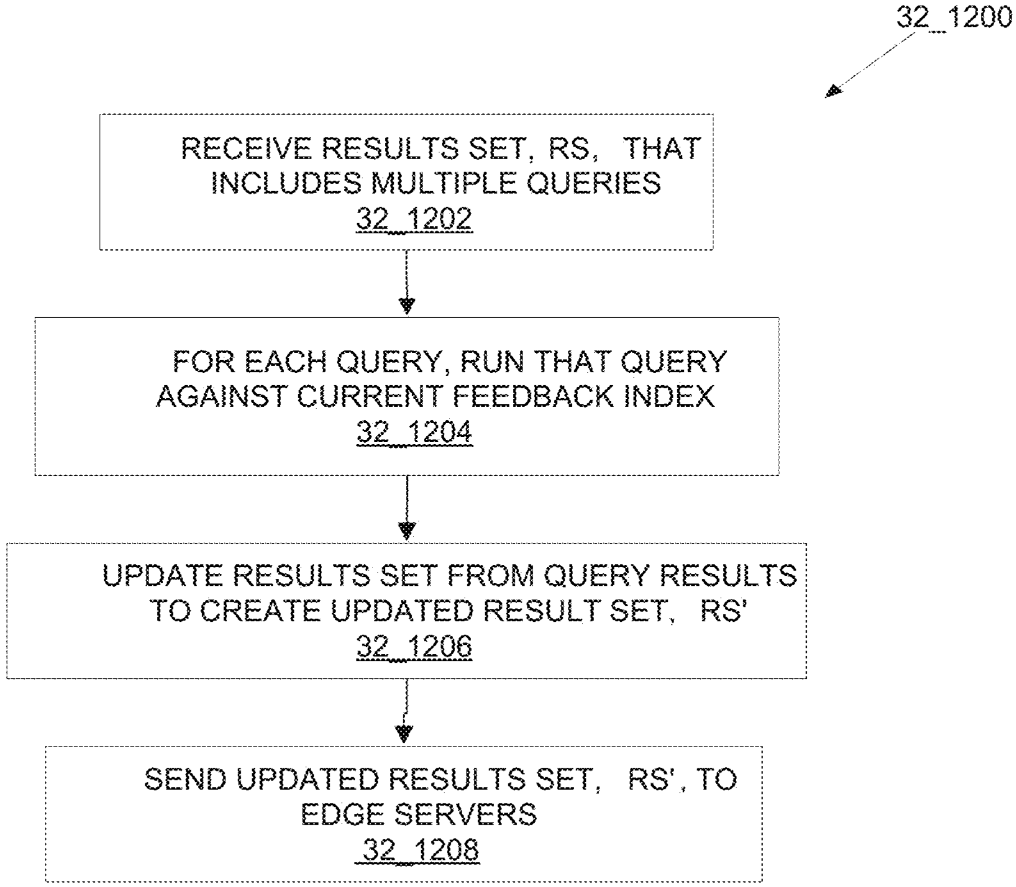
FIGURE 32_12

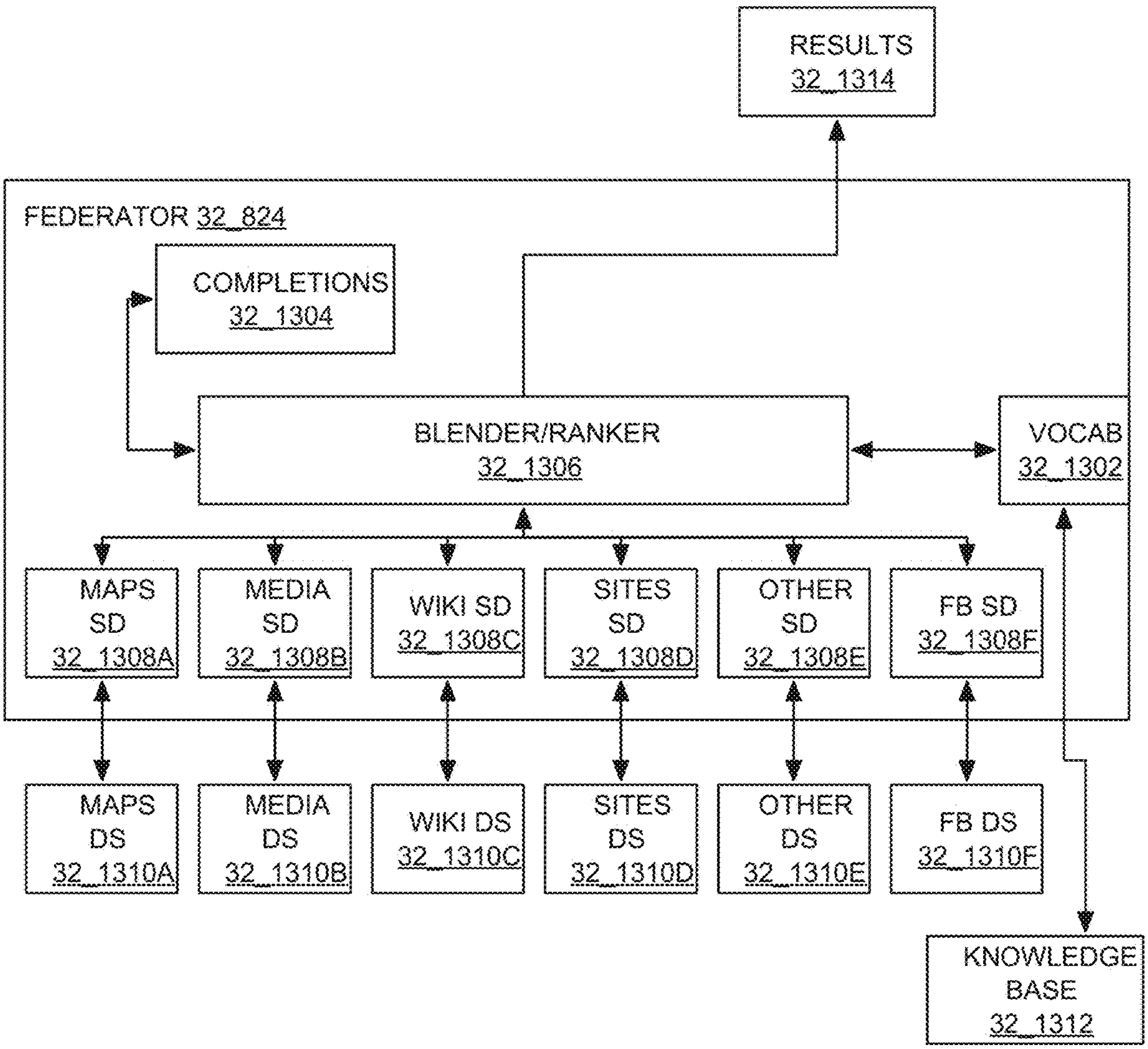
FIGURE 32_13

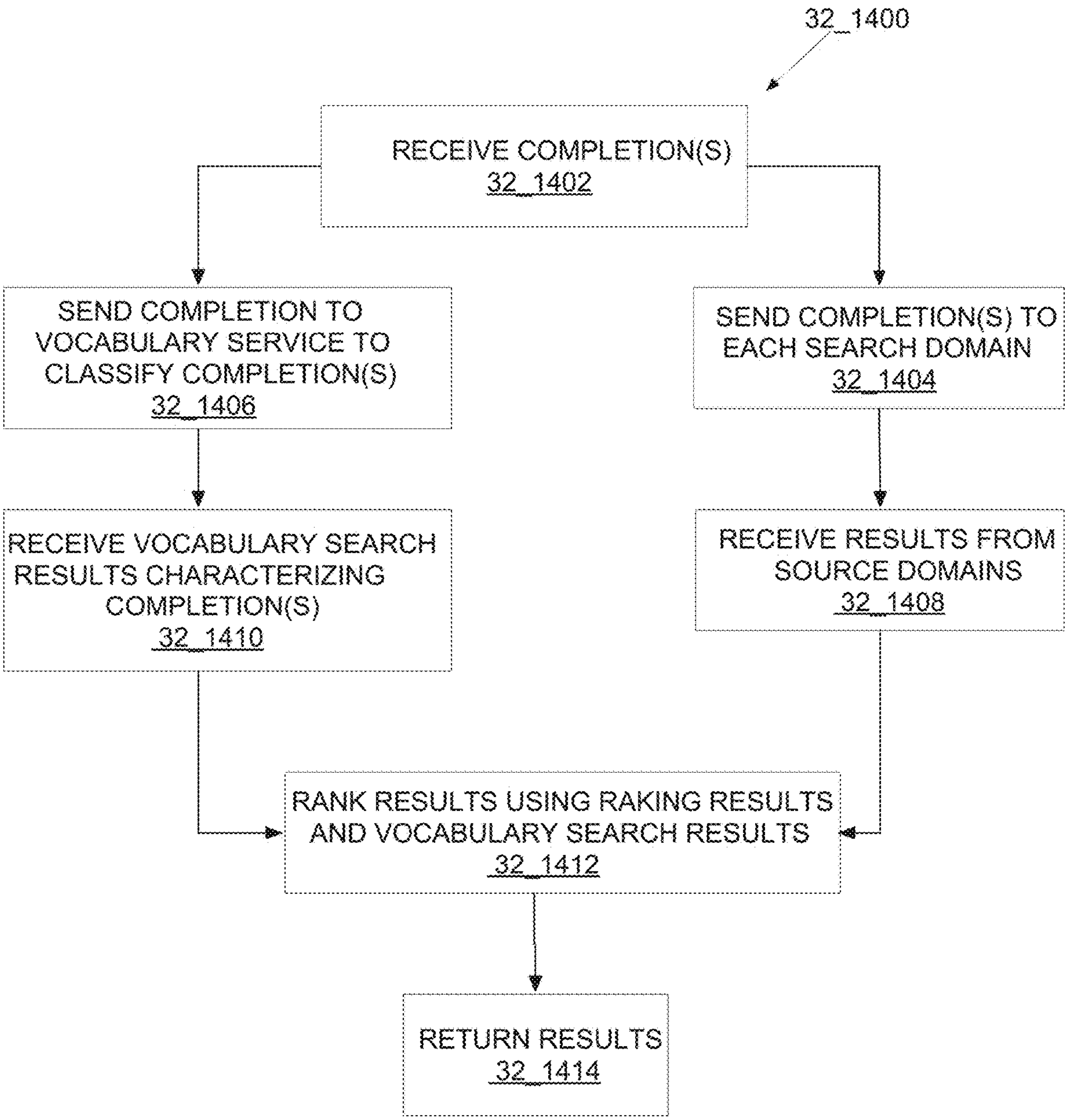
FIGURE 32_14

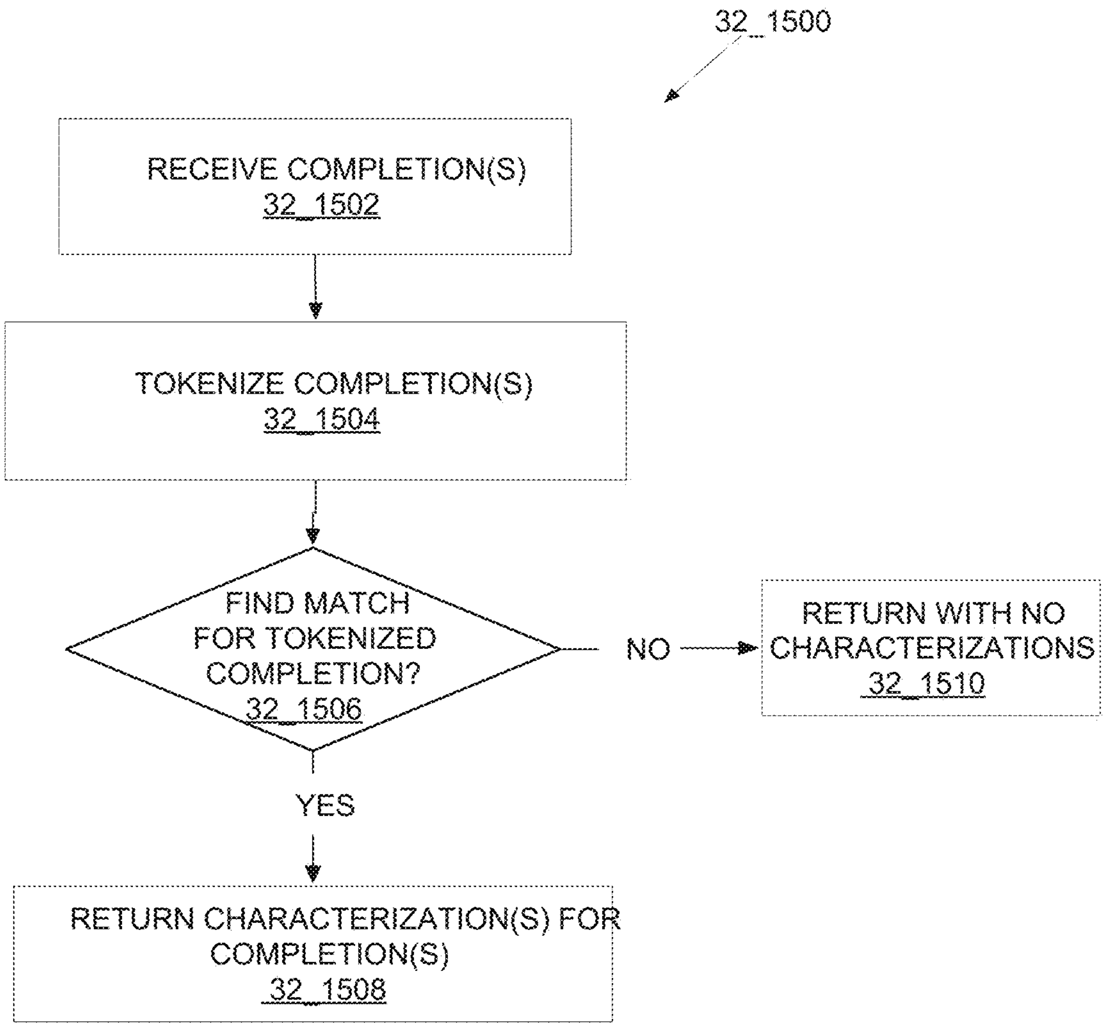
FIGURE 32_15

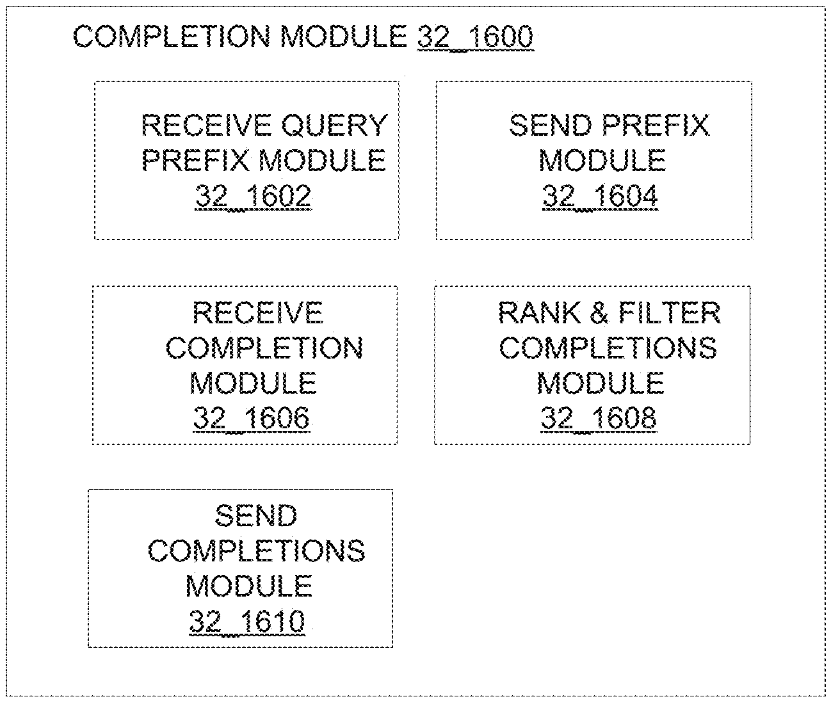
FIGURE 32_16

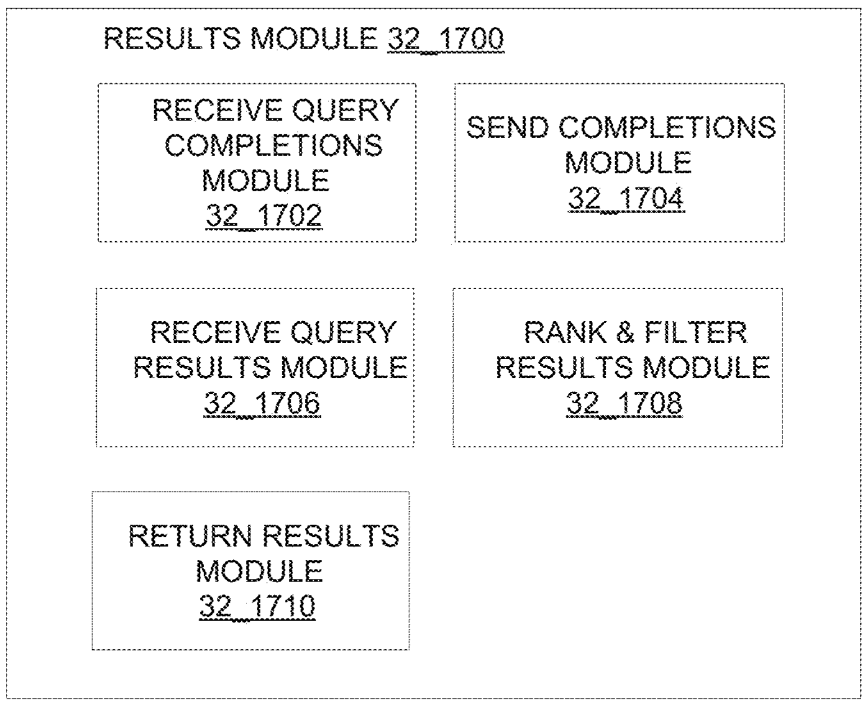
FIGURE 32_17

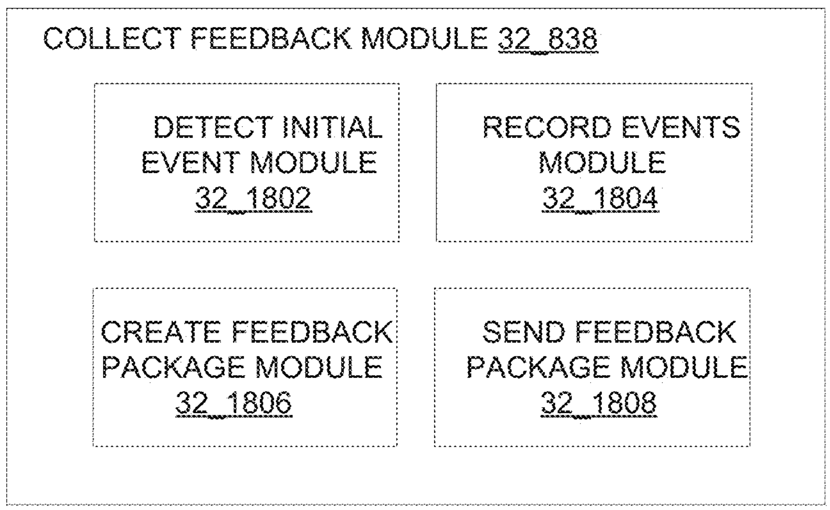
FIGURE 32_18

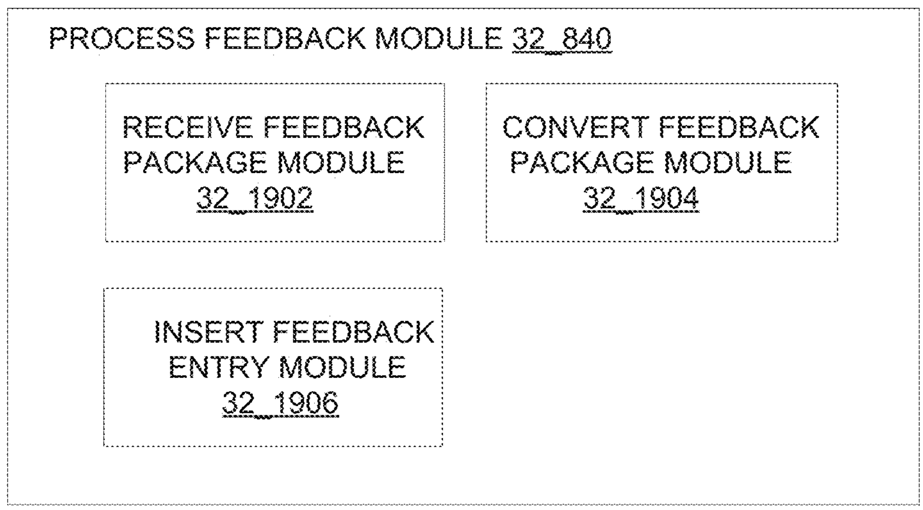
FIGURE 32_19

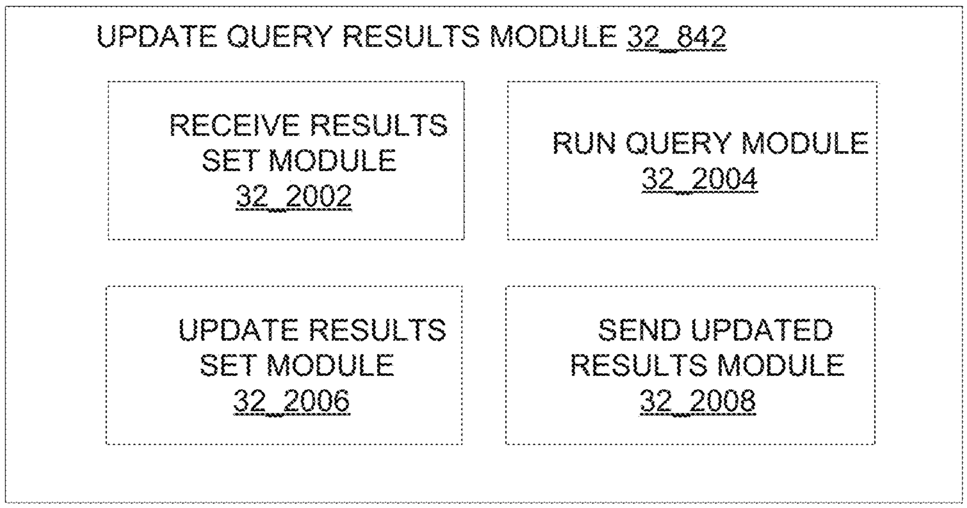
FIGURE 32_20

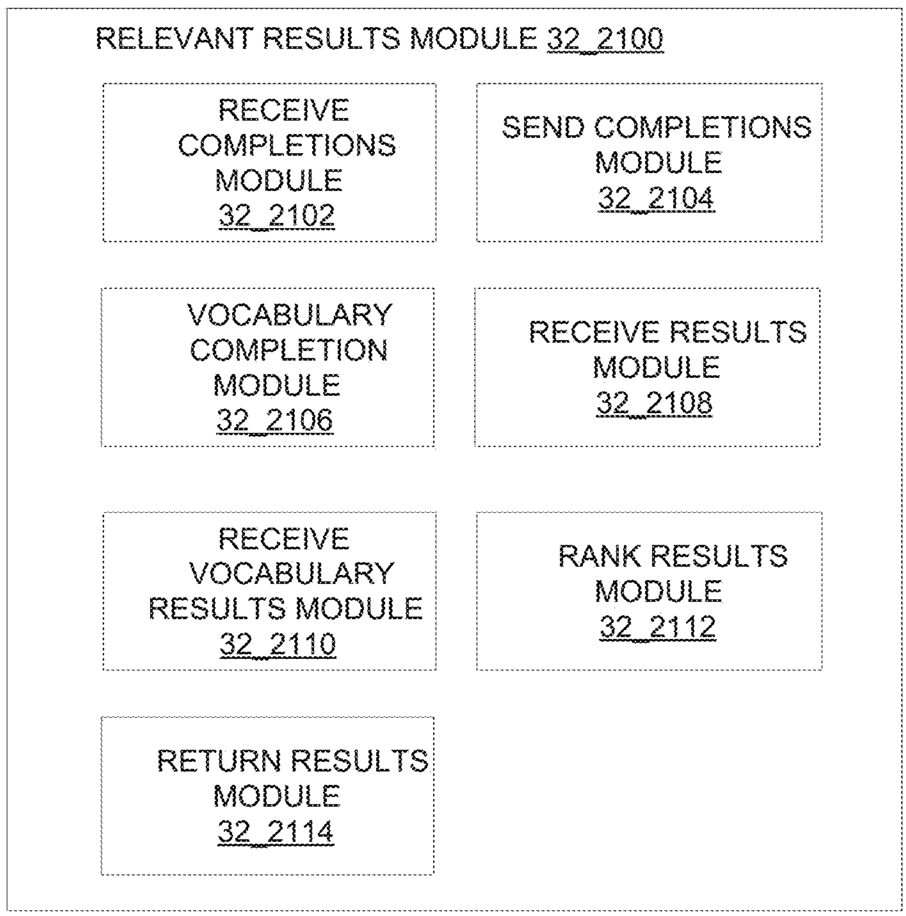
FIGURE 32_21

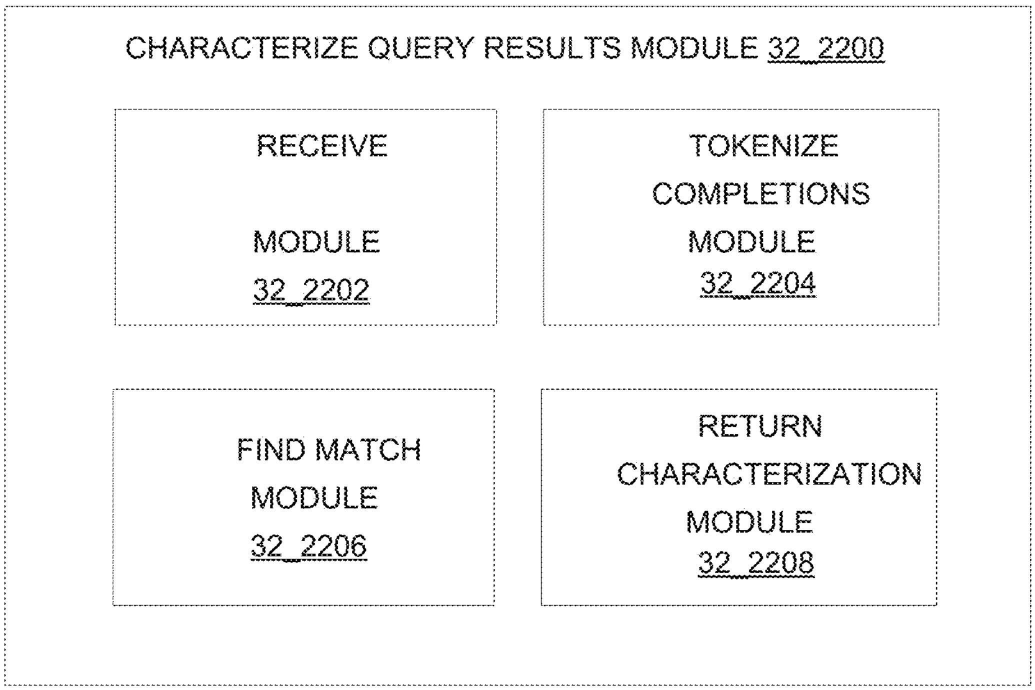
FIGURE 32_22

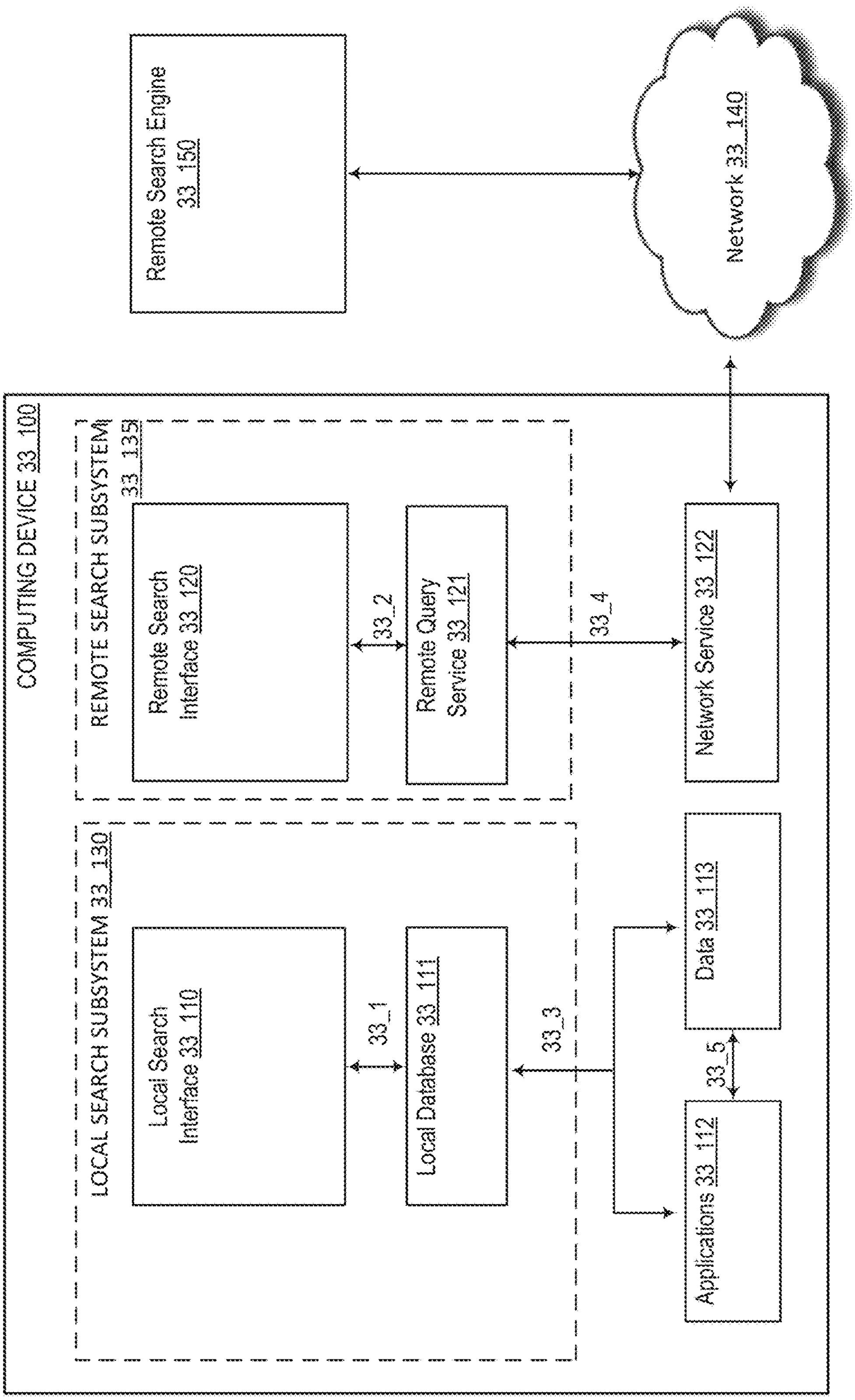
FIG. 33_1
(Prior Art)

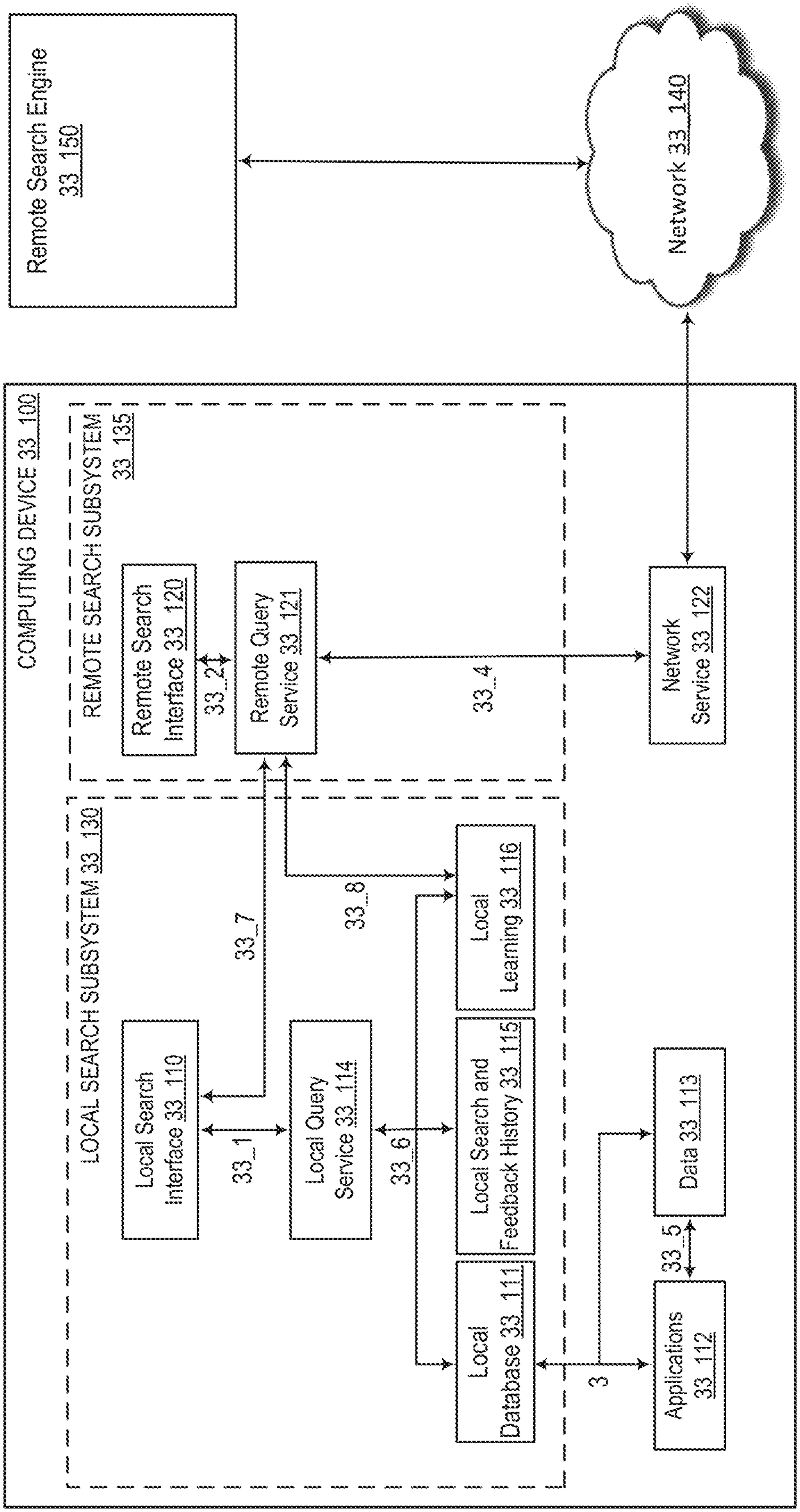
FIG. 33_2

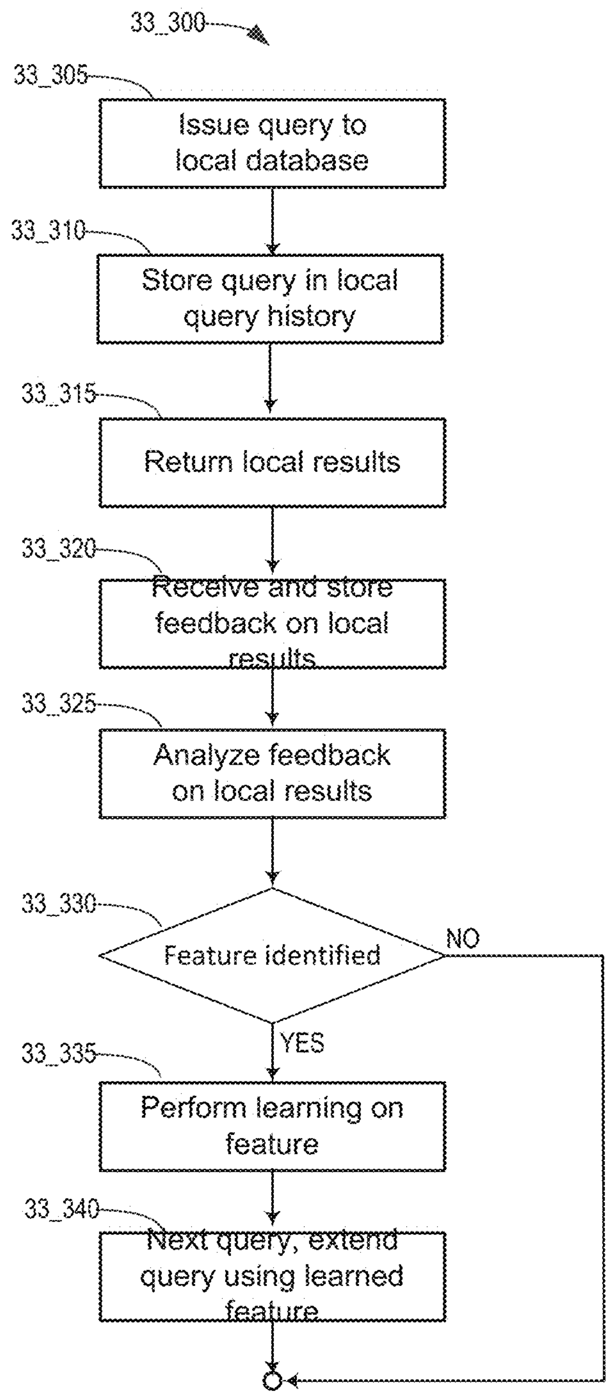
FIG. 33_3

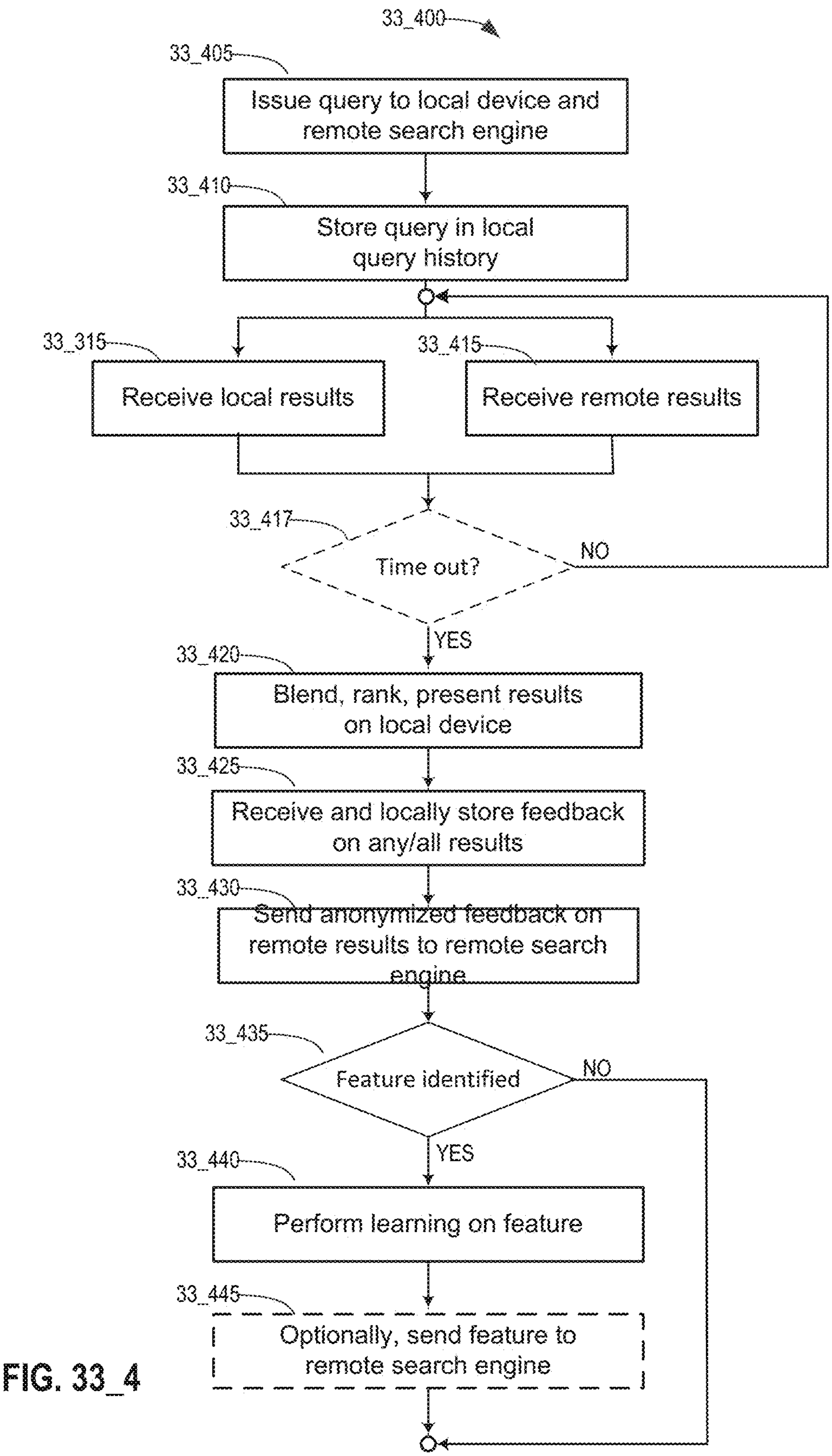
FIG. 33_4

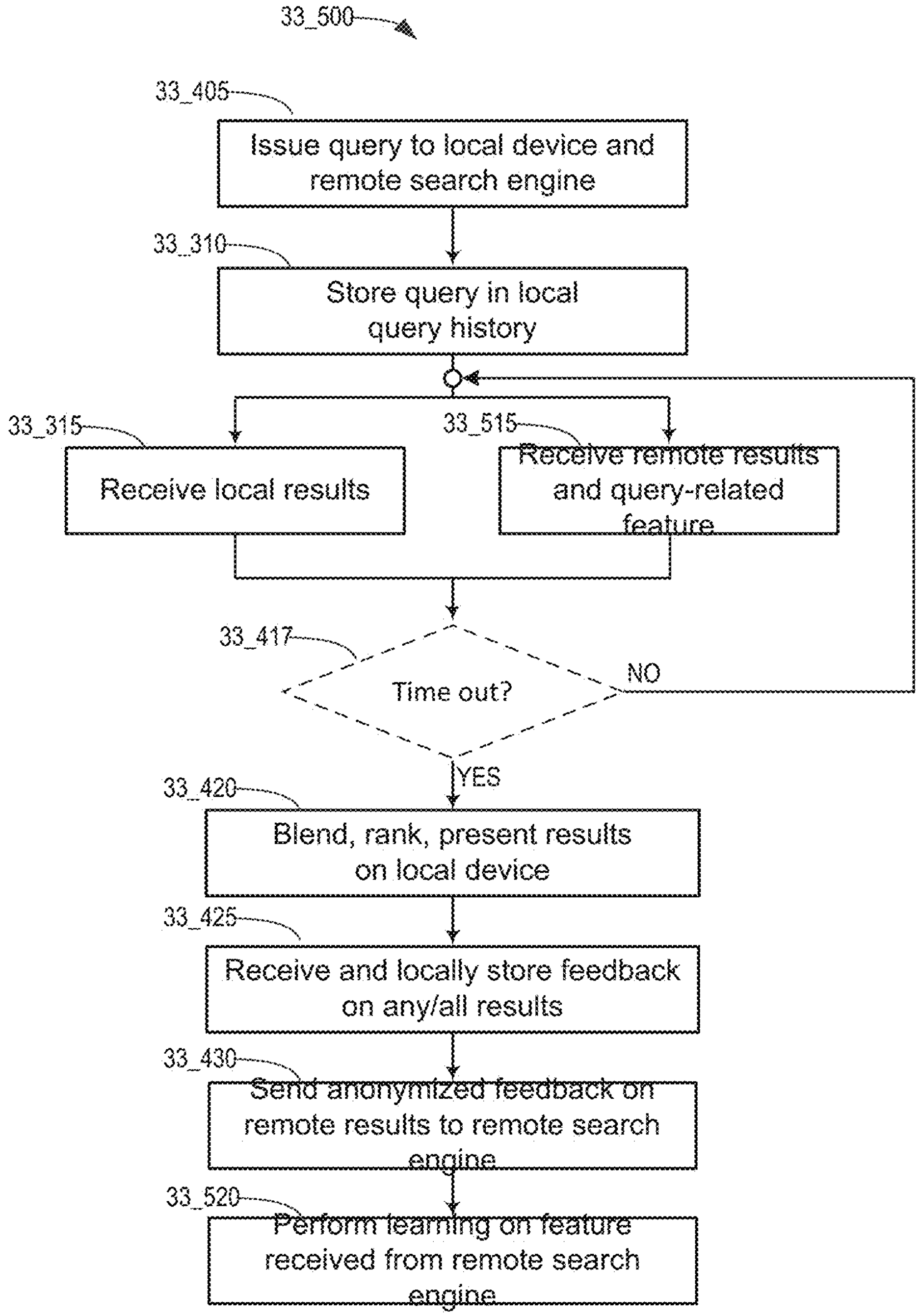
FIG. 33_5

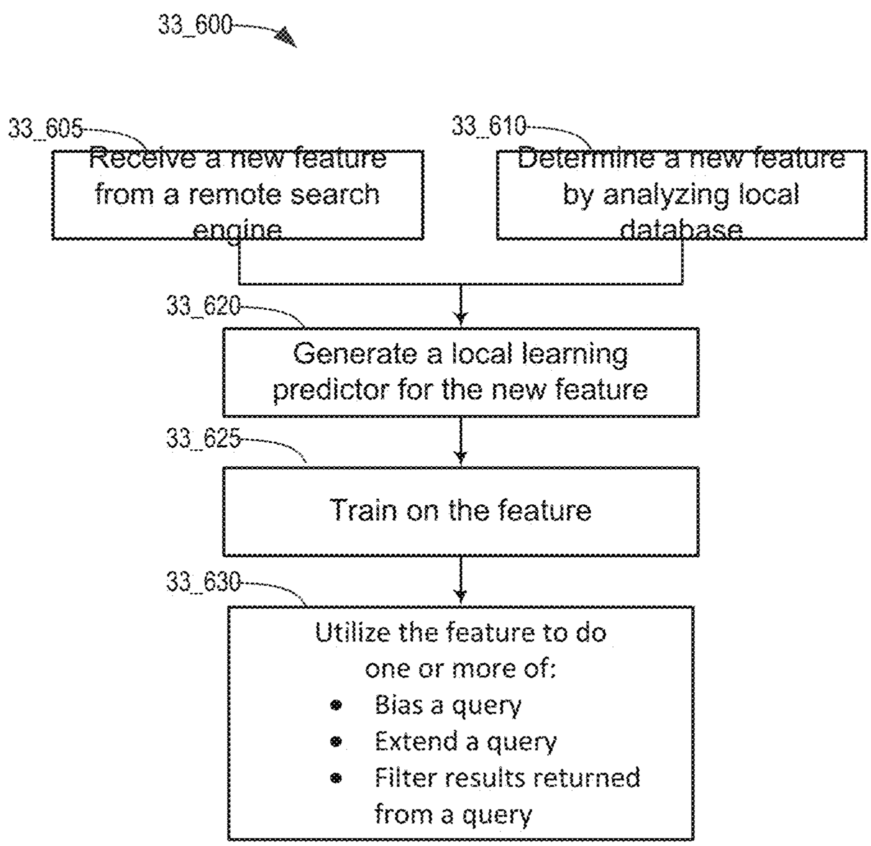
FIG. 33_6

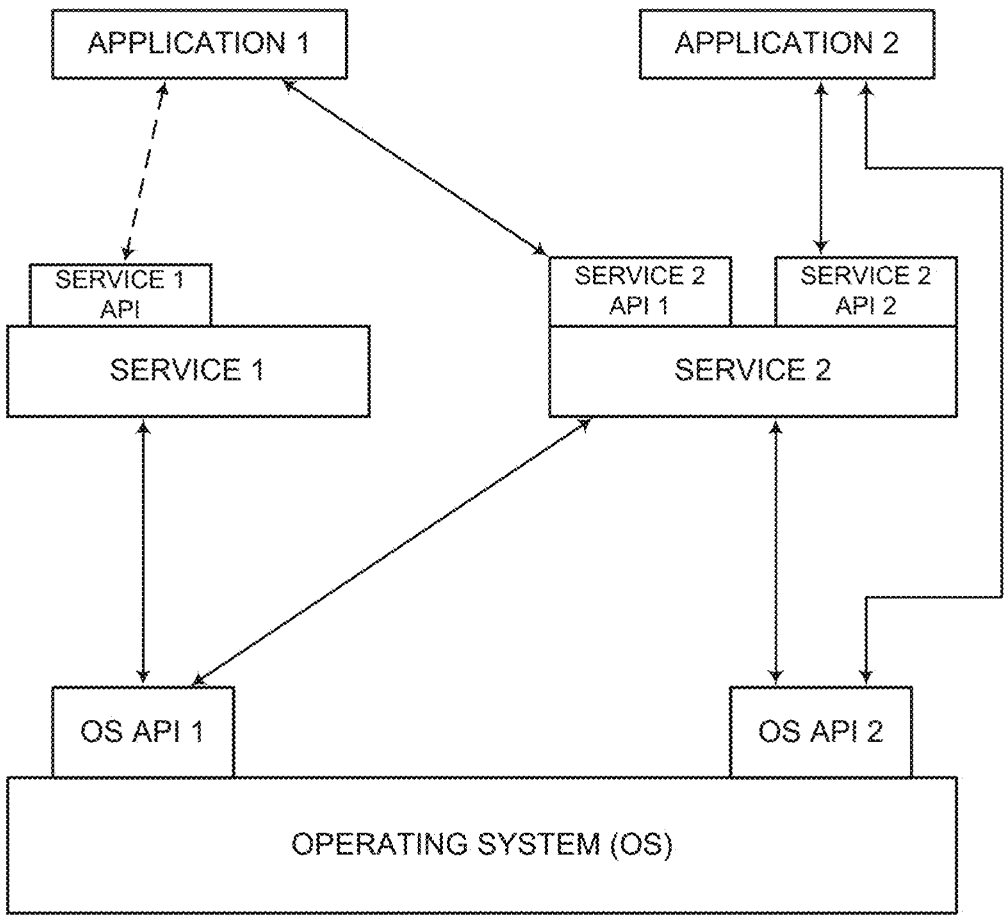
FIG. 33_7

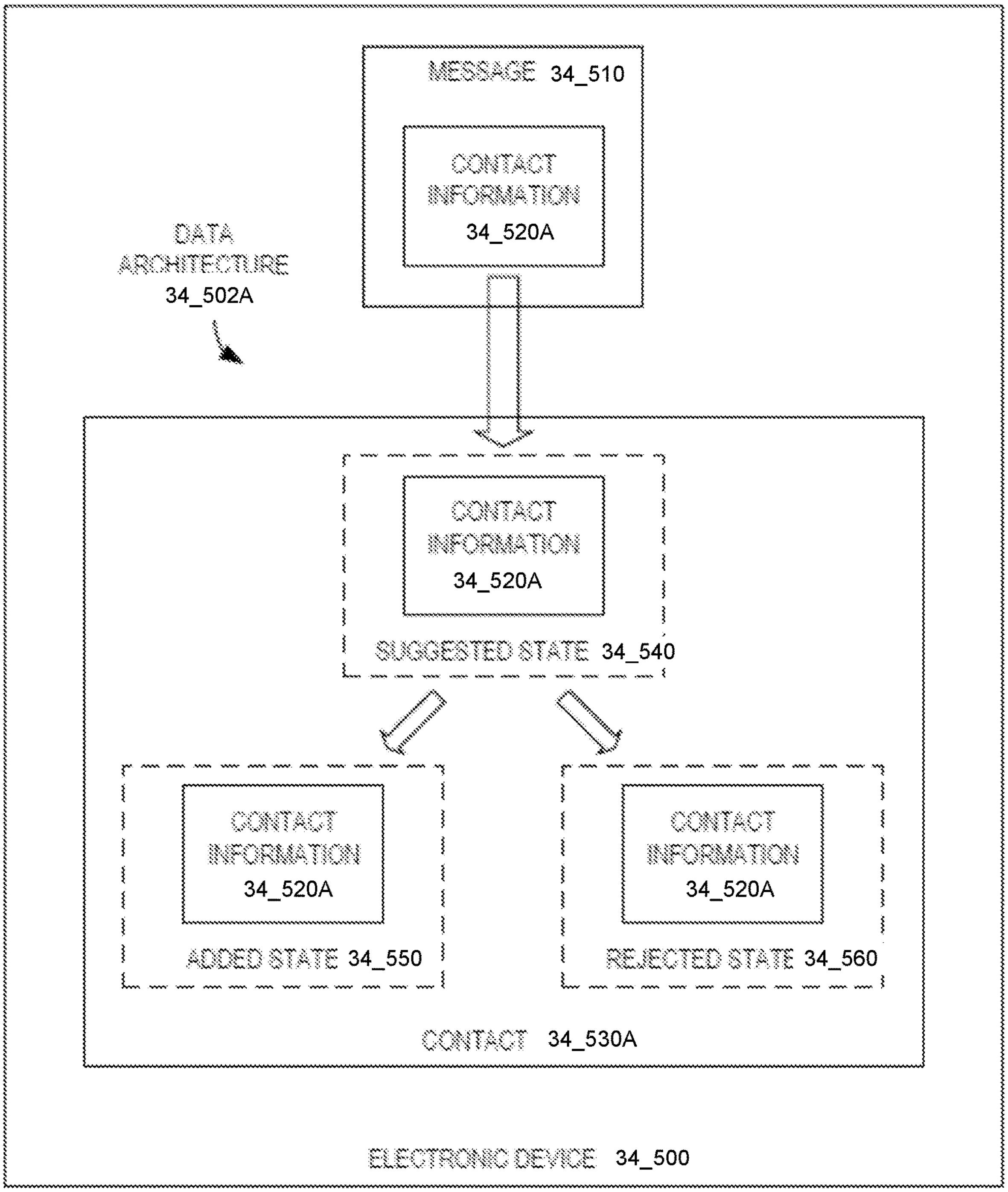
FIG. 34_5A

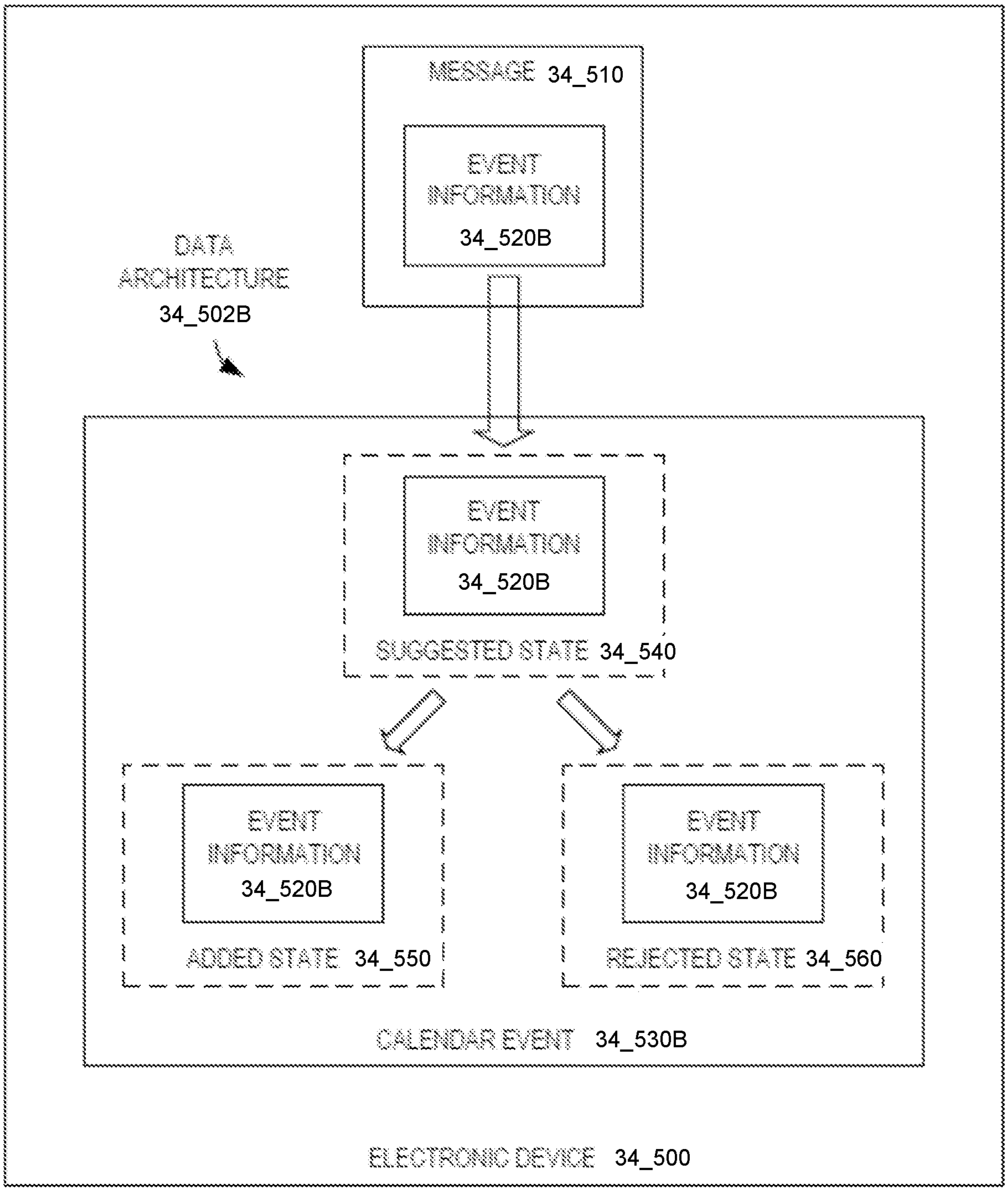
FIG. 34_5B

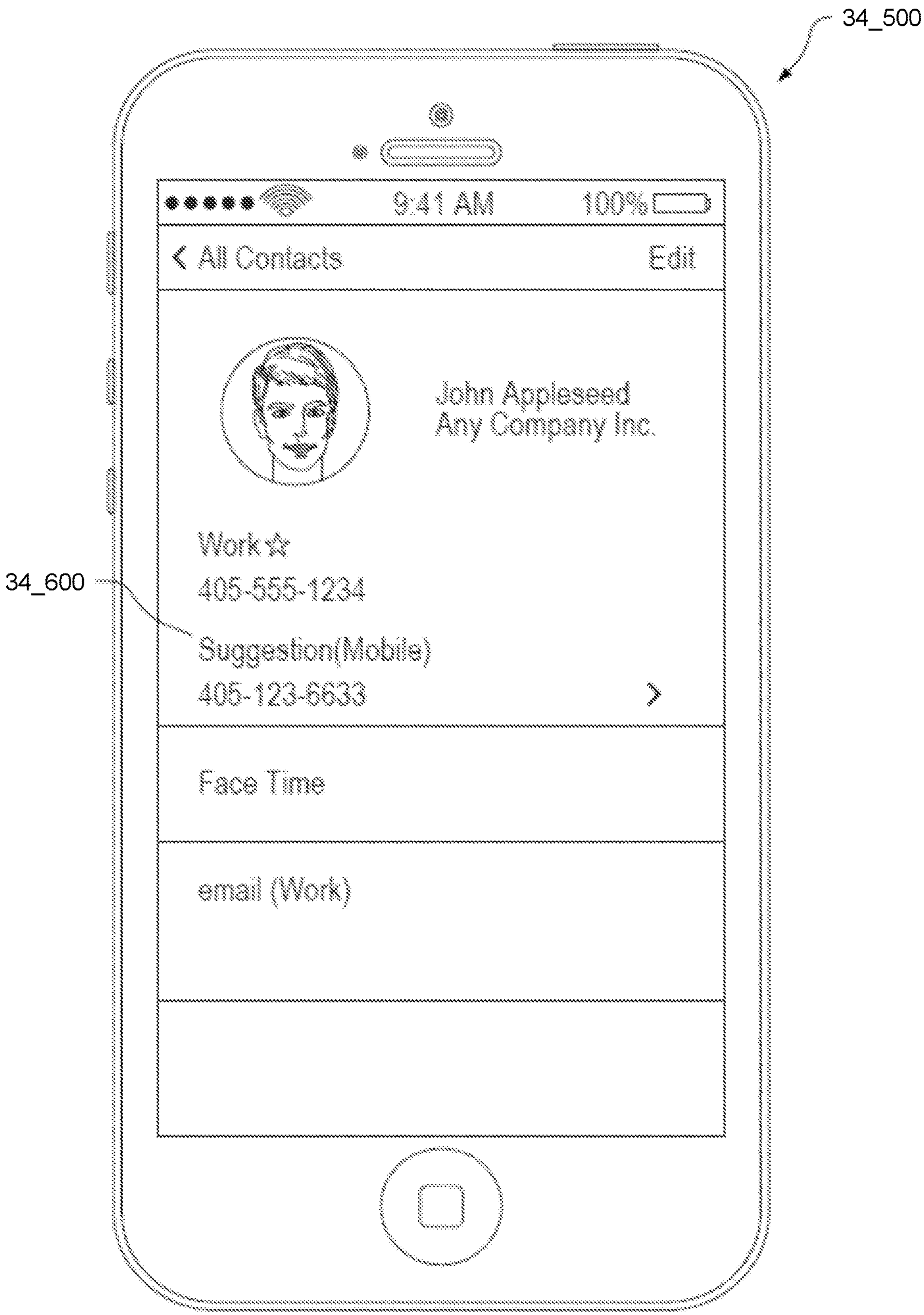
FIG. 34_6A

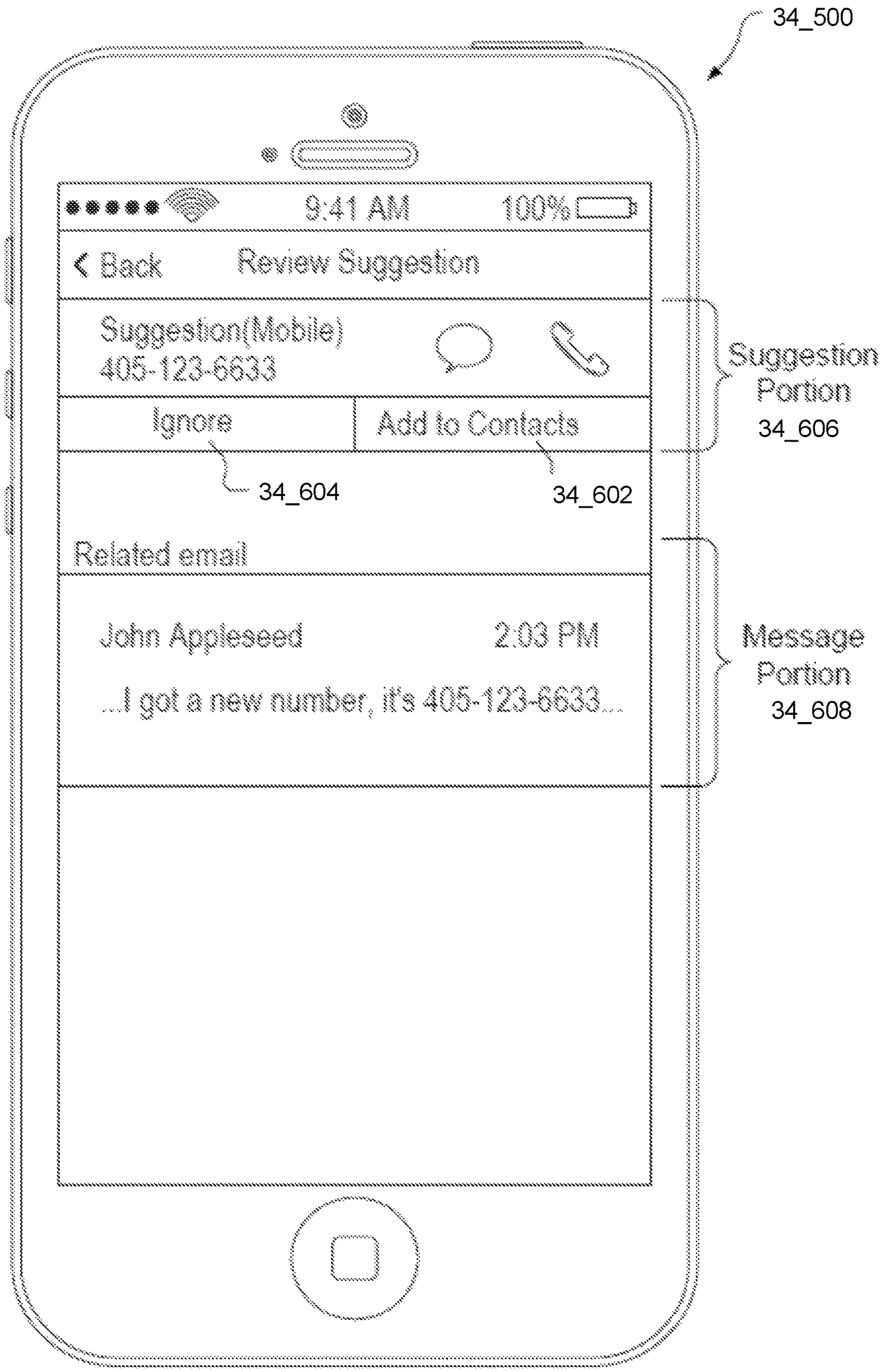
FIG. 34_6B

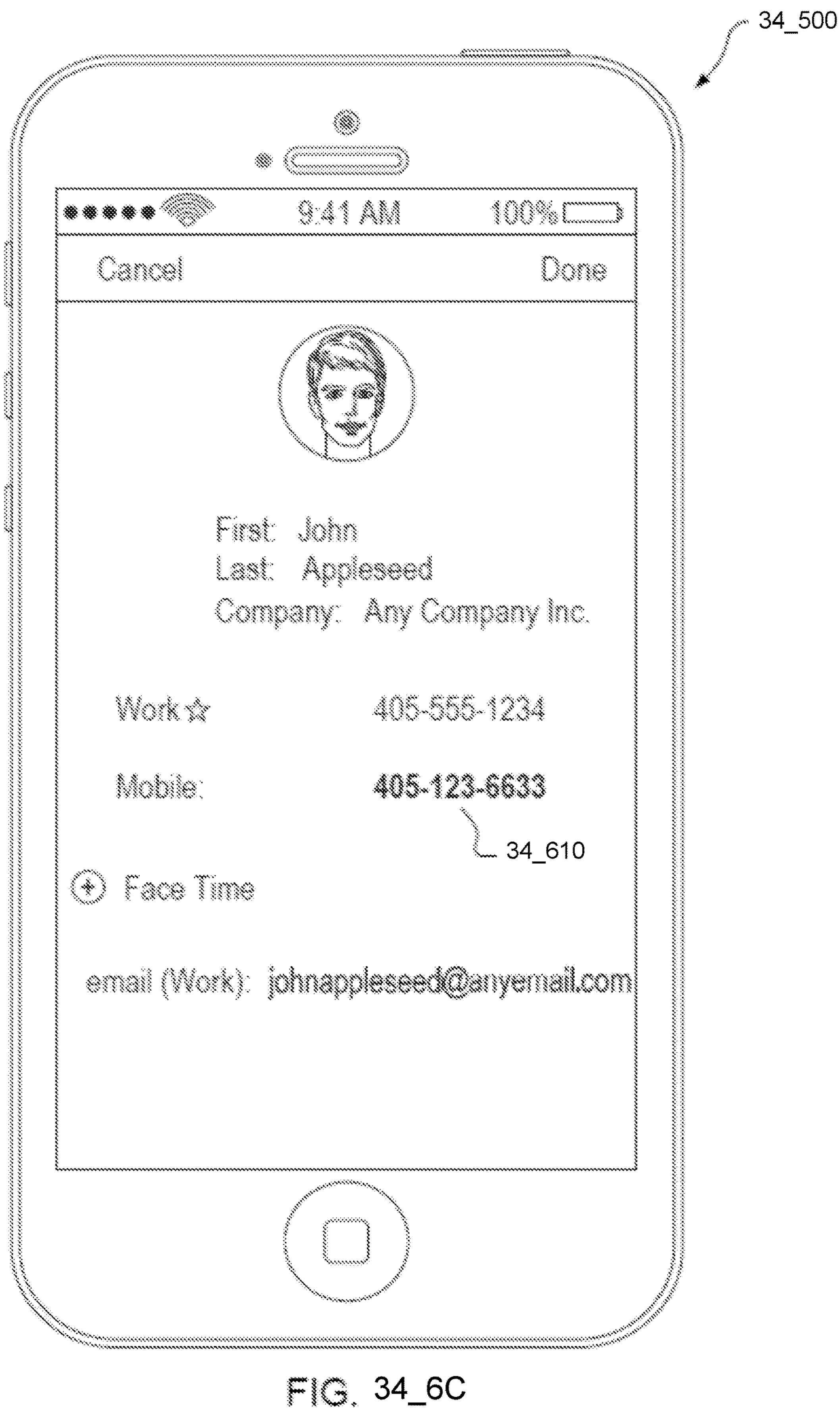
FIG. 34_6C

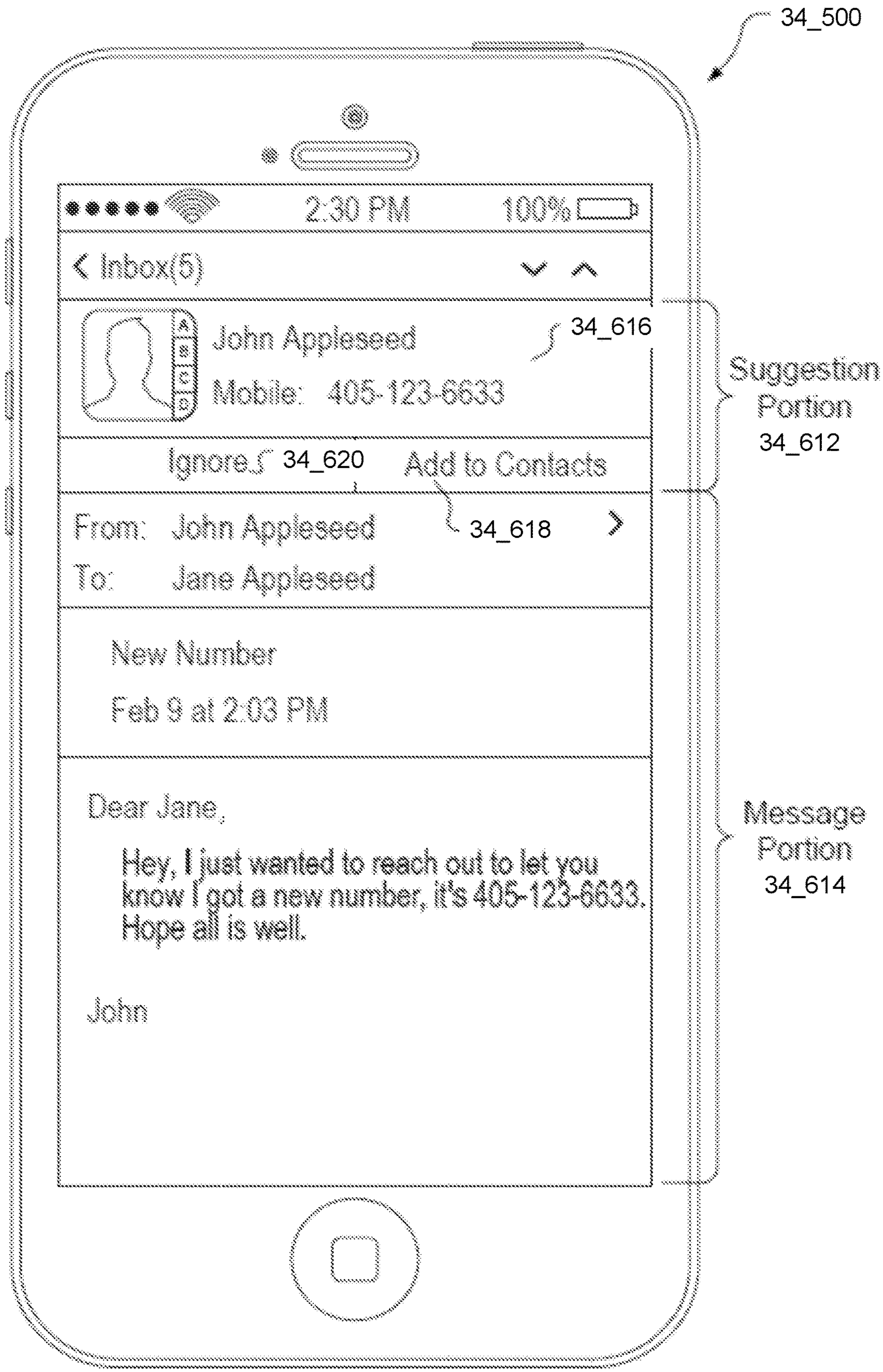
FIG. 34_6D

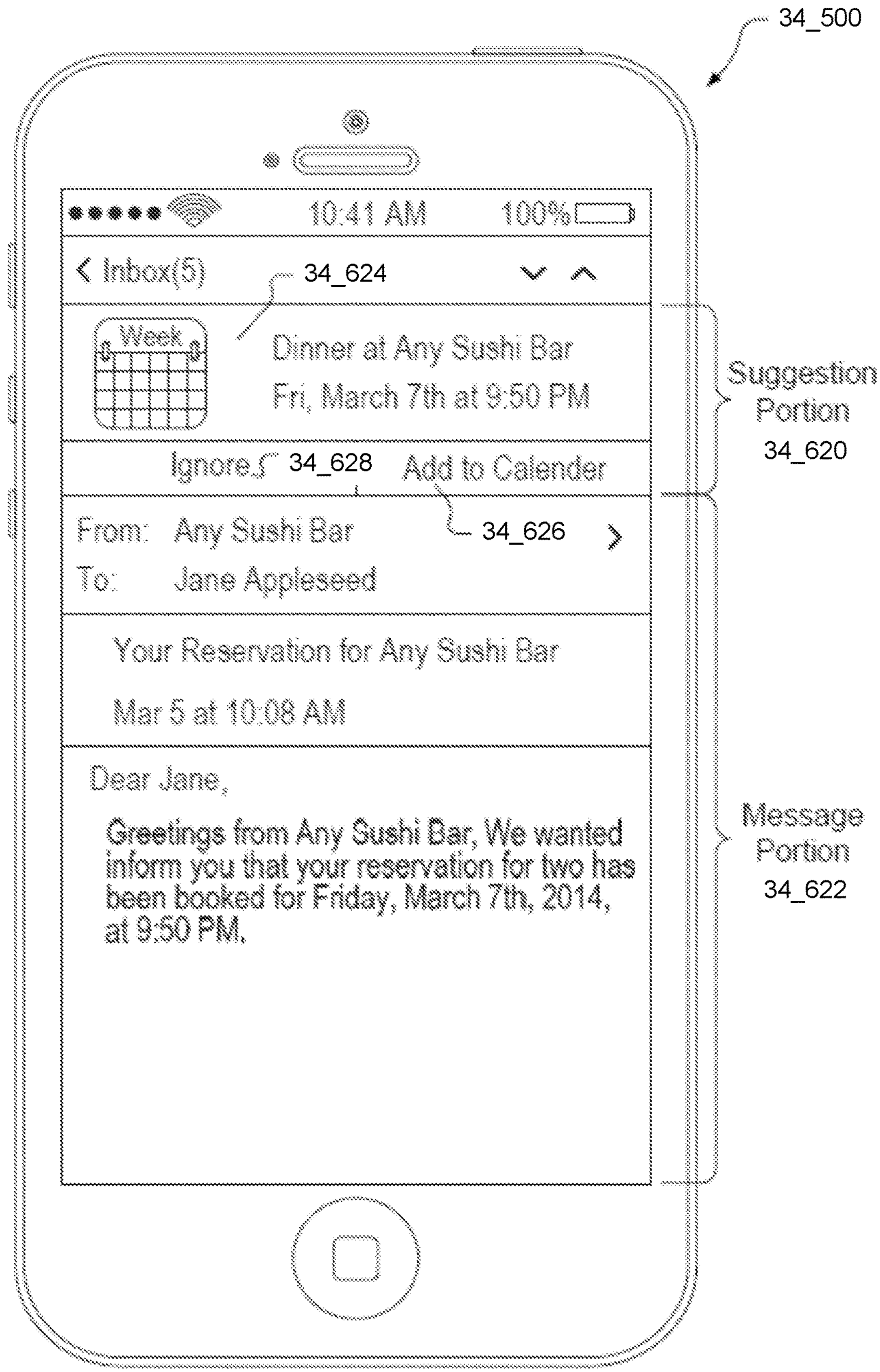
FIG. 34_6E

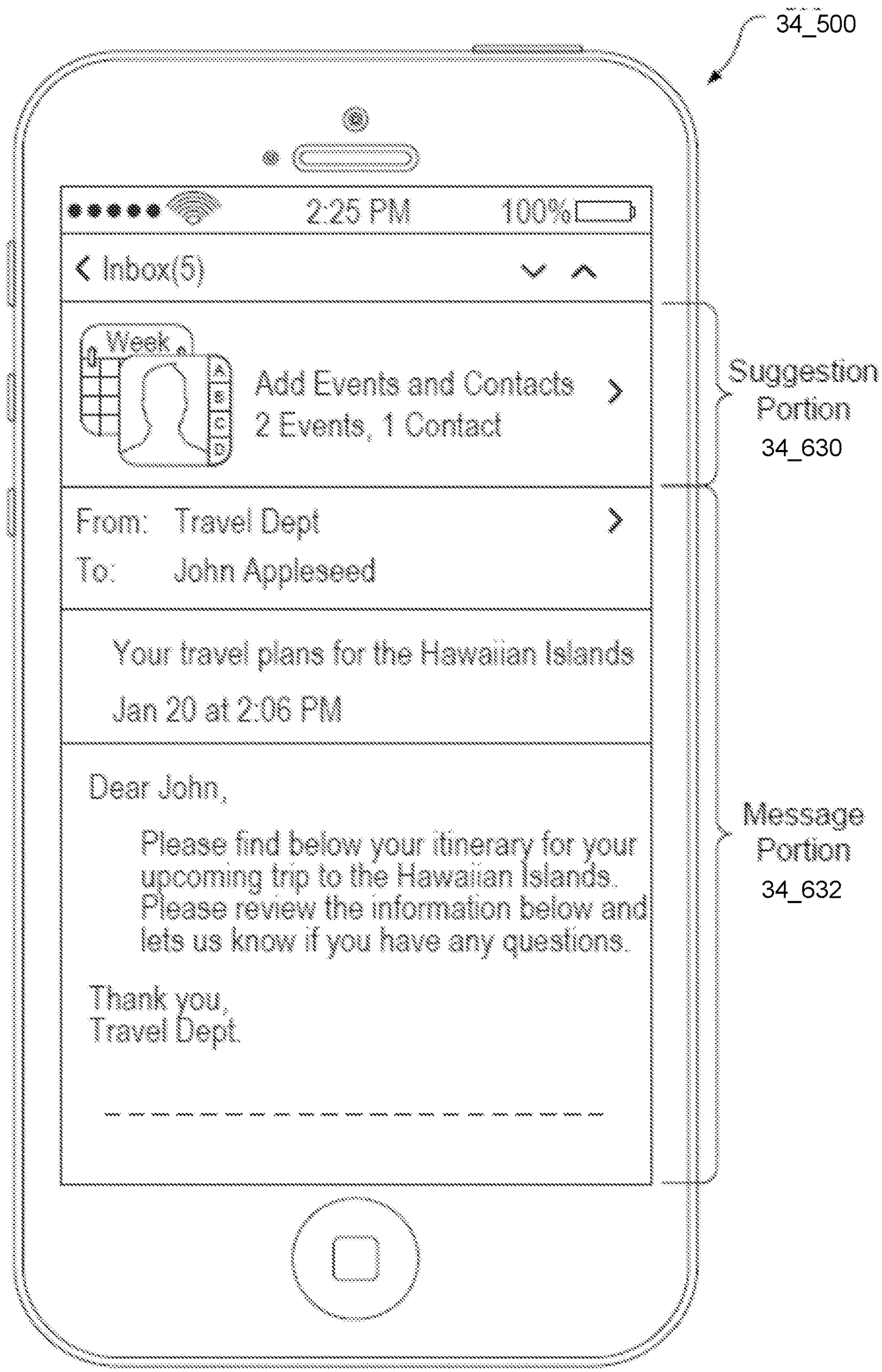
FIG. 34_6F

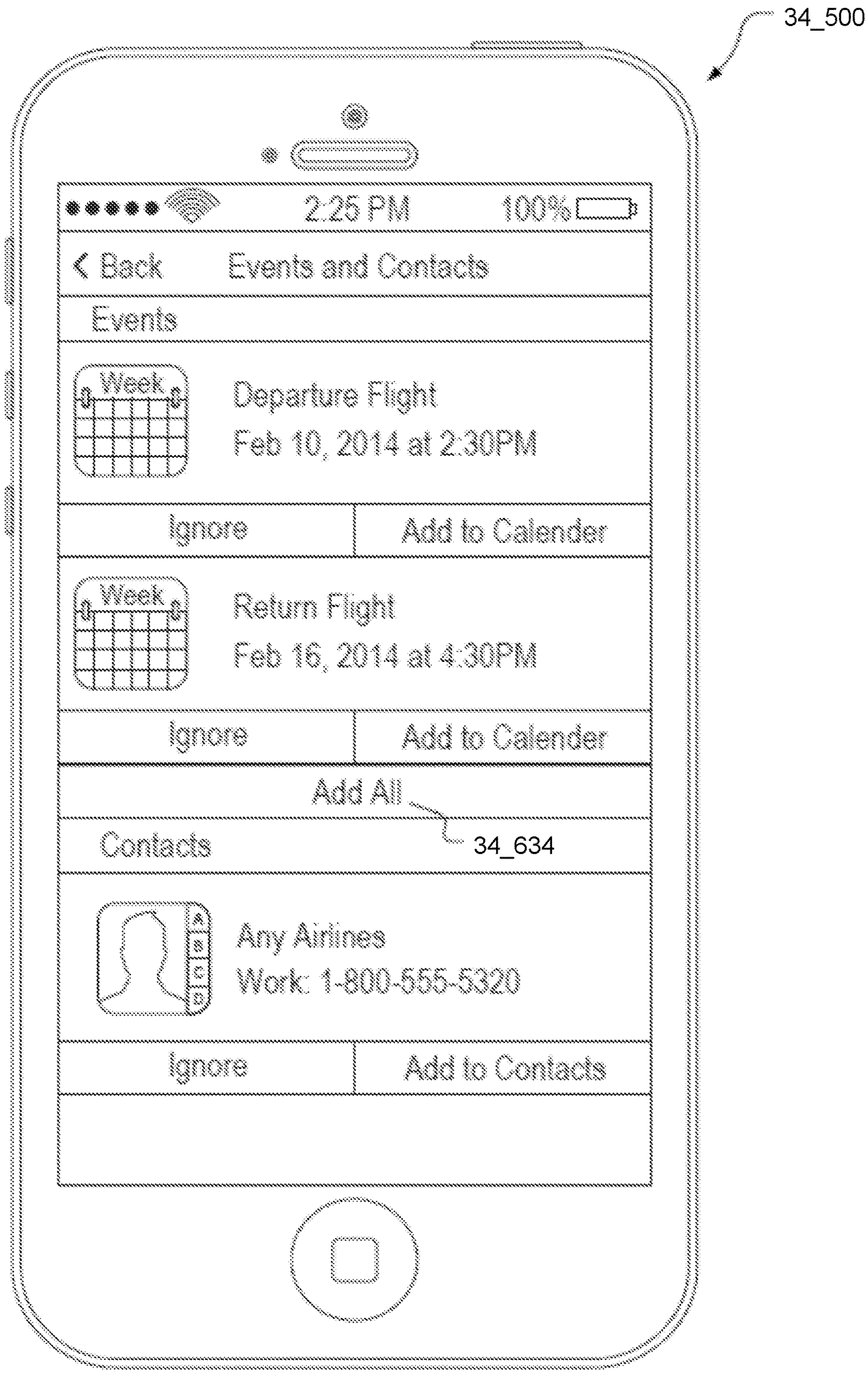
FIG. 34_6G

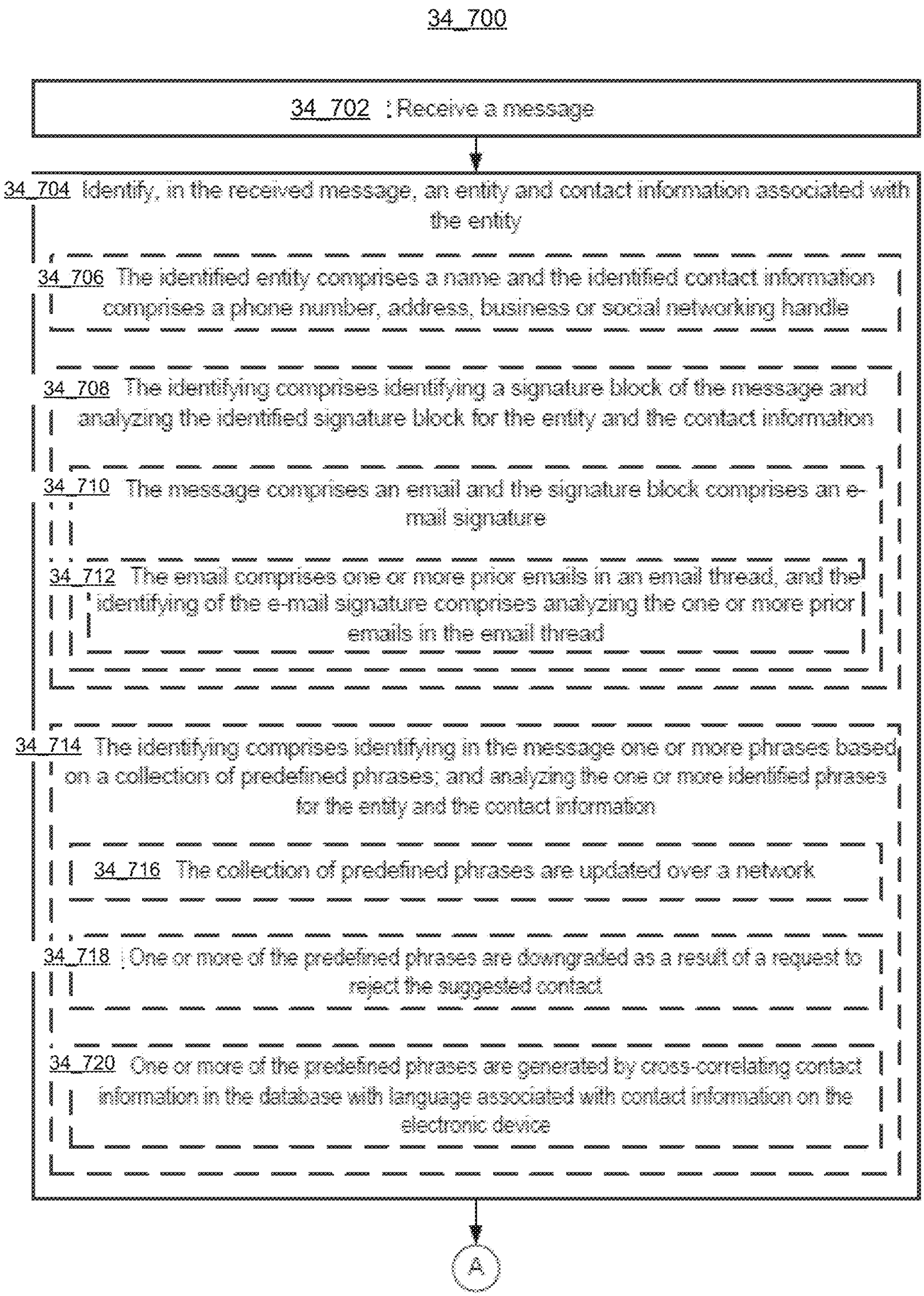
FIG 34_7A

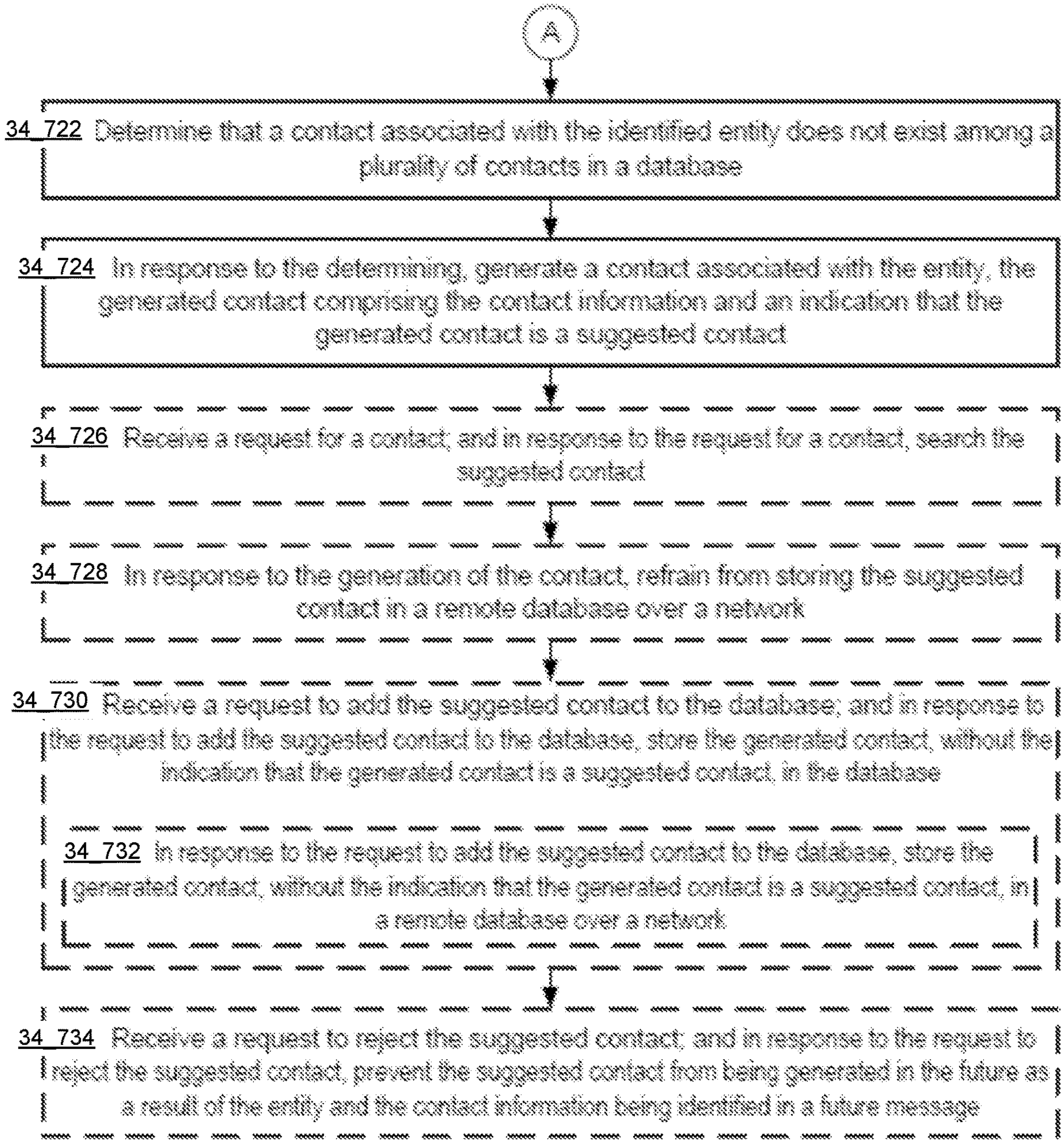
FIG. 34_7B

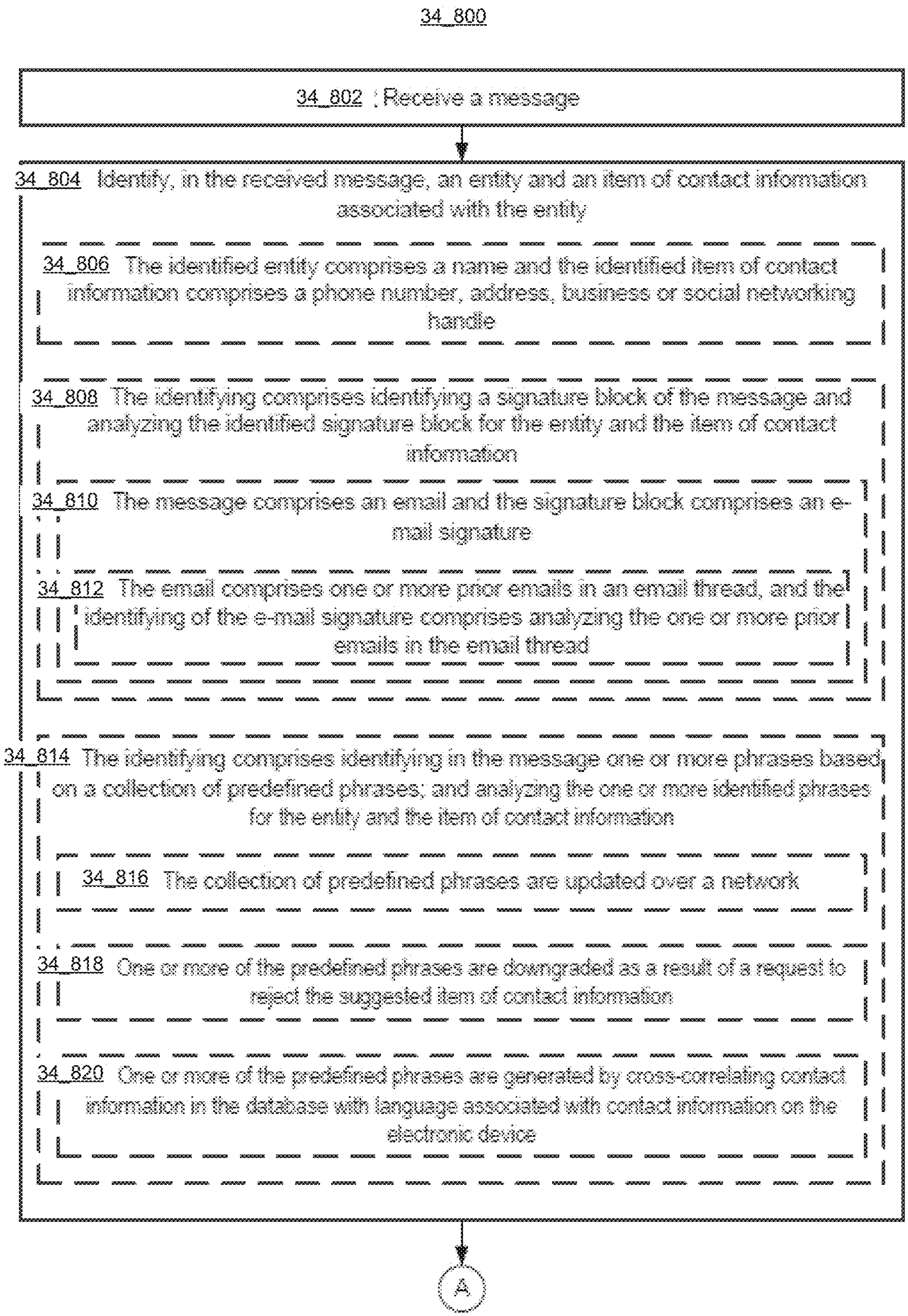
FIG. 34_8A

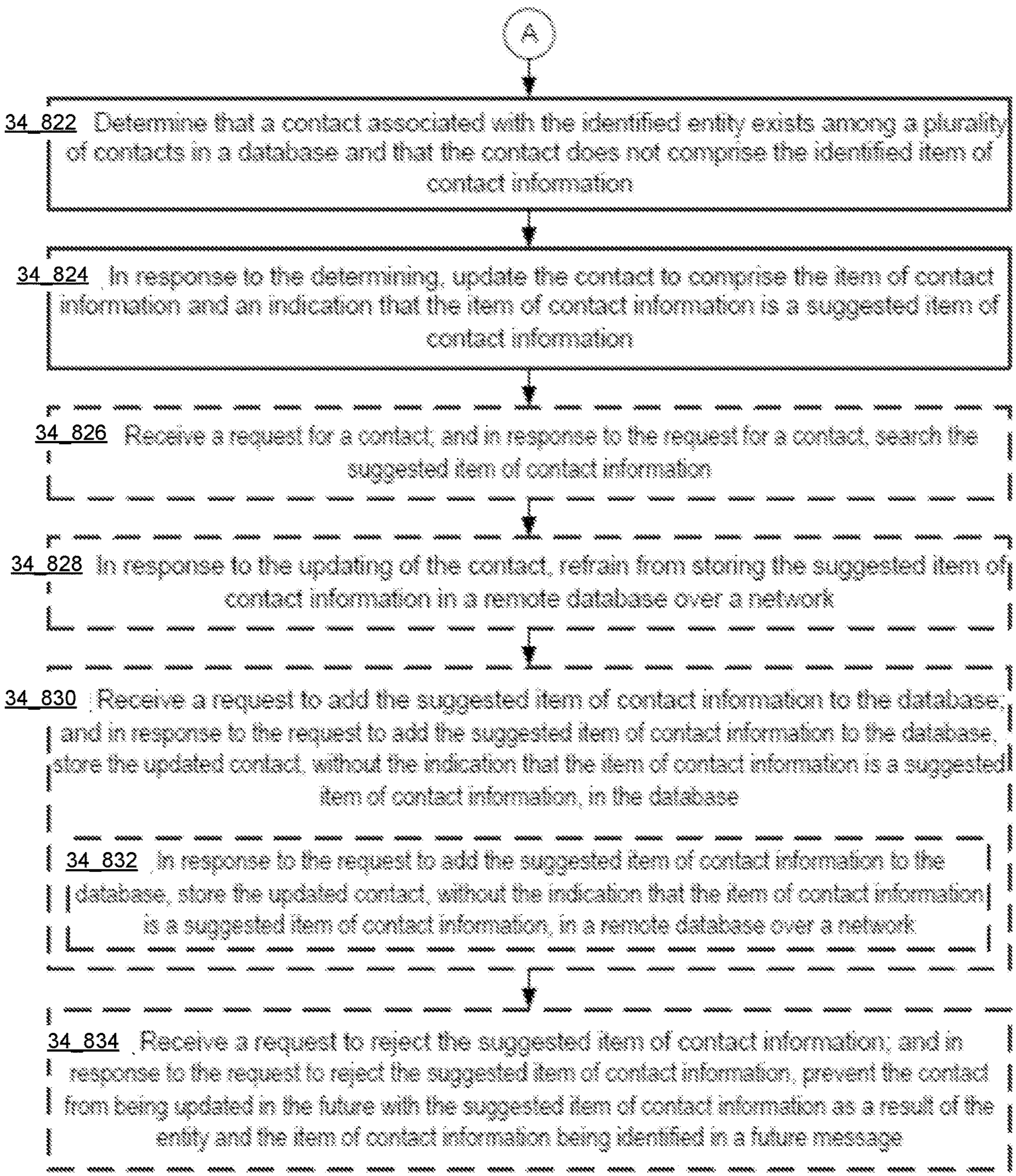
FIG. 34_8B

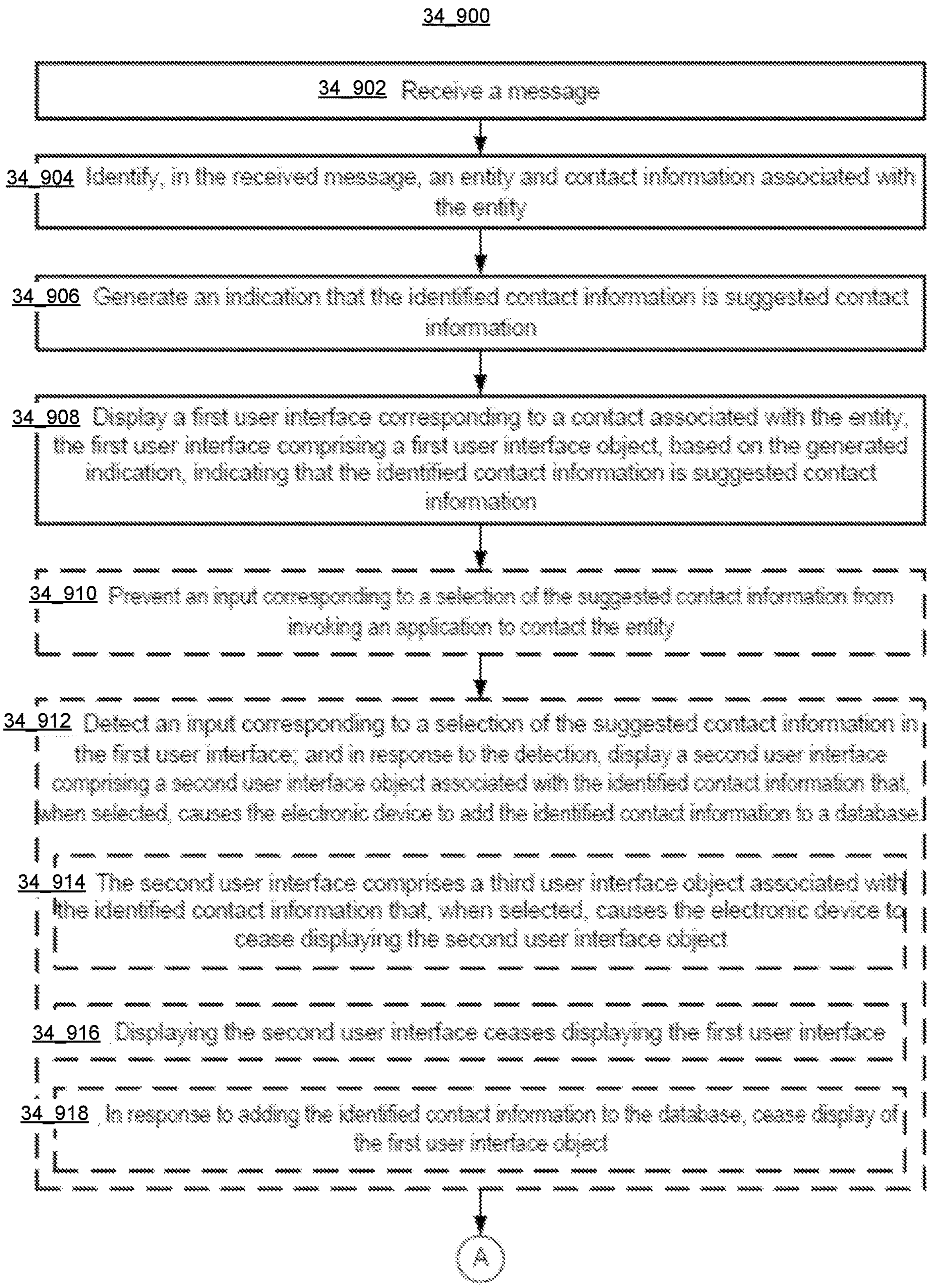
FIG. 34_9A

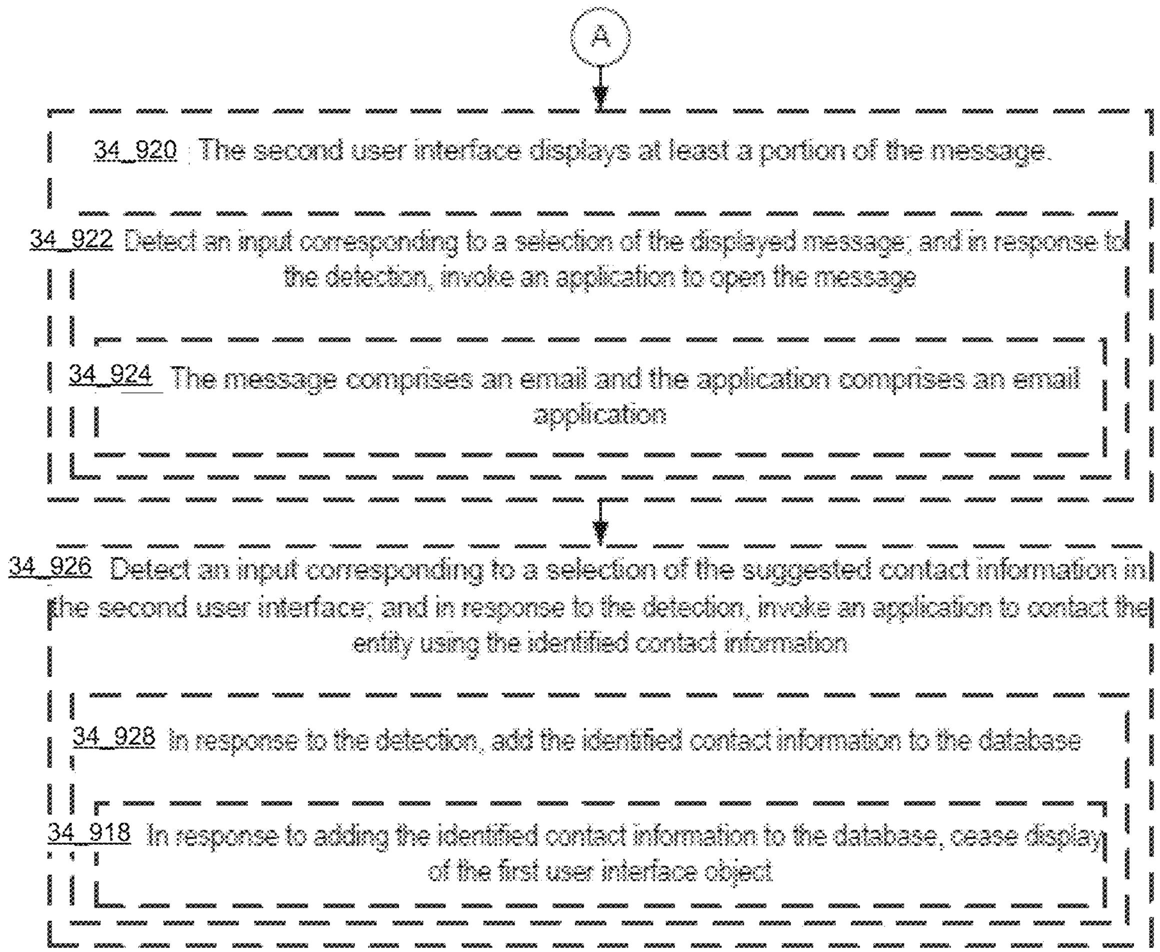
FIG. 34_9B

Figure 34:
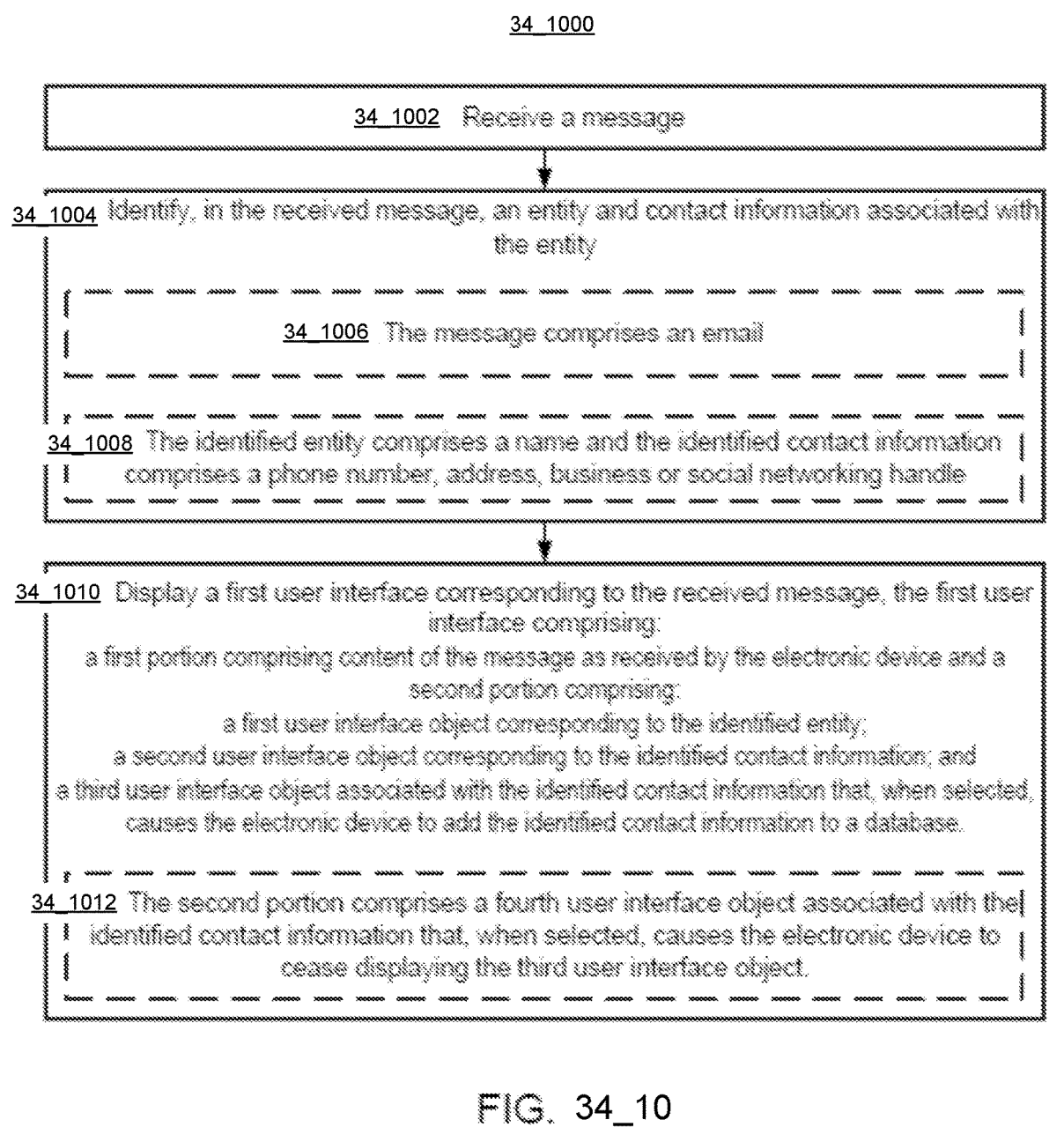

34_1000

34_1002 Receive a message

34_1004 Identify, in the received message, an entity and contact information associated with the entity 34_1006 The message comprises an email 34_1008 The identified entity comprises a name and the identified contact information comprises a phone number, address, business or social networking handle 34_1010 Display a first user interface corresponding to the received message, the first user interface comprising:
a first portion comprising content of the message as received by the electronic device and a second portion comprising:
a first user interface object corresponding to the identified entity;
a second user interface object corresponding to the identified contact information; and
a third user interface object associated with the identified contact information that, when selected, causes the electronic device to add the identified contact information to a database.

34_1012 The second portion comprises a fourth user interface object associated with the identified contact information that, when selected, causes the electronic device to cease displaying the third user interface object.

FIG. 34_10

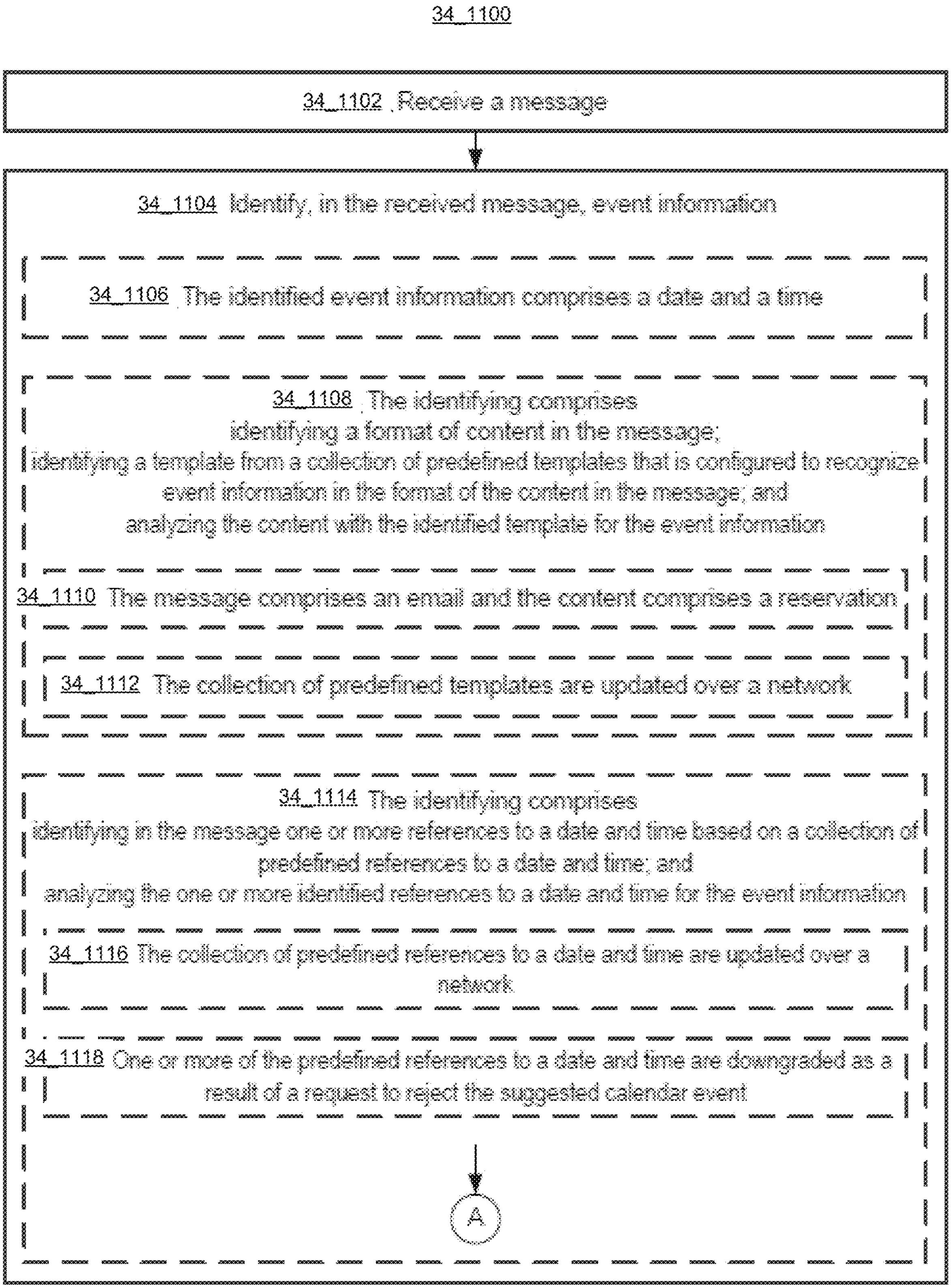
FIG. 34_11A

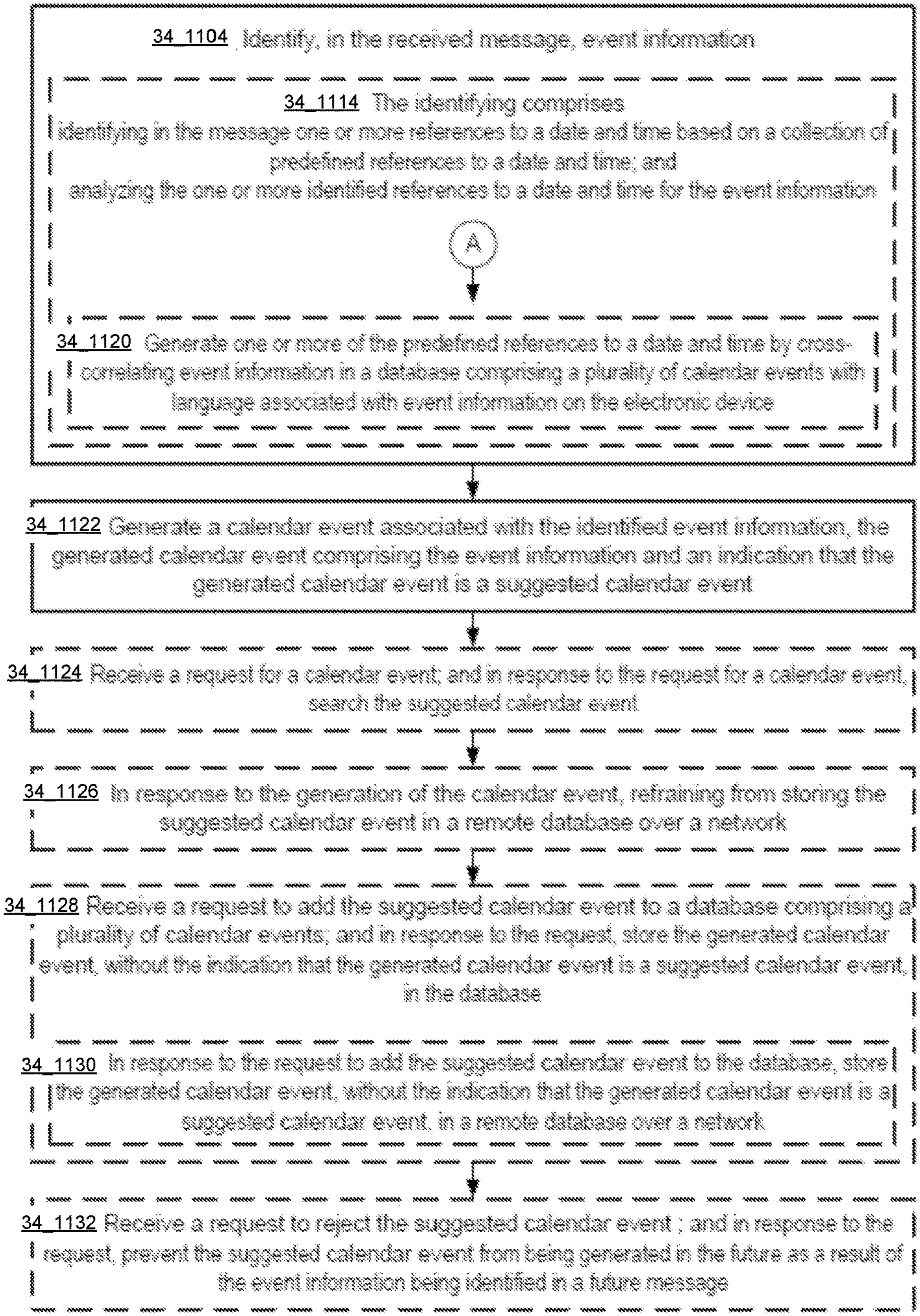
FIG. 34_11B

34_1200
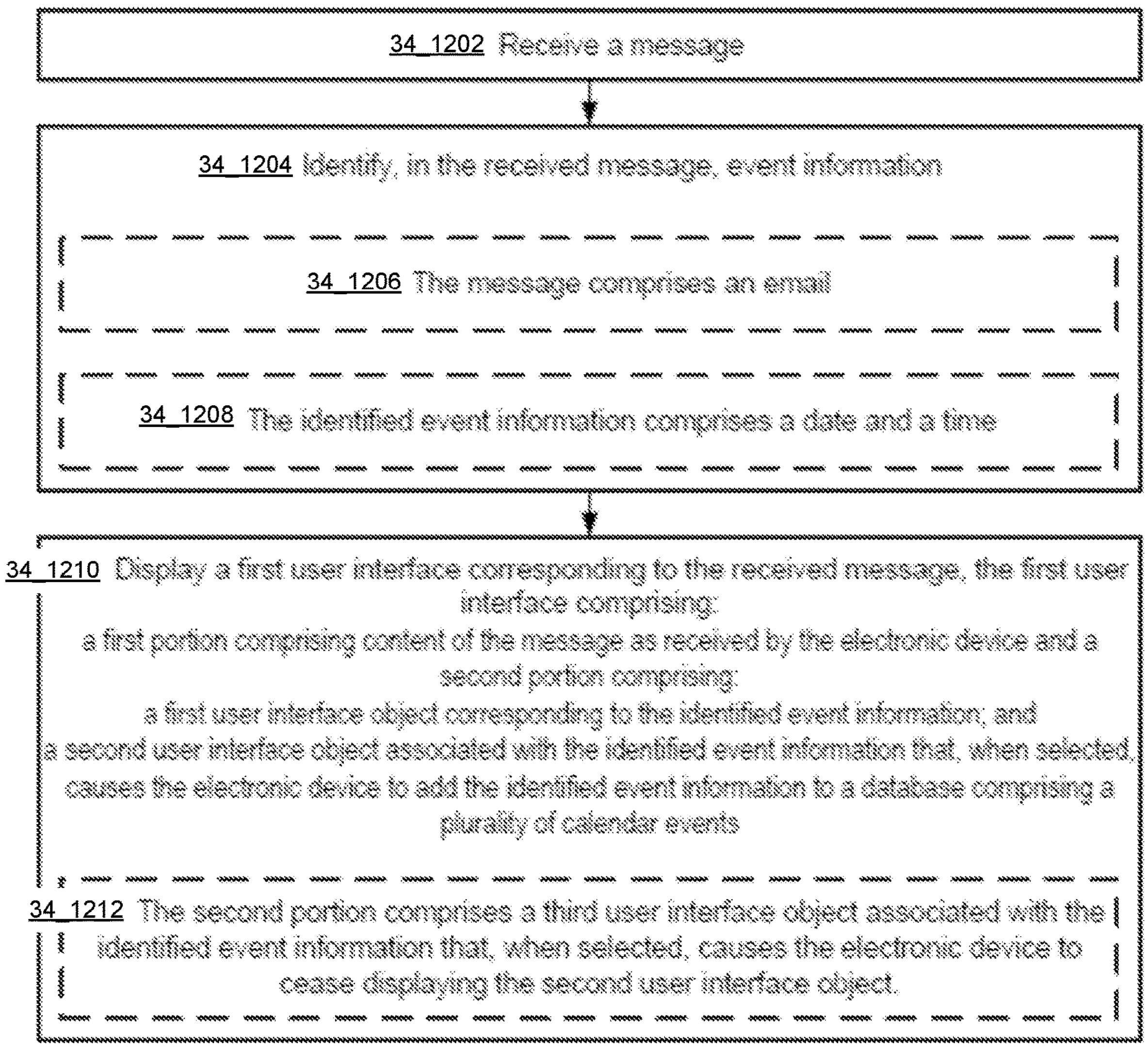
FIG. 34_12

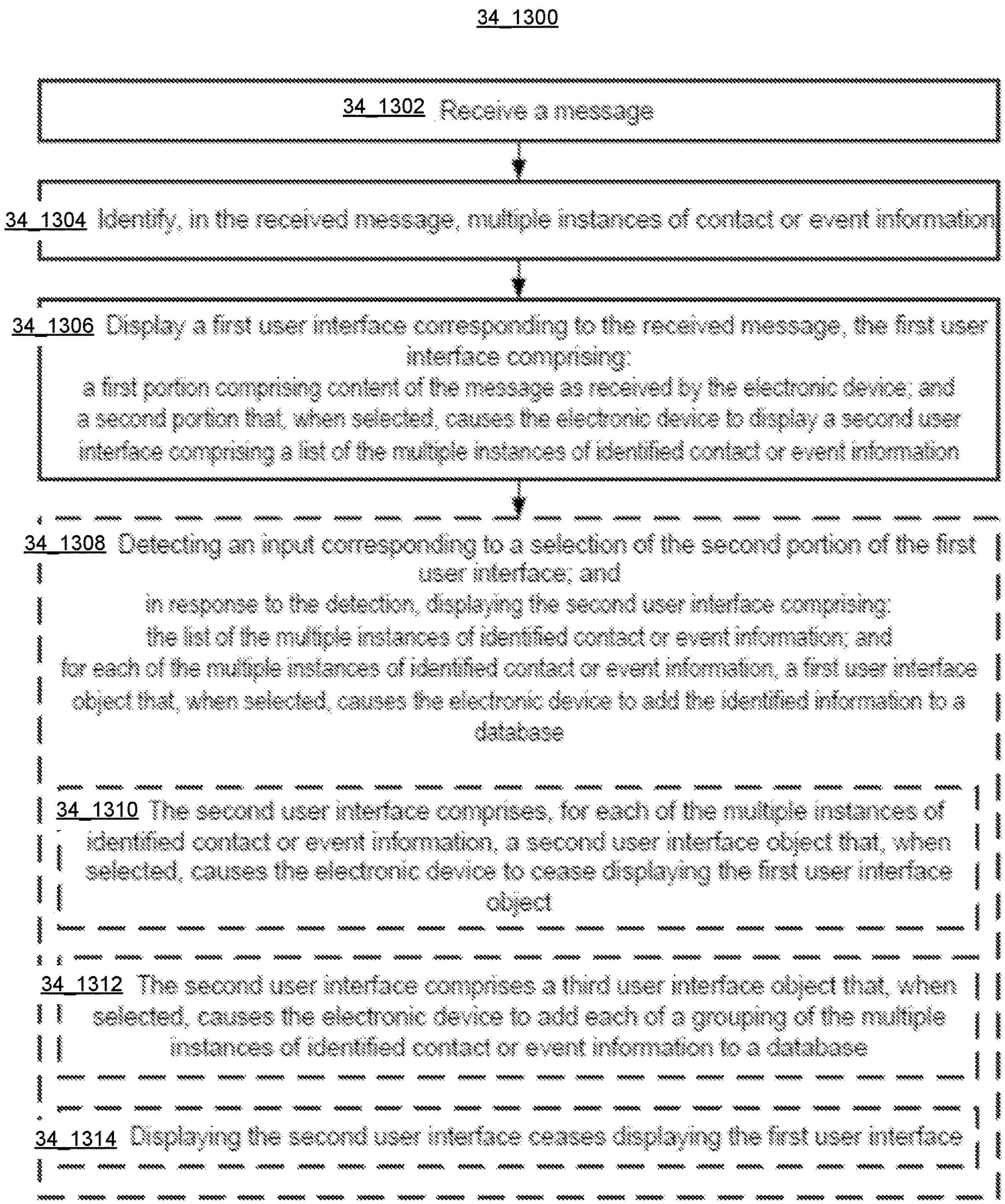
FIG. 34_13

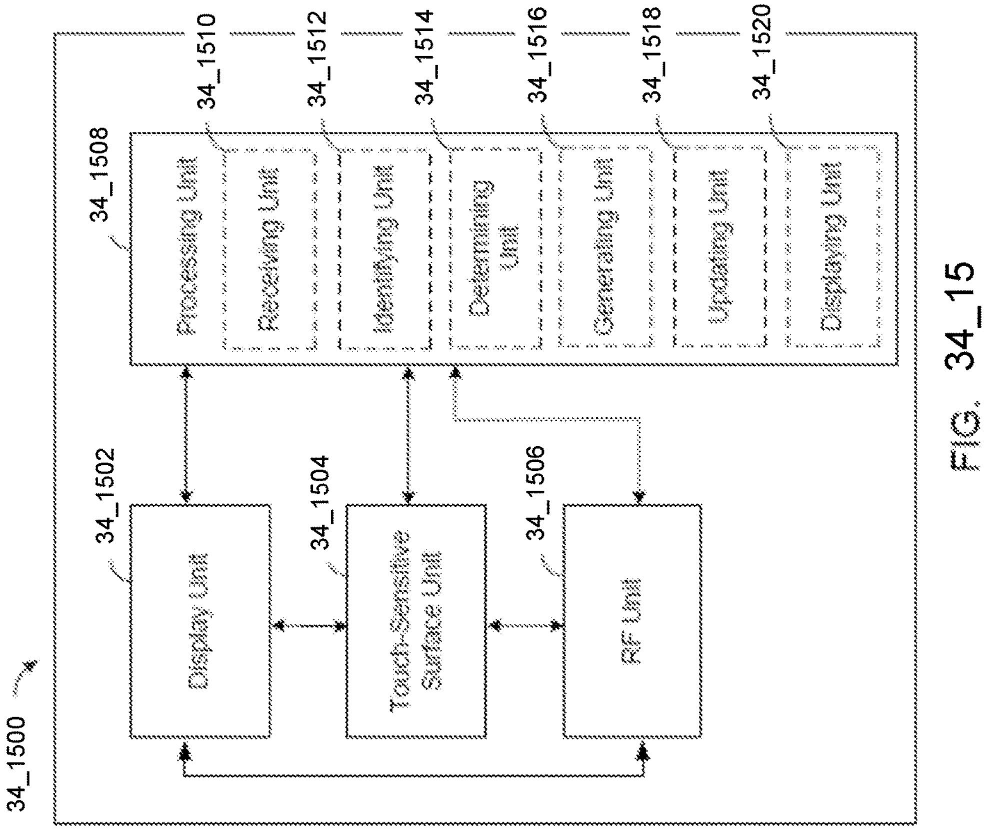
FIG. 34_15
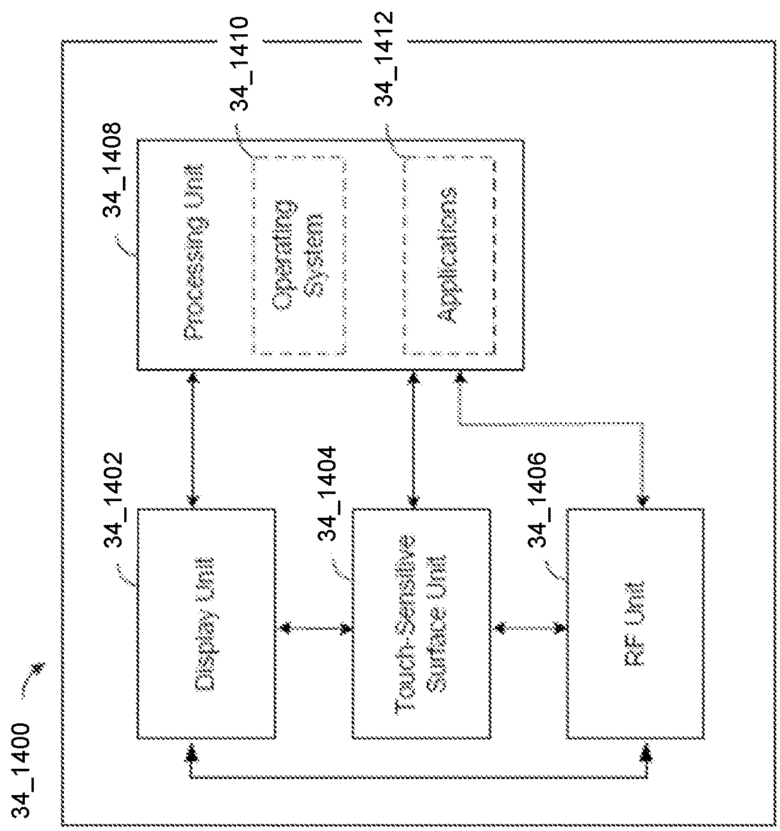
FIG. 34_14

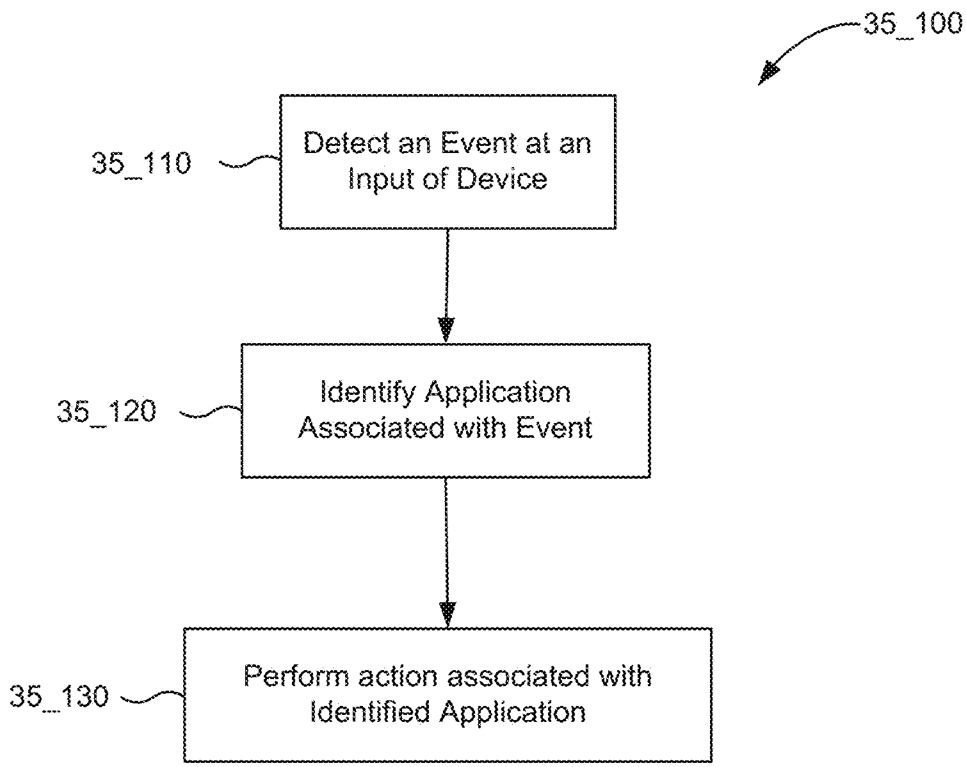
*FIG. 35_1*

*FIG. 35_2*
35_200
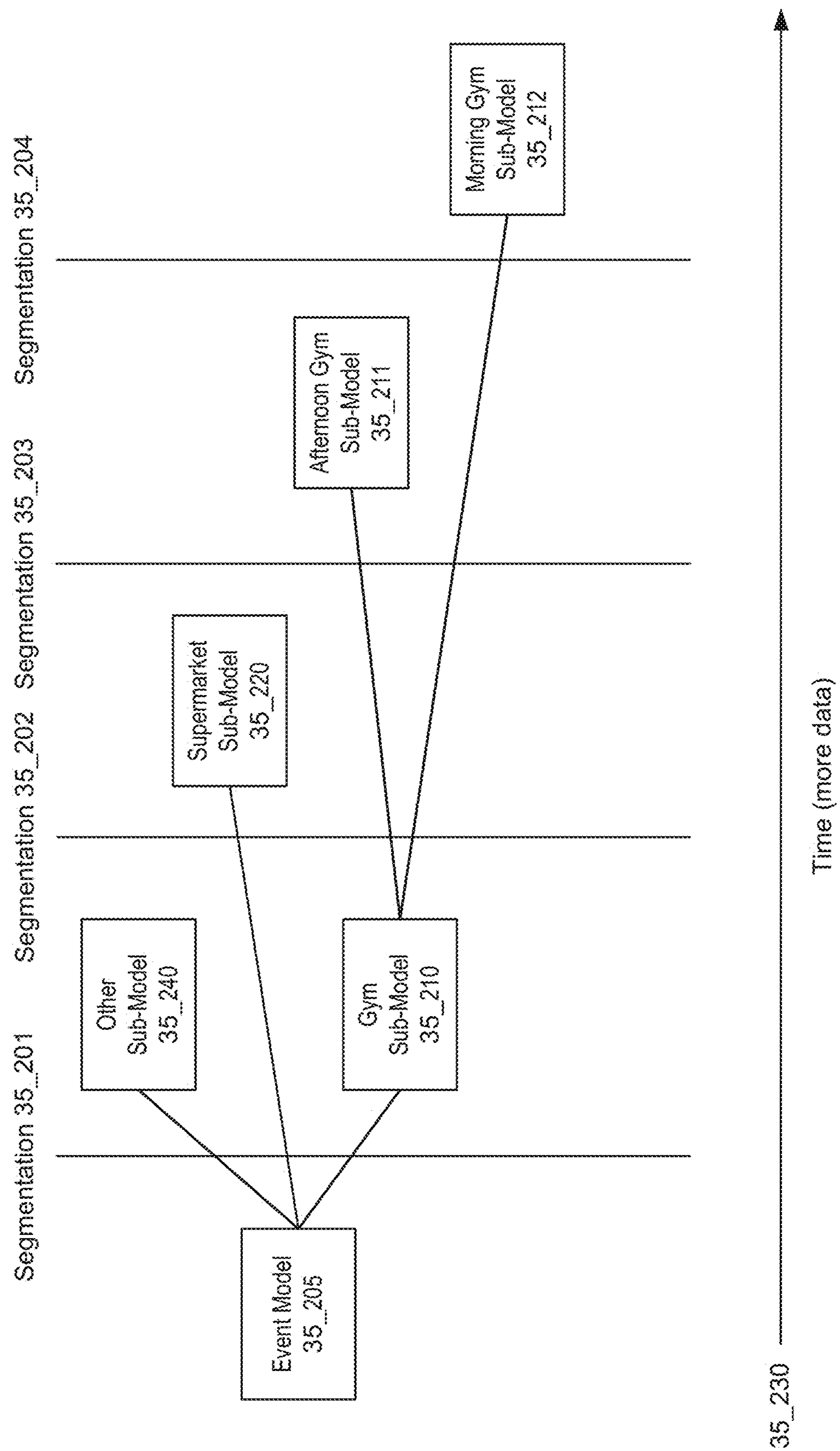

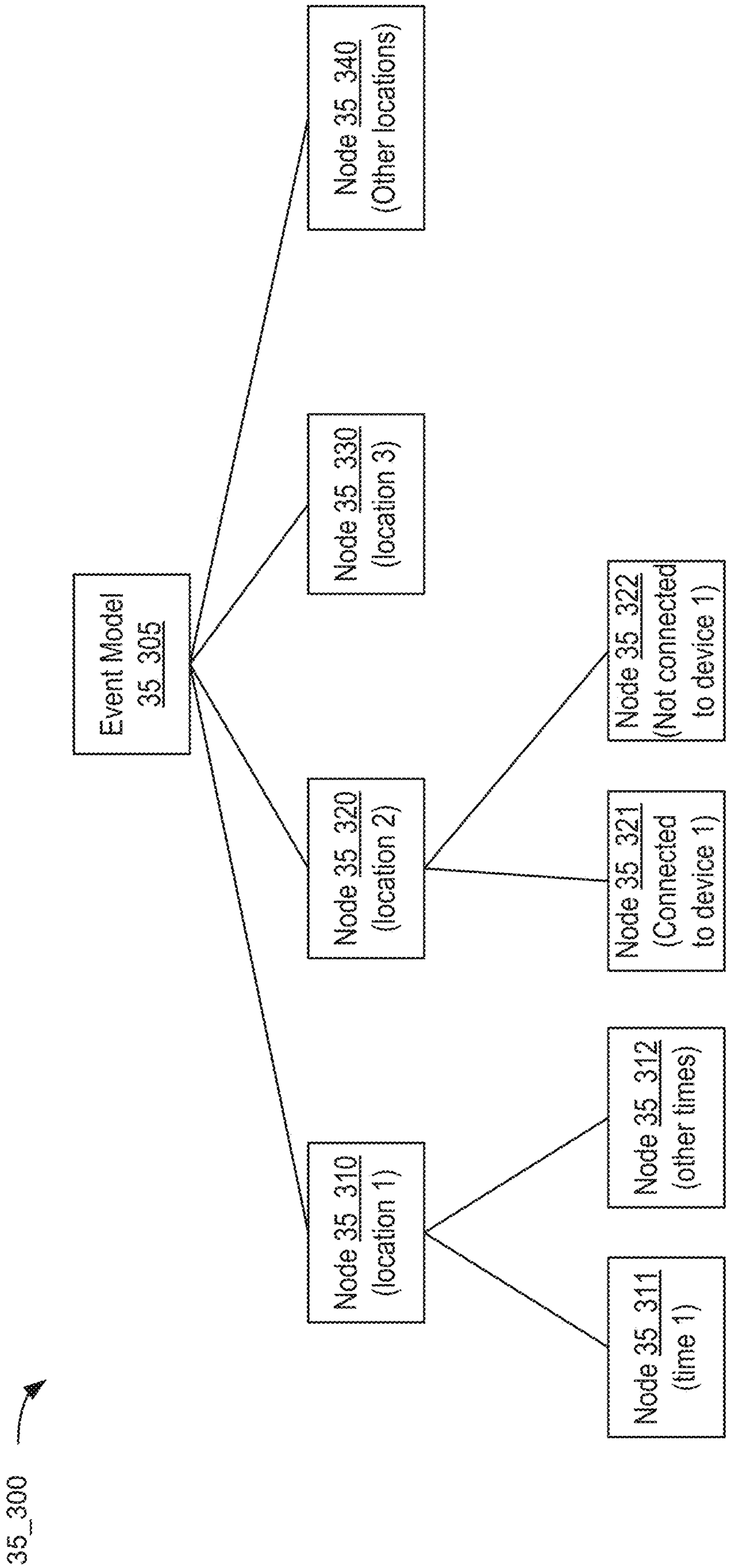
FIG. 35_3

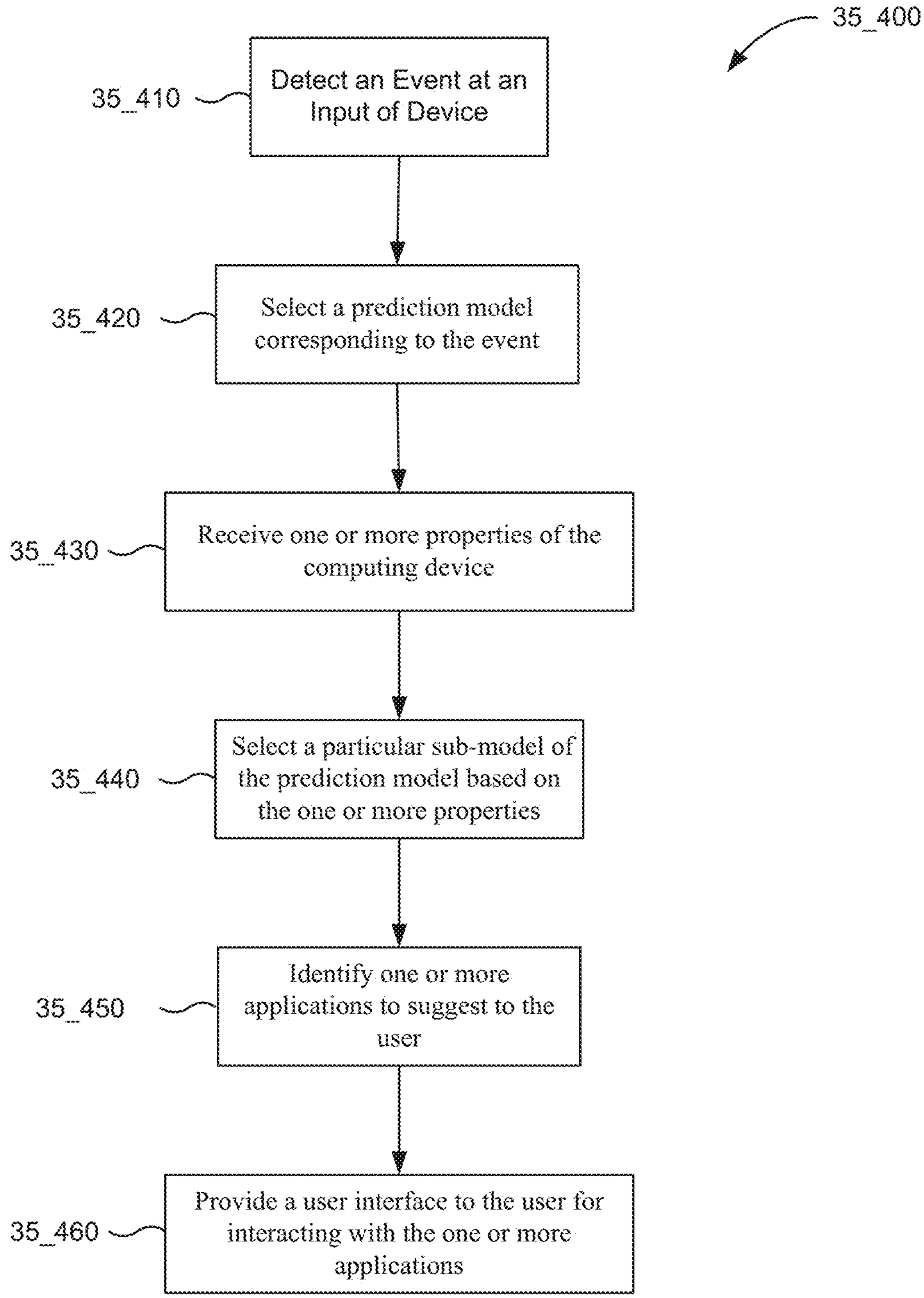
FIG. 35_4

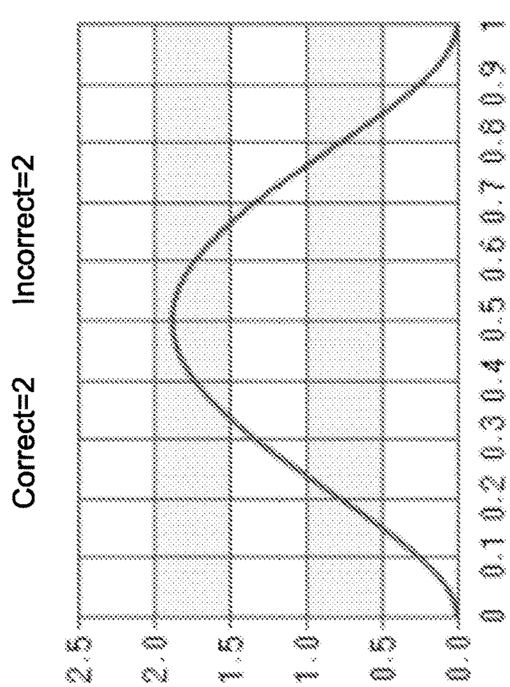
FIG. 35_5A
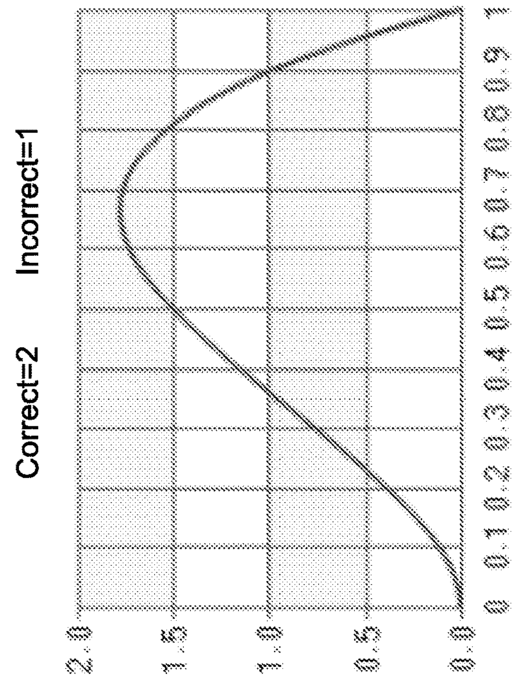
FIG. 35_5B
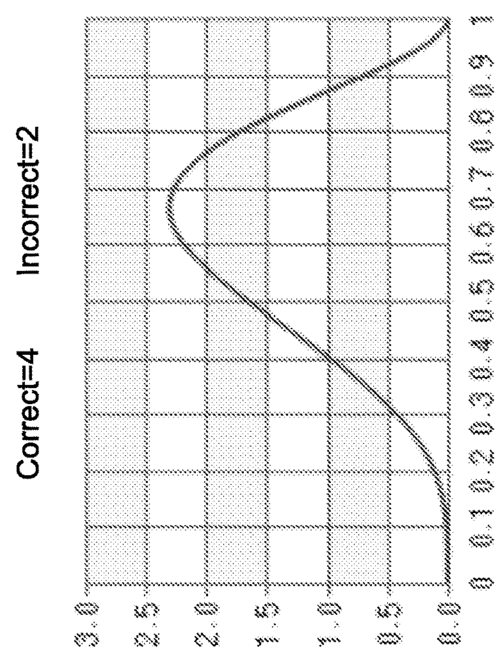
FIG. 35_5C
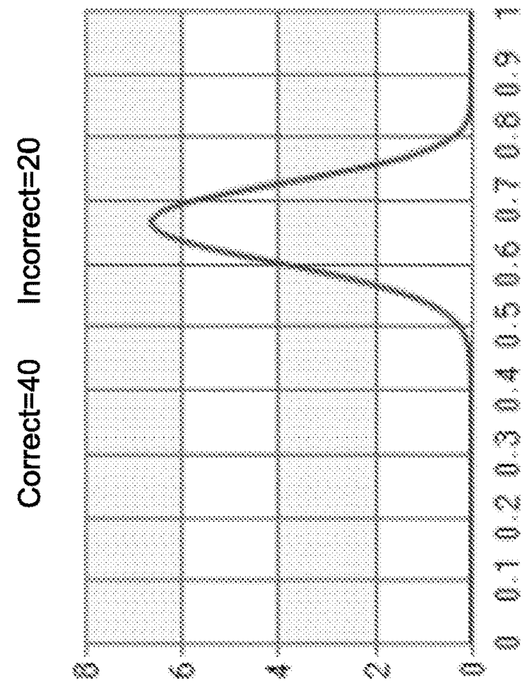
FIG. 35_5D

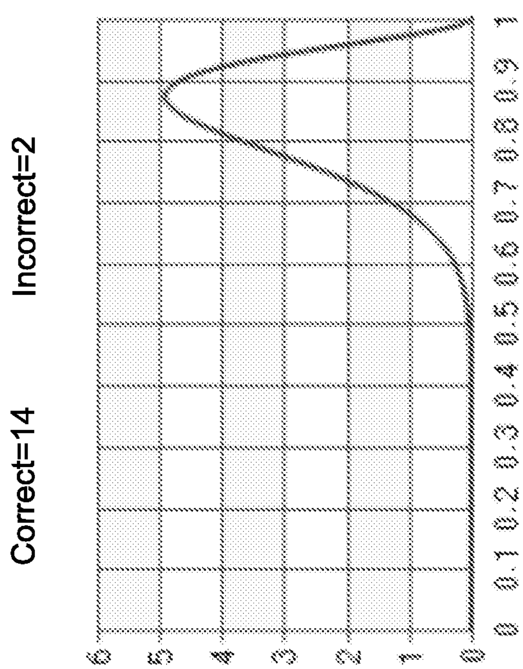
*FIG. 35_6B*
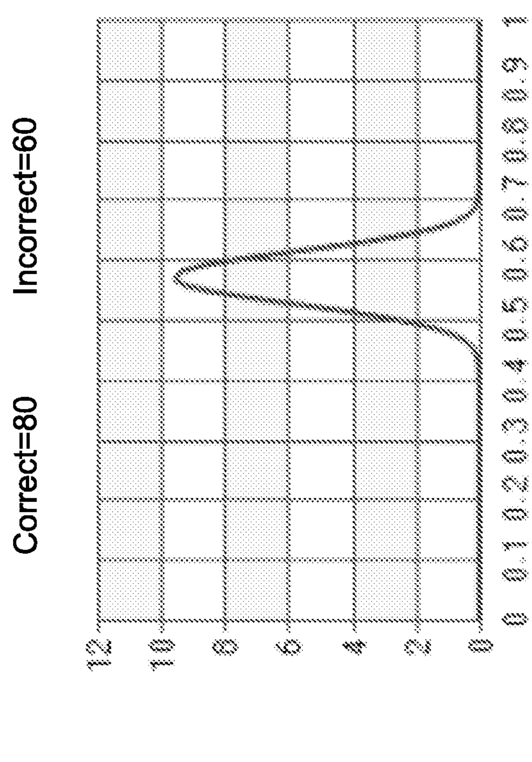
*FIG. 35_6A*

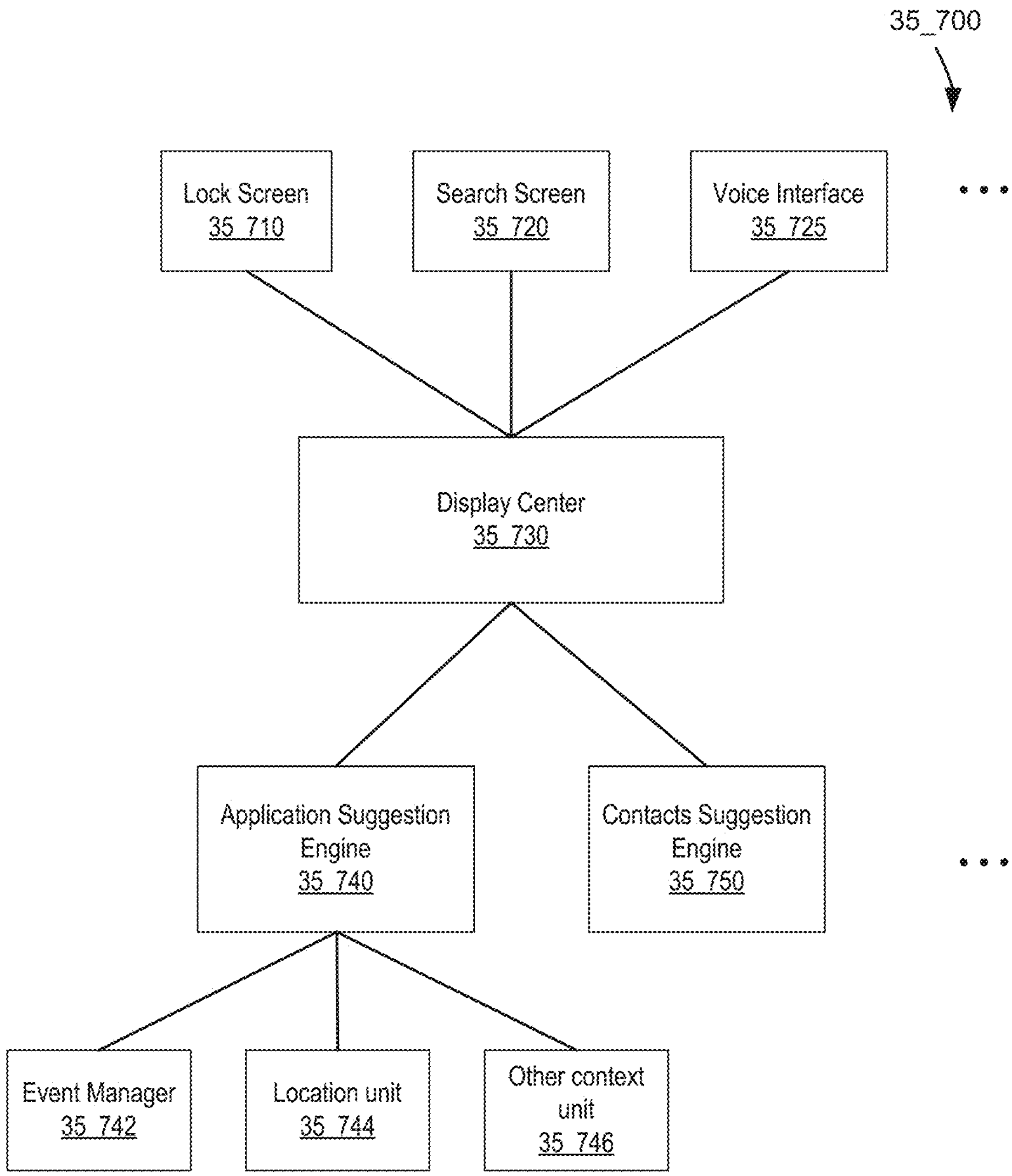
*FIG. 35_7*

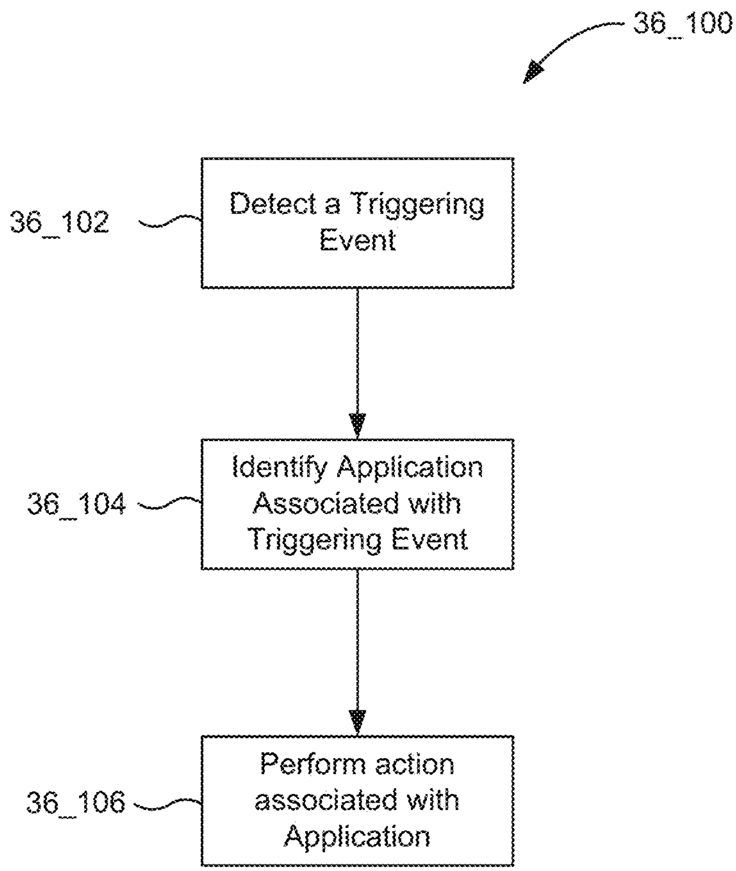
FIG. 36_1

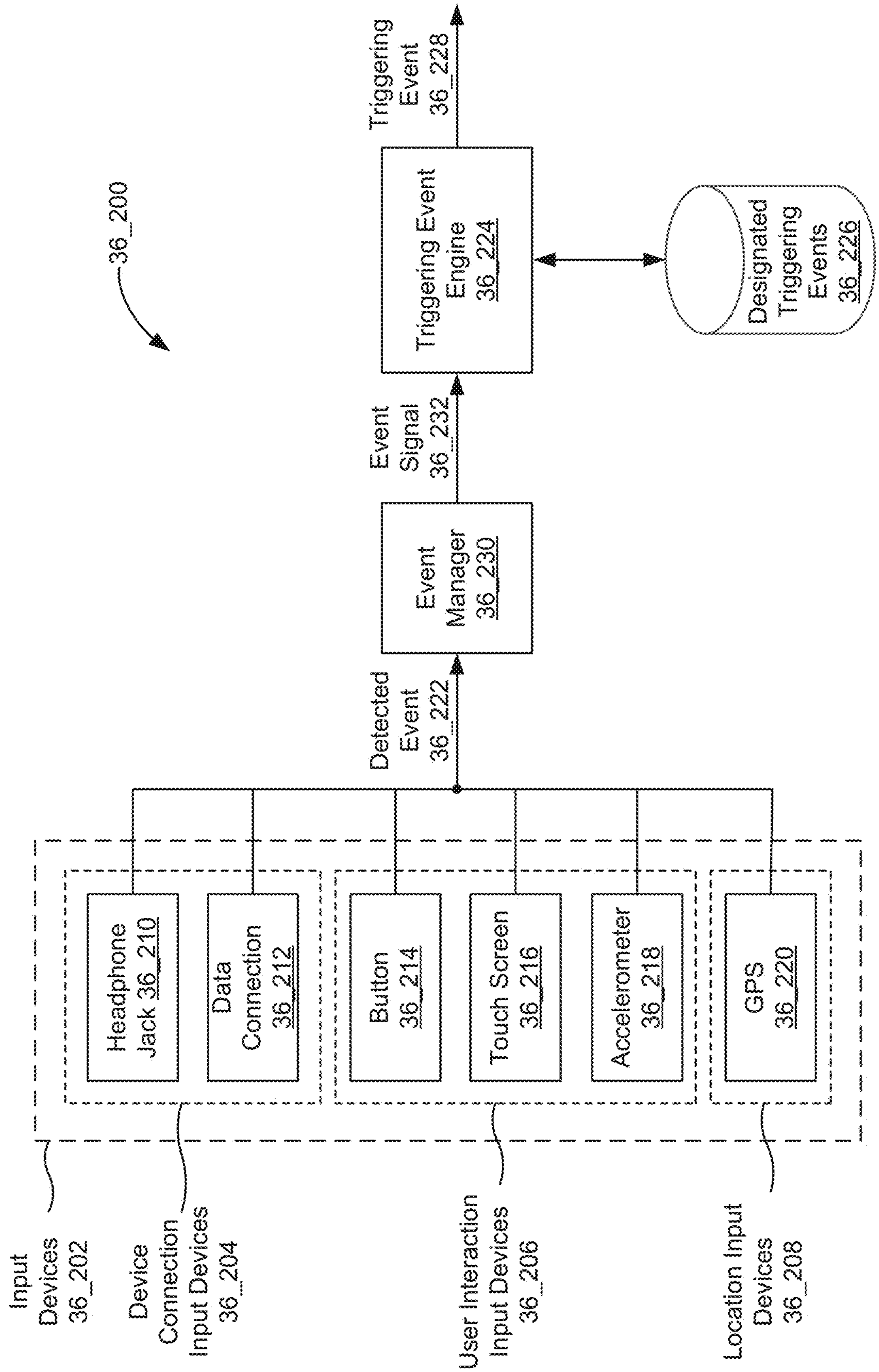
FIG. 36_2

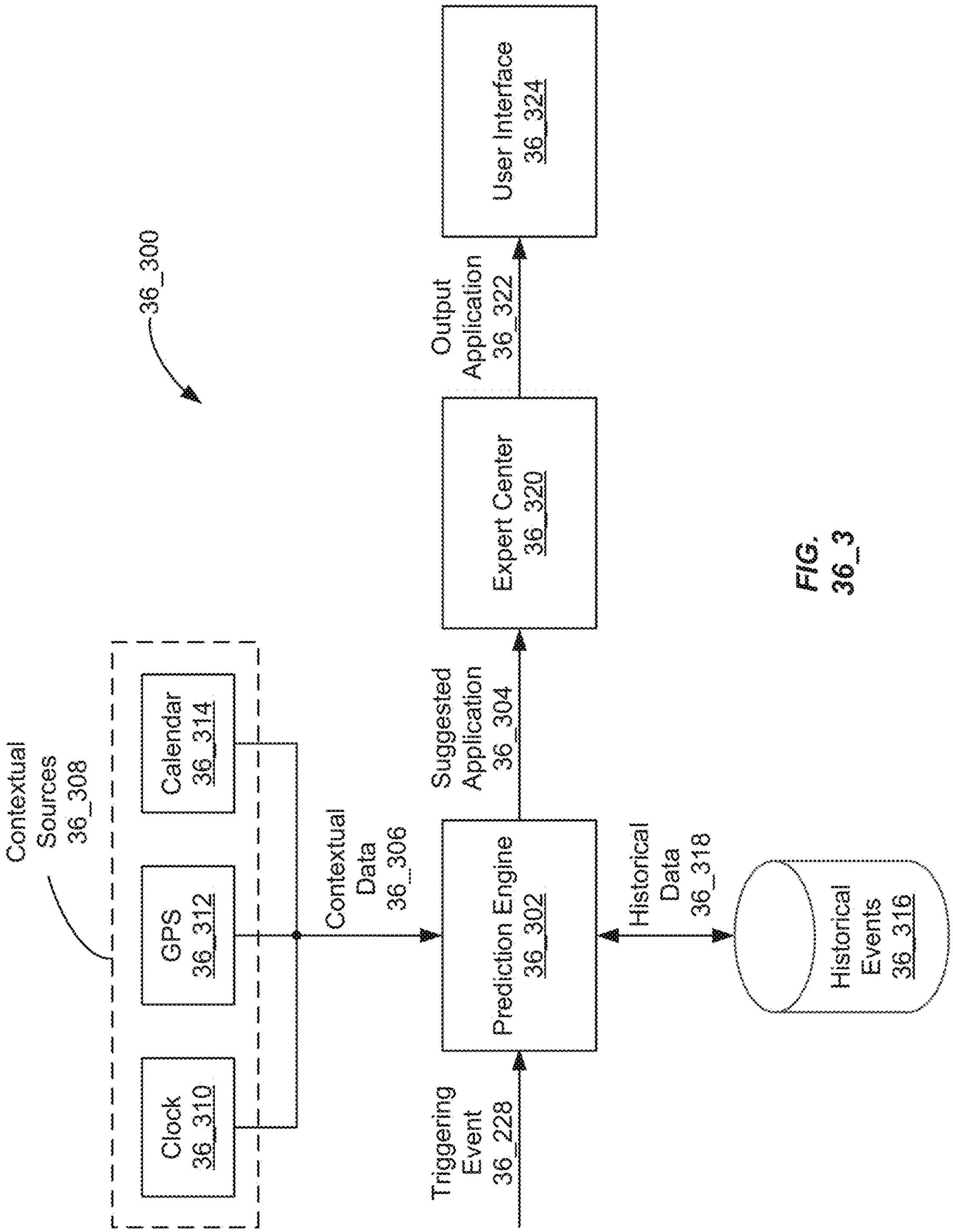
FIG. 36_3

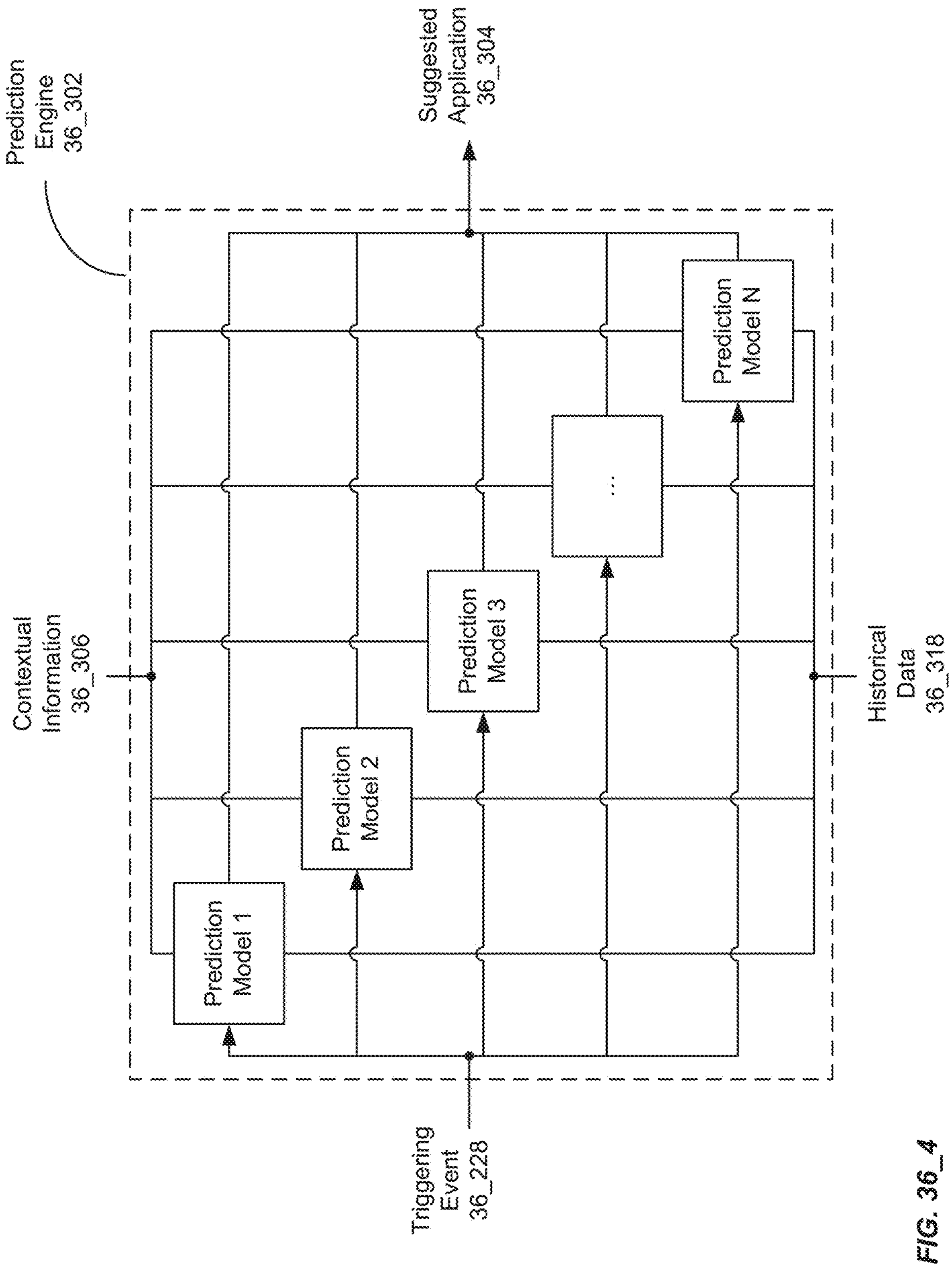
FIG. 36_4

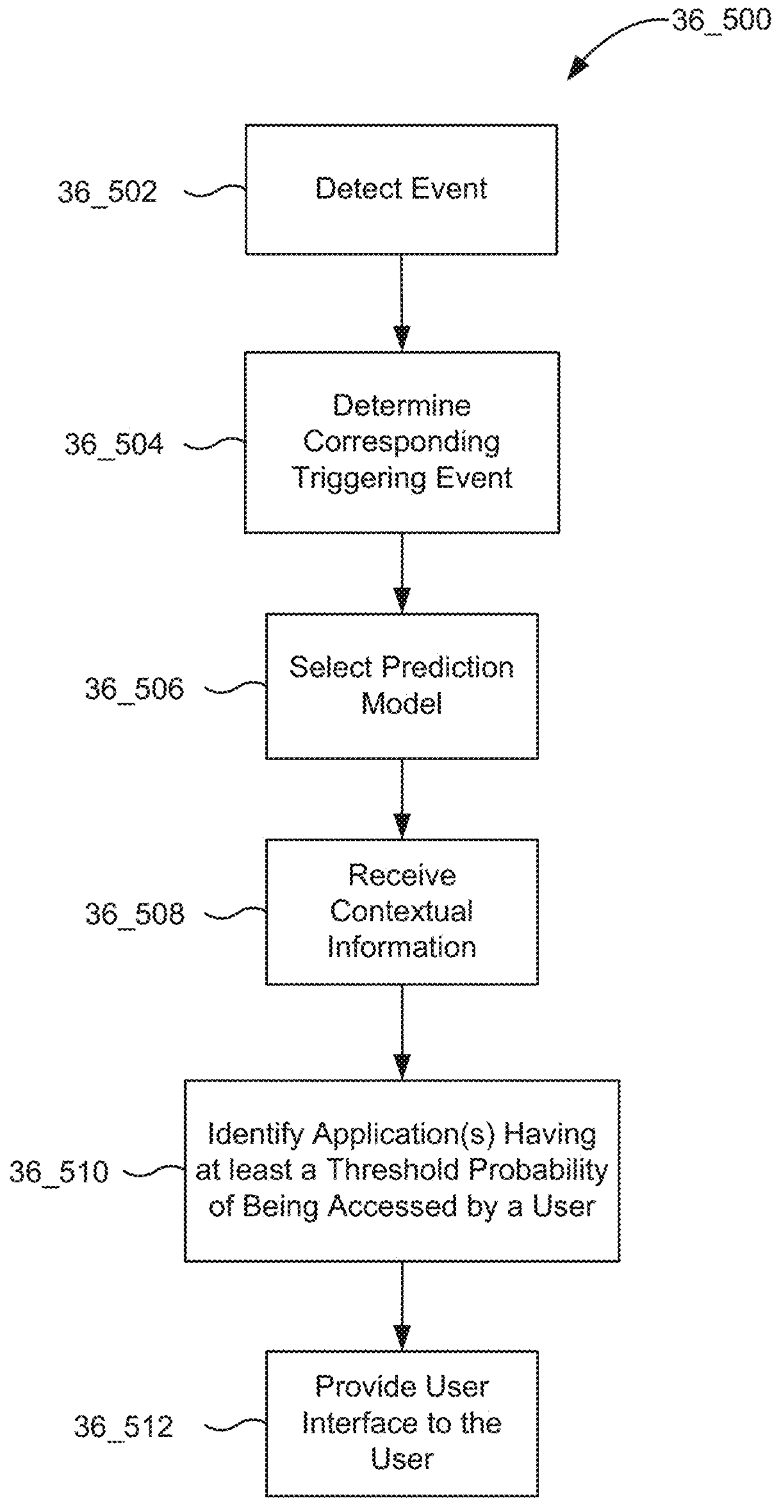
*FIG. 36_5*

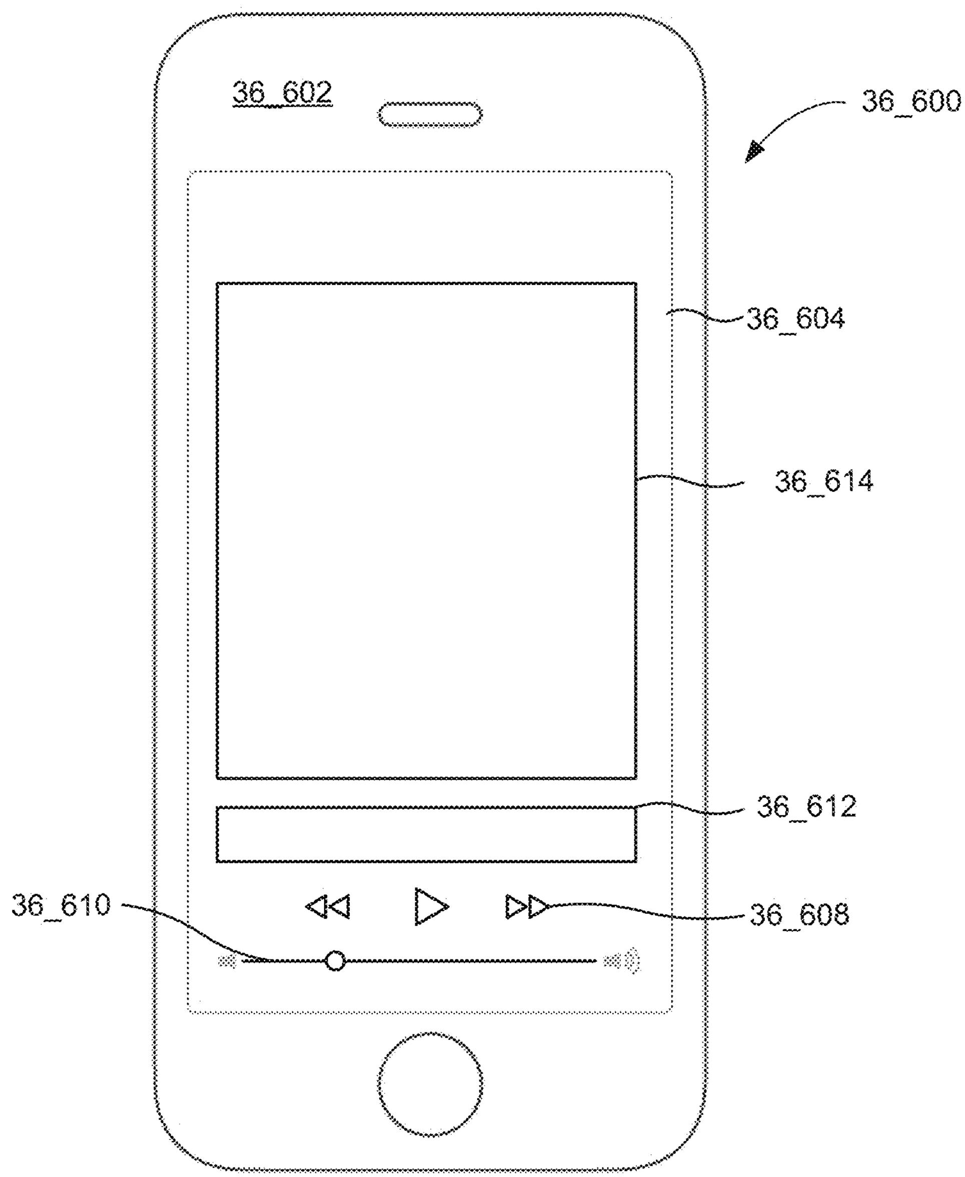
*FIG. 36_6*

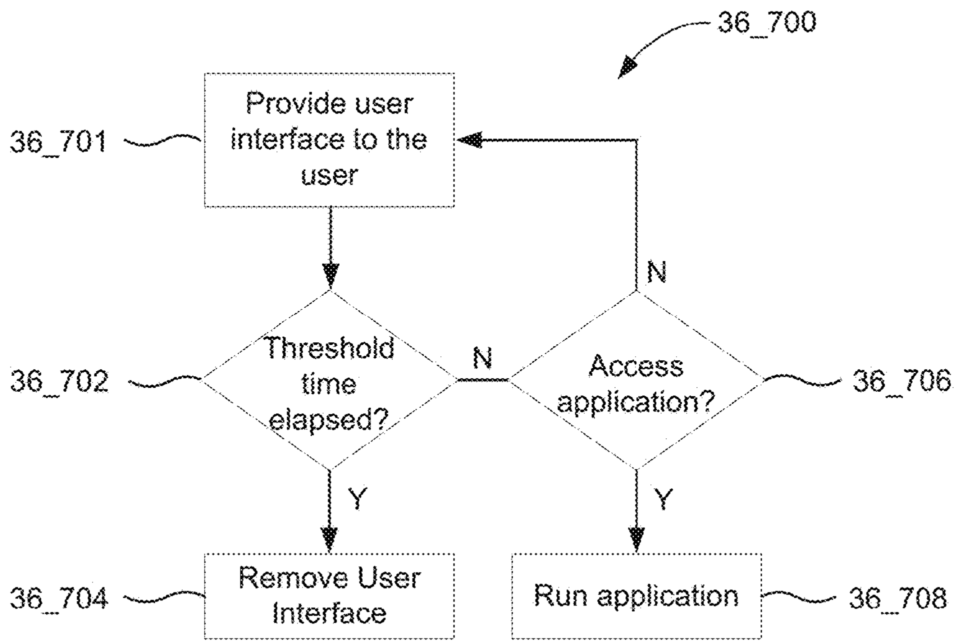
FIG. 36_7A
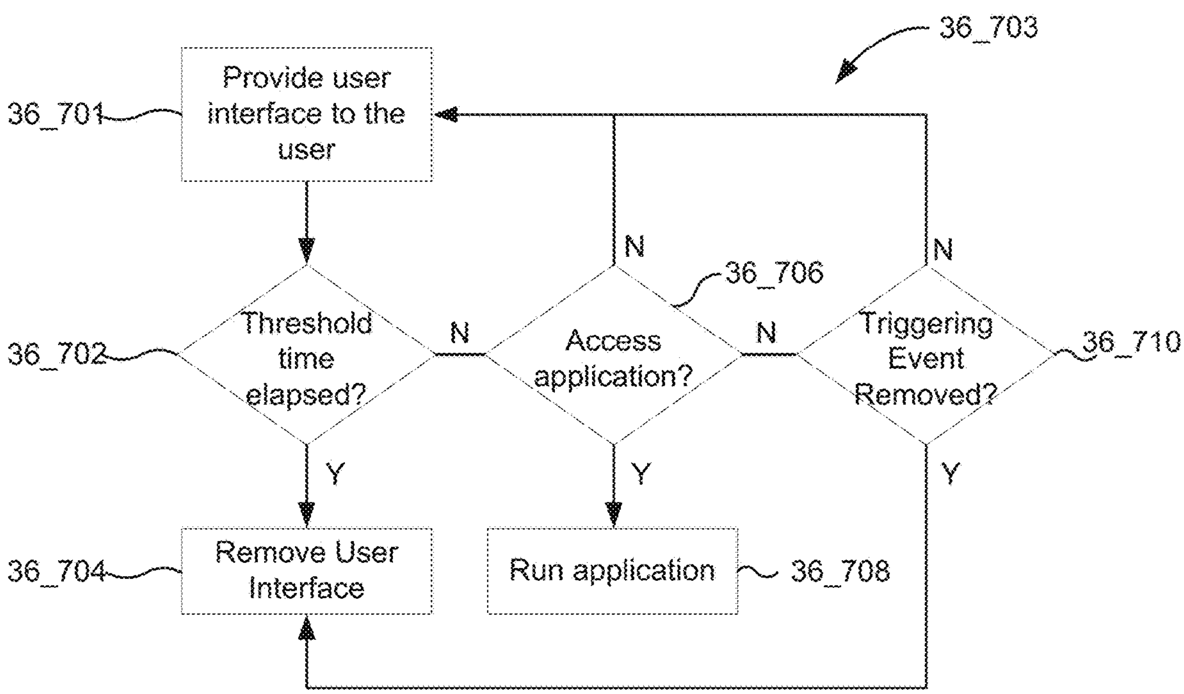
FIG. 36_7B

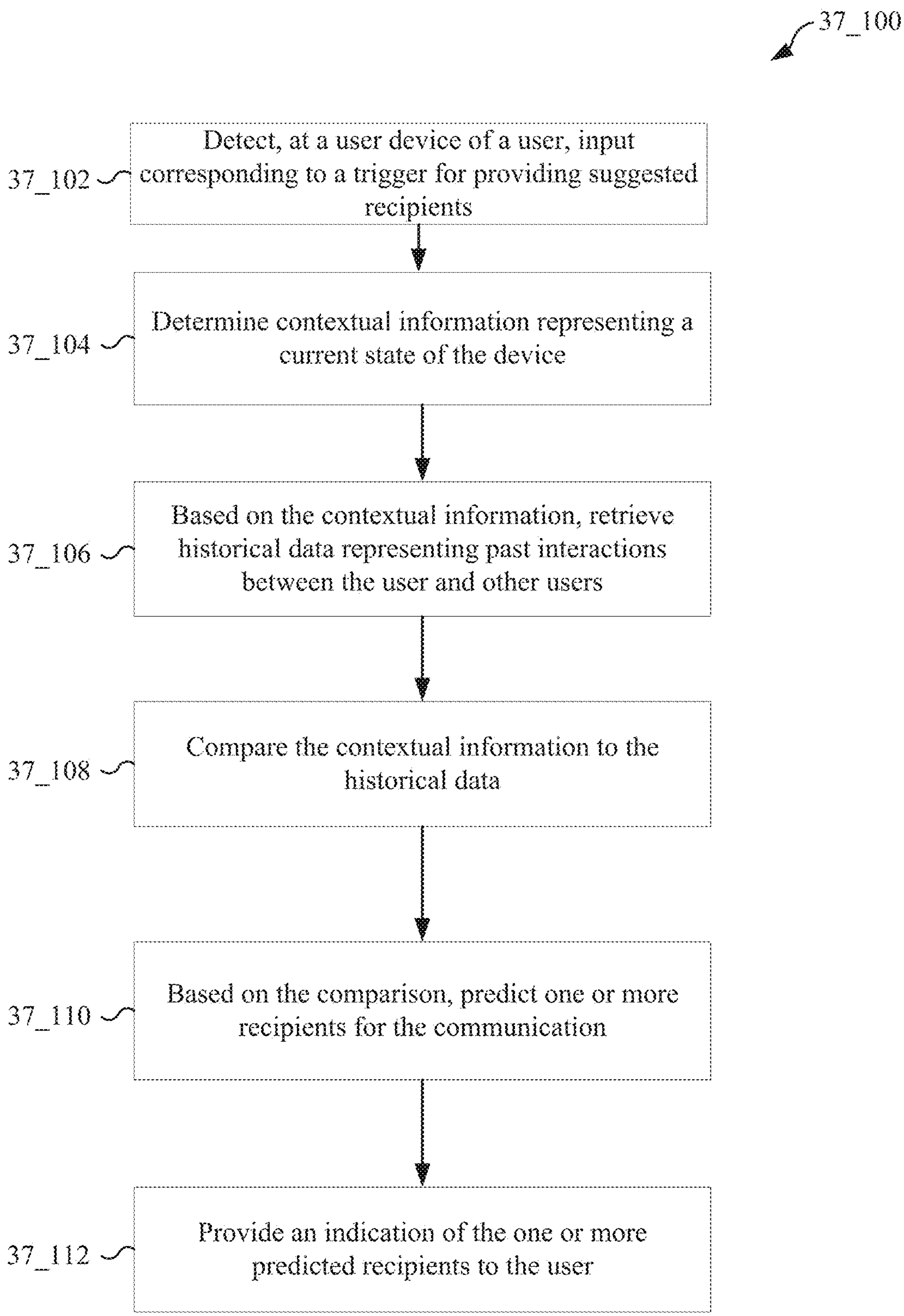
*FIG. 37_1*

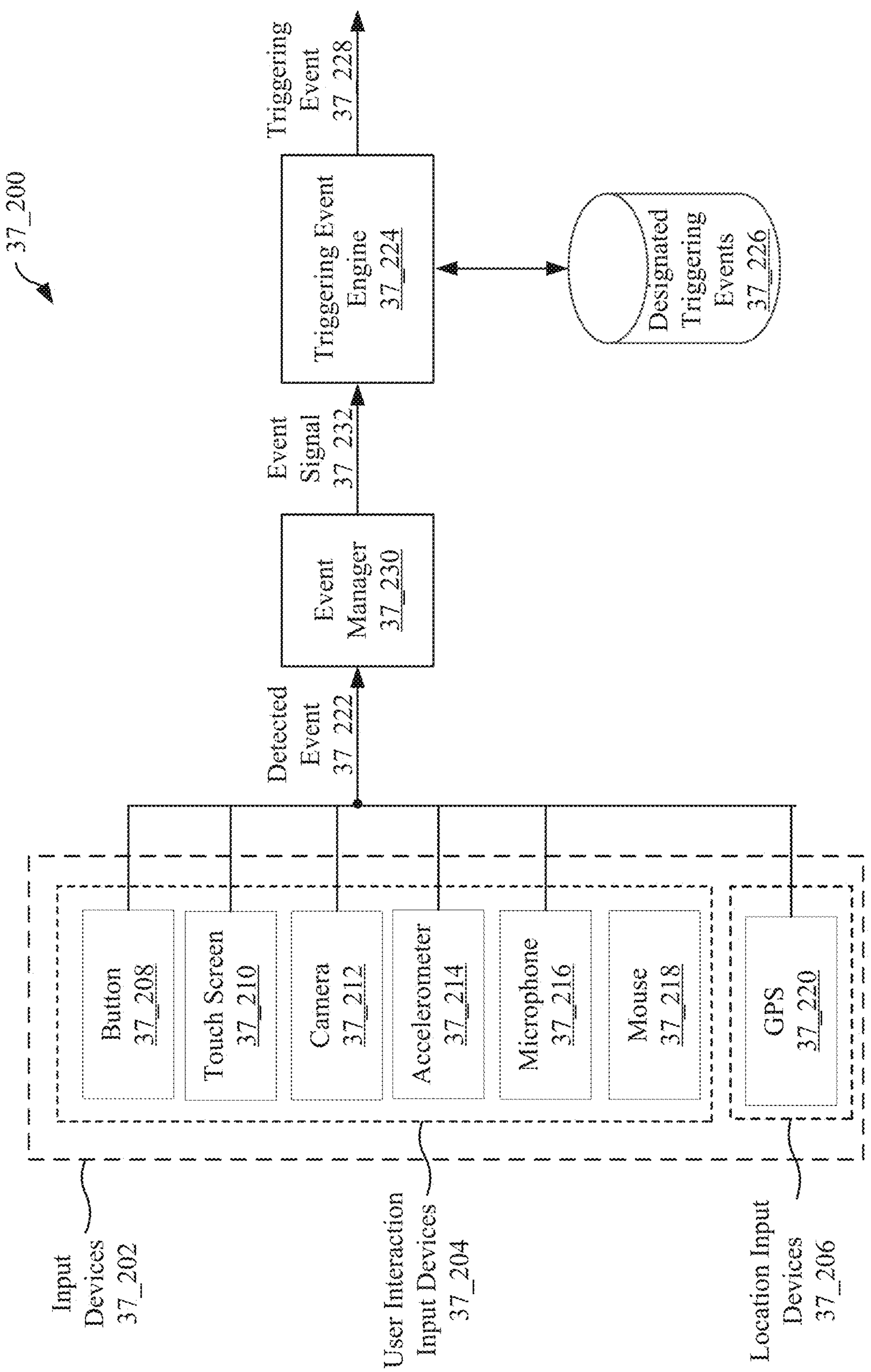
*FIG. 37_2*

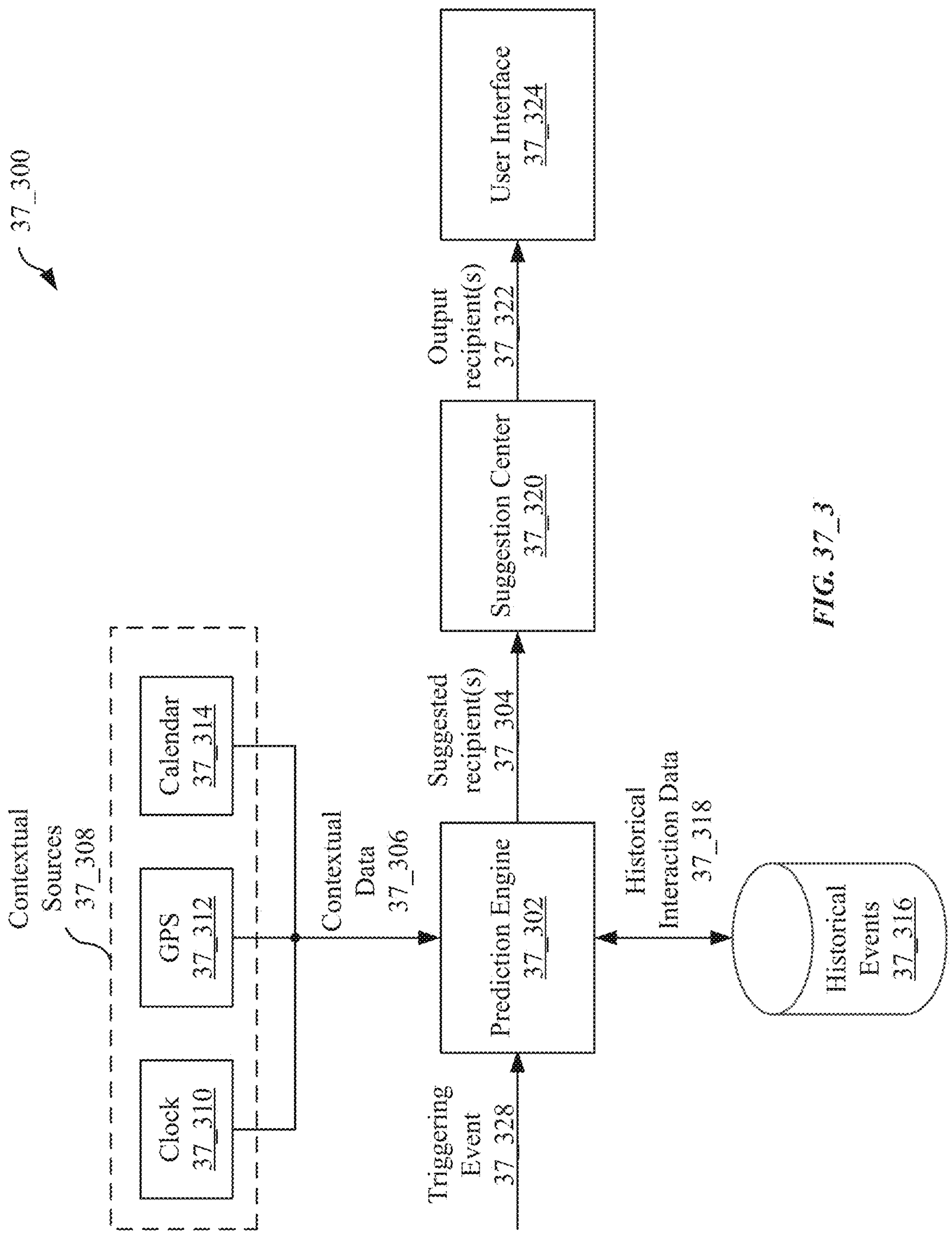
*FIG. 37_3*

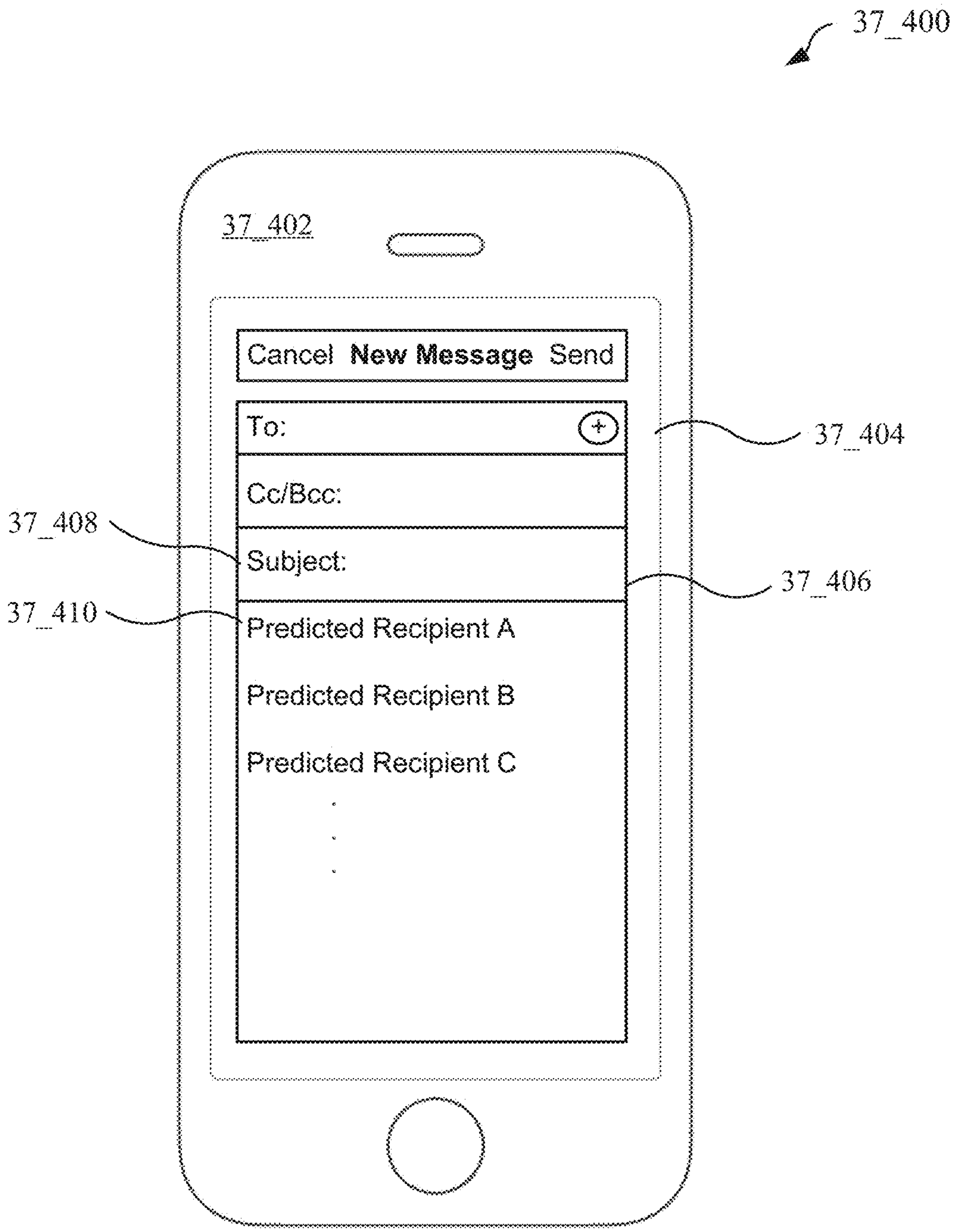
*FIG. 37_4*

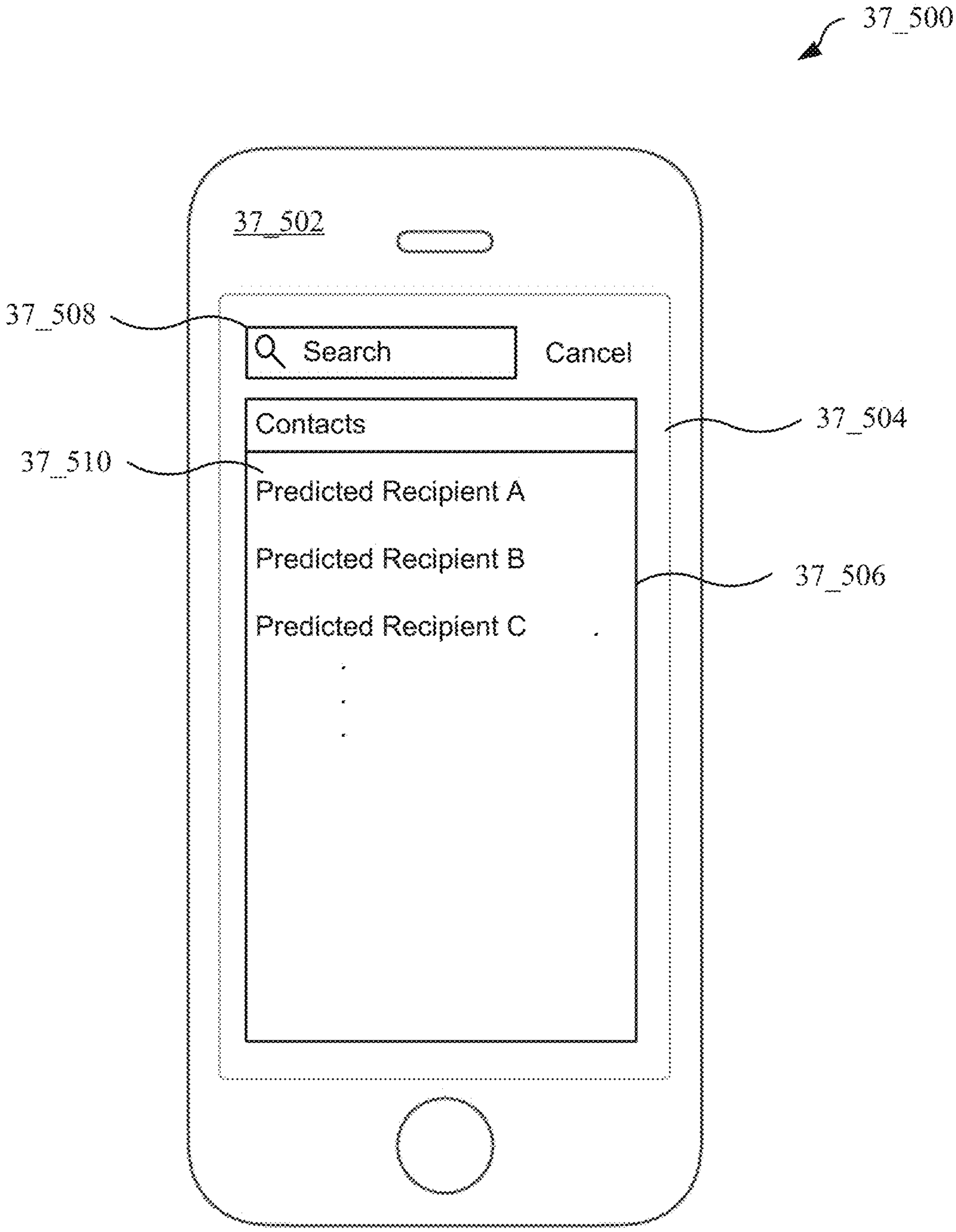
*FIG. 37_5*

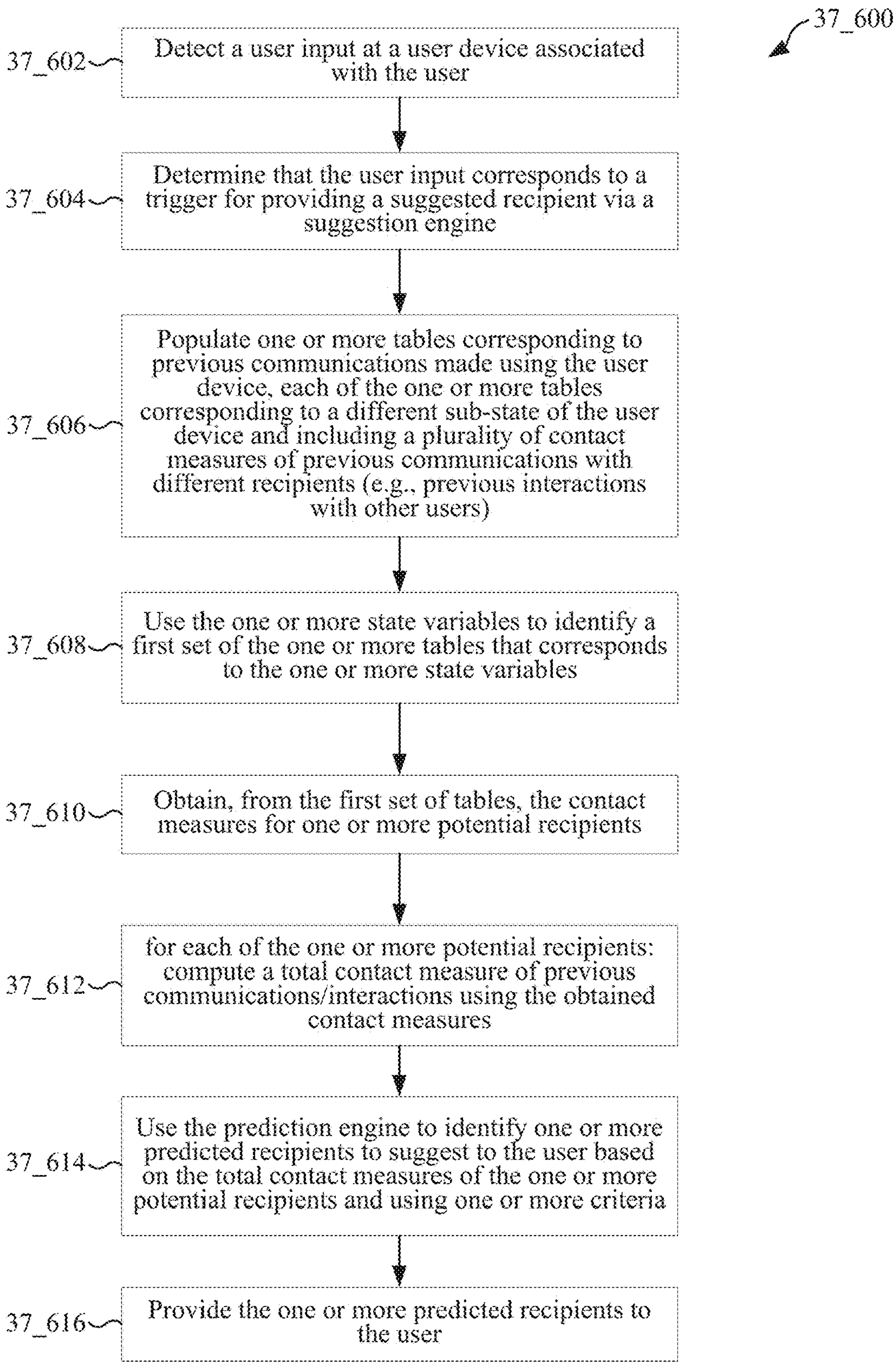
*FIG. 37_6*

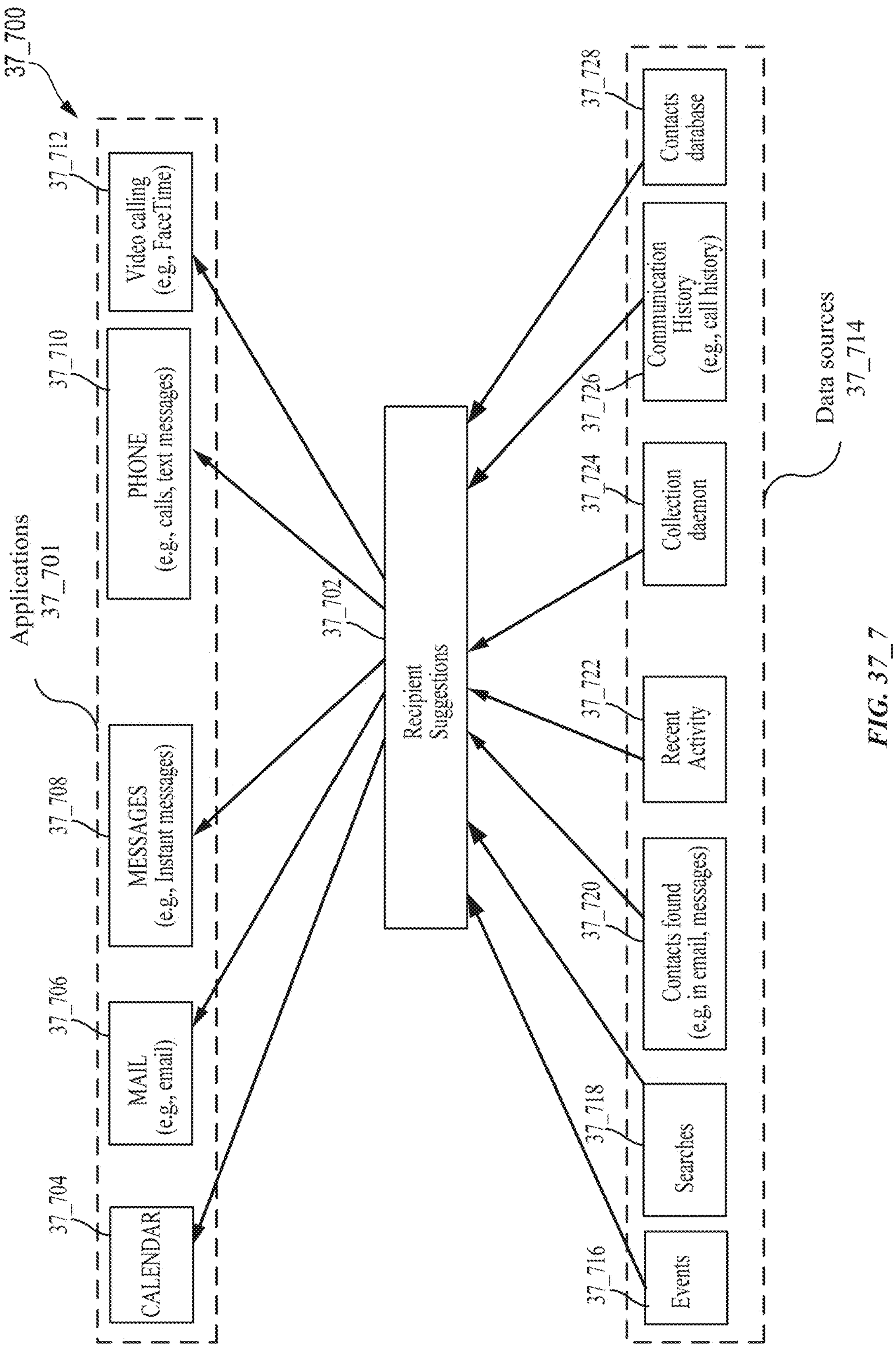
FIG. 37_7

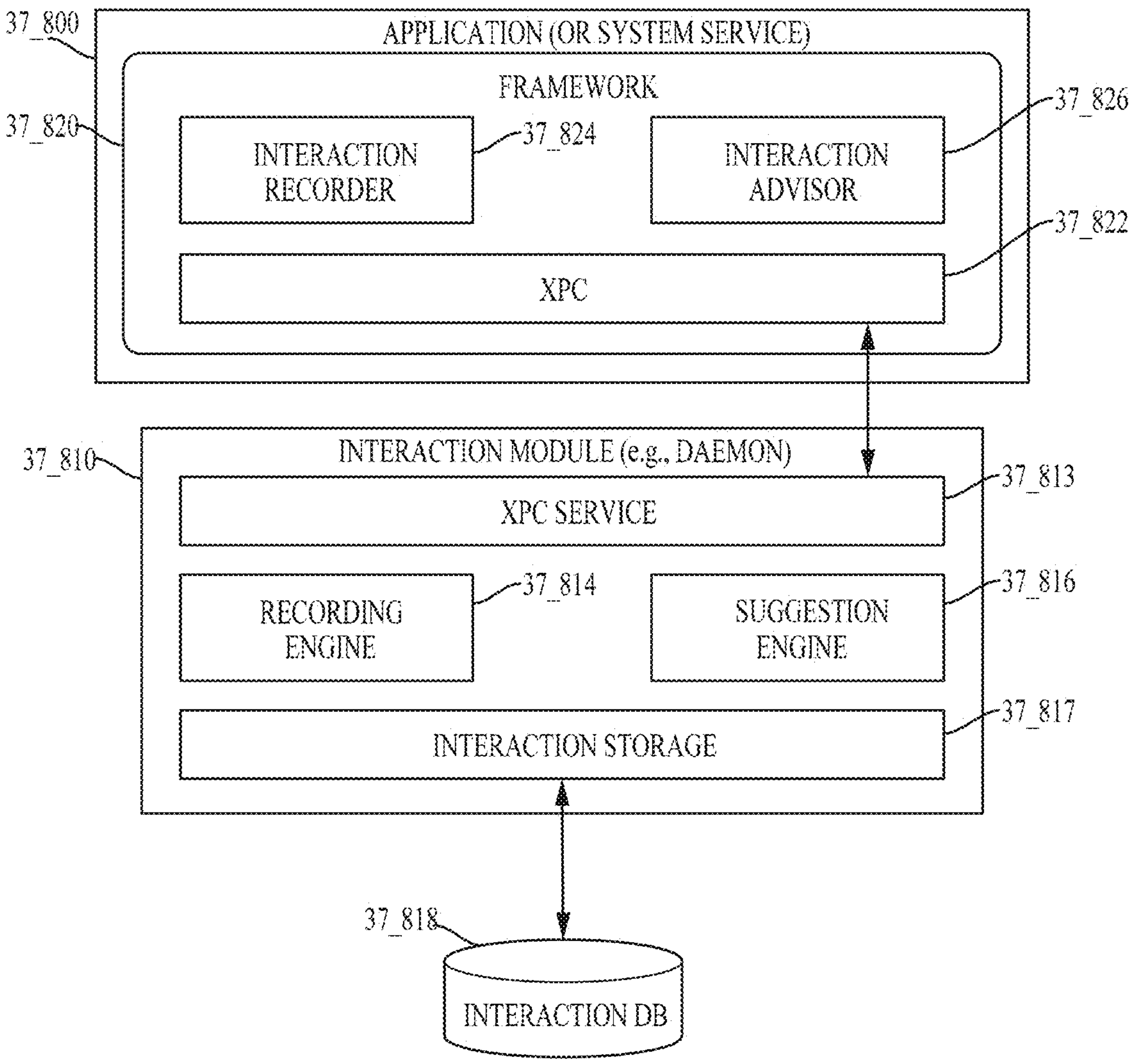
*FIG. 37_8*

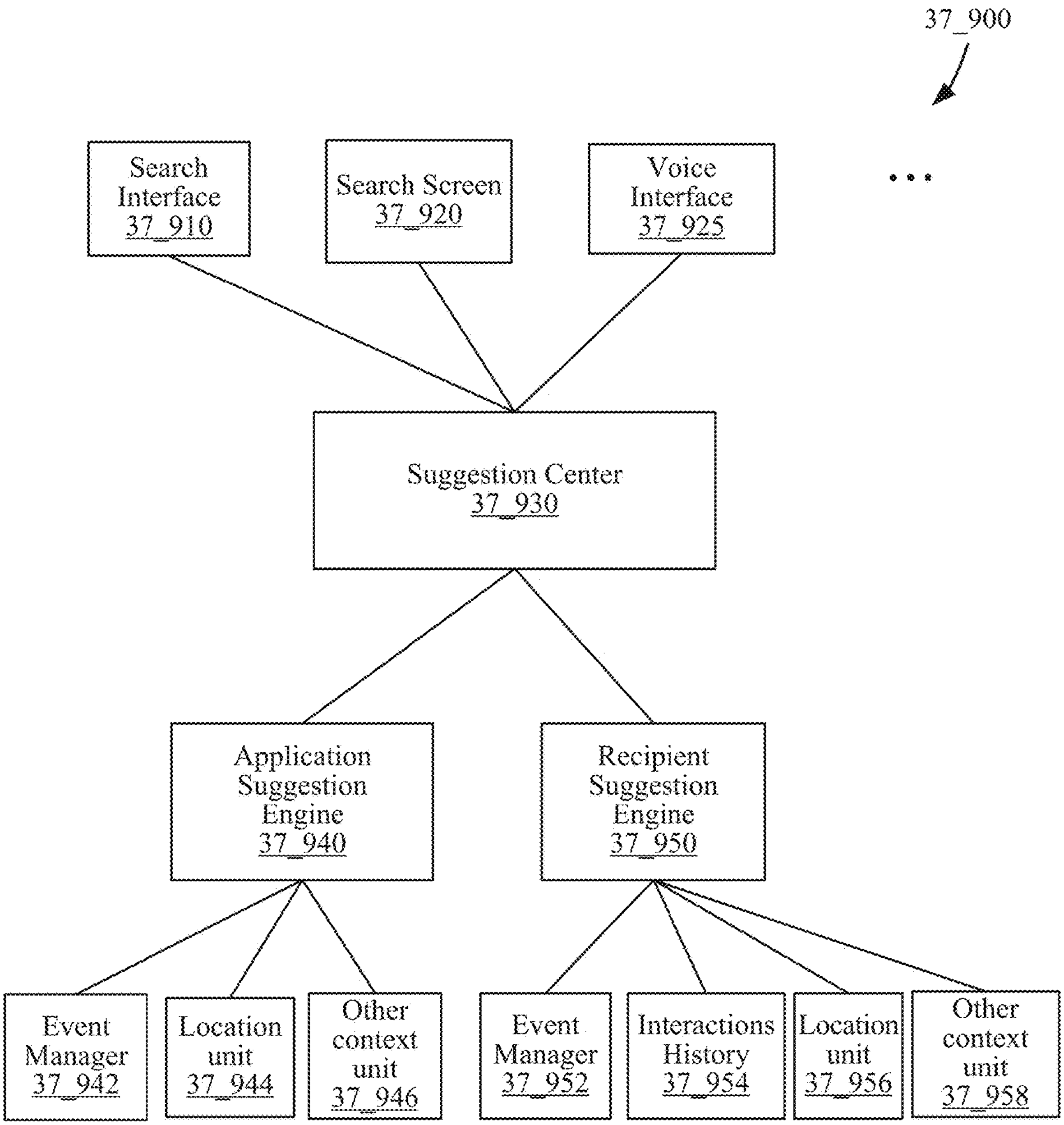
*FIG. 37_9*

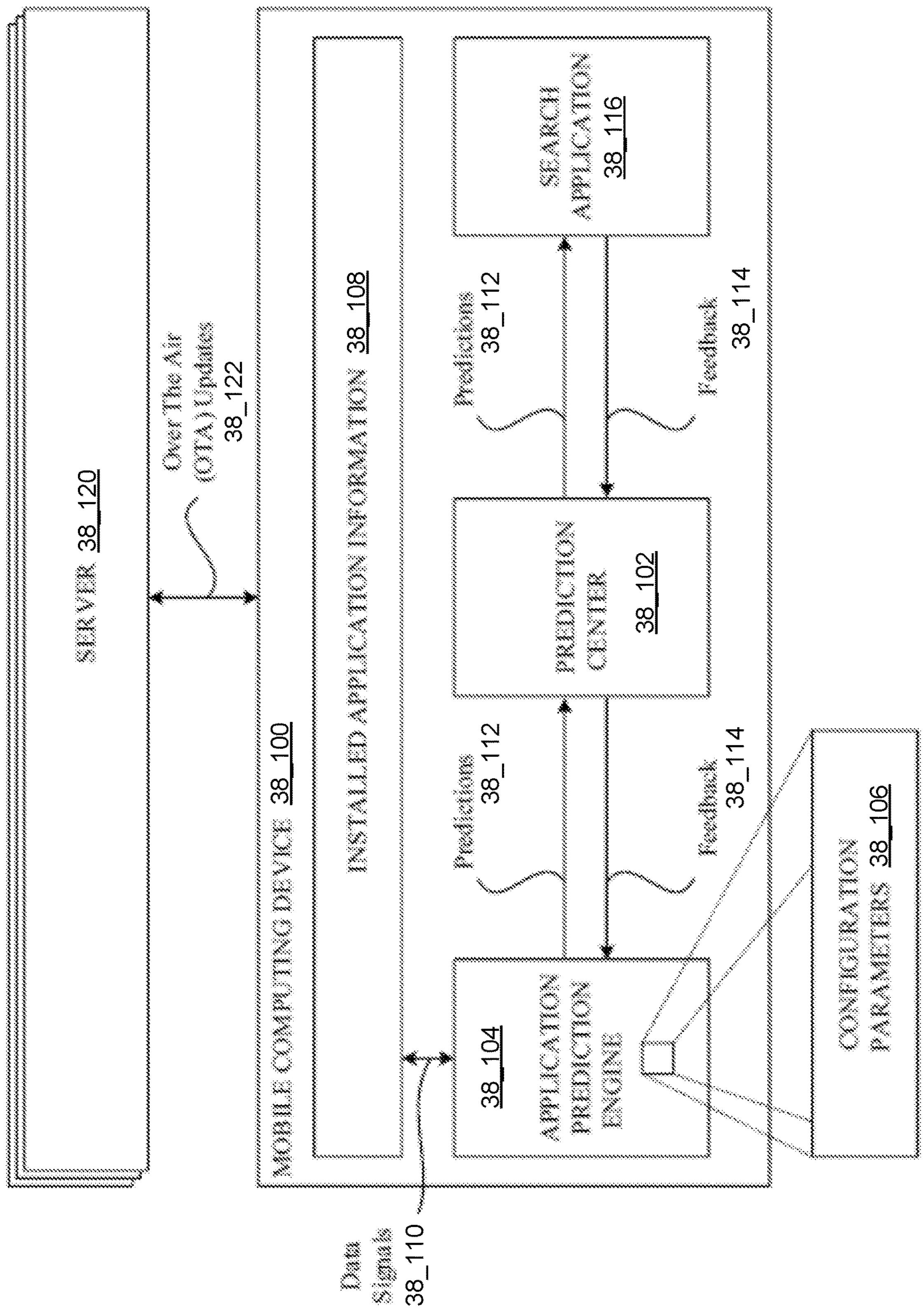
FIG. 38_1

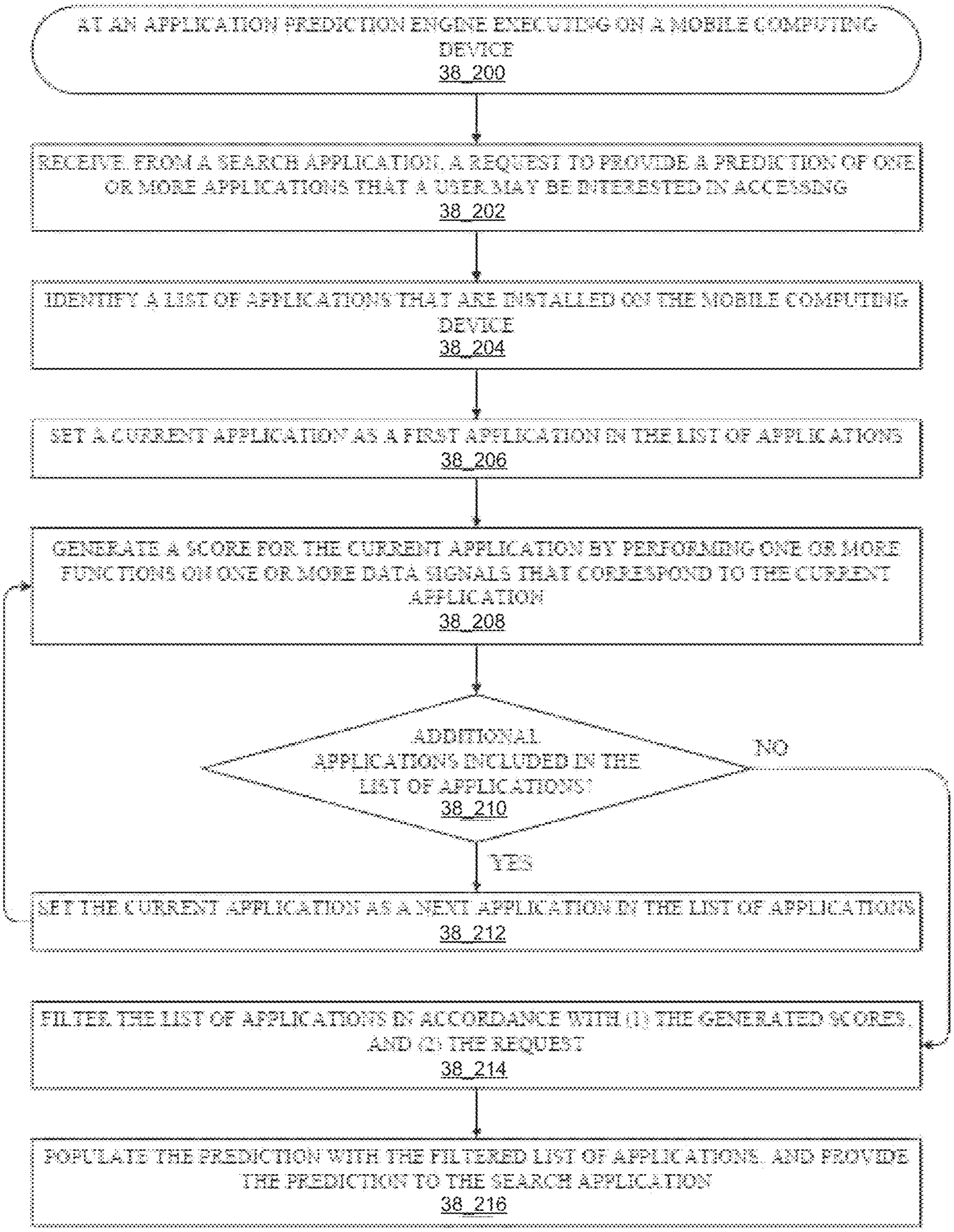
*FIG.* 38_2

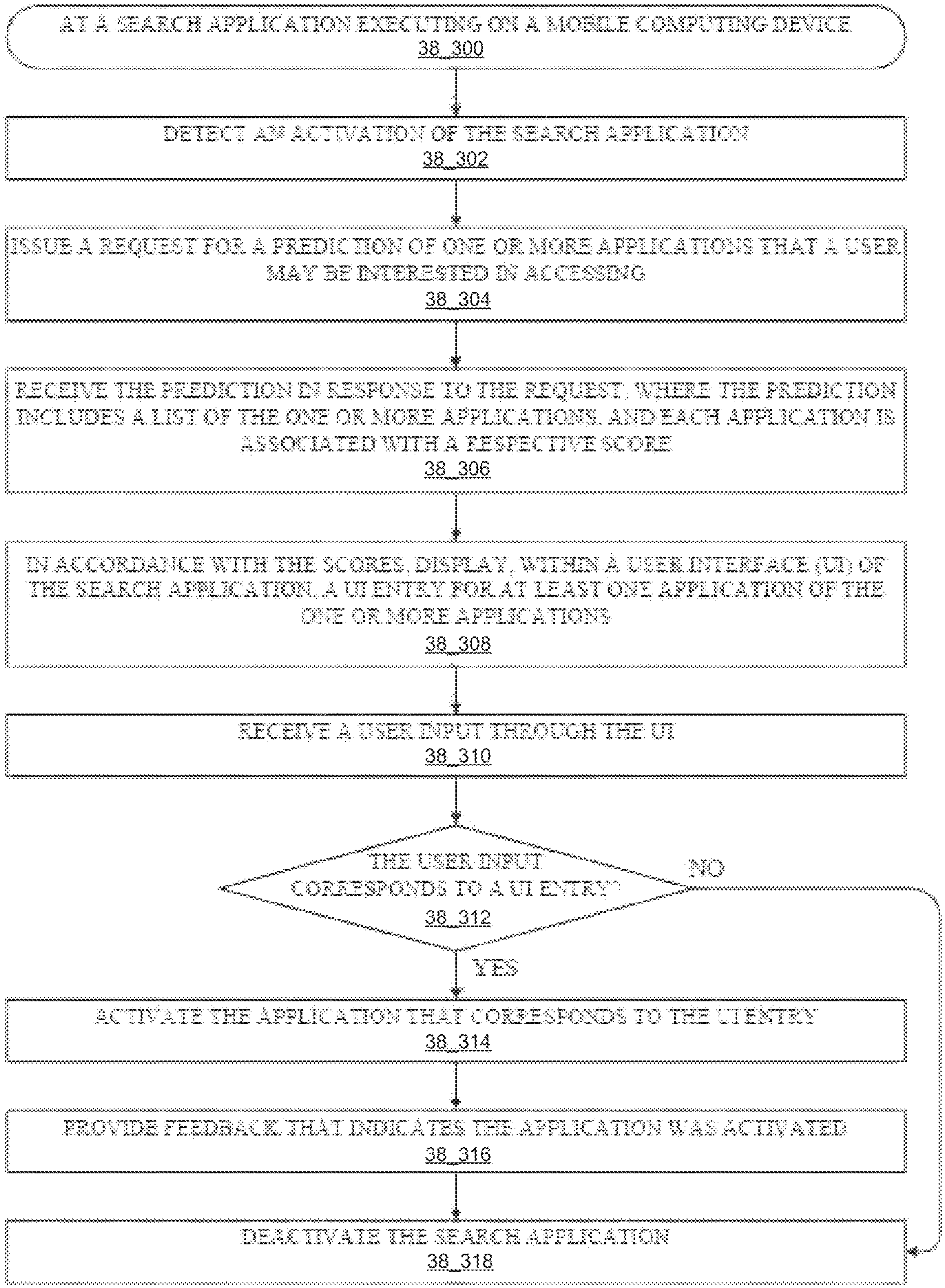
FIG. 38_3

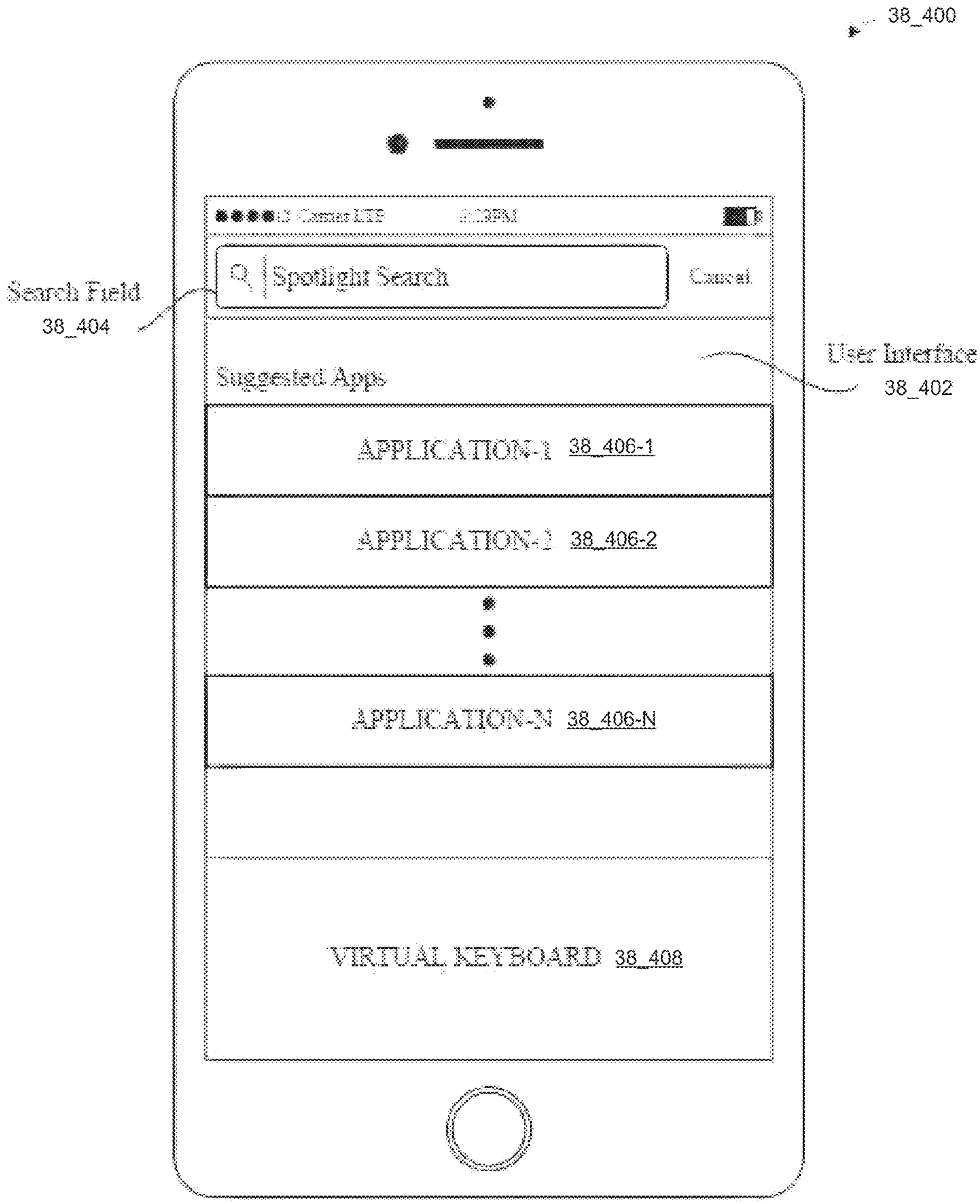
FIG. 38_4

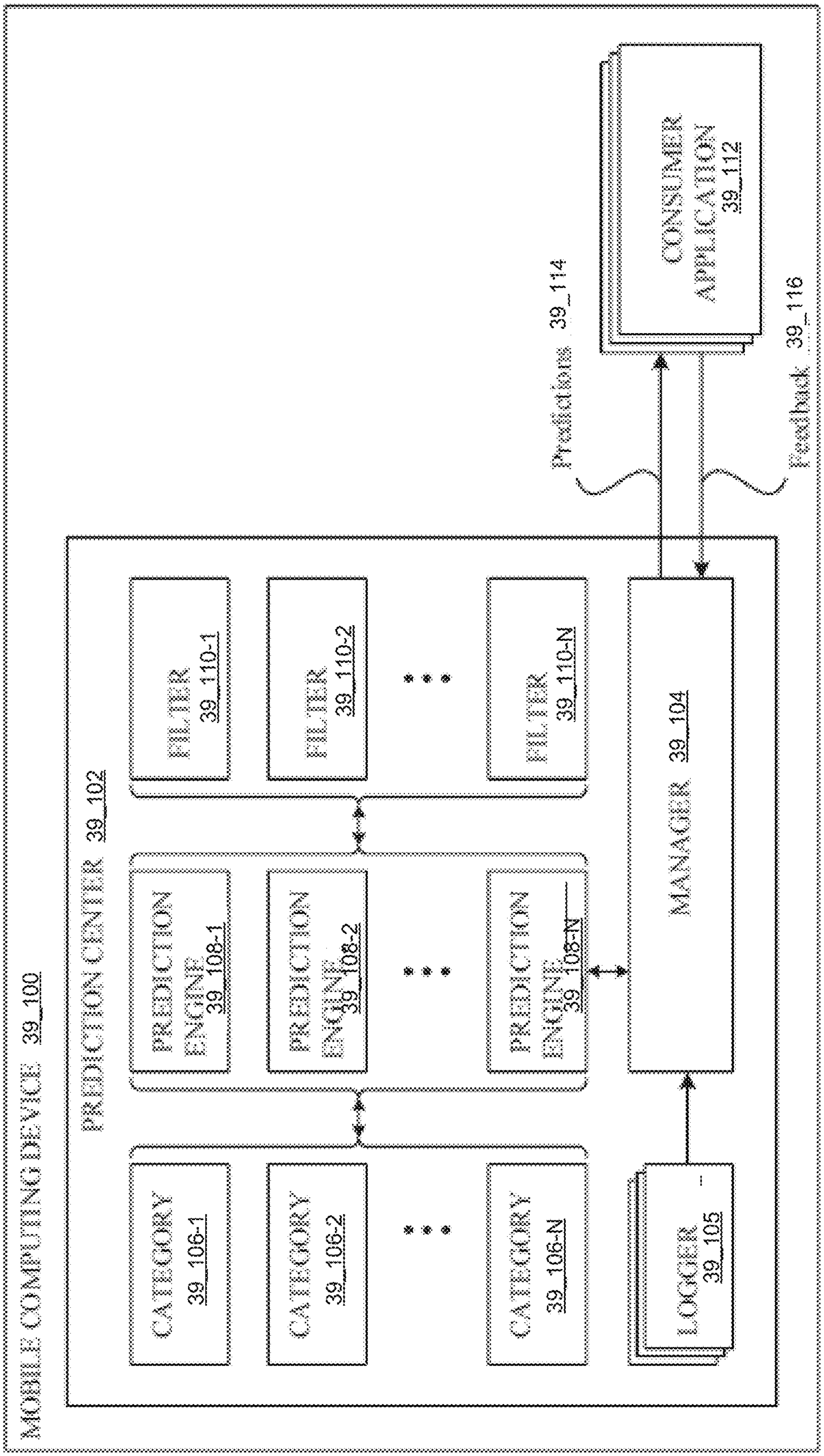
*FIG.* 39_1

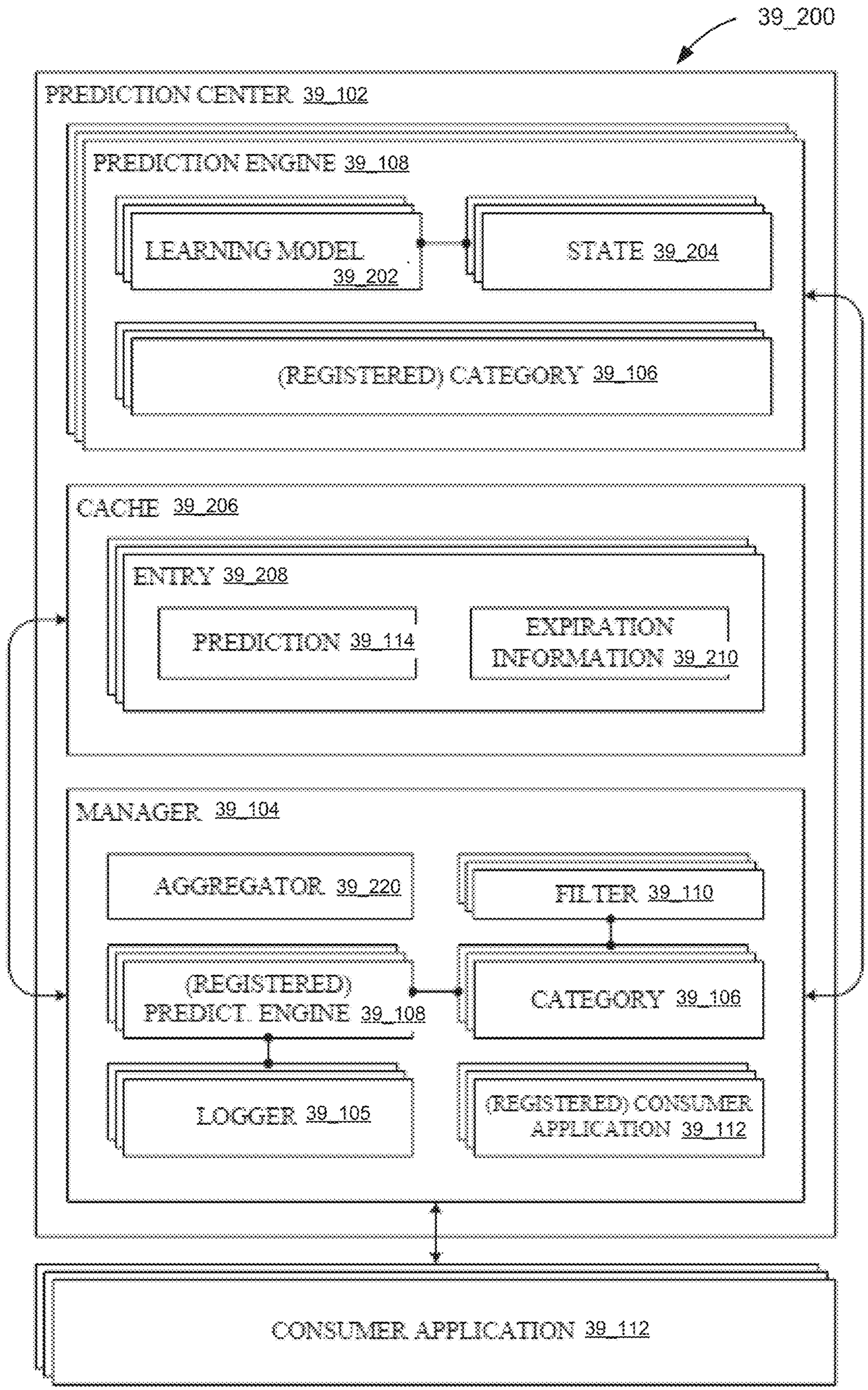
*FIG.* 39_2

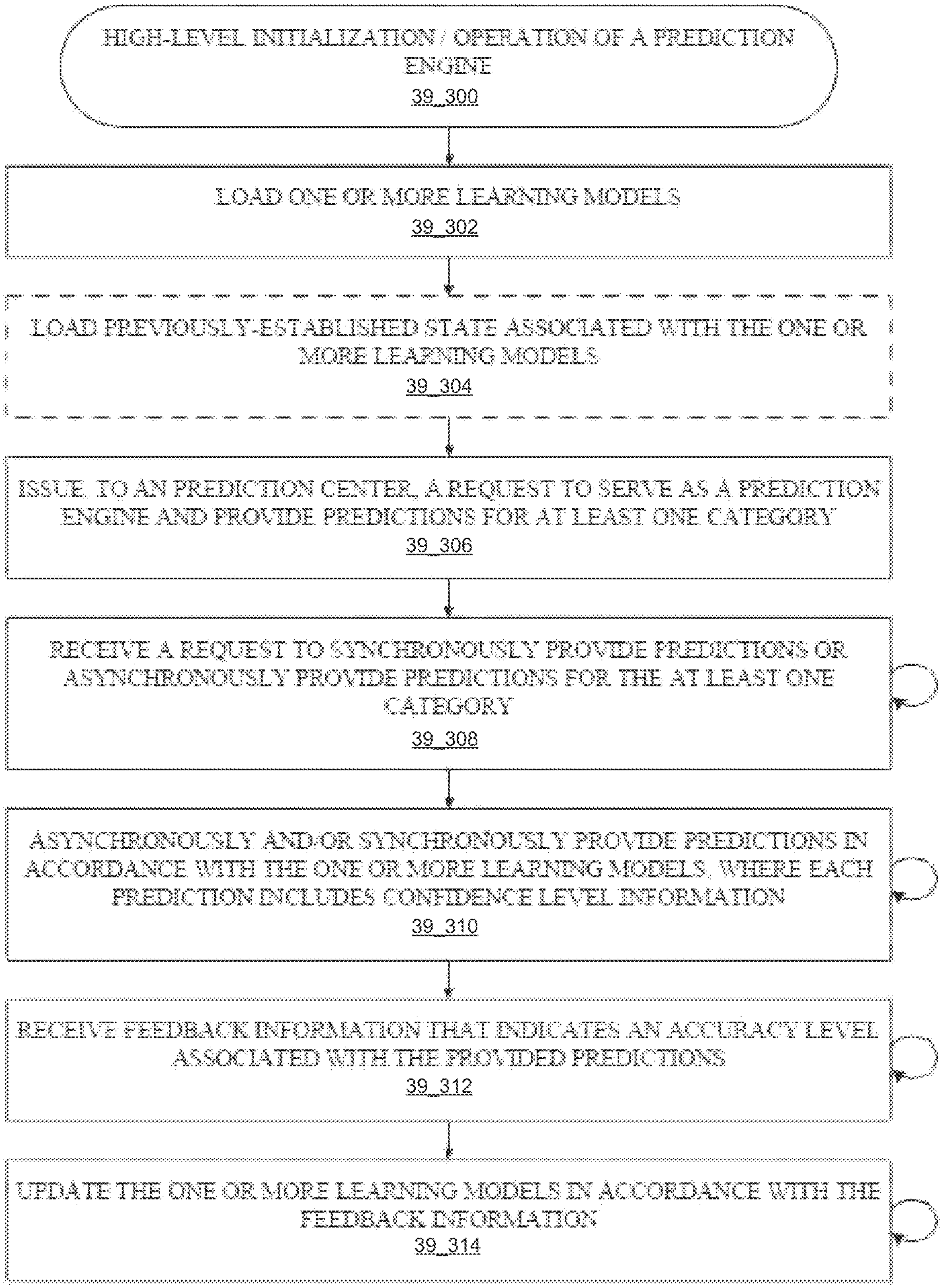
FIG. 39_3A

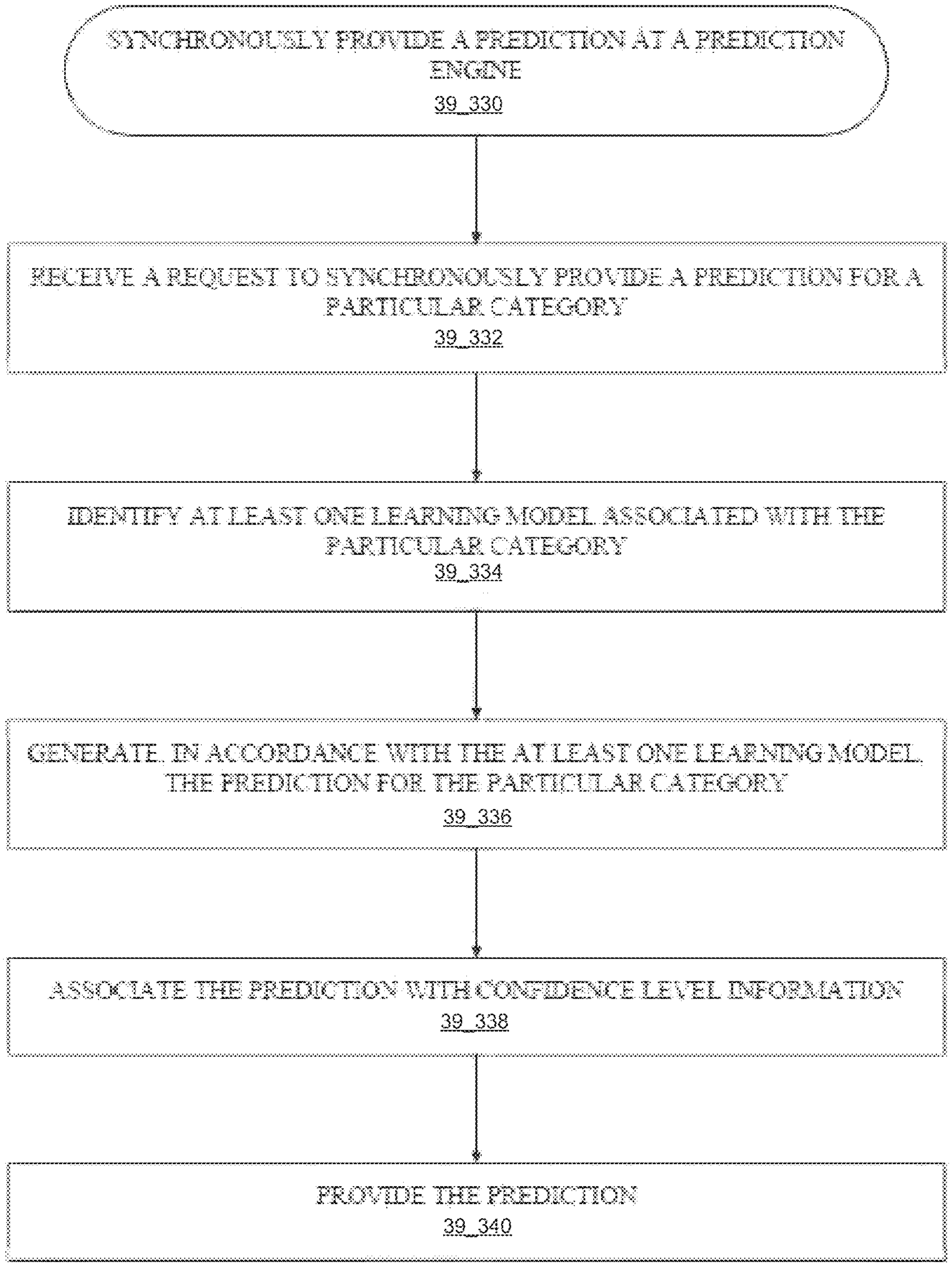
FIG. 39_3B

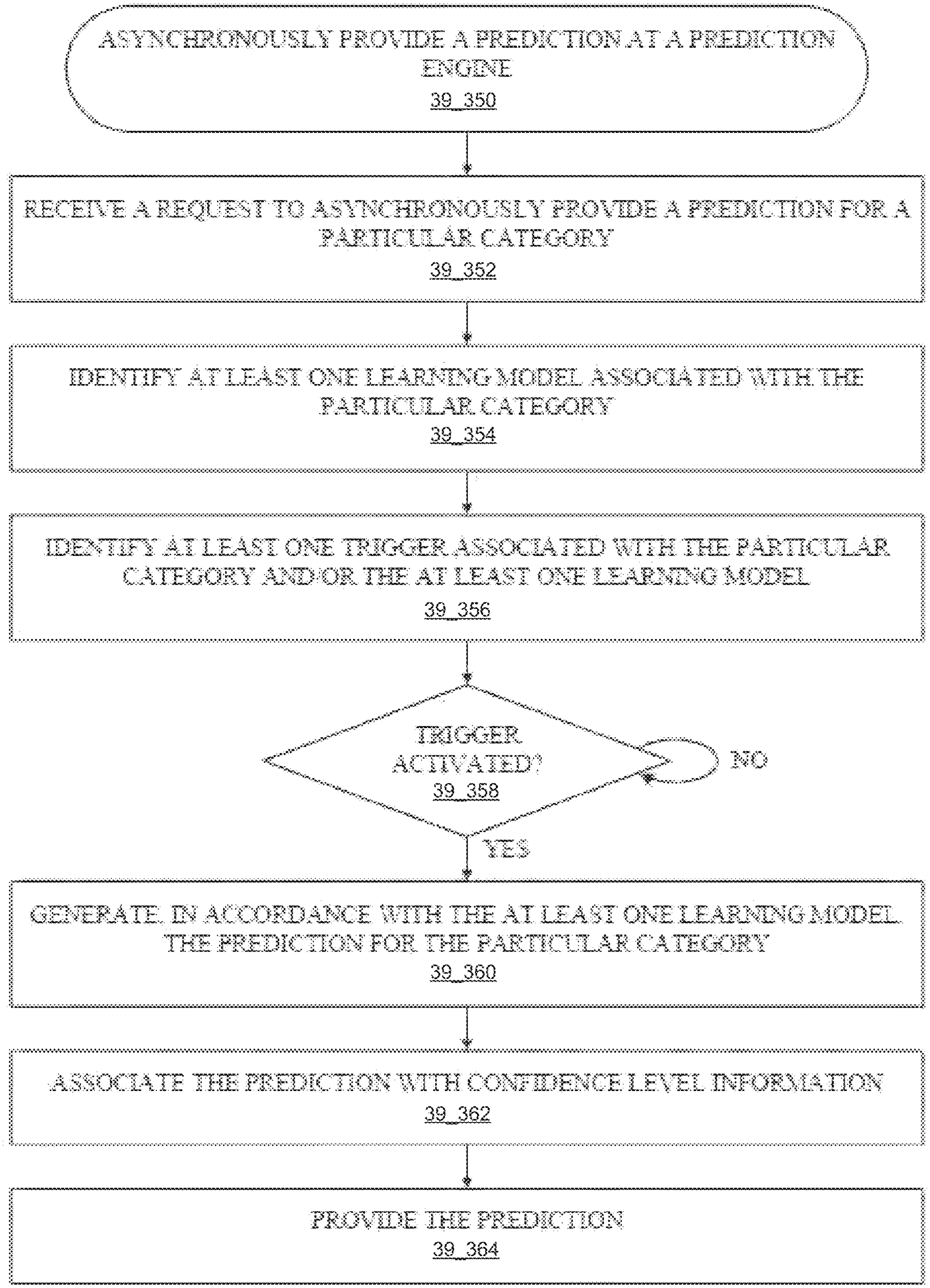
FIG. 39_3C

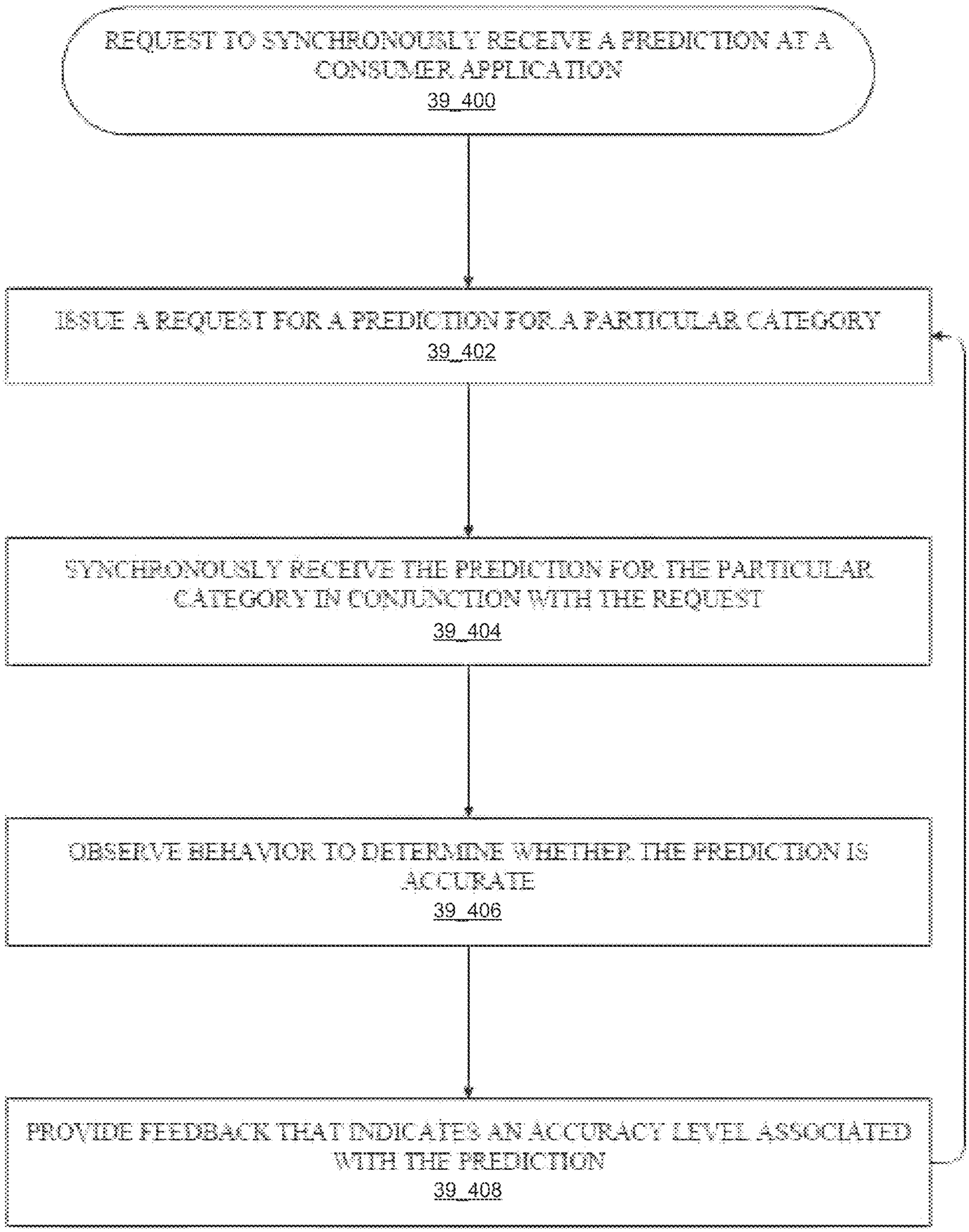
FIG. 39_4A

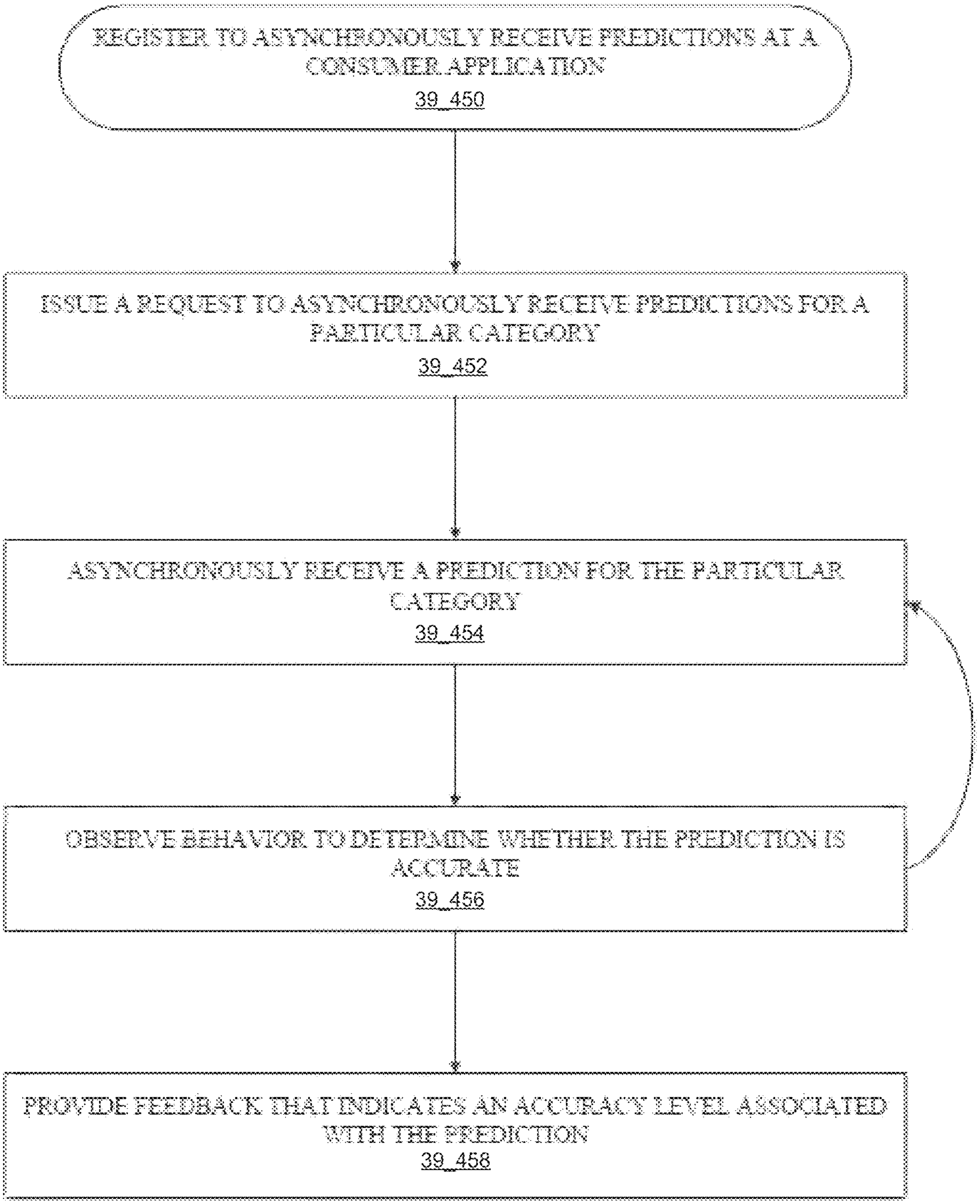
*FIG.* 39_4B

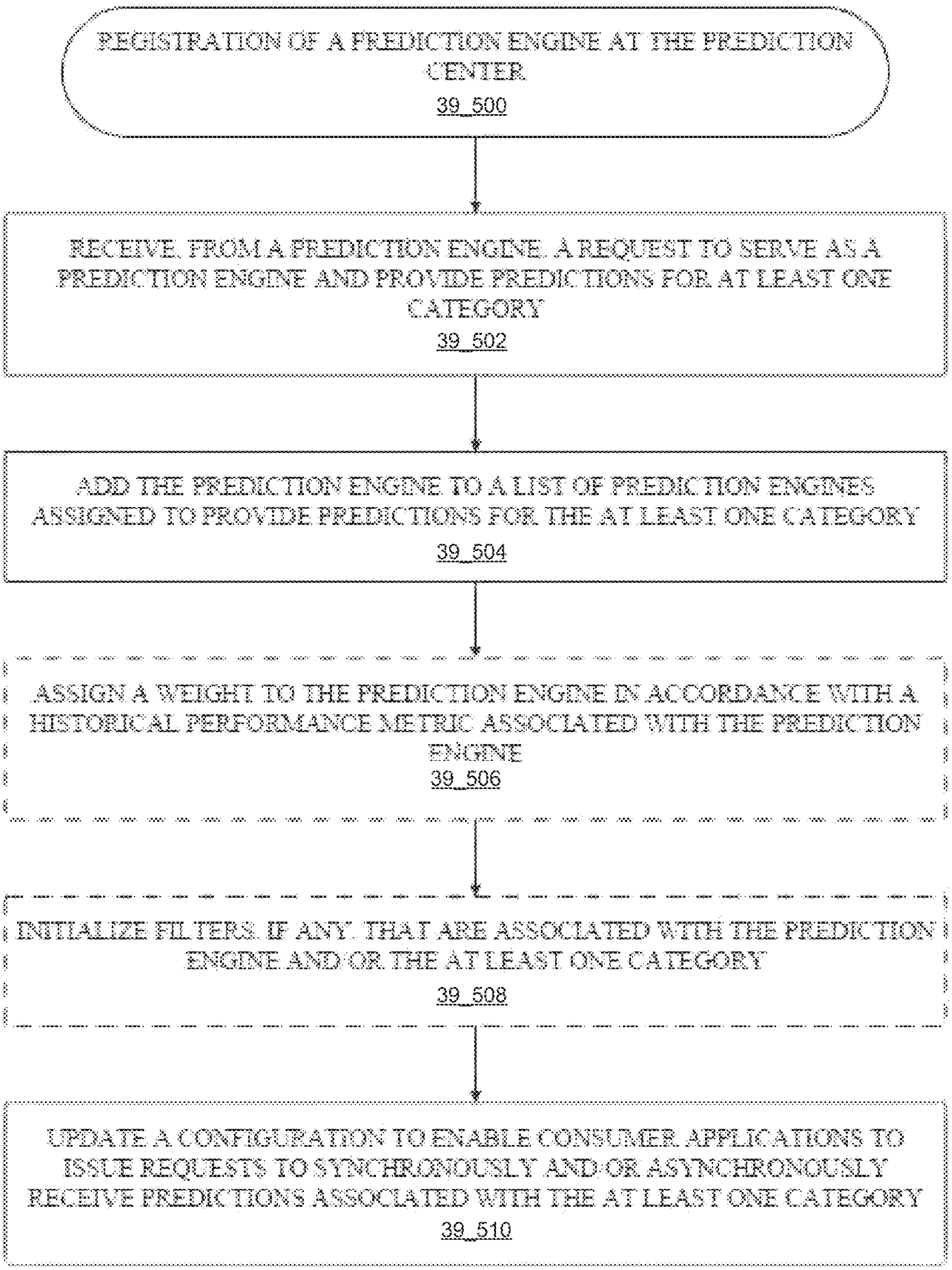
*FIG.* 39_5A

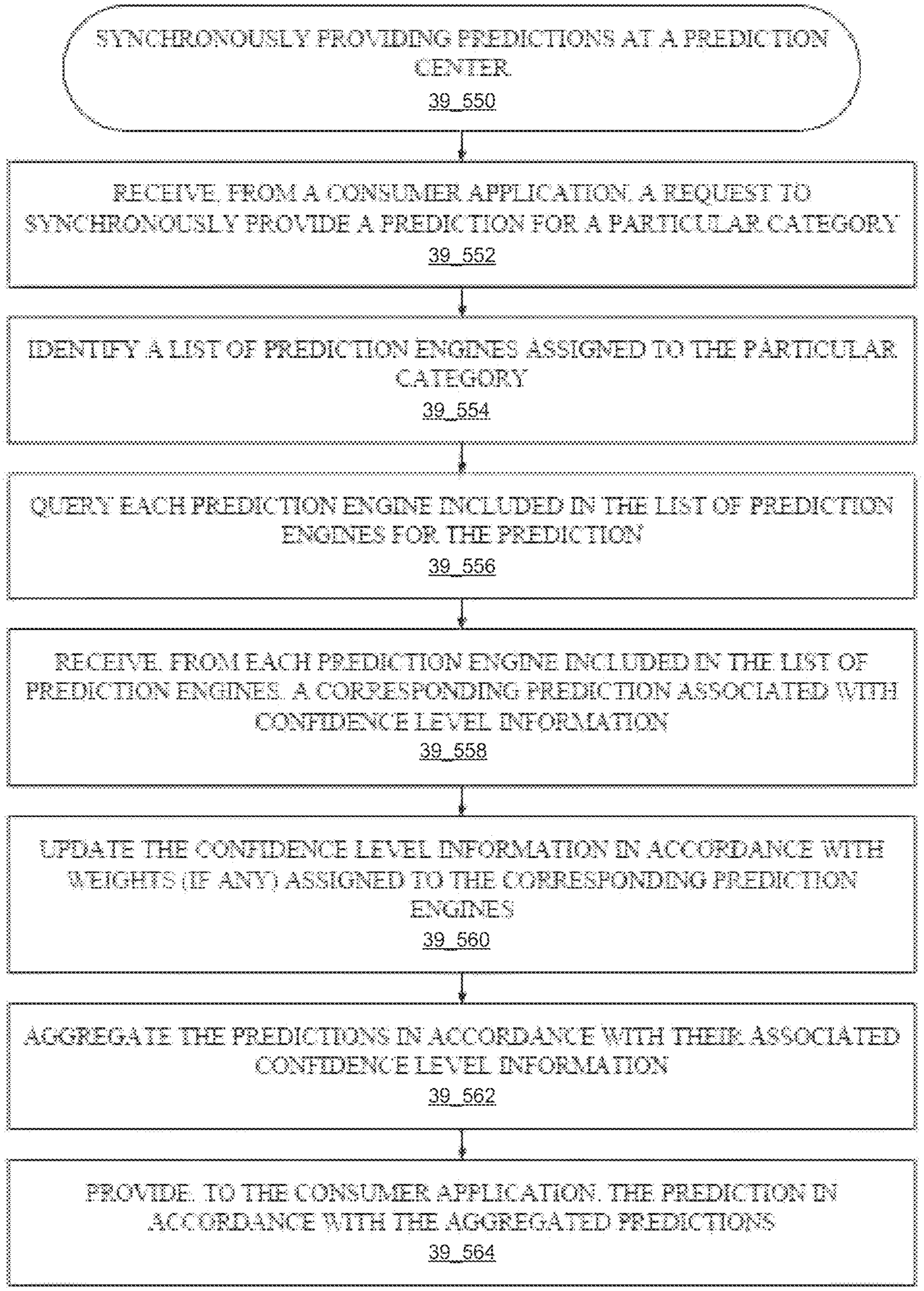
*FIG.* 39_5B

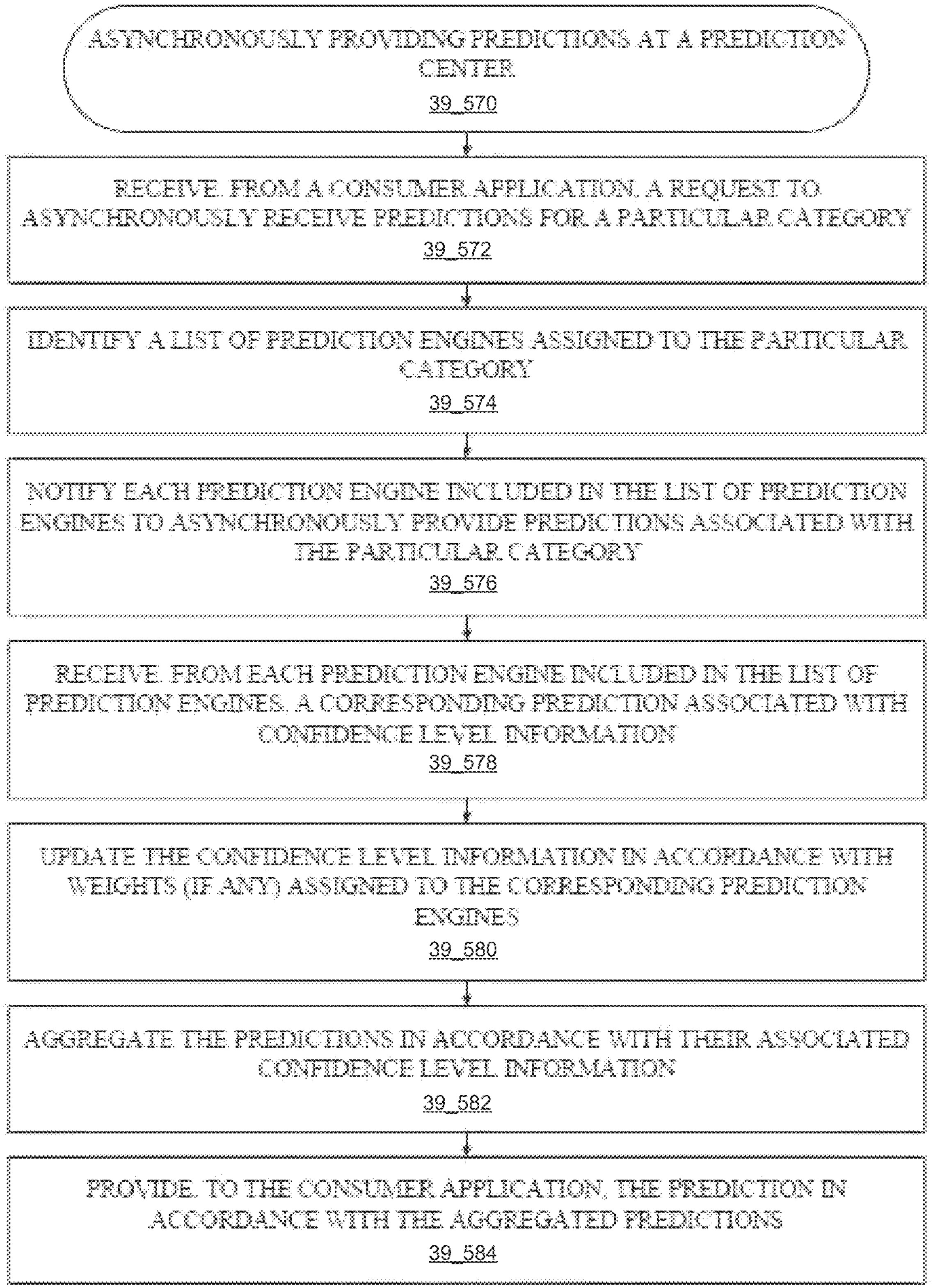
FIG. 39_5C

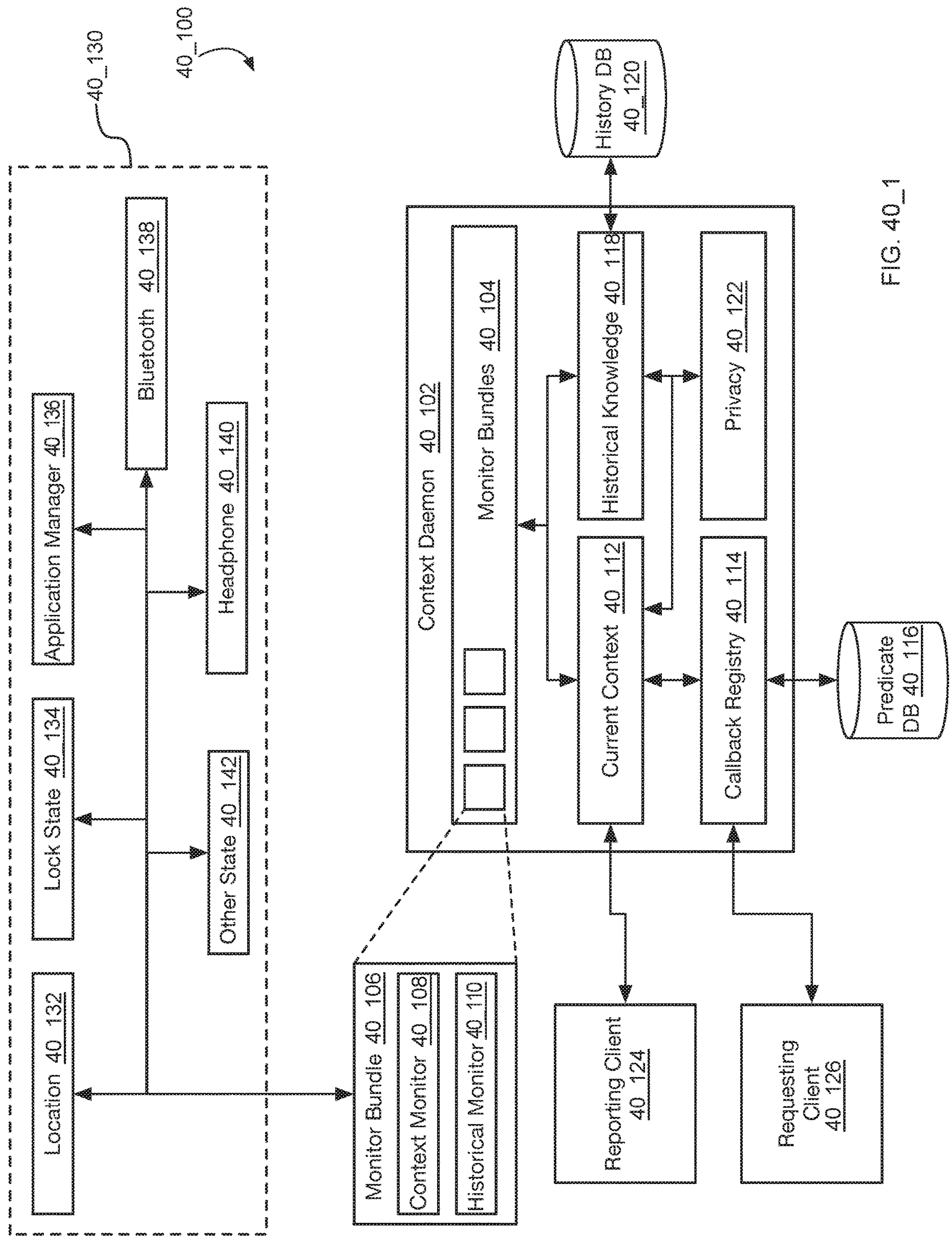
FIG. 40_1

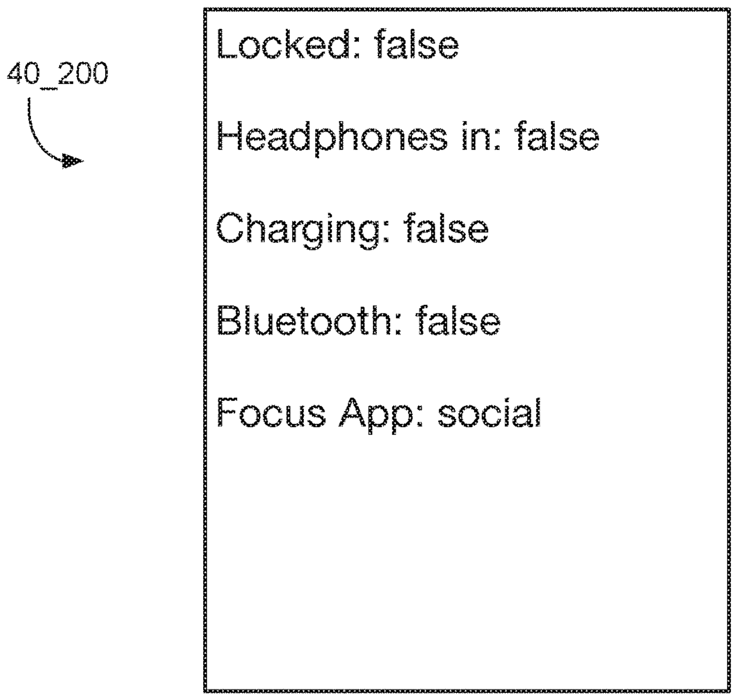
FIG. 40_2A
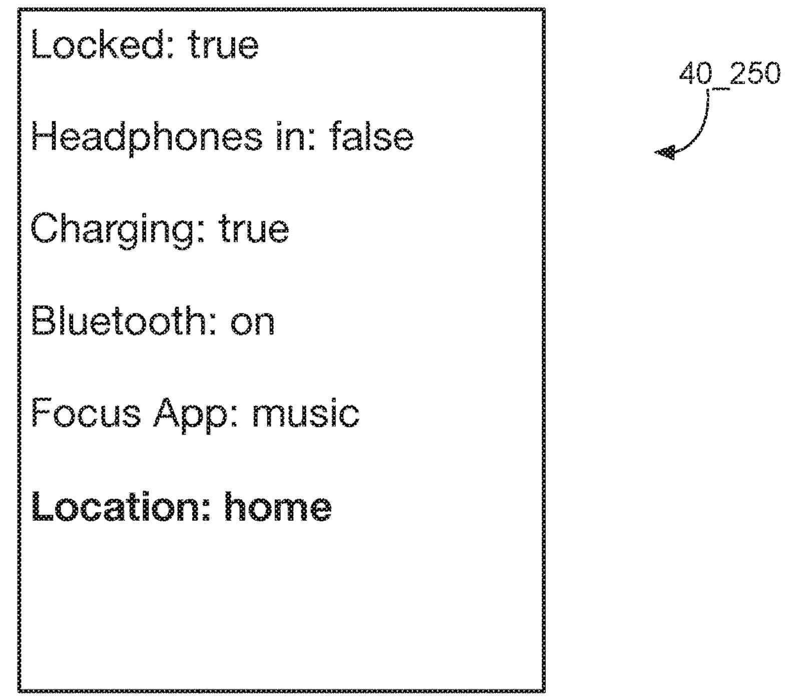
FIG. 40_2B

40_300

| | Request ID | Client ID | Predicate |
|---|---|---|---|
| 40_302 | 1 | Client_ID1 | locked == true AND focus app == music |
| 40_304 | 2 | Client_ID2 | locked == false AND location == home |
| 40_306 | 3 | Client_ID3 | sleep == true AND before == 30 minutes |
| 40_308 | 4 | Client_ID4 | locked == false AND charging == true |
| 40_310 | 5 | Client_ID5 | wake == true AND after == 5 minutes |
| 40_312 | 6 | Client_ID6 | sleep == true AND after == 10 minutes |
| 40_314 | 7 | Client_ID7 | location == home OR location == work |
| 40_316 | 8 | Client_ID7 | meeting == true AND before == 30 minutes |

FIG. 40_3

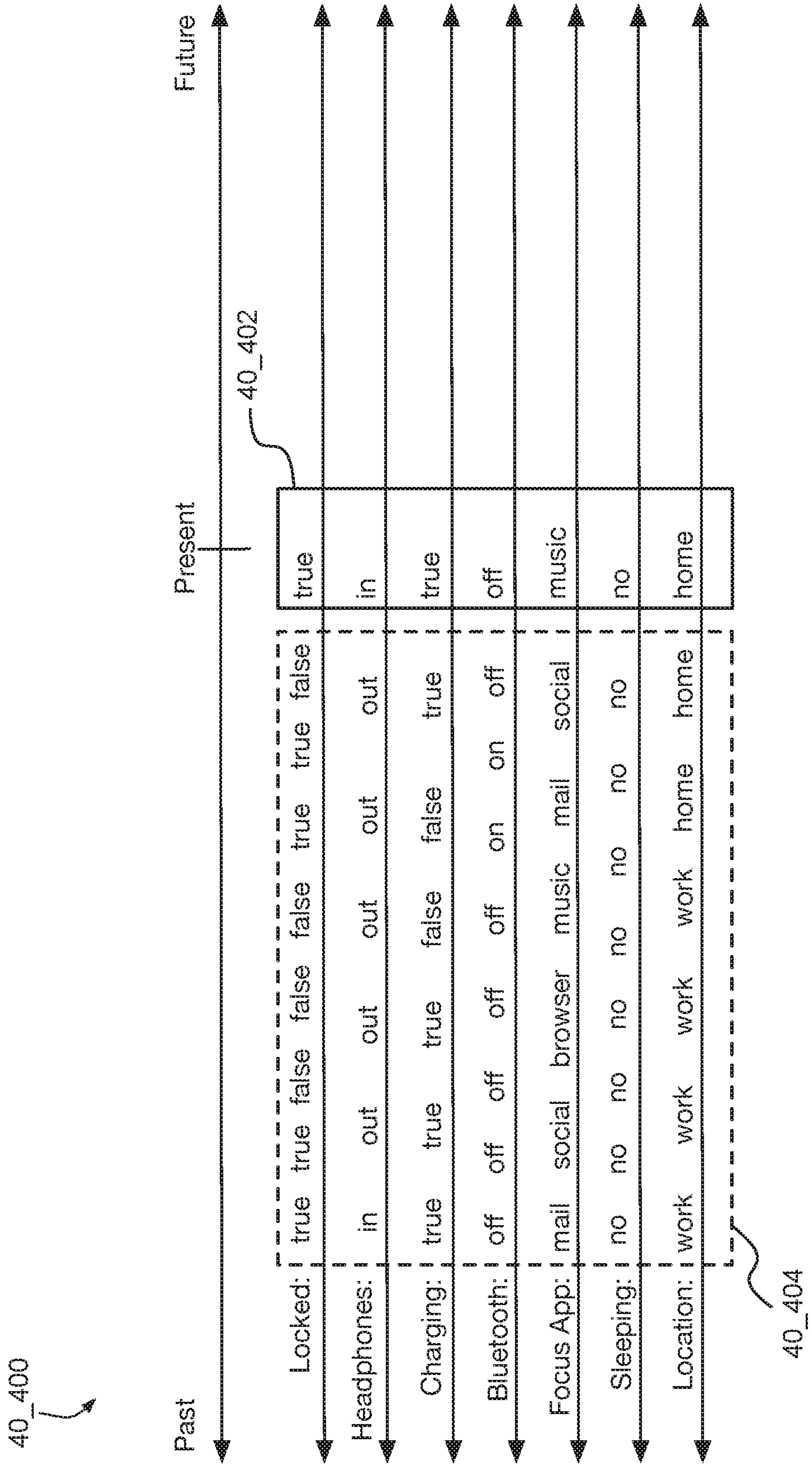
FIG. 40_4

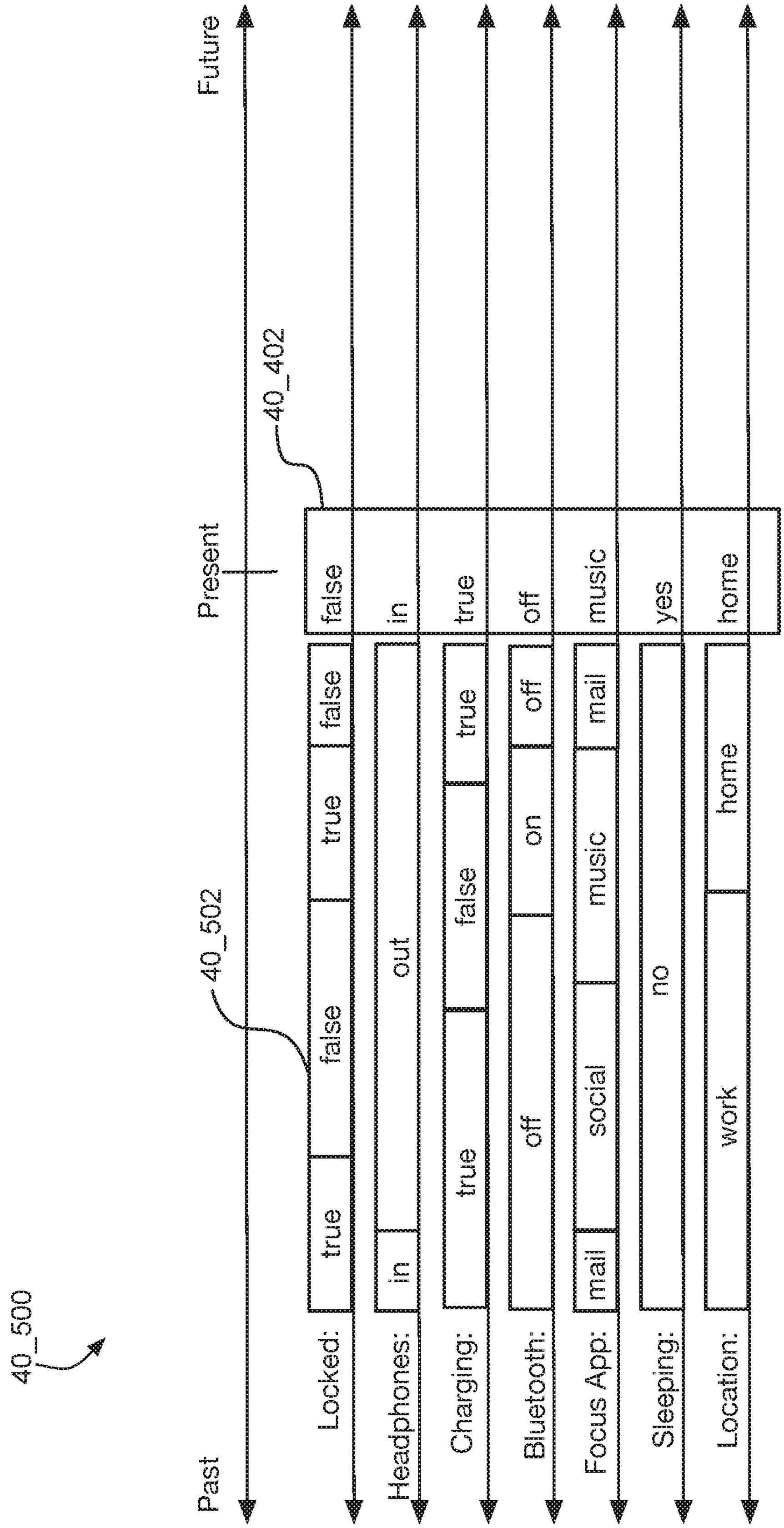
FIG. 40_5

40_600

| Event Stream | Event Metadata | | |
|---|---|---|---|
| Locked | start:TS; duration:D; locked:true | start:TS; duration:D; locked:false | |
| Headphones | start:TS; duration:D; | start:TS; duration:D; | start:TS; duration:D; |
| Charging | start:TS; duration:D; charging:yes; beginLevel:5%; endLevel:90% | | |
| Bluetooth | start:TS; duration:D; BT:on; type:speaker; mediaSource:music | | |
| Focus App | start:TS; duration:D; name:social | start:TS; duration:D; name:music | |
| Location | start:TS; duration:D; name:home | start:TS; duration:D; name:work | |
| Sleeping | start:TS; duration:D | start:TS; duration:D | start:TS; duration:D |

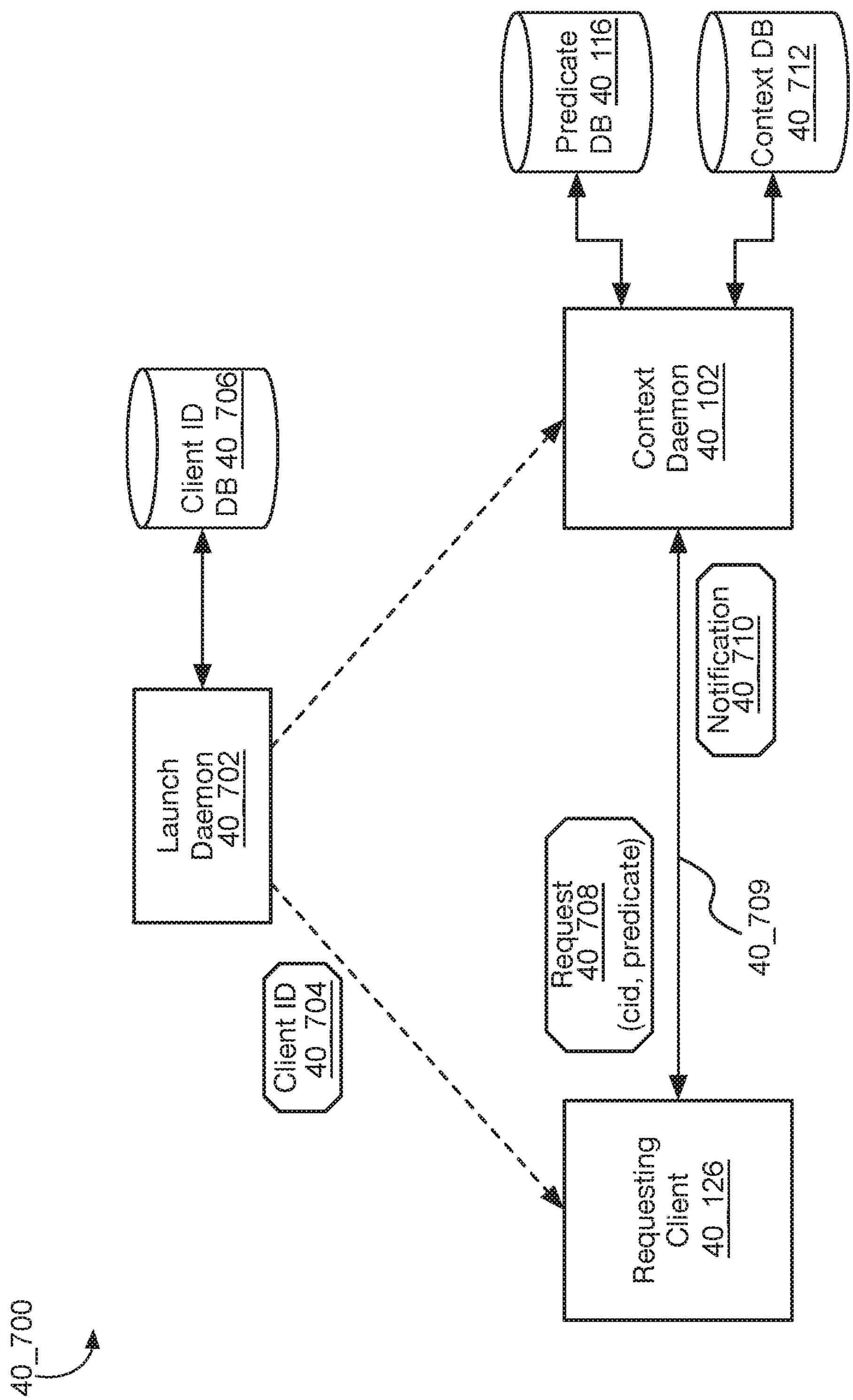
FIG. 40_7

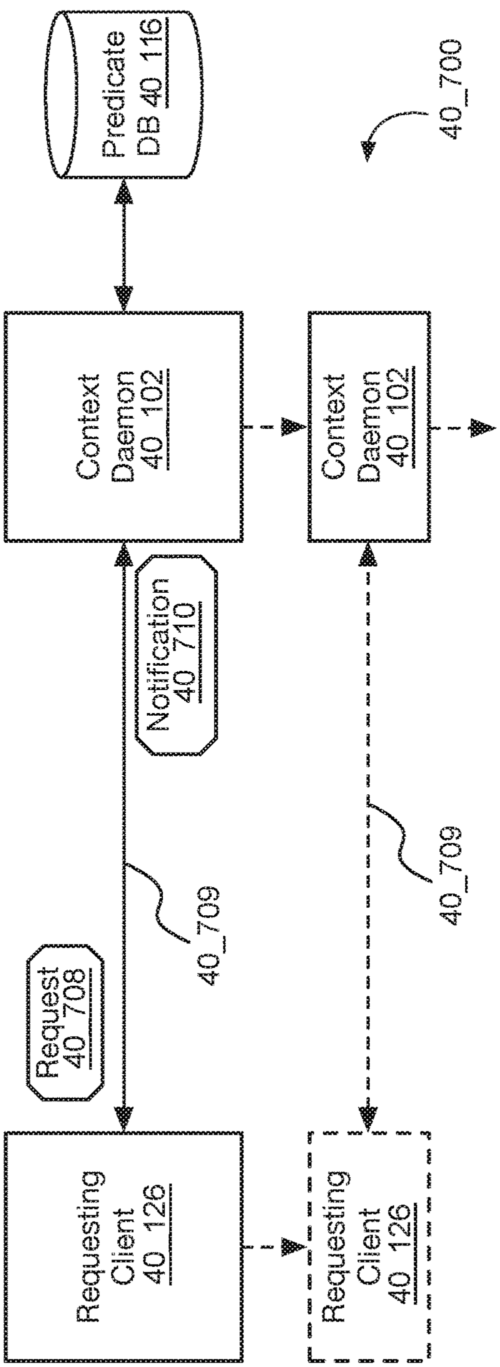
FIG. 40_8A
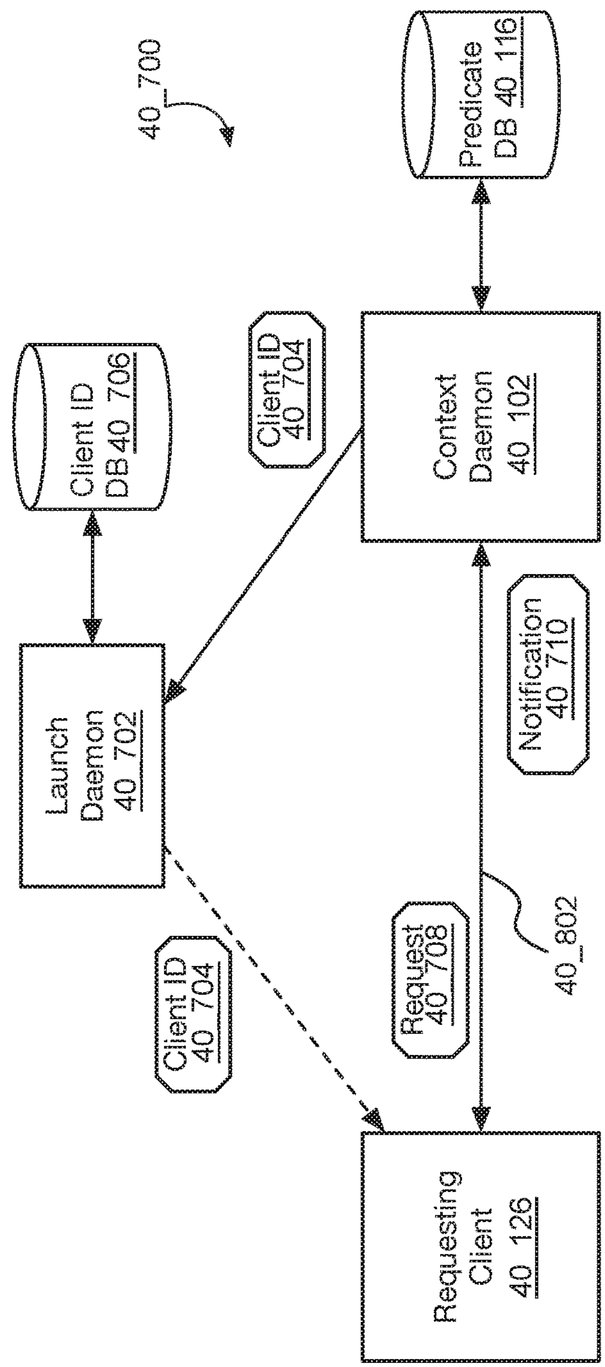
FIG. 40_8B

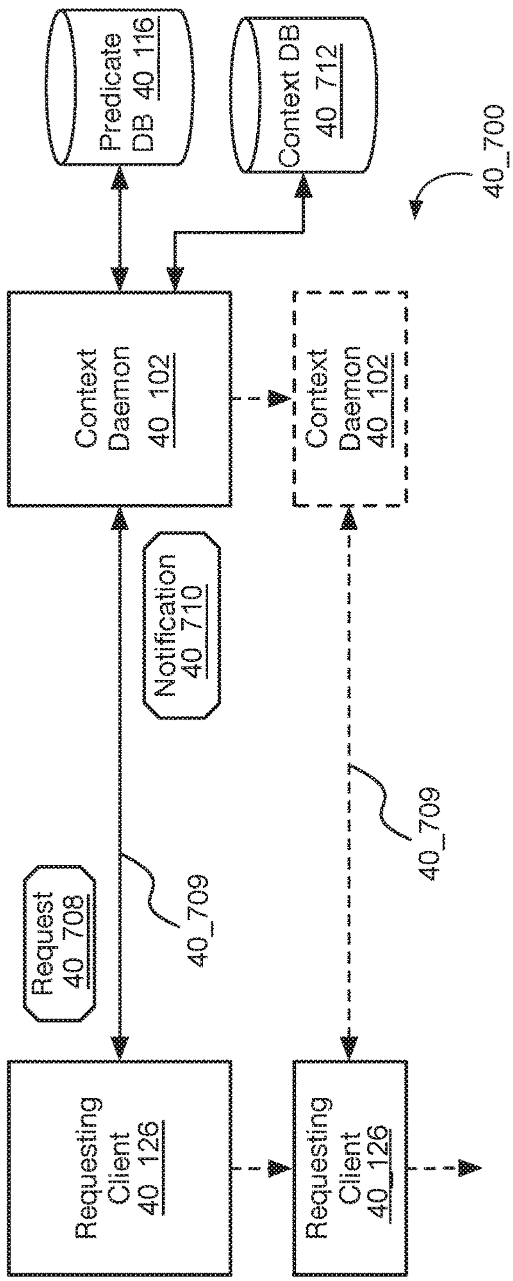
FIG. 40_9A
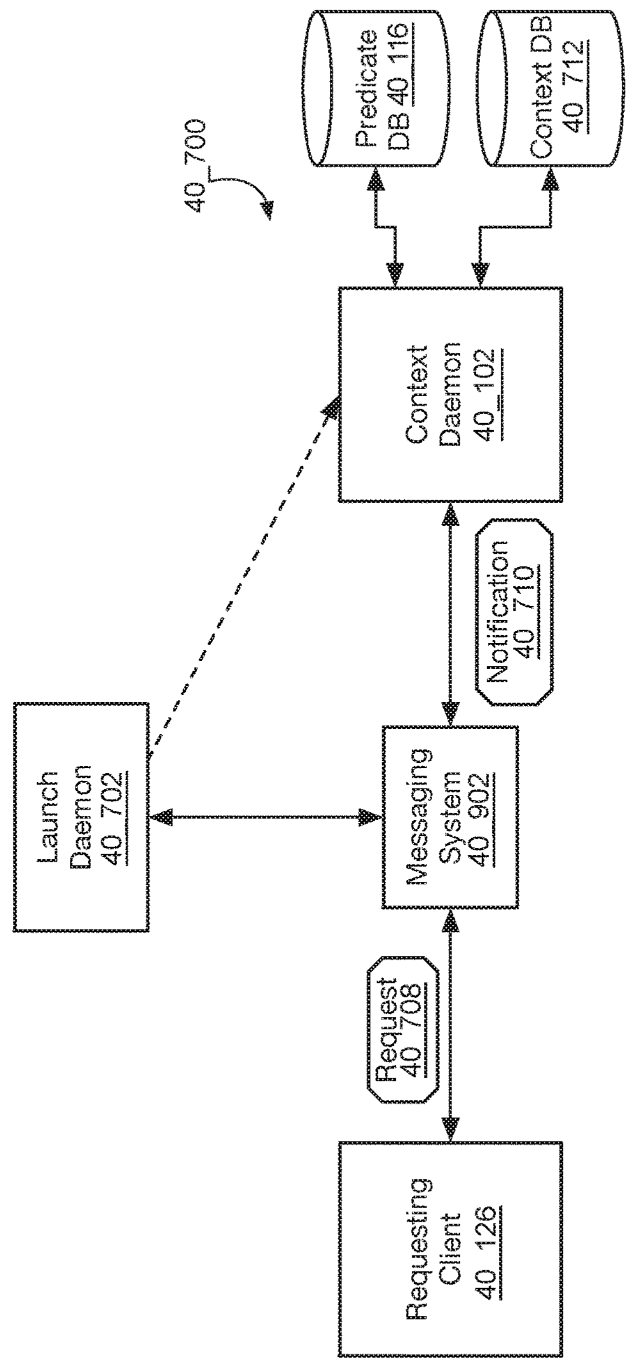
FIG. 40_9B

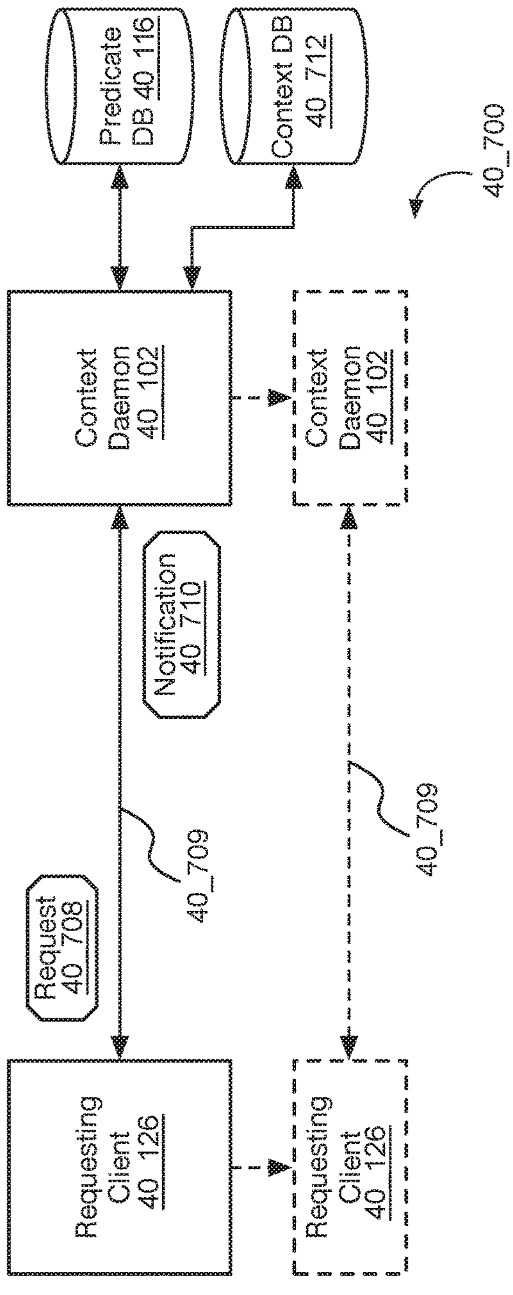
FIG. 40_10A
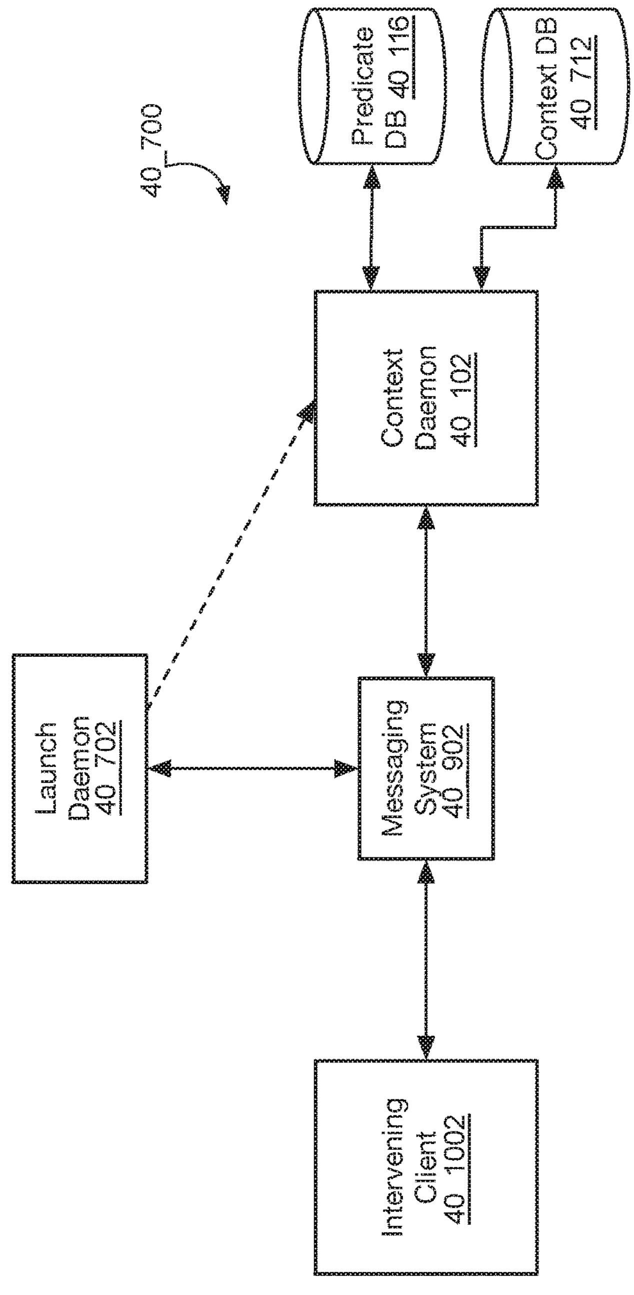
FIG. 40_10B

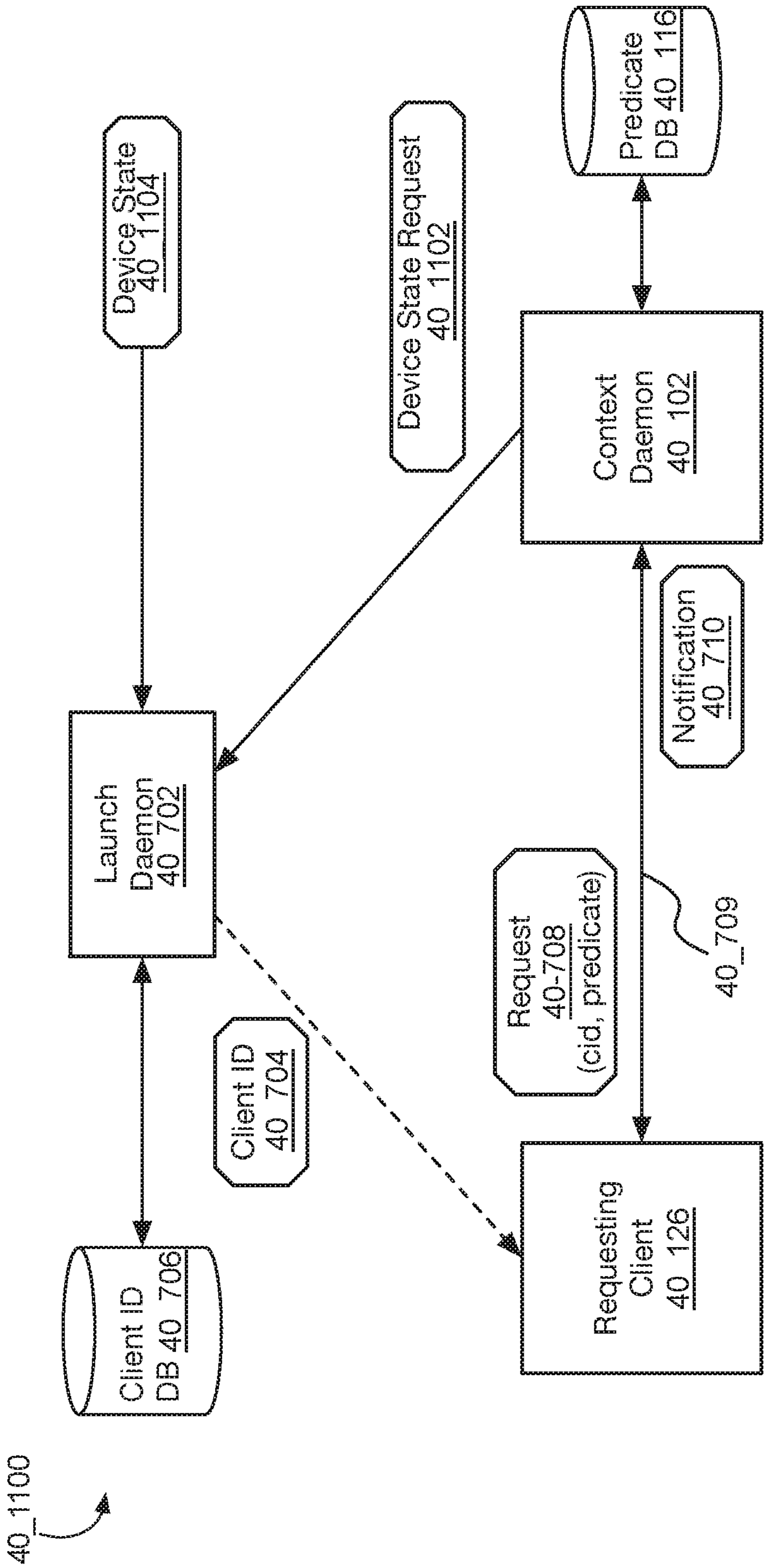
FIG. 40_11

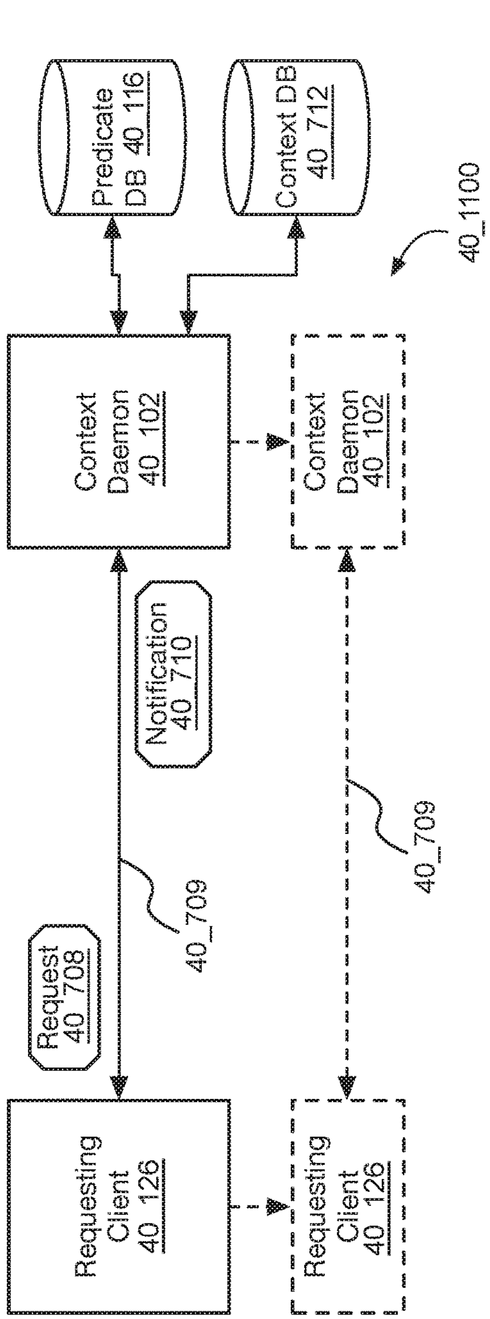
FIG. 40_12A
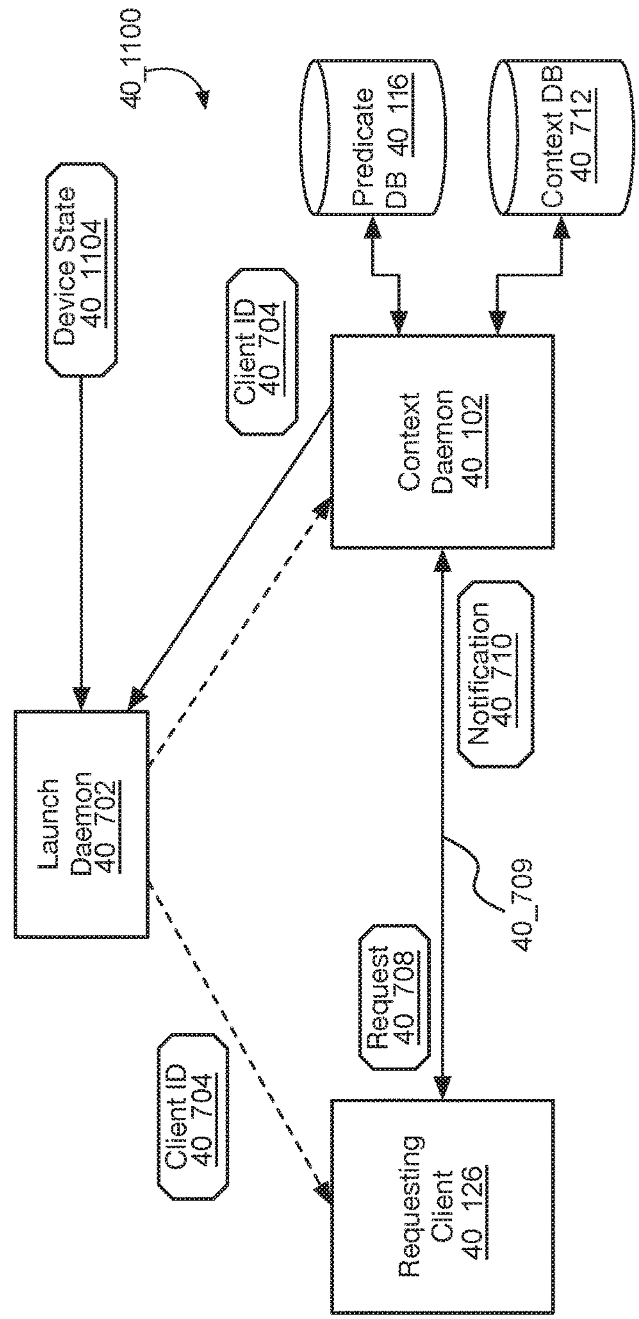
FIG. 40_12B

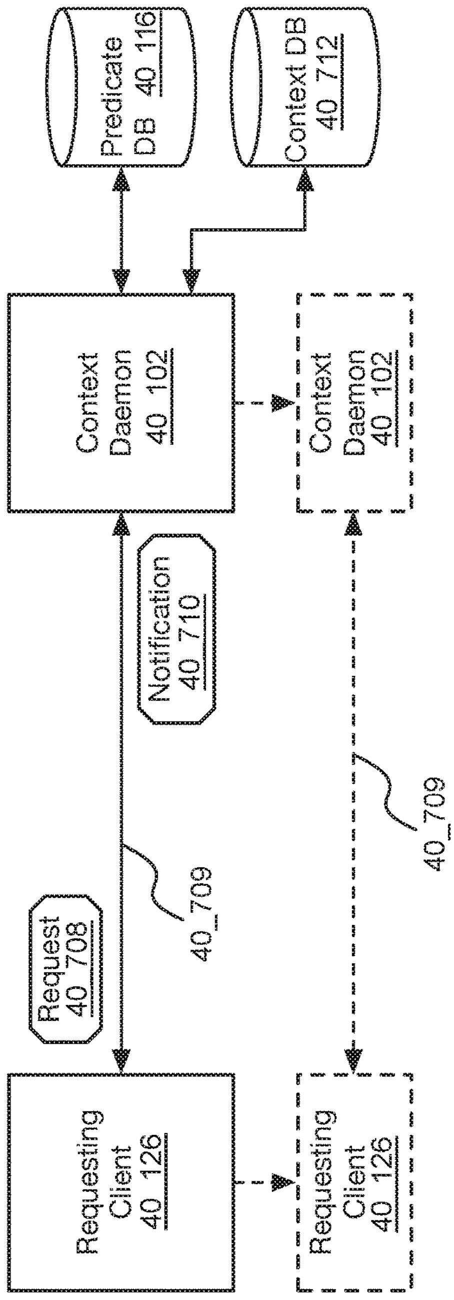
FIG. 40_13A
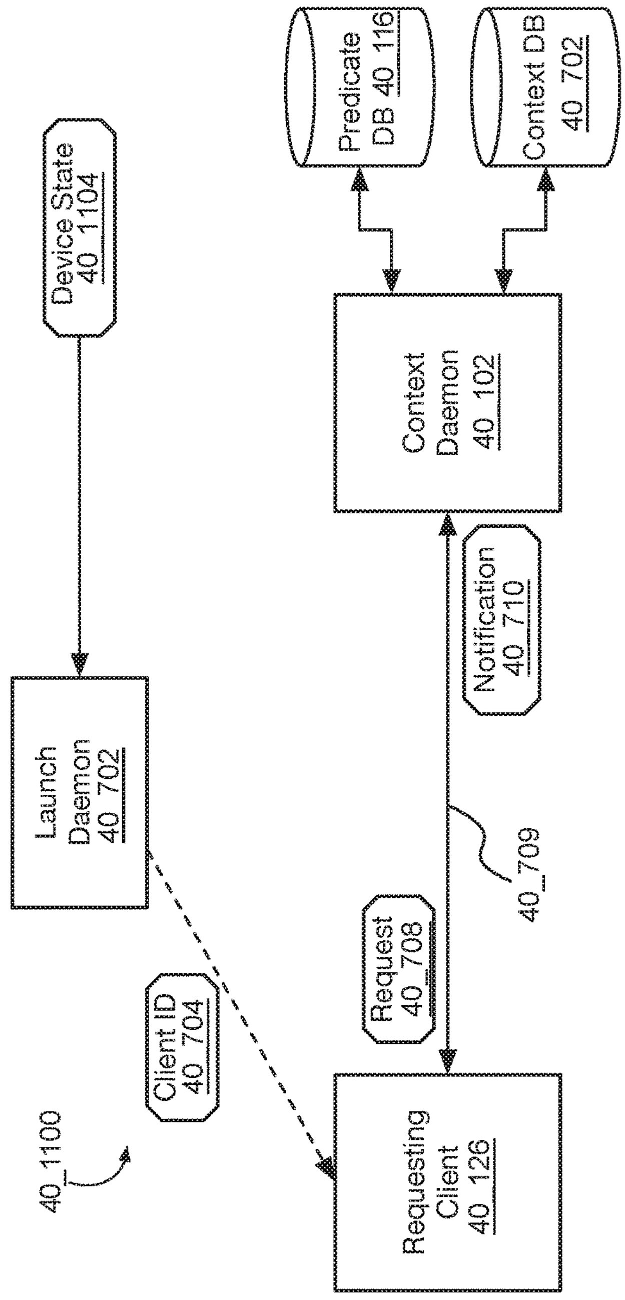
FIG. 40_13B

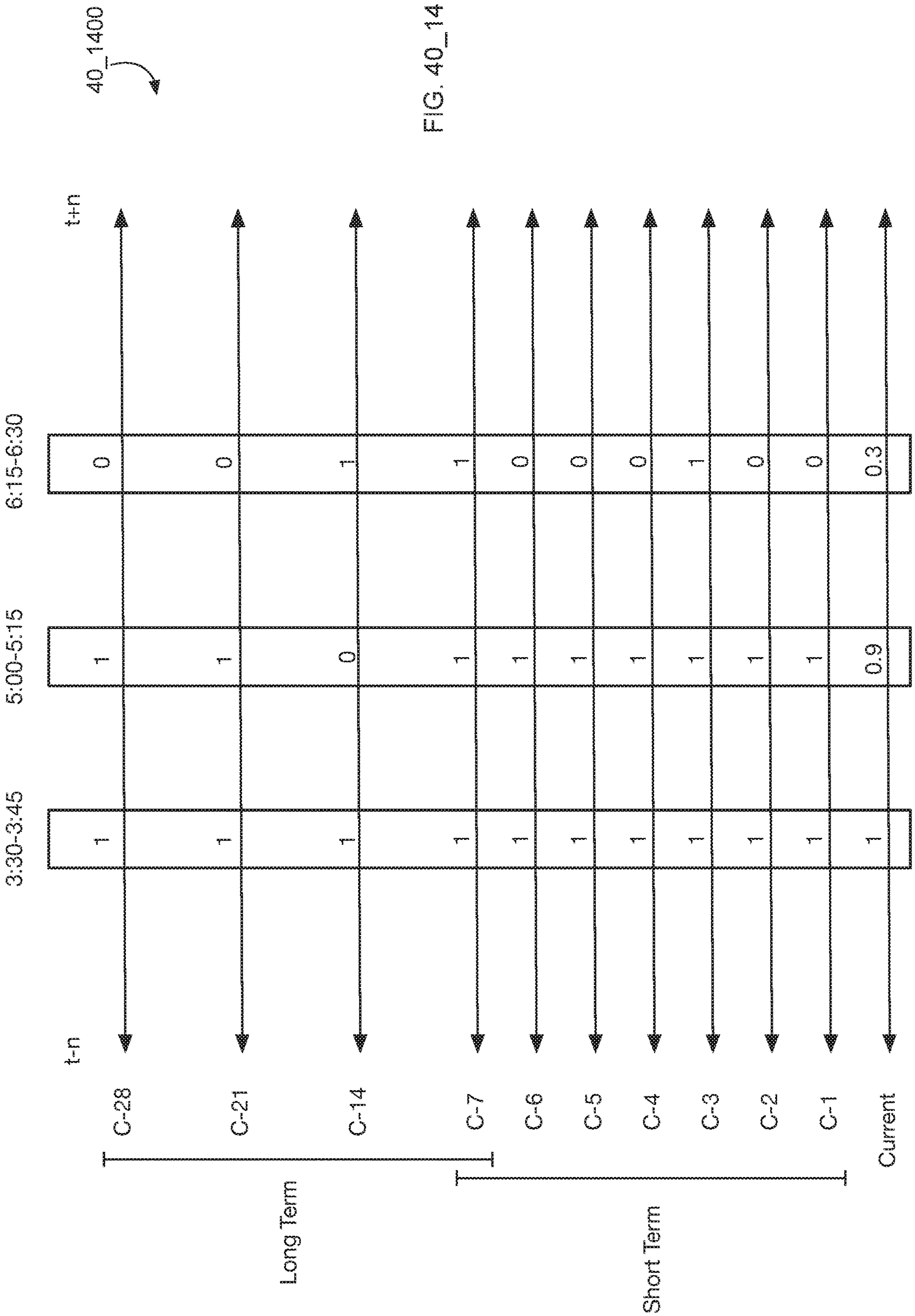
FIG. 40_14

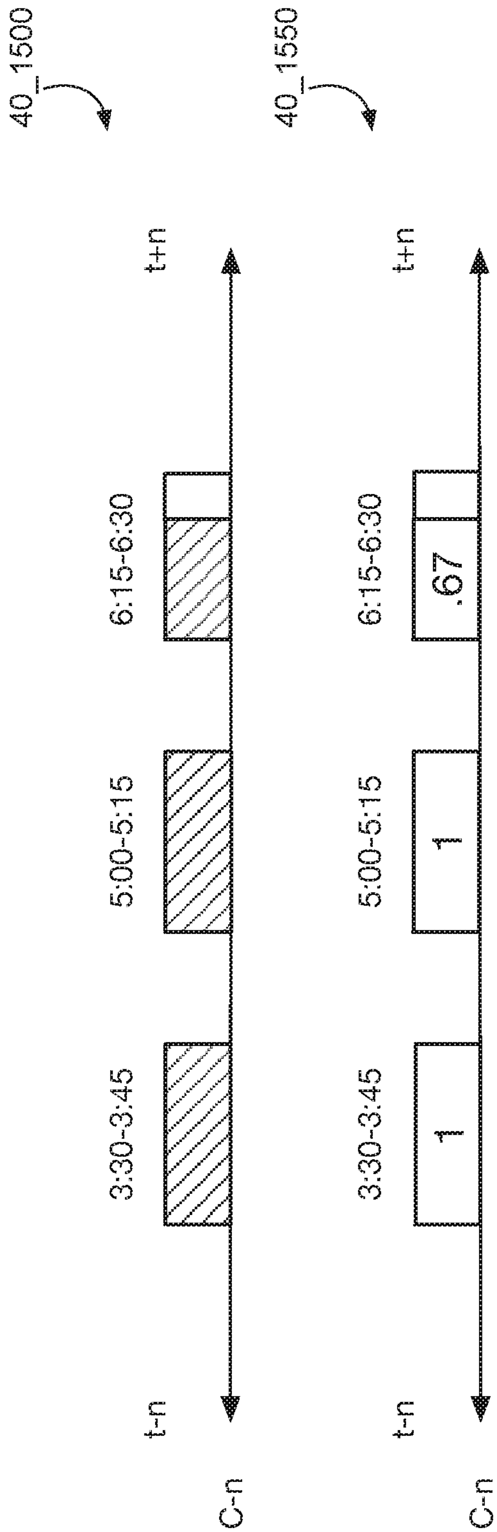
FIG. 40_15

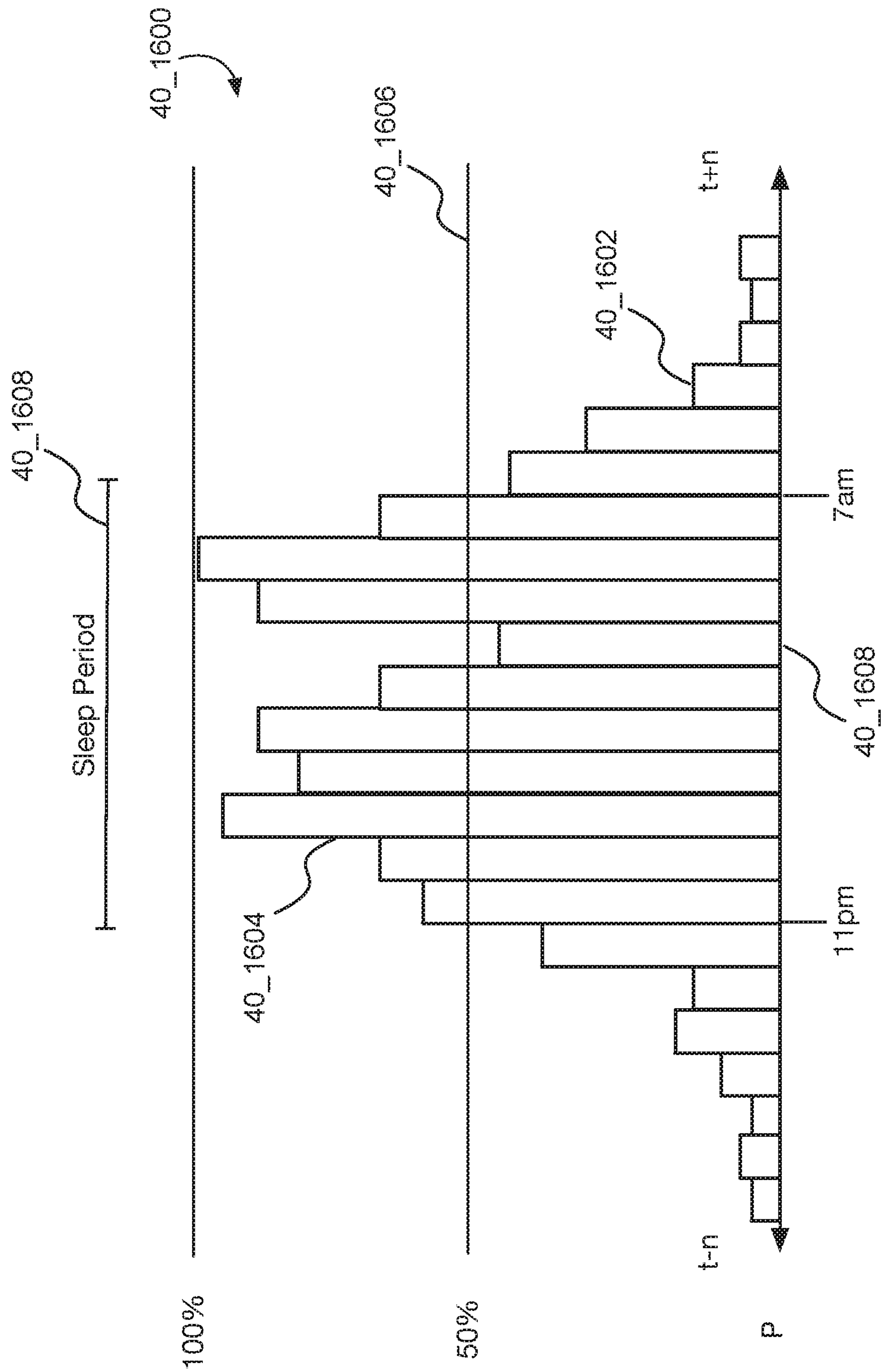
FIG. 40_16A

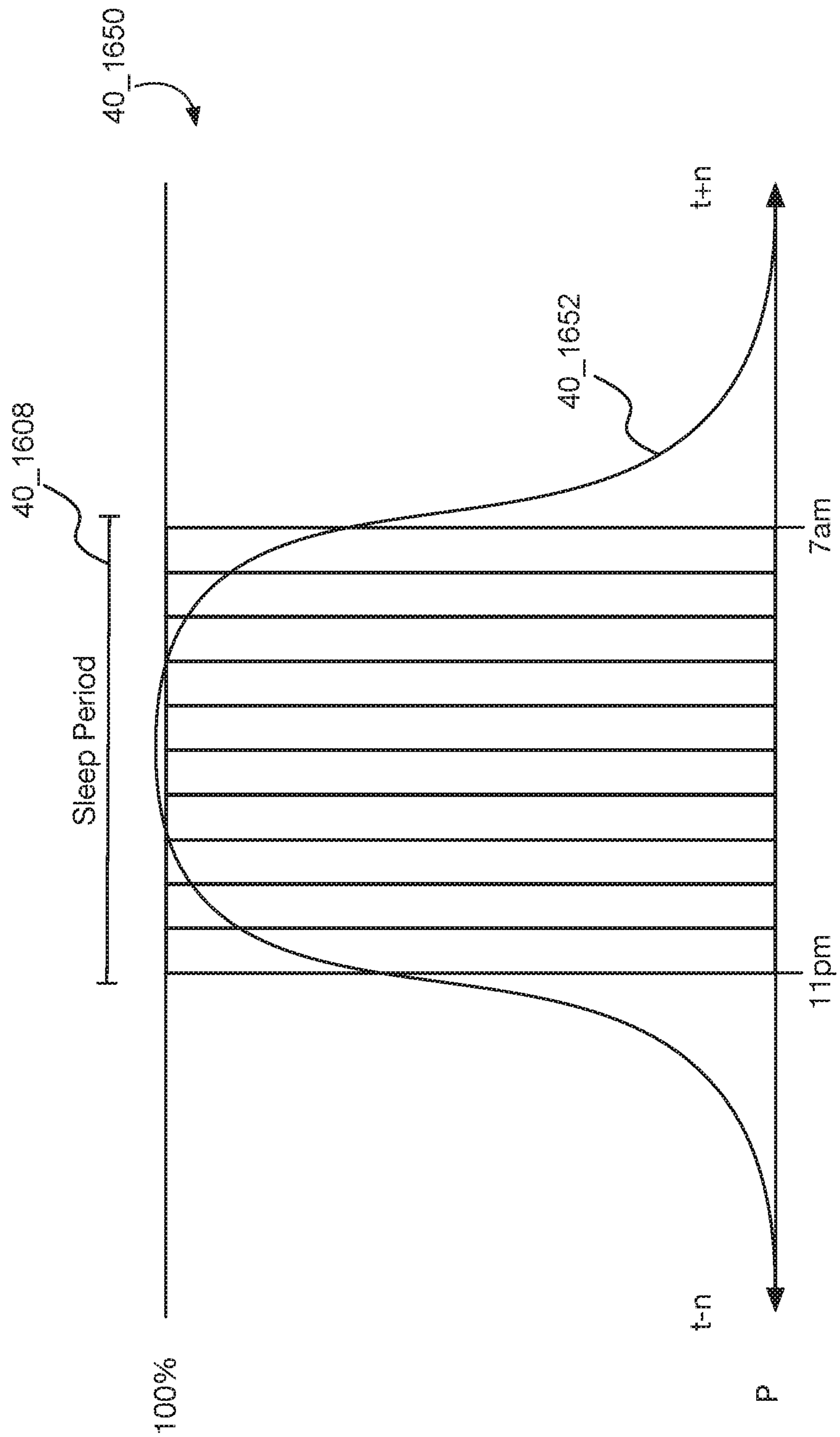
FIG. 40_16B

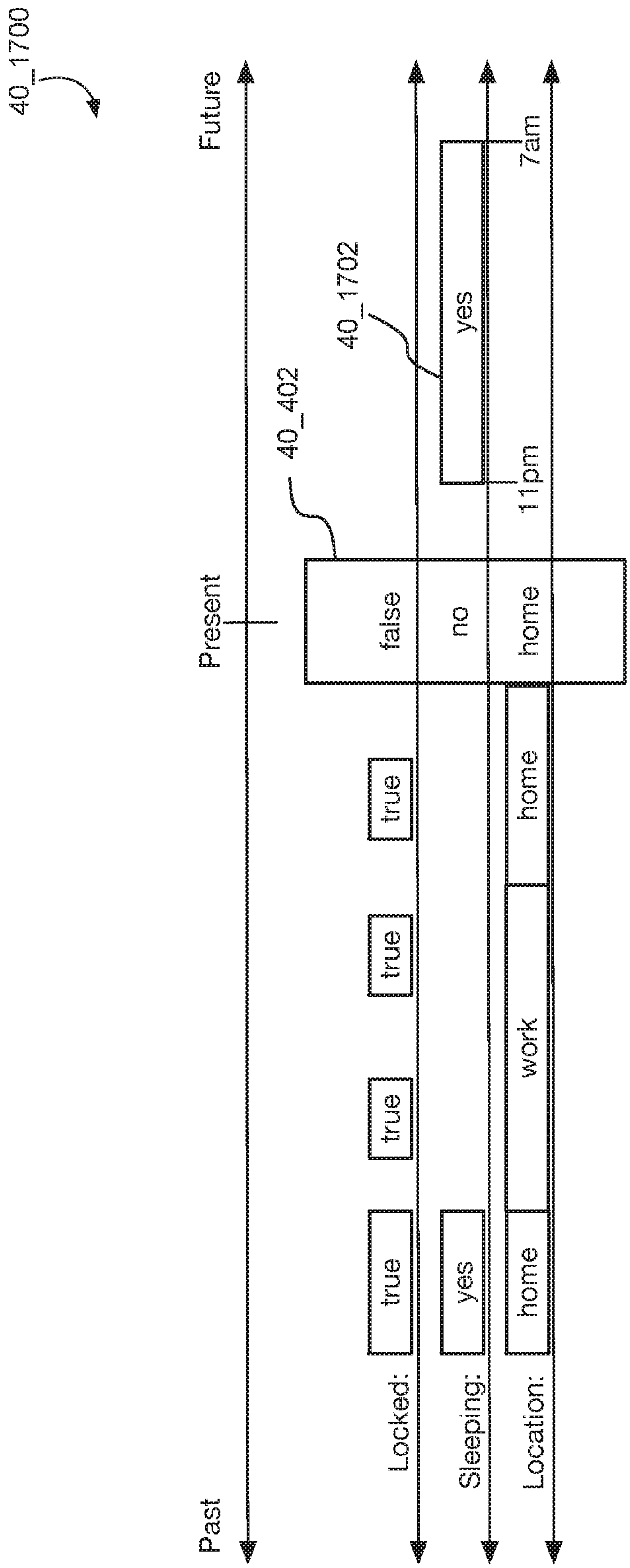
FIG. 40_17

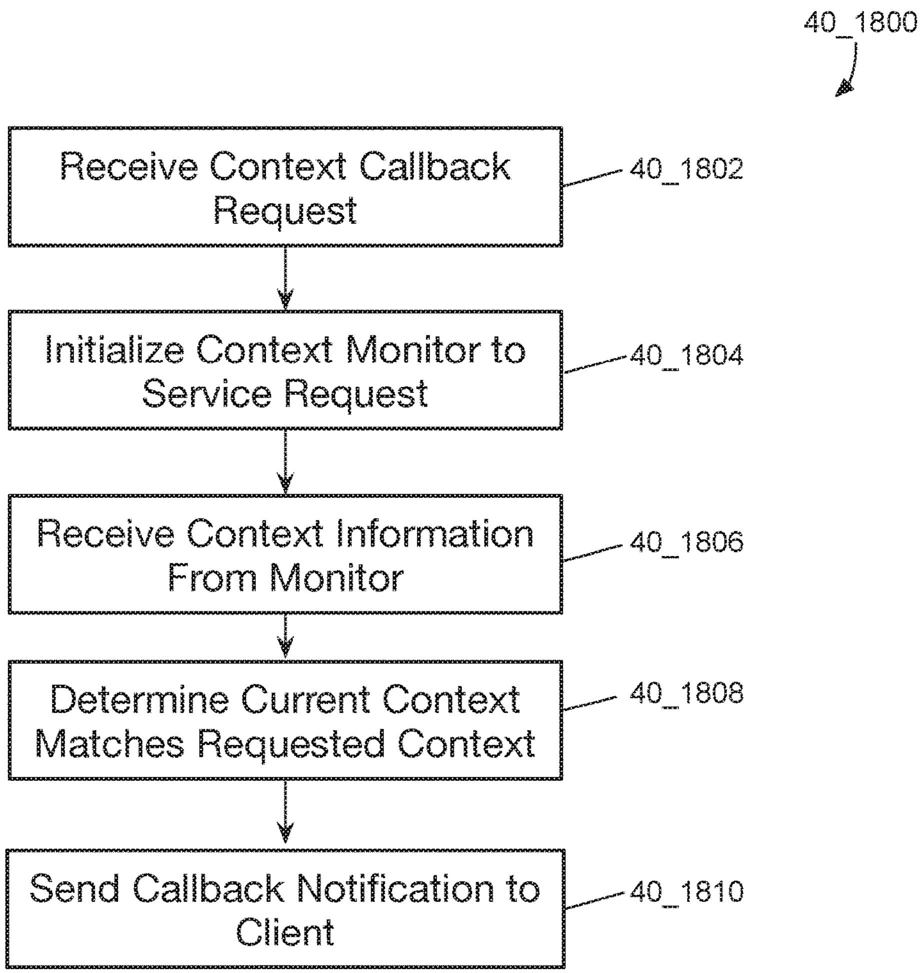
FIG. 40_18

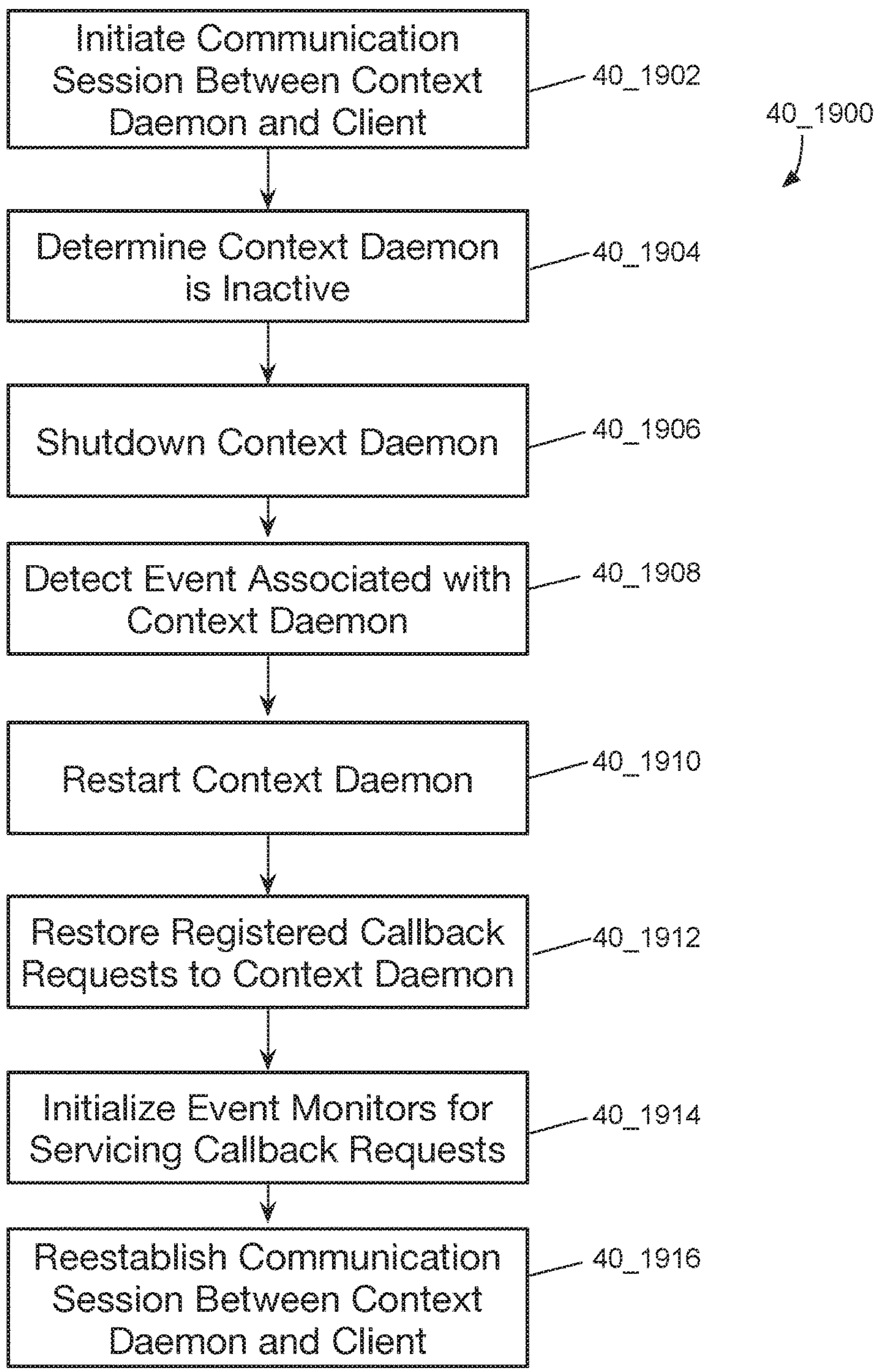
FIG. 40_19

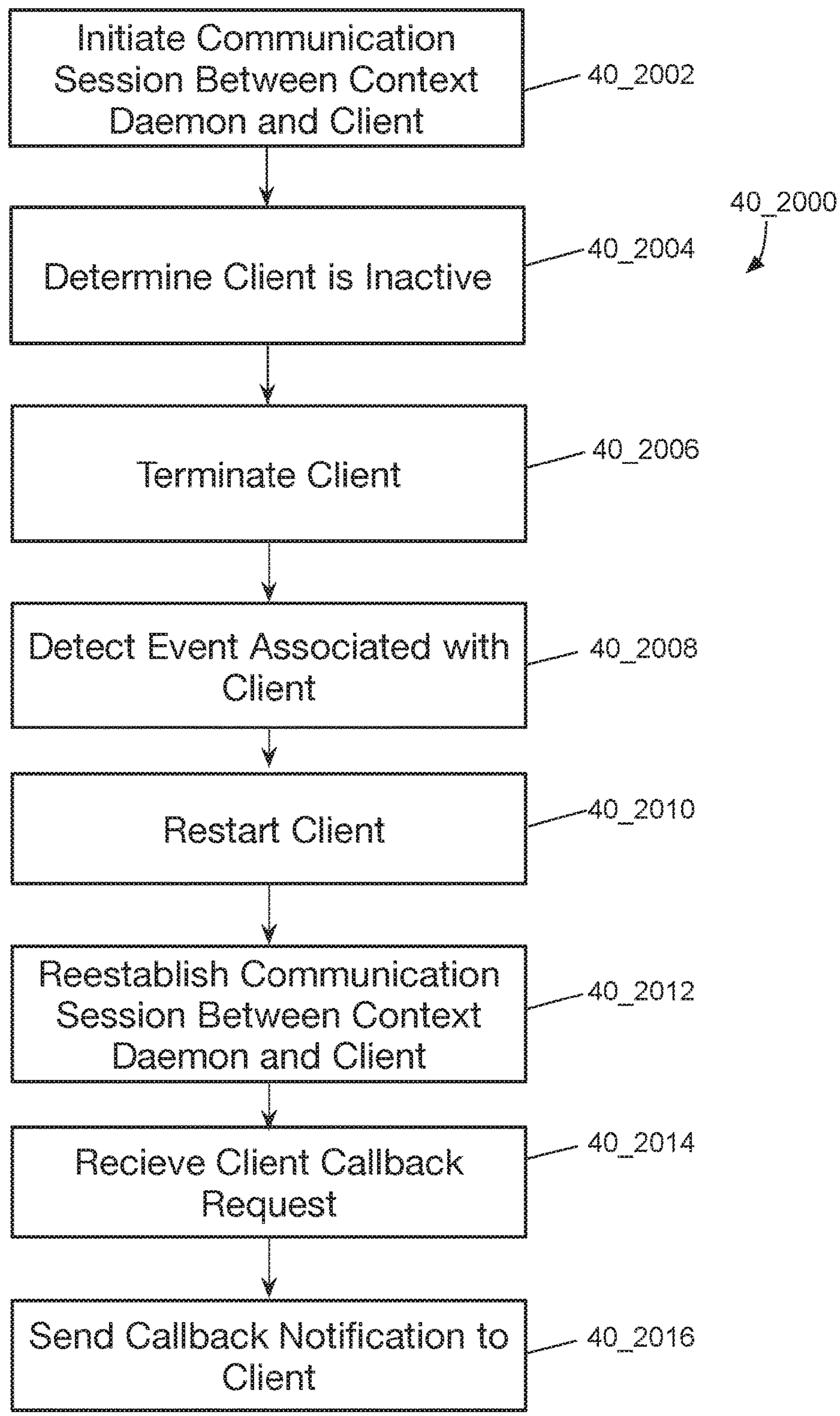
FIG. 40_20

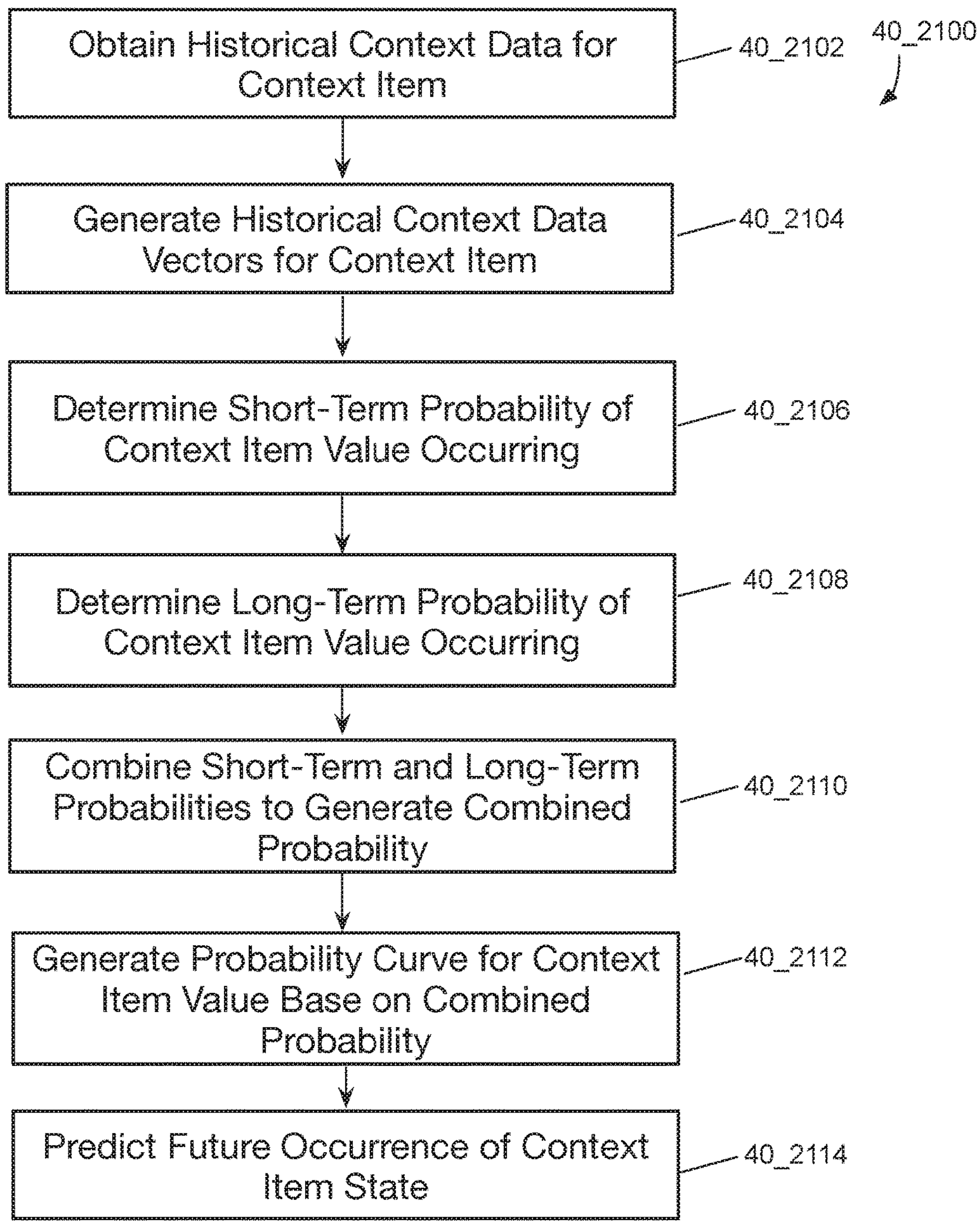
FIG. 40_21

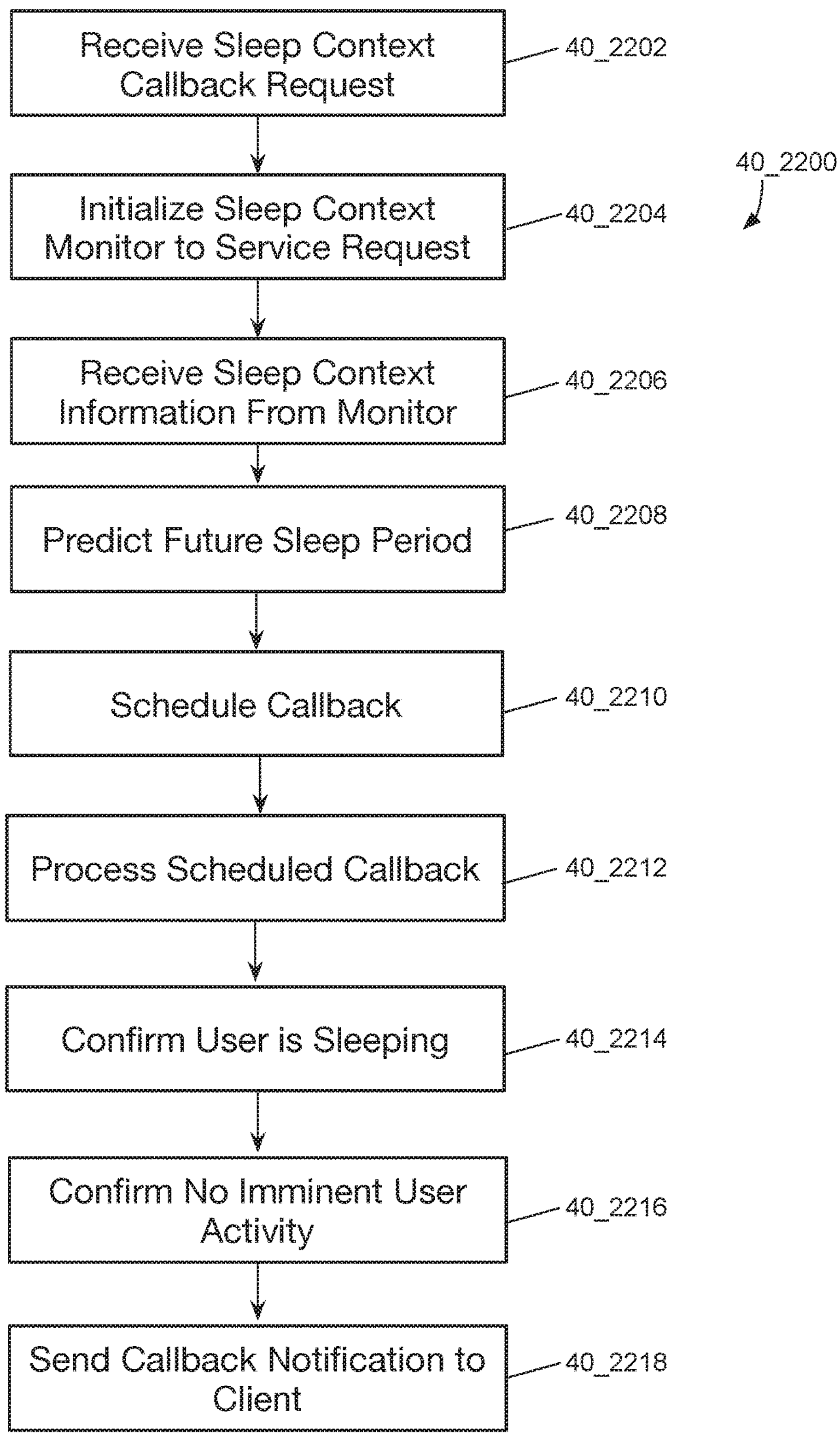
FIG. 40_22

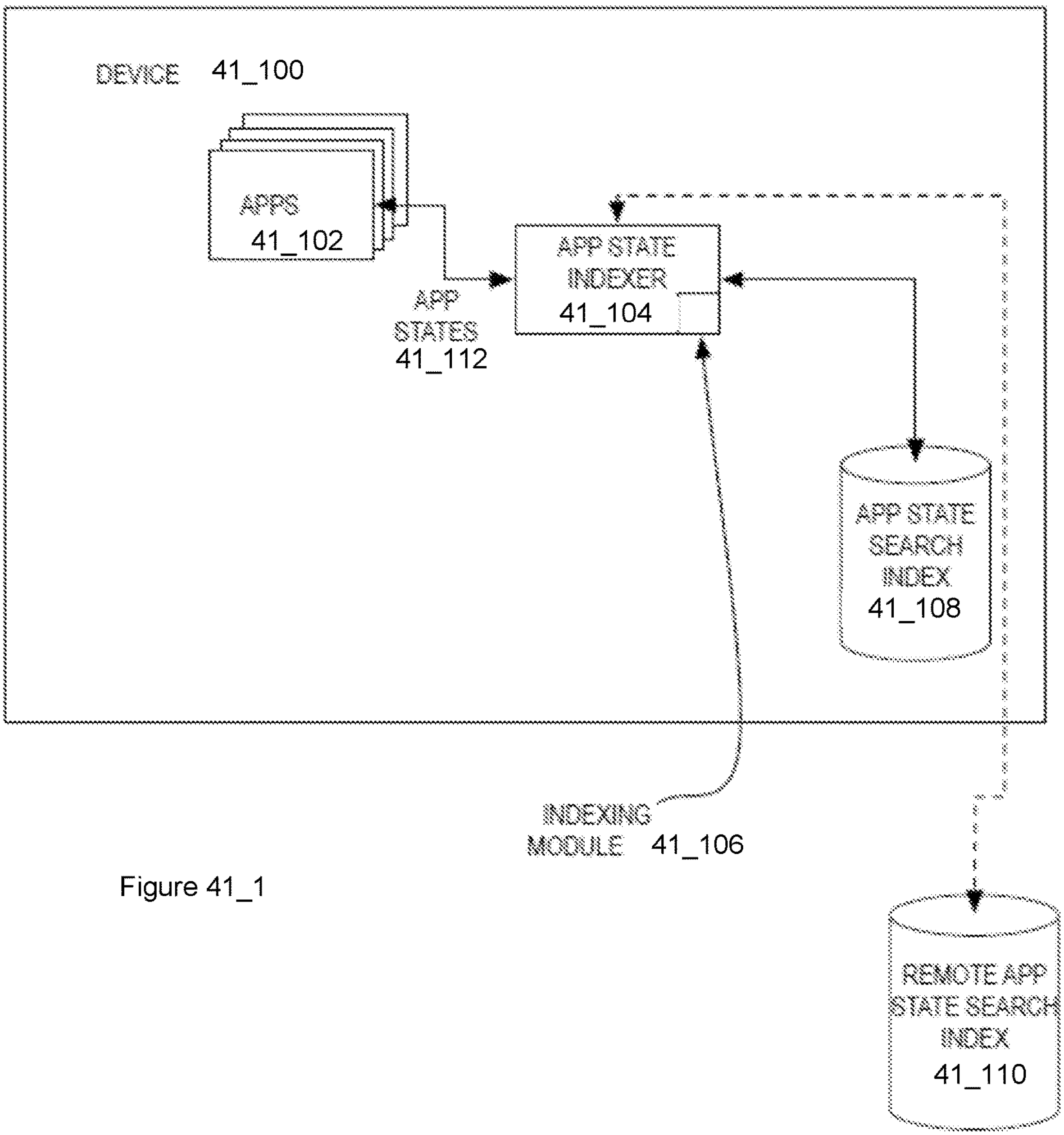
Figure 41_1

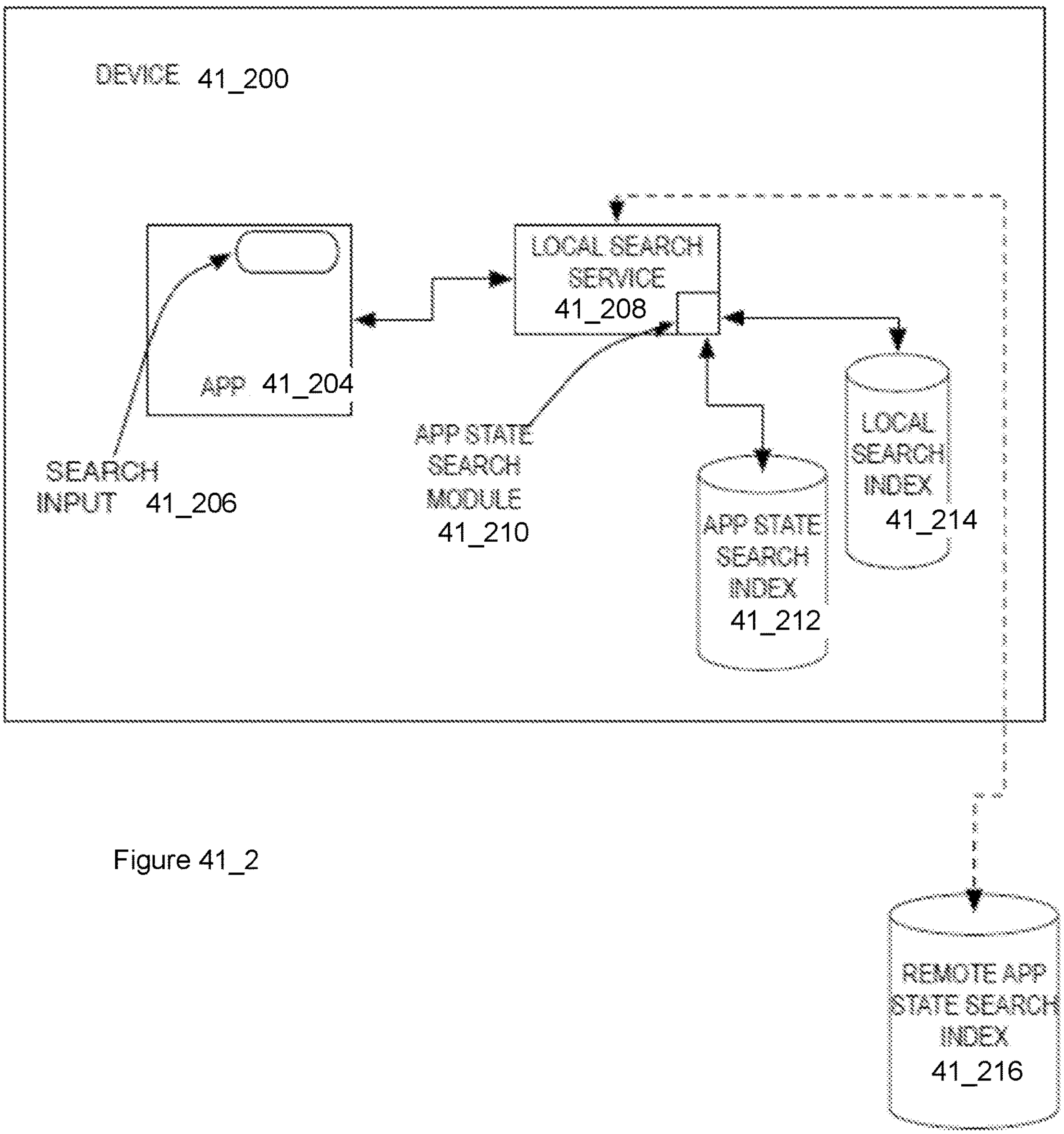
Figure 41_2

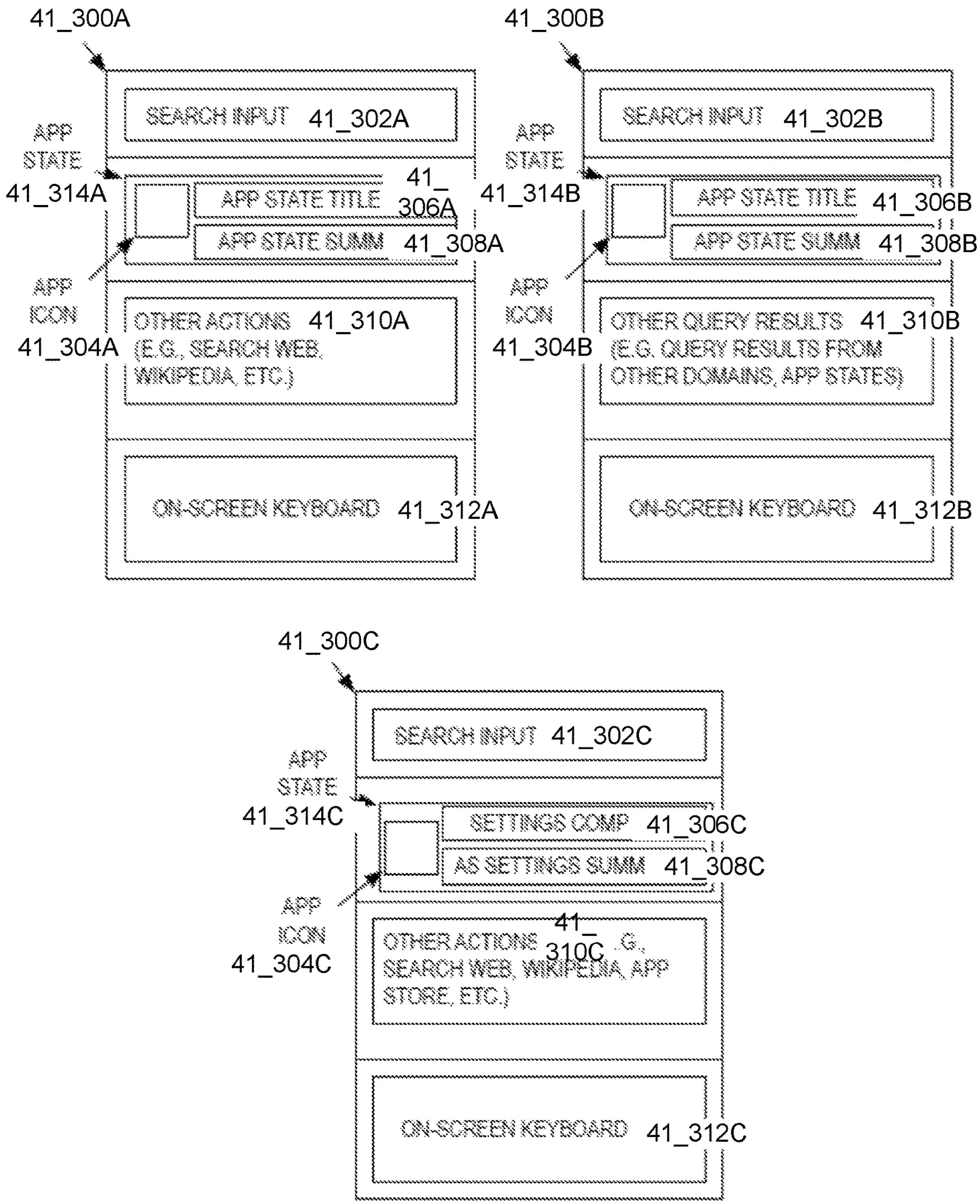
Figure 41_3

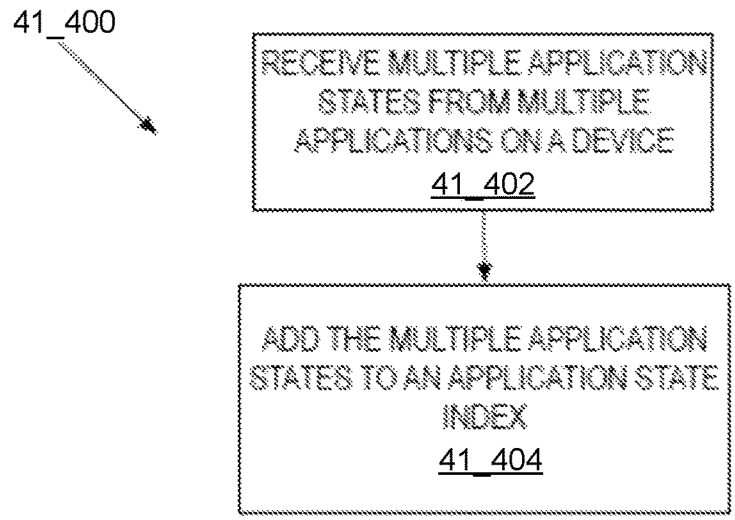
Figure 41_4A
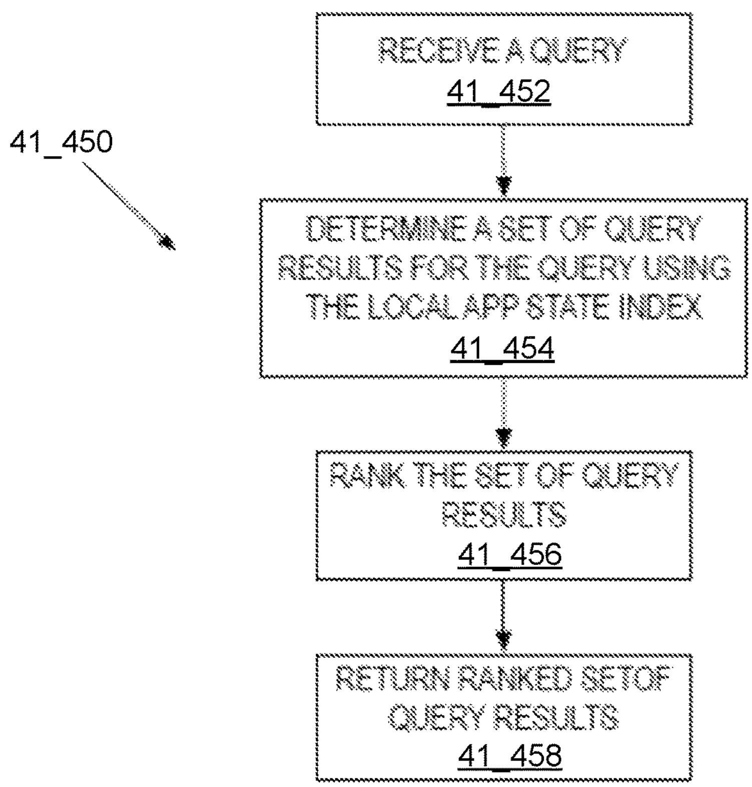
Figure 41_4B

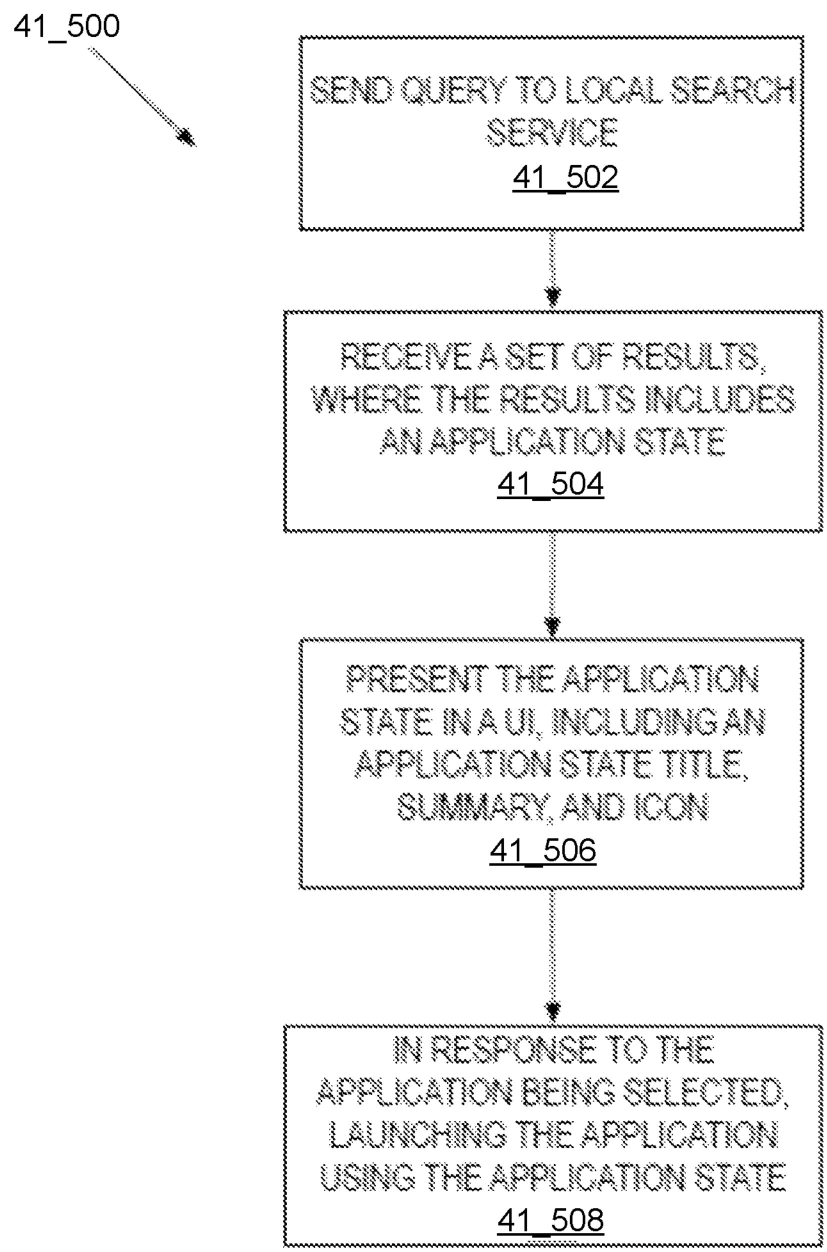
Figure 41_5

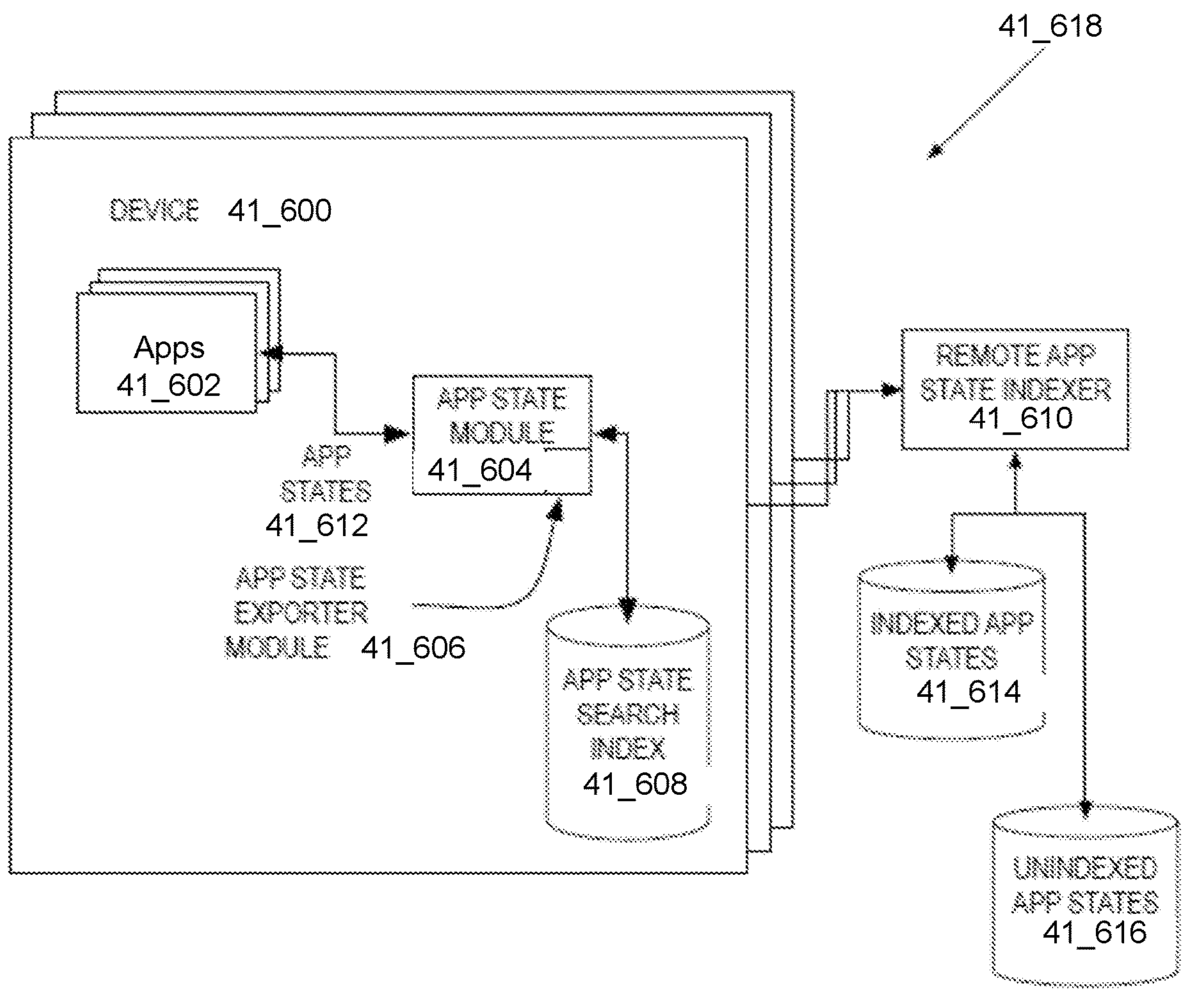
Figure 41_6

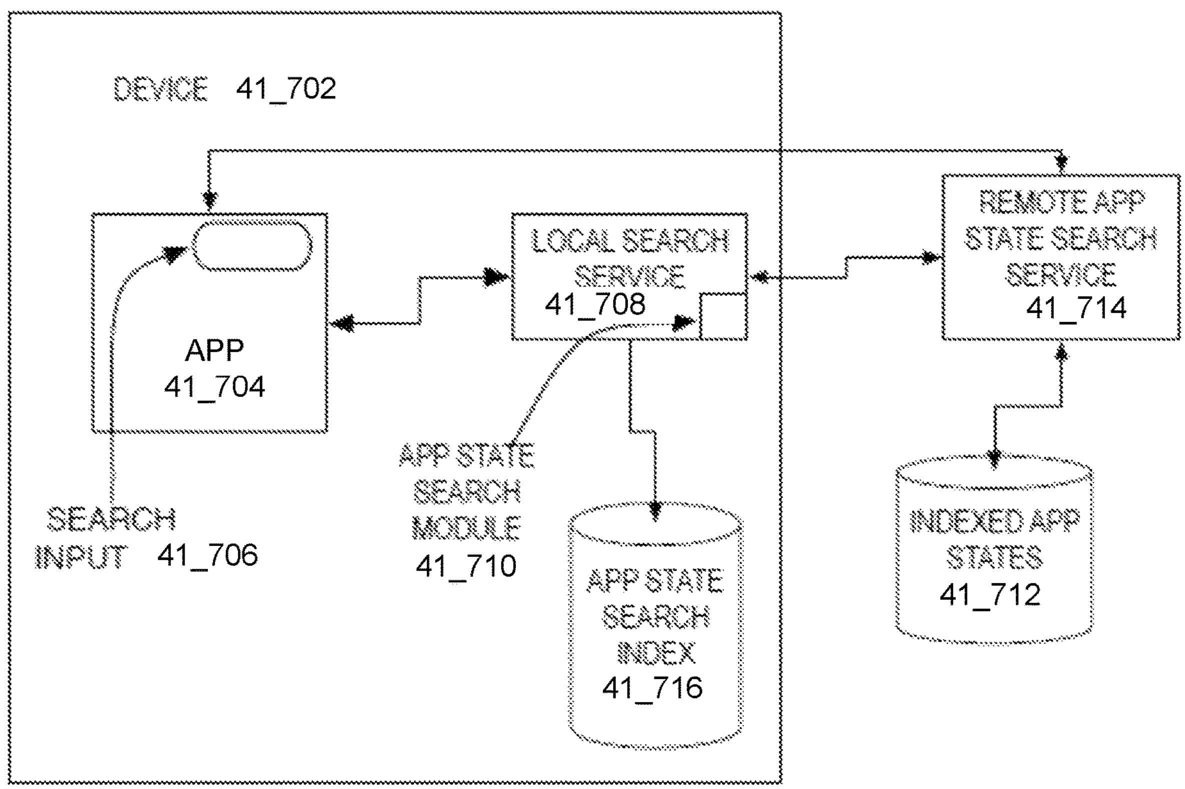
Figure 41_7

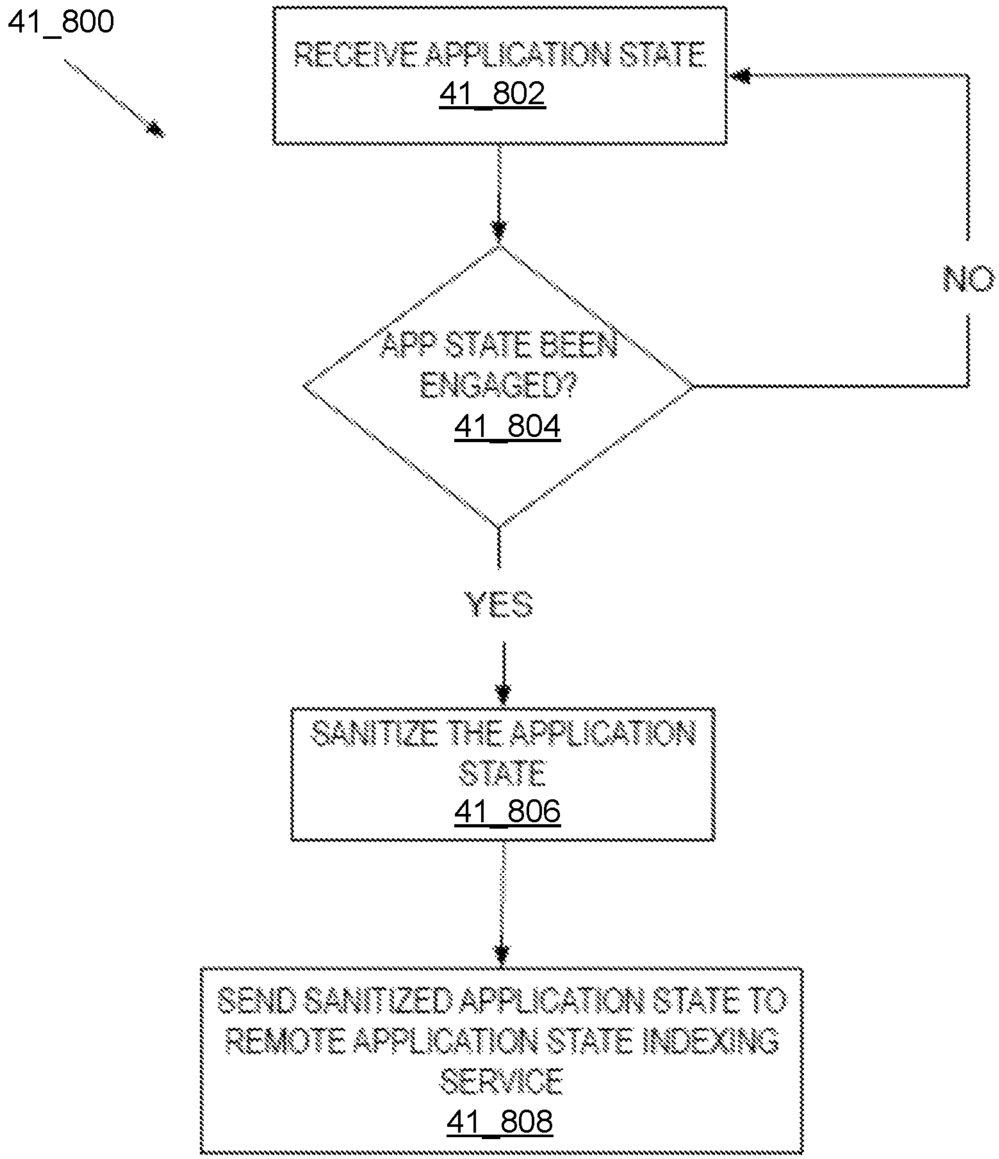
Figure 41_8

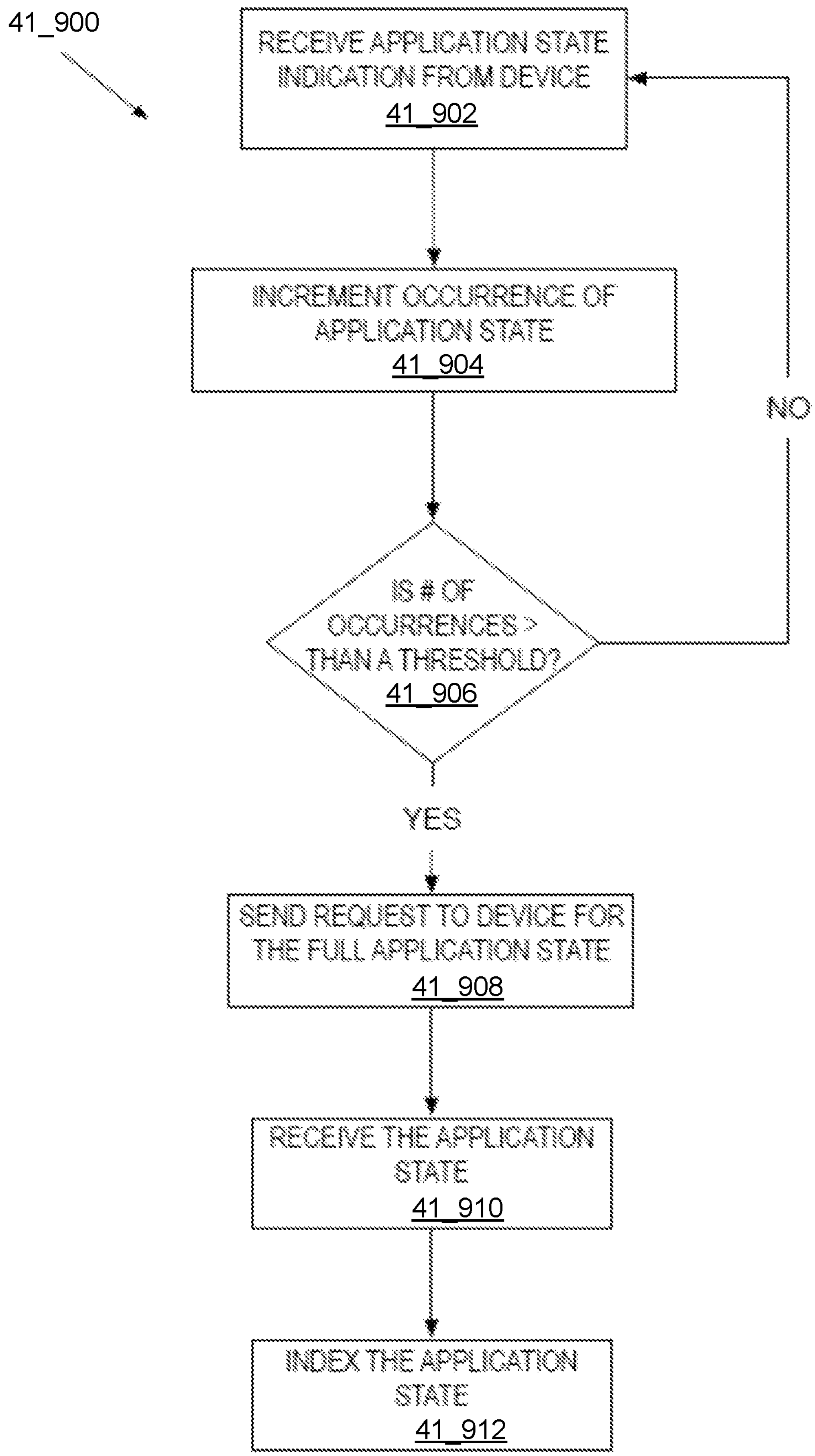
Figure 41_9

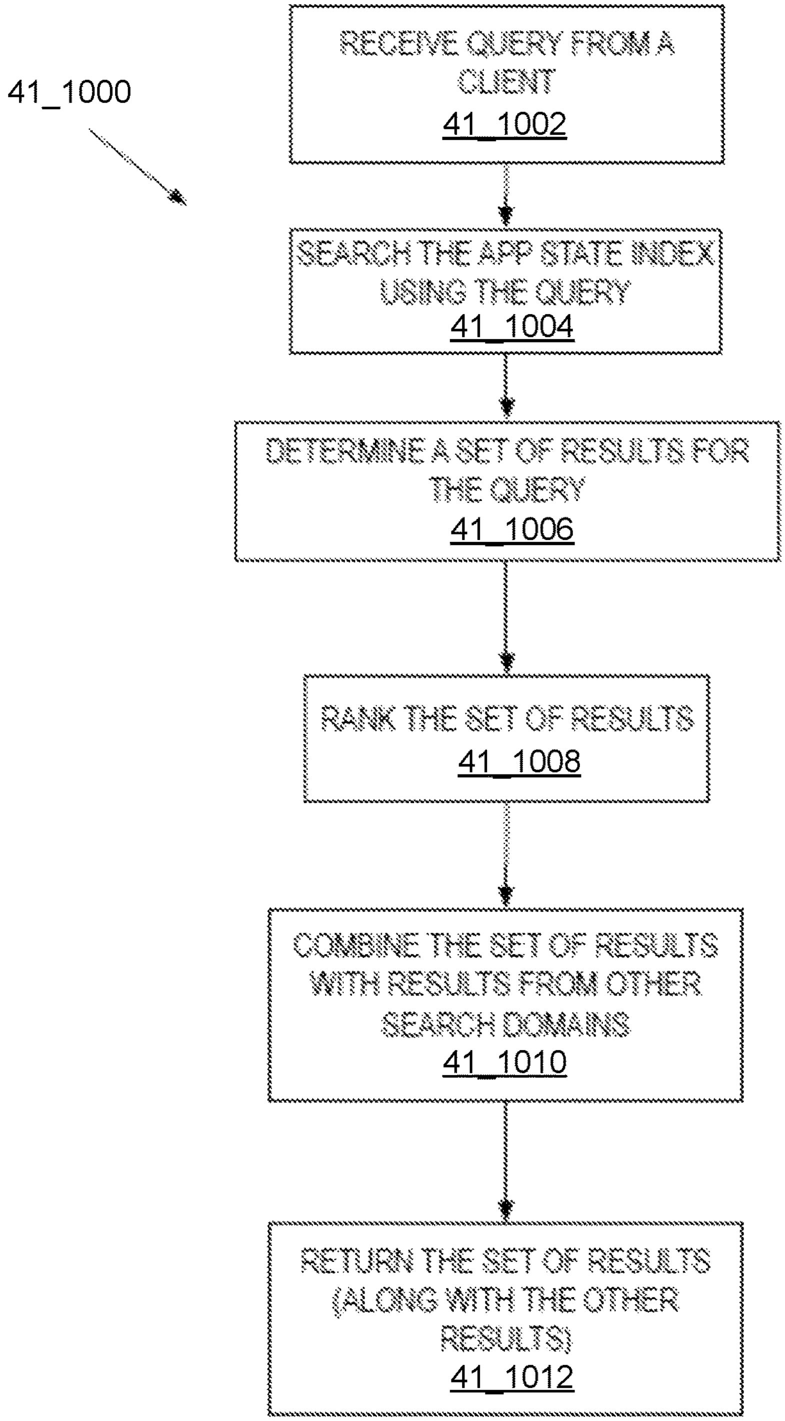
Figure 41_10

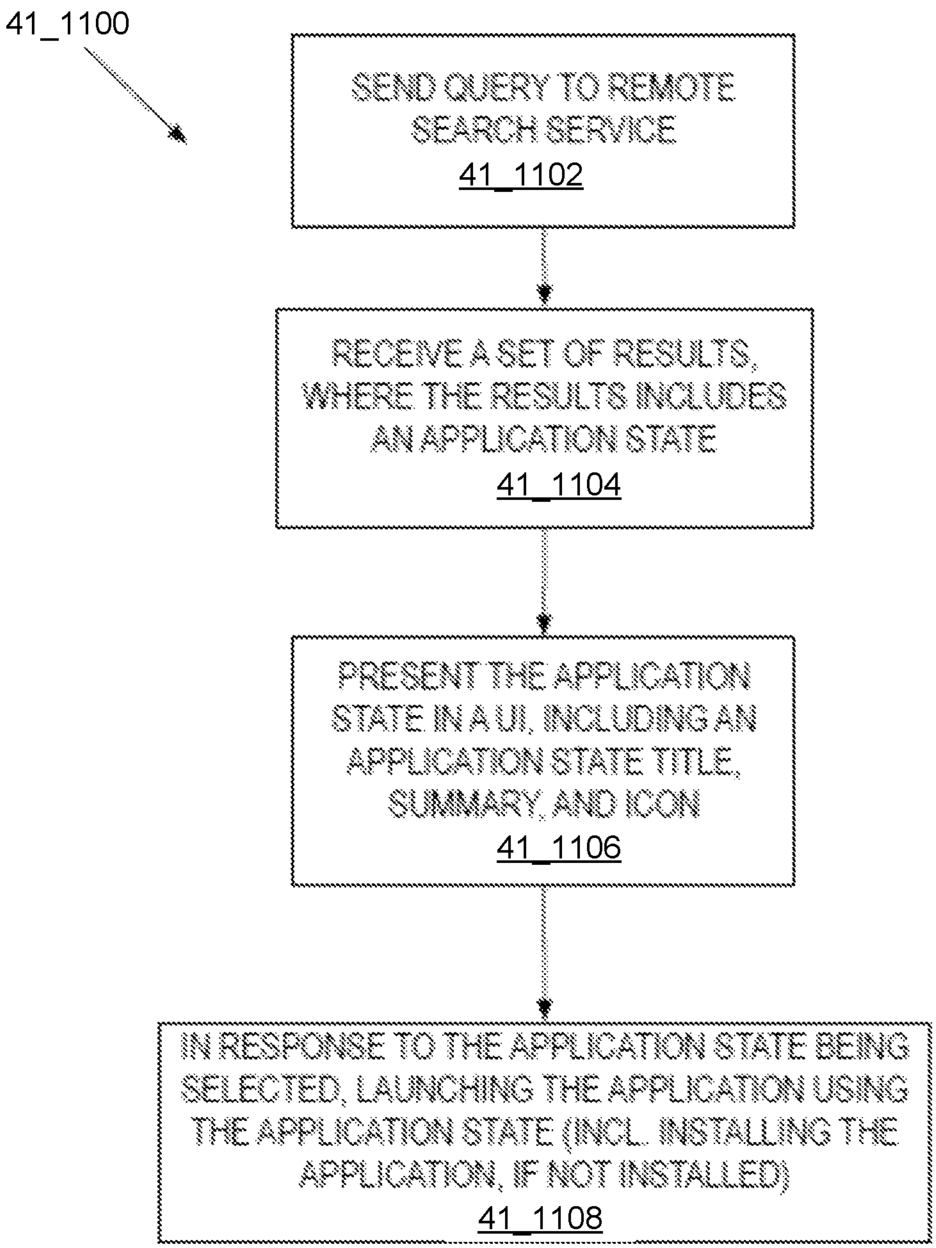
Figure 41_11

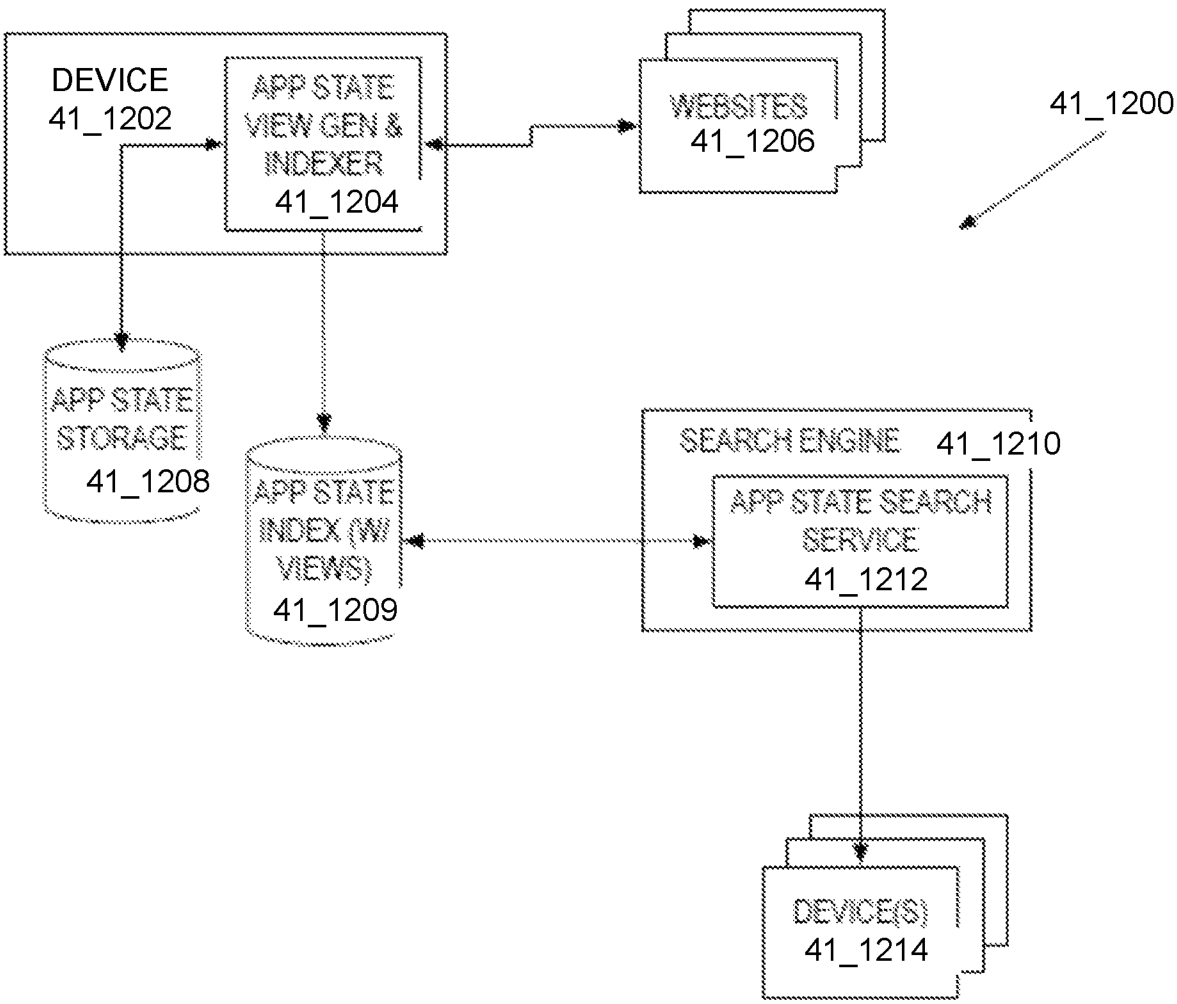
Figure 41_12

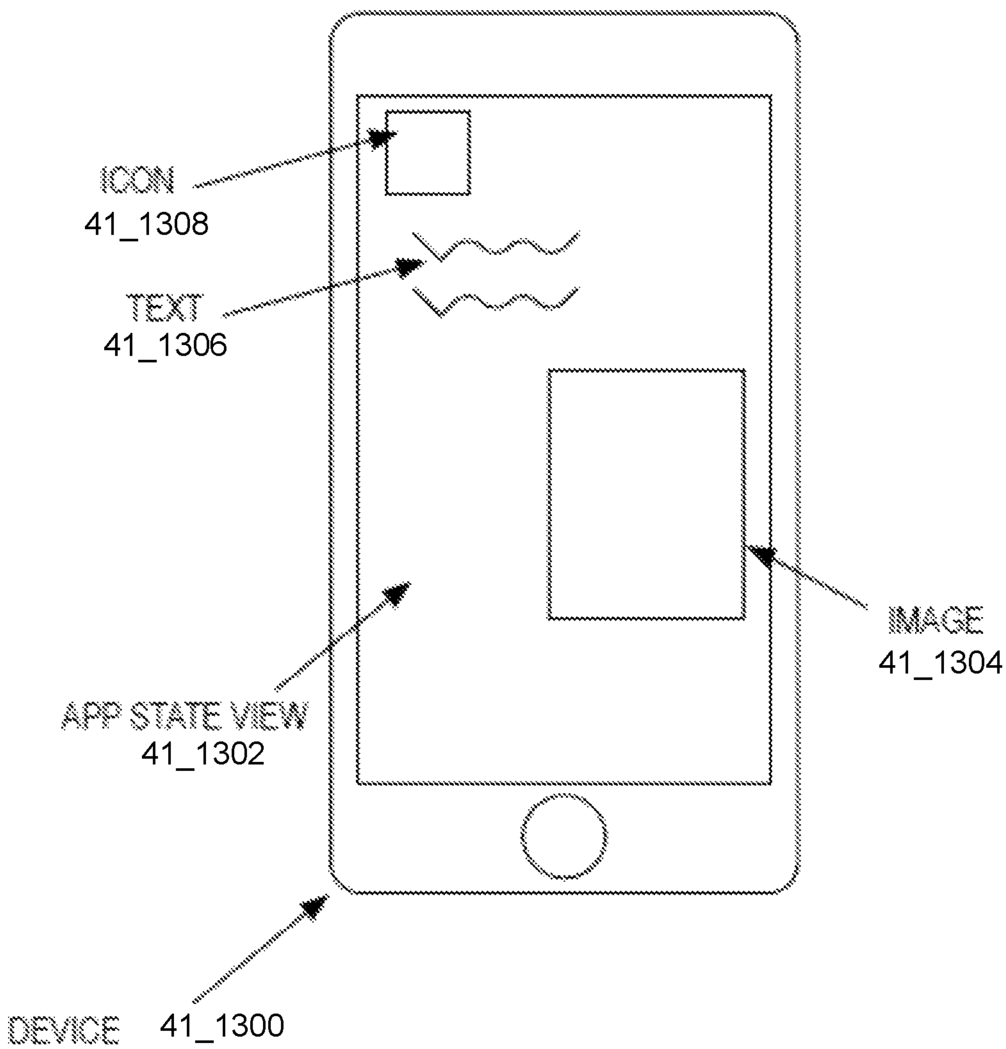
Figure 41_13

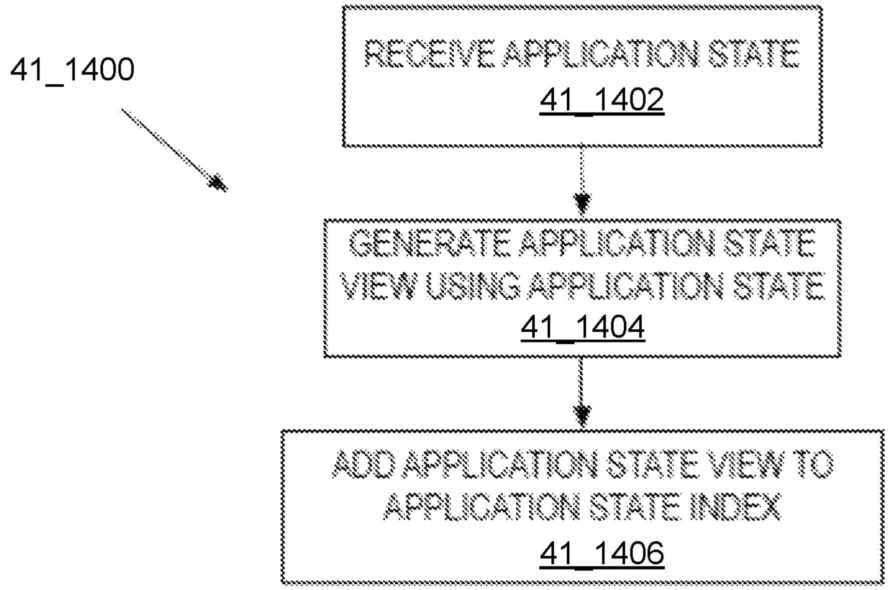
Figure 41_14

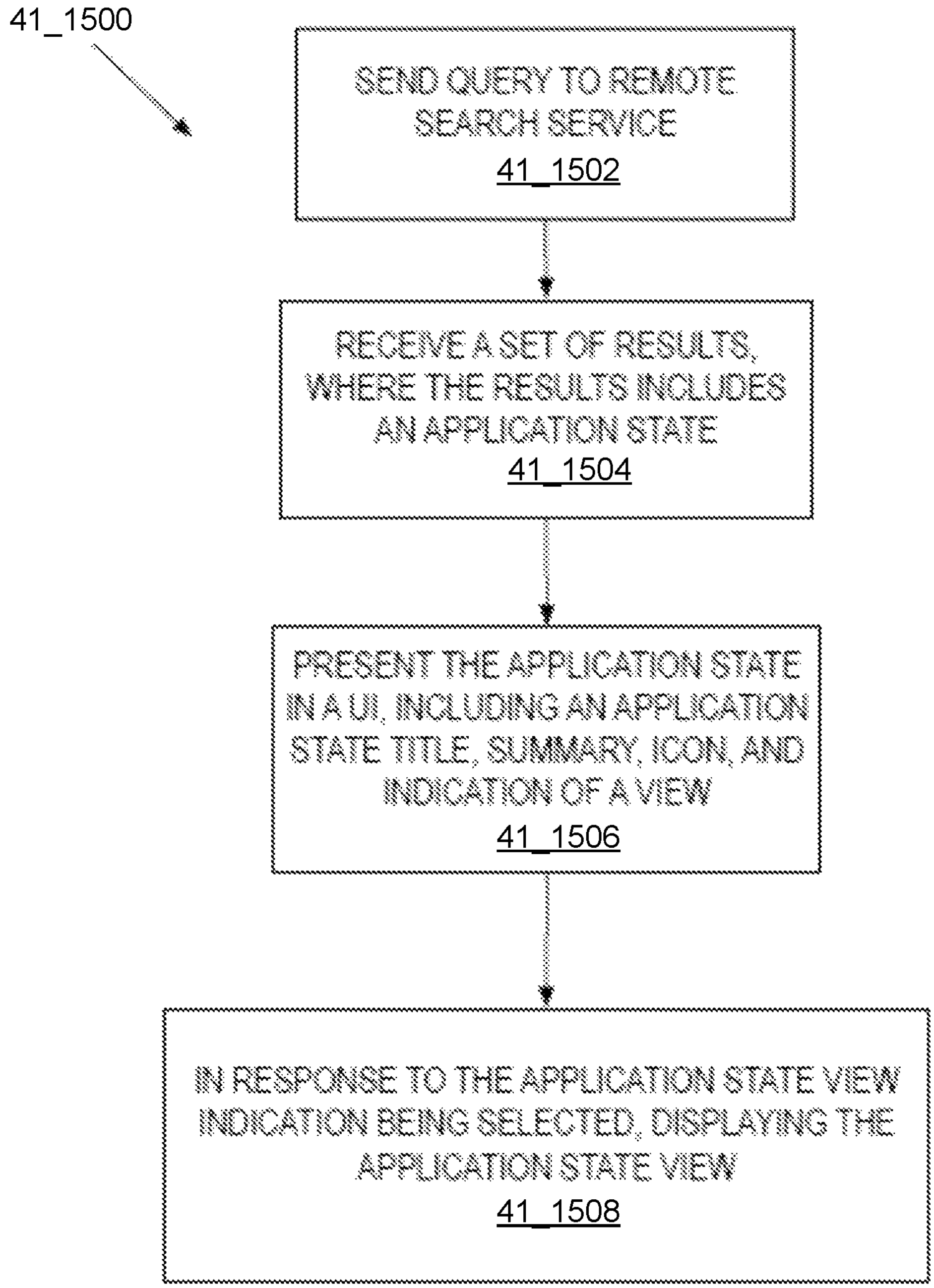
Figure 41_15

SYSTEMS AND METHODS FOR PROACTIVELY IDENTIFYING AND SURFACING RELEVANT CONTENT ON AN ELECTRONIC DEVICE WITH A TOUCH-SENSITIVE DISPLAY

RELATED APPLICATION

This application is a continuation of U.S. application Ser. No. 15/166,266, filed May 26, 2016, which claims priority to U.S. Provisional Application Ser. No. 62/172,019, filed Jun. 5, 2015, and U.S. Provisional Application Ser. No. 62/167,265, filed May 27, 2015. Each of these applications is incorporated by reference herein in its respective entirety.

TECHNICAL FIELD

The embodiments disclosed herein generally relate to electronic devices with touch-sensitive displays and, more specifically, to systems and methods for proactively identifying and surfacing relevant content on an electronic device with a touch-sensitive display.

BACKGROUND

Handheld electronic devices with touch-sensitive displays are ubiquitous. Users of these ubiquitous handheld electronic devices now install numerous applications on their devices and use these applications to help them perform their daily activities more efficiently. In order to access these applications, however, users typically must unlock their devices, locate a desired application (e.g., by navigating through a home screen to locate an icon associated with the desired application or by searching for the desired application within a search interface), and then also locate a desired function within the desired application. Therefore, users often spend a significant amount of time locating desired applications and desired functions within those applications, instead of simply being able to immediately execute (e.g., with a single touch input) the desired application and/or perform the desired function.

Moreover, the numerous installed applications inundate users with a continuous stream of information that cannot be thoroughly reviewed immediately. As such, users often wish to return at a later point in time to review a particular piece of information that they noticed earlier or to use a particular piece of information at a later point in time. Oftentimes, however, users are unable to locate or fail to remember how to locate the particular piece of information.

As such, it is desirable to provide an intuitive and easy-to-use system and method for proactively identifying and surfacing relevant content (e.g., the particular piece of information) on an electronic device that is in communication with a display and a touch-sensitive surface.

SUMMARY

Accordingly, there is a need for electronic devices with faster, more efficient methods and interfaces for quickly accessing applications and desired functions within those applications. Moreover, there is a need for electronic devices that assist users with managing the continuous stream of information they receive daily by proactively identifying and providing relevant information (e.g., contacts, nearby places, applications, news articles, addresses, and other information available on the device) before the information is explicitly requested by a user. Such methods and interfaces optionally complement or replace conventional methods for accessing applications. Such methods and interfaces produce a more efficient human-machine interface by requiring fewer inputs in order for users to locate desired information. For battery-operated devices, such methods and interfaces conserve power and increase the time between battery charges (e.g., by requiring a fewer number of touch inputs in order to perform various functions). Moreover, such methods and interfaces help to extend the life of the touch-sensitive display by requiring a fewer number of touch inputs (e.g., instead of having to continuously and aimlessly tap on a touch-sensitive display to locate a desired piece of information, the methods and interfaces disclosed herein proactively provide that piece of information without requiring user input).

The above deficiencies and other problems associated with user interfaces for electronic devices with touch-sensitive surfaces are addressed by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, fitness support, digital photography, digital video recording, web browsing, digital music playing, and/or digital video playing. Executable instructions for performing these functions are, optionally, included in a non-transitory computer-readable storage medium or other computer program product configured for execution by one or more processors.

(A1) In accordance with some embodiments, a method is performed at an electronic device (e.g., portable multifunction device 100, FIG. 1A, configured in accordance with any one of Computing Device A-D, FIG. 1E) with a touch-sensitive display (touch screen 112, FIG. 1C). The method includes: executing, on the electronic device, an application in response to an instruction from a user of the electronic device. While executing the application, the method further includes: collecting usage data. The usage data at least includes one or more actions (or types of actions) performed by the user within the application. The method also includes: (i) automatically, without human intervention, obtaining at least one trigger condition based on the collected usage data and (ii) associating the at least one trigger condition with a particular action of the one or more actions performed by the user within the application. Upon determining that the at least one trigger condition has been satisfied, the method includes: providing an indication to the user that the particular action associated with the trigger condition is available.

(A2) In some embodiments of the method of A1, obtaining the at least one trigger condition includes sending, to one or more servers that are remotely located from the electronic device, the usage data and receiving, from the one or more servers, the at least one trigger condition.

(A3) In some embodiments of the method of any one of A1-A2, providing the indication includes displaying, on a lock screen on the touch-sensitive display, a user interface object corresponding to the particular action associated with the trigger condition.

(A4) In some embodiments of the method of A3, the user interface object includes a description of the particular action associated with the trigger condition.

(A5) In some embodiments of the method of A4, the user interface object further includes an icon associated with the application.

(A6) In some embodiments of the method of any one of A3-A5, the method further includes: detecting a first gesture at the user interface object. In response to detecting the first gesture: (i) displaying, on the touch-sensitive display, the application and (ii) while displaying the application, the method includes: performing the particular action associated with the trigger condition.

(A7) In some embodiments of the method of A6, the first gesture is a swipe gesture over the user interface object.

(A8) In some embodiments of the method of any one of A3-A5, the method further includes: detecting a second gesture at the user interface object. In response to detecting the second gesture and while continuing to display the lock screen on the touch-sensitive display, performing the particular action associated with the trigger condition.

(A9) In some embodiments of the method of A8, the second gesture is a single tap at a predefined area of the user interface object.

(A10) In some embodiments of the method of any one of A3-A9, the user interface object is displayed in a predefined central portion of the lock screen.

(A11) In some embodiments of the method of A1, providing the indication to the user that the particular action associated with the trigger condition is available includes performing the particular action.

(A12) In some embodiments of the method of A3, the user interface object is an icon associated with the application and the user interface object is displayed substantially in a corner of the lock screen on the touch-sensitive display.

(A13) In some embodiments of the method of any one of A1-A12, the method further includes: receiving an instruction from the user to unlock the electronic device. In response to receiving the instruction, the method includes: displaying, on the touch-sensitive display, a home screen of the electronic device. The method also includes: providing, on the home screen, the indication to the user that the particular action associated with the trigger condition is available.

(A14) In some embodiments of the method of A13, the home screen includes (i) a first portion including one or more user interface pages for launching a first set of applications available on the electronic device and (ii) a second portion, that is displayed adjacent to the first portion, for launching a second set of applications available on the electronic device. The second portion is displayed on all user interface pages included in the first portion and providing the indication on the home screen includes displaying the indication over the second portion.

(A15) In some embodiments of the method of A14, the second set of applications is distinct from and smaller than the first set of applications.

(A16) In some embodiments of the method of any one of A1-A15, determining that the at least one trigger condition has been satisfied includes determining that the electronic device has been coupled with a second device, distinct from the electronic device.

(A17) In some embodiments of the method of any one of A1-A16, determining that the at least one trigger condition has been satisfied includes determining that the electronic device has arrived at an address corresponding to a home or a work location associated with the user.

(A18) In some embodiments of the method of A17, determining that the electronic device has arrived at an address corresponding to the home or the work location associated with the user includes monitoring motion data from an accelerometer of the electronic device and determining, based on the monitored motion data, that the electronic device has not moved for more than a threshold amount of time.

(A19) In some embodiments of the method of any one of A1-A18, the usage data further includes verbal instructions, from the user, provided to a virtual assistant application while continuing to execute the application. The at least one trigger condition is further based on the verbal instructions provided to the virtual assistant application.

(A20) In some embodiments of the method of A19, the verbal instructions comprise a request to create a reminder that corresponds to a current state of the application, the current state corresponding to a state of the application when the verbal instructions were provided.

(A21) In some embodiments of the method of A20, the state of the application when the verbal instructions were provided is selected from the group consisting of: a page displayed within the application when the verbal instructions were provided, content playing within the application when the verbal instructions were provided, a notification displayed within the application when the verbal instructions were provided, and an active portion of the page displayed within the application when the verbal instructions were provided.

(A22) In some embodiments of the method of A20, the verbal instructions include the term "this" in reference to the current state of the application.

(A23) In another aspect, a method is performed at one or more electronic devices (e.g., portable multifunction device 100, FIG. 5, and one or more servers 502, FIG. 5). The method includes: executing, on a first electronic device of the one or more electronic devices, an application in response to an instruction from a user of the first electronic device. While executing the application, the method includes: automatically, without human intervention, collecting usage data, the usage data at least including one or more actions (or types of actions) performed by the user within the application. The method further includes: automatically, without human intervention, establishing at least one trigger condition based on the collected usage data. The method additionally includes: associating the at least one trigger condition with particular action of the one or more actions performed by the user within the application. Upon determining that the at least one trigger condition has been satisfied, the method includes: providing an indication to the user that the particular action associated with the trigger condition is available.

(A24) In another aspect, an electronic device is provided. In some embodiments, the electronic device includes: a touch-sensitive display, one or more processors, and memory storing one or more programs which, when executed by the one or more processors, cause the electronic device to perform the method described in any one of A1-A22.

(A25) In yet another aspect, an electronic device is provided and the electronic device includes: a touch-sensitive display and means for performing the method described in any one of A1-A22.

(A26) In still another aspect, a non-transitory computer-readable storage medium is provided. The non-transitory computer-readable storage medium stores executable instructions that, when executed by an electronic device with a touch-sensitive display, cause the electronic device to perform the method described in any one of A1-A22.

(A27) In still one more aspect, a graphical user interface on an electronic device with a touch-sensitive display is provided. In some embodiments, the graphical user interface includes user interfaces displayed in accordance with the method described in any one of A1-A22.

(A28) In one additional aspect, an electronic device is provided that includes a display unit (e.g., display unit 4201, FIG. 42), a touch-sensitive surface unit (e.g., touch-sensitive surface unit 4203, FIG. 42), and a processing unit (e.g., processing unit 4205, FIG. 42). In some embodiments, the electronic device is configured in accordance with any one of the computing devices shown in FIG. 1E (i.e., Computing Devices A-D). For ease of illustration, FIG. 42 shows display unit 4201 and touch-sensitive surface unit 4203 as integrated with electronic device 4200, however, in some embodiments one or both of these units are in communication with the electronic device, although the units remain physically separate from the electronic device. The processing unit is coupled with the touch-sensitive surface unit and the display unit. In some embodiments, the touch-sensitive surface unit and the display unit are integrated in a single touch-sensitive display unit (also referred to herein as a touch-sensitive display). The processing unit includes an executing unit (e.g., executing unit 4207, FIG. 42), a collecting unit (e.g., collecting unit 4209, FIG. 42), an obtaining unit (e.g., obtaining unit 4211, FIG. 42), an associating unit (e.g., associating unit 4213, FIG. 42), a providing unit (e.g., providing unit 4215, FIG. 42), a sending unit (e.g., sending unit 4217, FIG. 42), a receiving unit (e.g., receiving unit 4219, FIG. 42), a displaying unit (e.g., displaying unit 4221, FIG. 42), a detecting unit (e.g., detecting unit 4223, FIG. 42), a performing unit (e.g., performing unit 4225, FIG. 42), a determining unit (e.g., determining unit 4227, FIG. 42), and a monitoring unit (e.g., monitoring unit 4229, FIG. 42). The processing unit (or one or more components thereof, such as the units 4207-4229) is configured to: execute (e.g., with the executing unit 4207), on the electronic device, an application in response to an instruction from a user of the electronic device; while executing the application, collect usage data (e.g., with the collecting unit 4209), the usage data at least including one or more actions performed by the user within the application; automatically, without human intervention, obtain (e.g., with the obtaining unit 4211) at least one trigger condition based on the collected usage data; associate (e.g., with the associating unit 4213) the at least one trigger condition with a particular action of the one or more actions performed by the user within the application; and upon determining that the at least one trigger condition has been satisfied, provide (e.g., with the providing unit 4215) an indication to the user that the particular action associated with the trigger condition is available.

(A29) In some embodiments of the electronic device of A28, obtaining the at least one trigger condition includes sending (e.g., with the sending unit 4217), to one or more servers that are remotely located from the electronic device, the usage data and receiving (e.g., with the receiving unit 4219), from the one or more servers, the at least one trigger condition.

(A30) In some embodiments of the electronic device of any one of A28-A29, providing the indication includes displaying (e.g., with the displaying unit 4217 and/or the display unit 4201), on a lock screen on the touch-sensitive display unit, a user interface object corresponding to the particular action associated with the trigger condition.

(A31) In some embodiments of the electronic device of A30, the user interface object includes a description of the particular action associated with the trigger condition.

(A32) In some embodiments of the electronic device of A31, the user interface object further includes an icon associated with the application.

(A33) In some embodiments of the electronic device of any one of A30-A32, the processing unit is further configured to: detect (e.g., with the detecting unit 4223 and/or the touch-sensitive surface unit 4203) a first gesture at the user interface object. In response to detecting the first gesture: (i) display (e.g., with the displaying unit 4217 and/or the display unit 4201), on the touch-sensitive display unit, the application and (ii) while displaying the application, perform (e.g., with the performing unit 4225) the particular action associated with the trigger condition.

(A34) In some embodiments of the electronic device of A33, the first gesture is a swipe gesture over the user interface object.

(A35) In some embodiments of the electronic device of any one of A30-A33, the processing unit is further configured to: detect (e.g., with the detecting unit 4223 and/or the touch-sensitive surface unit 4203) a second gesture at the user interface object. In response to detecting the second gesture and while continuing to display the lock screen on the touch-sensitive display unit, the processing unit is configured to: perform (e.g., with the performing unit 4225) the particular action associated with the trigger condition.

(A36) In some embodiments of the electronic device of A35, the second gesture is a single tap at a predefined area of the user interface object.

(A37) In some embodiments of the electronic device of any one of A30-A36, the user interface object is displayed in a predefined central portion of the lock screen.

(A38) In some embodiments of the electronic device of A28, providing the indication to the user that the particular action associated with the trigger condition is available includes performing (e.g., with the performing unit 4225) the particular action.

(A39) In some embodiments of the electronic device of A30, the user interface object is an icon associated with the application and the user interface object is displayed substantially in a corner of the lock screen on the touch-sensitive display unit.

(A40) In some embodiments of the electronic device of any one of A28-A39, the processing unit is further configured to: receive (e.g., with the receiving unit 4219) an instruction from the user to unlock the electronic device. In response to receiving the instruction, the processing unit is configured to: display (e.g., with the displaying unit 4217 and/or the display unit 4201), on the touch-sensitive display unit, a home screen of the electronic device. The processing unit is also configured to: provide (e.g., with the providing unit 4215), on the home screen, the indication to the user that the particular action associated with the trigger condition is available.

(A41) In some embodiments of the electronic device of A40, the home screen includes (i) a first portion including one or more user interface pages for launching a first set of applications available on the electronic device and (ii) a second portion, that is displayed adjacent to the first portion, for launching a second set of applications available on the electronic device. The second portion is displayed on all user interface pages included in the first portion and providing the indication on the home screen includes displaying (e.g., with the displaying unit 4217 and/or the display unit 4201) the indication over the second portion.

(A42) In some embodiments of the electronic device of A41, the second set of applications is distinct from and smaller than the first set of applications.

(A43) In some embodiments of the electronic device of any one of A28-A42, determining that the at least one trigger condition has been satisfied includes determining (e.g., with the determining unit 4227) that the electronic device has been coupled with a second device, distinct from the electronic device.

(A44) In some embodiments of the electronic device of any one of A28-A43, determining that the at least one trigger condition has been satisfied includes determining (e.g., with the determining unit 4227) that the electronic device has arrived at an address corresponding to a home or a work location associated with the user.

(A45) In some embodiments of the electronic device of A44, determining that the electronic device has arrived at an address corresponding to the home or the work location associated with the user includes monitoring (e.g., with the monitoring unit 4229) motion data from an accelerometer of the electronic device and determining (e.g., with the determining unit 4227), based on the monitored motion data, that the electronic device has not moved for more than a threshold amount of time.

(A46) In some embodiments of the electronic device of any one of A28-A45, the usage data further includes verbal instructions, from the user, provided to a virtual assistant application while continuing to execute the application. The at least one trigger condition is further based on the verbal instructions provided to the virtual assistant application.

(A47) In some embodiments of the electronic device of A46, the verbal instructions comprise a request to create a reminder that corresponds to a current state of the application, the current state corresponding to a state of the application when the verbal instructions were provided.

(A48) In some embodiments of the electronic device of A47, the state of the application when the verbal instructions were provided is selected from the group consisting of: a page displayed within the application when the verbal instructions were provided, content playing within the application when the verbal instructions were provided, a notification displayed within the application when the verbal instructions were provided, and an active portion of the page displayed within the application when the verbal instructions were provided.

(A49) In some embodiments of the electronic device of A46, the verbal instructions include the term "this" in reference to the current state of the application.

(B1) In accordance with some embodiments, a method is performed at an electronic device (e.g., portable multifunction device 100, FIG. 1A, configured in accordance with any one of Computing Device A-D, FIG. 1E) with a touch-sensitive display (touch screen 112, FIG. 1C). The method includes: obtaining at least one trigger condition that is based on usage data associated with a user of the electronic device, the usage data including one or more actions (or types of actions) performed by the user within an application while the application was executing on the electronic device. The method also includes: associating the at least one trigger condition with a particular action of the one or more actions performed by the user within the application. Upon determining that the at least one trigger condition has been satisfied, the method includes: providing an indication to the user that the particular action associated with the trigger condition is available.

(B2) In some embodiments of the method of B 1, the method further includes the method described in any one of A2-A22.

(B3) In another aspect, an electronic device is provided. In some embodiments, the electronic device includes: a touch-sensitive display, one or more processors, and memory storing one or more programs which, when executed by the one or more processors, cause the electronic device to perform the method described in any one of B1-B2.

(B4) In yet another aspect, an electronic device is provided and the electronic device includes: a touch-sensitive display and means for performing the method described in any one of B1-B2.

(B5) In still another aspect, a non-transitory computer-readable storage medium is provided. The non-transitory computer-readable storage medium stores executable instructions that, when executed by an electronic device with a touch-sensitive display, cause the electronic device to perform the method described in any one of B1-B2.

(B6) In still one more aspect, a graphical user interface on an electronic device with a touch-sensitive display is provided. In some embodiments, the graphical user interface includes user interfaces displayed in accordance with the method described in any one of B1-B2.

(B7) In one additional aspect, an electronic device is provided that includes a display unit (e.g., display unit 4201, FIG. 42), a touch-sensitive surface unit (e.g., touch-sensitive surface unit 4203, FIG. 42), and a processing unit (e.g., processing unit 4205, FIG. 42). In some embodiments, the electronic device is configured in accordance with any one of the computing devices shown in FIG. 1E (i.e., Computing Devices A-D). For ease of illustration, FIG. 42 shows display unit 4201 and touch-sensitive surface unit 4203 as integrated with electronic device 4200, however, in some embodiments one or both of these units are in communication with the electronic device, although the units remain physically separate from the electronic device. The processing unit includes an executing unit (e.g., executing unit 4207, FIG. 42), a collecting unit (e.g., collecting unit 4209, FIG. 42), an obtaining unit (e.g., obtaining unit 4211, FIG. 42), an associating unit (e.g., associating unit 4213, FIG. 42), a providing unit (e.g., providing unit 4215, FIG. 42), a sending unit (e.g., sending unit 4217, FIG. 42), a receiving unit (e.g., receiving unit 4219, FIG. 42), a displaying unit (e.g., displaying unit 4221, FIG. 42), a detecting unit (e.g., detecting unit 4223, FIG. 42), a performing unit (e.g., performing unit 4225, FIG. 42), a determining unit (e.g., determining unit 4227, FIG. 42), and a monitoring unit (e.g., monitoring unit 4229, FIG. 42). The processing unit (or one or more components thereof, such as the units 4207-4229) is configured to: obtain (e.g., with the obtaining unit 4211) at least one trigger condition that is based on usage data associated with a user of the electronic device, the usage data including one or more actions performed by the user within an application while the application was executing on the electronic device; associate (e.g., with the associating unit 4213) the at least one trigger condition with a particular action of the one or more actions performed by the user within the application; and upon determining that the at least one trigger condition has been satisfied, provide (e.g., with the providing unit 4215) an indication to the user that the particular action associated with the trigger condition is available.

(B8) In some embodiments of the electronic device of B7, obtaining the at least one trigger condition includes sending (e.g., with the sending unit 4217), to one or more servers that are remotely located from the electronic device, the usage data and receiving (e.g., with the receiving unit 4219), from the one or more servers, the at least one trigger condition.

(B9) In some embodiments of the electronic device of any one of B7-B8, providing the indication includes displaying (e.g., with the displaying unit 4217 and/or the display unit 4201), on a lock screen on the touch-sensitive display, a user interface object corresponding to the particular action associated with the trigger condition.

(B10) In some embodiments of the electronic device of B9, the user interface object includes a description of the particular action associated with the trigger condition.

(B11) In some embodiments of the electronic device of B10, the user interface object further includes an icon associated with the application.

(B12) In some embodiments of the electronic device of any one of B9-B11, the processing unit is further configured to: detect (e.g., with the detecting unit 4223 and/or the touch-sensitive surface unit 4203) a first gesture at the user interface object. In response to detecting the first gesture: (i) display (e.g., with the displaying unit 4217 and/or the display unit 4201), on the touch-sensitive display, the application and (ii) while displaying the application, perform (e.g., with the performing unit 4225) the particular action associated with the trigger condition.

(B13) In some embodiments of the electronic device of B12, the first gesture is a swipe gesture over the user interface object.

(B14) In some embodiments of the electronic device of any one of B9-B12, the processing unit is further configured to: detect (e.g., with the detecting unit 4223 and/or the touch-sensitive surface unit 4203) a second gesture at the user interface object. In response to detecting the second gesture and while continuing to display the lock screen on the touch-sensitive display, the processing unit is configured to: perform (e.g., with the performing unit 4225) the particular action associated with the trigger condition.

(B15) In some embodiments of the electronic device of B14, the second gesture is a single tap at a predefined area of the user interface object.

(B16) In some embodiments of the electronic device of any one of B9-B15, the user interface object is displayed in a predefined central portion of the lock screen.

(B17) In some embodiments of the electronic device of B7, providing the indication to the user that the particular action associated with the trigger condition is available includes performing (e.g., with the performing unit 4225) the particular action.

(B18) In some embodiments of the electronic device of B9, the user interface object is an icon associated with the application and the user interface object is displayed substantially in a corner of the lock screen on the touch-sensitive display.

(B19) In some embodiments of the electronic device of any one of B7-B18, the processing unit is further configured to: receive (e.g., with the receiving unit 4219) an instruction from the user to unlock the electronic device. In response to receiving the instruction, the processing unit is configured to: display (e.g., with the displaying unit 4217 and/or the display unit 4201), on the touch-sensitive display, a home screen of the electronic device. The processing unit is also configured to: provide (e.g., with the providing unit 4215), on the home screen, the indication to the user that the particular action associated with the trigger condition is available.

(B20) In some embodiments of the electronic device of B19, the home screen includes (i) a first portion including one or more user interface pages for launching a first set of applications available on the electronic device and (ii) a second portion, that is displayed adjacent to the first portion, for launching a second set of applications available on the electronic device. The second portion is displayed on all user interface pages included in the first portion and providing the indication on the home screen includes displaying (e.g., with the displaying unit 4217 and/or the display unit 4201) the indication over the second portion.

(B21) In some embodiments of the electronic device of B20, the second set of applications is distinct from and smaller than the first set of applications.

(B22) In some embodiments of the electronic device of any one of B7-B21, determining that the at least one trigger condition has been satisfied includes determining (e.g., with the determining unit 4227) that the electronic device has been coupled with a second device, distinct from the electronic device.

(B23) In some embodiments of the electronic device of any one of B7-B22, determining that the at least one trigger condition has been satisfied includes determining (e.g., with the determining unit 4227) that the electronic device has arrived at an address corresponding to a home or a work location associated with the user.

(B24) In some embodiments of the electronic device of B23, determining that the electronic device has arrived at an address corresponding to the home or the work location associated with the user includes monitoring (e.g., with the monitoring unit 4229) motion data from an accelerometer of the electronic device and determining (e.g., with the determining unit 4227), based on the monitored motion data, that the electronic device has not moved for more than a threshold amount of time.

(B25) In some embodiments of the electronic device of any one of B7-B24, the usage data further includes verbal instructions, from the user, provided to a virtual assistant application while continuing to execute the application. The at least one trigger condition is further based on the verbal instructions provided to the virtual assistant application.

(B26) In some embodiments of the electronic device of B25, the verbal instructions comprise a request to create a reminder that corresponds to a current state of the application, the current state corresponding to a state of the application when the verbal instructions were provided.

(B27) In some embodiments of the electronic device of B26, the state of the application when the verbal instructions were provided is selected from the group consisting of: a page displayed within the application when the verbal instructions were provided, content playing within the application when the verbal instructions were provided, a notification displayed within the application when the verbal instructions were provided, and an active portion of the page displayed within the application when the verbal instructions were provided.

(B28) In some embodiments of the electronic device of B26, the verbal instructions include the term "this" in reference to the current state of the application.

(C1) In accordance with some embodiments, a method is performed at an electronic device (e.g., portable multifunction device 100, FIG. 1A, configured in accordance with any one of Computing Device A-D, FIG. 1E) with a touch-sensitive display (touch screen 112, FIG. 1C). The method includes: detecting a search activation gesture on the touch-sensitive display from a user of the electronic device. In response to detecting the search activation gesture, the method includes: displaying a search interface on the touch-sensitive display that includes: (i) a search entry portion and (ii) a predictions portion that is displayed before receiving any user input at the search entry portion. The predictions portion is populated with one or more of: (a) at least one affordance for contacting a person of a plurality of previously-contacted people, the person being automatically selected from the plurality of previously-contacted people based at least in part on a current time and (b) at least one affordance for executing a predicted action within an application of a plurality of applications available on the electronic device, the predicted action being automatically selected based at least in part on an application usage history associated with the user of the electronic device.

(C2) In some embodiments of the method of C1, the person is further selected based at least in part on location data corresponding to the electronic device.

(C3) In some embodiments of the method of any one of C1-C2, the application usage history and contact information for the person are retrieved from a memory of the electronic device.

(C4) In some embodiments of the method of any one of C1-C2, the application usage history and contact information for the person are retrieved from a server that is remotely located from the electronic device.

(C5) In some embodiments of the method of any one of C1-C4, the predictions portion is further populated with at least one affordance for executing a predicted application, the predicted application being automatically selected based at least in part on the application usage history.

(C6) In some embodiments of the method of any one of C1-05, the predictions portion is further populated with at least one affordance for a predicted category of places (or nearby places), and the predicted category of places is automatically selected based at least in part on one or more of: the current time and location data corresponding to the electronic device.

(C7) In some embodiments of the method of any one of C1-C6, the method further includes: detecting user input to scroll the predictions portion. In response to detecting the user input to scroll the predictions portion, the method includes: scrolling the predictions portion in accordance with the user input. In response to the scrolling, the method includes: revealing at least one affordance for a predicted news article in the predictions portion (e.g., the predicted news article is one that is predicted to be of interest to the user).

(C8) In some embodiments of the method of C7, the predicted news article is automatically selected based at least in part on location data corresponding to the electronic device.

(C9) In some embodiments of the method of any one of C1-C8, the method further includes: detecting a selection of the at least one affordance for executing the predicted action within the application. In response to detecting the selection, the method includes: displaying, on the touch-sensitive display, the application and executing the predicted action within the application.

(C10) In some embodiments of the method of any one of C3-C4, the method further includes: detecting a selection of the at least one affordance for contacting the person. In response to detecting the selection, the method includes: contacting the person using the contact information for the person.

(C11) In some embodiments of the method of C5, the method further includes: detecting a selection of the at least one affordance for executing the predicted application. In response to detecting the selection, the method includes: displaying, on the touch-sensitive display, the predicted application.

(C12) In some embodiments of the method of C6, the method further includes: detecting a selection of the at least one affordance for the predicted category of places. In response to detecting the selection, the method further includes: (i) receiving data corresponding to at least one nearby place and (ii) displaying, on the touch-sensitive display, the received data corresponding to the at least one nearby place.

(C13) In some embodiments of the method of C7, the method further includes: detecting a selection of the at least one affordance for the predicted news article. In response to detecting the selection, the method includes: displaying, on the touch-sensitive display, the predicted news article.

(C14) In some embodiments of the method of any one of C1-C13, the search activation gesture is available from at least two distinct user interfaces, and a first user interface of the at least two distinct user interfaces corresponds to displaying a respective home screen page of a sequence of home screen pages on the touch-sensitive display.

(C15) In some embodiments of the method of C14, when the respective home screen page is a first home screen page in the sequence of home screen pages, the search activation gesture comprises one of the following: (i) a gesture moving in a substantially downward direction relative to the user of the electronic device or (ii) a continuous gesture moving in a substantially left-to-right direction relative to the user and substantially perpendicular to the downward direction.

(C16) In some embodiments of the method of C15, when the respective home screen page is a second home screen page in the sequence of home screen pages, the search activation gesture comprises the continuous gesture moving in the substantially downward direction relative to the user of the electronic device.

(C17) In some embodiments of the method of C14, a second user interface of the at least two distinct user interfaces corresponds to displaying an application switching interface on the touch-sensitive display.

(C18) In some embodiments of the method of C17, the search activation gesture comprises a contact, on the touch-sensitive display, at a predefined search activation portion of the application switching interface.

(C19) In another aspect, an electronic device is provided. In some embodiments, the electronic device includes: a touch-sensitive display, one or more processors, and memory storing one or more programs which, when executed by the one or more processors, cause the electronic device to perform the method described in any one of C1-C18.

(C20) In yet another aspect, an electronic device is provided and the electronic device includes: a touch-sensitive display and means for performing the method described in any one of C1-C18.

(C21) In still another aspect, a non-transitory computer-readable storage medium is provided. The non-transitory computer-readable storage medium stores executable instructions that, when executed by an electronic device with a touch-sensitive display, cause the electronic device to perform the method described in any one of C1-C18.

(C22) In still one more aspect, a graphical user interface on an electronic device with a touch-sensitive display is provided. In some embodiments, the graphical user interface includes user interfaces displayed in accordance with the method described in any one of C1-C18.

(C23) In one additional aspect, an electronic device is provided that includes a display unit (e.g., display unit 4301, FIG. 43), a touch-sensitive surface unit (e.g., touch-sensitive surface unit 4303, FIG. 43), and a processing unit (e.g., processing unit 4305, FIG. 43). In some embodiments, the electronic device is configured in accordance with any one of the computing devices shown in FIG. 1E (i.e., Computing Devices A-D). For ease of illustration, FIG. 43 shows display unit 4301 and touch-sensitive surface unit 4303 as integrated with electronic device 4300, however, in some embodiments one or both of these units are in communication with the electronic device, although the units remain physically separate from the electronic device. The processing unit includes a displaying unit (e.g., displaying unit 4309, FIG. 43), a detecting unit (e.g., detecting unit 4307, FIG. 43), a retrieving unit (e.g., retrieving unit 4311, FIG. 43), a populating unit (e.g., populating unit 4313, FIG. 43), a scrolling unit (e.g., scrolling unit 4315, FIG. 43), a revealing unit (e.g., revealing unit 4317, FIG. 43), a selecting unit (e.g., selecting unit 4319, FIG. 43), a contacting unit (e.g., contacting unit 4321, FIG. 43), a receiving unit (e.g., receiving unit 4323, FIG. 43), and an executing unit (e.g., executing unit 4325, FIG. 43). The processing unit (or one or more components thereof, such as the units 4307-4225) is configured to: detect (e.g., with the detecting unit 4307 and/or the touch-sensitive surface unit 4303) a search activation gesture on the touch-sensitive display from a user of the electronic device; in response to detecting the search activation gesture, display (e.g., with the displaying unit 4309 and/or the display unit 4301) a search interface on the touch-sensitive display that includes: (i) a search entry portion; and (ii) a predictions portion that is displayed before receiving any user input at the search entry portion, the predictions portion populated with one or more of: (a) at least one affordance for contacting a person of a plurality of previously-contacted people, the person being automatically selected (e.g., by the selecting unit 4319) from the plurality of previously-contacted people based at least in part on a current time; and (b) at least one affordance for executing a predicted action within an application of a plurality of applications available on the electronic device, the predicted action being automatically selected (e.g., by the selecting unit 4319) based at least in part on an application usage history associated with the user of the electronic device.

(C24) In some embodiments of the electronic device of C23, the person is further selected (e.g., by the selecting unit 4319) based at least in part on location data corresponding to the electronic device.

(C25) In some embodiments of the electronic device of any one of C23-C24, the application usage history and contact information for the person are retrieved (e.g., by the retrieving unit 4311) from a memory of the electronic device.

(C26) In some embodiments of the electronic device of any one of C23-C24, the application usage history and contact information for the person are retrieved (e.g., by the retrieving unit 4311) from a server that is remotely located from the electronic device.

(C27) In some embodiments of the electronic device of any one of C23-C26, the predictions portion is further populated (e.g., by the populating unit 4313) with at least one affordance for executing a predicted application, the predicted application being automatically selected (e.g., by the selecting unit 4319) based at least in part on the application usage history.

(C28) In some embodiments of the electronic device of any one of C23-C27, the predictions portion is further populated (e.g., by the populating unit 4313) with at least one affordance for a predicted category of places, and the predicted category of places is automatically selected (e.g., by the selecting unit 4319) based at least in part on one or more of: the current time and location data corresponding to the electronic device.

(C29) In some embodiments of the electronic device of any one of C23-C28, the processing unit is further configured to: detect (e.g., with the detecting unit 4307 and/or the touch-sensitive surface unit 4303) user input to scroll the predictions portion. In response to detecting the user input to scroll the predictions portion, the processing unit is configured to: scroll (e.g., with the scrolling unit 4319) the predictions portion in accordance with the user input. In response to the scrolling, the processing unit is configured to: reveal (e.g., with the revealing unit 4317) at least one affordance for a predicted news article in the predictions portion (e.g., the predicted news article is one that is predicted to be of interest to the user).

(C30) In some embodiments of the electronic device of C7, the predicted news article is automatically selected (e.g., with the selecting unit 4319) based at least in part on location data corresponding to the electronic device.

(C31) In some embodiments of the electronic device of any one of C23-C30, the processing unit is further configured to: detect (e.g., with the detecting unit 4307 and/or the touch-sensitive surface unit 4303) a selection of the at least one affordance for executing the predicted action within the application. In response to detecting the selection, the processing unit is configured to: display (e.g., with the displaying unit 4309), on the touch-sensitive display (e.g., display unit 4301), the application and execute (e.g., with the executing unit 4325) the predicted action within the application.

(C32) In some embodiments of the electronic device of any one of C25-C26, the processing unit is further configured to: detect (e.g., with the detecting unit 4307 and/or the touch-sensitive surface unit 4303) a selection of the at least one affordance for contacting the person. In response to detecting the selection, the processing unit is configured to: contact (e.g., with the contacting unit 4321) the person using the contact information for the person.

(C33) In some embodiments of the electronic device of C27, the processing unit is further configured to: detect (e.g., with the detecting unit 4307 and/or the touch-sensitive surface unit 4303) a selection of the at least one affordance for executing the predicted application. In response to detecting the selection, the processing unit is configured to: display (e.g., with the displaying unit 4307), on the touch-sensitive display (e.g., with the display unit 4301), the predicted application.

(C34) In some embodiments of the electronic device of C28, the processing unit is further configured to: detect (e.g., with the detecting unit 4307 and/or the touch-sensitive surface unit 4303) a selection of the at least one affordance for the predicted category of places. In response to detecting the selection, the processing unit is configured to: (i) receive (e.g., with the receiving unit 4323) data corresponding to at least one nearby place and (ii) display (e.g., with the displaying unit 4307), on the touch-sensitive display (e.g., display unit 4301), the received data corresponding to the at least one nearby place.

(C35) In some embodiments of the electronic device of C29, the processing unit is further configured to: detect (e.g., with the detecting unit 4307 and/or the touch-sensitive surface unit 4303) a selection of the at least one affordance for the predicted news article. In response to detecting the selection, the processing unit is configured to: display (e.g., with the displaying unit 4307), on the touch-sensitive display (e.g., display unit 4301), the predicted news article.

(C36) In some embodiments of the electronic device of any one of C23-C35, the search activation gesture is available from at least two distinct user interfaces, and a first user interface of the at least two distinct user interfaces corresponds to displaying a respective home screen page of a sequence of home screen pages on the touch-sensitive display.

(C37) In some embodiments of the electronic device of C36, when the respective home screen page is a first home screen page in the sequence of home screen pages, the search activation gesture comprises one of the following: (i) a gesture moving in a substantially downward direction relative to the user of the electronic device or (ii) a continuous gesture moving in a substantially left-to-right direction relative to the user and substantially perpendicular to the downward direction.

(C38) In some embodiments of the electronic device of C37, when the respective home screen page is a second home screen page in the sequence of home screen pages, the search activation gesture comprises the continuous gesture moving in the substantially downward direction relative to the user of the electronic device.

(C39) In some embodiments of the electronic device of C36, a second user interface of the at least two distinct user interfaces corresponds to displaying an application switching interface on the touch-sensitive display.

(C40) In some embodiments of the electronic device of C39, the search activation gesture comprises a contact, on the touch-sensitive display, at a predefined search activation portion of the application switching interface.

Thus, electronic devices with displays, touch-sensitive surfaces, and optionally one or more sensors to detect intensity of contacts with the touch-sensitive surface are provided with faster, more efficient methods and interfaces for proactively accessing applications and proactively performing functions within applications, thereby increasing the effectiveness, efficiency, and user satisfaction with such devices. Such methods and interfaces may complement or replace conventional methods for accessing applications and functions associated therewith.

(D1) In accordance with some embodiments, a method is performed at an electronic device (e.g., portable multifunction device 100, FIG. 1A, configured in accordance with any one of Computing Device A-D, FIG. 1E) with a touch-sensitive surface (e.g., touch-sensitive surface 195, FIG. 1D) and a display (e.g., display 194, FIG. 1D). The method includes: displaying, on the display, content associated with an application that is executing on the electronic device. The method further includes: detecting, via the touch-sensitive surface, a swipe gesture that, when detected, causes the electronic device to enter a search mode that is distinct from the application. The method also includes: in response to detecting the swipe gesture, entering the search mode, the search mode including a search interface that is displayed on the display. In conjunction with entering the search mode, the method includes: determining at least one suggested search query based at least in part on information associated with the content. Before receiving any user input at the search interface, the method includes: populating the displayed search interface with the at least one suggested search query. In this way, instead of having to remember and re-enter information into a search interface, the device provides users with relevant suggestions that are based on app content that they were viewing and the user need only select one of the suggestions without having to type in anything.

(D2) In some embodiments of the method of D1, detecting the swipe gesture includes detecting the swipe gesture over at least a portion of the content that is currently displayed.

(D3) In some embodiments of the method of any one of D1-D2, the method further includes: before detecting the swipe gesture, detecting an input that corresponds to a request to view a home screen of the electronic device; and in response to detecting the input, ceasing to display the content associated with the application and displaying a respective page of the home screen of the electronic device. In some embodiments, the respective page is an initial page in a sequence of home screen pages and the swipe gesture is detected while the initial page of the home screen is displayed on the display.

(D4) In some embodiments of the method of any one of D1-D3, the search interface is displayed as translucently overlaying the application.

(D5) In some embodiments of the method of any one of D1-D4, the method further includes: in accordance with a determination that the content includes textual content, determining the at least one suggested search query based at least in part on the textual content.

(D6) In some embodiments of the method of D5, determining the at least one suggested search query based at least in part on the textual content includes analyzing the textual content to detect one or more predefined keywords that are used to determine the at least one suggested search query.

(D7) In some embodiments of the method of any one of D1-D6, determining the at least one suggested search query includes determining a plurality of suggested search queries, and populating the search interface includes populating the search interface with the plurality of suggested search queries.

(D8) In some embodiments of the method of any one of D1-D7, the method further includes: detecting, via the touch-sensitive surface, a new swipe gesture over new content that is currently displayed; and in response to detecting the new swipe gesture, entering the search mode, entering the search mode including displaying the search interface on the display; and in conjunction with entering the search mode and in accordance with a determination that the new content does not include textual content, populating the search interface with suggested search queries that are based on a selected set of historical search queries from a user of the electronic device.

(D9) In some embodiments of the method of D8, the search interface is displayed with a point of interest based on location information provided by a second application that is distinct from the application.

(D10) In some embodiments of the method of any one of D8-D9, the search interface further includes one or more suggested applications.

(D11) In some embodiments of the method of any one of D8-D10, the set of historical search queries is selected based at least in part on frequency of recent search queries.

(D12) In some embodiments of the method of any one of D1-D11, the method further includes: in conjunction with entering the search mode, obtaining the information that is associated with the content by using one or more accessibility features that are available on the electronic device.

(D13) In some embodiments of the method of D12, using the one or more accessibility features includes using the one or more accessibility features to generate the information that is associated with the content by: (i) applying a natural language processing algorithm to textual content that is currently displayed within the application and (ii) using data obtained from the natural language processing algorithm to determine one or more keywords that describe the content, and the at least one suggested search query is determined based on the one or more keywords.

(D14) In some embodiments of the method of D13, determining the one or more keywords that describe the content also includes (i) retrieving metadata that corresponds to non-textual content that is currently displayed in the application and (ii) using the retrieved metadata, in addition to the data obtained from the natural language processing algorithm, to determine the one or more keywords.

(D15) In some embodiments of the method of any one of D1-D14, the search interface further includes one or more trending queries.

(D16) In some embodiments of the method of D15, the search interface further includes one or more applications that are predicted to be of interest to a user of the electronic device.

(D17) In another aspect, an electronic device is provided. In some embodiments, the electronic device includes: a touch-sensitive surface and a display, one or more processors, and memory storing one or more programs that, when executed by the one or more processors, cause the electronic device to perform the method described in any one of D1-D16.

(D18) In yet another aspect, an electronic device is provided and the electronic device includes: a touch-sensitive surface and a display and means for performing the method described in any one of D1-D16.

(D19) In still another aspect, a non-transitory computer-readable storage medium is provided. The non-transitory computer-readable storage medium stores executable instructions that, when executed by an electronic device with a touch-sensitive surface and a display, cause the electronic device to perform the method described in any one of D1-D16.

(D20) In still one more aspect, a graphical user interface on an electronic device with a touch-sensitive surface and a display is provided. In some embodiments, the graphical user interface includes user interfaces displayed in accordance with the method described in any one of D1-D16. In one more aspect, an information processing apparatus for use in an electronic device that includes a touch-sensitive surface and a display is provided. The information processing apparatus includes: means for performing the method described in any one of D1-D16.

(D21) In one additional aspect, an electronic device is provided that includes a display unit (e.g., display unit 4401, FIG. 44), a touch-sensitive surface unit (e.g., touch-sensitive surface unit 4403, FIG. 44), and a processing unit (e.g., processing unit 4405, FIG. 44). The processing unit is coupled with the touch-sensitive surface unit and the display unit. In some embodiments, the electronic device is configured in accordance with any one of the computing devices shown in FIG. 1E (i.e., Computing Devices A-D). For ease of illustration, FIG. 44 shows display unit 4401 and touch-sensitive surface unit 4403 as integrated with electronic device 4400, however, in some embodiments one or both of these units are in communication with the electronic device, although the units remain physically separate from the electronic device. In some embodiments, the touch-sensitive surface unit and the display unit are integrated in a single touch-sensitive display unit (also referred to herein as a touch-sensitive display). The processing unit includes a detecting unit (e.g., detecting unit 4407, FIG. 44), a displaying unit (e.g., displaying unit 4409, FIG. 44), a retrieving unit (e.g., retrieving unit 4411, FIG. 44), a search mode entering unit (e.g., the search mode entering unit 4412, FIG. 44), a populating unit (e.g., populating unit 4413, FIG. 44), a obtaining unit (e.g., obtaining unit 4415, FIG. 44), a determining unit (e.g., determining unit 4417, FIG. 44), and a selecting unit (e.g., selecting unit 4419, FIG. 44). The processing unit (or one or more components thereof, such as the units 1007-1029) is configured to: display (e.g., with the displaying unit 4407), on the display unit (e.g., the display unit 4407), content associated with an application that is executing on the electronic device; detect (e.g., with the detecting unit 4407), via the touch-sensitive surface unit (e.g., the touch-sensitive surface unit 4403), a swipe gesture that, when detected, causes the electronic device to enter a search mode that is distinct from the application; in response to detecting the swipe gesture, enter the search mode (e.g., with the search mode entering unit 4412), the search mode including a search interface that is displayed on the display unit (e.g., the display unit 4407); in conjunction with entering the search mode, determine (e.g., with the determining unit 4417) at least one suggested search query based at least in part on information associated with the content; and before receiving any user input at the search interface, populate (e.g., with the populating unit 4413) the displayed search interface with the at least one suggested search query.

(D22) In some embodiments of the electronic device of D21, detecting the swipe gesture includes detecting (e.g., with the detecting unit 4407) the swipe gesture over at least a portion of the content that is currently displayed.

(D23) In some embodiments of the electronic device of any one of D21-D22, wherein the processing unit is further configured to: before detecting the swipe gesture, detect (e.g., with the detecting unit 4407) an input that corresponds to a request to view a home screen of the electronic device; and in response to detecting (e.g., with the detecting unit 4407) the input, cease to display the content associated with the application and display a respective page of the home screen of the electronic device (e.g., with the displaying unit 4409), wherein: the respective page is an initial page in a sequence of home screen pages; and the swipe gesture is detected (e.g., with the detecting unit 4407) while the initial page of the home screen is displayed on the display unit.

(D24) In some embodiments of the electronic device of any one of D21-D23, the search interface is displayed (e.g., the displaying unit 4409 and/or the display unit 4401) as translucently overlaying the application.

(D25) In some embodiments of the electronic device of any one of D21-D24, the processing unit is further configured to: in accordance with a determination that the content includes textual content, determine (e.g., with the determining unit 4417) the at least one suggested search query based at least in part on the textual content.

(D26) In some embodiments of the electronic device of D25, determining the at least one suggested search query based at least in part on the textual content includes analyzing the textual content to detect (e.g., with the detecting unit 4407) one or more predefined keywords that are used to determine (e.g., with the determining unit 4417) the at least one suggested search query.

(D27) In some embodiments of the electronic device of any one of D21-D26, determining the at least one suggested search query includes determining (e.g., with the determining unit 4417) a plurality of suggested search queries, and populating the search interface includes populating (e.g., with the populating unit 4413) the search interface with the plurality of suggested search queries.

(D28) In some embodiments of the electronic device of any one of D21-D27, the processing unit is further configured to: detect (e.g., with the detecting unit 4407), via the touch-sensitive surface unit (e.g., with the touch-sensitive surface unit 4403), a new swipe gesture over new content that is currently displayed; and in response to detecting the new swipe gesture, enter the search mode (e.g., with the search mode entering unit 4412), and entering the search mode includes displaying the search interface on the display unit (e.g., with the display unit 4409); and in conjunction with entering the search mode and in accordance with a determination that the new content does not include textual content, populate (e.g., with the populating unit 4413) the search interface with suggested search queries that are based on a selected set of historical search queries from a user of the electronic device.

(D29) In some embodiments of the electronic device of D28, the search interface is displayed (e.g., the displaying unit 4409) with a point of interest based on location information provided by a second application that is distinct from the application.

(D30) In some embodiments of the electronic device of any one of D28-D29, the search interface further includes one or more suggested applications.

(D31) In some embodiments of the electronic device of any one of D28-D30, the set of historical search queries is selected (e.g., with the selecting unit 4419) based at least in part on frequency of recent search queries.

(D32) In some embodiments of the electronic device of any one of D21-D31, the processing unit is further configured to: in conjunction with entering the search mode, obtain (e.g., with the obtaining unit 4415) the information that is associated with the content by using one or more accessibility features that are available on the electronic device.

(D33) In some embodiments of the electronic device of D32, using the one or more accessibility features includes using the one or more accessibility features to generate the information that is associated with the content by: (i) applying a natural language processing algorithm to textual content that is currently displayed within the application and (ii) using data obtained (e.g., with the obtaining unit 4415) from the natural language processing algorithm to determine (e.g., with the determining unit 4417) one or more keywords that describe the content, and wherein the at least one suggested search query is determined (e.g., with the determining unit 4417) based on the one or more keywords.

(D34) In some embodiments of the electronic device of D33, determining the one or more keywords that describe the content also includes (i) retrieving (e.g., with the retrieving unit 4411) metadata that corresponds to non-textual content that is currently displayed in the application and (ii) using the retrieved metadata, in addition to the data obtained from the natural language processing algorithm, to determine (e.g., with the determining unit 4417) the one or more keywords.

(D35) In some embodiments of the electronic device of any one of D21-D34, the search interface further includes one or more trending queries.

(D36) In some embodiments of the electronic device of D35, the search interface further includes one or more applications that are predicted to be of interest to a user of the electronic device.

(E1) In accordance with some embodiments, a method is performed at an electronic device (e.g., portable multifunction device 100, FIG. 1A, configured in accordance with any one of Computing Device A-D, FIG. 1E) with a touch-sensitive surface (e.g., touch-sensitive surface 195, FIG. 1D) and a display (e.g., display 194, FIG. 1D). The method includes: detecting, via the touch-sensitive surface, a swipe gesture over a user interface, and the swipe gesture, when detected, causes the electronic device to enter a search mode. The method further includes: in response to detecting the swipe gesture, entering the search mode, and entering the search mode includes populating a search interface distinct from the user interface, before receiving any user input within the search interface, with a first content item. In some embodiments, in accordance with a determination that the user interface includes content that is associated with an application that is distinct from a home screen that includes selectable icons for invoking applications, populating the search interface with the first content item includes populating the search interface with at least one suggested search query that is based at least in part on the content that is associated with the application; and in accordance with a determination that the user interface is associated with a page of the home screen, populating the search interface with the first content item includes populating the search interface with an affordance that includes a selectable description of at least one point of interest that is within a threshold distance of a current location of the electronic device.

(E2) In some embodiments of the method of E1, populating the search interface with the affordance includes displaying a search entry portion of the search interface on the touch-sensitive surface; and the method further includes: detecting an input at the search entry portion; and in response to detecting the input the search entry portion, ceasing to display the affordance and displaying the at least one suggested search query within the search interface.

(E3) In another aspect, an electronic device is provided. In some embodiments, the electronic device includes: a touch-sensitive surface, a display, one or more processors, and memory storing one or more programs that, when executed by the one or more processors, cause the electronic device to perform the method described in any one of E1-E2.

(E4) In yet another aspect, an electronic device is provided and the electronic device includes: a touch-sensitive surface, a display, and means for performing the method described in any one of E1-E2.

(E5) In still another aspect, a non-transitory computer-readable storage medium is provided. The non-transitory computer-readable storage medium stores executable instructions that, when executed by an electronic device with a touch-sensitive surface and a display, cause the electronic device to perform the method described in any one of E1-E2.

(E6) In still one more aspect, a graphical user interface on an electronic device with a touch-sensitive surface and a display is provided. In some embodiments, the graphical user interface includes user interfaces displayed in accordance with the method described in any one of E1-E2. In one more aspect, an information processing apparatus for use in an electronic device that includes a touch-sensitive surface and a display is provided. The information processing apparatus includes: means for performing the method described in any one of E1-E2.

(E7) In one additional aspect, an electronic device is provided that includes a display unit (e.g., display unit 4501, FIG. 45), a touch-sensitive surface unit (e.g., touch-sensitive surface unit 4503, FIG. 45), and a processing unit (e.g., processing unit 4505, FIG. 45). The processing unit is coupled with the touch-sensitive surface unit and the display unit. In some embodiments, the electronic device is configured in accordance with any one of the computing devices shown in FIG. 1E (i.e., Computing Devices A-D). For ease of illustration, FIG. 45 shows display unit 4501 and touch-sensitive surface unit 4503 as integrated with electronic device 4500, however, in some embodiments one or both of these units are in communication with the electronic device, although the units remain physically separate from the electronic device. In some embodiments, the touch-sensitive surface unit and the display unit are integrated in a single touch-sensitive display unit (also referred to herein as a touch-sensitive display). The processing unit includes a detecting unit (e.g., detecting unit 4507, FIG. 45), a displaying unit (e.g., displaying unit 4509, FIG. 45), a populating unit (e.g., populating unit 4511, FIG. 45), and a search mode entering unit (e.g., the search mode entering unit 4513, FIG. 45). The processing unit (or one or more components thereof, such as the units 4507-4513) is configured to: detect (e.g., with the detecting unit 4507), via the touch-sensitive surface unit (e.g., the touch-sensitive surface unit 4503), a swipe gesture over a user interface, wherein the swipe gesture, when detected, causes the electronic device to enter a search mode; and in response to detecting the swipe gesture, enter the search mode (e.g., with the search mode entering unit 4513), wherein entering the search mode includes populating (e.g., with the populating unit 4511) a search interface distinct from the user interface, before receiving any user input within the search interface, with a first content item. In some embodiments, in accordance with a determination that the user interface includes content that is associated with an application that is distinct from a home screen that includes selectable icons for invoking applications, populating the search interface with the first content item includes populating (e.g., with the populating unit 4511) the search interface with at least one suggested search query that is based at least in part on the content that is associated with the application; and in accordance with a determination that the user interface is associated with a page of the home screen, populating the search interface with the first content item includes populating (e.g., with the populating unit 4511) the search interface with an affordance that includes a selectable description of at least one point of interest that is within a threshold distance of a current location of the electronic device.

(E8) In some embodiments of the electronic device of E7, populating the search interface with the affordance includes displaying (e.g., with the displaying unit 4507 and/or the display unit 4501) a search entry portion of the search interface; and the processing unit is further configured to: detect (e.g., with the detecting unit 4507) an input at the search entry portion; and in response to detecting the input the search entry portion, cease to display (e.g., with the displaying unit 4507 and/or the display unit 4501) the affordance and display (e.g., with the displaying unit 4507 and/or the display unit 4501) the at least one suggested search query within the search interface.

(F1) In accordance with some embodiments, a method is performed at an electronic device (e.g., portable multifunction device 100, FIG. 1A, configured in accordance with any one of Computing Device A-D, FIG. 1E) with a location sensor and a touch-sensitive surface (e.g., touch-sensitive surface 195, FIG. 1D) and a display (e.g., display 194, FIG. 1D). The method includes: automatically, and without instructions from a user, determining that a user of the electronic device is in a vehicle that has come to rest at a geographic location; upon determining that the user has left the vehicle at the geographic location, determining whether positioning information, retrieved from the location sensor to identifying the geographic location, satisfies accuracy criteria. The method further includes: upon determining that the positioning information does not satisfy the accuracy criteria, providing a prompt to the user to input information about the geographic location. The method also includes: in response to providing the prompt, receiving information from the user about the geographic location and storing the information as vehicle location information.

(F2) In some embodiments of the method of claim F1, the method further includes: upon determining that the positioning information satisfies the accuracy criteria, automatically, and without instructions from a user, storing the positioning information as the vehicle location information.

(F3) In some embodiments of the method of claim F2, the method further includes: in accordance with a determination that the user is heading towards the geographic location, displaying a user interface object that includes the vehicle location information.

(F4) In some embodiments of the method of claim F3, the user interface object is a maps object that includes an identifier for the user's current location and a separate identifier for the geographic location.

(F5) In some embodiments of the method of claim F4, the user interface object is displayed on a lock screen of the electronic device.

(F6) In some embodiments of the method of claim F4, the user interface object is displayed in response to a swipe gesture that causes the electronic device to enter a search mode.

(F7) In some embodiments of the method of claim F6, determining whether the user is heading towards the geographic location is performed in response to receiving the swipe gesture.

(F8) In some embodiments of the method of any one of F1-F7, the prompt is an audio prompt provided by a virtual assistant that is available via the electronic device, receiving the information from the user includes receiving a verbal description from the user that identifies the geographic location, and displaying the user interface object includes displaying a selectable affordance that, when selected, causes the device to playback the verbal description.

(F9) In some embodiments of the method of any one of F1-F7, the prompt is displayed on the display of the electronic device, receiving the information from the user includes receiving a textual description from the user that identifies the geographic location, and displaying the user interface object includes displaying the textual description from the user.

(F10) In some embodiments of the method of any one of F1-F7, determining whether the user is heading towards the geographic location includes using new positioning information received from the location sensor to determine that the electronic device is moving towards the geographic location.

(F11) In some embodiments of the method of F10, determining whether the user is heading towards the geographic location includes (i) determining that the electronic device remained at a different geographic location for more than a threshold period of time and (ii) determining that the new positioning information indicates that the electronic device is moving away from the different geographic location and towards the geographic location.

(F12) In some embodiments of the method of any one of F1-F11, determining that the user is in the vehicle that has come to rest at the geographic location includes (i) determining that the user is in the vehicle by determining that the electronic device is travelling above a threshold speed (ii) determining that the vehicle has come to rest at the geographic location by one or more of: (a) determining that the electronic device has remained at the geographic location for more than a threshold period of time, (b) determining that a communications link between the electronic device and the vehicle has been disconnected, and (c) determining that the geographic location corresponds to a location within a parking lot.

(F13) In some embodiments of the method of claim F12, determining that the vehicle has come to rest at the geographic location includes determining that the electronic device has remained at the geographic location for more than a threshold period of time.

(F14) In some embodiments of the method of any one of F12-F13, determining that the vehicle has come to rest at the geographic location includes determining that a communications link between the electronic device and the vehicle has been disconnected.

(F15) In some embodiments of the method of any one of F12-F14, determining that the vehicle has come to rest at the geographic location includes determining that the geographic location corresponds to a location within a parking lot.

(F16) In some embodiments of the method of any one of F1-F15, the accuracy criteria includes a criterion that is satisfied when accuracy of a GPS reading associated with the positioning information is above a threshold level of accuracy.

(F17) In another aspect, an electronic device is provided. In some embodiments, the electronic device includes: a touch-sensitive surface, a display, a location sensor, one or more processors, and memory storing one or more programs which, when executed by the one or more processors, cause the electronic device to perform the method described in any one of F1-F16.

(F18) In yet another aspect, an electronic device is provided and the electronic device includes: a touch-sensitive surface, a display, a location sensor, and means for performing the method described in any one of F1-F16.

(F19) In still another aspect, a non-transitory computer-readable storage medium is provided. The non-transitory computer-readable storage medium stores executable instructions that, when executed by an electronic device with a touch-sensitive surface, a display, and a location sensor, cause the electronic device to perform the method described in any one of F1-F16.

(F20) In still one more aspect, a graphical user interface on an electronic device with a touch-sensitive surface, a display, and a location sensor is provided. In some embodiments, the graphical user interface includes user interfaces displayed in accordance with the method described in any one of F1-F16. In one more aspect, an information processing apparatus for use in an electronic device that includes a touch-sensitive surface, a display, and a location sensor is provided. The information processing apparatus includes: means for performing the method described in any one of F1-F16.

(F21) In one additional aspect, an electronic device is provided that includes a display unit (e.g., display unit 4601, FIG. 46), a touch-sensitive surface unit (e.g., touch-sensitive surface unit 4603, FIG. 46), a location sensor unit (e.g., location sensor unit 4607, FIG. 46), and a processing unit (e.g., processing unit 4605, FIG. 46). The processing unit is coupled with the touch-sensitive surface unit, the display unit and the location sensor unit. In some embodiments, the electronic device is configured in accordance with any one of the computing devices shown in FIG. 1E (i.e., Computing Devices A-D). For ease of illustration, FIG. 46 shows display unit 4601 and touch-sensitive surface unit 4603 as integrated with electronic device 4600, however, in some embodiments one or both of these units are in communication with the electronic device, although the units remain physically separate from the electronic device. In some embodiments, the touch-sensitive surface unit and the display unit are integrated in a single touch-sensitive display unit (also referred to herein as a touch-sensitive display). The processing unit includes a displaying unit (e.g., displaying unit 4609, FIG. 46), a retrieving unit (e.g., retrieving unit 4611, FIG. 46), a determining unit (e.g., determining unit 4613, FIG. 46), a storing unit (e.g., storing unit 4615, FIG. 46), an identifying unit (e.g., identifying unit 4617, FIG. 46), a selecting unit (e.g., selecting unit 4619, FIG. 46), a receiving unit (e.g., receiving unit 4621, FIG. 46), a providing unit (e.g., providing unit 4623, FIG. 46), and a playback unit (e.g., playback unit 4625, FIG. 46). The processing unit (or one or more components thereof, such as the units 4607-4625) is configured to: automatically, and without instructions from a user: determine (e.g., with the determining unit 4613) that a user of the electronic device is in a vehicle that has come to rest at a geographic location; upon determining that the user has left the vehicle at the geographic location, determine (e.g., with the determining unit 4613) whether positioning information, retrieved (e.g., with the retrieving unit 4611) from the location sensor unit (e.g., the location sensor unit 4607) to identify (e.g., with the identifying unit 4617) the geographic location, satisfies accuracy criteria; upon determining (e.g., with the determining unit 4613) that the positioning information does not satisfy the accuracy criteria, provide (e.g., with the providing unit 4623) a prompt to the user to input information about the geographic location; and in response to providing the prompt, receive (e.g., with the receiving unit 4621) information from the user about the geographic location and store (e.g., with the storing unit 4615) the information as vehicle location information.

(F22) In some embodiments of the electronic device of F21, the processing unit is further configured to: upon determining that the positioning information satisfies the accuracy criteria, automatically, and without instructions from a user, store (e.g., with the storing unit 4615) the positioning information as the vehicle location information.

(F23) In some embodiments of the electronic device of F22, the processing unit is further configured to: in accordance with a determination that the user is heading towards the geographic location, display (e.g., with the displaying unit 4609 in conjunction with the display unit 4601) a user interface object that includes the vehicle location information.

(F24) In some embodiments of the electronic device of F23, the user interface object is a maps object that includes an identifier for the user's current location and a separate identifier for the geographic location.

(F25) In some embodiments of the electronic device of F24, the user interface object is displayed (e.g., with the displaying unit 4609 in conjunction with the display unit 4601) on a lock screen of the electronic device.

(F26) In some embodiments of the electronic device of F24, the user interface object is displayed (e.g., with the displaying unit 4609 in conjunction with the display unit 4601) in response to a swipe gesture that causes the electronic device to enter a search mode.

(F27) In some embodiments of the electronic device of F26, determining whether the user is heading towards the geographic location is performed in response to receiving the swipe gesture.

(F28) In some embodiments of the electronic device of any one of F21-F27, the prompt is an audio prompt provided by a virtual assistant that is available via the electronic device, receiving the information from the user includes receiving (e.g., with the receiving unit 4621) a verbal description from the user that identifies the geographic location, and displaying the user interface object includes displaying (e.g., with the displaying unit 4609 in conjunction with the display unit 4601) a selectable affordance that, when selected (e.g., via the selecting unit 4619), causes the device to playback (e.g., with the playback unit 4625) the verbal description.

(F29) In some embodiments of the electronic device of any one of F21-F27, the prompt is displayed on the display (e.g., with the displaying unit 4609 in conjunction with the display unit 4601) of the electronic device, receiving the information from the user includes receiving (e.g., with the receiving unit 4621) a textual description from the user that identifies the geographic location, and displaying the user interface object includes displaying the textual description from the user.

(F30) In some embodiments of the electronic device of any one of F21-F27, determining whether the user is heading towards the geographic location includes using new positioning information received (e.g., with the receiving unit 4621) from the location sensor unit (e.g., the location sensor unit 4607) to determine (e.g., with the determining unit 4613) that the electronic device is moving towards the geographic location.

(F31) In some embodiments of the electronic device of F30, determining whether the user is heading towards the geographic location includes (i) determining (e.g., with the determining unit 4613) that the electronic device remained at a different geographic location for more than a threshold period of time and (ii) determining (e.g., with the determining unit 4613) that the new positioning information indicates that the electronic device is moving away from the different geographic location and towards the geographic location.

(F32) In some embodiments of the electronic device of any one of F21-F31, determining that the user is in the vehicle that has come to rest at the geographic location includes (i) determining that the user is in the vehicle by determining (e.g., with the determining unit 4613) that the electronic device is travelling above a threshold speed (ii) determining that the vehicle has come to rest at the geographic location by one or more of: (a) determining (e.g., with the determining unit 4613) that the electronic device has remained at the geographic location for more than a threshold period of time, (b) determining (e.g., with the determining unit 4613) that a communications link between the electronic device and the vehicle has been disconnected, and (c) determining (e.g., with the determining unit 4613) that the geographic location corresponds to a location within a parking lot.

(F33) In some embodiments of the electronic device of F32, determining that the vehicle has come to rest at the geographic location includes determining (e.g., with the determining unit 4613) that the electronic device has remained at the geographic location for more than a threshold period of time.

(F34) In some embodiments of the electronic device of any one of F32-F33, determining that the vehicle has come to rest at the geographic location includes determining (e.g., with the determining unit 4613) that a communications link between the electronic device and the vehicle has been disconnected.

(F35) In some embodiments of the electronic device of any one of F32-F34, determining that the vehicle has come to rest at the geographic location includes determining (e.g., with the determining unit 4613) that the geographic location corresponds to a location within a parking lot.

(F36) In some embodiments of the electronic device of any one of F21-F35, the accuracy criteria includes a criterion that is satisfied when accuracy of a GPS reading associated with the positioning information is above a threshold level of accuracy.

(G1) In accordance with some embodiments, a method is performed at an electronic device (e.g., portable multifunction device 100, FIG. 1A, configured in accordance with any one of Computing Device A-D, FIG. 1E) with a location sensor and a touch-sensitive surface (e.g., touch-sensitive surface 195, FIG. 1D) and a display (e.g., display 194, FIG. 1D). The method includes: monitoring, using the location sensor, a geographic position of the electronic device. The method further includes: determining, based on the monitored geographic position, that the electronic device is within a threshold distance of a point of interest of a predetermined type. The method also includes: in accordance with determining that the electronic device is within the threshold distance of the point of interest: identifying at least one activity that is currently popular at the point of interest and retrieving information about the point of interest, including retrieving information about at least one activity that is currently popular at the point of interest. The method further includes: detecting, via the touch-sensitive surface, a first input that, when detected, causes the electronic device to enter a search mode; and in response to detecting the first input, entering the search mode, wherein entering the search mode includes, before receiving any user input at the search interface, presenting, via the display, an affordance that includes (i) the information about the at least one activity and (ii) an indication that the at least one activity has been identified as currently popular at the point of interest.

(G2) In some embodiments of the method of claim G1, the method includes: detecting a second input; and in response to detecting the second input, updating the affordance to include available information about current activities at a second point of interest, distinct from the point of interest, the point of interest is within the threshold distance of the electronic device.

(G3) In some embodiments of the method of any one of G1-G2, the affordance further includes selectable categories of points of interest and the method further includes: detecting a selection of a respective selectable category; and in response to detecting the selection, updating the affordance to include information about additional points of interest that are located within a second threshold distance of the device.

(G4) In some embodiments of the method of any one of G1-G3, the point of interest is an amusement park and the retrieved information includes current wait times for rides at the amusement park.

(G5) In some embodiments of the method of claim G4, the retrieved information includes information about wait times for rides that are located within a predefined distance of the electronic device.

(G6) In some embodiments of the method of any one of G1-G3, the point of interest is a restaurant and the retrieved information includes information about popular menu items at the restaurant.

(G7) In some embodiments of the method of claim G6, the retrieved information is retrieved from a social network that is associated with the user of the electronic device.

(G8) In some embodiments of the method of any one of G1-G3, the point of interest is a movie theatre and the retrieved information includes information about show times for the movie theatre.

(G9) In some embodiments of the method of claim G8, the retrieved information is retrieved from a social network that is associated with the user of the electronic device.

(G10) In some embodiments of the method of any one of G1-G9, after unlocking the electronic device, the affordance is available in response to a swipe in a substantially horizontal direction over an initial page of a home screen of the electronic device.

(G11) In another aspect, an electronic device is provided. In some embodiments, the electronic device includes: a touch-sensitive surface, a display, a location sensor, one or more processors, and memory storing one or more programs which, when executed by the one or more processors, cause the electronic device to perform the method described in any one of G1-G10.

(G12) In yet another aspect, an electronic device is provided and the electronic device includes: a touch-sensitive surface, a display, a location sensor, and means for performing the method described in any one of G1-G10.

(G13) In still another aspect, a non-transitory computer-readable storage medium is provided. The non-transitory computer-readable storage medium stores executable instructions that, when executed by an electronic device with a touch-sensitive surface, a display, and a location sensor, cause the electronic device to perform the method described in any one of G1-G10.

(G14) In still one more aspect, a graphical user interface on an electronic device with a touch-sensitive surface, a display, and a location sensor, is provided. In some embodiments, the graphical user interface includes user interfaces displayed in accordance with the method described in any one of G1-G10. In one more aspect, an information processing apparatus for use in an electronic device that includes a touch-sensitive surface, a display, and a location sensor is provided. The information processing apparatus includes: means for performing the method described in any one of G1-G10.

(G15) In one additional aspect, an electronic device is provided that includes a display unit (e.g., display unit 4701, FIG. 47), a touch-sensitive surface unit (e.g., touch-sensitive surface unit 4703, FIG. 47), a location sensor unit 4707, and a processing unit (e.g., processing unit 4705, FIG. 47). The processing unit is coupled with the touch-sensitive surface unit, the display unit, and the location sensor unit. In some embodiments, the electronic device is configured in accordance with any one of the computing devices shown in FIG. 1E (i.e., Computing Devices A-D). For ease of illustration, FIG. 47 shows display unit 4701 and touch-sensitive surface unit 4703 as integrated with electronic device 4700, however, in some embodiments one or both of these units are in communication with the electronic device, although the units remain physically separate from the electronic device. In some embodiments, the touch-sensitive surface unit and the display unit are integrated in a single touch-sensitive display unit (also referred to herein as a touch-sensitive display). The processing unit includes a detecting unit (e.g., detecting unit 4709, FIG. 47), a displaying unit (e.g., displaying unit 4711, FIG. 47), a retrieving unit (e.g., retrieving unit 4713, FIG. 47), a determining unit (e.g., determining unit 4715, FIG. 47), an identifying unit (e.g., identifying unit 4717, FIG. 47), an unlocking unit (e.g., unlocking unit 4719, FIG. 47), and a search mode entering unit (e.g., search mode entering unit 4721, FIG. 47). The processing unit (or one or more components thereof, such as the units 4709-4721) is configured to: without receiving any instructions from a user of the electronic device: monitor, using the location sensor unit (e.g., the location sensor unit 4707), a geographic position of the electronic device; determine (e.g., with the determining unit 4715), based on the monitored geographic position, that the electronic device is within a threshold distance of a point of interest of a predetermined type; in accordance with determining that the electronic device is within the threshold distance of the point of interest: identify (e.g., with the identifying unit 4717) at least one activity that is currently popular at the point of interest; retrieve (e.g., with the retrieving unit 4713) information about the point of interest, including retrieving information about at least one activity that is currently popular at the point of interest; detect (e.g., with the detecting unit 4709), via the touch-sensitive surface unit (e.g., the touch-sensitive surface unit 4703), a first input that, when detected, causes the electronic device to enter a search mode; and in response to detecting the first input, enter the search mode (e.g., with the search mode entering unit 4721), and entering the search mode includes, before receiving any user input at the search interface, presenting (e.g., with the displaying unit 4711), via the display unit (e.g., the display unit 4701), an affordance that includes (i) the information about the at least one activity and (ii) an indication that the at least one activity has been identified as currently popular at the point of interest.

(G16) In some embodiments of the electronic device of G15, the processing unit is further configured to: detect (e.g., with the detecting unit 4709) a second input; and in response to detecting the second input, update (e.g., with the displaying unit 4711) the affordance to include available information about current activities at a second point of interest, distinct from the point of interest, and the point of interest is within the threshold distance of the electronic device.

(G17) In some embodiments of the electronic device of any one of G15-G16, the affordance further includes selectable categories of points of interest and the processing unit is further configured to: detect (e.g., with the detecting unit 4709) a selection of a respective selectable category; and in response to detecting the selection, update (e.g., with the displaying unit 4711) the affordance to include information about additional points of interest that are located within a second threshold distance of the device.

(G18) In some embodiments of the electronic device of any one of G15-G17, the point of interest is an amusement park and the retrieved information includes current wait times for rides at the amusement park.

(G19) In some embodiments of the electronic device of G18, the retrieved information includes information about wait times for rides that are located within a predefined distance of the electronic device.

(G20) In some embodiments of the electronic device of any one of G15-G17, the point of interest is a restaurant and the retrieved information includes information about popular menu items at the restaurant.

(G21) In some embodiments of the electronic device of G20, the retrieved information is retrieved from a social network that is associated with the user of the electronic device.

(G22) In some embodiments of the electronic device of any one of G15-G17, the point of interest is a movie theatre and the retrieved information includes information about show times for the movie theatre.

(G23) In some embodiments of the electronic device of G22, the retrieved information is retrieved from a social network that is associated with the user of the electronic device.

(G24) In some embodiments of the electronic device of any one of G15-G23, after unlocking (e.g., with the unlocking unit 4719) the electronic device, the affordance is available in response to a swipe in a substantially horizontal direction over an initial page of a home screen of the electronic device.

(H1) In accordance with some embodiments, a method is performed at an electronic device (e.g., portable multifunction device 100, FIG. 1A, configured in accordance with any one of Computing Device A-D, FIG. 1E) with a touch-sensitive surface and display (in some embodiments, the touch-sensitive surface and the display are integrated, as is shown for touch screen 112, FIG. 1C). The method includes: receiving at least a portion of a voice communication (e.g., 10 seconds or less of a live phone call or a recorded voicemail), the portion of the voice communication including speech provided by a remote user of a remote device that is distinct from a user of the electronic device. The method also includes: extracting a content item based at least in part on the speech provided by the remote user of the remote device. The method further includes: determining whether the content item is currently available on the electronic device. In accordance with a determination that the content item is not currently available on the electronic device, the method includes: (i) identifying an application that is associated with the content item and (ii) displaying a selectable description of the content item on the display. In response to detecting a selection of the selectable description, the method includes: storing the content item for presentation with the identified application (e.g., storing the content item so that it is available for presentation by the identified application). In this way, users are able to store content items that were mentioned or discussed on the voice communication, without having to remember all of the details that were discussed and then later input those details to create appropriate content items. Instead, the electronic device is able to detect and extract content items based on speech that describes various respective content items, and then provide a selectable description of the content item that can be selected by the user in order to store a respective content item on the electronic device.

(H2) In some embodiments of the method of H1, the content item is a new event.

(H3) In some embodiments of the method of H1, the content item is new event details for an event that is currently associated with a calendar application on the electronic device.

(H4) In some embodiments of the method of H1, the content item is a new contact.

(H5) In some embodiments of the method of H1, the content item is new contact information for an existing contact that is associated with a telephone application on the electronic device.

(H6) In some embodiments of the method of any one of H1-H5, the voice communication is a live phone call.

(H7) In some embodiments of the method of any one of H1-H5, the voice communication is a live FaceTime call.

(H8) In some embodiments of the method of any one of H1-H5, the voice communication is a recorded voicemail.

(H9) In some embodiments of the method of any one of H1-H8, displaying the selectable description includes displaying the selectable description within a user interface that includes recent calls made using a telephone application. In this way, users are easily and conveniently able to access extracted content items (e.g., those that were extracted during respective voice communications) directly from the user interface that includes recent calls.

(H10) In some embodiments of the method of H9, the selectable description is displayed with an indication that the content item is associated with the voice communication.

(H11) In some embodiments of the method of H9, detecting the selection includes receiving the selection while the user interface that includes recent calls is displayed.

(H12) In some embodiments of the method of any one of H1-H11, the method further includes: in conjunction with displaying the selectable description of the content item, providing feedback (e.g., haptic feedback generated by the electronic device or presentation of a user interface object on a second device so that the user does not have to remove the phone from their ear during a phone call) to the user of the electronic device that the content item has been detected. In this way, the user is provided with a simple indication that a content item has been detected/extracted during the voice communication and the user can then decide whether to store the content item.

(H13) In some embodiments of the method of H12, providing feedback includes sending information regarding detection of the content item to a different electronic device (e.g., a laptop, a television monitor, a smart watch, and the like) that is proximate to the electronic device. In this way, the user does not have to interrupt the voice communication but can still view details related to the detected/extracted content item on a different device.

(H14) In some embodiments of the method of any one of H1-H13, the method further includes: determining that the voice communication includes information about a first physical location (e.g., an address mentioned during the phone call or a restaurant name discussed during the phone call, and the like, additional details are provided below). The method also includes: detecting an input and, in response to detecting the input, opening an application that is capable of accepting location data and populating the application with information about the first physical location. In this way, in addition to detecting and extracting event and contact information, the electronic device is able to extract location information discussed on the voice communication and provide that location information to the user in an appropriate application (e.g., so that the user is not burdened with remembering specific location details discussed on a phone call, especially new details that may be unfamiliar to the user, the device extracts those location details and displays them for use by the user).

(H15) In some embodiments of the method of H14, the application is a maps application and populating the maps application with information about the first physical location includes populating a map that is displayed within the maps application with a location identifier that corresponds to the first physical location. In this way, the user is able to easily use newly extracted location details to travel to a new destination, view how far away a particular location is, and other functions provided by the maps applications.

(H16) In some embodiments of the method of any one of H1-H13, the method further includes: determining that the voice communication includes information about a first physical location. The method also includes: detecting an input (e.g., a search activation gesture, such as the swipe gestures discussed in detail below) and, in response to detecting the input, populating a search interface with information about the first physical location. In this way, in addition to (or as an alternative to) offering location information to users for use in specific applications, the electronic device is also able to offer the location information for use in a search interface (e.g., to search for related points of interest or to search for additional details about the first physical location, such as a phone number, a menu, and the like).

(H17) In some embodiments of the method of any one of H1-H16, extracting the content item includes analyzing the portion of the voice communication to detect content of a predetermined type, and the analyzing is performed while outputting the voice communication via an audio system in communication with the electronic device (e.g., the voice communication is analyzed in real-time while the voice communication is being output to the user of the electronic device).

(H18) In some embodiments of the method of H17, analyzing the voice communication includes: (i) converting the speech provided by the remote user of the remote device to text; (ii) applying a natural language processing algorithm to the text to determine whether the text includes one or more predefined keywords; and (iii) in accordance with a determination that the text includes a respective predefined keyword, determining that the voice communication includes speech that describes the content item.

(H19) In some embodiments of the method of any one of H1-H18, receiving at least the portion of the voice communication includes receiving an indication from a user of the electronic device that the portion of the voice communication should be analyzed.

(H20) In some embodiments of the method of H19, the indication corresponds to selection of a hardware button (e.g., the user selects the hardware button while the voice communication is being output by an audio system to indicate that a predetermined number of seconds of the voice communication should be analyzed (e.g., a previous 10, 15, or 20 seconds)). In some embodiments, the button may also be a button that is presented for user selection on the display of the electronic device (e.g., a button that is displayed during the voice communication that says "tap here to analyze this voice communication for new content").

(H21) In some embodiments of the method of H19, the indication corresponds to a command from a user of the electronic device that includes the words "hey Siri." Thus, the user is able to easily instruct the electronic device to begin analyzing the portion of the voice communication to detect content items (such as events, contact information, and information about physical locations) discussed on the voice communication.

(H22) In some embodiments of the method of any one of H1-H21, the method further includes: receiving a second portion of the voice communication, the second portion including speech provided by the remote user of the remote device and speech provided by the user of the electronic device (e.g., the voice communication is a live phone call and the second portion includes a discussion between the user and the remote user). The method also includes: extracting a second content item based at least in part on the speech provided by the remote user of the remote device and the speech provided by the user of the electronic device. In accordance with a determination that the second content item is not currently available on the electronic device, the method includes: (i) identifying a second application that is associated with the second content item and (ii) displaying a second selectable description of the second content item on the display. In response to detecting a selection of the second selectable description, the method includes: storing the second content item for presentation with the identified second application.

(H23) In some embodiments of the method of H22, the selectable description and the second selectable description are displayed within a user interface that includes recent calls made using a telephone application. In this way, the user is provided with a single interface that conveniently includes content items detected on a number of voice communications (e.g., a number of phone calls, voicemails, or phone calls and voicemails).

(H24) In another aspect, an electronic device is provided. In some embodiments, the electronic device includes: a touch-sensitive surface, a display, one or more processors, and memory storing one or more programs which, when executed by the one or more processors, cause the electronic device to perform the method described in any one of H1-H23.

(H25) In yet another aspect, an electronic device is provided and the electronic device includes: a touch-sensitive surface, a display, and means for performing the method described in any one of H1-H23.

(H26) In still another aspect, a non-transitory computer-readable storage medium is provided. The non-transitory computer-readable storage medium stores executable instructions that, when executed by an electronic device with a touch-sensitive surface and a display, cause the electronic device to perform the method described in any one of H1-H23.

(H27) In still one more aspect, a graphical user interface on an electronic device with a touch-sensitive surface and a display is provided. In some embodiments, the graphical user interface includes user interfaces displayed in accordance with the method described in any one of H1-H23.

(H28) In one more aspect, an information processing apparatus for use in an electronic device that includes a touch-sensitive surface and a display is provided. The information processing apparatus includes: means for performing the method described in any one of H1-H23.

(H29) In one additional aspect, an electronic device is provided that includes a display unit (e.g., display unit 4801, FIG. 48), a touch-sensitive surface unit (e.g., touch-sensitive surface unit 4803, FIG. 48), and a processing unit (e.g., processing unit 4805, FIG. 48). In some embodiments, the electronic device is configured in accordance with any one of the computing devices shown in FIG. 1E (e.g., Computing Devices A-D). For ease of illustration, FIG. 48 shows display unit 4801 and touch-sensitive surface unit 4803 as integrated with electronic device 4800, however, in some embodiments one or both of these units are in communication with the electronic device, although the units remain physically separate from the electronic device. The processing unit includes a voice communication receiving unit (e.g., voice communication receiving unit 4807, FIG. 48), a content item extracting unit (e.g., content item extracting unit 4809, FIG. 48), an availability determining unit (e.g., availability determining unit 4811, FIG. 48), an application identifying unit (e.g., application identifying unit 4813, FIG. 48), a displaying unit (e.g., displaying unit 4815, FIG. 48), a content item storing unit (e.g., content item storing unit 4817, FIG. 48), a feedback providing unit (e.g., feedback providing unit 4819, FIG. 48), an input detecting unit (e.g., input detecting unit 4821, FIG. 48), an application opening unit (e.g., receiving unit 4823, FIG. 48), a populating unit (e.g., populating unit 4825, FIG. 48), and a voice communication analyzing unit (e.g., voice communication analyzing unit 4827, FIG. 48). The processing unit (or one or more components thereof, such as the units 4807-4827) is configured to: receive at least a portion of a voice communication (e.g., with the voice communication receiving unit 4807), the portion of the voice communication including speech provided by a remote user of a remote device that is distinct from a user of the electronic device. The processing unit is further configured to: extract a content item (e.g., with the content item extracting unit 4809) based at least in part on the speech provided by the remote user of the remote device and determine whether the content item is currently available on the electronic device (e.g., with the availability determining unit 4811). In accordance with a determination that the content item is not currently available on the electronic device, the processing unit is further configured to: (i) identify an application that is associated with the content item (e.g., with the application identifying unit 4813) and (ii) display a selectable description of the content item on the display (e.g., with the displaying unit 4815 and/or the display unit 4801). In response to detecting a selection of the selectable description (e.g., with the input detecting unit 4821 and/or the touch-sensitive surface unit 4803), the processing unit is configured to: store the content item for presentation with the identified application (e.g., with the content item storing unit 4817).

(H30) In some embodiments of the electronic device of H29, the processing unit (or one or more components thereof, such as the units 4907-4927) is further configured to perform the method described in any one of H2-H23.

(I1) In accordance with some embodiments, a method is performed at an electronic device (e.g., portable multifunction device 100, FIG. 1A, configured in accordance with any one of Computing Device A-D, FIG. 1E) with a touch-sensitive surface and display (in some embodiments, the touch-sensitive surface and the display are integrated, as is shown for touch screen 112, FIG. 1C). The method includes: receiving at least a portion of a voice communication, the portion of the voice communication (e.g., a live phone call, a recorded voicemail) including speech provided by a remote user of a remote device that is distinct from a user of the electronic device. The method also includes: determining that the voice communication includes speech that identifies a physical location. In response to determining that the voice communication includes speech that identifies the physical location, the method includes: providing an indication (e.g., providing haptic feedback to the user, displaying a user interface object with information about the physical location, or sending to a nearby device information about the physical location for display at that nearby device) that information about the physical location has been detected. The method additionally includes: detecting, via the touch-sensitive surface, an input. In response to detecting the input, the method includes: (i) opening an application that accepts geographic location data; and (ii) populating the application with information about the physical location. In this way, users are able to store information about physical locations mentioned or discussed on the voice communication, without having to remember all of the details that were discussed and then later input those details at an appropriate application. Instead, the electronic device is able to detect and extract information about physical locations based on speech that describes physical locations (e.g., a description of a restaurant, driving directions for a physical location, etc.), and then provide an indication that information about a respective physical location has been detected.

(I2) In some embodiments of the method of I1, the voice communication is a live phone call.

(I3) In some embodiments of the method of I1, the voice communication is a live FaceTime call.

(I4) In some embodiments of the method of I1, the voice communication is a recorded voicemail.

(I5) In some embodiments of the method of any one of I1-I4, providing the indication includes displaying a selectable description of the physical location within a user interface that includes recent calls made using a telephone application.

(I6) In some embodiments of the method of I5, the selectable description indicates that the content item is associated with the voice communication.

(I7) In some embodiments of the method of any one of I5-I6, detecting the input includes detecting the input over the selectable description while the user interface that includes recent calls is displayed.

(I8) In some embodiments of the method of any one of I1-I7, providing the indication includes providing haptic feedback to the user of the electronic device.

(I9) In some embodiments of the method of any one of I1-I8, providing the indication includes sending information regarding the physical location to a different electronic device that is proximate to the electronic device.

(I10) In some embodiments of the method of any one of I1-I9, determining that the voice communication includes speech that describes the physical location includes analyzing the portion of the voice communication to detect information about physical locations, and the analyzing is performed while outputting the voice communication via an audio system in communication with the electronic device.

(I11) In some embodiments of the method of any one of I1-I10, receiving at least the portion of the voice communication includes receiving an instruction from a user of the electronic device that the portion of the voice communication should be analyzed.

(I12) In some embodiments of the method of I11, the instruction corresponds to selection of a hardware button. In some embodiments, the button may also be a button that is presented for user selection on the display of the electronic device (e.g., a button that is displayed during the voice communication that says "tap here to analyze this voice communication for new content").

(I13) In some embodiments of the method of I11, the instruction corresponds to a command from a user of the electronic device that includes the words "hey Siri."

(I14) In another aspect, an electronic device is provided. In some embodiments, the electronic device includes: a touch-sensitive surface, a display, one or more processors, and memory storing one or more programs which, when executed by the one or more processors, cause the electronic device to perform the method described in any one of I1-I13.

(I15) In yet another aspect, an electronic device is provided and the electronic device includes: a touch-sensitive surface, a display, and means for performing the method described in any one of I1-I13.

(I16) In still another aspect, a non-transitory computer-readable storage medium is provided. The non-transitory computer-readable storage medium stores executable instructions that, when executed by an electronic device with a touch-sensitive surface and a display, cause the electronic device to perform the method described in any one of I1-I13.

(I17) In still one more aspect, a graphical user interface on an electronic device with a touch-sensitive surface and a display is provided. In some embodiments, the graphical user interface includes user interfaces displayed in accordance with the method described in any one of I1-I13.

(I18) In one more aspect, an information processing apparatus for use in an electronic device that includes a touch-sensitive surface and a display is provided. The information processing apparatus includes: means for performing the method described in any one of I1-I13.

(I19) In one additional aspect, an electronic device is provided that includes a display unit (e.g., display unit 4901, FIG. 49), a touch-sensitive surface unit (e.g., touch-sensitive surface unit 4903, FIG. 49), and a processing unit (e.g., processing unit 4905, FIG. 49). In some embodiments, the electronic device is configured in accordance with any one of the computing devices shown in FIG. 1E (e.g., Computing Devices A-D). For ease of illustration, FIG. 49 shows display unit 4901 and touch-sensitive surface unit 4903 as integrated with electronic device 4900, however, in some embodiments one or both of these units are in communication with the electronic device, although the units remain physically separate from the electronic device. The processing unit includes a voice communication receiving unit (e.g., voice communication receiving unit 4907, FIG. 49), a content item extracting unit (e.g., content item extracting unit 4909, FIG. 49), an indication providing unit (e.g., indication providing unit 4911, FIG. 49), an input detecting unit (e.g., input detecting unit 4913, FIG. 49), an application opening unit (e.g., application opening unit 4915, FIG. 49), an application populating unit (e.g., application populating unit 4917, FIG. 49), a feedback providing unit (e.g., feedback providing unit 4919, FIG. 49), and a voice communication analyzing unit (e.g., voice communication analyzing unit 4921, FIG. 49). The processing unit (or one or more components thereof, such as the units 4907-4921) is configured to: receive at least a portion of a voice communication, the portion of the voice communication including speech provided by a remote user of a remote device that is distinct from a user of the electronic device (e.g., with the voice communication receiving unit 4907). The processing unit is further configured to: determine that the voice communication includes speech that identifies a physical location (e.g., with the content item extracting unit 4909). In response to determining that the voice communication includes speech that identifies the physical location, the processing unit is configured to: provide an indication that information about the physical location has been detected (e.g., with the content item extracting unit 4909). The processing unit is also configured to: detect, via the touch-sensitive surface unit, an input (e.g., with the input detecting unit 4911). In response to detecting the input, the processing unit is configured to: (i) open an application that accepts geographic location data (e.g., with the application opening unit 4913) and (ii) populate the application with information about the physical location (e.g., with the application populating unit 4915).

(I20) In some embodiments of the electronic device of I19, the processing unit (or one or more components thereof, such as the units 4907-4921) is further configured to perform the method described in any one of I2-I13.

(J1) In accordance with some embodiments, a method is performed at an electronic device (e.g., portable multifunction device 100, FIG. 1A, configured in accordance with any one of Computing Device A-D, FIG. 1E) with a touch-sensitive surface and display (in some embodiments, the touch-sensitive surface and the display are integrated, as is shown for touch screen 112, FIG. 1C). The method includes: presenting, in a messaging application on the display, a text-input field and a conversation transcript. The method also includes: while the messaging application is presented on the display, determining that the next likely input from a user of the electronic device is information about a physical location. The method further includes: analyzing content associated with the text-input field and the conversation transcript to determine, based at least in part on a portion of the analyzed content, a suggested physical location. The method additionally includes: presenting, within the messaging application on the display, a selectable user interface element that identifies the suggested physical location and receiving a selection of the selectable user interface element. In response to receiving the selection, the method includes: presenting in the text-input field a representation of the suggested physical location. In this way, the user of the electronic device is conveniently provided with needed content without having to type anything and without having to search for the content (e.g., the user can simply select the selectable user interface element to input their current address without having to access a maps application to determine their exact location, switch back to the messaging application, and provide an explicit input to send location information).

(J2) In some embodiments of the method of J1, the messaging application includes a virtual keyboard and the selectable user interface element is displayed in a suggestions portion that is adjacent to and above the virtual keyboard.

(J3) In some embodiments of the method of any one of J1-J2, determining that the next likely input from the user of the electronic device is information about a physical location includes processing the content associated with the text-input field and the conversation transcript to detect that the conversation transcription includes a question about the user's current location. In this way, the user is provided with a suggested physical location that is directly relevant to a discussion in the conversation transcription (e.g., in response to a second user's question of "where are you?" the user is presented with a user interface object that when selected causes the device to send information about the user's current location to the second user).

(J4) In some embodiments of the method of J3, processing the content includes applying a natural language processing algorithm to detect one or more predefined keywords that form the question (e.g., "where are you?" or "what is your home address?").

(J5) In some embodiments of the method of any one of J3-J4, the question is included in a message that is received from a second user, distinct from the user.

(J6) In some embodiments of the method of any one of J1-J5, determining that the next likely input from the user of the electronic device is information about a physical location includes monitoring typing inputs received from a user in the text-input portion of the messaging application.

(J7) In some embodiments of the method of any one of J1-J6, the method further includes: in accordance with a determination that the user is typing and has not selected the selectable user interface element, ceasing to present the selectable user interface element. In this way, the device does not continue presenting the selectable user interface object if it can be determined that the user is not interested in selecting the object.

(J8) In some embodiments of the method of any one of J1-J7, the method further includes: in accordance with a determination that the user has provided additional input that indicates that the user will not select the selectable user interface element, ceasing to present the selectable user interface element. In this way, the device does not continue presenting the selectable user interface object if it can be determined that the user is not interested in selecting the object.

(J9) In some embodiments of the method of any one of J1-J5, the representation of the suggested physical location includes information identifying a current geographic location of the electronic device.

(J10) In some embodiments of the method of any one of J1-J9, the representation of the suggested physical location is an address.

(J11) In some embodiments of the method of any one of J1-J9, the suggested physical location is a maps object that includes an identifier for the suggested physical location.

(J12) In some embodiments of the method of any one of J1-J11, the suggested physical location corresponds to a location that the user recently viewed in an application other than the messaging application.

(J13) In some embodiments of the method of any one of J1-J12, the messaging application is an email application.

(J14) In some embodiments of the method of any one of J1-J12, the messaging application is a text-messaging application.

(J15) In another aspect, an electronic device is provided. In some embodiments, the electronic device includes: a touch-sensitive surface, a display, one or more processors, and memory storing one or more programs which, when executed by the one or more processors, cause the electronic device to perform the method described in any one of J1-J14.

(J16) In yet another aspect, an electronic device is provided and the electronic device includes: a touch-sensitive surface, a display, and means for performing the method described in any one of J1-J14.

(J17) In still another aspect, a non-transitory computer-readable storage medium is provided. The non-transitory computer-readable storage medium stores executable instructions that, when executed by an electronic device with a touch-sensitive surface and a display, cause the electronic device to perform the method described in any one of J1-J14.

(J18) In still one more aspect, a graphical user interface on an electronic device with a touch-sensitive surface and a display is provided. In some embodiments, the graphical user interface includes user interfaces displayed in accordance with the method described in any one of J1-J14.

(J19) In one more aspect, an information processing apparatus for use in an electronic device that includes a touch-sensitive surface and a display is provided. The information processing apparatus includes: means for performing the method described in any one of J1-J14.

(J20) In one additional aspect, an electronic device is provided that includes a display unit (e.g., display unit 5001, FIG. 50), a touch-sensitive surface unit (e.g., touch-sensitive surface unit 5003, FIG. 50), and a processing unit (e.g., processing unit 5005, FIG. 50). In some embodiments, the electronic device is configured in accordance with any one of the computing devices shown in FIG. 1E (e.g., Computing Devices A-D). For ease of illustration, FIG. 50 shows display unit 5001 and touch-sensitive surface unit 5003 as integrated with electronic device 5000, however, in some embodiments one or both of these units are in communication with the electronic device, although the units remain physically separate from the electronic device. The processing unit includes a presenting unit (e.g., presenting unit 5007, FIG. 50), a next input determining unit (e.g., next input determining unit 5009, FIG. 50), a content analyzing unit (e.g., content analyzing unit 5011, FIG. 50), a selection receiving unit (e.g., selection receiving unit 5013, FIG. 50), a typing input monitoring unit (e.g., typing input monitoring unit 5015, FIG. 50), and a presentation ceasing unit (e.g., presentation ceasing unit 5017, FIG. 50). The processing unit (or one or more components thereof, such as the units 5007-5017) is configured to: present, in a messaging application on the display, a text-input field and a conversation transcript (e.g., with the presenting unit 5007 and/or the display unit 5001). While the messaging application is presented on the display, the processing unit is also configured to: determine that the next likely input from a user of the electronic device is information about a physical location (e.g., with the next input determining unit 5009). The processing unit is additionally configured to: analyze content associated with the text-input field and the conversation transcript to determine, based at least in part on a portion of the analyzed content, a suggested physical location (e.g., with the content analyzing unit 5011); present, within the messaging application on the display, a selectable user interface element that identifies the suggested physical location (e.g., with the presenting unit 5007); receive a selection of the selectable user interface element (e.g., with the selection receiving unit 5013 and/or the touch-sensitive surface unit 5003); and in response to receiving the selection, present in the text-input field a representation of the suggested physical location (e.g., with the presenting unit 5007).

(J21) In some embodiments of the electronic device of J20, the processing unit (or one or more components thereof, such as the units 5007-5017) is further configured to perform the method described in any one of J2-J14.

(K1) In accordance with some embodiments, a method is performed at an electronic device (e.g., portable multifunction device 100, FIG. 1A, configured in accordance with any one of Computing Device A-D, FIG. 1E) with a touch-sensitive surface and display (in some embodiments, the touch-sensitive surface and the display are integrated, as is shown for touch screen 112, FIG. 1C). The method includes: while displaying a first application, obtaining information identifying a first physical location viewed by a user in the first application (e.g., a restaurant searched for by the user in application that allows for searching local businesses). The method also includes: exiting the first application and, after exiting the first application, receiving a request from the user to open a second application that is distinct from the first application. In some embodiments, the request is received without receiving any input at the first application (e.g., the request does not including clicking a link or button within the first application). In response to receiving the request and in accordance with a determination that the second application is capable of accepting geographic location information, the method includes: presenting the second application, and presenting the second application includes populating the second application with information that is based at least in part on the information identifying the first physical location. In this way, a user does not need to manually transfer information between two distinct applications. Instead, the device intelligently determines that a second application is capable of accepting geographic location information and then populates information about a physical location that was viewed in a first application directly into the second application (e.g., populating a maps object in the second application to include an identifier for the physical location).

(K2) In some embodiments of the method of K1, receiving the request to open the second application includes, after exiting the first application, detecting an input over an affordance for the second application. In other words, the request does not correspond to clicking on a link within the first application and, instead the user explicitly and directly requests to open the second application and the device then decides to populate the second application with information about a previously viewed physical location (previously viewed in a distinct first application) so that the user can further research or investigate that previously viewed physical location in the second application.

(K3) In some embodiments of the method of K2, the affordance for the second application is an icon that is displayed within a home screen of the electronic device. In some embodiments, the home screen is a system-level component of the operating system that includes icons for invoking applications that are available on the electronic device.

(K4) In some embodiments of the method of K2, detecting the input includes: (i) detecting a double tap at a physical home button, (ii) in response to detecting the double tap, displaying an application-switching user interface, and (iii) detecting a selection of the affordance from within the application-switching user interface.

(K5) In some embodiments of the method of any one of K1-K4, populating the second application includes displaying a user interface object that includes information that is based at least in part on the information identifying the first physical location.

(K6) In some embodiments of the method of K5, the user interface object includes a textual description informing the user that the first physical location was recently viewed in the first application.

(K7) In some embodiments of the method of K6, the user interface object is a map displayed within the second application and populating the second application includes populating the map to include an identifier of the first physical location.

(K8) In some embodiments of the method of any one of K6-K7, the second application is presented with a virtual keyboard and the user interface object is displayed above the virtual keyboard.

(K9) In some embodiments of the method of any one of K6-K8, obtaining the information includes obtaining information about a second physical location and displaying the user interface object includes displaying the user interface object with the information about the second physical location.

(K10) In some embodiments of the method of any one of K1-K9, the determination that the second application is capable of accepting geographic location information includes one or more of: (i) determining that the second application includes an input-receiving field that is capable of accepting and processing geographic location data; (ii) determining that the second application is capable of displaying geographic location information on a map; (iii) determining that the second application is capable of using geographic location information to facilitate route guidance; and (iv) determining that the second application is capable of using geographic location information to locate and provide transportation services.

(K11) In some embodiments of the method of K10, the determination that the second application is capable of accepting geographic location information includes determining that the second application includes an input-receiving field that is capable of accepting and processing geographic location data, and the input-receiving field is a search box that allows for searching within a map that is displayed within the second application.

(K12) In some embodiments of the method of any one of K1-K11, the method further includes: in response to receiving the request, determining, based on an application usage history for the user, whether the second application is associated (e.g., has been opened a threshold number of times after opening the first application) with the first application.

(K13) In some embodiments of the method of K12, the method further includes: before presenting the second application, providing access to the information identifying the first physical location to the second application, and before being provided with the access the second application had no access to the information identifying the first physical location. In this way, the second application is able to receive information about actions conducted by a user in a first application, so that the user is then provided with a way to use that information within the second application (e.g., to search for more information about the first physical location or to use the first physical location for some service available through the second application, such as a ride-sharing service).

(K14) In another aspect, an electronic device is provided. In some embodiments, the electronic device includes: a touch-sensitive surface, a display, one or more processors, and memory storing one or more programs which, when executed by the one or more processors, cause the electronic device to perform the method described in any one of K1-K13.

(K15) In yet another aspect, an electronic device is provided and the electronic device includes: a touch-sensitive surface, a display, and means for performing the method described in any one of K1-K13.

(K16) In still another aspect, a non-transitory computer-readable storage medium is provided. The non-transitory computer-readable storage medium stores executable instructions that, when executed by an electronic device with a touch-sensitive surface and a display, cause the electronic device to perform the method described in any one of K1-K13.

(K17) In still one more aspect, a graphical user interface on an electronic device with a touch-sensitive surface and a display is provided. In some embodiments, the graphical user interface includes user interfaces displayed in accordance with the method described in any one of K1-K13.

(K18) In one more aspect, an information processing apparatus for use in an electronic device that includes a touch-sensitive surface and a display is provided. The information processing apparatus includes: means for performing the method described in any one of K1-K13.

(K19) In one additional aspect, an electronic device is provided that includes a display unit (e.g., display unit 5101, FIG. 51), a touch-sensitive surface unit (e.g., touch-sensitive surface unit 5103, FIG. 51), and a processing unit (e.g., processing unit 5105, FIG. 51). In some embodiments, the electronic device is configured in accordance with any one of the computing devices shown in FIG. 1E (e.g., Computing Devices A-D). For ease of illustration, FIG. 51 shows display unit 5101 and touch-sensitive surface unit 5103 as integrated with electronic device 5100, however, in some embodiments one or both of these units are in communication with the electronic device, although the units remain physically separate from the electronic device. The processing unit includes an information obtaining unit (e.g., information obtaining unit 5107, FIG. 51), an application exiting unit (e.g., application exiting unit 5109, FIG. 51), a request receiving unit (e.g., request receiving unit 5111, FIG. 51), an application capability determining unit (e.g., application capability determining unit 5113, FIG. 51), an application presenting unit (e.g., application presenting unit 5115, FIG. 51), an application populating unit (e.g., application populating unit 5117, FIG. 51), an input detecting unit (e.g., input detecting unit 5119, FIG. 51), an application-switching user interface displaying unit (e.g., application-switching user interface displaying unit 5121, FIG. 51), an application association determining unit (e.g., application association determining unit 5123, FIG. 51), and an access providing unit (e.g., access providing unit 5125, FIG. 51). The processing unit (or one or more components thereof, such as the units 5107-5125) is configured to: while displaying a first application, obtain information identifying a first physical location viewed by a user in the first application (e.g., with the information obtaining unit 5107). The processing unit is also configured to: exit the first application (e.g., with the application exiting unit 5109) and, after exiting the first application, receive a request from the user to open a second application that is distinct from the first application (e.g., with the request receiving unit 5111). In response to receiving the request and in accordance with a determination that the second application is capable of accepting geographic location information (e.g., a determination processed or conducted by the application capability determining unit 5113), present the second application (e.g., with the application presenting unit 5115), and presenting the second application includes populating the second application with information that is based at least in part on the information identifying the first physical location (e.g., with the application populating unit 5117).

(K20) In some embodiments of the electronic device of K19, the processing unit (or one or more components thereof, such as the units 5107-5125) is further configured to perform the method described in any one of K2-K13.

(L1) In accordance with some embodiments, a method is performed at an electronic device (e.g., portable multifunction device 100, FIG. 1A, configured in accordance with any one of Computing Device A-D, FIG. 1E) with a touch-sensitive surface and display (in some embodiments, the touch-sensitive surface and the display are integrated, as is shown for touch screen 112, FIG. 1C). The method includes: obtaining information identifying a first physical location viewed by a user in a first application and detecting a first input. In response to detecting the first input, the method includes: (i) identifying a second application that is capable of accepting geographic location information and (ii) presenting, over at least a portion of the display, an affordance that is distinct from the first application with a suggestion to open the second application with information about the first physical location. The method also includes: detecting a second input at the affordance. In response to detecting the second input at the affordance: (i) opening the second application and (ii) populating the second application to include information that is based at least in part on the information identifying the first physical location.

As compared to operations associated with K1 above, operations associated with L1 do not receive a specific request from a user to open the second application before providing a suggestion to the user to open the second application with information about the first physical location. In this way, by providing operations associated with both K1 above and L1 (and combinations thereof using some processing steps from each of these methods), the electronic device is able to provide an efficient user experience that allows for predictively using location data either before or after a user has opened an application that is capable of accepting geographic location information. Additionally, with L1, the determination that the second application is capable of accepting geographic location information is conducted before even opening the second application, and in this way, in embodiments of L1 in which the input corresponds to a request to open an application-switching user interface, the application-switching user interface only displays suggestions to open applications (e.g., the second application) with information about the first physical location if it is known that the app can accept location data.

(L2) In some embodiments of the method of L1, the first input corresponds to a request to open an application-switching user interface (e.g., the first input is a double tap on a physical home button of the electronic device)

(L3) In some embodiments of the method of L2, the affordance is presented within the application-switching user interface.

(L4) In some embodiments of the method of L3, presenting the affordance includes: in conjunction with presenting the affordance, presenting within the application-switching user interface representations of applications that are executing on the electronic device (e.g., snapshots of application content for the application); and presenting the affordance in a region of the display that is located below the representations of the applications.

(L5) In some embodiments of the method of L1, the first input corresponds to a request to open a home screen of the electronic device (e.g., the first input is a single tap on a physical home button of the electronic device).

(L6) In some embodiments of the method of L5, the affordance is presented over a portion of the home screen.

(L7) In some embodiments of the method of any one of L1-L6, the suggestion includes a textual description that is specific to a type associated with the second application.

(L8) In some embodiments of the method of any one of L1-L7, populating the second application includes displaying a user interface object that includes information that is based at least in part on the information identifying the first physical location.

(L9) In some embodiments of the method of L8, the user interface object includes a textual description informing the user that the first physical location was recently viewed in the first application.

(L10) In some embodiments of the method of L9, the user interface object is a map displayed within the second application and populating the second application includes populating the map to include an identifier of the first physical location.

(L11) In some embodiments of the method of any one of L9-L10, the second application is presented with a virtual keyboard and the user interface object is displayed above the virtual keyboard.

(L12) In some embodiments of the method of any one of L1-L11, identifying that the second application that is capable of accepting geographic location information includes one or more of: (i) determining that the second application includes an input-receiving field that is capable of accepting and processing geographic location data; (ii) determining that the second application is capable of displaying geographic location information on a map; (iii) determining that the second application is capable of using geographic location information to facilitate route guidance;

and (iv) determining that the second application is capable of using geographic location information to locate and provide transportation services.

(L13) In some embodiments of the method of L12, identifying that the second application is capable of accepting geographic location information includes determining that the second application includes an input-receiving field that is capable of accepting and processing geographic location data, and the input-receiving field is a search box that allows for searching within a map that is displayed within the second application.

(L14) In another aspect, an electronic device is provided. In some embodiments, the electronic device includes: a touch-sensitive surface, a display, one or more processors, and memory storing one or more programs which, when executed by the one or more processors, cause the electronic device to perform the method described in any one of L1-L13.

(L15) In yet another aspect, an electronic device is provided and the electronic device includes: a touch-sensitive surface, a display, and means for performing the method described in any one of L1-L13.

(L16) In still another aspect, a non-transitory computer-readable storage medium is provided. The non-transitory computer-readable storage medium stores executable instructions that, when executed by an electronic device with a touch-sensitive surface and a display, cause the electronic device to perform the method described in any one of L1-L13.

(L17) In still one more aspect, a graphical user interface on an electronic device with a touch-sensitive surface and a display is provided. In some embodiments, the graphical user interface includes user interfaces displayed in accordance with the method described in any one of L1-L13.

(L18) In one more aspect, an information processing apparatus for use in an electronic device that includes a touch-sensitive surface and a display is provided. The information processing apparatus includes: means for performing the method described in any one of L1-L13.

(L19) In one additional aspect, an electronic device is provided that includes a display unit (e.g., display unit 5201, FIG. 52), a touch-sensitive surface unit (e.g., touch-sensitive surface unit 5203, FIG. 52), and a processing unit (e.g., processing unit 5205, FIG. 52). In some embodiments, the electronic device is configured in accordance with any one of the computing devices shown in FIG. 1E (e.g., Computing Devices A-D). For ease of illustration, FIG. 52 shows display unit 5201 and touch-sensitive surface unit 5203 as integrated with electronic device 5200, however, in some embodiments one or both of these units are in communication with the electronic device, although the units remain physically separate from the electronic device. The processing unit includes an information obtaining unit (e.g., information obtaining unit 5207, FIG. 52), an input detecting unit (e.g., input detecting unit 5209, FIG. 52), an application identifying unit (e.g., application identifying unit 5211, FIG. 52), an affordance presenting unit (e.g., affordance presenting unit 5213, FIG. 52), an application opening unit (e.g., application opening unit 5215, FIG. 52), an application populating unit (e.g., application populating unit 5217, FIG. 52), an application-switching user interface presenting unit (e.g., application-switching user interface presenting unit 5219, FIG. 52), and an application capability determining unit (e.g., application capability determining unit 5221, FIG. 52). The processing unit (or one or more components thereof, such as the units 5207-5221) is configured to: obtain information identifying a first physical location viewed by a user in a first application (e.g., with the information obtaining unit 5207) and detect a first input (e.g., with the input detecting unit 5209). In response to detecting the first input, the processing unit is configured to: (i) identify a second application that is capable of accepting geographic location information (e.g., with the application identifying unit 5209) and (ii) present, over at least a portion of the display, an affordance that is distinct from the first application with a suggestion to open the second application with information about the first physical location (e.g., with the affordance presenting unit 5213). The processing unit is also configured to: detect a second input at the affordance (e.g., with the input detecting unit 5209). In response to detecting the second input at the affordance, the processing unit is configured to: (i) open the second application (e.g., with the application opening unit 5215) and (ii) populate the second application to include information that is based at least in part on the information identifying the first physical location (e.g., with the application populating unit 5217).

(L20) In some embodiments of the electronic device of L19, the processing unit (or one or more components thereof, such as the units 5207-5221) is further configured to perform the method described in any one of L2-L13.

(M1) In accordance with some embodiments, a method is performed at an electronic device (e.g., portable multifunction device 100, FIG. 1A, configured in accordance with any one of Computing Device A-D, FIG. 1E) with a touch-sensitive surface and display (in some embodiments, the touch-sensitive surface and the display are integrated, as is shown for touch screen 112, FIG. 1C). The method includes: obtaining information identifying a first physical location viewed by a user in a first application that is executing on the electronic device. The method also includes: determining that the user has entered a vehicle. In response to determining that the user has entered the vehicle, providing a prompt to the user to use the first physical location as a destination for route guidance. In response to providing the prompt, the method includes: receiving from the user an instruction to use the first physical location as the destination for route guidance. The method further includes: facilitating route guidance to the first physical location. In this way, users are conveniently provided with suggestions for routing destinations based on physical locations that they were viewing earlier in applications on the electronic device.

(M2) In some embodiments of the method of M1, the method further includes: detecting that a message has been received by the electronic device, including detecting that the message includes information identifying a second physical location; and, in response to the detecting, providing a new prompt to the user to use the second physical location as a new destination for route guidance. In this way, users are also able to dynamically add waypoints or add new destinations for route guidance based on information included in messages (e.g., texts, emails, voicemails, etc.).

(M3) In some embodiments of the method of M2, the method further includes: in response to receiving an instruction from the user to use the second physical location as the new destination, facilitating route guidance to the second physical location.

(M4) In some embodiments of the method of any one of M2-M3, detecting that the message includes the information identifying the second physical location includes performing the detecting while a virtual assistant available on the electronic device is reading the message to the user via an audio system that is in communication with the electronic device. In this way, as the user is listening to a message that is being read out by an audio system (e.g., via a personal assistant that is available via the electronic device), the electronic device detects that information identifying the second physical location and uses that detected information to suggest using the second physical location as a new destination. Thus, the user does not have to take their focus off of the road while driving, but is still able to dynamically adjust route guidance settings and destinations.

(M5) In some embodiments of the method of any one of M2-M4, determining that the user has entered the vehicle includes detecting that the electronic device has established a communications link with the vehicle.

(M6) In some embodiments of the method of any one of M2-M5, facilitating the route guidance includes providing the route guidance via the display of the electronic device.

(M7) In some embodiments of the method of any one of M2-M5, facilitating the route guidance includes sending, to the vehicle, the information identifying the first physical location.

(M8) In some embodiments of the method of any one M2-M7, facilitating the route guidance includes providing the route guidance via an audio system in communication with the electronic device (e.g., car's speakers or the device's own internal speakers).

(M9) In another aspect, an electronic device is provided. In some embodiments, the electronic device includes: a touch-sensitive surface, a display, one or more processors, and memory storing one or more programs which, when executed by the one or more processors, cause the electronic device to perform the method described in any one of M1-M8.

(M10) In yet another aspect, an electronic device is provided and the electronic device includes: a touch-sensitive surface, a display, and means for performing the method described in any one of M1-M8.

(M11) In still another aspect, a non-transitory computer-readable storage medium is provided. The non-transitory computer-readable storage medium stores executable instructions that, when executed by an electronic device with a touch-sensitive surface and a display, cause the electronic device to perform the method described in any one of M1-M8.

(M12) In still one more aspect, a graphical user interface on an electronic device with a touch-sensitive surface and a display is provided. In some embodiments, the graphical user interface includes user interfaces displayed in accordance with the method described in any one of M1-M8.

(M13) In one more aspect, an information processing apparatus for use in an electronic device that includes a touch-sensitive surface and a display is provided. The information processing apparatus includes: means for performing the method described in any one of M1-M8.

(M14) In one additional aspect, an electronic device is provided that includes a display unit (e.g., display unit 5301, FIG. 53), a touch-sensitive surface unit (e.g., touch-sensitive surface unit 5303, FIG. 53), and a processing unit (e.g., processing unit 5305, FIG. 53). In some embodiments, the electronic device is configured in accordance with any one of the computing devices shown in FIG. 1E (e.g., Computing Devices A-D). For ease of illustration, FIG. 53 shows display unit 5301 and touch-sensitive surface unit 5303 as integrated with electronic device 5300, however, in some embodiments one or both of these units are in communication with the electronic device, although the units remain physically separate from the electronic device. The processing unit includes an information obtaining unit (e.g., information obtaining unit 5307, FIG. 53), a vehicle entry determining unit (e.g., vehicle entry determining unit 5309, FIG. 53), a prompt providing unit (e.g., prompt providing unit 5311, FIG. 53), an instruction receiving unit (e.g., instruction receiving unit 5313, FIG. 53), a route guidance facilitating unit (e.g., route guidance facilitating unit 5315, FIG. 53), and a message detecting unit (e.g., message detecting unit 5317, FIG. 53). The processing unit (or one or more components thereof, such as the units 5307-5317) is configured to: obtain information identifying a first physical location viewed by a user in a first application that is executing on the electronic device (e.g., with the information obtaining unit 5307). The processing unit is also configure to: determine that the user has entered a vehicle (e.g., with the vehicle entry determining unit 5309). In response to determining that the user has entered the vehicle, the processing unit is configured to: provide a prompt to the user to use the first physical location as a destination for route guidance (e.g., with the prompt providing unit 5311). In response to providing the prompt, receive from the user an instruction to use the first physical location as the destination for route guidance (e.g., with the instruction receiving unit 5313). The processing unit is additionally configured to: facilitate route guidance to the first physical location (e.g., with the route guidance facilitating unit 5307).

(M15) In some embodiments of the electronic device of M14, the processing unit (or one or more components thereof, such as the units 5307-5317) is further configured to perform the method described in any one of M2-M8.

(N1) In accordance with some embodiments, a method is performed at an electronic device (e.g., portable multifunction device 100, FIG. 1A, configured in accordance with any one of Computing Device A-D, FIG. 1E) with a touch-sensitive surface and display (in some embodiments, the touch-sensitive surface and the display are integrated, as is shown for touch screen 112, FIG. 1C). The method includes: presenting content in a first application. The method also includes: receiving a request from the user to open a second application that is distinct from the first application, the second application including an input-receiving field. In response to receiving the request, the method includes: presenting the second application with the input-receiving field. Before receiving any user input at the input-receiving field, the method includes: providing a selectable user interface object to allow the user to paste at least a portion of the content into the input-receiving field. In response to detecting a selection of the selectable user interface object, the method includes: pasting the portion of the content into the input-receiving field. In this way, users are provided with proactive paste actions in a second application based content previously viewed in a first action (e.g., this enables users to paste content into the second application without having to re-open the first application, perform an explicit copy action, re-open the second application, and then explicitly request to paste copied content into the second application).

(N2) In accordance with some embodiments of the method of N1, before providing the selectable user interface object, the method includes: identifying the input-receiving field as a field that is capable of accepting the portion of the content.

(N3) In accordance with some embodiments of the method of N2, identifying the input-receiving field as a field that is capable of accepting the portion of the content is performed in response to detecting a selection of the input-receiving field.

(N4) In accordance with some embodiments of the method of any one of N1-N3, the portion of the content corresponds to an image.

(N5) In accordance with some embodiments of the method of any one of N1-N3, the portion of the content corresponds to textual content.

(N6) In accordance with some embodiments of the method of any one of N1-N3, the portion of the content corresponds to textual content and an image.

(N7) In accordance with some embodiments of the method of any one of N1-N6, the first application is a web browsing application and the second application is a messaging application.

(N8) In accordance with some embodiments of the method of any one of N1-N6, the first application is a photo browsing application and the second application is a messaging application.

(N9) In accordance with some embodiments of the method of any one of N1-N8, the method includes: before receiving the request to open to the second application, receiving a request to copy at least the portion of the content.

(N10) In accordance with some embodiments of the method of any one of N1-N9, the selectable user interface object is displayed with an indication that the portion of the content was recently viewed in the first application. In this way, user is provided with a clear indication as to why the paste suggestion is being made.

(N11) In another aspect, an electronic device is provided. In some embodiments, the electronic device includes: a touch-sensitive surface, a display, one or more processors, and memory storing one or more programs which, when executed by the one or more processors, cause the electronic device to perform the method described in any one of N1-N10.

(N12) In yet another aspect, an electronic device is provided and the electronic device includes: a touch-sensitive surface, a display, and means for performing the method described in any one of N1-N10.

(N13) In still another aspect, a non-transitory computer-readable storage medium is provided. The non-transitory computer-readable storage medium stores executable instructions that, when executed by an electronic device with a touch-sensitive surface and a display, cause the electronic device to perform the method described in any one of N1-N10.

(N14) In still one more aspect, a graphical user interface on an electronic device with a touch-sensitive surface and a display is provided. In some embodiments, the graphical user interface includes user interfaces displayed in accordance with the method described in any one of N1-N10.

(N15) In one more aspect, an information processing apparatus for use in an electronic device that includes a touch-sensitive surface and a display is provided. The information processing apparatus includes: means for performing the method described in any one of N1-N10.

(N16) In one additional aspect, an electronic device is provided that includes a display unit (e.g., display unit 5401, FIG. 54), a touch-sensitive surface unit (e.g., touch-sensitive surface unit 5403, FIG. 54), and a processing unit (e.g., processing unit 5405, FIG. 54). In some embodiments, the electronic device is configured in accordance with any one of the computing devices shown in FIG. 1E (e.g., Computing Devices A-D). For ease of illustration, FIG. 54 shows display unit 5401 and touch-sensitive surface unit 5403 as integrated with electronic device 5400, however, in some embodiments one or both of these units are in communication with the electronic device, although the units remain physically separate from the electronic device. The processing unit includes a presenting unit (e.g., presenting unit 5407, FIG. 54), a request receiving unit (e.g., request receiving unit 5409, FIG. 54), a user interface object providing unit (e.g., user interface object providing unit 5411, FIG. 54), a proactive pasting unit (e.g., proactive pasting unit 5413, FIG. 54), and a capability determining unit (e.g., capability determining unit 5415, FIG. 54). The processing unit (or one or more components thereof, such as the units 5407-5415) is configured to: present content in a first application (e.g., with the presenting unit 5407 and/or the display unit 5401); receive a request from the user to open a second application that is distinct from the first application (e.g., with the request receiving unit and/or the touch-sensitive surface unit 5403), the second application including an input-receiving field; in response to receiving the request, present the second application with the input-receiving field (e.g., with the presenting unit 5407 and/or the display unit 5401); before receiving any user input at the input-receiving field, provide a selectable user interface object to allow the user to paste at least a portion of the content into the input-receiving field (e.g., with the user interface object providing unit 5411 and/or the display unit 5401); and in response to detecting a selection of the selectable user interface object, paste the portion of the content into the input-receiving field (e.g., with the proactive pasting unit 5413).

(N17) In some embodiments of the electronic device of N16, the processing unit (or one or more components thereof, such as the units 5407-5415) is further configured to perform the method described in any one of N1-N10.

(O1) In accordance with some embodiments, a method is performed at an electronic device (e.g., portable multifunction device 100, FIG. 1A, configured in accordance with any one of Computing Device A-D, FIG. 1E) with a touch-sensitive surface and display (in some embodiments, the touch-sensitive surface and the display are integrated, as is shown for touch screen 112, FIG. 1C). The method includes: presenting, on the display, textual content that is associated with an application. The method also includes: determining that a portion of the textual content relates to: (i) a location, (ii) a contact, or (iii) an event. Upon determining that the portion of the textual content relates to a location, the method includes: obtaining location information from a location sensor on the electronic device and preparing the obtained location information for display as a predicted content item. Upon determining that the portion of the textual content relates to a contact, the method includes: conducting a search on the electronic device for contact information related to the portion of the textual content and preparing information associated with at least one contact, retrieved via the search, for display as the predicted content item. Upon determining that the portion of the textual content relates to an event, the method includes: conducting a new search on the electronic device for event information related to the portion of the textual content and preparing information that is based at least in part on at least one event, retrieved via the new search, for display as the predicted content item. The method further includes: displaying, within the application, an affordance that includes the predicted content item; detecting, via the touch-sensitive surface, a selection of the affordance; and, in response to detecting the selection, displaying information associated with the predicted content item on the display adjacent to the textual content. In this way, users are conveniently provided with predicted content items that can be used to complete statements (or respond to questions posed by other users, e.g., in a messaging application), without having to type anything and without having to look through information available on the electronic device to find desired information. For example, the electronic device provides phone numbers, current locations, availability for scheduling new events, details associated with existing events, all without requiring any explicit request or extra effort by the user thus, saving time, while still ensuring that desired information is efficiently provided to users.

(O2) In accordance with some embodiments of the method of O1, the portion of the textual content corresponds to textual content that was most recently presented within the application.

(O3) In accordance with some embodiments of the method of any one of O1-O2, the application is a messaging application and the portion of the textual content is a question received in the messaging application from a remote user of a remote device that is distinct from the electronic device.

(O4) In accordance with some embodiments of the method of any one of O1-O2, the portion of the textual content is an input provided by the user of the electronic device at an input-receiving field within the application.

(O5) In accordance with some embodiments of the method of O1, the portion of the textual content is identified in response to a user input selecting a user interface object that includes the portion of the textual content.

(O6) In accordance with some embodiments of the method of O5, the application is a messaging application and the user interface object is a messaging bubble in a conversation displayed within the messaging application.

(O7) In accordance with some embodiments of the method of any one of O5-O6, the method further includes: detecting a selection of a second user interface object; in response to detecting the selection, (i) ceasing to display the affordance with the predicted content item and determining that textual content associated with the second user interface object relates to a location, a contact, or an event; and in accordance with the determining, displaying a new predicted content item within the application. In this way, users are easily able to go back in a messaging conversation to select previously received messages and still be provided with appropriated predicted content items.

(O8) In accordance with some embodiments of the method of any one of O1-07, the affordance is displayed in an input-receiving field that is adjacent to a virtual keyboard within the application.

(O9) In accordance with some embodiments of the method of any one of O8, the input-receiving field is a field that displays typing inputs received at the virtual keyboard.

(O10) In accordance with some embodiments of the method of any one of O1-O9, the determining includes parsing the textual content as it is received by the application to detect stored patterns that are known to relate to a contact, an event, and/or a location.

(O11) In another aspect, an electronic device is provided. In some embodiments, the electronic device includes: a touch-sensitive surface, a display, one or more processors, and memory storing one or more programs which, when executed by the one or more processors, cause the electronic device to perform the method described in any one of O1-O10.

(O12) In yet another aspect, an electronic device is provided and the electronic device includes: a touch-sensitive surface, a display, and means for performing the method described in any one of O1-O10.

(O13) In still another aspect, a non-transitory computer-readable storage medium is provided. The non-transitory computer-readable storage medium stores executable instructions that, when executed by an electronic device with a touch-sensitive surface and a display, cause the electronic device to perform the method described in any one of O1-O10.

(O14) In still one more aspect, a graphical user interface on an electronic device with a touch-sensitive surface and a display is provided. In some embodiments, the graphical user interface includes user interfaces displayed in accordance with the method described in any one of O1-O10.

(O15) In one more aspect, an information processing apparatus for use in an electronic device that includes a touch-sensitive surface and a display is provided. The information processing apparatus includes: means for performing the method described in any one of O1-O10.

(O16) In one additional aspect, an electronic device is provided that includes a display unit (e.g., display unit 5501, FIG. 55), a touch-sensitive surface unit (e.g., touch-sensitive surface unit 5503, FIG. 55), and a processing unit (e.g., processing unit 5505, FIG. 55). In some embodiments, the electronic device is configured in accordance with any one of the computing devices shown in FIG. 1E (e.g., Computing Devices A-D). For ease of illustration, FIG. 55 shows display unit 5501 and touch-sensitive surface unit 5503 as integrated with electronic device 5500, however, in some embodiments one or both of these units are in communication with the electronic device, although the units remain physically separate from the electronic device. The processing unit includes a presenting unit (e.g., presenting unit 5507, FIG. 55), a determining unit (e.g., determining unit 5509, FIG. 55), an obtaining unit (e.g., obtaining unit 5511, FIG. 55), a search conducting unit (e.g., search conducting unit 5513, FIG. 55), an information preparation unit (e.g., information preparation unit 5515, FIG. 55), an affordance displaying unit (e.g., affordance displaying unit 5517, FIG. 55), and a detecting unit (e.g., detecting unit 5519, FIG. 55). The processing unit (or one or more components thereof, such as the units 5507-5519) is configured to: present on the display, textual content that is associated with an application (e.g., with the presenting unit 5507 and/or the display unit 5501); determine that a portion of the textual content relates to: (i) a location, (ii) a contact, or (iii) an event (e.g., with the determining unit 5509); upon determining that the portion of the textual content relates to a location, obtain location information from a location sensor on the electronic device (e.g., with the obtaining unit 5511) and prepare the obtained location information for display as a predicted content item (e.g., with the information preparation unit 5515); upon determining that the portion of the textual content relates to a contact, conduct a search on the electronic device for contact information related to the portion of the textual content (e.g., with the search conducting unit 5513) and prepare information associated with at least one contact, retrieved via the search, for display as the predicted content item (e.g., with the information preparation unit 5515); upon determining that the portion of the textual content relates to an event, conduct a new search on the electronic device for event information related to the portion of the textual content (e.g., with the search conducting unit 5513) and prepare information that is based at least in part on at least one event, retrieved via the new search, for display as the predicted content item (e.g., with the information preparation unit 5515); display, within the application, an affordance that includes the predicted content item (e.g., with the affordance displaying unit 5517 and/or the display unit 5501); detect, via the touch-sensitive surface, a selection of the affordance (e.g., with the detecting unit 5519); and in response to detecting the selection, display information associated with the predicted content item on the display adjacent to the textual content (e.g., with the presenting unit 5507 and/or the display unit 5501).

(O17) In some embodiments of the electronic device of O16, the processing unit (or one or more components thereof, such as the units 5507-5519) is further configured to perform the method described in any one of O1-O10.

As described above (and in more detail below), one aspect of the present technology is the gathering and use of data available from various sources (e.g., based on speech provided during voice communications) to improve the delivery to users of content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of monitoring voice communications or monitoring actions performed by users within applications, the present technology can be configured to allow users to select to “opt in” or “opt out” of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments section below, in conjunction with the following drawings in which like reference numerals refer to corresponding parts throughout the drawings.

FIG. 12 is a flowchart representation of a method of entering a search mode based on heuristics, in accordance with some embodiments.

FIG. 31_1 illustrates a mobile device configured to perform dynamic adjustment of the mobile device, in accordance with some embodiments.

FIG. 31_2 illustrates an example process for invoking heuristic processes, in accordance with some embodiments.

FIG. 31_3 illustrates a process for adjusting the settings of a mobile device using a heuristic process, in accordance with some embodiments.

FIG. 31_4 illustrates an example system for performing background fetch updating of applications, in accordance with some embodiments.

FIG. 31_5 illustrates peer forecasting for determining user invocation probabilities for applications on mobile device 100, in accordance with some embodiments.

FIG. 31_6 is a flow diagram of an example process for predictively launching applications to perform background updates, in accordance with some embodiments.

FIG. 31_7 is a flow diagram of an example process for determining when to launch applications on a mobile device, in accordance with some embodiments.

FIG. 31_8 is a flow diagram illustrating state transitions for an entry in a trending table, in accordance with some embodiments.

FIG. 31_9 is a block diagram illustrating a system for providing push notifications to a mobile device, in accordance with some embodiments.

FIG. 31_10 is a flow diagram of an example process for performing non-waking pushes at a push notification server, in accordance with some embodiments.

FIG. 31_11 is a flow diagram of an example process for performing background updating of an application in response to a low priority push notification, in accordance with some embodiments.

FIG. 31_12 is a flow diagram of an example process for performing background updating of an application in response to a high priority push notification, in accordance with some embodiments.

FIG. 31_13 is a block diagram an example system for performing background downloading and/or uploading of data on a mobile device, in accordance with some embodiments.

FIG. 31_14 is flow diagram of an example process for performing background downloads and uploads, in accordance with some embodiments.

FIG. 31_15 illustrates an example graphical user interface (GUI) for enabling and/or disabling background updates for applications on a mobile device, in accordance with some embodiments.

FIG. 31_16 illustrates an example system for sharing data between peer devices, in accordance with some embodiments.

FIG. 31_17 illustrates an example process for sharing data between peer devices, in accordance with some embodiments.

FIG. 32_1 is a block diagram of one embodiment of a system that returns search results based on input query prefixes, in accordance with some embodiments.

FIG. 32_2 is flowchart of one embodiment of a process to determine query completions and relevant results based on an input query prefix, in accordance with some embodiments.

FIG. 32_3 is a block diagram of one embodiment of an aggregator and multiple search domains, in accordance with some embodiments.

FIG. 32_4 is an illustration of one embodiment to a query completion search domain, in accordance with some embodiments.

FIG. 32_5 is an illustration of one embodiment of a maps search domain.

FIG. 32_6 is a flow chart of one embodiment of a process to determine query completions from multiple search domains, in accordance with some embodiments.

FIG. 32_7 is a flow chart of one embodiment of a process to determine relevant results over multiple search domains from a determined query completion, in accordance with some embodiments.

FIG. 32_8 is a block diagram of one embodiment of a system that incorporates user feedback into a feedback search index, in accordance with some embodiments.

FIG. 32_9 is a flow chart of one embodiment of a process to incorporate user feedback into a citation search index, in accordance with some embodiments.

FIG. 32_10 is a flow chart of one embodiment of a process to collect user feedback during a user search session, in accordance with some embodiments.

FIG. 32_11 is a flow chart of one embodiment of a process to incorporate user feedback during into a feedback index, in accordance with some embodiments.

FIG. 32_12 is a flow chart of one embodiment of a process to use the user feedback to update a results cache, in accordance with some embodiments.

FIG. 32_13 is a block diagram of one embodiment of a federator that performs a multi-domain search using a characterized query completion, in accordance with some embodiments.

FIG. 32_14 is a flow chart of one embodiment of a process to determine relevant results using a vocabulary service, in accordance with some embodiments.

FIG. 32_15 is a flow chart of one embodiment of a process to characterize a query completion, in accordance with some embodiments.

FIG. 32_16 is a block diagram of one embodiment of a completion module to determine query completions from multiple search domains, in accordance with some embodiments.

FIG. 32_17 is a block diagram of one embodiment of a results module to determine relevant results over multiple search domains from a determined query completion, in accordance with some embodiments.

FIG. 32_18 is a block diagram of one embodiment of a collect feedback module to collect user feedback during a user search session, in accordance with some embodiments.

FIG. 32_19 is a block diagram of one embodiment of a process feedback module to incorporate user feedback during into a feedback index, in accordance with some embodiments.

FIG. 32_20 is a block diagram of one embodiment of an update query results module to use the user feedback to update a results cache, in accordance with some embodiments.

FIG. 32_21 is a block diagram of one embodiment of a process feedback module to incorporate user feedback during into a feedback index, in accordance with some embodiments.

FIG. 32_22 is a block diagram of one embodiment of an update query results module to use the user feedback to update a results cache, in accordance with some embodiments.

FIG. 33_1 illustrates, in block diagram form, a local search subsystem and a remote search subsystem on a computing device as is known in the prior art.

FIG. 33_2 illustrates, in block diagram form, a local search subsystem having local learning capability that can be used to improve the results returned from a remote search application on a computing device, in accordance with some embodiments.

FIG. 33_3 illustrates, in block diagram form, a method of locally learning a query feature utilizing local search queries, local results and local feedback based on the local results, in accordance with some embodiments FIG. 33_4 illustrates, in block diagram form, a method of locally learning a query feature utilizing search results returned from both local search queries and remote search queries, and local feedback on both local and remote search query results, in accordance with some embodiments.

FIG. 33_5 illustrates, in block diagram form, a method of locally learning a query feature passed to a local device by a remote service in response to a query sent to the remote service, in accordance with some embodiments.

FIG. 33_6 illustrates, in block diagram form, a method of receiving or determining a new feature, locally training on the feature, and utilizing the feature, in accordance with some embodiments.

FIG. 33_7 illustrates an exemplary embodiment of a software stack usable in some embodiments of the invention, in accordance with some embodiments.

FIG. 34_5A illustrates a block diagram of an exemplary data architecture for suggested contacts in accordance with some embodiments.

FIG. 34_5B illustrates a block diagram of an exemplary data architecture for suggested calendar events in accordance with some embodiments.

FIGS. 34_6A-34_6G illustrate exemplary user interfaces for providing suggested contacts and calendar events in accordance with some embodiments. FIGS. 1A-1B, 2, and 3 provide a description of exemplary devices for performing the techniques for suggesting contact and event information described in this section. FIGS. 34_6A-34_6G illustrate exemplary user interfaces for suggesting contact and event information, and the user interfaces in these figures are also used to illustrate the processes described below, including the processes in FIGS. 34_7A-34_13.

FIGS. 34_7A and 34_7B illustrate a flow diagram of an exemplary process for generating a suggested contact in accordance with some embodiments.

FIGS. 34_8A and 34_8B illustrate a flow diagram of an exemplary process for updating an existing contact with a suggested item of contact information in accordance with some embodiments.

FIGS. 34_9A and 34_9B illustrate a flow diagram of an exemplary process for displaying a contact with suggested contact information in accordance with some embodiments.

FIG. 34_10 illustrates a flow diagram of an exemplary process for displaying suggested contact information with a message in accordance with some embodiments.

FIGS. 34_11A and 34_11B illustrate a flow diagram of an exemplary process for generating a suggested calendar event in accordance with some embodiments.

FIG. 34_12 illustrates a flow diagram of an exemplary process for displaying suggested event information with a message in accordance with some embodiments.

FIG. 34_13 illustrates a flow diagram of an exemplary process for displaying multiple suggested contact or event information with a message in accordance with some embodiments.

FIG. 34_14 is a functional block diagram of an electronic device in accordance with some embodiments.

FIG. 34_15 is a functional block diagram of an electronic device in accordance with some embodiments.

FIG. 35_1 is a flow chart of a method 35_100 for suggesting an application based upon a detected event according to some embodiments.

FIG. 35_2 shows a segmentation process 35_200 according to some embodiments.

FIG. 35_3 shows a decision tree 35_300 that may be generated according to some embodiments.

FIG. 35_4 is a flowchart of a method 35_400 for suggesting an application to a user of a computing device based on an event according to some embodiments.

FIGS. 35_5A-35_5D shows plots of example binomial distributions for various correct numbers and incorrect numbers according to some embodiments.

FIGS. 35_6A and 35_6B show a parent model and a sub-model resulting from a segmentation according to some embodiments.

FIG. 35_7 shows an example architecture 35_700 for providing a user interface to the user for interacting with the one or more applications, in accordance with some embodiments.

FIG. 36_1 is a flowchart of a method for identifying an application based upon a triggering event according to some embodiments.

FIG. 36_2 shows a block diagram of a system for determining a triggering event according to some embodiments.

FIG. 36_3 shows a block diagram of a system for identifying an application for a user based on a triggering event according to some embodiments.

FIG. 36_4 shows a block diagram of a system for identifying an application with multiple prediction models according to some embodiments.

FIG. 36_5 is a flowchart of a method of identifying an application based on a triggering event with a device according to some embodiments.

FIG. 36_6 is a simplified diagram of a device having a user interface for a music application according to some embodiments.

FIGS. 36_7A and 36_7B are flowcharts of methods for removing an identified application from a user interface according to some embodiments.

FIG. 37_1 is a flow chart of a method 100 for suggesting a recipient to contact based upon a detected event according to some embodiments.

FIG. 37_2 shows a block diagram of a system for determining a triggering event according to some embodiments.

FIG. 37_3 shows a block diagram of a system for identifying recipients to contact based on a triggering event according to some embodiments.

FIG. 37_4 shows an example of suggesting recipients to contact in a user interface for an email application according to some embodiments.

FIG. 37_5 shows an example of suggesting recipients to contact in a user interface for a search application according to some embodiments.

FIG. 37_6 is a flowchart of a method 37_600 for suggesting recipients to a user of a computing device based on an event according to some embodiments.

FIG. 37_7 shows an example data flow for suggesting recipients to contact according to some embodiments.

FIG. 37_8 shows a block diagram of an interaction module according to some embodiments.

FIG. 37_9 shows an example architecture 37_900 for providing a user interface to the user for suggesting recipients to contact according to some embodiments.

FIG. 38_1 illustrates a block diagram of different components of a mobile computing device configured to implement the various techniques described herein, according to some embodiments.

FIG. 38_2 illustrates a method that is implemented by the application prediction engine of FIG. 38_1, according to some embodiments.

FIG. 38_3 illustrates a method that is implemented by the search application of FIG. 1, according to some embodiments.

Figure 1A:
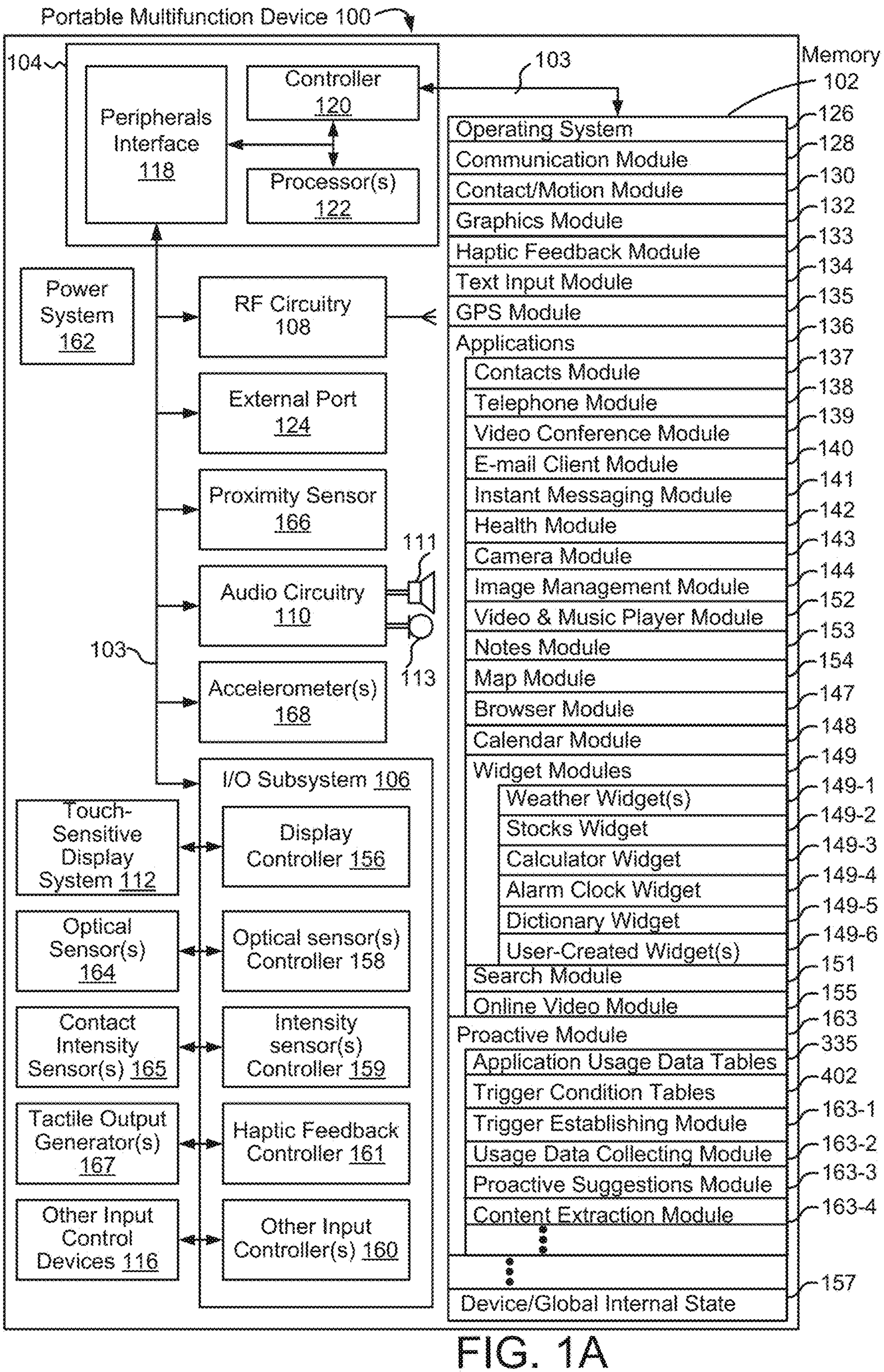
FIG. 1A is a high-level block diagram of a computing device with a touch-sensitive display, in accordance with some embodiments.

FIG. 38_4 illustrates a conceptual diagram of an example user interface of the search application of FIG. 38_1, according to some embodiments.

FIG. 39_1 illustrates a block diagram of different components of a mobile computing device configured to implement the various techniques described herein, according to some embodiments.

FIG. 39_2 illustrates a block diagram of a more detailed view of particular components of the mobile computing device illustrated in FIG. 39_1 (or FIG. 1A), according to some embodiments.

FIG. 39_3A illustrates a method for a high-level initialization and operation of a prediction engine, according to some embodiments.

FIG. 39_3B illustrates a method for synchronously providing a prediction at a prediction engine, according to some embodiments.

FIG. 39_3C illustrates a method for asynchronously providing a prediction at a prediction engine, according to some embodiments.

FIG. 39_4A illustrates a method for a consumer application requesting to synchronously receive a prediction, according to some embodiments.

FIG. 39_4B illustrates a method for a consumer application registering to asynchronously receive predictions, according to some embodiments.

FIG. 39_5A illustrates a method for managing prediction engine registrations at a prediction engine center, according to some embodiments.

FIG. 39_5B illustrates a method for synchronously providing predictions to consumer applications at a prediction engine center, according to some embodiments.

FIG. 39_5C illustrates a method for asynchronously providing predictions to consumer applications at a prediction engine center, according to some embodiments.

FIG. 40_1 is a block diagram of an example system for monitoring, predicting, and notifying context clients of changes in the current context of a computing device, in accordance with some embodiments.

FIG. 40_2A illustrates an example of context items that can make up the current context, in accordance with some embodiments.

FIG. 40_2B illustrates an example of a new context item being added to the current context, in accordance with some embodiments.

FIG. 40_3 illustrates an example callback predicate database, in accordance with some embodiments.

FIG. 40_4 is a graph that illustrates example state changes associated with context items over time, in accordance with some embodiments.

FIG. 40_5 is a graph that illustrates example event streams associated with context items, in accordance with some embodiments.

FIG. 40_6 illustrates an example historical event stream database, in accordance with some embodiments.

FIG. 40_7 is a block diagram of an example system for providing a context callback notification to a requesting client, in accordance with some embodiments.

FIG. 40_8A is a block diagram of an example system illustrating restarting a requesting client that has been terminated, in accordance with some embodiments.

FIG. 40_8B is a block diagram of an example system illustrating restarting a requesting client that has been terminated, in accordance with some embodiments.

FIG. 40_9A is a block diagram of an example system illustrating restarting a context daemon that has been terminated, in accordance with some embodiments.

FIG. 40_9B is a block diagram of an example system illustrating restarting a context daemon that has been terminated, in accordance with some embodiments.

FIG. 40_10A is a block diagram of an example system illustrating restarting a context daemon and a requesting client that have been terminated, in accordance with some embodiments.

FIG. 40_10B is a block diagram of an example system illustrating restarting a context daemon and a requesting client that have been terminated, in accordance with some embodiments.

FIG. 40_11 is a block diagram of an example system configured to restart a client and/or a context daemon based on device state information received by a launch daemon, in accordance with some embodiments.

FIG. 40_12A is a block diagram of an example system illustrating restarting a context daemon using a launch daemon, in accordance with some embodiments.

FIG. 40_12B is a block diagram of an example system illustrating restarting a context daemon using a launch daemon, in accordance with some embodiments.

FIG. 40_13A is a block diagram of an example system illustrating restarting a requesting client using a launch daemon, in accordance with some embodiments.

FIG. 40_13B is a block diagram of an example system illustrating restarting a requesting client using a launch daemon, in accordance with some embodiments.

FIG. 40_14 is a graph that illustrates an example of slot-wise averaging to predict future events, in accordance with some embodiments.

FIG. 40_15 depicts example graphs illustrating slot weighting, in accordance with some embodiments.

FIG. 40_16A is a graph illustrating an example method for predicting a future context, in accordance with some embodiments.

FIG. 40_16B is a graph illustrating an example method for converting slot-wise probabilities into a probability curve, in accordance with some embodiments.

FIG. 40_17 illustrates an example event stream that includes a predicted future event, in accordance with some embodiments.

FIG. 40_18 is a flow diagram of an example process for notifying clients of context changes on a computing device, in accordance with some embodiments.

FIG. 40_19 is a flow diagram of an example process for restarting a context daemon to service a callback request, in accordance with some embodiments.

FIG. 40_20 is a flow diagram of an example process for restarting a callback client to receive a callback notification, in accordance with some embodiments.

FIG. 40_21 is a flow diagram of an example process for predicting future events based on historical context information, in accordance with some embodiments.

FIG. 40_22 is a flow diagram of an example process for servicing a sleep context callback request, in accordance with some embodiments.

FIG. 41_1 is a block diagram of one embodiment of a system that indexes application states for use in a local device search index.

FIG. 41_2 is a block diagram of one embodiment of a system that searches application states using an on-device application state search index.

FIG. 41_3 is a block diagram of embodiments of user interfaces that display an application state query results among other query results.

FIG. 41_4A is a flow diagram of one embodiment of a process to index application states received from multiple different applications on a device.

FIG. 41_4B is a flow diagram of one embodiment of a process to determine query results for a query using an application state index.

FIG. 41_5 is a flow diagram of one embodiment of a process to receive and present an application state as part of a query result.

FIG. 41_6 is a block diagram of one embodiment of a system that indexes application states for use in a remote search index.

FIG. 41_7 is a block diagram of one embodiment of a system that searches application states using a remote application state search index.

FIG. 41_8 is a flow diagram of one embodiment of a process to add an application state to an application state index.

FIG. 41_9 is a flow diagram of one embodiment of a process to export an application state to an application state indexing service.

FIG. 41_10 is a flow chart of one embodiment of a process to perform a query search using an application state index.

FIG. 41_11 is a flow diagram of one embodiment of a process to receive and present an application state as part of a query result.

FIG. 41_12 is a block diagram of one embodiment of a system that indexes application state views for use in a remote search index.

FIG. 41_13 is a block diagram of one embodiment of an application view.

FIG. 41_14 is a flow chart of one embodiment of a process to generate an application state view using an application state.

FIG. 41_15 is a flow chart of one embodiment of a process to receive and present an application state that includes an application state view as part of a query result.

FIGS. 42-55 are functional block diagrams of an electronic device, in accordance with some embodiments.

DESCRIPTION OF EMBODIMENTS

As discussed above and in more detail below, there is a need for electronic devices with faster, more efficient methods and interfaces for quickly accessing applications and desired functions within those applications. In particular, there is a need for devices that help users to avoid repetitive tasks and provide proactive assistance by identifying and providing relevant information before a user explicitly requests it. Additionally, there is a need for quickly accessing applications and desired functions within those applications at particular periods of time (e.g., accessing a calendar application after waking up each morning), at particular places (e.g., accessing a music application at the gym), etc. Disclosed herein are novel methods and interfaces to address these needs and provide users with ways to quickly access applications and functions within those applications at these particular places, periods of time, etc. Such methods and interfaces optionally complement or replace conventional methods for accessing applications. Such methods and interfaces reduce the cognitive burden on a user and produce a more efficient human-machine interface. For battery-operated devices, such methods and interfaces conserve power and increase the time between battery charges. Moreover, such methods and interfaces help to extend the life of the touch-sensitive display by requiring a fewer number of touch inputs (e.g., instead of having to continuously and aimlessly tap on a touch-sensitive display to located a desired piece of information, the methods and interfaces disclosed herein proactively provide that piece of information without requiring user input).

Figure 5:
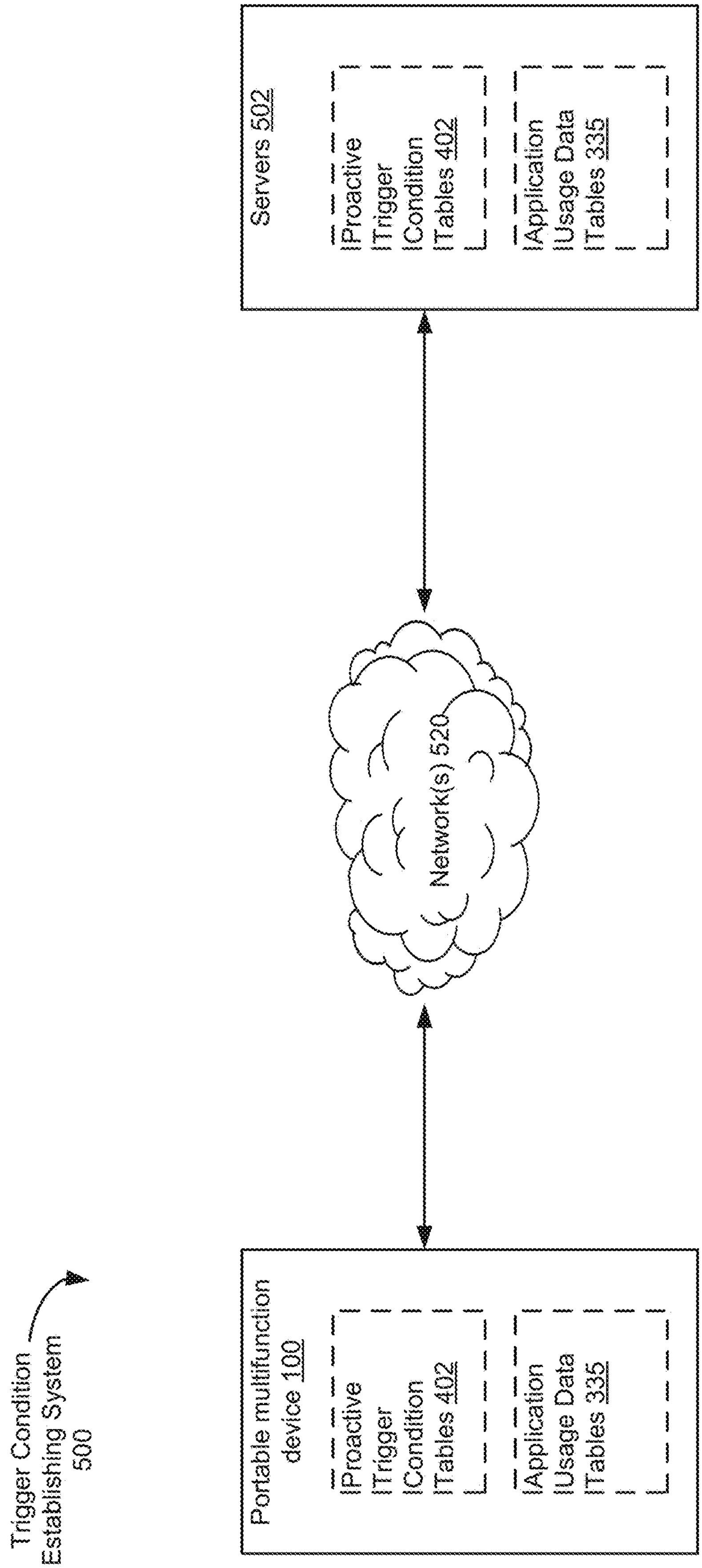
FIG. 5 is a block diagram illustrating an example of a trigger condition establishing system, in accordance with some embodiments.
Figure 6A:
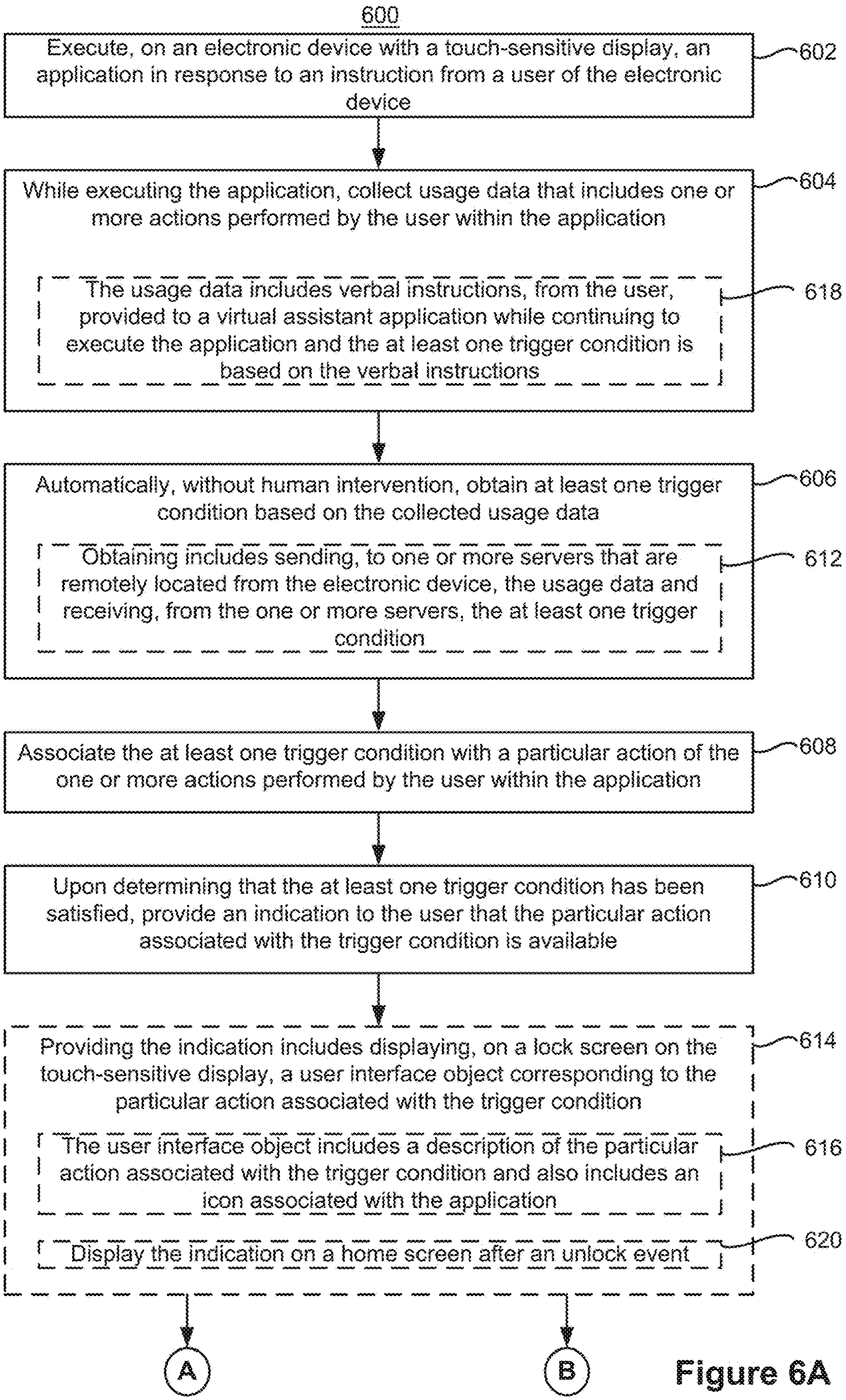
FIGS. 6A-6B are a flowchart representation of a method of proactively identifying and surfacing (e.g., surfacing for user selection) relevant content on an electronic device with a touch-sensitive display, in accordance with some embodiments.
Figure 6B:
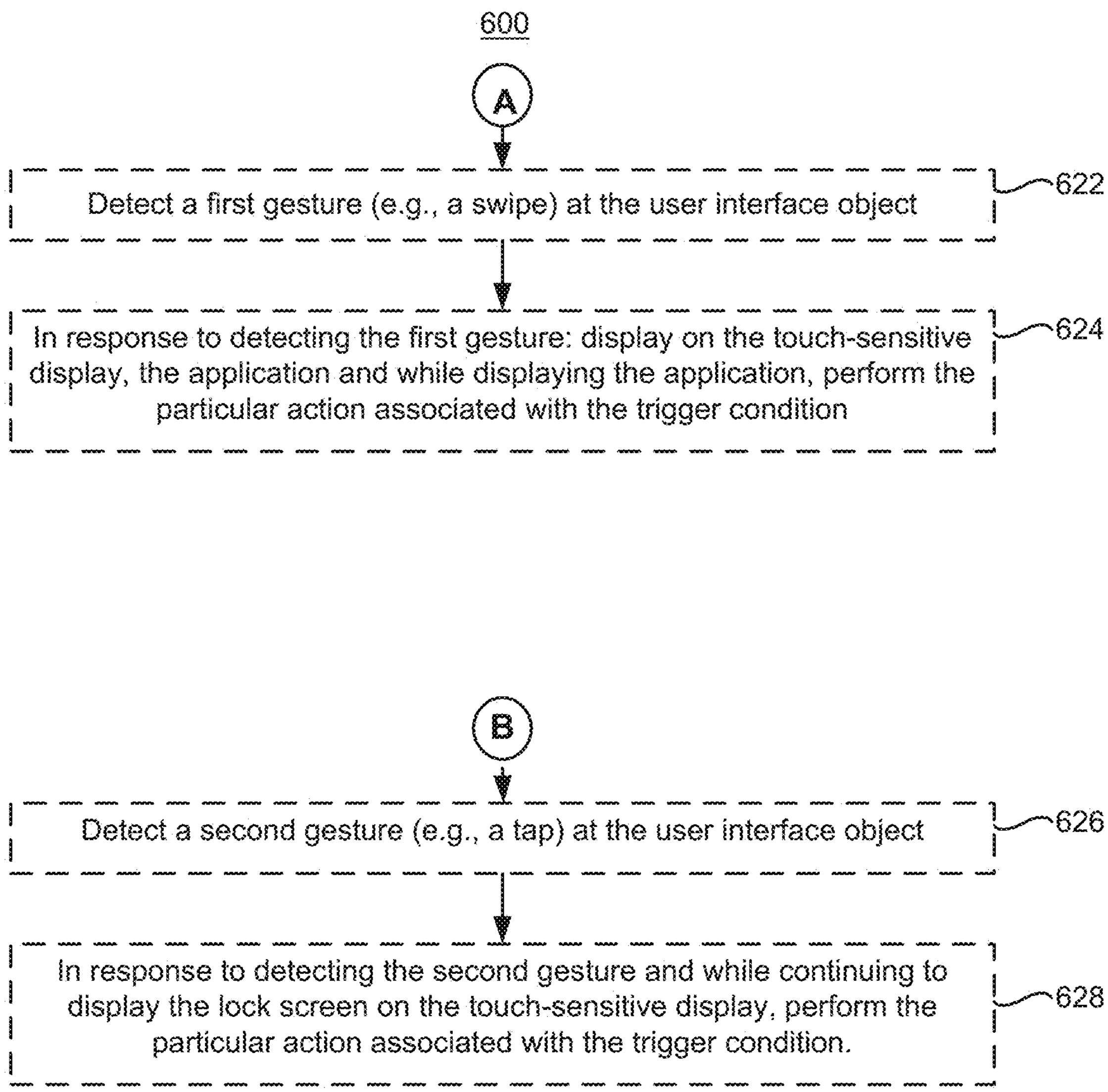
Figure 7A:
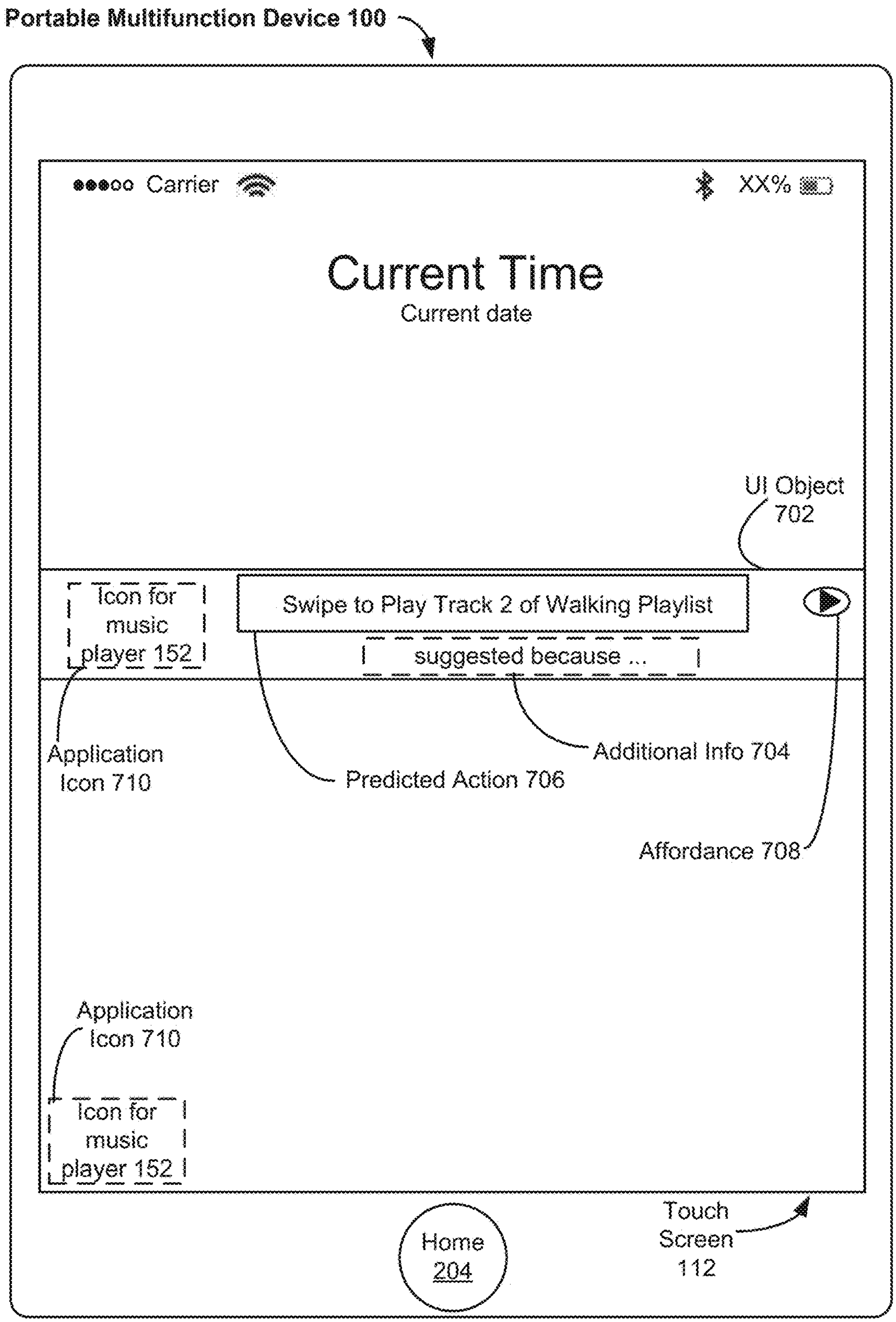
FIGS. 7A-7B are schematics of a touch-sensitive display used to illustrate user interfaces for proactively identifying and surfacing relevant content, in accordance with some embodiments.
Figure 7B:
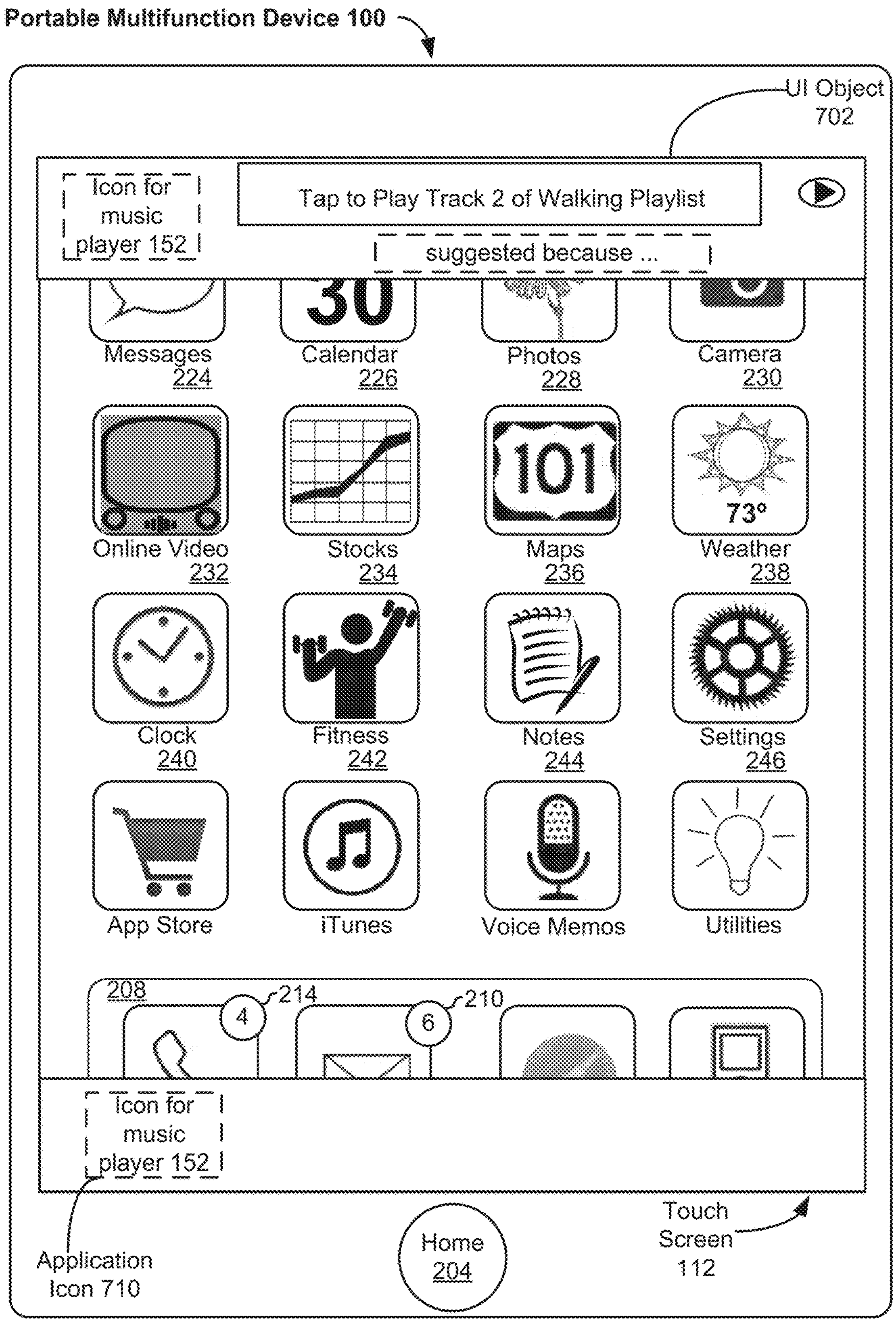
Figure 8A:
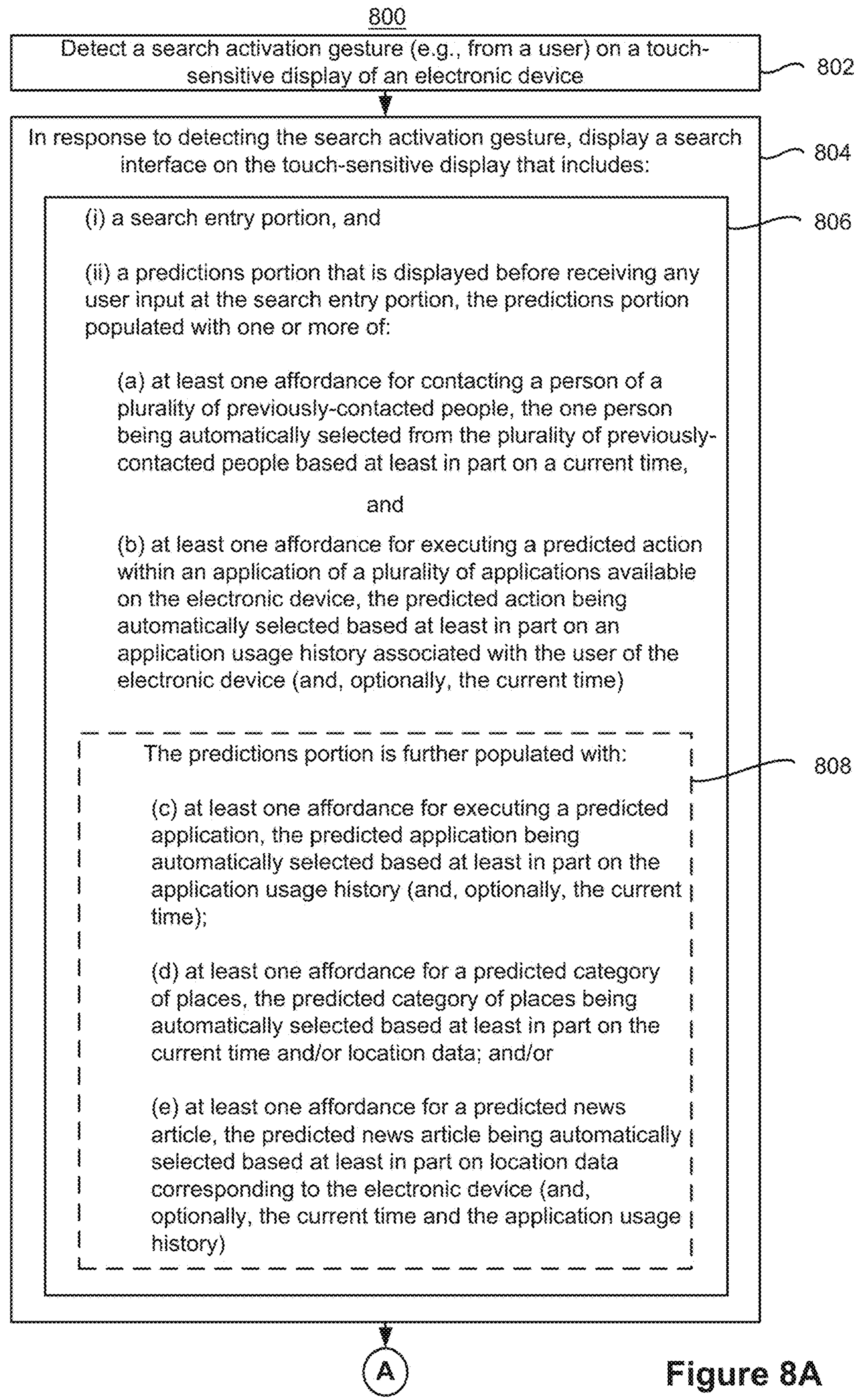
FIGS. 8A-8B are a flowchart representation of a method of proactively identifying and surfacing (e.g., surfacing for user selection) relevant content on an electronic device with a touch-sensitive display, in accordance with some embodiments.
Figure 8B:
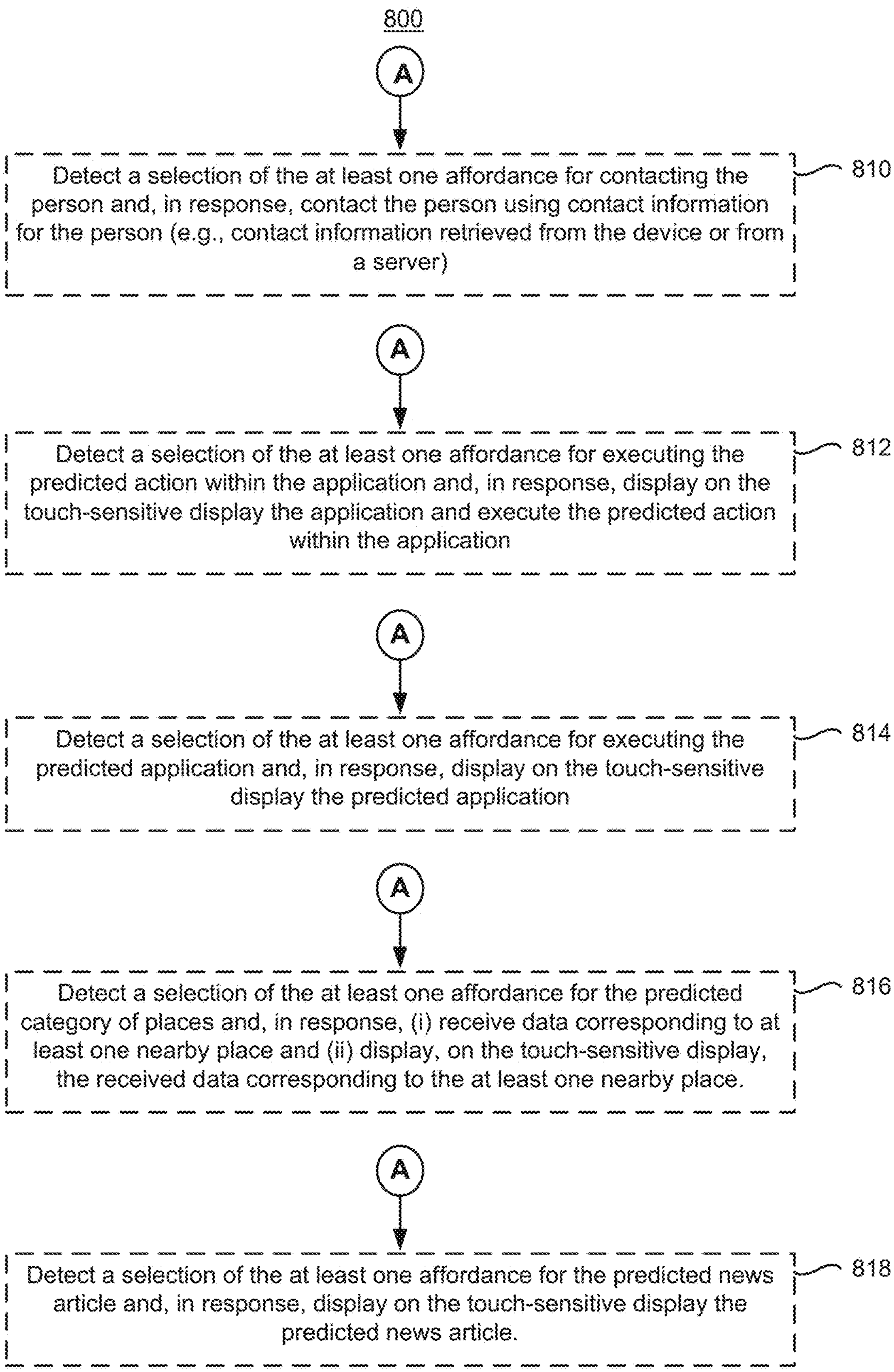

Below, FIGS. 1A-1E and 2 provide a description of example devices. FIGS. 10 and 11 provide functional block diagrams of example electronic devices. FIGS. 3A-3B and FIGS. 4A-4B are block diagrams of example data structures that are used to proactively identify and surface relevant content (these data structures are used in the method described in reference to FIGS. 6A-6B and in the method described with reference to FIGS. 8A-8B). FIG. 5 is a block diagram illustrating an example system for establishing trigger conditions that are used to proactively identify and surface relevant content (the example system is used in the method described in reference to FIGS. 6A-6B and in the method described with reference to FIGS. 8A-8B). FIGS. 6A-6B are a flowchart depicting a method of proactively identifying and surfacing relevant content. FIGS. 7A-7B are schematics of a touch-sensitive display used to illustrate example user interfaces and gestures for proactively identifying and surfacing relevant content. FIGS. 8A-8B are a flowchart depicting a method of proactively identifying and surfacing relevant content. FIGS. 9A-9D are schematics of a touch-sensitive display used to illustrate additional user interfaces for proactively identifying and surfacing relevant content. FIGS. 3A-3B, 4A-4B, 5, and 7A-7B are used to illustrate the methods and/or processes of FIGS. 6A-6B. FIGS. 3A-3B, 4A-4B, 5, and 9A-9D are used to illustrate the methods and/or processes of FIGS. 8A-8B.

Figure 10A:
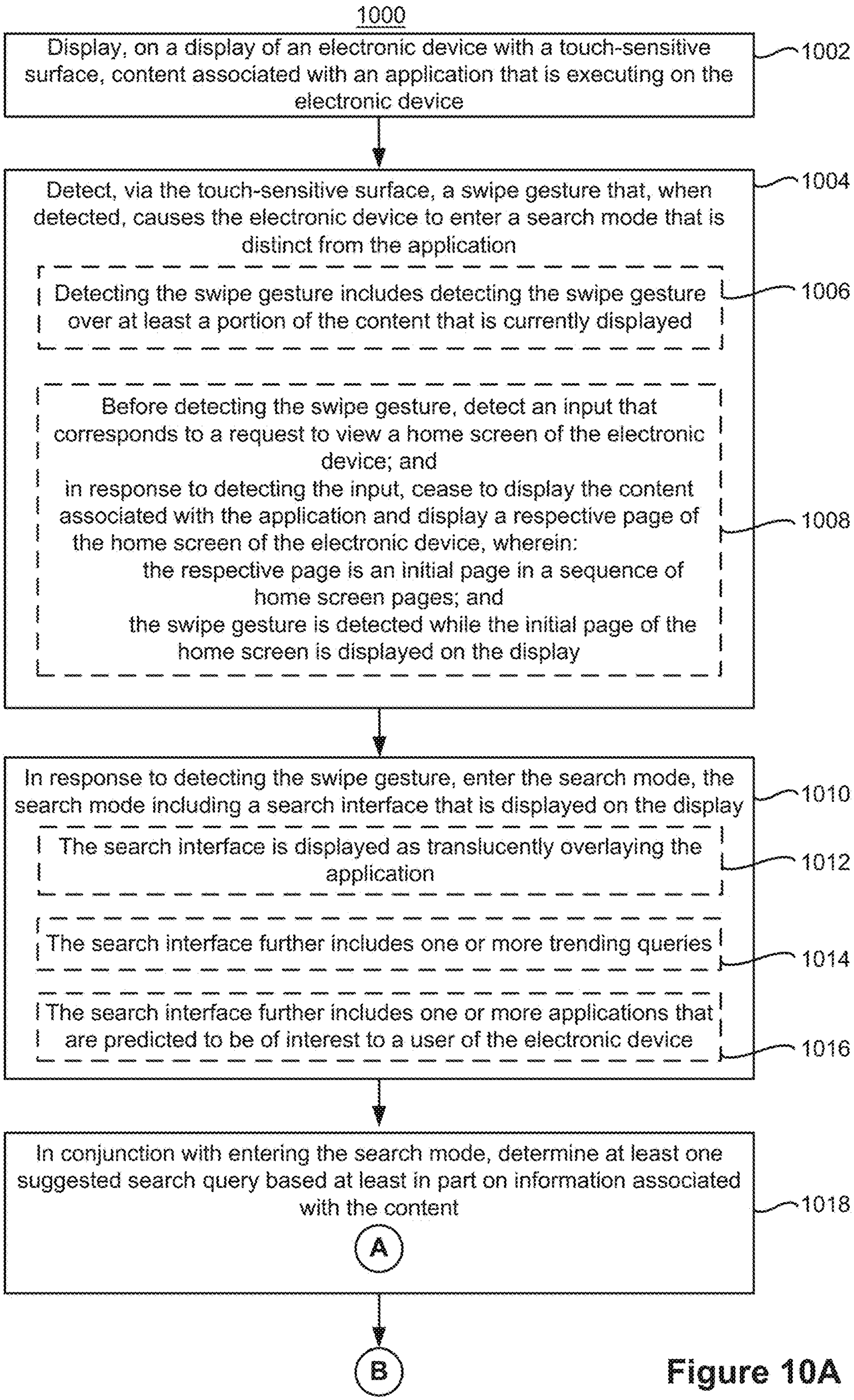
FIGS. 10A-10C are a flowchart representation of a method of proactively suggesting search queries based on content currently being displayed on an electronic device with a touch-sensitive display, in accordance with some embodiments.
Figure 10B:
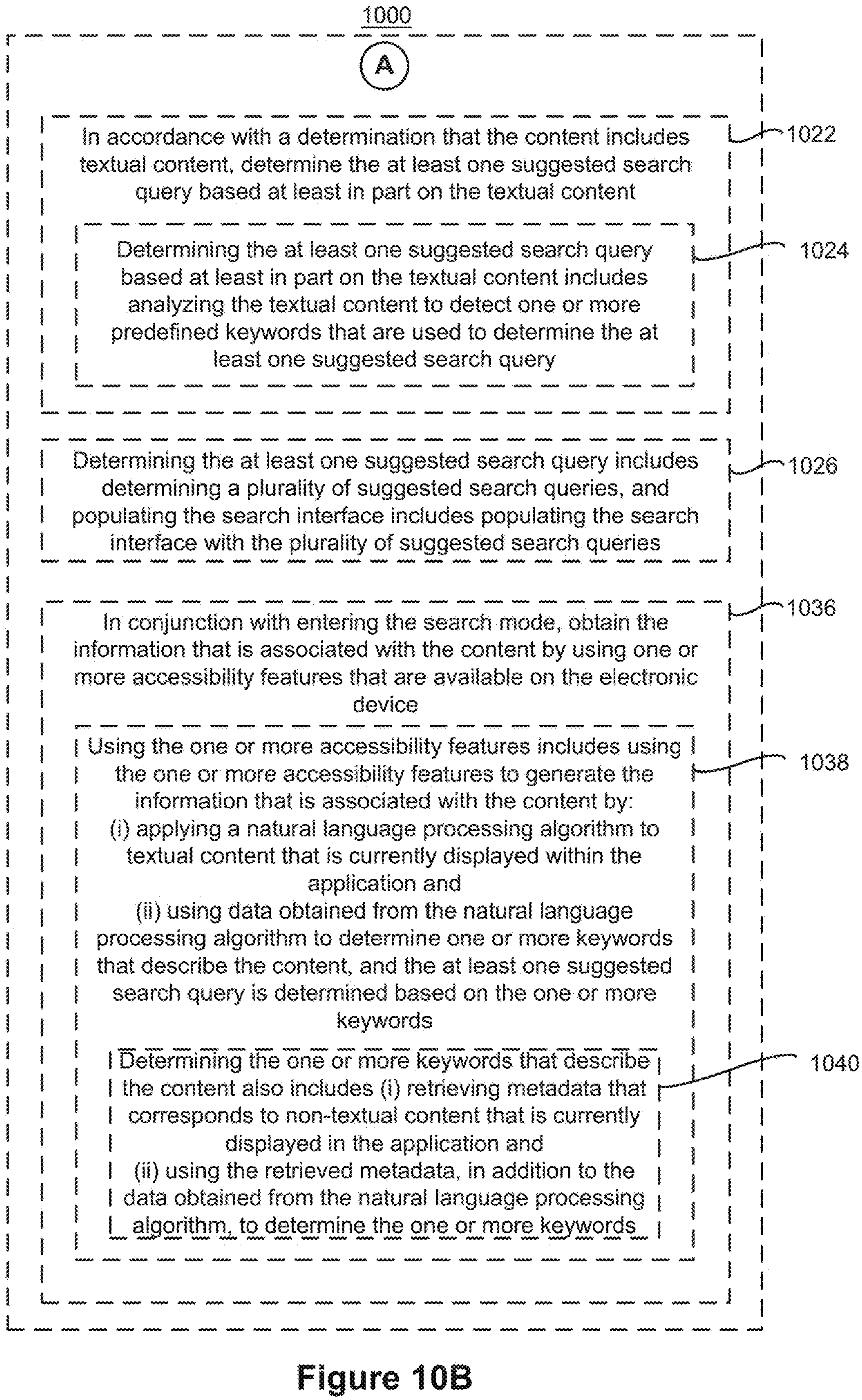
Figure 10C:
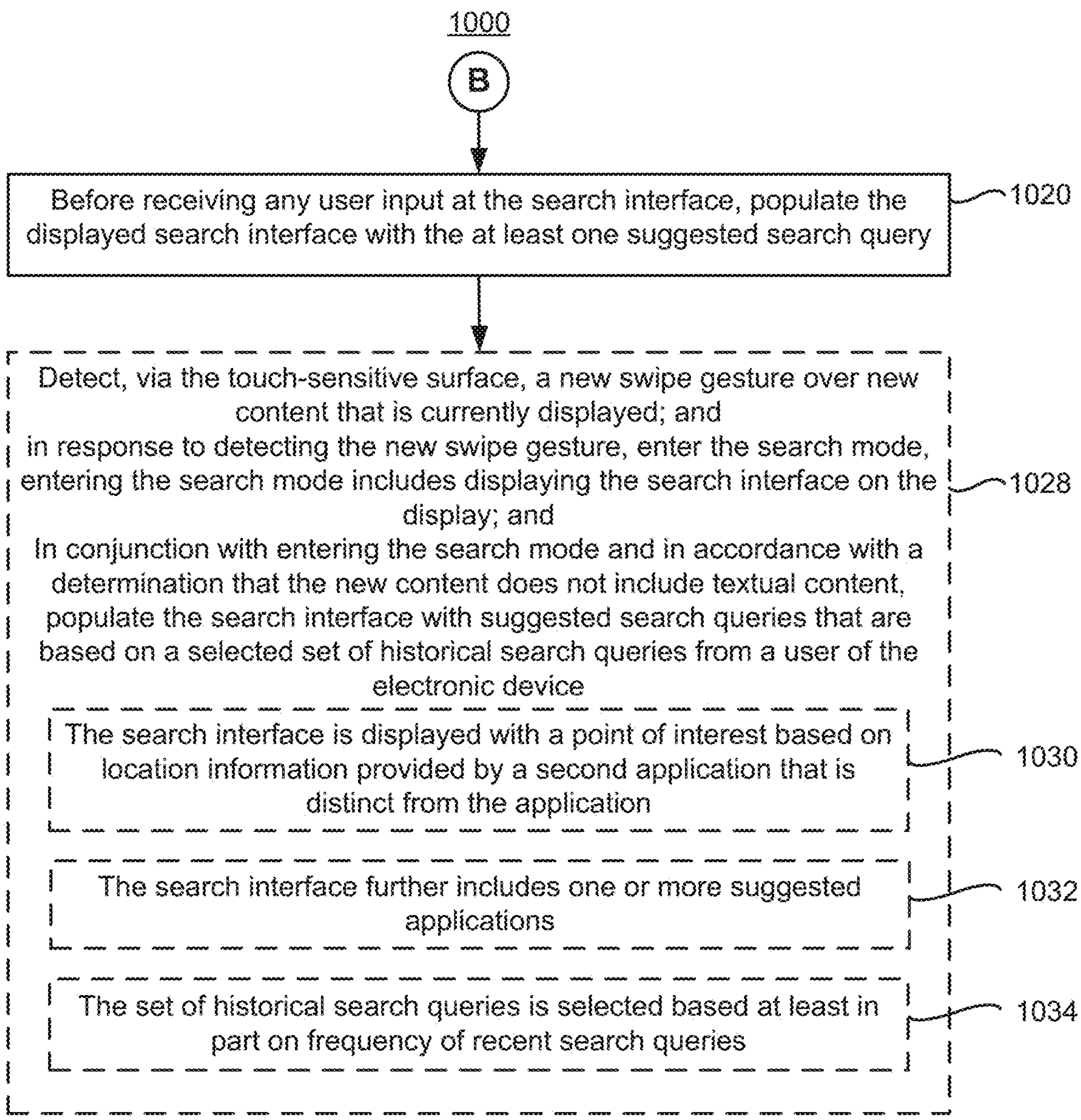

FIGS. 10A-10C are a flowchart depicting a method of proactively suggesting search queries based on content currently being displayed on an electronic device with a touch-sensitive display. FIGS. 11A-11J are schematics of a touch-sensitive display used to illustrate user interfaces for proactively suggesting search queries based on content currently being displayed on the touch-sensitive display. FIGS. 11A-11J are used to illustrate the methods and/or processes of FIGS. 10A-10C.

Figure 13A:
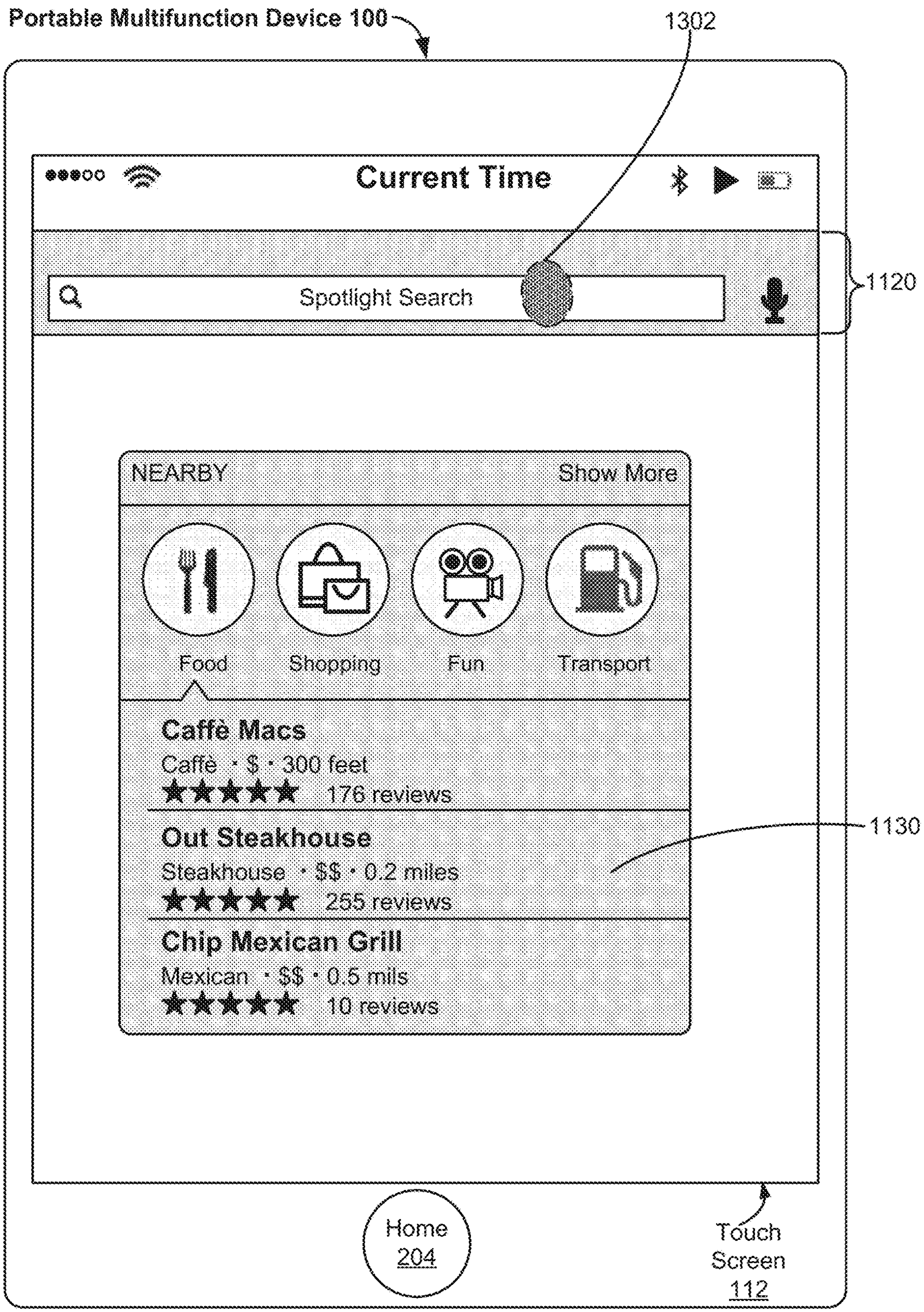
FIGS. 13A-13B are schematics of a touch-sensitive display used to illustrate user interfaces for entering a search mode based on heuristics, in accordance with some embodiments.
Figure 13B:
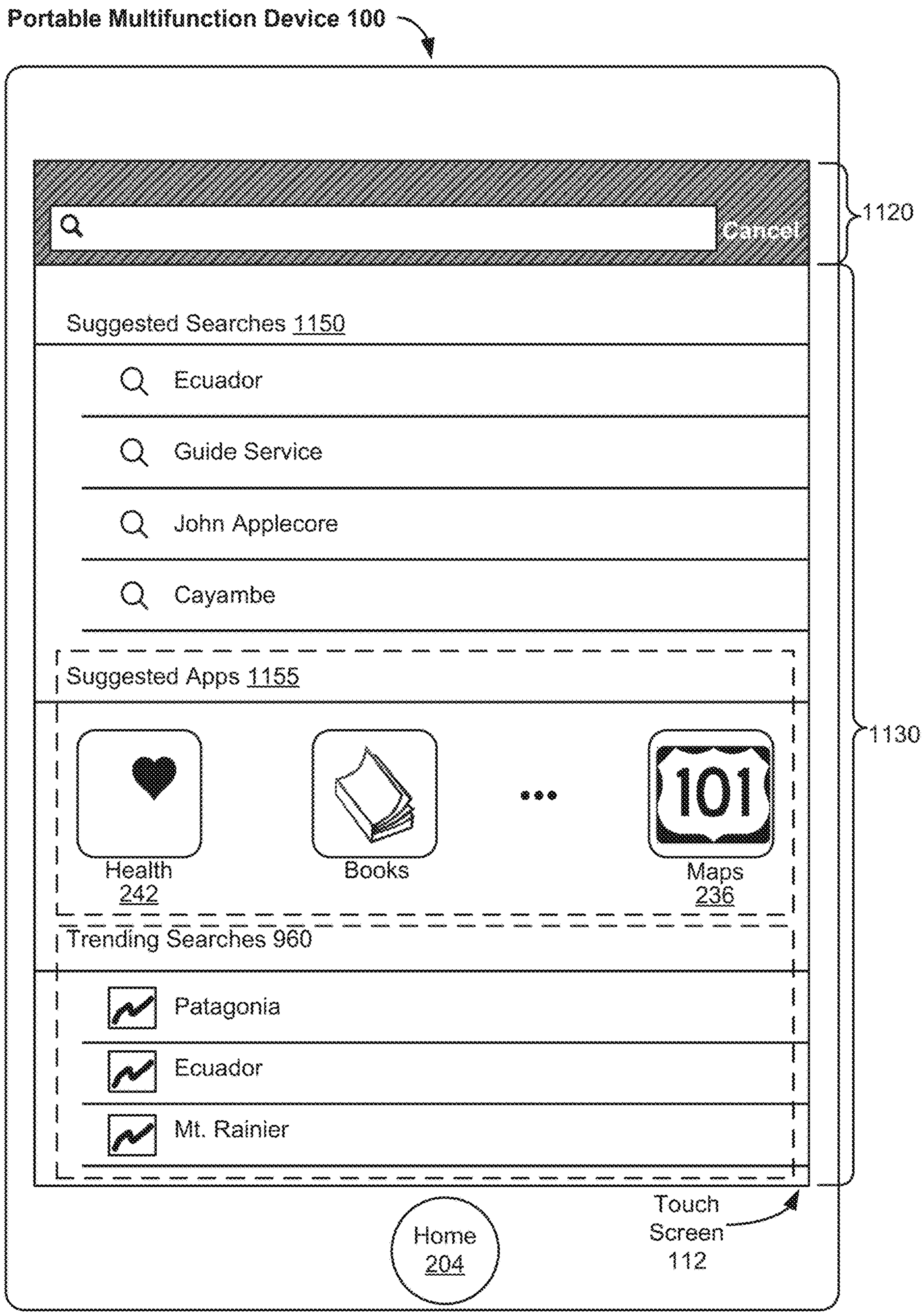

FIG. 12 is a flowchart representation of a method of entering a search mode based on heuristics. FIGS. 13A-13B are schematics of a touch-sensitive display used to illustrate user interfaces for entering a search mode based on heuristics. FIGS. 13A-13B are used to illustrate the methods and/or processes of FIG. 12.

Figure 14:
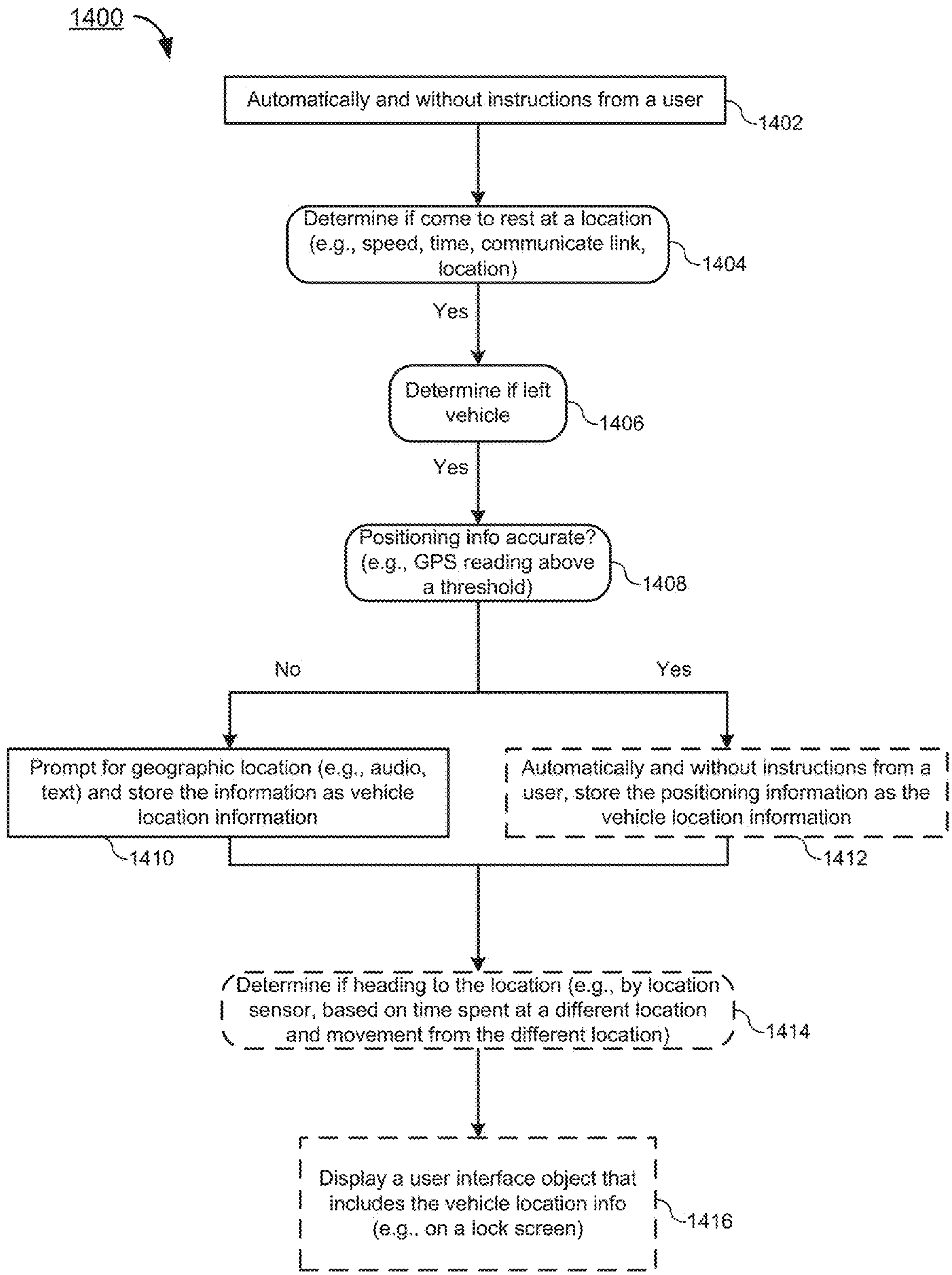
FIG. 14 is a flowchart representation of a method of proactively providing vehicle location on an electronic device with a touch-sensitive display, in accordance with some embodiments.
Figure 15A:
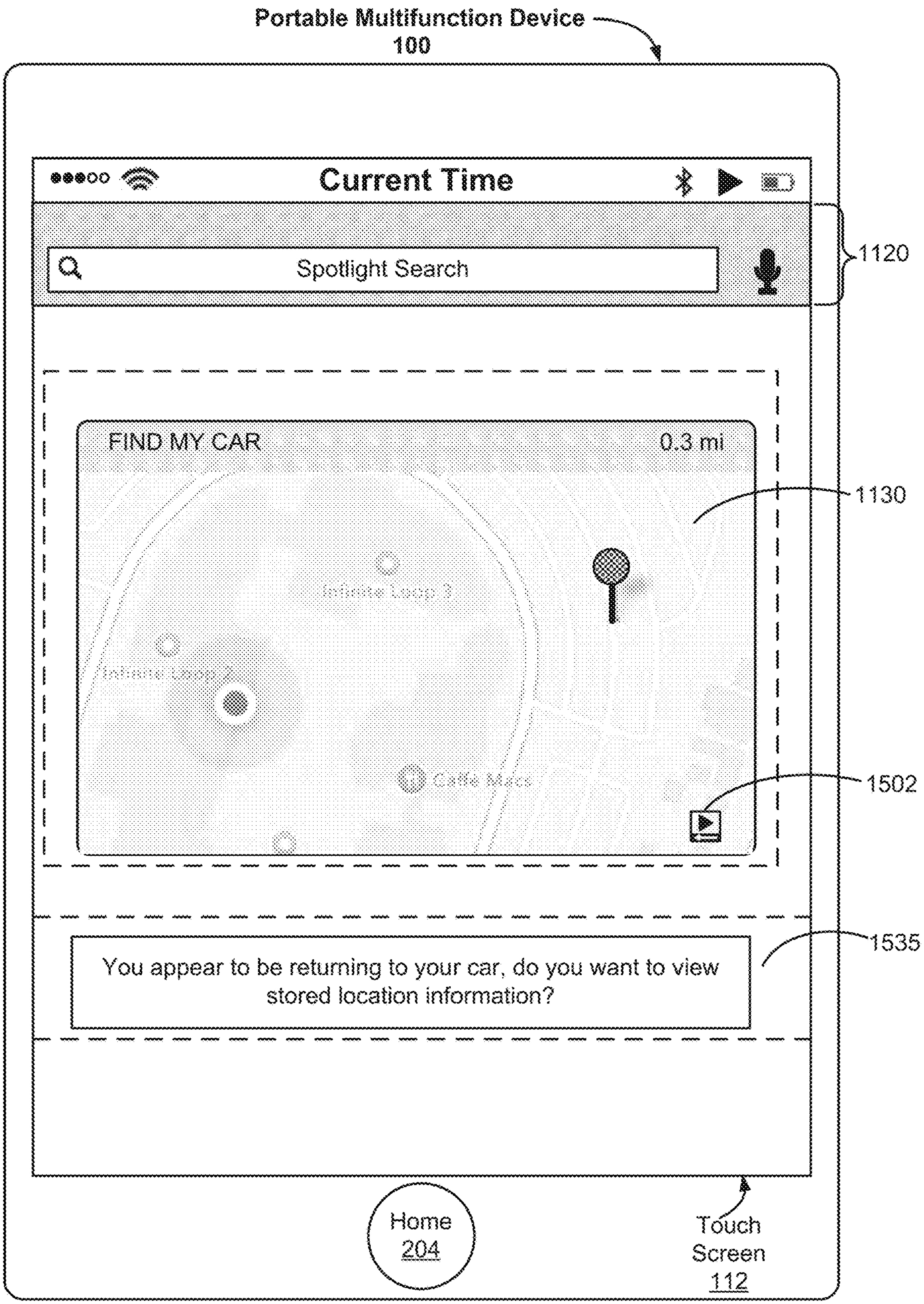
FIGS. 15A-15B are schematics of a touch-sensitive display used to illustrate user interfaces for proactively providing vehicle location, in accordance with some embodiments.
Figure 15B:
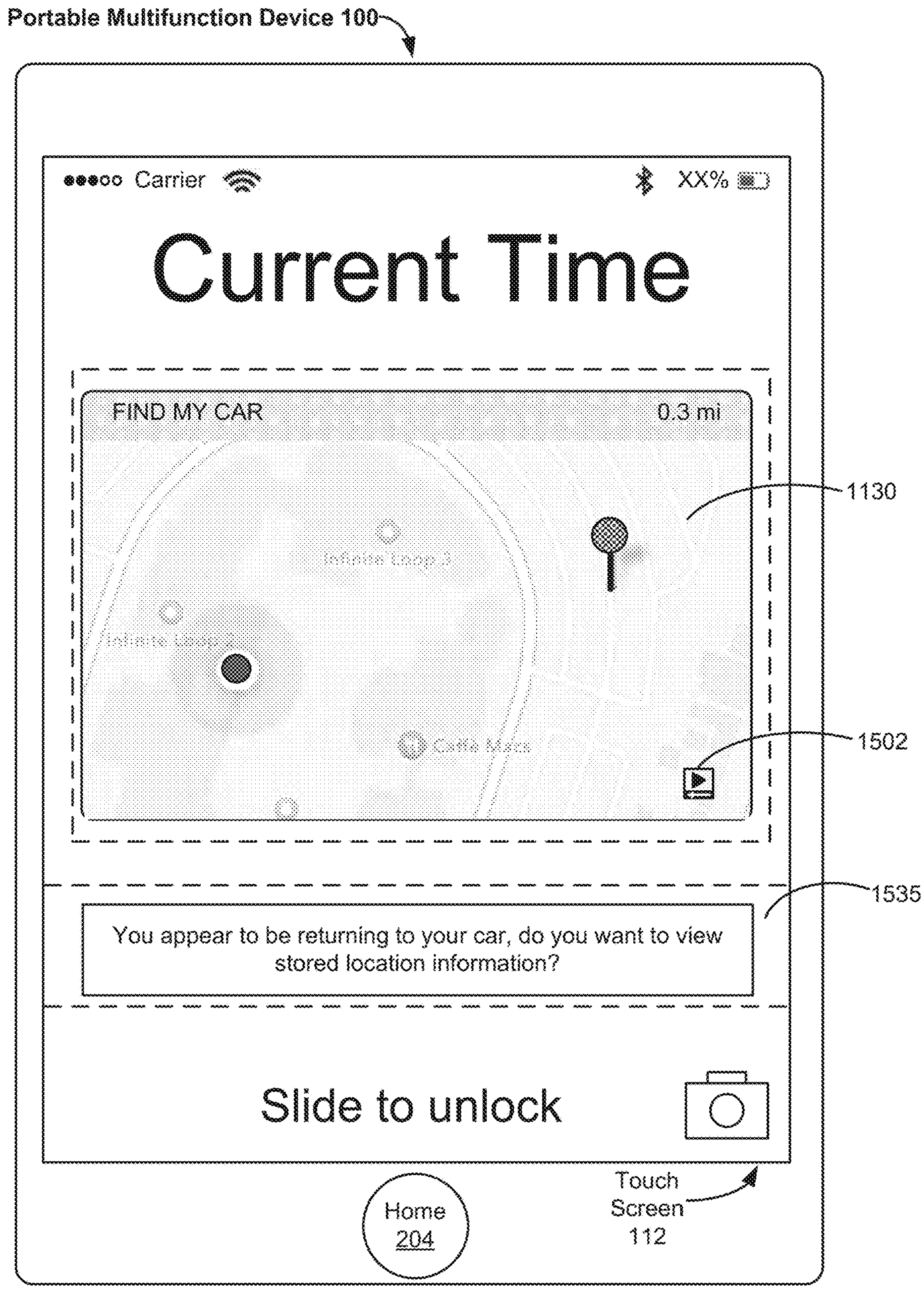

FIG. 14 is a flowchart representation of a method of proactively providing vehicle location on an electronic device with a touch-sensitive display, in accordance with some embodiments. FIGS. 15A-15B are schematics of a touch-sensitive display used to illustrate user interfaces for proactively providing vehicle location, in accordance with some embodiments. FIGS. 15A-15B are used to illustrate the methods and/or processes of FIG. 14.

Figure 16A:
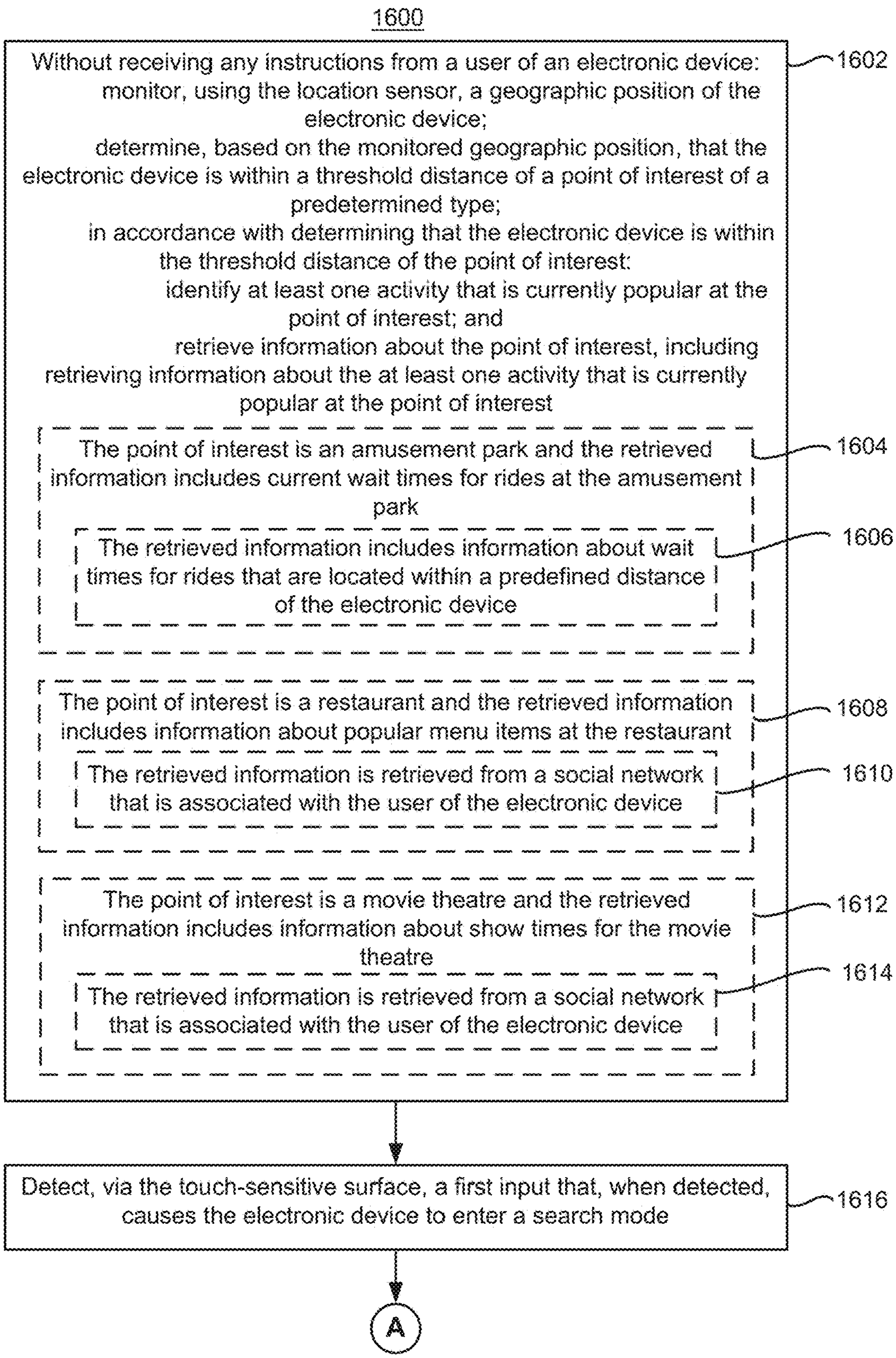
FIGS. 16A-16B are a flowchart representation of a method of proactively providing nearby point of interest (POI) information for search queries, in accordance with some embodiments.
Figure 16B:
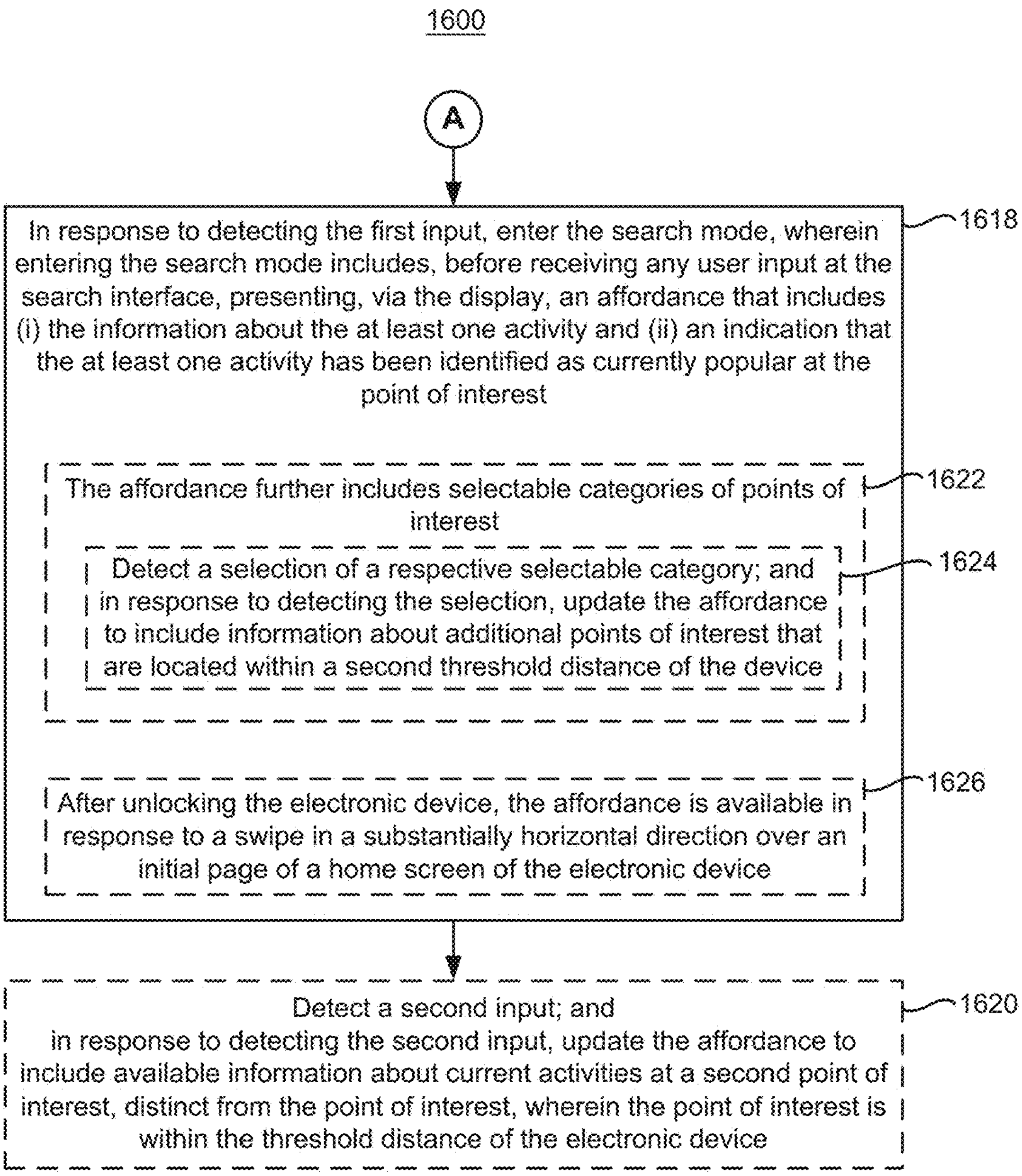

FIGS. 16A-16B are a flowchart representation of a method of proactively providing nearby point of interest (POI) information for search queries, in accordance with some embodiments. FIGS. 17A-17E are schematics of a touch-sensitive display used to illustrate user interfaces for proactively providing nearby point of interest (POI) information for search queries, in accordance with some embodiments. FIGS. 16A-16B are used to illustrate the methods and/or processes of FIGS. 17A-17E.

Figure 18A:
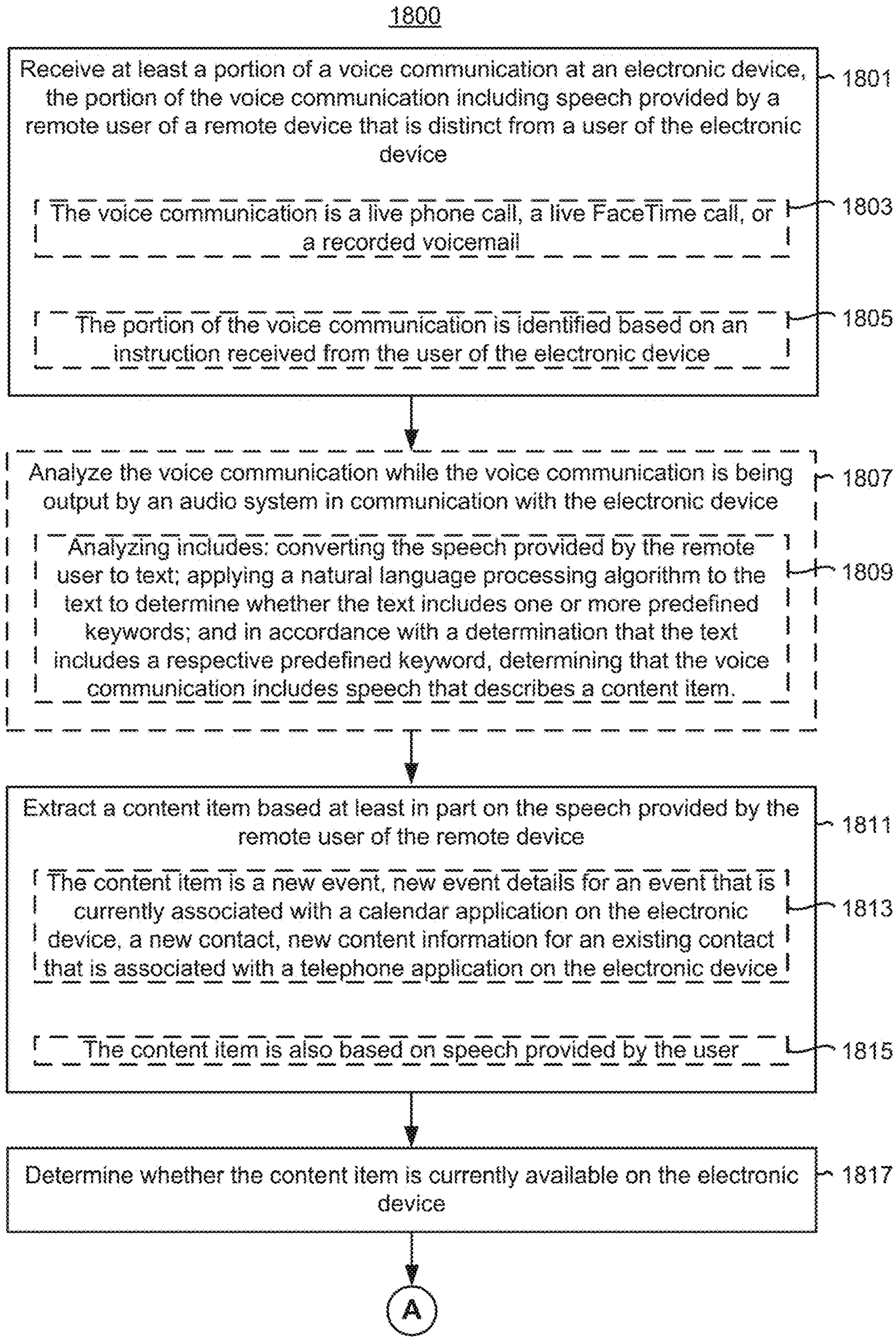
FIGS. 18A-18B are a flowchart representation of a method of extracting a content item from a voice communication and interacting with the extracted content item, in accordance with some embodiments.
Figure 18B:
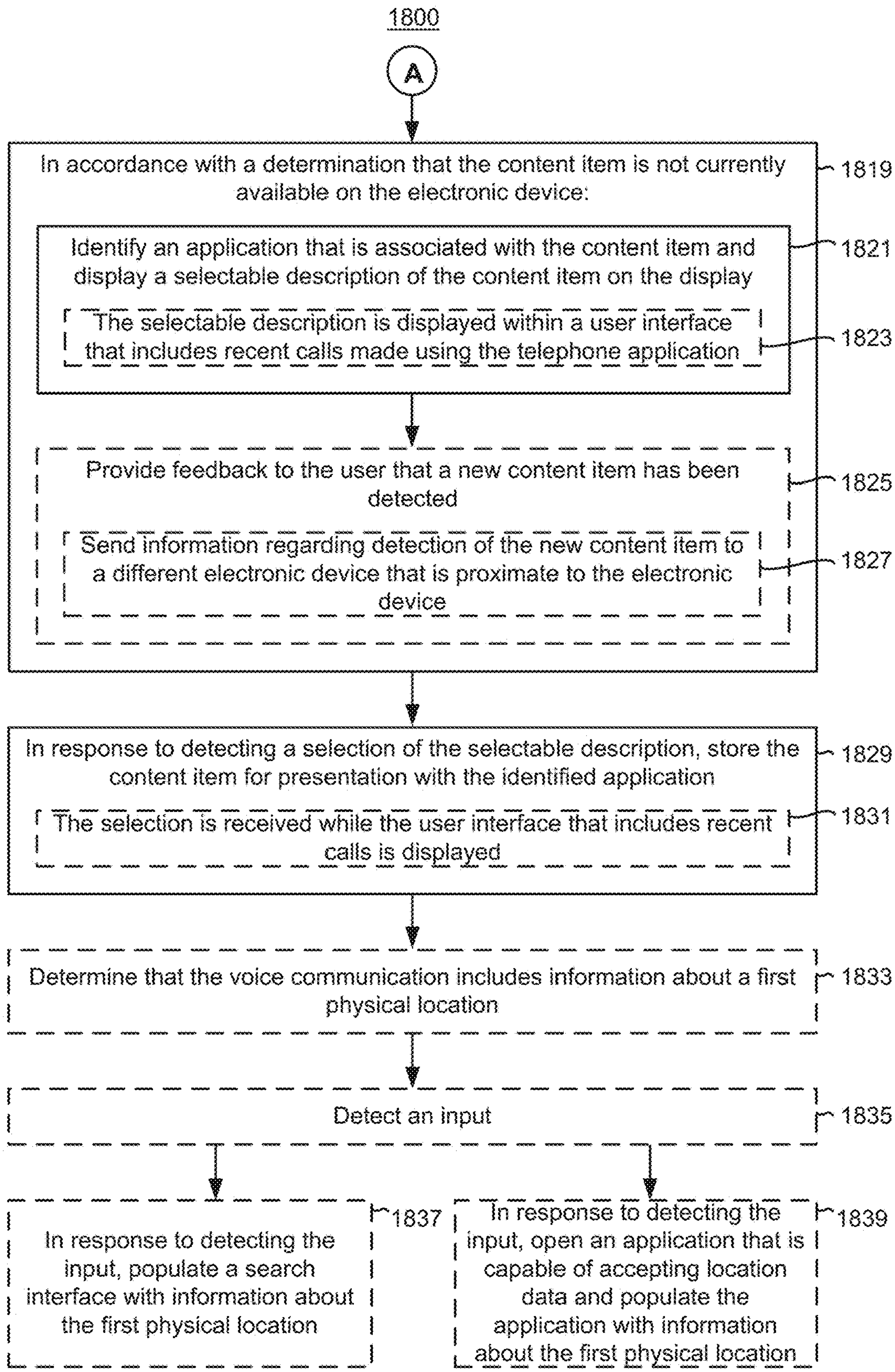

FIGS. 18A-18B are a flowchart representation of a method of extracting a content item from a voice communication and interacting with the extracted content item, in accordance with some embodiments. FIGS. 19A-19F are schematics of a touch-sensitive display used to illustrate user interfaces for displaying and interacting with content items that have been extracted from voice communications, in accordance with some embodiments. FIGS. 19A-19F are used to illustrate the methods and/or processes of FIGS. 18A-18B.

Figure 19A:
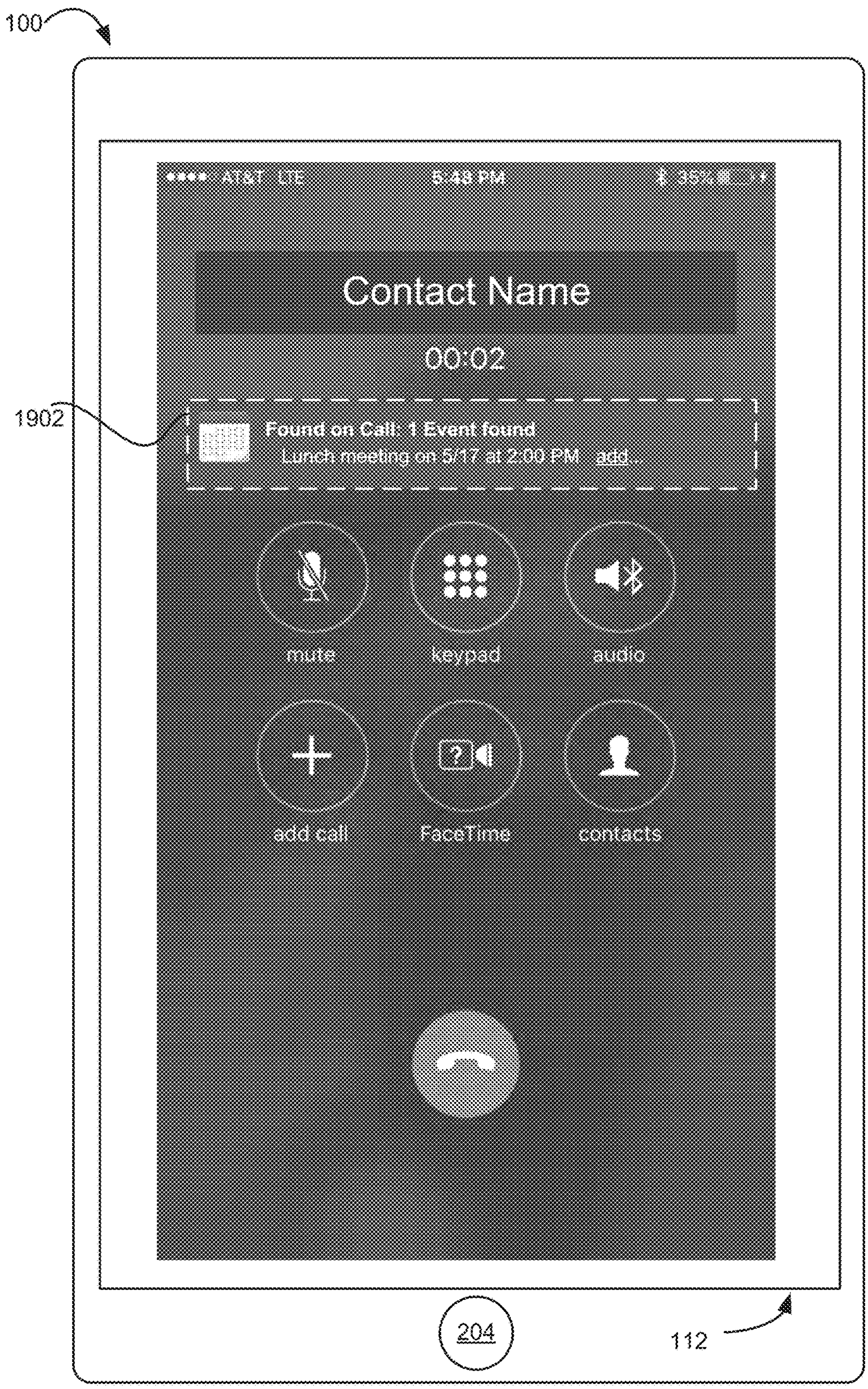
FIGS. 19A-19F are schematics of a touch-sensitive display used to illustrate user interfaces for displaying and interacting with content items that have been extracted from voice communications, in accordance with some embodiments.
Figure 19B:
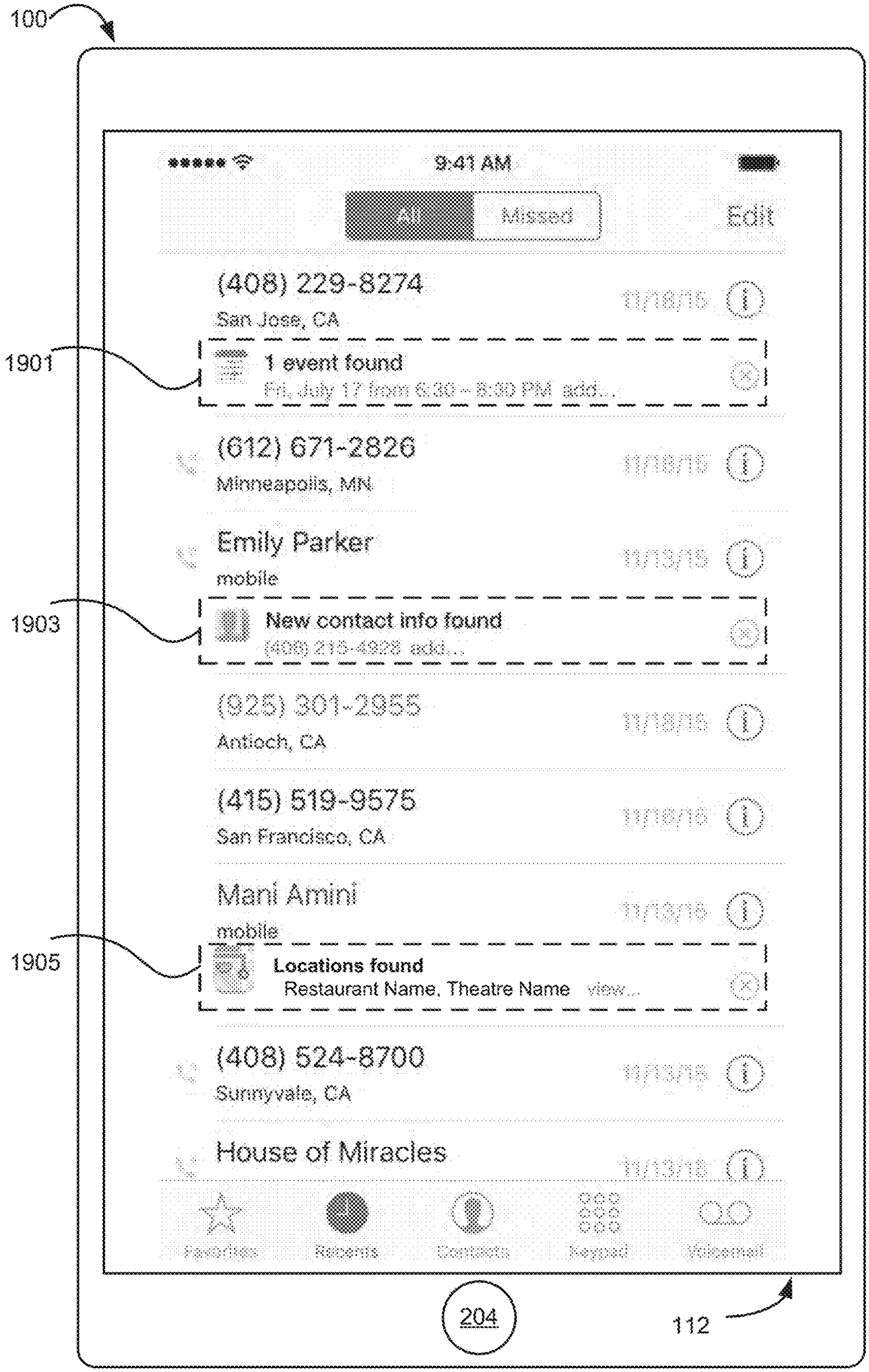
Figure 19C:
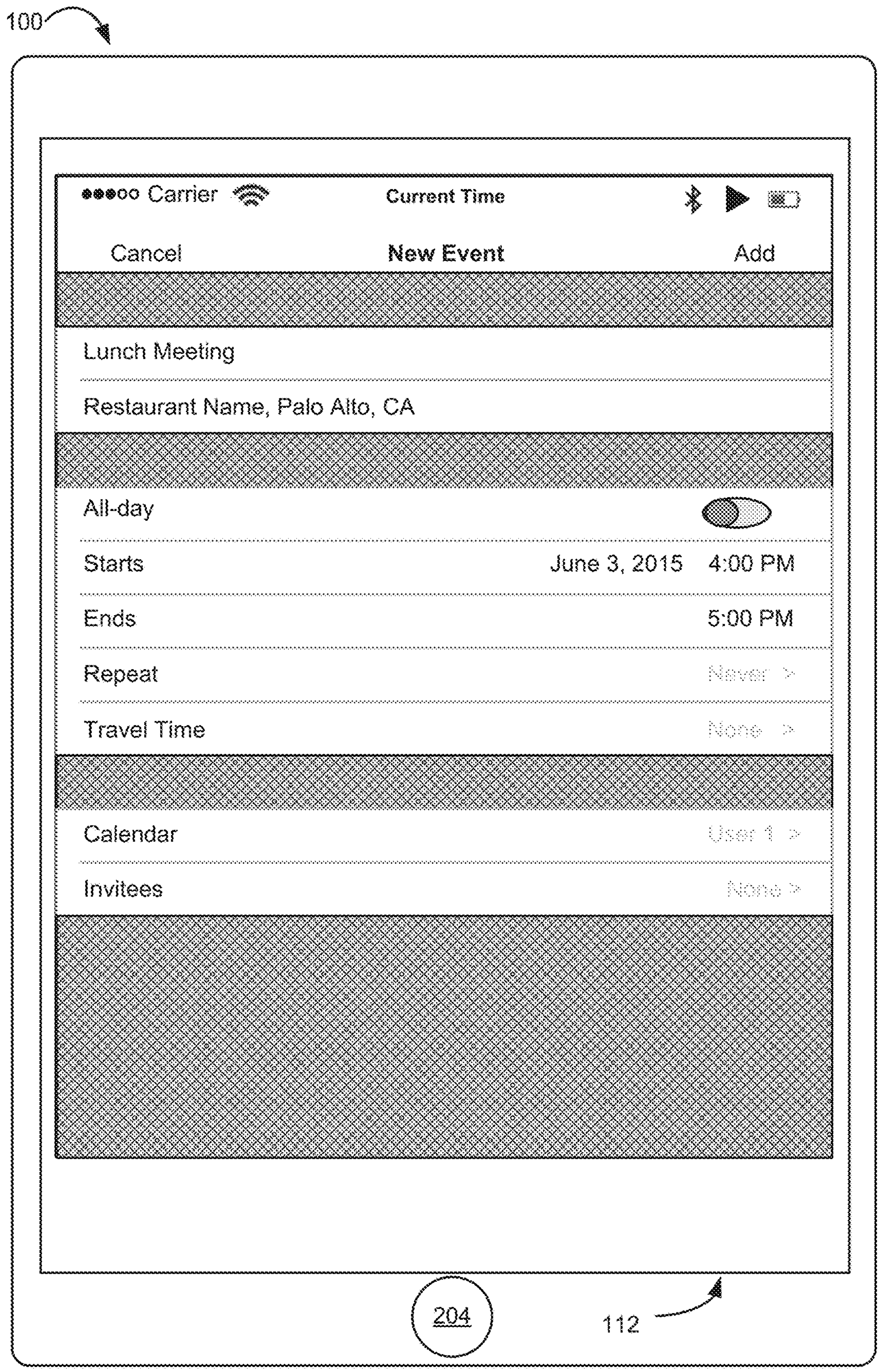
Figure 19D:
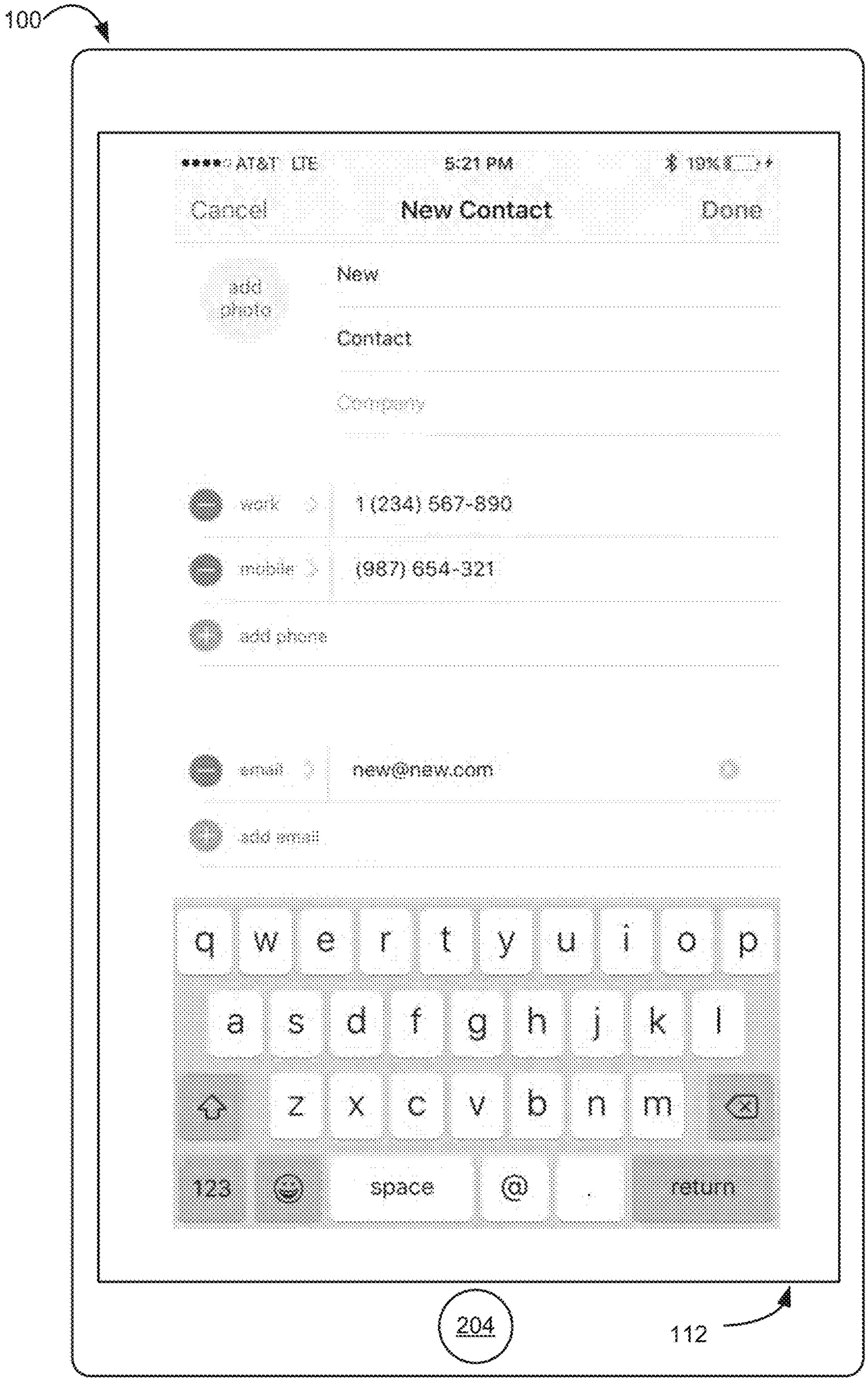
Figure 19E:
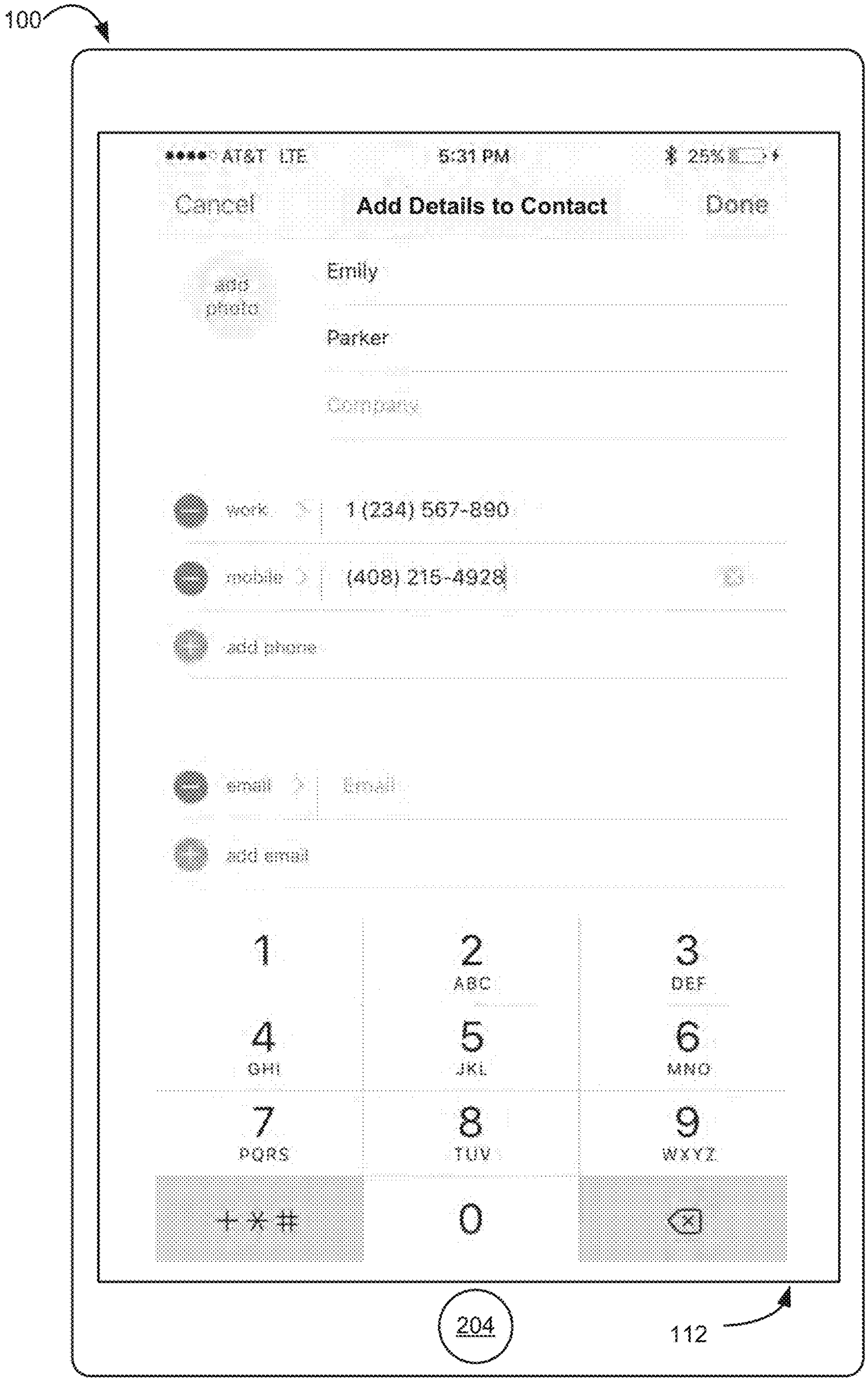
Figure 19F:
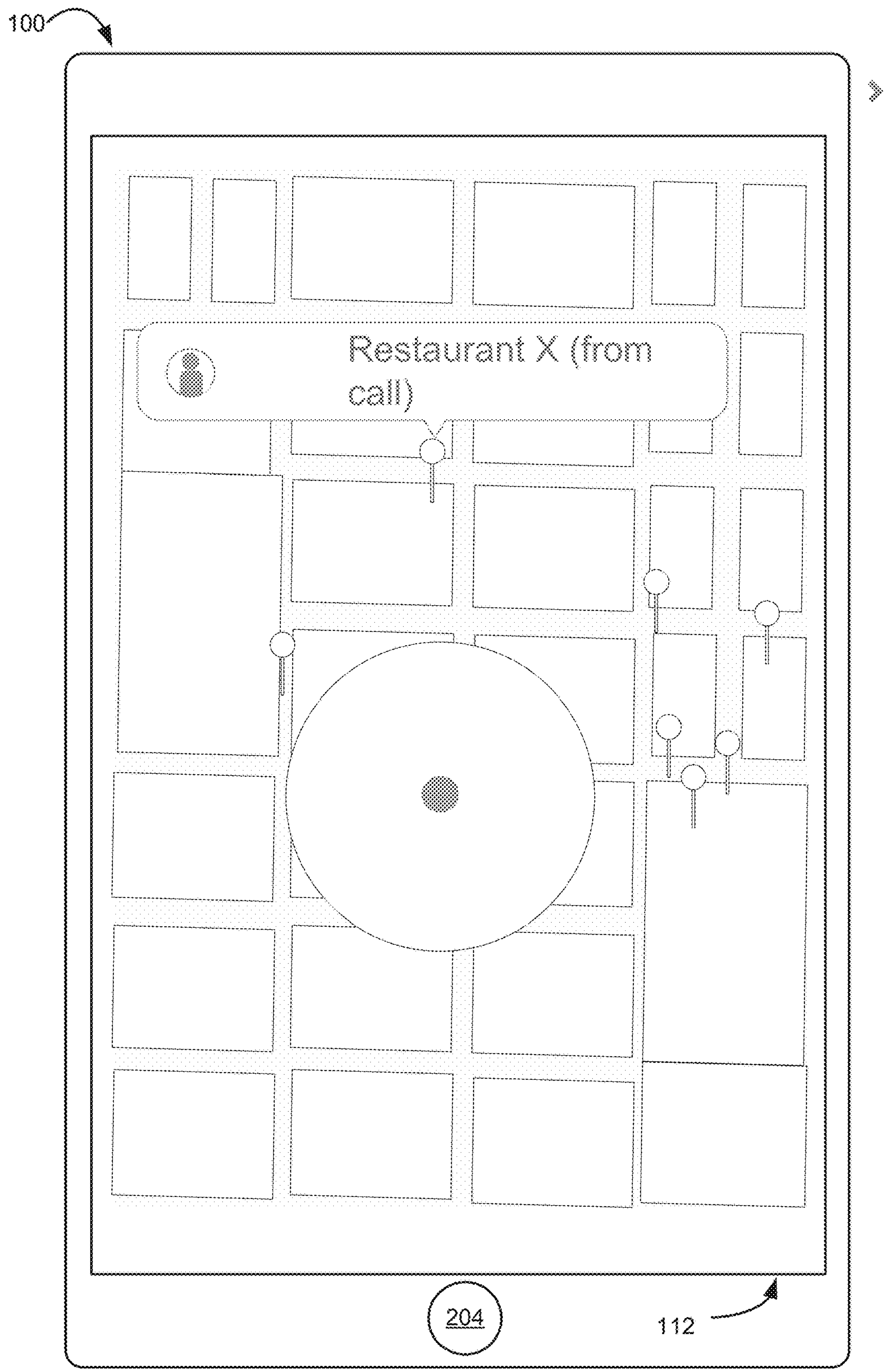
Figure 20:
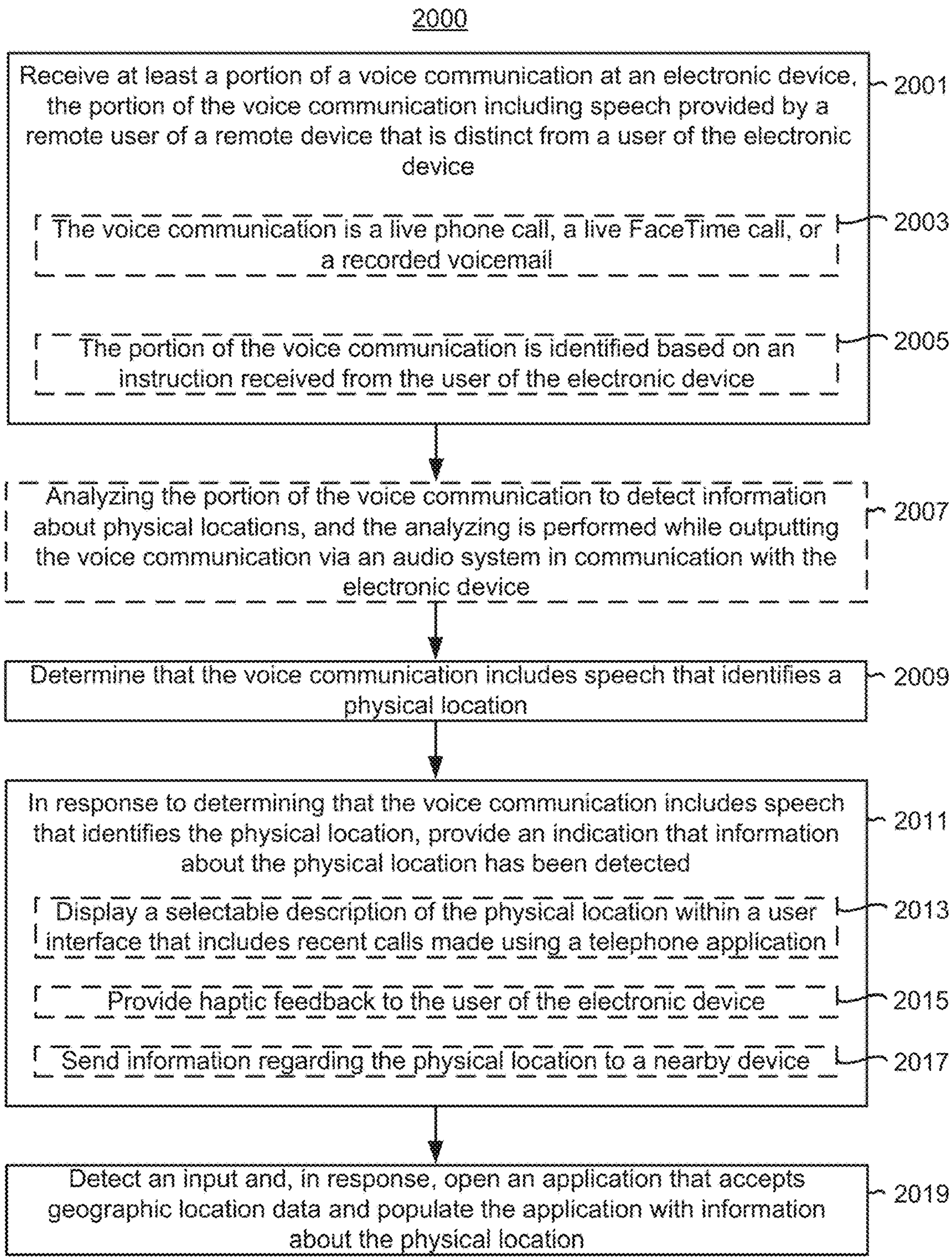
FIG. 20 is a flowchart representation of a method of determining that a voice communication includes speech that identifies a physical location and populating an application with information about the physical location, in accordance with some embodiments.
Figure 21A:
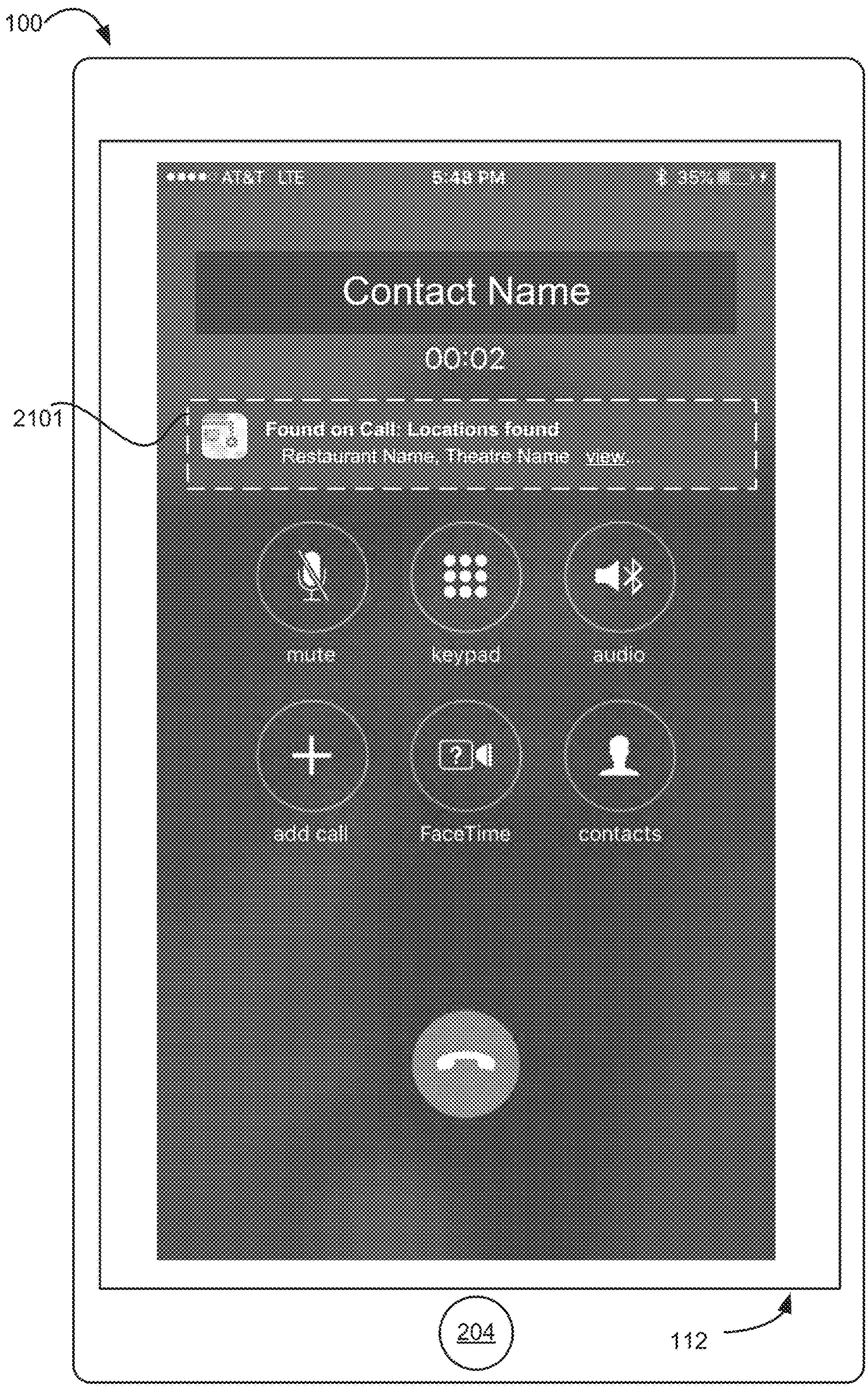
FIGS. 21A-21B are schematics of a touch-sensitive display used to illustrate user interfaces for determining that a voice communication includes speech that identifies a physical location and populating an application with information about the physical location, in accordance with some embodiments.
Figure 21B:
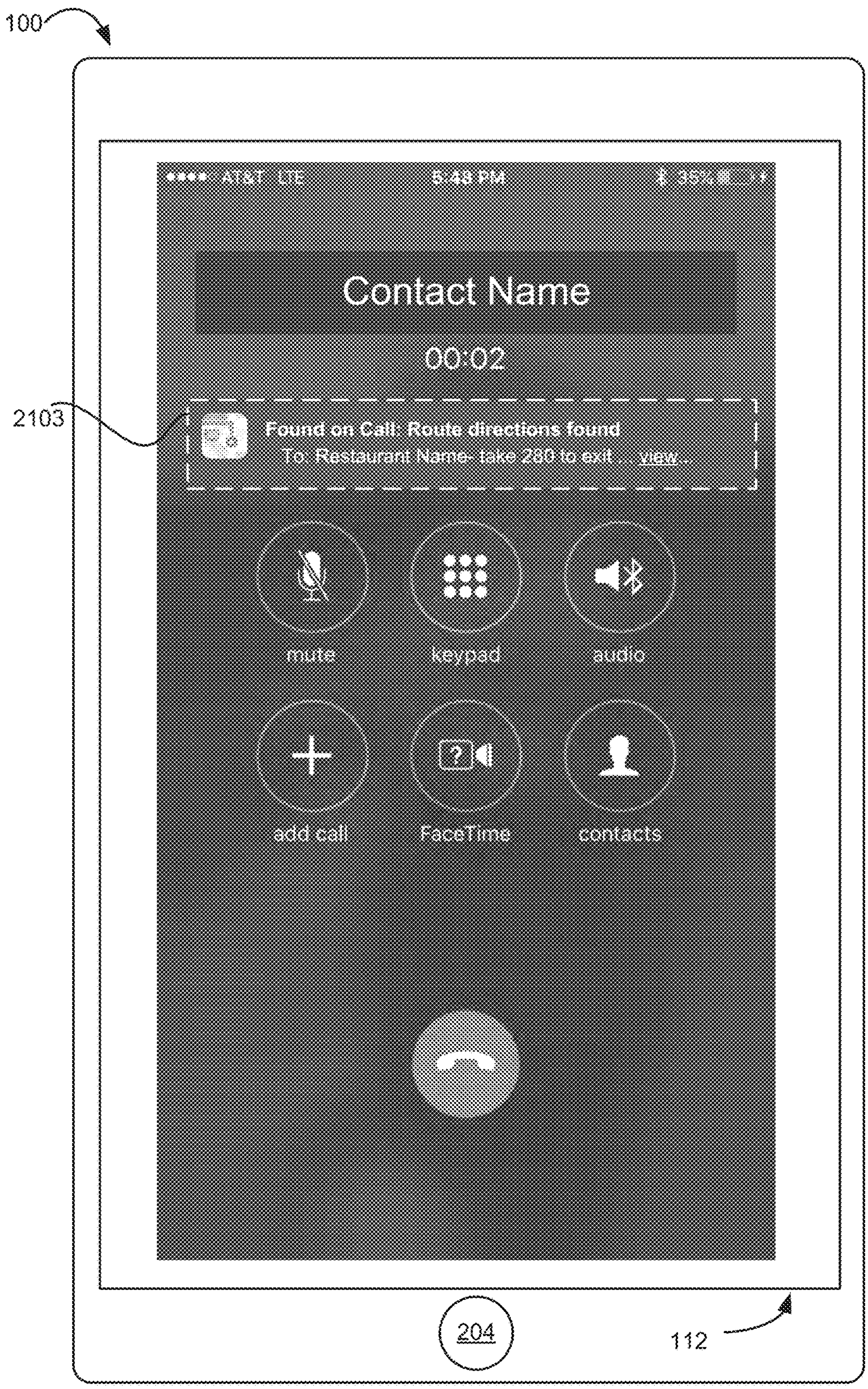

FIG. 20 is a flowchart representation of a method of determining that a voice communication includes speech that identifies a physical location and populating an application with information about the physical location, in accordance with some embodiments. FIGS. 21A-21B are schematics of a touch-sensitive display used to illustrate user interfaces for determining that a voice communication includes speech that identifies a physical location and populating an application with information about the physical location, in accordance with some embodiments. FIGS. 19A-19F and FIGS. 21A-21B are used to illustrate the methods and/or processes of FIG. 20.

Figure 22A:
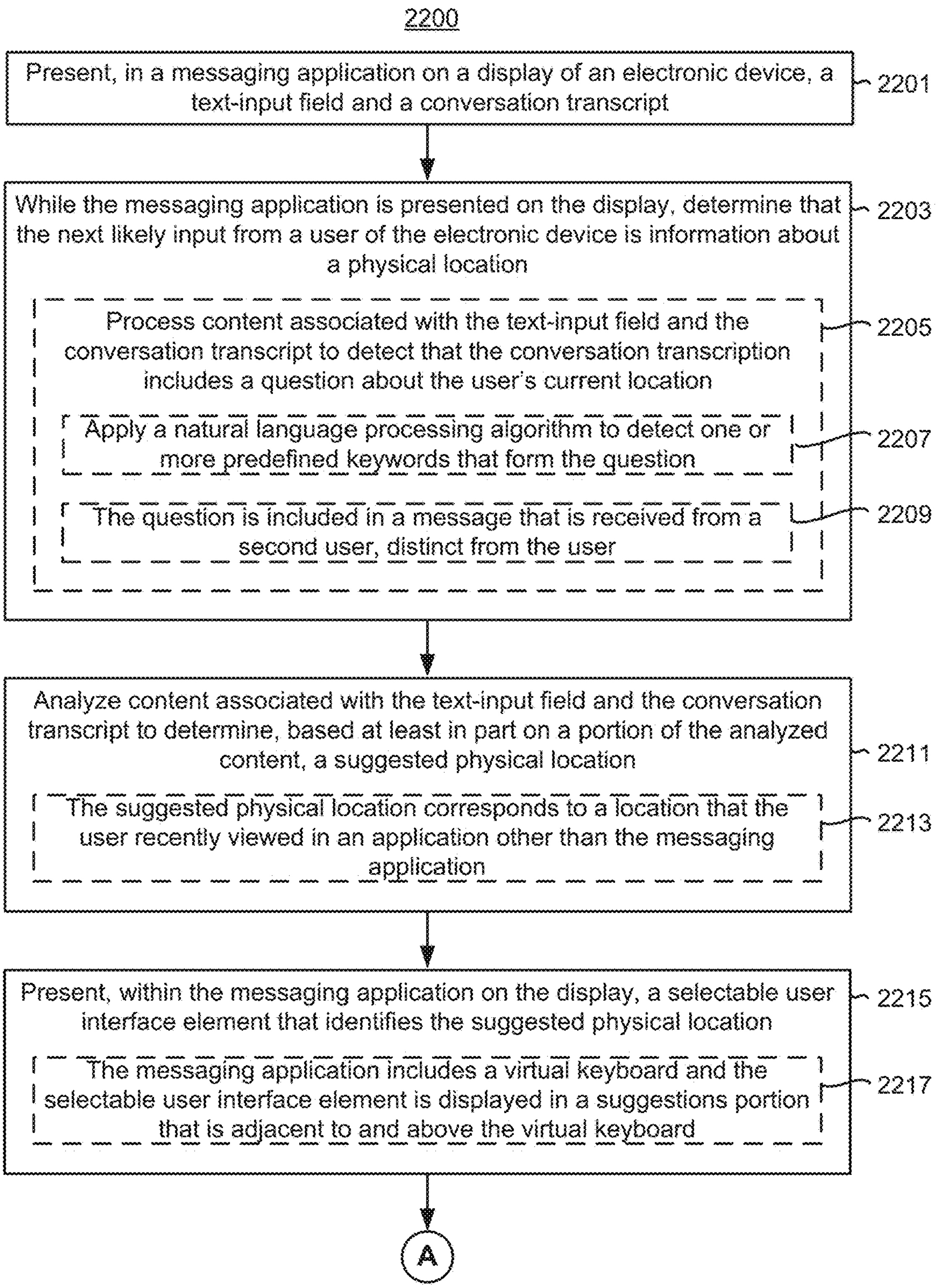
FIGS. 22A-22B are a flowchart representation of a method of proactively suggesting physical locations for use in a messaging application, in accordance with some embodiments.
Figure 22B:
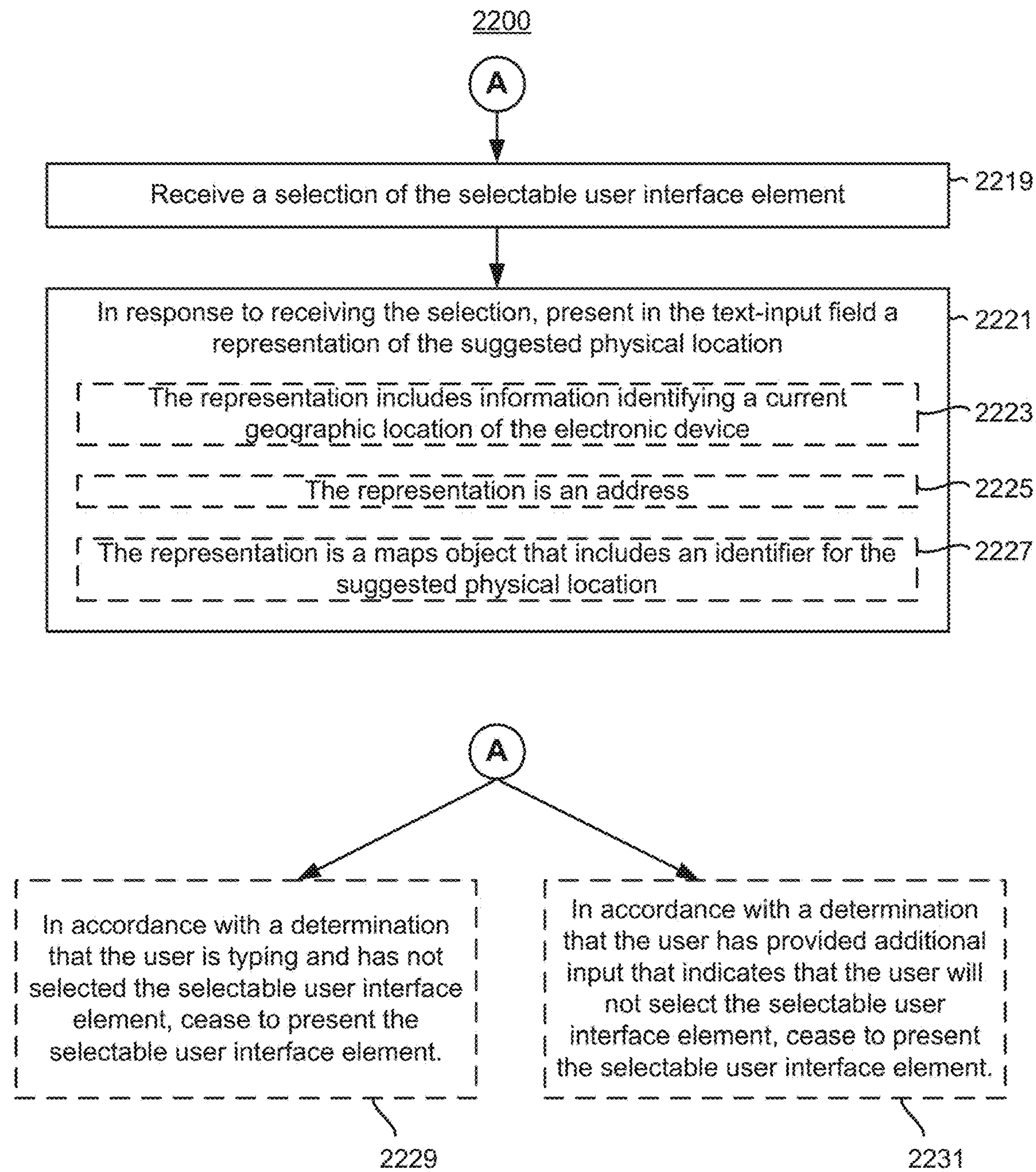
Figure 23B:
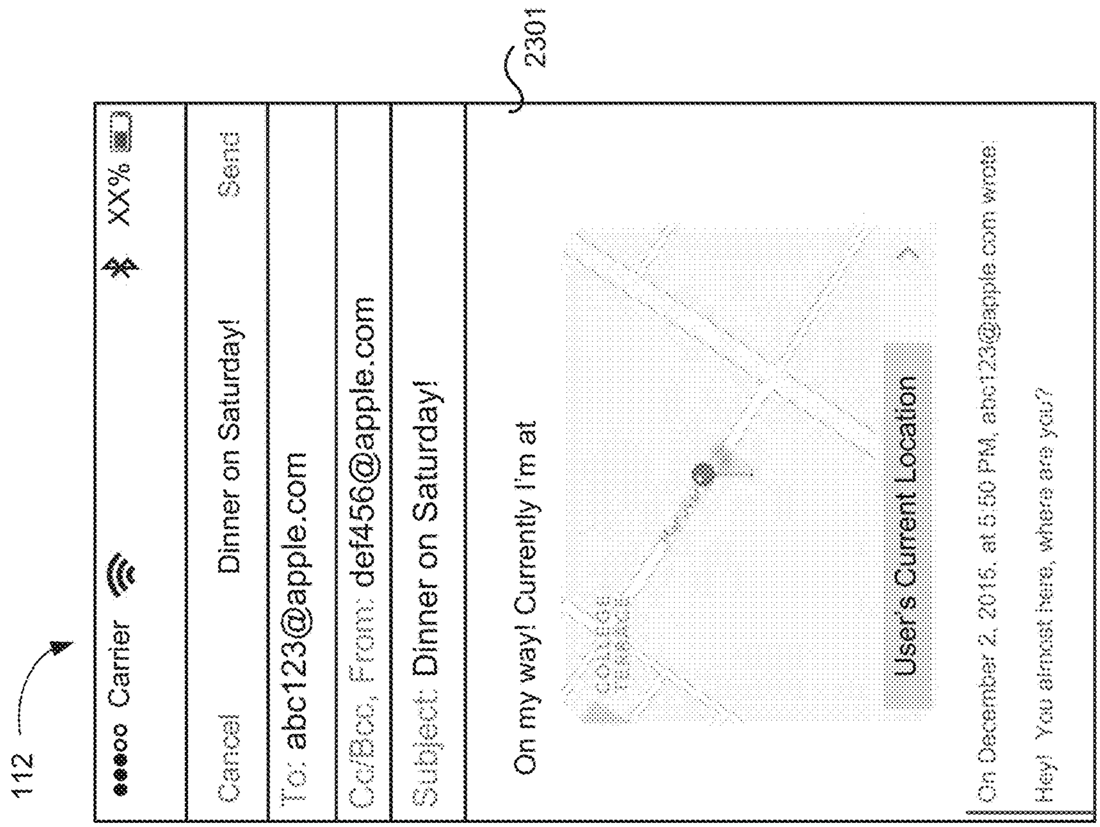
FIGS. 23A-23O are schematics of a touch-sensitive display used to illustrate user interfaces for proactively suggesting information that relates to locations, events, or contacts (e.g., for easy selection by a user and inclusion in a messaging application), in accordance with some embodiments.
Figure 23A:
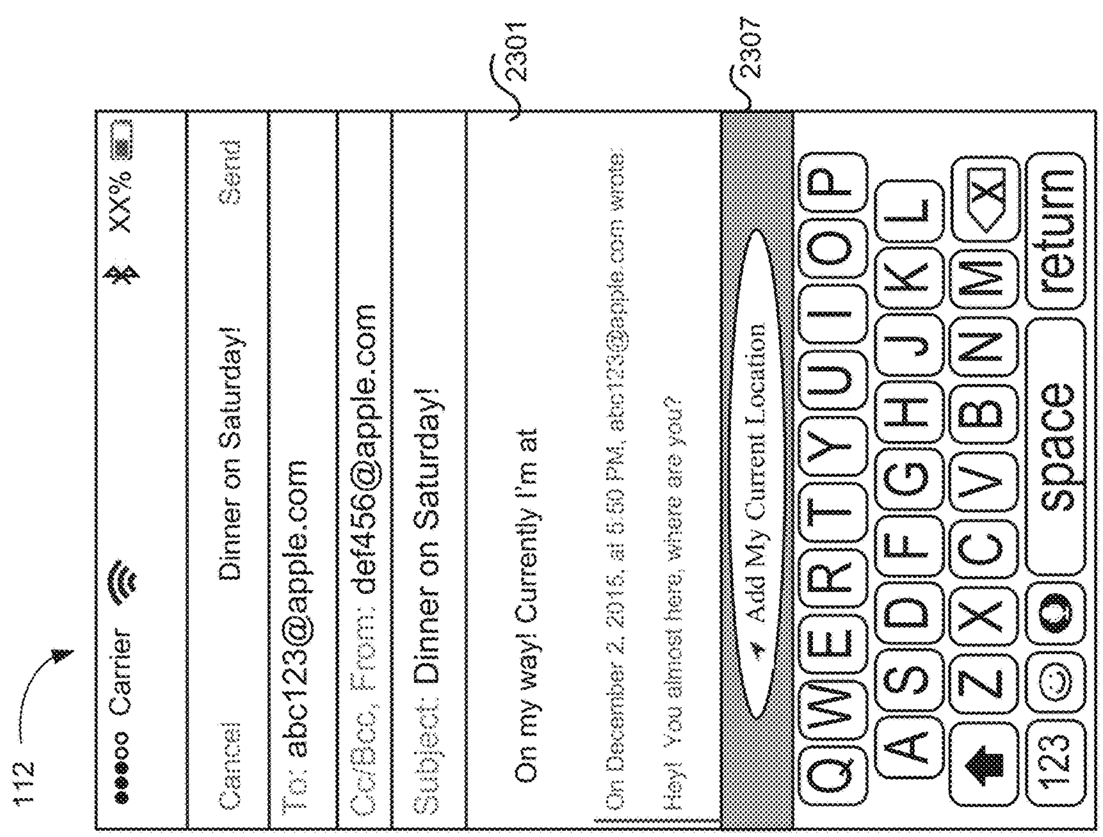
Figure 23D:
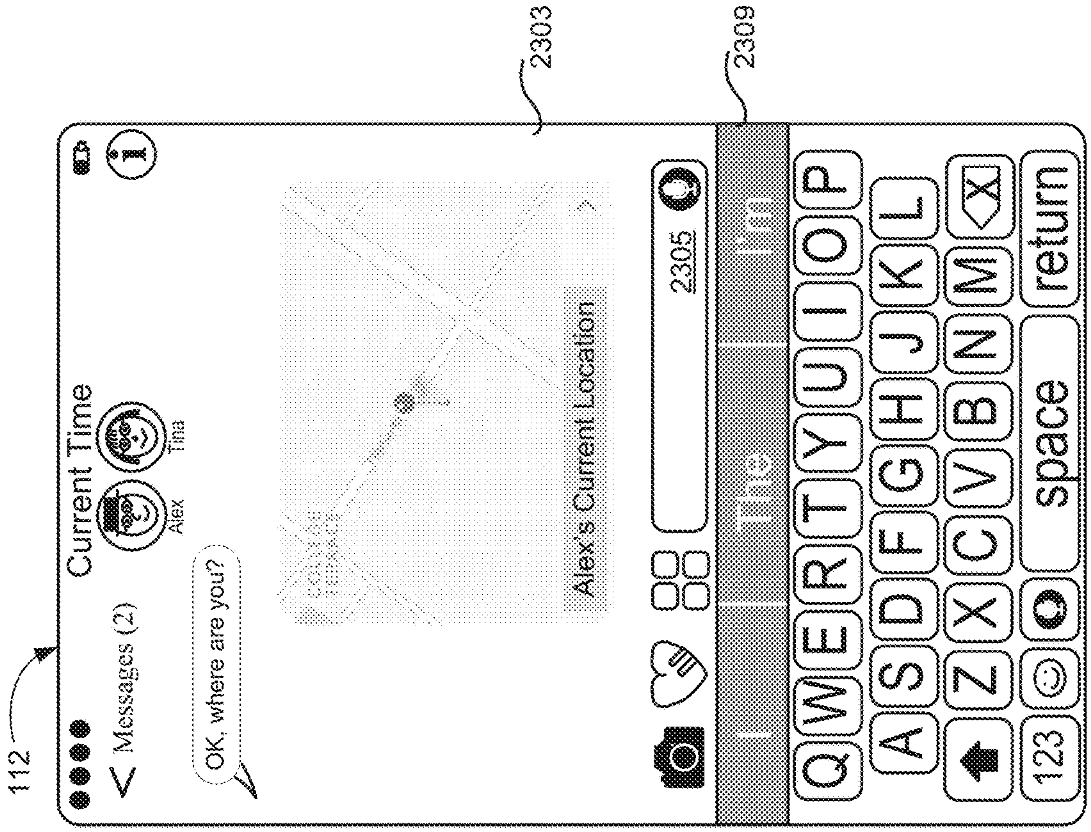
Figure 23C:
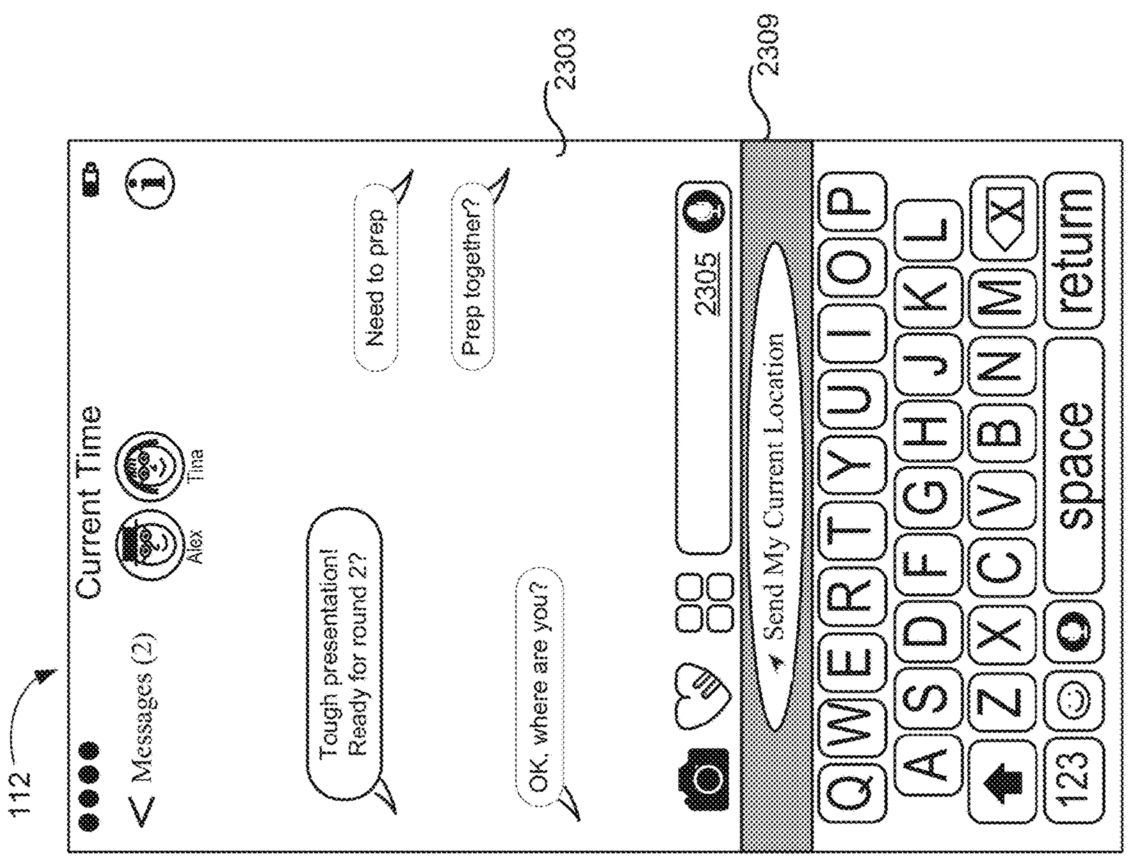

FIGS. 22A-22B are a flowchart representation of a method of proactively suggesting physical locations for use in a messaging application, in accordance with some embodiments. FIGS. 23A-23O are schematics of a touch-sensitive display used to illustrate user interfaces for proactively suggesting information that relates to locations, events, or contacts (e.g., for easy selection by a user and inclusion in a messaging application), in accordance with some embodiments. FIGS. 23A-23O are used to illustrate the methods and/or processes of FIGS. 22A-22B.

Figure 22C:
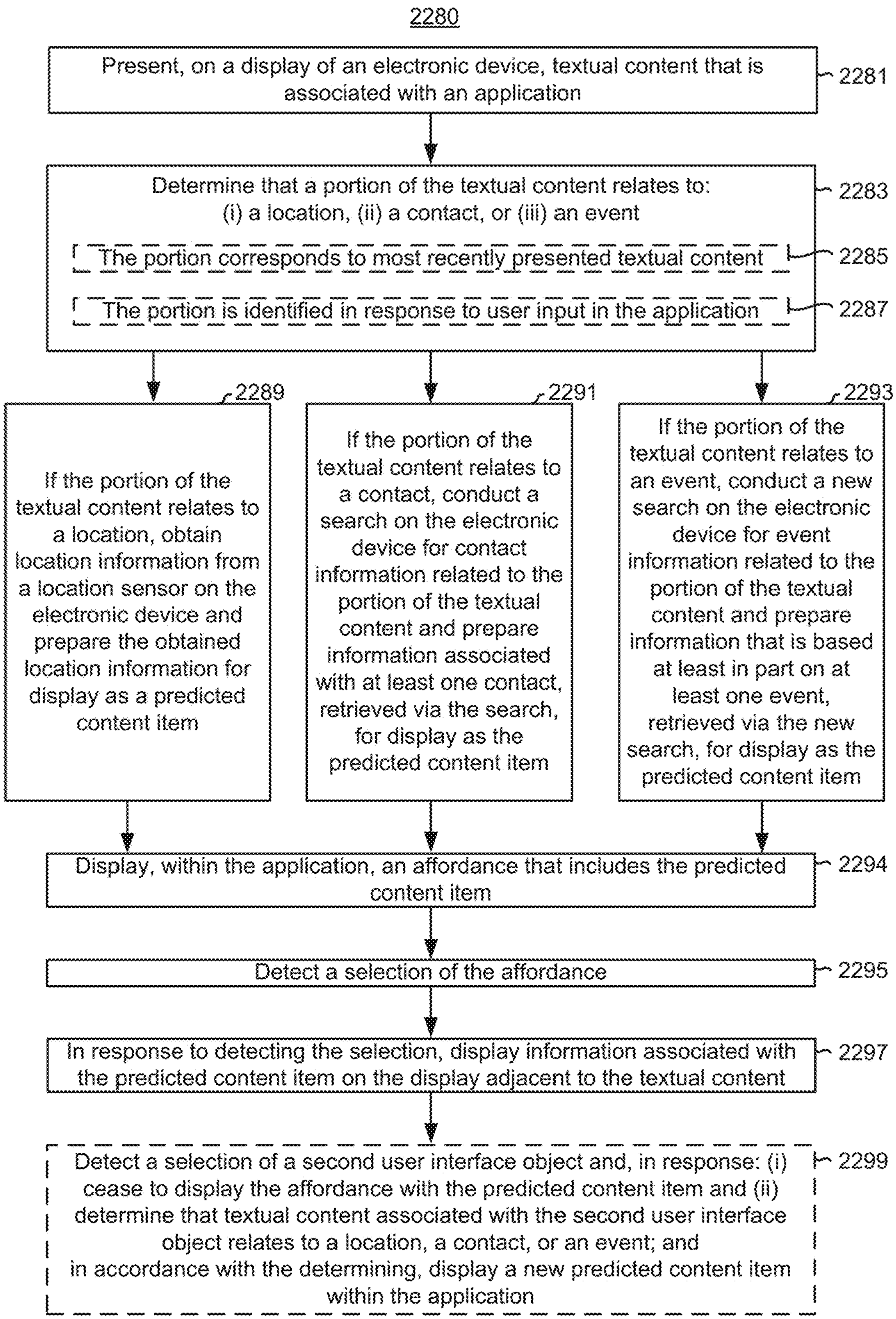
FIG. 22C is a flowchart representation of a method of proactively suggesting information that relates to locations, events, or contacts, in accordance with some embodiments.

FIG. 22C is a flowchart representation of a method of proactively suggesting information that relates to locations, events, or contacts, in accordance with some embodiments. FIGS. 23A-23O are used to illustrate the methods and/or processes of FIG. 22C.

Figure 24A:
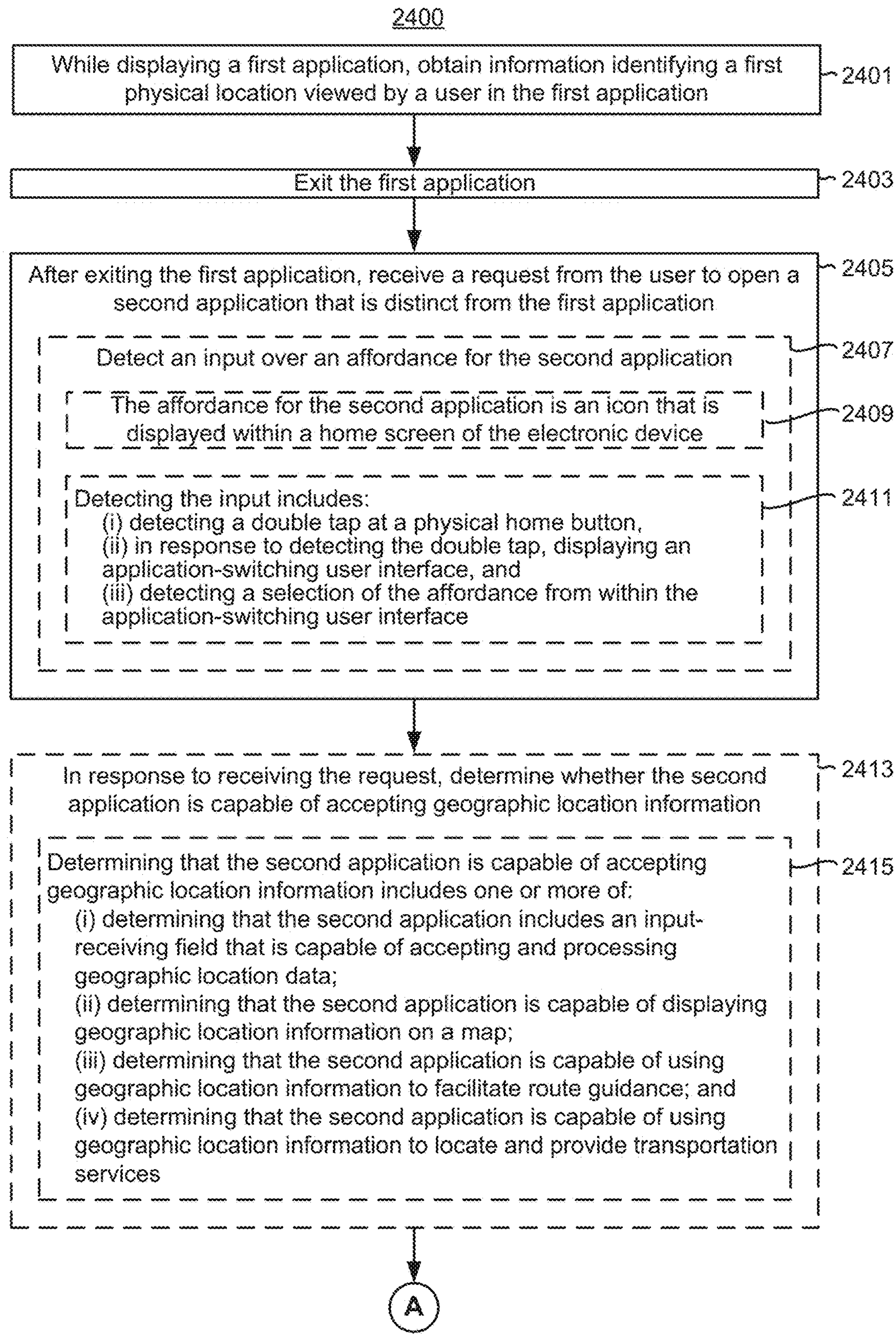
FIGS. 24A-24B are a flowchart representation of a method of proactively populating an application with information that was previously viewed by a user in a different application, in accordance with some embodiments.
Figure 24B:
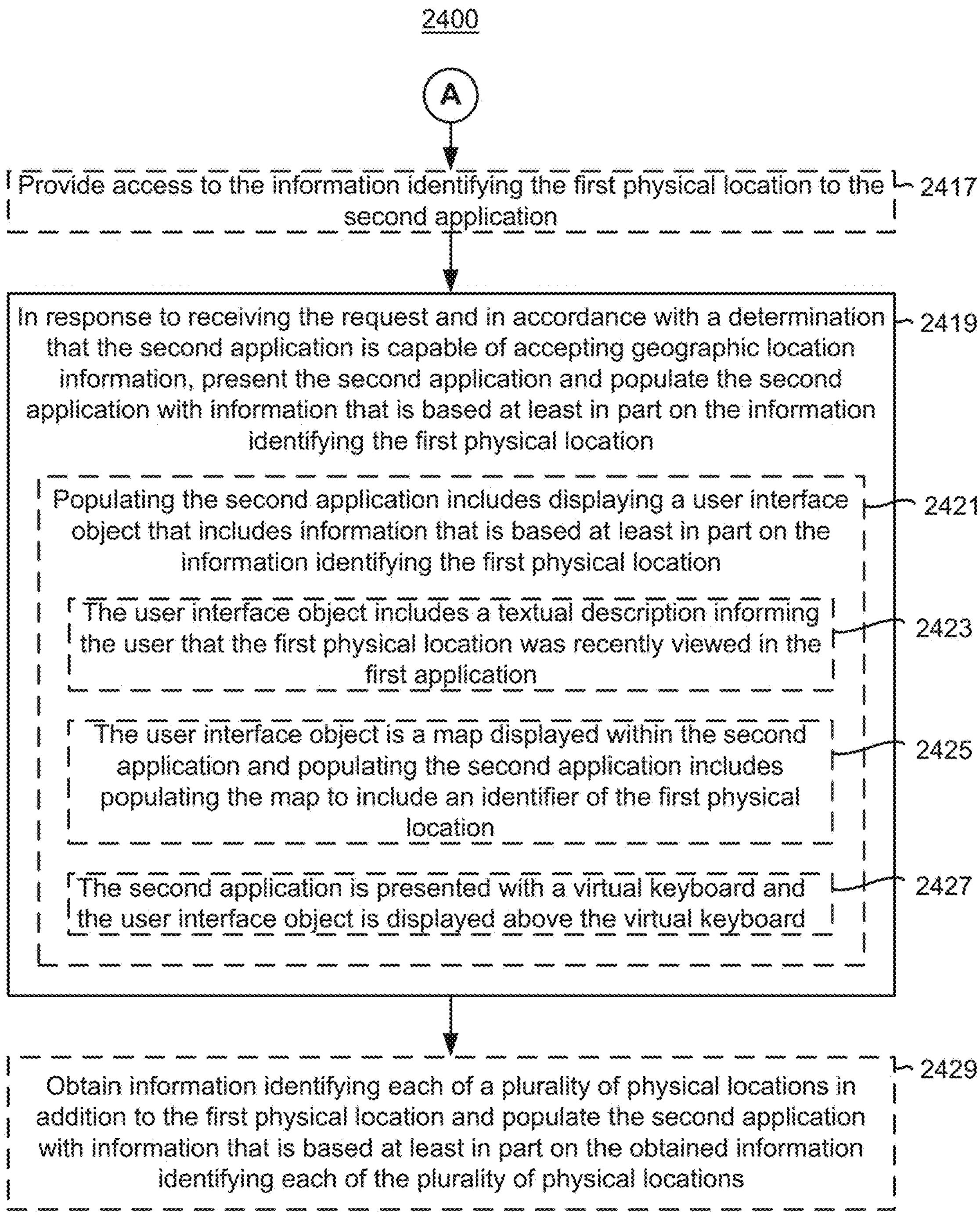

FIGS. 24A-24B are a flowchart representation of a method of proactively populating an application with information that was previously viewed by a user in a different application, in accordance with some embodiments. FIGS. 25A-25J are schematics of a touch-sensitive display used to illustrate user interfaces for proactively populating an application with information that was previously viewed by a user in a different application (e.g., populating a ride-sharing application with information about locations viewed by the user in a reviewing application), in accordance with some embodiments. FIGS. 25A-25J are used to illustrate the methods and/or processes of FIGS. 24A-24B.

Figure 25A:
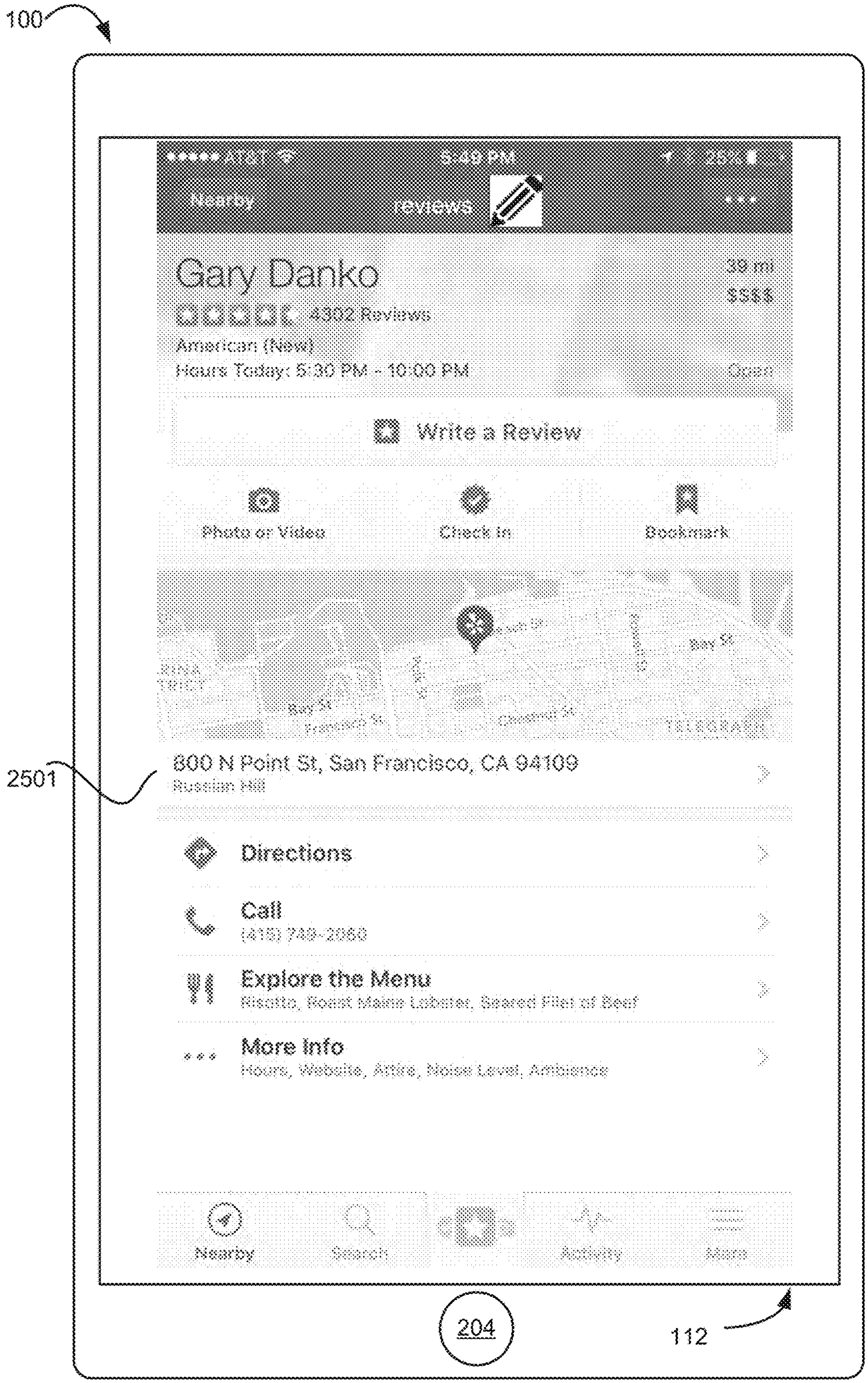
FIGS. 25A-25J are schematics of a touch-sensitive display used to illustrate user interfaces for proactively populating an application with information that was previously viewed by a user in a different application (e.g., populating a ride-sharing application with information about locations viewed by the user in a reviewing application), in accordance with some embodiments.
Figure 25B:
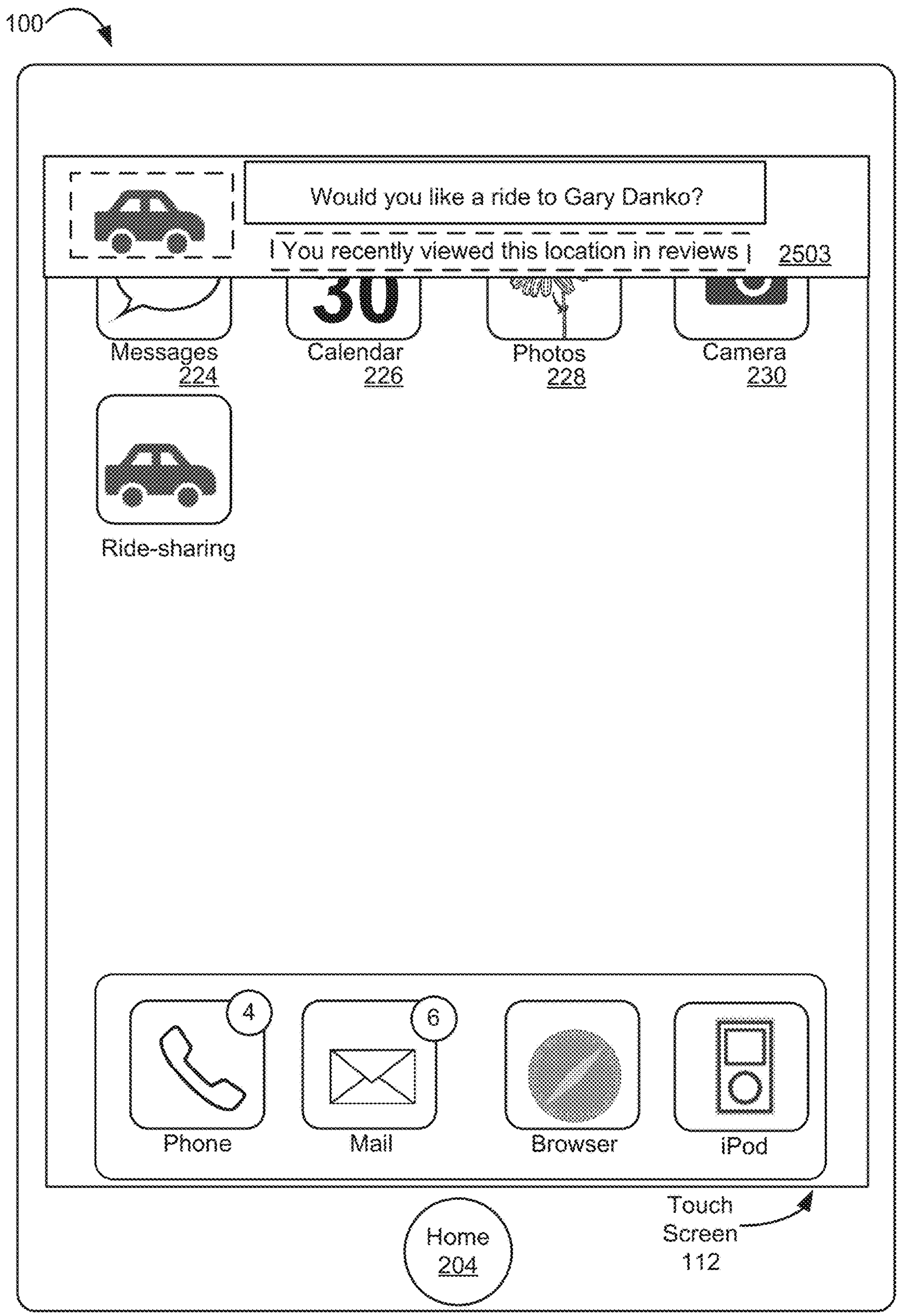
Figure 25C:
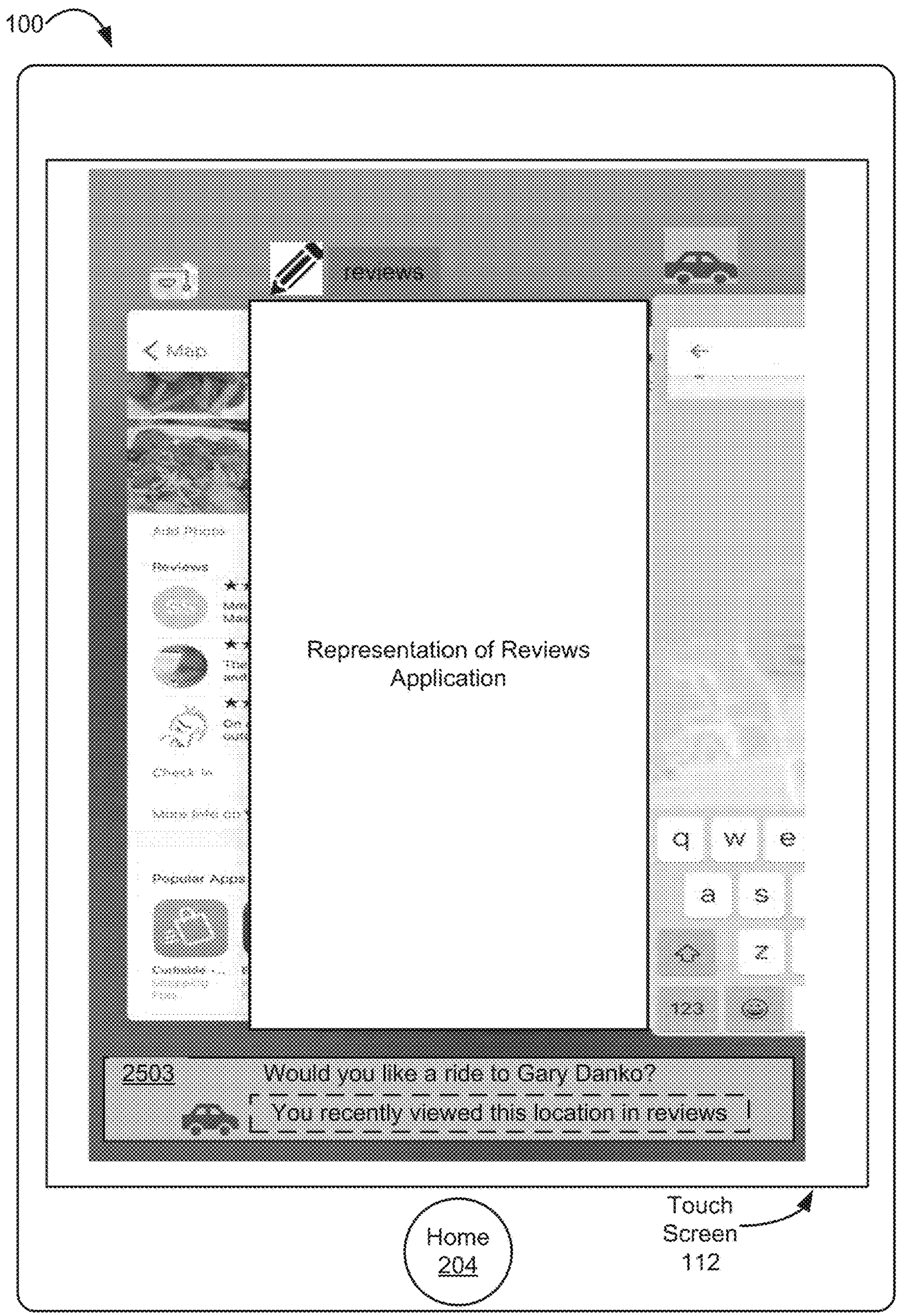
Figure 25D:
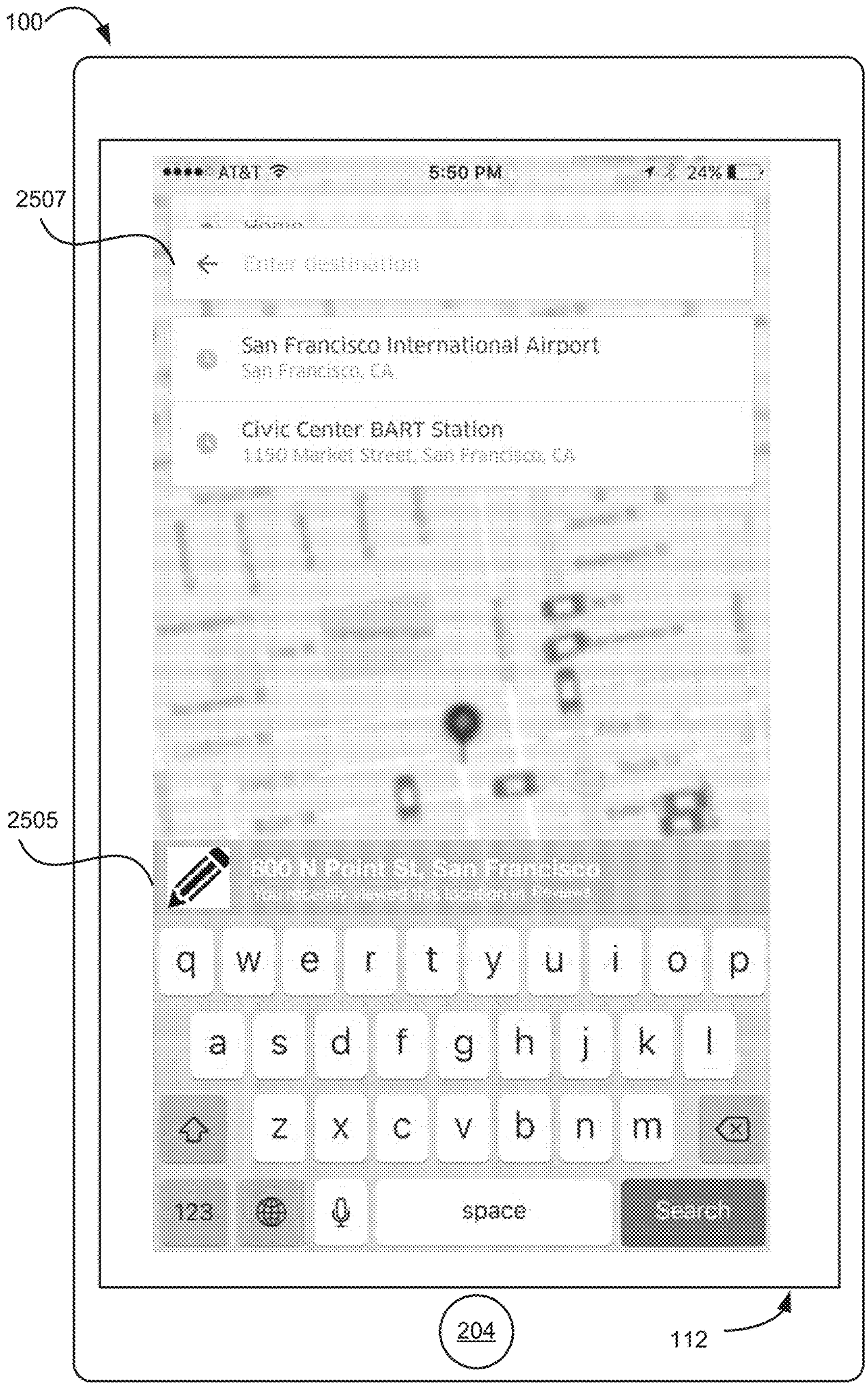
Figure 25E:
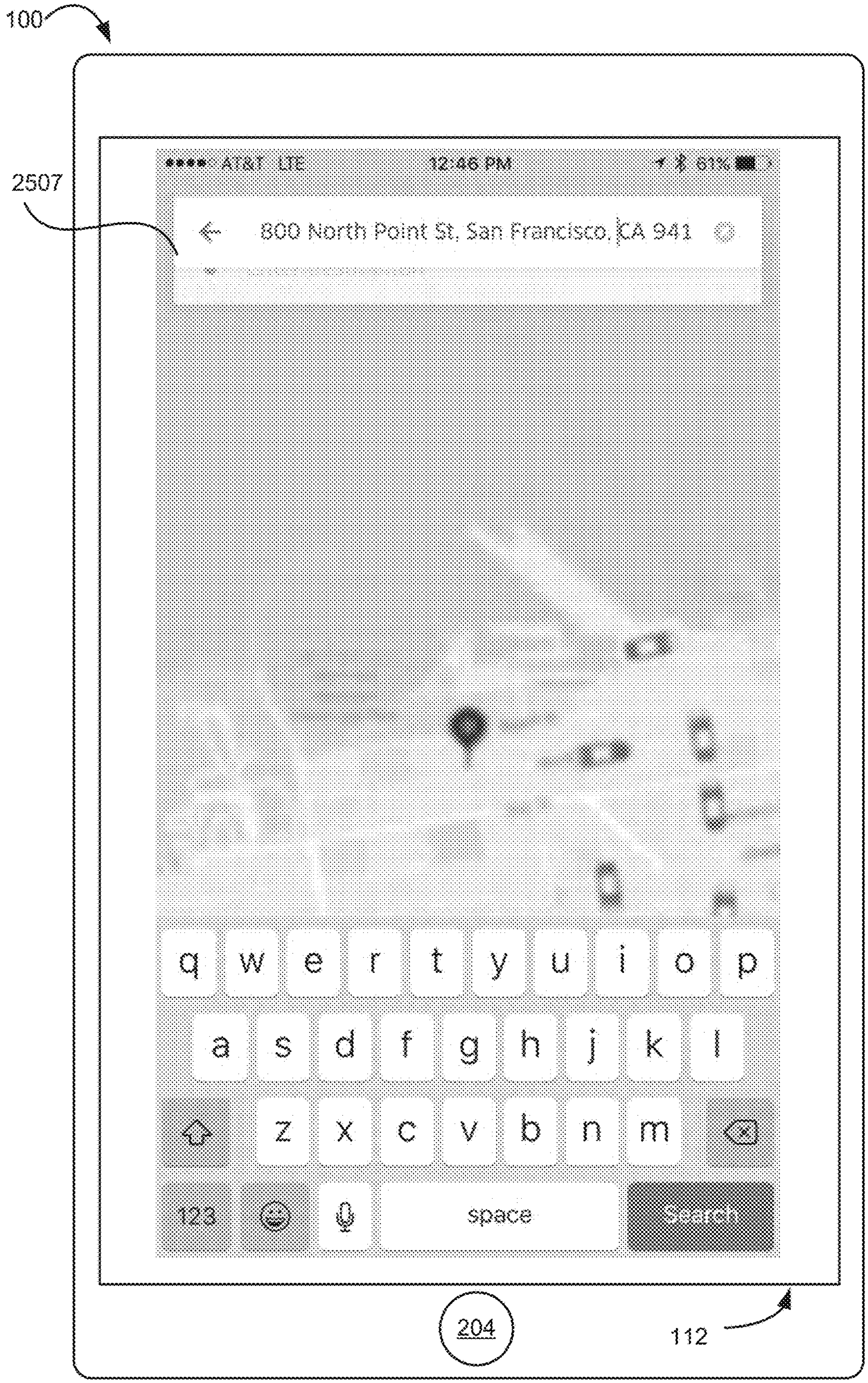
Figure 25F:
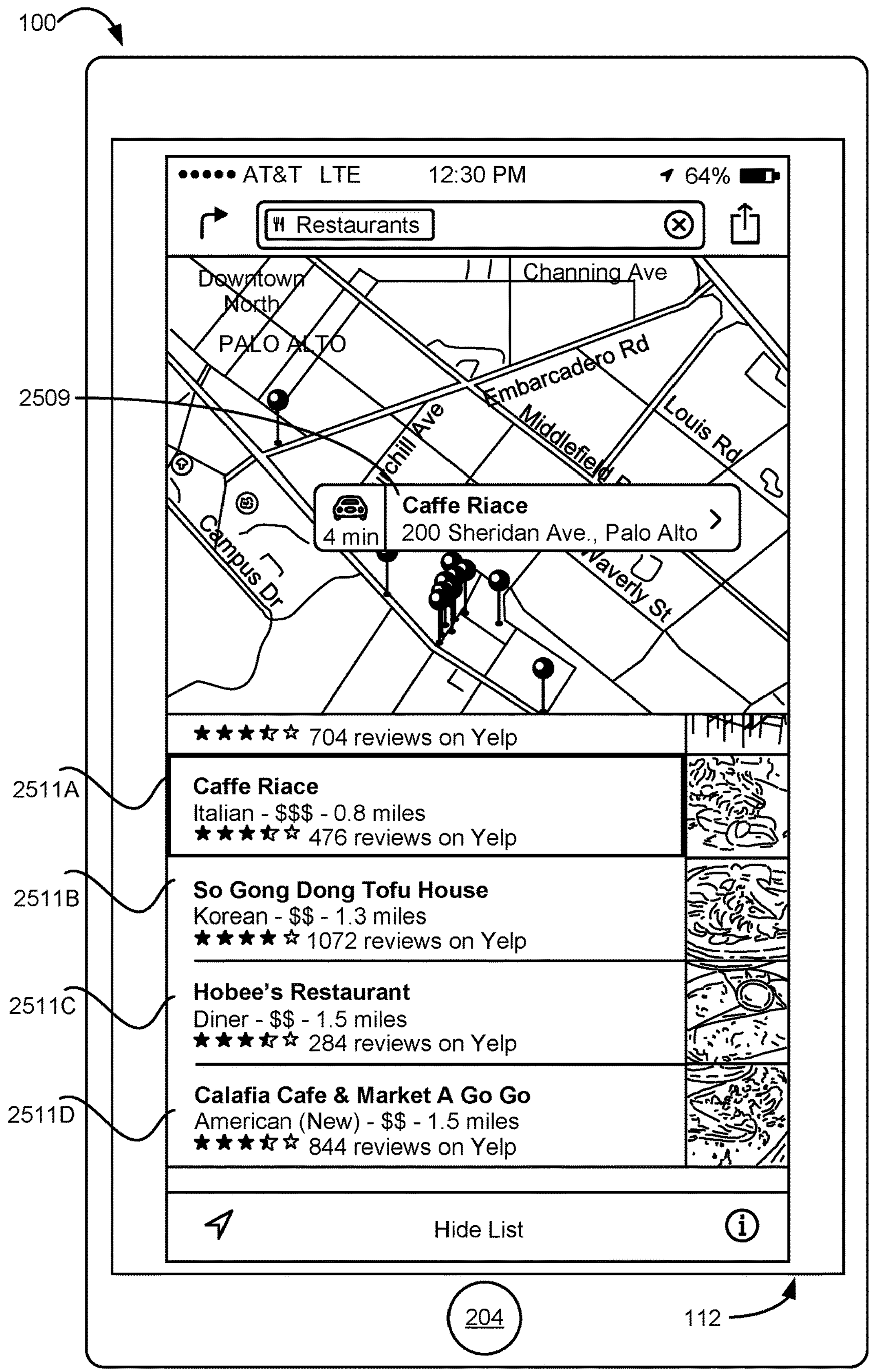
Figure 25G:
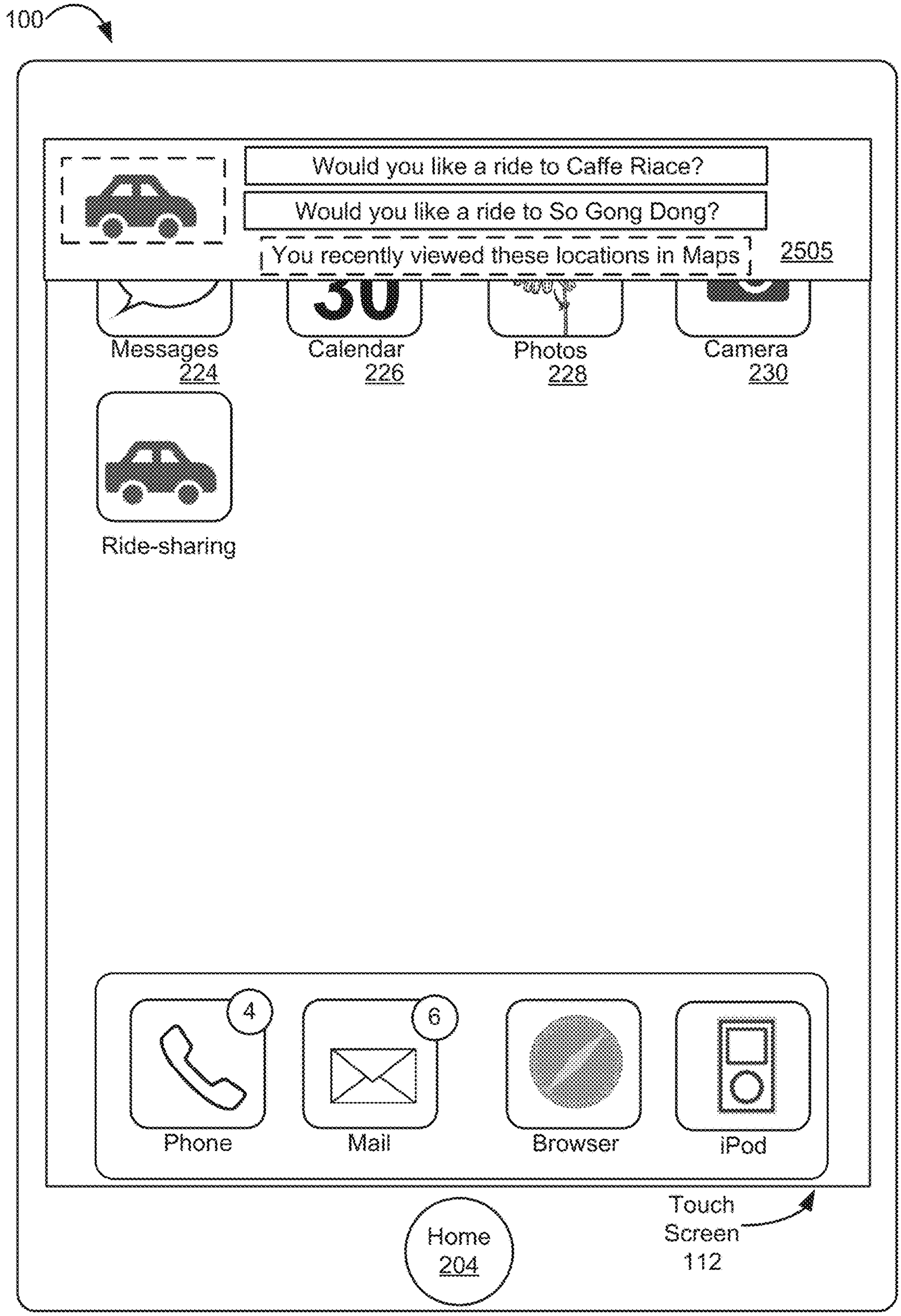
Figure 25H:
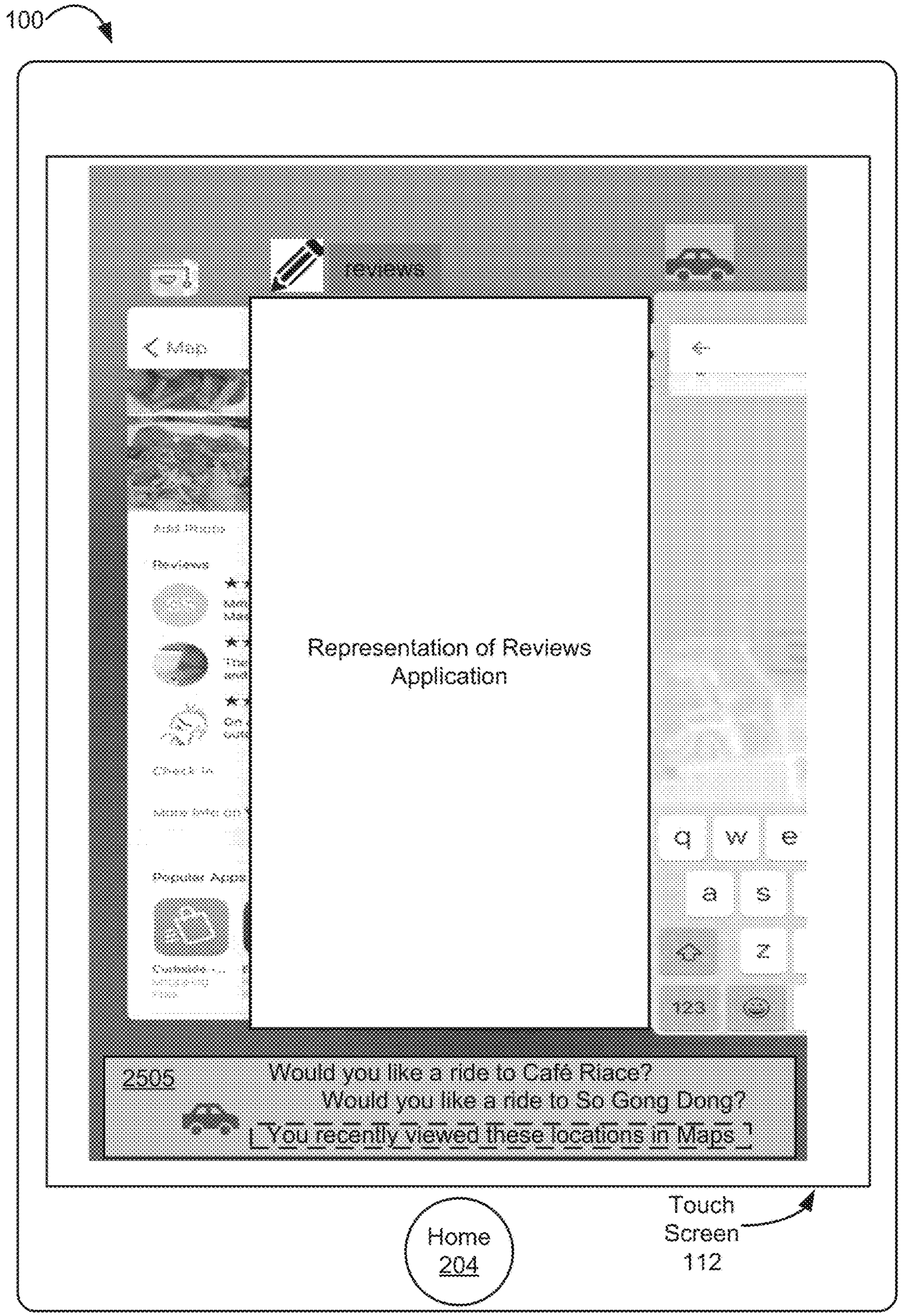
Figure 25I:
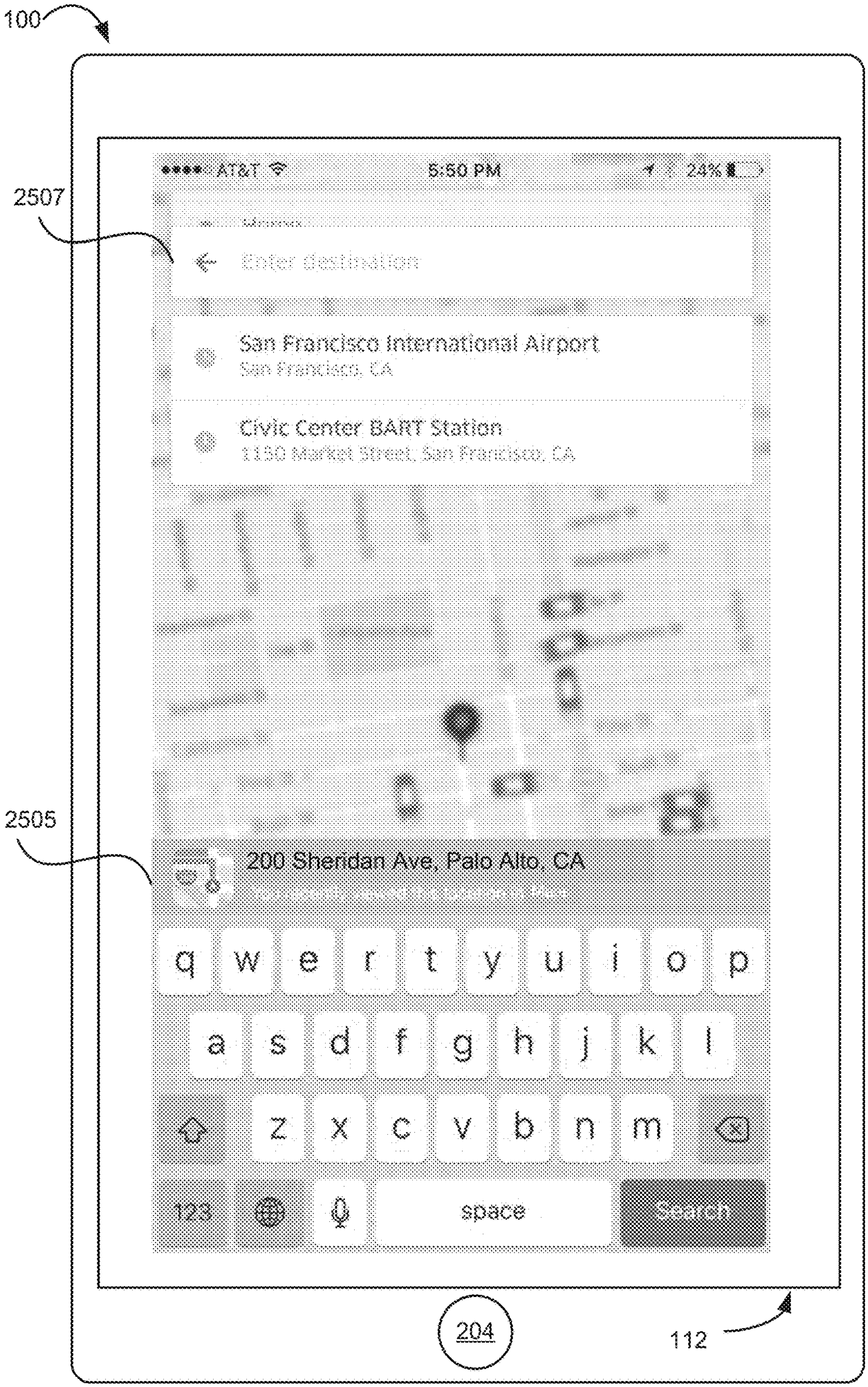
Figure 25J:
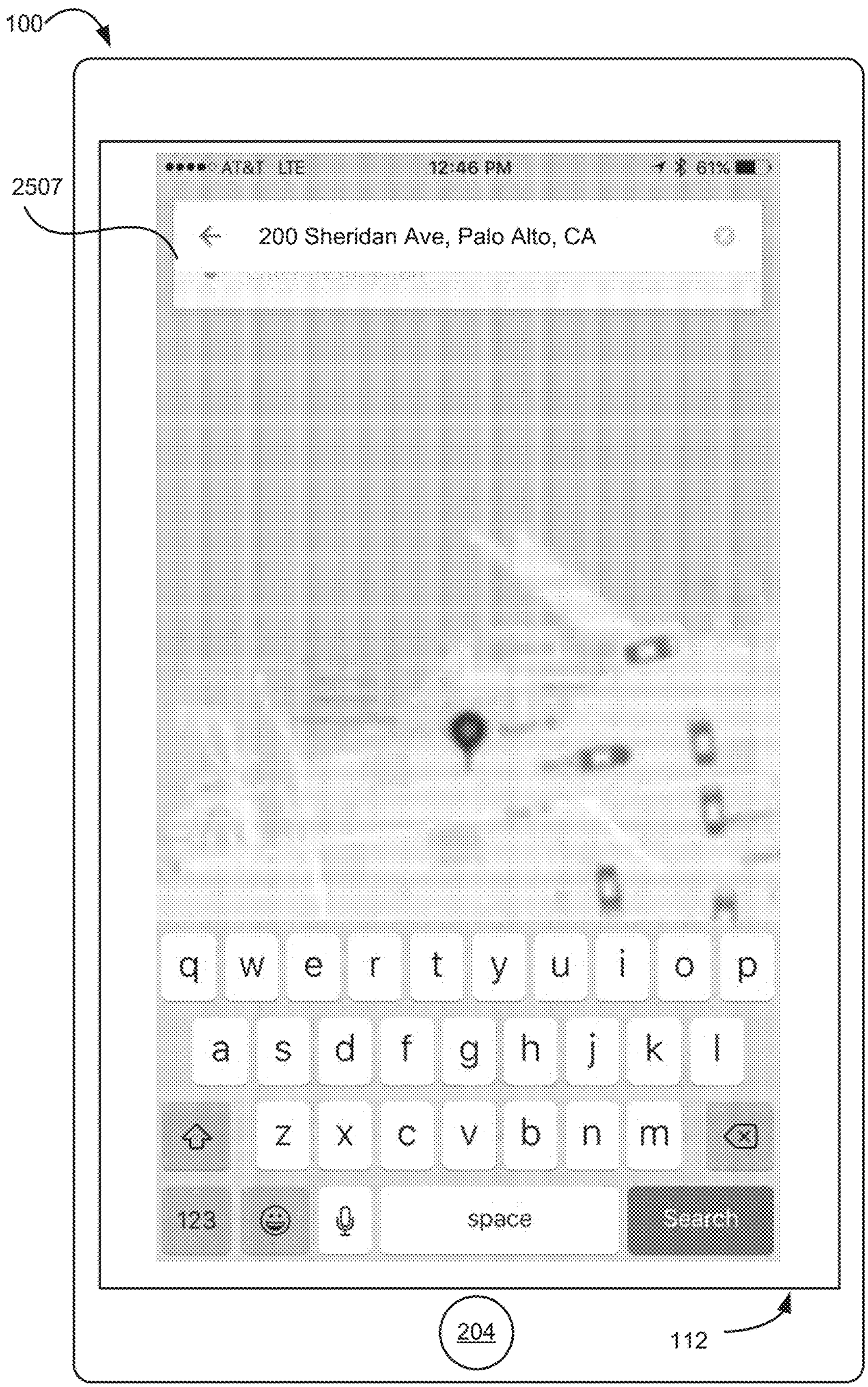
Figure 26A:
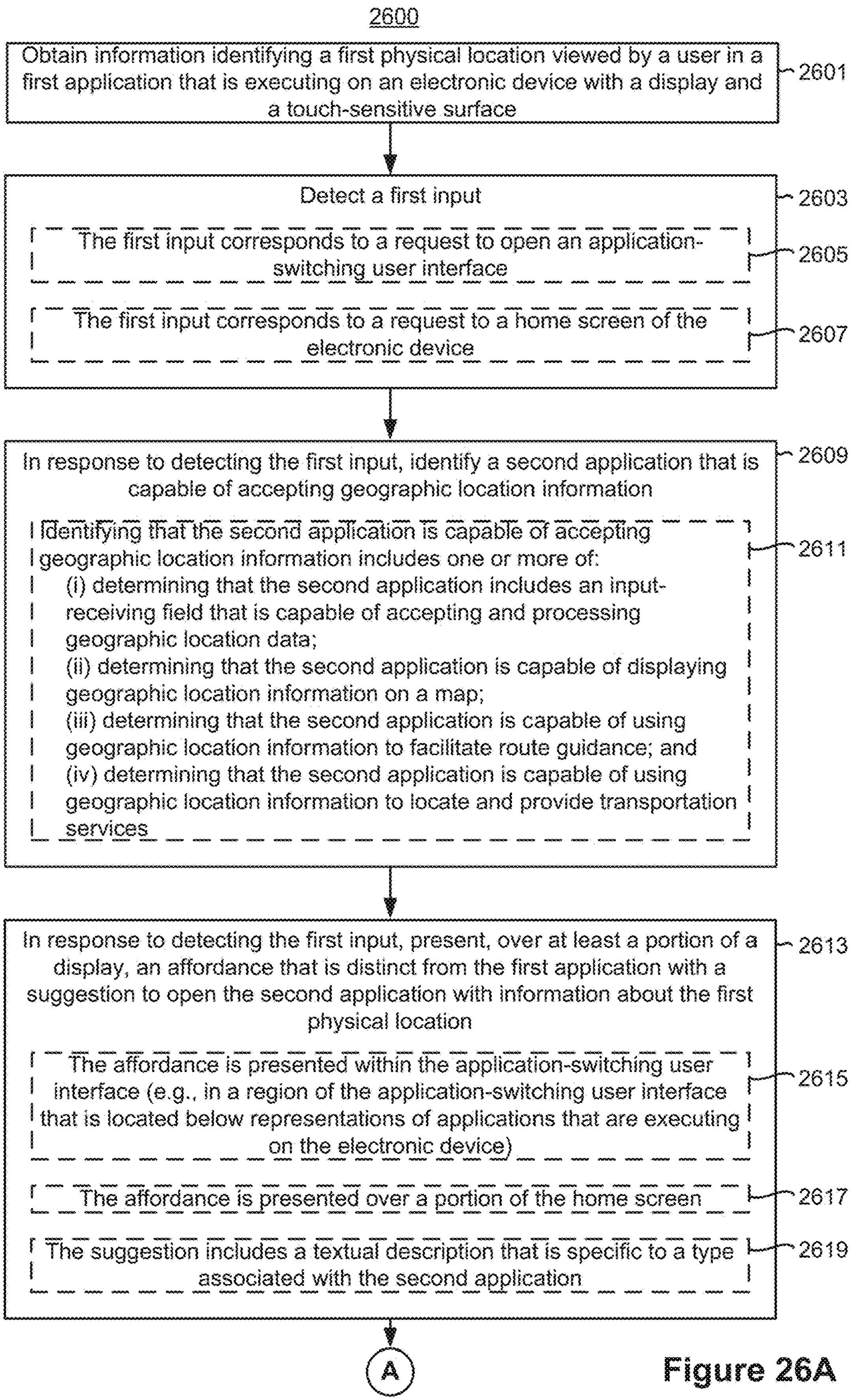
FIGS. 26A-26B are a flowchart representation of a method of proactively suggesting information that was previously viewed by a user in a first application for use in a second application, in accordance with some embodiments.
Figure 26B:
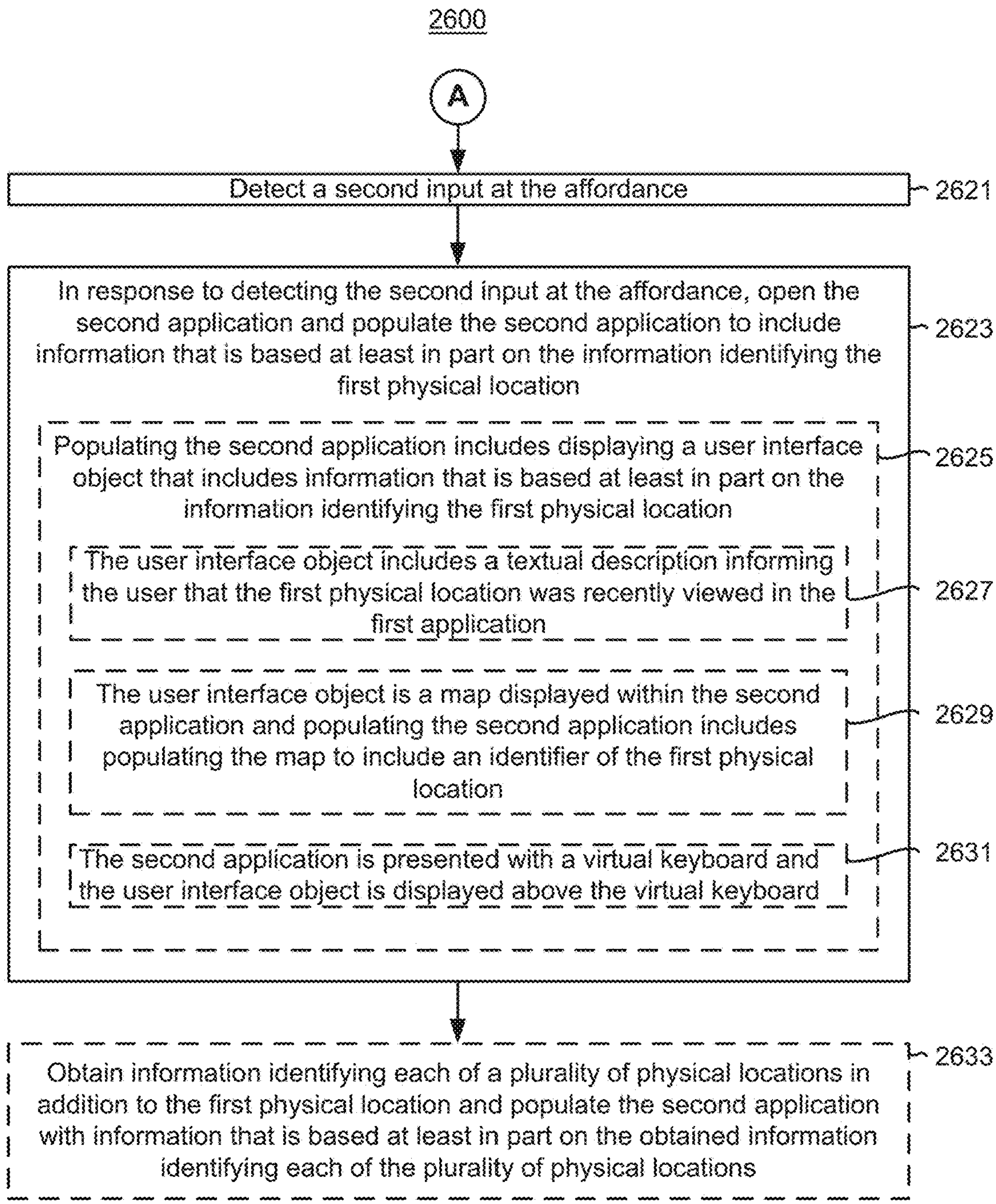

FIGS. 26A-26B are a flowchart representation of a method of proactively suggesting information that was previously viewed by a user in a first application for use in a second application, in accordance with some embodiments. FIGS. 25A-25J are used to illustrate the methods and/or processes of FIGS. 26A-26B.

Figure 27:
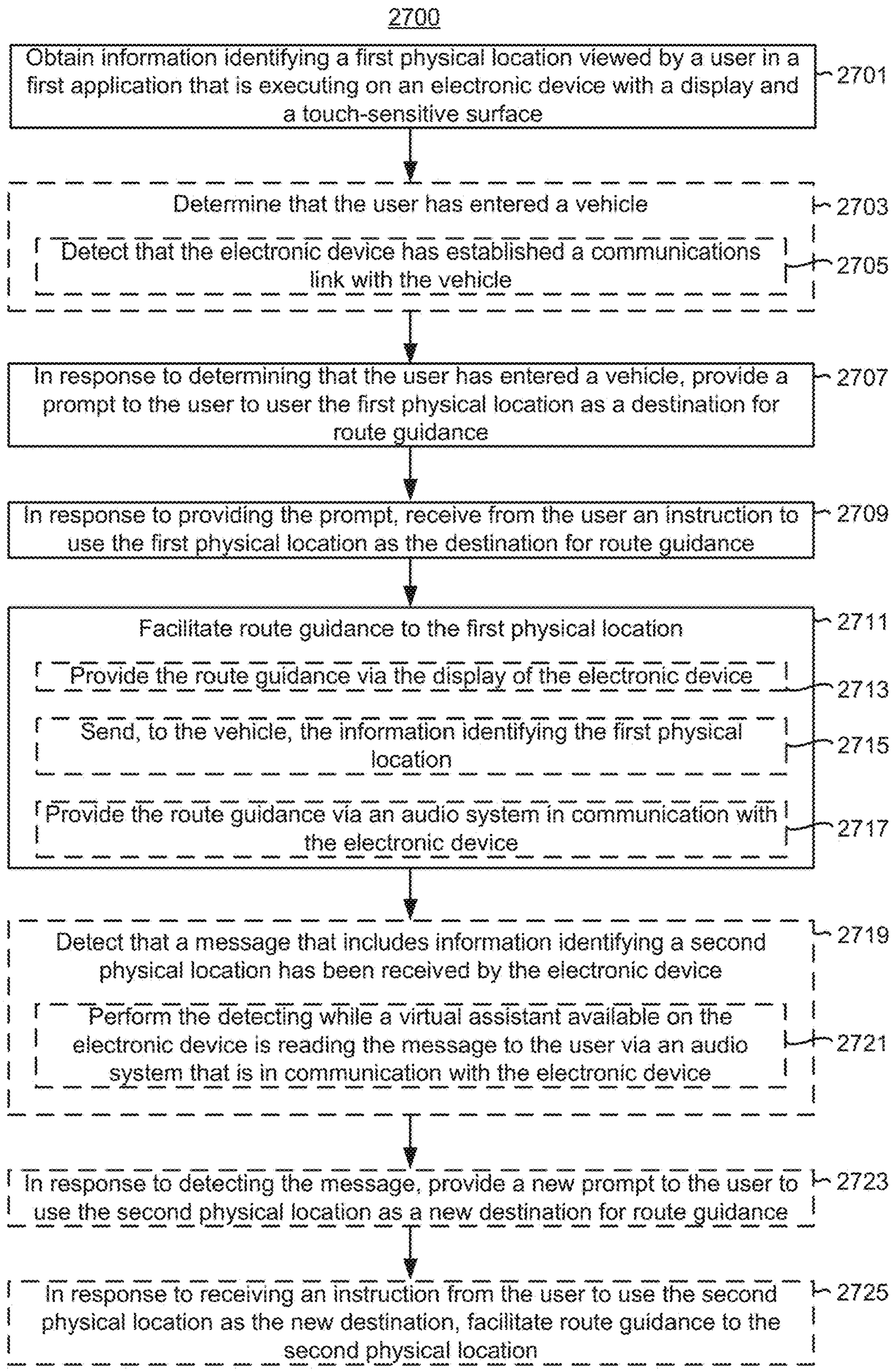
FIG. 27 is a flowchart representation of a method of proactively suggesting a physical location for use as a destination for route guidance in a vehicle, in accordance with some embodiments.
Figure 28:
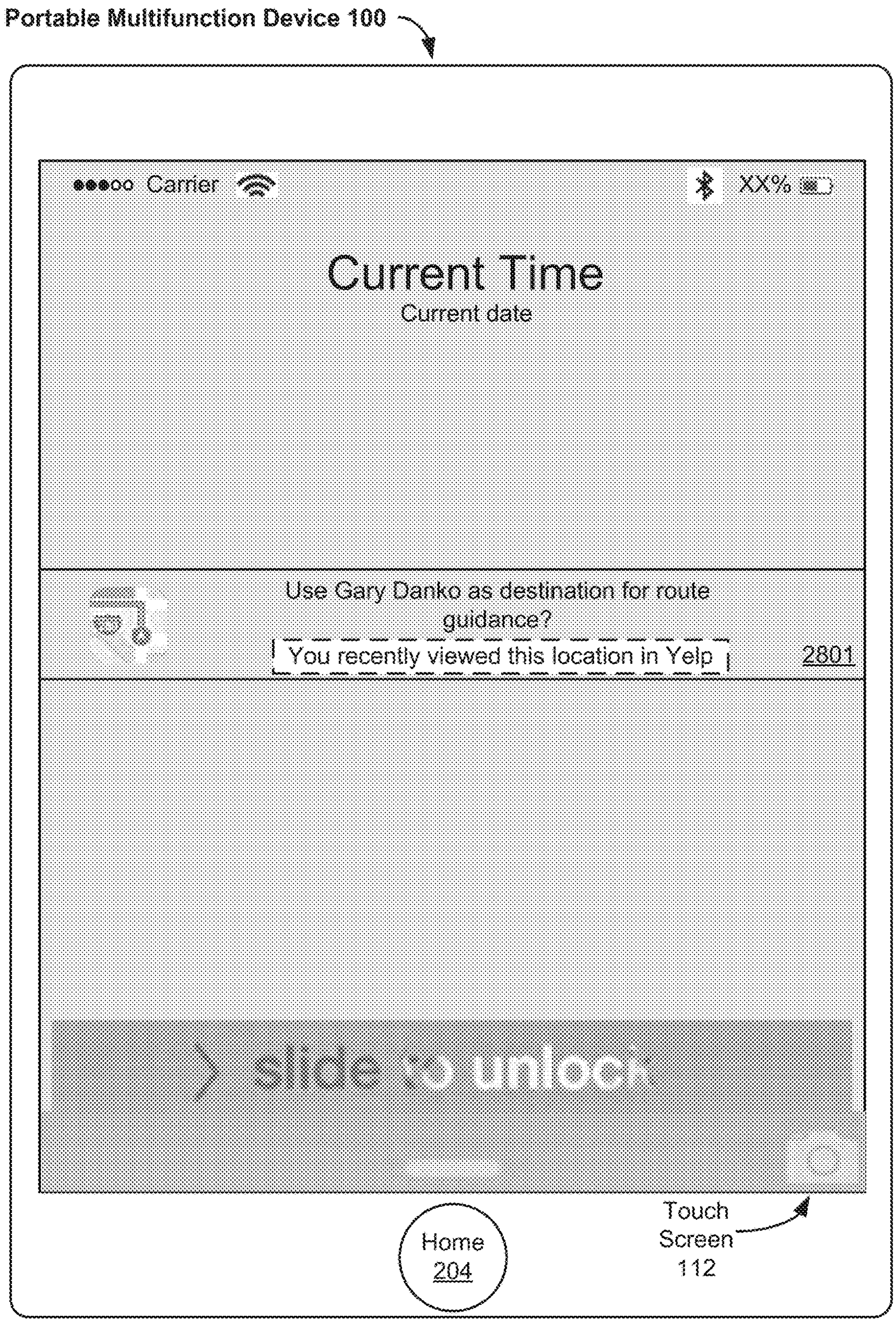
FIG. 28 is a schematic of a touch-sensitive display used to illustrate a user interface for proactively suggesting a physical location for use as a destination for route guidance in a vehicle, in accordance with some embodiments.

FIG. 27 is a flowchart representation of a method of proactively suggesting a physical location for use as a destination for route guidance in a vehicle, in accordance with some embodiments. FIG. 28 is a schematic of a touch-sensitive display used to illustrate a user interface for proactively suggesting a physical location for use as a destination for route guidance in a vehicle, in accordance with some embodiments. FIG. 28 is used to illustrate the methods and/or processes of FIG. 27.

Figure 29:
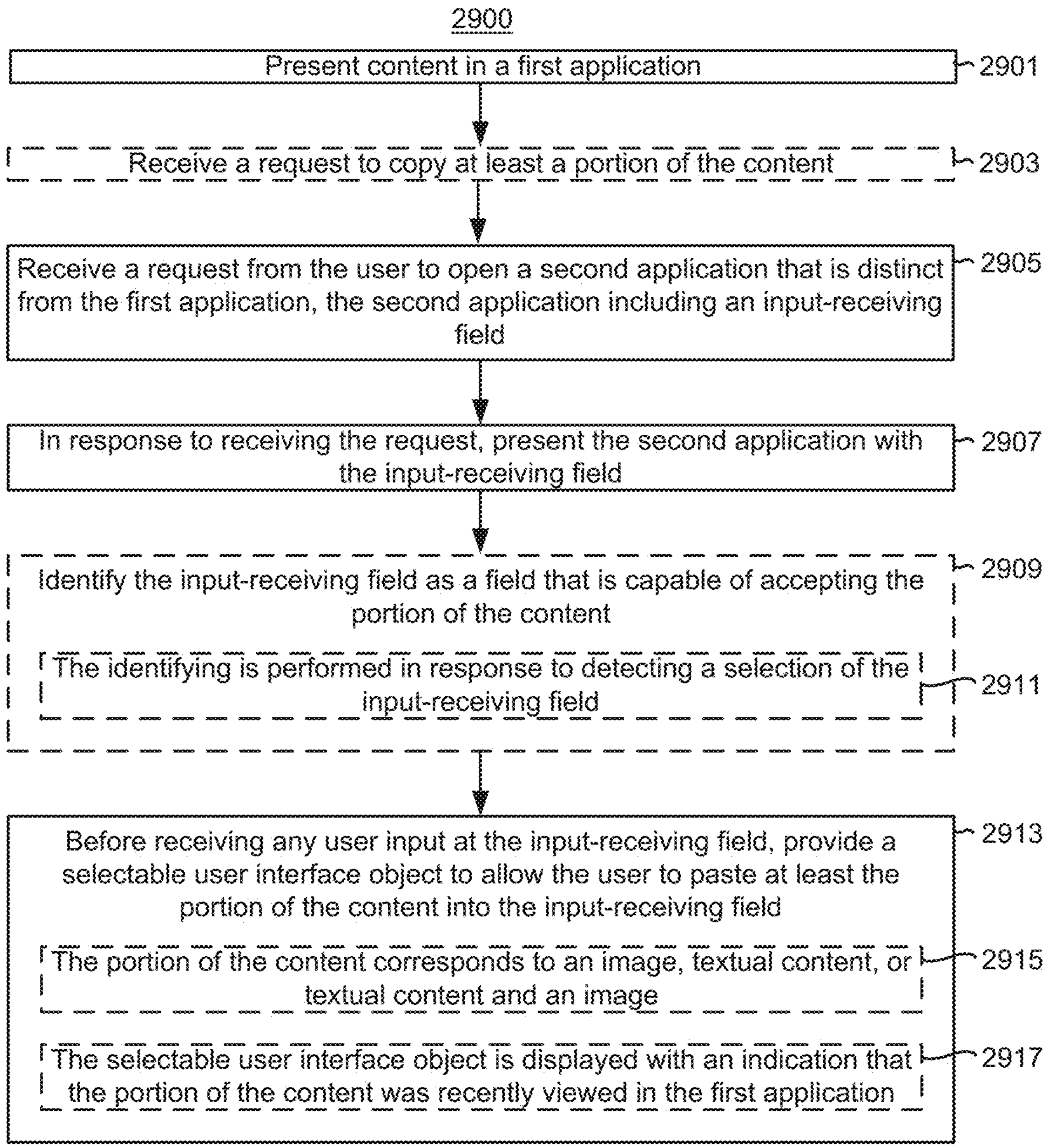
FIG. 29 is a flowchart representation of a method of proactively suggesting a paste action, in accordance with some embodiments.

FIG. 29 is a flowchart representation of a method of proactively suggesting a paste action, in accordance with some embodiments. FIGS. 30A-30D are schematics of a touch-sensitive display used to illustrate user interfaces for proactively suggesting a paste action, in accordance with some embodiments. FIGS. 30A-30D is used to illustrate the methods and/or processes of FIG. 29.

Sections 1-11 in the "Additional Descriptions of Embodiments" section describe additional details that supplement those provided in reference to FIGS. 1A-30D.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The disclosure herein interchangeably refers to detecting a touch input on, at, over, on top of, or substantially within a particular user interface element or a particular portion of a touch-sensitive display. As used herein, a touch input that is detected "at" a particular user interface element could also be detected "on," "over," "on top of," or "substantially within" that same user interface element, depending on the context. In some embodiments and as discussed in more detail below, desired sensitivity levels for detecting touch inputs are configured by a user of an electronic device (e.g., the user could decide (and configure the electronic device to operate) that a touch input should only be detected when the touch input is completely within a user interface element).

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the IPHONE®, IPOD TOUCH®, and IPAD® devices from APPLE Inc. of Cupertino, Calif. Other portable electronic devices, such as laptops or tablet computers with touch-sensitive surfaces (e.g., touch-sensitive displays and/or touch pads), are, optionally, used. It should also be understood that, in some embodiments, the device is not a portable communications device, but is a desktop computer with a touch-sensitive surface (e.g., a touch-sensitive display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a health/fitness application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable electronic devices with touch-sensitive displays. FIG. 1A is a block diagram illustrating portable multifunction device 100 (also referred to interchangeably herein as electronic device 100 or device 100) with touch-sensitive display 112 in accordance with some embodiments. Touch-sensitive display 112 is sometimes called a "touch screen" for convenience, and is sometimes known as or called a touch-sensitive display system. Device 100 includes memory 102 (which optionally includes one or more computer-readable storage mediums), controller 120, one or more processing units (CPU's) 122, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or a touchpad of device 100). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as a "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of hardware and software, including one or more signal processing and/or application specific integrated circuits.

Memory 102 optionally includes high-speed random access memory (e.g., DRAM, SRAM, DDR RAM or other random access solid state memory devices) and optionally also includes non-volatile memory, such as one or more magnetic disk storage devices, flash memory devices, or other non-volatile solid-state memory devices. Memory 102 optionally includes one or more storage devices remotely located from processor(s) 122. Access to memory 102 by other components of device 100, such as CPU 122 and the peripherals interface 118, is, optionally, controlled by controller 120.

Peripherals interface 118 can be used to couple input and output peripherals of the device to CPU 122 and memory 102. The one or more processors 122 run or execute various software programs and/or sets of instructions stored in memory 102 to perform various functions for device 100 and to process data.

In some embodiments, peripherals interface 118, CPU 122, and controller 120 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, and/or Wireless Fidelity (Wi-Fi) (e.g., IEEE 802.11a, IEEE 802.11b, IEEE 802.11g and/or IEEE 802.11n).

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack. The headset jack provides an interface between audio circuitry 110 and removable audio input/output peripherals, such as output-only headphones or a headset with both output (e.g., a headphone for one or both ears) and input (e.g., a microphone).

I/O subsystem 106 connects input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons optionally include an up/down button for volume control of speaker 111 and/or microphone 113. The one or more buttons optionally include a push button.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, a sensor or a set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages or images) that are displayed on touch screen 112. In an example embodiment, a point of contact between touch screen 112 and the user corresponds to an area under a finger of the user.

Touch screen 112 optionally uses LCD (liquid crystal display) technology, LPD (light emitting polymer display) technology, or LED (light emitting diode) technology, or OLED (organic light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an example embodiment, projected mutual capacitance sensing technology is used, such as that found in the IPHONE®, IPOD TOUCH®, and IPAD® from APPLE Inc. of Cupertino, Calif.

Touch screen 112 optionally has a video resolution in excess of 400 dpi. In some embodiments, touch screen 112 has a video resolution of at least 600 dpi. In other embodiments, touch screen 112 has a video resolution of at least 1000 dpi. The user optionally makes contact with touch screen 112 using any suitable object or digit, such as a stylus or a finger. In some embodiments, the user interface is designed to work primarily with finger-based contacts and gestures. In some embodiments, the device translates the finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)), and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen 112 on the front of the device, so that the touch-sensitive display is enabled for use as a viewfinder for still and/or video image acquisition. In some embodiments, another optical sensor is located on the front of the device so that the user's image is, optionally, obtained for videoconferencing while the user views the other video conference participants on the touch-sensitive display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch-sensitive display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, proactive module 163 (optionally including one or more of application usage data tables 335, trigger condition tables 402, trigger establishing module 163-1, and/or usage data collecting module 163-2), communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIG. 1A. Device/global internal state 157 includes one or more of: active application state, indicating which applications, if any, are currently active; display state, indicating what applications, views or other information occupy various regions of touch-sensitive display 112; sensor state, including information obtained from the device's various sensors and input control devices 116; and location information concerning the device's location and/or attitude (e.g., orientation of the device).

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on some embodiments of IPOD devices from APPLE Inc. In other embodiments, the external port is a multi-pin (e.g., 8-pin) connector that is the same as, or similar to and/or compatible with the 8-pin connector used in LIGHTNING connectors from APPLE Inc.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has selected or "clicked" on an affordance). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch-sensitive display can be set to any of a large range of predefined thresholds values without changing the trackpad or touch-sensitive display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and, in some embodiments, subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinating data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications ("apps") 136 optionally include the following modules (or sets of instructions), or a subset or superset thereof:

- contacts module 137 (sometimes called an address book or contact list);
- telephone module 138;
- video conferencing module 139;
- e-mail client module 140;
- instant messaging (IM) module 141;
- health module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, website creation applications, disk authoring applications, spreadsheet applications, JAVA-enabled applications, encryption, digital rights management, voice recognition, widget creator module for making user-created widgets 149-6, and voice replication.

In conjunction with touch screen 112, display controller 156, contact module 130, graphics module 132, and text input module 134, contacts module 137 is, optionally, used to manage an address book or contact list (e.g., stored in contacts module 137 in memory 102), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact module 130, graphics module 132, and text input module 134, telephone module 138 is, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files, and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and video and music player module 152, health module 142 includes executable instructions to create workouts (e.g., with time, distance, and/or calorie burning goals), communicate with workout sensors (sports devices such as a watch or a pedometer), receive workout sensor data, calibrate sensors used to monitor a workout, select and play music for a workout, and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, a widget creator module (not pictured) is, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions. In some embodiments, search module 151 further includes executable instructions for displaying a search entry portion and a predictions portion (e.g., search entry portion 920 and predictions portion 930, FIG. 9B, and discussed in more detail below in reference to FIGS. 6A-9C). In some embodiments, the search module 151, in conjunction with proactive module 163, also populates, prior to receiving any user input at the search entry portion, the predictions portion with affordances for suggested or predicted people, actions within applications, applications, nearby places, and/or news articles (as discussed in more detail below in reference to FIGS. 3A-9C).

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an IPOD from APPLE Inc.

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 is, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

As pictured in FIG. 1A, portable multifunction device 100 also includes a proactive module 163 for proactively identifying and surfacing relevant content (e.g., surfacing a user interface object corresponding to an action within an application (e.g., a UI object for playing a playlist within a music app) to a lock screen or within a search interface). Proactive module 163 optionally includes the following modules (or sets of instructions), or a subset or superset thereof:

application usage tables 335;
trigger condition tables 402;
trigger establishing module 163-1;
usage data collecting module 163-2;
proactive suggestions module 163-3; and
(voice communication) content extraction module 163-4.

In conjunction with applications 136, GPS module 135, operating system 126, I/O subsystem 106, RF circuitry 108, external portion 124, proximity sensor 166, audio circuitry 110, accelerometers 168, speaker 111, microphone 113, and peripherals interface 118, the application usage tables 335 and usage data collecting module 163-2 receive (e.g., from the components of device 100 identified above, FIG. 1A) and/or store application usage data. In some embodiments, the application usage is reported to the usage data collecting module 163-2 and then stored in the application usage tables 335. In some embodiments, application usage data includes all (or the most important, relevant, or predictive) contextual usage information corresponding to a user's use of a particular application 136. In some embodiments, each particular application stores usage data while the user is interacting with the application and that usage data is then reported to the application usage data tables 335 for storage (e.g., usage data 193 for a particular application 136-1, FIG. 1B, includes all sensor readings, in-application actions performed, device coupling info, etc., and this usage data 193 gets sent to an application usage table 335 for storage as a record within the table). For example, while the user interacts with browser module 147, application usage data receives and stores all contextual usage information, including current GPS coordinates of the device 100 (e.g., as determined by GPS module 135), motion data (e.g., as determined by accelerometers 168), ambient light data (e.g., as determined by optical sensor 164), and in-application actions performed by the user within the browser module 147 (e.g., URLs visited, amount of time spent visiting each page), among other sensor data and other contextual usage information received and stored by the application usage tables 335. Additional information regarding application usage tables 335 is provided below in reference to FIGS. 3A-3B. As discussed below in reference to FIG. 5, the application usage data, in some embodiments, is stored remotely (e.g., at one or more servers 502, FIG. 5).

Trigger condition tables 402 and trigger establishing module 163-1 receive and/or store trigger conditions that are established based on the usage data stored in application usage tables 335. In some embodiments, trigger establishing module 163-1 mines and analyzes the data stored in the application usage tables 335 in order to identify patterns. For example, if the application usage data indicates that the user always launches a music application between 3:00 PM-4:00 PM daily, then the trigger establishing module 163-1 creates and stores a trigger condition in the trigger condition tables 402 that, when satisfied (e.g., when a current time of day is within a predetermined amount of time of 3:00 PM-4:00 PM), causes the device 100 to launch the music application (or at least provide an indication to the user that the music application is available (e.g., display a UI object on the lock screen, the UI object allowing the user to easily access the music application). Additional information regarding trigger condition tables 402 is provided below in reference to FIGS. 4A-4B. As discussed below in reference to FIG. 5, in some embodiments, the identification of patterns and establishing of trigger conditions based on the identified patterns is done at a remote server (e.g., at one or more servers 502, FIG. 5).

The proactive suggestions module 163-3 works in conjunction with other components of the device 100 to proactively provide content to the user for use in a variety of different applications available on the electronic device. For example, the proactive suggestions module 163-3 provides suggested search queries and other suggested content for inclusion in a search interface (e.g. as discussed below in reference to FIGS. 10A-10C), provides information that helps users to locate their parked vehicles (e.g., as discussed below in reference to FIG. 14), provides information about nearby points of interest (e.g., as discussed below in reference to FIGS. 16A-16B), provides content items that have been extracted from speech provided during voice communications (e.g., as discussed below in reference to FIGS. 18A-18B), and helps to provide numerous other suggestions (e.g., as discussed below in reference to FIGS. 20, 21A-21B, 24A-24B, 26A-26B, 27, and 29) that help users to efficiently located desired content with a minimal number of inputs (e.g., without having to search for that content, the proactive suggestions module 163-3 helps to ensure that the content is provided at an appropriate time for selection by the user).

The (voice communication) content extraction module 163-4 works in conjunction with other components of device 100 to identify speech that relates to a new content item and to extract new content items from voice communications (e.g., contact information, information about events, and information about locations, as discussed in more detail below in reference to FIGS. 18A-18B and 20).

Each of the above-identified modules and applications correspond to a set of executable instructions for performing one or more functions described above and the methods described in this application (e.g., the computer-implemented methods and other information processing methods described herein). These modules (e.g., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
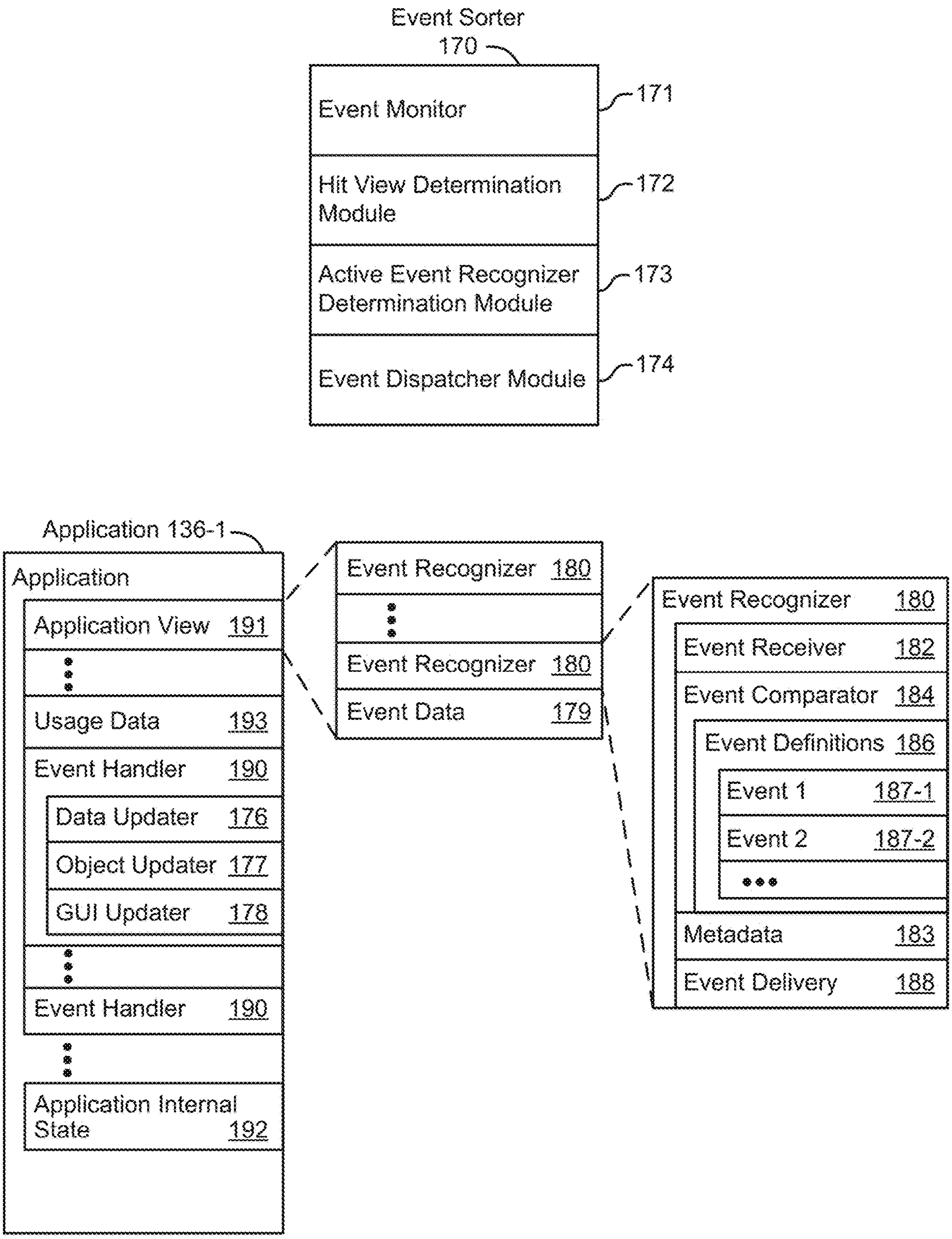
FIG. 1B is a block diagram of example components for event handling, in accordance with some embodiments.

FIG. 1B is a block diagram illustrating example components for event handling in accordance with some embodiments. In some embodiments, memory 102 (in FIG. 1A) includes event sorter 170 (e.g., in operating system 126) and a respective application 136-1 selected from among the applications 136 of portable multifunction device 100 (FIG. 1A) (e.g., any of the aforementioned applications stored in memory 102 with applications 136).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from portrait to landscape, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 186 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any remain active for the hit view, continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 152. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

In some embodiments, each particular application 136-1 stores usage data while the user is interacting with the application and that usage data is then reported to the application usage data tables 335 for storage (e.g., usage data 193 for a particular application 136-1, FIG. 1B, includes all sensor readings, in-application actions performed, device coupling info, etc., and this usage data 193 gets sent to a respective application usage table 335 for the particular application for storage as a record within the table). In some embodiments, usage data 193 stores data as reported by usage data collecting module 163-2 while the particular application 136-1 is in use (e.g., the user is actively interactive with the particular application 136-1).

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof is optionally utilized as inputs corresponding to sub-events which define an event to be recognized.

Figure 1C:
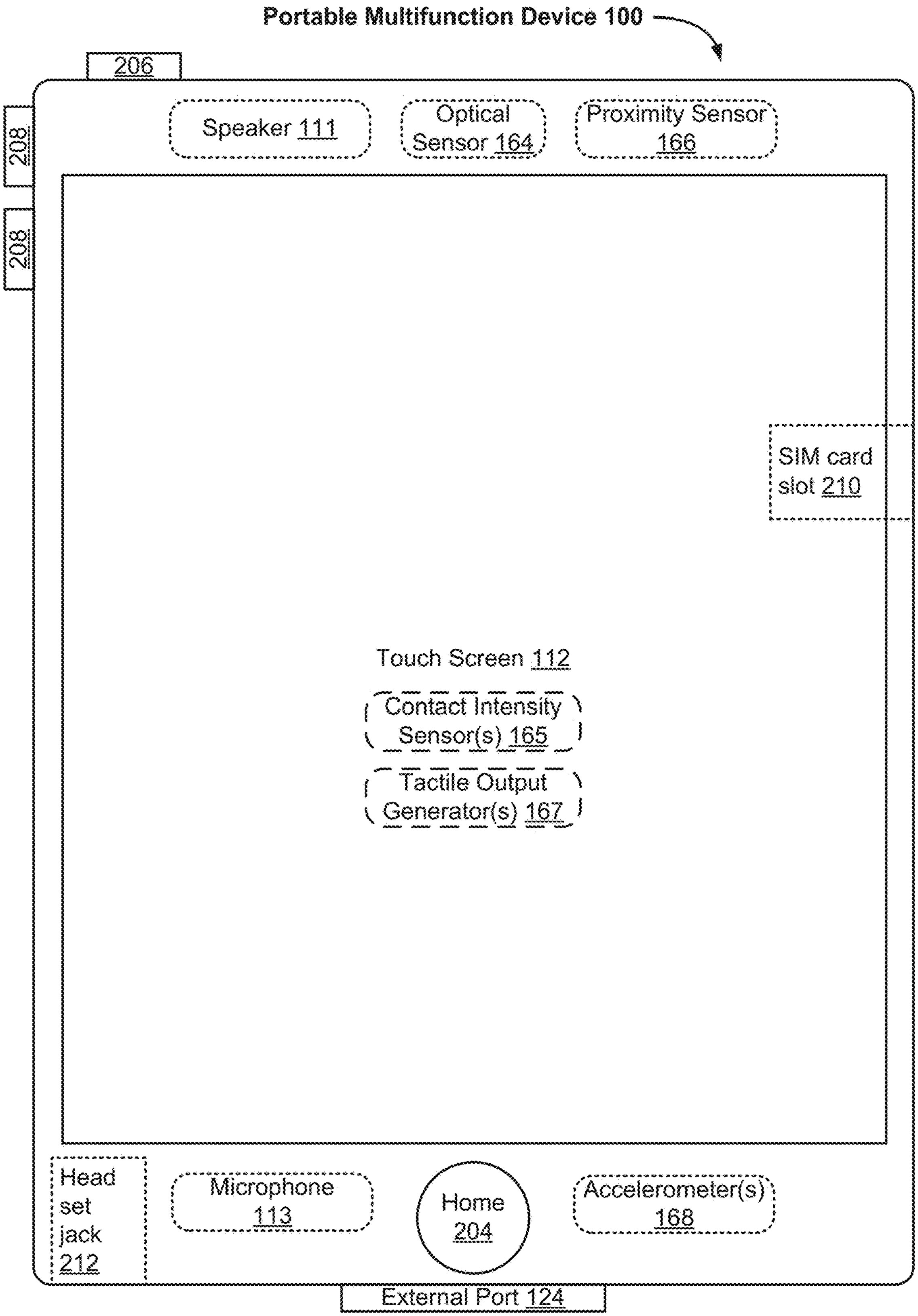
FIG. 1C is a schematic of a portable multifunction device having a touch-sensitive display, in accordance with some embodiments.

FIG. 1C is a schematic of a portable multifunction device (e.g., portable multifunction device 100) having a touch-sensitive display (e.g., touch screen 112) in accordance with some embodiments. In this embodiment, as well as others described below, a user can select one or more of the graphics by making a gesture on the screen, for example, with one or more fingers or one or more styluses. In some embodiments, selection of one or more graphics occurs when the user breaks contact with the one or more graphics (e.g., by lifting a finger off of the screen). In some embodiments, the gesture optionally includes one or more tap gestures (e.g., a sequence of touches on the screen followed by liftoffs), one or more swipe gestures (continuous contact during the gesture along the surface of the screen, e.g., from left to right, right to left, upward and/or downward), and/or a rolling of a finger (e.g., from right to left, left to right, upward and/or downward) that has made contact with device 100. In some implementations or circumstances, inadvertent contact with a graphic does not select the graphic. For example, a swipe gesture that sweeps over an application affordance (e.g., an icon) optionally does not launch (e.g., open) the corresponding application when the gesture for launching the application is a tap gesture.

Device 100 optionally also includes one or more physical buttons, such as a "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

Figure 1D:
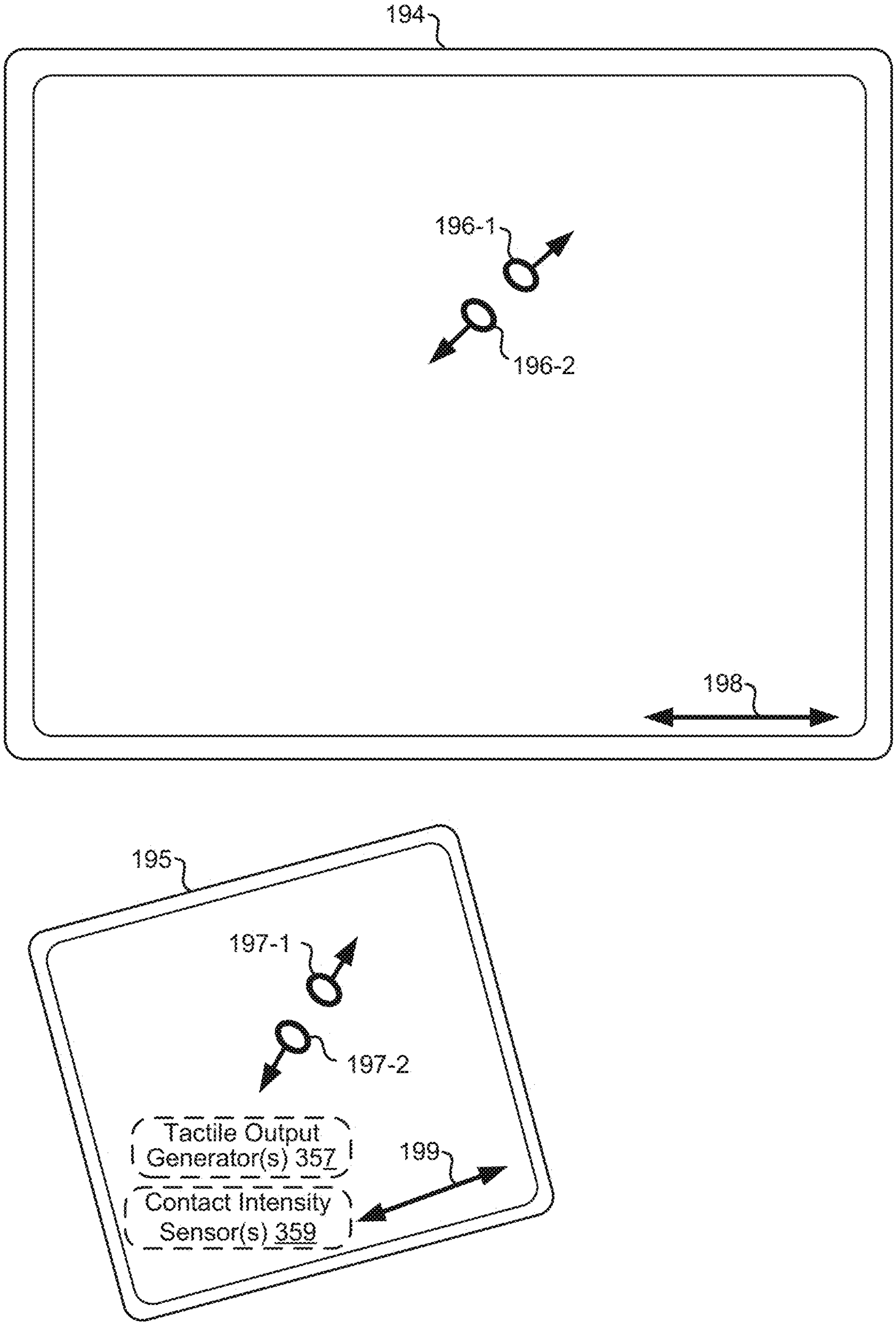
FIG. 1D is a schematic used to illustrate a computing device with a touch-sensitive surface that is separate from the display, in accordance with some embodiments.

FIG. 1D is a schematic used to illustrate a user interface on a device (e.g., device 100, FIG. 1A) with a touch-sensitive surface 195 (e.g., a tablet or touchpad) that is separate from the display 194 (e.g., touch screen 112). In some embodiments, touch-sensitive surface 195 includes one or more contact intensity sensors (e.g., one or more of contact intensity sensor(s) 359) for detecting intensity of contacts on touch-sensitive surface 195 and/or one or more tactile output generator(s) 357 for generating tactile outputs for a user of touch-sensitive surface 195.

Although some of the examples which follow will be given with reference to inputs on touch screen 112 (where the touch sensitive surface and the display are combined), in some embodiments, the device detects inputs on a touch-sensitive surface that is separate from the display, as shown in FIG. 1D. In some embodiments the touch sensitive surface (e.g., 195 in FIG. 1D) has a primary axis (e.g., 199 in FIG. 1D) that corresponds to a primary axis (e.g., 198 in FIG. 1D) on the display (e.g., 194). In accordance with these embodiments, the device detects contacts (e.g., 197-1 and 197-2 in FIG. 1D) with the touch-sensitive surface 195 at locations that correspond to respective locations on the display (e.g., in FIG. 1D, 197-1 corresponds to 196-1 and 197-2 corresponds to 196-2). In this way, user inputs (e.g., contacts 197-1 and 197-2, and movements thereof) detected by the device on the touch-sensitive surface (e.g., 195 in FIG. 1D) are used by the device to manipulate the user interface on the display (e.g., 194 in FIG. 1D) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touch-sensitive surface 195 in FIG. 1D (touch-sensitive surface 195, in some embodiments, is a touchpad)) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch-sensitive display) will indicate that the user is intending to activate the respective button (as opposed to other user interface elements shown on a display of the device).

Figure 1E:
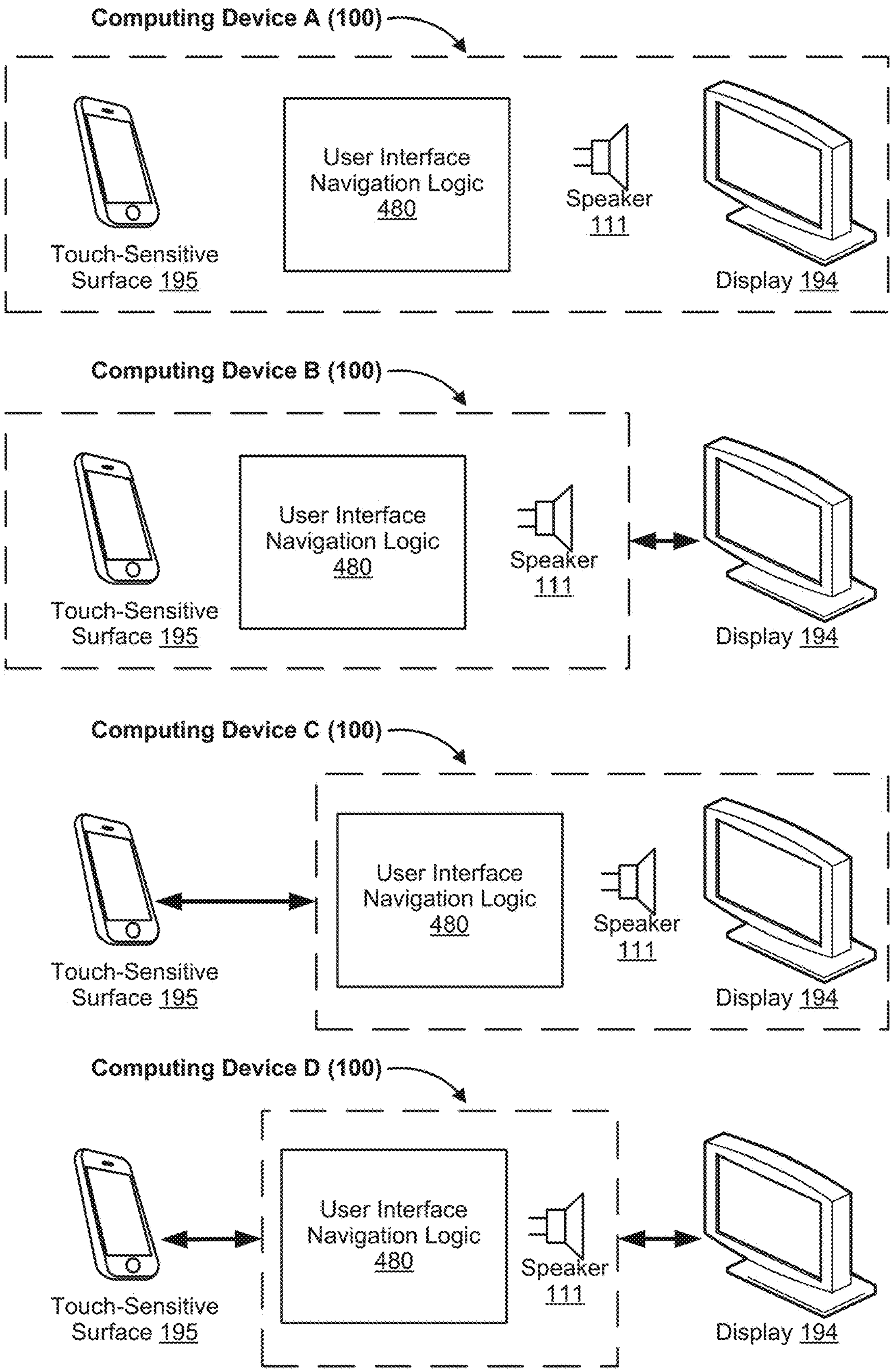
FIG. 1E illustrates example electronic devices that are in communication with a display and a touch-sensitive surface, in accordance with some embodiments.

FIG. 1E illustrates example electronic devices that are in communication with display 194 and touch-sensitive surface 195. For at least a subset of the electronic devices, display 194 and/or touch-sensitive surface 195 is integrated into the electronic device in accordance with some embodiments. While the examples described in greater detail below are described with reference to a touch-sensitive surface 195 and a display 194 that are in communication with an electronic device (e.g., portable multifunction device 100 in FIGS. 1A-1B), it should be understood that in accordance with some embodiments, the touch-sensitive surface and/or the display are integrated with the electronic device, while in other embodiments one or more of the touch-sensitive surface and the display are separate from the electronic device. Additionally, in some embodiments the electronic device has an integrated display and/or an integrated touch-sensitive surface and is in communication with one or more additional displays and/or touch-sensitive surfaces that are separate from the electronic device.

In some embodiments, all of the operations described below with reference to FIGS. 6A-6B, 7A-7B, 8A-8B, 9A-9D, 10A-10C, 11A-11J, 12, 13A-13B, 14, 15A-15B, 16A-16B, 17A-17E, 18A-18B, 19A-19F, 20, 21A-21B, 22A-22C, 23A-23O, 24A-24B, 25A-25J, 26A-26B, 27, 28, 29, 30A-30D are performed on a single electronic device with user interface navigation logic 480 (e.g., Computing Device A described below with reference to FIG. 1E). However, it should be understood that frequently multiple different electronic devices are linked together to perform the operations described below with reference to FIGS. 6A-6B, 7A-7B, 8A-8B, 9A-9D, 10A-10C, 11A-11J, 12, 13A-13B, 14, 15A-15B, 16A-16B, 17A-17E, 18A-18B, 19A-19F, 20, 21A-21B, 22A-22C, 23A-23O, 24A-24B, 25A-25J, 26A-26B, 27, 28, 29, 30A-30D (e.g., an electronic device with user interface navigation logic 480 communicates with a separate electronic device with a display 194 and/or a separate electronic device with a touch-sensitive surface 195). In any of these embodiments, the electronic device that is described below with reference to FIGS. 6A-6B, 7A-7B, 8A-8B, 9A-9D, 10A-10C, 11A-11J, 12, 13A-13B, 14, 15A-15B, 16A-16B, 17A-17E, 18A-18B, 19A-19F, 20, 21A-21B, 22A-22C, 23A-23O, 24A-24B, 25A-25J, 26A-26B, 27, 28, 29, 30A-30D is the electronic device (or devices) that contain(s) the user interface navigation logic 480. Additionally, it should be understood that the user interface navigation logic 480 could be divided between a plurality of distinct modules or electronic devices in various embodiments; however, for the purposes of the description herein, the user interface navigation logic 480 will be primarily referred to as residing in a single electronic device so as not to unnecessarily obscure other aspects of the embodiments.

In some embodiments, the user interface navigation logic 480 includes one or more modules (e.g., one or more event handlers 190, including one or more object updaters 177 and one or more GUI updaters 178 as described in greater detail above with reference to FIG. 1B) that receive interpreted inputs and, in response to these interpreted inputs, generate instructions for updating a graphical user interface in accordance with the interpreted inputs which are subsequently used to update the graphical user interface on a display. In some embodiments, an interpreted input is an input that has been detected (e.g., by a contact motion 130 in FIG. 1A), recognized (e.g., by an event recognizer 180 in FIG. 1B) and/or prioritized (e.g., by event sorter 170 in FIG. 1B). In some embodiments, the interpreted inputs are generated by modules at the electronic device (e.g., the electronic device receives raw contact input data so as to identify gestures from the raw contact input data). In some embodiments, some or all of the interpreted inputs are received by the electronic device as interpreted inputs (e.g., an electronic device that includes the touch-sensitive surface 195 processes raw contact input data so as to identify gestures from the raw contact input data and sends information indicative of the gestures to the electronic device that includes the user interface navigation logic 480).

In some embodiments, both the display 194 and the touch-sensitive surface 195 are integrated with the electronic device (e.g., Computing Device A in FIG. 1E) that contains the user interface navigation logic 480. For example, the electronic device may be a desktop computer or laptop computer with an integrated display and touchpad. As another example, the electronic device may be a portable multifunction device 100 (e.g., a smartphone, PDA, tablet computer, etc.) with a touch screen (e.g., 112 in FIG. 2).

In some embodiments, the touch-sensitive surface 195 is integrated with the electronic device while the display 194 is not integrated with the electronic device (e.g., Computing Device B in FIG. 1E) that contains the user interface navigation logic 480. For example, the electronic device may be a device (e.g., a desktop computer or laptop computer) with an integrated touchpad connected (via wired or wireless connection) to a separate display (e.g., a computer monitor, television, etc.). As another example, the electronic device may be a portable multifunction device 100 (e.g., a smartphone, PDA, tablet computer, etc.) with a touch screen (e.g., 112 in FIG. 2) connected (via wired or wireless connection) to a separate display (e.g., a computer monitor, television, etc.).

In some embodiments, the display 194 is integrated with the electronic device while the touch-sensitive surface 195 is not integrated with the electronic device (e.g., Computing Device C in FIG. 1E) that contains the user interface navigation logic 480. For example, the electronic device may be a device (e.g., a desktop computer, laptop computer, television with integrated set-top box) with an integrated display connected (via wired or wireless connection) to a separate touch-sensitive surface (e.g., a remote touchpad, a portable multifunction device, etc.). As another example, the electronic device may be a portable multifunction device 100 (e.g., a smartphone, PDA, tablet computer, etc.) with a touch screen (e.g., 112 in FIG. 2) connected (via wired or wireless connection) to a separate touch-sensitive surface (e.g., a remote touchpad, another portable multifunction device with a touch screen serving as a remote touchpad, etc.).

In some embodiments, neither the display 194 nor the touch-sensitive surface 195 is integrated with the electronic device (e.g., Computing Device D in FIG. 1E) that contains the user interface navigation logic 480. For example, the electronic device may be a stand-alone electronic device (e.g., a desktop computer, laptop computer, console, set-top box, etc.) connected (via wired or wireless connection) to a separate touch-sensitive surface (e.g., a remote touchpad, a portable multifunction device, etc.) and a separate display (e.g., a computer monitor, television, etc.). As another example, the electronic device may be a portable multifunction device 100 (e.g., a smartphone, PDA, tablet computer, etc.) with a touch screen (e.g., 112 in FIG. 2) connected (via wired or wireless connection) to a separate touch-sensitive surface (e.g., a remote touchpad, another portable multifunction device with a touch screen serving as a remote touchpad, etc.).

In some embodiments, the computing device has an integrated audio system. In some embodiments, the computing device is in communication with an audio system that is separate from the computing device. In some embodiments, the audio system (e.g., an audio system integrated in a television unit) is integrated with a separate display 194. In some embodiments, the audio system (e.g., a stereo system) is a stand-alone system that is separate from the computing device and the display 194.

Attention is now directed towards user interface ("UI") embodiments and associated processes that may be implemented on an electronic device with a display and a touch-sensitive surface, such as device 100.

Figure 2:
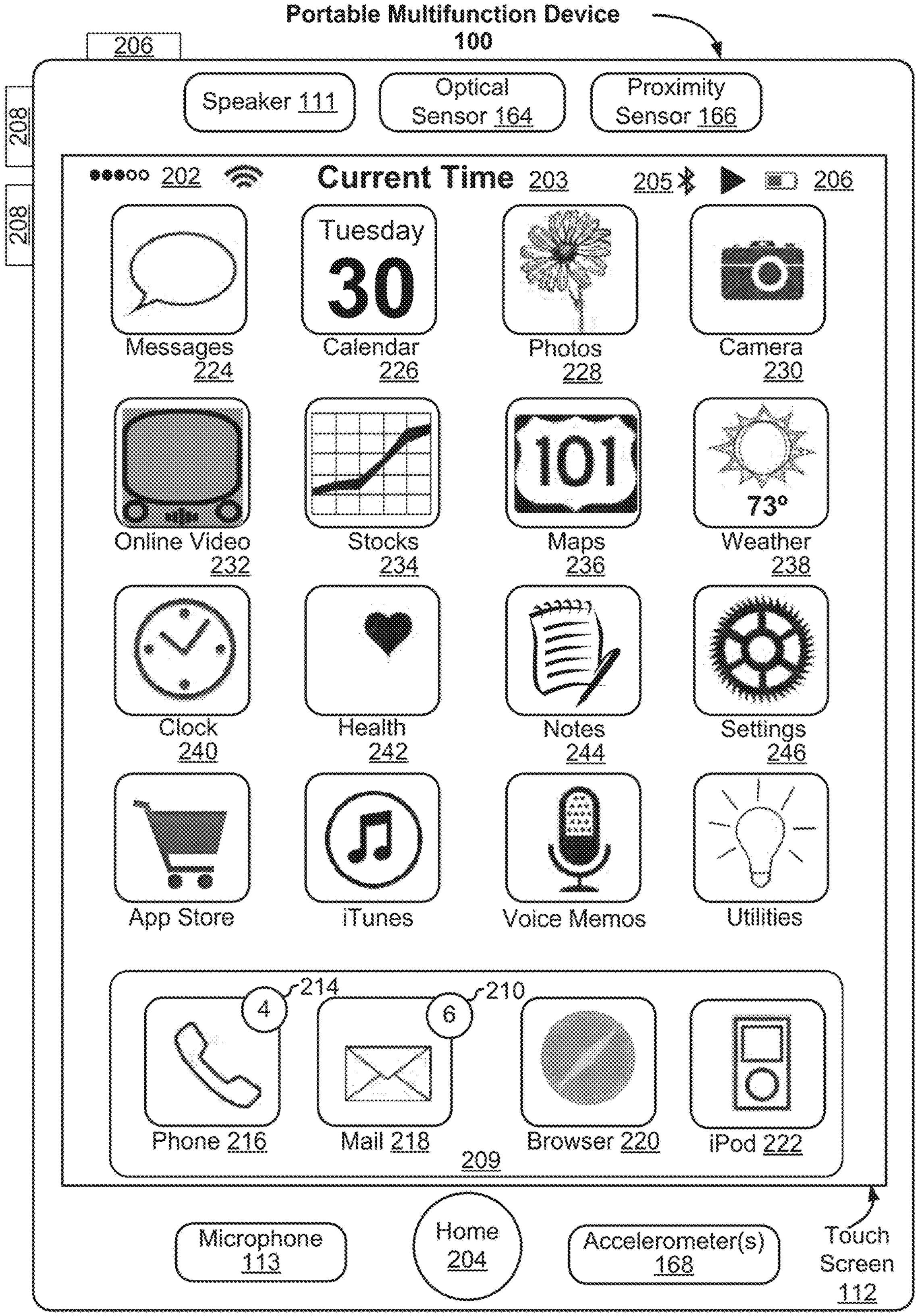
FIG. 2 is a schematic of a touch screen used to illustrate a user interface for a menu of applications, in accordance with some embodiments.

FIG. 2 is a schematic of a touch screen used to illustrate a user interface for a menu of applications, in accordance with some embodiments. Similar user interfaces are, optionally, implemented on device 100 (FIG. 1A). In some embodiments, the user interface displayed on the touch screen 112 includes the following elements, or a subset or superset thereof:

- Signal strength indicator(s) 202 for wireless communication(s), such as cellular and Wi-Fi signals;
- Time 203;
- Bluetooth indicator 205;
- Battery status indicator 206;
- Tray 209 with icons for frequently used applications, such as:
  - Icon 216 for telephone module 138, labeled "Phone," which optionally includes an indicator 214 of the number of missed calls or voicemail messages;
  - Icon 218 for e-mail client module 140, labeled "Mail," which optionally includes an indicator 210 of the number of unread e-mails;
  - Icon 220 for browser module 147, labeled "Browser;" and
  - Icon 222 for video and music player module 152, also referred to as IPOD (trademark of APPLE Inc.) module 152, labeled "iPod;" and
- Icons for other applications, such as:
  - Icon 224 for IM module 141, labeled "Messages;"
  - Icon 226 for calendar module 148, labeled "Calendar;"
  - Icon 228 for image management module 144, labeled "Photos;"
  - Icon 230 for camera module 143, labeled "Camera;"
  - Icon 232 for online video module 155, labeled "Online Video"
  - Icon 234 for stocks widget 149-2, labeled "Stocks;"
  - Icon 236 for map module 154, labeled "Maps;"
  - Icon 238 for weather widget 149-1, labeled "Weather;"
  - Icon 240 for alarm clock widget 149-4, labeled "Clock;"
  - Icon 242 for health module 142, labeled "Health;"
  - Icon 244 for notes module 153, labeled "Notes;"
  - Icon 246 for a settings application or module, which provides access to settings for device 100 and its various applications; and
  - Other icons for additional applications, such as App Store, iTunes, Voice Memos, and Utilities.

It should be noted that the icon labels illustrated in FIG. 2 are merely examples. Other labels are, optionally, used for various application icons. For example, icon 242 for health module 142 is alternatively labeled "Fitness Support," "Workout," "Workout Support," "Exercise," "Exercise Support," or "Fitness." In some embodiments, a label for a respective application icon includes a name of an application corresponding to the respective application icon. In some embodiments, a label for a particular application icon is distinct from a name of an application corresponding to the particular application icon.

Figure 3A:
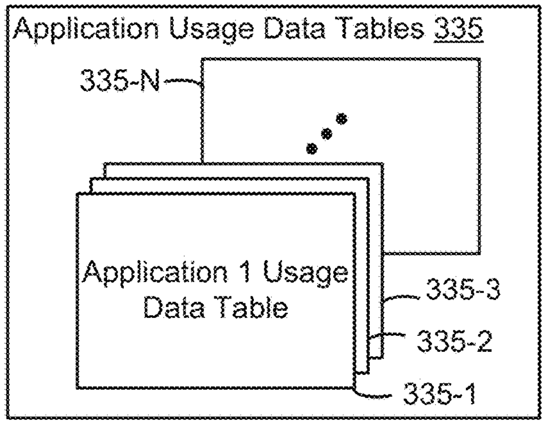
FIGS. 3A-3B are block diagrams illustrating data structures for storing application usage data, in accordance with some embodiments.
Figure 3B:
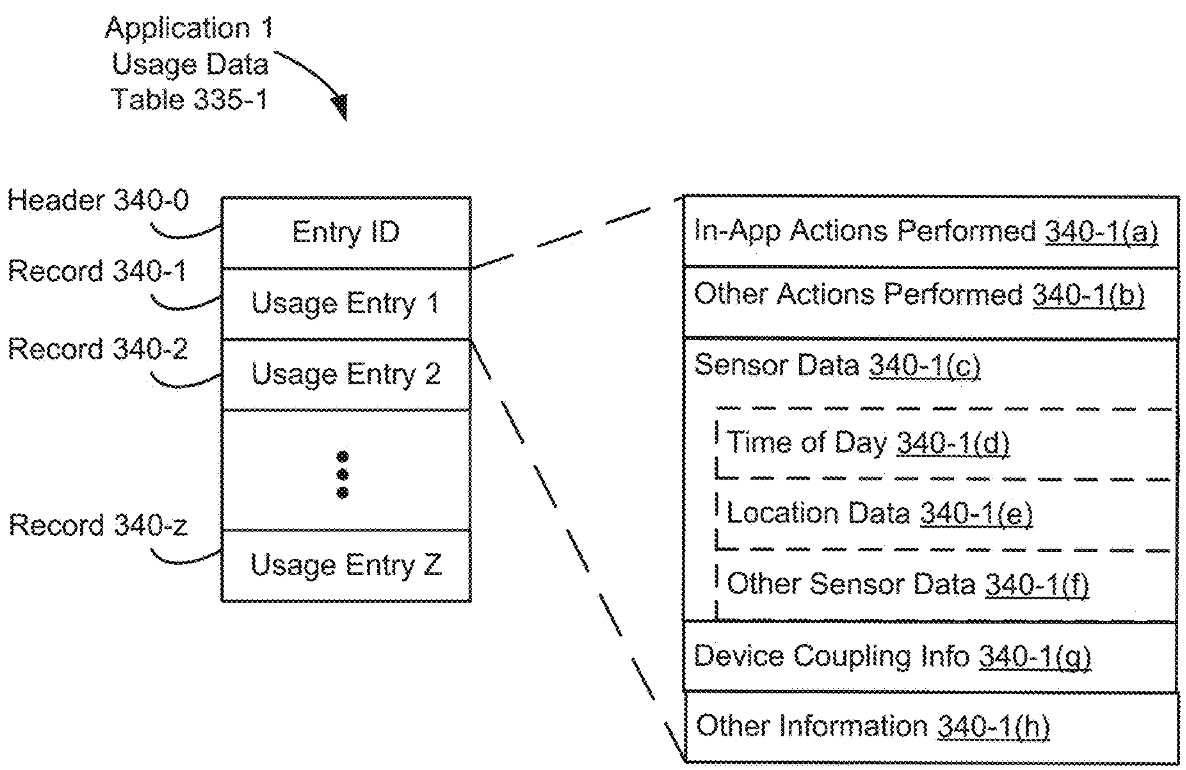

FIGS. 3A-3B are block diagrams illustrating data structures for storing application usage data, in accordance with some embodiments. As shown in FIG. 3A, application usage data tables 335 include a collection of data structures, optionally implemented as a collection of tables for each application installed on the device 100, that each store usage data associated with a corresponding respective application installed on the electronic device (e.g., application 1 usage data table 335-1 stores usage data for application 1 and application usage data table 335-2 stores usage data for application 2). In some embodiments, each table (e.g., table 335-1, 335-2, 335-3 . . . 335-N) in the collection of application usage data tables stores usage data for more than one application installed on the electronic device (e.g. table 335-1 stores usage data for related applications that are each provided by a common application developer or application vendor, for efficient storage of potentially related data).

In some embodiments, one or more application usage data tables 335 (e.g., application 1 usage data table 335-1) are used for storing usage data associated with applications installed on the device 100. As illustrated in FIG. 3B, application 1 usage data table 335-1 contains a number of usage entries. In some embodiments, the usage entries are stored in individual records 340-1 through 340-*z* and, optionally, a header 340-0. Header 340-0, in some embodiments, contains a brief description of each field of information (e.g., each field associated with each of the records) stored within the table. For example, Header 340-0 indicates that each record 340-1 through 340-*z* includes an entry ID that uniquely identifies the usage entry. In some embodiments, application 1 usage data table 335-1 includes additional fields in addition to the entry ID field, such as a timestamp field that identifies when the usage entry was created and/or stored in the table 335-1 and a related usage entries field that identifies related usage entries that may be stored in other application usage data tables 335.

In some embodiments, each record within the application 1 usage data table 335-1 contains one or more usage entries containing usage data collected while a user interacts with application 1 (e.g., every time the user launches application 1, a new usage entry is created to store collected usage data). In some embodiments, each usage entry in the table stores the following information and data structures, or a subset or superset thereof:

- information identifying in-app actions performed (e.g., in-app actions performed 340-1(*a*)) by the user within the application (in some embodiments, these actions are reported to the device by the application), for example the application reports to the usage data collecting module 163-2 that the user played a particular song within a particular playlist;
- information identifying other actions performed (e.g., other actions performed 340-1(*b*)) by the user within other applications (e.g., system-level applications), such as providing verbal instructions to a virtual assistant application or conducting a search for an item of information within a search application (e.g., search module 151, FIG. 1A);
- sensor data (e.g., usage data 340-1(*c*)) that includes data collected by the sensors on the device 100 while the user is interacting with the application associated with the usage entry, optionally including:
  - time of day (e.g., time of day 340-1(*d*)) information;
  - location data (e.g., location data 340-1(*e*)) identifying a current location at the time when the user launched the application and other locations visited by the user while executing the application (e.g., as reported by GPS module 135);
  - other sensor data (e.g., other sensor data 340-1(*f*)) collected while the user is interacting with the application (such as ambient light data, altitude data, pressure readings, motion data, etc.);
- device coupling information (e.g., device coupling info 340-1(*g*)) identifying external devices coupled with the device 100 while the user is interacting with the application (e.g., an example external device could be a pair of headphones connected to the headphone jack or another example device could be a device connected via BLUETOOTH (e.g., speakers in a motor vehicle or a hands-free system associated with a motor vehicle)); and
- other information (e.g., other information 340-1(*h*)) collected while the user is interacting with the application (e.g., information about transactions completed, such as information about the user's use of APPLE PAY.

In some embodiments, the application each usage entry further includes information identifying an action type performed by a user, while in other embodiments, the information identifying the in-app actions performed is used to determine or derive action types.

In some embodiments, the application usage data tables 335 also store information about privacy settings associated with users of the device 100. For example, the users of device 100 are able to configure privacy settings associated with the collection of usage data for each application. In some embodiments, users are able to control data collection settings for all information contained within each usage entry (e.g., in-app actions performed, other actions performed, sensor data, device coupling info, and other information). For example, a user can configure a privacy setting so that the device 100 (or a component thereof, such as usage data collecting module 163-2) does not collect location data, but does collect information about in-app actions performed for the browser module 147. As another example, the user can configure a privacy setting so that the device 100 does not collect information about in-app actions performed, but does collect location data for the online video module 155. In this way, users are able to control the collection of usage data on the device 100 and configure appropriate privacy settings based on their personal preferences regarding the collection of usage data for each application available on the device 100.

Figures 4A, 4B:
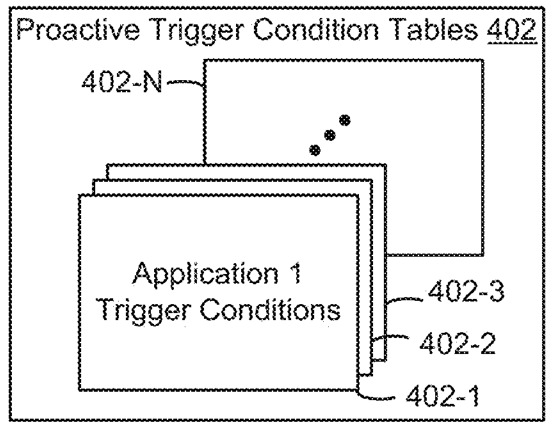
FIGS. 4A-4B are block diagrams illustrating data structures for storing trigger conditions, in accordance with some embodiments.

FIGS. 4A-4B are block diagrams illustrating data structures for storing trigger conditions, in accordance with some embodiments. As shown in FIG. 4A, proactive trigger condition tables 402 include a collection of data structures, optionally implemented as a collection of tables for each respective application installed on the device 100, that each store trigger conditions associated with the respective application (e.g., application 1 trigger conditions table 402-1 stores trigger conditions that are associated with application 1 (e.g., trigger conditions that, when satisfied, cause the device 100 to launch or use application 1)). In some embodiments, each table (e.g., table 402-1, 402-2, 402-3 . . . 402-N) in the collection of application usage data tables stores trigger conditions associated with more than one application installed on the electronic device (e.g. table 402-1 stores trigger conditions for related applications that are each provided by a common application developer or application vendor, for efficient storage of potentially related data).

In some embodiments, one or more proactive trigger condition tables 402 (e.g., application 1 trigger conditions table 402-1) are used for storing trigger conditions associated with applications installed on the device 100. For example, as illustrated in FIG. 4B, an application 1 trigger condition table 402-1 contains information identifying a number of prerequisite conditions and associated actions for each trigger condition that is associated with application 1. As shown in FIG. 4B, the application 1 trigger condition table 402-1 contains records 414-1 through 414-*z* and, optionally, includes a header 414-0. Header 414-0, in some embodiments, contains a brief description of each field of information (e.g., each field associated with each of the records) stored within the table. Each record (e.g., record 414-1) includes information that allows the device 100 to determine the prerequisite conditions for satisfying each trigger condition. In some embodiments, prereqs 1 of record 414-1 contains or identifies a number of prerequisite conditions (e.g., sensor readings) that, when detected, cause the device 100 to perform the associated action (e.g., action 4).

As a specific example, prereqs 1 may indicate that if the time of day is between 4:00 PM-4:30 PM; location data (e.g., as reported by GPS module 135) shows that the user is still near their office (e.g., within a predetermined distance of their work address); and accelerometer data shows that the user is moving (e.g., as reported by accelerometers 168), then the device 100 should detect the trigger condition associated with prereqs 1 and perform action 4 (e.g., action 4 is associated with instant messaging module 141 and causes the module 141 to send a message to the user's spouse (or present a dialog asking the user whether they would like to send the message) indicating he/she is headed back home from work). In some embodiments, prerequisite conditions are identified based on a pattern of user behavior identified by the trigger establishing module 163-1 (FIG. 1A). In some embodiments, the trigger establishing module 163-1, in conjunction with usage data collecting module 163-2 and application usage data tables 335, mines data that is stored in the application usage data tables to identify the patterns of user behavior. Continuing the previous example, after observing on three separate days that the user has sent the message to their spouse between 4:00 PM-4:30 PM, while the user is within the predetermined distance of their work and while the user is moving, then the trigger establishing module 163-1 creates a corresponding trigger condition to automatically send the message (or ask the user for permission to automatically send the message) when the prerequisite conditions are observed. In some embodiments, the trigger establishing module 163-1 analyzes or mines the application usage data tables 335 at predefined intervals (e.g., every hour, every four hours, every day, or when the device is connected to an external power source) and creates trigger conditions only at these predefined intervals. In some embodiments, the user confirms that the trigger condition should be created (e.g., the device 100 presents a dialog to the user that describes the prerequisite conditions and the associated action and the user then confirms or rejects the creation of the trigger condition). For example, an example dialog contains the text "I've noticed that you always text your wife that you are on your way home at this time of day. Would you like to send her a text saying: I'm heading home now?"

FIG. 5 is a block diagram illustrating an example trigger condition establishing system, in accordance with some embodiments. As shown in FIG. 5, a trigger condition establishing system 500 includes the portable multifunction device 100 and also includes one or more servers 502. The portable multifunction device 100 communicates with the one or more servers 502 over one or more networks. The one or more networks (e.g., network(s) 520) communicably connect each component of the trigger condition establishing system 500 with other components of the trigger condition establishing system 500. In some embodiments, the one or more networks 520 include public communication networks, private communication networks, or a combination of both public and private communication networks. For example, the one or more networks 520 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, one or more proactive trigger condition tables 402 are stored on the portable multifunction device 100 and one or more other proactive trigger condition tables 402 are stored on the one or more servers 502. In some embodiments, the portable multifunction device 100 stores the proactive trigger condition tables 402, while in other embodiments, the one or more servers 502 store the proactive trigger condition tables 402. Similarly, in some embodiments, one or more application usage data tables 335 are stored on the portable multifunction device 100 and one or more other application usage data tables 335 are stored on the one or more servers 502. In some embodiments, the portable multifunction device 100 stores the application usage data tables 335, while in other embodiments, the one or more servers 502 store the application usage data tables 335.

In embodiments in which one or more proactive trigger condition tables 402 or one or more application usage data tables 335 are stored on the one or more servers 502, then some of functions performed by the trigger establishing module 163-1 and the usage data collecting module 163-2, respectively, are performed at the one or more servers 502. In these embodiments, information is exchanged between the one or more servers 502 and the device 100 over the networks 520. For example, if the one or more servers 502 store proactive trigger condition tables 402 for the online video module 155, then, in some embodiments, the device 100 sends one or more usage entries corresponding to the online video module 155 to the one or more servers 502. In some embodiments, the one or more servers 502 then mine the received usage data to identify usage patterns and create trigger conditions (as discussed above in reference to FIGS. 4A-4B) and sends the created trigger conditions to the device 100. In some embodiments, while receiving data associated with the online video module 155 (e.g., data for one or more video streams), the device 100 and the one or more servers 502 exchange usage data and trigger conditions. In some embodiments, the one or more servers 502 are able to detect the created trigger conditions as well (e.g., based on the usage data received during the exchange of the data for one or more video streams, the server can determine that the trigger conditions has been satisfied), such that the trigger conditions do not need to be sent to the device 100 at all. In some embodiments, the usage data that is sent to the one or more servers 502 is of limited scope, such that it contains only information pertaining to the user's use of the online video module 155 (as noted above, the user must also configure privacy settings that cover the collection of usage data and these privacy settings, in some embodiments, also allow the user to configure the exchange of usage data with one or more servers 502 (e.g., configure what type of data should be sent and what should not be sent)).

In some embodiments, data structures discussed below in reference to Sections 1-11 are also used to help implement and/or improve any of the methods discussed herein. For example, the predictions engines discussed below in reference to FIGS. 1-11 are used to help establish trigger conditions and/or other techniques discussed in Sections 1-11 are also used to help monitor application usage histories.

FIGS. 6A-6B illustrate a flowchart representation of a method 600 of proactively identifying and surfacing relevant content, in accordance with some embodiments. FIGS. 3A-3B, 4A-4B, 5, and 7A-7B are used to illustrate the methods and/or processes of FIGS. 6A-6B. Although some of the examples which follow will be given with reference to inputs on a touch-sensitive display (in which a touch-sensitive surface and a display are combined), in some embodiments, the device detects inputs on a touch-sensitive surface 195 that is separate from the display 194, as shown in FIG. 1D.

In some embodiments, the method 600 is performed by an electronic device (e.g., portable multifunction device 100, FIG. 1A) and/or one or more components of the electronic device (e.g., I/O subsystem 106, operating system 126, etc.). In some embodiments, the method 600 is governed by instructions that are stored in a non-transitory computer-readable storage medium and that are executed by one or more processors of a device, such as the one or more processors 122 of device 100 (FIG. 1A). For ease of explanation, the following describes method 600 as performed by the device 100. In some embodiments, with reference to FIG. 1A, the operations of method 600 are performed by or use, at least in part, a proactive module (e.g., proactive module 163), application usage data tables (e.g., application usage data tables 335), trigger condition tables (e.g., trigger condition tables 402), a trigger establishing module (e.g., trigger establishing module 163-1), a usage data collecting module (e.g., usage data collecting module 163-2), a proactive suggestions module (e.g., proactive suggestions module 163-3), a contact/motion module (e.g., contact/motion module 130), a graphics module (e.g., graphics module 132), one or more contact intensity sensors (e.g., contact intensity sensors 165), and a touch-sensitive display (e.g., touch-sensitive display system 112). Some operations in method 600 are, optionally, combined and/or the order of some operations is, optionally, changed.

As described below, the method 600 provides an intuitive way to proactively identify and surface relevant content on an electronic device with a touch-sensitive display. The method creates more efficient human-machine interfaces by requiring fewer touch inputs in order to perform various functions. For battery-operated electronic devices, proactively identifying and surfacing relevant content faster and more efficiently both conserves power and increases the time between battery charges.

As shown in FIG. 6A, the device executes (602), on the electronic device, an application in response to an instruction from a user of the electronic device. In some embodiments, the instruction from the user is a touch input over an icon associated with the application or a voice command received from the user that instructs a virtual assistant application (e.g., a virtual assistant application managed by operating system 126, FIG. 1A) to execute the application. While executing the application, the device (or a component thereof, such as usage data collecting module 163-2) collects (604) usage data that includes one or more actions performed by the user within the application. In some embodiments the usage data, in addition to or instead of including the one or more actions, also includes information identifying an action type associated with each of the one or more actions. For example, the usage data includes information identifying that, while interacting with the music player module 152, the user searched for a first playlist, navigated within the first playlist, selected a first track within the first playlist, then searched for a second playlist (e.g., the usage data includes each of the one or more actions performed by the user within the music player module 152). In this way, the usage data includes information about each of the individual actions performed (e.g., the user searched for and played the first track of the first playlist) and also includes information identifying the action types (search, navigate, select, etc.). In some embodiments, the usage data collection module 163-2 collects the one or more actions and then the trigger establishing module 163-1 later assigns an action type to each of the one or more actions.

In some embodiments the collected usage data is stored in a usage entry (as described above in reference to FIGS. 3A-3B) in an application usage data table that is associated with the application. In some embodiments, the collected usage data includes in-app actions performed by the user, other actions performed by the user (e.g., interactions with a virtual assistant application, interactions with a search interface (e.g., search module 151), and other interactions with applications that are managed by the operating system 126), information associated with calendar events, and additional data obtained from sensors on the device 100 (as explained above in reference to FIG. 3B).

In some embodiments, the usage data includes (618) verbal instructions, from the user, provided to a virtual assistant application while continuing to execute the application, and the at least one trigger condition is further based on the verbal instructions provided to the virtual assistant application. In some embodiments, the verbal instructions comprise a request to create a reminder that corresponds to (e.g., references or requires recreation/re-execution of) a current state of the application, the current state corresponding to a state of the application when the verbal instructions were provided (e.g., one or more application views 191, FIG. 1B). In some embodiments, the state of the application when the verbal instructions were provided is selected from the group consisting of: a page displayed within the application when the verbal instructions were provided, content playing within the application when the verbal instructions were provided (e.g., a currently playing audio track), a notification displayed within the application when the verbal instructions were provided (e.g., a notification from instant messaging module 141 that is displayed while the user is interacting with browser module 147), and an active portion of the page displayed within the application when the verbal instructions were provided (e.g., currently playing video content within a web page). As additional examples, the current state of the application might correspond also to (i) an identifier of the particular page (e.g., a URL for a currently displayed webpage) that the user is currently viewing within the application when the verbal instructions are provided or a history of actions that the user took before navigating to a current page within the application (e.g., URLs visited by the user prior to the currently displayed webpage).

In some embodiments, the verbal instructions include the term "this" or "that" in reference to the current state of the application. For example, the user provides the instruction "remind me of 'this'" to the virtual assistant application while a notification from instant messaging module 141 is displayed, and, in response, the virtual assistant application causes the device 100 to create a reminder corresponding to content displayed within the notification. As another example, the user provides the instruction "remind me to watch 'this'" to the virtual assistant application while the user is watching particular video content in the online video module 155 and, in response, the virtual assistant application causes the device 100 to create a reminder corresponding to the particular video content. In some embodiments, the device 100 receives information regarding the current state of the application when the verbal instructions were provided from the application itself (e.g., continuing with the previous example, the online video module 155 reports its current state back to the device 100, or to a component thereof such as proactive module 163 and, in this way, the proactive module 163 receives information identifying the particular video content)

The device then automatically and without human intervention, obtains (606) at least one trigger condition based on the collected usage data. In some embodiments, the at least one trigger condition is established on the device, while in other embodiments, the trigger condition is obtained (612) from a server (e.g., one or more servers 502, FIG. 5) that established the trigger condition based on usage data that was sent from the device to the one or more servers 502 (as explained above in reference to FIG. 5). In some embodiments, the at least one trigger condition, when satisfied, causes the device (or a component thereof, such as proactive module 163) to allow the user to easily perform (e.g., without any input or with only a single touch or verbal input from the user) an action that is associated with the at least one trigger condition. For example one example trigger might indicate that between 2:00 PM and 2:30 PM, while the accelerometer data (e.g., as reported by accelerometers 168) indicates that the user is walking between previously-visited GPS coordinates (e.g., between two often-visited buildings located near a work address for the user), the device should automatically (and without any input from the user) open a music application (e.g., music player 152, FIG. 1A) and begin playing a specific playlist. In some embodiments, this example trigger was established (by the one or more servers 502 or by the device 100) after collecting usage data and determining that the collected usage data associated with the music player 152 indicates that the user opens the music player 152 and plays the specific playlist while walking between the previously-visited GPS coordinates every weekday between 2:00 PM—2:30 PM. In this way, the device (or the server) identifies and recognizes a pattern based on the collected usage data. By performing the action (e.g., playing the specific playlist) automatically for the user, the user does not need to waste any time unlocking the device, searching for the music player 152, searching for the specific playlist, and then playing the specific playlist.

In some embodiments, the method also includes checking privacy settings associated with the user of the device prior to establishing or obtaining trigger conditions, in order to confirm that the user has permitted the device to collect certain usage data and/or to verify that the user has permitted the device to establish trigger conditions (e.g., the user may configure a setting to prohibit the device from establishing trigger conditions that cause the device to automatically send text messages).

The device (or a component thereof, such as trigger condition establishing module 163-1) also associates (608) the at least one trigger condition with a particular action (or with a particular action type that corresponds to the particular action) of the one or more actions performed by the user within the application (e.g., by storing the prerequisite conditions for satisfying the trigger condition together with the particular action in a proactive trigger condition table 402, FIGS. 4A-4B). Upon determining that the at least one trigger condition has been satisfied, the device provides (610) an indication to the user that the particular action (or that the particular action type) associated with the trigger condition is available. In some embodiments, providing the indication to the user includes surfacing a user interface object for launching the particular action (or for performing an action corresponding to the particular action type) (e.g., UI object 702, FIG. 7A), surfacing an icon associated with the application that performs the particular action (e.g., application icon 710, as shown in the bottom left corner of touch screen 112, FIG. 7A), or simply performing the particular action (as described in the example of the specific playlist above). In some embodiments, the device surfaces the user interface object and/or the icon, while also (automatically and without human intervention) simply performing the particular action (or an action that is of the same particular action type as the particular action).

In some embodiments, obtaining the at least one trigger condition includes (612) sending, to one or more servers that are remotely located from the electronic device (e.g., servers 502, FIG. 5), the usage data and receiving, from the one or more servers the at least one trigger condition. For example, consistent with these embodiments, the electronic device sends (over networks 520) one or more usage entries (e.g., usage entry 1, FIG. 3B) to the servers 502 and, based on the usage data, the servers 502 establish the at least one trigger condition. Continuing the example, the servers 502 then send (using networks 520) the at least one trigger condition (e.g., prerequisite conditions and associated actions, stored in a proactive trigger condition table 402-1) to the device 100.

In some embodiments, providing the indication includes (614) displaying, on a lock screen on the touch-sensitive display, a user interface object corresponding to the particular action associated with the trigger condition. In some embodiments, the user interface object is displayed in a predefined central portion of the lock screen (e.g., as pictured in FIG. 7A, the UI object 702 is displayed substantially in the middle of the lock screen). For example, the device provides the indication by displaying UI object 702 on the lock screen (FIG. 7A). As shown in FIG. 7A, UI object 702 includes a predicted action 706. In some embodiments, the predicted action 706 is a description of an action associated with the at least one trigger condition (in other words, the user interface object includes a description of the particular action associated with the trigger condition (616)), such as "Swipe to Play Track 2 of Walking Playlist"). In some embodiments, the UI object 702 also optionally includes additional info 704 that provides information to the user as to why the UI object 702 is being displayed. In some embodiments, the additional info 704 includes a description of the usage data that was used to detect the trigger condition (e.g., sensor data 340-1(*c*)) and/or a description of the prerequisite conditions for the at least one trigger condition (e.g., prereqs 1 of record 414-1, FIG. 4B). For example, the additional info 704 indicates that the predicted action 706 is being displayed because the user often listens to the walking playlist at this particular time of day and while the user is walking. In some embodiments, selecting the additional info 704 (e.g., tapping on top of the additional info 704) causes the device 100 to displays a user interface that allows the user to change privacy settings associated with the collection of usage data and the creation of trigger conditions.

In some embodiments, the UI object 702 also optionally includes (616) an application icon 710 that is associated with the predicted action 706. For example, the application icon 710 is the icon for music player 152 (as shown in FIG. 7A). In some embodiments, the UI object 702 also includes an affordance 708 that, when selected, causes the device to perform the predicted action (e.g., causes the device to begin playing track 2 of the walking playlist). In some embodiments, the user interface object (e.g., user interface object 702) includes a description of the particular action associated with the trigger condition (e.g., predicted action 706, as explained above). In some embodiments, the user interface object 702 further includes an icon associated with the application (e.g., application icon 710 displayed within the UI object 702). In some embodiments, the user interface object 702 further includes a snooze button that, when selected, causes the device to cease displaying the UI object 702 and to re-display the UI object 702 after a period of time selected or pre-configured by the user. For example, the user selects to snooze the UI object 702 for two hours and, after the two hours, the device then re-displays the UI object 702. As another example, the user selects to snooze the UI object 702 until they are available and, in some embodiments, the device 100 searches the calendar module 148 to identify the next open slot in the user's schedule and re-displays the UI object 702 during the identified next open slot.

In some embodiments, the device detects (622) a first gesture at the user interface object. In response to detecting the first gesture, the device displays (624), on the touch-sensitive display, the application and, while displaying the application, performs the particular action associated with the trigger condition. In some embodiments, the first gesture is a swipe gesture over the user interface object. In some embodiments, in response to detecting the swipe gesture over the user interface object, the device also unlocks itself prior to displaying the application (in other embodiments, the application is displayed right on the lock screen). In some embodiments, the first gesture is indicated by the text displayed within the UI object 702 (e.g., the text within predicted action 706 includes a description of the first gesture, e.g., "Swipe to . . . "). For example and with references to FIG. 7A, the user makes contact with the touch-sensitive surface on top of the UI object 702 and, without breaking contact with the touch-sensitive surface, the user moves the contact in a substantially horizontal direction across the UI object 702. In response to detecting this swipe gesture from the user over the UI object 702, the device displays the music player 152 and begins playing track 2 of the walking playlist.

Alternatively, instead of detecting the first gesture, in some embodiments, the device detects (626) a second gesture (e.g., a gesture distinct from the first gesture discussed above, such as a single tap at a predefined area of the user interface object (e.g., a play button, such as the affordance 708)) at the user interface object. In response to detecting the second gesture and while continuing to display the lock screen on the touch-sensitive display, the device performs (628) the particular action associated with the trigger condition. In other words, the device performs the particular action right from the lock screen and continues to display the lock screen, without displaying the application.

In some embodiments, the first and second gestures discussed above in reference to operations 622-628 are the same gesture but they are performed over different objects displayed within the UI object 702. For example, the first gesture is a swipe gesture over the predicated action 706, while the second gesture is a swipe gesture over the affordance 708. As another example, the first gesture is a single tap over the predicted action 706 and the second gesture is a single tap over the affordance 708.

In some embodiments, providing the indication to the user that the particular action is available includes letting the user know that the particular action is available for execution. In some embodiments, providing the indication to the user that the particular action associated with the trigger condition is available includes performing the particular action. In some embodiments, the indication is provided to the user by virtue of the performance of the particular action (e.g., the user hearing that a desired playlist is now playing). In some embodiments, the UI object 702 is displayed on the lock screen and the particular action is also performed without receiving any user input (such as the first and second gestures discussed above).

In some embodiments, instead of (or in addition to) displaying the UI object 702, the device displays an icon associated with the application substantially in a corner of the lock screen (e.g., as pictured in FIG. 7A, application icon 710 is displayed substantially in a lower left corner of the touch screen 112).

In some embodiments, the device receives an instruction from the user to unlock the electronic device (e.g., recognizes the user's fingerprint as valid after an extended contact over the home button 204). In response to receiving the instruction (e.g., after unlocking the device and ceasing to display the lock screen), the device displays (620), on the touch-sensitive display, a home screen of the device and provides, on the home screen, the indication to the user that the particular action associated with the trigger condition is available. As pictured in FIG. 7B, the UI object 702 is displayed as overlaying a springboard section (or application launcher) of the home screen after receiving the instruction to unlock the device. In some embodiments, instead of or in addition to display the UI object 702 at the top of the home screen, the device also displays the application icon 710 in a bottom portion that overlays a dock section of the home screen. In some embodiments, the home screen includes: (i) a first portion including one or more user interface pages for launching a first set of applications available on the electronic device (e.g., the first portion consists of all the individual pages of the springboard section of the home screen) and (ii) a second portion, that is displayed adjacent (e.g., below) to the first portion, for launching a second set of applications available on the electronic device, the second portion being displayed on all user interface pages included in the first portion (e.g., the second portion is the dock section). In some embodiments, providing the indication on the home screen includes displaying the indication over the second portion (e.g., as shown in FIG. 7B, the bottom portion that includes application icon 710 is displayed over the dock portion). In some embodiments, the second set of applications is distinct from and smaller than the first set of applications (e.g., the second set of applications that is displayed within the dock section is a selected set of icons corresponding to favorite applications for the user).

In some embodiments, determining that the at least one trigger condition has been satisfied includes determining that the electronic device has been coupled with a second device, distinct from the electronic device. For example, the second device is a pair of headphones that is coupled to the device via the headset jack 212 and the at least one trigger condition includes a prerequisite condition indicating that the pair of headphones has been coupled to the device (e.g., prior to executing a particular action that includes launching the user's favorite podcast within a podcast application that the user always launches after connecting headphones). As another example, the second device is a Bluetooth speaker or other hands-free device associated with the user's motor vehicle and the at least one trigger condition includes a prerequisite condition indicating that the motor vehicle's Bluetooth speaker has been coupled to the device (e.g., prior to executing a particular action that includes calling the user's mom if the time of day and the user's location match additional prerequisite conditions for the particular action of calling the user's mom). Additional details regarding the coupling of an external device and performing an action in response to the coupling are provided in Section 6 below (e.g., in reference to FIG. 36_1 of Section 6).

In some embodiments, determining that the at least one trigger condition has been satisfied includes determining that the electronic device has arrived at a location corresponding to a home or a work location associated with the user. In some embodiments, the device monitors locations (e.g., specific GPS coordinates or street addresses associated with the locations) that are frequently visited by the user and uses this information to ascertain the home or the work location associated with the user. In some embodiments, the device determines addresses for these locations based on information received from or entered by the user (such as stored contacts). In some embodiments, determining that the electronic device has arrived at an address corresponding to the home or the work location associated with the user includes monitoring motion data from an accelerometer of the electronic device and determining, based on the monitored motion data, that the electronic device has not moved for more than a threshold amount of time (e.g., user has settled in at home and has not moved for 10 minutes). In this way, for example, the device ensures that the particular action associated with the at least one trigger condition is performed when the user has actually settled in to their house, instead of just when the user arrives at the driveway of their house.

In some embodiments of the method 600 described above, the method begins at the obtaining operation 606 and, optionally, includes the executing operation 602 and the collecting operation 604. In other words, in these embodiments, the method 600 includes: obtaining at least one trigger condition that is based on usage data associated with a user of the electronic device, the usage data including one or more actions performed by the user within an application while the application was executing on the electronic device; associating the at least one trigger condition with a particular action of the one or more actions performed by the user within the application; and, upon determining that the at least one trigger condition has been satisfied, providing an indication to the user that the particular action associated with the trigger condition is available.

It should be understood that the particular order in which the operations in FIGS. 6A-6B have been described is merely one example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 800) are also applicable in an analogous manner to method 600 described above with respect to FIGS. 6A-6B. For example, the user interface objects described above with reference to method 600 optionally have one or more of the characteristics of the user interface objects described herein with reference to other methods described herein (e.g., method 800). In some embodiments, any relevant details from Sections 1-11 may be utilized for any suitable purpose in conjunction with method 600. For brevity, these details are not repeated here.

FIGS. 8A-8B illustrate a flowchart representation of a method 800 of proactively identifying and surfacing relevant content, in accordance with some embodiments. FIGS. 3A-3B, 4A-4B, 5, and 9A-9D are used to illustrate the methods and/or processes of FIGS. 8A-8B. In some embodiments, the user interfaces illustrated in FIGS. 9A-9D are referred to as a zero-keyword search. A zero-keyword search is a search that is conducted without any input from a user (e.g., the search entry box remains blank) and allows the user to, for example, view people, applications, actions within applications, nearby places, and/or news articles that the user is likely going to (or predicted to) search for next. Although some of the examples which follow will be given with reference to inputs on a touch-sensitive display (in which a touch-sensitive surface and a display are combined), in some embodiments, the device detects inputs on a touch-sensitive surface 195 that is separate from the display 194, as shown in FIG. 1D.

In some embodiments, a method 800 is performed by an electronic device (e.g., portable multifunction device 100, FIG. 1A) and/or one or more components of the electronic device (e.g., I/O subsystem 106, operating system 126, etc.). In some embodiments, the method 800 is governed by instructions that are stored in a non-transitory computer-readable storage medium and that are executed by one or more processors of a device, such as the one or more processors 122 of device 100 (FIG. 1A). For ease of explanation, the following describes a method 800 as performed by the device 100. In some embodiments, with reference to FIG. 1A, the operations of method 800 are performed by or use, at least in part, a proactive module (e.g., proactive module 163), application usage data tables (e.g., application usage data tables 335), trigger condition tables (e.g., trigger condition tables 402), a trigger establishing module (e.g., trigger establishing module 163-1), a usage data collecting module (e.g., usage data collecting module 163-2), a proactive suggestions module (e.g., proactive suggestions module 163-3), a search module (e.g., search module 151), a contact/motion module (e.g., contact/motion module 130), a graphics module (e.g., graphics module 132), one or more contact intensity sensors (e.g., contact intensity sensors 165), and a touch-sensitive display (e.g., touch-sensitive display system 112). Some operations in method 800 are, optionally, combined and/or the order of some operations is, optionally, changed.

As described below, the method 800 provides an automated method for proactively identifying and surfacing relevant content (before the user explicitly asks for the relevant content, e.g., before the user enters any text into a search entry portion of a search interface) on an electronic device with a touch-sensitive display. The method reduces the cognitive burden on a user when accessing applications, thereby creating a more efficient human-machine interface.

Figure 9A:
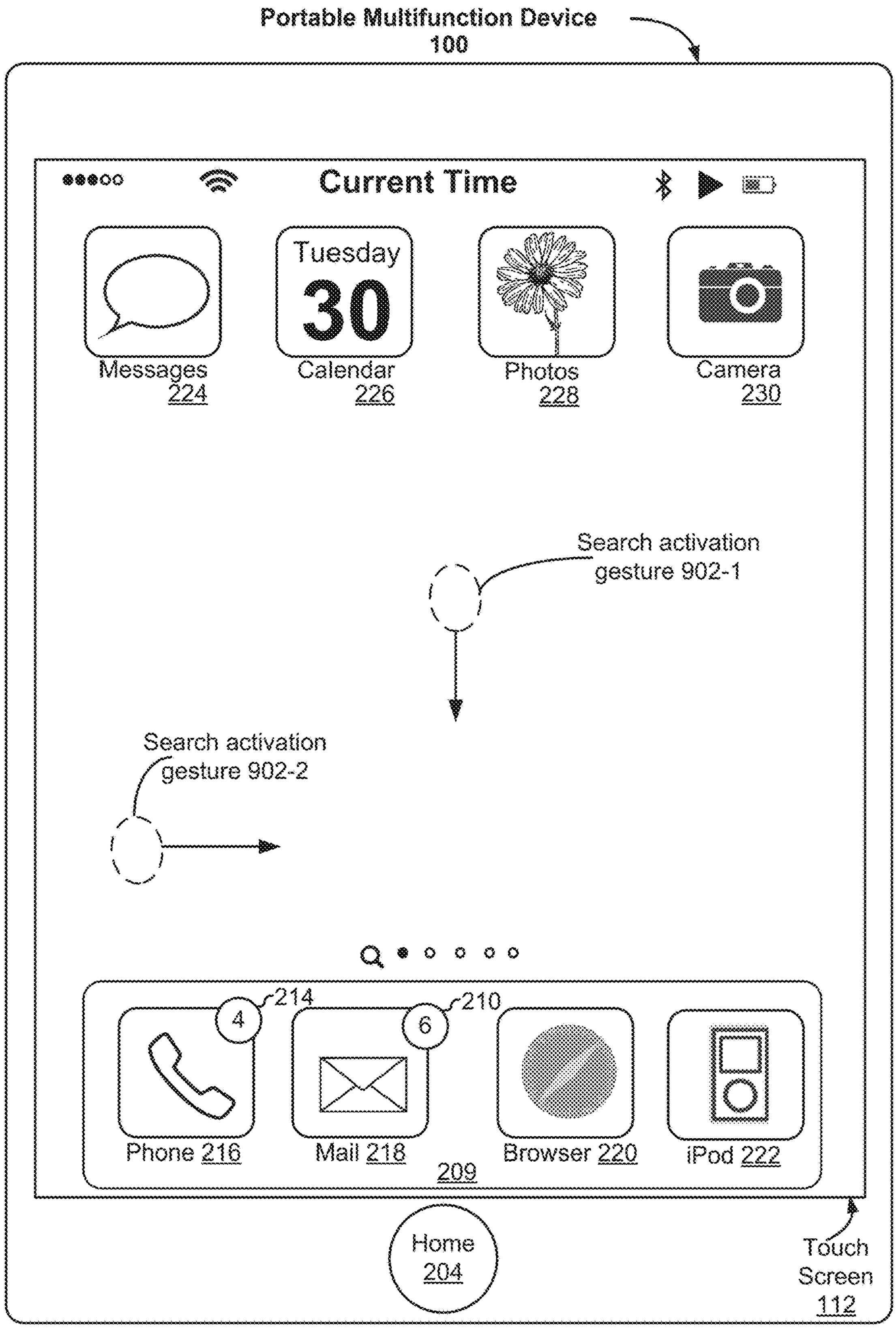
FIGS. 9A-9D are schematics of a touch-sensitive display used to illustrate user interfaces for proactively identifying and surfacing relevant content, in accordance with some embodiments.

As shown in FIG. 8A, the device detects (802) a search activation gesture on the touch-sensitive display. For example, as shown in FIG. 9A, the device detects a search activation gesture 902-1 (e.g., a contact on the touch-sensitive display followed by continuous movement of the contact in a substantially vertical direction (e.g., downward)). As another example, as is also shown in FIG. 9A, the device detects a search activation gesture 902-2 (e.g., a contact on the touch-sensitive surface followed by continuous movement of the contact in a substantially horizontal direction (e.g., rightward)). In some embodiments, the search activation gesture is available from at least two distinct user interfaces, and a first user interface of the at least two distinct user interfaces corresponds to displaying a respective home screen page of a sequence of home screen pages on the touch-sensitive display.

In some embodiments, when the respective home screen page is a first home screen page in the sequence of home screen pages (e.g., as shown in FIG. 9A), the search activation gesture includes one of the following: (i) a gesture moving in a substantially downward direction relative to the user of the electronic device (e.g., gesture 902-1) or (ii) a continuous gesture moving in a substantially left-to-right direction relative to the user and substantially perpendicular to the downward direction (e.g., gesture 902-2). In some embodiments, when the respective home screen page is a second home screen page in the sequence of home screen pages (in other words, not the first home screen page), the search activation gesture is the continuous gesture moving in the substantially downward direction relative to the user of the electronic device (in other words, only the search activation gesture 902-1 is available and gesture 902-2 is not available).

In some embodiments, a second user interface of the at least two distinct user interfaces corresponds to displaying an application switching interface on the touch-sensitive display (e.g., in response to the user double tapping on the home button 204). In some embodiments, the search activation gesture comprises a contact, on the touch-sensitive display, at a predefined search activation portion of the application switching interface (e.g., the application switching interface includes a search entry portion that is the predefined search activation portion (similar to search entry portion 920 of FIG. 9B) displayed within a top portion of the application switching interface).

In response to detecting the search activation gesture, the device displays (804) a search interface on the touch-sensitive display that includes (806): (a) a search entry portion (e.g., search entry portion 920 for receiving input from a user that will be used as a search query, FIG. 9B) and (b) a predictions portion that is displayed before receiving any user input at the search entry portion (e.g., predictions portion 930, FIG. 9B). The predictions portion is populated with one or more of: (a) at least one affordance for contacting a person of a plurality of previously-contacted people (e.g., the affordances displayed within suggested people 940 section, FIG. 9B) and (b) at least one affordance for executing a predicted action within an application (e.g., a "deep link") of a plurality of applications available on the electronic device (e.g., suggested actions 950 section, FIG. 9B). "Within" the application refers to the at least one affordance for executing the predicated action representing a link to a specific page, view, or state (e.g., one of application views 191, FIG. 1B) within the application. In other words the at least one affordance for executing the predicted action, when selected, does not just launch the application and display default content or content from a previous interaction with the application, but instead displays the specific page, view, or state corresponding to the deep link.

In some embodiments, the person is automatically selected (e.g., by the device 100 or proactive module 163) from the plurality of previously-contacted people based at least in part on a current time. For example, every day around 5:30 PM, while the user is still at work (work location is determined as explained above with reference to FIGS. 6A-6B), the user sends a text to their roommate indicating that they are headed home, so the predictions portion includes an affordance that is associated with the roommate (e.g., P-1 is for the roommate).

Figure 9B:
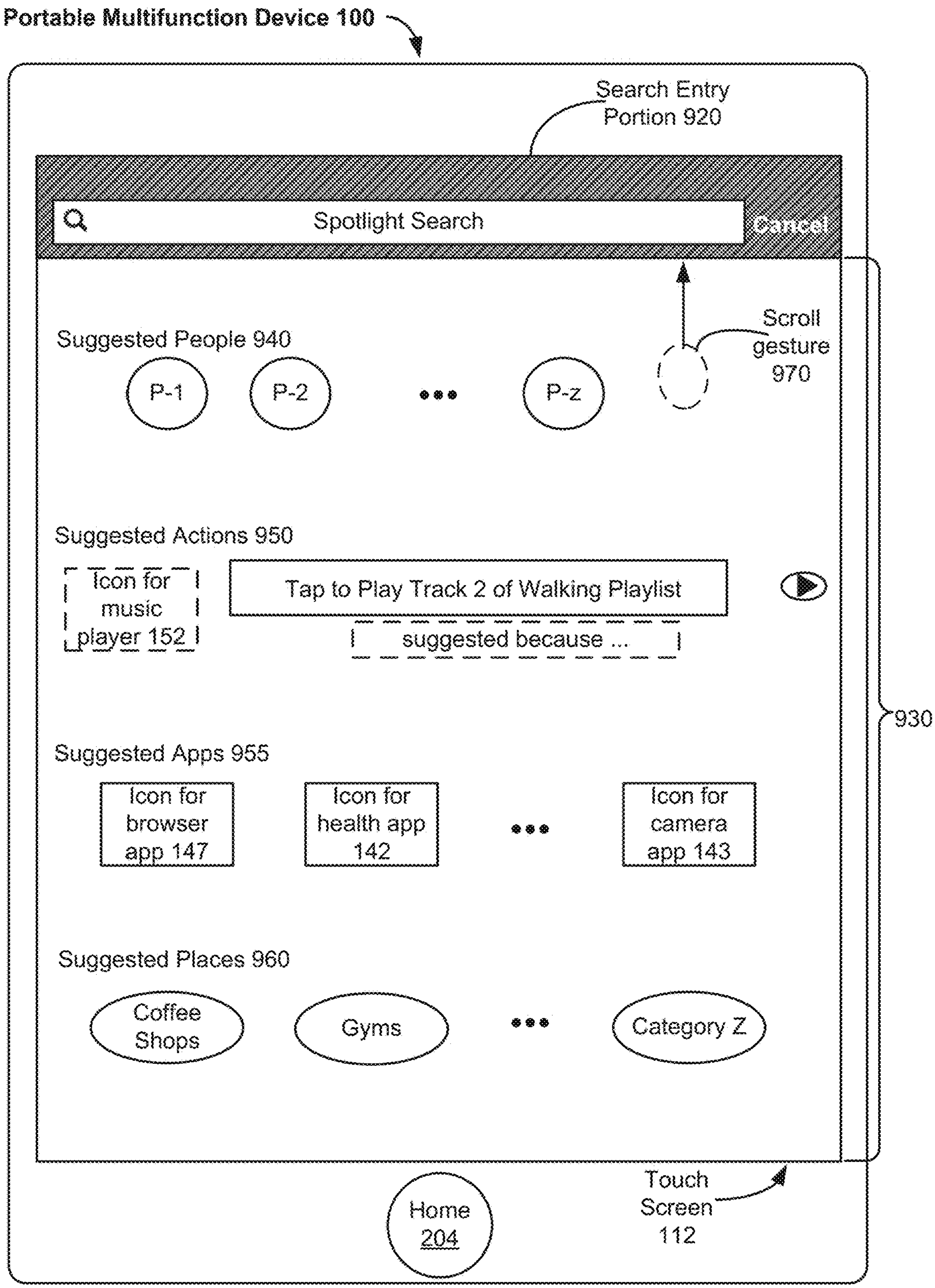
Figure 9C:
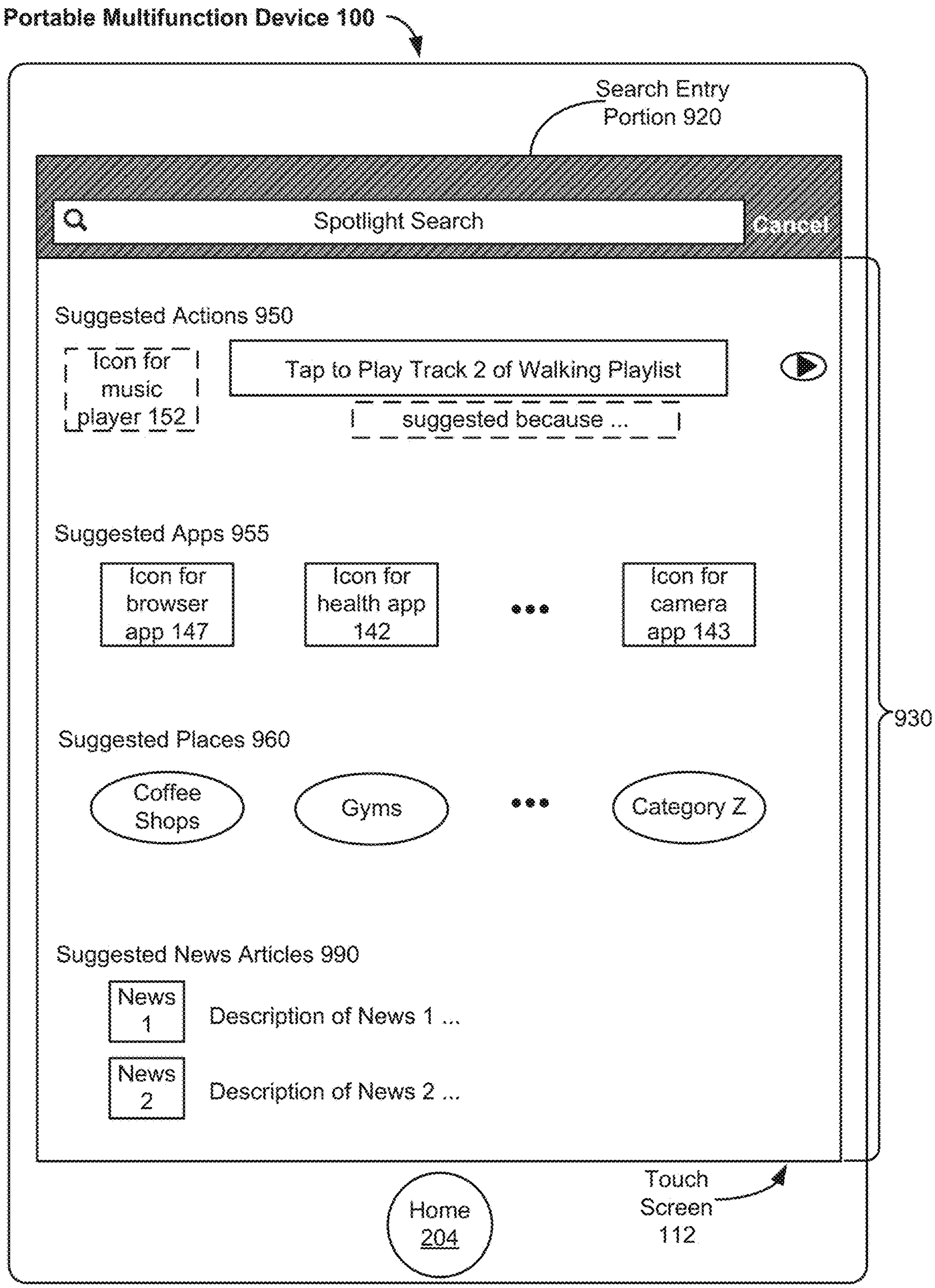

In some embodiments, the predicted action is automatically selected (e.g., by the device 100 or proactive module 163) based at least in part on an application usage history associated with the user of the electronic device (e.g., the application usage history (as provided by one or more application usage tables 335, FIGS. 3A-3B) indicates that every day around 2:15 PM the user opens the search interface (by providing the search activation gesture, as discussed above), searches for "music," selects a particular music app search result, and then plays a "walking playlist," so, based on this application usage history, the predictions portion, before receiving any user input in the search entry portion, includes an affordance to start playing the playlist within the music app (e.g., as shown by the content displayed within the suggested actions 950 section, FIG. 9B)). In some embodiments, the at least one affordance for executing the predicated action within the application is also selected (instead of or in addition to the application usage history) based at least in part on the current time (e.g., based on the user providing the search activation gesture at around the same time that the user typically performs the predicted action). In some embodiments (and as pictured in FIG. 9B), the at least one affordance for executing a predicted action corresponds to the user interface object 702 and, thus, the details provided above (FIGS. 6A-6B and 7A-7B) regarding user interface object 702 apply as well to the suggested actions section 950 and the content displayed therein.

In some embodiments, the person is further selected based at least in part on location data corresponding to the electronic device (e.g., the user frequently contacts their significant other when they reach an address in the morning associated with their work). In some embodiments, the application usage history and contact information for the person are retrieved from a memory of the electronic device (e.g., memory 102 of device 100, FIG. 1A). In some embodiments, the application usage history and contact information for the person are retrieved from a server that is remotely located from the electronic device (e.g., one or more servers 502, FIG. 5).

In some embodiments, the predictions portion is further populated (808) with at least one affordance for executing a predicted application (e.g., suggested apps 955 section, FIG. 9B). In some embodiments, the predicted application is automatically selected (by the device 100) based at least in part on the application usage history. For example, the application usage history (e.g., one or more records within one of the application usage data tables 335, FIGS. 3A-3B) indicates that the user opens the calendar module 148 (FIG. 1A) every morning at around 9:00 AM when they are at their home address and, thus, the suggested apps 955 section includes an affordance for the calendar module 148 when the current time is around 9:00 AM and the location data indicates that the user is at their home address. As an additional example, the application usage history indicates that a weather application (e.g., weather widget 149-1, FIG. 1A) is has been launched on three consecutive days at around 5:15 AM and it is now 5:17 AM (e.g., the current time is 5:17 AM when the user launches spotlight using the search activation gesture), so the electronic device populates the search interface with the weather application as one of the predicted applications in the predictions portion based at least in part on this application usage history. In some embodiments, the predicted applications and the prediction actions are displayed within a single section in which the predicted actions are displayed above the predicted applications. As noted in the preceding examples, in some embodiments, the at least one affordance for executing the predicated application is also selected (instead of or in addition to the application usage history) based at least in part on the current time (e.g., based on the user providing the search activation gesture at around the same time that the user typically uses the predicted application).

In some embodiments, in order to populate the suggested apps 955 section, the device 100 (or a component thereof such as proactive module 163) determines whether any of the prerequisite conditions for a trigger (e.g., prereqs stored in one of the trigger condition tables 402, FIGS. 4A-4B) are satisfied and, in accordance with a determination that a particular trigger is satisfied, the device 100 populates the suggested apps 955 section accordingly (e.g., adds an affordance corresponding to an application that is associated with the trigger, such as the calendar module 148 or the weather widget 149-1 in the preceding examples). In some embodiments, the other sections within the search interface (e.g., sections 940, 950, 955, 960, and 990) are populated using a similar determination process (for the sake of brevity, those details are not repeated herein).

In some embodiments, the predictions portion is further populated (808) with at least one affordance for a predicted category of nearby places (e.g., suggested places 960 section, FIG. 9B), and the predicted category of places (e.g., nearby places) is automatically selected based at least in part on one or more of: the current time and location data corresponding to the device. For example, the current time of day is around 7:30 AM and the location data indicates that the device is near (within a predetermined distance of) popular coffee shops (popularity of the coffee shops is determined, in some embodiments, by crowdsourcing usage data across numerous device 100 associated with numerous distinct users) and, thus, the device 100 populates the suggested places 960 section with an affordance for "Coffee Shops." In some embodiments, the suggested places 960 section is populated with (in addition to or instead of the predicted category of places) information corresponding to a predicted search for nearby places based on the current time. In other words, based on previous searches (e.g., searches within the search module 151 or the browser module 147) conducted by the user at around the current time, the device proactively predicts a search the user is likely to conduct again. For example, based on the user having searched for "Coffee" between 7:20 AM and 8:00 AM on four previous occasions (or some other threshold number of occasions), the device (e.g., the trigger establishing module 163-1), in response to detecting the search activation gesture, populates the suggested places 960 section with an affordance for "Coffee Shops." In other embodiments, the suggested categories are only based on the device's current location and not on time. For example, an affordance linking to nearby coffee shops is displayed. In this way, the user does not need to manually conduct the search for "Coffee" again and can instead simply select the "Coffee Shops" or "Food" affordance and quickly view a list of nearby coffee shops. In some embodiments, the previous search history is stored with one or more usage entries as other information (e.g., other information 340-1(*h*), FIG. 3B) and/or as other actions performed (e.g., other actions performed 340-1(*b*), FIG. 3B).

In some embodiments, the device detects user input to scroll the predictions portion (e.g., scroll gesture 970, FIG. 9B) and, in response to detecting the user input to scroll the predictions portion, the device scrolls the predictions portion in accordance with the user input (e.g., scrolls the search interface in a downward direction or scrolls only the predictions portion within the search interface). In response to the scrolling, the device reveals at least one affordance for a predicted news article in the predictions portion (e.g., suggested news articles 990 section, FIG. 9C). In some embodiments, the predicted news article(s) is(are) automatically selected (by the device 100) based at least in part on location data corresponding to the electronic device. In some embodiments, the suggested news articles 990 section is displayed without requiring the scroll input. In some embodiments, the predicted news article is optionally selected (in addition to or instead of the location data) based at least in part on the current time (e.g., the user has read similar or related articles more than a threshold number of times (e.g., three times) at around the current time (e.g., the time at which the user provided the search activation gesture that caused the device to display the search interface with the predictions portion 930)), a previous search history corresponding to the user (e.g., the user has searched for articles that are similar or related more than a threshold number of times (e.g., three times) to the predicted news article), trending data associated with the news story through searches conducted by other users, the user's friends, in social media, such as Twitter or Facebook, etc.

In some embodiments, the particular order in which the sections 940, 950, 955, 960, and 990 are displayed within the predictions portion 930 is configurable, such that the user is able to choose a desired ordering for each of the sections. For example, the user can configure the ordering such that the suggested apps 955 section is displayed first, the suggested people 940 section is displayed second, the suggested actions 950 section is displayed third, the suggested news articles 990 section is displayed fourth, and the suggested places 960 section is displayed last. In some embodiments, the predictions portion 930 includes any two of the sections 940, 950, 955, 960, and 990. In other embodiments, the predictions portions 930 includes any three of the sections 940, 950, 955, 960, and 990. In still other embodiments, the predictions portion 930 includes any four of the sections 940, 950, 955, 960, and 990. In yet other embodiments, the predictions portion 930 includes all of the sections, 940, 950, 955, 960, and 990. In some embodiments, the user configures a preference as to how many and which of the sections 940, 950, 955, 960, and 990 should be displayed within the predictions portion 930.

Additionally, the user, in some embodiments, is able to configure the weights given to the data (e.g., current time, application usage history, location data, other sensor data, etc.) that is used to populate each of the sections 940, 950, 955, 960, and 990. For example, the user configures a preference so that the current time is weighted more heavily than the location data when determining the affordances to display within the suggested people 940 section of the predictions portion 930.

Turning now to FIG. 8B, in some embodiments, the affordances displayed within each of the aforementioned sections 940, 950, 955, 960, and 990 are selectable, so that a user is able to select one of: a suggested action, a suggested app, a suggested place, or a suggested news article, respectively (each is discussed in order below).

As to selection of the affordances displayed within the suggested people 940 section, in some embodiments, the device detects (810) a selection of the at least one affordance for contacting the person. In some embodiments, the device detects a single touch input over the at least one affordance (e.g., a single tap over the affordance corresponding to P-1 displayed within the suggested people 940 section). In some embodiments, in response to detecting the selection of the at least one affordance for contacting the person, the device contacts the person (or suggests different communication mediums, e.g., text, email, telephone, and the like, for contacting the person) using contact information for the person (e.g., contact information retrieved from the device or from one or more servers, as discussed above). For example, in response to detecting a single tap over the affordance corresponding to P-1, the device sends a text message to the user's roommate that reads "on my way home." In some embodiments, the device automatically contacts P-1, while in other embodiments, the device displays the instant messaging module 141 and pre-populates an interface within the module 141 with a message (e.g., "on my way home") and then awaits a request from the user before sending the message (e.g., a voice command or a selection of a send button by the user). In this way, the user of the device is able to conveniently and quickly contact the person (e.g., P-1) and also send a relevant (or desired) message without having to enter any text in the search entry portion (thus saving time and frustration if the user had to enter text and was unable to locate the person).

As to selection of the affordances displayed within the suggested actions 950 section, in some embodiments, the device detects (812) a selection of the at least one affordance for executing the predicted action. For example, the device detects a single touch input (e.g., a tap over the icon for music player 152 or a tap over the text "Tap to Play Track 2 of Walking Playlist") within the suggested actions 950 section. In some embodiments, in response to detecting the selection of the at least one affordance for executing the predicted action, the device displays the application on the touch-sensitive display and executes the predicted action within the displayed application. In other words, the device ceases to display the search interface (e.g., search module 151 with the search entry and predictions portions) and instead launches and displays the application, and executes the predicted action within the displayed application. For example, in response to detecting a single tap over the text "Tap to Play Track 2 of Walking Playlist," the device displays the music player module 152 and executes the predicted action by playing track 2 of the walking playlist. In this way, the user of the device is able to conveniently and quickly access a relevant (or desired) application (e.g., the music player module) and also execute a desired function within the desired application without having to enter any text in the search entry portion (thus saving time and frustration if the user had to enter text and was unable to locate the music player module).

As to selection of the affordances displayed within the suggested apps 955 section, in some embodiments, the device detects (814) a selection of the at least one affordance for executing the predicted application. In some embodiments, the device detects a single touch input over the at least one affordance (e.g., a single tap over the affordance for the icon for browser app 147). In some embodiments, in response to detecting the selection of the at least one affordance for executing the predicted application, the device displays the predicted application on the touch-sensitive display (e.g., the device ceases to display the search interface with the search entry portion and the predictions portion and instead opens and displays the predicted application on the touch-sensitive display). For example, in response to detecting a single tap over the affordance corresponding to the icon for browser app 147, the device displays the browser app 147 (e.g., browser module 147, FIG. 1A). In this way, the user of the device is able to conveniently and quickly access a relevant (or desired) application (e.g., the browser application) without having to enter any text in the search entry portion (thus saving time and frustration if the user had to enter text and was unable to locate the browser application).

As to selection of the affordances displayed within the suggested places 960 section, in some embodiments, the device detects (816) a selection of the at least one affordance for the predicted category of places (e.g., nearby places). In some embodiments, the device detects a single touch input over the at least one affordance (e.g., a single tap over the affordance for the "Coffee Shops"). In some embodiments, in response to detecting the selection of the at least one affordance for executing the predicted category of places, the device: (i) receives data corresponding to at least one nearby place (e.g., address information or GPS coordinates for the at least one nearby place, as determined by map module 154) and (ii) displays, on the touch-sensitive display, the received data corresponding to the at least one nearby place (e.g., ceases to display the search interface, launches the maps module 154, displays the maps module 154 including a user interface element within a displayed map that corresponds to the received data, such as a dot representing the GPS coordinates for the at least one nearby place). In some embodiments, the receiving and displaying step are performed substantially in parallel. For example, in response to detecting a single tap over the affordance corresponding to "Coffee Shops," the device retrieves GPS coordinates for a nearby café that serves coffee and, in parallel, displays the maps module 154 and, after receiving the GPS coordinates, displays the dot representing the GPS coordinates for the café. In this way, the user of the device is able to conveniently and quickly locate a relevant (or desired) point of interest (e.g., the café discussed above) without having to enter any text in the search entry portion (thus saving time and frustration if the user had to enter text and was unable to locate the café or any coffee shop). In some embodiments, the receiving data operation discussed above is performed (or at least partially performed) before receiving the selection of the at least one affordance for the predicted category of places. In this way, data corresponding to the nearby places is pre-loaded and is quickly displayed on the map after receiving the selection of the at least one affordance for the predicted category of places.

As to selection of the affordances displayed within the suggested news articles 990 section, in some embodiments, the device detects (818) a selection of the at least one affordance for the predicted news article. In some embodiments, the device detects a single touch input over the at least one affordance (e.g., a single tap over the affordance for News 1, FIG. 9C). In some embodiments, in response to detecting the selection of the at least one affordance for the predicted news article, the device displays the predicted news article on the touch-sensitive display (e.g., the device ceases to display the search interface with the search entry portion and the predictions portion and instead opens and displays the predicted news article within the browser module 147). For example, in response to detecting a single tap over the affordance corresponding to News 1, the device displays the news article corresponding to News 1 within the browser app 147 (e.g., browser module 147, FIG. 1A). In this way, the user of the device is able to conveniently and quickly access a relevant (or desired) news article (e.g., the browser application) without having to enter any text in the search entry portion (thus saving time and frustration if the user had to enter text and was unable to locate the predicted news article).

In some embodiments, the predicted/suggested content items that are included in the search interface (e.g., in conjunction with methods 600 and 800, or any of the other methods discussed herein) are selected based on techniques that are discussed below in reference to Sections 1-11.

It should be understood that the particular order in which the operations in FIGS. 8A-8B have been described is merely one example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 600) are also applicable in an analogous manner to method 800 described above with respect to FIGS. 8A-8B. For example, the user interface objects described above with reference to method 800 optionally have one or more of the characteristics of the user interface objects described herein with reference to other methods described herein (e.g., method 600). In some embodiments, any relevant details from Sections 1-11 may be utilized for any suitable purpose in conjunction with method 800. For brevity, these details are not repeated here.

FIGS. 10A-10C illustrate a flowchart representation of a method 1000 of proactively suggesting search queries based on content currently being displayed on an electronic device with a touch-sensitive display, in accordance with some embodiments. FIGS. 11A-11J are used to illustrate the methods and/or processes of FIGS. 10A-10C. Although some of the examples which follow will be given with reference to inputs on a touch-sensitive display (in which a touch-sensitive surface and a display are combined), in some embodiments, the device detects inputs on a touch-sensitive surface 195 that is separate from the display 194, as shown in FIG. 1D.

In some embodiments, the method 1000 is performed by an electronic device (e.g., portable multifunction device 100, FIG. 1A, configured in accordance with any one of Computing Device A-D, FIG. 1E) and/or one or more components of the electronic device (e.g., I/O subsystem 106, operating system 126, etc.). In some embodiments, the method 1000 is governed by instructions that are stored in a non-transitory computer-readable storage medium and that are executed by one or more processors of a device, such as the one or more processors 122 of device 100 (FIG. 1A). For ease of explanation, the following describes method 1000 as performed by the device 100. In some embodiments, with reference to FIG. 1A, the operations of method 1000 are performed by or use, at least in part, a proactive module (e.g., proactive module 163) and the components thereof, a contact/motion module (e.g., contact/motion module 130), a graphics module (e.g., graphics module 132), and a touch-sensitive display (e.g., touch-sensitive display system 112). Some operations in method 1000 are, optionally, combined and/or the order of some operations is, optionally, changed.

As described below, the method 1000 provides an intuitive way to proactively suggest relevant content (e.g., suggested search queries) on an electronic device with a touch-sensitive display. The method requires less touch inputs in order to perform a search on the electronic device (e.g., the user need only select a suggested search query and does not need to type any text), thereby creating a more efficient human-machine interface and allow users to quickly execute relevant searches. By providing suggested search queries, method 1000 also helps to ensure that users know that a proactive assistant is available on the device to assist with performing actions more quickly (thus, improving user satisfaction with their devices). For battery-operated electronic devices, the method 1000 both conserves power and increases the time between battery charges.

Figure 11A:
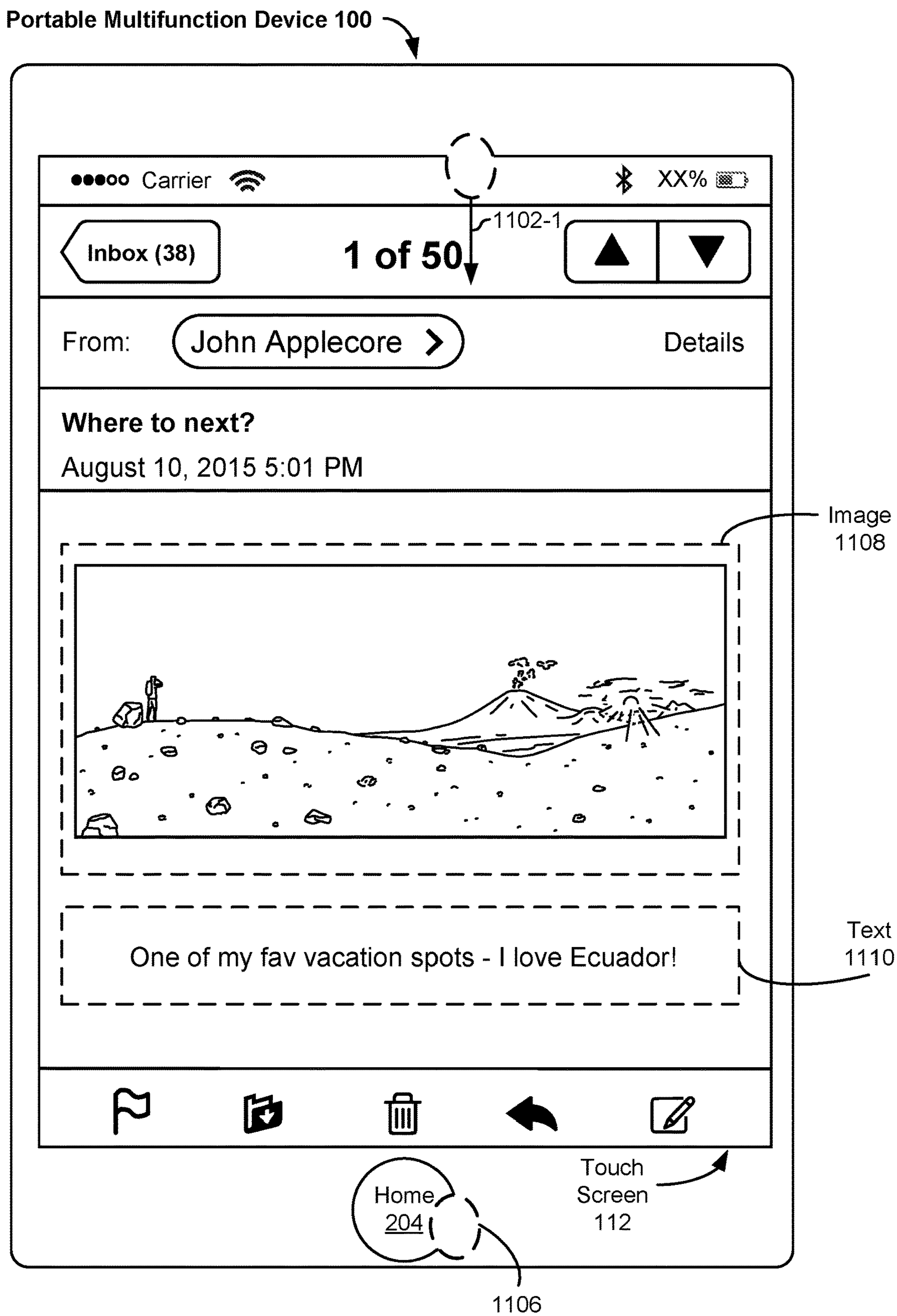
FIGS. 11A-11J are schematics of a touch-sensitive display used to illustrate user interfaces for proactively suggesting search queries based on content currently being displayed on the touch-sensitive display, in accordance with some embodiments.

As shown in FIG. 10A, the device displays (1002), on the display, content associated with an application that is executing on the electronic device. For example, as shown in FIG. 11A, content associated with an email application that is executing on the electronic device 100 is displayed on the touch screen 112. The content at least includes the sender name and/or address of an email (e.g., "From: John Applecore"), the subject text (e.g., "Where to next?"), and a body of the email. In some embodiments, the body of the email may include image 1108 and/or may text 1110.

While displaying the application, the device detects (1004), via the touch-sensitive surface, a swipe gesture that, when detected, causes the electronic device to enter a search mode that is distinct from the application. In some embodiments, detecting the swipe gesture includes (1006) detecting the swipe gesture over at least a portion of the content that is currently displayed. In some embodiments, the swipe gesture is used to invoke a search interface over the application (e.g., such as that shown in FIG. 11B). In some embodiments, the swipe gesture is a first swipe gesture that is received over the application and is not received within any user interface field that is included in the content associated with the application (e.g., the first swipe gesture is not a tap within a search box that might be displayed in the application). In some embodiments, the first swipe gesture causes the electronic device to enter the search mode of the electronic device that is distinct from the application, the search mode including display of a search interface (e.g., such as the search interface shown in FIGS. 11B and 11D, and 11F-11J and discussed in greater detail below).

Figure 11B:
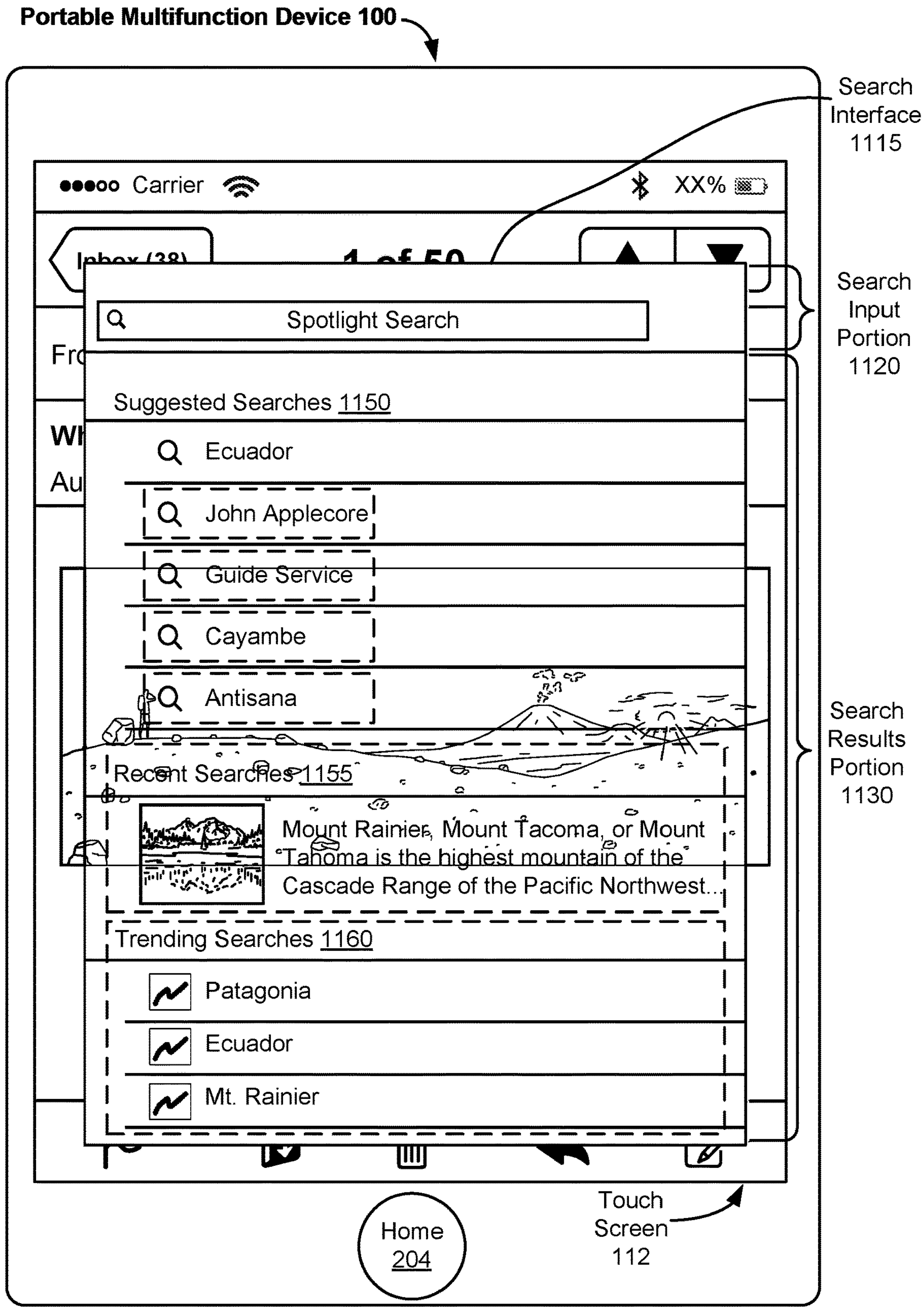
Figure 11C:
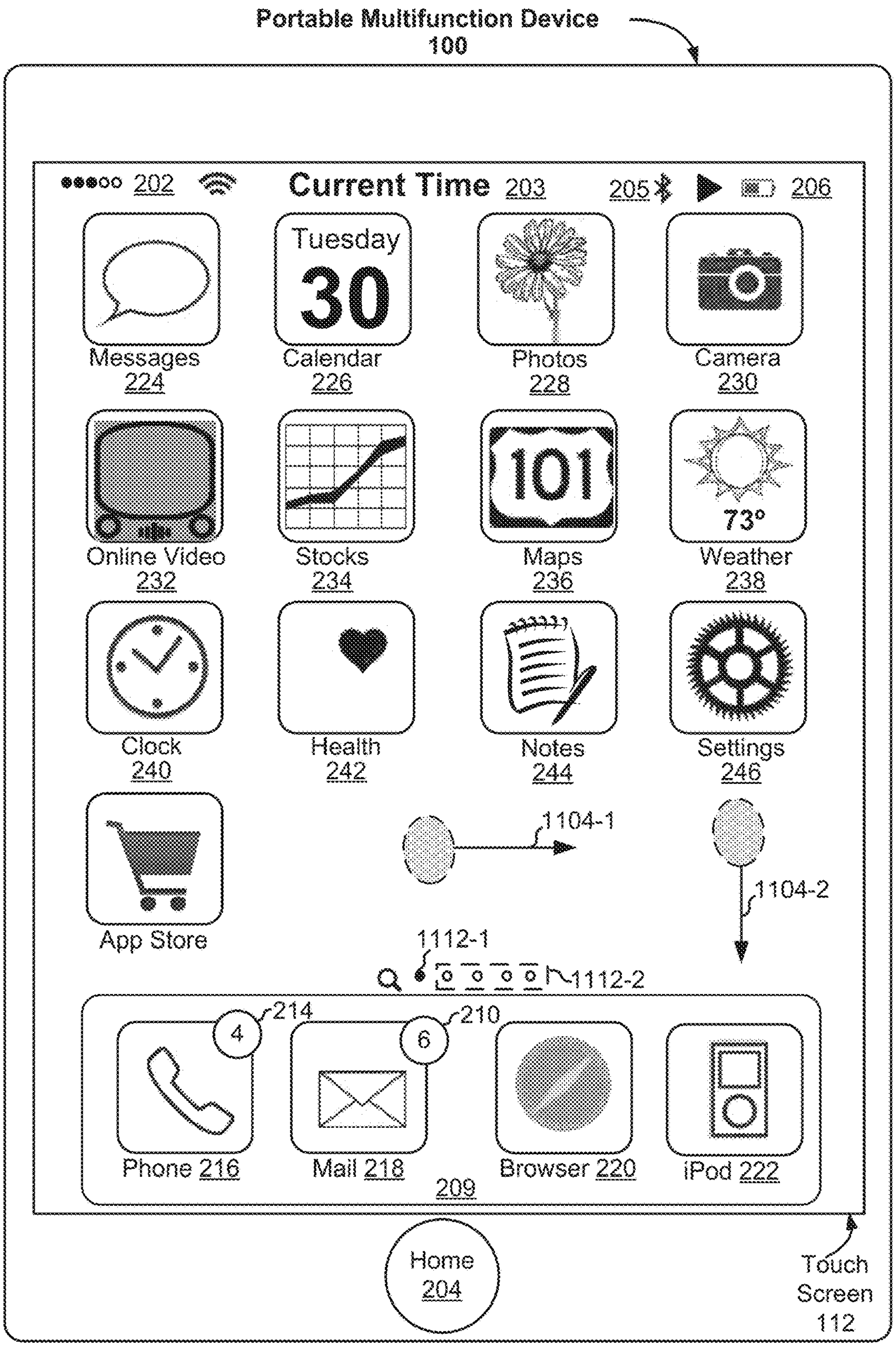
Figure 11D:
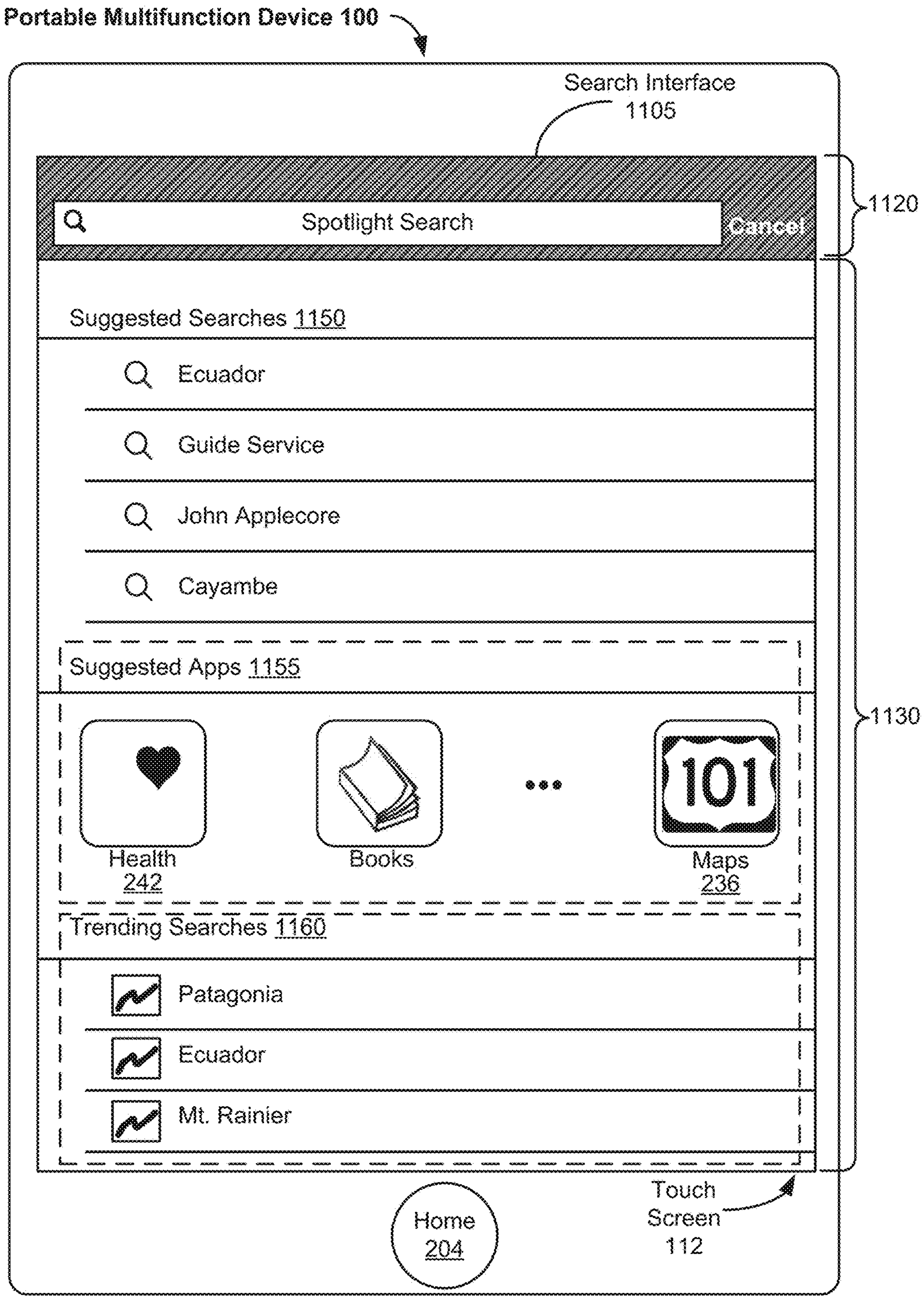
Figure 11E:
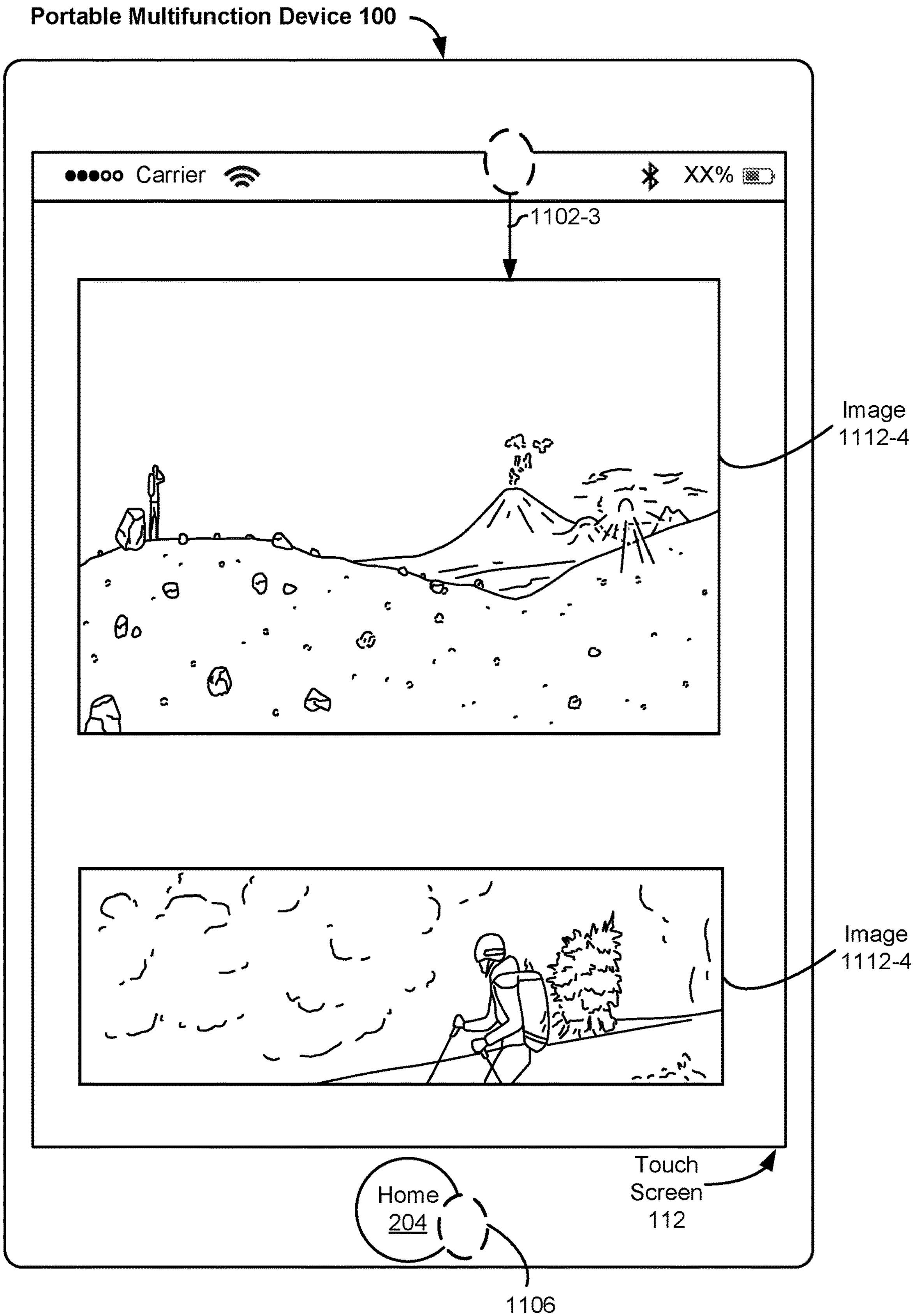

In some embodiments, the first swipe gesture is available at any time by swiping in a downward direction (and travelling at least a threshold distance (e.g., 2, 3, 4 cm.)) over the touch-sensitive display (e.g., the downward swipe 1102-1 and 1102-3 as shown in FIGS. 11A and 11E, respectively). In some embodiments, the swipe gesture is detected (e.g., the first swipe gesture discussed above) while the application is currently displayed on the touch-sensitive display and the swipe gesture is detected on top of the content that is currently displayed for the application. For example, in FIGS. 11A and 11E, the downward swipe gestures 1102-1 and 1102-3 are detected on top of the email content while the email application is currently displayed.

In some embodiments, a second swipe gesture, that also causes the device to enter the search mode, is also available at a later time (e.g., after exiting the application). In some embodiments, before detecting the swipe gesture, the device detects (1008) an input that corresponds to a request to view a home screen of the electronic device, and in response to detecting the input, the device ceases to display the content associated with the application and displays a respective page of the home screen of the electronic device. In some embodiments, the respective page is an initial page in a sequence of home screen pages (e.g., a first page in a sequence of home screen pages), and the swipe gesture is detected (e.g., the second swipe gesture) while the initial page of the home screen is displayed on the display.

For example, as shown in FIGS. 11A and 11E, the user exits the application and switches to viewing a home screen as shown in FIG. 11A by tapping 1106 physical home button 204 of the device while the application is displayed. In FIG. 11C, a first page of the home screen is displayed as indicated by the highlighted first dot 1112-1 of home screen page indicator and not highlighting the remaining dots 1112-2 of the home screen. While viewing the first page of the home screen, the user is able to provide the second swipe gesture by swiping in a substantially horizontal direction (e.g., a left-to-right direction shown for swipe gesture 1104-1 in FIG. 11E). In response to receiving the second swipe gesture, the electronic device enters the search mode, including displaying a search interface on the touch-sensitive display (as discussed in greater detail below with reference to FIG. 11D).

In response to detecting the swipe gesture, the device enters (1010) the search mode, the search mode including a search interface that is displayed on the display. Example search interfaces are shown in FIGS. 11B and 11D. In some embodiments, the search interface is displayed (1012) as translucently overlaying the application, e.g., search interface 1115 in FIG. 11B. In some embodiments, the search interface is displayed as a translucent overlay over the application (e.g., as shown for search interface 1115 in FIG. 11B). In some embodiments, the search interface 1115 is gradually displayed such that an animation of the search interface 1115 is played, e.g., fading in and/or transitioning in from one side. In FIG. 11B, the search interface 1115 is displayed as translucently overlying the email application such that the email application remains partially visible beneath the search interface 1115 on the touch-sensitive display 112. In some embodiments, the search interface is displayed as translucently overlaying the home screen as shown in FIGS. 11G-11J in response to the second swipe gesture discussed above.

In some embodiments, the search interface further includes (1014) one or more trending queries, e.g., one or more trending terms that have been performed by members of a social network that is associated with the user. In some embodiments, the one or more trending queries include one or more trending terms that are based on (i) popular news items, (ii) a current location of the electronic device (e.g., if the user is visiting a location other than their home (such as Tokyo)), and/or (iii) items that are known to be of interest to tourists, etc.). For example, trending searches 1160 is shown as optional in FIGS. 11B and 11D, and the one or more trending terms include, e.g., "Patagonia," "Ecuador," "Mt. Rainier" etc. In some embodiments, the search interface also includes trending GIFs (e.g., based on emotive phrases, such as "Congrats!," in the content that lead people to want to share a GIF). In some embodiments, the search interface further includes (1016) one or more applications that are predicted to be of interest to a user of the electronic device (e.g., as shown in FIG. 11D, the search interface includes suggested apps 1155).

In conjunction with entering the search mode, the device determines (1018) at least one suggested search query based at least in part on information associated with the content. In some embodiments, this determination is conducted as the animation of the search interface 1115 is played, e.g., as the search interface 1115 is gradually revealed. In other embodiments, this determination is conducted before the swipe gesture is even received.

In some embodiments, in accordance with a determination that the content includes textual content, the device determines (1022) the at least one suggested search query based at least in part on the textual content. In some embodiments, determining the at least one suggested search query based at least in part on the textual content includes (1024) analyzing the textual content to detect one or more predefined keywords that are used to determine the at least one suggested search query. In some embodiments, the one or more predefined keywords are stored in one or more data structures that are stored on the electronic device, including a first data structure with at least 150,000 entries for predefined keywords. In this way, the device includes a number of common terms that can be quickly detected in content and then provided to the user as suggested search queries, and this is all done without requiring any input from the user at the search interface. In some embodiments, a second data structure of the one or more data structures is associated with a context kit that leverages the second data structure to identify a context for the content and then identify the at least one suggested search query based at least in part on the identified context for the content. In some embodiments, the second data structure is an on-device index (such as a Wikipedia index that is specific to the electronic device). In some embodiments, suggested search queries are determined using both the first and second data structures and then the suggested search queries are aggregated and presented to the user (e.g., within the search interface and before receiving any user input). In some embodiments, leveraging both the first and second data structures also allows the electronic device to help distinguish between businesses with the same name, but with different addresses/phones.

For example, in FIG. 11A, the content associated with the email application includes textual content, such as the sender and/or recipient information, the subject line, and the text in email body, "I love Ecuador!" etc. Based at least in part on the textual content, the device determines at least one suggested search query and displays the search results as shown in FIG. 11B, e.g., Ecuador, John Applecore, Guide Service, Cayambe, Antisana etc. The term "Ecuador" may be a predefined keyword stored on the electronic device as part of entries in the first data structure, while other entries may be identified based on a context for the content and using the second data structure while leveraging the first data structure.

In some embodiments, determining the at least one suggested search query includes (1026) determining a plurality of suggested search queries, and populating the search interface includes populating the search interface with the plurality of suggested search queries. As shown in FIG. 11B, one suggested search query "Ecuador" is displayed in the suggested searches 1150. Optionally, as indicated by the dotted line in FIG. 11B, in the suggested searches 1150 section, a plurality of suggested search queries, e.g., "John Applecore," "Guide Service," "Cayambe," and "Antisana" etc. in addition to "Ecuador" are displayed.

In some embodiments, in conjunction with entering the search mode, the device obtains (1036) the information that is associated with the content (before and/or after displaying the search interface) by using one or more accessibility features that are available on the electronic device. In some embodiments, an operating system of the electronic device does not have direct access to (or knowledge) of the content that is currently displayed in some applications on the electronic device (e.g., third-party applications developed by companies other than a provider of the operating system). As such, the operating system obtains information about the content by using APIs (e.g., accessibility APIs) and other features that are available on the electronic device and allow the operating system to learn about the content that is displayed within the third-party applications.

In some embodiments, using the one or more accessibility features includes (1038) using the one or more accessibility features to generate the information that is associated with the content by: (i) applying a natural language processing algorithm to textual content that is currently displayed within the application; and (ii) using data obtained from the natural language processing algorithm to determine one or more keywords that describe the content, and wherein the at least one suggested search query is determined based on the one or more keywords. (e.g., a natural language processing algorithm that is used to provide functions such as VoiceOver, Dictation, and Speak Screen that are available as the one or more accessibility features on the electronic device). In some embodiments, the information that is associated with the content includes information that is extracted from the content that is currently displayed in the application, including names, addresses, telephone numbers, instant messaging handles, and email addresses (e.g., extracted using the natural language processing algorithm discussed above).

In some embodiments, determining the one or more keywords that describe the content also includes (1040): (i) retrieving metadata that corresponds to non-textual content that is currently displayed in the application; and (ii) using the retrieved metadata, in addition to the data obtained from the natural language processing algorithm, to determine the one or more keywords. An example of non-textual content is an image that is displayed within the application (e.g., image 1108 in FIG. 11A and one or more images 1112-4 in FIG. 11E). In some embodiments, one or more informational tags (such as HTML tags, CSS descriptors, and other similar metadata) are associated with the image and can be used to help the one or more accessibility features learn about the image (e.g., one of the informational tags could describe a type of the image and/or provide details about what is displayed in the image).

In some embodiments (in particular when only non-textual content is displayed in the application), the natural language processing algorithm is not utilized and instead only the retrieved metadata is used to determine the one or more keywords. In some embodiments, inputs from the user that were previously provided in the application are also used to help determine the one or more keywords. For example, the user searches for a particular restaurant name in order to locate an address and/or telephone number and the name of that restaurant may also be used (e.g., even if the restaurant name is not currently displayed in the application and was only used as an earlier input or search query) to help determine the one or more keywords that describe the content.

Turning to FIG. 10C, before receiving any user input at the search interface, the device populates (1020) the displayed search interface with the at least one suggested search query. In some embodiments, the search interface includes a search input portion (e.g., search entry portion 1120 at a top portion of the search interface 1115, FIGS. 11B, 11D, and 11F-11J) and a search results portion (e.g., search results portion 1130 directly below the search input portion 1120, FIGS. 11B, 11D, and 11F-11J) and the at least one suggested search query is displayed within the search results portion. For example, in FIG. 11B, suggested searches 1150 include at least one suggested search query, e.g., “Ecuador,” “John Applecore,” “Guide Service,” “Cayambe,” “Antisana,” and the at least one suggested query is displayed within the search results portion 1130.

In some embodiments, the first swipe gesture discussed above is available while any page of the home screen is displayed as well. For example, in addition to being able to use the first swipe gesture 1102-1 to enter the search mode over the application as shown in FIGS. 11A and 11B, the user may also use the first swipe gesture to enter the search mode over any page of the home screen. In FIG. 11C, in response to swipe 1104-2 in a substantially vertical direction (e.g., downward), the device enters the search mode and displays the search interface 1105 as shown in FIG. 11D. In this way, any time the user chooses to enter the search mode, the user is presented with relevant search queries that are related to content that was recently viewed in the application. Although FIG. 11C illustrates detecting the swipe gesture 1104-2 over the first page of the home screen, as indicated by highlighting the first dot 1112-1 of home screen page indicator and not highlighting the remaining dots 1112-2 of the home screen page indicator, the swipe gesture 1104-2 can be detected over any page of the home screen, e.g., over a page over than the initial page of the home screen where one of the remaining dots 1112-2 is highlighted and the first dot 1112-1 is not highlighted.

In some embodiments, the device detects (1028), via the touch-sensitive surface, a new swipe gesture over new content that is currently displayed. In response to detecting the new swipe gesture, the device enters the search mode. In some embodiments, entering the search mode includes displaying the search interface on the display. In conjunction with entering the search mode and in accordance with a determination that the new content does not include textual content, in some embodiments, the device populates the search interface with suggested search queries that are based on a selected set of historical search queries from a user of the electronic device.

Figure 11F:
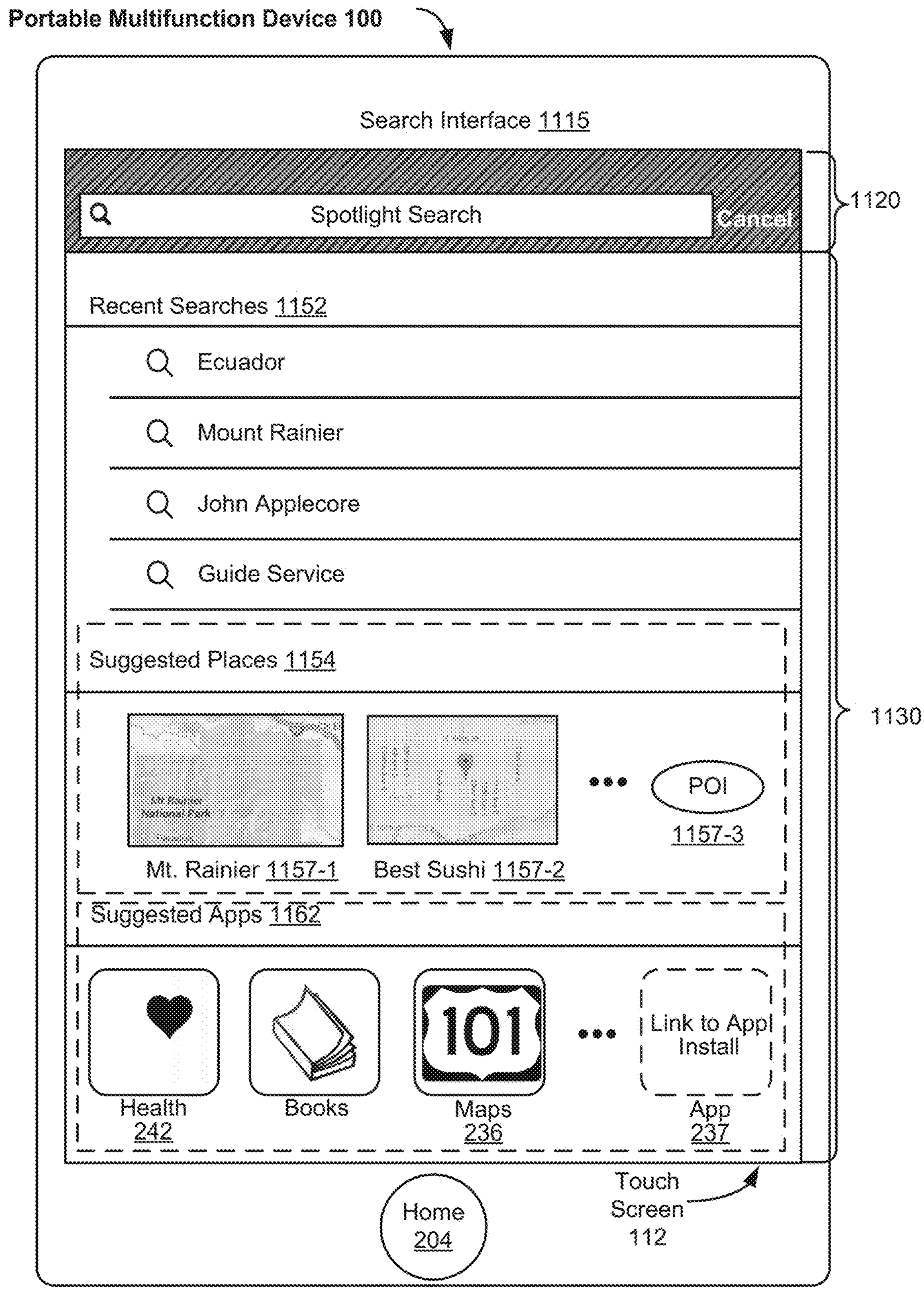

For example, after viewing the email content as shown in FIG. 11A and exiting the search interface, the user viewed a picture (example images 1112-4 are shown in FIG. 11E). Both images do not include textual content. Subsequently, as shown in FIG. 11E, a new swipe gesture 1102-3 is detected. In response to detecting the new swipe gesture 1102-3, the device enters the search mode and displays the search interface 1115 on the display as shown in FIG. 11F. In FIG. 11F, “Mount Rainier” is shown as a historical search query and displayed in recent searches 1152 section.

In some embodiments, the search interface is displayed (1030) with a point of interest based on location information provided by a second application that is distinct from the application. For example, continuing the above example, location information of Mt. Rainier is obtained by a second application, such as an imaging application, based on tags and/or metadata associated with the image. In response to the new swipe gesture 1102-3 (FIG. 11E), the search interface 1115 is displayed with a point of interest, Mt. Rainier 1157-1 in suggested places section 1154, as shown in FIG. 11F.

In some embodiments, the point of interest is displayed not just in response to a new swipe gesture over non-textual content. The point of interest can be displayed in response to a new swipe gesture over textual content. For example, in a scenario where the user was searching for restaurants in a first application (such as a YELP application), the user then switched to using a text messaging application (e.g., the application), the user then provided the swipe gesture over the text messaging application and, in response, the device pre-populates the search interface to include the point of interest (e.g., Best Sushi 1157-2 and other points of interest 1157-3, FIG. 11F) as a suggested search query based on the user’s earlier interactions with the first application.

In some embodiments, the search interface further includes (1032) one or more suggested applications. The suggested applications are applications that are predicted to be of interest to the user of the electronic device based on an application usage history associated with the user (application usage history is discussed above in reference to FIGS. 3A and 3B). In some embodiments, the set of historical search queries is selected based at least in part on frequency of recent search queries (e.g., based on when and how frequently each historical search query has been conducted by the user). For example, as shown in FIG. 11D, based on the application usage history, applications, Health 242, Books, Maps 236 applications are suggested to the user in the suggested apps 1162 section. These application suggestions may be selected based at least in part on frequency of recent search queries. In some embodiments, an application that has not been installed on the electronic device is predicted to be of interest to the user. The name of the application 237 that has not been installed is displayed along with other suggested applications and a link to the application installation is provided.

In some embodiments, one or more suggested applications are displayed not just in response to a new swipe over non-textual content. For example, as shown in FIG. 11D, in response to detecting the swipe gesture 1104-2 over the home screen (e.g., over any page of the home screen), suggested apps 1155 are optionally displayed in the search results portion 1130 of the search interface 1115.

Figure 9D:
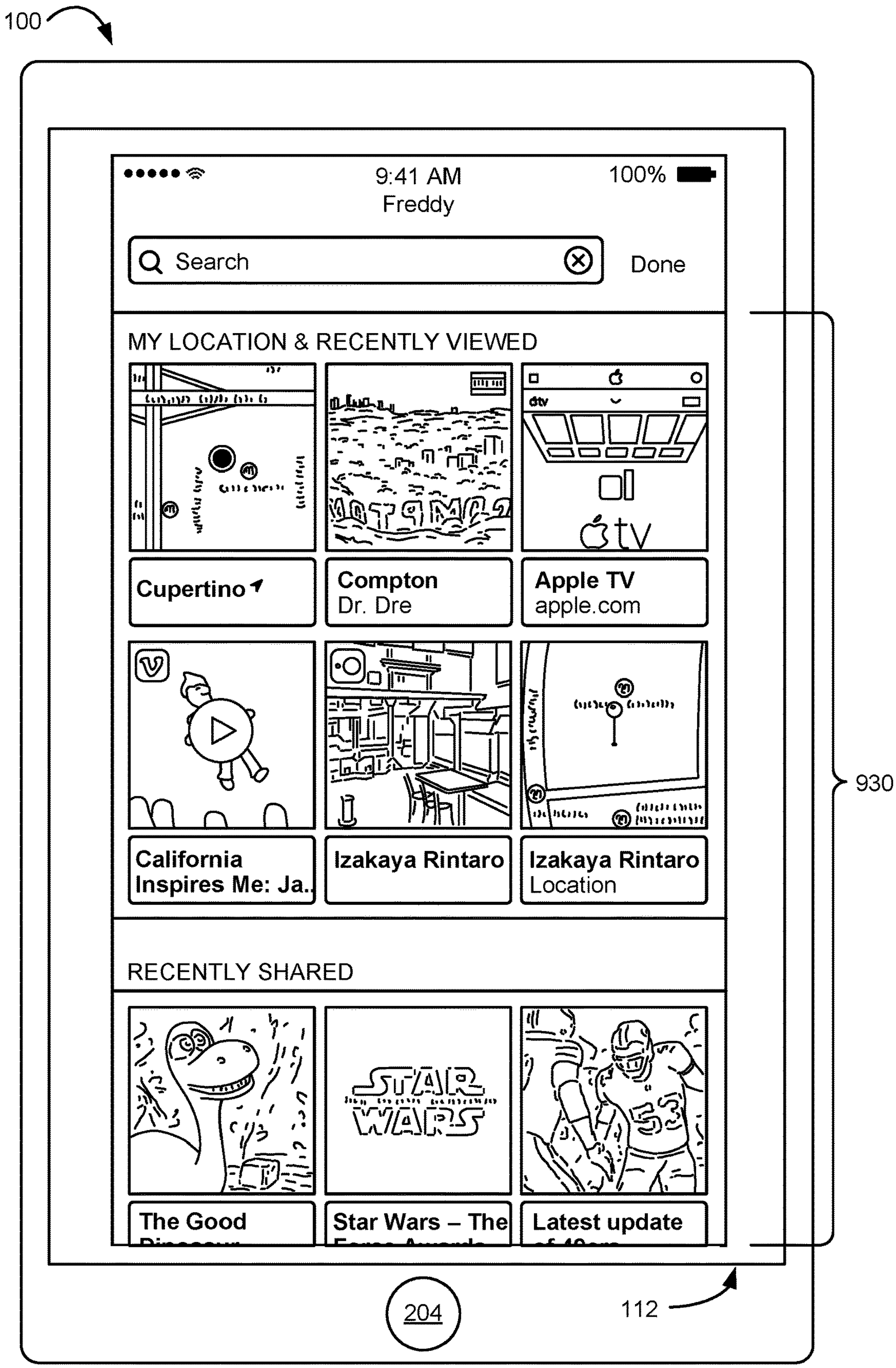

Although FIGS. 11B, 11D, and 11F illustrate grouping the suggested search results into categories and displaying the suggested searches in different sections of the search interface 1115, other display formats are shown to the user. For example, the suggested search results can be blended. As shown in FIG. 9D, point of interests, suggested places, recent searches, and suggested applications are displayed together in "My Location & Recently Viewed." In some embodiments, blending the suggested searches is performed in accordance with a set of predefined rules. For example, up to a number of search results spots (e.g., 8) can from each of the sources that contribute to the suggested searches. A predetermined order of precedence is used to determine the order of the suggested searches (e.g., connections, historical, then uninstalled hero assets). In another example, a predetermined set of rules includes: (i) for each type of suggested search results, it has a position and a maximum number of results it can contribute; (ii) for certain types of suggested search results, (e.g., applications that have not been installed), a maximum number of results can contribute to the blended results (e.g., each contribute 1); (iii) or for historical results, it is up to the user. For example, in some embodiments, the set of historical search queries is selected (1034) based at least in part on frequency of recent search queries. (e.g., based on when and how frequently each historical search query has been conducted by the user).

Figure 11G:
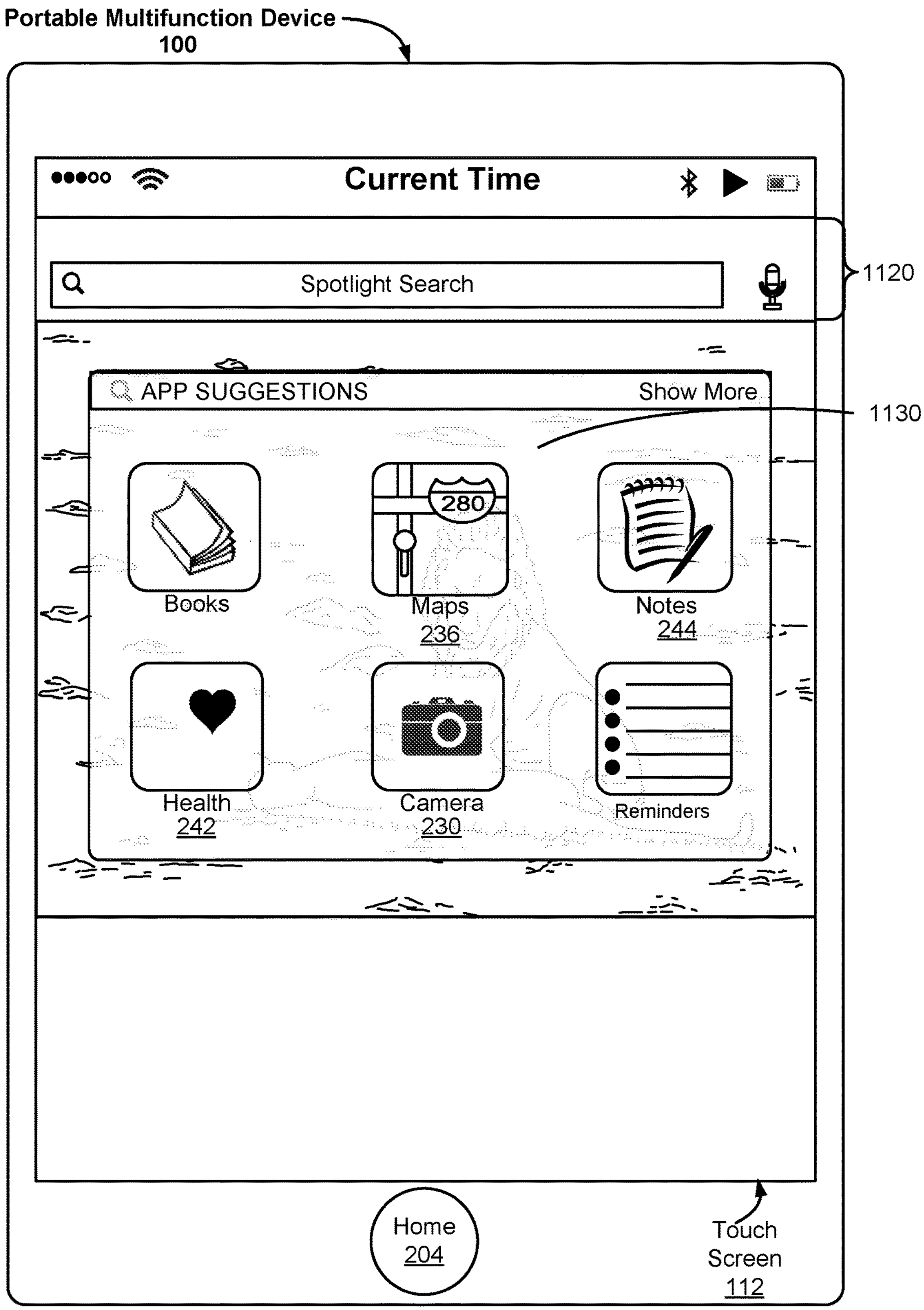
Figure 11H:
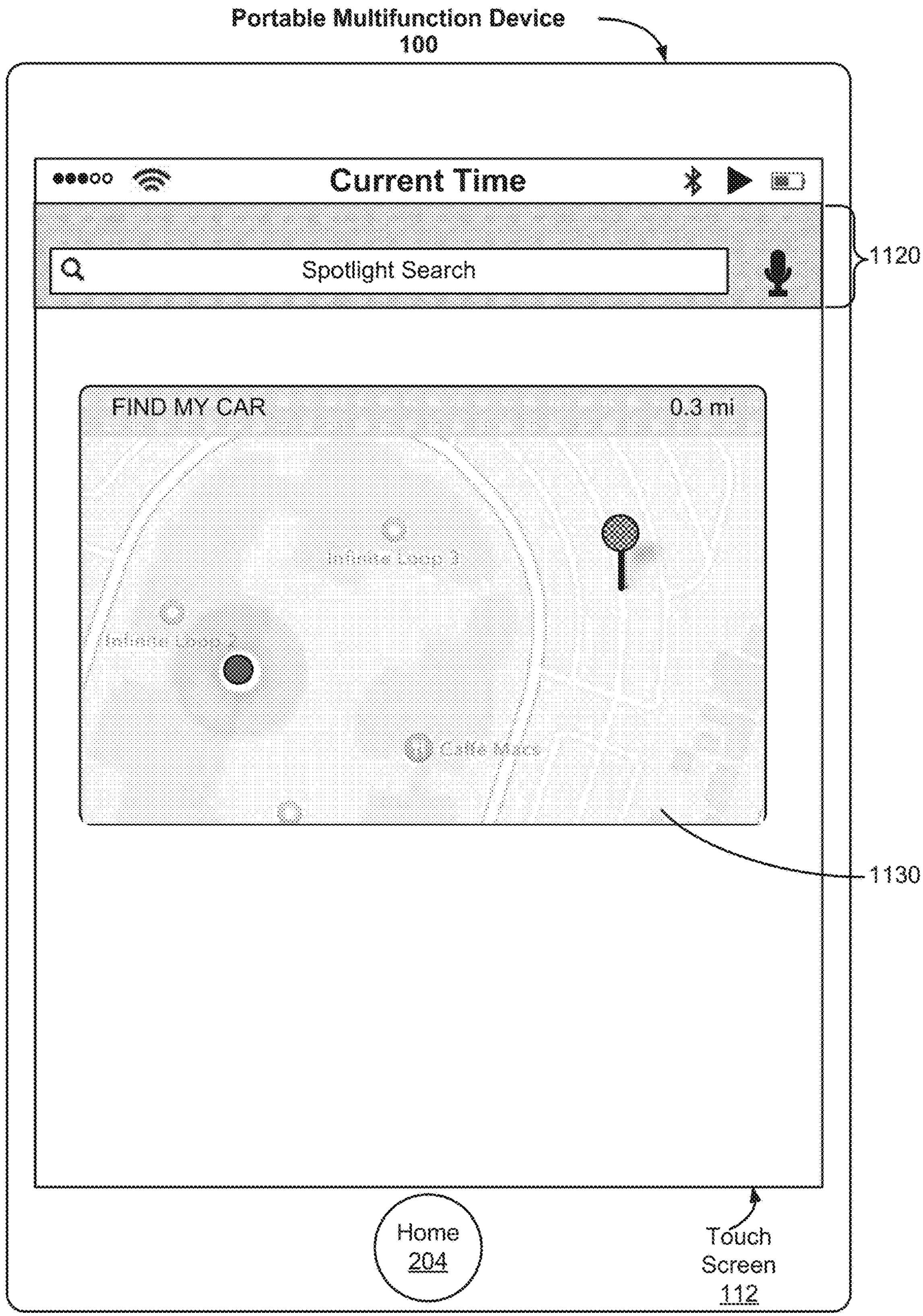

In some embodiments, only one or more suggested applications that are predicted to be the most of interest to the user are displayed in response to a search activation gesture. For example, in response to receiving a search activation gesture (e.g., swipe 1104 in FIG. 11C), the device enters the search mode and displays a translucent search interface on the touch-sensitive display as shown in FIGS. 11G-11J. The search interface includes the search input portion 1120 and the search results portion 1130. For example, as shown in FIG. 11G, suggesting applications are predicted to be of the most of interest to the user. Multiple applications are displayed in the search results portion 1130.

Figure 11I:
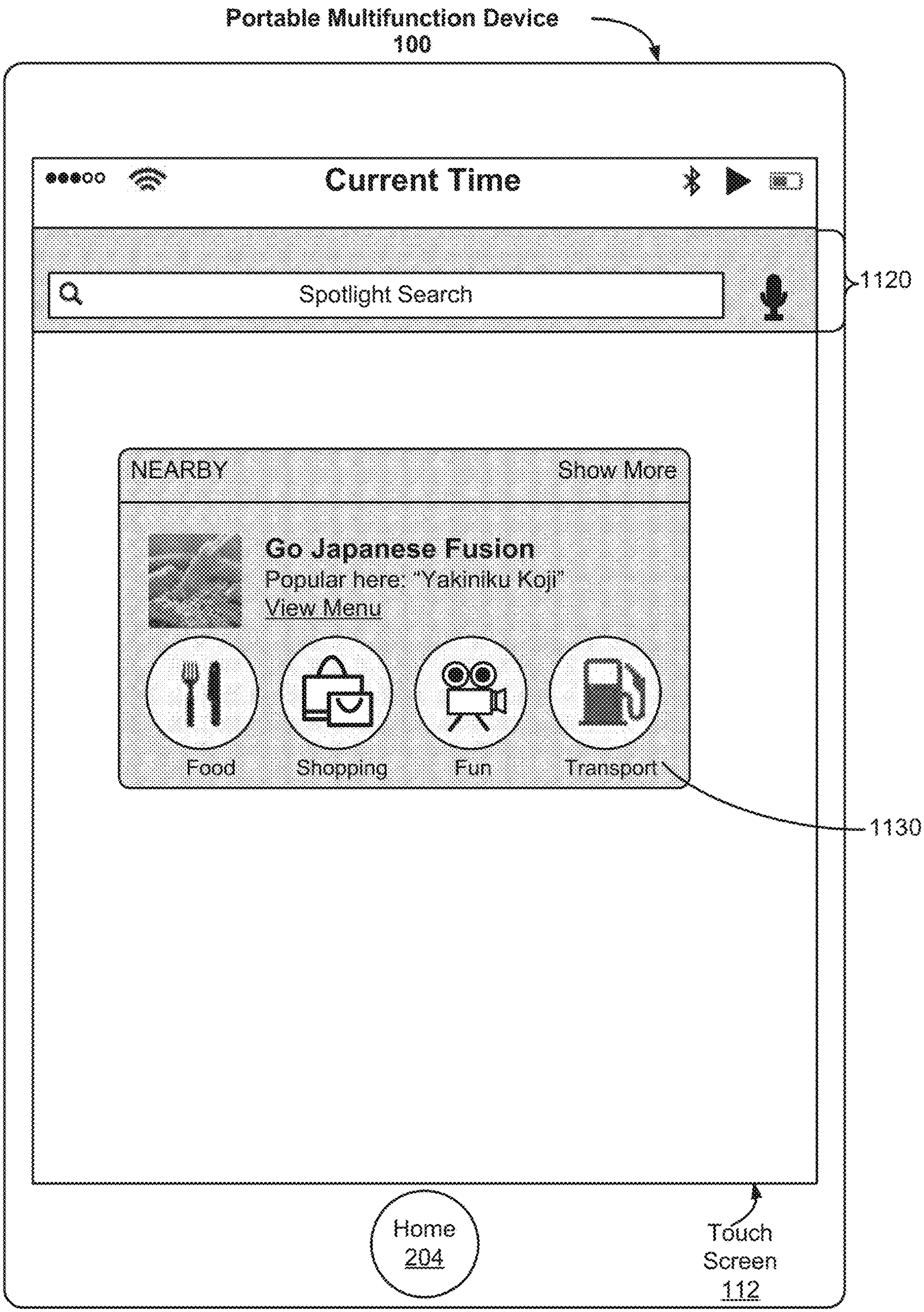
Figure 11J:
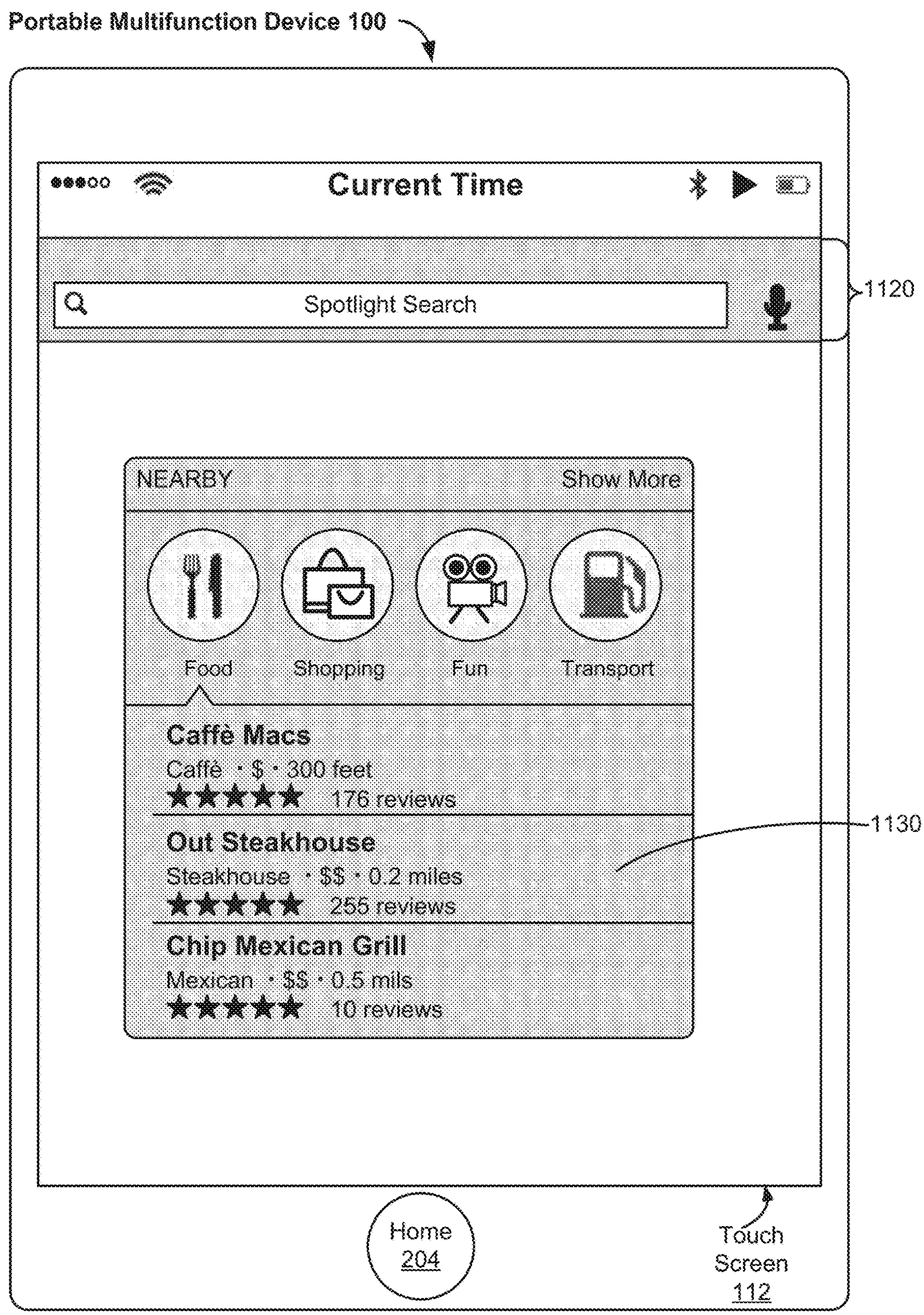

In some embodiments, the suggested application uses the location information to suggest content that is predicted to be of most of interest to the user. For example, in FIG. 11H, "Find My Car" application is predicted to be the most of interest to the user. In the search results portion 1130, the user interface for "Find My Car" application is displayed. The application uses location information of the user to display a pin on the map and shows the relative position of the user to the car indicated by the dot. In another example, based on a user's location and/or other information described above (e.g., usage data, textual content, and/or non-textual content etc.), an application displaying nearby points of interest is predicted to be the most of interest to the user. In FIG. 11I, the search results portion 1130 includes a point of interest, e.g., a restaurant within "Food" category named "Go Japanese Fusion". The "Food" category is highlighted as indicated in double circle and the nearby restaurant "Go Japanese Fusion" is located based on the user's location information and the location of the restaurant. In another example, as shown in FIG. 11J, multiple points of interests within the "Food" category are predicted to be the most of interest to the user, and these points of interests, e.g., Caffe Macs, Out Steakhouse, and Chip Mexican Grill, within the food category are displayed and the "Food" category is highlighted.

It should be understood that the particular order in which the operations in FIGS. 10A-10C have been described is merely one example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600 and 800) are also applicable in an analogous manner to method 1000 described above with respect to FIGS. 10A-10C. For example, the user interface objects (e.g., those displayed within the search interface) described above with reference to method 1000 optionally have one or more of the characteristics of the user interface objects described herein with reference to other methods described herein (e.g., methods 600 and 800). In some embodiments, aspects of method 1000 are optionally interchanged or supplemented by aspects of method 1200 discussed below (and vice versa). In some embodiments, any relevant details from Sections 1-11 may be utilized for any suitable purpose in conjunction with method 1000. For brevity, these details are not repeated here.

FIG. 12 illustrates a flowchart representation of a method 1200 of entering a search mode, in accordance with some embodiments. FIGS. 13A-13B are used to illustrate the methods and/or processes of FIG. 12. Although some of the examples which follow will be given with reference to inputs on a touch-sensitive display (in which a touch-sensitive surface and a display are combined), in some embodiments, the device detects inputs on a touch-sensitive surface 195 that is separate from the display 194, as shown in FIG. 1D.

In some embodiments, the method 1200 is performed by an electronic device (e.g., portable multifunction device 100, FIG. 1A, configured in accordance with any one of Computing Device A-D, FIG. 1E) and/or one or more components of the electronic device (e.g., I/O subsystem 106, operating system 126, etc.). In some embodiments, the method 1200 is governed by instructions that are stored in a non-transitory computer-readable storage medium and that are executed by one or more processors of a device, such as the one or more processors 122 of device 100 (FIG. 1A). For ease of explanation, the following describes method 1200 as performed by the device 100. In some embodiments, with reference to FIG. 1A, the operations of method 1200 are performed by or use, at least in part, a proactive module (e.g., proactive module 163) and the components thereof, a contact/motion module (e.g., contact/motion module 130), a graphics module (e.g., graphics module 132), and a touch-sensitive display (e.g., touch-sensitive display system 112). Some operations in method 1200 are, optionally, combined and/or the order of some operations is, optionally, changed.

As described below, the method 1200 provides an intuitive way to proactively suggest relevant content (e.g., suggested search queries or affordances with content relevant to a user's current location) on an electronic device in response to where a gesture is received. The method allows users to efficiently identify and select desired content with a minimal number of user inputs, thereby creating a more efficient human-machine interface (e.g., the device provides suggested search queries and content for nearby points of interest and the user need only select these, without having to search and locate them). For battery-operated electronic devices, proactively identifying and surfacing relevant content faster and more efficiently both conserves power and increases the time between battery charges.

As shown in FIG. 12, the device detects (1202), via the touch-sensitive surface, a swipe gesture over a user interface. In some embodiments, the swipe gesture, when detected, causes the electronic device to enter a search mode. In response to detecting the swipe gesture, the device enters the search mode. In some embodiments, entering the search mode includes populating a search interface distinct from the user interface, before receiving any user input within the search interface (e.g., no text is entered into a search box within the search interface, no input is received within the search box (no tap within the search box), etc.), with a first content item.

In some embodiments, in accordance with a determination that the user interface includes content that is associated with an application that is distinct from a home screen that includes selectable icons for invoking applications (and, therefore, the swipe gesture was detected over the app-specific content), the device populates the search interface with the first content item includes populating the search interface with at least one suggested search query that is based at least in part on the content that is associated with the application. For example, as explained above with reference to FIGS. 11A-11B in response to the swipe gesture 1102 over email application with content of "John Applecore," Ecuador image, and/or "I love Ecuador" text (FIG. 11A), the search interface 1115 is populated (FIG. 11B). The search interface 1115 includes at least one suggested search query, e.g., "Ecuador," "John Applecore" based at least in part on the content associated with the email application. In another example, as explained above with reference to FIGS. 11E-11F, in response to the swipe gesture 1102 over image application with content of Ecuador and/or Mt. Rainier image (FIG. 11E), the search interface 1115 is populated (FIG. 11F). The search interface 1115 includes at least one suggested search query, e.g., "Ecuador," "Mount Rainier" based at least in part on the image content.

In some embodiments, in accordance with a determination that the user interface is associated with a page of the home screen (e.g., swipe gesture was over an initial home screen page, FIG. 11C), populating the search interface with the first content item includes populating the search interface with an affordance that includes a selectable description of at least one point of interest that is within a threshold distance of a current location of the electronic device. For example, when the device is close to a mall with some restaurants, display information about those restaurants instead of suggested search queries, since the information about the restaurants is predicted to be of most of interest to the user based on the user's proximity to the mall. In the example explained above with reference to FIGS. 11I and 11J, in response to detecting the swipe gesture 1104 over the home screen (FIG. 11C), instead of displaying the suggested search queries interface as shown in FIG. 11D, at least one nearby point of interest is displayed in the search results portion 1130 of the search interface, e.g., "Go Japanese Fusion" restaurant (FIG. 11I), "Caffe Macs," "Out Steakhouse," "Chip Mexican Grill" (FIG. 11J). In FIGS. 11I and 11J, each point of interest includes an affordance and includes a selectable description, which upon selected, provides more information about the point of interest, e.g., selecting the icon and or the description of the point of interest provides more description, pricing, menu, and/or distance information.

In some embodiments, the decision as to whether to populate the search interface with suggested search queries or with an affordance for a nearby point of interest is additionally or alternatively based on whether a predetermined period of time has passed since displaying the content for the application. For example, in accordance with a determination that (i) the swipe gesture was detected over a home screen page (e.g., swipe gesture was note detected over the content) and (ii) a period of time since displaying the content that is associated with the application is below a threshold period of time, the search interface is still populated with the at least one suggested search query. Therefore, in such embodiments, the determination that the swipe gesture was not detected over the content includes a determination that the period of time since displaying the content meets or exceeds the threshold period of time (e.g., if the content was viewed too long ago, 2 minutes, 3 minutes ago) then the device determines that the user is not likely to be interested in suggested search queries based on that content and, instead, the search interface is populated with the affordance that includes the selectable description of the at least one point of interest. In this way, the user is still provided with suggested search queries if the device determines that the content that is associated with the application was recently displayed.

In some embodiments, populating the search interface with the affordance includes (1204) displaying a search entry portion of the search interface. In some embodiments, the device detects (1206) an input at the search entry portion; and in response to detecting the input (e.g., a tap within) the search entry portion, the electronic device ceases to display the affordance and display the at least one suggested search query within the search interface. For example, as shown in FIG. 13A, the search interface includes a search entry portion 1120 and a search results portion 1130 with at least one affordance for nearby points of interest (e.g., nearby restaurants as shown in FIG. 13A and selectable categories of interest for other nearby points of interest). While displaying the search interface with nearby point of interests, an input 1302 at the search entry portion 1120 is detected, e.g., the user taps within the search box with input 1302 as shown in FIG. 13A. In response to detecting the input 1302, in FIG. 13B, the device ceases to display the at least one affordance associated with the nearby points of interest and displays suggested search queries in the search results portion 1130, e.g., Ecuador, Mount Rainier, Best Sushi etc. Therefore, the device is able to quickly switch between suggested search queries and suggested points of interest (in this example, the users tap within the search box indicates that they are not interested in the suggested points of interest and, thus, the device attempts to provide a different type of suggested content, e.g., the suggested search queries based on content previously viewed in other applications).

Additional details regarding the selectable description of the at least one point of interest are provided below in reference to FIGS. 16A-16B and 17A-17E. Additional details regarding populating the search interface with the at least one suggested search query are provided above in reference to FIGS. 10A-10C and 11A-11J.

It should be understood that the particular order in which the operations in FIG. 12 have been described is merely one example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 800, 1000) are also applicable in an analogous manner to method 1200 described above with respect to FIG. 12. For example, the user interface objects and/or operations described above with reference to method 1200 optionally have one or more of the characteristics of the user interface objects and/or operations described herein with reference to other methods described herein (e.g., methods 600, 800, and 1000). In some embodiments, any relevant details from Sections 1-11 may be utilized for any suitable purpose in conjunction with method 1200. For brevity, these details are not repeated here.

FIG. 14 illustrates a flowchart representation of a method 1400 of proactively providing vehicle location information on an electronic device with a touch-sensitive display, in accordance with some embodiments. FIGS. 15A-15B are used to illustrate the methods and/or processes of FIG. 14. Although some of the examples which follow will be given with reference to inputs on a touch-sensitive display (in which a touch-sensitive surface and a display are combined), in some embodiments, the device detects inputs on a touch-sensitive surface 195 that is separate from the display 194, as shown in FIG. 1D.

In some embodiments, the method 1400 is performed by an electronic device (e.g., portable multifunction device 100, FIG. 1A, configured in accordance with any one of Computing Device A-D, FIG. 1E) and/or one or more components of the electronic device (e.g., I/O subsystem 106, operating system 126, etc.). In some embodiments, the method 1400 is governed by instructions that are stored in a non-transitory computer-readable storage medium and that are executed by one or more processors of a device, such as the one or more processors 122 of device 100 (FIG. 1A). For ease of explanation, the following describes method 1400 as performed by the device 100. In some embodiments, with reference to FIG. 1A, the operations of method 1400 are performed by or use, at least in part, a proactive module (e.g., proactive module 163) and the components thereof, a contact/motion module (e.g., contact/motion module 130), a graphics module (e.g., graphics module 132), one or more location sensors (e.g., accelerometer(s) 168, a magnetometer and/or a GPS receiver), and a touch-sensitive display (e.g., touch-sensitive display system 112). Some operations in method 1400 are, optionally, combined and/or the order of some operations is, optionally, changed.

As described below, the method 1400 provides an intuitive way to proactively provide location information when users are in immediate need of that information. The method creates more efficient human-machine interfaces by proactively providing the vehicle location information without requiring users to attempt to locate the information themselves and by providing the information at a time when the user is determined to be returning to a parked vehicle. For battery-operated electronic devices, method 1400 both conserves power and increases the time between battery charges.

As shown in FIG. 14, the device automatically, and without instructions from a user, performs (1402) steps 1404 and 1406 described below. In step 1404, the device determines that a user of the electronic device is in a vehicle that has come to rest at a geographic location.

In some embodiments, determining that the vehicle has come to rest at the geographic location includes determining that the electronic device has remained at the geographic location for more than a threshold period of time, e.g., the device is in one spot for approximately 2 minutes after having travelled above the threshold speed, so this gives an indication that the vehicle is now parked. In some embodiments, determining that the vehicle has come to rest at the geographic location includes determining that a communications link between the electronic device and the vehicle has been disconnected, e.g., the device losing Bluetooth connection with vehicle and/or the user removing a cable connecting the device with the vehicle, etc., thus providing an indication that the vehicle is stopped and/or the engine of the vehicle has been turned off In some embodiments, determining that the vehicle has come to rest at the geographic location includes determining that the geographic location corresponds to a location within a parking lot, e.g., plug current GPS coordinates into (or send to) a maps application to make this determination and get back a determination as to whether the geographic location is in a parking lot.

In some embodiments, only one or more of the above determinations is conducted in order to determine whether the vehicle has come to rest at the geographic location, in other embodiments two or more of the determinations are conducted while, in still other embodiments, all three of the determinations are conducted in order to assess whether the vehicle has come to rest at the geographic location. For example, in some embodiments, determining that the user is in the vehicle that has come to rest at the geographic location includes (i) determining that the user is in the vehicle by determining that the electronic device is travelling above a threshold speed as described above, (ii) determining that the vehicle has come to rest at the geographic location by one or more of: (a) determining that the electronic device has remained at the geographic location for more than a threshold period of time as described above, (b) determining that a communications link between the electronic device and the vehicle has been disconnected as described above, and (c) determining that the geographic location corresponds to a location within a parking lot as described above.

In step 1406, the device further determines whether the user has left the vehicle. In some embodiments, the device makes the determination by determining that a current position of the device is more than a threshold distance away from the geographic location. In some embodiments, the device makes the determination by determining that the user has physically untethered the device from a connection with the vehicle or the user has broken a wireless connection between the device and the vehicle (e.g., Bluetooth or WiFi based connection). Additional details regarding determinations that are used to establish (with a high enough confidence) that the user has left the vehicle at the geographic location are provided below.

Upon determining that the user has left the vehicle at the geographic location, the device determines (1408) whether positioning information, retrieved from the location sensor to identify the geographic location, satisfies accuracy criteria. In some embodiments, the accuracy criteria include a criterion that is satisfied when accuracy of a GPS reading associated with the positioning information is above a threshold level of accuracy (e.g., 10 meters or less circular error probability).

Upon determining that the positioning information does not satisfy the accuracy criteria (1408—No), the device provides (1410) a prompt to the user to input information about the geographic location, and in response to providing the prompt, the device receives information from the user about the geographic location and store the information as vehicle location information. In some embodiments, the prompt is an audio prompt provided by a virtual assistant that is available via the electronic device. When the prompt is an audio prompt, receiving the information from the user includes receiving a verbal description from the user that identifies the geographic location. In some embodiments, the prompt from the virtual assistant instructs the user to take a photo of the vehicle at the geographic location and/or to take a photo of the area surrounding the vehicle. In some embodiments, the user is instructed to provide a verbal description of the geographic location.

In some embodiments, upon determining that the positioning information satisfies the accuracy criteria (1408—Yes), the device automatically, and without instructions from a user, stores (1412) the positioning information as the vehicle location information. In some embodiments, if the positioning information is accurate enough (e.g., satisfies the accuracy criteria), then no prompt is provided to the user. In other embodiments, even if the positioning information is accurate enough, the device still prompts the user to provide additional details regarding the geographic location (verbal, textual, or by taking a picture, as explained above in reference to operation 1410), in order to save these additional details and present them to the user if, for example, the device does not have a strong GPS signal at the time when the user is returning to their vehicle.

In some embodiments, the device further determines (1414) whether the user is heading towards the geographic location. In some embodiments, determining whether the user is heading towards the geographic location includes using new positioning information received from the location sensor to determine that the electronic device is moving towards the geographic location. In some embodiments, determining whether the user is heading towards the geographic location includes: (i) determining that the electronic device remained at a different geographic location for more than a threshold period of time (e.g., at a location/position associated with a shopping mall, a restaurant, a known home or work address for the user, etc.); and (ii) determining that the new positioning information indicates that the electronic device is moving away from the different geographic location and towards the geographic location. In some embodiments, the device additionally or alternatively compares a picture taken of the geographic location to an image of the user's current location in order to determine whether the user is heading towards the geographic location (e.g., by recognizing common or overlapping visual elements in the images). In some embodiments, the device additionally or alternatively detects that the user is accessing a settings user interface that allows the user to establish or search for a data connection with the vehicle and, in this way, the device has an indication that the user is heading towards the geographic location.

In some embodiments, in accordance with a determination that the user is heading towards the geographic location, the device displays (1416) a user interface object that includes the vehicle location information. In some embodiments, the user interface object is a maps object that includes an identifier for the user's current location and a separate identifier for the geographic location. For example, as shown in FIG. 15A, the search user interface includes the search input portion 1120 and the search results portion 1130, which is a map object that includes the vehicle location information at the geographic location identified by a dot and the location label "Infinite Loop 2" and the user's current location separately identified by a pin.

In some embodiments, the user interface object is displayed on a lock screen of the electronic device. For example, as shown in FIG. 15B, the map object is displayed on the lock screen. Thus, automatically, and without instructions from a user, the device predicts that finding the car is predicted to be of interest to the user based on relatively accurate location information and provides the map indicating the car location without the user unlocking the electronic device.

In some embodiments, the user interface object is displayed in response to a swipe gesture that causes the electronic device to enter a search mode. In some embodiments, determining whether the user is heading towards the geographic location is performed in response to receiving the same swipe gesture. Thus, the same swipe gesture causes the device to determine that the user is heading towards the geographic location and displays the user interface object based on relatively accurate location information.

In some embodiments, the search mode includes displaying a search interface that is pre-populated to include the user interface object, e.g., a maps object that includes an identifier that corresponds to the geographic location. In other words, before receiving any user input from the user within the search interface (e.g., before the user has enter any search queries), the search interface is populated to include the maps object, so that the user is provided with quick access to a visual reminder as to the geographic location at which they parked their vehicle (e.g., user interface object 1130 or user interface object 1535 or both, FIG. 15A). In some embodiments, the swipe gesture is in a substantially left-to-right direction, and the swipe gesture is provided by the user while the electronic device is displaying an initial page of a home screen (e.g., 1104-1 in FIG. 11C). In some circumstances, the swipe gesture is in a substantially downward direction and is provided by the user while viewing content that is associated with an application (e.g., 1102 in FIGS. 11A and 11E).

In some embodiments, in conjunction with determining that the user is heading towards to the geographic location (as discussed above in reference to operation 1414), the device also determines whether a current GPS signal associated with the location sensor of the electronic device is strong enough to allow the device to provide accurate directions back to the geographic location and, in accordance with a determination that the GPS signal is not strong enough, then the device provides both the positioning information and the additional details from the user, so that the user can rely on both pieces of information to help locate their parked vehicle.

In some embodiments, the prompt is an audio prompt provided by a virtual assistant that is available via the electronic device (as discussed above in reference to operation 1410), receiving the information from the user includes receiving a verbal description from the user that identifies the geographic location, and displaying the user interface object includes displaying a selectable affordance (e.g., affordance 1502, FIGS. 15A-15B) that, when selected, causes the device to playback the verbal description. In some embodiments, the prompt from the virtual assistant instructs the user to take a photo of the vehicle at the geographic location and/or to take one or more photos/videos of the area surrounding the vehicle and displaying the user interface object includes displaying a selectable affordance (e.g., the affordance 1502, FIG. 15A-15B) that, when selected, causes the device to playback the recorded media. In some embodiments, the selectable affordance is displayed proximate to a maps object (as shown for affordance 1502), while in other embodiments, the selectable affordance is displayed by itself (in particular, in circumstances in which the positioning information did not satisfy the accuracy criteria, one example of this other display format is shown for affordance 1535, FIGS. 15A-15B). In some embodiments (depending on whether positioning information in addition to user-provided location information has been provided), one or both of the affordances 1130 and 1535 are displayed once it is determined that the user is heading towards their parked vehicle.

In some embodiments, the user interface object/affordance (e.g., 1130, 1535, or both) includes an estimated distance to reach the parked vehicle (e.g., the user interface object 1130 includes "0.3 mi" in the upper right corner).

In some embodiments, the prompt is displayed on the display of the electronic device, receiving the information from the user includes receiving a textual description from the user that identifies the geographic location, and displaying the user interface object includes displaying the textual description from the user. In other embodiments, a selectable affordance is displayed that allows the user to access the textual description. For example, in response to a selection of the affordance 1535 (FIGS. 15A-15B), the device opens up a notes application that includes the textual description from the user.

It should be understood that the particular order in which the operations in FIG. 14 have been described is merely one example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 800, 1000, and 1200) are also applicable in an analogous manner to method 1400 described above with respect to FIG. 14. For example, the user interface objects described above with reference to method 1400 optionally have one or more of the characteristics of the user interface objects described herein with reference to other methods described herein (e.g., methods 600, 800, 1000, and 1200). Additionally, the details, operations, and data structures described below in reference to Sections 1-11 may also be utilized in conjunction with method 1400 (e.g., details discussed in reference to Section 6 may be used to help determine when to present user interface objects that include a location of a user's parked vehicle, details discussed in reference to Section 5 may be used to help identify and learn user patterns that relate to when a user typically parks their vehicle and then returns later, and details related to Section 10 may be utilized to help improve vehicle location information by relying on contextual information). In some embodiments, any other relevant details from Sections 1-11 may be utilized for any suitable purpose in conjunction with method 1400. For brevity, these details are not repeated here.

FIGS. 16A-16B illustrate a flowchart representation of a method 1600 of proactively providing information about nearby points of interest (POI), in accordance with some embodiments. FIGS. 17A-17E are used to illustrate the methods and/or processes of FIGS. 16A-16B. Although some of the examples which follow will be given with reference to inputs on a touch-sensitive display (in which a touch-sensitive surface and a display are combined), in some embodiments, the device detects inputs on a touch-sensitive surface 195 that is separate from the display 194, as shown in FIG. 1D.

In some embodiments, the method 1600 is performed by an electronic device (e.g., portable multifunction device 100, FIG. 1A, configured in accordance with any one of Computing Device A-D, FIG. 1E) and/or one or more components of the electronic device (e.g., I/O subsystem 106, operating system 126, etc.). In some embodiments, the method 1600 is governed by instructions that are stored in a non-transitory computer-readable storage medium and that are executed by one or more processors of a device, such as the one or more processors 122 of device 100 (FIG. 1A). For ease of explanation, the following describes method 1600 as performed by the device 100. In some embodiments, with reference to FIG. 1A, the operations of method 1600 are performed by or use, at least in part, a proactive module (e.g., proactive module 163) and the components thereof, a contact/motion module (e.g., contact/motion module 130), a graphics module (e.g., graphics module 132), one or more location sensors (e.g., accelerometer(s) 168, a magnetometer and/or a GPS receiver), and a touch-sensitive display (e.g., touch-sensitive display system 112). Some operations in method 1600 are, optionally, combined and/or the order of some operations is, optionally, changed.

As described below, the method 1600 proactively provides point-of-interest information on an electronic device without requiring the user to search for and locate that information themselves (and then surfaces that information when the user is within a certain distance of a particular POI). The method thus creates more efficient human-machine interfaces by requiring less touch inputs in order to perform a desired action (e.g., viewing information about nearby POIs). For battery-operated electronic devices, the method 1600 both conserves power and increases the time between battery charges.

As shown in FIG. 16A, without receiving any instructions from a user of the electronic device, the device monitors (1602), using the location sensor, a geographic position of the electronic device. Also without receiving any instructions from the user of the electronic device, the device determines, based on the monitored geographic position, that the electronic device is within a threshold distance of a point of interest of a predetermined type (e.g., a point of interest for which activity suggestions are available, such as a restaurant, an amusement park, or a movie theatre).

In some embodiments, points of interest of the predetermined type are determined based on points of interest that the user frequently visits. In some embodiments, the points of interest also include points of interest that are predicted to be of interest to the user based on current text messages, emails, and/or other data associated with the user's social network.

Still without receiving any instructions from the user of the electronic device, in accordance with determining that the electronic device is within the threshold distance of the point of interest, the device identifies at least one activity that is currently popular at the point of interest, and retrieves information about the point of interest, including retrieving information about at least one activity that is currently popular at the point of interest (e.g., rides that are currently popular, menu items that are popular, movies that are popular, and the like). In some embodiments, popularity is assessed based on whether a threshold number (e.g., more than 5) or a threshold percentage (e.g., 5% or 10%) of individuals in the user's social network have posted something that is related to the at least one activity. In some embodiments, the device maintains a list of a predetermined number (e.g., 5, 10, or 20) of points of interest that the user often visits (and/or points of interest that are determined to be of interest right now based on text messages, emails, or activity within the user's social network, as discuss above) and the device retrieves information about current activities at those points of interest when the user is within the threshold distance (e.g., 1 mile, 1.5 miles, 2 miles) of any of them.

Still referring to FIG. 16A, after retrieving the information about the point of interest, the device detects (1616), via the touch-sensitive surface, a first input that, when detected, causes the electronic device to enter a search mode. In some embodiments, the search mode is a system-level search mode that allows for conducting a search across the entire electronic device (e.g., across applications and content sources (both on-device and elsewhere), not just within a single application). In some embodiments, the first input corresponds to a swipe gesture (e.g., swipe gesture 1104-1 in a substantially left-to-right, FIG. 11C) direction across the touch-sensitive surface that is received while the device is displaying an initial page of a home screen.

In some embodiments, in accordance with determining that the device is within the threshold distance of the point of interest, the device also displays an affordance, on a lock screen, the affordance indicating that information is available about current activities at the point of interest. In these embodiments, the first input corresponds to a request to view the available information about the current activities at the point of interest. For example, as shown in FIG. 17D, the restaurant information object is displayed on the lock screen. The icon and/or description of the restaurant are selectable and indicate that more information, such as menu information is available about the restaurant. In response to a first input, e.g., a tap on the "View Menu" link, the menu is displayed (e.g., directly on the lock screen or by unlocking the device and opening an appropriate application for viewing of the menu). In some embodiments, any of the user interface objects/affordances shown in FIGS. 17A-17E (e.g., 1713 and 1715, and the content included therein) may be presented within the search interface or within the lock screen (or both).

Turning to FIG. 16B, in response to detecting the first input, the device enters (1618) the search mode. In some embodiments, entering the search mode includes, before receiving any user input at the search interface (e.g., no search terms have been entered and no input has been received at a search box within the search interface), presenting, via the display, an affordance that includes (i) the information about the at least one activity and (ii) an indication that the at least one activity has been identified as currently popular at the point of interest, e.g., popular menu items at a nearby restaurant (e.g., affordance 1715 in FIGS. 17C-17D), ride wait times at a nearby amusement park (e.g., affordance 1713 in FIGS. 17A-17B), current show times at a nearby movie theatre, etc.

Figure 17A:
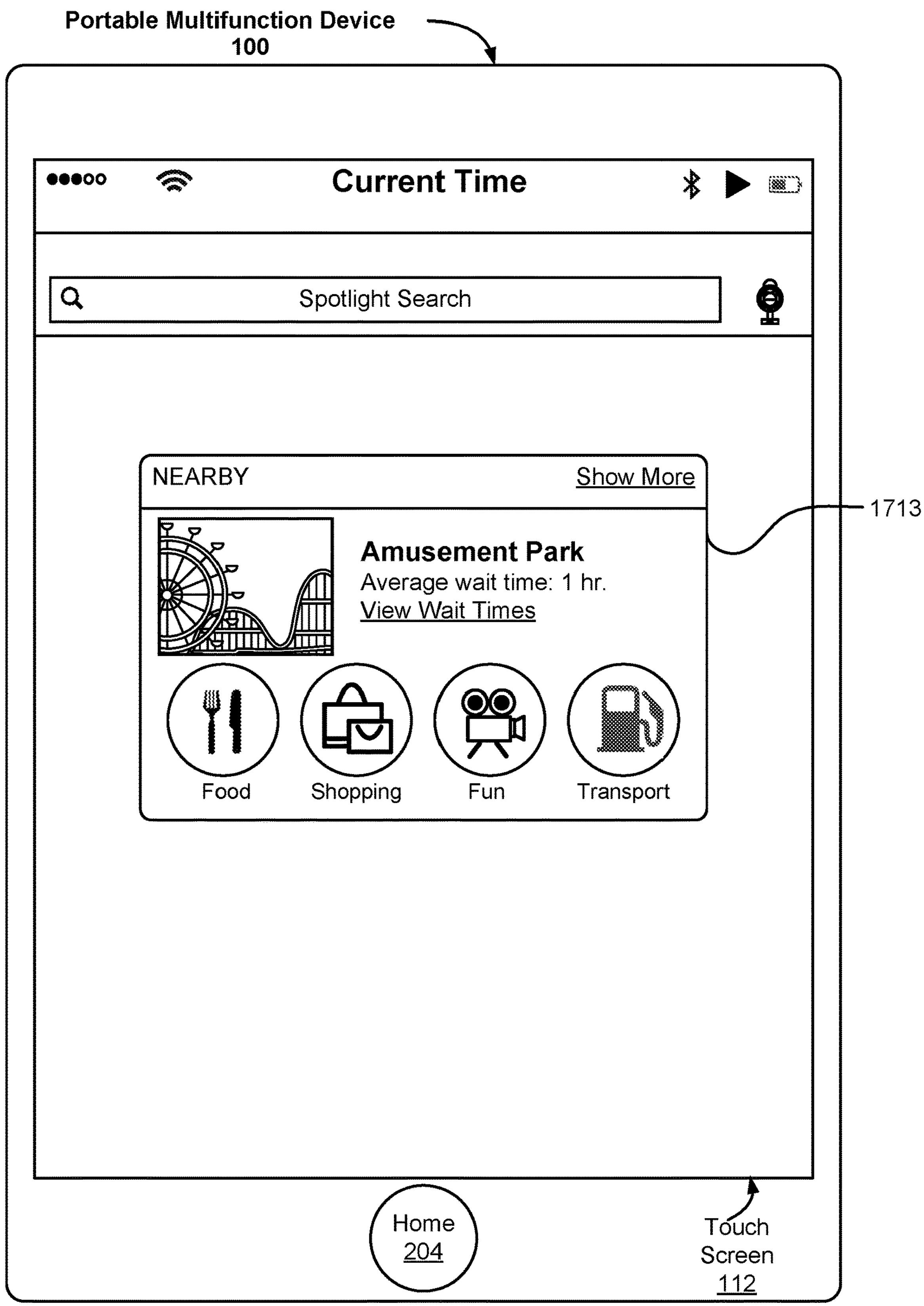
FIGS. 17A-17E are schematics of a touch-sensitive display used to illustrate user interfaces for proactively providing nearby point of interest (POI) information for search queries, in accordance with some embodiments.
Figure 17B:
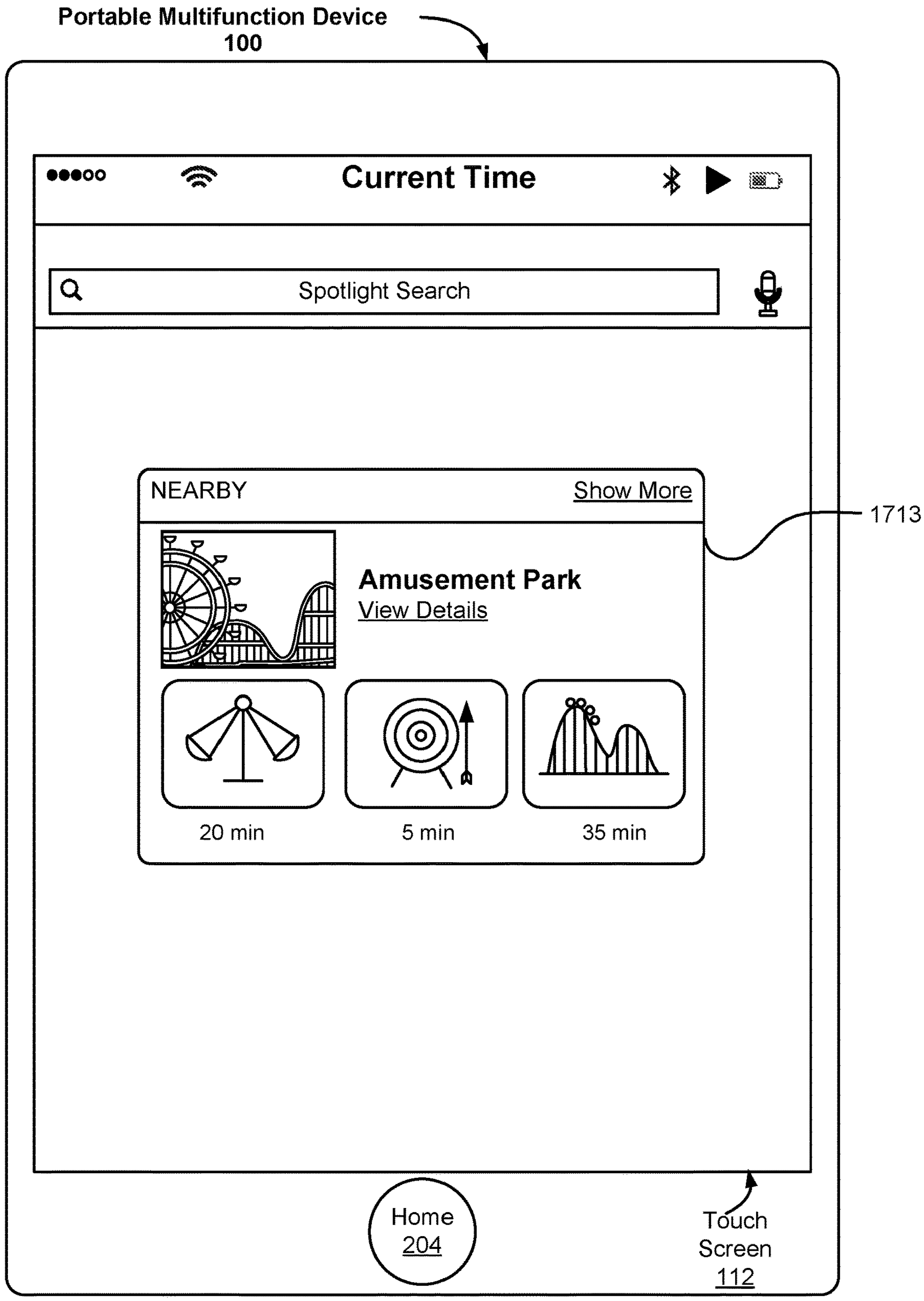

For example, as shown in FIG. 17A, in some embodiments, the point of interest is (1604) an amusement park and the retrieved information includes current wait times for rides at the amusement park. In some embodiments and as shown in FIG. 17A, the electronic device uses the retrieved information to present an average wait time (e.g., 1 hr) for all rides and the user is able to select a link in order to view wait times for each individual ride. As shown in FIG. 17B, in some embodiments, the portion of the retrieved information includes (1606) information about wait times for rides that are located within a predefined distance of the electronic device, e.g., three rides/games are within a distance of approximately 100-150 feet from the electronic device and the wait time for each ride/game is displayed (after receiving an input from the user requesting to view the ride wait times, such as an input over the "View Wait Times" text shown in FIG. 17A).

Figure 17C:
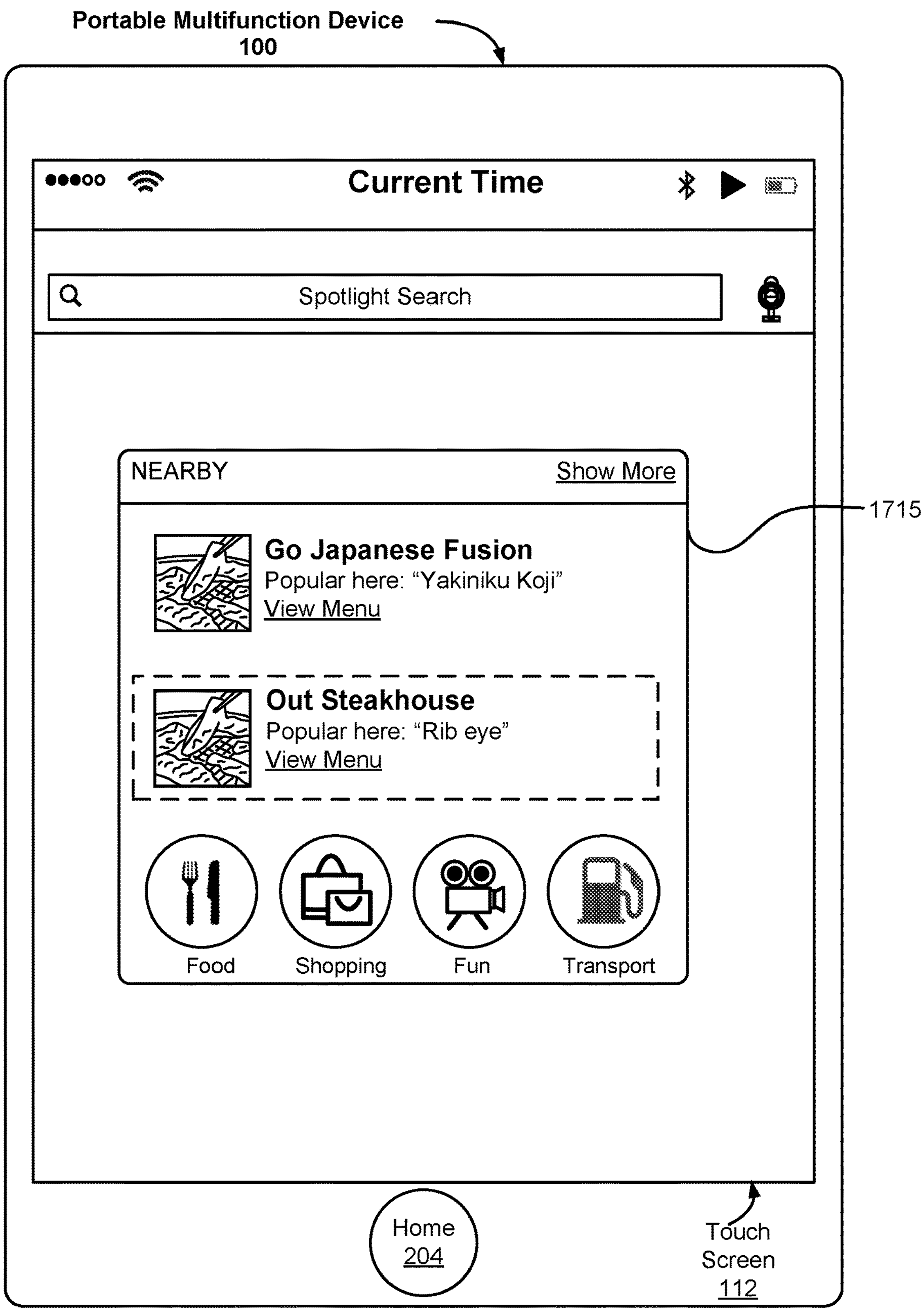
Figure 17D:
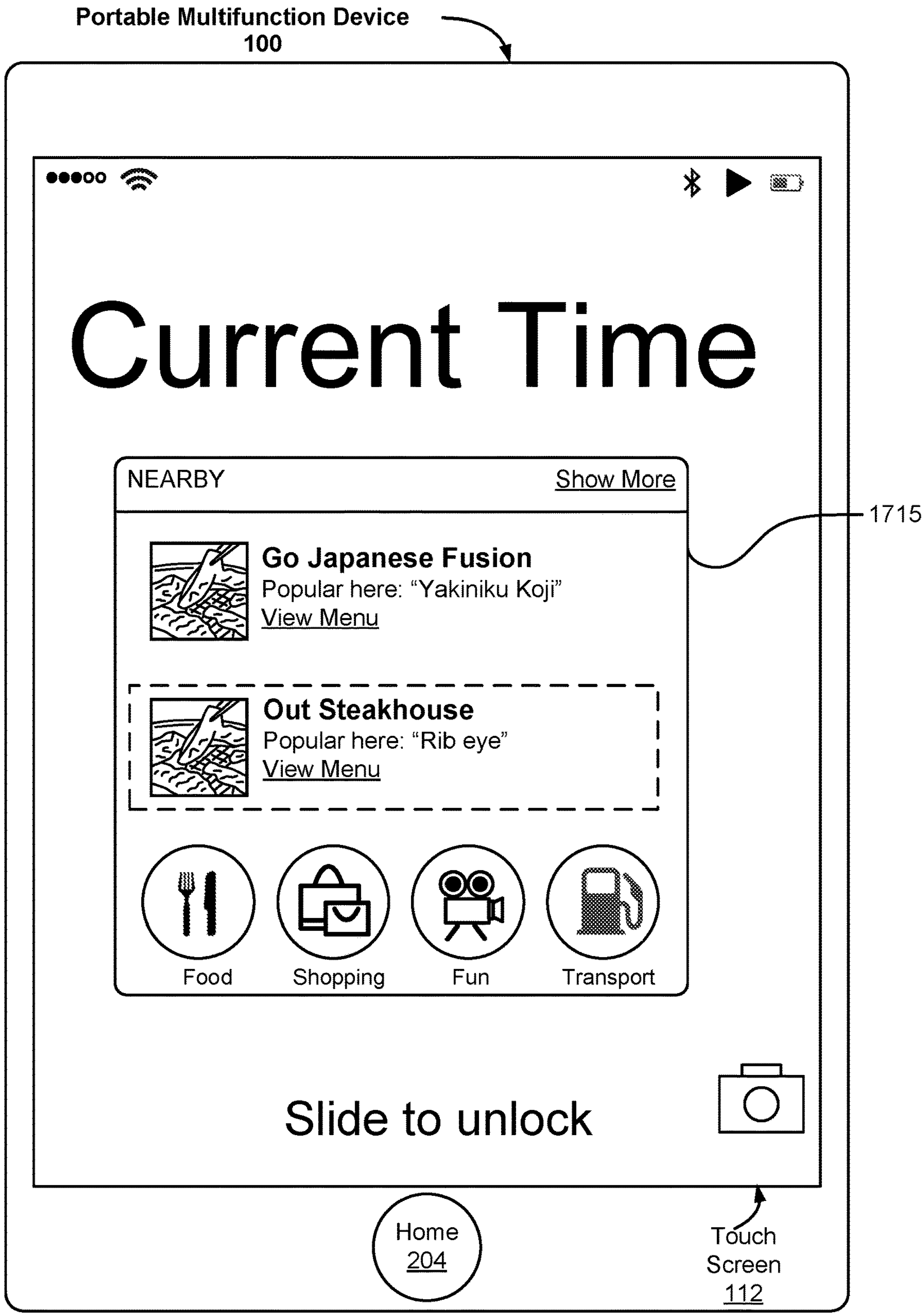

As another example, as show in FIG. 17C, the point of interest is (1608) a restaurant and the retrieved information includes information about popular menu items at the restaurant. In some embodiments, the retrieved information is retrieved (1610) from a social network that is associated with the user of the electronic device. For example, in FIG. 17C, popular menu item "Yakiniku Koji" at the restaurant "Go Japanese Fusion" is displayed within the affordance 1715, and the popular menu item may be determined based on information retrieved from a social network that is associated with the user of the electronic device.

As one additional example, the point of interest may be (1612) a movie theatre and the retrieved information includes information about show times for the movie theatre. In some embodiments, the retrieved information about the show times is retrieved (1614) from a social network that is associated with the user of the electronic device (e.g., based on information that has recently been posted by individuals in the user's social network).

In some embodiments, the device detects (1620) a second input, e.g., selection of a show more link that is displayed near (e.g., above) the affordance, such as the show more link shown for affordances 1713 and 1715 in FIGS. 17A-17D), and in response to detecting the second input, the device updates the affordance to include available information about current activities at a second point of interest, distinct from the point of interest. In some embodiments, the second point of interest is also within the threshold distance of the electronic device. For example, in response to a user selecting the show more link shown in FIG. 17D, the device updates the affordance 1715 to include available information about restaurants and food at a different restaurant "Out Steakhouse" within 1 mile of the electronic device, as shown in FIG. 17C. Stated another way, the affordance 1715 is initially presented with just the information about "Go Japanese Fusion" and, in response to the second input, the affordance 1715 is updated to include the information about the second point of interest (e.g., the information about "Out Steakhouse," shown within dotted lines in FIG. 17C). In some embodiments, more than one points of interest distinct from the point of interest are displayed in response to detecting the second input, e.g., the device updates the restaurant information affordance to include available information about two or more new restaurants in addition to the point of interest. In some embodiments, the same functionality (i.e., the functionality allowing users to view information about additional points of interest in response to selection of the show more link) is also available for affordances presented on a lock screen (e.g., affordance 1715 shown on the lock screen, FIG. 17D).

Figure 17E:
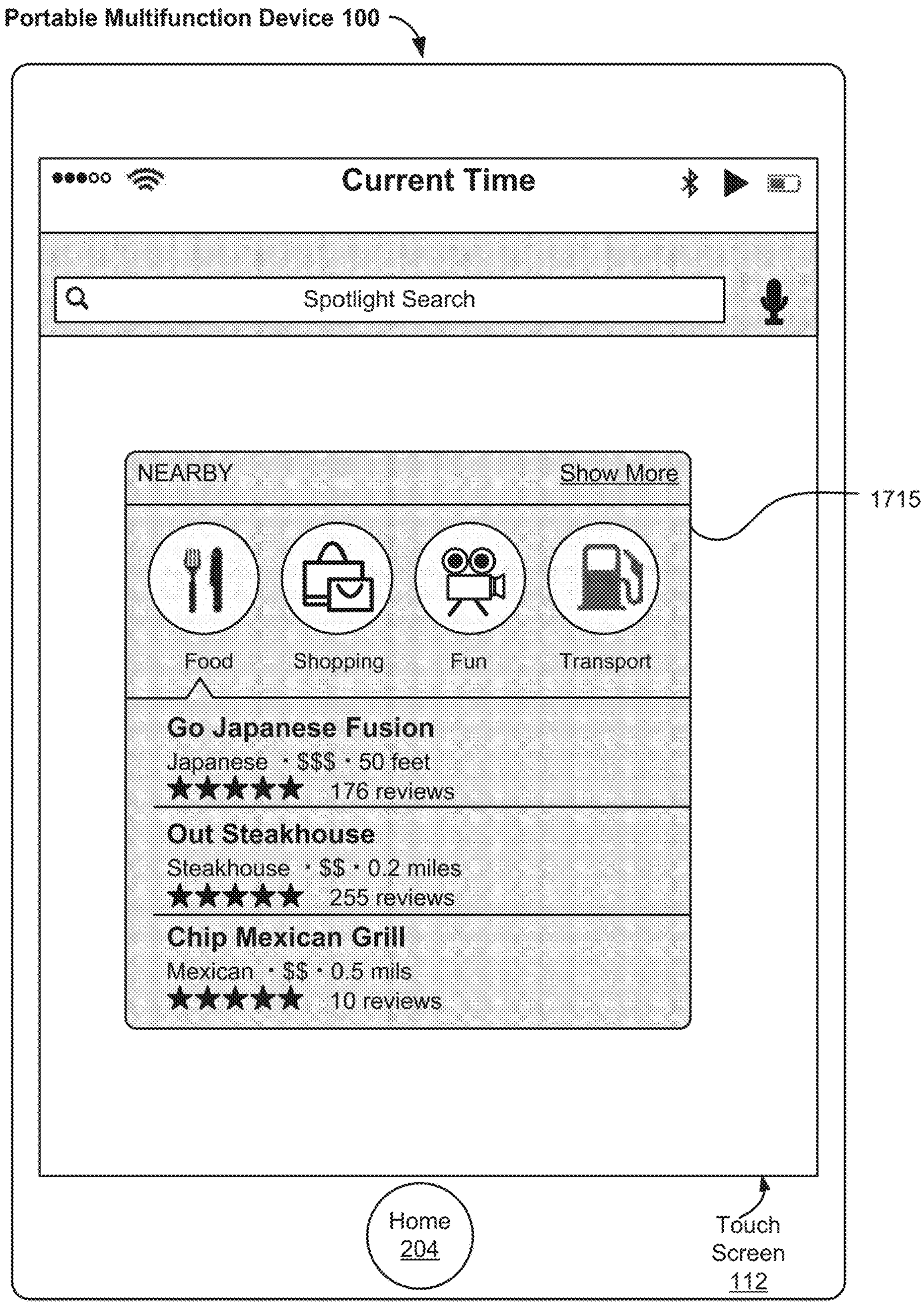

In some embodiments, the affordance further includes (1622) selectable categories of points of interest and the device detects (1624) a selection of a respective selectable category, and in response to detecting the selection, updates the affordance to include information about additional points of interest that are located within a second threshold distance of the device, e.g., the second threshold is greater than the threshold distance, in order to capture points of interest that might be of interest to the user, since they have not yet selected the closest points of interest. For example, the first threshold distance is 100 feet. The device displays "Go Japanese Fusion" as the point of interest as shown in FIGS. 17C and 17D when the electronic device is approximately 50 feet away from the point of interest. In response to detecting the selection of the "Food" category, as shown in FIG. 17E, additional points of interest, e.g., "Out Steakhouse" and "Chip Mexican Grill" that are located more than 100 feet but within 1 mile of the device are displayed.

In some embodiments, after unlocking the electronic device, the user interface object is (1626) available in response to a swipe in a substantially horizontal direction (e.g., the left-to-right swipe 1104-1, FIG. 11C) over an initial page of a home screen of the electronic device.

It should be understood that the particular order in which the operations in FIGS. 16A-16B have been described is merely one example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 800, 1000, 1200, and 1400) are also applicable in an analogous manner to method 1600 described above with respect to FIG. 16. For example, the user interface objects and/or operations described above with reference to method 1600 optionally have one or more of the characteristics of the user interface objects and/or operations described herein with reference to other methods described herein (e.g., methods 600, 800, 1000, 1200, and 1400). In some embodiments, any relevant details from Sections 1-11 may be utilized for any suitable purpose in conjunction with method 1600. For brevity, these details are not repeated here.

FIGS. 18A-18B are a flowchart representation of a method 1800 of extracting a content item from a voice communication and interacting with the extracted content item, in accordance with some embodiments. FIGS. 19A-19F are used to illustrate the methods and/or processes of FIGS. 18A-18B. Although some of the examples which follow will be given with reference to inputs on a touch-sensitive display (in which a touch-sensitive surface and a display are combined), in some embodiments, the device detects inputs on a touch-sensitive surface 195 that is separate from the display 194, as shown in FIG. 1D.

In some embodiments, the method 1800 is performed by an electronic device (e.g., portable multifunction device 100, FIG. 1A, configured in accordance with any one of Computing Device A-D, FIG. 1E) and/or one or more components of the electronic device (e.g., I/O subsystem 106, operating system 126, etc.). In some embodiments, the method 1800 is governed by instructions that are stored in a non-transitory computer-readable storage medium and that are executed by one or more processors of a device, such as the one or more processors 122 of device 100 (FIG. 1A). For ease of explanation, the following describes method 1800 as performed by the device 100. In some embodiments, with reference to FIG. 1A, the operations of method 1800 are performed by or use, at least in part, a proactive module (e.g., proactive module 163) and the components thereof, a contact/motion module (e.g., contact/motion module 130), a graphics module (e.g., graphics module 132), and a touch-sensitive display (e.g., touch-sensitive display system 112). Some operations in method 1800 are, optionally, combined and/or the order of some operations is, optionally, changed.

As described below, the method 1800 provides an intuitive way to extract content items from voice communications and present them to a user on an electronic device with a touch-sensitive display. The method reduces the number of inputs required from a user (e.g., the device automatically extracts relevant information for contacts, locations, and events and prepares that information for storage and use on the device), thereby creating a more efficient human-machine interface and assisting users with adding new content items based on what is discussed on voice communications. For battery-operated electronic devices, this method helps to both conserves power and increases the time between battery charges.

As shown in FIG. 18A, the device receives (1801) at least a portion of a voice communication, the portion of the voice communication including speech provided by a remote user of a remote device that is distinct from a user of the electronic device. In some embodiments, the voice communication is a live phone call, a live video call (e.g., a FaceTime call), or a recorded voicemail (1803). In some embodiments, the voice communication is a live telephone call (or FaceTime call) between the user and the remote user and, thus, the voice communication includes speech provided by both the user and the remote user. In other embodiments, the voice communication is a recorded voicemail sent by the remote user to the user, the recorded voicemail is delivered from the remote device to the electronic device via a telecommunications network, and the recorded voicemail is then stored on the electronic device for later playback.

In some embodiments, the portion of the voice communication is identified based on an instruction from the user of the electronic device (1805). For example, the portion is flagged by the user of the electronic device for analysis based on the user's selection of a hardware button (e.g., the user taps the hardware button, just as a volume button, and in response, the device begins to analyze a predefined amount of the voice communication (e.g., a previous 10, 9, 8, or 7 seconds) to detect/extract content items. In some embodiments, the button may also be a button that is presented for user selection on the display of the electronic device (e.g., a button that is displayed on a user interface similar to that shown in FIG. 21B during the voice communication that includes the text "tap here to analyze this voice communication for new content").

In some embodiments, the instruction from the user corresponds to a verbal command that includes the phrase "hey Siri" (e.g., "hey Siri, please save that," or "hey Siri, please remember that," or "hey Siri, please grab the event details that were just mentioned" or the like). In some embodiments, the verbal instruction from the user is any predefined phrase that causes the device to begin analyzing the voice communication to detect new content (e.g., the phrase could be in some other language besides English or the phrase could include different words, such as "Siri, please analyze this call" or "Siri, please begin analyzing" or something to that effect).

In some embodiments, the device does not record or maintain any portion of the voice communication in persistent memory, instead the device analyzes just the portion of the voice communication (e.g., 10 seconds at a time) and then immediately deletes all recorded data and only saves content items extracted based on the analysis (as discussed in more detail below). In this way, extracted content items are made available to users, but the actual content of the voice communication is not stored, thus helping to preserve user privacy.

In some embodiments, the device analyzes (1807) the portion of the voice communication (e.g., the portion flagged by the user of a recorded voicemail or a live phone call between the user of the device and another remotely located user of a different device, or a portion that is identified automatically by the device as including new content for extraction) to detect content of a predetermined type. In some embodiments, analyzing the voice communication includes (1809): converting the speech provided by the remote user to text (and, if applicable, the speech provided by the user of the electronic device); applying a natural language processing algorithm to the text to determine whether the text includes one or more predefined keywords; and in accordance with a determination that the text includes a respective predefined keyword, determining that the voice communication includes speech that describes a content item.

Stated another way, the voice communication is being passed through speech-to-text processing algorithms, natural language processing is performed on the text that is produced by the speech-to-text processing, and then the electronic device determines whether the text includes any of the one or more predefined keywords. In some embodiments, an automated speech recognition algorithm is utilized (e.g., to help perform the speech-to-text and natural language processing operations). In some embodiments, the one or more predefined keywords include data detectors that are used to identify key phrases/strings in the text and those are used to provide the suggested output (e.g., the selectable description discussed above). In some embodiments, this entire process (converting speech to text and processing that text to detect new content) is all performed on the electronic device and no servers or any external devices are used to help perform these operations and, in this way, a user's privacy is maintained and protected. In some embodiments, a circular buffer is used while analyzing the voice communication (e.g., a small circular buffer that includes ten seconds or less of the voice communication) and the data in the circular buffer is used to store and transcribe the speech, which also preserves privacy since the entire conversation is not recorded, monitored, or stored. In this way, the device is able to quickly and efficiently process voice communications in order to detect new events, new contact information, and other new content items.

In some embodiments, for certain types of content that may be extracted from the voice communication (e.g., phone numbers), instead of or in addition to search for the one or more predefined keywords, the device also checks whether text produced by the natural language processing algorithm includes a predefined number of digits (e.g., 10 or 11 for U.S. phone numbers). In some embodiments, both techniques are used (e.g., the device looks for a predefined keyword such as "phone number" then searches for the predefined number of digits shortly thereafter in the text in order to locate the referenced phone number).

In some embodiments, the analyzing (e.g., operations 1807 and 1809) is performed while the voice communication is being output via an audio system in communication with the electronic device. In some embodiments, the content of the predetermined type includes informational content that is discussed on the voice communication and is related to contacts, events, and/or location information (additional details regarding detection and extraction of location information from voice communications is provided below). For example, analyzing the voice communication to detect content of the predetermined type includes analyzing to detect new contact information (including contacts and new contact information for existing contacts) and new events (or content that relates to modifying an existing event). In some embodiments, the audio system is an internal speaker of the device, external headphones, or external audio system, such as speakers or a vehicle's stereo system.

In some embodiments, the device extracts (1811) a content item based at least in part on the speech provided by the remote user of the remote device (e.g., the speech identifies or describes the content item, such as details about an upcoming event (start time, end time, location, attendees, and the like), contact information (phone numbers, contact name, employer name, and the like), a restaurant name, a phone number, directions to a point of interest, and other descriptive details that can be used to extract a content item from the speech. In some embodiments, the content item is extracted based at least in part on speech provided by the user of the electronic device as well (e.g., both users are discussing event details and the device extracts those event details based on speech provided by both users) (1815).

In some embodiments, the content item is a new event, new event details for an event that is currently associated with a calendar application on the electronic device, a new contact, new content information for an existing contact that is associated with a telephone application on the electronic device (1813).

In some embodiments, the electronic device determines (1817) whether the content item is currently available on the electronic device.

Turning now to FIG. 18B, in accordance with a determination (1819) that the content item is not currently available on the electronic device, the electronic device: identifies an application that is associated with the content item and displays a selectable description of the content item on the display (1821). FIG. 19A shows one example user interface in which the selectable description 1902 is displayed while the user is currently participating in the voice communication (e.g., live telephone call). As shown in FIG. 19A, the selectable description 1902 includes an icon for the identified associated application (e.g., an icon for a calendar application), a description of the content item (e.g., text indicating that a new event was found on this phone call), and details about the content item (e.g., event details that are associated with the new event).

In some embodiments, displaying the selectable description includes displaying the selectable description within a user interface that includes recent calls made using a telephone application (1823). In some embodiments, the user interface that includes recent calls is displayed after the voice communication has completed (i.e., the selectable description 1902 is first shown while the user is on a call and then the user interface that includes recent calls is shown upon termination of the call). For example, FIG. 19B illustrates an example user interface that includes selectable descriptions 1901, 1903, and 1905 for content items extracted from voice communications. In particular, selectable description 1901 indicates that a new event was found on a first phone call, selectable description 1903 indicates that new contact information was found on a second phone call, and selectable description 1905 indicates that locations were found on a third phone call. As discussed above, the voice communication could also be a recorded voicemail and, thus, the user interface shown in FIG. 19B may also be displayed in the voicemail tab of the telephone application.

In some embodiments, the selectable description is displayed with an indication that the content item is associated with the voice communication. For example, each of the selectable descriptions 1901-1905 are displayed adjacent to the voice communication from which they were extracted, those providing users with a clear indication of a respective voice communication that is associated with each extracted content item.

In accordance with the determination that the content item is not currently available on the electronic device, the electronic device also: provides (1825) feedback to the user that a new contact item has been detected. In some embodiments, providing feedback is performed in conjunction with displaying the selectable description (i.e., the displaying and providing feedback are performed in a substantially simultaneous fashion, such that the user is able to receive haptic feedback which then directs them to view the display on which selectable description 1902 is shown during the voice communication). In some embodiments, providing feedback includes sending (1827) information regarding detection of the content item to a different electronic device that is proximate to the electronic device (e.g., send info to a nearby laptop or watch, so that user doesn't have to remove phone from ear to see details regarding the detected new content item).

In some embodiments, in response to detecting a selection of the selectable description (e.g., user input provided at the user interface shown in either of FIG. 19A or 19B), the electronic device stores (1829) the content item for presentation with the identified application. The selectable description may be selected while the user is listening to the voice communication (e.g., by tapping over selectable description 1902, FIG. 19A) or by selecting the selectable description from the user interface that includes recent calls (e.g., by tapping over selectable description 1901, FIG. 19B) (1831). In response to the selection, the content item is stored with the identified application (e.g., a calendar application or a contacts application, depending on the type of contact item extracted). For example, in response to selection of either selectable description 1902 or 1901, the electronic device opens a create new event user interface and populates the create new event user interface with details that were extracted from the portion of the voice communication (e.g., the user interface shown in FIG. 19C is populated to include a title, a location, a start time, an end time, and the like).

As another example, in response to selection of selectable description 1903, the electronic device opens a user interface for a contacts application (e.g., to either allow for creation of a new contact or addition of new contact details to an existing contact, FIGS. 19D-19E, respectively) and populates the user interface with details that were extracted from the portion of the voice communication (e.g., the user interface shown in FIG. 19D includes first name, last name, phone numbers, email address, and the like and the user interface shown in FIG. 19E includes a new mobile phone number for an existing contact).

In some embodiments, the electronic device also detects/extracts information about physical locations mentioned or discussed during the voice communication. In particular and referring back to FIG. 18B, the electronic device determines (1833) that the voice communication includes information about a first physical location (e.g., a reference to a geographic location or directions that are provided for reaching the first geographic location). The electronic device also detects (1835) an input (e.g., the input) and, in response to detecting the input, the electronic device performs either operation 1837 or operation 1839 depending on whether the input corresponds to a request to open an application that accepts geographic location data or the input corresponds to a request to search for content on the electronic device (e.g., any of the search-activating gestures discussed herein).

In accordance with a determination that the input corresponds to a request to open an application that accepts geographic location data, the electronic device opens (1839) the application that is capable of accepting location data and populates the application with information about the first physical location (could be the information included in the voice communication or information that is based thereon, such as a restaurant name that is discussed on a live phone call or a phone number that is looked up by the electronic device using that restaurant name). For example, as shown in FIG. 19F, the application is a maps application and populating the maps application with information about the first physical location includes populating a map that is displayed within the maps application with a location identifier that corresponds to the first physical location (or as shown in FIG. 19F a plurality of location identifiers are displayed for each physical location discussed/extracted during the voice communication).

In accordance with a determination that the input corresponds to a request to enter a search mode, the electronic device populates (1837) a search interface with information about the first physical location (could be the information included in the voice communication or information that is based thereon, such as a restaurant name that is discussed on a live phone call or a phone number that is looked up by the electronic device using that restaurant name). For example, the search interface discussed above in reference to FIG. 13B could be populated to include information about the first physical location as one of the suggested searches 1150 (e.g., the request is received over the telephone application).

In some embodiments, the voice communication may include speech (from a single user or from multiple users that are both speaking during the voice communication) that describes a number of various content items (e.g., multiple new contacts or new contact information for existing contacts, multiple physical locations, and multiple details about new or existing events, or combinations thereof) and the electronic device is configured to ensure that each of these content items are extracted from the voice communication. For example, the method 1800 also includes having the electronic device receive a second portion of the voice communication (e.g., the second portion includes speech provided by one or more of: the remote user of the remote device and the user of the electronic device). In some embodiments, the electronic device: extracts a second content item based at least in part on the speech provided by the remote user of the remote device and the speech provided by the user of the electronic device. In accordance with a determination that the second content item is not currently available on the electronic device, the electronic device: identifies a second application that is associated with the second content item and displays a second selectable description of the second content item on the display (e.g., the user interface shown in FIG. 19A may include more than one selectable description 1902 and/or the user interface shown in FIG. 19B may include more than one selectable description 1901, 1903, or 1905, as applicable if multiple content items were extracted from each associated voice communication). In response to detecting a selection of the second selectable description, the electronic device stores the second content item for presentation with the identified second application (as discussed above with reference to the first content item).

In some embodiments, after the selectable description or the second selectable description is selected, the electronic device ceases to display the respective selectable description in the user interface that includes the recent calls. In some embodiments, each selectable description is also displayed with a remove affordance (e.g., an "x") that, when selected, causes the electronic device to cease displaying the respective selectable description (as shown for the selectable descriptions pictured in FIGS. 19A and 19B).

It should be understood that the particular order in which the operations in FIGS. 18A-18B have been described is merely one example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 2000) are also applicable in an analogous manner to method 1800 described above with respect to FIGS. 18A-18B. For example, the operations described above with reference to method 1800 optionally are implemented or incorporate the operations described herein with reference to other methods described herein (e.g., method 2000). Additionally, the details provided below in Section 4: "Structured Suggestions" may also be utilized in conjunction with method 2000 (e.g., the details discussed in section 4 related to detecting information about contacts and events in messages can be used to extract the same information from voice communications as well). In some embodiments, any relevant details from Sections 1-11 may be utilized for any suitable purpose in conjunction with method 1800. For brevity, these details are not repeated here.

In some embodiments, the techniques described with reference to methods 1800 above and 2000 below are also used to detect other types of content that can be extracted from voice communications. For example, phone numbers may be extracted and presented to a user for storage as contact information (e.g., for new or existing contacts) or for immediate use (e.g., the user makes a phone call and hears an answering message that includes a new phone number and, in response to detecting that the message includes this new phone number, the device presents the phone number, such as on a user interface like that shown in FIG. 21B, so that the user can quickly and easily call the new phone number).

In some embodiments of the methods 1800 and 2000, haptic feedback is provided whenever the device detects new content (e.g., locations, phone numbers, contact information, or anything else) in order to provide the user with a clear indication that new content is available for use FIG. 20 is a flowchart representation of a method of determining that a voice communication includes speech that identifies a physical location and populating an application with information about the physical location, in accordance with some embodiments. FIGS. 19A-19F and FIGS. 21A-21B are used to illustrate the methods and/or processes of FIG. 20. Although some of the examples which follow will be given with reference to inputs on a touch-sensitive display (in which a touch-sensitive surface and a display are combined), in some embodiments, the device detects inputs on a touch-sensitive surface 195 that is separate from the display 194, as shown in FIG. 1D.

In some embodiments, the method 2000 is performed by an electronic device (e.g., portable multifunction device 100, FIG. 1A, configured in accordance with any one of Computing Device A-D, FIG. 1E) and/or one or more components of the electronic device (e.g., I/O subsystem 106, operating system 126, etc.). In some embodiments, the method 2000 is governed by instructions that are stored in a non-transitory computer-readable storage medium and that are executed by one or more processors of a device, such as the one or more processors 122 of device 100 (FIG. 1A). For ease of explanation, the following describes method 2000 as performed by the device 100. In some embodiments, with reference to FIG. 1A, the operations of method 2000 are performed by or use, at least in part, a proactive module (e.g., proactive module 163) and the components thereof, a contact/motion module (e.g., contact/motion module 130), a graphics module (e.g., graphics module 132), and a touch-sensitive display (e.g., touch-sensitive display system 112). Some operations in method 2000 are, optionally, combined and/or the order of some operations is, optionally, changed.

As described below, the method 2000 provides an intuitive way to extract content items from voice communications and present them to a user on an electronic device with a touch-sensitive display. The method reduces the number of inputs required from a user (e.g., the device automatically extracts relevant information about physical locations and prepares that information for storage and use on the device), thereby creating a more efficient human-machine interface and assisting users with recalling information about physical locations based on what is discussed on voice communications. For battery-operated electronic devices, this method helps to both conserves power and increases the time between battery charges.

As shown in FIG. 20, the device receives (2001) at least a portion of a voice communication, the portion of the voice communication including speech provided by a remote user of a remote device that is distinct from a user of the electronic device. In some embodiments, the voice communication is a live phone call, a live video call (e.g., a FaceTime call), or a recorded voicemail (2003). Additional details regarding examples of voice communications (and associated portions thereof) are provided above in reference to FIGS. 18A-18B. In some embodiments, the portion of the voice communication is identified based on an instruction received from the user of the electronic device (2005). Additional details regarding examples of instructions received from the user are provided above in reference to FIGS. 18A-18B (e.g., the instruction could correspond to selection of a hardware button or a verbal command from the user).

In some embodiments, the device analyzes (2007) the portion of the voice communication to detect information about physical locations, and the analyzing is performed while outputting the voice communication via an audio system in communication with the electronic device. In some embodiments, the audio system may be an internal speaker of the device, external headphones, external audio system, such as speakers or a vehicle's stereo system. Additional information regarding this analyzing operation 2007 and other examples of speech-to-text processing are provided above (and these techniques apply to detecting physical locations as well.

In some embodiments, the electronic device determines (2009) that the voice communication includes speech that identifies a physical location. In some embodiments, the speech that identifies the physical location includes speech that discusses driving directions to a particular point of interest, speech that mentions a name of a restaurant (or other point of interest), and the like. In some embodiments, the physical location may correspond to any point of interest (such as a restaurant, a house, an amusement park, and others) and the speech identifying the physical location may include speech that mentions a street address, speech that mentions positional information for the physical location (GPS coordinates, latitude/longitude, etc.), and other related speech that provides information that can be used (by the device) to locate the physical location on a map. In some embodiments, the physical location is also referred to as a named location or a physically addressable location.

In some embodiments, in response to determining that the voice communication includes speech that identifies the physical location, the electronic device provides (2011) an indication that information about the physical location has been detected (e.g., the device provides haptic feedback and/or displays a UI object for selection, such as the user interface object 2101 or 2103 shown in FIGS. 21A and 21B, respectively). In some embodiments, providing the indication includes (2013) displaying a selectable description of the physical location within a user interface that includes recent calls made using a telephone application (e.g., selectable description 1905, FIG. 19B) or within a user interface that is associated with the voice communication (e.g., selectable description 2101 and 2103, FIGS. 21A-21B, respectively) or within both such user interfaces (e.g., within the user interface that is associated with the voice communication while the voice communication is ongoing and within the user interface that includes recent calls after the voice communication is over). In some embodiments, the selectable description indicates that the content item is associated with the voice communication (e.g., the selectable description is displayed underneath an identifier for the voice communication, as shown in FIG. 19B, or the selectable description is displayed in the user interface associated with the voice communication (as shown in FIGS. 21A-21B).

In some embodiments, providing the indication includes providing haptic feedback to the user of the electronic device (2015).

In some embodiments, providing the indication includes (2017) sending information regarding the physical location to a different electronic device that is proximate to the electronic device (e.g., the information is sent for presentation at a nearby laptop or watch, so that user doesn't have to remove phone from ear to see details regarding the detected new content item).

In some embodiments, the electronic device detects (2019), via the touch-sensitive surface, an input (e.g., the input corresponds to a request to open an application that accepts geographic location data (received at a later time after end of the voice communication) or the input corresponds to a selection of the selectable description of the physical location that is displayed during or after the voice communication) and, in response to detecting the input, the device: opens an application that accepts geographic location data and populates the application with information about the physical location.

In some embodiments, detecting the input includes detecting the input over the selectable description while the user interface that includes recent calls is displayed (e.g., a selection or tap over selectable description 1905, FIG. 19B). For example, in response to detecting a contact over the selectable description 1905, FIG. 19B, the electronic device opens a maps application (or an application that is capable of displaying a maps object, such as a ride-sharing application) and populates the maps application with information about the physical location (e.g., a pin that identifies the physical location, as shown in FIG. 19F).

In some embodiments, detecting the input includes detecting the input over the selectable description while a user interface that is associated with the voice communication is displayed (e.g., a selection or tap over selectable description 2101 or 2103, FIGS. 21A-21B). For example, in response to detecting a contact over the selectable description 2101, FIG. 21A, the electronic device opens a maps application (or an application that is capable of displaying a maps object, such as a ride-sharing application) and populates the maps application with information about the physical location (e.g., a pin that identifies the physical location, as shown in FIG. 19F). As another example, in response to detecting a contact over the selectable description 2103 (FIG. 21B), the device opens a maps application (or an application that is capable of providing route guidance to a physical destination) and populates the maps application with information about the physical location (e.g., a pin that identifies the physical location, as shown in FIG. 19F, as well as directions to the physical location that were extracted based on speech provided during the voice communication).

In some embodiments, because the application is populated in response to the detection of the input, the populating is performed before receiving any additional user input within the application (e.g., the pins are populated into the maps application shown in FIG. 19F when the maps application opens and without requiring any user input within the maps application). In this way, the user is presented with the information about the physical location based only on information extracted from speech during the voice communication and the user does not provide any extra input to have the application populated with the information (in other words, the application is pre-populated with the information).

In some other embodiments, the detected geographic location is stored for displaying in an appropriate application whenever the user later opens an appropriate application (e.g., an application capable of accepting geographic location information) and, thus, no indication is provided to the user during the voice communication.

It should be understood that the particular order in which the operations in FIG. 20 have been described is merely one example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 1800) are also applicable in an analogous manner to method 2000 described above with respect to FIG. 20. For example, the operations described above with reference to method 2000 optionally are implemented or supplemented by the operations described herein with reference to other methods described herein (e.g., method 1800). Additionally, the details provided below in Section 4: "Structured Suggestions" may also be utilized in conjunction with method 2000 (e.g., the details discussed in section 4 related to detecting information about contacts and events in messages can be used to extract the same information from voice communications as well). In some embodiments, any relevant details from Sections 1-11 may be utilized for any suitable purpose in conjunction with method 2000. For brevity, these details are not repeated here.

FIGS. 22A-22B are a flowchart representation of a method of proactively suggesting physical locations for use in a messaging application, in accordance with some embodiments. FIGS. 23A-23O are used to illustrate the methods and/or processes of FIGS. 22A-22B. Although some of the examples which follow will be given with reference to inputs on a touch-sensitive display (in which a touch-sensitive surface and a display are combined), in some embodiments, the device detects inputs on a touch-sensitive surface 195 that is separate from the display 194, as shown in FIG. 1D.

In some embodiments, the method 2200 is performed by an electronic device (e.g., portable multifunction device 100, FIG. 1A, configured in accordance with any one of Computing Device A-D, FIG. 1E) and/or one or more components of the electronic device (e.g., I/O subsystem 106, operating system 126, etc.). In some embodiments, the method 2200 is governed by instructions that are stored in a non-transitory computer-readable storage medium and that are executed by one or more processors of a device, such as the one or more processors 122 of device 100 (FIG. 1A). For ease of explanation, the following describes method 2200 as performed by the device 100. In some embodiments, with reference to FIG. 1A, the operations of method 2200 are performed by or use, at least in part, a proactive module (e.g., proactive module 163) and the components thereof, a contact/motion module (e.g., contact/motion module 130), a graphics module (e.g., graphics module 132), and a touch-sensitive display (e.g., touch-sensitive display system 112). Some operations in method 2200 are, optionally, combined and/or the order of some operations is, optionally, changed.

As described below, the method 2200 provides an intuitive way to proactively suggest physical locations for use in a messaging application on an electronic device with a touch-sensitive display. The method reduces the number of inputs from a user in order to add relevant information about physical locations in a messaging application, thereby creating a more efficient human-machine interface. For battery-operated electronic devices, proactively suggesting physical locations for use in a messaging application both conserves power and increases the time between battery charges (e.g., by saving the time and energy-draining operations when a user has to aimlessly search for this information before entering it into a messaging application).

As shown in FIG. 22A, the electronic device presents (2201), in a messaging application on the display (e.g., email or iMessage application on a desktop, laptop, smart phone, or smart watch), a text-input field and a conversation transcript. In some embodiments, the conversation transcript includes messages exchanged between one or more users (such as email messages, text messages, audio messages, video messages, picture messages and the like). In some embodiments, the conversation transcript includes the text-input field (e.g., as shown in FIG. 23A, conversation transcript 2301 includes text typed by a user while drafting a new email response. In some embodiments, the conversation transcript and the text-input field are separate (e.g., as shown in FIG. 23C, conversation transcript 2303 is located substantially above a separate text-input field 2305 in which a user is able to draft a new message). In some embodiments (e.g., those in which the electronic device is in communication with a display and the display remains physically separate from the device, such as a desktop or smart TV device), presenting includes causing the display to present (e.g., the device provides information to the display so that the display is able to render the text-input field and the conversation transcript (and other user interface elements that are discussed below).

While the messaging application is presented on the display, the electronic device determines (2203) that the next likely input from a user of the electronic device is information about a physical location (e.g., an address, or the user's current location as determined by the device). In some embodiments, determining that the next likely input from the user of the electronic device is information about a physical location includes processing the content associated with the text-input field and the conversation transcript to detect that the conversation transcription includes (2205) a question about the user's current location (e.g., a second user sends a message asking the user "where are you," as shown in FIGS. 23A-23B and FIGS. 23C-23D). In some embodiments, processing the content includes applying (2207) a natural language processing algorithm to detect one or more predefined keywords that form the question. In some embodiments, the one or more keywords can be directly searched by the electronic device in the content associated with the text-input field and the conversation transcript, while in other embodiments, the one or more keywords are detected by performing semantic analysis to find comparable phrases to the one or more keywords (e.g., words that are a short semantic distance apart) and, in some embodiments, both of these techniques are used. In some embodiments, the question is included in a message that is received from a second user, distinct from the user (2209) (as shown in FIGS. 23A-23B and FIGS. 23C-23D).

In some embodiments, the electronic device analyzes (2211) the content associated with the text-input field and the conversation transcript to determine, based at least in part on a portion of the analyzed content (e.g., content from a most recently received message), a suggested physical location. In some embodiments, the suggested physical location corresponds (2213) to a location that the user recently viewed in an application other than the messaging application. (e.g., user starts typing "we should grab dinner at [auto-insert recently viewed address].") For example, the user was previously using a review-searching application (such as that shown in FIG. 25A) to search for restaurants and the device then uses information based on that search for restaurants in the review-searching application to identify the suggested physical location.

In some embodiments, the electronic device presents (2215), within the messaging application on the display, a selectable user interface element that identifies the suggested physical location. For example, the messaging application includes a virtual keyboard and the selectable user interface element is displayed in a suggestions portion that is adjacent to and above the virtual keyboard (2217). As shown in FIG. 23A, the suggestions portion 2307 includes a selectable user interface element that, when selected, causes the device to include the user's current location in the text-input field (as shown in FIG. 23B). In some embodiments, selection of the selectable UI element shown in 2307 causes the device to immediately send the user's current location to a remote user in a new message.

Turning now to FIG. 22B, in some embodiments, the electronic device receives (2219) a selection of the selectable user interface element. In response to receiving the selection, the electronic device presents (2221) in the text-input field a representation of the suggested physical location. In some embodiments, the representation of the suggested physical location includes information identifying a current geographic location of the electronic device (2223) (e.g., from a location sensor of the electronic device, GPS information is retrieved that identifies the current geographic location and that information is then presented in the representation (as shown in FIGS. 23B and 23D).) As shown in FIGS. 23B and 23D, in some embodiments, the representation of the suggested physical location is a maps object that includes an identifier for the suggested physical location (2227).

In some embodiments, the representation of the suggested physical location is an address (2225). For example, with reference to FIG. 23E, in response to detecting a selection of the selectable user interface element shown in suggestions portion 2307, the device updates the text-input field to include the address that was shown in the suggestions portion 2307. In some embodiments, the address may correspond to the user's own addresses (home, work, etc.), addresses of contacts stored in the device (as shown in FIGS. 23G-23H), addresses recently viewed by the user on the electronic device (e.g., restaurant locations viewed within some other application, as shown in FIG. 23F), an address sent to the user in this or other conversation transcripts, or an address shared with the user by other users (e.g., via email, a social networking application, etc.).

Figure 23E:
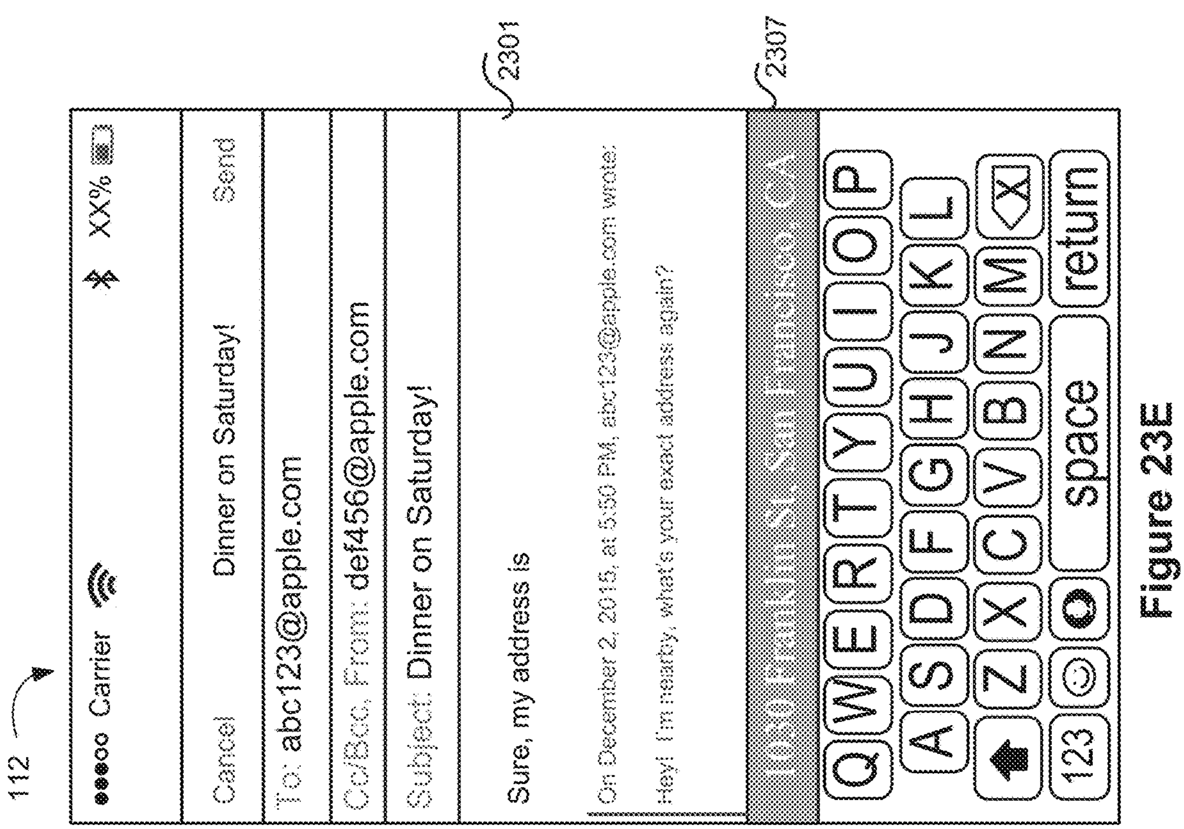
Figure 23F:
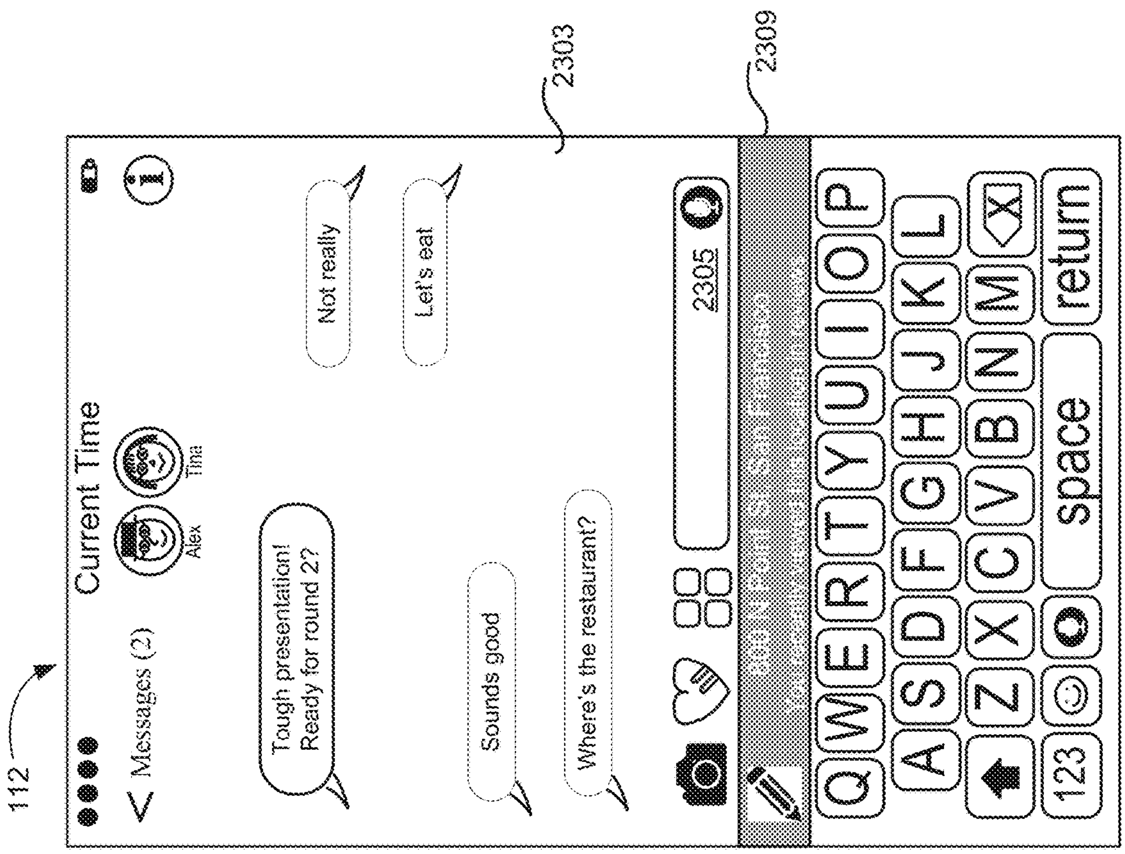
Figure 23H:
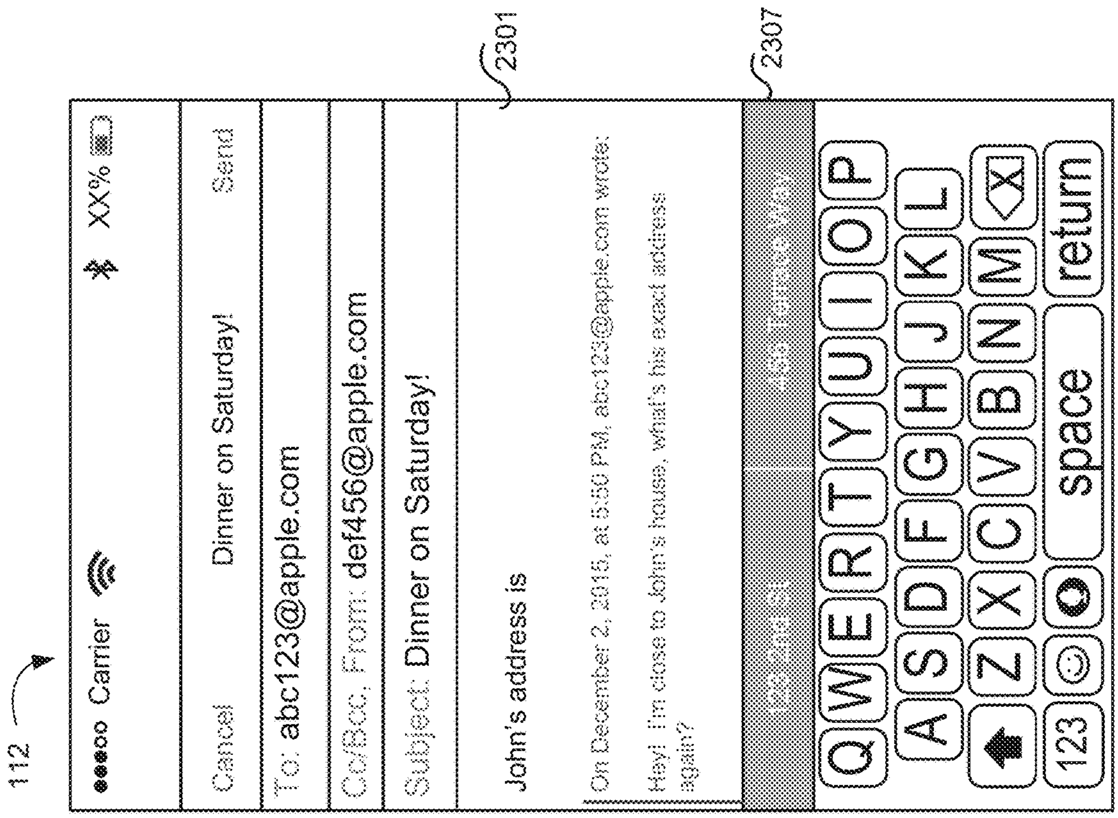
Figure 23G:
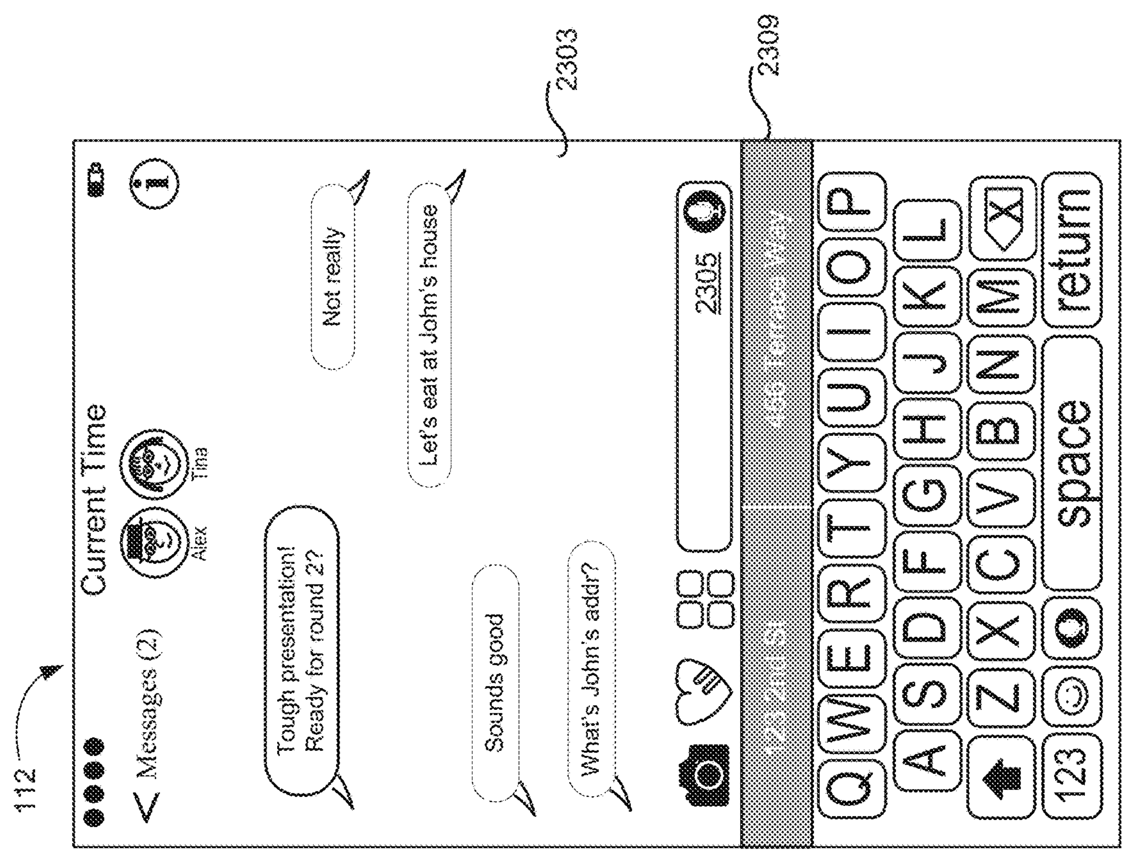

In some embodiments, in accordance with a determination that the user is typing (i.e., the user is continuing to enter text into the messaging application, such as via a virtual keyboard like the one shown in FIG. 23E) and has not selected the selectable user interface element (e.g., after a predefined period of time, such as 2 seconds, 3 seconds, 4 seconds, in which it is reasonably certain the user is not going to select the selectable user interface element), the device ceases (2229) to present the selectable user interface element. In some embodiments, once the user begins typing, the device ceases to present the selectable user interface element.

In some embodiments, determining that the next likely input from the user of the electronic device is information about a physical location includes monitoring typing inputs received from a user in the text-input portion of the messaging application. In such embodiments, the method further includes: while monitoring the typing inputs, determining whether any of the typing inputs match one or more triggering phrases, each triggering phrase having an association with a respective content item; in accordance with a determination that a sequence of the typing inputs matches a first triggering phrase, display, on the display, a suggested content item that is associated with the first triggering phrase; and detect a selection of the suggested content item and, in response to detecting the selection, display information about the suggested content item in the text-input portion of the messaging application. In some embodiments, in accordance with a determination that the user has provided additional input that indicates that the user will not select the selectable user interface element (e.g., continued keystrokes no longer match a trigger phrase), the electronic device ceases to present the selectable user interface element (2231).

In some embodiments, the device ceases to present the selectable user interface object in accordance with a determination that a predetermined period of time has passed since first displaying the selectable user interface object (e.g., 10 seconds).

Figure 23I:
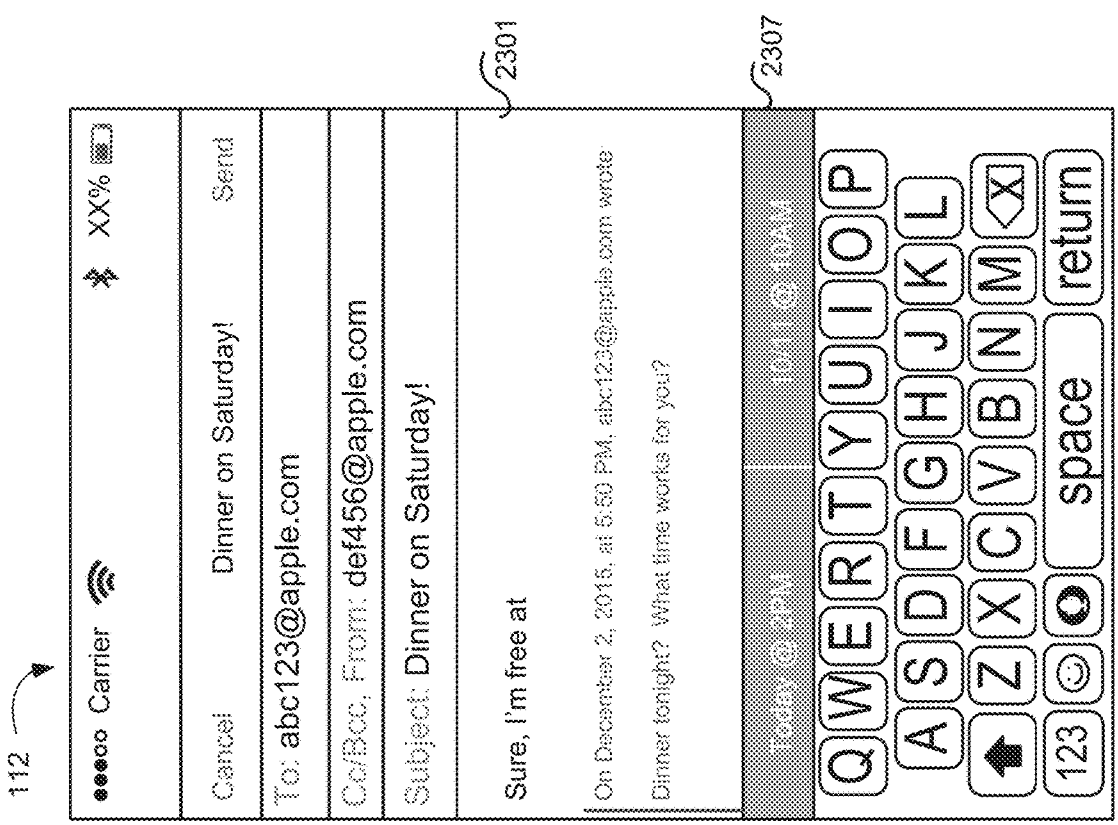
Figure 23J:
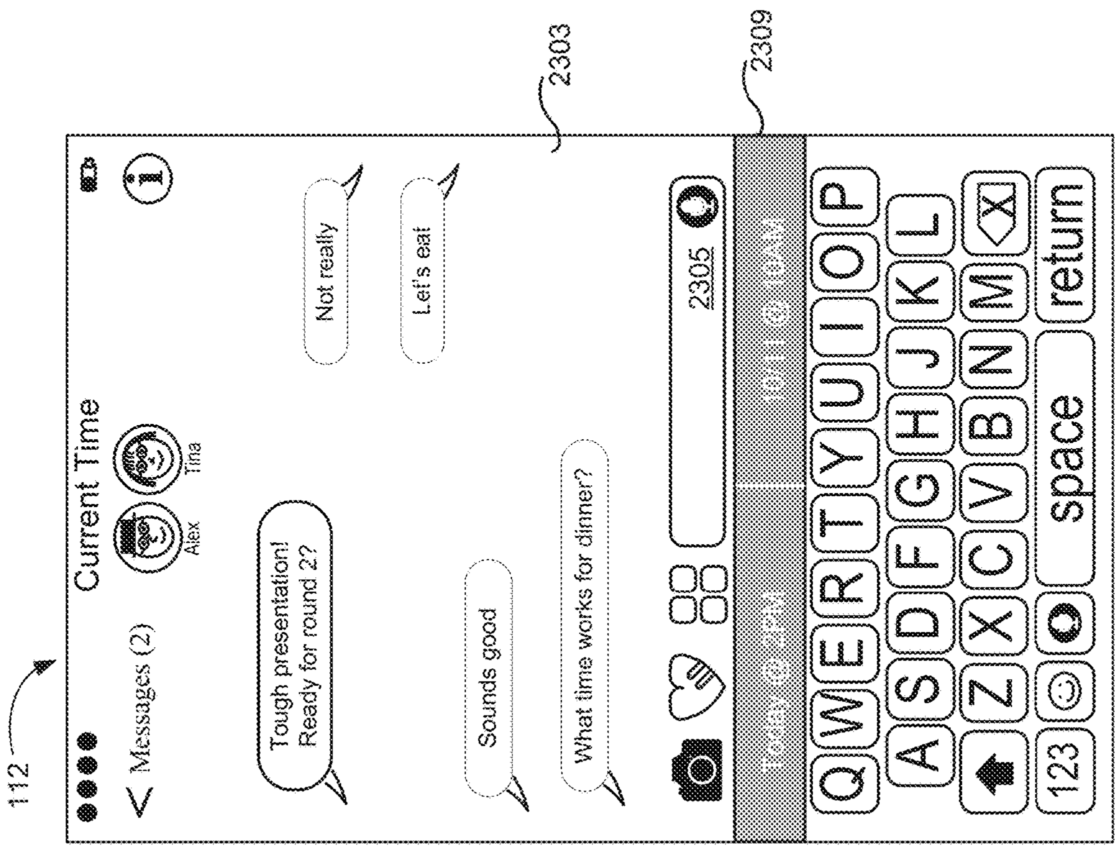
Figure 23L:
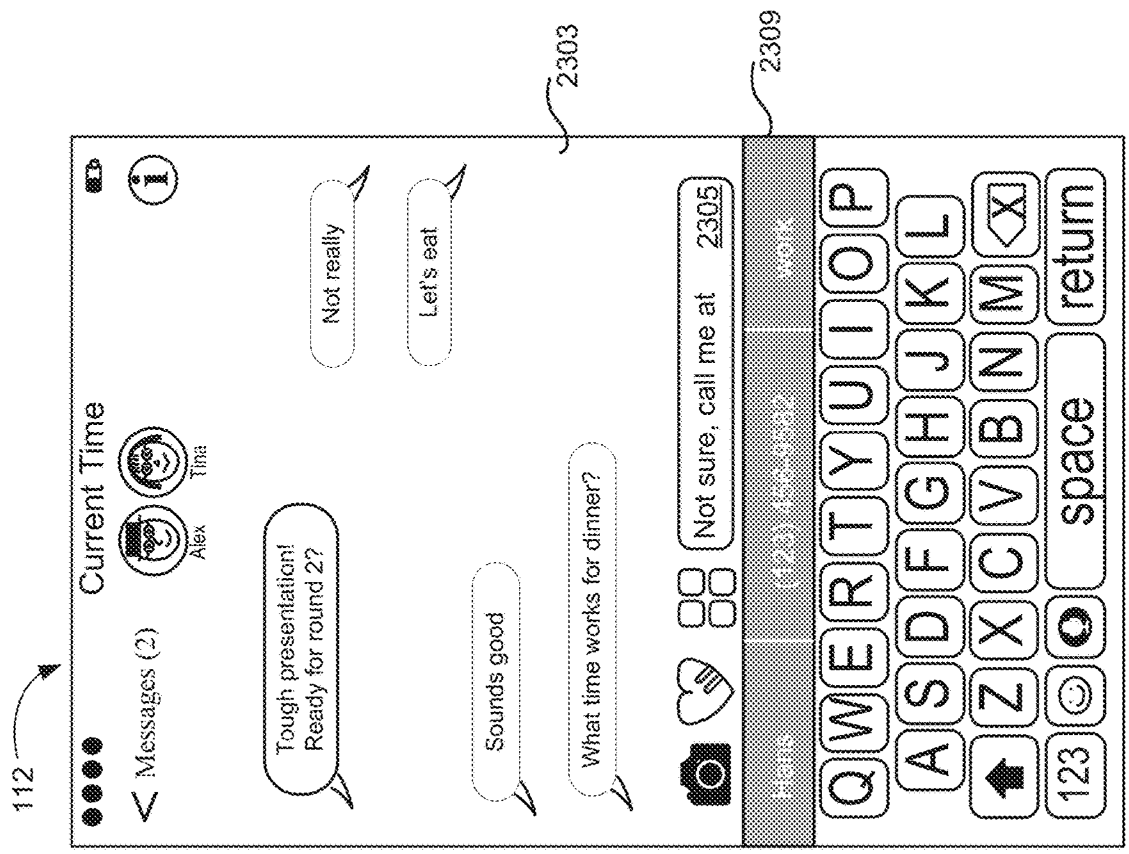
Figure 23K:
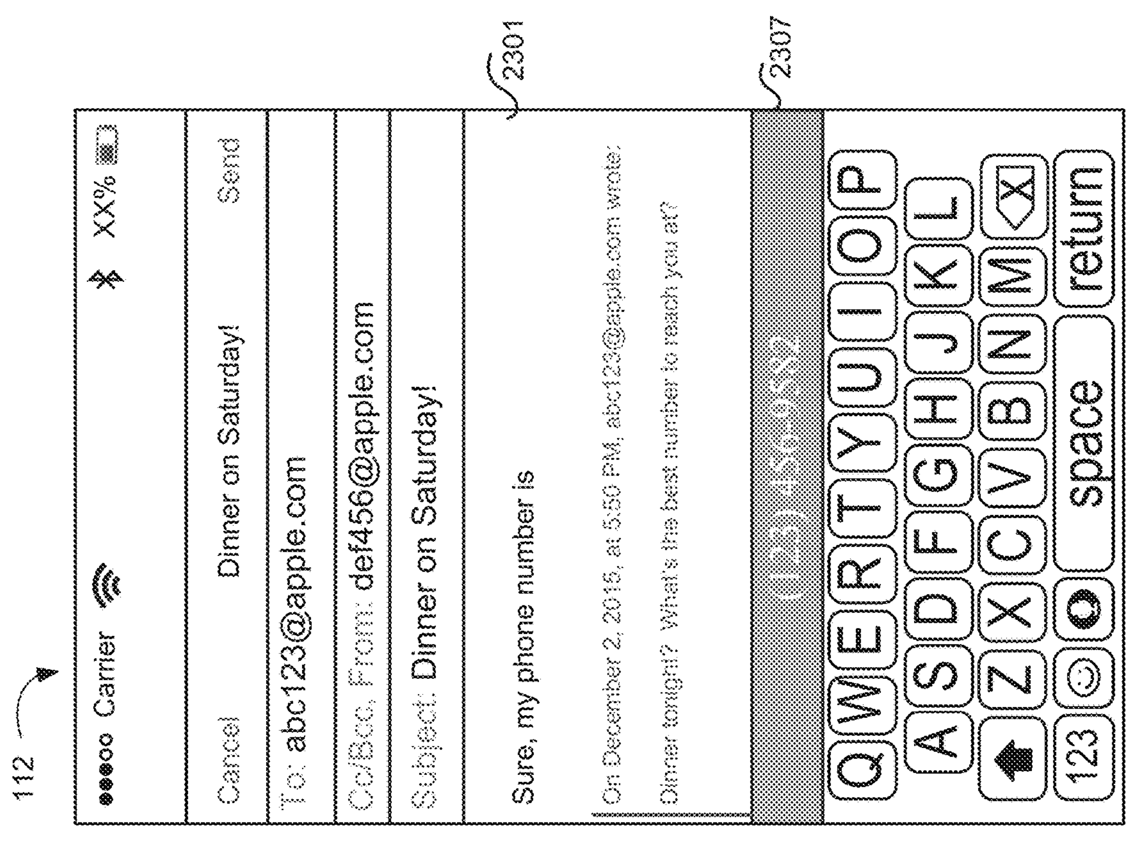
Figure 23N:
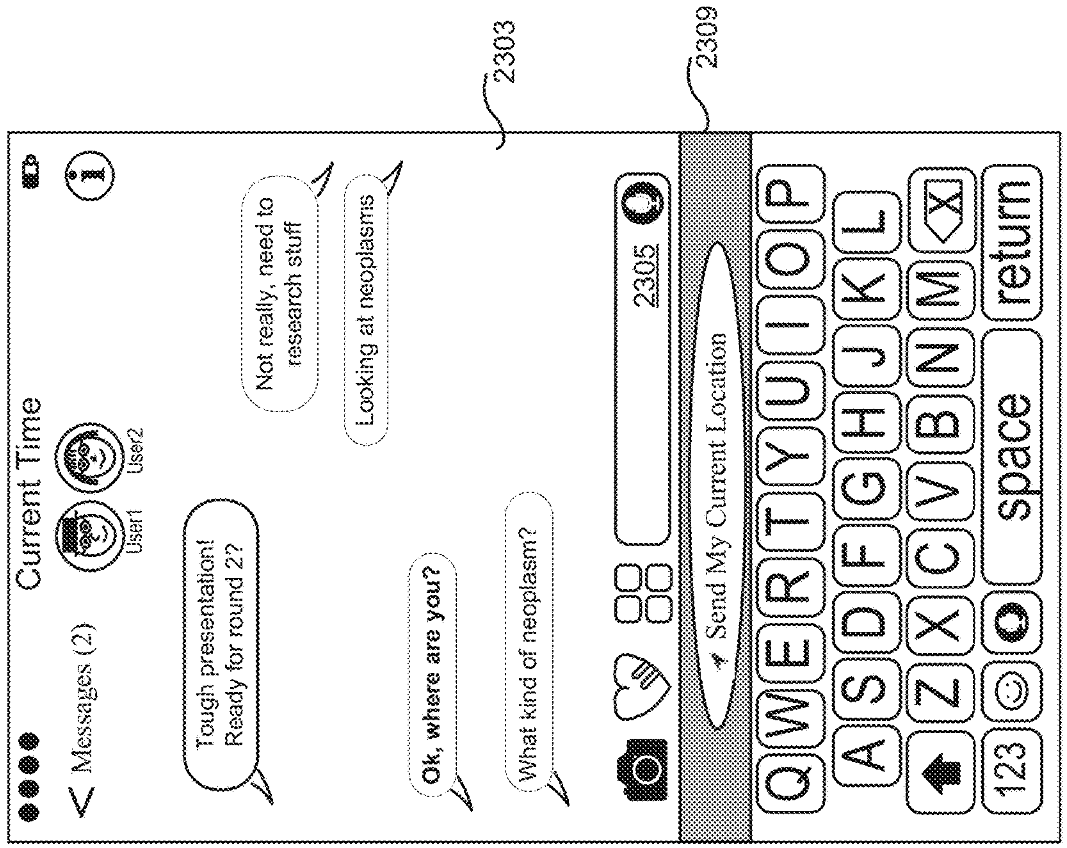
Figure 23M:
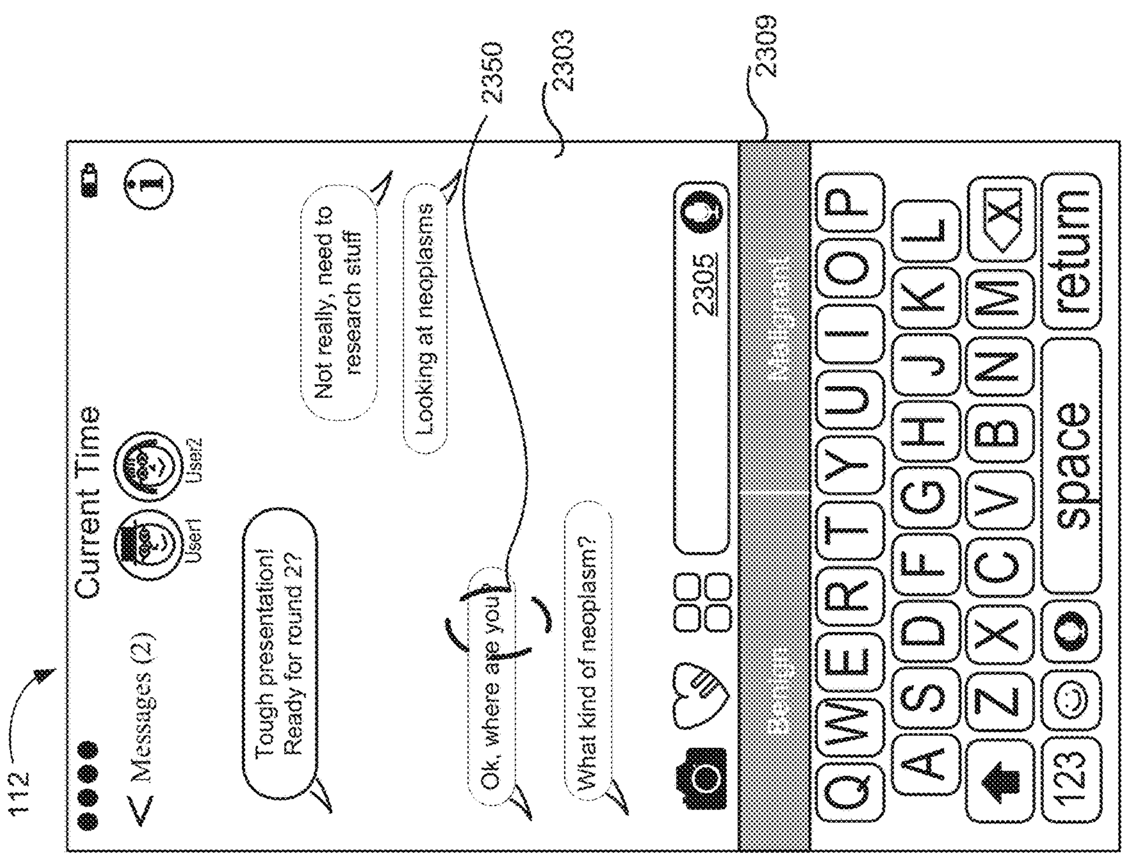
Figure 23O:
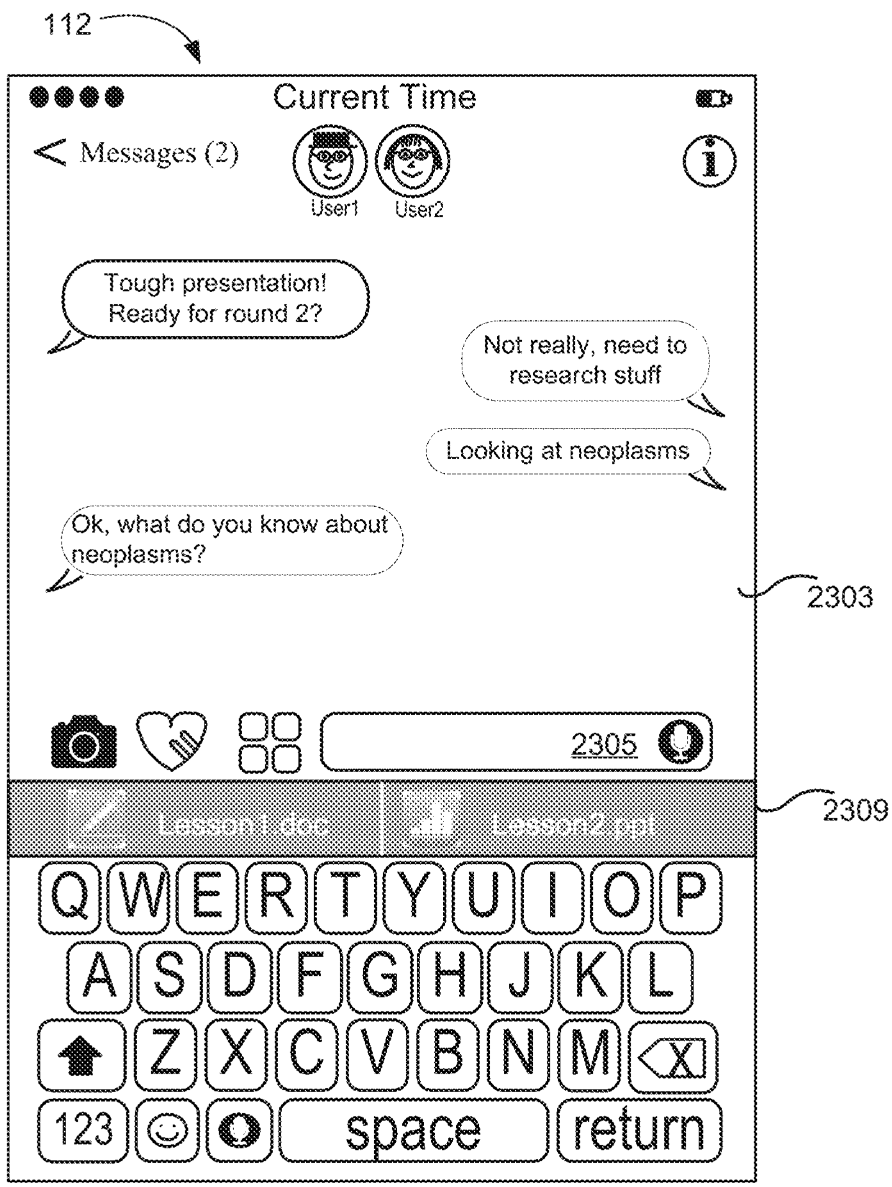

In some embodiments, techniques associated with the method 2200 are also available via additional types of applications (other than messaging applications, such as document-authoring applications) and for additional object types (in addition to physical locations, such as contacts and events). For example, as shown in FIGS. 23I and 23J, some embodiments also enable electronic devices to proactively suggest availability windows for scheduling events (discussed in more detail below in reference to FIG. 22C and method 2280). Additionally, as shown in FIGS. 23K-23J, some embodiments also enable electronic devices to proactively suggest contact information (such as phone numbers for the user or for contacts stored on the device) or to proactively suggest appropriate responses based on previous conversations (e.g., as shown in FIG. 23M) or to proactively suggest appropriate reference documents (e.g., as shown in FIG. 23O). Method 2280, below, also provides some additional details regarding other types of applications and additional object types. In some embodiments, various aspects of method 2200 and 2280 are combined, exchanged, and or interchanged.

It should be understood that the particular order in which the operations in FIGS. 22A-22B have been described is merely one example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 2280 and 2900) are also applicable in an analogous manner to method 2200 described above with respect to FIGS. 22A-22B. For example, the operations described above with reference to method 2200 optionally include one or more operations or features of the other methods described herein (e.g., methods 2280 and 2900). In some embodiments, any relevant details from Sections 1-11 may be utilized for any suitable purpose in conjunction with method 2200. For brevity, these details are not repeated here.

FIG. 22C is a flowchart representation of a method of proactively suggesting information that relates to locations, events, or contacts, in accordance with some embodiments. FIGS. 23A-23O are used to illustrate the methods and/or processes of FIG. 22C. Although some of the examples which follow will be given with reference to inputs on a touch-sensitive display (in which a touch-sensitive surface and a display are combined), in some embodiments, the device detects inputs on a touch-sensitive surface 195 that is separate from the display 194, as shown in FIG. 1D.

In some embodiments, the method 2280 is performed by an electronic device (e.g., portable multifunction device 100, FIG. 1A, configured in accordance with any one of Computing Device A-D, FIG. 1E) and/or one or more components of the electronic device (e.g., I/O subsystem 106, operating system 126, etc.). In some embodiments, the method 2280 is governed by instructions that are stored in a non-transitory computer-readable storage medium and that are executed by one or more processors of a device, such as the one or more processors 122 of device 100 (FIG. 1A). For ease of explanation, the following describes method 2280 as performed by the device 100. In some embodiments, with reference to FIG. 1A, the operations of method 2280 are performed by or use, at least in part, a proactive module (e.g., proactive module 163) and the components thereof, a contact/motion module (e.g., contact/motion module 130), a graphics module (e.g., graphics module 132), and a touch-sensitive display (e.g., touch-sensitive display system 112). Some operations in method 2280 are, optionally, combined and/or the order of some operations is, optionally, changed.

As described below, the method 2280 provides an intuitive way to proactively suggest information that relates to locations, events, or contacts on an electronic device with a touch-sensitive display. The method reduces the number of inputs required from users in order to locate information about contacts, locations, or events and input that information for use in an application, thereby creating a more efficient human-machine interface. For battery-operated electronic devices, proactively suggesting information that relates to locations, events, or contacts improves user satisfaction with electronic devices (by automatically recalling information and presenting it at relevant times to users for immediate user), conserves power, and increases the time between battery charges.

As shown in FIG. 22C, the electronic device presents (2281), on the display, textual content that is associated with an application. In some embodiments, the application is a document-authorizing application (e.g., notes application, word processing application, or the like) or a messaging application (such as an email or text messaging application), or any other application in which a virtual keyboard is displayed for inputting text to an input-receiving field).

In some embodiments, the device determines (2283) that a portion of the textual content relates to (or the portion of the textual content makes a reference to): (i) a location (e.g., current location information available via a location sensor of the electronic device), (ii) a contact (e.g., information available via a contacts application on the electronic device), or (iii) an event (e.g., information available via a calendar application on the electronic device). In some embodiments, the portion of the textual content is a statement/question that is best completed with information about a location, a contact, or an event (e.g., such as the examples shown in FIGS. 23A-23O). In some embodiments, the portion of the textual content corresponds (2285) to most recently presented textual content in the application (such as textual content that was typed by the user or textual content that was received in a message from a remote user). For example, the portion is current text typed by the user in a notes or messaging app (e.g., "Currently I'm at" in FIG. 23A, "My address is" in FIG. 23E, "John's address is" in FIG. 23H, "I'm free at" in FIG. 23I, "my phone number is" in FIG. 23K, "Call me at" in FIG. 23L, and "what kind of neoplasm" in FIG. 23M). Stated another way, the portion of the textual content is an input (i.e., a sequence of typing inputs) provided by the user of the electronic device at an input-receiving field (e.g., field 2305 of an instant messaging application, FIG. 23C, or field 2301 of an email application, FIG. 23A) within the application (e.g., the user is providing the sequence of typing inputs at a virtual keyboard or using dictation to add text to the input-receiving field).

In some embodiments, the portion of the textual content is a most recently received message from some other user in a conversation transcript. For example, the application is a messaging application and the portion of the textual content is a question received in the messaging application from a remote user of a remote device that is distinct from the electronic device (e.g., "where are you?" in FIG. 23C, "where's the restaurant?" in FIG. 23F, "What's John's addr?" in FIG. 23G, "what time works for dinner?" in FIG. 23J, and "Do you know about neoplasms?" in FIG. 23O).

In some embodiments, upon determining that the portion of the textual content relates to (i) a location (2289), (ii) a contact (2291), or (iii) an event (2293), the electronic device proceeds to identify an appropriate content item that is available on the electronic device (in some embodiments, without having to retrieve any information from a server) and to present that content item to the user for use in the application (e.g., to respond to a question or to efficiently complete the user's own typing inputs). In this way, users are able to quickly and easily include information about contacts, events, and locations in applications, without having to leave a current application, search for appropriate content, copy or remember that content, return to the current application, and then include that content in the current application (thereby reducing a number of inputs required for a user to include information about contacts, events, and locations in applications).

More specifically, as to (i), upon determining that the portion of the textual content relates to a location, the electronic device obtains (2289) location information from a location sensor on the electronic device and prepares the obtained location information for display as a predicted content item. For example, based on the portion of the textual content including the phrase "Where are you?" in a message received from a remote user (as shown in FIG. 23C), the device determines that the portion relates to a location and the device then obtains information from a GPS sensor on the device and prepares that information for presentation as the predicted content item (see FIG. 23D in which a maps object that includes the user's current location is sent to the remote user). As another example, based on the portion of the textual content including the phrase "I'm at" as the user is typing a new email (as shown in FIG. 23A), the device determines that the portion relates to a location and the device then obtains information from a GPS sensor on the device and prepares that information for presentation as the predicted content item (see FIG. 23B in which a maps object that includes the user's current location is included in the new email that the user is preparing). Additional examples are shown in FIG. 23E (e.g., the device determines that the portion of the textual content includes information that relates to a location based on the user typing "My address is") and 23F (e.g., the device determines that the portion of the textual content includes information that relates to a location based on the user receiving a message that includes the text "Where's the restaurant"). As shown in FIG. 23F, in some embodiments, the device obtains the location information based on the user's previous interactions with a different application (e.g., the user searching for restaurant applications in a different application, such as an application that provides crowd-sourced reviews, and, thus, the location sensor is not used to obtain the information). Additional details regarding sharing information between two different applications is discussed in more detail below in reference to methods 2400, 2500, and 2800, for brevity those details are not repeated here.

As to (ii), upon determining that the portion of the textual content relates to a contact, the electronic device conducts (2291) a search on the electronic device for contact information related to the portion of the textual content and prepares information associated with at least one contact, retrieved via the search, for display as the predicted content item. For example, the portion of the textual content is "What's John's addr?" (FIG. 23G), "John's address is" (FIG. 23H) or "My phone number is" (FIG. 23K) or "Call me at" (FIG. 23L) and the device analyzes contact information stored with the contacts application to retrieve contact information that is predicted to be responsive to the portion and provides that retrieved contact information as the predicted content item.

As to (iii), upon determining that the portion of the textual content relates to an event, the electronic device conducts a new search (2293) on the electronic device for event information related to the portion of the textual content and prepares information that is based at least in part on at least one event, retrieved via the new search, for display as the predicted content item. In some embodiments, the information that is based at least in part on the at least one event could be event details (such as event time, duration, location) or information derived from event details (such as a user's availability for scheduling a new event, as shown in FIGS. 23I and 23J). For example, the portion of the textual content is "What conference room is the meeting in?" or "What time does the conference start at?" and the device analyzes information associated with events stored with the calendar application to retrieve information that is responsive to the question and provides that retrieved information as the predicted content items.

As discussed above, the electronic device, displays (2294), within the application, an affordance that includes the predicted content item (e.g., affordance for "Add Current Location" is shown within suggestions portion 2307, FIG. 23A, affordance for "Send My Current Location" is shown within suggestions portion 2309, FIG. 23C, etc. for other example affordances shown within suggestions portions 2307 or 2309 in FIGS. 23E, 23F, 23G, 23H, 23I, 23J, 23K, 23L, 23M, 23N, and 23O). The electronic device also detects (2295), via the touch-sensitive surface, a selection of the affordance; and, in response to detecting the selection, the device displays (2297) information associated with the predicted content item on the display adjacent to the textual content (e.g., a maps object with the user's current location is displayed in response to selection of the affordance for "Add Current Location" (FIG. 23B)).

In some embodiments, the portion of the textual content is identified in response to a user input selecting a user interface object that includes the portion of the textual content (2287). For example, the application is a messaging application and the user interface object is a messaging bubble in a conversation displayed within the messaging application. In this way, users are able to retrieve predicted content items for specific portions displayed in the application, so that if they forget to respond to a particular portion, they are able to select a user interface object associated with that portion in order to easily view predicted content items for that specific portion. As a specific example, with reference to FIG. 23M, the portion of the textual content is initially the most recently displayed textual content (e.g., "What kind of neoplasm?") and, thus, the suggestions portion 2309 includes affordances for textual suggestions that are responsive to that portion (e.g., "benign" and "malignant"). The device then detects a selection (e.g., input 2350, FIG. 23M) of a second user interface object (e.g., a second message bubble that includes textual content of "btw, where are you?" that was received before the most recently display textual content). In response to detecting the selection, the device: ceases to display the affordance with the predicted content item and determines that textual content associated with the second user interface object relates to a location, a contact, or an event (in this example, the device determines that "where are you?" relates to a location) and, in accordance with the determining, the device displays a new predicted content item within the application (e.g., an affordance that includes "Send my current location" within the suggestions portion 2309, FIG. 23N) (2299).

As noted in the preceding paragraph, in some embodiments, the device is also able to determine whether the portion of the textual content relates to other types (in addition to contacts, locations, and events) of information available on the electronic device. For example, the device is able to detect a question (e.g., what kind of neoplasm) that relates to information that has been discussed by the user in an exchange of emails, in a document that the user is authoring or received from some other user, or information from other knowledge sources. Additionally, in some embodiments, the electronic device determines that documents are responsive to a particular portion of textual content in an application (e.g., as shown in FIG. 23O, two different documents are suggested as being responsive to a question of "Do you know about neoplasms?"). In some embodiments, in response to a selection of either of the two different documents, the device may open up a respective document and allow the user to review the document before returning to the application.

In some embodiments, the affordances that are displayed within the suggestions portions and that include the predicted content items are displayed adjacent to (e.g., above) a virtual keyboard within the application. For example, as shown in FIG. 23A, the affordance for "Add Current Location" is displayed in a suggestions portion 2307 above the virtual keyboard.

In some embodiments, the information that is associated with the predicted content item and is displayed adjacent to the textual content is displayed in an input-receiving field, and the input-receiving field is a field that displays typing inputs received at the virtual keyboard (e.g., a document such as that shown in a Notes application or an input-receiving field that is displayed above a virtual keyboard, such as in a messaging application, as shown for input-receiving field 2305 in FIG. 23D, in which field 2305 is above the virtual keyboard).

In some embodiments, the determining operation 2283 includes parsing the textual content as it is received by the application (e.g., as the user types or as messages are received by the application) to detect stored patterns that are known to relate to a contact, an event, and/or a location. In some embodiments, a neural network is trained to perform the detection of stored patterns and/or a finite state grammar is used for detection, and then after detection, the electronic device passes information to a system-level service (e.g., using one or more predictive models, discussed below in Section 9) to retrieve appropriate predicted content items.

It should be understood that the particular order in which the operations in FIG. 22C have been described is merely one example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 2200 and 2900) are also applicable in an analogous manner to method 2280 described above with respect to FIG. 22C. For example, the operations described above with reference to method 2280 optionally have one or more characteristics or use one or more of the operations described herein with reference to other methods described herein (e.g., methods 2200 and 2900). In some embodiments, any relevant details from Sections 1-11 may be utilized for any suitable purpose in conjunction with method 2280. For brevity, these details are not repeated here.

FIG. 24A-24B are a flowchart representation of a method of proactively populating an application with information that was previously viewed by a user in a different application, in accordance with some embodiments. FIGS. 25A-25J are used to illustrate the methods and/or processes of FIGS. 24A-24B. Although some of the examples which follow will be given with reference to inputs on a touch-sensitive display (in which a touch-sensitive surface and a display are combined), in some embodiments, the device detects inputs on a touch-sensitive surface 195 that is separate from the display 194, as shown in FIG. 1D.

In some embodiments, the method 2400 is performed by an electronic device (e.g., portable multifunction device 100, FIG. 1A, configured in accordance with any one of Computing Device A-D, FIG. 1E) and/or one or more components of the electronic device (e.g., I/O subsystem 106, operating system 126, etc.). In some embodiments, the method 2400 is governed by instructions that are stored in a non-transitory computer-readable storage medium and that are executed by one or more processors of a device, such as the one or more processors 122 of device 100 (FIG. 1A). For ease of explanation, the following describes method 2400 as performed by the device 100. In some embodiments, with reference to FIG. 1A, the operations of method 2400 are performed by or use, at least in part, a proactive module (e.g., proactive module 163) and the components thereof, a contact/motion module (e.g., contact/motion module 130), a graphics module (e.g., graphics module 132), and a touch-sensitive display (e.g., touch-sensitive display system 112). Some operations in method 2400 are, optionally, combined and/or the order of some operations is, optionally, changed.

As described below, the method 2400 provides an intuitive way to proactively populate an application with information that was previously viewed by a user in a different application on an electronic device with a touch-sensitive display. The method reduces the number of inputs from a user in order to use application from a first application in a second, different application, thereby creating a more efficient human-machine interface. For battery-operated electronic devices, proactively populating an application with information that was previously viewed by a user in a different application both conserves power and increases the time between battery charges.

As shown in FIG. 24A, while displaying a first application, the electronic device obtains (2401) information identifying a first physical location viewed by a user in the first application. For example, the first application is a foreground application that is currently displayed on the touch-sensitive display (e.g., the first application is an application that provides crowd-sourced reviews, such as that shown in FIG. 25A). In some embodiments, obtaining includes the first application sending the information about the location data to an operating system component of the electronic device or obtaining includes using an accessibility feature to obtain the information. Details regarding use of an accessibility feature to obtain the information are provided above (see, e.g., descriptions provided above in reference to method 1800, in particular, those provided above in reference to operations 1807 and 1809.

In some embodiments, the electronic device exits (2403) the first application (e.g., the user taps a home hardware button to request exiting of the first application and viewing of a home screen or the user double taps the home hardware button to request exiting of the first application and view of an application-switching user interface). After exiting the first application, the electronic device receives (2405) a request from the user to open a second application that is distinct from the first application. In some embodiments, receiving the request to open the second application includes, after exiting the first application, detecting (2407) an input over an affordance for the second application (in other words, the request does not correspond to clicking on a link within the first application). For example, the user selects the second application from the home screen (2409) (e.g., user taps over an icon (the affordance) for a ride-sharing application displayed on the home screen, FIG. 25B). In some embodiments, the home screen is a system-level component of the operating system that includes icons for invoking applications that are available on the electronic device.

As another example, the user selects the second application from the app-switching user interface (e.g., user taps a representation of a ride-sharing application that is included in the app-switching user interface, FIG. 25C). More specifically in this another example, detecting the input includes: detecting a double tap at a physical home button (e.g., home 204), in response to detecting the double tap, displaying an application-switching user interface, and detecting a selection of the affordance from within the application-switching user interface (2411).

As one additional example with respect to operation 2405, the user selects a user interface object that, when selected, causes the device to open the second application (e.g., affordance 2503, FIGS. 25B and 25C). In some embodiments, the request is received without receiving any input at the first application (e.g., the request does not including clicking a link or a button within the first application).

In response to receiving the request, the electronic device determines (2413) whether the second application is capable of accepting geographic location information. In some embodiments, this determining operation 2413 includes (2415) one or more of: (i) determining that the second application includes an input-receiving field that is capable of accepting and processing geographic location data; (ii) determining that the second application is capable of displaying geographic location information on a map; (iii) determining that the second application is capable of using geographic location information to facilitate route guidance; and (iv) determining that the second application is capable of using geographic location information to locate and provide transportation services. In some embodiments, determining that the second application is capable of accepting geographic location information includes determining that the second application includes an input-receiving field that is capable of accepting and processing geographic location data, and the input-receiving field is a search box that allows for searching within a map that is displayed within the second application. For example, the second application is a ride-sharing application that includes such an input-receiving field (as shown in FIG. 25E, the example ride-sharing application includes an input-receiving field 2507 that allows for searching within a displayed map) or the second application is a maps application that also includes such an input-receiving field (as shown in FIG. 25F).

Turning now to FIG. 24B, in some embodiments, in response to receiving the request, the electronic device determines, based on an application usage history for the user, whether the second application is associated (e.g., has been opened a threshold number of times after opening the first application) with the first application and also determines that the second application is capable of accepting and processing location data (as discussed above). In other words, the electronic device in some embodiments, determines both that the second application has a field that accepts location data and that the first and second applications are connected by virtue of the user often opening the second application after having opened the first application. In some embodiments, before presenting the second application, the electronic device provides (2417) access to the information identifying the first physical location to the second application, and before being provided with the access the second application had no access to the information identifying the first physical location. For example, the second application previously had no access to information about what the user was viewing in the first application and is only now provided access for the limited purpose of using the information identifying the first geographic location to populate an input-receiving field in the second application. In this way, because the device knows that the user often uses the first and second applications together, the device is able to proactively populate text entry fields without requiring any input from the user (other than those inputs used to establish the connection between the first and second apps).

In some embodiments, in response to receiving the request and in accordance with the determination (discussed above in reference to operations 2413 and 2415) that the second application is capable of accepting geographic location information (2419), the electronic device presents the second application, and presenting the second application includes populating the second application with information that is based at least in part on the information identifying the first physical location. In some embodiments, populating the second application includes (2421) displaying a user interface object that includes information that is based at least in part on the information identifying the first physical location. For example, as shown in FIG. 25D, user interface object 2505 includes information that is based at least in part on the information identifying the first physical location (e.g., an address 2501 for a restaurant viewed by the user in the first application, as shown in FIG. 25A). In some embodiments, the user interface object 2505 may include a name of the restaurant (e.g., "Gary Danko" instead of or in addition to the address, or the UI object 2505 may include other relevant information about the restaurant's location). In some embodiments, the user interface object includes (2423) a textual description informing the user that the first physical location was recently viewed in the first application (e.g., an icon that is associated with the first application is included in the user interface object 2505, as shown in FIG. 25D).

In some embodiments, the user interface object is a map displayed within the second application (e.g., the map shown in FIG. 25D) and populating the second application includes populating the map to include an identifier of the first physical location (2425). In some embodiments, the electronic device looks up a specific geographic location using a name of the first physical location, a phone number for the first physical location, an address for the first physical location, or some other information that identifies (and allows for conducting a search about) the first physical location and that specific geographic location is populated into the second application. In some embodiments, the second application is presented (2427) with a virtual keyboard and the user interface object is displayed above the virtual keyboard (e.g., as shown in FIG. 25D, the user interface object 2505 is display above the virtual keyboard).

In some embodiments, obtaining the information includes (2429) obtaining information about a second physical location and displaying the user interface object includes displaying the user interface object with the information about the second physical location. (e.g., the map includes identifiers for both the first and second physical locations) and/or the affordance includes information about the first and second physical locations. In some embodiments, receiving the request (e.g., operation 2405) includes receiving a request to open the second application with information about one of the first or the second physical locations (e.g., a user interface object 2505, such as that shown in FIGS. 25G and 25H is shown and the user is able to select either of the physical locations that were previously viewed in the first application).

In some embodiments, a user's search within a maps application may also be used to obtain information about physical locations (e.g., the first and second physical locations discussed above). As shown in FIG. 25F, a user may search for a location and receive a number of search results, including results 2511A, 2511B, 2511C, and 2511D. In some embodiments, the user is able to select one of the results, such as 2511A as shown in FIG. 25F and that location is then highlighted on a map (2509). After conducting the search, the user may be presented with options for utilizing the physical locations that were part of the search results (e.g., as shown in FIG. 25G, a user interface object 2505 is presented with options to use information that is based on at least two of the physical locations for obtaining a ride to either of these locations). In some embodiments, the user interface object 2505 of FIG. 25G is also available via an application-switching user interface (as shown in FIG. 25H). In some embodiments, in response to receiving a selection of one of the physical locations shown in the user interface object 2505 (from either the app-switching or home screen of FIG. 25G or 25H), the user is taken to an appropriate application (e.g., a ride-sharing application, FIG. 25I) and that application is populated with information based on the selected physical location (e.g., user interface object 2505 is shown in FIG. 25I and includes an address).

Sharing of location data is used as a primary example in explaining method 2400 above, however, the same method and techniques discussed above also applies to sharing of other types of data between two different applications. For example, sharing search queries between social networking applications (e.g., Facebook) and social sharing applications (e.g., Twitter) is also facilitating by using the techniques described above in reference to method 2400. For example, after the user searches a name in Facebook, the user is provided with a suggestion to also search that same name in Twitter. As another example, attendees lists for upcoming meetings can be shared between calendar and email applications, so that if the user was viewing an upcoming meeting in a calendar application and then they switch to using an email application and they hit a "compose" button, the recipients list for the new email is populated to include the list of attendees for the upcoming meeting.

It should be understood that the particular order in which the operations in FIGS. 24A-24B have been described is merely one example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 2600 and 2700) are also applicable in an analogous manner to method 2400 described above with respect to FIGS. 24A-24B. For example, the operations described above with reference to method 2400 optionally have one or more characteristics of or incorporate operations described herein with reference to other methods described herein (e.g., methods 2600 and 2700). In some embodiments, any relevant details from Sections 1-11 may be utilized for any suitable purpose in conjunction with method 2400. For brevity, these details are not repeated here.

FIG. 26A-26B are a flowchart representation of a method of proactively suggesting information that was previously viewed by a user in a first application for use in a second application, in accordance with some embodiments. FIGS. 25A-25J are used to illustrate the methods and/or processes of FIGS. 26A-26B. Although some of the examples which follow will be given with reference to inputs on a touch-sensitive display (in which a touch-sensitive surface and a display are combined), in some embodiments, the device detects inputs on a touch-sensitive surface 195 that is separate from the display 194, as shown in FIG. 1D.

In some embodiments, the method 2600 is performed by an electronic device (e.g., portable multifunction device 100, FIG. 1A, configured in accordance with any one of Computing Device A-D, FIG. 1E) and/or one or more components of the electronic device (e.g., I/O subsystem 106, operating system 126, etc.). In some embodiments, the method 2600 is governed by instructions that are stored in a non-transitory computer-readable storage medium and that are executed by one or more processors of a device, such as the one or more processors 122 of device 100 (FIG. 1A). For ease of explanation, the following describes method 2600 as performed by the device 100. In some embodiments, with reference to FIG. 1A, the operations of method 2600 are performed by or use, at least in part, a proactive module (e.g., proactive module 163) and the components thereof, a contact/motion module (e.g., contact/motion module 130), a graphics module (e.g., graphics module 132), and a touch-sensitive display (e.g., touch-sensitive display system 112). Some operations in method 2600 are, optionally, combined and/or the order of some operations is, optionally, changed.

As described below, the method 2600 provides an intuitive way to proactively suggesting information that was previously viewed by a user in a first application for use in a second application on an electronic device with a touch-sensitive display. The method creates more efficient human-machine interface by recalling useful information for users, without requiring users to perform a number of inputs in order to retrieve that information. For battery-operated electronic devices, proactively suggesting information that was previously viewed by a user in a first application for use in a second application both conserves power and increases the time between battery charges.

As shown in FIG. 26A, the electronic device obtains (2601) information identifying a first physical location viewed by a user in a first application. Details described above in reference to operation 2401 are application to operation 2601 as well. The electronic device detects (2603) a first input. In some embodiments, the first input corresponds (2605) to a request to open an application-switching user interface (e.g., the first input is a double tap on a physical home button of the electronic device). In some embodiments, the first input corresponds (2607) to a request to open a home screen of the electronic device. (e.g., the first input is a single tap on a physical home button of the electronic device). In some embodiments, the first input is an input that causes the device to at least partially exit or switch applications.

In response to detecting the first input, the electronic device identifies (2609) a second application that is capable of accepting geographic location information. In some embodiments, identifying that the second application that is capable of accepting geographic location information includes (2611) one or more of: (i) determining that the second application includes an input-receiving field that is capable of accepting and processing geographic location data; (ii) determining that the second application is capable of displaying geographic location information on a map; (iii) determining that the second application is capable of using geographic location information to facilitate route guidance; and (iv) determining that the second application is capable of using geographic location information to locate and provide transportation services. In some embodiments, identifying that the second application is capable of accepting geographic location information includes determining that the second application includes an input-receiving field that is capable of accepting and processing geographic location data, and the input-receiving field is a search box that allows for searching within a map that is displayed within the second application.

In response to detecting the first input, (in addition to identifying the second application) the electronic device presents (2613) over at least a portion of the display, an affordance that is distinct from the first application with a suggestion to open the second application with information about the first physical location. For example, if the first input corresponds to a request to open the home screen, then the electronic device presents over a portion of the home screen (2617) (e.g., affordance 2505 is displayed over a top portion of the home screen, as shown in FIG. 25B and FIG. 25G). As another example, if the first input corresponds to a request to open the application-switching user interface, then the electronic device presents the affordance within the application-switching user interface (2615) (e.g., the affordance is presented in a region of the display that is located below representations of applications that are executing on the electronic device, as shown for affordance 2505 in FIG. 25H). In some embodiments, the suggestion includes (2619) a textual description that is specific to a type associated with the second application (e.g., either a description of an action to be performed in the second application using the information identifying the first physical location or a description of conducting a search within the second application, e.g., do you want a ride to location X? versus do you want to look up address X?) In some embodiments, the type associated with the second application is determined based on functions available via the second application (e.g., how the second application uses location information and what functions are available based on the second application's use of location information).

Turning now to FIG. 25B, the electronic device detects (2621) a second input at the affordance. In response to detecting the second input at the affordance, the electronic device (2623) opens the second application and populates the second application to include information that is based at least in part on the information identifying the first physical location. In some embodiments, populating the second application includes (2625) displaying a user interface object that includes information that is based at least in part on the information identifying the first physical location. Operations 2627, 2629, and 2631 correspond to operations 2423, 2425, and 2427, respectively, discussed above in reference to method 2400 and the above discussions apply as well to method 2600 (for brevity, these details are not repeated here). In some embodiments, the electronic device obtains (2633) information identifying each of a plurality of physical locations in addition to the first physical location and the device populates the second application with information that is based at least in part on the obtained information identifying each of the plurality of physical locations.

As compared to method 2400, method 2600 does not receive a specific request from the user to open the second application before providing a suggestion to the user to open the second application with information about the first physical location. In this way, by making operations associated with both methods 2400 and 2600 (and combinations thereof using some processing steps from each of these methods), the electronic device is able to provide an efficient user experience that allows for predictively using location data either before or after a user has opened an application that is capable of accepting geographic location information. Additionally, the determination that the second application is capable of accepting geographic location information (in method 2600) is conducted before even opening the second application, and in this way, the application-switching user interface only suggests opening an app with previously viewed location info if it is known that the app can accept location data. For brevity, some details regarding method 2400 have not been repeated here for method 2600, but such details are still applicable to method 2600 (such as that the first and second applications might share location data directly).

It should be understood that the particular order in which the operations in FIGS. 26A-26B have been described is merely one example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 2400 and 2700) are also applicable in an analogous manner to method 2600 described above with respect to FIGS. 26A-26B. For example, the operations described above with reference to method 2600 optionally have one or more of the characteristics of operations or use operations described herein with reference to other methods described herein (e.g., methods 2400 and 2700). In some embodiments, any relevant details from Sections 1-11 may be utilized for any suitable purpose in conjunction with method 2600. For brevity, these details are not repeated here.

FIG. 27 is a flowchart representation of a method of proactively suggesting a physical location for use as a destination for route guidance in a vehicle, in accordance with some embodiments. FIG. 28 is used to illustrate the methods and/or processes of FIG. 27. Although some of the examples which follow will be given with reference to inputs on a touch-sensitive display (in which a touch-sensitive surface and a display are combined), in some embodiments, the device detects inputs on a touch-sensitive surface 195 that is separate from the display 194, as shown in FIG. 1D.

In some embodiments, the method 2700 is performed by an electronic device (e.g., portable multifunction device 100, FIG. 1A, configured in accordance with any one of Computing Device A-D, FIG. 1E) and/or one or more components of the electronic device (e.g., I/O subsystem 106, operating system 126, etc.). In some embodiments, the method 2700 is governed by instructions that are stored in a non-transitory computer-readable storage medium and that are executed by one or more processors of a device, such as the one or more processors 122 of device 100 (FIG. 1A). For ease of explanation, the following describes method 2700 as performed by the device 100. In some embodiments, with reference to FIG. 1A, the operations of method 2700 are performed by or use, at least in part, a proactive module (e.g., proactive module 163) and the components thereof, a contact/motion module (e.g., contact/motion module 130), a graphics module (e.g., graphics module 132), and a touch-sensitive display (e.g., touch-sensitive display system 112). Some operations in method 2700 are, optionally, combined and/or the order of some operations is, optionally, changed.

As described below, the method 2700 provides an intuitive way to proactively suggest a physical location for use as a destination for route guidance in a vehicle on an electronic device with a touch-sensitive display. The method creates more efficient human-machine interface by requiring fewer (or no) inputs in order to use a physical location for route guidance. For battery-operated electronic devices, proactively suggesting a physical location for use as a destination for route guidance in a vehicle both conserves power and increases the time between battery charges.

As shown in FIG. 27, the electronic device obtains (2701) information identifying a first physical location viewed by a user in a first application that is executing on the electronic device. The electronic device determines (2703) that the user has entered a vehicle. In some embodiments, determining that the user has entered the vehicle includes detecting that the electronic device has established a communications link with the vehicle (2705). In other embodiments, determining that the user has entered the vehicle may include detecting that a user is within a predetermined distance of a stored location for the vehicle, so that the user is prompted about using the first geographic location as a destination for route guidance before they even enter the car. In some embodiments, any of the other determinations discussed above in reference to method 1400 may also be utilized to establish that the user has entered the vehicle.

In response to determining that the user has entered the vehicle, the electronic device provides (2707) a prompt (e.g., in a user interface object on the device, such as user interface object 2801 shown in FIG. 28, or via a prompt from Siri, or both) to the user to use the first physical location as a destination for route guidance. In response to providing the prompt, the electronic device receives (2709) from the user an instruction to use the first physical location as the destination for route guidance.

The electronic device then facilitates (2711) route guidance to the first physical location. In some embodiments, facilitating the route guidance includes (2713) providing the route guidance via the display of the electronic device. In some embodiments, facilitating the route guidance includes (2715) sending, to the vehicle, the information identifying the first physical location. In some embodiments, facilitating the route guidance includes (2717) providing the route guidance via an audio system in communication with the electronic device (e.g., vehicle's speakers or the device's own internal speakers). In some embodiments, two or more of operations 2713, 2715, and 2717 are performed in order to ensure that the user accurately follows the route guidance.

In some embodiments, the electronic device detects (2719) that a message (voicemail, text, email, or other social media message) has been received by the electronic device, including detecting that the message includes information identifying a second physical location (in some embodiments, one or more of the techniques discussed above in reference to methods 1800 and 2000 are utilized to perform the detection). In some embodiments, detecting that the message includes the information identifying the second physical location includes performing the detecting (2721) while a virtual assistant available on the electronic device is reading the message to the user via an audio system that is in communication with the electronic device (e.g., Siri is reading the message through the device's speakers or through vehicle's audio system).

In some embodiments, in response to the detecting, the electronic device provides (2723) a new prompt to the user to use the second physical location as a new destination for route guidance (e.g., the second physical location could correspond to a new meeting point, such as a restaurant location that was changed while the user was driving, while in other embodiments, the second physical location is not identified until after the user has reached the first physical location). In some embodiments, in response to receiving an instruction from the user to use the second physical location as the new destination, the electronic device facilitates (2725) route guidance to the second physical location (e.g., using one or more of the facilitation techniques discussed above in reference to operations 2711, 2713, 2715, and 2717).

It should be understood that the particular order in which the operations in FIG. 27 have been described is merely one example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 2400 and 2600) are also applicable in an analogous manner to method 2700 described above with respect to FIG. 27. For example, the operations described above with reference to method 2700 optionally have one or more characteristics of operations or use operations described herein with reference to other methods described herein (e.g., methods 2400 and 2600). In some embodiments, any relevant details from Sections 1-11 may be utilized for any suitable purpose in conjunction with method 2700. For brevity, these details are not repeated here.

FIG. 29 is a flowchart representation of a method of proactively suggesting a paste action, in accordance with some embodiments. FIGS. 30A-30D is used to illustrate the methods and/or processes of FIG. 29. Although some of the examples which follow will be given with reference to inputs on a touch-sensitive display (in which a touch-sensitive surface and a display are combined), in some embodiments, the device detects inputs on a touch-sensitive surface 195 that is separate from the display 194, as shown in FIG. 1D.

In some embodiments, the method 2900 is performed by an electronic device (e.g., portable multifunction device 100, FIG. 1A, configured in accordance with any one of Computing Device A-D, FIG. 1E) and/or one or more components of the electronic device (e.g., I/O subsystem 106, operating system 126, etc.). In some embodiments, the method 2900 is governed by instructions that are stored in a non-transitory computer-readable storage medium and that are executed by one or more processors of a device, such as the one or more processors 122 of device 100 (FIG. 1A). For ease of explanation, the following describes method 2900 as performed by the device 100. In some embodiments, with reference to FIG. 1A, the operations of method 2900 are performed by or use, at least in part, a proactive module (e.g., proactive module 163) and the components thereof, a contact/motion module (e.g., contact/motion module 130), a graphics module (e.g., graphics module 132), and a touch-sensitive display (e.g., touch-sensitive display system 112). Some operations in method 2900 are, optionally, combined and/or the order of some operations is, optionally, changed.

As described below, the method 2900 provides an intuitive way to proactively suggest a paste action on an electronic device with a touch-sensitive display. The method reduces the inputs required from a user in order to perform paste actions, thereby creating a more efficient human-machine interface. For battery-operated electronic devices, proactively suggesting a paste action both conserves power and increases the time between battery charges.

Figure 30A:
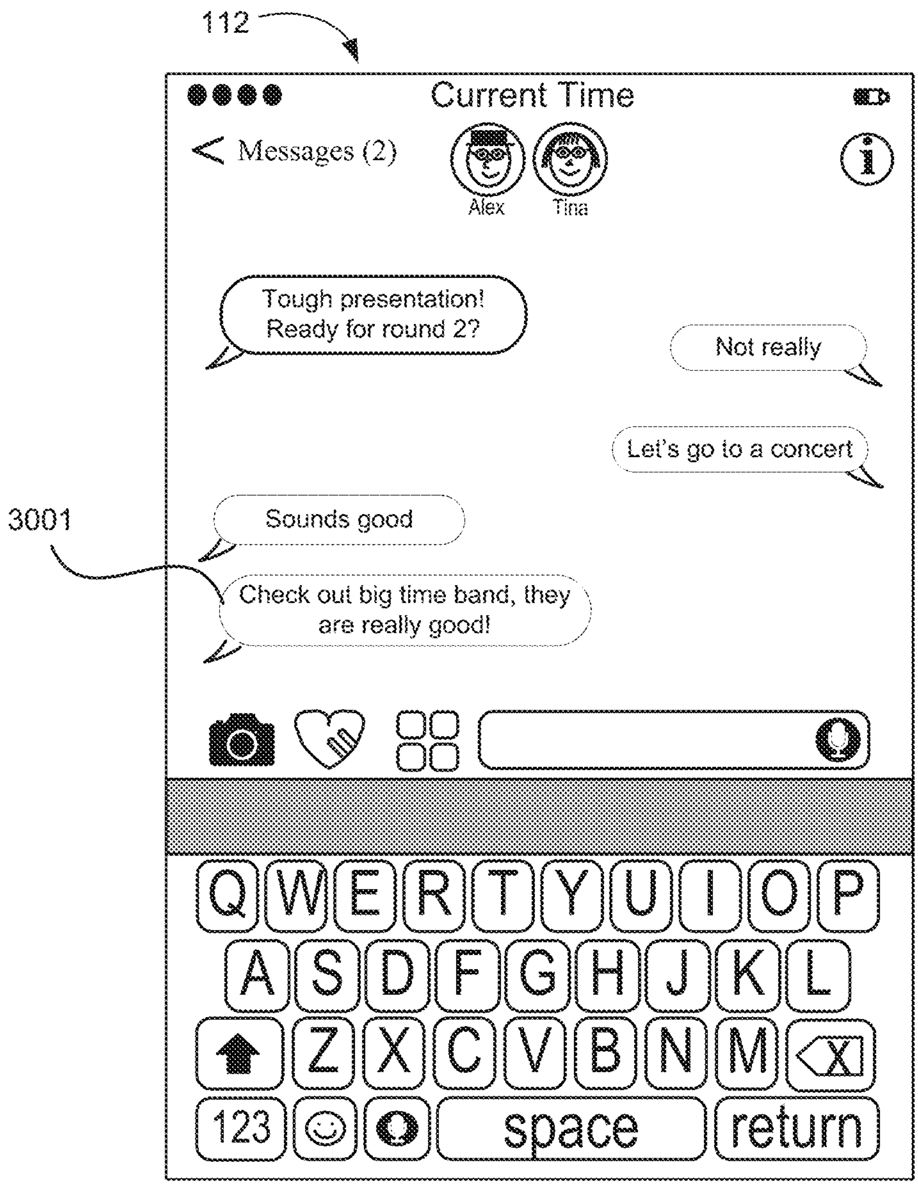
FIGS. 30A-30D are schematics of a touch-sensitive display used to illustrate user interfaces for proactively suggesting a paste action, in accordance with some embodiments.

As shown in FIG. 29, the electronic device presents (2901) content in a first application (e.g., as shown in FIG. 30A, the device presents content corresponding to a messaging application, including a message 3001 from a remote user that reads "check out big time band, they are really good!"). In some embodiments, the electronic device receives (2903) a request to copy at least a portion of the content (e.g., the user copies the text "big time band"). In some embodiments, no request to copy the portion of the content is received at all (in other words, the user just views the content in the first application without requesting to copy any of the content).

Figure 30B:
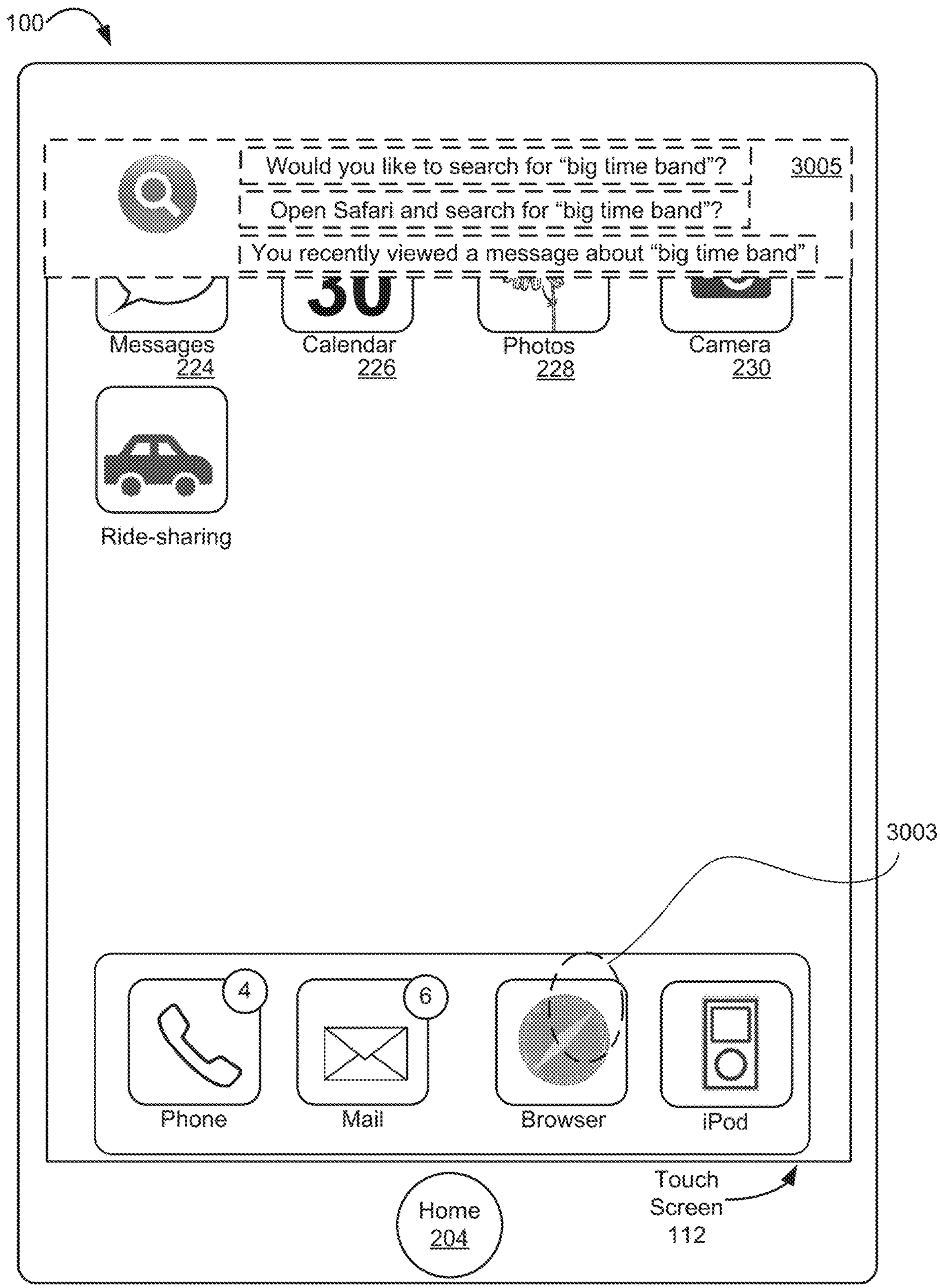
Figure 30C:
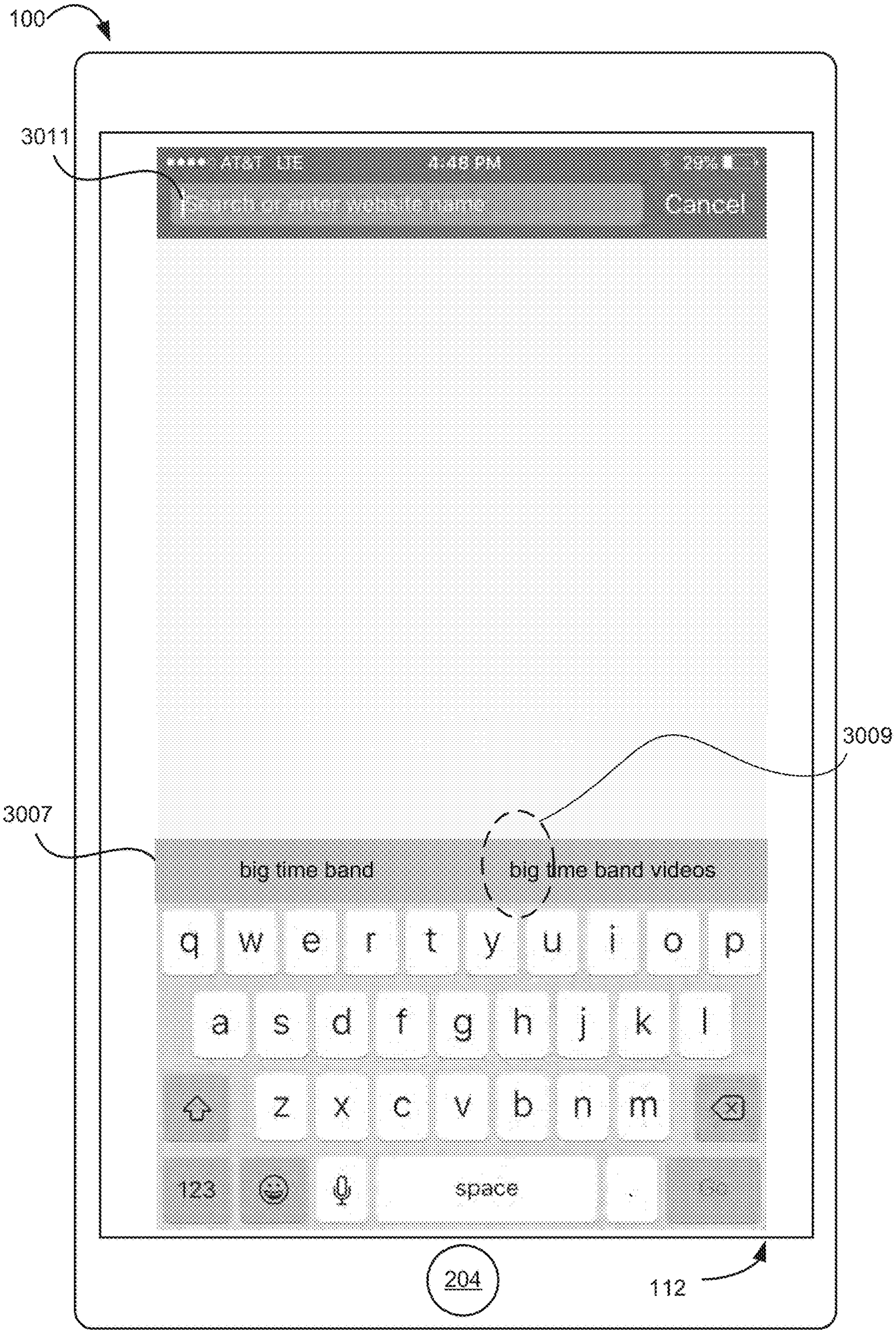

The electronic device receives (2905) a request from the user to open a second application that is distinct from the first application, the second application including an input-receiving field (e.g., input-receiving field 3011, FIG. 30C). For example, as shown in FIG. 30B, the user provides an input (e.g., contact 3003) over an icon for the second application (e.g., a browser application in the example shown in FIG. 30B), the input corresponding to a request to open the second application. As shown in FIG. 30C, in response to receiving the request, the electronic device presents (2907) the second application with the input-receiving field (e.g., input-receiving field 3011, FIG. 30C).

In some embodiments, the electronic device identifies the input-receiving field as a field that is capable of accepting the portion of the content (2909). In some embodiments, the identifying is performed (2911) in response to detecting a selection of the input-receiving field (e.g., the user taps within the input-receiving field 3011, FIG. 30C). Stated another way, the user places a focus within the first input-receiving field and the electronic device then determines whether that first input-receiving field is capable of accepting the proactively copied portion of the content.

Figure 30D:
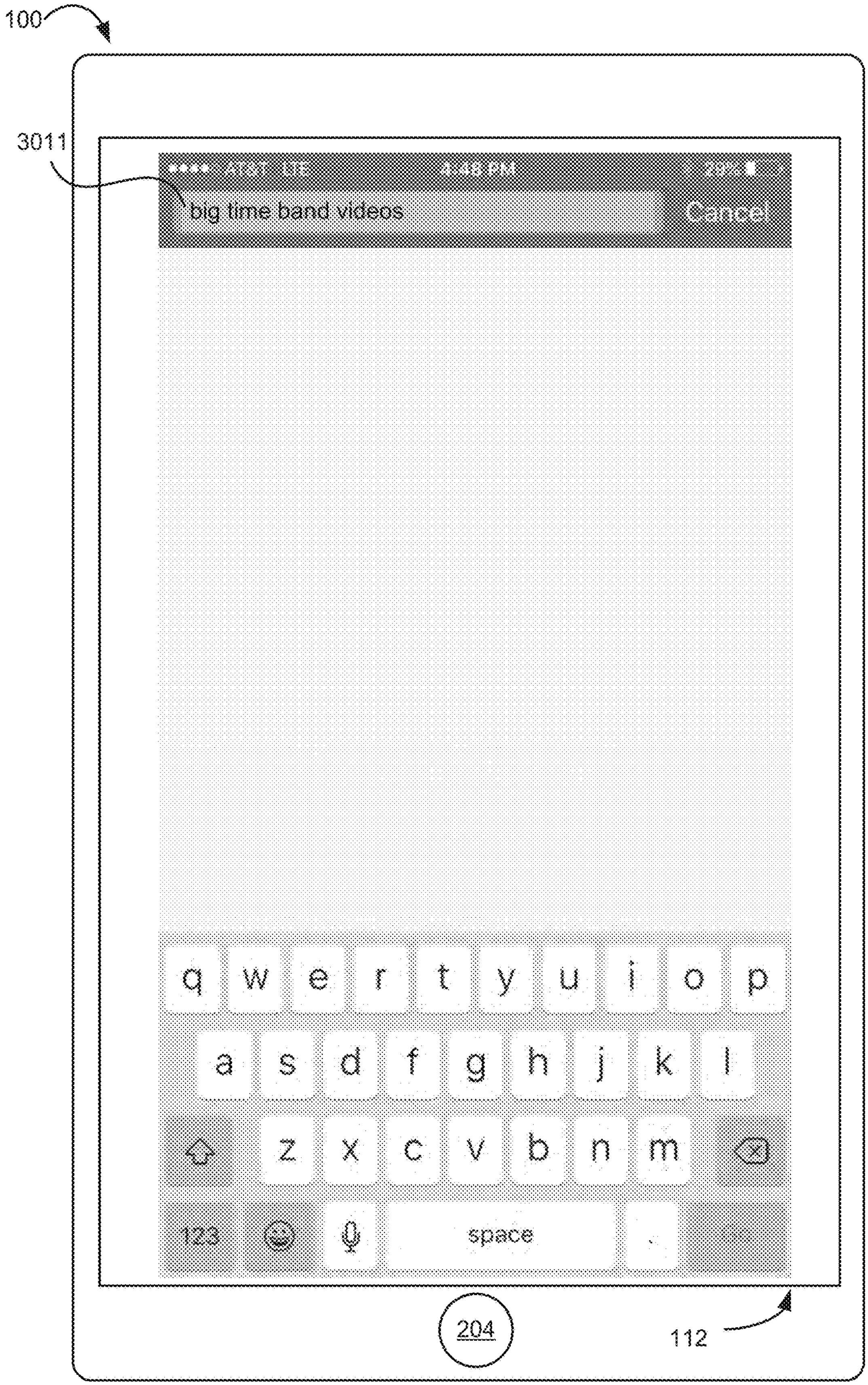

In some embodiments, before receiving any user input at the input-receiving field, the electronic device provides (2913) a selectable user interface object (or more than one selectable user interface object, such as those shown within suggestions portion 3007, FIG. 30C) to allow the user to paste at least a portion of the content into the input-receiving field. For example, a suggestions portion 3007 that is displayed substantially above a virtual keyboard within the second application is populated with two suggested items that are based on the portion of the content (e.g., "big time band" and "big time band videos"). In response to detecting a selection of the selectable user interface object (e.g., input 3009, FIG. 30C), the electronic device pastes the portion of the content into the input-receiving field (e.g., as shown in FIG. 30D, "big time band videos" is pasted into the input-receiving field 3011). By providing this proactive pasting functionality, users are not required to leave the second application, re-open the first application, copy the portion from the first application, re-open the second application, then perform a paste action in the second application. Instead, the user simply selects the selectable user interface object associated with the portion of the content that the user would like to paste, thereby saving a significant number of extra inputs to perform the same paste function, resulting in more efficient and energy-saving user interfaces for the electronic device.

In some embodiments, the portion of the content corresponds to an image, textual content, or to textual content and an image (2915). In this way, the electronic device is able to proactively suggest paste actions for a variety of content types, depending on data that can be accepted by the second application.

In some embodiments, the selectable user interface object is displayed with an indication that the portion of the content was recently viewed in the first application (2917) (e.g., the suggestions portion 3007, FIG. 30C, includes a textual description such as "you recently viewed a message related to 'big time band'"). In this way, the user is provided with a clear indication as to why the paste suggestion is being made.

In some embodiments, a user interface object may also be presented over a portion of a home screen or an application-switching user interface that provides the user with an option to perform an action that is based on the content that was viewed in the first application. In some embodiments, this user interface object is presented before the request to open the second application (operation 2905), and could be presented over the first application, over the home screen, or over the application-switching user interface. An example is shown for user interface object 3005 in FIG. 30B. The example user interface object 3005 allows the user to perform a search using text that was presented in the first application (e.g., perform a system-wide search (e.g., Spotlight search) for "big time band" or open a specific application (such as Safari) and perform that search).

While a messaging application and a browser application are used as the primary examples above, many other types of applications benefit from the techniques associated with method 2900. For example, the first application could be a photo-browsing application and the second application could be a messaging application (e.g., so that the proactive paste suggestions presented in the messaging application correspond to photos viewed by the user in the photo browsing application).

It should be understood that the particular order in which the operations in FIG. 29 have been described is merely one example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 2200 and 2900) are also applicable in an analogous manner to method 2900 described above with respect to FIG. 29. For example, the operations described above with reference to method 2900 optionally have one or more of characteristics of the operations or use the operations described herein with reference to other methods described herein (e.g., methods 2200 and 2900). In some embodiments, any relevant details from Sections 1-11 may be utilized for any suitable purpose in conjunction with method 2900. For brevity, these details are not repeated here.

Additional details are also provided below regarding suggesting information about physical locations and may be used to supplement methods 2200, 2280, 2900, 2400, 2600, and 2700. In some embodiments, methods 2200, 2280, 2900, 2400, 2600, and 2700 (or any other method described herein) also obtain information about physical locations (or other types of content) from locations viewed by a user in a web-browsing application (e.g., Safari from APPLE INC. of Cupertino, Calif.), addresses that have been copied by the user (e.g., to a pasteboard), locations that are associated with upcoming calendar events (e.g., if an event is scheduled to occur within a predetermined period of time, such as 1 hr., 30 minutes, or the like, then a location associated with that event may also be available for use and easy suggestion to the user in a ride-sharing or other application), and locations discussed by a user in interactions with a virtual assistant on the electronic device (e.g., Siri of APPLE INC., such as when a user asks Siri for restaurants that are nearby, then information about those restaurants may be made available for use by other applications or as suggestions for the user to use in other applications).

In some embodiments, locations are made available for use by other applications or as suggestions for use by the user without any prior user interactions related to the locations. For example, if a particular location is associated with an upcoming calendar event, then that particular location may be proactively suggested for use in a ride-sharing application, even if the user did not recently look at the upcoming calendar event or the particular location.

In some embodiments, location suggestions (e.g., for locations that are made available using any of the techniques discussed herein) are provided throughout a variety of applications and components of an electronic device (e.g., device 100). For example, locations suggestions in some embodiments, are made available from within the following:

- a suggestions portion above a virtual keyboard (also referred to as a QuickType bar) as discussed, e.g., in reference to user interface object 2505 in FIG. 25D;
- an application-switching user interface, e.g., as discussed in reference to user interface object 2503, FIG. 25C;
- a maps application, on a main screen, without any user action required;
- a maps widget (e.g., such as one shown within a left-of-home interface that is made available in response to a user swiping in a substantially left-to-right direction over a first page of a home screen), in some embodiments, a user performing a gesture with increasing intensity (i.e.,) over the maps widget causes the display of suggested locations within the maps widget;
- a CarPlay maps application, on a main screen, without any user action required (e.g., as discussed for method 2700);
- a search interface (e.g., to show a search query suggestion that corresponds to the location within the search interface such as the one in FIG. 11B); and
- in a virtual assistant component of the device 100 (e.g., in response to a textual or verbal question from the user such as "navigate me there" or "call this place," the virtual assistant is able to disambiguate references to "there" and "this" based on suggested locations determined in accordance with any of the techniques discussed herein).

In some embodiments, in reference to making locations available for use by the virtual assistant application, the device 100 is able to respond to questions such as "navigate me there" or "call this place" based on data that the user is currently viewing in a foreground application. In some embodiments, any requests submitted to a server in order to respond to questions posed to the virtual assistant are performed in a privacy-preserving fashion. For example, when resolving and responding to "navigate me there," a request is sent to a server associated with the virtual assistant and only an indication that a location is available in the current app is provided to the server, without any other user identifying information and without explicitly advertising location data. In some embodiments, the server interprets and responds to the command/question and instructs the device 100 to start navigation to an appropriate location (e.g., a location viewed by the user in a foreground location or some other appropriate location, such as a location for an upcoming calendar event).

In some embodiments, if a user copies textual content, the device 100 automatically (i.e., without any explicit instructions from the user to do so) and determines if the copied textual content includes location information (e.g., an address or some other information that can be used to retrieve an address such as a restaurant name). In accordance with a determination that the copied textual content does include location information, the device 100 advertises the address for use by other system components that are capable of displaying and using the location information (e.g., the examples provided above, such as the QuickType bar and the application-switching user interface, among many others). For example, the user receives a text message with an address, the user then copies that address, provides an input (e.g., double taps on the home button to bring up the application-switching user interface), and, in response to the input, the device 100 displays a user interface object, such as a banner (e.g., user interface 2503 discussed above) that reads "Get directions to <address> in Maps" or some other appropriate and instructive phrase that the location is available for use in an application.

In some embodiments, location information that is suggested for use by the user (e.g., within the QuickType bar, within the application-switching user interface, or the like)

is different depending on a type of application that is going to use the location information. For example, if a user views a location in a crowd-sourced reviews application (e.g., Yelp) and the user then navigates to a ride-sharing application (e.g., Uber), the user may see a full address that corresponds to the location they were previously viewing. However, if the user navigates to a weather application instead, then the user may be presented within only a city and state for the location they were previously viewing, instead of the complete address, since the weather application only needs city and state information and does not need complete addresses. In some embodiments, applications are able to specify a level of granularity at which location information should be provided and the location information that is suggested is then provided accordingly (e.g., at a first level of granularity for the ride-sharing application and at a second level of granularity for the weather application).

In some embodiments, location information that is inserted in response to user selection of a suggested location depends on a triggering phrase. For example, if the user views a location in a crowd-sourced reviewing application and then switches to a messaging application and begins to type "let's meet at," then the device may display the location the user was previously viewing in the crowd-sourced reviewing application (e.g., within a user interface object 2309, FIG. 23F). In some embodiments, if the user selects the suggested location (e.g., taps on the user interface object 2309), then the device may insert both the restaurant name and the address for the restaurant (and may also insert other relevant information, such as a link to a menu, a phone number, or the like). In some embodiments, if the user had typed "the address is," then, in response to user selection of the suggestion, only the address might get inserted (instead of the name or other details, since the trigger phrase "the address is" indicates that only the address is needed). In some embodiments, the device 100 maintains more than one representation of a particular location that is available for suggestion, in order to selectively provide this information at varying levels of granularity. For example, if the user copies an address from within the crowd-sourced reviews application, then the device 100 may keep the copied address and may additionally store other information that is available from the crowd-source reviews application (e.g., including a phone number, restaurant name, link to menu, and the like).

In some embodiments, the device 100 (or a component, such as the proactive module, FIG. 1A) proactively monitors calendar events and suggests locations that are associated with upcoming events (e.g., events for which a start time is within a predetermined amount of time, such as 30 minutes, an hour, or 1.5 hours) even without receiving any user interaction with a particular event or its associated location. In some embodiments, traffic conditions are taken into account in order to adjust the predetermined amount of time.

In some embodiments, when an application is suggested with location information (e.g., in the application-switching user interface, such as the ride-sharing application suggested to use the location for Gary Danko in user interface object 2503, FIG. 25C), that application is selected based on a variety of contextual information/heuristics that help to identify the application (e.g., based on application usage patterns, time of day, day of week, recency of application install, etc., and more details are provided below in reference to Sections 8). In some embodiments, how recently a respective application was used is an additional factor that is utilized in order to identify the application (e.g., if the user recently went to dinner and used a ride-sharing application to get there, then the device 100 may determine that the user is trying to return home after about an hour and will suggest the ride-sharing application since it was very recently used).

As noted above, any of the methods 2200, 2280, 2900, 2400, 2600, and 2700 (or any other method described herein) may utilize the above details in conjunction with identifying, storing, and providing information about physical locations.

Additional Descriptions of Embodiments

The additional descriptions provided in Sections 1-11 below provide additional details that supplement those provided above. In some circumstances or embodiments, any of the methods described above (e.g., methods 600, 800, 1000, 1200, 1400, 1600, 1800, 2000, 2200, 2280, 2400, 2600, 2700, and 2900) may use some of the details provided below in reference to Sections 1-11, as appropriate to improve or refine operation of any of the methods. One of ordinary skill in the art will appreciate the numerous ways in which the descriptions in Sections 1-11 below supplement the disclosures provided herein (e.g., in reference to FIG. 1A-30D).

Section 1: Dynamic Adjustment of Mobile Devices

The material in this section "Dynamic Adjustment of Mobile Devices" relates to dynamically adjusting a mobile device based on user activity, peer event data, system data, voter feedback, adaptive prediction of system events, and/or thermal conditions, in accordance with some embodiments, and provides information that supplements the disclosures provided herein. For example and as described in more detail below, this section describes forecasting when during the day applications will be used/invoked and also describes checking usage statistics to determine whether an application is likely to be invoked by a user in the near future, which supplements the disclosures provided herein in regards to, e.g., operations 604 and 608 of method 600 and operation 808 of method 800. As another example, Section 1 describes temporal forecasts used indicate what time of day an event associated with an attribute is likely to occur (e.g., during a 24 hour period, the likely times at which the user will launch a particular type of application, such as a mail application), which supplements the disclosures provided herein, e.g., those related to the collection/storage of usage data (FIGS. 3A-3B) and the creation/storage of trigger conditions (FIGS. 4A-4B) and to the operation 808 of method 800. As one more example, Section 1 discusses the use of additional data (location data, motion data, and the like) to improve temporal forecasts and to generate panorama forecasts that assign percentage values as to the likelihood that a particular application will be launched during a particular period of time, which supplements the disclosures provided herein, e.g., those related to the creation/storage of trigger conditions (FIGS. 4A-4B). As yet another example, Section 1 describes the use of a voting system to manage the execution of forecasted events, which supplements the disclosures provided here, e.g., those related to the collection/storage of usage data (FIGS. 3A-3B) and the creation/storage of trigger conditions (FIGS. 4A-4B) and to the operation 808 of method 800). As yet one more example, Section 1 describes predicting a likelihood that an event associated with an attribute will occur in a time period (based on various types of forecasts), which supplements the disclosures provided here, e.g., those related to the collection/storage of usage data (FIGS. 3A-3B) and the creation/storage of trigger conditions (FIGS. 4A-4B). As one additional example, Section 1 describes the management of thermal conditions which supplements the disclosures provided herein regarding conserving power (e.g., to ensure that the methods 600 and 800 or any of the other methods discussed above operate in an energy efficient fashion).

Summary of Dynamic Adjustment of Mobile Devices

In some implementations, a mobile device (e.g., device 100, FIG. 1A) can be configured to monitor environmental, system and user events. The mobile device can be configured to detect the occurrence of one or more events that can trigger adjustments to system settings.

In some implementations, the mobile device can be configured with predefined and/or dynamically defined attributes. The attributes can be used by the system to track system events. The attribute events can be stored and later used to predict future occurrences of the attribute events. The stored attribute events can be used by the system to make decisions regarding processing performed by the mobile device. The attributes can be associated with budgets that allow for budgeting resources to support future events or activities on the system.

In some implementations, various applications, functions and processes running on the mobile device can submit attribute events. The applications, functions and processes can later request forecasts based on the submitted events. The applications, functions and processes can perform budgeting based on the budgets associated with the attributes and the costs associated with reported events. The applications, functions, and processes can be associated with the operating system of the mobile device or third party applications, for example.

In some implementations, the mobile device can be configured to keep frequently invoked applications up to date. The mobile device can keep track of when applications are invoked by the user. Based on the invocation information, the mobile device can forecast when during the day the applications are invoked. The mobile device can then preemptively launch the applications and download updates so that the user can invoke the applications and view current updated content without having to wait for the application to download updated content.

In some implementations, the mobile device can receive push notifications associated with applications that indicate that new content is available for the applications to download. The mobile device can launch the applications associated with the push notifications in the background and download the new content. After the content is downloaded, the mobile device can present a graphical interface indicating to the user that the push notification was received. The user can then invoke the applications and view the updated content.

In some implementations, the mobile device can be configured to perform out of process downloads and/or uploads of content for applications on the mobile device. For example, a dedicated process can be configured on the mobile device for downloading and/or uploading content for applications on the mobile device.

The applications can be suspended or terminated while the upload/download is being performed. The applications can be invoked when the upload/download is complete.

In some implementations, before running an application or accessing a network interface, the mobile device can be configured to check battery power and cellular data usage budgets to ensure that enough power and data is available for user invoked operations. Before launching an application in the background, the mobile device can check usage statistics to determine whether the application is likely to be invoked by a user in the near future.

In some implementations, attribute event data can be shared between mobile devices owned by the same user. The mobile device can receive event data from a peer device and make decisions regarding interactions or operations involving the peer device based on the received event data. The event data can be shared as forecasts, statistics, and/or raw (e.g., unprocessed) event data. The mobile device can determine whether to communicate with the peer device based on the received event data, for example.

Particular implementations provide at least the following advantages: Battery power can be conserved by dynamically adjusting components of the mobile device in response to detected events. The user experience can be improved by anticipating when the user will invoke applications and downloading content so that the user will view updated content upon invoking an application.

Details of one or more implementations are set forth in the accompanying drawings and the description below. Other features, aspects, and potential advantages will be apparent from the description and drawings, and from the claims.

Detailed Description of Dynamic Adjustment of Mobile Devices

Overview

Described in this section is a system architecture for enabling adaptation of a mobile device based on various system events to facilitate tradeoffs between battery lifetime, power requirements, thermal management and performance. The system provides the underlying event gathering architecture and a set of heuristic processes that learn from the system events to maximize battery life without noticeable degradation in the user experience. The system monitors system-defined and client-defined attributes and can use the system-defined and client-defined attributes to predict or forecast the occurrence of future events. This system can anticipate the system's future behavior as well as the user's expectation of device performance based on dynamically gathered statistics and/or explicitly specified user intent. The system can determine which hardware and software control parameters to set and to what values to set the parameters in order to improve the user experience for the anticipated system behavior. The system leverages system monitoring and hardware control to achieve an overall improvement in the user experience while extending system and network resources available to the mobile device. Thus, the system can maximize system and network resources while minimizing the impact to the user experience.

Data Collection—User Centric Statistics

FIG. 31_1 illustrates an example mobile device 31_100 configured to perform dynamic adjustment of the mobile device 31_100. In some implementations, mobile device 31_100 can include a sampling daemon 31_102 that collects events related to device conditions, network conditions, system services (e.g., daemons) and user behavior. For example, sampling daemon 31_102 can collect statistics related to applications, sensors, and user input received by mobile device 31_100 and store the statistics in event data store 31_104. The statistics can be reported to sampling daemon 31_102 by various clients (e.g., applications, utilities, functions, third-party applications, etc.) running on mobile device 31_100 using predefined or client-defined attributes reported as events.

Data Collection—Events & Attributes

In some implementations, mobile device 31_100 can be configured with a framework for collecting system and/or application events. For example, mobile device 31_100 can be configured with application programming interfaces (API) that allow various applications, utilities and other components of mobile device 31_100 to submit events to sampling daemon 31_102 for later statistical analysis.

In some implementations, each event recorded by sampling daemon 31_102 in event data store 31_104 can include an attribute name (e.g., "bundleId"), an attribute value (e.g., "contacts"), anonymized beacon information, anonymized location information, date information (e.g., GMT date of event), time information (e.g., localized 24 hour time of event), network quality information, processor utilization metrics, disk input/output metrics, identification of the current user and/or type of event (e.g., start, stop, occurred). For example, the attribute name can identify the type of attribute associated with the event. The attribute name can be used to identify a particular metric being tracked by sampling daemon 31_102, for example. The attribute value can be a value (e.g., string, integer, floating point) associated with the attribute. The anonymized beacon information can indicate which wireless beacons (e.g., Bluetooth, Bluetooth Low Energy, Wi-Fi, etc.) are in range of the mobile device without tying or associating the beacon information to the user or the device. Similarly, the anonymized location information can identify the location of the mobile device without tying or associating the location information to the user or the device. For example, location information can be derived from satellite data (e.g., global positioning satellite system), cellular data, Wi-Fi data, Bluetooth data using various transceivers configured on mobile device 31_100. Network quality information can indicate the quality of the mobile device's network (e.g., Wi-Fi, cellular, satellite, etc.) connection as detected by mobile device 31_100 when the event occurred.

In some implementations, the event data for each event can indicate that the event occurred, started or stopped. For example, time accounting (e.g., duration accounting) can be performed on pairs of events for the same attribute that indicate a start event and a stop event for the attribute. For example, sampling daemon 31_102 can receive a start event for attribute "bundleId" having a value "contacts". Later, sampling daemon 31_102 can receive a stop event for attribute "bundleId" having a value "contacts". Sampling daemon 31_102 can compare the time of the start event to the time of the stop event to determine how long (e.g., time duration) the "contacts" application was active. In some implementations, events that are not subject to time accounting can be recorded as point events (e.g., a single occurrence). For example, an event associated with the "batteryLevel" system attribute that specifies the instantaneous battery level at the time of the event can simply be recorded as an occurrence of the event.

Table 1, below, is provides an example of attribute event entries recorded by sampling daemon 31_102 in event data store 31_104. The first entry records a "bundleId" event that indicates that the "contacts" application has been invoked by user "Fred." This "bundleId" event is a start event indicating that Fred has begun using the contacts application. The second entry is a "batteryLevel" event entry that indicates that the battery level of mobile device 31_100 is at 46%; this event is an occurrence type event (e.g., single point event). The third entry is a "personName" event that associated with the value "George." The "personName" event is used to record the fact that user Fred has accessed the contact information for contact "George" in the contacts application; this is an occurrence type event. The fourth entry records a "bundleId" event that indicates that the "contacts" application has been closed or hidden by user "Fred." This bundleId event is a stop event indicating that Fred has stopped using the contacts application. By recording start and stop events for the "bundleId" attribute, sampling daemon 31_102 can determine that user Fred has used the contacts application for 8 minutes on May 12, 2014 based on the timestamps corresponding to the start and stop events. This attribute event information can be used, for example, to forecast user activity related to applications on mobile device 31_100 and with respect to the contacts application in particular.

TABLE 1

| Attr. Name | Value | Beacons | Location | Date | Time | Network Quality | User ID | State |
|---|---|---|---|---|---|---|---|---|
| bundleId | "contacts" | B1, B2 . . . | Location1 | 2014 May 12 | 1421 | 8 | Fred | start |
| batteryLevel | 46 | B1, B2 . . . | Location2 | 2014 May 12 | 1424 | 8 | Fred | occur |
| personName | "George" | B1, B2 . . . | Location2 | 2014 May 12 | 1426 | 8 | Fred | occur |
| bundleId | "contacts" | B1, B2 . . . | Location1 | 2014 May 12 | 1429 | 8 | Fred | stop |

Predefined Attributes

In some implementations, event data can be submitted to sampling daemon 31_102 using well-known or predefined attributes. The well-known or predefined attributes can be generic system attributes that can be used by various applications, utilities, functions or other components of mobile device 31_100 to submit event data to sampling daemon 31_102. While the attribute definition (e.g., attribute name, data type of associated value, etc.) is predefined, the values assigned to the predefined attribute can vary from event to event. For example, mobile device 31_100 can be configured with predefined attributes "bundleId" for identifying applications and "personName" for identifying people of interest. The values assigned to "bundleId" can vary based on which application is active on mobile device 31_100. The values assigned to "personName" can vary based on user input. For example, if a user selects an email message from "George," then the "personName" attribute value can be set to "George." If a user selects a contacts entry associated with "Bob," then the "personName" attribute value can be set to "Bob." When an application, utility, function or other component of mobile device 31_100 submits an event to sampling daemon 31_102 using the predefined attributes, the application, utility, function or other component can specify the value to be associated with the predefined attribute for that event. Examples of predefined or well-known system events are described in the following paragraphs.

In some implementations, mobile device 31_100 can be configured with a predefined attribute (e.g., “system.bundleId”) that specifies a name or identifier for an application (e.g., application bundle) installed on mobile device 31_100. When an application is launched, the application manager 31_106 (e.g., responsible for launching applications) can use an API of the sampling daemon 31_102 to submit the identifier or name of the application (e.g., “contacts” for the contacts application) as the value for the “system.bundleId” system attribute. The sampling daemon 31_102 can record the occurrence of the launching of the “contacts” application as an event in event data store 31_104, for example, along with other event data, as described above. Alternatively, the application can use the API of the sampling daemon 31_102 to indicate start and stop events corresponding to when the application “contacts” is invoked and when the application is hidden or closed, respectively. For example, the “bundleId” attribute can be used to record application launch events on mobile device 31_100. The “bundleId” attribute can be used to record application termination events on mobile device 31_100. By specifying start and stop events associated with the “bundleId” attribute, rather than just the occurrence of an event, the sampling daemon 31_102 can determine how long the “contacts” application was used by the user of mobile device 31_100.

In some implementations, mobile device 31_100 can be configured with a predefined attribute (e.g., “system.personName”) that specifies a name or identifier of a user of mobile device 31_100 or a person of interest to the user of mobile device 31_100. For example, upon logging into, waking or otherwise accessing mobile device 31_100, an event associated with the “personName” attribute can be generated and submitted to sampling daemon 31_102 that identifies the current user of mobile device 31_100. When the user accesses data associated with another person, a “personName” attribute event can be generated and submitted to sampling daemon 31_102 that identifies the other person as a person of interest to the user.

In some implementations, mobile device 31_100 can be configured with a predefined attribute (e.g., “system.anonymizedLocation”) that indicates a location of the mobile device 31_100. For example, mobile device 31_100 can generate and submit an event to sampling daemon 31_102 associated with the “anonymizedLocation” attribute that specifies the location of the mobile device 31_100 at the time when the event is generated. The location data can be anonymized so that the location cannot be later tied or associated to a particular user or device. The “anonymizedLocation” attribute event can be generated and stored, for example, whenever the user is using a location-based service of mobile device 31_100.

In some implementations, mobile device 31_100 can be configured with a predefined attribute (e.g., “system.airplaneMode”) that indicates that the airplane mode of mobile device 31_100 is on or off. For example, when a user turns airplane mode on or off, mobile device 31_100 can generate and submit an event to sampling daemon 31_102 that indicates the airplane mode state at the time of the event. For example, the value of the “airplaneMode” attribute can be set to true (e.g., one) when airplaneMode is turned on and set to false (e.g., zero) when the airplane mode is off. Sampling daemon 31_102 can, in turn, store the “airplaneMode” event, including “airplaneMode” attribute value in event data store 31_104.

In some implementations, mobile device 31_100 can be configured with a predefined attribute (e.g., “system.cablePlugin”) that indicates that the power cable of mobile device 31_100 is plugged in or is not plugged in. For example, when mobile device 31_100 detects that the power cable has been unplugged, mobile device 31_100 can generate an event that indicates that the “cablePlugin” attribute value is false (e.g., zero). When mobile device 31_100 detects that the power cable has been plugged into mobile device 31_100, mobile device 31_100 can generate an event that indicates that the “cablePlugin” attribute is true (e.g., one). Mobile device 31_100 can submit the “cablePlugin” event to sampling daemon 31_102 for storage in event data store 31_104.

In some implementations, mobile device 31_100 can be configured with a predefined attribute (e.g., “system.screenLock”) that indicates whether the display screen of mobile device 31_100 is locked or unlocked. For example, mobile device 31_100 can detect when the display screen of mobile device 31_100 has been locked (e.g., by the system or by a user) or unlocked (e.g., by the user). Upon detecting the locking or unlocking of the display screen, mobile device 31_100 can generate an event that includes the “screenLock” attribute and set the “screenLock” attribute value for the event to true (e.g., locked, integer one) or false (e.g., unlocked, integer zero) to indicate whether the display screen of mobile device 31_100 was locked or unlocked. Mobile device 31_100 can submit the “screenLock” event to sampling daemon 31_102 for storage in event data store 31_104.

In some implementations, mobile device 31_100 can be configured with a predefined attribute (e.g., “system.sleepWake”) that indicates whether mobile device 31_100 is in sleep mode. For example, mobile device 31_100 can detect when mobile device 31_100 enters sleep mode. Mobile device 31_100 can detect when mobile device 31_100 exits sleep mode (e.g., wakes). Upon detecting entering or exiting sleep mode, mobile device can generate an event that includes the “sleepWake” attribute and sets the attribute value to true or false (e.g., integer one or zero, respectively) to indicate the sleep mode state of the mobile device 31_100 at the time of the “sleepWake” event. Mobile device 31_100 can submit the “sleepWake” event to sampling daemon 31_102 for storage in the event data store 31_104.

In some implementations, mobile device 31_100 can be configured with a predefined attribute (e.g., “system.backlight”) that indicates whether the display of mobile device 31_100 is lit. The “backlight” attribute can be assigned a value that indicates the intensity or level of the backlight. For example, a user of mobile device 31_100 can adjust the intensity of the lighting (backlight) of the display of mobile device 31_100. The user can increase the intensity of the backlight when the ambient lighting is bright. The user can decrease the intensity of the backlight when the ambient lighting is dark. Upon detecting a change in backlight setting, mobile device 31_100 can generate an event that includes the “backlight” attribute and sets the attribute value to the adjusted backlight setting (e.g., intensity level). Mobile device 31_100 can submit the “backlight” change event to sampling daemon 31_102 for storage in the event data store 31_104.

In some implementations, mobile device 31_100 can be configured with a predefined attribute (e.g., “system.ALS”) that indicates the ambient light intensity value as detected by the ambient light sensor of mobile device 31_100. The “ALS” attribute can be assigned a value that indicates the intensity or level of the ambient light surrounding mobile device 31_100. For example, the ambient light sensor of mobile device 31_100 can detect a change in the intensity of ambient light. Mobile device 31_100 can determine that the change in intensity exceeds some threshold value. Upon detecting a change in ambient light that exceeds the threshold value, mobile device 31_100 can generate an event that includes the "ALS" attribute and sets the attribute value to the detected ambient light intensity value. Mobile device 31_100 can submit the "ALS" change event to sampling daemon 31_102 for storage in the event data store 31_104.

In some implementations, mobile device 31_100 can be configured with a predefined attribute (e.g., "system.proximity") that indicates the when the proximity sensor of mobile device 31_100 detects that the display of mobile device 31_100 is near an object (e.g., the user's face, on a table, etc.). The "proximity" attribute can be assigned a value that indicates whether the display of the mobile device is proximate to an object (e.g., true, false, 0, 1). For example, the proximity sensor of mobile device 31_100 can detect a change in proximity. Upon detecting a change in proximity, mobile device 31_100 can generate an event that includes the "proximity" attribute and sets the attribute value to true (e.g., one) when the mobile device 31_100 is proximate to an object and false (e.g., zero) when the mobile device 31_100 is not proximate to an object. Mobile device 31_100 can submit the "proximity" change event to sampling daemon 31_102 for storage in the event data store 31_104.

In some implementations, mobile device 31_100 can be configured with a predefined attribute (e.g., "system.motionState") that indicates the type of motion detected by mobile device 31_100. The "motionState" attribute can be assigned a value that indicates whether the mobile device is stationary, moving, running, driving, walking, etc. For example, the motion sensor (e.g., accelerometer) of mobile device 31_100 can detect movement of the mobile device 31_100. The mobile device 31_100 can classify the detected movement based on patterns of motion detected in the detected movement. The patterns of motion can be classified into user activities, such as when the user is stationary, moving, running, driving, walking, etc. Upon detecting a change in movement, mobile device 31_100 can generate an event that includes the "motionState" attribute and sets the attribute value to the type of movement (e.g., stationary, running, walking, driving, etc.) detected. Mobile device 31_100 can submit the "motionState" event to sampling daemon 31_102 for storage in the event data store 31_104.

In some implementations, mobile device 31_100 can be configured with a predefined attribute (e.g., "system.networkQuality") that indicates the quality of the network connection detected by mobile device 31_100. The "networkQuality" attribute can be assigned a value that indicates the network throughput value over an n-second (e.g., 1 millisecond, 2 seconds, etc.) period of time. For example, mobile device 31_100 can connect to a data network (e.g., cellular data, satellite data, Wi-Fi, Internet, etc.). The mobile device 31_100 can monitor the data throughput of the network connection over a period of time (e.g., 5 seconds). The mobile device can calculate the amount of data transmitted per second (e.g., bits/second, bytes/second, etc.). Upon detecting a change in throughput or upon creating a new network connection, mobile device 31_100 can generate an event that includes the "networkQuality" attribute and sets the attribute value to the calculated throughput value. Mobile device 31_100 can submit the "networkQuality" event to sampling daemon 31_102 for storage in the event data store 31_104.

In some implementations, mobile device 31_100 can be configured with a predefined attribute (e.g., "system.batteryLevel") that indicates an instantaneous charge level of the internal battery of mobile device 31_100. The "batteryLevel" attribute can be assigned a value that indicates the charge level (e.g., percentage) of the battery. For example, mobile device 31_100 can periodically (e.g., every 5 seconds, every minute, every 15 minutes, etc.) determine the charge level of the battery and generate a "batteryLevel" event to record the charge level of the battery. Mobile device 31_100 can monitor the battery charge level and determine when the charge level changes by a threshold amount and generate a "batteryLevel" event to record the charge level of the battery. Mobile device 31_100 can submit the "batteryLevel" event to sampling daemon 31_102 for storage in the event data store 31_104.

In some implementations, mobile device 31_100 can be configured with a predefined attribute (e.g., "system.thermalLevel") that indicates the thermal level of mobile device 31_100. For example, the thermal level of mobile device 31_100 can be the current operating temperature of the mobile device (e.g., degrees Celsius). The thermal level of the mobile device 31_100 can be a level (e.g., high, medium, low, normal, abnormal, etc.) that represents a range of temperature values. For example, mobile device 31_100 can be configured with a utility or function for monitoring the thermal state of the mobile device 31_100. Upon detecting a change in temperature or change in thermal level, the thermal utility of mobile device 31_100 can generate an event that includes the "thermalLevel" attribute and sets the attribute value to the operating temperature or current thermal level. Mobile device 31_100 can submit the "thermalLevel" event to sampling daemon 31_102 for storage in the event data store 31_104.

In some implementations, mobile device 31_100 can be configured with a predefined attribute (e.g., "system.energy") that indicates the energy usage of mobile device 31_100 over an n-second (e.g., 2 millisecond, 3 second, etc.) period of time. For example, when a user invokes a function (e.g., invocation of an application, illumination of the display, transmission of data, etc.) of mobile device 31_100, mobile device 31_100 can monitor the energy usage over a period of time that the function is executing to estimate how much energy each activity or function uses. The mobile device 31_100 can then generate an event that includes the "energy" attribute and sets the attribute value to the calculated average energy usage. Mobile device 31_100 can submit the "energy" event to sampling daemon 31_102 for storage in the event data store 31_104.

In some implementations, mobile device 31_100 can be configured with a predefined attribute (e.g., "system.networkBytes") that indicates the network data usage of mobile device 31_100 over a n-second (e.g., 2 millisecond, 3 second, etc.) period of time. For example, when a user invokes a function or initiates an operation that requires transmission of data over a network connection of mobile device 31_100, mobile device 31_100 can monitor the network data usage over a period of time to estimate how much network data each activity or function uses or transmits. The mobile device 31_100 can then generate an event that includes the "networkBytes" attribute and sets the attribute value to the calculated average network data usage. Mobile device 31_100 can submit the "networkBytes" event to sampling daemon 31_102 for storage in the event data store 31_104.

Other predefined attributes can include a "system.chargingStatus" attribute having a true/false (e.g., one/zero) attribute value indicating whether the mobile device 31_100 is charging its battery, a "system.batteryCapacity" attribute having an attribute value that indicates the current battery charge (e.g., in mAh, proportional to batteryLevel), and a "system.devicePresence" attribute having a device identifier (e.g., string) attribute value that tracks the appearances of peer devices. For example, the "devicePresence" attribute can be used to forecast the appearance of peer devices when scheduling peer-to-peer data sharing.

Custom Attributes

In some implementations, client-specific attributes can be dynamically defined by clients of sampling daemon 31_102. For example, instead of using the attributes predefined (e.g., in sampling daemon 31_102 or the operating system) and configured on mobile device 31_100, clients (e.g., third party applications) can dynamically define their own event attributes. For example, an email application can dynamically (e.g., at runtime) create a "mailbox" attribute. The email application ("mailapp") can use an API of sampling daemon 31_102 to define the attribute name (e.g., "mailapp.mailbox") and the attribute value type (e.g., string, integer, float). Once the client has created (registered) the new custom attribute, the client can use the attribute to generate events to be stored in event data store 31_104. For example, the mailapp can use the "mailbox" attribute to report which mailbox in the email application that the user is accessing. If the user is accessing a "work" mailbox, then the mailapp can create an event using the "mailapp.mailbox" attribute and set the value of the attribute to "work" to record the user's accessing the "work" mailbox. The sampling daemon 31_102 and the client can then use the stored mailbox event information to predict when the user is likely to access the "work" mailbox in the future, for example.

In some implementations, when a client application is removed (e.g., deleted, uninstalled) from mobile device 31_100, attributes created by the client application can be deleted from mobile device 31_100. Moreover, when the client application is removed, event data associated with the client application can be deleted. For example, if mailapp is deleted from mobile device 31_100, the attribute "mailapp.mailbox" can be deleted from mobile device 31_100 along with all of the event data associated with the mailapp.

Example Event Generating Clients

In some implementations, sampling daemon 31_102 can receive application events (e.g., "system.bundleId" events) from application manager process 31_106. For example, application manager 31_106 can be a process that starts, stops and monitors applications (e.g., application 31_108) on mobile device 31_100. In some implementations, application manager 31_106 can report start and stop times (e.g., "bundleId" start and stop events) for applications running on mobile device 31_100 to sampling daemon 31_102. For example, when a user invokes or launches an application, application manager 31_106 can notify sampling daemon 31_102 of the application invocation by submitting a "bundleId" start event for the invoked application that specifies the name or identifier of the application. In some implementations, application manager 31_106 can indicate to sampling daemon 31_102 that the application launch was initiated in response to a push notification, user invocation or a predicted or forecasted user application invocation. When an application terminates, application manager 31_106 can notify sampling daemon 31_102 that the application is no longer running by submitting a "bundleId" stop event for the application that specifies the name or identifier of the application.

In some implementations, sampling daemon 31_102 can use the application start and end events (e.g., "bundleId" attribute events) to generate a history of usage times per application. For example, the history of usage times per application can include for each execution of an application an amount of time that has passed since the last execution of the application and execution duration. Sampling daemon 31_102 can maintain a separate history of user-invoked application launches and/or system launched (e.g., automatically launched) applications. Thus, sampling daemon 31_102 can maintain usage statistics for all applications that are executed on mobile device 31_100.

In some implementations, sampling daemon 31_102 can receive power events from power monitor process 31_109. For example, power monitor 31_109 can monitor battery capacity, discharge, usage, and charging characteristics for mobile device 31_100. Power monitor 31_109 can determine when the mobile device 31_100 is plugged into external power sources and when the mobile device 31_100 is on battery power. Power monitor 31_109 can notify sampling daemon 31_102 when the mobile device 31_100 is plugged into external power. For example, power monitor 31_109 can send a "cablePlugin" event with a "cablePlugin" attribute value of one (e.g., true) to sampling daemon 31_102 when power monitor detects that mobile device 31_100 is plugged into an external power source. The event can include the battery charge at the time when the external power source is connected. Power monitor 31_109 can send "energy" attribute events to sampling daemon 31_102 to report battery usage.

In some implementations, power monitor 31_109 can notify sampling daemon 31_102 when the mobile device 31_100 is disconnected from external power. For example, power monitor 31_109 can send a "cablePlugin" event with a "cablePlugin" attribute value of zero (e.g., false) to sampling daemon 31_102 when power monitor detects that mobile device 31_100 is disconnected from an external power source. The message can include the battery charge at the time when the external power source is disconnected. Thus, sampling daemon 31_102 can maintain statistics describing the charging distribution (e.g., charge over time) of the batteries of the mobile device 31_100. The charging distribution statistics can include an amount of time since the last charge (e.g., time since plugged into external power) and the change in battery charge attributable to the charging (e.g., start level of charge, end level of charge).

In some implementations, power monitor 31_109 can notify sampling daemon 31_102 of changes in battery charge throughout the day. For example, power monitor 31_109 can be notified when applications start and stop and, in response to the notifications, determine the amount of battery power discharged during the period and the amount of charge remaining in the battery and transmit this information to sampling daemon 31_102. For example, power monitor 31_109 can send a "system.energy" event to sampling daemon 31_102 to indicate the amount of energy consumed over the period of time during which the application was active.

In some implementations, sampling daemon 31_102 can receive device temperature statistics from thermal daemon 31_110. For example, thermal daemon 31_110 can monitor the operating temperature conditions of the mobile device 31_100 using one or more temperature sensors. Thermal daemon 31_110 can be configured to periodically report temperature changes to sampling daemon 31_102. For example, thermal daemon 31_110 can determine the operating temperature of mobile device 31_100 every five seconds and report the temperature or thermal level of mobile device 31_100 to sampling daemon 31_102. For example, thermal daemon 31_110 can send a "system.thermalLevel" event to sampling daemon 31_102 to report the current operating temperature or thermal level of mobile device 31_100. Sampling daemon 31_102 can store the reported temperatures in event data store 31_104.

In some implementations, sampling daemon 31_102 can receive device settings statistics from device settings process 31_112. For example, device settings process 31_112 can be a function or process of the operating system of mobile device 31_100. Device settings process 31_112 can, for example, receive user input to adjust various device settings, such as turning on/off airplane mode, turning on/off Wi-Fi, turning on/off roaming, etc. Device settings process 31_112 can report changes to device settings to sampling daemon 31_102. Each device setting can have a corresponding predefined event attribute. For example, device settings process 31_112 can send a "system.airplaneMode" event to sampling daemon 31_102 when the user turns on or off airplane mode on the mobile device 31_100. Sampling daemon 31_102 can generate and store statistics for the device settings based on the received events and attribute values. For example, for each time a setting is enabled (or disabled), sampling daemon 31_102 can store data that indicates the amount of time that has passed since the setting was previously enabled and the amount of time (e.g., duration) that the setting was enabled.

Similarly, in some implementations, sampling daemon 31_102 can receive notifications from other mobile device 31_100 components (e.g., device sensors 31_114) when other events occur. For example, sampling daemon 31_102 can receive notifications when the mobile device's screen is turned on or off (e.g., "system.backlight" event), when the mobile device 31_100 is held next to the user's face (e.g., "system.proximity" event), when a cell tower handoff is detected, when the baseband processor is in a search mode (e.g., "system.btlescan" event), when the mobile device 31_100 has detected that the user is walking, running and/or driving (e.g., "system.motionState" event). In each case, the sampling daemon 31_102 can receive a notification at the start and end of the event. In each case, the sampling daemon 31_102 can generate and store statistics indicating the amount of time that has passed since the event was last detected and the duration of the event. The sampling daemon 31_102 can receive other event notifications and generate other statistics as described further below with respect to specific use cases and scenarios.

Application Events

In some implementations, sampling daemon 31_102 can receive event information from applications on mobile device 31_100. For example, applications on mobile device 31_100 can generate events that include predefined or dynamically defined attributes to sampling daemon 31_102 to track various application-specific events. For example, sampling daemon 31_102 can receive calendar events (e.g., including a "calendar.appointment," "calendar.meeting," or "calendar.reminder" attribute etc.) from calendar application 31_116. The calendar events can include a "calendar.appointment," "calendar.meeting," or "calendar.reminder" attribute that has values that specify locations, times, or other data associated with various calendar events or functions. Sampling daemon 31_102 can store the attribute name, attribute duration and/or time when the attribute is scheduled to occur, for example. In some implementations, sampling daemon 31_102 can receive clock events (e.g., including a "clock.alarm" attribute) from clock application 31_118. For example, sampling daemon 31_102 can store the attribute name (e.g., "clock.alarm") and a value indicating a time when the alarm is scheduled to occur. Sampling daemon 31_102 can receive event information from other applications (e.g., media application, passbook application, etc.) as described further below.

Application Statistics

In some implementations, sampling daemon 31_102 can collect application statistics across application launch events. For example, sampling daemon 31_102 can collect statistics (e.g., events, "bundleId" attribute values) for each application across many invocations of the application. For example, each application can be identified with a hash of its executable's filesystem path and the executable's content's hash so that different versions of the same application can be handled as distinct applications. The application hash value can be submitted to sampling daemon 31_102 in a "bundleId" event as a value for the "bundleId" attribute, for example.

In some implementations, sampling daemon 31_102 can maintain a counter that tracks background task completion assertion events for each application. For example, each time an application is run as a background task (e.g., not visible in the foreground and/or currently in use by the user) the application or application manager 31_106 can notify sampling daemon 31_102 when the application is terminated or is suspended and the sampling daemon 31_102 can increment the counter. Sampling daemon 31_102 can maintain a counter that tracks the cumulative number of seconds across application launches that the application has run in the background. For example, sampling daemon 31_102 can analyze "bundleId" start and stop events to determine when applications are started and stopped and use the timestamps of start and stop events to determine how long the application has run. In some implementations, sampling daemon 31_102 can maintain separate counters that count the number of data connections, track the amount of network data traffic (e.g., in bytes), track the duration and size of filesystem operations and/or track the number of threads associated with each application. Sampling daemon 31_102 can maintain a count of the cumulative amount of time an application remains active across application launches, for example. These are just a few examples of the types of application statistics that can be generated by sampling daemon 31_102 based on events and attribute data received by sampling daemon 31_102 and stored in event data store 31_104. Other statistics can be generated or collected, as described further below.

Heuristics

In some implementations, mobile device 31_100 can be configured with heuristic processes that can adjust settings of device components based on events detected by sampling daemon 31_102. For example, heuristic processes 31_120 can include one or more processes that are configured (e.g., programmed) to adjust various system settings (e.g., CPU power, baseband processor power, display lighting, etc.) in response to one or more trigger events and/or based on the statistics collected or generated by sampling daemon 31_102.

In some implementations, heuristic process 31_120 can register with sampling daemon 31_102 to be invoked or activated when a predefined set of criteria is met (e.g., the occurrence of some trigger event). Trigger events might include the invocation of a media player application (e.g., “bundleId” event) or detecting that the user has started walking, running, driving, etc. (e.g., “motionState” event). The trigger event can be generalized to invoke a heuristic process 31_120 when some property, data, statistic, event, attribute, attribute value etc. is detected in event data 31_104 or by sampling daemon 31_102. For example, a heuristic process 31_120 can be invoked when sampling daemon 31_102 receives an application start notification (e.g., “bundleId” start event that specifies a specific application) or a temperature (e.g., “thermalLevel” event) above a certain threshold value. A heuristic process 31_120 can be invoked when sampling daemon 31_102 receives an event associated with a specified attribute or attribute value. A heuristic process 31_120 can register to be invoked when a single event occurs or statistic is observed. A heuristic process 31_120 can register to be invoked when a combination of events, data, attributes, attribute values and/or statistics are observed or detected. Heuristic process 31_120 can be triggered or invoked in response to specific user input (e.g., “airplaneMode” event, “sleepWake” event, etc.). When sampling process 31_102 detects the events for which a heuristic process 31_120 registered, sampling process 31_102 can invoke the heuristic process 31_120.

In some implementations, when a heuristic process 31_120 is invoked, the heuristic process 31_120 can communicate with sampling daemon 31_102 to retrieve event data from event data store 31_104. The heuristic process 31_120 can process the event data and/or other data that the heuristic process 31_120 collects on its own to determine how to adjust system settings to improve the performance of mobile device 31_100, improve the user’s experience while using mobile device 31_100 and/or avert future problems with mobile device 31_100.

In some implementations, heuristic process 31_120 can make settings recommendations that can cause a change in the settings of various device components 31_122 of mobile device 31_100. For example, device components can include CPU, GPU, baseband processor, display, GPS, Bluetooth, Wi-Fi, vibration motor and other components.

In some implementations, heuristic process 31_120 can make settings recommendations to control multiplexer 31_124. For example, control multiplexer 31_124 can be a process that arbitrates between component settings provided by heuristic processes 31_120 and other processes and/or functions of mobile device 31_100 that influence or change the settings of the components of mobile device 31_100. For example, thermal daemon 31_110 can be a heuristics process that is configured to make adjustments to CPU power, display brightness, baseband processor power and other component settings based on detecting that the mobile device 31_100 is in the middle of a thermal event (e.g., above a threshold temperature). However, heuristic process 31_120 can be configured to make adjustments to CPU power, display brightness, baseband processor power and other component settings as well. Thus, in some implementations, heuristic process 31_120 and thermal daemon 31_110 can make settings adjustment recommendations to control multiplexer 31_124 and control multiplexer 31_124 can determine which settings adjustments to make. For example, control multiplexer 31_124 can prioritize processes and perform adjustments based on the priority of the recommending process. Thus, if thermal daemon 31_110 is a higher priority process than heuristic process 31_120, control multiplexer 31_124 can adjust the settings of the CPU, display, baseband processor, etc. according to the recommendations of thermal daemon 31_110 instead of heuristic process 31_120.

In some implementations, a mobile device 31_100 can be configured with multiple heuristic processes 31_120. The heuristic processes 31_120 can be configured or reconfigured over the air. For example, the parameters (e.g., triggers, threshold values, criteria, and output) of each heuristic process 31_120 can be set or adjusted over the network (e.g., cellular data connection, Wi-Fi connection, etc.). In some implementations, new heuristic processes 31_120 can be added to mobile device 31_100. For example, over time new correlations between trigger events, statistical data and device settings can be determined by system developers. As these new correlations are identified, new heuristic processes 31_120 can be developed to adjust system settings to account for the newly determined relationships. In some implementations, new heuristic processes 31_120 can be added to mobile device 31_100 over the network. For example, the new heuristic processes 31_120 can be downloaded or installed on mobile device 31_100 over the air (e.g., cellular data connection, Wi-Fi connection, etc.).

Example Heuristic Processes

In some implementations, a heuristic process 31_120 can be configured to adjust system settings of the mobile device 31_100 to prevent the mobile device 31_100 from getting too hot when in the user’s pocket. For example, this hot-in-pocket heuristic process can be configured to register with sampling daemon 31_102 to be invoked when the mobile device’s display is off (e.g., “system.backlight” event has an attribute value of zero/false) and when the mobile device 31_100 is not playing any entertainment media (e.g., music, movies, video, etc.). When invoked, the hot-in-pocket heuristic can make recommendations to reduce CPU power and GPU power to reduce the operating temperature of mobile device 31_100, for example.

In some implementations, heuristic process 31_120 can be configured to adjust location accuracy when the mobile device’s display is not being used (e.g., “system.backlight” event has an attribute value of zero/false). For example, if the mobile device’s display is not being used (e.g., the display is turned off, as indicated by the “backlight” attribute event described above), the mobile device 31_100 cannot display map information or directions to the user. Thus, the user is not likely using the location services of the mobile device 31_100 and the location services (e.g., GPS location, Wi-Fi location, cellular location, etc.) can be adjusted to use less power. The location accuracy heuristic process can register with sampling daemon 31_102 to be invoked when the mobile device’s display is off. When invoked, the heuristic process can adjust the power levels of the GPS processor, Wi-Fi transmitter, cellular transmitter, baseband processor or terminate processes used to determine a location of the mobile device 31_100 in order to conserve the energy resources of mobile device 31_100.

In some implementations, a heuristic process 31_120 can be configured to adjust the settings of the mobile device’s ambient light sensor in response to the user’s behavior. For example, this user-adaptive ambient light sensor (ALS) heuristic process can be invoked by sampling daemon 31_102 when sampling daemon 31_102 receives data (e.g., an “ALS” attribute event) indicating that the ambient light sensor has detected a change in the ambient light surrounding mobile device 31_100, that the ambient light sensor system has adjusted the brightness of the display and/or that the user has provided input to adjust the brightness of the display.

When invoked, the user-adaptive ALS heuristic can request additional information from sampling daemon 31_102 with respect to ALS display adjustments and user initiated display adjustments to determine if there is a pattern of user input that indicates that when the ALS adjusts the display brightness up or down and the user adjusts the display brightness in the opposite direction (e.g., a "system.ALS" event followed by a "system.backlight" event). For example, the user may ride the bus or the train to work. The bus lights may be turned on and off during the ride. The ambient light sensor can detect the change in ambient light and increase the display brightness when the lights come on. Since the lights only come on temporarily, the user may decrease the display brightness when the lights turn off again. This pattern of user input can be tracked (e.g., through "backlight" attribute events) and correlated to time of day, calendar or alarm event entry, or travel pattern by the heuristic process to determine under what circumstances or context the user adjusts the display brightness in response to an ALS display adjustment. Once the user-adaptive ALS heuristic process determines the pattern of input and context, the heuristic process can adjust the settings of the ALS to be more or less aggressive. For example, the ALS can be adjusted to check the level of ambient light more or less frequently during the determined time of day, calendar or alarm entry, or travel pattern and adjust the display brightness accordingly.

The above heuristic processes are a few examples of heuristic processes and how they might be implemented in the system described in this section. Other heuristic processes can be implemented and added to the system as they are developed over time. For example, additional heuristic processes can be configured or programmed to adjust CPU, GPU, baseband processors or other components of the mobile device in response to detecting events or patterns of events related to temperature measurements, user input, clock events (e.g., alarms), calendar events and/or other events occurring and detected on the mobile device.

Example Heuristic Registration and Invocation Processes

FIG. 31_2 illustrates an example process 31_200 for invoking heuristic processes. At step 31_202, the sampling daemon 31_102 can be initialized. For example, sampling daemon 31_102 can be initialized during startup of the mobile device 31_100.

At step 31_204, the sampling daemon 31_102 can invoke the heuristic processes configured on the mobile device 31_100 during initialization of the sampling daemon 31_102. For example, sampling daemon 31_102 can cause each heuristic process 31_120 to execute on mobile device 31_100 and run through their initialization subroutines.

At step 31_206, the sampling daemon 31_102 can receive event registration messages from each heuristic process 31_120. For example, during the initialization subroutines of the heuristic processes 31_120, the heuristic processes 31_120 can send information to sampling daemon 31_102 indicating which attribute events should trigger an invocation of heuristic process 31_120. Sampling daemon 31_102 can store the registration information in a database, such as event data store 31_104, for example. The registration information can include an identification of the heuristic process (e.g., executable name, file system path, etc.) and event criteria (identification of attributes, attribute values, threshold, ranges, etc.) so that sampling daemon 31_102 can call the heuristic process 31_120 when the specified event is detected.

At step 31_208, the sampling daemon 31_102 can receive attribute event data. For example, sampling daemon 31_102 can receive attribute event data from various system components, including the application manager 31_106, sensors 31_114, calendar 31_116 and clock 31_118, as described above.

At step 31_210, the sampling daemon 31_102 can compare the received attribute event data to the heuristic registration data. For example, as attribute event data is reported to sampling daemon 31_102, sampling daemon 31_102 can compare the event data (e.g., attribute values), or the statistics generated from the event data, to the registration information received from the heuristic processes 31_120.

At step 31_212, the sampling daemon 31_102 can invoke a heuristic process based on the comparison performed at step 31_210. For example, if the event data (e.g., attribute data) and/or statistics, meet the criteria specified in the heuristic registration data for a heuristic process 31_120, then the sampling daemon 31_102 can invoke the heuristic process 31_120. For example, if the event data and/or statistics data cross some threshold value specified for an event by the heuristic process during registration, then the heuristic process can be invoked by sampling daemon 31_102. Alternatively, the mere occurrence of a particular attribute event can cause invocation the heuristic process 31_120.

FIG. 31_3 illustrates a process 31_300 for adjusting the settings of a mobile device 31_100 using a heuristic process 31_120. At step 31_302, the heuristic process 31_120 is initialized. For example, the heuristic process 31_120 can be invoked by sampling daemon 31_102 so that the heuristic process 31_120 can run through its initialization subroutines. For example, the invocation can be parameterized to indicate that the heuristic process 31_120 should run through its initialization subroutines during this invocation.

At step 31_304, the heuristic process 31_120 can register with sampling daemon 31_102 for system events. For example, during initialization, the heuristic process 31_120 can send a message to sampling daemon 31_102 that includes an identification of events, thresholds, attributes, attribute values or other criteria for invoking the heuristic process 31_120. When the event occurs and/or the criteria are met, sampling daemon 31_102 can invoke the heuristic process 31_120.

At step 31_306, the heuristic process 31_120 can shut down or terminate. For example, the heuristic process 31_120 is not needed by the system until the registration criteria are met for the heuristic process 31_120. Thus, to conserve device resources (e.g., battery power, processing power, etc.), the heuristic process 31_120 is terminated, shutdown or suspended until it is needed (e.g., triggered by sampling daemon 31_102).

At step 31_308, the heuristic process 31_120 can be restarted. For example, sampling daemon 31_102 can invoke the heuristic process 31_120 when sampling daemon 31_102 determines that the criteria specified by the heuristic process 31_120 in the registration message have been met.

At step 31_310, the heuristic process 31_120 can obtain event data from sampling daemon 31_102. For example, once restarted, the heuristic process 31_120 can query sampling daemon 31_102 for additional attribute event data.

The heuristic process 31_120 can be configured to interact with other system resources, processes, sensors, etc. to collect data, as needed.

At step 31_312, the heuristic process 31_120 can process event data to determine component settings. For example, the heuristic process 31_120 can use the event data and/or statistics from the sampling daemon 31_102 and/or the data collected from other components of the system to determine how to adjust the settings of various components of the mobile device 31_100. For example, if heuristic process 31_120 determines that mobile device 31_100 is too hot, heuristic process 31_120 can determine which power settings of mobile device 31_100 will reduce the operating temperature of mobile device 31_100.

At step 31_314, the heuristic process 31_120 can transmit the determined component settings to the control multiplexer 31_124. For example, the control multiplexer 31_124 can arbitrate device settings recommendations received from the heuristic process 31_120 and other system components (e.g., thermal daemon 31_110). The control multiplexer 31_124 can then adjust various components (e.g., CPU, GPU, baseband processor, display, etc.) of the mobile device 31_100 according to the received settings recommendations.

Forecasting Events

In some implementations, attribute event data stored in event data store 31_104 (e.g., historical data) can be used by sampling daemon 31_102 to predict the occurrence of future events. For example, "bundleId" attribute events can be analyzed to predict when a user will invoke applications (e.g., any application or a specific application). The "mailapp.mailbox" event that specifies a particular email folder (e.g., "mailbox" attribute value set to "work" folder) can be analyzed to predict when a user will use a particular email folder of the "mailapp" application.

Event History Window Specification

In some implementations, an event forecast can be generated based on an event history window specification. For example, the window specification can be generated by a client to specify a time period of interest, or recurring time period of interest, upon which the client wishes to base an event forecast. The window specification can include four components: a start time, an end time, a recurrence width, and a recurrence frequency. The start time can indicate the date and/or time in history when the window should start. The end time can indicate the date and/or time in history when the window should end. The recurrence width can indicate a block of time (e.g., four hours starting at the start time) that is of interest to a client. The recurrence frequency can indicate how frequently the block of time should be repeated starting at the start time (e.g., every 8 hours, every two days, every week, every two weeks, etc.).

In some implementations, only the events that occur within the specified block of time (e.g., time period of interest) will be analyzed when generating an event forecast. For example, if the current date is May 13, 2014, a window specification can specify a start date of May 11, 2014 at 12:00 pm, an end date of May 12 at 12 pm, a recurrence width of 1 hour, and a recurrence frequency of 4 hours. This window specification will cause the sampling daemon 31_102 to analyze event data within each 1 hour block (e.g., time period of interest) that occurs every 4 hours starting on May 11, 2014 at 12:00 pm and ending on May 12, 2014 at 12:00 pm (e.g., block 1: May 11, 2014 at 12:00-1:00 pm; block 2: May 11, 2014 at 4:00-5:00 pm; block 3: May 11, 2014 at 8:00-9:00 pm, etc.). In some implementations, when no recurrence width is specified, the entire time period from the start time to the end time will be analyzed to forecast events.

In some implementations, sampling daemon 31_102 can automatically generate an event history window specification. For example, sampling daemon 31_102 can identify patterns in the event history data stored in event data store 31_104. If a client requests a forecast for "bundleId" events but does not provide a window specification, sampling daemon 31_102 can, for example, identify a pattern for the "bundleId" attribute/event that indicates that applications are typically invoked by the user at 8:00-9:00 am, 11:30 am-1:30 pm, and 7:00-11:00 pm. Sampling daemon 31_102 can automatically generate a window specification that includes those time periods and excludes other times of day so that a requested forecast will focus on time periods that are relevant to the requested attribute. Similarly, sampling daemon 31_102 can automatically generate an event history window specification for a particular (e.g., specified) attribute value. For example, if the client requests a forecast for "bundleId" events having an attribute value of "mailapp," then sampling daemon 31_102 can analyze the event history data to identify patterns of occurrences related to the "mailapp" value. If the "mailapp" "bundleId" attribute value is recorded in the event history data every day at 10:00 am, 12:00 pm and 5:00 pm, then sampling daemon 31_102 can generate a window specification that specifies time periods of interest around those times of day.

Temporal Forecasts

In some implementations, a temporal forecast can be generated for an attribute or attribute value. The temporal forecast can indicate, for example, at what time of day an event associated with the attribute or attribute value is likely to occur. For example, a client of sampling daemon 31_102 can request a temporal forecast for the "bundleId" attribute (e.g., application launches) over the last week (e.g., last 7 days). To generate the forecast, a 24-hour day can be divided into 96 15-minute timeslots. For a particular timeslot (e.g., 1:00-1:15 pm) on each of the last seven days, the sampling daemon 31_102 can determine if a "bundleId" event occurred and generate a score for the timeslot. If the "bundleId" event occurred during the particular timeslot in 2 of the 7 days, then the likelihood (e.g., score) that the "bundleId" event will occur during the particular timeslot (e.g., 1:00-1:15 pm) is 0.29 (e.g., 2 divided by 7). If the "bundleId" event occurred during a different timeslot (e.g., 12:15-12:30 pm) on 4 of the 7 days, then the likelihood (e.g., score) that the "bundleId" event will occur during that timeslot is 0.57 (e.g., 4 divided by 7).

Similarly, a client can request a temporal forecast for a particular attribute value. For example, instead of requesting a temporal forecast for the "bundleId" attribute (e.g., "bundleId" event), the client can request a temporal forecast for "bundleId" events where the "bundleId" attribute value is "mailapp". Thus, the client can receive an indication of what time (e.g., 15-minute time-slot) of day the user will likely invoke the "mailapp" application.

In some implementations, the temporal forecast can be generated based on an event history window specification. For example, if the client provides a window specification that specifies a 4-hour time period of interest, the temporal forecast will only generate likelihood scores for the 15-minute timeslots that are in the 4-hour time period of interest. For example, if the time period of interest corresponds to 12:00-4:00 pm for each of the last 3 days, then 16 timeslots will be generated during the 4 hour period of interest and a score will be generated for each of the 16 15 minute timeslots. Scores will not be generated for timeslots outside the specified 4 hour time period of interest.

Peer Forecasts

In some implementations, sampling daemon 31_102 can generate peer forecasts for attributes. For example, a peer forecast can indicate the relative likelihoods of values for an attribute occurring during a time period of interest relative to all values (e.g., occurrences) of the same attribute. For example, a client of sampling daemon 31_102 can request a peer forecast of the "bundleId" attribute over a time period of interest (e.g., 11:00 am-1:00 pm) as specified by a window specification submitted with the request. If, during the time period of interest, "bundleId" events having attribute values "mailapp," "contacts," "calendar," "webbrowser," "mailapp," "webbrowser," "mailapp" occur, then the relative likelihood (i.e., score) of "mailapp" occurring is 0.43 (e.g., 3/7), the relative likelihood of "webbrowser" occurring is 0.29 (e.g., 2/7) and the relative likelihoods for "contacts" or "calendar" occurring is 0.14 (e.g., 1/7).

In some implementations, a client of sampling daemon 31_102 can request a peer forecast for an attribute. For example, if a client requests a peer forecast for an attribute without specifying a value for the attribute, then sampling daemon 31_102 will generate a peer forecast and return the various probability scores for all values of the attribute within the time period of interest. Using the example peer forecast above, sampling daemon 31_102 will return a list of attribute values and scores to the requesting client, for example: "mailapp":0.43; "webbrowser":0.29; "contacts": 0.14; "calendar":0.14.

In some implementations, a client of sampling daemon 31_102 can request a peer forecast for an attribute value. For example, the client can request a peer forecast for the "bundleId" attribute having a value of "mailapp." Sampling daemon 31_102 can generate a peer forecast for the "bundleId" attribute according to the window specification provided by the client, as described above. For example, the sampling daemon 31_102 can calculate the relative likelihood (i.e., score) of "mailapp" occurring is 0.43 (e.g., 3/7), the relative likelihood of "webbrowser" occurring is 0.29 (e.g., 2/7) and the relative likelihoods for "contacts" or "calendar" occurring is 0.14 (e.g., 1/7). Sampling daemon 31_102 can return a score for the requested "mailapp" value (e.g., 0.43) to the client. If the requested value is not represented in the time period of interest as specified by the window specification, then a value of zero will be returned to the client.

Panorama Forecasts

In some implementations, a panorama forecast can be generated to predict the occurrence of an attribute event. For example, the temporal and peer forecasts described above use the relative frequency of occurrence of events for a single attribute or attribute value to predict future occurrences of that attribute. This "frequency" forecast type (e.g., frequency of occurrence) uses only the data associated with the attribute or attribute value specified in the forecast request. In contrast, a "panorama" forecast can use other data (e.g., location data, beacon data, network quality, etc.) in the event data received for the attribute or attribute value specified in the forecast request. In some implementations, a panorama forecast can use data from events associated with other attributes or attribute values. For example, when a client requests a temporal forecast or a peer forecast for a specified attribute or attribute value and also specifies that the forecast type (i.e., forecast flavor) is panorama, sampling daemon 31_102 will analyze event data for the specified attribute or attribute value and event data for other attributes and attribute value to identify correlations between the specified event and other events received by sampling daemon 31_102. For example, a frequency forecast for attribute "bundleId" having a value "mailapp" might assign a score of 0.4 to the 9:00 am 15-minute timeslot. However, a panorama forecast might determine that there is a strong correlation between the "mailapp" attribute value and the user's work location. For example, a panorama forecast might determine that if the user is at a location associated with work, the mailapp is invoked 90% of the time in the 9:00 am 15-minute timeslot. Thus, sampling daemon 31_102 can assign a higher score (e.g., 0.9) to the "mailapp" forecast score for the 9:00 am 15-minute timeslot.

Similarly, sampling daemon 31_102 might find a strong correlation between the "mailapp" "bundleId" attribute value and an occurrence of an event associated with the "motionState" attribute value "stationary." For example, sampling daemon 31_102 can determine that the correlation between use of the mailapp application and mobile device 31_100 being stationary is 95%. Sampling daemon 31_102 can determine that the correlation between use of the mailapp and mobile device 31_100 being in motion is 5%. Thus, sampling daemon 31_102 can adjust the forecast score (e.g., 0.95 or 0.05) for the "mailapp" attribute value for a particular timeslot based on whether mobile device is moving or stationary.

Scoreboarding—Frequency vs. Panorama

In some implementations, sampling daemon 31_102 can keep track of which forecast type is a better predictor of events. For example, when sampling daemon 31_102 receives an attribute event, sampling daemon 31_102 can generate frequency and panorama forecasts for the attribute or attribute value associated with the received event and determine which forecast type would have been a better predictor of the received attribute event. Stated differently, sampling daemon 31_102 can determine whether the frequency forecast type or the panorama forecast type would have been a better predictor of the received attribute event if the forecasts were generated immediately before the attribute event was received.

In some implementations, sampling daemon 31_102 can maintain a scoreboard for each forecast type (e.g., default, panorama). For example, each time that sampling daemon 31_102 determines that the frequency forecast type would have been a better predictor for a received event, sampling daemon 31_102 can increment the score (e.g., a counter) for the frequency forecast type. Each time that sampling daemon 31_102 determines that the panorama forecast type would have been a better predictor for a received event, sampling daemon 31_102 can increment the score (e.g., counter) for the panorama forecast type.

In some implementations, sampling daemon 31_102 can determine a default forecast type based on the scores generated for each forecast type (e.g., frequency, panorama). For example, if the scoreboarding process generates a higher score for the panorama forecast type, then panorama will be assigned as the default forecast type. If the scoreboarding process generates a higher score for the frequency forecast type, then frequency will be assigned as the default forecast type. When a client requests a peer or temporal forecast, the client can specify the forecast type (e.g., panorama, frequency, default). If the client does not specify a forecast type, then the default forecast type will be used to generate peer and/or temporal forecasts.

Attribute Statistics

In some implementations, a client can request that sampling daemon 31_102 generate statistics for an attribute or an attribute value. For example, similar to forecast generation, a client can specify a history window over which statistics for an attribute or attribute value should be generated. The sampling daemon 31_102 will analyze attribute events that occur within the specified history window when generating statistics for the specified attribute or attribute value. The client request can specify which of the following statistics should be generated by sampling daemon 31_102.

In some implementations, sampling daemon 31_102 can generate a "count" statistic for an attribute or attribute value. For example, the "count" statistic can count the number of events associated with the specified attribute or attribute value that occur within the specified history window.

In some implementations, sampling daemon 31_102 can generate statistics based on attribute values. For example, a client can request and sampling daemon 31_102 can return the first value and/or the last value for an attribute in the specified history window. A client can request and sampling daemon 31_102 can return the minimum, maximum, mean, mode and standard deviation for all values associated with the specified attribute within the specified history window. The sampling daemon 31_102 can generate or determine which values are associated with requested percentiles (e.g., 10th, 25th, 50th, 75th, 90th, etc.)

In some implementations, sampling daemon 31_102 can generate duration statistics. For example, sampling daemon 31_102 can determine a duration associated with an attribute value by comparing an attribute's start event with the attribute's stop event. The time difference between when the start event occurred and when the stop event occurred will be the duration of the event. In some implementations, a client can request and sampling daemon 31_102 can return the minimum, maximum, mean, mode and standard deviation for all durations associated with the specified attribute or attribute value within the specified history window. The sampling daemon 31_102 can generate or determine which duration values are associated with requested percentiles (e.g., 10th, 25th, 50th, 75th, 90th, etc.)

In some implementations, sampling daemon 31_102 can generate event interval statistics. For example, sampling daemon 31_102 can determine a time interval associated with the arrival or reporting of an event associated with an attribute value by comparing a first occurrence of the attribute event with a subsequent occurrence of an attribute event. The time difference between when the first event occurred and when the subsequent event occurred will be the time interval between occurrences of the event. In some implementations, a client can request and sampling daemon 31_102 can return the minimum, maximum, mean, mode and standard deviation for all time interval values associated with the specified attribute or attribute value within the specified history window. The sampling daemon 31_102 can generate or determine which interval values are associated with requested percentiles (e.g., 10th, 25th, 50th, 75th, 90th, etc.).

Keep Applications Up To Date—Fetching Updates

FIG. 31_4 illustrates an example system 31_400 for performing background fetch updating of applications. In some implementations, mobile device 31_100 can be configured to predictively launch applications as background processes of the mobile device 31_100 so that the applications can download content and update their interfaces in anticipation of a user invoking the applications. For example, the user application launch history data (e.g., "system.bundleId" start events) maintained by sampling daemon 31_102 can be used to forecast (predict) when the user will invoke applications of the mobile device 31_100. These predicted applications can be launched by the application manager 31_106 prior to user invocation so that the user will not be required to wait for a user invoked application to download current content and update the graphical interfaces of the applications.

Determining when to Launch Applications—Temporal Forecasts

In some implementations, application manager 31_106 can request an application invocation forecast from sampling daemon 31_102. For example, sampling daemon 31_102 can provide an interface that allows the application manager 31_106 to request temporal forecast of application launches (e.g., "bundleId" start events) on mobile device 31_100. Sampling daemon 31_102 can receive events (e.g., "bundleId" start events) that indicate when the user has invoked applications on the mobile device 31_100, as described above. When application manager 31_106 requests a temporal forecast for the "bundleId" attribute, sampling daemon 31_102 can analyze the "bundleId" events stored in event data store 31_104 to determine when during the day (e.g., in which 15-minute timeslot) applications are typically invoked by the user. For example, sampling daemon 31_102 can calculate a probability that a particular time of day or time period will include an application invocation by a user using the temporal forecasting mechanism described above.

In some implementations, application manager 31_106 can request a temporal forecast for the "bundleId" attribute from sampling daemon 31_102 during initialization of the application manager 31_106. For example, application manager 31_106 can be invoked or launched during startup of mobile device 31_100. While application manager 31_106 is initializing, application manager 31_106 can request a temporal forecast of application invocations (e.g., "bundleId" start events) for the next 24 hours. Once the initial 24-hour period has passed, application manager 31_106 can request another 24-hour temporal forecast. This 24-hour forecast cycle can continue until the mobile device 31_100 is turned off, for example.

In some implementations, sampling daemon 31_102 can generate an application invocation (e.g., "bundleId" start event) temporal forecast for a 24-hour period. For example, sampling daemon 31_102 can divide the 24-hour period into 96 15-minute timeslots. Sampling daemon 31_102 can determine which applications have been invoked and at what time the applications were invoked over a number (e.g., 1 to 7) of previous days of operation based on the application launch history data (e.g., "bundleId" start event data) collected by sampling daemon 31_102 and stored in event data store 31_104.

In some implementations, when sampling daemon 31_102 generates a temporal forecast for the "bundleId" attribute, each 15-minute timeslot can be ranked according to a probability that an (e.g., any) application will be invoked in the 15-minute timeslot, as described above in the Temporal Forecast section.

Once the application invocation probabilities for each of the 96 timeslots is calculated, sampling daemon 31_102 can select a number (e.g., up to 64) of the timeslots having the largest non-zero probabilities and return information identifying the timeslots to application manager 31_106. For example, sampling daemon 31_102 can send application manager 31_106 a list of times (e.g., 12:00 pm, 1:45 pm, etc.) that correspond to the start of 15-minute timeslots that correspond to probable user invoked application launches (e.g., timeslots that have a score greater than zero).

In some implementations, application manager 31_106 can set timers based on the timeslots provided by sampling daemon 31_102. For example, application manager 31_106 can create or set one or more timers (e.g., alarms) that correspond to the timeslots identified by sampling daemon 31_102. When each timer goes off (e.g., at 12:00 pm), application manager 31_106 can wake (e.g., if sleeping, suspended, etc.) and determine which applications should be launched for the current 15-minute timeslot. Thus, the timers can trigger a fetch background update for applications that are likely to be invoked by a user within the corresponding timeslot.

In some implementations, other events can trigger a fetch background update for applications. For example, application manager 31_106 can register interest for various events with sampling daemon 31_102. For example, application manager 31_106 can register interest in events (e.g., attributes) related to turning on a cellular radio, baseband processor or establishing a network connection (e.g., cellular or Wi-Fi) so that application manager 31_106 can be notified when these events occur and can trigger a background application launch so that the application update can take advantage of an active network connection. Unlocking the mobile device 31_100, turning on the display and/or other interactions can trigger a background application launch and fetch update, as described further below. In some implementations, application manager 31_106 will not trigger a background application launch and fetch update if any background updates were performed within a previous number (e.g., seven) of minutes.

Determining What Applications to Launch—Peer Forecasts

In some implementations, application manager 31_106 can request that sampling daemon 31_102 provide a list of applications to launch for the current time. For example, when a timer goes off (e.g., expires) for a 15-minute timeslot or a triggering event is detected, application manager can request a peer forecast from sampling daemon 31_102 for the "bundleId" attribute so that sampling daemon 31_102 can determine which applications to launch for the current timeslot. Sampling daemon 31_102 can then generate peer forecasts that include a list of application identifiers and corresponding scores indicating the probability that each application will be invoked by the user at about the current time.

FIG. 31_5 illustrates peer forecasting for determining user invocation probabilities for applications on mobile device 31_100. For example, diagram 31_500 illustrates peer forecasting for a recent history window specification (e.g., previous 2 hours). Diagram 31_530 illustrates peer forecasting for a daily history window specification (e.g., 4 hour blocks every day for previous 7 days). Diagram 31_560 illustrates peer forecasting for a weekly history window specification (e.g., 4 hour block, once every 7 days). In some implementations, sampling daemon 31_102 can perform time series modeling using peer forecasts for different overlapping window specifications to determine the user invocation probabilities for applications on mobile device 31_100. If an application does not show up in the peer forecasts, the application can be assigned a zero probability value.

In some implementations, time series modeling can be performed by generating peer forecasts for different windows of time. For example, recent, daily and weekly peer forecasts can be generated by based on recent, daily and weekly event history window specifications. The recent, daily and weekly peer forecasts can then be combined to determine which applications to launch at the current time, as described further below.

In some implementations, user invocation probabilities can be generated based on recent application invocations. For example, user invocation probabilities can be generated by performing a peer forecast for the "bundleId" attribute with a window specification that specifies the previous two hours as the time period of interest (e.g., user initiated application launches within the last two hours).

As illustrated by diagram 31_500, application launch history data (e.g., "bundleId" event data) can indicate a number (e.g., four) of applications were launched in the previous two hours. For example, the dots and circles can represent applications where the empty circles can represent a single particular application (e.g., email, social networking application, etc.) and the empty circles represent invocations of other applications. The peer forecast probability score associated with the particular application using recent history (e.g., previous 2 hours) can be calculated by dividing the number of invocations of the particular application (e.g., 2) by the total number of application invocations (e.g., 4) within the previous two hours. In the illustrated case, the probability associated with the particular application using recent application launch history data is 2/4 or 50%.

User invocation probabilities can be generated based on a daily history of application launches (e.g., which applications were launched at the current time +−2 hours for each of the previous seven days). For example, user invocation probabilities can be generated by performing a peer forecast for the "bundleId" attribute with a window specification that specifies the current time of day +−2 hours (e.g., 4 hour recurrence width) as the time period of interest (e.g., user initiated application launches within the last two hours) with a recurrence frequency of 24 hours (e.g., repeat the recurrence width every 24 hours).

Diagram 31_530 illustrates a daily history of application launches (e.g., "bundleId" start events) that can be used to determine a user invocation probability for an application. For example, each box of diagram 31_530 represents time windows (e.g., current time of day +−2 hours) in each of a number (e.g., 7) of previous days (e.g., as specified in the window specification of a peer forecast) that can be analyzed to determine the user invocation probability (e.g., peer forecast score) for a particular application (e.g., empty circle). The probability associated with the particular application using daily history data can be calculated by dividing the number of invocations of the particular application in all windows (e.g., 6) by the total number of application invocations in all windows (e.g., 22). In the illustrated case, the probability associated with the particular application using daily launch history data is 6/22 or 27%.

User invocation probabilities can be generated based on a weekly history of application launches (e.g., which applications were launched at the current time +−2 hours seven days ago). For example, user invocation probabilities can be generated by performing a peer forecast for the "bundleId" attribute with a window specification that specifies the current time of day +−2 hours (e.g., 4 hour recurrence width) as the time period of interest (e.g., user initiated application launches within the last two hours) with a recurrence frequency of 7 days (e.g., repeat the recurrence width every 7 days).

Diagram 31_560 illustrates a weekly history of application launches (e.g., "bundleId" start events) that can be used to determine a user invocation probability for an application. For example, if the current day and time is Wednesday at 1 pm, the user invocation probability (e.g., peer forecast score) for an application can be based on applications launched during the previous Wednesday during a time window at or around 1 pm (e.g., +−2 hours). In the illustrated case, the probability associated with the particular application (e.g., empty circle) using weekly application launch history data is ¼ or 25%.

In some implementations, the recent, daily and weekly user invocation probabilities can be combined to generate a score for each application. For example, the recent, daily and weekly probabilities can be combined by calculating a weighted average of the recent (r), daily (d) and weekly (w) probabilities. Each probability can have an associated weight and each weight can correspond to an empirically determined predefined importance of each probability. The sum of all weights can equal one. For example, the weight for probability based on recent launches can be 0.6, the weight for the daily probability can be 0.3, and the weight for the weekly probability can be 0.1. Thus, the combined probability score can be the sum of 0.6(r), 0.3(d) and 0.1(w) (e.g., score=0.6r+0.3d+0.1w).

Referring back to FIG. 31_4, once the probability score is determined for each application based on the recent, daily and weekly probabilities, sampling daemon 31_102 can recommend a configurable number (e.g., three) of applications having the highest non-zero probability scores to the application manager 31_106 for launching to perform background fetch downloads/updates.

In some implementations, sampling daemon 31_102 can exclude from the "what to launch" analysis described above applications that do not support background updates (e.g., fetching) application updates, applications where the user has turned off background updates, applications that have opted out of background updates, and/or whichever application is currently being used by the user or is in the foreground on the display of the mobile device 31_100 since it is likely that the foreground application is already up to date.

In some implementations, once application manager 31_106 receives that recommended applications from sampling daemon 31_102, application manager 31_106 can ask sampling daemon 31_102 if it is ok to launch each of the recommended applications. Sampling daemon 31_102 can use its local admission control mechanism (described below) to determine whether it is ok for the application manager to launch a particular application. For example, application manager 31_106 can send the "bundleId" attribute with an attribute value that identifies one of the recommended applications to sampling daemon 31_102 and request that sampling daemon 31_102 perform admission control on the attribute value.

Local Admission Control

In some implementations, sampling daemon 31_102 can perform admission control for attribute events on mobile device 31_100. For example, admission control can be performed on an attribute or attribute value to determine whether a client application can perform an activity, action, function, event, etc., associated with the attribute. For example, a client of sampling daemon 31_102 can request admission of attribute "bundleId" having a value of "mailapp." In response to receiving the admission request, sampling daemon can determine whether the client can perform an activity associated with the "mailapp" attribute value (e.g., execute the "mailapp" application).

In some implementations, admission control can be performed based on budgets and feedback from voters. For example, when sampling daemon 31_102 receives an admission control request the request can include a cost associated with allowing the attribute event (e.g., launching an application, "bundleId" start event). Sampling daemon 31_102 can check a system-wide data budget, a system-wide energy budget and/or specific attribute budgets to determine whether the budgets associated with the attribute have enough credits remaining to cover the attribute event. If there is no budget associated with the attribute (e.g., the attribute is not a budgeted attribute), then the attribute event can be allowed to proceed (e.g., sampling daemon 31_102 will return an "ok" value in response to the admission control request). If there is a budget associated with the attribute and there is not enough credits left in the associated budget to cover the cost of the event, then the attribute event will not be allowed to proceed (e.g., sampling daemon 31_102 will return an "no" value in response to the admission control request).

If there is a budget associated with the attribute and there is enough credits left in the budget to cover the cost of the event, then the voters will be asked to vote on allowing the attribute to proceed. If all voters vote 'yes,' then the attribute event will be allowed to proceed (e.g., sampling daemon 31_102 will return an "ok" value in response to the admission control request). If any voter votes 'no,' then the attribute event will not be allowed to proceed (e.g., sampling daemon 31_102 will return an "no" value in response to the admission control request). Details regarding budgets and voters are described in the paragraphs below.

In some implementations, if an attribute or attribute value has not been reported in an event to sampling daemon 31_102 in a period of time (e.g., 7 days, one month, etc.) preceding the admission control request, then the sampling daemon 31_102 can return a "never" value in response to the admission control request. For example, sampling daemon 31_102 can generate a temporal or peer forecast to determine when to allow or admit an event associated with an attribute or attribute value. For example, there is no need to preempt an event that is not expected to occur (e.g., no need to prefetch data for applications that are not going to be invoked by the user).

Admission Control—Budgets

In some implementations, sampling daemon 31_102 can perform admission control based on budgets associated with attributes or attribute values. For example, sampling daemon 31_102 can determine whether to allow (e.g., admit) an activity (e.g., event) associated with an attribute or attribute value based on a budget associated with the attribute or attribute value. In some implementations, sampling daemon 31_102 can determine whether it is ok to admit an attribute or attribute value based on a system-wide energy budget and/or a system-wide data budget configured for mobile device 31_100. Sampling daemon 31_102 can store budget in accounting data store 31_402, including counters for keeping track of remaining data and energy budgets for the current time period (e.g., current hour). When a client requests admission control be performed for an attribute or attribute value, the client can specify a number representing the cost of allowing or admitting an event associated with the attribute or attribute value to occur. If there are enough credits in the budget associated with the attribute, then the attribute event will be voted on by the voters described below. If there are not enough credits in the budget associated with the attribute, then the attribute event will not be allowed to proceed.

System-Wide Energy Budget

In some implementations, sampling daemon 31_102 can determine whether it is ok to admit an attribute or attribute value based on an energy budget. For example, the energy budget can be a percentage (e.g., 5%) of the capacity of the mobile device's battery in milliamp hours.

In some implementations, the energy budget can be distributed among each hour in a 24-hour period. For example, sampling daemon 31_102 can utilize the battery utilization statistics (e.g., "system.energy" events) collected and stored in event data store 31_104 to determine a distribution that reflects a typical historical battery usage for each hour in the 24-hour period. For example, each hour can be assigned a percentage of the energy budget based on the historically or statistically determined energy use distribution or application usage forecast, as described above. Each hour will have at least a minimum amount of energy budget that is greater than zero (e.g., 0.1%, 1%, etc.). For example, 10% of the energy budget can be distributed among hours with no use data and the remaining 90% of the energy budget can be distributed among active use hours according to historical energy or application use. As each hour passes, the current energy budget will be replenished with the energy budget for the new/current hour. Any energy budget left over from a previous hour will be added to the current hour's budget.

In some implementations, accounting data store 31_402 can include a counter for determining how much energy budget remains available. For example, accounting data store 31_402 can include one or more counters that are initialized with the energy budget for the current hour. When the energy budget is used by an attribute event, the energy budget can be decremented by a corresponding amount. For example, application manager 31_106 can notify sampling daemon 31_102 when an application is launched or terminated using a "bundleId" start or stop event. In turn, sampling daemon 31_102 can notify power monitor 31_109 when an application is launched and when the application is terminated. Based on the start and stop times, power monitor 31_109 can determine how much energy was used by the application. Power monitor 31_109 can transmit the amount of power used by the application (e.g., by submitting a "system.energy" attribute event) to sampling daemon 31_102 and sampling daemon 31_102 can decrement the appropriate counter by the amount of power used.

In some implementations, when no energy budget remains for the current hour, sampling daemon 31_102 can decline the admission request for the attribute. For example, when the energy budget counters in accounting data store 31_402 are decremented to zero, no energy budget remains and no activities, events, etc., associated with attributes that are tied to the energy budget can be admitted. If enough energy budget remains for the current hour to cover the cost of the attribute event, sampling daemon 31_102 can return a "yes" value in response to the admission control request and allow the attribute event to proceed.

In some implementations, sampling daemon 31_102 will not base an admission control decision on the energy budget when the mobile device 31_100 is plugged into external power. For example, a remaining energy budget of zero will not prevent attribute events when the mobile device 31_100 is plugged into an external power source.

System-Wide Data Budget

In some implementations, sampling daemon 31_102 can determine whether it is ok to admit an attribute based on a data budget. For example, sampling daemon 31_102 can determine an average amount of network data consumed by the mobile device 31_100 based on statistical data (e.g., "system.networkBytes" attribute events) collected by sampling daemon 31_102 and stored in event data store 31_104. The network data budget can be calculated as a percentage of average daily network data consumed by the user/mobile device 31_100. Alternatively, the network data budgets can be predefined or configurable values.

In some implementations, the network data budgets can be distributed among each hour in a 24-hour period. For example, each hour can be allocated a minimum budget (e.g., 0.2 MB). The remaining amount of the network data budget can be distributed among each of the 24 hours according to historical network data use. For example, sampling daemon 31_102 can determine based on historical statistical data (e.g., "system.networkBytes" attribute events) how much network data is consumed in each hour of the day and assign percentages according to the amounts of data consumed in each hour. As each hour passes, the current data budget will be replenished with the data budget for the new/current hour. Any data budget left over from a previous hour can be added to the current hour's data budget.

In some implementations, accounting data store 31_402 can maintain data counters for network data budgets. As network data is consumed, the data counters can be decremented according to the amount of network data consumed. For example, the amount of network data consumed can be determined based on application start and stop events (e.g., "bundleId" start or stop events) provided to sampling daemon 31_102 by application manager 31_106. Alternatively, the amount of network data consumed can be provided by a process managing the network interface (e.g., network daemon 31_406, background transfer daemon 31_1302 in FIG. 31_13). For example, the network interface managing process can report "system.networkBytes" events to sampling daemon 31_102 that can be correlated to application start and stop events (e.g., "bundleId" events) to determine how much data an application consumes.

In some implementations, sampling daemon 31_102 can keep track of which network interface type (e.g., cellular or Wi-Fi) is used to consume network data and determine the amount of network data consumed based on the network interface type. The amount of network data consumed can be adjusted according to weights or coefficients assigned to each interface type. For example, network data consumed on a cellular data interface can be assigned a coefficient of one (1). Network data consumed on a Wi-Fi interface can be assigned a coefficient of one tenth (0.1). The total network data consumed can be calculated by adding the cellular data consumed to Wi-Fi data consumed divided by ten (e.g., total data=1*cellular data+0.1*Wi-Fi). Thus, data consumed over Wi-Fi will impact the data budget much less than data consumed over a cellular data connection.

In some implementations, when no data budget remains for the current hour, sampling daemon 31_102 can respond with a "no" reply to the admission control request. For example, when the data budget counters in accounting data store 31_402 are decremented to zero, no data budget remains and no activities associated with attributes that are tied to the data budget will be allowed. If there is enough remaining data budget in the current hour to cover the data cost of the attribute event, then sampling daemon 31_102 can respond with a "yes" reply to the admission control request.

Attribute Budgets

In some implementations, an attribute can be associated with a budget. For example, a predefined attribute or custom (dynamically defined) attribute can be associated with a budget through an API of the sampling daemon 31_102. A client (e.g., application, utility, function, third party application, etc.) of the sampling daemon 31_102 can make a request to the sampling daemon 31_102 to associate an attribute with a client-defined budget. The budget can be, for example, a number of credits.

Once the budget is allocated, reported events associated with the budgeted attribute can indicate a cost associated with the event and the budget can be decremented according to the specified cost. For example, a predefined system attribute "system.btlescan" can be configured on mobile device 31_100 to indicate when the mobile device 31_100 performs scans for signals from other Bluetooth low energy devices. The Bluetooth LE scan can be run as a background task, for example. The Bluetooth LE scan requires that the Bluetooth radio be turned on which, in turn, consumes energy from the battery of mobile device 31_100. To prevent the Bluetooth LE scan from consuming too much energy, the "btlescan" attribute can be assigned a budget (e.g., 24 credits). Every time a "btlescan" event is generated and reported to sampling daemon 31_102, the event can be reported with a cost (e.g., 1). The cost can be subtracted from the budget so that every time the "btlescan" attribute is reported in an event the budget of 24 is decremented by 1.

In some implementations, the attribute budget can be distributed over a time period. For example, the "btlescan" attribute budget can be distributed evenly over a 24 hour period so that the "btlescan" attribute can only spend 1 credit per hour. In some implementations, the attribute budget can be replenished at the end of a time period. For example, if the period for the "btlescan" attribute budget is 24 hours, then the "btlescan" attribute budget can be replenished every 24 hours.

In some implementations, a budget associated with an attribute can be a can be a subset (e.g., sub-budget) of another budget. For example, a budget for an attribute can be specified as a portion of another budget, such as the system-wide data or system-wide energy budgets described above. For example, the "mailapp.mailbox" attribute can be associated with a budget that is 5% of the data budget allocated for the system. The "btlescan" attribute can be associated with a budget that is 3% of the energy budget allocated for the system. The sub-budget (e.g., "mailbox" budget) can be tied to the super-budget (e.g., system data budget) such that decrementing the sub-budget also decrements the super-budget. In some implementations, if the super-budget is reduced to zero, then the sub-budget is also reduced to zero. For example, if the system data budget is at zero, the "mailbox" attribute budget will also be zero even if the no events have been reported for the "mailbox" attribute that would decrement the "mailbox" attribute budget.

In some implementations, sampling daemon 31_102 clients can request that the sampling daemon 31_102 return the amount of budget left for an attribute. For example, a client can make a request to the sampling daemon 31_102 for the budget remaining for the "btlescan" attribute. If three of 24 budgeted credits have been used, then sampling daemon 31_102 can return the value 21 to the requesting client.

In some implementations, a client can report an event that costs a specified number of budgeted credits when no credits remain in the budget for the associated attribute. When sampling daemon 31_102 receives an event (e.g., "btlescan" event) that costs 1 credit when there are no credits remaining in the budget, sampling daemon 31_102 can decrement the budget (e.g., −1) and return an error to the client that reported the event. The error can indicate that the attribute has no budget remaining, for example.

Attribute Budget Shaping

In some implementations, the attribute budget can be distributed based on historical usage information. For example, as events are reported for a budgeted attribute, requests (e.g., events associated with a cost) to use the budget for the attribute can be tracked over time. If a budget of 24 is allocated for the "btlescan" attribute, for example, the budget can initially be allocated evenly across a 24-hour period, as described above. As events are reported over time for an attribute associated with the budget, sampling daemon 31_102 can analyze the reported events to determine when during the 24-hour period the events are most likely to occur. For example, sampling daemon 31_102 can determine that the "btlescan" event frequently happens around 8 am, 12 pm and 6 pm but rarely happens around 2 am. Sampling daemon 31_102 can use this event frequency information to shape the distribution of the "btlescan" attribute's budget over the 24-hour period. For example, sampling daemon can allocate two budget credits for each timeslot corresponding to 8 am, 12 pm and 6 pm and zero budget credits for the timeslot associated with 2 am.

Admission Control—Voters

In some implementations, sampling daemon 31_102 can perform admission control based on feedback from other software (e.g., plugins, utilities, applications, heuristics processes) running on mobile device 31_100. For example, other software can be configured to work with sampling daemon 31_102 as a voter for admission control. For example, several voters (e.g., applications, utilities, daemons, heuristics, etc.) can be registered with sampling daemon 31_102 to vote on admission control decisions. For example, sampling daemon 31_102 can be configured to interface with a voter that monitors the thermal conditions of mobile device 31_100, a voter that monitors CPU usage of mobile device 31_100 and/or a voter that monitors battery power level of mobile device 31_100. When sampling daemon 31_102 receives an admission control request, each voter (e.g., thermal, CPU and battery) can be asked to vote on whether the activity associated with the specified attribute should be allowed. When all voters vote 'yes', then the attribute will be admitted (e.g., the activity associated with the attribute will be allowed to happen). When a single voter votes 'no', then the attribute will not be admitted (e.g., the activity associated with the attribute will not be allowed). In some implementations, the voters can be configured as plugin software that can be dynamically (e.g., at runtime) added to sampling daemon 31_102 to provide additional functionality to the admission control system. In some implementations, the voters can use the temporal and peer forecasting mechanisms described above when determining whether to admit or allow an event associated with an attribute or attribute value.

Network Daemon

In some implementations, a network daemon 31_406 can be configured as an admission control voter. The network daemon 31_406 can be configured to use a voting API of sampling daemon 31_102 that allows the network daemon 31_406 to receive voting requests from sampling daemon 31_102 and provide voting (e.g., yes, no) responses to sampling daemon 31_102. For example, the network daemon 31_406 can receive a voting request from sampling daemon 31_102 that includes an attribute and/or attribute value. The network daemon 31_406 can indicate that sampling daemon 31_102 should not admit or allow an event associated with an attribute or attribute value when the mobile device 31_100 is connected to a voice call and not connected to a Wi-Fi network connection, for example. For example, to prevent background updating processes (e.g., fetch processes) from interfering with or reducing the quality of voice calls, the network daemon 31_406 will not allow events (e.g., "bundleId" start events) associated with launching a background updating process when the user is connected to a voice call and not connected to a Wi-Fi connection. Thus, network daemon 31_406 can return a "no" value in response to a voting request when the mobile device 31_100 is connected to a call and not connected to Wi-Fi.

In some implementations, the network daemon 31_406 can indicate that sampling daemon 31_102 should not allow or admit an attribute event when the mobile device 31_100 has a poor quality cellular network connection. A poor quality cellular connection can be determined when transfer rate and/or throughput are below predefined threshold values. For example, if the mobile device 31_100 has a poor quality cellular network connection and is not connected to Wi-Fi, the network daemon 31_406 can prevent admission or execution of an attribute event that will waste battery energy and cellular data by using the poor quality network connection (e.g., launching an application that will attempt to download or upload data over a poor cellular connection) by returning a "no" value when sampling daemon 31_102 makes a voter request.

In some implementations, when network daemon 31_406 does not have information that indicates poor network conditions or some other condition that will effect network data usage or system performance, network daemon 31_406 can vote "yes" on the admission of the requested attribute.

Thermal Daemon

In some implementations, a thermal daemon 31_110 application can be configured as an admission control voter. The thermal daemon 31_110 can be configured to use a voting API of sampling daemon 31_102 that allows the thermal daemon 31_110 to receive voting requests from sampling daemon 31_102 and provide voting (e.g., yes, no) responses to sampling daemon 31_102. For example, the thermal daemon can receive a voting request from sampling daemon 31_102 that includes an attribute and/or attribute value. The thermal daemon 31_110 can indicate that sampling daemon 31_102 should not admit or allow an event associated with an attribute or attribute value when the thermal daemon 31_110 has detected a thermal event. For example, the thermal daemon 31_110 can monitor the temperature of the mobile device 31_100 and report temperature values to sampling daemon 31_102 by generating events that include the "thermalLevel" attribute and corresponding temperature value.

In some implementations, when thermal daemon 31_110 determines that the temperature of mobile device 31_100 is above a threshold temperature value, thermal daemon 31_110 can prevent sampling daemon 31_102 from allowing attribute events that may increase the operating temperature of mobile device 31_100 further by returning a "no" value when sampling daemon 31_102 sends a request to thermal daemon 31_110 to vote on an attribute (e.g., "bundleId") event.

In some implementations, sampling daemon 31_102 will only ask for a vote from thermal daemon 31_110 when an abnormal thermal condition currently exists. For example, sampling daemon 31_102 can maintain a thermal condition value (e.g., true, false) that indicates whether the mobile device 31_100 is operating at normal thermal conditions. If the current thermal condition of mobile device 31_100 is normal, then the thermal condition value can be true, for example. If the current thermal condition of mobile device 31_100 is abnormal (e.g., too hot, above a threshold temperature), then the thermal condition value can be false. Initially, the thermal condition value can be set to true (e.g., normal operating temperatures). Upon detecting that operating temperatures have risen above a threshold temperature, thermal daemon 31_110 can send sampling daemon 31_102 an updated value for the thermal condition value that indicates abnormal operating temperatures (e.g., false). Once the mobile device 31_100 cools down to a temperature below the threshold temperature, thermal daemon 31_110 can update the thermal condition value to indicate normal operating temperatures (e.g., true).

When sampling daemon 31_102 receives an admission control request for an attribute, sampling daemon 31_102 can check the thermal condition value to determine whether to ask thermal daemon 31_110 to vote on admission (allowance) of the attribute event. If the thermal condition value indicates normal operating temperatures (e.g., value is true), sampling daemon 31_102 will interpret the thermal condition value as a "yes" vote from thermal daemon 31_110.

If the thermal condition value indicates an abnormal operating temperature (e.g., value is false), sampling daemon 31_102 will send the attribute and/or attribute value to thermal daemon 31_110 to allow the thermal daemon 31_110 to vote on the specific attribute or attribute value.

In some implementations, thermal daemon 31_110 can determine how to vote (e.g., yes, no) on attributes and/or attribute values based on the current thermal condition of the mobile device 31_100 and a peer forecast for the attribute. For example, thermal daemon 31_110 can request a peer forecast for the attribute from sampling daemon 31_102. Thermal daemon 31_110 can request a peer forecast for the current time by generating a window specification that includes the current time (e.g., +−1 hour, 2 hours, etc.) in the time period of interest. Thermal daemon 31_110 will receive a peer forecast from the sampling daemon 31_102 that indicates likelihood scores for each value of the attribute that appears in the time period of interest. For example, if thermal daemon 31_110 requests a peer forecast for the "bundleId" attribute, thermal daemon 31_110 can receive a list of "bundleId" values (e.g., application identifiers) and associated forecast (e.g., probability, likelihood) scores. For example, if, during the time period of interest, "bundleId" events having attribute values "mailapp," "contacts," "calendar," "webbrowser," "mailapp," "webbrowser," "mailapp" occur, then the relative likelihood (i.e., score) of "mailapp" occurring is 0.43 (e.g., 3/7), the relative likelihood of "webbrowser" occurring is 0.29 (e.g., 2/7) and the relative likelihoods for "contacts" or "calendar" occurring is 0.14 (e.g., 1/7). In some implementations, thermal daemon 31_110 can order the list of attribute values according to score (e.g., highest scores at top, lowest scores at bottom). For example, the ordered list for the above "bundleId" attribute values from top to bottom is: "mailapp;" "webbrowser;" "contacts;" and "calendar".

In some implementations, thermal daemon 31_110 can determine when to vote yes on an attribute value based on where an attribute value is in the ordered list. For example, if the attribute value under consideration by thermal daemon 31_110 is not in the peer forecast list received from sampling daemon 31_102, then the attribute value will receive a 'no' vote from thermal daemon 31_110. If the attribute value is in the peer forecast list and is below a threshold level (e.g., index) in the list (e.g., in the bottom 25% of attributes based on scores), then thermal daemon 31_110 will vote 'no' on the attribute. If the attribute value is in the peer forecast list and is above a threshold level in the list (e.g., in the top 75% of attributes based on scores), then thermal daemon 31_110 will vote 'yes' on the attribute. Once the vote is determined, thermal daemon 31_110 will return the 'yes' (e.g., true) or 'no' (e.g., false) vote to sampling daemon 31_102.

In some implementations, thermal daemon 31_110 can be configured with a maximum threshold level to avoid voting 'no' on all attribute values (e.g., so that some attribute events will occur). The maximum threshold level can be 50% (e.g., top 50% get a 'yes' vote, bottom 50% get a 'no' vote) of attribute values in the ordered peer forecast list. Thermal daemon 31_110 can, therefore, adjust the threshold level that separates attribute values that will receive a 'yes' vote from attribute values that will receive a 'no' vote from the 0% to 50% of the attribute values with the lowest scores.

In some implementations, the threshold level for determining 'yes' or 'no' votes can be proportional to the thermal level (e.g., temperature) of mobile device 31_100. For example, thermal daemon 31_110 can be configured with a maximum operating thermal level (Lh) and a normal operating level (Ln). Thermal daemon 31_110 can determine the current operating thermal level (Lc) and determine what percentile of the thermal range (e.g., Lh-Ln) the mobile device 31_100 is currently operating at (e.g., Lc-Ln/Lh-Ln=%). Thermal daemon 31_110 can use the calculated percentile to determine what portion of the 0-50% attribute values should receive a 'no' vote. For example, if the current operating thermal level is calculated to be 65% of the thermal range, then the bottom 32.5% of attribute values by peer forecast score will receive a 'no' vote from thermal daemon 31_110. Thus, the least important attribute values will receive a 'no' vote while the most important attribute values will receive a 'yes' vote. Referring back to the "bundleId" example above, if the ordered list for the above "bundleId" attribute values from top to bottom is: "mailapp;" "webbrowser;" "contacts;" and "calendar," then "calendar" would receive a 'no' vote and "mailapp," "webbrowser," and "contacts" would receive a 'yes' vote (e.g., "mailapp," "webbrowser," and "contacts" being the most used applications). For example, if application manager 31_106 has made an admission control request for the "bundleId" attribute to determine which applications to launch, then "mailapp," "webbrowser," and "contacts" applications would be launched and "calendar" application would not be launched.

As another example, thermal daemon 31_110 can be asked to vote on the "mailapp.mailbox" attribute. A peer forecast can be generated for "mailapp.mailbox" attribute values that produce an ordered list of mail folders that indicate the most frequently accessed folder to the least frequently accessed folder (e.g., "inbox;" "personal;" "work;" "family;" "spam;" and "trash"). If the bottom 32.5% of attribute values are to receive a 'no' vote, then "spam" and "trash" will receive a 'no' vote. For example, if the "mailbox" application made the admission control request for the "mailapp.mailbox" attribute to determine which folders to fetch email for, then the "mailapp" application will fetch email for the "inbox," "personal," "work," and "family" folders and not fetch email for the "spam" and "trash" folders. In some implementations, attributes or attribute values that have received a 'no' vote from thermal daemon 31_110 can be notified when the thermal condition value maintained by sampling daemon 31_102 is reset to indicate normal operating temperatures (e.g., true value). For example, sampling daemon 31_102 can store data that identifies clients, attributes and attribute values that have received a 'no' vote. Upon receiving an updated thermal condition value (e.g., true) from thermal daemon 31_110, sampling daemon 31_102 can send a notification to the clients that received a 'no' vote to prompt the client to attempt another admission control request for the previously rejected attribute or attribute value. In some implementations, clients can resend an admission control request without prompting from sampling daemon 31_102. For example, a client may have an internal timer that causes the client to retry the admission control request after a period of time has elapsed.

Activity Monitor

In some implementations, an activity monitor application 31_408 can be configured as an admission control voter. The activity monitor 31_408 can be configured to use a voting API of sampling daemon 31_102 that allows the activity monitor 31_408 to receive voting requests from sampling daemon 31_102 and provide voting (e.g., yes, no) responses to sampling daemon 31_102. For example, the activity monitor 31_408 can receive a voting request from sampling daemon 31_102 that includes an attribute and/or attribute value. The activity monitor 31_408 can indicate that sampling daemon 31_102 should not admit or allow an event associated with an attribute or attribute value when mobile device 31_100 is using more than a threshold amount (e.g., 90%) of memory resources or CPU resources. For example, if mobile device 31_100 is already running many applications or processes that are using most of the memory resources or CPU resources of the mobile device 31_100, launching additional applications in the background will likely reduce the performance of the mobile device 31_100 by using up remaining memory resources. Thus, when the activity monitor 31_408 determines that memory or CPU usage exceeds a threshold value (e.g., 75%), activity monitor 31_408 can prevent application manager 31_106 from launching additional applications by returning a "no" value when sampling daemon 31_102 sends a request to vote on a "bundleId" attribute event. If the activity monitor 31_408 determines that the memory and/or CPU resources of mobile device 31_100 are below the threshold usage amount, the activity monitor 31_408 can return a "yes" value in response to the vote request from sampling daemon 31_102.

Launching a Background Fetch Application

In some implementations, when application manager 31_106 makes an admission control request to sampling daemon 31_102 and receives a "yes" reply, application manager 31_106 can invoke or launch the identified application (e.g., as identified by the "bundleId" attribute value, application 31_108) in the background of the operating environment of mobile device 31_100. For example, the application 31_108 can be launched in the background such that it is not apparent to the user that application 31_108 was launched. The application 31_108 can then communicate over a network (e.g., the internet) with content server 31_404 to download updated content for display to the user. Thus, when the user subsequently selects application 31_108 (e.g., brings the application to the foreground), the user will be presented with current and up-to-date content without having to wait for application 31_108 to download the content from server 31_404 and refresh the application's user interfaces.

In some implementations, application manager 31_106 can be configured to launch background fetch enabled applications when the mobile device 31_100 is charging and connected to Wi-Fi. For example, sampling daemon 31_102 can determine when mobile device 31_100 is connected to an external power source (e.g., based on "cablePlugin" attribute events) and connected to the network (e.g., internet) over Wi-Fi (e.g., based on received events) and send a signal to application manager 31_106 to cause application manager 31_106 to launch fetch enabled applications that have been used within a previous amount of time (e.g., seven days).

Example Background Fetch Processes

FIG. 31_6 is a flow diagram of an example process 31_600 for predictively launching applications to perform background updates. For example, process 31_600 can be performed by application manager 31_106 and sampling daemon 31_102 to determine when to launch background applications configured to fetch data updates from network resources, such as content server 31_404 of FIG. 31_4. Additional description related to the steps of process 31_600 can be found with reference to FIG. 31_4 and FIG. 31_5 above.

At step 31_602, application manager 31_106 can receive an application invocation forecast from sampling daemon 31_102. For example, application manager 31_106 can be launched during startup of mobile device 31_100. During its initialization, application manager 31_106 can request a forecast of applications likely to be invoked by a user of the mobile device 31_100 over the next 24-hour period. For example, application manager 31_106 can request a temporal forecast for attribute "bundleId." This forecast can indicate when to launch applications. For example, a 24-hour period can be divided into 15-minute blocks and each 15-minute block can be associated with a probability that the user will invoke an application during the 15-minute block. The forecast returned to application manager 31_106 can identify up to 64 15-minute blocks of time when the user is likely to invoke an application.

At step 31_604, application manager 31_106 can set timers based on the application launch forecast. For example, application manager 31_106 can set a timer or alarm for each of the 15 minute blocks identified in the application launch forecast returned to the application manager 31_106 by sampling daemon 31_102.

At step 31_606, application manager 31_106 can request sampling daemon 31_102 identify what applications to launch. For example, when a timer expires or alarm goes off, application manager can wake, if sleeping or suspended, and request from sampling daemon 31_102 a list of applications to launch for the current 15-minute block of time. Sampling daemon 31_102 can return a list of applications that should be launched in the background on mobile device 31_100. For example, application manager 31_106 can request a peer forecast for attribute "bundleId". The peer forecast can indicate which values of the "bundleId" attribute are most likely to be reported (e.g., which applications are most likely to be invoked by the user) in the current 15-minute timeslot.

At step 31_608, application manager 31_106 can send a request to sampling daemon 31_102 asking if it is ok to launch an application. For example, for each application identified by sampling daemon 31_102 in response to the "bundleId" peer forecast request, application manager 31_106 can ask sampling daemon 31_102 whether it is ok to launch the application. For example, application manager 31_106 can request that sampling daemon 31_102 perform admission control on a particular value of the "bundleId" attribute that corresponds to an application that application manager 31_106 is attempting to launch. Sampling daemon 31_102 can return "yes" from the admission control request if it is ok to launch the application, "no" if it is not ok to launch the application, or "never" if it is never ok to launch the application.

At step 31_610, application manager 31_106 can launch an application. For example, if sampling daemon 31_102 returns an "ok" (e.g., ok, yes, true, etc.) response to the admission control request, application manager 31_106 will launch the application as a background process of mobile device 31_100. If sampling daemon 31_102 returns a "no" or "never" response to the admission control request, application manager 31_106 will not launch the application.

At step 31_612, application manager 31_106 can transmit an application launch notification to sampling daemon 31_102. For example, application manager 31_106 can transmit a "bundleId" start event to sampling daemon 31_102 to record the execution of the launched application.

At step 31_614, application manager 31_106 can detect that the launched application has terminated. For example, application manager 31_106 can determine when the launched application is no longer running on mobile device 31_100.

At step 31_616, application manager 31_106 can transmit an application termination notification to sampling daemon 31_102. For example, application manager 31_106 can transmit a "bundleId" end event to sampling daemon 31_102 to record the termination of the application.

FIG. 31_7 is a flow diagram of an example process 31_700 for determining when to launch applications on a mobile device 31_100. For example, process 31_700 can be used to determine when to launch applications, what applications should be launched and if it is ok to launch applications based on application use statistics (e.g., "bundleId" attribute event data), data and energy budgets, and mobile device operating and environmental conditions, as described above in detail with reference to FIG. 31_4

At step 31_702, sampling daemon 31_102 can receive an application launch forecast request from application manager 31_106. For example, application manager 31_106 can request a temporal forecast for the "bundleId" attribute for the next 24 hours from sampling daemon 31_102. Once the 24-hour period has passed, application manager 31_106 can request a temporal forecast for the "bundleId" attribute for the subsequent 24 hour period. For example, application manager 31_106 can request temporal forecast for the "bundleId" attribute every 24 hours.

At step 31_704, sampling daemon 31_102 can determine an application launch forecast. For example, the application launch forecast (e.g., temporal forecast for the "bundleId" attribute) can be used to predict when user-initiated application launches are likely to occur during a 24-hour period. The 24-hour period can be divided into 15-minute time blocks. For each 15-minute time block (e.g., there are 96 15-minute time blocks in a 24 hour period), sampling daemon 31_102 can use historical user invocation statistics (e.g., "bundleId" start events) to determine a probability that a user initiated application launch will occur in the 15-minute time block, as described above with reference to FIG. 31_4.

At step 31_706, sampling daemon 31_102 can transmit the application launch forecast to application manager 31_106. For example, sampling daemon 31_102 can select up to 64 15-minute blocks having the highest non-zero probability of a user initiated application launch. Each of the selected 15-minute blocks can be identified by a start time for the 15-minute block (e.g., 12:45 pm). Sampling daemon 31_102 can send the list of 15-minute block identifiers to application manager 31_106 as the application launch forecast (e.g., temporal forecast for the "bundleId" attribute).

At step 31_708, sampling daemon 31_102 can receive a request for what applications to launch at a current time. For example, application manager 31_106 can send a request to sampling daemon 31_102 for sampling daemon 31_102 to determine which applications should be launched at or around the current time. For example, the request can be a request for a peer forecast for the "bundleId" attribute for the current 15-minute timeslot.

At step 31_710, sampling daemon 31_102 can score applications for the current time based on historical event data. Sampling daemon 31_102 can determine which applications that the user is likely to launch in the near future based on historical user initiated application launch data (e.g., "bundleId" attribute start event data) collected by sampling daemon 31_102. Sampling daemon 31_102 can utilize recent application launch data, daily application launch data and/or weekly application launch data to score applications based on the historical likelihood that the user will invoke the application at or around the current time, as described above with reference to FIG. 31_4 and FIG. 31_5.

At step 31_712, sampling daemon 31_102 can transmit the applications and application scores to application manager 31_106. For example, sampling daemon 31_102 can select a number (e.g., three) of applications (e.g., "bundleId" attribute values) having the highest scores (e.g., highest probability of being invoked by the user) to transmit to application manager 31_106. Sampling daemon 31_102 can exclude applications that have been launched within a previous period of time (e.g., the previous 5 minutes). Sampling daemon 31_102 can transmit information that identifies the highest scored applications and their respective scores to application manager 31_106, as described above with reference to FIG. 31_4.

At step 31_714, sampling daemon 31_102 can receive a request from application manager 31_106 to determine whether it is ok to launch an application. For example, sampling daemon 31_102 can receive an admission control request that identifies an application (e.g., "bundleId" value).

At step 31_716, sampling daemon 31_102 can determine that current mobile device conditions and budgets allow for an application launch. For example, in response to the admission control request, sampling daemon 31_102 can check system-wide data and energy budgets, attribute budgets and voter feedback to determine whether the application should be launched as a background task on mobile device 31_100, as described in detail above with reference to FIG. 31_4.

At step 31_718, sampling daemon 31_102 can transmit a reply to application manger 31_106 indicating that it is ok to launch the identified application. For example, if conditions are good for a background application launch, sampling daemon 31_102 can return a "yes" value (e.g., ok, yes, true, etc.) to application manager 31_106 in response to the admission control request so that application manager 31_106 can launch the identified application.

Short Term Trending

In some implementations, sampling daemon 31_102 can be configured to detect when attributes are trending. For example, a client application may register interest in a particular attribute with sampling daemon 31_102. When sampling daemon 31_102 detects that the particular attribute is trending, sampling daemon 31_102 can notify the client that the particular attribute is trending.

For example, application manager 31_106 can register interest in the "bundleId" attribute (or a particular value of the "bundleId" attribute). When sampling daemon 31_102 determines that the "bundleId" attribute (or value thereof) is trending, sampling daemon 31_102 can notify application manager 31_106 of the trend so that application manager 31_106 can predictively launch the trending application in the background on mobile device 31_100. For example, an application is trending if the application is being repeatedly invoked by a user of mobile device 31_100. In some cases, the trending application is a new application or, prior to the trend, a rarely used application that may not be included in the "bundleId" attribute peer forecast described above. Thus, the trending application may not be kept up to date using the application launch forecasting methods described above.

The purpose of attribute trend detection is to detect attributes (e.g., attribute events) that are being reported repeatedly to sampling daemon 31_102 and to determine an approximate cadence (e.g., periodicity) with which the attributes are being launched, erring on reporting a smaller cadence. Attributes that are being reported repeatedly to the sampling daemon 31_102 are said to be "trending." The determined cadence can then be used by sampling daemon 31_102 clients to perform functions or operations in anticipation of the next event associated with the trending attribute.

For example, the determined cadence can be used by application manager 31_106 to set timers that will trigger the application manager 31_106 to launch the trending applications in the background so that the applications will be updated when the user invokes the applications, as described above. For example, if the cadence is 5 minutes for an application, application manager 31_106 can set a timer that will expire every 4 minutes and cause application manager 31_106 to launch the application so that the application can receive updated content and update the application's interfaces before being invoked again by the user.

In some implementations, the trend detection mechanisms described in this section can be used to detect other system event trends beyond application launches, such as repeated software or network notifications, application crashes, etc. For example, clients can register interest in any attribute or attribute value and can receive notifications when the attributes of interest are trending.

In some implementations, sampling daemon 31_102 can maintain a trending table that can be used to track the behavior of a number of attributes. The trending table can include an attribute value identification field (ATTID), a state field (STATE), a last launch timestamp (LLT), an inter-launch cadence (ILC) that indicates the amount of time between launches, and a confidence field (C).

FIG. 31_8 is a flow diagram 31_800 illustrating state transitions for an entry (e.g., application) in the trending table. Initially at step 31_802, the trending table can include empty entries (e.g., records) where the ATTID, LLT, ILC and C fields are empty (e.g., N/A) and the STATE is set to "invalid" (I). When an attribute event is reported at time t, the trending table is scanned for an available entry (e.g., an entry in state I). Among the possible invalid entries, several methods can be used for selecting an entry to use. For example, a random invalid entry can be selected. Alternatively, an invalid entry can be selected such that all the empty entries in the trending table are kept in consecutive order. If no invalid entry exists, the oldest entry (or a random entry) in transient (T) state can be selected to track the newly launched application. If no I or T state entries exist, the oldest new (N) state entry can be selected to track the newly reported attribute event.

At step 31_804, once the trending table entry is selected, the STATE field of the selected entry for tracking the newly reported attribute event can be set to new (N), the ATTID can be set to the attribute value of the newly reported attribute, the LLT field can be set to the current time t (e.g., wall clock time) and the ILC and C fields are set to predefined minimum values ILC_MIN (e.g., 1 minute) and C_MIN (e.g., zero).

At step 31_806, on the next report of the same attribute event at time t', the entry in the table for the attribute is found, if it still exists and has not been evicted (e.g., selected to track another attribute). The STATE of the entry is set to transient (T), the ILC is set to the difference between the LLT and the current system time (e.g., t'-t or t'-LLT), and the C field is incremented (e.g., by predefined value C_DELTA). Alternatively, the ILC field can be set to some other function of its old and new values, such as the running average.

At step 31_808, on the next report of the same attribute event at time t'', the entry in the table for the attribute is found, if it still exists and has not been evicted (e.g., selected to track another attribute). The STATE of the entry can remain set to transient (T), the ILC is set to the difference between the LLT and the current (e.g., wall) clock time (e.g., t''-t' or t''-LLT), and the C field is incremented again (e.g., by predefined value C_DELTA).

At step 31_810, if, after several reports of the attribute event, the C value of the trending table entry reaches (e.g., equals) a threshold value (e.g., C_HIGHTHRESHOLD), at step 31_811, the state of the attribute entry can be changed to STATE=A. If, at step 31_810, the C value of the trending table entry does not reach the threshold value (e.g., C_HIGHTHRESHOLD), the values of the entry can be updated according to step 31_808.

Whenever the attribute event is reported while in state "A," if the time between the last report and the time of the current report is within some amount of time (e.g., ILC_EPSILON=5 minutes), then the attribute entry's confidence (C) field is incremented until it reaches a predefined maximum value (e.g., C_MAX). When an attribute entry in the trending table is in the active (A) state, the entry's ILC value can be used as an estimation of the rate of launch (e.g., cadence) and the entry's ATTID can be used to identify the trending attribute value.

In some implementations, sampling daemon 31_102 can send the attribute value (ATTID) and cadence value (ILC) to a client so that the client can perform some action or function in anticipation of the next event associated with the attribute value. For example, the attribute value and cadence value can be sent to application manager 31_106 so that application manager 31_106 can launch the identified application (e.g., ATTID, "bundleId" attribute value) in the background in anticipation of a user invocation of the application so that the application can receive updated content prior the user launching the application, as described above. For example, application manager 31_106 can start a timer based on the cadence value that will wake the application manager 31_106 to launch the application in anticipation of a user invoking the application.

In some implementations, sampling daemon 31_102 can notify clients of the anticipated next occurrence of an attribute event based on a detected attribute trend. For example, sampling daemon 31_102 can send application manager 31_106 a signal or notification indicating that a trending application should be launched by application manager 31_106. Application manager 31_106 can register interest in an application by sending sampling daemon 31_102 an application identifier (e.g., "bundleId" attribute value). Sampling daemon 31_102 can monitor the application for user invocation (e.g., based on reported "bundleId" start events) to determine whether the application is trending, as described above. If the application is trending, sampling daemon 31_102 can determine the cadence of invocation, as described above, and send a notification or signal to application manager 31_106 at a time determined based on the cadence. For example, if the cadence is four minutes, sampling daemon 31_102 can send a signal to application manager 31_106 every 3 minutes (e.g., some time period before the next occurrence of the event) to cause application manager 31_106 to launch the application. If the cadence changes to six minutes, sampling daemon 31_102 can detect the cadence change and adjust when application manager 31_106 is signaled. For example, sampling daemon 31_102 can signal application manager 31_106 to launch the application every 5 minutes instead of every 3 minutes to adjust for the decreased cadence (e.g., increased time period between invocations).

At each inspection of the attribute trending table for any reason (e.g., adding a new entry, updating an existing entry, etc.), all entries in STATE=T or STATE=A whose time since last launch is greater than their ILC by ILC_EPSILON will have their C values decremented. Any entry whose C value at that point falls below a minimum threshold value (e.g., C_LOWTHRESHOLD) is demoted. An entry can be demoted from state A to state T or from state T to state I, for example.

In some implementations, the trend detection mechanism described above can be used to detect trending events other than application invocations or launches. For example, the trend detection method and trending table described above can be used to detect and track any recurring event (e.g., any attribute event) on mobile device 31_100. A trending event can include screen touches, network connections, application failures, the occurrence of network intrusions and/or any other event that can be reported or signaled to sampling daemon 31_102.

Push Notifications

FIG. 31_9 is a block diagram 31_900 illustrating a system for providing push notifications to a mobile device 31_100. In some implementations, mobile device 31_100 can be configured to receive push notifications. For example, a push notification can be a message that is initiated by a push provider 31_902 and sent to a push service daemon 31_904 running on mobile device 31_100 through push notification server 31_906.

In some implementations, push provider 31_902 can receive authorization to send push notifications to mobile device 31_100 through a user authorization request presented to a user of mobile device 31_100 by application 31_908. For example, push provider 31_902 can be a server owned, operated and/or maintained by the same vendor that created (e.g., programmed, developed) application 31_908. Push provider 31_902 can receive authorization from a user to send push notifications to mobile device 31_100 (e.g., push service daemon 31_904) when application 31_908 presents a user interface on mobile device 31_100 requesting authorization for push provider 31_902 to send push notifications to mobile device 31_100 and the user indicates that push notifications are authorized. For example, the user can select a button on the user interface presented by application 31_908 to indicate that push notifications are authorized for the push provider 31_902 and/or application 31_908. Push provider 31_902 can then receive a device token that identifies mobile device 31_100 and that can be used to route push notifications to mobile device 31_100. For example, push notification server 31_906 can receive a device token with a push notification and use the device token to determine which mobile device 31_100 should receive the push notification.

In some implementations, mobile device 31_100 can send information identifying authorized push applications to push notification server 31_906. For example, mobile device 31_100 can send a message that includes push filter 31_926 containing push notification filters 31_914 and the device token for mobile device 31_100 to push notification server 31_906. Push notification server 31_906 can store a mapping of device tokens (e.g., identifier for mobile device 31_100) to push filters 31_914 for each mobile device serviced by push notification server 31_906. Push filters 31_914 can include information identifying applications that have received authorization to receive push notifications on mobile device 31_100, for example.

In some implementations, push filters 31_914 can be used by push notification server 31_906 to filter out (e.g., prevent sending) push notifications to applications that have not been authorized by a user of mobile device 31_100. Each push notification sent by push provider 31_902 to push notification server 31_906 can include information (e.g., an identifier) that identifies the application 31_908 associated with push provider 31_902 and the mobile device 31_100 (e.g., device token).

When notification server 31_906 receives a push notification, notification server 31_906 can use the mobile device identification information (e.g., device token) to determine which push filters 31_914 to apply to the received push notification. Notification server 31_906 can compare application identification information in the push notification to the push filters 31_914 for the identified mobile device to determine if the application associated with push provider 31_902 and identified in the push notification is identified in the push filter 31_914. If the application associated with the push notification is identified in the push filters 31_914, then the notification server 31_906 can transmit the push notification received from push provider 31_902 to mobile device 31_100. If the application identified in the push notification is not identified in the push filters 31_914, then the notification server will not transmit the push notification received from push provider 31_902 to mobile device 31_100 and can delete the push notification.

Non-Waking Push Notifications

In some implementations, notification server 31_906 can be configured to process high priority push notifications and low priority push notifications. For example, push provider 31_902 can send a high priority push notification 31_910 and/or a low priority push notification 31_912 to push notification server 31_906. Push provider 31_902 can identify a push notification as high or low priority by specifying the priority of the push notification in data contained within the push notification sent to push notification server 31_906 and mobile device 31_100, for example.

In some implementations, push notification server 31_906 can process low priority push notification 31_912 differently than high priority push notification 31_910. For example, push notification server 31_906 can be configured to compare application identification information contained in high priority push 31_910 with authorized application identification information in push filters 31_914 to determine if high priority push notification 31_910 can be transmitted to mobile device 31_100. If the application identification information in high priority push notification 31_910 matches an authorized application identifier in push filters 31_914, then push notification server 31_906 can transmit the high priority push notification to mobile device 31_100. If the application identification information in high priority push notification 31_910 does not match an authorized application identifier in push filters 31_914, then push notification server 31_906 will not transmit the high priority push notification to mobile device 31_100.

In some implementations, push notification server 31_906 can be configured to delay delivery of low priority push notifications. For example, when mobile device 31_100 receives a push notification from push notification server 31_906, the receipt of the push notification causes mobile device 31_100 to wake up (e.g., if in a sleep or low power state). When mobile device 31_100 wakes, mobile device 31_100 will turn on various subsystems and processors that can drain the battery, use cellular data, cause the mobile device 31_100 to heat up or otherwise effect the mobile device 31_100. By preventing or delaying the delivery of low priority push notifications to mobile device 31_100, mobile device 31_100 can conserve network (e.g., cellular data) and system (e.g., battery) resources, for example.

In some implementations, push notification filters 31_914 can include a wake list 31_916 and a no wake list 31_918. The wake list 31_916 can identify applications for which low priority push notifications should be delivered to mobile device 31_100. In some implementations, when an application is authorized to receive push notifications at mobile device 31_100, the application identification information is added to the wake list 31_914 by default. The no wake list 31_918 can identify authorized applications for which low priority push notifications should be delayed. The specific mechanism for populating no wake list 31_918 and/or manipulating wake list 31_916 and no wake list 31_918 is described in detail below when describing push notification initiated background updates. In some implementations, high priority push notifications will not be delayed at the push notification server 31_906 and will be delivered to mobile device 31_100 as long as the application identified in the high priority push notification is identified in push filters 31_914 (e.g., wake list 31_916 and/or no wake list 31_918).

In some implementations, when push notification server 31_906 receives a low priority push notification 31_912, push notification server 31_906 can compare the application identifier in low priority push notification 31_912 to wake list 31_916 and/or no wake list 31_918. For example, if the application identification information in the low priority push notification 31_912 matches an authorized application identifier in the wake list 31_916, the low priority push notification 31_912 will be delivered to the mobile device 31_100 in a notification message 31_920.

In some implementations, delivery of low priority push notifications associated with applications identified in the no wake list 31_918 can be delayed. For example, if an application identified in low priority push notification 31_912 is also identified in no wake list 31_918, then low priority push notification 31_912 can be stored in push notification data store 31_922 and not immediately delivered to mobile device 31_100. In some implementations, if the mobile device 31_100 identified by a push notification (high or low priority) is not currently connected to push notification server 31_906, the push notification for the disconnected mobile device 31_100 can be stored in push notification data store 31_922 for later delivery to mobile device 31_100.

In some implementations, push notifications stored in push data store 31_922 will remain in push data store 31_922 until the application identifier associated with a stored push notification is moved from the no wake list 31_918 to wake list 31_916 or until a network connection is established between push notification server 31_906 and mobile device 31_100.

For example, a network connection between push notification server 31_906 and mobile device 31_100 can be established when another (high or low priority) push notification is delivered to mobile device 31_100 or when mobile device 31_100 sends other transmissions 31_924 (e.g., status message, heartbeat message, keep alive message, etc.) to push notification server 31_906. For example, mobile device 31_100 can send a message 31_924 to push notification server 31_906 indicating that the mobile device 31_100 will be active for a period of time (e.g., 5 minutes) and push notification server 31_906 can send all received push notifications to mobile device 31_100 during the specified active period of time. In some implementations, when a network connection is established between mobile device 31_100 and push notification server 31_906 all push notifications stored in push notification store 31_922 will be delivered to mobile device 31_100. For example, push notifications stored in push notification data store 31_922 can be transmitted through connections created by other transmissions between mobile device 31_100 and push notification server 31_906.

In some implementations, mobile device 31_100 can establish two different communication channels with push notification server 31_906. For example, the two communication channels can be established simultaneously or at different times. The mobile device 31_100 can have a cellular data connection and/or a Wi-Fi connection to push notification server 31_906, for example. In some implementations, mobile device 31_100 can generate and transmit to push notification server 31_906 different push filters 31_914 for each communication channel. For example, a cellular data connection can be associated with first set of push filters 31_914 for determining when to send high and low priority push notifications across the cellular data connection. A Wi-Fi data connection can be associated with a second set of push filters 31_914 that are the same or different than the cellular data push filters for determining when to send high and low priority push notifications across the Wi-Fi data connection. When push notification server 31_906 receives a push notification, push notification server can compare the application identified in the push notification to the push notification filters for the communication channel (e.g., Wi-Fi, cellular) that the push notification server 31_906 will use to transmit the push notification to the mobile device 31_100.

Push Initiated Background Updates

In some implementations, receipt of push notifications by mobile device 31_100 can trigger a background update of applications on the mobile device 31_100. For example, when mobile device 31_100 (e.g., push service daemon 31_904) receives a push notification message 31_920 from push notification server 31_906, push service daemon 31_904 can compare the application identifier in the push notification message 31_920 to push filters 31_928 stored on mobile device 31_100 to determine if the push notification message 31_920 was properly delivered or should have been filtered (e.g., not delivered) by push notification server 31_906. For example, push filters 31_928, wake list 31_930 and no wake list 31_932 can correspond to push filters 31_914, wake list 31_916 and no wake list 31_918, respectively. In some implementations, if push service daemon 31_904 determines that the push notification message 31_920 should not have been delivered to mobile device 31_100, the push notification message 31_902 will be deleted.

Low Priority Push Notifications

In some implementations, the push notification message 31_920 received by mobile device 31_100 can include a low priority push notification. For example, the low priority push notification can indicate that content updates are available for the application associated with the push notification. Thus, when the low priority push notification causes a launch of an application 31_908, the application 31_908 can download updated content from one or more network resources (e.g., push provider 31_902).

In some implementations, when push service daemon 31_904 receives a low priority push notification associated with an application (e.g., application 31_908) on mobile device 31_100, push service daemon 31_904 can ask sampling daemon 31_102 if it is ok to launch the application associated with the received low priority push notification. For example, push service daemon 31_904 can request that sampling daemon 31_102 perform admission control by sending sampling daemon 31_102 an identifier for the application (e.g., "bundleId" attribute value) associated with the received low priority push notification. Sampling daemon 31_102 can perform admission control by checking data budgets, energy budgets, attribute budgets and voter feedback, as described above with reference to FIG. 31_4. Sampling daemon 31_102 can return to push service daemon 31_904 a value indicating whether it is ok to launch the application identified by the low priority push notification based on the outcome of the admission control process.

In some implementations, if the value returned from the admission control request indicates "yes" it is ok to launch the application, push service daemon 31_904 will send the low priority push notification to application manager 31_106 and application manager 31_106 can invoke the application (e.g., application 31_908). Application 31_908 can then communicate with push provider 31_902 over the network (e.g., the internet) to receive updated content from push provider 31_902.

In some implementations, if the value returned from the admission control request indicates "no" it is not ok to launch the application, push service daemon 31_904 will store the low priority push notification in push notification data store 31_934. For example, when storing a low priority push notification, push service daemon 31_904 will only store the last push notification received for the application identified in the push notification. In some implementations, when sampling daemon 31_102 indicates that push service daemon 31_904 should not launch an application right now (e.g., the admission control reply is "no"), push service daemon 31_904 can move the application identifier for the application from wake list 31_930 to no wake list 31_932. For example, if sampling daemon 31_102 determines that the budgets, and/or conditions of the mobile device do not allow for launching the application, allowing the push notification server 31_906 to wake mobile device 31_100 for additional low priority push notifications associated with the application will just further consume the data and energy budgets of the mobile device 31_100 or make environmental conditions worse (e.g., cause the device to heat up). Thus, by moving the application identifier into the no wake list 31_932 and sending a message that includes push filter 31_926 to push notification server 31_906 that includes the updated filters 31_928 (e.g., wake list 31_930 and no wake list 31_932), notification server 31_906 can update its own push filters 31_914, wake list 31_916 and no wake list 31_918 to reflect the changes to push filters 31_928 and to prevent additional low priority push notifications for the application from being delivered to mobile device 31_100.

In some implementations, if the value returned from the admission control request indicates that it is "never" ok to launch the application, push service daemon 31_904 will delete the low priority push notification and remove the application identifier associated with the push notification from push filters 31_928. The updated push filters can be transmitted to push notification server 31_906 and push filters 31_914 on push notification server 31_906 can be updated to prevent push notification server 31_906 from sending any more push notifications associated with the application identifier.

In some implementations, sampling daemon 31_102 can transmit a "stop" signal to push service daemon 31_904 to temporarily prevent future low priority push notifications from being sent from push notification server 31_906 to mobile device 31_100. For example, sampling daemon 31_102 can send a stop signal to push service daemon 31_904 when sampling daemon 31_102 determines the data budget is exhausted for the current hour, the energy budget is exhausted for the current hour, the system is experiencing a thermal event (e.g., mobile device 31_100 is too hot), the mobile device 31_100 has a poor cellular connection and the mobile device 31_100 is not connected to Wi-Fi and/or that the mobile device 31_100 is connected to a voice call and not connected to Wi-Fi. When push service daemon 31_904 receives a stop signal, push service daemon 31_904 can move the application identifiers in wake list 31_930 to no wake list 31_932 and transmit the updated push filters 31_928 to push notification server 31_906 to update push filters 31_914. Thus, push notification server 31_906 will temporarily prevent future low priority push notifications from waking mobile device 31_100 and impacting the budgets, limits and operating conditions of mobile device 31_100.

In some implementations, sampling daemon 31_102 can transmit a retry signal to push service daemon 31_904. For example, sampling daemon 31_102 can monitor the status of the budgets, network connections, limits and device conditions and will send a retry message to push service daemon 31_904 when the push data budget is not exhausted, when the energy budget is not exhausted, when the mobile device 31_100 is not experiencing a thermal event, when the mobile device 31_100 has a good quality cellular connection or is connected to Wi-Fi, when mobile device 31_100 is not connected to a voice call and when the launch rate limits have been reset. Once the push service daemon 31_904 receives the retry signal, push service daemon 31_904 will send an admission control request to sampling daemon 31_102 for each push notification in push notification data store 31_934 to determine if it is ok to launch each application (e.g., "bundleId" attribute value) associated with the stored push notifications.

If sampling daemon 31_102 returns a "yes" from the admission control request, push service daemon 31_904 can send the push notification to application manager 31_106 and application manager 31_106 can launch the application associated with the push notification as a background process on mobile device 31_100, as described above. Once the application is launched, the application can download content or data updates and update the applications user interfaces based on the downloaded data. Application manager 31_106 will not ask sampling daemon 31_102 if it is ok to launch an application associated with a low priority push notification.

High Priority Push Notifications

In some implementations, the push notification message 31_920 received by mobile device 31_100 can include a high priority push notification. For example, the high priority push notification can indicate that content updates are available for the application associated with the push notification. Thus, when the high priority push notification causes an invocation of an application, the application can download updated content from one or more network resources. In some implementations, when a high priority push notification is received by push service daemon 31_904, push service daemon 31_904 will send the high priority push notification to application manager 31_106 without making an admission control request to sampling daemon 31_102.

In some implementations, when application manager 31_106 receives a push notification associated with an application, application manager 31_106 will make an admission control request to sampling daemon 31_102. In response to the admission control request, sampling daemon 31_102 can reply with "yes," "no," or "never" responses as described above. When application manager 31_106 receives a "yes" reply to the admission control request, application manager 31_106 can launch the application associated with the received high priority push notification as a background process on mobile device 31_100.

In some implementations, when application manager 31_106 receives a "no" reply to an admission control request, application manager 31_106 can store the high priority push notification in high priority push notification store 31_936. When application manager 31_106 receives a "never" response, application manager 31_106 can delete the high priority push notification and delete any push notifications stored in push notification data store 31_936 for the application associated with the push notification.

In some implementations, sampling daemon 31_102 can send an "ok to retry" signal to application manager 31_106. For example, when application manager 31_106 receives an "ok to retry" message from sampling daemon 31_102, application manager 31_106 can make an admission control request for the applications associated with each high priority push notification in high priority push notification data store 31_936 and launch the respective applications as background processes when a "yes" reply is received in response to the admission control request.

Delaying Display of Push Notifications

In some implementations, high priority push notifications can cause a graphical user interface to be displayed on mobile device 31_100. For example, receipt of a high priority push notification can cause a banner, balloon or other graphical object to be displayed on a graphical user interface of mobile device 31_100. The graphical object can include information indicating the subject matter or content of the received push notification, for example.

In some implementations, when application manager 31_106 receives a high priority push notification, application manager 31_106 can cause the notification to be displayed on a graphical user interface of the mobile device 31_100. However, when the high priority push notification indicates that there are data updates to be downloaded to the application associated with the high priority push notification, the application can be launched in the background of mobile device 31_100 before the push notification is displayed. For example, application manager 31_106 can be configured with an amount of time (e.g., 30 seconds) to delay between launching an application associated with the high priority push notification and displaying the graphical object (e.g., banner) that announces the push notification to the user. The delay can allow the application enough time to download content updates and update the application's user interfaces before being invoked by the user, for example. Thus, when the user provides input to the graphical object or otherwise invokes the application associated with the high priority push notification, the application's user interfaces will be up to date and the user will not be forced to wait for updates to the application. In some implementations, if application manager 31_106 is unable to launch the application associated with the high priority push notification, the mobile device 31_100 will display the graphical object (e.g., banner) to notify the user that the high priority push notification was received.

Example Push Notification Processes

FIG. 31_10 is a flow diagram of an example process 31_1000 for performing non-waking pushes at a push notification server 31_906. At step 31_1002, push notification server 31_906 can receive a push notification. For example, push notification server 31_906 can receive a push notification from a push notification provider 31_902 (e.g., a server operated by an application vendor).

At step 31_1004, push notification server 31_906 can determine that the push notification is a low priority push notification. For example, the push notification provider can include data in the push notification that specifies the priority of the push notification. Push notification server 31_906 can analyze the contents of the push notification to determine the priority of the push notification.

At step 31_1006, push notification server 31_906 can compare the push notification to a push notification filter. For example, the push notification can identify an application installed or configured on mobile device 31_100 to which the low priority push notification is directed. The push notification can include an application identifier (e.g., a "bundleId" attribute value), for example. Push notification server 31_906 can compare the application identifier in the push notification to application identifiers in the push notification filter's no wake list 31_918.

At step 31_1008, push notification server 31_906 can determine that the low priority push notification should be stored. For example, if the application identifier from the low priority push notification is in the push notification filter's no wake list 31_918, the push notification server 31_906 can determine that the low priority push should be stored in push notification data store 31_922.

At step 31_1010, based on the determination at step 31_1008, the low priority push notification will be stored in a database or data store 31_922 of the push notification server 31_906 and not immediately sent to the mobile device 31_100.

At step 31_1012, push notification server 31_906 can determine that a network connection to mobile device 31_100 has been established. For example, push notification server 31_906 can create a network connection to mobile device 31_100 to deliver another high or low priority push. Mobile device 31_100 can establish a network connection to push notification server 31_906 to send notification filter changes, periodic status updates, keep alive messages or other messages to push notification server 31_906.

At step 31_1014, push notification server 31_906 can send the stored push notifications in response to determining that a network connection to mobile device 31_100 has been established. For example, push notification server 31_906 can send the low priority push notifications stored at the push notification server 31_906 to mobile device 31_100.

FIG. 31_11 is a flow diagram of an example process 31_1100 for performing background updating of an application in response to a low priority push notification. At step 31_1102, mobile device 31_100 can receive a low priority push notification from push notification server 31_906.

At step 31_1104, mobile device 31_100 can determine if it is ok to launch an application associated with the low priority push notification. For example, the application can be launched as a background process on mobile device 31_100. Mobile device 31_100 can determine whether it is ok to launch the application using the admission control process described above. For example, mobile device 31_100 (e.g., sampling daemon 31_102) can determine whether it is ok to launch the application based on data, energy and/or attribute budgets determined for the mobile device 31_100. Mobile device 31_100 can determine whether it is ok to launch the application based on conditions of the mobile device, and/or the condition of the mobile device's network connections based on responses from various voters. The details for determining whether it is ok to launch an application (e.g., admission control) are described in greater detail with reference to FIG. 31_4 above.

At step 31_1106, mobile device 31_100 can store the low priority push notification when device conditions, budgets, limits and other data indicate that it is not ok to launch the application. For example, mobile device 31_100 can store the low priority push notifications in a database or other data store on mobile device 31_100.

At step 31_1108, mobile device 31_100 can update its push notification filters in response to determining that it is not ok to launch a background application. For example, mobile device 31_100 can move the application associated with the low priority push notification to the no wake list of the push notification filters on mobile device 31_100.

At step 31_1110, mobile device 31_100 can transmit the updated notification filters to push notification server 31_906. Push notification server 31_906 can update its own push notification filters based on the filters received from mobile device 31_100 to determine when to transmit and when to not transmit low priority push notifications to mobile device 31_100.

At step 31_1112, mobile device 31_100 can determine that it is ok to retry launching applications associated with low priority push notifications. For example, mobile device 31_100 can determine that the budgets, limits and device conditions, as described above, allow for launching additional background applications on the mobile device 31_100.

At step 31_1114, mobile device 31_100 can determine whether it is ok to launch a particular application associated with a stored low priority push notification. For example, sampling daemon 31_102 of mobile device 31_100 can perform admission control to determine that the budgets configured on mobile device 31_100 have been reset or replenished for the current time and that the environmental conditions of the mobile device 31_100 and network connections are good enough to launch the particular background application.

At step 31_1116, mobile device 31_100 can launch the particular application when the mobile device 31_100 determines that it is ok to launch the application. For example, the particular application can be launched as a background process to download new content and update the user interfaces of the application before a user invokes the application. This process will allow a user to invoke an application and not have to wait for content updates to be downloaded and for user interfaces of the application to be refreshed.

FIG. 31_12 is a flow diagram of an example process 31_1200 for performing background updating of an application in response to a high priority push notification. At step 31_1202, mobile device 31_100 can receive a high priority push notification.

At step 31_1204, mobile device 31_100 can determine if it is ok to launch an application associated with the high priority push notification. For example, sampling daemon 31_102 of mobile device 31_100 can perform admission control to determine whether it is ok to launch the application based on budgets and environmental conditions of the mobile device 31_100 (e.g., device conditions, network conditions, etc.).

At step 31_1206, mobile device 31_100 can store the high priority push notification when it is not ok to launch (e.g., admission control returns "no") the application associated with the high priority push notification. For example, mobile device 31_100 can store the high priority push notification in a database, queue, or other appropriate data structure.

At step 31_1208, mobile device 31_100 can determine that it is ok to retry launching applications associated with stored high priority push notifications. For example, mobile device 31_100 can determine that it is ok to retry launching applications when the data, energy and/or attribute budgets have been replenished, device conditions have improved, network conditions have improved or other conditions of the mobile device 31_100 have changed, as discussed above in the admission control description.

At step 31_1210, mobile device 31_100 can determine if it is ok to launch an application associated with a stored high priority push notification. For example, mobile device 31_100 can determine if it is ok to launch an application based on the criteria discussed above.

At step 31_1212, mobile device 31_100 can launch the application in the background on the mobile device 31_100. For example, the application can be launched as a background process on the mobile device 31_100 so that the application can download updated content from a network resource (e.g., a content server) on a network (e.g., the internet).

At step 31_1214, the mobile device 31_100 can wait a period of time before presenting the push notification to the user. For example, the mobile device can be configured to allow the application to download content for a period of time before notifying the user of the received high priority push notification.

At step 31_1216, the mobile device 31_100 can present the push notification on a user interface of the mobile device 31_100. For example, the mobile device 31_100 can present a graphical object (e.g., a banner) that includes information describing the high priority push notification. The user can select the graphical object to invoke the application, for example. Since the application had time to download content before the user was presented with the notification, when the user invokes the application the application will be able to display updated content to the user without forcing the user to wait for the updated content to be downloaded from the network.

Background Uploading/Downloading

FIG. 31_13 is a block diagram of an example system 31_1300 for performing background downloading and/or uploading of data on a mobile device 31_100. A background download and/or upload can be a network data transfer that is initiated by an application without explicit input from the user. For example, a background download could be performed to retrieve the next level of a video game while the user is playing the video game application. In contrast, a foreground download or upload can be a network data transfer performed in response to an explicit indication from the user that the download or upload should occur. For example, a foreground download could be initiated by a user selecting a webpage link to download a picture, movie or document. Similarly, background uploads can be distinguished from foreground uploads based on whether or not an explicit user request to upload data to a network resource (e.g. server) was received from the user.

In some implementations, foreground downloads/uploads (e.g., downloads/uploads explicitly requested by a user) are performed immediately for the user. For example, the user requested downloads/uploads are performed immediately and are not subject to budgeting constraints or other considerations. Foreground downloads/uploads can be performed over a cellular data connection. In contrast, background downloads and/or uploads can be performed opportunistically and within budgeting constraints and considering environmental conditions, such as the temperature of the mobile device 31_100. For example, a background download or upload can be performed for an attribute or attribute value when the attribute is approved by the admission control mechanisms described above. In some implementations, background downloads and/or uploads can be restricted to Wi-Fi network connections.

In some implementations, system 31_1300 can include background transfer daemon 31_1302. In some implementations, background transfer daemon 31_1302 can be configured to perform background downloading and uploading of data or content on behalf of applications or processes running on mobile device 31_100. For example background transfer daemon 31_1302 can perform background download and/or uploads between application 31_1304 and server 31_1306 on behalf of application 31_1304. Thus, the background downloads/uploads can be performed out of process from application 31_1304 (e.g., not performed in/by the process requesting the download/upload).

In some implementations, application 31_1304 can initiate a background download/upload by sending a request to background transfer daemon 31_1302 to download or upload data. For example, a request to download data (e.g., content) can identify a network location from where the data can be downloaded. A request to upload data can identify a network location to which the data can be uploaded and a location where the data is currently stored on the mobile device 31_100. The request can also identify application 31_1304. Once the request has been made, application 31_1304 can be shut down or suspended so that the application will not continue consuming computing and/or network resources on mobile device 31_100 while the background download/upload is being performed by background transfer daemon 31_1304.

In some implementations, upon receiving a request to perform a background upload or download of data, background transfer daemon 31_1302 can send a request to sampling daemon 31_102 to determine if it is ok for background transfer daemon 31_1302 to perform a data transfer over the network. For example, background transfer daemon 31_1302 can request that sampling daemon 31_102 perform admission control for the data transfer. In the admission control request, background transfer daemon 31_1302 can provide the identifier (e.g., "bundleId" attribute value) for the background transfer daemon 31_1302 or the identifier for the application requesting the background transfer so that admission control can be performed on the background transfer daemon or the application. The admission control request can include the amount of data to be transferred as the cost of the request to be deducted from the system-wide data budget.

In response to receiving the admission control request from background transfer daemon 31_1302, sampling daemon 31_102 can determine if the system-wide data and/or energy budgets have been exhausted for the current hour. In some implementations, if sampling daemon 31_102 determines that the mobile device 31_100 is connected to an external power source, sampling daemon 31_102 will not prevent a background download/upload based on the energy budget. Sampling daemon 31_102 can determine if mobile device 31_100 is connected to Wi-Fi. Sampling daemon 31_102 can also determine whether mobile device 31_100 is in the middle of a thermal event (e.g., operating temperature above a predefined threshold value). In some implementations, if sampling daemon 31_102 determines that the data budget is exhausted and the mobile device 31_100 is not connected to Wi-Fi, that the energy budget is exhausted and the mobile device 31_100 is not connected to an external power source, or that the mobile device 31_100 is in the middle of a thermal event, then sampling daemon 31_102 will return a "no" reply to the admission control request by background transfer daemon 31_1302.

In some implementations, when background transfer daemon 31_1302 receives a "no" reply to the admission control request from sampling daemon 31_102, background transfer daemon 31_1302 can store the background download/upload request from application 31_1304 in request repository 31_1308.

In some implementations, sampling daemon 31_102 can send an retry signal to background transfer daemon 31_1302. For example, sampling daemon 31_102 can send the retry signal to background transfer daemon 31_1302 when the data and energy budgets are replenished and when the system is no longer experiencing a thermal event. Sampling daemon 31_102 can send the retry signal to background transfer daemon 31_1302 when the mobile device 31_100 is connected to Wi-Fi, connected to external power and when the system is not experiencing a thermal event. For example, when connected to Wi-Fi, there may not be a need to control data usage. Similarly, when connected to external power, there may not be a need to conserve battery power. Thus, the data and energy budgets may be disregarded by sampling daemon 31_102 when performing admission control.

In some implementations, when the retry signal is received by background transfer daemon 31_1302, background transfer daemon 31_1302 can send an admission control request to sampling daemon 31_102.

If sampling daemon 31_102 returns an "ok" reply in response to the admission control request, background transfer daemon 31_1302 can perform the background download or upload for application 31_1304. Once a background download is completed, background transfer daemon 31_1302 can wake or invoke application 31_1304 and provide application 31_1304 with the downloaded data.

In some implementations, background transfer daemon 31_1302 can notify sampling daemon 31_102 when the background download/upload starts and ends so that sampling daemon 31_102 can adjust the budgets and maintain statistics on the background downloads/uploads performed on mobile device 31_100. For example, background transfer daemon 31_1302 can send a "backgroundTransfer" attribute start or stop event to sampling daemon 31_102. In some implementations, background transfer daemon 31_1302 can transmit the number of bytes (e.g., "system.networkBytes" attribute event) transferred over cellular data, over Wi-Fi and/or in total so that sampling daemon 31_102 can adjust the budgets and maintain statistics on the background downloads/uploads performed on mobile device 31_100.

In some implementations, sampling daemon 31_102 can return a timeout value to background transfer daemon 31_1302 in response to an admission control request. For example, the timeout value can indicate a period of time (e.g., 5 minutes) that the background transfer daemon has to perform the background download or upload. When the timeout period elapses, background transfer daemon 31_1302 will suspend the background download or upload.

In some implementations, the timeout value can be based on remaining energy budgets for the current hour. For example, sampling daemon 31_102 can determine how much energy is consumed each second while performing a download or upload over Wi-Fi based on historical event data collected by sampling daemon 31_102. Sampling daemon 31_102 can determine the time out period by dividing the remaining energy budget by the rate at which energy is consumed while performing a background download or upload (e.g., energy budget/energy consumed/time=timeout period).

In some implementations, background downloads and/or uploads are resumable. For example, if mobile device 31_100 moves out of Wi-Fi range, the background download/upload can be suspended (e.g., paused). When mobile device 31_100 reenters Wi-Fi range, the suspended download/upload can be resumed. Similarly, if the background download/upload runs out of energy budget (e.g., timeout period elapses), the background download/upload can be suspended. When additional budget is allocated (e.g., in the next hour), the suspended download/upload can be resumed.

In some implementations, background downloads/uploads can be suspended based on the quality of the network connection. For example, even though mobile device 31_100 can have a good cellular data connection between mobile device 31_100 and the servicing cellular tower and a good data connection between the cellular tower and the server that the mobile device 31_100 is transferring data to or from, mobile device 31_100 may not have a good connection to the server. For example, the transfer rate between the mobile device 31_100 and the server may be slow or the throughput of the cellular interface may be low. If the transfer rate of the background download/upload falls below a threshold transfer rate value and/or the throughput of the background download/upload falls below a threshold throughput value, the background download/upload (e.g., data transfer) can be suspended or paused based on the detected poor quality network connection until a better network connection is available. For example, if a Wi-Fi connection becomes available the suspended background download/upload can be resumed over the Wi-Fi connection.

In some implementations, background transfer daemon 31_1302 can be configured with a limit on the number of background downloads and/or uploads that can be performed at a time. For example, background transfer daemon 31_1302 can restrict the number of concurrent background downloads and/or uploads to three.

Example Background Download/Upload Process

FIG. 31_14 is flow diagram of an example process 31_1400 for performing background downloads and uploads. For example, background downloads and/or uploads can be performed on behalf of applications on mobile device 31_100 by background transfer daemon 31_1302.

At step 31_1402, a background transfer request can be received. For example, background transfer daemon 31_1302 can receive a background download/upload request from an application running on mobile device 31_100. Once the application makes the request, the application can be terminated or suspended, for example. The request can identify the application and identify source and/or destination locations for the data. For example, when downloading data the source location can be a network address for a server and the destination location can be a directory in a file system of the mobile device 31_100. When uploading data, the source location can be a file system location and the destination can be a network location.

At step 31_1404, mobile device 31_100 can determine that budgets and device conditions do not allow for the data transfer. For example, background transfer daemon 31_1302 can ask sampling daemon 31_102 if it is ok to perform the requested background transfer by making an admission control request to sampling daemon 31_102 that identifies the background transfer daemon 31_1302, the application for which the background transfer is being performed, and/or the amount of data to be transferred. Sampling daemon 31_102 can determine if energy and data budgets are exhausted and if the mobile device 31_100 is in the middle of a thermal event. If the budgets are exhausted or if the mobile device 31_100 is in the middle of a thermal event, sampling daemon 31_102 can send a message to background transfer daemon 31_1302 indicating that it is not ok to perform the background data transfer (e.g., admission control returns "no").

At step 31_1406, mobile device 31_100 can store the background transfer request. For example, background transfer daemon 31_1302 can store the transfer request in a transfer request repository when sampling daemon 31_102 returns a "no" value in response to the admission control request.

At step 31_1408, mobile device 31_100 can determine that it is ok to retry the background transfer. For example, sampling daemon 31_102 can determine that the data and energy budgets have been replenished and that the mobile device 31_100 is not in the middle of a thermal event. Sampling daemon 31_102 can send a retry message to background transfer daemon 31_1302. Background transfer daemon 31_1302 can then attempt to perform the requested transfers stored in the transfer request repository by making another admission control request for each of the stored transfer requests.

At step 31_1410, mobile device 31_100 can determine that budgets and conditions of the mobile device 31_100 allow for background data transfer. For example, background transfer daemon 31_1302 can ask sampling daemon 31_102 if it is ok to perform the requested background transfer. Sampling daemon 31_102 can perform admission control to determine that energy and data budgets are replenished and that the mobile device 31_100 is not in the middle of a thermal event. If the budgets are not exhausted and if the mobile device 31_100 is not in the middle of a thermal event, sampling daemon 31_102 can send a message to background transfer daemon 31_1302 indicating that it is ok to perform the background data transfer.

At step 31_1412, mobile device 31_100 can perform the background transfer. For example, background transfer daemon 31_1302 can perform the requested background download or background upload for the requesting application. Background transfer daemon 31_1302 can notify sampling daemon 31_102 when the background transfer begins and ends (e.g., using "backgroundTransfer" attribute start and stop events). Background transfer daemon 31_1302 can send a message informing sampling daemon of the number of bytes transferred during the background download or upload (e.g., using the "networkBytes" attribute event). Once the background transfer is complete, background transfer daemon 31_1302 can invoke (e.g., launch or wake) the application that made the background transfer request and send completion status information (e.g., success, error, downloaded data, etc.) to the requesting application.

Enabling/Disabling Background Updates

FIG. 31_15 illustrates an example graphical user interface (GUI) 31_1500 for enabling and/or disabling background updates for applications on a mobile device. For example, GUI 31_1500 can be an interface presented on a display of mobile device 31_100 for receiving user input to adjust background update settings for applications on mobile device 31_100.

In some implementations, user input to GUI 31_1500 can enable or disable background updates from being performed for applications based on a user invocation forecast, as described above. For example, sampling daemon 31_102 and/or application manager 31_106 can determine whether background updates are enabled or disabled for an application and prevent the application from being launched by application manager 31_106 or prevent the application from being included in application invocation forecasts generated by sampling daemon 31_102. For example, if background updates are disabled for an application, sampling daemon 31_102 will not include the application the user invoked application forecast requested by when application manager 31_106. Thus, application manager 31_106 will not launch the application when background updates are disabled. Conversely, if background updates are enabled for the application, the application may be included in the application invocation forecast generated by sampling daemon 31_102 based on user invocation probabilities, as described above.

In some implementations, user input to GUI 31_1500 can enable or disable background updates from being performed for applications when a push notification is received, as described above. For example, sampling daemon 31_102, application manager 31_106 and/or push service daemon 31_904 can determine whether background updates are enabled or disabled for an application and prevent the application from being launched by application manager 31_106 in response to receiving a push notification. For example, if background updates are disabled for an application and a push notification is received for the application, application manager 31_106 will not launch the application to download updates in response to the push notification.

In some implementations, GUI 31_1500 can display applications 31_1502-1514 that have been configured to perform background updates. For example, the applications 31_1502-1514 can be configured or programmed to run as background processes on mobile device 31_100 when launched by application manager 31_106. When run as a background process, the applications 31_1502-1514 can communicate with various network resources to download current or updated content. The applications 31_1502-1514 can then update their respective user interfaces to present updated content when invoked by a user of mobile device 31_100. In some implementations, applications that are not configured or programmed to perform background updates will not be displayed on GUI 31_1500.

In some implementations, a user can provide input to GUI 31_1500 to enable and/or disable background updates for an application. For example, a user can provide input (e.g., touch input) to mobile device 31_100 with respect to toggle 31_1516 to turn on or off background updates for application 31_1502. A user can provide input (e.g., touch input) to mobile device 31_100 with respect to toggle 31_1518 to turn on or off background updates for application 31_1508.

In some implementations, additional options can be specified for a background update application through GUI 31_1500. For example, a user can select graphical object 31_1510 associated with application 31_1514 to invoke a graphical user interface (not shown) for specifying additional background update options. The background update options can include, for example, a start time and an end time for turning on and/or off background updates for application 31_1514.

Sharing Data Between Peer Devices

FIG. 31_16 illustrates an example system for sharing data between peer devices. In some implementations, mobile device 31_100 can share event data, system data and/or event forecasts with mobile device 31_1600. For example, mobile device 31_100 and mobile device 31_1600 can be devices owned by the same user. Thus, it may be beneficial to share information about the user's activities on each device between mobile device 31_100 and mobile device 31_1600.

In some implementations, mobile device 31_1600 can be configured similarly to mobile device 31_100, described above. For example, mobile device 31_1600 can be configured with a sampling daemon 31_1602 that provides the functionalities described in the above paragraphs (e.g., attributes, attribute events, forecasting, admission control, etc.).

In some implementations, mobile device 31_100 and mobile device 31_1600 can be configured with identity services daemon 31_1620 and identity service daemon 31_1610, respectively. For example, identity services daemon 31_1620 and 31_1610 can be configured to communicate information between mobile device 31_100 and mobile device 31_1600. The identity services daemon can be used to share data between devices owned by the same user over various peer-to-peer and network connections. For example, identity services daemon 31_1620 and identity services daemon 31_1610 can exchange information over Bluetooth, Bluetooth Low Energy, Wi-Fi, LAN, WAN and/or Internet connections.

In some implementations, sampling daemon 31_1602 (and sampling daemon 31_102) can be configured to share event forecasts and system state information with other sampling daemons running on other devices owned by the same user. For example, if mobile device 31_100 and mobile device 31_1600 are owned by the same user, sampling daemon 31_102 and sampling daemon 31_1602 can exchange event forecast information and/or system status information (e.g., battery status). For example, sampling daemon 31_1602 can send event forecast information and/or system status information using identity services daemon 31_1610.

Identity services daemon 31_1610 can establish a connection to identity services daemon 31_1620 and communicate event forecast information and/or mobile device 31_1600 system status information to sampling daemon 31_102 through identity services daemon 31_1620.

In some implementations, application 31_1608 (e.g., a client of sampling daemon 31_1602) can request that sampling daemon 31_1602 send event forecasts for a specified attribute or attribute value to sampling daemon 31_102. For example, application 31_1608 can be an application that is synchronized with application 31_108 of mobile device 31_100. For example, applications 31_108 and 31_1608 can be media applications (e.g., music libraries, video libraries, email applications, messaging applications, etc.) that are configured to synchronize data (e.g., media files, messages, status information, etc.) between mobile device 31_100 and mobile device 31_1600.

In some implementations, in order to allow a peer device (e.g., mobile device 31_100) determine when to synchronize data between devices, application 31_1608 can request that sampling daemon 31_1602 generate temporal and/or peer forecasts for the "bundleId" attribute or a specific "bundleId" attribute value (e.g., the application identifier for application 31_1608) based on attribute event data generated by mobile device 31_1600 and transmit the forecasts to sampling daemon 31_102. For example, a peer device can be remote device (e.g., not the current local device) owned by the same user. Mobile device 31_100 can be a peer device of mobile device 31_1600, for example.

In some implementations, the requesting client (e.g., application 31_1608) can specify a schedule for delivery and a duration for forecast data. For example, application 31_1608 can request a peer and/or temporal forecast for the "bundleId" attribute value "mailapp." Application 31_1608 can request that the forecast be generated and exchanged every week and that each forecast cover a duration or period of one week, for example.

In some implementations, data exchanges between peer devices can be statically scheduled. Sampling daemon 31_1602 can send attribute data that is necessary for mobile device 31_100 to have a consistent view of the remote state of mobile device 31_1600 under a strict schedule (e.g., application forecasts and battery statistics every 24 hours). In some implementations, clients can request attribute forecasts or statistics on-demand from the peer device. These exchanges are non-recurring. The requesting client can be notified when the requested data is received.

In some implementations, sampling daemon 31_1602 can transmit system state data for mobile device 31_1600 to sampling daemon 31_102. For example, sampling daemon 31_1602 can receive battery charge level events (e.g., "batteryLevel" attribute events), battery charging events (e.g., "cableplugin" events), energy usage events (e.g., "energy" attribute events) and/or other events that can be used to generate battery usage and charging statistics and transmit the battery-related event data to sampling daemon 31_102. For example, battery state information can be exchanged every 24 hours. Battery state information can be exchanged opportunistically. For example, when a communication channel (e.g., peer-to-peer, networked, etc.) is established mobile device 31_100 and mobile device 31_1600, the mobile devices can opportunistically use the already opened communication channel to exchange battery state or other system state information (e.g., an identification of the current foreground application).

As another example, sampling daemon 31_1602 can receive thermal level events (e.g., "thermalLevel" attribute events), network events (e.g., "networkQuality" attribute events, "networkBytes" attribute events) and transmit the thermal and/or network events to sampling daemon 31_102. Sampling daemon 31_1602 can receive events (e.g., "system.foregroundApp" attribute event) from application manager 31_106 that indicates which application (e.g., application identifier) is currently in the foreground of mobile device 31_1600 and transmit the foreground application information to sampling daemon 31_102. In some implementations, thermal events and foreground application change information can be exchanged with peer devices as soon as the events occur (e.g., as soon as a connection is established between peer devices). In some implementations, network status information can be exchanged on a periodic basis (e.g., once a day, twice a day, every hour, etc.).

Upon receipt of the forecast and/or system event data from sampling daemon 31_1602, sampling daemon 31_102 can store the forecast and/or event data in peer data store 31_1622. Similarly, any forecast and/or event data that sampling daemon 31_1602 receives from sampling daemon 31_102 can be stored in peer data store 31_1612. In some implementations, forecast and/or event data received from another device can be associated with a device description. For example, the device description can include a device name, a device identifier and a model identifier that identifies the model of the device. The device description can be used to lookup forecast data and/or event data for the device in peer data store 31_1622. Once mobile device 31_100 and mobile device 31_1600 have exchanged forecast and/or event data, the mobile devices can use the exchanged information to determine when to communicate with each other using the remote admission control mechanism below. By allowing devices to share information only when the information is needed and when the battery state of the devices can support sharing the information, power management of communications can be improved.

Remote Admission Control

In some implementations, mobile device 31_100 (or mobile device 31_1600) can perform admission control based on data received from another device. For example, sampling daemon 31_102 can perform admission control based on forecast and system event data received from sampling daemon 31_1602 and stored in peer data store 31_1622. For example, to synchronize data with application 31_1608, application 31_108 can send a synchronization message to identity services daemon 31_1620. For example, the synchronization message can include an identifier for mobile device 31_100, an identifier for mobile device 31_1600, a priority identifier (e.g., high, low), and a message payload (e.g., data to be synchronized).

Low Priority Messages

In some implementations, a low priority message can be transmitted after going through admission control. For example, a low priority message can be a message associated with discretionary processing (e.g., background applications, system utilities, anticipatory activities, activities that are not user-initiated). For example, identity services daemon 31_1620 can send an admission control request to sampling daemon 31_102 for a "bundleId" attribute value that is the bundle identifier for application 31_1608 (e.g., "bundleId"="1608"). In addition to the "bundleId" attribute name and value (e.g., "1608"), identity services daemon 31_1620 can provide the device name (e.g., "device 31_1600") in the admission control request to indicate that application 31_108 is requesting admission control for communication with another device.

In some implementations, in response to receiving the admission control request, sampling daemon 31_102 can perform local admission control and remote admission control. For example, sampling daemon 31_102 can perform local admission control, as described above, to determine if mobile device 31_100 is in condition to allow an event associated with the specified attribute value (e.g., "bundleId"="1608") to occur. Sampling daemon 31_102 can check local energy, data and attribute budgets, for example, and ask for voter feedback to determine whether mobile device 31_100 is in condition to allow an event associated with the specified attribute value (e.g., "bundleId"="1608").

In addition to performing local admission control, sampling daemon 31_102 can perform remote admission control based on the "bundleId" attribute forecasts, event data and system data received from mobile device 31_1600 and stored in peer data store 31_1622. For example, sampling daemon 31_102 can use the device identifier (e.g., "device 31_1600," device name, unique identifier, UUID, etc.) to locate data associated with mobile device 31_1600 in peer data store 31_1622. Sampling daemon 31_102 can analyze the attribute (e.g., "bundleId") forecast data received from sampling daemon 31_1602 to determine if application 31_1608 is likely to be invoked by the user on mobile device 31_1600 in the current 15-minute timeslot. If application 31_1608 is not likely to be invoked by the user in the current 15-minute timeslot, then sampling daemon 31_102 can return a "no" value in response to the admission control request. For example, by allowing application 31_108 to synchronize with application 31_1608 only when application 31_1608 is likely to be used on mobile device 31_1600, sampling daemon 31_102 can delay the synchronization process and conserve system resources (e.g., battery, CPU cycles, network data) until such time as the user is likely to use application 31_1608 on mobile device 31_1600.

In some implementations, if application 31_1608 is likely to be invoked by the user of mobile device 31_1600 in the current 15-minute timeslot, then sampling daemon 31_102 can check the system data associated with mobile device 31_1600 and stored in peer data store 31_1622. For example, sampling daemon 31_102 can check the system data associated with mobile device 31_1600 to determine if mobile device 31_1600 has enough battery charge remaining to perform the synchronization between application 31_108 and application 31_1608. For example, sampling daemon 31_102 can check if there is currently enough battery charge to complete the synchronization between application 31_108 and application 31_1608. Sampling daemon 31_102 can check if there is enough battery charge to perform the synchronization and continue operating until the next predicted battery recharge (e.g., "cablePlugin" attribute event). For example, sampling daemon 31_102 can generate a temporal forecast for the "cablePlugin" attribute that identifies when the next "cablePlugin" attribute event is likely to occur. Sampling daemon 31_102 can analyze energy usage statistics (events) to predict energy usage until the next "cablePlugin" event and determine if there is enough surplus energy to service the synchronization transmission between application 31_108 and application 31_1608. If sampling daemon 31_102 determines that mobile device 31_1600 does not have enough energy (e.g., battery charge) to service the synchronization, sampling daemon 31_102 can return a "no" value in response to the remote admission control request.

In some implementations, sampling daemon 31_102 can check the system data associated with mobile device 31_1600 to determine if mobile device 31_1600 is in a normal thermal condition (e.g., not too hot) and can handle processing the synchronization request. For example, if "thermalLevel" attribute event data received from mobile device 31_1600 indicates that mobile device 31_1600 is currently operating at a temperature above a threshold value, sampling daemon 31_102 can prevent the synchronization communication by returning a "no" value in response to the remote admission control request.

In some implementations, when the forecast data indicates that the user is likely to invoke application 31_1608 on mobile device 31_1600 and the energy, thermal and other system state information indicate that mobile device 31_1600 is in condition to handle a communication from mobile device 31_100, sampling daemon 31_102 can return a "yes" value to identity services daemon 31_1620 in response to the admission control request. In response to receiving a "yes" value in response to the admission control request, identity services daemon 31_1620 can transmit the synchronization message for application 31_108 to identity services daemon 31_1610 on mobile device 31_1600. Application 31_108 and application 31_1608 can then synchronize data by exchanging messages through identity services daemon 31_1620 and identity services daemon 31_1610.

In some implementations, a high priority message can be transmitted after going through remote admission control. For example, a high priority message can be a message associated with a user-initiated task, such as a message associated with a foreground application or a message generated in response to a user providing input. In some implementations, admission control for high priority messages can be handled similarly to low priority messages. However, when performing remote admission control for high priority messages, a high priority message can be admitted (allowed) without considering attribute forecast data (e.g., "bundleId" forecast data) because the high priority message is typically triggered by some user action instead of being initiated by some discretionary background task.

In some implementations, when performing admission control for high priority messages, the battery state of the remote device (e.g., mobile device 31_1600) can be checked to make sure the remote device (e.g., peer device) has enough battery charge available to process the high priority message. If there is enough battery charge available on the remote device, then the high priority message will be approved by remote admission control. For example, sampling daemon 31_102 can transmit a "yes" value to identity services daemon 31_1620 in response to the remote admission control request when there is enough battery charge remaining to process the high priority message. If there is not enough battery charge available on the remote device, then the high priority message will be rejected by remote admission control. For example, sampling daemon 31_102 can transmit a "no" value to identity services daemon 31_1620 in response to the remote admission control request when there is enough battery charge remaining to process the high priority message. Thus, identity services daemon 31_1620 will initiate communication with a peer device (e.g., mobile device 31_1600) when the peer device has enough battery charge remaining to process the message in question.

In some implementations, when a sampling daemon 31_102 is notified of a high priority message, sampling daemon 31_102 can send current battery state information (e.g., current charge level) to identity services daemon 31_1620. Identity services daemon 31_1620 can then add the battery state information to the high priority message. Thus, system state information can be efficiently shared between devices by piggy backing the battery state information (or other information, e.g., thermal level, foreground application, etc.) on other messages transmitted between mobile device 31_100 and mobile device 31_1600.

In some implementations, sampling daemon 31_102 can send a retry message to identity services daemon 31_1620. For example, when conditions on mobile device 31_100 or mobile device 31_1600 change (e.g., battery conditions improve), sampling daemon 31_102 can send identity services daemon 31_1620 a retry message. In some implementations, a retry message can be generated when the remote focal application changes. For example, if the user on the remote peer device is using the "mailapp" application, the "mailapp" application becomes the focal application. When the user begins using the "webbrowser" application, the focal application changes to the "webbrowser" application.

The change in focal application can be reported as an event to sampling daemon 31_1602 and transmitted to sampling daemon 31_102 when peer data is exchanged between mobile device 31_100 and mobile device 31_1600. Upon receiving the event information indicating a change in focal application at the peer device 31_1602, sampling daemon 31_102 can send a retry message to identity services daemon 31_1620. Identity services daemon 31_1620 can then retry admission control for each message that was rejected by sampling daemon 31_102. For example, identity services daemon 31_1620 can store rejected messages (e.g., transmission tasks) and send the rejected messages through admission control when a retry message is received from sampling daemon 31_102. In some implementations, rejected messages can be transmitted after a period of time has passed. For example, a message that has not passed admission control can be sent to the peer device after a configurable period of time has passed.

In some implementations, identity services daemon 31_1620 can interrupt a data stream transmission when sampling daemon 31_102 indicates that conditions on mobile device 31_100 or mobile device 31_1600 have changed. For example, if sampling daemon 31_102 determines that battery conditions on mobile device 31_100 or mobile device 31_1600 have changed such that one of the mobile devices may run out of battery power, sampling daemon 31_102 can tell identity services daemon 31_1620 to stop transmitting and retry admission control for the attribute event associated with the data stream.

Process for Sharing Data Between Peer Devices

FIG. 31_17 illustrates an example process 31_1700 for sharing data between peer devices. Additional details for process 31_1700 can be found above with reference to FIG. 31_16. At step 31_1702, a mobile device can receive event data from a peer device. For example, event data can be shared as "digests" (e.g., forecasts, statistics, etc.) or as raw (e.g., unprocessed) event data. For example, a second device (e.g., mobile device 31_1600) is a peer device of the mobile device 31_100 when the second device and the mobile device are owned by the same user. The mobile device 31_100 can receive event data related to system state (e.g., battery state, network state, foreground application identifier, etc.) of mobile device 31_1600. The mobile device can receive attribute event forecasts, statistics, or raw event data from the mobile device 31_1600 based on events that have occurred on mobile device 31_1600. For example, an application 31_1608 on the peer device 31_1600 can instruct the sampling daemon 31_1602 on the peer device 31_1600 to generate and send forecasts for a particular attribute or attribute value to the mobile device 31_100.

At step 31_1704, an identity services daemon 31_1620 on the mobile device 31_100 can receive a message to transmit to the peer device 31_1600. For example, an application 31_108 running on the mobile device may need to share, exchange or synchronize data with a corresponding application 31_1608 on the peer device 31_1600. The application 31_108 can send a message containing the data to be shared to the identity services daemon 31_1620.

At step 31_1706, the sampling daemon 31_102 on the mobile device 100 can determine whether to transmit the message based on data received from the peer device 31_1600. For example, the sampling daemon 31_102 can perform a local admission control check and a remote admission control check to determine whether the message should be sent to the peer device 31_1600 at the current time. If the attribute event forecasts received from the peer device 31_1600 indicate that the user of peer device 31_1600 is likely to invoke application 31_1608 at the current time and if the event data indicates that the conditions (e.g., battery state, thermal level, etc.) of peer device 31_1600 are such that initiating communication with peer device 31_1600 will not deplete the battery or make the thermal state worse, then sampling daemon 31_102 can approve the transmission of the message.

At step 31_1708, once sampling daemon 31_102 performs admission control and approves initiating communication with the peer device 31_1600, identity services daemon 31_1620 can transmit the message to the peer device 31_1600. For example, identity services daemon 31_1620 can transmit the message to identity services daemon 31_1610 of peer device 31_1600. Identity services daemon 31_1610 can then transmit the message to application 31_1608 so that application 31_108 and application 31_1608 can synchronize data.

The memory (e.g., of device 100, FIG. 1A) may also store other software instructions to facilitate processes and functions described in Section 1, such as the dynamic adjustment processes and functions as described with reference to FIGS. 31_1-31_17.

Example Methods, Systems, and Computer-Readable Media for Dynamic Adjustment of Mobile Devices The memory (e.g., of device 100, FIG. 1A) may also store other software instructions to facilitate processes and functions described in Section 1, such as the dynamic adjustment processes and functions as described with reference to FIGS. 31_1-31_17.

In one aspect, a mobile device can be configured to monitor environmental, system and user events associated with the mobile device and/or a peer device. The occurrence of one or more events can trigger adjustments to system settings. The mobile device can be configured to keep frequently invoked applications up to date based on a forecast of predicted invocations by the user. In some implementations, the mobile device can receive push notifications associated with applications that indicate that new content is available for the applications to download. The mobile device can launch the applications associated with the push notifications in the background and download the new content. In some implementations, before running an application or communicating with a peer device, the mobile device can be configured to check energy and data budgets and environmental conditions of the mobile device and/or a peer device to ensure a high quality user experience.

In some implementations, a method is provided. The method includes: receiving, at a mobile device, attribute event data from a peer device, where the attribute event data describes events that occurred on the peer device; storing the peer event data at the mobile device; receiving a request to communicate with the peer device from an application on the mobile device, wherein the request includes an attribute having a value corresponding to an identifier for a corresponding application on the peer device; determining, by the mobile device, to initiate communication with the peer device based on the peer event data.

In some implementations, the peer device and the mobile device are owned by a single user. In some implementations, determining, by the mobile device, to initiate communication with the peer device based on the peer event data includes generating one or more a forecasts for the attribute based on the peer event data. In some implementations, determining, by the mobile device, to initiate communication with the peer device based on the peer event data includes determining a battery status of the peer device based on the peer event data. In some implementations, determining, by the mobile device, to initiate communication with the peer device based on the peer event data includes determining a thermal status of the peer device based on the peer event data. In some implementations, determining, by the mobile device, to initiate communication with the peer device based on the peer event data includes determining that a user is likely to invoke the corresponding application on the peer device at about a current time.

In some implementations, a non-transitory computer-readable storage medium is provided, the non-transitory computer-readable storage medium including one or more sequences of instructions which, when executed by one or more processors, causes: receiving, at a mobile device, attribute event data from a peer device, where the attribute event data describes events that occurred on the peer device; storing the peer event data at the mobile device; receiving a request to communicate with the peer device from an application on the mobile device, wherein the request includes an attribute having a value corresponding to an identifier for a corresponding application on the peer device; determining, by the mobile device, to initiate communication with the peer device based on the peer event data.

In some implementations, the peer device and the mobile device are owned by a single user. In some implementations, the instructions that cause determining, by the mobile device, to initiate communication with the peer device based on the peer event data include instructions that cause generating one or more a forecasts for the attribute based on the peer event data. In some implementations, the instructions that cause determining, by the mobile device, to initiate communication with the peer device based on the peer event data include instructions that cause determining a battery status of the peer device based on the peer event data. In some implementations, the instructions that cause determining, by the mobile device, to initiate communication with the peer device based on the peer event data include instructions that cause determining a thermal status of the peer device based on the peer event data. In some implementations, the instructions that cause determining, by the mobile device, to initiate communication with the peer device based on the peer event data include instructions that cause determining that a user is likely to invoke the corresponding application on the peer device at about a current time.

In some implementations, a system is provided, the system including one or more processors; and a non-transitory computer-readable medium including one or more sequences of instructions which, when executed by the one or more processors, causes: receiving, at a mobile device, attribute event data from a peer device, where the attribute event data describes events that occurred on the peer device; storing the peer event data at the mobile device; receiving a request to communicate with the peer device from an application on the mobile device, wherein the request includes an attribute having a value corresponding to an identifier for a corresponding application on the peer device; determining, by the mobile device, to initiate communication with the peer device based on the peer event data.

In some implementations, the peer device and the mobile device are owned by a single user. In some implementations, the instructions that cause determining, by the mobile device, to initiate communication with the peer device based on the peer event data include instructions that cause generating one or more a forecasts for the attribute based on the peer event data. In some implementations, the instructions that cause determining, by the mobile device, to initiate communication with the peer device based on the peer event data include instructions that cause determining a battery status of the peer device based on the peer event data. In some implementations, the instructions that cause determining, by the mobile device, to initiate communication with the peer device based on the peer event data include instructions that cause determining a thermal status of the peer device based on the peer event data. In some implementations, the instructions that cause determining, by the mobile device, to initiate communication with the peer device based on the peer event data include instructions that cause determining that a user is likely to invoke the corresponding application on the peer device at about a current time.

In another aspect, a mobile device can be configured to monitor environmental, system and user events. The occurrence of one or more events can trigger adjustments to system settings. In some implementations, the mobile device can be configured to keep frequently invoked applications up to date based on a forecast of predicted invocations by the user. In some implementations, the mobile device can receive push notifications associated with applications that indicate that new content is available for the applications to download. The mobile device can launch the applications associated with the push notifications in the background and download the new content. In some implementations, before running an application or accessing a network interface, the mobile device can be configured to check energy and data budgets and environmental conditions of the mobile device to preserve a high quality user experience.

In some implementations, a method is provided, the method including: receiving event data at a first process running on a mobile device; receiving event registration data from a second process running on the mobile device, the event registration data identifying one or more events for triggering an invocation of the second process, where the second process is suspended or terminated after the event registration data is received; determining, by the first process, that the one or more events have occurred based on the event data; and invoking the second process on the mobile device.

In some implementations, invoking the second process causes the second process to adjust one or more components of the mobile device. In some implementations, the one or more components include a central processing unit, graphics processing unit, baseband processor or display of the mobile device. In some implementations, the one or more events include a change in operating temperature of the mobile device, a change in a system setting, a user input, turning on or off a display, setting a clock alarm, or setting a calendar event. In some implementations, the method also includes: receiving, at the first process, a request from the second process for event data stored by the second process; transmitting, from the first process to the second process, the requested event data, where the second process is configured to adjust one or more components of the mobile device based on the event data. In some implementations, the one or more events include a pattern of events and wherein the first process is configured to identify patterns in the received event data and invoke the second process when the pattern of events is detected.

In some implementations, a non-transitory computer-readable medium is provided, the non-transitory computer-readable medium including one or more sequences of instructions which, when executed by one or more processors, causes: receiving event data at a first process running on a mobile device; receiving event registration data from a second process running on the mobile device, the event registration data identifying one or more events for triggering an invocation of the second process, where the second process is suspended or terminated after the event registration data is received; determining, by the first process, that the one or more events have occurred based on the event data; and invoking the second process on the mobile device.

In some implementations, invoking the second process causes the second process to adjust one or more components of the mobile device. In some implementations, the one or more components include a central processing unit, graphics processing unit, baseband processor or display of the mobile device. In some implementations, the one or more events include a change in operating temperature of the mobile device, a change in a system setting, a user input; turning on or off a display, setting a clock alarm, or setting a calendar event. In some implementations, the instructions cause: receiving, at the first process, a request from the second process for event data stored by the second process; transmitting, from the first process to the second process, the requested event data, where the second process is configured to adjust one or more components of the mobile device based on the event data. In some implementations, the one or more events include a pattern of events and wherein the first process is configured to identify patterns in the received event data and invoke the second process when the pattern of events is detected in some implementations, a system is provided, the system including one or more processors; and a non-transitory computer-readable medium including one or more sequences of instructions which, when executed by one or more processors, causes: receiving event data at a first process running on a mobile device; receiving event registration data from a second process running on the mobile device; the event registration data identifying one or more events for triggering an invocation of the second process, where the second process is suspended or terminated after the event registration data is received; determining, by the first process, that the one or more events have occurred based on the event data; and invoking the second process on the mobile device.

In some implementations, invoking the second process causes the second process to adjust one or more components of the mobile device. In some implementations, the one or more components include a central processing unit, graphics processing unit, baseband processor or display of the mobile device. In some implementations, the one or more events include a change in operating temperature of the mobile device, a change in a system setting, a user input, turning on or off a display, setting a clock alarm, or setting a calendar event. In some implementations, the instructions cause: receiving, at the first process, a request from the second process for event data stored by the second process; transmitting, from the first process to the second process, the requested event data, where the second process is configured to adjust one or more components of the mobile device based on the event data. In some implementations, the one or more events include a pattern of events and wherein the first process is configured to identify patterns in the received event data and invoke the second process when the pattern of events is detected.

In one more aspect, a mobile device can be configured to monitor environmental, system and user events associated with the mobile device and/or a peer device. The occurrence of one or more events can trigger adjustments to system settings. The mobile device can be configured to keep frequently invoked applications up to date based on a forecast of predicted invocations by the user. In some implementations, the mobile device can receive push notifications associated with applications that indicate that new content.

In some implementations, a method is provided, the method including: receiving, by a first process executing on a mobile device, events generated by one or more client processes, each event including data associated with one of a plurality of attributes, where each of the attributes is associated with a budget and each of the events has a corresponding cost; reducing the budget for a particular attribute based on the cost of events associated with the particular attribute received by the mobile device; storing the event data in an event data store on the mobile device; receiving, by the first process, a request from a client process to initiate an event associated with the particular attribute; comparing the cost of the event to the budget remaining for the particular attribute; and determining, by the first process, to allow the event associated with the particular attribute based on the comparison.

In some implementations, at least one of the plurality of attributes is dynamically defined by a client at runtime. In some implementations, determining to allow the event comprises generating a forecast for the particular attribute that indicates when an event associated with the attribute is likely to occur. In some implementations, determining to allow the event comprises determining that there is enough budget remaining to cover the cost of the event. In some implementations, the budget for the particular attribute is dynamically defined by the client. In some implementations, the budget corresponds to a portion of a system-wide data budget. In some implementations, the budget corresponds to a portion of a system-wide energy budget.

In some implementations, a non-transitory computer-readable medium is provided, the non-transitory computer-readable medium including one or more sequences of instructions which, when executed by one or more processors, causes: receiving, by a first process executing on a mobile device, events generated by one or more client processes, each event including data associated with one of a plurality of attributes, where each of the attributes is associated with a budget and each of the events has a corresponding cost; reducing the budget for a particular attribute based on the cost of events associated with the particular attribute received by the mobile device; storing the event data in an event data store on the mobile device; receiving, by the first process, a request from a client process to initiate an event associated with the particular attribute; comparing the cost of the event to the budget remaining for the particular attribute; and determining, by the first process, to allow the event associated with the particular attribute based on the comparison.

In some implementations, at least one of the plurality of attributes is dynamically defined by a client at runtime. In some implementations, the instructions that cause determining to allow the event include instructions that cause generating a forecast for the particular attribute that indicates when an event associated with the attribute is likely to occur. In some implementations, the instructions that cause determining to allow the event include instructions that cause determining that there is enough budget remaining to cover the cost of the event. In some implementations, the budget for the particular attribute is dynamically defined by the client. In some implementations, the budget corresponds to a portion of a system-wide data budget. In some implementations, the budget corresponds to a portion of a system-wide energy budget.

In some implementations, a system is provided, the system including one or more processors; and a computer-readable medium including one or more sequences of instructions which, when executed by the one or more processors, causes: receiving, by a first process executing on a mobile device, events generated by one or more client processes, each event including data associated with one of a plurality of attributes, where each of the attributes is associated with a budget and each of the events has a corresponding cost; reducing the budget for a particular attribute based on the cost of events associated with the particular attribute received by the mobile device; storing the event data in an event data store on the mobile device; receiving, by the first process, a request from a client process to initiate an event associated with the particular attribute; comparing the cost of the event to the budget remaining for the particular attribute; and determining, by the first process, to allow the event associated with the particular attribute based on the comparison.

In some implementations, at least one of the plurality of attributes is dynamically defined by a client at runtime. In some implementations, the instructions that cause determining to allow the event include instructions that cause generating a forecast for the particular attribute that indicates when an event associated with the attribute is likely to occur. In some implementations, the instructions that cause determining to allow the event include instructions that cause determining that there is enough budget remaining to cover the cost of the event. In some implementations, the budget for the particular attribute is dynamically defined by the client. In some implementations, the budget corresponds to a portion of a system-wide data budget. In some implementations, the budget corresponds to a portion of a system-wide energy budget.

In still another aspect, a mobile device can be configured to monitor environmental, system and user events associated with the mobile device and/or a peer device. The occurrence of one or more events can trigger adjustments to system settings. The mobile device can be configured to keep frequently invoked applications up to date based on a forecast of predicted invocations by the user. In some implementations, the mobile device can receive push notifications associated with applications that indicate that new content is available for the applications to download. The mobile device can launch the applications associated with the push notifications in the background and download the new content. In some implementations, before running an application or communicating with a peer device, the mobile device can be configured to check energy and data budgets and environmental conditions of the mobile device and/or a peer device to ensure a high quality user experience.

In some implementations, a method is provided, the method including: receiving, by a first process from one or more plugin processes executing on a computing device, a request to register the plugin processes as one or more voting processes; receiving, by the first process, events generated by one or more client processes, each event including data associated with one of a plurality of attributes; storing the event data in an event data store on the mobile device; receiving, by the first process, a request from a client process to initiate an event associated with a particular attribute; sending to each registered voting process information that identifies the particular attribute; in response to sending to each registered voting process the information that identifies the particular attribute, receiving a vote from at least one of the registered voting processes; and determining, by the first process, to allow the event associated with the particular attribute based on the vote.

In some implementations, the one or more voting processes are dynamically plugged into the first process at runtime. In some implementations, determining, by the first process, to allow the event associated with the particular attribute based on feedback from one or more voting processes comprises: sending each voting process information that identifies the particular attribute; and receiving a yes vote from each of the voting processes when each voting process determines that an event associated with the particular attribute should be allowed to occur. In some implementations, the method includes: determining, by the first process, to prevent a second event associated with a second attribute when the first process receives a no vote from at least one of the one or more voting processes. In some implementations, the method includes: receiving a request from at least one of the voting processes for a forecast associated with the particular attribute; generating the requested forecast; and returning the requested forecast to the at least one voting process. In some implementations, the method includes: determining, by the first process, to allow a third event associated with a particular attribute value based on feedback from one or more voting processes. In some implementations, determining, by the first process, to allow a third event associated with a particular attribute value based on feedback from one or more voting processes comprises: sending each voting process information that identifies the particular attribute value; and receiving a yes vote from each of the voting processes when each voting process determines that an event associated with the particular attribute value should be allowed to occur.

In some implementations, a non-transitory computer-readable medium i s provided, the non-transitory computer-readable medium including one or more sequences of instructions which, when executed by one or more processors, causes: receiving, by a first process from one or more plugin processes executing on a computing device, a request to register the plugin processes as one or more voting processes; receiving, by the first process, events generated by one or more client processes, each event including data associated with one of a plurality of attributes; storing the event data in an event data store on the mobile device; receiving, by the first process, a request from a client process to initiate an event associated with a particular attribute; sending to each registered voting process information that identifies the particular attribute; in response to sending to each registered voting process the information that identifies the particular attribute, receiving a vote from at least one of the registered voting processes; and determining, by the first process, to allow the event associated with the particular attribute based on the vote.

In some implementations, the one or more voting processes are dynamically plugged into the first process at runtime. In some implementations, the instructions that cause determining, by the first process, to allow the event associated with the particular attribute based on feedback from one or more voting processes include instructions that cause: sending each voting process information that identifies the particular attribute; and receiving a yes vote from each of the voting processes when each voting process determines that an event associated with the particular attribute should be allowed to occur. In some implementations, the instructions cause determining, by the first process, to prevent a second event associated with a second attribute when the first process receives a no vote from at least one of the one or more voting processes. In some implementations, the instructions cause: receiving a request from at least one of the voting processes for a forecast associated with the particular attribute; generating the requested forecast; and returning the requested forecast to the at least one voting process. In some implementations, the instructions cause determining, by the first process, to allow a third event associated with a particular attribute value based on feedback from one or more voting processes. In some implementations, the instructions that cause determining, by the first process, to allow a third event associated with a particular attribute value based on feedback from one or more voting processes include instructions that cause: sending each voting process information that identifies the particular attribute value; and receiving a yes vote from each of the voting processes when each voting process determines that an event associated with the particular attribute value should be allowed to occur.

In some implementations, a system is provided, the system including one or more processors; and a computer-readable medium including one or more sequences of instructions which, when executed by the one or more processors, causes: receiving, by a first process from one or more plugin processes executing on a computing device, a request to register the plugin processes as one or more voting processes; receiving, by the first process, events generated by one or more client processes, each event including data associated with one of a plurality of attributes; storing the event data in an event data store on the mobile device; receiving, by the first process, a request from a client process to initiate an event associated with a particular attribute; sending to each registered voting process information that identifies the particular attribute; in response to sending to each registered voting process the information that identifies the particular attribute, receiving a vote from at least one of the registered voting processes; and determining, by the first process, to allow the event associated with the particular attribute based on the vote.

In some implementations, the one or more voting processes are dynamically plugged into the first process at runtime. In some implementations, the instructions that cause determining, by the first process, to allow the event associated with the particular attribute based on feedback from one or more voting processes include instructions that cause: sending each voting process information that identifies the particular attribute; and receiving a yes vote from each of the voting processes when each voting process determines that an event associated with the particular attribute should be allowed to occur. In some implementations, the instructions cause determining, by the first process, to prevent a second event associated with a second attribute when the first process receives a no vote from at least one of the one or more voting processes. In some implementations, the instructions cause: receiving a request from at least one of the voting processes for a forecast associated with the particular attribute; generating the requested forecast; and returning the requested forecast to the at least one voting process. In some implementations, the instructions cause determining, by the first process, to allow a third event associated with a particular attribute value based on feedback from one or more voting processes. In some implementations, the instructions that cause determining, by the first process, to allow a third event associated with a particular attribute value based on feedback from one or more voting processes include instructions that cause: sending each voting process information that identifies the particular attribute value; and receiving a yes vote from each of the voting processes when each voting process determines that an event associated with the particular attribute value should be allowed to occur.

In one other aspect, a mobile device can be configured to monitor environmental, system and user events associated with the mobile device and/or a peer device. The occurrence of one or more events can trigger adjustments to system settings. The mobile device can be configured to keep frequently invoked applications up to date based on a forecast of predicted invocations by the user. In some implementations, the mobile device can receive push notifications associated with applications that indicate that new content is available for the applications to download. The mobile device can launch the applications associated with the push notifications in the background and download the new content. In some implementations, before running an application or communicating with a peer device, the mobile device can be configured to check energy and data budgets and environmental conditions of the mobile device and/or a peer device to ensure a high quality user experience.

In some implementations, a method is provided, the method including: receiving, by a first process executing on a mobile device, events generated by one or more client processes, each event including data associated with one of a plurality of attributes; storing the event data in an event data store on the mobile device; generating one or more event forecasts for each of the attributes in the stored event data; receiving, by the first process, a request from a client process to initiate an event associated with a particular attribute; determining, by the first process, to allow the event associated with the particular attribute based on the a forecast generated for the particular attribute.

In some implementations, the one or more forecasts predict a likelihood that an event associated with an attribute will occur in a time period. In some implementations, the one or more forecasts include a peer forecast. In some implementations, the one or more forecasts include a temporal forecast. In some implementations, the one or more forecasts include a frequency forecast based on the frequency of occurrence of the particular attribute in the event data store. In some implementations, the one or more forecasts include a panorama forecast based on events associated with attributes that are different than the particular attribute. In some implementations, the method includes: determining a default forecast type based on how well each of a plurality of forecast types predicts the occurrence of a received event. In some implementations, the plurality of forecast types includes a frequency forecast type and a panorama forecast type.

In some implementations, a non-transitory computer-readable medium is provided, the non-transitory computer-readable medium including one or more sequences of instructions which, when executed by one or more processors, causes: receiving, by a first process executing on a mobile device, events generated by one or more client processes, each event including data associated with one of a plurality of attributes; storing the event data in an event data store on the mobile device; generating one or more event forecasts for each of the attributes in the stored event data; receiving, by the first process, a request from a client process to initiate an event associated with a particular attribute; determining, by the first process, to allow the event associated with the particular attribute based on the a forecast generated for the particular attribute.

In some implementations, the one or more forecasts predict a likelihood that an event associated with an attribute will occur in a time period. In some implementations, the one or more forecasts include a peer forecast. In some implementations, the one or more forecasts include a temporal forecast. In some implementations, the one or more forecasts include a frequency forecast based on the frequency of occurrence of the particular attribute in the event data store. In some implementations, the one or more forecasts include a panorama forecast based on events associated with attributes that are different than the particular attribute. In some implementations, the instructions cause determining a default forecast type based on how well each of a plurality of forecast types predicts the occurrence of a received event. In some implementations, the plurality of forecast types includes a frequency forecast type and a panorama forecast type.

In some implementations, a system is provided, the system including: one or more processors; and a non-transitory computer-readable medium including one or more sequences of instructions which, when executed by the one or more processors, causes: receiving, by a first process executing on a mobile device, events generated by one or more client processes, each event including data associated with one of a plurality of attributes; storing the event data in an event data store on the mobile device; generating one or more event forecasts for each of the attributes in the stored event data; receiving, by the first process, a request from a client process to initiate an event associated with a particular attribute; determining, by the first process, to allow the event associated with the particular attribute based on the a forecast generated for the particular attribute.

In some implementations, the one or more forecasts predict a likelihood that an event associated with an attribute will occur in a time period. In some implementations, the one or more forecasts include a peer forecast. In some implementations, the one or more forecasts include a temporal forecast. In some implementations, the one or more forecasts include a frequency forecast based on the frequency of occurrence of the particular attribute in the event data store. In some implementations, the one or more forecasts include a panorama forecast based on events associated with attributes that are different than the particular attribute. In some implementations, the instructions cause determining a default forecast type based on how well each of a plurality of forecast types predicts the occurrence of a received event. In some implementations, the plurality of forecast types includes a frequency forecast type and a panorama forecast type.

In yet one additional aspect, a mobile device can be configured to monitor environmental, system and user events associated with the mobile device and/or a peer device. The occurrence of one or more events can trigger adjustments to system settings. The mobile device can be configured to keep frequently invoked applications up to date based on a forecast of predicted invocations by the user. In some implementations, the mobile device can receive push notifications associated with applications that indicate that new content is available for the applications to download. The mobile device can launch the applications associated with the push notifications in the background and download the new content. In some implementations, before running an application or communicating with a peer device, the mobile device can be configured to check energy and data budgets and environmental conditions of the mobile device and/or a peer device to ensure a high quality user experience.

In some implementations, a method is provided, the method including: receiving, at a thermal management daemon executing on a mobile device, a request to vote on allowing an event to occur that is associated with a specified value of an attribute; requesting a peer forecast from a sampling daemon for the attribute; receiving scores for each of a plurality of values associated with the attribute and predicted to occur near a current time; voting to allow the event based on the score of the specified attribute value.

In some implementations, the method includes: determining a number of highest scored attribute values in the plurality of values; voting to allow the event when the specified attribute value is included in the number of highest scored attribute values. In some implementations, the method includes: voting to prevent the event when the specified attribute value is not included in the plurality of values. In some implementations, the method includes: determining a number of lowest scored attribute values in the plurality of values; voting to prevent the event when the specified attribute value is included in the number of lowest scored attribute values. In some implementations, the method includes: determining the number of lowest scored attribute values based on a current operating temperature of the mobile device. In some implementations, the method includes: determining the number of lowest scored attribute values based on where the current operating temperature is in a range of operating temperatures.

In some implementations, a non-transitory computer-readable medium is provided, the non-transitory computer-readable medium including one or more sequences of instructions which, when executed by one or more processors, cause: receiving, at a thermal management daemon executing on a mobile device, a request to vote on allowing an event to occur that is associated with a specified value of an attribute; requesting a peer forecast from a sampling daemon for the attribute; receiving scores for each of a plurality of values associated with the attribute and predicted to occur near a current time; voting to allow the event based on the score of the specified attribute value.

In some implementations, the instructions further cause: determining a number of highest scored attribute values in the plurality of values; voting to allow the event when the specified attribute value is included in the number of highest scored attribute values. In some implementations, the instructions cause: voting to prevent the event when the specified attribute value is not included in the plurality of values. In some implementations, the instructions cause: determining a number of lowest scored attribute values in the plurality of values; voting to prevent the event when the specified attribute value is included in the number of lowest scored attribute values. In some implementations, the instructions cause: determining the number of lowest scored attribute values based on a current operating temperature of the mobile device. In some implementations, the instructions cause: determining the number of lowest scored attribute values based on where the current operating temperature is in a range of operating temperatures.

In some implementations, a system is provided, the system including one or more processors; and a computer-readable medium including one or more sequences of instructions which, when executed by one or more processors, cause: receiving, at a thermal management daemon executing on a mobile device, a request to vote on allowing an event to occur that is associated with a specified value of an attribute; requesting a peer forecast from a sampling daemon for the attribute; receiving scores for each of a plurality of values associated with the attribute and predicted to occur near a current time; voting to allow the event based on the score of the specified attribute value.

In some implementations, the instructions further cause: determining a number of highest scored attribute values in the plurality of values; voting to allow the event when the specified attribute value is included in the number of highest scored attribute values. In some implementations, the instructions cause: voting to prevent the event when the specified attribute value is not included in the plurality of values. In some implementations, the instructions cause: determining a number of lowest scored attribute values in the plurality of values; voting to prevent the event when the specified attribute value is included in the number of lowest scored attribute values. In some implementations, the instructions cause: determining the number of lowest scored attribute values based on a current operating temperature of the mobile device. In some implementations, the instructions cause: determining the number of lowest scored attribute values based on where the current operating temperature is in a range of operating temperatures.

Section 2: Search Techniques

The material in this section "Search Techniques" describes performing federated searches, multi-domain query completion, and the use of user feedback in a citation search index, in accordance with some embodiments, and provides information that supplements the disclosure provided herein. For example, portions of this section describe generating a plurality of ranked query results from a query over a plurality of separate search domains (e.g., search maps, people, and places), which supplements the disclosures provided herein, e.g., those related to the method 800 and to populating the predictions portion 930 of FIGS. 9B-9C, as discussed below. As another example, portions of this section describe searching and determining search completions, which supplements the disclosures provided herein, e.g., those related to automatically surfacing relevant content without receiving any user input (e.g., method 800) and those related to the use of a previous search history and the generation of predicted content based on a previous search history for a user (e.g., as discussed below in reference to FIGS. 3A-3B). As one more example, portions of this section describe monitoring a user's interactions with search results in order to improve the presentation of search results, which supplements the disclosures herein, e.g., those related to the use of a previous search history in the generation of predicted content (e.g., as discussed below in reference to FIGS. 3A-3B).

Brief Summary for Search Techniques

A method and apparatus of a device that performs a multi-domain query search is described. In an exemplary embodiment, the device receives a query prefix from a client of a user. The device further determines a plurality of search completions across the plurality of separate search domains. In addition, the device ranks the plurality of search completions based on a score calculated for each of the plurality of search completions determined by a corresponding search domain, where at least one of the plurality of search completions is used to generate a plurality of search results without an indication from the user and in response to receiving the query prefix.

In another embodiment, the device generates a results cache using feedback from a user's search session. In this embodiment, the device receives a feedback package from a client, where the feedback package characterizes a user interaction with a plurality of query results in the search session that are presented to a user in response to a query prefix entered by the user. The device further generates a plurality of results for a plurality of queries by, running the plurality of queries using the search feedback index to arrive at the plurality of results. In addition, the device creates a results cache from the plurality of results, where the results cache maps the plurality of results to the plurality of queries and the results cache is used to serve query results to a client.

In a further embodiment, the device generates a plurality of ranked query results from a query over a plurality of separate search domains. In this embodiment, the device receives the query and determines a plurality of results across the plurality of separate search domains using the query. The device further characterizes the query. In addition, the device ranks the plurality of results based on a score calculated for each of the plurality of results determined by a corresponding search domain and the query characterization, where the query characterization indicates a query type.

Other methods and apparatuses are also described.

Detailed Description for Search Techniques

A method and apparatus of a device that performs a multi-domain query search is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order.

Moreover, some operations may be performed in parallel rather than sequentially.

The terms "server," "client," and "device" are intended to refer generally to data processing systems rather than specifically to a particular form factor for the server, client, and/or device.

A method and apparatus of a device that performs a multi-domain query search is described. In one embodiment, the device receives incremental query prefixes from a client that are input by a user and uses the incremental query prefixes to generate a set of query completions for each query prefix. For example and in one embodiment, if the user enters the string "apple," the device receives the incremental query prefixes for "a," "ap," "app," "appl," and "apple." For each of the query prefixes, the device generates a set of query completions. For example and in one embodiment, the completions for "a" can be "apple.com," "America," or "Annapolis." Similarly, the device can generate a different set of query completions for the other incremental query prefixes. In one embodiment, the device determines the set of query completions from multiple search domains. For example and in one embodiment, the device searches for query completions across search domains such as maps, media, wiki, site, and other search domains. In one embodiment, each of these search domains includes one or more query completion trees that are used to determine possible completions for the input query prefix. In one embodiment, each of the search domains returns a set of scores that the device uses to rank these query completions. For example and in one embodiment, each of search domains returns a set of raw, local, and global scores that can be used by the device to rank the different completions across the different domains.

As described above, traditional systems will returns possible query completions to the user and the user will select one of the possible query completions to use for a query search. In contrast and in one embodiment, the device does not return the set of query completions to the user. Instead, the device ranks the set of query completions and uses a subset of the query completions to determine relevant results for this subset of query completions without presenting the set of query completions to the user or getting an indication which of this set of query completions to use to determine relevant results. In one embodiment, the device performs a search for relevant results across multiple search domains (e.g., maps, media, wiki, sites, other, or another search domain). The device receives a set of results from the multiple search domains and ranks these results based on scores generated from each search domain and cross-domain information. In one embodiment, the device further ranks the relevant results based on a type of the query completion that was used to determine these results. For example and in one embodiment, if the query completion is characterized to be a search for a place, the results from the maps search domain can be ranked higher as well as a wiki entry about this place. As a further example, if the query completion is indicated to be about an artist, the media search domain results can be ranked higher. The device returns the relevant results found for the query completions to the client.

In one embodiment, the user viewing the results might engage or abandon the results. In one embodiment, an engagement event occurs if the user interacts with one of the rendered results presented to the user during a user's search session. For example and in one embodiment, the user could click on a link that is presented for one of the rendered results. In another example, the user could click on the link and spend a time greater than a predetermined time interacting with the object (e.g., a website) referenced by that link (e.g., interacts with the referenced object for more than 60 seconds). In this example, the user may receive results directed towards a query search for the current U.S. President and click on a link that references a web page describing the latest presidential speech. If the user interacts with the website for more than a predetermined time (e.g., 60-90 seconds), the device would determine that the user engaged with the result represented by that link. In another embodiment, the user may ignore or abandon results rendered for the user. For example and in one embodiment, if a user clicks on a link presented for one of the rendered results, but navigates away from that website within a predetermined time (e.g., less than 60-90 seconds), the device determines that this is an abandonment event for that result.

In one embodiment, this feedback can be incorporated into a search index, where the feedback influences the ranking and filtering of the relevant results. In this embodiment, the client that presents and renders the relevant results additionally collects the engagement and abandonment events for a user's search session. The client collects the events into a feedback package and sends this package to a server for processing. In one embodiment, the server receives the feedback package and converts the feedback package into a feedback index entry. In one embodiment, the feedback index entry has the format of <query, result, render counts, engagement counts, abandonment counts>, where query is the input query and context information such as, device type, application, locale, and geographic location, result is the render result, render counts is the number of times the result is rendered for that query, engagement counts is the number of times the result is engaged for that query, and abandonment counts is the number of times that result is abandoned. This entry is incorporated into a feedback search index. In one embodiment, the feedback search index is a search index that incorporates the users feedback into scoring results. For example and in one embodiment, each engagement events for a query result pair promotes that result for the corresponding query. In this example, if a user engages with a result for a particular query, then a future user may also engagement with this result for the same query. Thus, in one embodiment, the result for this query would be returned and ranked higher for a future user having the same query. Conversely, if a user abandons a result for a particular query, then a future user may also abandon this same result for the same query. Thus, in one embodiment, the result for this query may be returned and ranked lower for a future user having the same query.

In one embodiment, the server further uses the feedback search index to generate a results cache that maps queries to results. In one embodiment, the results cache is a cache that maps queries to results, which can be used to quickly return results for a user query. In one embodiment, the results cache is stored in an edge server that is close in proximity to a user's device that can be used to serve one or more results prior to performing a query search. In one embodiment, the server generates the results cache by running a set of queries from a results set to generated an updated results set that incorporates the collected feedback into the results of the update results set. This updated results set is sent to the edge server.

FIG. 32_1 is a block diagram of one embodiment of a system 32_100 that returns search results based on input query prefixes. In FIG. 32_1, the system 32_100 includes a search network 32_108 that is coupled to device 32_102, smartphone 32_114, and tablet 32_117. In one embodiment, the search network is a network of one or more servers that receives query prefixes for different devices and returns query results back to those devices. For example and in one embodiment, the search network receives query prefixes 32_110A-D from device 32_102, smartphone 32_114, and/or tablet 32_117 and returns query results 32_112A-D back to the respective device (e.g., device 32_102, smartphone 32_114, and/or tablet 32_117). In one embodiment, the device 32_102 can be personal computer, laptop, server, mobile device (e.g., smartphone, laptop, personal digital assistant, music playing device, gaming device, etc.), and/or any device capable requesting and/or displaying a query. In one embodiment, the device can be a physical or virtual device. In one embodiment, the smartphone 32_114 can be a cellular telephone that is able to perform many function of device 32_102. In one embodiment, the tablet 32_117 can be a mobile device that accepts input on a display.

In one embodiment, each of the devices includes a browser that is used to input a query prefix by the user. For example in one embodiment, device 32_102 includes a web browser 32_104 and file browser 32_106. Each of these browsers includes a search input field that is used by the user to input the query prefix. In one embodiment a web browser 32_104 is a program that all that allows a user to search and retrieve the web for various type of web documents. In one embodiment, the web browser 32_104 includes a search input field 32_120A. The search input field 32_120A is used by the user to input a query prefix string. In one embodiment, a query prefix string is a string of text or other symbols that will be used in the query prefix that is sent to the search network 32_108. The query prefix string can be an incomplete or complete search string that was input by the user. In one embodiment as the user types in the query input string in the search input field 32_120A, the web browser 32_104 captures the query prefix string and sends this query prefix string in a query prefix 32_110A to the search network. For each symbol or text string entered in the search input field 32_120A, the web browser 32_104 creates the query prefix 32_110A and sends it to the search network 32_108. In response to receiving the query prefix 32_110A, the search network creates one or more query completions over multiple search domains and selects one or more of these query completions to create a set of relevant results 32_112A, which is returned to the web browser 32_104. For example and in one embodiment, as the user enters the text "appl," the web browser 32_104 creates query prefixes 32_110A using the query prefix strings "a," "ap," "app," and "appl." For each of these query prefixes 32_110A, the search network 32_108 creates a set of query completions from multiple search domains, uses these query completions to determine relevant results, and returns a different set of results for the different query prefixes 32_110A. This procedure of capturing query prefixes as the user enters the subsequent characters can also be done in a file browser 32_106. In one embodiment, the file browser 32_106 includes a search input field 32_120B, which a user can use to input a query prefix string. In this embodiment, as a user inputs the query prefix string, the file browser 32_106 creates different query prefixes 32_110B and sends them to the search network 32_108. The search network 32_108 receives the different query prefixes 32_110B and determines the one or more query completions and returns relevant results as described above. In addition, the query prefixes can be used to perform a query using a metadata database of data stored locally on device 32_102.

In one embodiment, this same procedure of capturing a query input string as the strings is entered, determining one or more query completions, and using these query completions to determine relevant results can also be performed on the smartphone 32_114 and tablet 32_117. In this embodiment, the smart phone 32_114 includes a browser 32_116. The browser 32_116 includes a search input field 32_120C. Similar as described above, the search input field 32_120C is used by a user to input a query prefix string. This query prefix string is incrementally captured by the browser 32_116, which, in turn, creates a set of different query prefixes 32_110C that is sent to the search network 32_108. In response to receiving the each of these different query prefixes 32_110C, the search network 32_108 determines one or more query completions, and uses these query completions to determine relevant results 32_112C that are returned back to browser 32_116. In addition, the tablet 32_117 includes a browser 32_119. The browser 32_119 includes a search input field 32_120D. Similar as described above, the search input field 32_120D is used by a user to input a query prefix string. This query prefix string is incrementally captured by the browser 32_119, which in turn creates a set of different query prefixes 32_110D that is sent to the search network 32_108. In response to receiving each of these different query prefixes 32_110D, the search network 32_108 determines one or more query completions, and uses these query completions to determine relevant results 32_112D that are returned back to browser 32_119. In one embodiment, the search network 32_108 includes a search module 32_118 that processes the query completion and returns relevant results. Processing the query completions and returning relevant results is further described in FIGS. 32_2-32_7 below.

As described above, a browser on a device sends query prefixes 32_110A-D to the search network 32_108. In one embodiment a query prefix 32_110A-D includes a query prefix string, the location (e.g., latitude/longitude combination), a device type identifier (e.g., computer, smartphone, tablet, etc.), and application type identifier (e.g., web browser (and what type of web browser), file browser), and locale. In this embodiment, by providing the location, device type identifier, application type identifier, and locale, the context in which the query prefix string was entered by the user is provided to the search network 32_108. In one embodiment, the search network 32_108 uses this context and the query prefix string to determine the query completions and relevant results. For example and in one embodiment, the search network 32_108 can use the location information to determine query completions and results that are relevant to the location of the device that provided the query prefix. As an example, the device location can be used to find search results for places near the current device location. As another example and in another embodiment, the device type identifier can be used by the search network 32_108 to determine completions and results that are directed to that device type. In this example, if the device type identifier indicated that the query prefix was coming from a smartphone, the search network 32_108 may give greater weight to results to an application store for the smartphone instead of an application store for personal computer. In a further example and in further embodiment, the application type identifier and locale can also be used to weight completions and results.

In one embodiment, the search network 32_108 completes the query prefixes using a multi-domain query completion. In this embodiment, the search network 32_108 sends each received query prefix to each of the search domains used by the search network 32_108. For example and in one embodiment, the search network 32_108 sends a received a query prefix to the map search domain, media search domain, wiki search domain, sites search domain, and other search domains. Each of these search domains would determine one or more query completions for that query prefix based on the data contained in that search domain. In addition, each search domain would return a set of scores for each of the one or more query completions. For example and in one embodiment, a search domain would return a raw, local, and/or global score for each query completion. Performing the multi-domain query completion is further described in FIGS. 3-6.

Instead of returning the query completions determined by the search network 32_108 to the device that provided the query prefix, the search network 32_108 uses one or more of the query completions to determine a set of relevant query results over multiple search domains. In one embodiment, using the query completions to determine a set of relevant query results is performed without an indication from the user as to which of these query completions to use to determine the relevant results. In this embodiment, as the user inputs a string into the search input field, the search network 32_108 processes the string and returns relevant results to the user. In one embodiment, the search network 32_108 uses one or more of the determined query completions to find and rank query results for those query completions. In one embodiment, the search network 32_108 searches over the multiple search domains that are available to the search network 32_108. In this embodiment, the search network 32_108 receives from each search domain a set of results for query completion. For each of these results, the search network 32_108 additionally receives a set of scores that characterizes that result. In one embodiment, the scores can include scores determined by the search domain the provided the result, another metric, and/or a signal that characterizes the query completion that was used to provide the result as described below in FIG. 32_7. In one embodiment, the signal is based on a vocabulary characterization of the query completion using a knowledge base. In one embodiment, the vocabulary characterization determines what type of query completion is being used for the multi-domain query search. Performing a multi-domain query search to determine a set of relevant results is further described in FIGS. 32_7 and 32_13-32_15 below.

FIG. 32_2 is flowchart of one embodiment of a process 32_200 to determine query completions and relevant results based on an input query prefix. In FIG. 32_2, process 32_200 begins by receiving a query prefix 32_202. In one embodiment, the query prefix includes a query prefix string, a location, a device type identifier, an application type identifier, and a locale as described in FIG. 32_1 above. In this embodiment, the location, device type identifier, application type identifier, and/or locale give a context for the query prefix that the query prefix string was input by the user. At block 32_204, process 32_200 determines query completions across multiple search domains and ranks and selects the query completions. In one embodiment, process 32_200 uses the query prefix to determine a set of query completions from each of the different such domains. For example and in one embodiment, if the query prefix string is 'ap', process 32_200 would use this query prefix string to determine the set of query completions from the different search domains (e.g., maps, media, wiki, sites, and/or other search domains). In this example, the maps search domain might return a query completion to the city Apache Junction, the media search domain by return a query completion to the music work Appalachian Spring, the wiki search domain might return a query completion to the company Apple, and the sites search domain my return a query completion to the website Apple.com. In one embodiment, process 32_200 creates the set of query completions if the query prefix string has a minimum number of characters (e.g., four characters).

In addition, process 32_200 ranks and selects the possible query completions received from the different such domains. In one embodiment, process 32_200 ranks the possible query completions based on scores determined by the corresponding search domain and weights based on the context of the query prefix. In this embodiment, process 32_200 selects the set of query completions based on these rankings. In one embodiment, instead of returning the set of query completions back to the user who input the query prefix string used for the great completions, this set of query completions is used to determine a set of relevant results, which are then returned to the user. Determining a set of query completions is further described in FIGS. 32_3-32_6 below.

Process 32_200 determines the set of relevant results at block 32_206. In one embodiment, process 32_200 determines the relevant results based on the query completions determined in block 32_204. In this embodiment, process 32_200 searches over the multiple search domains that are available to process 32_200. In this embodiment, process 32_200 receives from each search domain a set of results for the query completion(s). For each of these results, process 32_200 additionally receives a set of scores that characterizes that result. In one embodiment, the scores can include scores determined by the search domain the provided the result, another metric, and/or a signal that characterizes the query completion that was used to provide the result as described below in FIG. 32_7. In one embodiment, the signal is based on a vocabulary characterization of the query completion using a knowledge base. In one embodiment, the vocabulary characterization determines what type of query completion is being used for the multi-domain query search. Determining the set of relevant results is further described in FIGS. 32_7 and 32_13-32_15 below. At block 32_208, process 32_200 returns the set of relevant results to the user. In another embodiment, the feedback index can be used as a signal domain to weight results. This embodiment is further described in FIG. 32_14 below.

As described above, process 32_200 determines query completions and relevant results over multiple search domains. In one embodiment, the query completions and relevant results our aggregated using an aggregator. FIG. 32_3 is a block diagram of one embodiment of a system 32_300 that includes an aggregator 32_302 and multiple search domains 32_304A-F. In one embodiment, the aggregator 32_302 receives requests for query completions based on an input query prefix. In response to receiving the input query prefix, the aggregator 32_302 sends the input query prefix to each of the search domains 32_304A-F. Each of the search domains 32_304A-F uses the input query prefix to determine possible query completions in that domain. For example and in one embodiment, the map search domain 32_304A receives an input query prefix and searches this domain for possible query completions. In one embodiment, the aggregator 32_302 receives the query completions from each of the search domains, and ranks the received query completions based on the scores for each of the completions determined by the corresponding search domain and weights based on the query prefix context.

In one embodiment, the maps search domain 32_304A is a search domain that includes information related to a geographical map. In this embodiment, the maps information can include information about places, addresses, places, businesses, places of interest, or other type of information relating to maps. In another embodiment, the maps information can also include information related to places of interest, such as opening hours, reviews and ratings, contact information, directions, and/or photographs related to the place. In one embodiment, the media search domain 32_304B is a search domain related to media. In one embodiment, the media search domain 32_304B includes information related to music, books, video, classes, spoken word, podcasts, radio, and/or other types of media. In a further embodiment, the media search domain 32_304B can include information related to applications that can run on the device, such as device 32_102, smartphone 32_114 and tablet 32_117 as described above in FIG. 32_1. In one embodiment, the media search domain is a media store that includes different types of media available for purchase (e.g., music, books, video, classes, spoken word, podcasts, radio, applications, and/or other types of media). In one embodiment, the wiki search domain 32_304C is an online encyclopedia search domain. For example and in one embodiment, wiki search domain 32_304C can be WIKIPEDIA. In one embodiment, the sites search domain 32_304D is a search domain of websites. For example and in one embodiment, the sites search domain 32_304D includes business, governmental, public, and/or private websites such as "apple.com," "whitehouse.gov," "yahoo.com," etc. In one embodiment, the other search domain 32_304E is a set of other search domains that can be accessed by the aggregator 32_302 (e.g., a news search domain). One embodiment, the feedback completion domain 32_304F is a search index that is based on query feedback collected by browsers running on various devices. In one embodiment, the feedback completion domain 32_304F includes a feedback index that maps queries to results based on the collected query feedback. The feedback index is further described in FIGS. 32_8-32_12 below.

As described above, each search domain 32_304A-F includes information that allows each of the search domains to give a set of query completions based on an input query prefix. In one embodiment, each of the search domains includes a query completion tree that is used to determine the query completion as well as determine scores for each of those query completions. FIG. 32_4 is an illustration of one embodiment to a query completion search domain 32_402. In FIG. 32_4, the query completion search domain 32_402 includes a query completion tree 32_400 that has nodes 32_404A-J. In one embodiment, each of the nodes 32_404A-J represents a character in a respective language. In this embodiment, by following the nodes 32_404A-J down the tree, different query completions can be represented. For example and in one embodiment, starting at node 32_404A and following down to node 32_404C, completions that start with the letters 'ap' can be represented (32_406). Each node also includes a frequency, which is the number of times this completion has been matched by an input query prefix. In one embodiment, node 32_404C has a frequency of N. In this embodiment, the frequency is represented as the raw score that is returned to the aggregator 32_302 (FIG. 32_3) above. In one embodiment, the frequency can be calculated based on logs (e.g., maps or media search domains), pages visited (e.g., wiki search domain), or another source of information. Under node 32_404C, there are number of possible other query completions. For example and in one embodiment, nodes 32_404D-F represents the query completions that start with the letters 'apa', 'apt', and 'app'. The total number of possible query completions underneath the node gives an indication of closeness for that query completion represented by that node. If the node has a large number of possible other nodes below it, the query completion represented by that node is unlikely to be a good completion. On the other hand, a node that has relatively few nodes underneath that node, this node may be a good completion. In one embodiment, local score for that node is represented by that node's frequency divided by the number of completions represented by the subtrees below that node. In one embodiment, the equation for the local score is represented by equation (1):

local score(node)=Frequency(node)/Number of completions below the node.

In one embodiment, each query completion tree includes the total number of completions. This value is used to compute the global score for completion (or node). In one embodiment, the equation for the global score is represented by equation (2): global score (node)=Frequency(node)/Number of completions in the query completion tree In one embodiment, the raw, local, and global scores for each query completion are returned to the aggregator by the search domain.

FIG. 32_5 is an illustration of one embodiment of a maps search domain 32_500. In FIG. 32_5, the map search domain 32_500 includes query completion trees 32_504A-D for different zoom levels of this domain. In one embodiment, the map search domain 32_500 includes a query completion tree for the city level 32_504A, the county level 32_504B, the state level 32_504C, and the country level 32_504D, which are aggregated by the maps aggregator 32_502. In this embodiment, a determination of query completions for input query prefix is received by the maps aggregator 32_502, which in turn, determines query completions for that input query prefix at the different zoom levels 32_504A-D of the map search domain 32_500. The maps aggregator 32_502 retrieves the possible query completions from each of the different zoom levels 32_504A-D, aggregates the query completions, and returns these query completions to the aggregator (e.g., aggregator 32_302 (FIG. 32_3)). Thus, the map search domain 32_500 determines query completions across different zoom levels. In one embodiment, the map search domain 32_500 includes information about addresses, places, businesses, places of interest, and/or any other information relating to maps. In one embodiment, the map search domain 32_500 can include directory information, such as a white or yellow pages directory. In one embodiment, the media search domain is organized by storefront, which is based on a combination of device identifier and locale. In this embodiment, there is a query completion tree for each storefront. FIG. 32_6 is a flow chart of one embodiment of a process 32_600 to determine query completions from multiple search domains. In one embodiment, aggregator 32_302 (FIG. 32_3) performs process 32_600 to determine query completions from multiple search domains. In FIG. 32_6, process 32_600 begins by receiving a query prefix at block 32_602. In one embodiment, the query prefix includes a query prefix string in a context as described above in FIG. 32_2. At block 32_602, process 32_600 sends the query prefix to different search domains to determine possible completions (32_604). In one embodiment, process 32_600 sends the query prefix to the maps, media, wiki, sites, and/or other search domains, where each of the search domains determines possible query completions for the input query prefix based on the query completion tree(s) that are available for each of those search domains as described in FIG. 32_4 above. Process 32_600 receives the possible query completions from each of the search domains at block 32_606. In addition to receiving the possible query completions, process 32_600 also receives a set of scores for each of the possible completions: e.g., a raw, local, and/or global score as described in FIG. 32_4 above. At block 32_608, process 32_600 ranks and filters the possible query completions based on the returned scores and the context of the input query prefix. In one embodiment, process 32_600 tanks the possible query completions based on the raw, local, and global scores received from the different search domains and the context included with the query prefix. Process 32_600 additionally filters the possible query completions based on a set of rules. For example and in one embodiment, a filter rule could be that processed 32_600 filters out possible completions that have a raw score of one or less than some predetermined value. Process 32_600 sends the ranked, filtered completions to the search query module, where the search query module uses the set of rank filtered query completions to determine a set of relevant results that will be returned to the user at block 32_610.

As described above, the query completions determined by process 32_600 are used to determine relevant results without sending these completions back to the user. FIG. 32_7 is a flow chart of one embodiment of a process 32_700 to determine relevant results over multiple search domains from a determined query completion. In one embodiment, the federator 32_824 (FIG. 32_8) performs process 32_700. In FIG. 32_7, process 32_700 receives the query completions from the completer at block 32_702. In one embodiment, the received query completions are the completions determined by process 32_600 in response to receiving a query prefix. At block 32_704, process 32_700 sends the query completions to the different search domains to determine possible relevant results. In one embodiment, each of the search domains uses the received query completions to determine relevant results for that search domain. At block 32_706, process 32_700 receives the query results from the different search domains. In one embodiment, process 32_700 receives the results and the scores associated with each result that are computed by the relevant search domain.

Process 32_700 ranks and filters the search results at block 32_708. In one embodiment, process 32_700 ranks the search results based on scores returned by each of the searched domains for the search results and other factors. In this embodiment, the scores from the different domains can be scored based on domain-dependent scores, query independent scores, and query dependent scores. In one embodiment, each of the different search domains can provide specific data that is used to rank the returned results. For example and in one embodiment, the maps search domain can provide a variety of query independent information to rank the results: number of online reviews, average review score, distance from the user (e.g., based the query prefix location information), if the result has a Uniform Resource Locator (URL) associated with the result (e.g., if the result is a business location, if the business has a URL reference a website or other social media presence), and/or the number of click counts. As another example and another embodiment, the media search domain can provide other type of information for scoring: media rating count, age of the media, popularity, decayed popularity, and/or buy data by result. In a further example and embodiment, the wiki search domain can provide information regarding page views, edit history, and number of languages that can be for ranking. Other search domain can provide scoring metrics such as number of citations and age.

In one embodiment, process 32_700 receives a set of scores from each search domain and uses these scores to determine an initial score for each of the results. Process 32_700 applies a signal domain to each of the results. In one embodiment, a signal domain is a query completion characterization. In this embodiment, process 32_700 characterizes each of the query completions and uses this query completion characterization to rank the results. For example and in one embodiment, process 32_700 performs a vocabulary characterization utilizing a knowledge base to determine what a type for the query completion. In this example, a query completion type indicates whether the query completion is determining a person, place, thing, and/or another category. For example and one embodiment, process 32_700 could determine that a query completion is being used to determine a place. In this example, because the query completion is used to determine a place, the query results from the maps search domain would be weight (and ranked) higher in the ranking of the search results. The query completion characterization is further described in FIGS. 32_13-32_15 below.

In another embodiment, process 32_700 applies boosts to each of the result scores. In this embodiment, process 32_700 applies a query deserves freshness to each of the results. In one embodiment, query deserve freshness means that if there are recent spikes or peaks in the number of counts for that results, this result is a "fresh" result, which could be boosted. A result with a count that fluctuates around a baseline over time would not be a "fresh" result and would not be boosted. In one embodiment, the counts are based on analysis of a social media feed (e.g., Twitter, etc.).

For example and in one embodiment, if the query completion was "puppy love" and four results were returned: (1) the song "Puppy Love" from the media search domain; (2) a business called "Puppy Love Dogs" from the maps search domain; (3) a news article referring to a puppy love commercial; and (4) a wiki entry called "Puppy Love". In this embodiment, there is initial scoring of each result based on search domain dependent metrics: {age, rating, and raw score} from the media search domain; {distance from user, has URL, number of reviews, average review} from the maps search domain; {age, news score, trackback count} from the news domain; and {page rank, raw score} from the wiki search domain. Each of the search domain provides its own scoring to process 32_700. In this example, the scoring of each result could be initially rank as wiki result>media result>news result>maps result. Process 32_700 further applies a signal domain to each of the results. In this example, the query "puppy love" is characterized as a song and possibly a place. Applying this characterization would boost the media store result and, to a lesser extent, the maps result. After applying the characterization boosts, the results scoring may be ranked wiki result>media result (but closer in score)>maps result>news result. In addition, process 32_700 applies query deserved boosts to the results. For example, because it is two days after the initial airing of the "Puppy Love" commercial, there is a boost in the counts for this commercial. Thus, the "Puppy Love" result would get a query deserves freshness boost. In this example, the news result "Puppy Love" would get a big boost so that the results would rank as news result>wiki result>media result>maps result.

In one embodiment, process 32_700 additionally filters the search results. In this embodiment, process 32_700 removes results based on certain rules. For example and in one embodiment, process 32_700 may remove results that below a certain overall score. Alternatively, process 32_700 can filter results based on another criteria (e.g., Poor text match to query, low click-through rate, low popularity, results with explicit content and/or profanity, and/or a combination thereof). At block 32_710, process 32_700 returns the ranked, filtered results to the user.

FIG. 32_8 is a block diagram of a system 32_800 that incorporates user feedback into a search index. In FIG. 32_8, the system 32_800 includes a device 32_802 that sends query prefix(es) 32_828 to an edge server 32_804, which in turn returns query results 32_830 back to the device. In addition, the edge server 32_804 is coupled to a core server 32_816. In one embodiment, the device 32_802 sends the query prefix(es) 32_828 to the edge server as the user enters in the query prefix. For example and in one embodiment, if the user types in the query prefix "apple," a query prefix is generated for "a," "ap," "app," "appl," and "apple" and sent to the edge server 32_804 as the user enters each character. In addition, for each query prefix 32_828 sent to the edge server 32_804, the edge server 32_804 returns relevant results 32_830 to the client. For example and in one embodiment, the edge server would return relevant results for the query prefixes 32_828 "a," "ap," "app," "appl," and "apple" as the user enters each character. In one embodiment, the edge server can also perform the query completion. In one embodiment, the device 32_802 further collects feedback regarding a user's search session, collects this feedback into a feedback package 32_832, and sends the feedback package to the edge server. Collecting and sending of the feedback is further described in FIG. 32_10 below. In one embodiment, the device 32_802 includes a collect feedback module 32_838 to collect and send feedback.

In one embodiment, the edge server 32_804 includes a feedback module 32_806 that further includes a feedback search module 32_808 and feedback collection module 32_810. In one embodiment, the feedback search module 32_808 performs a search for each of the query prefix(es) 32_828 based on a feedback index 32_814 stored on an edge cache 32_812 of the edge server 32_804. In this embodiment, as the user enters a query prefix 32_828, a new set of relevant results 32_830 is returned to the device 32_802 using the feedback search module 32_808 and the feedback search index 32_814. In one embodiment, a feedback search index is an index that incorporates the user's feedback into the search index. In this embodiment, the feedback search index is a results cache that is used to quickly serve results 32_830 back to the device. In one embodiment, the feedback search index is a citation search index and is further described with reference to FIG. 32_11 below. In one embodiment, the feedback collection 32_810 collects the feedback packages sent from device 32_802 and forwards the feedback package to the core server 32_816.

In one embodiment, the core server 32_816 includes a feedback feed pipeline 32_818, feedback decision pipeline 32_822, feedback index 32_820, and federator 32_824. In one embodiment, the feedback feed pipeline 32_818 receives the raw feedback packages 32_834 from the edge server 32_804 and converts each of these raw feedback packages 32_834 into entries for the feedback index 32_820. In one embodiment, the feedback feed pipeline 32_818 converts each of the raw feedback packages into a set of index entries with the format of <query, result, render counts, engagement counts, abandonment counts>, where query is the input query and context information such as, device type, application, locale, and geographic location, result is the render result, render counts is the number of times the result is rendered for that query, engagement counts is the number of times the result is engaged for that query, and abandonment counts is the number of times that result is abandoned. In this embodiment, these index entries are added to the feedback index 32_820. Updating a feedback index with the raw feedback packages is further described in FIG. 32_11 below. In one embodiment, the feedback index 32_820 is a search index that incorporates the user's feedback. The feedback feed pipeline 32_818 further includes a process feedback module 32_840 that updates a feedback index with the raw feedback packages.

In one embodiment, the feedback decision pipeline 32_822 updates a results set using the feedback index 32_820. In one embodiment, a results set is a map between a set of queries and results. In this embodiment, the feedback decision pipeline 32_822 runs a set of queries against the feedback index 32_820 to determine an updated results set. In this embodiment, the updated results set is sent to the federator 32_824. The feedback decision pipeline 32_822 additionally sends the updated results set 32_826 to the edge server 32_804. The updated results set 32_826 includes the results for the set of queries that are determined using the updated feedback index 32_820. In one embodiment, the feedback decision pipeline 32_822 includes an update results module 32_842 that updates the results set. Updating the results set is further described in FIG. 32_12 below. In one embodiment, the feedback decision pipeline 32_822 additionally sends the updated results set to a feedback archive 32_836 that stores the updated results set 32_826. In one embodiment, the federator 32_824 performs a multi-domain search using completed queries as described in FIGS. 32_13-32_15 below.

As described above, the search network captures user feedback with respect to a user's search session and uses this feedback to build a search feedback index. FIG. 32_9 is a flow chart of one embodiment of a process 32_900 to incorporate user feedback into a citation search index. In FIG. 32_9, process 32_900 begins by collecting (32_902) the user feedback for a user's search session. In one embodiment, process 32_900 start collecting feedback at a device that received the query results in response to a query prefix that was sent to the search network. In this embodiment, process 32_900 collects the feedback by detecting an initial render event (or another event (e.g., begin input of a query prefix) and determining the user's interactions in the search session. In one embodiment, a user interaction can be maintaining focus on a website referenced by results, clicking on a link or other reference on that website, or another type of interaction. In one embodiment, a search session is a set of events initiated by the user beginning an input of a query prefix, tracking the user's actions over a rough period of time (e.g., 15 minutes). In one embodiment, process 32_900 records the query prefix sent out, the relevant results that are rendered for the user, if the user engages with any of these render results ("engagement events"), and if the user abandons the rendered results ("abandonment events"). In one embodiment, process 32_900 records if the user engages in alternate search options.

In one embodiment, an engagement event occurs if the user interacts with one of the rendered results presented to the user. For example and in one embodiment, the user could click on a link that is presented for one of the rendered results. In another example, the user could click on the link and spend a time greater than a predetermined time interacting with the object (e.g., a website) referenced by that link (e.g., interacts with the referenced object for more than 60 seconds). In this example, the user may receive results directed towards a query search for the current U.S. President and click on a link that references a web page describing the latest presidential speech. If the user interacts with the website for more than a predetermined time (e.g., 60-90 seconds), process 32_900 would determine that the user engaged with the result represented by that link. Thus, this would be an engagement event for this result. In one embodiment, hovering over a link can be recorded as engagement. In another embodiment, a user can also observe a displayed result for a certain period of time. In this embodiment, depending on the type of result, and the action following the period of time, an action otherwise recorded as abandonment may be recorded as engagement instead, or vice versa. For example and in one embodiment, if a user queries for the "population of china" and is displayed a result, and the user pauses for 10 seconds before deleting the query, this event maybe recorded as an engagement instead of an abandonment event.

In another embodiment, the user may ignore or abandon results rendered for the user. For example and in one embodiment, if a user clicks on a link presented for one of the rendered results, but navigates away from that website within a predetermined time (e.g., less than 60-90 seconds), process 32_900 determines that this is an abandonment event for that result. In one embodiment, there are other types of abandonment events: continuing to type more characters (extending the query prefix); changing focus to another window or application; deleting the query; backspacing one or more characters or otherwise editing the query; engaging with anything other than what was presented as a result can be recorded as an abandonment of that result. In one embodiment, the user's actions are recorded along with time intervals spent by the user, which can change the interpretation of what would otherwise be an abandonment to an engagement or vice versa.

In one embodiment, a user's search session can end after a predetermined time, whether in length of user session, time of inactivity, or some other metric. In response to a search session ending, process 32_900 assembles the collected events for this search session into a feedback package that is sent to the search network. Collecting the feedback is further described in FIG. 32_10 below.

At block 32_904, process 32_900 processes the received feedback that is included in the feedback package. In one embodiment, process 32_900 converts the received feedback package into an entry for a feedback search index. In one embodiment, the feedback search index is a search index that incorporates the users feedback into scoring results. For example and in one embodiment, each engagement events for a (query, result) pair promotes that result for the corresponding query. In this example, if a user engages with a result for a particular query, then a future user may also engagement with this result for the same query. Thus, in one embodiment, the result for this query would be returned and ranked higher for a future user having the same query. Conversely, if a user abandons a result for a particular query, then a future user may also abandon this same result for the same query. Thus, in one embodiment, the result for this query may be returned and ranked lower for a future user having the same query.

In one embodiment, process 32_900 converts the received feedback package into a feedback search index entry that has the format of <query, result, render counts, engagement counts, abandonment counts>, where query is the input query and context information such as, device type, application, locale, and geographic location, result is the render result, render counts is the number of times the result is rendered for that query, engagement counts is the number of times the result is engaged for that query, and abandonment counts is the number of times that result is abandoned. In one embodiment, process 32_900 updates this feedback index entry in the feedback search index. In a further embodiment, each feedback package includes also unique source identifiers that may include user identifiers, device identifiers, or session identifiers, with or without methods to obfuscate identity to preserve privacy, where updating the feedback index entry append to the index in the form of a citation index, with the unique source identifiers being the source of the feedback citations. The feedback index can then be queried to provide results and weightings that are personalized or customized to individuals or groups of users. Processing the received feedback is further described in FIG. 32_11 below.

Process 32_900 updates a results cache at block 32_906. In one embodiment, the results cache is a cache that maps queries to results, which can be used to quickly return results for a user query. In one embodiment, the results cache is stored in an edge server that is close in proximity to a user's device that can be used to serve one or more results prior to performing a query search (e.g., an edge server that is geographically closer to the client than other edge servers). In one embodiment, process 32_900 updates the results by running a set of queries using the updated feedback search index to determine a set of results for these queries. The updated results are sent to each of the results caches stored on the edge servers. Updating the results cache is further described in FIG. 32_12 below.

FIG. 32_10 is a flow chart of one embodiment of a process 32_1000 to collect user feedback during a user search session. In one embodiment, process 32_1000 is performed by a collect feedback module to collect user feedback during a user search session, such as the collect feedback module 32_838 as described in FIG. 32_8 above. In FIG. 32_10, process 32_1000 begins by detecting (32_1002) an event that triggers the feedback collection. In one embodiment, the initial event can be start of an input for the query prefix string, of another type of event. In one embodiment, if the user has participated in a previous search session over a period of time (e.g., 15 minutes), this start of an input for the query prefix string marks the start of a new user search session and starts the recording of the user feedback. As described above, a search session is a set of events initiated by the user beginning an input of a query prefix, tracking the user's actions over a rough period of time (e.g., 15 minutes).

At block 32_1004, process 32_1000 records the events associated with the user search session. In one embodiment, process 32_1000 records render, engagement, and abandonment events. In one embodiment, a render event is the relevant results that are rendered for the user in response to a user entering a query prefix or complete query. In one embodiment, process 32_1000 records the render event by recording the results presented for each query prefix or complete query. In addition, process 32_1000 records engagement events at block 32_1004. In one embodiment, an engagement event is an event that occurs if the user interacts with one of the rendered results presented to the user. For example and in one embodiment, the user could click on a link that is presented for one of the rendered results. In another example, the user could click on the link and spend a time greater than a predetermined time interacting with the object (e.g., a website) referenced by that link (e.g., interacts with the referenced object for more than 60 seconds). In this example, the user may receive results directed towards a query search for the current U.S. President and click on a link that references a web page describing the latest presidential speech. If the user interacts with the website for more than a predetermined time (e.g., 60-90 seconds), process 32_1000 would determine that the user engaged with the result represented by that link. Thus, this would be an engagement event for this result.

In a further embodiment, process 32_1000 can record abandonment events, where an abandonment event is an event where the user may ignore or abandon results rendered for the user. For example and in one embodiment, if a user clicks on a link presented for one of the rendered results, but navigates away from that website within a predetermined time (e.g., less than 60-90 seconds), process 32_900 determines that this is an abandonment event for that result. In one embodiment, a user navigates away by closing a tab or window presenting the website, changing focus to another application, or some other action that indicates that the user is not interacting with the presented website.

At block 32_1006, process 32_1000 creates a feedback package from the recorded events of the user's search session. In one embodiment, a user's search session ends by based on a predetermined time since the initial search session event (e.g., 15 minutes) or can be a predetermined time of user inactivity with regards to the user search session. For example and in one embodiment, if the user has no activity or is not interacting with the results or other types of objects referenced by one of the results over a predetermined amount of time (e.g., 10 minutes), the user's search session would end. In one embodiment, in response to the ending of a user's search session, process 32_1000 would collect the recorded events and create a feedback package from this user search session. In one embodiment, the feedback package includes a set of results rendered for the user, the queries associated with those results, the engagement events where the user engaged a results of a query, and the abandonment events where the user abandoned results rendered for the user, where each of the abandoned events is associated with a query. Process 32_1000 sends this feedback package to the search network at block 32_1008. In one embodiment, the client sends the feedback package to an edge server, where the edge server forwards the feedback package to the core server for processing.

FIG. 32_11 is a flow chart of one embodiment of a process 32_1100 to incorporate user feedback during into a feedback index. In one embodiment, the process feedback module performs process feedback module, such as the process feedback module 32_840 as described in FIG. 32_8 above. In FIG. 32_11, process 32_1100 begins by receiving the feedback package at block 32_1102. In one embodiment, the feedback package is the feedback package of a user's search session as described in FIG. 32_10 above. At block 32_1104, process 32_1100 converts the feedback package into one or more feedback index entries. In one embodiment, a feedback index entry is the number of events recorded for a particular query, result pair. For example and in one embodiment, a feedback index entry includes <query, result, render counts, engagement counts, abandonment counts>, where query is the input query and context information such as, device type, application, locale, and geographic location, result is the render result, render counts is the number of times the result is rendered for that query, engagement counts is the number of times the result is engaged for that query, and abandonment counts is the number of times that result is abandoned.

At block 32_1106, process 32_1100 inserts the feedback index entry into a feedback index. In one embodiment, a feedback index is a search index that incorporates the user feedback into a search index. In one embodiment, the feedback index is a citation index, where an engagement event is a positive citation for the result and an abandonment event is a negative citation for that result. In one embodiment, a citation search index is described in U.S. patent application Ser. No. 12/628,791, entitled "Ranking and Selecting Entities Based on Calculated Reputation or Influence Scores," filed on Dec. 1, 2009 and is incorporated in this section. In one embodiment, if the there is an entry in the feedback index with the same query, result pair, process 32_1100 updates this entry with the number of event counts.

As described above, the user feedback incorporated the feedback index can be used to update a results cache. FIG. 32_12 is a flow chart of one embodiment of a process 32_1200 to use the user feedback to update a results cache. In one embodiment, an update results module performs process 32_1200 to update a results cache, such as the update results module 32_842 as described in FIG. 32_8 above. In FIG. 32_12, process 32_1200 begins by receiving a results set RS that includes multiple queries (32_1202). In one embodiment, the results set is a map between a set of queries and results. This results set can be used for a result cache to quickly return relevant results for query prefixes as described in FIG. 32_8 above. In one embodiment, the results sets is generated by a search index that does not include user feedback In another embodiment, the results sets is generated by a previous feedback index that incorporates previous user feedback.

At block 32_1204, process 32_1200 runs each query from the results set RS against the current feedback index. Process 32_1200 uses the results from the run queries in block 32_1204 to create an update results set RS' at block 32_1206. In one embodiment, the results set RS' is a feedback weighted results set, where the results for a query that have a greater engagement events are weighted higher in the feedback index and results for that query that have greater abandonment events are weighted lower in the feedback index. For example and in one embodiment, if a query Q in results set RS, would have results ranked as R1, R2, and R3, and in the updated feedback index has the these results for Q as R1 having 20 engagement events and 50 abandonment events, R2 having 32_100 engagement events and 2 abandonment events, and R3 having 50 engagement events and 10 abandonment events, running the query Q against the updated feedback index may return the ranked results as R2, R3, and R1. Thus, in one embodiment, using the feedback index will alter the ranking of the results in the updated results set RS'. In another embodiment, the relevant results filter may have a rule that for a result to be presented, the result may need at x number of engagement events or no more than y abandonment events. Thus, in this embodiment, using the feedback index may alter which results are presents and which are not. Process 32_1200 sends the updated results set RS' to each of the edge servers at block 32_1208. In one embodiment, process 32_1200 sends the updated results set RS' from the core server 32_816 to the edge server 32_804 as described in FIG. 32_8 above.

FIG. 32_13 is a block diagram of one embodiment of a federator 32_824 that performs a multi-domain search using a characterized query completion. In one embodiment, the federator includes completions module 32_1304, blender/ranker 32_1306, multiple search domains 32_1308A-F, and vocabulary service 32_1302. In one embodiment, the completions module 32_1304 determines the query completions for each of the query prefixes as described in FIG. 32_6 above. The determined query completions are forwarded to the blender/ranker 32_1306, which uses the query completions to perform a multi-domain search for relevant results 32_1314 using search domains 32_1308A-F as described in FIG. 32_7 above. In one embodiment, the search domains 32_1308A-F are the search domains as described in FIG. 32_3 above. For example and in one embodiment, the maps search domain 32_1308A is search domain that includes information related to a geographical map as described in FIG. 32_3 above. The maps search domain 32_1308A queries information from a maps data source 32_1310A. The media search domain 32_1308B is a search domain related to media as described in FIG. 32_3 above. The media search domain 32_1308B queries information from a media data source 32_1310B. The wiki search domain 32_1308C is an online encyclopedia search domain as described in FIG.

32_3 above. The wiki search domain 32_1308C queries information from a wiki data source 32_1310C. The sites search domain 32_1308D is a search domain of websites as described in FIG. 32_3 above. The sites search domain 32_1308D queries information from a sites data source 32_1310D. The other search domain is a set of other search domains that can be accessed by the blender/ranker 32_1306 as described in FIG. 32_3 above. The other search domain 32_1308E queries information from other data source(s) 32_1310E. In one embodiment, the feedback search domain 32_1308F a search index that is based on query feedback collected by browsers running on various devices as described in FIG. 32_3. The feedback search domain 32_1308 queries information from the feedback data source 32_1310F (e.g., the feedback search index).

In addition, the blender/ranker 32_1306 receives the results from the multiple search domains 32_1308A-F and ranks these results. In one embodiment, the blender/ranker 32_1306 characterizes each of the query completions using a vocabulary service 32_1302 that determines what type of search is being performed. For example and in one embodiment, the vocabulary service 32_1302 can determine if the search is for a person, place, thing, etc. In one embodiment, the vocabulary service 32_1302 uses a knowledge base 32_1312 that maps words or phrases to a category. In this embodiment, characterizing the query completion is used to weight results returned by the search domains 32_1308A-F. For example and in one embodiment, if the query completion is characterized to be a search for a place, the results from the maps search domain can be ranked higher as well as a wiki entry about this place. As a further example, if the query completion is indicated to be about an artist, the media search domain results can be ranked higher. Weighting the results is further described in FIG. 32_14 below.

FIG. 32_14 is a flow chart of one embodiment of a process 32_1400 to determine relevant results using a vocabulary service for the query completion. In one embodiment, the blender/ranker 32_1306 performs process 32_1400 to determine relevant results using a vocabulary service for the query completion as described in FIG. 32_13 above. In FIG. 32_14, process 32_1400 begins by receiving query completions at block 32_1402. In one embodiment, the received query completions are the completions determined by process 32_600 in response to receiving a query prefix. In one embodiment, process 32_1400 performs blocks 32_1404 and 32_1408 in one parallel stream and blocks 32_1406 and 32_1410 in another parallel stream. At block 32_1404, process 32_1400 sends the query completions to the different search domains to determine possible relevant results. In one embodiment, each of the search domains uses the received query completions to determine relevant results for that search domain. In one embodiment, the multiple search domain process each of the query completions in parallel. Process 32_1400 sends the query completion(s) to the vocabulary service to characterize each of the completion(s) at block 32_1406. In one embodiment, the vocabulary service characterizes each of the query completion(s) by determining if the query completion(s) is a query about a person, place, thing, or another type of information. Characterizing the query completion(s) is further described in FIG. 32_15 below. Process 32_1400 receives the search results from the multiple search domains at block 32_1408. In one embodiment, each of the search results includes a set of scores that characterizes that result from the corresponding search domain.

At block 32_1410, process 32_1400 receives the vocabulary search results characterizing the query completion(s). In one embodiment, the characterization of the query completion(s) indicates the type of information that each query completion is searching for. For example and in one embodiment, the query completion(s) is a query about a person, place, thing, or another type of information. In one embodiment, the two parallel streams converge at block 32_1412. Process 32_1400 uses the query completion characterization to rank and filter the relevant results for that query completion at block 32_1412. In one embodiment, if the query completion is indicated to be a search for a person, the results from the wiki domain regarding a person results from the search may be ranked higher. For example and in one embodiment, if the query completion is characterized as searching for a movie, the results from reviews or local show times of that movie can be ranked higher. As another example, if the query completion is indicated to be a place, the results from the maps search domain can be ranked higher as well as a wiki entry about this place. As a further example, if the query completion is indicated to be about an artist, the media search domain results can be ranked higher. Ranking using query completion is also described in FIG. 32_7 above. In another embodiment, the feedback index can be a signal domain that is used to rank and/or filter the relevant results. In this embodiment, process 32_1400 uses the number of engagement events to rank higher a result and uses the number of abandonment events to rank lower a result. In one embodiment, process 32_1400 additionally ranks and filters the results as described in FIG. 32_7, block 32_708 above. Process 32_1400 returns the ranked, filtered results at block 32_1414.

As described above, process 32_1400 uses a vocabulary service to characterize a query completion. FIG. 32_15 is a flow chart of one embodiment of a process 32_1500 to characterize a query completion. In FIG. 32_15, process 32_1500 receives the query completion(s) at block 32_1502. At block 32_1504, process 32_1500 tokenizes each query completion. In one embodiment, tokenizing a completion is separating the query completion into separate tokens (e.g., words, phrases, plural/singular variations). For the tokenized query completion, process 32_1500 determines (at block 32_1506) a match for the tokenized completion in a knowledge base. In one embodiment, the knowledge base is a database of words or phrases mapped to a category. For example and in one embodiment, the knowledge base can include entries such as {Eiffel Tower→place}, {Michael Jackson→artist}, {Barack Obama→president}, {Black Widow→spider}, etc. In one embodiment, the knowledge base is built using an ontology. In one embodiment, process 32_1500 uses a term frequency matching algorithm to determine a match of the query completion in the knowledge base. For example and in one embodiment, if the query completion is "Who is Michael Jackson?" process 32_1500 can match on the terms "Michael," "Jackson," or "Michael Jackson". In this example, process 32_1500 would try to find the longest match in the knowledge database. If the knowledge base has matches for "Michael," "Jackson," and "Michael Jackson," the match for "Michael Jackson" would be used. If there is a match for one or more of the query completions, process 32_1500 returns the match(es) at block 32_1508. For example and in one embodiment, process 32_1500 can return "person," "artist," or another type of characterization for the query completion "Who is Michael Jackson?" If there are no matches, process 32_1500 returns with no characterizations at block 32_1510.

FIG. 32_16 is a block diagram of one embodiment of a completion module 32_1600 to determine query completions from multiple search domains. In one embodiment, the completion module 32_1600 includes receive query prefix module 32_1602, send prefix module 32_1604, receive completion module 32_1606, rank & filter completions module 32_1608, and send completions module 32_1610. In one embodiment, the receive query prefix module 32_1602 receives the query prefixes as described in FIG. 32_6, block 32_602 above. The send prefix module 32_1604 sends the query prefixes to the different search domains as described in FIG. 32_6, block 32_604 above. The receive completion module 32_1606 receives the query completion as described in FIG. 32_6, block 32_606 above. The rank & filter completions module 32_1608 ranks and filters the received query completions as described in FIG. 32_6, block 32_608 above. The send completions module 32_1610 sends the query completions to the relevant results module as described in FIG. 32_6, block 32_610 above.

FIG. 32_17 is a block diagram of one embodiment of a results module 32_1700 to determine relevant results over multiple search domains from a determined query completion. In one embodiment, the results module 32_1700 includes a receive query completions module 32_1702, send completions module 32_1704, receive query results module 32_1706, rank and filter module 32_1708, and return results module 32_1710. In one embodiment, the receive query completions module 32_1702 receives the query completions as described in FIG. 32_7, block 32_702 above. The send completions module 32_1704 sends the completions to the multiple search domains as described in FIG. 32_7, block 32_704 above. The receive query results module 32_1706 receives the query results from the multiple search domains as described in FIG. 32_7, block 32_706 above. The rank and filter module 32_1708 ranks and filters the query results as described in FIG. 32_7, block 32_708 above. The return results module 32_1710 returns the query results as described in FIG. 32_7, block 32_710 above.

FIG. 32_18 is a block diagram of one embodiment of a collect feedback module 32_838 to collect user feedback during a user search session. In one embodiment, the collect feedback module 32_838 includes a detect render event module 32_1802, record events module 32_1804, create feedback package module 32_1806, and send feedback module 32_1808. In one embodiment, the detect initial event module 32_1802 detects an initial event to start a user search session as described in FIG. 32_10, block 32_1002 above. The record events module 32_1804 records the events during the user search session as described in FIG. 32_10, block 32_1004 above. The create feedback package module 32_1806 create a feedback package as described in FIG. 32_10, block 32_1006 above. The send feedback module 32_1808 sends the feedback package as described in FIG. 32_10, block 32_1008 above.

FIG. 32_19 is a block diagram of one embodiment of a process feedback module 32_840 to incorporate user feedback during into a feedback index. In one embodiment, the process feedback module 32_840 includes a receive feedback package module 32_1902, convert feedback package module 32_1904, and insert feedback entry module 32_1906. In one embodiment, the receive feedback package module 32_1902 receives the feedback module as described in FIG. 32_11, block 32_1102. The convert feedback package module 32_1904 converts the feedback package as described in FIG. 32_11, block 32_1104. The insert feedback entry module 32_1906 insert a feedback index entry as described in FIG. 32_11, block 32_1106.

FIG. 32_20 is a block diagram of one embodiment of an update query results module 32_842 to use the user feedback to update a results cache. In one embodiment, the update results cache 32_842 includes a receive results set module 32_2002, run query module, 32_2004, update results set module 32_2006, and send updated results module 32_2008. In one embodiment, the receive results set module 32_2002 receives the results set as described in FIG. 32_12, block 32_1202. The run query module 32_2004 runs the queries using the feedback index as described in FIG. 32_12, block 32_1204. The update results set module 32_2006 updates the results set as described in FIG. 32_12, block 32_1206. The send updated results module 32_2008 sends the updated results set as described in FIG. 32_12, block 32_1202.

FIG. 32_21 is a block diagram of one embodiment of a relevant results module 32_2100 to determine relevant results using a vocabulary service for the query completion. In one embodiment, the relevant results module 32_2100 includes a receive completions module 32_2102, send completions module 32_2104, vocabulary completion module 32_2106, receive results module 32_2108, receive vocabulary results module 32_2110, rank results module 32_2112, and return results module 32_2114. In one embodiment, the receive completions module 32_2102 receives the query completions as described in FIG. 32_14, block 32_1402. The send completions module 32_2104 sends the query completions to the multiple search domains receives the query completions as described in FIG. 32_14, block 32_1404. The vocabulary completion module 32_2106 sends the query completions to the vocabulary service as described in FIG. 32_14, block 32_1406. The receive results module 32_2108 receives the query results from the multiple search domains as described in FIG. 32_14, block 32_1408. The receive vocabulary results module 32_2110 receives the vocabulary service characterization as described in FIG. 32_14, block 32_1410. The rank results module 32_2112 ranks the search domain results as described in FIG. 32_14, block 32_1412. The return results module 32_2114 returns the ranks results as described in FIG. 32_14, block 32_1414.

FIG. 32_22 is a block diagram of one embodiment of a characterize query module 32_2200 to characterize a query completion. In one embodiment, the characterize query results module 32_2200 includes a receive completions module 32_2202, tokenize completions module 32_2204, find match module 32_2206, and return characterization module 32_2208. In one embodiment, the receive completions module 32_2202 receives the completions as described in FIG. 32_15, block 32_1502 above. The tokenize completions module 32_2204 tokenizes the completions as described in FIG. 32_15, block 32_1504 above. The find match module 32_2206 find a match for the tokenized completion in the knowledge base as described in FIG. 32_15, block 32_1506 above. The return characterization module 32_2208 returns the characterization as described in FIG. 32_15, block 32_1508 above.

In some embodiments, device 100 (described above in reference to FIG. 1A) is used to implement the techniques described in this section.

Example Devices, Methods, and Computer-Readable Media for Search Techniques

In one aspect, a method and apparatus of a device that performs a multi-domain query search is described. In an exemplary embodiment, the device receives a query prefix from a client of a user. The device further determines a plurality of search completions across the plurality of separate search domains. In addition, the device ranks the plurality of search completions based on a score calculated for each of the plurality of search completions determined by a corresponding search domain, where at least one of the plurality of search completions is used to generate a plurality of search results without an indication from the user and in response to receiving the query prefix.

In some embodiments, a non-transitory machine-readable medium is provided that has executable instructions to cause one or more processing units to perform a method to generate a plurality of ranked completions using a query prefix over a plurality of separate search domains, the method comprising: receiving the query prefix from a client of a user; determining a plurality of search completions across the plurality of separate search domains; and ranking the plurality of search completions based on a score calculated for each of the plurality of search completions determined by a corresponding search domain, wherein at least one of the plurality of search completions is used to generate a plurality of search results without an indication from the user and in response to receiving the query prefix.

In some embodiments, the method includes: filtering the plurality of search completions. In some embodiments, the each of the plurality of separate search domains is selected from the group consisting of maps search domain, media store search domain, online encyclopedia search domain, and sites search domain. In some embodiments, the score for one of the plurality of search completions is a raw score of that search completion that is the frequency of times this search completion has been received. In some embodiments, the score for one of the plurality of search completions is a local score for that search completion that is based on this search completion raw score and a number of possible other search completions using this search completion as a prefix. In some embodiments, the score for one of the plurality search completions is a global score for that search completion that is based on this search completion raw score and a number of possible other search completions in the search domain. In some embodiments, query prefix includes an input string and a context, and the input string is input by the user. In some embodiments, the context includes a location, a device type, an application identifier, and a locale.

In some embodiments, a method is provided to generate a plurality of ranked completions using a query prefix over a plurality of separate search domains, the method comprising: receiving the query prefix from a client of a user; determining a plurality of search completions across the plurality of separate search domains; and ranking the plurality of search completions based on a score calculated for each of the plurality of search completions determined by a corresponding search domain, wherein at least one of the plurality of search completions is used to generate a plurality of search results without an indication from the user and in response to receiving the query prefix. In some embodiments, the method includes: filtering the plurality of search completions. In some embodiments, the each of the plurality of separate search domains is selected from the group consisting of maps search domain, media store search domain, online encyclopedia search domain, and sites search domain. In some embodiments, the score for one of the plurality of search completions is a raw score of that search completion that is the frequency of times this search completion has been received. In some embodiments, the score for one of the plurality of search completions is a local score for that search completion that is based on this search completion raw score and a number of possible other search completions using this search completion as a prefix. In some embodiments, the score for one of the plurality search completions is a global score for that search completion that is based on this search completion raw score and a number of possible other search completions in the search domain. In some embodiments, query prefix includes an input string and a context, and the input string is input by the user. In some embodiments, the context includes a location, a device type, an application identifier, and a locale.

In some embodiments, a device is provided to generate a plurality of ranked completions using a query prefix over a plurality of separate search domains, the device comprising: a processor; a memory coupled to the processor though a bus; and a process executed from the memory by the processor that causes the processor to receive the query prefix from a client of a user, determine a plurality of search completions across the plurality of separate search domains, and ranking the plurality of search completions based on a score calculated for each of the plurality of search completions determined by a corresponding search domain, wherein at least one of the plurality of search completions is used to generate a plurality of search results without an indication from the user and in response to receiving the query prefix. In some embodiments, the process further causes the processor to filter the plurality of search completions. In some embodiments, the each of the plurality of separate search domains is selected from the group consisting of maps search domain, media store search domain, online encyclopedia search domain, and sites search domain. In some embodiments, the score for one of the plurality of search completions is a raw score of that search completion that is the frequency of times this search completion has been received.

In another aspect, a method and apparatus is provided that generates a results cache using feedback from a user's search session. In this embodiment, the device receives a feedback package from a client, where the feedback package characterizes a user interaction with a plurality of query results in the search session that are presented to a user in response to a query prefix entered by the user. The device further generates a plurality of results for a plurality of queries by, running the plurality of queries using the search feedback index to arrive at the plurality of results. In addition, the device creates a results cache from the plurality of results, where the results cache maps the plurality of results to the plurality of queries and the results cache is used to serve query results to a client.

In some embodiments, a non-transitory machine-readable medium is provided that has executable instructions to cause one or more processing units to perform a method to generate a results cache using feedback from a search session, the method comprising: receiving a feedback package from a client, wherein the feedback package characterizes a user interaction with a plurality of query results in the search session that are presented to a user in response to a query prefix entered by the user; adding an entry in a search feedback index using the feedback package; generating a plurality of results for a plurality of queries by, running the plurality of queries using the search feedback index to arrive at the plurality of results; and creating the results cache from the plurality of results, wherein the results cache maps the plurality of results to the plurality of queries and the results cache is used to serve query results to a client. In some embodiments, the feedback package includes a query prefix, the plurality of query results, and a plurality of events that were recorded during the user interaction. In some embodiments, the plurality of events includes a render event that is an event in which results from the query prefix are displayed for the user. In some embodiments, the plurality of events includes an engagement event for one of the query results that is an event indicating the user has engaged with that query result. In some embodiments, the engagement event for that query result is a click on a link for the query result. In some embodiments, the plurality of events includes an abandonment event for one of the query results that is an event indicating the user abandoned that query result. In some embodiments, the results cache is a cache used by clients to return query results for query requests. In some embodiments, the feedback index entry includes the query prefix, a result for the query prefix, and a set of events for that result.

In some embodiments, a method is provided to generate a results cache using feedback from a search session, the method comprising: receiving a feedback package from a client, wherein the feedback package characterizes a user interaction with a plurality of query results in the search session that are presented to a user in response to a query prefix entered by the user; adding an entry in a search feedback index using the feedback package; generating a plurality of results for a plurality of queries by, running the plurality of queries using the search feedback index to arrive at the plurality of results; and creating the results cache from the plurality of results, wherein the results cache maps the plurality of results to the plurality of queries and the results cache is used to serve query results to a client. In some embodiments, the feedback package includes a query prefix, the plurality of query results, and a plurality of events that were recorded during the user interaction. In some embodiments, the plurality of events includes a render event that is an event in which results from the query prefix are displayed for the user. In some embodiments, the plurality of events includes an engagement event for one of the query results that is an event indicating the user has engaged with that query result. In some embodiments, the engagement event for that query result is a click on a link for the query result. In some embodiments, the plurality of events includes an abandonment event for one of the query results that is an event indicating the user abandoned that query result. In some embodiments, the results cache is a cache used by clients to return query results for query requests. In some embodiments, the feedback index entry includes the query prefix, a result for the query prefix, and a set of events for that result.

In some embodiments, a device is provided to generate a results cache using feedback from a search session, the device comprising: a processor; a memory coupled to the processor though a bus; and a process executed from the memory by the processor that causes the processor adding an entry in a search feedback index using the feedback package, generate a plurality of results for a plurality of queries by running the plurality of queries using the search feedback index to arrive at the plurality of results, and create the results cache from the plurality of results, wherein the results cache maps the plurality of results to the plurality of queries and the results cache is used to serve query results to a client. In some embodiments, the feedback package includes a query prefix, the plurality of query results, and a plurality of events that were recorded during the user interaction. In some embodiments, the plurality of events includes a render event that is an event in which results from the query prefix are displayed for the user. In some embodiments, the plurality of events includes an engagement event for one of the query results that is an event indicating the user has engaged with that query result.

In still one more aspect, a method and apparatus is provided that generates a plurality of ranked query results from a query over a plurality of separate search domains. In this embodiment, the device receives the query and determines a plurality of results across the plurality of separate search domains using the query. The device further characterizes the query. In addition, the device ranks the plurality of results based on a score calculated for each of the plurality of results determined by a corresponding search domain and the query characterization, where the query characterization indicates a query type.

In some embodiments, a non-transitory machine-readable medium is provided that has executable instructions to cause one or more processing units to perform a method to generate a plurality of ranked query results from a query over a plurality of separate search domains, the method comprising: receiving the query; determining a plurality of results across the plurality of separate search domains using the query; characterizing the query; ranking the plurality of query results based on a score calculated for each of the plurality of results determined by a corresponding search domain and the query characterization, wherein the query characterization indicates a query type. In some embodiments, the query type is selected from the group of a person, place, and thing. In some embodiments, the method includes: filtering the plurality of search results. In some embodiments, the each of the plurality of separate search domains is selected from the group consisting of maps search domain, media store search domain, online encyclopedia search domain, and sites search domain. In some embodiments, the characterizing the query comprises: tokenizing the query; and finding a match for the tokenized query in a knowledge base. In some embodiments, the finding a match comprises: finding a longest match among the tokens in the query. In some embodiments, the tokenizing the query comprises: separating the query into tokens. In some embodiments, the token is selected for the group consisting of a word and a phrase. In some embodiments, query is a query completion that is completed from a query prefix without an indication from the user as to which query completion to use.

In some embodiments, a method is provided to generate a plurality of ranked query results from a query over a plurality of separate search domains, the method comprising: receiving the query; determining a plurality of results across the plurality of separate search domains using the query; characterizing the query; ranking the plurality of query results based on a score calculated for each of the plurality of results determined by a corresponding search domain and the query characterization, wherein the query characterization indicates a query type. In some embodiments, the query type is selected from the group of a person, place, and thing. In some embodiments, the method includes: filtering the plurality of search results. In some embodiments, the each of the plurality of separate search domains is selected from the group consisting of maps search domain, media store search domain, online encyclopedia search domain, and sites search domain. In some embodiments, the characterizing the query comprises: tokenizing the query; and finding a match for the tokenized query in a knowledge base. In some embodiments, the finding a match comprises: finding a longest match among the tokens in the query. In some embodiments, the tokenizing the query comprises: separating the query into tokens. In some embodiments, query is a query completion that is completed from a query prefix without an indication from the user as to which query completion to use.

In some embodiments a device is provided to generate a plurality of ranked query results from a query over a plurality of separate search domains, the device comprising:

a processor; a memory coupled to the processor though a bus; and a process executed from the memory by the processor that causes the processor to receive the query, determine a plurality of results across the plurality of separate search domains using the query, characterize the query, and rank the plurality of query results based on a score calculated for each of the plurality of results determined by a corresponding search domain and the query characterization, wherein the query characterization indicates a query type. In some embodiments, the query type is selected from the group of a person, place, and thing. In some embodiments, the process further causes the processor to filter the plurality of search results.

Section 3: Multi-Domain Searching Techniques

The material in this section "Multi-Domain Searching Techniques" describes multi-domain searching on a computing device, in accordance with some embodiments, and provides information that supplements the disclosure provided herein. For example, portions of this section describe improving search results obtained from one or more domains utilizing local learning on a computer device, which supplements the disclosures provided herein, e.g., those related to FIGS. 4A-4B, FIG. 5, and others related to recognizing and using patterns of user behavior. In some embodiments, the details in this section are used to help improve search results that are presented in a search interface (e.g., as discussed above in reference to methods 600, 800, 1000, and 1200).

Brief Summary for Multi-Domain Searching Techniques

Embodiments are described for improving search results returned to a user from a local database of private information and results returned from one or more search domains, utilizing query and results features learned locally on the user's computing device. In one embodiment, one or more search domains can inform a computing device of one or more features related to a search query, upon which the computing device can apply local learning.

In one embodiment, a computing device can learn one or more features related to a search query using information obtained from the computing device. Information obtained from, and by, the computing device can be used locally on the computing device to train a machine learning algorithm to learn a feature related to a search query or a feature related to the results returned from the search query. The feature can be sent to a remote search engine to return more relevant, personalized results for the query, without violating the privacy of a user of the device. In one embodiment, the feature is used to extend the query. In an embodiment, the feature is used to bias a term of the query. The feature can also be used to filter results returned from the search query. Results returned from the query can be local results, remote search engine results, or both.

In an example, a user of a computing device may subscribe to a news, or RSS, feed that pushes daily information about sports scores to the computing device. The only information that the news or RSS feed knows about the subscribing user is that the user is interested in sports scores. The user can query the information received by the computing device, from the RSS feed, for "football scores" using a local query interface on the computing device. To an American user, football means American football as played by, for example, the Dallas Cowboys. To a European or South American user, football often refers to what Americans call soccer. Thus, the distinction of "soccer" v. "football," with reference to the query term "football," can be a feature related to a search query that the computing device can train upon. If the user of the computing device interacts with local results for soccer scores, a local predictor for the news or RSS feed can learn that when the user of this device queries for football scores, this user means soccer scores.

In one embodiment, a remote search engine can learn the feature "football v. soccer." But, while the remote search engine can learn that a clear distinction exists between American football and soccer, the remote search engine does not know whether a particular user querying for football scores is interested in results about American football or soccer. Once the remote search engine learns of the distinction, the next time the remote search service receives a query about football scores, the remote search engine can return both American football scores and soccer scores, and also send a feature to the querying computing device to train upon so that the computing device can learn whether the particular user of the computing device is interested in American football scores or soccer scores.

In one embodiment, after the local client learns on the feature utilizing information that is private to the computing device, the next time that a user of the computing device queries a remote search service for football scores, the computing device can send a bias for the feature to the remote search service along with the query. For example, the bias can indicate whether this particular user is interested in American football or soccer.

In an embodiment, the computing device can learn on a feature using statistical analysis method of one of: linear regression, Bayes classification, or Naive Bayes classification.

Some embodiments include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code.

At least certain embodiments include an environment with a calling software component interacting with a called software component through an APL A method for operating through an API in this environment includes transferring one or more function calls, messages, other types of invocations or parameters via the APL Other features and advantages will be apparent from the accompanying drawings and from the detailed description.

Detailed Description for Multi-Domain Searching Techniques

In the following detailed description of embodiments, reference is made to the accompanying drawings in which like references indicate similar elements, and in which is shown by way of illustration manners in which specific embodiments may be practiced. These embodiments are described in sufficient detail to enable those skilled in the art to practice the invention, and it is to be understood that other embodiments may be utilized and that logical, mechanical, electrical, functional and other changes may be made without departing from the scope of the present disclosure. The following detailed description is, therefore, not to be taken in a limiting sense, and the scope of the present invention is defined only by the appended claims.

Embodiments are described for using locally available information on a computing device to learn query and results features that improve both local and remote search results for a user of the computing device, without disclosing private information about the user to a remote search engine.

FIG. 33_1 illustrates a block diagram of a local search subsystem 33_130 and a remote search subsystem 33_135 on a computing device 33_100, as is known in the prior art. The local search subsystem 33_130 can include a local search interface 33_110 in communication with a local database 33_111 of searchable information.

The local database 33_111 indexes local information on the computing device 33_100 for searching using the local search interface 33_110. Local information is private to a computing device 33_100 and is not shared with the remote search subsystem 33_135. Local information can include data, metadata, and other information about applications 33_112 and data 33_113 on the computing device 33_100.

The local database 33_111, applications 33_112 and data 33_113 are not accessible by the remote search subsystem 33_135. Queries entered into the local search interface 33_110, local results returned from the local query, and a user's interaction with the local results returned from the local query are not shared with, or accessible by, the remote search subsystem 33_135.

The local search interface 33_110 can communicate with the local database 33_111 via communication interface 33_1. The local database can communication with applications 33_112 and data 33_113 via communication interface 33_3.

A remote search subsystem 33_135 can include a remote search interface 33_120 and a remote query service 33_121. The remote query service 33_121 can send a query to, and return results from, a remote search engine 33_150 via network service 33_122 and network 33_140. The remote results are not made available to the local search subsystem 33_130.

The remote search interface 33_120 can communicate with the remote query service 33_121 via interface 33_2. The remote query service 33_121 can communicate with the network service 33_122 via interface 33_4.

FIG. 33_2 illustrates, in block diagram form, a local search subsystem 33_130 having local learning system 33_116 that can be used to improve the search results returned from both local searches and searches of remote search engine 33_150, without exposing private information. In one embodiment, the local learning system 33_116 can be reset so that learning is flushed.

The local search subsystem 33_130 can include a local search interface 33_110 and a local database 33_111 of data and metadata about applications 33_112 and data 33_113 on computing device 33_100. Local database 33_111 can include local information about data sources such as a contacts database stored on the client, titles of documents or words in documents stored on the computing device, titles of applications and data and metadata associated with applications on the computing device, such as emails, instant messages, spreadsheets, presentations, databases, music files, pictures, movies, and other data that is local to a computing device. In an embodiment, local database 33_111 can include information about data sources stored in a user's Cloud storage. Applications 33_112 can include a calculator program, a dictionary, a messaging program, an email application, a calendar, a phone, a camera, a word processor, a spreadsheet application, a presentation application, a contacts management application, a map application, a music, video, or media player, local and remote search applications, and other software applications.

A query can be generated using the local search interface 33_110 and query results can be returned from the local database 33_111, via communication interface 33_1, and displayed in the local search interface 33_110. The local search subsystem 33_130 additionally can have a local query service 33_114, a local search and feedback history 33_115, and a local learning system 33_116. The local query service 33_114 can receive a query from local search interface 33_110. In one embodiment, local search interface 33_110 can also pass the query to remote query server 33_121, via communication interface 33_7, so that local search interface 33_110 receives search results from both the local database 33_111 and from remote search engine 33_150. Local query service 33_114 can remove redundant white space, remove high frequency-low relevance query terms, such as "the" and "a," and package the query into a form that is usable by the local database 33_111. Remote query service 33_121 can perform analogous functionality for the remote search engine 33_150. In an embodiment, local search interface 33_110 can pass the query to the remote query service 33_121, via communication interface 33_7, to obtain query results from remote search engine 33_150. In one embodiment, remote query service 33_121 can receive a query feature learned by local learning system 33_116 via communication interface 33_8. The feature can be used to extend the query and/or bias a query feature to the remote search engine 33_150. In an embodiment, remote query service 33_121 can pass a query feature, returned from the remote search engine 33_150, to the local learning system 33_116 for training on that feature via communication interface 33_8.

Local search and feedback history 33_115 can store the history of all search queries issued using the local query interface 33_110, including queries that are sent to the remote query service 33_121 via communication interface 33_7. Local search and feedback history 33_115 can also store user feedback associated with both local and remote results returned from a query. Feedback can include an indication of whether a user engaged with a result, e.g. by clicking-through on the result, how much time the user spent viewing the result, whether the result was the first result that the user interacted with, or other ordinal value, whether result was the only result that a user interacted with, and whether the user did not interact with a result, i.e. abandoned the result. The user feedback can be encoded and stored in association with the query that generated the results for which the feedback was obtained. In one embodiment, the local search and feedback history 33_115 can store a reference to one or more of the results returned by the query. Information stored in the local search and feedback history 33_115 is deemed private user information and is not available to, or accessible by, the remote search subsystem 33_135. In one embodiment, the local search and feedback history 33_115 can be flushed. In an embodiment, local search and feedback history 33_115 can be aged-out. The age-out timing can be analyzed so that stable long term trends are kept longer than search and feedback history showing no stable trend.

Local learning system 33_116 can analyze the local search and feedback history 33_115 to identify features upon which the local learning system 33_116 can train. Once a feature is identified, the local learning system 33_116 can generate a local predictor to train upon the feature. In one embodiment, a predictor is an instance of a software component that operates on one or more pieces of data. In one embodiment, the local predictors can train using a statistical classification method, such as regression, Bayes, or Naive Bayes. In an embodiment, a predictor can be specific to a particular category of results. Categories are discussed more fully below, with respect to operation 33_420 of FIG. 33_4: Blending, ranking, and presenting the results on a local device.

The computing device 33_100 can also include a remote search subsystem 33_135 that includes a remote search interface 33_120 and a remote query service 33_121. A remote search interface 33_120 can include a web browser such as Apple® Safari®, Mozilla®, or Firefox®. A query service 33_121 can perform intermediary processing on a query prior to passing the query to the network service 33_122 and on to the remote search engine 33_150 via network 33_140. Network service 33_122 passes can receive results back from the remote search engine 33_150 for display on the remote query interface 33_120 or on the local search interface 33_110. The remote query service 33_121 can be communicatively coupled to the network service 33_122 via communication interface 33_4.

A network 33_140 can include the Internet, an 802.11 wired or wireless network, a cellular network, a local area network, or any combination of these.

Interfaces 33_1-33_8 can be implemented using inter-process communication, shared memory, sockets, or an Application Programming Interface (API). APIs are described in detail, below, with reference to FIG. 33_7.

FIG. 33_3 illustrates, in block diagram form, a method 33_300 of locally learning a query and results feature utilizing local search queries, local search results and local feedback and search history 33_115 based on the local search results.

In operation 33_305, a user can issue a query utilizing the local query interface 33_110.

In operation 33_310, the local query can be stored in the local search history and feedback history 33_115.

In operation 33_315, local results can be returned from the local database 33_111 to the local search interface 33_110 for display to the user. Local database 33_111 indexes data and metadata 33_113 generated or processed by one or more applications 33_112, such as documents, images, music, audio, video, calculator results, contacts, queries, filenames, file metadata and other data generated by applications 33_112 or associated with data 33_113. In an embodiment, the local database may not return any local results to a query for one or more applications 33_112. For example, if a query for "ham" is entered into the local search interface 33_110 in operation 33_305, then local database 33_111 may return a result from a dictionary application 33_112, from documents 33_113 containing the word "ham," and a contact having the word "ham," such as "Cunningham," but not return a result for a calculator application 33_112 because the calculator application has no data or metadata 33_113 related to "ham." However, if a query for "Pi" is entered in the local search interface 33_110 in operation 33_305, then local database 33_111 may return results related to the calculator application 33_112, such as "3.141592654," the Greek symbol "7t," or formulae that utilize the value of Pi, such as the circumference or area of a circle, or the volume of a sphere or cylinder. Similarly, if a query is entered in the local search interface 33_110 for "Lake Tahoe pictures" in operation 33_305, then the local database 33_111 may return results for pictures of Lake Tahoe that may have been generated by a camera application 33_112, downloaded from an email application 33_112, and/or documents 33_113 that contain pictures of Lake Tahoe generated by a word processing application 33_112. In an embodiment, local results can be categorized for display according to the application 33_112 that acquired or generated the local results. For example, pictures of Lake Tahoe that were downloaded from an email application 33_112 may be categorized together for display, pictures of Lake Tahoe that were generated by the camera application 33_112 may be categorized together for display, and pictures of Lake Tahoe that are incorporated into one or more documents generated by a word processing application 33_112 may be categorized together for display.

In operation 33_320, the user can interact with one or more of the displayed local results. The interaction with, or non-interaction with, the results can be stored as feedback on the local results in the local search and feedback history 33_115.

In operation 33_325, the local leaning system 33_116 can analyze the local search and local feedback history 33_115 to determine one or more features related to the query.

In operation 33_330, if the local learning system 33_116 has identified a new feature, then in operation 33_335 a new local predictor can be generated for the feature and the local learning system 33_116 can train on the identified feature.

In operation 33_340, the next time that a query is issued for which the feature is relevant to the query, the feature can be used to do one or more of: extend the query, bias a term of the query, or filter the results returned from the query.

FIG. 33_4 illustrates, in block diagram form, a method 33_400 of locally learning a query feature utilizing search results returned from both local search queries and remote search queries, and local feedback on both local and remote search query results.

In operation 33_405, a user issues a query using the local search interface 33_110. As described above, the local search interface 33_110 can pass the query to one, or both, of the local database 33_111 and the remote search engine 33_150 via local query service 33_114 or remote query service 33_121, respectively.

In operation 33_410, the query can be stored in the local search history and feedback history 33_115.

As shown in operations 33_315 and 33_415, local results from local database 33_111 and remote results from remote search engine 33_150, respectively, may return at the same time, or asynchronously. In one embodiment, a time 33_417 can be set to determine when to display the results that have been received up to the expiration of the timer. In an embodiment, additional results can be received after the expiration of the timer. The time value can be configured locally on the computing device 33_100, or on the remote search engine 33_150, or on both such that local and remote search results are displayed at different times.

In operation 33_420, the local search results and the remote results can be blended and ranked, then presented to the user on the local search interface 33_110. In one embodiment, if the local learning system 33_116 determines that a calculator result is highly relevant, then it is ranked toward the top. A calculator result may be highly relevant if the user issued a query from within the calculator application and the query "looks" like a computation or a unit conversion. In an embodiment, local results 33_315 matching the query can be ranked higher than remote search engine results 33_415. In an embodiment, results can be ranked and/or filtered utilizing a previously learned feature. In an embodiment, local results 33_315 can be presented in categories, such as emails, contacts, iTunes, movies, Tweets, text messages, documents, images, spreadsheets, et al. and ordered within each category. For example, local results can be presented within categories, ordered by the most recently created, modified, accessed, or viewed local results 33_315 being displayed first in each category. In another embodiment, categories can be ordered by context. For example, if a user issues a local query from within his music player application 33_112, then results returned from the local database 33_111 that are related to the music player application 33_112 can be categorized and displayed before other local results. In yet another embodiment, categories can be ordered by the frequency that a user interacts with results from a category. For example, if a user rarely interacts with email results, then email results can be categorized and displayed lower than other local results. In an embodiment, the display order of local categories is fixed. This can facilitate easy identification for a user, since local result categories rarely change. In another embodiment, categories can be displayed according to a relevance ranking order, and the results within each category can be displayed by relevance ranking order.

In one embodiment, results 33_415 returned from the remote search engine can include a score based on at least one of: whether the a query term is equal to the title of the result, whether a query term is within the title of the result, whether a query term is within the body of the result, or based on the term frequency-inverse document frequency of one or more query terms. Additionally, remote search engine search results 33_415 may have a query-dependent engagement scores indicating whether other users that have issued this query have engaged with the result, indicating that users found the result relevant to the query. A result may also have a query-independent engagement score indicating whether other users have engaged with the result, meaning that other users found the result relevant regardless of the query used to retrieve the result. A result may also have a "top-hit" score, indicating that so many users found the result to be relevant that the result should be ranked toward the top of a results set. In one embodiment, the local learning system 33_116 can generate, for each result, a probability that this user of this computing device 33_110 will likely also find the result relevant.

In operation 33_425, the local search interface can receive feedback from the user indicating whether a user has engaged with a result, and if so, how long has the user engaged with the result, or whether the user has abandoned the result. The user feedback can be collected and stored in the local search and feedback history 33_115, regardless of whether a result is a local database result or a remote search engine result. The query can also be stored in the local search and feedback history 33_115. In one embodiment, the query and the feedback history can be associated with a particular user of the computing device 33_100. In an embodiment, the query, feedback history 33_115, and association with a particular user, can be used by the local learning 33_116 to generate a social graph for the particular user.

For example, suppose that a particular user, Bob, issues one or more queries to the local device and remote search engine in operation 33_405 for "Bill" and "Steven." Local results 33_315 may be received from, e.g., a contacts application 33_112 and remote results 33_415 may be returned for, e.g., LinkedIn® profiles of persons named Bill and Steven, as well as other remote results 33_415. After the results are blended, ranked, and presented to the user Bob in operation 420, then the search query and feedback history 33_115 of Bob's interaction with the local results 33_315, the remote results 33_415, or both, can be stored in operation 33_425. From this stored search history and feedback 33_115, a social graph can be generated by local learning system 33_116 from Bob's interaction with local results 33_315, remote results 33_415, or both.

In an embodiment, local learning on remote results can also be used to filter out results that the user has repeatedly been presented, but the user has not interacted with. For example, a user may issue a query to the local device and remote search engine 33_150 for a current political topic in operation 33_405. The remote results 33_415 returned in response to the query may include results from The Huffington Post® and Fox News®. In operation 33_425, the learning system 33_116 can learn from the locally stored feedback on any/all results that the user rarely, or never, interacts with Fox News®" results. The learning system 33_116 can determine a new feature to train upon, "News Source," and learn to exclude Fox News® results from future remote results when blending, ranking, and presenting results on the local device in operation 33_420.

In operation 33_430, feedback history of only the remote search engine results can be returned to the remote search engine 33_150. The feedback history can be anonymized so that a particular user and/or machine is not identified in the information sent to the remote search engine 33_150. In one embodiment, the query associated with the anonymized feedback is not sent to the remote search engine, to preserve user privacy.

In operation 33_435, local learning system 33_116 can analyze the local search and feedback history 33_115 to determine whether a feature can be identified from the results and the feedback on the results. The local learning system 33_116 can utilize the feedback on all of the results for the query, both local and remote, in determining whether a feature can be identified.

If a feature was identified in operation 33_435, then in operation 33_440 the local learning system 33_116 can generate a local predictor on the feature and train upon that feature.

In operation 33_445 the local learning system 33_116 can optionally send a feature vector to the remote search engine based upon a feature identified by the local learning system 33_116. Using the news sources example again, a user may query to the local device and remote search engine 33_150 for a current political topic in operation 33_405. The remote results 33_415 returned in response to the query may include results from The Huffington Post® and Fox News®. The remote search engine 33_150 may have returned results for Fox News® as the top rated results based upon interaction by many users of the remote search engine 33_150. However, the local feedback history for this particular user may indicate that this particular user does not interact with Fox News® results, contrary to the top rated ranking of Fox News® results by the remote search engine 33_150. The local learning system 33_116 can identify that this user does not interact with Fox News® results, even though the remote search engine ranks the Fox News® results as top rated, as a feature in operation 33_435 and can perform local learning on the feature in operation 33_440, and optionally send the feature back to the remote search engine 33_150 in operation 33_445.

FIG. 33_5 illustrates, in block diagram form, a method 33_500 of locally learning a query feature passed to a computing device 33_100 by a remote search engine 33_150 in response to a query sent by the computing device 33_100 to the remote search engine 33_150. Many of the operations of method 33_500 have been previously described above.

In operation 33_405, a user can issue a query using the local search interface 33_110. As described above, the local search interface 33_110 can pass the query to one, or both, of the local database 33_111 and the remote search engine 33_150.

In operation 33_310, the local query can be stored in the local search history and feedback history 33_115.

In operation 33_315, the computing device 33_100 can receive local results returned from the local database 33_111 in response to the query. Local results can be received independently of, and asynchronous to, search results returned from the remote search engine 33_150.

In operation 33_515, the computing device 33_100 can receive results returned from the remote search engine 33_150 in response to the query. In operation 33_515, the remote search engine can also return a feature related to the query and the results, for the local learning system 33_116 to train on.

In an embodiment, a timer 33_417 can be set to determine when to display the results that have been received up to the expiration of the timer. In an embodiment, additional results can be received after the expiration of the timer. The time value of the timer can be configured locally on the computing device 33_100, or on the remote search engine 33_150, or on both such that local and remote search results are displayed at different times.

In operation 33_420, the local results and the remote results can be blended and ranked as described in operation 33_420, above, with reference to FIG. 33_4.

In operation 33_425, the local search interface can receive feedback from the user indicating whether a user has engaged with a result, and if so, how long has the user engaged with the result, or whether the user has abandoned the result. The user feedback can be collected and stored in the local search and feedback history 33_115, regardless of whether a result is a local database result or a remote search engine result. The query can also be stored in the local search and feedback history 33_115. In one embodiment, the query and the feedback history can be associated with a particular user of the computing device 33_100.

In operation 33_430, feedback history of only the remote search engine results can be returned to the remote search engine 33_150. The feedback history can be anonymized so that a particular user and/or machine is not identified in the information sent to the remote search engine 33_150. In one embodiment, the query associated with the anonymized feedback is not sent to the remote search engine, to preserve user privacy.

In operation 33_520, the local learning system 33_116 can generate a local predictor on the feature that was received from the remote search engine 33_150 in operation 33_515 and train upon that feature. The local learning system 33_116 can utilize local feedback and search history 33_115 to determine how a particular user interacts with both local and remote search results for the feature received from the remote search engine 33_150. The local learning system 33_116 can track whether a feature is determined by the local learning system 33_116 or whether a feature is received from a remote search engine 33_150 for learning by the local learning system 33_116. In embodiments that send feature information to the remote search engine 33_150, such as in operation 33_630 of FIG. 33_6, below, feature information can be anonymized before sending the feature information to the remote search engine 33_150 the privacy of the particular user.

FIG. 33_6 illustrates, in block diagram form, a method 33_600 of receiving or determining a new feature, locally training on the feature, and utilizing the feature.

In operation 33_605, remote search engine 33_150 can return to computing device 33_100 a new feature that the computing device is to training locally upon. The remote search engine 33_150 can return the feature to the computing device 33_100 in conjunction with results returned from a query by the computing device 33_100. In one embodiment, the feature can be returned to computing device independent of whether the query was generated from the local search interface 33_110 or the remote search interface 33_120. In one embodiment, the remote query server 33_121 can intercept the feature and pass the feature to the local learning system 33_116 via communication interface 33_8.

In operation 33_610, the method 33_600 can alternatively begin by the local learning system 33_116 determining a feature by analyzing the local search history and feedback history 33_115. A feature can be learned by analyzing the local search history and feedback history 33_115 in a variety of ways. A few examples are given below:

A user may issue a query for "football scores." The remote search engine 33_150 may return results for both football scores and soccer scores. The remote search engine 33_150 may have determined that the computing device 33_100 that sent the query was located at an IP address that is in the United States. Therefore the remote search engine prioritized American football scores, such as the Dallas Cowboys, as being the most relevant results. In many European and South American countries, football means soccer. Suppose the user that issued the query is interested in, and interacts with, the soccer results. The local learning system 33_116 can analyze the local search history and feedback history 33_115 to determine that the user did not interact with the higher-ranked American football scores. The local learning system 33_116 can then analyze the results and determine that the feature that football has at least two meanings and that the user of this computing device 33_100 has a preference for soccer over American football.

Using the football scores example again, upon receiving the results for football scores, the user may have wondered why he was receiving American football scores. In the local results returned from local database 33_111, there may be a dictionary entry for the word, "football." The user clicked on the dictionary entry for "football." In response, the local learning system 33_116 can determine a new feature that there are alternate definitions for football and that this user has a preference for soccer over American football.

In another example, suppose that a user enters the query, "Montana," and receives a local result from his address book, "Mary Montana," a local result from his dictionary, remote results for Joe Montana (American football legend), and the U.S. State of Montana. The user clicks on Mary Montana from his local address book almost every time that he queries for Montana. The local learning system 33_116 can determine a feature for Montana, and that this user has a preference for the contact record "Mary Montana."

In yet another example, a user issues a query for, "MG." The user has many pictures of British MG cars on his local computer and they are indexed in the local database 33_111. The remote search engine 33_150 may return results for the element, "Magnesium" (symbol Mg). The user may also have many songs on his computer by the band, "Booker T. and the MGs" and receive local results accordingly. The local learning system 33_116 can determine the disparity in these results and can determine a feature for "MG."

Once a feature has been received in operation 33_605, or determined in operation 33_610, then in operation 33_620 the local learning system 33_116 can generate a local predictor for the feature.

In operation 33_625, the local learning system 33_116 can use the local predictor to train on the feature, "MG," utilizing the local search history and feedback history 33_115. The local learning system 33_116 can also use the context of the computing device 33_100 to train upon a feature.

Using the MG example, above, if a user issued the query, MG, from inside a Calculator program, the local learning system 33_116 can utilize the context to learn that the user was most likely interested in the molecular weight of magnesium, or other property of magnesium, and train on MG accordingly. If the user issued the query from inside a picture viewing application, while viewing a picture of an MG car, the local learning system 33_116 can utilizing the context to learn that the user is most likely interested in British MG cars.

In operation 33_630, a feature learned by the local learning system 33_116, or a feature received from the remote search engine 33_150, can be utilized in several different ways. When issuing a new query for MG, e.g., the query can be extended utilizing a learned preference for MG (e.g. magnesium). In one embodiment, when issuing a new query for MG, e.g., the query can be biased in favor of results for magnesium. Local learning system 33_116 can compute a bias probability (learned preference) associated with each query feature and provide the bias to remote search engine 33_150 as a feature vector. In an embodiment, the feature vector can be sent to the remote search engine the next time that a user queries the remote search engine using a query term associated with the feature. In an embodiment, the feature can be used to filter the results returned from either, or both, the local database 33_111 or the remote search engine 33_150 to limit, the results returned to the query MG to, e.g., magnesium results.

In FIG. 33_7 ("Software Stack"), an exemplary embodiment, applications can make calls to Services A or B using several Service APIs and to Operating System (OS) using several as APIs, A and B can make calls to as using several as APIs.

Note that the Service 2 has two APIs, one of which (Service 2 API 1) receives calls from and returns values to Application 1 and the other (Service 2 API 2) receives calls from and returns values to Application 2, Service 1 (which can be, for example, a software library) makes calls to and receives returned values from OS API 1, and Service 2 (which can be, for example, a software library) makes calls to and receives returned values from both as API 1 and OS API 2, Application 2 makes calls to and receives returned values from as API 2.

Example Systems, Methods, and Computer-Readable Media for Multi-Domain Searching Techniques In some embodiments, a computer-implemented method is provided, the method comprising: learning, on a computing device, a feature related to a search query, wherein the feature is learned, at least in part, using information generated on the computing device that is not transmitted to a remote search engine; transmitting, to the remote search engine, a search query and an indication of the feature; and receiving, by the computing device, search results responsive to the search query and the indication of the feature. In some embodiments, the indication of the feature comprises at least one of: a bias toward the feature or a feature vector. In some embodiments, information obtained from the computing device comprises at least one of: a search query performed on the computing device of information on the computing device or feedback of interaction by a user of the computing device with results returned from a search query performed on the computing device of information stored on the computing device. In some embodiments, learning comprises a statistical analysis of the information obtained from the computing device, wherein statistical analysis comprises one of: linear regression, Bayes classification, or Naive Bayes classification. In some embodiments, the method further includes receiving, from a remote search engine, a feature related to a search query for the computing device to learn. In some embodiments, the method further includes learning, on the computing device, the feature received from the remote search engine, wherein the feature received from the remote search engine is learned, at least in part, using information generated on the computing device that is not transmitted to the remote search engine. In some embodiments, learning the feature comprises disambiguating a query term related to the search query in accordance with the information obtained from the computing device.

In some embodiments, a non-transitory machine-readable medium is provided that when executed by a processing system, performs a method, comprising: learning, on a computing device, a feature related to a search query, wherein the feature is learned, at least in part, using information generated on the computing device that is not transmitted to a remote search engine; transmitting, to the remote search engine, a search query and an indication of the feature; and receiving, by the computing device, search results responsive to the search query and the indication of the feature. In some embodiments, the indication of the feature comprises at least one of: a bias toward the feature or a feature vector. In some embodiments, information obtained on the computing device comprises at least one of: a search query performed on the computing device of information on the computing device or feedback of interaction by a user of the computing device with results returned from a search query performed on the computing device of information stored on the computing device. In some embodiments, learning comprises a statistical analysis of the information obtained from the computing device, wherein statistical analysis comprises one of: linear regression, Bayes classification, or Naive Bayes classification. In some embodiments, the method further includes receiving, from a remote search engine, a feature related to a search query for the computing device to learn. In some embodiments, the method further includes learning, on the computing device, the feature received from the remote search engine, wherein the feature received from the remote search engine is learned, at least in part, using information generated on the computing device that is not transmitted to the remote search engine. In some embodiments, learning the feature comprises disambiguating a query term related to the search query in accordance with the information obtained from the computing device.

In some embodiments, a system is provided, the system comprising: a processing system programmed with executable instructions that, when executed by the processing system, perform a method. The method includes: learning, on the system, a feature related to a search query, wherein the feature is learned, at least in part, using information generated on the system that is not transmitted to a remote search engine; transmitting, to the remote search engine, a search query and an indication of the feature; and receiving, by the system, search results responsive to the search query and the indication of the feature. In some embodiments, the indication of the feature comprises at least one of: a bias toward the feature or a feature vector. In some embodiments, information obtained on the system comprises at least one of: a search query performed on the system of information on the system or feedback of interaction by a user of the system with results returned from a search query performed on the system of information stored on the system. In some embodiments, learning comprises a statistical analysis of the information obtained from the system, wherein statistical analysis comprises one of: linear regression, Bayes classification, or Naive Bayes classification. In some embodiments, the method further includes receiving, from a remote search engine, a feature related to a search query for the system to learn. In some embodiments, the method further includes learning, on the system, the feature received from the remote search engine, wherein the feature received from the remote search engine is learned, at least in part, using information generated on the system that is not transmitted to the remote search engine. In some embodiments, learning the feature comprises disambiguating a query term related to the search query in accordance with the information obtained from the system.

Section 4: Structured Suggestions

The material in this section "Structured Suggestions" describes structuring suggestions and the use of context-aware computing for suggesting contacts and calendar events for users based on an analysis of content associated with the user (e.g., text messages), in accordance with some embodiments, and provides information that supplements the disclosure provided herein. For example, portions of this section describe ways to identify and suggest new contacts, which supplements the disclosures provided herein, e.g., those related to method 600 and method 800 discussed below, in particular, with reference to populating suggested people in the predictions portion 930 of FIGS. 9B-9C. Additionally, the techniques for analyzing content may also be applied to those discussed above in reference to methods 1800 and 2000 and the techniques for suggesting contacts and calendar events may be used to perform these suggestions based on an analysis of voice communication content.

Brief Summary of Structured Suggestions

In some embodiments, a method of suggesting a contact comprises: at an electronic device: receiving a message; identifying, in the received message, an entity and contact information associated with the entity; determining that a contact associated with the identified entity does not exist among a plurality of contacts in a database; and in response to the determining, generating a contact associated with the entity, the generated contact comprising the contact information and an indication that the generated contact is a suggested contact.

In some embodiments, a method of suggesting a contact comprises: at an electronic device: receiving a message; identifying, in the received message, an entity and an item of contact information associated with the entity; determining that a contact associated with the identified entity exists among a plurality of contacts in a database and that the contact does not comprise the identified item of contact information; and in response to the determining, updating the contact to comprise the item of contact information and an indication that the item of contact information is a suggested item of contact information.

In some embodiments, a method of suggesting a contact comprising: at an electronic device with a display: receiving a message; identifying, in the received message, an entity and contact information associated with the entity; generating an indication that the identified contact information is suggested contact information; and displaying a first user interface corresponding to a contact associated with the entity, the first user interface comprising a first user interface object, based on the generated indication, indicating that the identified contact information is suggested contact information.

In some embodiments, a method of suggesting a contact comprising: at an electronic device with a display: receiving a message; identifying, in the received message, an entity and contact information associated with the entity; and displaying a first user interface corresponding to the received message, the first user interface comprising: a first portion comprising content of the message as received by the electronic device; and a second portion comprising: a first user interface object corresponding to the identified entity; a second user interface object corresponding to the identified contact information; and a third user interface object associated with the identified contact information that, when selected, causes the electronic device to add the identified contact information to a database.

In some embodiments, a method of suggesting a calendar event comprising: at an electronic device: receiving a message; identifying, in the received message, event information; and generating a calendar event associated with the identified event information, the generated calendar event comprising the event information and an indication that the generated calendar event is a suggested calendar event.

In some embodiments, a method of suggesting a calendar event comprising: at an electronic device with a display: receiving a message; identifying, in the received message, event information; and displaying a first user interface corresponding to the received message, the first user interface comprising: a first portion comprising content of the message as received by the electronic device; and a second portion comprising: a first user interface object corresponding to the identified event information; and a second user interface object associated with the identified event information that, when selected, causes the electronic device to add the identified event information to a database comprising a plurality of calendar events.

In some embodiments, a method of suggesting multiple contacts and/or calendar events comprising: at an electronic device with a display: receiving a message; identifying, in the received message, multiple instances of contact or event information; and displaying a first user interface corresponding to the received message, the first user interface comprising: a first portion comprising content of the message as received by the electronic device; and a second portion that, when selected, causes the electronic device to display a second user interface comprising a list of the multiple instances of identified contact or event information.

Detailed Description of Structured Suggestions

In the following description of the disclosure and embodiments, reference is made to the accompanying drawings in which it is shown by way of illustration specific embodiments that can be practiced. It is to be understood that other embodiments and examples can be practiced and changes can be made without departing from the scope of the disclosure.

As noted above, managing contacts and calendar events on an electronic device can be burdensome to a user because adding or updating contacts and calendar events requires several manual steps that adds up over time. Because of this, many users simply neglect to keep their address books and calendars up to date, which costs them time later when they need to manually search their device for particular contact or event information. This can lead to a frustrating user experience and loss in productivity.

The present disclosure addresses this problem by providing an electronic device that automatically suggests contacts and calendar events for users based on their messages. The device can analyze a user's messages for contact and event information and automatically generate or update suggested contacts and calendar events for the user based on this information. The suggested contacts and calendar events can be searchable as if they were manually entered by the user, and the user can choose to add or ignore the suggested contacts and calendar events. In this manner, a user's contacts and calendar events can be maintained with no or minimal effort on the user's part, which can save the user time, enhance productivity and produce a more efficient human-machine interface.

1. Structured Suggestions

In embodiments of the present disclosure, the electronic device can structure suggested contacts and calendar events for users from their messages. The suggested contacts and calendar events can be searchable as if they were manually entered by the user, and the user can choose to add or ignore (e.g., reject) the suggested contacts and calendar events. In this manner, a user's contacts and calendar events can be maintained with no or minimal effort on the user's part, which can save the user time, enhance productivity and produce a more efficient human-machine interface.

2.1 Suggested Contact Information

FIG. 34_5A illustrates an exemplary data architecture 34_502A for suggested contacts in accordance with some embodiments. As shown in FIG. 34_5A, electronic device 34_500 can associate (e.g., store) contact information 34_520A from message 34_510 with a corresponding contact 34_530A. Message 34_510 can include any type of message that can be sent or received by the user of device 34_500, such as an email, instant message, messaging via an application on device 34_500, etc., and can include any attachment to message 34_510.

Contact information 34_520A can include information typically associated with a contact entry in an address book database, such as name, phone number, address, business or social networking handle, etc., of an entity. Contact entries are typically organized or indexed by the entity, which can include an individual, group, organization, company, etc. Contact information 34_520A can be stored in any suitable format that applications, such as contacts module 137, can recognize in order to process contact information 34_520A. Contact information 34_520A can also be formatted according to standard protocols, such as the CardDAV protocol, to allow for updating or synchronization over a network with other clients.

In some embodiments, the identified contact information 34_520A can be associated with contact 34_530A in any one of three mutually exclusive states—suggested state 34_540, added state 34_550 and rejected state 34_560. Suggested state 34_540 can reflect a state in which the user has not yet confirmed or approved the addition of contact information 34_520A to a contact. Added state 34_550 can reflect a state in which the user has confirmed or approved the addition of contact information 34_520A to a contact. Rejected state 34_560 can reflect a state in which the user has rejected the addition of contact information 34_520A to a contact. Contact 34_530A can also be associated with any one of these three states when all associated contact information belongs to the same state.

In some embodiments, added state 34_550 can be treated by device 34_500 as a default state, meaning that no additional data is required to be associated with such contacts to indicate that they are in added state 34_550. For example, user added contacts on device 34_500 can be defaulted to added state 34_550.

In embodiments in which added state 34_550 is treated as the default state, device 34_500 can associate data with contact information 34_520A to indicate that contact information 34_520A belongs to either suggested state 34_540 or rejected state 34_560. This data can take any suitable form, such as metadata, which can be used by applications processing contact information 34_520A to recognize that contact information 34_520A is in either suggested state 34_540 or rejected state 34_560.

Device 34_500 can also associate data with contact 34_530A to indicate that contact 34_530A and all associated contact information belong to either suggested state 34_540 or rejected state 34_560.

By storing contact information 34_520A in suggested state 34_540, device 34_500 (e.g., via an application running on device 34_500) can include the suggested contact information in searches of contacts. To avoid user confusion, device 34_500 can also indicate to the user that contact information 34_520A is in suggested state 34_540 by providing a visual indication (e.g., via labeling or highlighting) and/or preventing a user from directly acting on contact information 34_520A (e.g., by requiring the user to provide an additional input before allowing the user to act on contact information 34_520A). Input can refer to any suitable manner in input, such as touch, mouse, speech, etc.

By storing contact information 34_520A in rejected state 34_560, device 34_500 can remember previously suggested contact information that the user had rejected so as not to suggest it again to the user. Contact information 34_520A in rejected state 34_560 can be ignored by applications that process contact information in added state 34_550 and suggested state 34_540.

Device 34_500 can store contact information 34_520A locally on device 34_500, and refrain from synchronizing contact information 34_520A to remote databases until contact information 34_520A is changed from suggested state 34_540 to added state 34_550. In other embodiments, contact information 34_520A can be updated to remote databases while in suggested state 34_540.

Device 34_500 can identify contact information 34_520A from structured or unstructured content in message 34_510. Structured content refers to content with formal organization or structure arranged according to a predefined format, such as automated e-mails provided by online travel agencies that lay out flight, hotel and/or car reservation information in the same predefined way (e.g., using the same HTML structure). In some embodiments, to identify contact information 34_520A from structured content, device 34_500 can use templates configured to recognize contact information in the particular format provided by such messages. In some embodiments, device 34_500 can add and/or update these templates over a network.

Unstructured content refers to content without formal organization or structure, such as natural language content (e.g., someone says in a message that they have a new number) and email signatures. To identify contact information 34_520A from unstructured content, device 34_500 can use data detectors that are configured to identify predefined references to contact information, such as particular phrases like “I got a new number, it's<number>.” Device 34_500 can also add and/or update these data detectors over a network. Device 34_500 can improve the predefined references relied on by the data detectors by cross-correlating contact information on device 34_500 (e.g., in an address book database) with language associated with that contact information on device 34_500 (e.g., in messages). The correlated language can then be used to refine the predefined references for subsequent use. The message content analyzed by device 34_500 can include any information that is recognizable by device 34_500, including message metadata.

2.2 Suggested Event information

FIG. 34_5B illustrates an exemplary data architecture 34_502B for suggested calendar events in accordance with some embodiments. As shown in FIG. 34_5B, electronic device 34_500 can associate (e.g., store) event information 34_520B from message 34_510 with a corresponding calendar event 34_530B. Message 34_510 can include any type of message that can be sent or received by the user of device 34_500, such as an email, instant message, messaging via an application on the device, etc., and can include any attachment to the message.

Event information 34_520B can include information typically associated with a calendar entry in a calendar database, such as time, date, location, etc. Event information 34_520B can be stored in any suitable format that applications, such as calendar module 148, can recognize in order to process event information 34_520B. Event information 34_520B can also be formatted according to standard protocols, such as the CalDAV protocol, to allow for updating or synchronization over a network with other clients.

In some embodiments, the identified event information 34_520B can be associated with calendar event 34_530B in any one of three mutually exclusive states—suggested state 34_540, added state 34_550 and rejected state 34_560. Suggested state 34_540 can reflect a state in which the user has not yet confirmed or approved the addition of event information 34_520B to a calendar event. Added state 34_550 can reflect a state in which the user has confirmed or approved the addition of event information 34_520B to a calendar event. Rejected state 34_560 can reflect a state in which the user has rejected the addition of event information 34_520B to a calendar event. Calendar event 34_530B can also be associated with any one of these three states when all associated calendar event information belongs to the same state.

In some embodiments, added state 34_550 can be treated by device 34_500 as a default state, meaning that no additional data is required to be associated with such calendar events to indicate that they are in added state 34_550. For example, user-added calendar events on device 34_500 can be defaulted to added state 34_550.

In embodiments in which added state 34_550 is treated as the default state, device 34_500 can associate data with event information 34_520B to indicate that event information 34_520B belongs to either suggested state 34_540 or rejected state 34_560. This data can take any suitable form, such as metadata, which can be used by applications processing event information 34_520B to recognize that event information 34_520B is in either suggested state 34_540 or rejected state 34_560.

Device 34_500 can also associate data with calendar event 34_530B to indicate that calendar event 34_530B and all associated event information 34_520B belong to either suggested state 34_540 or rejected state 34_560.

By storing event information 34_520B in suggested state 34_540, device 34_500 (e.g., via an application running on device 34_500) can include the suggested event information in searches of calendar events. To avoid user confusion, device 34_500 can also indicate to the user that event information 34_520B is in suggested state 34_540 by providing a visual indication (e.g., via labeling or highlighting) and/or preventing a user from directly acting on event information 34_520B (e.g., by requiring the user to provide an additional input before allowing the user to act on event information 34_520B). Input can refer to any suitable manner in input, such as touch, mouse, speech, etc.

By storing event information 34_520B in rejected state 34_560, device 34_500 can remember previously suggested event information that the user had rejected so as not to suggest it again to the user. Event information 34_520B in rejected state 34_560 can be ignored by applications that process event information in added state 34_550 and suggested state 34_540.

Device 34_500 can store event information 34_520B locally on device 34_500, and refrain from synchronizing event information 34_520B to remote databases until event information 34_520B is changed from suggested state 34_540 to added state 34_550. In other embodiments, event information 34_520B can be updated to remote databases while in suggested state 34_540.

Device 34_500 can identify event information 34_520B from structured or unstructured content in message 34_510. Structured content refers to content with formal organization or structure arranged according to a predefined format, such as automated e-mails provided by online travel agencies that lay out flight, hotel and/or car reservation information in the same predefined way (e.g., using the same HTML structure). In some embodiments, to identify event information 34_520B from structured content, device 34_500 can use templates configured to recognize event information in the particular format provided by such messages. In some embodiments, device 34_500 can add and/or update these templates over a network.

Unstructured content refers to content without formal organization or structure, such as natural language content (e.g., someone says in a message that they'll meet you somewhere at a particular time) and email signatures. To identify event information 34_520B from unstructured content, device 34_500 can use data detectors that are configured to identify predefined references to event information, such as particular phrases like “meet me at <address> at <time>.” Device 34_500 can also add and/or update these data detectors over a network. Device 34_500 can improve the predefined references relied on by the data detectors by cross-correlating event information on device 34_500 (e.g., in a calendar database) with language associated with that event information on device 34_500 (e.g., in messages). The correlated language can then be used to refine the predefined references for subsequent use. The message content analyzed by device 34_500 can include any information that is recognizable by device 34_500, including message metadata.

It should be recognized that exemplary data architectures 34_520A and 34_520B can be the same or different. For example, a single data architecture can be used for suggested contacts as for suggested calendar events. Alternatively, one data architecture can be used for suggested contacts, while another, different data architecture can be used for suggested calendar events.

It should also be recognized that message 34_510 can be processed for only suggested contacts, only suggested calendar events, or both suggested contacts and suggested calendar events. When processed for both suggested contacts and suggested calendar events, message 34_510 can be processed for suggested contacts and suggested calendar events in series or parallel. For example, message 34_510 can be first processed for suggested contacts, and then processed for suggested calendar events. Alternatively, message 34_510 and a copy of message 34_510 can be processed for suggested contacts and suggested calendar events in parallel.

3. User Interfaces and Associated Processes

FIGS. 34_6A-34_13 depict embodiments of user interfaces ("UI") and associated processes that may be implemented on device 34_500. In some embodiments, device 34_500 corresponds to device 100 (FIG. 1A).

FIGS. 34_6A and 34_6G illustrate exemplary user interfaces for providing suggested contacts and calendar events in accordance with some embodiments.

In particular, FIG. 34_6A shows the display, by contacts module 137 for example, of a user interface corresponding to a contact with suggested contact information (i.e., contact information in suggested state 34_540), for example, after processing a message as described above. In this example, the contact is associated with an individual named John Appleseed and includes a company name ("Any Company Inc."), work number ("405-555-1234") and a mobile number ("405-123-6633"). The company name and work number are confirmed items of contact information and belong to added state 34_550. The mobile number is a suggested item of contact information and belongs to suggested state 34_540.

Device 34_500 can provide user interface object 34_600 (e.g., the word "suggestion") in the user interface to indicate to the user that the mobile number is a suggested item of contact information and not one that has been confirmed by the user. Any suitable user interface object can be used for this purpose, including a label, icon, or other visual indication that the mobile number is a suggested item of contact information. When the same contact includes items of contact information in suggested state 34_540 and items of contact information in added state 34_550, as in the case in FIG. 34_6A, device 34_500 can display the items in suggested state 34_540 below, or in a position of lesser priority to, all items in added state 34_550.

Device 34_500 can also prevent the user from directly invoking an application (e.g., telephone module 138) to call John Appleseed at the suggested number from this initial user interface. For example, device 34_500 can provide the text and/or region associated with the suggested number with a different visual appearance than that of confirmed items of contact information, such as a grayed-out appearance (not shown), to indicate that a selection of the suggested number by the user will not directly call the number. Rather, upon selecting the suggested number by the user, device 34_500 can replace the current user interface with a second user interface through which the user can review and call the suggested number.

As shown in FIG. 34_6B, the second user interface (labeled "Review Suggestion") includes suggestion portion 34_606 in the form of a banner that includes user interface object 34_602 (labeled "Add to Contacts") associated with the suggested number. Selecting user interface object 34_602 by the user can cause device 34_500 to add the suggested number to the contact in added state 34_550 (e.g., change the state of the suggested number from suggested state 34_540 to added state 34_550). Upon selection of the mobile number or similar indication, such as the telephone icon displayed next to the mobile number, by the user in this subsequent user interface, device 34_500 can invoke an application (e.g., telephone module 138) to call John Appleseed at the suggested number. In some embodiments, device 34_500 can retain the mobile number in suggested state 34_540 if the user does not select user interface object 34_602 but does select the mobile number or similar indication (e.g., a user calling the suggested number is not treated as an implicit approval of the suggested number for the contact). In other embodiments, device 34_500 can change the state of the mobile number to added state 34_550 upon the user selecting the mobile number, even if the user had not selected user interface object 34_602 (e.g., a user calling the suggested number is treated as an implicit approval of the suggested number for the contact).

The second user interface in FIG. 34_6B also includes user interface object 34_604 (labeled "Ignore") associated with the suggested number. Selection of user interface object 34_604 by the user can cause device 34_500 to cease displaying user interface object 34_602, which removes the option of adding the number to the contact. Upon selecting user interface object 34_604, device 34_500 can change the state of the suggested number from suggested state 34_540 to rejected state 34_560. In rejected state 34_560, device 34_500 can be configured to no longer display or suggest the suggested number in association with this contact.

Additionally, the second user interface in FIG. 34_6B includes message portion 34_608 (labeled as "Related email") that includes a portion of the message from which the suggested number was identified by device 34_500. Thus, in providing an interface for reviewing suggested contact information, the user interface of FIG. 34_6B can provide the user with message context associated with the suggested contact information. As shown in FIG. 34_6B, device 34_500 can display a limited section of the e-mail relating to the portion with the mobile number. Upon the user selecting the displayed portion of the message, device 34_500 can cause a message application (e.g., E-mail Client Module 140) to open the entire e-mail for the user. In some embodiments, the entire e-mail can be displayed with the suggested contact information in a user interface corresponding to that shown in FIG. 34_6D.

FIG. 34_6C shows a user interface that is displayed in response to the user selecting the "Edit" user interface object in FIG. 34_6A. In this edit user interface, the user can also directly call the suggested number, represented by user interface object 34_610, which is highlighted (i.e., in bold) to indicate that the number is in suggested state 34_540. Any suitable visual indication can be used to indicate that user interface object 34_610 is in suggested state 34_540.

FIG. 34_6D shows a screen that a user can view upon opening a message on device 34_500 (e.g., an e-mail displayed by E-mail Client Module 140) with device 34_500 having identified suggested contact information in the message. The user interface of FIG. 34_6D includes suggestion portion 34_612 and message portion 34_614. Message portion 34_614 includes the content of the message as received by device 34_500. Suggestion portion 34_612 includes a user interface object corresponding to the identified entity ("John Appleseed"), a user interface object corresponding to the identified contact information ("405-123-6633") and user interface object 34_618 (labeled "Add to Contacts") associated with the identified contact information that, when selected, causes the device to add the suggested number to the contact in added state 34_550. Suggestion portion 34_612 includes user interface object 34_620 (labeled "Ignore") associated with the identified contact information that, upon selection, causes device 34_500 to change the state of the identified contact information from suggested state 34_540 to rejected state 34_560. In rejected state 34_560, device 34_500 can be configured to no longer display or suggest the suggested contact information in association with this contact. Selecting identified contact information 34_616 of suggestion portion 34_612 above the "Ignore" and "Add to Contacts" tile can bring up a user interface corresponding to the contact associated with the identified entity. For example, device 34_500 can present the contact information for "John Appleseed" in a user interface corresponding to that shown in FIG. 34_6A in this embodiment.

FIG. 34_6E shows a screen that a user can view upon opening a message on device 34_500 (e.g., an e-mail displayed by E-mail Client Module 140) with device 34_500 having identified suggested event information in the message. The user interface of FIG. 34_6E includes suggestion portion 34_620 and message portion 34_622. Message portion 34_622 includes the content of the message as received by device 34_500. Suggestion portion 34_620 includes a user interface object corresponding to the identified event information ("Dinner," "Any Sushi Bar," "Fri, March 7th," or "9:50 PM") and user interface object 34_626 (labeled "Add to Calendar") associated with the identified event information that, when selected, causes device 34_500 to add the suggested event information to a calendar event in added state 34_550. Suggestion portion 34_620 includes user interface object 34_628 (labeled "Ignore") that, upon selection, causes device 34_500 to change the state of the identified event information from suggested state 34_540 to rejected state 34_560. In rejected state 34_560, device 34_500 can be configured to no longer display or suggest the suggested event information in association with this calendar event. Selecting identified event information 34_624 of suggestion portion 34_620 above the "Ignore" and "Add to Calendar" tile can bring up a user interface (not shown) corresponding to a calendar event associated with the identified event information (e.g., displayed by contacts module 137 for example), through which the user can select a user interface object to add the suggested event information to a calendar event in added state 34_550.

FIG. 34_6F shows a screen that a user can view upon opening a message on device 34_500 (e.g., an e-mail displayed by E-mail Client Module 140) with device 34_500 having identified multiple suggested contacts and/or calendar events in the message. The user interface of FIG. 34_6F includes suggestion portion 34_630 and message portion 34_632. Message portion 34_632 includes the content of the message as received by device 34_500. Suggestion portion 34_630 further includes a user selectable region that, when selected, causes device 34_500 to display a subsequent user interface having a list of the multiple instances of identified contact or event information as shown in FIG. 34_6G. Confining suggestion portion 34_630 of FIG. 34_6F to a single banner rather than incorporating all of the suggestions of FIG. 34_6G into the user interface of FIG. 34_6F prevents the suggestion portion of FIG. 34_6F from interfering with the user's ability to view and read the message in the message portion with ease.

FIG. 34_6G shows the subsequent user interface having the list of suggested contact and event information identified in the message associated with the user interface of FIG. 34_6F. As shown in FIG. 34_6G, the suggestions are organized by type (e.g., suggested calendar events are grouped together and suggested contacts are grouped together) and each suggestion includes the "Ignore" and "Add to Contact" and "Add to Calendar" functionality described above. The user interface of FIG. 34_6G also includes user interface object 34_634 ("Add All") that, when selected, causes device 34_500 to add each of a grouping of the multiple instances of identified contact or event information (e.g., the two suggested calendar events shown in FIG. 34_6G) to a corresponding contact or calendar event in added state 34_550.

FIGS. 34_7A and 34_7B illustrate a flow diagram of an exemplary process for generating a suggested contact in accordance with some embodiments. The process can be performed at an electronic device (e.g., device 34_500).

The electronic device can receive (34_702) a message (e.g., FIG. 34_6D, email in message portion 34_614) and identify (34_704), in the received message, an entity (e.g., FIG. 34_6D, "John Appleseed") and contact information (e.g., FIG. 34_6D, "405-123-6633") associated with the entity. The device can determine (34_722) that a contact (e.g., FIG. 34_5A, contact 34_530A) associated with the identified entity does not exist among a plurality of contacts in a database (e.g., storage on device 34_500, such as an address book database), and in response to this determination (34_724), the device can generate a contact associated with the entity, the generated contact including the contact information and an indication (e.g., metadata) that the generated contact is a suggested contact (e.g., in suggested state 34_540). It is noted that when the device generates the "John Appleseed" contact as a suggested contact, each item of contact information in the contact can be indicated as a suggested item of contact information and stored in suggested state 34_540 or the entire contact as a whole can be indicated as a suggested contact and stored in suggested state 34_540. It is also noted that any message resident on the device can be analyzed using the disclosed process, such as incoming and outgoing messages.

In some embodiments, the identified entity is (34_706) a name and the identified contact information is a phone number, address, business or social networking handle.

In some embodiments, the device can identify unstructured content in the message by recognizing signature blocks in the message. For example, to identify the entity and associated contact information in the message, the device can identify (34_708) a signature block of the message and analyze the identified signature block for the entity and the contact information. The message can include (34_710) an email and the signature block can be an e-mail signature. The email can include (34_712) one or more prior emails in an email thread, and the identifying of the e-mail signature can include analyzing the one or more prior emails in the email thread. By unrolling the quoting layers of the e-mail the device can avoid incorrectly associating contact information location in different e-mails in an e-mail thread.

In some embodiments, the device can identify unstructured content in the message by searching for definitive phrases with data detectors. For example, to identify the entity and associated contact information in the message, the device can identify (34_714) in the message one or more phrases based on a collection of predefined phrases, and analyze the one or more identified phrases for the entity and the contact information. The device can update (34_716) the collection of predefined phrases over a network, which can allow the device to continue to use accurate phrases. The device can also downgrade (34_718) one or more of the predefined phrases as a result of a request to reject the suggested contact. In other words, if users continue to reject suggestions identified through the use of particular phrases, that can be an indication that those phrases are inaccurate. The device can also generate (34_720) one or more of the predefined phrases by cross-correlating contact information in the database with language associated with contact information on the electronic device (such as messages, calendar events, etc.) In this manner the device can determine what exact language in a message with contact information, for example, led a user to create or update a contact with the contact information.

In some embodiments, the suggested contact can be searchable in view of the data architecture of FIG. 34_5A. For example, the device can receive (34_726) a request for a contact (e.g., by a user searching for a contact via an application on the device) and, in response to the request for a contact, search the suggested contact.

In some embodiments, the device can (34_728), in response to the generation of the contact, refrain from storing the suggested contact in a remote database over a network. For example, if the suggested contact is in suggested state 34_540, the device can refrain from pushing the contact to an updating or synchronization service (e.g., an application on the device) that allows contacts to be updated on multiple clients over a network.

In some embodiments, the device can (34_730) receive a request to add the suggested contact (e.g., FIG. 34_6D, "Add to Contacts" 34_618) to the database and in response to the request, store the generated contact, without the indication that the generated contact is a suggested contact (e.g., change the state of the contact from suggested state 34_540 to added state 34_550), in the database. In response to the request to add the suggested contact to the database, the device can store (34_732) the generated contact, without the indication that the generated contact is a suggested contact, in a remote database over a network by, for example, pushing the contact to an updating or synchronization service.

In some embodiments, the device can (34_734) receive a request to reject the suggested contact (e.g., FIG. 34_6D, "Ignore" 34_620) and, in response to the request, reject the suggested contact, preventing the suggested contact from being generated in the future as a result of the entity and the contact information being identified in a future message. This can be implemented by storing rejected contacts in rejected state 34_560, so that the device can know what has already been rejected.

FIGS. 34_8A and 34_8B illustrate a flow diagram of an exemplary process for updating an existing contact with a suggested item of contact information in accordance with some embodiments. The process can be performed at an electronic device (e.g., device 34_500).

The electronic device can receive (34_802) a message (e.g., FIG. 34_6D, email in message portion 34_614) and identify (34_804), in the received message, an entity (e.g., FIG. 34_6D, "John Appleseed") and an item of contact information (e.g., FIG. 34_6D, "405-123-6633") associated with the entity. The device can determine (34_822) that a contact (e.g., FIG. 34_5A, contact 34_530A) associated with the identified entity exists among a plurality of contacts in a database and that the contact does not include the identified item of contact information. In response to this determination (34_824), the device can update the contact to include the item of contact information and an indication (e.g., metadata) that the item of contact information is a suggested item of contact information (e.g., in suggested state 34_540). It is also noted that any message resident on the device can be analyzed using the disclosed process, such as incoming and outgoing messages.

In some embodiments, the identified entity is (34_806) a name and the identified item of contact information is a phone number, address, business or social networking handle.

In some embodiments, the device can identify unstructured content in the message by recognizing signatures in the message. For example, to identify the entity and associated item of contact information in the message, the device can identify (34_808) a signature block of the message and analyze the identified signature block for the entity and the item of contact information. The message can include (34_810) an email and the signature block can be an e-mail signature. The email can include (34_812) one or more prior emails in an email thread, and the identifying of the e-mail signature can include analyzing the one or more prior emails in the email thread. By unrolling the quoting layers of the e-mail the device can avoid incorrectly associating contact information location in different e-mails in an e-mail thread.

In some embodiments, the device can identify unstructured content in the message by searching for definitive phrases with data detectors. For example, to identify the entity and associated item of contact information in the message, the device can identify (34_814) in the message one or more phrases based on a collection of predefined phrases, and analyze the one or more identified phrases for the entity and the item of contact information. The device can update (34_816) the collection of predefined phrases over a network, which can allow the device to continue to use accurate phrases. The device can also downgrade (34_818) one or more of the predefined phrases as a result of a request to reject the suggested item of contact information. In other words, if users continue to reject suggestions identified through the use of particular phrases, that can be an indication that those phrases are inaccurate. The device can also generate (34_820) one or more of the predefined phrases by cross-correlating contact information in the database with language associated with contact information on the electronic device (such as messages, calendar events, etc.) In this manner the device can determine what exact language in a message with contact information, for example, led a user to create or update a contact with the contact information.

In some embodiments, the suggested contact can be searchable in view of the data architecture of FIG. 34_5A. For example, the device can receive (34_826) a request for a contact (e.g., by a user searching for a contact via an application on the device) and, in response to the request for a contact, search the suggested item of contact information.

In some embodiments, the device can (34_828), in response to the updating of the contact, refrain from storing the suggested item of contact information in a remote database over a network. If the suggested item of contact information is in suggested state 34_540, the device can refrain from pushing the item of contact information to an updating or synchronization service (e.g., an application on the device) that allows contacts to be updated on multiple clients over a network.

In some embodiments, the device can (34_830) receive a request to add the suggested item of contact information to the database (e.g., FIG. 34_6B, "Add to Contacts" 34_602) and in response to the request, store the updated contact, without the indication that the item of contact information is a suggested item of contact information (e.g., change the state of the contact information from suggested state 34_540 to added state 34_550), in the database. In response to the request to add the suggested item of contact information to the database, the device can store (34_832) the updated contact, without the indication that the item of contact information is a suggested item of contact information, in a remote database over a network by, for example, pushing the contact information to an updating/synchronization service.

In some embodiments, the device can (34_834) receive a request to reject the suggested item of contact information (e.g., FIG. 34_6B, "Ignore" 34_604) and, in response to the request, reject the suggested item of contact information, preventing the contact from being updated in the future with the suggested item of contact information as a result of the entity and the item of contact information being identified in a future message. This can be implemented by storing rejected contact information in rejected state 34_560, so that the device can know what has already been rejected.

FIGS. 34_9A and 34_9B illustrate a flow diagram of an exemplary process for displaying a contact with suggested contact information in accordance with some embodiments. The process can be performed at an electronic device with a display (e.g., device 34_500).

The electronic device can receive (34_902) a message (e.g., FIG. 34_6D, email in message portion 34_614) and identify (34_904), in the received message, an entity (e.g., FIG. 34_6D, "John Appleseed") and contact information (e.g., FIG. 34_6D, "405-123-6633") associated with the entity. The device can generate (34_906) an indication (e.g., metadata) that the identified contact information is suggested contact information, and display (34_908) a first user interface (e.g., FIG. 34_6A) corresponding to a contact associated with the entity. The first user interface can include a first user interface object (e.g., "Suggestion") based on the generated indication, indicating that the identified contact information is suggested contact information.

In some embodiments, the device can prevent (34_910) an input corresponding to a selection of the suggested contact information from invoking an application to contact the entity (e.g., FIG. 34_6A, selecting the suggested number does not call the number).

In some embodiments, the device can (34_912) detect an input corresponding to a selection of the suggested contact information in the first user interface, and in response to the detection, display a second user interface (e.g., FIG. 34_6B) including a second user interface object (e.g., FIG. 34_6B, "Add to Contacts" 34_602) associated with the identified contact information that, when selected, causes the electronic device to add the identified contact information to a database. The second user interface can (34_914) include a third user interface object (e.g., FIG. 34_6B, "Ignore" 34_604) associated with the identified contact information that, when selected, causes the electronic device to cease displaying the second user interface object. Displaying the second user interface can cease (34_916) displaying the first user interface. The device can, in response to adding the identified contact information to the database, cease (34_918) display of the first user interface object.

In some embodiments the second user interface can display (34_920) at least a portion of the message (e.g., FIG. 34_6B, "Related email"). The device can (34_922) detect an input corresponding to a selection of the displayed message and, in response to the detection, invoke an application (e.g., E-mail Client Module 140) to open the message (e.g., FIG. 34_6D). The message can (34_924) be an email and the application can be an email application.

In some embodiments the device can detect (34_926) an input corresponding to a selection of the suggested contact information in the second user interface, and in response to the detection, invoke an application (e.g., telephone module 138) to contact the entity using the identified contact information. In response to the detection of the input corresponding to a selection of the suggested contact information in the second user interface, the device can (34_928) add the identified contact information to the database (e.g., change the state of the contact information from suggested state 34_540 to added state 34_550). The device can, in response to adding the identified contact information to the database, cease (34_918) display of the first user interface object.

FIG. 34_10 illustrates a flow diagram of an exemplary process for displaying suggested contact information with a message in accordance with some embodiments. The process can be performed at an electronic device with a display (e.g., device 34_500).

The electronic device can receive (34_1002) a message (e.g., FIG. 34_6D, email in message portion 34_614) and identify (34_1004), in the received message, an entity (e.g., FIG. 34_6D, "John Appleseed") and contact information (e.g., FIG. 34_6D, "405-123-6633") associated with the entity. The message can (34_1006) be an email. The identified entity can (34_1008) be a name and the identified contact information can be a phone number, address, business or social networking handle.

The device can display (34_1010) a first user interface (e.g., FIG. 34_6D) corresponding to the received message. The first user interface can include a first portion (e.g., FIG. 34_6D, message portion 34_614) including content of the message as received by the electronic device and a second portion (e.g., FIG. 34_6D, suggestion portion 34_612) including a first user interface object (e.g., FIG. 34_6D, "John Appleseed") corresponding to the identified entity, a second user interface object (e.g., FIG. 34_6D, "405-123-6633") corresponding to the identified contact information, and a third user interface object (e.g., FIG. 34_6D, "Add to Contacts" 34_618) associated with the identified contact information that, when selected, causes the electronic device to add the identified contact information to a database (e.g., store the contact information as a contact). The second portion can (34_1012) include a fourth user interface object (e.g., FIG. 34_6D, "Ignore" 34_620) associated with the identified contact information that, when selected, causes the electronic device to cease displaying the third user interface object.

FIGS. 34_11A and 34_11B illustrate a flow diagram of an exemplary process for generating a suggested calendar event in accordance with some embodiments. The process can be performed at an electronic device (e.g., device 34_500).

The electronic device can receive (34_1102) a message (e.g., FIG. 34_6E, email in message portion 34_622) and identify (34_1104), in the received message, event information (e.g., FIG. 34_6E, "Dinner," "Any Sushi Bar," "Fri, March 7th," or "9:50 PM"). The device can generate (34_1122) a calendar event (e.g., FIG. 34_5B, calendar event 34_530B) associated with the identified event information, the generated calendar event including the event information and an indication (e.g., metadata) that the generated calendar event is a suggested calendar event (e.g., in suggested state 34_540).

In some embodiments, the identified event information is (34_1106) a date and a time. In some embodiments, the device can identify structured content in the message by using templates configured to recognize event information in the particular format provided by such messages. For example, to identify the event information in the message, the device can (34_1108) identify a format of content in the message, identify a template from a collection of predefined templates that is configured to recognize event information in the format of the content in the message, and analyze the content with the identified template for the event information. The message can include (34_1110) an email and the content can include a reservation (e.g., FIG. 34_6E). The device can update (34_1112) the collection of predefined templates over a network, which can allow the device to continue to use accurate templates.

In some embodiments, the device can identify unstructured content in the message by searching for references to event information with data detectors. For example, to identify the event information in the message, the device can identify (34_1114) in the message one or more references to a date and time based on a collection of predefined references to a date and time, and analyze the one or more identified references to a date and time for the event information.

The device can update (34_1116) the collection of predefined references to a date and time over a network, which can allow the device to continue to use accurate references. The device can downgrade (34_1118) one or more of the predefined references to a date and time as a result of a request to reject the suggested calendar event. In other words, if users continue to reject suggestions identified through the use of particular references to date and time, that can be an indication that those references are inaccurate. The device can generate (34_1120) one or more of the predefined references to a date and time by cross-correlating event information in a database including a plurality of calendar events with language associated with event information on the electronic device. In this manner the device can better determine what language in a message with event information, for example, led a user to create or update a calendar event with the event information.

In some embodiments, the suggested calendar event can be searchable in view of the data architecture of FIG. 34_5A-34_5B. For example, the device can receive (34_1124) a request for a calendar event (e.g., by a user searching for a calendar event via an application on the device) and, in response to the request for a calendar event, searching the suggested calendar event.

In some embodiments, the device can, in response to the generation of the calendar event, refrain (34_1126) from storing the suggested calendar event in a remote database over a network. For example, if the suggested calendar event is in suggested state 34_540, the device can refrain from pushing the calendar event to an updating or synchronization service (e.g., an application on the device) that allows calendar events to be updated on multiple clients over a network.

In some embodiments the device can (34_1128) receive a request to add the suggested calendar event (e.g., FIG. 34_6E, "Add to Calendar" 34_626) to a database including a plurality of calendar events, and in response, storing the generated calendar event, without the indication that the generated calendar event is a suggested calendar event (e.g., change the state of the calendar event from suggested state 34_540 to added state 34_550), in the database. In response to the request to add the suggested calendar event to the database, the device can store (34_1130) the generated calendar event, without the indication that the generated calendar event is a suggested calendar event, in a remote database over a network by, for example, pushing the calendar event to an updating or synchronization service.

In some embodiments, the device can (34_1132) receive a request to reject the suggested calendar event (e.g., FIG. 34_6E, "Ignore" 34_628), and, in response to the request to reject, prevent the suggested calendar event from being generated in the future as a result of the event information being identified in a future message. This can be implemented by storing rejected events in rejected state 34_560, so that the device can know what has already been rejected.

FIG. 34_12 illustrates a flow diagram of an exemplary process for displaying suggested event information with a message in accordance with some embodiments. The process can be performed at an electronic device with a display (e.g., device 34_500).

The electronic device can receive (34_1202) a message (e.g., FIG. 34_6E, email in message portion 34_622) and identify (34_1204), in the received message, event information (e.g., FIG. 34_6E, "Dinner," "Any Sushi Bar," "Fri, March 7th," or "9:50 PM"). The message can be (34_1206) an email. The identified event information can (34_1208) be a date and a time.

The device can display (34_1210) a first user interface (e.g., FIG. 34_6E) corresponding to the received message. The first user interface can include a first portion (e.g., FIG. 34_6E, message portion 34_622) including content of the message as received by the electronic device and a second portion (e.g., FIG. 34_6E, suggestion portion 34_620) including a first user interface object (e.g., FIG. 34_6E, "Dinner," "Any Sushi Bar," "Fri, March 7th," or "9:50 PM") corresponding to the identified event information and a second user interface object (e.g., FIG. 34_6E, "Add to Calendar" 34_626) associated with the identified event information that, when selected, causes the electronic device to add the identified event information to a database including a plurality of calendar events (e.g., store the event information as a calendar event). The second portion can (34_1212) include a third user interface object (e.g., FIG. 34_6E, "Ignore" 34_628) associated with the identified event information that, when selected, causes the electronic device to cease displaying the second user interface object.

FIG. 34_13 illustrates a flow diagram of an exemplary process for displaying multiple suggested contact or event information with a message in accordance with some embodiments.

The process can be performed at an electronic device with a display (e.g., device 34_500).

The electronic device can receive (34_1302) a message (e.g., FIG. 34_6F, email in message portion 34_632) and identify (34_1304), in the received message, multiple instances of contact or event information (e.g., FIG. 34_6F, "2 Events, 1 Contact" in attached travel itinerary).

The device can display (34_1306) a first user interface (e.g., FIG. 34_6F) corresponding to the received message. The first user interface can include a first portion (e.g., FIG. 34_6F, message portion 34_632) including content of the message as received by the electronic device and a second portion (e.g., FIG. 34_6F, suggestion portion 34_630) that, when selected, causes the electronic device to display a second user interface (FIG. 34_6G) including a list of the multiple instances of identified contact or event information.

In some embodiments, the device can (34_1308) detect an input corresponding to a selection of the second portion of the first user interface and, in response to the detection, display the second user interface including the list of the multiple instances of identified contact or event information and, for each of the multiple instances of identified contact or event information, a first user interface object (e.g., FIG. 34_6G, "Add to Calendar," or "Add to Contacts") that, when selected, causes the electronic device to add the identified information to a database (e.g., store the event information as a calendar event, or the contact information as a contact). The second user interface can (34_1310) include, for each of the multiple instances of identified contact or event information, a second user interface object (e.g., FIG. 34_6G, "Ignore") that, when selected, causes the electronic device to cease displaying the first user interface object. The second user interface can (34_1312) include a third user interface object (e.g., FIG. 34_6G, "Add All" 34_634) that, when selected, causes the electronic device to add each of a grouping (e.g., calendar events or contacts) of the multiple instances of identified contact or event information to a database. Displaying the second user interface can cease (34_1314) displaying the first user interface.

It should be understood that the particular order in which the operations in FIGS. 34_7A-34_13 have been described is exemplary and not intended to indicate that the described order is the only order in which the operations could be performed. One of ordinary skill in the art would recognize various ways to reorder the operations described in this section. For brevity, these details are not repeated here. Additionally, it should be noted that aspects of processes 34_700-34_1300 (FIGS. 34_7A-34_13) may be incorporated with one another.

The operations in the information processing processes described above may be implemented by running one or more functional modules in information processing apparatus such as general purpose processors or application specific chips. These modules, combinations of these modules, and/or their combination with general hardware (e.g., as described above with respect to FIGS. 1A, 1B and 3) are all included within the scope of protection of the invention.

FIG. 34_14 shows exemplary functional blocks of an electronic device 34_1400 that, in some examples, perform the features described above. As shown in FIG. 34_14, electronic device 34_1400 includes a display unit 34_1402 configured to display graphical objects; a touch-sensitive surface unit 34_1404 configured to receive user gestures; one or more RF units 34_1406 configured to detect and communicate with external electronic devices; and a processing unit 34_1408 coupled to display unit 34_1402, touch-sensitive surface unit 34_1404, and RF units 34_1406.

In some embodiments, processing unit 34_1408 is configured to support an operating system 34_1410 running one or more applications 34_1412. In some embodiments, processing unit 34_1408 is configured to receive data, from RF unit 34_1406, representing an external device that is within wireless communications range, display a graphical user interface affordance on touch-sensitive surface unit 34_1404, and in response to detecting a contact on the displayed affordance, launch an application on device 34_1400 that corresponds to an application that is executing on the external device.

The functional blocks of the device 34_1400 are, optionally, implemented by hardware, software, or a combination of hardware and software to carry out the principles of the various described examples. It is understood by persons of skill in the art that the functional blocks described in FIG. 34_14 are, optionally, combined or separated into sub-blocks to implement the principles of the various described examples. Therefore, the description in this section optionally supports any possible combination or separation or further definition of the functional blocks described in this section.

FIG. 34_15 shows exemplary functional blocks of another electronic device 34_1500 that, in some examples, perform the features described above. As shown in FIG. 35_15, electronic device 34_1500 includes a display unit 34_1502 configured to display graphical objects; a touch-sensitive surface unit 34_1504 configured to receive user gestures; one or more RF units 34_1506 configured to detect and communicate with external electronic devices; and a processing unit 34_1508 coupled to display unit 34_1502, touch-sensitive surface unit 34_1504, and RF units 34_1506.

In some embodiments, processing unit 34_1508 is configured to support one or more of units 34_1510-1520 to perform the various functions described above. For example, receiving unit 34_1510 is configured to perform one or more of the receiving functions describe above (e.g., receiving a message). Identifying unit 34_1512 is configured to perform one or more of the identifying functions described above (e.g., identifying, in a received message, an entity and contact information associated with the entity; identifying, in a received message, event information; or identifying, in a received message, multiple instances of contact or event information). Determining unit 34_1514 is configured to perform one or more of the determining functions described above (e.g., determining that a contact associated with the identified entity does not exist among a plurality of contacts in a database; determining that a contact associated with the identified entity exists among a plurality of contacts in a database and that the contact does not comprise the identified item of contact information;). Generating unit 34_1516 is configured to perform one or more of the generating steps described above (e.g., generating, in response to the determining, a contact associated with the entity; generating an indication that the identified contact information is suggested contact information; generating a calendar event associated with the identified event information). Updating unit 34_1518 is configured to perform one or more of the updating steps described above (e.g., updating, in response to the determining, the contact to comprise the items of contact information and an indication that the item of contact information is a suggested item of contact information). Displaying unit 34_1520 is configured to perform one or more of the displaying steps described above (e.g., displaying, for example on display unit 34_1502, a first user interface corresponding to a contact associated with the entity or the received message).

The functional blocks of the device 34_1500 are, optionally, implemented by hardware, software, or a combination of hardware and software to carry out the principles of the various described examples. It is understood by persons of skill in the art that the functional blocks described in FIG. 34_15 are, optionally, combined or separated into sub-blocks to implement the principles of the various described examples. Therefore, the description in this section optionally supports any possible combination or separation or further definition of the functional blocks described in this section.

Example Methods, Devices Systems, and Computer-Readable Media for Structured Suggestions In one aspect, an electronic device that suggests contacts and calendar events for users based on their messages. The device can analyze a user's messages for contact and event information and automatically generate or update suggested contacts and calendar events for the user based on this information. The suggested contacts and calendar events can be searchable as if they were manually entered by the user, and the user can choose to add or ignore the suggested contacts and calendar events.

In some implementations, a method is provided that is performed at an electronic device (e.g., device 100, FIG. 1A, implemented in accordance with any of the configurations shown in FIG. 1E). The method includes: receiving a message; identifying, in the received message, an entity and contact information associated with the entity; determining that a contact associated with the identified entity does not exist among a plurality of contacts in a database; and in response to the determining, generating a contact associated with the entity, the generated contact comprising the contact information and an indication that the generated contact is a suggested contact.

In some implementations, the identified entity comprises a name and the identified contact information comprises a phone number, address, business or social networking handle. In some implementations, the identifying comprises identifying a signature block of the message and analyzing the identified signature block for the entity and the contact information. In some implementations, the message comprises an email and the signature block comprises an e-mail signature. In some implementations, the email comprises one or more prior emails in an email thread, and the identifying of the e-mail signature comprises analyzing the one or more prior emails in the email thread. In some implementations, the identifying comprises: identifying in the message one or more phrases based on a collection of predefined phrases; and analyzing the one or more identified phrases for the entity and the contact information. In some implementations, the method includes: updating the collection of predefined phrases over a network. In some implementations, the method includes: downgrading one or more of the predefined phrases as a result of a request to reject the suggested contact. In some implementations, the method includes: generating one or more of the predefined phrases by cross-correlating contact information in the database with language associated with contact information on the electronic device. In some implementations, the method includes: receiving a request for a contact; and in response to the request for a contact, searching the suggested contact. In some implementations, the method includes: in response to the generation of the contact, refraining from storing the suggested contact in a remote database over a network. In some implementations, the method includes: receiving a request to add the suggested contact to the database; and in response to the request to add the suggested contact to the database, storing the generated contact, without the indication that the generated contact is a suggested contact, in the database. In some implementations, the method includes: in response to the request to add the suggested contact to the database, storing the generated contact, without the indication that the generated contact is a suggested contact, in a remote database over a network. In some implementations, the method includes: receiving a request to reject the suggested contact; and in response to the request to reject the suggested contact, preventing the suggested contact from being generated in the future as a result of the entity and the contact information being identified in a future message.

In some implementations, a system is provided, the system including: means for receiving a message; means for identifying, in the received message, an entity and contact information associated with the entity; means for determining that a contact associated with the identified entity does not exist among a plurality of contacts in a database; and means for generating, in response to the determining, a contact associated with the entity, the generated contact comprising the contact information and an indication that the generated contact is a suggested contact.

In another aspect, a method is provided that is performed at an electronic device (e.g., device 100, FIG. 1A, implemented in accordance with any of the configurations shown in FIG. 1E). The method includes: receiving a message; identifying, in the received message, an entity and an item of contact information associated with the entity; determining that a contact associated with the identified entity exists among a plurality of contacts in a database and that the contact does not comprise the identified item of contact information; and in response to the determining, updating the contact to comprise the item of contact information and an indication that the item of contact information is a suggested item of contact information.

In some implementations, the identified entity comprises a name and the identified item of contact information comprises a phone number, address, business or social networking handle. In some implementations, the identifying comprises identifying a signature block of the message and analyzing the identified signature block for the entity and the item of contact information. In some implementations, the message comprises an email and the signature block comprises an e-mail signature. In some implementations, the email comprises one or more prior emails in an email thread, and the identifying of the e-mail signature comprises analyzing the one or more prior emails in the email thread. In some implementations, the identifying comprises: identifying in the message one or more phrases based on a collection of predefined phrases; and analyzing the one or more identified phrases for the entity and the item of contact information. In some implementations, the method includes: updating the collection of predefined phrases over a network. In some implementations, the method includes: downgrading one or more of the predefined phrases as a result of a request to reject the suggested item of contact information. In some implementations, the method includes: generating one or more of the predefined phrases by cross-correlating contact information in the database with language associated with contact information on the electronic device. In some implementations, the method includes: receiving a request for a contact; and in response to the request for a contact, searching the suggested item of contact information. In some implementations, the method includes: in response to the updating of the contact, refraining from storing the suggested item of contact information in a remote database over a network. In some implementations, the method includes: receiving a request to add the suggested item of contact information to the database; and in response to the request to add the suggested item of contact information to the database, storing the updated contact, without the indication that the item of contact information is a suggested item of contact information, in the database. In some implementations, the method includes: in response to the request to add the suggested item of contact information to the database, storing the updated contact, without the indication that the item of contact information is a suggested item of contact information, in a remote database over a network. In some implementations, the method includes: receiving a request to reject the suggested item of contact information; and in response to the request to reject the suggested item of contact information, preventing the contact from being updated in the future with the suggested item of contact information as a result of the entity and the item of contact information being identified in a future message.

In some implementations, a system is provided that includes: means for receiving a message; means for identifying, in the received message, an entity and an item of contact information associated with the entity; means for determining that a contact associated with the identified entity exists among a plurality of contacts in a database and that the contact does not comprise the identified item of contact information; and means for updating, in response to the determining, the contact to comprise the item of contact information and an indication that the item of contact information is a suggested item of contact information.

In one more aspect, a method is provided that is performed at an electronic device (e.g., device 100, FIG. 1A, implemented in accordance with any of the configurations shown in FIG. 1E). The method includes: receiving a message; identifying, in the received message, an entity and contact information associated with the entity; generating an indication that the identified contact information is suggested contact information; and displaying a first user interface corresponding to a contact associated with the entity, the first user interface comprising a first user interface object, based on the generated indication, indicating that the identified contact information is suggested contact information. In some implementations, the method includes: preventing an input corresponding to a selection of the suggested contact information from invoking an application to contact the entity. In some implementations, the method includes: detecting an input corresponding to a selection of the suggested contact information in the first user interface; and in response to the detection of the input corresponding to a selection of the suggested contact information in the first user interface, displaying a second user interface comprising a second user interface object associated with the identified contact information that, when selected, causes the electronic device to add the identified contact information to a database. In some implementations, the second user interface comprises a third user interface object associated with the identified contact information that, when selected, causes the electronic device to cease displaying the second user interface object. In some implementations, displaying the second user interface ceases displaying the first user interface. In some implementations, the second user interface displays at least a portion of the message. In some implementations, the method includes: detecting an input corresponding to a selection of the displayed message; and in response to the detection of the input corresponding to a selection of the displayed message, invoking an application to open the message. In some implementations, the message comprises an email and the application comprises an email application. In some implementations, the method includes: detecting an input corresponding to a selection of the suggested contact information in the second user interface; and in response to the detection of the input corresponding to a selection of the suggested contact information in the second user interface, invoking an application to contact the entity using the identified contact information. In some implementations, the method includes: in response to the detection of the input corresponding to a selection of the suggested contact information in the second user interface, adding the identified contact information to the database. In some implementations, the method includes: in response to adding the identified contact information to the database, ceasing display of the first user interface object.

In some implementations, a system is provided that includes: means for receiving a message; means for identifying, in the received message, an entity and contact information associated with the entity; means for generating an indication that the identified contact information is suggested contact information; and means for displaying a first user interface corresponding to a contact associated with the entity, the first user interface comprising a first user interface object, based on the generated indication, indicating that the identified contact information is suggested contact information.

In yet one more aspect, a method is provided that is performed at an electronic device (e.g., device 100, FIG. 1A, implemented in accordance with any of the configurations shown in FIG. 1E). The method includes: receiving a message; identifying, in the received message, an entity and contact information associated with the entity; and displaying a first user interface corresponding to the received message, the first user interface comprising: a first portion comprising content of the message as received by the electronic device; and a second portion comprising: a first user interface object corresponding to the identified entity; a second user interface object corresponding to the identified contact information; and a third user interface object associated with the identified contact information that, when selected, causes the electronic device to add the identified contact information to a database. In some implementations, the second portion comprises a fourth user interface object associated with the identified contact information that, when selected, causes the electronic device to cease displaying the third user interface object. In some implementations, the message comprises an email. In some implementations, the identified entity comprises a name and the identified contact information comprises a phone number, address, business or social networking handle.

In some implementations, a system is provided that includes: means for receiving a message; means for identifying, in the received message, an entity and contact information associated with the entity; and means for displaying a first user interface corresponding to the received message, the first user interface comprising: a first portion comprising content of the message as received by the electronic device; and a second portion comprising: a first user interface object corresponding to the identified entity; a second user interface object corresponding to the identified contact information; and a third user interface object associated with the identified contact information that, when selected, causes the electronic device to add the identified contact information to a database.

In still one more aspect, a method is provided that is performed at an electronic device (e.g., device 100, FIG. 1A, implemented in accordance with any of the configurations shown in FIG. 1E). The method includes: receiving a message; identifying, in the received message, event information; and generating a calendar event associated with the identified event information, the generated calendar event comprising the event information and an indication that the generated calendar event is a suggested calendar event. In some implementations, the identified event information comprises a date and a time. In some implementations, the identifying comprises: identifying a format of content in the message; identifying a template from a collection of predefined templates that is configured to recognize event information in the format of the content in the message; and analyzing the content with the identified template for the event information. In some implementations, the message comprises an email and the content comprises a reservation.

In some implementations, the method includes: updating the collection of predefined templates over a network. In some implementations, the identifying comprises: identifying in the message one or more references to a date and time based on a collection of predefined references to a date and time; and analyzing the one or more identified references to a date and time for the event information. In some implementations, the method includes: updating the collection of predefined references to a date and time over a network. In some implementations, the method includes: downgrading one or more of the predefined references to a date and time as a result of a request to reject the suggested calendar event. In some implementations, the method includes: generating one or more of the predefined references to a date and time by cross-correlating event information in a database comprising a plurality of calendar events with language associated with event information on the electronic device. In some implementations, the method includes: receiving a request for a calendar event; and in response to the request for a calendar event, searching the suggested calendar event. In some implementations, the method includes: in response to the generation of the calendar event, refraining from storing the suggested calendar event in a remote database over a network. In some implementations, the method includes: receiving a request to add the suggested calendar event to a database comprising a plurality of calendar events; and in response to the request to add the suggested calendar event to the database, storing the generated calendar event, without the indication that the generated calendar event is a suggested calendar event, in the database. In some implementations, the method includes: in response to the request to add the suggested calendar event to the database, storing the generated calendar event, without the indication that the generated calendar event is a suggested calendar event, in a remote database over a network. In some implementations, the method includes: receiving a request to reject the suggested calendar event; and in response to the request to reject the suggested calendar event, preventing the suggested calendar event from being generated in the future as a result of the event information being identified in a future message.

In some implementations, a system is provided that includes: means for receiving a message; means for identifying, in the received message, event information; and means for generating a calendar event associated with the identified event information, the generated calendar event comprising the event information and an indication that the generated calendar event is a suggested calendar event.

In still an additional aspect, a method is provided that is performed at an electronic device (e.g., device 100, FIG. 1A, implemented in accordance with any of the configurations shown in FIG. 1E). The method includes: receiving a message; identifying, in the received message, event information; and displaying a first user interface corresponding to the received message, the first user interface comprising: a first portion comprising content of the message as received by the electronic device; and a second portion comprising: a first user interface object corresponding to the identified event information; and a second user interface object associated with the identified event information that, when selected, causes the electronic device to add the identified event information to a database comprising a plurality of calendar events. In some implementations, the second portion comprises a third user interface object associated with the identified event information that, when selected, causes the electronic device to cease displaying the second user interface object. In some implementations, the message comprises an email. In some implementations, the identified event information comprises a date and a time. In some implementations, a system is provided that includes: means for receiving a message; means for identifying, in the received message, event information; and means for displaying a first user interface corresponding to the received message, the first user interface comprising: a first portion comprising content of the message as received by the electronic device; and a second portion comprising: a first user interface object corresponding to the identified event information; and a second user interface object associated with the identified event information that, when selected, causes the electronic device to add the identified event information to a database comprising a plurality of calendar events.

In still one more additional aspect, a method is provided that is performed at an electronic device (e.g., device 100, FIG. 1A, implemented in accordance with any of the configurations shown in FIG. 1E). The method includes: receiving a message; identifying, in the received message, multiple instances of contact or event information; and displaying a first user interface corresponding to the received message, the first user interface comprising: a first portion comprising content of the message as received by the electronic device; and a second portion that, when selected, causes the electronic device to display a second user interface comprising a list of the multiple instances of identified contact or event information. In some implementations, the method includes: detecting an input corresponding to a selection of the second portion of the first user interface; and in response to the detection of the input corresponding to a selection of the second portion of the first user interface, displaying the second user interface comprising: the list of the multiple instances of identified contact or event information; and for each of the multiple instances of identified contact or event information, a first user interface object that, when selected, causes the electronic device to add the identified information to a database. In some implementations, the second user interface comprises, for each of the multiple instances of identified contact or event information, a second user interface object that, when selected, causes the electronic device to cease displaying the first user interface object. In some implementations, the second user interface comprises a third user interface object that, when selected, causes the electronic device to add each of a grouping of the multiple instances of identified contact or event information to a database. In some implementations, displaying the second user interface ceases displaying the first user interface.

In some implementations, a system is provided that includes: means for receiving a message; means for identifying, in the received message, multiple instances of contact or event information; and means for displaying a first user interface corresponding to the received message, the first user interface comprising: a first portion comprising content of the message as received by the electronic device; and a second portion that, when selected, causes the electronic device to display a second user interface comprising a list of the multiple instances of identified contact or event information.

In some implementations, an electronic device is provided, the electronic device including: one or more processors; memory; and one or more programs, wherein the one or more programs are stored in the memory and configured to be executed by the one or more processors, the one or more programs including instructions for performing any of the methods described above in this section. In some implementations, computer readable storage medium is provided, the computer readable storage medium storing one or more programs, the one or more programs comprising instructions, which, when executed by an electronic device, cause the device to perform any of the methods described in this section. In some implementations, a system is provided that includes means for performing any of the methods described in this section.

Section 5: Decision Tree Segmentation of Generative Models for Learning Complex User Patterns in the Context of Data Sparsity The material in this section "Decision Tree Segmentation of Generative Models for Learning Complex User Patterns in the Context of Data Sparsity" describes decision tree segmentation of generative modules for learning complex user patterns in the context of data sparsity, in accordance with some embodiments, and provides information that supplements the disclosure provided in this section. For example, portions of this section describe ways to suggest applications responsive to an event on a device, which supplements the disclosures provided in this section, e.g., those related to populating affordances corresponding to applications and deep links within the predictions portion 930 of FIGS. 9B-9C. In some embodiments, the prediction models described in this section are used to help identify appropriate applications for prediction and display to a user (i.e., these prediction models are used in conjunction with methods 600, 800, 1000, and 1200).

Brief Summary for Decision Tree Segmentation of Generative Models for Learning Complex User Patters in the Context of Data Sparsity Embodiments can provide systems, methods, and apparatuses for suggesting one or more applications to a user of a computing device based on an event. Examples of a computing device are a phone, a tablet, a laptop, or a desktop computer. Example events include connecting to an accessory device and changing a power state (e.g., to awake from off or sleeping).

A prediction model can correspond to a particular event. The suggested application can be determined using one or more properties of the computing device. For example, a particular sub-model can be generated from a subset of historical data that are about user interactions after occurrences of the event and that are gathered when the device has the one or more properties (e.g., user interactions of which application is selected after the event of connecting to one's car, with a property of a particular time of day). A tree of sub-models may be determined corresponding to different contexts of properties of the computing device. And, various criteria can be used to determine when to generate a sub-model, e.g., a confidence level in the sub-model providing a correct prediction in the subset of historical data and an information gain (entropy decrease) in the distribution of the historical data relative to a parent model.

Other embodiments are directed to systems, portable consumer devices, and computer readable media associated with methods described in this section.

A better understanding of the nature and advantages of embodiments in this section may be gained with reference to the following detailed description and the accompanying drawings.

Detailed Description for Decision Tree Segmentation of Generative Models for Learning Complex User Patters in the Context of Data Sparsity Embodiments can provide a customized and personalized experience for suggesting an application to a user of a device, thereby making use of the device easier. A user can have an extensive set of interactions with the user device (e.g., which applications are launched or are running in association with an event) that occur after specific events. Examples of a computing device are a phone, a tablet, a laptop, or a desktop computer. Example events include connecting to an accessory device and changing a power state (e.g., to awake from off or sleeping).

Each data point in the historical data can correspond to a particular context (e.g., corresponding to one or more properties of the device), with more and more data for a particular context being obtained over time. This historical data for a particular event can be used to suggest an application to a user. As different users will have different historical data, embodiments can provide a personalized experience.

To provide an accurate personalized experience, various embodiments can start with a broad model that is simply trained without providing suggestions or that suggests a same set of application(s) for a variety of contexts. With sufficient historical data, the broad model can be segmented into sub-models, e.g., as a decision tree of sub-models, with each sub-model corresponding to a different subset of the historical data. Then, when an event does occur, a particular sub-model can be selected for providing a suggested application corresponding to a current context of the device. Various criteria can be used to determine when to generate a sub-model, e.g., a confidence level in the sub-model providing a correct prediction in the subset of historical data and an information gain (entropy decrease) in the distribution of the historical data relative to a parent model.

In some embodiments, a "confidence level" corresponds to a probability that a model can make a correct prediction (i.e., at least one of the predicted application(s) was chosen after the event) based on the historical data. An example of a confidence level is the percentage of events where a correct prediction was made. Another example uses a cumulative distribution function (CDF) of a probability distribution (e.g., beta distribution) generated from the number of correct and incorrect predictions. The CDF can be computed by integrating the probability distribution. In various implementations, the confidence level can be the amount of increase in the CDF past an input value (e.g., between 0 and 1, with 1 corresponding to a correct prediction) or the input value providing a specified CDF past the input value. The probability of an application being selected can be required to be a threshold probability, which is the corollary of the model having a confidence level above a confidence threshold. The confidence level can be inversely proportional to a measure of entropy, and thus an increase in confidence level from a parent model to a sub-model can correspond to decrease in entropy.

Accordingly, some embodiments can decide when and how to segment the user's historical data in the context of user recommendations. For example, after collecting a period of user activity, embodiments can accumulate a list of possible segmentation candidates (e.g. location, day of week, etc.). Embodiments can also train a model on the entire dataset and compute a metric of the confidence in the joint distribution of the dataset and the model. A set of models can be trained, one for each of the segmented datasets (i.e., subsets), and then measure the confidence of each of the data model distributions. If the confidence of all data model distributions is admissible, embodiments can perform the segmentation (split) and then recursively examine the segmented spaces for additional segmentations.

In this way, some embodiments can use inference to explore the tradeoff between segmentation and generalization, creating more complex models for users who have more distinct, complex patterns, and simple, general models for users who have noisier, simpler patterns. And, some embodiments can generate a tree of probabilistic models based on finding divergence distributions among potential candidate models.

I. Suggesting Application Based on Event

Embodiments can suggest an application based upon an event, which may be limited to certain predetermined events (also called triggering events). For instance, a music application can be suggested when headphones are inserted into a headphone jack. In some embodiments, contextual information may be used in conjunction with the event to identify an application to suggest to a user. As an example, when a set of headphones are inserted into a headphone jack, contextual information relating to location may be used. If the device is at the gym, for instance, application A may be suggested when headphones are inserted into the headphone jack. Alternatively, if the device is at home, application B may be suggested when the headphones are inserted into the headphone jack. Accordingly, applications that are likely to be used under certain contexts may be suggested at an opportune time, thus enhancing user experience.

In some embodiments, "contextual information" refers collectively to any data that can be used to define the context of a device. The contextual information for a given context can include one or more contextual data, each corresponding to a different property of the device. The potential properties can belong to different categories, such as a time category or a location category. We contextual data is used as a feature of a model (or sub-model), the data used to train the model can include different properties of the same category. A particular context can correspond to a particular combination of properties of the device, or just one property.

FIG. 35_1 is a flow chart of a method 35_100 for suggesting an application based upon a detected event according to embodiments of the present invention. Method 35_100 can be performed by a mobile device (e.g., a phone, tablet) or a non-mobile device and utilize one or more user interfaces of the device.

In some embodiments, a "user interface" corresponds to any interface for a user to interact with a device. A user interface for an application allows for a user to interact with the application. The user interface could be an interface of the application when the application is running. As another example, the user interface can be a system interface that provides a reduced set of applications for users to select from, thereby making it easier for a user to use the application.

At block 35_110, an event is detected. In some embodiments, it can be determined whether the event is a triggering event for suggesting an application. In some implementations, a determination of a suggested application is only made for certain predetermined events (e.g., triggering events). In other implementations, a determination of the suggested application can be made for dynamic list of events, which can be updated based on historical user interactions with applications on the device.

In some embodiments, a triggering event can be identified as sufficiently likely to correlate to unique operation of the device. A list of events that are triggering events can be stored on the device. Such events can be a default list and be maintained as part of an operating system and may or may not be configurable by a user.

A triggering event can be an event induced by a user and/or an external device. For instance, the triggering event can be when an accessory device is connected to the mobile device. Examples include inserting headphones into a headphone jack, making a Bluetooth connection, turning on the device, waking the device up from sleep, arriving at a particular location (e.g., a location identified as being visited often), and the like. In this example, each of these events can be classified as a different triggering event, or the triggering event can collectively be any accessory device connecting to the mobile device. As other examples, a triggering event can be a specific interaction of the user with the device. For example, the user can move the mobile device in a manner consistent with running, where a running state of the device is a triggering event. Such a running state (or other states) can be determined based on sensors of the device.

At block 35_120, an application associated with the event is identified. As an example, a music application can be identified when the headphones are inserted into the headphone jack. In some embodiments, more than one application can be identified. A prediction model can identify the associated application, where the prediction model may be selected for the specific event. The prediction model may use contextual information to identify the application, e.g., as different application may be more likely to be used in different contexts. Some embodiments can identify applications only when there is a sufficient probability of being selected by a user, e.g., as determined from historical interactions of the user with the device.

The prediction model can be composed of sub-models, each for different combinations of contextual data. The different combinations can have differing amounts of contextual data. The sub-models can be generated in a hierarchical tree, with the sub-models of more specific combinations being lower in a hierarchical tree. In some embodiments, a sub-model can be generated only if the sub-model can predict an application with greater accuracy than a model higher in the tree. In this manner, a more accurate prediction can be made for which application the user will select. In some embodiments, the prediction model and sub-models may identify the top N applications (e.g., a fixed number of a percentage) that are chosen by the user after the event when there is a particular combination of contextual data.

Contextual information may specify one or more properties of the device for a certain context. The context may be the surrounding environment (type of context) of the device when the triggering event is received. For instance, contextual information may be the time of day that the event is detected. In another example, contextual information may be a certain location of the device when the event is detected. In yet another example, contextual information may be a certain day of year at the time the triggering event is detected. Such contextual information may provide more meaningful information about the context of the device such that the prediction engine may accurately suggest an application that is likely to be used by the user in that context. Accordingly, prediction engine utilizing contextual information may more accurately suggest an application to a user than if no contextual information were utilized.

At block 35_130, an action is performed in association with the application. In an embodiment, the action may be the displaying of a user interface for a user to select to run the application. The user interface may be provided in various ways, such as by displaying on a screen of the device, projecting onto a surface, or providing an audio interface.

In other embodiments, an application may run, and a user interface specific to the application may be provided to a user. Either of the user interfaces may be provided in response to identifying the application, e.g., on a lock screen. In other implementations, a user interface to interact with the application may be provided after a user is authenticated (e.g., by password or biometric), but such a user interface would be more specific than just a home screen, such as a smaller list of suggested applications to run.

In some embodiments, a "lock screen" is a screen that is shown when a user has not been authenticated, and therefore the device is locked from most usage. Some functionality can be exposed, e.g., a camera. In some embodiments, if a user interface corresponding to a suggested application is exposed on a lock screen, then some functionality associated with the suggested application can be obtained. For example, the application could be run. The functionality may be limited if the application is run from a lock screen, and the limited functionality may be expanded when the user is authenticated.

In some embodiments, a "home screen" is a screen of a device that appears when a device is first powered on. For a mobile device, a home screen often shows an array of icons corresponding to various applications that can be run on the device. Additional screens may be accessed to browse other applications not appearing on the home screen.

II. Segmentation

Each time a particular event occurs (e.g., plugging in headphones or powering up the device), the device can track which application(s) is used in association with the event. In response to each occurrence of the particular event, the device can save a data point corresponding to a selected application, action performed with the application, and the event. In various embodiments, the data points can be saved individually or aggregated, with a count being determined for the number of times a particular application is selected, which may include a count for a specific action. Thus, different counts a determine for different actions for a same selected application. This historical data the previous user interactions with the device can be used as an input for determining the prediction model, and for determining whether and how many sub-models are to be created.

Once a particular event is detected, a prediction model corresponding to the particular event can be selected. The prediction model would be determined using the historical data corresponding to the particular event as input to a training procedure. However, the historical data might occur in many different contexts (i.e., different combinations of contextual information), with different applications being selected in different contexts. Thus, in aggregate, the historical data might not provide an application that will clearly be selected with a particular event occurs.

A model, such as a neural network or regression, can be trained to identify a particular application for a particular context, but this may be difficult when all of the corresponding historical data is used. Using all the historical data can result in over-fitting the prediction model, and result in lower accuracy. Embodiments of the present invention can segment the historical data into different input sets of the historical data, each corresponding to different contexts. Different sub-models can be trained on different input sets of the historical data.

Segmentation can improve performance of a machine learning system. In one step of segmentation, the input space can be divided into two subspaces, and each of these subspaces can be solved independently with a separate sub-model. Such a segmentation process can increase the number of free parameters available to the system and can improve training accuracy, but at the cost of diluting the amount of data in each model, which can reduce the accuracy of the system when the system is shown new data, e.g., if the amount of data for a sub-model is small. Embodiments can segment the input space only when the joint distributions of the data and the model parameters created from the resulting subspaces are confident.

A. Different Models Based on Different Contextual Data

When a particular event occurs, the device could be in various contexts, e.g., in different locations, at different times, at different motion states of the device (such as running, walking, driving in a car, or stationary,), or at different states of power usage (such as being turned or transitioning from a sleep mode). The contextual information can be retrieved in association with the detected event, e.g., retrieved after the event is detected. The contextual information can be used to help predict which application might be used in connection with the detected event. Different motion states can be determined using motion sensors, such as an accelerometer, a gyrometer, or a GPS sensor.

Embodiments can use the contextual information in various ways. In one example, a piece of the contextual data (e.g., corresponding to one property of the device) can be used as a feature of a particular sub-model to predict which application(s) are most likely to be selected. For example, a particular location of the device can be provided as an input to a sub-model. These features are part of the composition of the sub-model.

In another example, some or all of the contextual data of the contextual information can be used in a segmentation process. A certain piece of contextual data can be used to segment the input historical data, such that a particular sub-model is determined only using historical data corresponding to the corresponding property of that piece of contextual data. For example, a particular location of the device would not be used as an input to the sub-model, but would be used to select which sub-model to use, and correspondingly which input data to use to generate the particular sub-model.

Thus, in some embodiments, certain contextual data can be used to identify which sub-model to use, and other contextual data can be used as input to the sub-model for predicting which application(s) that the user might interact with. A particular property (e.g., a particular location) does not correspond to a particular sub-model, that particular property can be used as a future (input) to the sub-model that is used. If the particular property does correspond to a particular sub-model, the use of that property can become richer as the entire model is dedicated to the particular property.

One drawback of dedicating a sub-model to a particular property (or combination of properties) is that there may not be a large amount of the historical data corresponding to that particular property. For example, the user may have only performed a particular event (e.g., plugging in headphones) at a particular location a few times. This limited amount of data is also referred as data being sparse. Data can become even more sparse when combinations of properties are used, e.g., a particular location at a particular time. To address this drawback, embodiments can selectively determine when to generate a new sub-model as part of a segmentation process.

B. Segmenting as More Data is Obtained

When a user first begins using a device, there would be no historical data for making predication about actions the use might take with an application after a particular event. In an initial mode, historical data can be obtained while no predictions are provided. As more historical data to obtained, determinations can be made about whether to segment the prediction model into sub-models. With even more historical data, sub-models can be segmented into further sub-models. When limited historical data is available for user interactions with the device, no actions can be taken or more general model can be used, as examples.

FIG. 35_2 shows a segmentation process 35_200 according to embodiments of the present invention. Segmentation process 35_200 can be performed by a user device (e.g., a mobile device, such as a phone), which can maintain data privacy. In other embodiments, segmentation process 35_200 can be performed by a server in communication with the user device. Segmentation process 35_200 can be performed in parts over a period of time (e.g., over days, months, or years), or all of segmentation process 35_200 can be performed together, and potentially redone periodically. Segmentation process 35_200 can execute as a routine of a prediction engine.

FIG. 35_2 shows a timeline 35_230 that corresponds to more data being collected. As more data is collected, a prediction model can be segmented into sub-models. At different points of collecting data, a segmentation may occur (e.g., segmentation 35_201). As even more data is obtained, another segmentation may occur. Although FIG. 35_2 shows new sub-models for certain segmentations occurring at different points along timeline 35_230, each segmentation can involve completely redoing the segmentation, which may or may not result in the same sub-models being created as in a previous segmentation.

In this example, event model 35_205 can correspond to a particular event (e.g., connecting to a particular device, such as a car). Event model 35_205 can correspond to a top level of a prediction engine for the particular event. At the beginning, there can be just one model for the particular event, as minimal historical data is available. At this point, event model 35_205 may just track the historical data for training purposes. Event model 35_205 can make predictions and compared those predictions to the actual results (e.g., whether user to interact with predicted application within a specified time after the event is detected). If no applications have a probability greater than a threshold, no action may be performed when the particular event occurs.

In some embodiments, event model 35_205 only uses data collected for the particular device. In other embodiments, event model 35_205 can be seeded with historical data aggregated from other users. Such historical data may allow event model 35_205 can provide some recommendations, which can then allow additional data points to be obtained. For example, it can be tracked whether a user interacts with a suggested application via a user interface, which can provide more data points than just whether a user does select an application.

As more data is collected, a determination can be made periodically as to whether a segmentation should occur. Such a determination can be based on whether greater accuracy can be achieved via the segmentation. The accuracy can be measured as a level of probability that a prediction can be made, which is described in more detail below. For example, if an application can be predicted with a higher level of probability for a sub-model than with event model 35_205, then a segmentation may be performed. One or more other criteria can also be used to determine whether a sub-model should be created as part of segmentation process. For example, a criterion can be that a sub-model must have a statistically significant amount of input historical data before the sub-model is implemented. The requirement of the amount of data can provide greater stability to the sub-model, and ultimately greater accuracy as a model trained on a small amount of data can be inaccurate.

At segmentation 35_201, it is determined to segment event model 35_205 into gym sub-model 35_210 and another sub-model 35_240. This segmentation can occur the user has definitive behavior for a particular context. In this example, there is definitive behavior when the context is that the device is located at the gym, which may be a specific gym or any gym, as can be determined by cross-referencing a location restored locations of businesses. Such a cross-referencing can use external databases stored on servers. The definitive behavior can be measured when gym sub-model 35_210 can predict a correct application that is selected by the user with greater probability than event model 35_205.

As part of segmentation 35_201, the input historical data is used for generating gym sub-model 35_210 is used for generating a sub-model 35_240, which corresponds to all other contexts besides the gym. Other sub-model 35_240 can be used to predict applications that the user might interact with when the context is something other than the gym.

At segmentation 35_202 after more data has been gathered, it is determined that a further segmentation can be made from event model 35_205 to generate supermarket model 35_220. This determination may be made after a sufficient number of data points have been obtained at a supermarket such that supermarket model 35_220 can make a prediction with sufficient confidence. A sufficient confidence can be measured relative to the confidence obtained from other sub-model 35_240. Once supermarket sub-model 35_220 can predict an application greater confidence and the other sub-model 35_240, the segmentation can be performed. After segmentation 35_202, a sub-model 35_240 would correspond to any other context besides the gym and the supermarket.

At segmentation 35_203 after even more data has been gathered, it is determined that a segmentation can be made of gym sub-model 35_210. In this instance, it is determined that an application can be predicted with higher confidence in the historical data for the gym is segmented into specific times, specifically afternoon times (e.g., 12-4). Thus, when a user is at the gym in the afternoon, afternoon gym sub-model 35_211 can be used to predict which application(s) the user might interact with. If the user is the gym for any other times, gym sub-model 35_210 can be used, which is equivalent to having some other sub-model at a position in the tree, i.e., in a similar manner as other sub-model 35_240 is depicted.

At segmentation 35_204 after even more data has been gathered, it is determined that a further segmentation can be made of gym sub-model 35_210 to generate morning gym sub-model 35_212. In this instance, sufficient historical data has been gathered for morning times that an application can be predicted with greater accuracy than using a more general gym sub-model 35_210 (which would only use data not corresponding to afternoon gym sub-model 35_211).

1. Default Model

When a device is first obtained (e.g., brought) by a user, a default model can be used. The default model could apply to a group of events (e.g., all events designated as triggering events). As mentioned above, the default model can be seeded is aggregate data from other users. In some embodiments, the default model can simply pick the most popular application, regardless of the context, e.g., as not enough data is available for any one context. Once more data is collected, the default model can be discarded.

In some embodiments, the default model can have hard-coded logic that specifies predetermined application(s) to be suggested and actions to be performed. In this manner, a user can be probed for how the user responds (e.g., a negative response is a user does not select a suggested application), which can provide additional data that simply tracking for affirmative responses are user. In parallel with such a default model, a prediction model can be running to compare its prediction against the actual result. A prediction model can then be refined in response to the actual result. When the prediction model has sufficient confidence, the switch can be made from the default model to the prediction model. Similarly, the performance of a sub-model can be tracked. When the sub-model has sufficient confidence, the sub-model can be used for the given context.

2. Initial Training

A prediction model (e.g., event model 35_205) can undergo initial training using historical data collected so far, where the model does not provide suggestions to a user. This training can be called initial training. The prediction model can be updated periodically (e.g., every day) as part of the background process, which may occur when the device is charging and not in use. The training may involve optimizing coefficients of the model so as to optimize the number of correct predictions and compared to the actual results in historical data. In another example, the training may include identifying the top N (e.g., a predetermined number a predetermined percentage) applications actually selected. After the training, the accuracy of the model can be measured to determine whether the model should be used to provide a suggested application (and potential corresponding action) to the user.

Once a model is obtaining sufficient accuracy (e.g., top selected application is being selected with a sufficiently high accuracy), then the model can be implemented. Such an occurrence may not happen for a top-level model (e.g., event model 35_205), but may occur when sub-models are tested for specific contexts. Accordingly, such an initial training can be performed similarly for a sub-model.

As historical information accumulates through use of the mobile device, prediction models may be periodically trained (i.e., updated) in consideration of the new historical information. After being trained, prediction models may more accurately suggest applications and actions according to the most recent interaction patterns between the user and the mobile device. Training prediction models may be most effective when a large amount of historical information has been recorded. Thus, training may occur at intervals of time long enough to allow the mobile device to detect a large number of interactions with the user. However, waiting too long of a period of time between training sessions may hinder adaptability of the prediction engine. Thus, a suitable period of time between training sessions may be between 15 to 20 hours, such as 18 hours.

Training prediction models may take time and may interfere with usage of the mobile device. Accordingly, training may occur when the user is most unlikely going to use the device. One way of predicting that the user will not use the device is by waiting for a period of time when the device is not being used, e.g., when no buttons are pressed and when the device is not moving. This may indicate that the user is in a state where the user will not interact with the phone for a period of time in the near future, e.g., when the user is asleep. Any suitable duration may be used for the period of time of waiting, such as one to three hours. In a particular embodiment, the period of time of waiting is two hours.

At the end of the two hours, prediction models may be updated. If, however, the user interacts with the mobile device (e.g., presses a button or moves the device) before the end of the two hours, then the two hour time period countdown may restart. If the time period constantly restarts before reaching two hours of inactivity, then the mobile device may force training of prediction models after an absolute period of time. In an embodiment, the absolute period of time may be determined to be a threshold period of time at which user friendliness of the mobile device begins to decline due to out-of-date prediction models. The absolute period of time may range between 10 to 15 hours, or 12 hours in a particular embodiment. Accordingly, the maximum amount of time between training may be between 28 hours (18+10 hours) to 33 hours (18+15 hours). In a particular embodiment, the maximum amount of time is 30 hours (18+12 hours).

III. Selecting Model Based on Contextual Information

A prediction model and any sub-models can be organized as a decision tree, e.g., as depicted in FIG. 35_2. The sub-models of the decision tree can also be referred to as nodes. Each node of the decision tree can correspond to a different context, e.g., a different combination of contextual data. The decision tree can be traversed using the contextual data of the contextual information to determine which sub-model to use.

A. Traversing Decision Tree

FIG. 35_3 shows a decision tree 35_300 that may be generated according to embodiments of the present invention. Event model 35_305 corresponds to a top-level model of decision tree 35_300. Event model 35_305 can correspond to a particular event, e.g., as mentioned in this section. Event model 35_305 may be selected in response to the detection of the corresponding event. Once the event model 35_305 is selected, a determination can be made about which sub-model to use. Each sub-model can use different historical data, e.g., mutually exclusive sets of data. A different decision tree with different sub-models would exist for different detected events.

A first hierarchal level of decision tree 35_300 corresponds to the location category. Node 35_310 corresponds to location 1, which may be defined as a boundary region (e.g., within a specified radius) of location 1. Node 35_320 corresponds to location 2. Node 35_330 corresponds to location 3. Node 35_340 corresponds to any other locations.

Each of nodes 35_310, 35_320, and 35_330 can be generated if the sub-model can predict an application with greater confidence when the contextual information corresponds to the particular location than the more general node 35_340 can. Nodes 35_310 and 35_320 have further children nodes while node 35_330 does not.

Embodiments can traverse decision tree 35_300 by searching whether any of the nodes 35_310, 35_320, and 35_330 match the contextual information for the particular occurrence. If the contextual information of the user device for a particular occurrence of the event indicates a context including location 3, then a match is found for node 35_330. Since node 35_330 does not have any further children nodes, the sub-model for node 35_330 can be used.

Node 35_310 has two children nodes: node 35_311 and node 35_312. Node 35_311 corresponds to a particular time (time 1), and node 35_312 corresponds to all other times that do not match to time 1. If the contextual information for a current occurrence of the event includes location 1 (and thus a match to node 35_310), then a search can be performed to determine whether the contextual information includes time 1 (i.e., matches to node 35_311). If the contextual information includes time 1 (i.e., in combination with location 1), then the sub-model for node 35_311 can be used to make the prediction. If the contextual information does not include time 1, then the sub-model for node 35_312 can be used to make the prediction.

Node 35_320 has two children nodes: node 35_321 and node 35_322. Node 35_321 corresponds to whether the user device is connected to a particular device (device 1), and node 35_322 corresponds to when the user device is not connected to device 1. If the contextual information for a current occurrence of the event includes location 2 (and thus match to node 35_320), then a search can be performed to determine whether the contextual information includes a connection to device (i.e., matches to node 35_321). If the contextual information includes a connection to device 1 (i.e., in combination with location 2), then the sub-model for node 35_321 can be used to make the prediction. If the contextual information does not include a connection to device 1, then the sub-model for node 35_322 can be used to make the prediction.

Accordingly, once a bottom of the tree is detected, the sub-model of the final node can be used to make the prediction. All of the branches of tree 35_300 can be deterministic with a final node always being selected for the same contextual information. Having all the nodes of a same hierarchal level of decision tree 35_300 correspond to a same category can avoid conflicts in selecting an applicable node. For example, there could be a conflict if a child node of event model 35_305 corresponded to time 1, as that might conflict with node 35_311. In such embodiments, nodes of the same level but underneath different parent nodes can correspond to different categories, as is the case for the set of nodes 35_311 and 35_312 and a set of nodes 35_321 and 35_322.

Once a sub-model has been selected based on the detected event and the contextual information, the selected sub-model can be used to predict what a more applications and any corresponding actions. In some embodiments, which action to take for a predicted application can depend on a level of confidence that the application is predicted.

B. Method

FIG. 35_4 is a flowchart of a method 35_400 for suggesting an application to a user of a computing device based on an event according to embodiments of the present invention. Method 35_400 can be performed by a computing device (e.g., by a user device that is tracking user interactions with the user device). Method 35_400 can use a set of historical interactions including interactions having different sets of one or more properties of the computing device to suggest the application.

At block 35_410, the device detects an event at an input device. Examples of an input device are a headphone jack, a network connection device, a touch screen, buttons, and the like. The event may be any action where the mobile device interacts with an external entity such as an external device or a user. The event can be of a type that recurs for the device. Thus, historical, statistical data can be obtained for different occurrences of the event. Models and sub-models can be trained using such historical data.

At block 35_420, a prediction model corresponding to the event is selected. The selected prediction model may depend on the event. For instance, a prediction model designed for Bluetooth connections may be selected when the event relates to establishing a Bluetooth connection with an external device. As another example, a prediction model designed for headphone connections may be selected when the event relates to inserting a set of headphones into a headphone jack.

At block 35_430, one or more properties of the computing device are received. The one or more properties may be received by an application suggestion engine executing on the device. As mentioned in this section, the properties can correspond to time, location, a motion state, a current or previous power state (e.g., on, off, or sleep), charging state, current music selection, calendar events, and the like. Such one or more properties can correspond to contextual data that defines a particular context of the device. The one or more properties can be measured at a time around the detection of the event, e.g., within some time period. The time period can include a time before and after the detection of the event, a time period just before the detection of the event, or just a time after the detection of the event.

At block 35_440, the one or more properties are used to select a particular sub-model of the prediction model. For example, a decision tree can be traversed to determine the particular sub-model. The particular sub-model can correspond to the one or more properties, e.g., in that the one or more properties can uniquely identify the particular sub-model. This may occur when the decision tree is defined to not have properties of different categories under a same parent node.

The particular sub-model can be generated using a particular subset of historical interactions of the user with the device. The particular subset can result from a segmentation process that increases accuracy by creating sub-models. The particular subset of historical interactions can be obtained by tracking user interactions with the device after occurrences of the event. The computing device has the one or more properties when the particular subset is obtained. Thus, a current context of the device corresponds to the context of the device within which the particular subset of historical interactions was obtained.

At block 35_450, the particular sub-model identifies one or more applications to suggest to the user. The one or more applications can have at least a threshold probability of at least one of the one or more applications being accessed by the user in association with the event. Predicting one of the one or more applications in the historical data can be identified as a correct prediction. The threshold probability can be measured in a variety of ways, and can use a probability distribution determined from the historical data, as is described in more detail below. For example, an average (mean) probability, a median probability, or a peak value of a probability distribution can be required to be above the threshold probability (e.g., above 0.5, equivalent to 50%). Thus, a confidence level can be an average value, median value, or a peak value of the probability distribution. Another example is that the area for the probability distribution above a specific value is greater than the threshold probability.

At block 35_460, a user interface is provided to the user for interacting with the one or more applications. For example, the device may display the identified applications to the user via an interface with which the user may interact to indicate whether the user would like to access the identified applications. For instance, the user interface may include a touch-sensitive display that shows the user one or more of the identified applications, and allows the user to access one or more of the applications identified by the device by interacting with the touch-sensitive display. The user interface can allow interactions on a display screen with fewer applications than provided on a home screen of the computing device.

As an example, one or more suggested applications can be provided on a lock screen. The user can select to open the applications from the lock screen, thereby making it easier for the user to interact with the application. The user interface can be provided on other screen, which may occur after activating a button to begin use of the device. For example, a user interface specific to the application can appear after authenticating the user (e.g., via password or biometric).

C. Example Models

In some embodiments, a model can select the top N applications for a given set (or subset) of data. Since the N application has been picked most in the past, it can be predicted that future behavior will mirror past behavior. N can be a predetermined number (e.g., 1, 2, or 3) or a percentage of applications, which may be the percentage of applications actually used in association with the event (i.e., not all applications on the device). Such a model can select the top N applications for providing to the user. Further analysis can be performed, e.g., to determine a probability (confidence) level for each of the N applications to determine whether to provide them to the user, and how to provide them to the user (e.g., an action), which may depend on the confidence level.

In an example where N equals three, the model would return the top three most launched apps when the event occurs with contextual information corresponding to the particular sub-model.

In other embodiments, a sub-model can use a composite signal, where some contextual information is used in determining the predicted application, as opposed to just using the contextual information to select the sub-model. For example, a neural network or a logistic regression model can use a location (or other features) and build sort of a linear weighted combination of those features to predict the application. Such more complex models may be more suitable when an amount of data for a sub-model is significantly large. Some embodiments could switch the type of sub-model used at a particular node (i.e., particular combination of contextual data) once more data is obtained for that node.

IV. Generation of Models and Decision Tree

In some embodiments, the decision tree can be regenerated periodically (e.g., every day) based on the historical data at the time of regeneration. Thus, the decision tree can have different forms on different days. The generation of a child node (a further sub-model) can be governed by the confidence for predicting an application(s) is increased, also referred to as information gain. The generation of a child node can be also governed by whether the data for the child node is statistically significant. In some embodiments, all of the children at a given level (e.g., gym sub-model 35_210 and other sub-model 35_240) can be required to be statistically significant and provide information gain relative to the parent model.

In determining the nodes of the decision tree, segmentation can be performed in various ways to result in different decision trees. For example, a particular location and a particular time could both be used. In some embodiments, the properties of provides the highest increase in information gain (confidence) for predicting an application can be generated higher in the decision. Such a segmentation process can ensure a highest probability of predicting the correct application that a user will interact with.

A. Accuracy Distribution of a Model

The accuracy of a model can be tested against the historical data. For a given event, the historical data can identify which application(s) were used in association with the event (e.g., just before or just after, such as within a minute). For each event, the contextual data can be used to determine the particular model. Further, contextual data can be used as input features to the model.

In an example where the model (or sub-model) selects the top application, a number of historical data points where the top application actually was selected (launched) can be determined as a correct count, and a number of historical data points where the top application was not selected can be determined as an incorrect count. In an embodiment where N is greater than one for a model that selects the top N, the correct count can correspond to any historical data point where one of the top N applications was launched.

The correct count and the incorrect count can be used to determine a distribution specifying how accurate the model is. A binomial distribution can be used as the accuracy distribution. The binomial distribution with parameters m and p is the discrete probability distribution of the number of successes in a sequence of m independent yes/no experiments. Here the yes/no experiments are whether one of the predicted N applications is correct. For example, if the model predicted a music application would be launched, and a music application was launched, then the data point adds to the number of yes (True) experiments. If the music application was not launched (e.g., another application was launched or no application was launched), then the data point adds to the number of no (False) experiments Under Bayes theorem, $$P(A \mid B) = \frac{p(B \mid A)(P(A)}{P(B)}.$$

B is the event of getting a specified determined correct count T and incorrect count F. A is the event of the predicted application being correct. P(A) is a prior (expected) probability of randomly selecting the correct application, which may be assumed to be 1, as no particular application would be expected more than any other, at least without the historical data. P(B) is the probability of the model being correct (which corresponds to the correct count divided by total historical events). P(B|A) is the likelihood function of getting the correct count T and the incorrect count F for a given probability r (namely event A, which can be taken to be 0.5 for equal probability of getting correct or incorrect). P(A|B) is the posterior probability is to be determined, namely the probability of one of the prediction application(s) being selected given the historical data B.

If there is a uniform prior, P(A) disappears and one is left with P(A|B)/P(B), which is equal to Beta[# correct, # incorrect], i.e., the beta distribution with parameters alpha=# correct and beta=# incorrect. Because the beta function is ill-defined for alpha=0 or beta=0, embodiments can assume an initial value of 1 for # correct and # incorrect. Beta[1+# correct, 1+# incorrect] is the binomial distribution.

For Bayesian statistics, the posterior probability $p(\theta|X)$ is the probability of the parameters $\theta$ (e.g., the actual selected application is one of the predicted application) given the evidence X (e.g., correct count and incorrect count of historical data). It contrasts with the likelihood function $p(x|\theta)$, which is the probability of the evidence X (e.g., correct count and incorrect count of historical data) given the parameters (e.g., the predicted application is selected for an event). The two are related as follows: Let us have a prior belief that the probability distribution function is P(θ) (e.g., expected probability that the selected application would be correct) and observations X with the likelihood p(x|θ), then the posterior probability is defined as $$P(\theta \mid X) = \frac{p(X \mid \theta)(P(\theta)}{P(X)}.$$

The posterior probability can be considered as proportional to the likelihood times the prior probability.

Other accuracy distributions can be used. For example, one could use a Dirichlet distribution, which is a multivariate generalization of the beta distribution. The Dirichlet distribution is the conjugate prior of the categorical distribution and multinomial distribution, in a similar manner as the beta distribution is the conjugate prior of the binomial distribution. The Dirichlet has its probability density function returns the belief that the probabilities of K rival events are $x_i$ given that each event has been observed $a_i-1$ times. The Dirichlet distribution can be used generate the entire histogram of app launches (i.e., predicted number of app launches for a particular event) as a multinomial distribution.

Instead, embodiments can separate them into two classes (correct and incorrect) so use a binominal distribution and do not have to provide the entire histogram. Other embodiments could use a Dirichlet distribution (the conjugate prior of the multinomial distribution) to try to solve the harder problem of describing the whole histogram, but this would take more data to be confident since more data needs to be explained.

B. Example Binomial Distributions

FIGS. 35_5A-35_5D show plots of example binomial distributions for various correct numbers and incorrect numbers according to embodiments of the present invention. The plots were generated from Beta[1+# correct, 1+# incorrect]. On the horizontal axis in the plots, a 1 corresponds to a correct prediction and a 0 corresponds to an incorrect prediction. The vertical axis provides a probability for how often the model will be correct. These distributions are also called probability density functions (PDF). The distributions can be normalized for comparisons.

FIG. 35_5A shows a binomial distribution for two correct predictions and two incorrect predictions. Such a model would be equally correct and incorrect, and thus the highest probability is for 0.5. The highest value for 0.5 indicates that it is most probable that the model will get the prediction correct only half the time. Given the low number of data points, the distribution is quite broad. Thus, there is low confidence about the accuracy of the model. There is appreciable probability that the model is less accurate than 50% of the time or more accurate than 50% of the time. But, since the number of data points is low, the confidence in determining the accurate is low.

FIG. 35_5B shows a binomial distribution for 2 correct predictions and 1 incorrect predictions. Such a model is correct 66% of the time. Thus, the peak of the distribution is about at 0.66. But, given the low number of data points, the confidence is very low. There is appreciable probability that the model could be accurate only 10 or 20% of the time.

FIG. 35_5C shows a binomial distribution for four correct predictions and two incorrect predictions. Such a model is also correct 66% of the time But, still given the low number of data points, there is still appreciable probability that the model could be accurate only 30%, once more data is available.

FIG. 35_5D shows a binomial distribution for 40 correct predictions and 20 incorrect predictions. Such a model is also correct 66% of the time. But, given the higher number of data points, there is very low probability that the model could be accurate only 30%. Thus, the distribution shows more confidence in being able to determine that the accuracy of the model is 66%. Further, more of the area under the distribution is to the right of 0.5, and thus one can more confidently determine that the model is accurate at least 50% of time than can be determined for FIG. 35_5B.

C. Statistically Significant

A model can be considered statistically significant if the model can accurately separate the cases where it is correct and wrong with sufficient confidence. The posterior probability distribution determined based on the number of incorrect and correct predictions can be used to determine whether the model is sufficiently accurate with enough confidence.

The required confidence level for statistical significance can be provided in various ways and can have various criteria. The average accuracy (# correct/# total) for the distribution, the peak of the distribution, or median of the distribution can be required to have a certain value. For example, the model can be required to be correct at least 50% of the time, e.g., as measured by the average of the distribution (i.e., greater than 0.5). The # correct/# total is also called the maximum likelihood estimation.

A further criterion (confidence level) can be for the confidence of the accuracy. The confidence can be measured by an integral of the distribution that is above a lower bound (e.g., area of the distribution that is above 0.25 or other value). The area under the distribution curve is also called the cumulative distribution function. In one embodiment, the criteria can be that 95% of the area of the PDF is above 0.25. The point at which the interval [x,1.0] covers 95% of the area under the PDF is called the "lower confidence bound". Thus, if you were right twice and wrong once, you were right 66 percent of the time, but that's not statistically significant because the distribution is very broad, as in in FIG. 35_5B.

Some embodiments will only begin to use a model (e.g., the top-level model or a sub-model) when the model is sufficiently accurate and there is enough confidence in knowing the accuracy. For example, an initial model might get trained for a while before it is used. Only once the accuracy and confidence are above respective thresholds, then might an embodiment begin to use the model to provide suggestions to a user. In some embodiments, a requirement of a certain amount of the area of the PDF can provide a single criterion for determining whether to use the model, as the accuracy can be known to be sufficiently high if the area is sufficiently shifted to the right.

In some embodiments, an initial model could use data from other people to provide more statistics, at least at first. Then, once enough statistics are obtained, then only the data for the specific person can be used. Further, the data specific to the user can be weighted higher, so as to phase out the data from other people.

D. Information Gain (Entropy)

A comparison can be made between a first probability distribution of a model and a second probability distribution of a sub-model to determine whether segment the model. In some embodiments, the comparison can determine whether there is an information gain (e.g., Kullback-Leibler divergence), or equivalently a decrease in entropy. High entropy would have many applications having similar probability of being selected, with maximum entropy having the same probability for all applications. With maximum entropy the likelihood of selecting the correct application is the smallest, since all of the applications have an equal probability, and no application is more probable than another.

Such difference metrics can be used to determine whether a more accurate prediction (including confidence) can be made using the sub-model for the given context that the sub-model would be applied to. If the difference metric is greater than a difference threshold, then a segmentation can be performed. The difference metric can have a positive sign to ensure information is gained. Kullback-Leibler divergence can be used as the difference metric. Other example metrics include Gini impurity and variance reduction.

For example, if there was one model for everything, the model would only pick the top application (e.g., a music application) for all contexts. The music application would be the prediction for all contexts (e.g., the gym, for driving to work, etc.). As sub-models are generated for more specific contexts, then the predictions can become more specific, e.g., when the user goes to the gym a single app dominates, or a particular playlist dominates. Thus, there can be a peak in the number of selections for one application, and then everything else is at zero. Thus, a goal with the decision tree is to maximize the information gain (minimize the entropy).

Further sub-models can be identified when more specific contexts can provide more information gain. For example, the gym in the morning can be a more specific context for when a particular playlist dominates. As another example, connected to the car in the morning can provide for a more accurate prediction of a news application, since the historical data organizes more (decrease in entropy) to have selections of predominantly the news application (or a group of news applications).

FIGS. 35_6A and 35_6B show a parent model and a sub-model resulting from a segmentation according to embodiments of the present invention. FIG. 35_6A shows a binomial distribution for a parent model that provides 80 correct predictions and 60 incorrect predictions. A sub-model can be created from a portion of the historical data used for the parent model. FIG. 35_6B shows a binomial distribution for the sub-model that provides 14 correct predictions and 2 incorrect predictions. Even though the sub-model has fewer data points, the prediction is more accurate, as evidence by the shift toward one, signifying greater accuracy. Thus, entropy has decreased and there is information gain.

E. When to Segment

As mentioned above, various embodiments can use one or more criteria for determining whether to segment a model to generate a sub-model. One criterion can be that a confidence level for making a correct prediction (one of a group of one or more predicted application is selected) is greater than a confidence threshold. For example, the average probability of a correct prediction is greater than an accuracy threshold (example of a confidence threshold). As another example, the CDF of the distribution above a specific value can be required to be above a confidence level.

Another criterion can be that using the sub-model, instead of the model, provides an information gain (decrease in entropy). For example, a value for the Kullback-Leibler divergence can be compared to a difference threshold. The one or more criteria for segmentation can guarantee that the sub-models will outperform the base model. The one or more criteria can be required for all of the sub-models of a parent model, e.g., gym sub-model 35_210 and other sub-model 35_240.

In some instances, the lower confidence bounds can decrease for two sub-models versus the parent model, but still have an information gain and the lower confidence bound above a threshold. The lower confidence bound could increase as well. As long all of the sub-models have a high enough confidence bounds and the information gain is sufficiently positive, embodiments can choose to segment (split) the more general model.

In some embodiments, any accuracy and information gain criteria can be satisfied by ensuring that a confidence level increases as a result of the segmentation. For example, a first property of the device can be selected for testing a first sub-model of a first context, which could include other properties, relative to a parent model. A first subset of the historical interactions that occurred when the computing device had the first property can be identified. The first subset is selected from the set of historical interactions for the parent model and is smaller than the set of historical interactions.

Based on the first subset of historical interactions, the first sub-model can predict at least one application of a first group of one or more applications that the user will access in association with the event with a first confidence level. The first sub-model can be created at least based on the first confidence level being greater than the initial confidence level at least a threshold amount, which may be 0 or more. This threshold amount can correspond to a difference threshold. In some implementations, the first sub-model can be created may not always be created when this criterion is satisfied, as further criteria may be used. If the confidence level is not greater than the initial confidence level another property can be selected for testing. This comparison of the confidence levels can correspond to testing for information gain. The same process can be repeated for determining a second confidence level of a second sub-model (for a second property) of the first sub-model for predicting a second group of one or more applications. A second subset of the historical interactions can be used for the second sub-model. A third property or more properties can be tested in a similar manner.

F. Regeneration of Decision Tree

Embodiments can generate a decision tree of the models periodically, e.g., daily. The generation can use the historical data available at that time. Thus, the decision tree can change from one generation to another. In some embodiments, the decision tree is built without knowledge of previous decision trees. In other embodiments, a new decision tree can be built from such previous knowledge, e.g., knowing what sub-models are likely or by starting from the previous decision tree.

In some embodiments, all contexts are attempted (or a predetermined listed of contexts) to determined which sub-models provide a largest information gain. For example, if location provides the largest information gain for segmenting into sub-models, then sub-models for at least one specific location can be created. At each level of segmentation, contexts can be tested in such a greedy fashion to determine which contexts provide a highest increase in information gain.

In other embodiments, a subset of contexts are selected (e.g., a random selection, which include pseudorandom) for testing whether segmentation is appropriate. Such selection can be advantageous when there are many contexts that could be tested. The contexts can be selected using Monte Carlo based approach, which can use probabilities for which contexts will likely result in a segmentation. A random number can be generated (an example of a random process) and then used to determine which context (for a particular property) to test.

The probabilities can be used as weights such that contexts with higher weights are more likely to be selected in the "random" selection process. The probabilities can be determined based on which sub-models have been generated in the past. For example, if the gym (and potentially a particular time of day was very successful before), then the generation process pick that context with a 90%, 95%, or 99% likelihood, depending on how often it had been picked in the past, and potentially also depending on how high the information gain had been in the past. A certain number of splits would be attempted for each level or for an entire tree generation process.

V. Determination of Action Based on Level of Probability

The prediction model can test not only for the selected application but a specific action, and potentially media content (e.g., a particular playlist). In some embodiments, once the probability of selecting an application is sufficiently accurate, a more aggressive action can be provided than just providing an option to launch. For example, when the application is launched, content can automatically play. Or, the application can automatically launch.

When selecting an application is predicted with sufficient probability (e.g., confidence level is above a high threshold), then the prediction can begin testing actions. Thus, the testing is not just for prediction of an application, but testing whether a particular action can be predicted with sufficient accuracy. The different possible actions (including media items) can be obtained from the historical data. A plurality of actions can be selected to be performed with the one application. Each of the plurality of actions can correspond to one of a plurality of different sub-models of the first sub-model. A confidence level of each of the plurality of different sub-models can be tested to determine whether to generate a second sub-model for at least one of the plurality of actions.

Accordingly, embodiments can be more aggressive with the actions to be performed when there is greater confidence. The prediction model may provide a particular user interface if a particular action has a high probability of being performed. Thus, in some embodiments, the higher the probability of use, more aggressive action can be taken, such as automatically opening an application with a corresponding user interface (e.g., visual or voice command), as opposed to just providing an easier mechanism to open the application.

For example, a base model can have a certain level of statistical significance (accuracy and confidence) that the action might be to suggest the application(s) on the lock screen. As other examples, a higher level of statistical significance can cause the screen to light up (thereby brining attention to the application, just one application can be selected, or for a user interface (UI) of the application can be provided (i.e., not a UI of the system for selecting the application). Some embodiments may take into account the actions being taken when determining whether to segment, and not segment if an action would be lost, which generally would correspond to having an information gain.

The action can depend on whether the model predicts just one application or a group of application. For example, if there is an opportunity to make three recommendations instead of one, then that also would change the probability distribution, as a selection of any one of the three would provide a correct prediction. A model that was not confident for recommendation of one application might be sufficiently confident for three. Embodiments can perform adding another application to a group of application being predicted by the model (e.g., a next most used application not already in the group), thereby making the model more confident. If the model is based on a prediction of more than one application, the user interface provided would then provide for an interaction with more than application, which can affect the form for the UI. For example, all of the applications can be provided on a lock screen, and one application would not automatically launch.

There can also be multiple actions, and a suggestion for different actions. For example, there can be two playlists at the gym as part of the sub-model (e.g., one application is identified but two actions are identified in the model when the two actions have a similar likelihood of being selected). Together the two actions can have statistically significance, whereas separately they did not.

As an example, when the model for an event (e.g., plugging in the headphones) is first being trained, the model may not be confident enough to perform any actions. At an initial level of confidence, an icon or other object could be displayed on a lock screen. At a next higher level of confidence, the screen might light up. At a further level of confidence, a user interface specific to a particular functionality of the application can be displayed (e.g., controls for playing music or a scroll window for accessing top stories of a new application). A next higher level can correspond to certain functionality of the application automatically being launched. The action could be even to replace a current operation of the application (e.g., playing one song) to playing another song or playlist. These different levels could be for various values used to define a confidence level.

Other example actions can include changing a song now playing, providing a notification (which may be front and center on the screen). The action can occur after unlocking the device, e.g., a UI specific to the application can display after unlocking. The actions can be defined using deep links to start specific functionality of an application.

Some embodiments may display a notice to the user on a display screen. The notice may be sent by a push notification, for instance. The notice may be a visual notice that includes pictures and/or text notifying the user of the suggested application. The notice may suggest an application to the user for the user to select and run at his or her leisure. When selected, the application may run. In some embodiments, for more aggressive predictions, the notification may also include a suggested action within the suggested application. That is, a notification may inform the user of the suggested application as well as a suggested action within the suggested application. The user may thus be given the option to run the suggested application or perform the suggested action within the suggested application. As an example, a notification may inform the user that the suggested application is a music application and the suggested action is to play a certain song within the music application. The user may indicate that he or she would like to play the song by clicking on an icon illustrating the suggested song. Alternatively, the user may indicate that he or she would rather run the application to play another song by swiping the notification across the screen.

Other than outputting a suggested application and a suggested action to the user interface in one notification, a prediction engine may output two suggested actions to the user interface in one notification. For instance, prediction engine may output a suggested action to play a first song, and a second suggested action to play a second song. The user may choose which song to play by clicking on a respective icon in the notification. In embodiments, the suggested actions may be determined based on different criteria. For instance, one suggested action may be for playing a song that was most recently played regardless of contextual information, while the other suggested action may be for playing a song that was last played under the same or similar contextual information. As an example, for the circumstance where a user enters into his or her car and the triggering event causes the prediction engine to suggest two actions relating to playing a certain song, song A may be a song that was last played, which happened to be at home, while song B may be a song that was played last time the user was in the car. When the user selects the song to be played, the song may continue from the beginning or continue from where it was last stopped (e.g., in the middle of a song).

In order for a prediction engine to be able to suggest an action, a prediction engine 35_302 may have access to a memory device that stores information about an active state of the device. The active state of a device may represent an action that is performed following selection of the suggested application. For instance, an active state for a music application may be playing a certain song. The active state may keep track of when the song last stopped. In embodiments, historical database may record historical data pertaining to the active state of the device. Accordingly, the prediction engine may suggest an action to be run by the suggested application.

VI. Architecture

FIG. 35_7 shows an example architecture 35_700 for providing a user interface to the user for interacting with the one or more applications. Architecture 35_700 shows elements for detecting events and providing a suggestion for an application. Architecture 35_700 can also provide other suggestions, e.g., for suggesting contacts. Architecture 35_700 can exist within a user device (e.g., device 100, FIG. 1A).

At the top are UI elements. As shown, there is a lock screen 35_710, a search screen 35_720, and a voice interface 35_725. These are ways that a user interface can be provided to a user. Other UI elements can also be used.

At the bottom, are data sources. An event manager 35_742 can detect events and provide information about the event to an application suggestion engine 35_740. In some embodiments, event manager can determine whether an event triggers a suggestion of an application. A list of predetermined events can be specified for triggering an application suggestion. Location unit 35_744 can provide a location of the user device. As examples, location unit 35_744 can include GPS sensor and motion sensors. Location unit 35_744 can also include other applications that can store a last location of the user, which can be sent to application suggestion engine 35_740. Other contextual data can be provided from other context unit 35_746.

Application suggestion engine 35_740 can identify one or more applications, and a corresponding action. At a same level as application suggestion engine 35_740, a contacts suggestion engine 35_750 can provide suggested contacts for presenting to a user.

The suggested application can be provided to a display center 35_730, which can determine what to provide to a user. For example, display center 35_730 can determine whether to provide a suggested application or a contacts. In other examples, both the application(s) and contact(s) can be provided. Display center can determine a best manner for providing to a user. The different suggestions to a user may use different UI elements. In this manner, display center 35_730 can control the suggestions to a user, so that different engines do not interrupt suggestions provided by other engines. In various embodiments, engines can push suggestions (recommendations) to display center 35_730 or receive a request for suggestions from display center 35_730. Display center 35_730 can store a suggestion for a certain amount of time, and then determine to delete that suggestion if the suggestion has not been provided to a user, or the user has not interacted with the user interface.

Display center 35_730 can also identify what other actions are happening with the user device, so as to devise when to send the suggestion. For example, if the user is using an application, a suggestion may not be provided. Display center 35_730 can determine when to send the suggestion based on a variety of factors, e.g., motion state of device, whether lock screen is on or whether authorized access has been provided, whether user is using the device, etc.

In some embodiments, the software components included on device 100 (FIG. 1A) include an application suggestion module. The application suggestion module can include various sub-modules or systems, e.g., as described above in FIG. 35_7. The application suggestion module can perform all or part of method 37_400.

Example Methods, Devices Systems, and Computer-Readable Media for Decision Tree Segmentation of Generative Models for Learning Complex User Patterns in the Context of Data Sparsity Systems, methods, and apparatuses are provided in this section for suggesting one or more applications to a user based on an event. A prediction model can correspond to a particular event. The suggested application can be determined using one or more properties of the computing device. For example, a particular sub-model can be generated from a subset of historical data that are about user interactions after occurrences of the event and that are gathered when the device has the one or more properties. A tree of sub-models may be determined corresponding to different contexts of properties of the computing device. And, various criteria can be used to determine when to generate a sub-model, e.g., a confidence level in the sub-model providing a correct prediction in the subset of historical data and an information gain (entropy decrease) in the distribution of the historical data relative to a parent model.

In some embodiments, a method for suggesting one or more applications to a user of a computing device based on an event is provided, the method including, at the computing device: detecting the event at an input device of the computing device, the event being of a type that recurs for the computing device; selecting a prediction model corresponding to the event; receiving one or more properties of the computing device; using the one or more properties to select a particular sub-model of the prediction model, the particular sub-model corresponding to the one or more properties, wherein the particular sub-model is generated using a particular subset of historical interactions of the user with the computing device, the particular subset of historical interactions occurring after the event is detected and when the computing device has the one or more properties; identifying, by the particular sub-model, the one or more applications to suggest to the user, the one or more applications having at least a threshold probability of at least one of the one or more applications being accessed by the user in association with the event; and providing a user interface to the user for interacting with the one or more applications.

In some embodiments, the user interface is provided on a display screen with fewer applications than provided on a home screen of the computing device. In some embodiments, the particular sub-model predicts the one or more applications with a confidence level greater than a confidence threshold. In some embodiments, the method includes: determining how the user interface is to be provided to the user based on the confidence level. In some embodiments, the method includes: determining the confidence level by: determining a first probability distribution; and computing a cumulative distribution of the first probability distribution for points greater than a lower bound to obtain the confidence level. In some embodiments, the method includes: determining the confidence level by: determining a first probability distribution; and computing an average value, median value, or a peak value of the first probability distribution to obtain the confidence level. In some embodiments, the particular sub-model provides a first probability distribution for correct predictions of the particular subset of historical interactions with an information gain relative a second probability distribution for correct predictions of the prediction model. In some embodiments, the information gain is greater than a difference threshold, and wherein the information gain is determined using Kullback-Leibler divergence. In some embodiments, the method includes: receiving a set of historical interactions of the user with the computing device after the event is detected, wherein the set of historical interactions includes and is larger than the particular subset of historical interactions, the set of historical interactions including interactions having different sets of one or more properties of the computing device; using an initial model of the prediction model to compute an initial confidence level for predicting the one or more applications the user will access after the event based on the set of historical interactions; and generating a tree of sub-models for the prediction model by: selecting a first property of the computing device; identifying a first subset of the historical interactions that occurred when the computing device had the first property, the first subset being selected from the set of historical interactions and being smaller than the set of historical interactions; using a first sub-model to compute a first confidence level for predicting at least one application of a first group of one or more applications that the user will access in association with the event based on the first subset of the historical interactions; creating the first sub-model based on the first confidence level being greater than the initial confidence level at least a threshold amount; and selecting another property for testing when the first confidence level is not greater than the initial confidence level. In some embodiments, the method includes: when the first confidence level is not greater than the initial confidence level: adding another application to the first group of one or more applications and testing the first sub-model again. In some embodiments, the method includes: generating the tree of sub-models for the prediction model further by: selecting a second property of the computing device; identifying a second subset of the historical interactions that occurred when the computing device had the first property and the second property, the second subset being selected from the first subset of the historical interactions and being smaller than the first subset of the historical interactions; using a second sub-model to compute a second confidence level for predicting an application of a second group of one or more applications that the user will access in association with the event based on the second subset of the historical interactions; creating the second sub-model based on the second confidence level being greater than the first confidence level at least the threshold amount; and selecting a third property for testing when the second confidence level is not greater than the first confidence level. In some embodiments, the tree of sub-models for the prediction model is generated periodically. In some embodiments, the first property is selected using a random process. In some embodiments, the first group of one or more applications is one application, and the method includes: selecting a plurality of actions to be performed with the one application, each of the plurality of actions corresponding to one of a plurality of different sub-models of the first sub-model; testing a confidence level of each of the plurality of different sub-models to determine whether to generate a second sub-model for at least one of the plurality of actions.

In some embodiments, a computer product comprising a non-transitory computer readable medium is provided that stores a plurality of instructions for suggesting one or more applications to a user of a computing device based on an event, that when executed on one or more processors of a computer system, perform: detecting the event at an input device of the computing device, the event being of a type that recurs for the computing device; selecting a prediction model corresponding to the event; receiving one or more properties of the computing device; using the one or more properties to select a particular sub-model of the prediction model, the particular sub-model corresponding to the one or more properties, wherein the particular sub-model is generated using a particular subset of historical interactions of the user with the computing device, the particular subset of historical interactions occurring after the event is detected and when the computing device has the one or more properties; identifying, by the particular sub-model, the one or more applications to suggest to the user, the one or more applications having at least a threshold probability of at least one of the one or more applications being accessed by the user in association with the event; and perform an action for the one or more applications. In some embodiments, the particular sub-model predicts the one or more applications with a confidence level greater than a confidence threshold, and, wherein the particular sub-model provides a first probability distribution for correct predictions of the particular subset of historical interactions with an information gain relative a second probability distribution for correct predictions of the prediction model. In some embodiments, the action is providing a user interface to the user for interacting with the one or more applications.

In some embodiments, a computing device is provided for suggesting one or more applications to a user of the computing device based on an event, the computing device comprising: an input device; one or more processors configured to: detect the event at the input device of the computing device, the event being of a type that recurs for the computing device; select a prediction model corresponding to the event; receive one or more properties of the computing device; use the one or more properties to select a particular sub-model of the prediction model, the particular sub-model corresponding to the one or more properties, wherein the particular sub-model is generated using a particular subset of historical interactions of the user with the computing device, the particular subset of historical interactions occurring after the event is detected and when the computing device has the one or more properties; identify, by the particular sub-model, the one or more applications to suggest to the user, the one or more applications having at least a threshold probability of at least one of the one or more applications being accessed by the user in association with the event; and provide a user interface to the user for interacting with the one or more applications. In some embodiments, the particular sub-model predicts the one or more applications with a confidence level greater than a confidence threshold, and, wherein the particular sub-model provides a first probability distribution for correct predictions of the particular subset of historical interactions with an information gain relative a second probability distribution for correct predictions of the prediction model. In some embodiments, the one or more processors are further configured to: receive a set of historical interactions of the user with the computing device after the event is detected, wherein the set of historical interactions includes and is larger than the particular subset of historical interactions, the set of historical interactions including interactions having different sets of one or more properties of the computing device; use an initial model of the prediction model to compute an initial confidence level for predicting the one or more applications the user will access after the event based on the set of historical interactions; and generate a tree of sub-models for the prediction model by: selecting a first property of the computing device; identifying a first subset of the historical interactions that occurred when the computing device had the first property, the first subset being selected from the set of historical interactions and being smaller than the set of historical interactions; using a first sub-model to compute a first confidence level for predicting at least one application of a first group of one or more applications that the user will access in association with the event based on the first subset of the historical interactions; creating the first sub-model based on the first confidence level being greater than the initial confidence level at least a threshold amount; and selecting another property for testing when the first confidence level is not greater than the initial confidence level.

Section 6: Application Recommendations Based on Detected Triggering Events

The material in this section "Application Recommendations based on Detected Triggering Events" describes application recommendations based on detected triggering events, in accordance with some embodiments, and provides information that supplements the disclosure provided herein. For example, portions of this section describe recommending applications for use based on triggering events (plugging headphones into a device, and suggesting different applications depending on the user's current location), which supplements the disclosures provided herein, e.g., those related to populating predicted content within the predictions portion 930 of FIGS. 9B-9C and those related to the creation and detection of trigger conditions (FIGS. 4A-4B). In some embodiments, the prediction models described in this section are used to help identify appropriate applications for prediction and display to a user (i.e., these prediction models are used in conjunction with methods 600, 800, 1000, and 1200).

Brief Summary for Application Recommendations Based on Detected Triggering Events Embodiments provide improved devices and methods for recommending an application based upon a triggering event. For example, certain events can be detected by a device and identified as a triggering event. Different triggering events can have different prediction models, which may allow for more accurate recommendations. A selected prediction model can use contextual information (e.g., collected before or after the event is detected) to identify an application for presenting to a user for easier access, e.g., allowing access on a lock screen.

In some embodiments, one or more input devices are monitored for a triggering event. When a triggering event is detected, contextual information may be gathered from one or more sources (e.g., another application of the device that has already obtained the contextual information). Contextual information may relate to a context of the device at or near the occurrence of the triggering event, such as location or time of day. Once the contextual information is received, historical information may then be gathered from a historical events database. The database may maintain a record of historical interactions between the user and the device. In light of the triggering event, the contextual information and historical information may be utilized to identify a set of one or more applications for a user. The identified application may then be suggested to the user by providing a user interface in a manner different than how, when, or where the identified application is normally accessed (e.g., on a home screen), thereby giving the user the option to run the application if desired.

Other embodiments are directed to systems, portable consumer devices, and computer readable media associated with methods described in this section.

A better understanding of the nature and advantages of embodiments of the present invention may be gained with reference to the following detailed description and the accompanying drawings.

Detailed Description for Application Recommendations Based on Detected Triggering Events Current mobile devices can have many applications stored on its solid state drive. In some cases, mobile devices can have hundreds of applications stored on its solid state drive. When a user wants to run an application on his mobile device, he or she must unlock the device, search through all of the applications in the device to identify the desired application, and then initiate execution of the application. Going through the process of finding the desired application can be excessively time consuming and redundant, especially for applications that are repeatedly used more often than others.

A user could pre-program a device to automatically perform a specified action of a predetermined application when a particular condition is satisfied (e.g., a triggering event occurs). For instance, the device can be programmed to suggested a predetermined application when a triggering event occurs. But, such operation is static and requires configuration by a user.

Instead of automatically suggesting a predetermined application, embodiments of the present invention can utilize a prediction model to suggest an application in a given context that is likely to be run by a user when a triggering event occurs. Different applications may be identified for different contexts for the same triggering events. As an example, one application can be suggested in a first context, but another application can be suggested in a second context.

Identifying an application that a user is likely to use has several benefits. A user interface can be provided to a user in an opportune manner or in an opportune screen, which can save time and streamline device operation. The user does not have to search through numerous applications to identify an application to use. A user interface of the application can be provided in various ways, which may depend on how high the probability is that a user will use the application. Further, the prediction model may provide a particular user interface if a particular action has a high probability of being performed. Thus, in some embodiments, the higher the probability of use, more aggressive action can be taken, such as automatically opening an application with a corresponding user interface (e.g., visual or voice command), as opposed to just providing an easier mechanism to open the application.

VII. Application Prediction

Embodiments can suggest an application based upon a triggering event. For instance, a music application can be suggested when headphones are inserted into a headphone jack. In some embodiments, contextual information may be used in conjunction with the triggering event to identify an application to suggest to a user. As an example, when a set of headphones are inserted into a headphone jack, contextual information relating to location may be used. If the device is at the gym, for instance, application A may be suggested when headphones are inserted into the headphone jack. Alternatively, if the device is at home, application B may be suggested when the headphones are inserted into the headphone jack. Accordingly, applications that are likely to be used under certain contexts may be suggested at an opportune time, thus enhancing user experience.

FIG. 36_1 is a flow chart of a method 36_100 for suggesting an application based upon a triggering event according to embodiments of the present invention. Method 100 can be performed by a mobile device (e.g., a phone, tablet) or a non-mobile device and utilize one or more user interfaces of the device.

At block 36_102, a triggering event is detected. Not all events that can occur at a device are triggering events. A triggering event can be identified as sufficiently likely to correlate to unique operation of the device. A list of events that are triggering events can be stored on the device. Such events can be a default list and be maintained as part of an operating system, and may or may not be configurable by a user.

A triggering event can be an event induced by a user and/or an external device. For instance, the triggering event can be when an accessory device is connected to the mobile device. Examples include inserting headphones into a headphone jack, making a Bluetooth connection, and the like. In this example, each of these can be classified as a different triggering event, or the triggering event can collectively be any accessory device connecting to the mobile device. As other examples, a triggering event can be a specific interaction of the user with the device. For example, the user can move the mobile device in a manner consistent with running, where a running state of the device is a triggering event. Such a running state (or other states) can be determined based on sensors of the device.

At block 36_104, an application associated with the triggering event is identified. As an example, a music application can be identified when the headphones are inserted into the headphone jack. In some embodiments, more than one application can be identified. A prediction model can identify the associated application, where the prediction model may be selected for the specific triggering event. The prediction model may use contextual information to identify the application, e.g., as different application may be more likely to be used in different contexts. Some embodiments can identify applications only when there is a sufficient probability of being selected by a user, e.g., as determined from historical interactions of the user with the device. Various types of prediction models can be used. Examples of prediction models include neural networks, decision trees, multi-label logistic regression, and combinations thereof.

At block 36_106, an action is performed in association with the application. In an embodiment, the action may be the providing of a user interface for a user to select to run the application. The user interface may be provided in various ways, such as by displaying on a screen of the device, projecting onto a surface, or providing an audio interface.

In other embodiments, an application may run, and a user interface specific to the application may be provided to a user. Either of the user interfaces may be provided in response to identifying the application, e.g., on a lock screen. In other implementations, a user interface to interact with the application may be provided after a user is authenticated (e.g., by password or biometric). When the user interface is displayed, such a user interface would be more specific than just a home screen, i.e., a smaller list of suggested applications to run than are on the home screen. The user interface may be displayed immediately on the display of the device after the triggering event is detected. In other embodiments, the user interface may be displayed after the user provides some input (e.g., one or more click gestures), which may still be less user input (e.g., the number of clicks) than if no application was suggested.

VIII. Events Initiating Prediction

Triggering events may be a predetermined set of events that trigger the identification of one or more applications to provide to a user. The events may be detected using signals generated by device components. Further details of how a triggering event is detected is discussed in further detail in this section.

FIG. 36_2 illustrates a simplified block diagram of a detection system 36_200 for determining a triggering event according to embodiments of the present invention. Detection system 36_200 may reside within the device for which a triggering event is being determined. As shown, detection system 36_200 can detect a plurality of different events. One or more of the detected events may be determined by the detection system 36_200 to be triggering events. Other processing modules can then perform processing using a triggering event.

A. Detecting Events

In embodiments, detection system 36_200 includes hardware and software components for detecting events. As an example, detection system 36_200 may include a plurality of input devices, such as input devices 36_202. Input devices 36_202 may be any suitable device capable of generating a signal in response to an event. For instance, input devices 36_202 may include device connection input devices 36_204, user interaction input devices 36_206, and location input devices 36_208 that can detect device connection events, user interaction events, and locational events, respectively. When an event is detected at an input device, the input device can send a signal indicating a particular event for further analysis.

In some embodiments, a collection of components can contribute to a single event. For example, a person can be detected to be running based on motion sensors and a GPS location device.

1. Device Connection Events

Device connection events may be events that occur when other devices are connected to the device. For example, device connection input devices 36_204 can detect events where devices are communicatively coupled to the device. Any suitable device component that forms a wired or wireless connection to an external device can be used as a device connection input device 36_204. Examples of device connection input device 36_204 include a headphone jack 36_210 and a data connection 36_212, such as a wireless connection circuit (e.g., Bluetooth, Wi-Fi, and the like) or a wired connection circuit (e.g., Ethernet and the like).

The headphone jack 36_210 allows a set of headphones to couple to a device. A signal can be generated when headphones are coupled, e.g., by creating an electrical connection upon insertion into headphone jack 36_210. In more complex embodiments, headphone jack 36_210 can include circuitry that provides an identification signal that identifies a type of headphone jack to the device. The event can thus be detected in various ways, and a signal generated and/or communicated in various ways.

Data connection 36_212 may communicatively couple with an external device, e.g., through a wireless connection. For instance, a Bluetooth connection may be coupled to a computer of a vehicle, or a computer of a wireless headset. Accordingly, when the external device is coupled to the mobile device via data connection 36_212, it may be determined that an external device is connected, and a corresponding device connection event signal may be generated.

2. User Interaction Events

User interaction input devices 36_206 may be utilized to detect user interaction events. User interaction events can occur when a user interacts with the device. In some embodiments, a user can directly activate a displayed user interface via one of user interaction input devices 36_206. In other embodiments, the user interface may not be displayed, but still is accessible to a user, e.g., via a user shaking a device or providing some other type of gesture. Further, the interaction may not include a user interface, e.g., when a state engine uses values from sensors of the device.

Any suitable device component of a user interface can be used as a user interaction input device 36_206. Examples of suitable user interaction input devices are a button 36_214 (e.g., a home or power button), a touch screen 36_216, and an accelerometer 36_218. For instance, button 36_214 of a mobile device, such as a home button, a power button, volume button, and the like, may be a user interaction input device 36_204. In addition, a switch such as a silent mode switch may be a user interaction input device 36_204. When the user interacts with the device, it may be determined that a user has provided user input, and a corresponding user interaction event may be generated. Such an event may depend on a current state of the device, e.g., when a device is first turned on or activated in the morning (or other long period of inactivity). Such information can also be used when determining whether an even is a triggering event.

Touch screen 36_216 may allow a user to provide user input via a display screen. For instance, the user may swipe his or her finger across the display to generate a user input signal. When the user performs the action, a corresponding user interaction event may be detected.

Accelerometer 36_218 or other motion sensors may be passive components that detect movement of the mobile device, such as shaking and tilting (e.g., using a gyrometer or compass). Such movement of a mobile device may be detected by an event manager 36_230, which can determine the movement to be of a particular type. The event manager 36_230 can generate an event signal 36_232 corresponding to the particular type of a user interaction event in a given state of the device. The state of the device may be determined by a state engine, further details of which can be found in U.S. Patent Publication No. 2012/0310587 entitled "Activity Detection" and U.S. Patent Publication No. 2015/0050923 entitled "Determining Exit From A Vehicle," the disclosures of which are incorporated by reference in their entirety.

One example is when a user is running, the accelerometer may sense the shaking and generate a signal to be provided to the event manager 36_230. The event manager 36_230 can analyze the accelerometer signal to determine a type of event. Once the type of event is determined, the event manager 36_230 can generate an event signal 36_232 corresponding to the type of event. The mobile device can move in such a manner as to indicate that the user is running. Thus, this particular user interaction can be identified as a running event. The event manager 36_230 can then generate and send the event signal 36_232 indicating that a running event has been detected.

3. Locational Events

Locational input devices 36_208 may be used to generate locational events. Any suitable positioning system may be used to generate locational events. For instance, a global positioning system (GPS) may be used to generate locational events. Locational events may be events corresponding to a specific geographic location. As an example, if the mobile device arrives at a specific location, the GPS component may generate an input signal corresponding to a locational event. Typically, a mobile device may move to tens or even hundreds of locations per day, many of which may not be important enough to be considered as a location event. Thus, not every detected location will be a locational event. In embodiments, a locational event may be a location that is frequented more often than others. For instance, an event may be a locational event if it is frequented at least a threshold number of times in a period of time, e.g., five times in a span of six months to a year. Thus, important locations may be separated from unimportant locations and determined to be a locational event.

B. Determining Triggering Events

As further illustrated in FIG. 36_2, input devices 36_202 can output a detected event 36_222, e.g., as a result of any of the corresponding events. Detected event may include information about which input device is sending the signal for detected event 36_222, a subtype for a specific event (e.g., which type of headphones or type of data connection). Such information may be used to determine whether detected event 36_222 is a triggering event, and may be passed to later modules for determining which prediction model to use or which action to perform for a suggested application.

Detected event 36_222 may be received by an event manager 36_230. Event manager 36_230 can receive signals from input devices 36_202, and determine what type of event is detected. Depending on the type of event, event manager 36_230 may output signals (e.g., event signal 36_232) to different engines. The different engines may be have a subscription with the event manager 36_230 to receive specific event signals 36_232 that are important for their functions. For instance, triggering event engine 36_224 may be subscribed to receive event signals 36_232 generated in response to detected events 36_222 from input devices 36_202. Event signals 36_232 may correspond to the type of event determined from the detected events 36_222.

Triggering event engine 36_224 may be configured to determine whether the detected event 36_222 is a triggering event. To make this determination, triggering event engine 36_224 may reference a designated triggering events database 36_226, which may be coupled to the triggering event engine 36_224. The designated triggering events database 36_226 may include a list of predetermined events that are designated as triggering events.

Triggering event engine 36_224 may compare the received detected event 36_222 with the list of predetermined events and output a triggering event 36_228 if the detected event 36_222 matches a predetermined event listed in the designated triggering events database 36_226. An example of the list of predetermined events may include any one or more of: (1) inserting headphones into a headphone jack, (2) connecting an external device via Bluetooth connection, (3) pressing a button after a period of time has elapsed (e.g., upon waking up in the morning), (4) sensing a certain type of movement of the device, and (5) arriving at a certain location. For (5), designated triggering events database 36_226 can include specifications of the certain location.

As described in this section, one aspect of the present technology is the gathering and use of data available from various sources to suggest applications to a user. The present disclosure contemplates that in some instances, this gathered data may include personal information data that uniquely identifies or can be used to contact or locate a specific person. Such personal information data can include location-based data, home addresses, or any other identifying information.

The present disclosure recognizes that the use of such personal information data, in the present technology, can be used to the benefit of users. For example, the personal information data can be used to suggest an application that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, users can select not to provide location information for targeted content delivery services. In yet another example, users can select to not provide precise location information, but permit the transfer of location zone information.

IX. Suggested Application Determination

Once a triggering event is detected, an application may be identified based on the triggering event. In some embodiments, identification of the application is not a pre-programmed action. Rather, identification of the application can be a dynamic action that may change depending on additional information. For instance, identification of the suggested application can be determined based on contextual information and/or historical information, as well as based on other information.

A. System for Determining Application Based on Triggering Event

FIG. 36_3 illustrates a simplified block diagram of a prediction system 36_300 for identifying an application and a corresponding action command based upon a triggering event and contextual information according to embodiments of the present invention. Prediction system 36_300 resides within the device that is identifying the application. Prediction system 36_300 may include hardware and software components.

Prediction system 36_300 includes a prediction engine 36_302 for identifying the suggested application. Prediction engine 36_302 can receive a triggering event, such as the triggering event 36_228 discussed in FIG. 36_2. The prediction engine 36_302 may use information gathered from the triggering event 36_228 to identify a suggested application 36_304. As shown, the prediction engine 36_302 may receive contextual data 36_306 in addition to the triggering event 36_228. The prediction engine 36_302 may use information gathered from both the triggering event 36_228 and the contextual data 36_306 to identify a suggested application 36_304. Prediction engine 36_302 may also determine an action to be performed, e.g., how and when a user interface may be provided for a user to interact with a suggested application.

In certain embodiments, suggested application 36_304 may be any application existing on the mobile device's solid state drive. Prediction engine 36_302 may thus have the ability to suggest any application when a triggering event is detected. Alternatively, in embodiments, prediction engine 36_302 may have the ability to suggest less than all of the applications when a triggering event is detected. For instance, a user may select some applications to be inaccessible to the prediction engine 36_302. Thus, the prediction engine 36_302 may not be able to suggest those applications when a triggering event is detected.

1. Contextual Information

Contextual information may be gathered from contextual data 36_306. In embodiments, contextual information may be received at any time. For instance, contextual information may be received before and/or after the triggering event 36_228 is detected. Additionally, contextual information may be received during detection of the triggering event 36_228. Contextual information may specify one or more properties of the device for a certain context. The context may be the surrounding environment (type of context) of the device when the triggering event 36_228 is detected. For instance, contextual information may be the time of day the triggering event 36_228 is detected. In another example, contextual information may be a certain location of the device when the triggering event 36_228 is detected. In yet another example, contextual information may be a certain day of year at the time the triggering event 36_228 is detected. Additionally, contextual information may be data gathered from a calendar. For instance, the amount of time (e.g., days or hours) between the current time and an event time. Such contextual information may provide more meaningful information about the context of the device such that the prediction engine 36_302 may accurately suggest an application that is likely to be used by the user in that context. Accordingly, prediction engine 36_302 utilizing contextual information may more accurately suggest an application to a user than if no contextual information were utilized.

Contextual data 36_306 may be generated by contextual sources 36_308. Contextual sources 36_308 may be components of a mobile device that provide data relating to the current situation of the mobile device. For instance, contextual sources 36_308 may be hardware devices and/or software code that operate as an internal digital clock 36_310, GPS device 36_312, and a calendar 36_314 for providing information related to time of day, location of the device, and day of year, respectively. Other contextual sources may be used.

Gathering the contextual data 36_306 for the prediction engine 36_302 may be performed in a power efficient manner. For example, continuously polling the GPS 36_312 to determine the location of the device may be excessively power intensive, which may decrease battery life. To avoid decreasing battery life, prediction engine 36_302 may determine the location of the device by requesting the device's location from sources other than the GPS 36_312. Another source for locational information may be an application that has recently polled the GPS 36_312 for the device's location. For instance, if application A is the most recent application that has polled the GPS 36_312 for the device's location, the prediction engine 36_302 may request and receive locational data from application A rather than separately polling the GPS 36_312.

2. Historical Information

In addition to the contextual sources 36_308, a historical events database 36_316 may also be utilized by the prediction engine 36_302 in certain embodiments. The historical events database 36_316 may include historical information of prior interactions between the user and the mobile device after a triggering event is detected.

The historical events database 36_316 may keep a record of the number of times an application was opened following a certain triggering event. For instance, the database 36_316 may keep a record indicating that a user opens application A eight out of ten times after headphones are plugged into the headphone jack. Accordingly, the prediction engine 36_302 may receive this information as historical data 36_318 to determine whether application A should be identified for the user when a set of headphones are inserted into the headphone jack.

The historical events database 36_316 may also keep a record of the number of times an application was opened under different contexts when the triggering event is detected. For example, the database 36_316 may keep a record indicating that a user opens application A nine out of ten times after the headphones are inserted into the headphone jack when the user is at home, and one out of the ten times when the user is at the gym. Accordingly, the prediction engine 36_302 may receive this information as historical data 36_318 and determine that application A should be identified when headphones are inserted into the device at home, but not at the gym. It is to be appreciated that although examples discussed in this section refer to locations as "home" or "gym," contextual data 36_306 representing "home" or "gym" may be in the form of numerical coordinates. One skilled in the art understands that information relating to time of day and day of year may be utilized instead of location in a similar manner to identify other applications.

Historical events database 36_316 may also keep a record of how often, and under what circumstances, the user decides not to run the identified application. For instance, the database 36_316 may keep a record indicating that the user did not select application B two out of ten times it was suggested to the user when the user inserted the headphones into the device at home. Accordingly, the prediction engine 36_302 may receive this information as historical data 36_318 to adjust the probability of suggesting application B when the user inserts the headphones into the device at home.

In some embodiments, contextual information 36_306 and/or historical information (further discussed in this section) may be unavailable or limited when a triggering event is detected. In such cases, a default application may be suggested when a triggering event is detected. The default application may be a type of application that is commonly associated with the type of triggering event. For instance, a music application may be suggested if a set of headphones are inserted into the headphone jack. Alternatively, a maps application may be suggested when a Bluetooth connection is made with a car. Once more historical information is obtained, a suggested application can be provided instead of a default application.

B. Multiple Prediction Models

As different triggering events can result in different suggested applications, embodiments can use a different prediction model for different triggering events. In this manner, a prediction model can be refined to provide a more accurate suggestion for a particular triggering event.

FIG. 36_4 illustrates in more detail the prediction engine 36_302 according to embodiments of the present invention. The prediction engine 36_302 may be program code stored on a memory device. In embodiments, the prediction engine 36_302 includes one or more prediction models. For example, prediction engine 36_302 may include prediction models 1 through N. Each prediction model may be a section of code and/or data that is specifically designed to identify an application for a specific triggering event 36_228. For instance, prediction model 1 may be specifically designed to identify an application for a triggering event where a set of headphones are inserted into a headphone jack. Prediction model 2 may be designed to identify an application for a triggering event where a Bluetooth device is connected.

Prediction model 3 may be designed to identify an application for a triggering event where a user interacts with a user interface of the device after an elongated period of time (e.g., when the user first interacts with the mobile device after waking up in the morning). Other prediction models may be designed to identify an application for a triggering event associated with a certain pattern of detected motion (e.g., when the user is running with the mobile device), an arrival at a specific location, and a selection of a particular application (e.g., selecting an application that communicates with the computer of a car). Any number of prediction models may be included in the prediction engine 36_302 depending on the number of triggering events 36_228.

As shown, each prediction model 1 through N may be coupled to the contextual sources and the historical events database to receive contextual data 36_306 and historical data 36_318. Accordingly, each prediction model my utilize contextual data 36_306 and historical data 36_318 to identify a suggested application 36_304 according to embodiments discussed in this section.

With reference back to FIG. 36_3, the prediction engine 36_302 may send the suggested application 36_304 to an expert center module 36_320. In embodiments, the expert center 36_320 may be a section of code that manages what is displayed on a device, e.g., on a lock screen, when a search screen is opened, or other screens. For instance, the expert center 36_320 may coordinate which information is displayed to a user, e.g., a suggested application, suggested contact, and/or other information. Expert center 36_320 can also determine when to provide such information to a user.

X. User Interface

If the expert center 36_320 determines that it is an opportune time for the suggested application to be outputted to the user, the expert center 36_320 may output an application 36_322 to a user interface 36_324. In embodiments, the output application 36_322 may correspond to the suggested application 36_304. The user interface 36_324 may communicate the output application 36_322 to the user and solicit a response from the user regarding the output application 36_322.

In embodiments, the user interface 36_324 may be a combination of device components with which the user may interact. For instance, the user interface 36_324 may be a combination of device components that has the ability to output information to a user and/or allow a user to input signals to the device.

A. Display

User interface 36_324 can be displayed on a display of the device. The display may be sensitive to touch such that input signals can be generated by physical interaction with the display. In such embodiments, the display may include a touch-sensitive layer superimposed on an image display layer to detect a user's touch against the display. Accordingly, the display may be a part of the user interface 36_324 that can both output information to a user and input information from a user. As an example, the display may show an icon for a suggested application, and input a signal to run the application when the user taps a corresponding location of the display panel.

Modern devices have security measures that prevent unauthorized use of the device. Such devices may require a user to unlock the device before the user can access all of the applications stored on the device. The device may limit accessibility of all the applications depending on a state of device security. For instance, the device may require a user to unlock the device before the device allows access to all of its applications. An unlocked device may have a display that shows a home screen. The home screen may display and/or provide access to all applications of the device. A locked device, however, may have a display that shows a lock screen. Some regions of the display may be occupied by a prompt for unlocking the device. Accordingly, the lock screen may allow interaction with fewer applications than the home screen due to the heightened state of device security and the limited display space. For instance, the lock screen may only allow access to less than all of the applications of the device, such as one to three applications. In some embodiments, suggested applications 36_304 as discussed in this section with respect to FIG. 36_3 may be displayed on the lock screen.

B. Other Input and Output Device Components

Although the display may be a part of the user interface 36_324 that is capable of both outputting information to a user and inputting information from a user, other parts of the user interface 36_324 are not so limited. For instance, other device components that can input information from a user are envisioned in embodiments in this section as well. As an example, buttons and switches can be a part of the user interface 36_324. A button may be a device component that generates an input when a user applies pressure upon it. A switch may be a device component that generates an input when a user flips a lever to another position. Accordingly, the button and/or switch may be activated by a user to run a suggested application 36_304 according to embodiments discussed in this section.

Device components that can output information from a user are envisioned in embodiments in this section as well. As an example, a speaker or a haptic device may be a part of the user interface that outputs information to a user. The speaker may output an audio notification to indicate that an identified application has been suggested. The haptic device may output a tactile notification to indicate that an identified application has been suggested. It is to be appreciated that such devices are mere embodiments, and that other embodiments are not limited to such devices.

C. Level of Interaction

User interface 36_324 may require different levels of interaction in order for a user to run the output application 36_322. The various levels may correspond to a degree of probability that the user will run the suggested application 36_304. For instance, if the prediction engine 36_302 determines that the suggested application 36_304 has a probability of being run by the user that is greater than a threshold probability, the user interface 36_324 may output a prompt that allows the user to more quickly run the application by skipping intermediate steps.

As an example, if the prediction engine 36_302 determines that the probability of the user running the suggested music application is greater than a high threshold probability, the suggested music application may be automatically run, and the user interface 36_324 may thus display controls, e.g. play, pause, and fast forward/reverse, for the music application. The user therefore may not have to perform the intermediate step of clicking to run the application.

Alternatively, if the prediction engine 36_302 determines that the probability of the user running the music application is less than the high threshold probability but still higher than a lower threshold probability, the music application may be displayed as an icon. The lower threshold probability may be higher than a baseline threshold probability. The baseline threshold probability may establish the minimum probability at which a corresponding application will be suggested. The user may thus have to perform an extra step of clicking on the icon to run the suggested music application. However, the number of clicks may still be less than the number of clicks required when no application is suggested to the user. In embodiments, the threshold probability may vary according to application type. In various embodiments, the high threshold probability may range between 75% to 100%, the lower threshold probability may range between 50% to 75%, and the baseline threshold may range between 25% to 50%. In a particular embodiment, the high threshold probability is 75%, the lower threshold probability is 50%, and the baseline probability is 25%.

In embodiments, higher probabilities may result in more aggressive application suggestions. For instance, if an application has a high probability of around 90%, the prediction engine 36_302 may provide an icon on a lock screen of the device to allow the user to access the application with one click of the icon. If an application has an even higher probability of around 95%, the prediction engine 36_302 may even automatically run the suggested application for the user without having the user click anything. In such instances, the prediction engine 36_302 may not only output the suggested application, but also output a command specific to that application, such as a command to play the selected music in a music application or a command to initiate guidance of a specific route in a map application.

According to embodiments of the present invention, the prediction engine 36_302 may determine what level of interaction is required, and then output that information to the expert center 36_320. The expert center 36_320 may then send this information to the user interface 36_324 to output to the user.

In embodiments, the user interface 36_324 may display a notice to the user on a display screen. The notice may be sent by a push notification, for instance. The notice may be a visual notice that includes pictures and/or text notifying the user of the suggested application. The notice may suggest an application to the user for the user to select and run at his or her leisure. When selected, the application may run. In some embodiments, for more aggressive predictions, the notification may also include a suggested action within the suggested application. That is, a notification may inform the user of the suggested application as well as a suggested action within the suggested application. The user may thus be given the option to run the suggested application or perform the suggested action within the suggested application. As an example, a notification may inform the user that the suggested application is a music application and the suggested action is to play a certain song within the music application. The user may indicate that he or she would like to play the song by clicking on an icon illustrating the suggested song. Alternatively, the user may indicate that he or she would rather run the application to play another song by swiping the notification across the screen.

Other than outputting a suggested application and a suggested action to the user interface 36_324 in one notification, prediction engine 36_302 may output two suggested actions to the user interface 36_324 in one notification. For instance, prediction engine 36_302 may output a suggested action to play a first song, and a second suggested action to play a second song. The user may choose which song to play by clicking on a respective icon in the notification. In embodiments, the suggested actions may be determined based on different criteria. For instance, one suggested action may be for playing a song that was most recently played regardless of contextual information, while the other suggested action may be for playing a song that was last played under the same or similar contextual information. As an example, for the circumstance where a user enters into his or her car and the triggering event causes the prediction engine 36_302 to suggest two actions relating to playing a certain song, song A may be a song that was last played, which happened to be at home, while song B may be a song that was played last time the user was in the car. When the user selects the song to be played, the song may continue from the beginning or continue from where it was last stopped (e.g., in the middle of a song).

In order for prediction engine 36_302 to be able to suggest an action, prediction engine 36_302 may have access to a memory device that stores information about an active state of the device. The active state of a device may represent an action that is performed following selection of the suggested application. For instance, an active state for a music application may be playing a certain song. The active state may keep track of when the song last stopped. In embodiments, historical events database 36_316 from FIG. 36_3 may record historical data pertaining to the active state of the device. Accordingly, the prediction engine 36_302 may suggest an action to be run by the suggested application.

XI. Method of Determining Suggested Application

FIG. 36_5 is a flow chart illustrating a method 36_500 of identifying an application based upon a triggering event according to embodiments of the present invention. Method 36_500 can be performed entirely or partially by the device. As various examples, the device can be a phone, tablet, laptop, or other mobile device as already discussed in this section.

At block 36_502 the device, e.g., a mobile device, detects an event. For example, a set of headphones may be inserted into a headphone jack of the device. As another example, a wireless headset may be coupled to the device via a Bluetooth connection. Input devices 36_202 in FIG. 36_2 may be used to detect the event. The event may be any action where the mobile device interacts with an external entity such as an external device or a user.

At block 36_504, the device determines whether the detected event is a triggering event. To determine whether the detected event is a triggering event, the detected event may be compared to a predetermined list of events, e.g., the list of events in the designated triggering events database 36_226 in FIG. 36_2. If the detected event matches one of the predetermined list of events, then the detected event may be determined to be a triggering event.

At block 36_506, the device selects a prediction model, e.g., one of the prediction models 1 through N in FIG. 36_4. The selected prediction model may depend on the triggering event. For instance, a prediction model designed for Bluetooth connections may be selected when the triggering event relates to establishing a Bluetooth connection with an external device. As another example, a prediction model designed for headphone connections may be selected when the triggering event relates to inserting a set of headphones into a headphone jack.

At block 36_508, the device receives contextual information. Contextual information may be received from a variety of sources, e.g., the contextual sources 36_308 in FIG. 36_3. In embodiments, contextual information may relate to the surrounding situation of the device. For instance, contextual information may relate to the time of day, day of year, or the location of the device. Additionally, historical information may be received by the device as well. Historical information may relate to a history of interactions between the device and a user stored in a database, e.g., historical events database 36_316.

At block 36_510, the device may identify one or more applications that have at least a threshold probability of being accessed by the user. As already mentioned in this section, there may be a plurality of thresholds. In some embodiments, the threshold probability may be a baseline threshold probability, a lower threshold probability, or a high threshold probability. For example, one or more applications can each have a probability of greater than the threshold probability. In another example, the one or more applications can have a combined probability of greater than the threshold probability. The one or more applications may be the applications that have the top probabilities, and may be selected to various criteria (e.g., all having a probability greater than the threshold, as many applications as needed to get above threshold but limited to a maximum number, etc.) In some embodiments, applications that have a probability of less than the baseline threshold probability may be ignored.

The probability of being accessed by a user may be determined by the prediction model. The prediction model may determine the probability by utilizing contextual information as well as historical information. In embodiments, the identified applications are the applications discussed in this section with respect to FIGS. 36_3 and 36_4.

In some embodiments, if applications have equal probabilities, then they may be ignored, i.e., not identified. In these situations, the device may need to generate additional historical information to properly identify the one or more applications. As more historical information is gathered, the more accurate the device becomes at identifying the correct application, e.g., the application desired to be accessed by the user in a given context. In other embodiments, both the applications can be provided, e.g., if their combined probability is sufficiently high, as may occur of both application have the top two probabilities.

At block 36_512, the device may provide a user interface to the user. For example, the device may display the identified applications to the user via an interface with which the user may interact to indicate whether the user would like to access the identified applications. For instance, the user interface may include a touch-sensitive display that shows the user one or more of the identified applications, and allows the user to access one or more of the applications identified by the device by interacting with the touch-sensitive display.

In certain embodiments, the user interface may be provided in a lock screen, or a home screen. The home screen may be a screen displayed after pressing a home button in an unlocked state. The lock screen may be a screen displayed after pressing a home button after a prolonged period of inactivity to wake up the device. In embodiments, the lock screen has less available display space for displaying applications than the home screen because a portion of the lock screen is reserved for unlocking the device. In some embodiments, the user interface may be associated with an already running application. As an example, the user interface may be a music player interface having audio controls associated with a running music application, as illustrated in FIG. 36_6.

FIG. 36_6 illustrates an exemplary user interface 36_600 for a device 36_602 that is associated with an already running application. User interface 36_600 may be a user interface for a music application, although other user interfaces for different applications are envisioned in this section as well. User interface 36_600 may be provided by a touch-screen display 36_604. Touch-screen display 36_604 may display audio controls 36_608, volume controls 36_610, song title 36_612, and/or album art 36_614. Audio controls 36_608 may provide a user interface for fast forwarding, rewinding, playing, and pausing a song. Volume controls 36_610 allow a user to adjust the volume of the outputted acoustics. Song title 36_612 and album art 36_614 may display information about the song that is currently playing. In embodiments, when the user interface 36_600 is displayed by the touch-screen display 36_604, a backlight of the device 36_602 may be illuminated. Illumination of the backlight allows the user to see the running application and be aware that the device 36_602 has run a suggested application. By automatically running the music application and providing user interface 36_600 to a user, the device 36_602 may enhance the user experience by allowing the user to access his or her desired application without having to click one or more icons.

Portions of the user interface 36_600 may be hidden in some situations. For instance, if an expert center, such as the expert center 36_320 in FIG. 36_3, of the device 36_602 decides that another application has priority over the suggested application, the album art 36_614 may be hidden and the other application may be displayed instead. The other application may be displayed as an accessible icon on the display 36_604 for running the other application. In other embodiments, the other application may be displayed as a notification that allows access to the icon of the other application when the user clicks on the notification. In such situations, the notification would be displayed in lieu of the album art 36_614. In embodiments, if the user interface is displayed on the lock screen, then the notification may be displayed on the lock screen as well. Accordingly, the user may be made aware of, and given the opportunity to run, the application that is deemed to have higher priority.

XII. Time Limit for Running Application

In embodiments, if the identified application is not accessed in a certain period of time, the device may remove the user interface as if no user interface was provided in the first place. If the user does not access the application within a certain period of time, it is assumed that the user is not interested in accessing the application. Thus, the user interface is removed so that the user cannot access the identified application, and the user is not distracted.

FIGS. 36_7A and 36_7B are flowcharts illustrating methods for removing the user interface according to embodiments. Specifically, FIG. 36_7A is a flow chart illustrating a method 36_700 for removing the user interface after a period of time has elapsed. FIG. 36_7B is a flow chart illustrating a method 36_703 for removing the user interface after a triggering event has been removed within a threshold period of time. The methods 36_700 and 36_703 can be performed entirely or partially by the device.

With reference to FIG. 36_7A, method 36_700 begins by providing a user interface to the user at block 36_701. Block 36_701 may be performed as mentioned at block 36_512 discussed in this section with respect to FIG. 36_5.

At block 36_702, the device determines whether a threshold period of time has elapsed since the user interface was first provided to the user. The user interface may be provided to the user in either a locked screen or a home screen. In embodiments, the threshold period of time represents a predetermined period of time beginning immediately after providing the user interface to the user where the user has not interacted with the device.

The threshold period of time may vary depending on the type of triggering event. For instance, if the triggering event is a type of event that involves direct user interaction (e.g., a cognizant action by a user intended to bring about an event), then the threshold period of time may be relatively short, such as 15 to 30 seconds. An example of such a triggering event includes insertion of a set of headphones into a headphone jack. An another example includes waking up the device by pressing a button after a prolonged period of time. The threshold period of time can be relatively short because it may be assumed that the user is directly interacting with the phone and may be immediately aware of the outputted identified application. Because the user is immediately aware of the identified application, a passage of a short period of time where the identified application is not accessed indicates that the user does not intend to access the identified application.

Alternatively, if the triggering event is a type of event that does not involve direct user interaction, then the threshold period of time may be longer than the threshold period of time for a triggering event involving direct user interaction. In an embodiment, the threshold period of time for a triggering event that does not involve direct user interaction may be relatively long, such as 15 to 30 minutes. One such example includes arriving at a location. When a device arrives at a specific location, it is assumed that the user is traveling and is not focused on the device. The user may not be immediately aware of the outputted identified application. Thus, more time may pass before the user checks the device and becomes aware of the identified application.

At block 36_704, if the threshold period of time elapses, then the user interface may be removed such that the user may not have realized that an application was suggested at all. However, if the threshold period of time has not elapsed, then at block 36_706, the device determines whether the user would like to access the application. The user may indicate that he or she would like to access the application by any form of user input via the user interface, such as by interacting with a touch screen, pressing a button, flipping a switch, or using a biometric device.

If it is determined that the user has not yet indicated his or her desire to access the application, then the device may continue to provide the user interface to the user at block 36_701. However, if the device receives an indication that the user would like to access the application, then at block 36_708, the device may run the application. Accordingly, the device may save the user time by providing a short cut to the desired application, thereby enhancing the user's experience.

In some embodiments, the user interface may be removed prior to the duration of the threshold period of time. As illustrated in FIG. 36_7B, at block 36_710, the device determines whether the triggering event has been removed, e.g., an action opposite of the triggering event has been detected. For instance, if the triggering event is inserting a set of headphones into a headphone jack, then removal of the triggering event is pulling out the set of headphones from the headphone jack. In another example, if the triggering event is establishing a Bluetooth connection, then removal of the triggering event is disconnecting the Bluetooth connection. Removal of the triggering event can be interpreted by the device to mean that the user does not intend to access the suggested device. Accordingly, if the triggering event is removed, the user interface may be removed at block 36_704, e.g., the application may be cleared and any user interface for the application may be hidden.

XIII. Training Routine

As historical information accumulates through use of the mobile device, prediction models (e.g., predictions models 1-N discussed in FIG. 36_4) may be periodically trained (i.e., updated) in consideration of the new historical information. After being trained, prediction models 1-N may more accurately suggest applications and actions according to the most recent interaction patterns between the user and the mobile device. Training prediction models 1-N may be most effective when a large amount of historical information has been recorded. Thus, training may occur at intervals of time long enough to allow the mobile device to detect a large number of interactions with the user. However, waiting too long of a period of time between training sessions may hinder adaptability of the prediction engine. Thus, a suitable period of time between training sessions may be between 15 to 20 hours, such as 18 hours.

Training prediction models 1-N may take time and may interfere with usage of the mobile device. Accordingly, training may occur when the user is most unlikely going to use the device. One way of predicting that the user will not use the device is by waiting for a period of time when the device is not being used, e.g., when no buttons are pressed and when the device is not moving. This may indicate that the user is in a state where the user will not interact with the phone for a period of time in the near future, e.g., when the user is asleep. Any suitable duration may be used for the period of time of waiting, such as one to three hours. In a particular embodiment, the period of time of waiting is two hours.

At the end of the two hours, prediction models 1-N may be updated. If, however, the user interacts with the mobile device (e.g., presses a button or moves the device) before the end of the two hours, then the two hour time period countdown may restart. If the time period constantly restarts before reaching two hours of inactivity, then the mobile device may force training of prediction models 1-N after an absolute period of time. In an embodiment, the absolute period of time may be determined to be a threshold period of time at which user friendliness of the mobile device begins to decline due to out-of-date prediction models. The absolute period of time may range between 10 to 15 hours, or 12 hours in a particular embodiment. Accordingly, the maximum amount of time between training may be between 28 hours (18+10 hours) to 33 hours (18+15 hours). In a particular embodiment, the maximum amount of time is 30 hours (18+12 hours).

In some embodiments, the software components of device 100 (FIG. 1A) include a triggering event module and a prediction module. Triggering event module can include various sub-modules or systems, e.g., as described in this section with respect to FIG. 36_2. Furthermore, the prediction module can include various sub-modules or systems, e.g., as described in this section with respect to FIG. 36_3.

Example Methods, Devices, and Computer-Readable Media for Application Recommendations Based on Detected Triggering Events In some embodiments, an event can be detected by an input device. The event may be determined to be a triggering event by comparing the event to a group of triggering events. A first prediction model corresponding to the event is then selected. Contextual information about the device specifying one or more properties of the computing device in a first context is then received, and a set of one or more applications is identified. The set of one or more applications may have at least a threshold probability of being accessed by the user when the event occurs in the first context. Thereafter, a user interface is provided to a user for interacting with the set of one or more applications.

In some embodiments, a computer-implemented method for providing a user interface to a user for interacting with a suggested application executing on a computing device is provided, the method comprising, at the computing device: detecting an event at an input device of the computing device; determining that the event corresponds to one of a group of triggering events designated for identifying one or more suggested applications; selecting a first prediction model corresponding to the event; receiving contextual information about the computing device, the contextual information specifying one or more properties of the computing device for a first context; identifying, by the first prediction model, a set of one or more applications that have at least a threshold probability of being accessed by the user when the event occurs in association with the first context, the first prediction model using historical interactions of the user with the computing device after the event is detected; providing the user interface to the user for interacting with the set of one or more applications. In some embodiments, detecting the event at the input device of the computing device comprises: detecting a connection of the computing device to an accessory device. In some embodiments, the accessory device includes headphones or a computer of a vehicle. In some embodiments, the contextual information specifies a location of the computing device. In some embodiments, the user interface allows interactions on a screen with fewer applications than provided on a home screen of the computing device. In some embodiments, detecting the event at the input device of the computing device comprises: detecting a movement of the computing device with one or more motion sensors; and determining a motion state of the computing device based on the movement, wherein the one of the group of triggering events designated for identifying the one or more suggested applications includes the motion state of the computing device. In some embodiments, a second prediction model is selected when another triggering event is detected, the another triggering event being different than the event, wherein the second prediction model is different than the first prediction model. In some embodiments, the set of one or more applications includes a plurality of applications, and wherein the set of one or more applications as a whole has a probability greater than a threshold probability. In some embodiments, the user interface is provided on a lock screen of the computing device, the user interface allowing selection of one of the set of applications from the lock screen. In some embodiments, the method includes: running the set of one or more applications, the user interface being specific to the one or more applications being run. In some embodiments, the one or more properties include at least one of: a location of the computing device, a time of day determined by the computing device, and a day of year determined by the computing device. In some embodiments, the method includes: determining whether a threshold period of time has elapsed; removing the user interface when it is determined that the threshold period of time has elapsed; determining whether the user seeks to access the set of one or more applications when it is determined that the threshold period of time has not elapsed; and running the set of one or more applications when it is determined that the user seeks to access the set of one or more applications. In some embodiments, the threshold period of time is shorter for triggering events that involve direct user interaction than for triggering events that do not involve direct user interaction.

In some embodiments, a computer product comprising a non-transitory computer readable medium stores a plurality of instructions that when executed control a device including one or more processors, the instructions comprising: detecting an event at an input device of the device; determining that the event corresponds to one of a group of triggering events designated for identifying one or more suggested applications; selecting a first prediction model corresponding to the event; receiving contextual information about the device, the contextual information specifying one or more properties of the device for a first context; identifying, by the first prediction model, a set of one or more applications that have at least a threshold probability of being accessed by the user when the event occurs in the first context, the first prediction model using historical interactions of the user with the device when the event is detected; providing a user interface to the user for interacting with the set of one or more applications. In some embodiments, detecting the event at the input device of the device comprises: detecting a connection of the computing device to an accessory device.

In some embodiments, a device is provided, the device comprising: a triggering events storage for storing triggering events; an historical storage for storing historical data; one or more input devices; one or more contextual sources; and one or more processors configured to: detect an event at the one or more input devices; determine that the event corresponds to one of a group of triggering events designated for identifying one or more suggested applications; select a first prediction model corresponding to the event; receive contextual information about the device from the one or more contextual sources, the contextual information specifying one or more properties of the computing device for a first context; identify, by the first prediction model, a set of one or more applications that have at least a threshold probability of being accessed by the user when the event occurs in the first context, the first prediction model using historical interactions of the user with the computing device when the event is detected; provide a user interface to the user for interacting with the set of one or more applications. In some embodiments, the one or more input devices includes at least one of a headphone jack, a Bluetooth device, a button, a touch screen, an accelerometer, and a GPS. In some embodiments, the triggering events are predetermined events. In some embodiments, the user interface allowing interactions with fewer applications than provided on a home screen of the computing device. In some embodiments, the set of one or more applications includes a plurality of applications, and wherein each of the plurality of applications has a probability greater than a threshold probability.

Section 7: People Centric Predictions/Techniques for Suggesting Recipients Based on a Context of a Device The material in this section "People-Centric Predictions" describes people centric predictions and techniques for suggesting recipients based on a context of a device, in accordance with some embodiments, and provides information that supplements the disclosure provided herein. For example, portions of this section describes ways to identify and predict contacts and recommend them for use by a user, which supplements the disclosures provided herein, e.g., those related to method 600 and method 800 discussed below, in particular, with reference to populating suggested people in the predictions portion 930 of FIGS. 9B-9C. In some embodiments, the prediction models and historical interactions databases used to help predict and suggest contacts that are described in this section are used to help identify appropriate contacts for prediction, suggestion and/or inclusion in a user interface, such as a search interface or a lock screen for immediate use by a user (i.e., these prediction models are used in conjunction with methods 600, 800, 1000, and 1200 to suggest/. predict contacts).

Brief Summary for People-Centric Predictions

Embodiments suggest recipients for communications and interactions that are most likely to be relevant to a user of a computing device based on a current context of the device. Examples of a computing device are a phone, a tablet, a laptop, or a desktop computer. An example system gathers knowledge of previous interactions and suggests predicted recipients based on this knowledge. The knowledge can be stored in a historical interactions database with information indicating when, where, and how the user has interacted with other users. The system can recommend recipients (e.g., people) along with a mechanism to interact with them given a specific context. The context can be described in terms of state variables indicating time, location, and an account identifier (e.g., an email account). The context can also be based on keywords (e.g., keywords from an email subject or calendar event title) and other factors, such as, for example, sets of recipients the user has interacted with in the past. Additional constraints can be imposed to help narrow suggestions to particular users, accounts, applications (e.g., communications applications), or mechanisms of interaction.

Embodiments can provide systems, methods, and apparatuses for suggesting one or more recipients to contact with a computing device based on an event and a context. Example events include receiving an input to initiate a search, receiving an input to access an email application, composition of an email, receiving an input to access a text messaging application, composition of a text message, receiving an input to access a calendar application, creation of a calendar entry, editing a calendar entry, initiation of a phone call, initiation of a video call, and initiation of a video conference. Example contexts include location and time. Embodiments can predict recipients of a communication based on the context of the device a user is using to initiate or compose the communication (e.g., at home, commuting to work, at work, etc.). For instance, based on information known about the communication (e.g., whether the communication is an email, instant message, text message, video conference, or calendar invitation), recipients for the communication are predicted. Recipients for communications are also predicted based on previous communications. For instance, users or contacts that a user has interacted with in the past via previous emails, messages, or calls can be suggested as recipients for a communication.

Embodiments can provide methods for suggesting recipients to contact by using contextual information to predict people a user may want to interact with at a certain time and place. Some embodiments determine a current context representing a current state as a user of a device (e.g., a mobile device) is composing or initiating a communication in an application. In embodiments, the current context can include contextual information such as a time, a location, a next calendar entry, a title or subject of the communication (e.g., email subject or calendar entry title), a previous recipient of a similar communication, and account information (e.g., a personal email account or a work email account). Some embodiments use the current context to predict who is the most likely recipient the user will add as a recipient of the communication.

Other embodiments are directed to systems, portable consumer devices, and computer readable media associated with methods described herein.

A better understanding of the nature and advantages of embodiments of the present invention may be gained with reference to the following detailed description and the accompanying drawings.

Detailed Description for People-Centric Predictions

Embodiments can provide a customized and personalized experience for suggesting recipients to a user of a computing device, thereby making use of the device for interacting and communicating with other users easier. Embodiments can provide methods for suggesting recipients to contact using people centric prediction. People centric prediction uses contextual information to predict people a user may want to interact with at a certain time and place. A user of a computing device can interact and communicate with a set of other users (e.g., contacts). Examples of a computing device are a phone, a tablet, a laptop, or a desktop computer. Interactions and communications with other users may occur after specific events. Example events include initiating a search, accessing a communication application, and composing or initiating a communication. Example communication applications include an email application, a calendar application, a video call application, an instant message application, a text message application, a video conference application, a web conferencing application, and a voice call application. Example communications include voice and data communications, such as, for example, an email message, a calendar invitation, a text message, an instant message, a video call, a voice call, and a video conference. When a communication application is used on a device, recipients of communications can be suggested based on comparing a current context of the device to historical information.

In embodiments, data from past, historical interactions is stored in tables of a database and used to suggest recipients of communications. The database can include contextual information for the past interactions such as, for example, timestamps, applications used for the interactions, account information (e.g., an account identifier for an email account), and location. The past interactions can be compared to a device's context to suggest recipients for a communication being initiated on the device. For example, the device's current context can be compared to historical interactions data to match the current context to similar past interactions with previous recipients.

Each data point (e.g., record) in the historical data can correspond to a particular context (e.g., corresponding to one or more properties of the device), with more and more data for a particular context being obtained over time. This historical data for a particular event can be used to suggest recipients to a user. As different users will have different historical data, embodiments can provide a personalized experience.

In some embodiments, recipients for prior, similar communications are used to suggest recipients for a communication being composed or initiated. For example, if a user selects a first recipient for a current communication, other recipients added to past communications with the selected first recipient can be used to predict additional recipients for the current communication. In an embodiment, recipients can be suggested based on contextual data indicating periodicity of interactions (e.g., communications repeatedly sent at a similar time of day or a same day of week). Recipients can also be suggested based on location information indicating that a user's current location is similar to a location the user was at when past communications were sent to certain contacts.

In embodiments, user-supplied information can be used to predict recipients. The user-supplied information can include an email subject, content of an email, a calendar entry title, an event time, and/or a user-selected recipient. Such user-supplied information can be compared to historical contextual information to predict recipients. For example, recipients of past communications having characteristics similar to the user-supplied information can be presented to the user as suggested recipients of a current communication. Some embodiments may use information the user has entered into the communication (e.g., if the user has included a subject or attachment) to determine that such information is relevant to the identification of potential recipients. For example, embodiments can parse a subject of an email message or calendar entry to identify one or more keywords that may be relevant to suggesting potential recipients if such information is available.

To provide an accurate personalized experience, various embodiments can start with a broad model that is simply trained without providing recipient suggestions or that suggests a same set of recipient(s) for a variety of contexts. With sufficient historical data, the broad model can be segmented into sub-models, e.g., as a group of people or interactions, with each sub-model corresponding to a different subset of the historical interactions data. Then, when an event does occur, a particular sub-model can be selected for providing one or more suggested recipients corresponding to a current context of the device. Various criteria can be used to determine when to generate a sub-model, e.g., a confidence level in the sub-model providing a correct prediction in the subset of historical data and an information gain (entropy decrease) in the distribution of the historical data relative to a parent model.

Accordingly, some embodiments can decide when and how to segment the historical data in the context of recipient recommendations. For example, after collecting a period of user interaction activity, embodiments can accumulate a list of possible segmentation candidates (e.g., location, day of week, time of day, etc.). Embodiments can also train a model on the entire dataset and compute a metric of the confidence in the joint distribution of the dataset and the model. A set of models can be trained, one for each of the segmented datasets (i.e., subsets), and then measure the confidence of each of the data model distributions. If the confidence of all data model distributions is admissible, embodiments can perform the segmentation (split) and then recursively examine the segmented spaces for additional segmentations.

In this way, some embodiments can use inference to explore the tradeoff between segmentation and generalization, creating more complex models for users who have more distinct, complex patterns, and simple, general models for users who have noisier, simpler patterns. And, some embodiments can generate a tree of probabilistic models based on finding divergence distributions among potential candidate models.

I. Suggesting Recipients Based on Events

Embodiments can suggest one or more recipients based upon an event, which may be limited to certain predetermined events (also called triggering events). Example triggering events can include initiating a search, composing an email message, creating a calendar entry, etc. For instance, a contact that a user has previously sent email to using a certain email account can be suggested when a user begins composing an email using the email account. In some embodiments, contextual information may be used in conjunction with the event to identify a recipient to suggest to a user. As an example, when a calendar entry (e.g., a calendar event, meeting, or appointment) is being created or modified, contextual information relating to location may be used. If the device is at an office location, for instance, recipient A having an office at that location may be suggested as an invitee for the calendar event. Alternatively, if the device is at home, recipient B associated with the home location (i.e., a family member or roommate) can be suggested as an invitee for the calendar entry. Accordingly, recipients that are predicted to be relevant under certain contexts may be suggested at an opportune time, thus enhancing user experience. As another example, when a calendar entry is open for creation or modification, contextual information relating to time may be used. If the scheduled start time for the calendar entry corresponds to a user's typical work hours, recipient A who is a coworker may be suggested as an invitee for the calendar event. Alternatively, if the calendar entry has a start time corresponding to an evening or weekend, recipient B who is a friend or family member can be suggested as an invitee for the calendar event.

FIG. 37_1 is a flow chart of a method 37_100 for suggesting a recipient based upon a detected event according to embodiments of the present invention. Method 37_100 can be performed by a mobile device (e.g., a phone, tablet) or a non-mobile device and use one or more user interfaces of the device.

At block 37_102, user input at a user device is detected. In some embodiments, it can be determined whether the input corresponds to a triggering event for suggesting recipients. In some implementations, a determination of one or more suggested recipient(s) is only made for certain predetermined events (e.g., triggering events). In other implementations, a determination of the one or more suggested recipient(s) can be made for dynamic list of events, which can be updated based on historical user interactions made using the user device.

In some embodiments, a triggering event can be identified as sufficiently likely to correlate to an operation of a communications application of the device. A list of events that are triggering events can be stored on the device. Such events can be a default list and be maintained as part of an operating system and may or may not be configurable by a user.

A triggering event can be an event induced by a user and/or an external device. For instance, the triggering event can be when an input is received at the mobile device. Examples include receiving input to initiate a search, receiving input to access a communications application, and the like. In this example, each of these events can be classified as a different triggering event. As other examples, a triggering event can be a specific interaction of the user with the device. For example, the user can initiate a search on the device, access a communication application on the device, or begin composing a communication message on the device. Also, for example, the user can move the mobile device to a work location, where a location state of the device is a triggering event. Such a location state (or other states) can be determined based on sensors of the device.

At block 37_104, contextual information representing a current state of the device is determined. In an example, the contextual information can indicate an application executing on the device. For instance, the contextual information can indicate the state of a communication application being used to initiate a communication. The contextual information can also indicate the state of a search application being used to initiate a search. As an example, block 37_104 can include determining a time, account information (e.g., an email account identifier), and/or a location corresponding to a communication application being used on the device. Block 37_104 can also include determining a sub-state of the device, the sub-state being an application state of an executing application. For example, the application state can indicate the state of an email application being used to compose an email message, the state of a calendar application being used to create a calendar event, the state of an instant messaging client being used to initiate an instant message, the state of an application being used to compose a text message, or the state of an application being used to initiate a phone call, a video call, or a video conference.

Contextual information may specify one or more properties of the device for a certain context. The context may be the surrounding environment (type of context) of the device when the triggering event is received. For instance, contextual information may be the time of day that the event is detected. In another example, contextual information may be a certain location of the device when the event is detected. In yet another example, contextual information may be a certain day of year at the time the triggering event is detected. Such contextual information may provide more meaningful information about the context of the device such that the suggestion engine may accurately suggest a recipient that is likely to be selected by the user in that context. Accordingly, prediction engine utilizing contextual information may more accurately suggest a recipient to a user than if no contextual information were utilized.

At block 37_106, historical data representing past interactions between the user and other users is retrieved. The retrieval is based on the contextual information. For example, block 37_106 can include retrieving data corresponding to past emails, messages, phone calls, calendar entries, video calls, and video conferences. The historical data can be retrieved from tables corresponding to previous communications made using the user device, where each of the tables corresponds to a different device sub-state of the user device and includes a plurality of contact measures of previous communications for different recipients. As an example, block 37_106 can include using one or more state variables to identify a first set of the tables that correspond to the one or more state variables, and then obtaining, from the first set of tables, contact measures for one or more potential recipients.

At block 37_108, the contextual information is compared to the historical data. Block 37_108 can include querying a first set of tables identified at block 37_106 to determine correlations between historical data in the set of tables and the contextual information.

At block 37_110, one or more recipients for the communication are predicted. As shown in FIG. 37_1, the recipients are predicted based on the comparison performed at block 37_108. As an example, a previously used contact having a work email address can be identified as a predicted recipient when an email is being composed using a work email account during working hours while the user device is at a work location. In some embodiments, more than one recipient can be identified.

Block 37_110 can use a prediction engine or prediction model to identify predicted recipients. For instance, a prediction model may be selected for a specific triggering event. The prediction model may use contextual information to identify the recipient(s), e.g., interactions or communications with different recipients may be more likely in different contexts. Some embodiments can suggest recipients only when there is a sufficient probability of the suggested recipients being selected by a user, e.g., as determined from historical interactions of the user with the recipients while using the device. Examples of historical interactions can include at least portions of communications that the user exchanged with the recipients using an email application, text messaging (e.g., SMS-based messaging), an instant messaging application, and a video conferencing application.

In some embodiments, a social element based on past communications and interactions can be used to predict recipients. For example, the historical data obtained at block 37_106 can be used to weigh recipients of previously sent emails. The social element reflects historical interactions data between a user of the user device and groups of past recipients of the user's communications (e.g., contacts and groups of contacts). Co-occurrences (i.e., communications sent to the same group of recipients) can be used to predict email recipients. For instance, a social element can weigh each recipient the user has sent email to, with higher weights being assigned to recipients who have been repeatedly included in a group of recipients (e.g., a CC list or a defined group of contacts). The recipients can be uniquely identified within the historical data by their respective email addresses. The social element weight can be higher for sent email messages as compared to received emails. The social element can also be weighted based on the email account (e.g., a personal account or a work account) that the user has used to send email messages. When the contextual information indicates an email is being composed, the social element can be used to identify co-occurrences of recipients for past email messages. These co-occurrences can be used in turn to predict recipients of the email being composed, particularly when the user selects a recipient that has been included in a group of recipients in the past email messages.

At block 37_112, an indication of the one or more predicted recipients is provided to the user. Block 37_112 can include presenting a list of the one or more predicted recipients in a user interface of the user device, or within a communication application executing on the user device. In some embodiments, an action can be performed in association with an executing application at block 37_112. In an embodiment, the action may be the displaying of a user interface for a user to select one or more of the predicted recipients. The user interface may be provided in various ways, such as by displaying on a screen of the device, projecting onto a surface, or providing an audio interface.

In other embodiments, an application may run, and a user interface specific to the application may be provided to a user. Either of the user interfaces may be provided in response to identifying a recipient, e.g., a potential recipient of a communication. In other implementations, a user interface to interact with the application may be provided after a user is authenticated (e.g., by password or biometric), but such a user interface would be more specific than just a home screen, such an interface with a list of suggested recipients.

II. Events Initiating Recipient Prediction

Triggering events may be a predetermined set of events that trigger the identification of one or more recipients to provide to a user. The events may be detected using signals generated by device components. Details of how triggering events are detected are discussed in further detail below with reference to FIG. 37_2.

FIG. 37_2 illustrates a simplified block diagram of a detection system 37_200 for determining a triggering event according to embodiments of the present invention. Detection system 37_200 may reside within the device for which a triggering event is being determined. As shown, detection system 37_200 can detect a plurality of different events. One or more of the detected events may be determined by the detection system 37_200 to be triggering events. Other processing modules can then perform processing using a triggering event.

A. Detecting Events

In embodiments, detection system 37_200 includes hardware and software components for detecting triggering events. As an example, detection system 37_200 may include a plurality of input devices, such as input devices 37_202. Input devices 37_202 may be any suitable device capable of generating a signal in response to an event. For instance, input devices 37_202 may include user interaction input devices 37_204 and location input devices 37_206 that can detect device connection events, user interaction events, and locational events, respectively. When an event is detected at an input device, the input device can send a signal indicating a particular event for further analysis.

In some embodiments, a collection of components can contribute to a single event. For example, a person can be detected to be commuting to or from work based on motion sensors, a GPS location device, and a timestamp.

1. User Interaction Events

User interaction input devices 37_204 may be utilized to detect user interaction events. User interaction events can occur when a user interacts with the device. In some embodiments, a user can provide inputs to a displayed user interface of an application via one of user interaction input devices 37_204. In other embodiments, the user interface may not be displayed, but still is accessible to a user, e.g., via a user shaking a device or providing some other type of gesture. Further, the interaction may not include a user interface, e.g., when a state engine uses values from sensors of the device.

Any suitable device component of a user interface can be used as a user interaction input device 37_204. Examples of suitable user interaction input devices are a button 37_208 (e.g., a home or power button), a touch screen 37_210, a camera 37_212, an accelerometer 37_214, a microphone 37_216, and a mouse 37_218. For instance, button 37_208 of a mobile device, such as a home button, a power button, volume button, and the like, may be a user interaction input device 37_204. In addition, a switch such as a silent mode switch may be a user interaction input device 37_204. Also, for example, microphone 37_216 of a mobile device, such as an integrated microphone configured to detect voice commands, may be a user interaction input device 37_204. Further for example, a mouse 37_218 or a pointing device such as a stylus may be a user interaction input device 37_204 used to provide user inputs to a communication application.

When the user interacts with the device, it may be determined that a user has provided user input to an application, and a corresponding triggering event may be generated. Such an event may depend on a current state of the device, e.g., where the device is located or when the event occurs. That is, a triggering event can be generated based in part on input from a user interaction input device 37_204 in conjunction with a location state of the device (e.g., at a work location) and a time context (e.g., a weekday morning). Such information can also be used when determining whether an event is a triggering event.

Touch screen 37_210 may allow a user to provide user input via a display screen. For instance, the user may swipe his or her finger across the display to generate a user input signal. When the user performs the action, a corresponding triggering event 37_228 may be detected.

Accelerometer 37_214 or other motion sensors may be passive components that detect movement of the mobile device, such as shaking and tilting (e.g., using a gyrometer or compass). Such movement of a mobile device may be detected by an event manager 37_230, which can determine the movement to be of a particular type. The event manager 37_230 can generate an event signal 37_232 corresponding to the particular type of a user interaction event in a given state of the device. The state of the device may be determined by a state engine, further details of which can be found in U.S. Patent Publication No. 2012/0310587 entitled "Activity Detection" and U.S. Patent Publication No. 2015/0050923 entitled "Determining Exit From A Vehicle," the disclosures of which are incorporated by reference in their entireties.

One example is when a user is running, the accelerometer may sense the shaking and generate a signal to be provided to the event manager 37_230. The event manager 37_230 can analyze the accelerometer signal to determine a type of event. Once the type of event is determined, the event manager 37_230 can generate an event signal 37_232 corresponding to the type of event. The mobile device can move in such a manner as to indicate that the user is running. Thus, this particular user interaction can be identified as a running event. The event manager 37_230 can then generate and send the event signal 37_232 indicating that a running event has been detected.

2. Locational Events

Locational input devices 37_206 may be used to generate locational events. Locational events can be used in combination with user interaction events to trigger suggestion of a recipient. Any suitable positioning system may be used to generate locational events. For instance, a global positioning system (GPS) may be used to generate locational events. Locational events may be events corresponding to a specific geographic location. As an example, if the mobile device arrives at a specific location, the GPS component may generate an input signal corresponding to a locational event.

B. Determining Triggering Events

As further illustrated in FIG. 37_2, input devices 37_202 can output a detected event 37_222, e.g., as a result of any of the corresponding events. Detected event may include information about which input device is sending the signal for detected event 37_222, a subtype for a specific event (e.g., which type of headphones or type of data connection). Such information may be used to determine whether detected event 37_222 is a triggering event, and may be passed to later modules for determining which prediction model to use or which action to perform for a suggested recipient (e.g., compose an email, create a calendar invitation, initiate a voice or video call).

Detected event 37_222 may be received by an event manager 37_230. Event manager 37_230 can receive signals from input devices 37_202, and determine what type of event is detected. Depending on the type of event, event manager 37_230 may output signals (e.g., event signal 37_232) to different engines. The different engines may be have a subscription with the event manager 37_230 to receive specific event signals 37_232 that are important for their functions. For instance, triggering event engine 37_224 may be subscribed to receive event signals 37_232 generated in response to detected events 37_222 from input devices 37_202. Event signals 37_232 may correspond to the type of event determined from the detected events 37_222.

Triggering event engine 37_224 may be configured to determine whether the detected event 37_222 is a triggering event. To make this determination, triggering event engine 37_224 may reference a designated triggering events database 37_226, which may be coupled to the triggering event engine 37_224. The designated triggering events database 37_226 may include a list of predetermined events that are designated as triggering events.

Triggering event engine 37_224 may compare the received detected event 37_222 with the list of predetermined events and output a triggering event 37_228 if the detected event 37_222 matches a predetermined event listed in the designated triggering events database 37_226. An example the list of predetermined events may include any one or more of: (1) accessing a communications application, (2) initiating a search, (3) composing a communication, (4) sensing a certain type of movement of the device, and (5) arriving at a certain location. For (5), designated triggering events database 37_226 can include specifications of the certain location. For each of the predetermined events (1)-(5), a time or time range of the occurrence of the events can be included in designated triggering events database

37_226. For example, designated triggering events database 37_226 can store a designated triggering event corresponding to sensing arrival at a work location between 8-10 am.

III. Suggested Recipient Determination

Once a triggering event is detected, one or more potential recipients may be identified based on the triggering event. In some embodiments, identification of the recipient(s) is not a pre-programmed action. Rather, identification of the recipient(s) can be a dynamic action that may change depending on additional information. For instance, identification of the suggested recipient(s) can be determined based on contextual information and/or people-centric historical interaction information, as well as based on other information.

Each time a particular triggering event occurs (e.g., accessing an email client, calendar application, instant messaging application, or video conferencing application on the device), the device can track which recipient(s) are selected as recipients of a communication in association with the event. In response to each occurrence of the particular event, the device can save a data point corresponding to a selected recipient, interaction with the recipient performed using the application, and the event. In various embodiments, the data points can be saved individually or aggregated, with a count being determined for the number of times a particular recipient is selected, which may include a count for a specific action. For example, counts indicating the number of emails sent to a recipient can be saved with information indicating which email account was used to send the emails, the times when the emails were sent, and the location of the device when the emails were sent. In this example, the data points can also indicate the number of times the recipient was the first addressee for an email, was included as part of an email group or distribution list, was copied (e.g., carbon copied/CC or blind carbon copied/BCC). Thus, different counts are determined for different actions for a same selected recipient.

Historical data that indicates previous user interactions and communications with recipients can be used as an input to a prediction model that predicts whether a given recipient should be suggested as a recipient of a future communication. For instance, historical data used for predicting/suggesting recipients can include records of past interactions (i.e., historical interactions) with other users. Examples of such historical interactions include voice calls, emails, calendar entries/events, instant messages, text messages (e.g., SMS-based messages), video conferences, and video calls. For example, historical interactions can include a call history indicating times, durations, and recipients (identified by phone numbers) corresponding to past voice calls. Also, for example, historical interactions can include an email history indicating times, periodicity (e.g., daily, weekly), and recipients (identified by email addresses) corresponding to past email messages.

Once a particular event is detected, a prediction model corresponding to the particular event can be selected. The prediction model would be determined using the historical interactions data corresponding to the particular event as input to a training procedure. However, the historical data might occur in many different contexts (i.e., different combinations of contextual information), with different recipients being selected in different contexts. Thus, in aggregate, the historical interactions data might not suggest a recipient that will clearly be selected by a user when a particular event occurs.

A prediction model can correspond to a particular event. Suggested recipients to contact can be determined using one or more properties of the computing device. For example, a particular sub-model can be generated from a subset of historical data corresponding to user interactions with other users after occurrences of the event. The subset of historical interactions data can be gathered when the device has the one or more properties (e.g., user interactions with selected recipients after an event of accessing an email application, with a property of a particular location and/or time of day). The prediction model can be composed of sub-models, each for different combinations of contextual data. The different combinations can have differing amounts of contextual data. The sub-models can be generated in a hierarchical tree, with the sub-models of more specific combinations being lower in a hierarchical tree. In some embodiments, a sub-model can be generated only if the sub-model can predict a recipient with greater accuracy than a model higher in the tree. In this manner, a more accurate prediction can be made for which application the user will select. In some embodiments, the prediction model and sub-models may identify the top N recipients (e.g., a fixed number of a percentage) that are chosen by the user after the event when there is a particular combination of contextual data.

A model, such as a neural network or regression, can be trained to identify a particular application for a particular context, but this may be difficult when all of the corresponding historical data is used. Using all the historical interactions data can result in over-fitting the prediction model, and result in lower accuracy. Embodiments of the present invention can segment the historical data into different input sets of the historical data, each corresponding to different contexts. Different sub-models can be trained on different input sets of the historical data.

A. Different Models Based on Different Contextual Data

When a particular event occurs, the device could be in various contexts, e.g., in different locations (such as at work, at home, or at school), at different times, on different days of the week (such as business days or weekends), at different motion states of the device (such as running, walking, driving in a car, or stationary), or at different states of communication application usage (such as being used to compose an email or create a calendar entry). The contextual information can be retrieved in association with the detected event, e.g., retrieved after the event is detected. The contextual information can be used to help predict which predicted recipient might be selected as a recipient for a communication in connection with the detected event. Different locations can be determined using a GPS sensor and times can be determined based on when prior communications were transmitted. Different motion states can be determined using motion sensors, such as an accelerometer, a gyrometer, or a GPS sensor.

Embodiments can use the contextual information in various ways. In one example, a piece of the contextual data (e.g., corresponding to one property of the device) can be used to predict which recipient(s) are most likely to be selected. For example, a particular location of the device can be provided as an input to a prediction model.

In another example, some or all of the contextual data of the contextual information can be used in a segmentation process. A certain piece of contextual data can be used to segment the input historical data, such that a particular sub-model is determined only using historical data corresponding to the corresponding property of that piece of contextual data. For example, a particular location of the device would not be used as an input to the sub-model, but would be used to select which sub-model to use, and correspondingly which input data to use to generate the particular sub-model.

Thus, in some embodiments, certain contextual data can be used to identify which sub-model to use, and other contextual data can be used as input to the sub-model for predicting which recipient(s) that the user might interact with. A particular property (e.g., a particular location) does not correspond to a particular sub-model, that particular property can be used as a future (input) to the sub-model that is used. If the particular property does correspond to a particular sub-model, the use of that property can become richer as the entire model is dedicated to the particular property.

One drawback of dedicating a sub-model to a particular property (or combination of properties) is that there may not be a large amount of the historical data corresponding to that particular property. For example, the user may have only performed a particular event (e.g., composing an email) at a particular location a few times. This limited amount of data is also referred as data being sparse. Data can become even more sparse when combinations of properties are used, e.g., a particular location at a particular time. To address this drawback, embodiments can selectively determine when to generate a new sub-model as part of a segmentation process.

1. Default Model

When a device is first obtained (e.g., bought) by a user, a default model can be used. The default model could apply to a group of events (e.g., all events designated as triggering events). The default model can be seeded with aggregate data from other devices associated with user. In some embodiments, the default model can simply pick the most popular recipient, regardless of the context, e.g., as not enough data is available for any one context. Once more data is collected, the default model can be discarded.

In some embodiments, the default model can have hard-coded logic that specifies predetermined recipient(s) to be suggested and actions to be performed. In this manner, a user can be probed for how the user responds (e.g., a negative response is a user does not select a suggested recipient), which can provide additional data that simply tracking for affirmative responses are used. In parallel with such a default model, a prediction model can be running to compare its prediction against the actual result. A prediction model can then be refined in response to the actual result. When the prediction model has sufficient confidence, the switch can be made from the default model to the prediction model. Similarly, the performance of a sub-model can be tracked. When the sub-model has sufficient confidence, the sub-model can be used for the given context. In some embodiments, there are different sub-models about for different events. For example, an email sub-model can be used for email contexts to predict email recipients, and a separate calendar sub-model can be used to predict invitees for calendar events. These different sub-models can use data from corresponding tables in a historical interactions database to identify recipients of previous emails and calendar invitations. In this example, an email table can have records for past email messages indicating recipients that a user previously added to the messages. Similarly, a calendar table in the historical interactions database can have records for past calendar events that indicate users that were invited to the calendar events.

2. Initial Training

A prediction model (e.g., an event model) can undergo initial training using historical data collected so far, where the model does not provide recipient suggestions to a user. This training can be called initial training. The prediction model can be updated periodically (e.g., every day) as part of the background process, which may occur when the device is charging and not in use. The training may involve optimizing coefficients of the model so as to optimize the number of correct predictions and compared to the actual results in historical interactions data. In another example, the training may include identifying the top N (e.g., a predetermined number a predetermined percentage) applications actually selected. After the training, the accuracy of the model can be measured to determine whether the model should be used to provide a suggested recipient (and potential corresponding type of interaction) to the user.

Once a model is obtaining sufficient accuracy (e.g., top selected application is being selected with a sufficiently high accuracy), then the model can be implemented. Such an occurrence may not happen for a top-level model (e.g., a first event model), but may occur when sub-models are tested for specific contexts. Accordingly, such an initial training can be performed similarly for a sub-model.

B. Segmenting as More Data is Obtained

When a user first begins using a device, there would be no historical interaction data for making predictions about the recipients the user might select to interact with after a particular event (e.g., after accessing an email application, a calendar application, a video conference application, or a calendar application). In an initial mode, historical interactions data can be obtained while no predicted recipients are suggested. As more historical data is obtained, determinations can be made about whether to segment the prediction model into sub-models. With even more historical interaction data, sub-models can be segmented into further sub-models. When limited historical data is available for user interactions with recipients, no recipients may be suggested or a more general model can be used.

A segmentation process can be performed by a user device (e.g., a mobile device, such as a smartphone), which can maintain data privacy. In other embodiments, a segmentation process can be performed by a server in communication with the user device. The segmentation process can be performed in parts over a period of time (e.g., over days or months), or all of the segmentation process can be performed together, and potentially redone periodically. The segmentation process can execute as a routine of a recipient prediction engine.

As more data is collected, a prediction model can be segmented into sub-models. At different points of collecting data, a segmentation may occur. As even more data is obtained, another segmentation may occur. Each segmentation can involve completely redoing the segmentation, which may or may not result in the same sub-models being created as in a previous segmentation.

In this example, a first event model can correspond to a particular event (e.g., sending an email to a particular contact, such as a co-worker). The event model can correspond to a top level of a prediction engine for the particular event. Initially, there can be just one model for the particular event, as minimal historical interaction data is available. At this point, the event model may just track the historical data for training purposes. The event model can make recipient predictions and compare those predictions to the actual results (e.g., whether the user selects a suggested recipient to interact with within a specified time after the event is detected). If no recipients have a probability greater than a threshold, no recipients may be suggested when the particular event occurs.

In some embodiments, the event model only uses data collected for the particular device. In other embodiments, the event model can be seeded with historical interactions data aggregated from other devices associated with the user.

Such historical interactions data may allow the event model to provide some recipient recommendations, which can then allow additional data points to be obtained. For example, it can be tracked whether a user interacts with a suggested recipient via a particular application (e.g., email, audio call, video conference, instant message, or text message), which can provide more data points than just whether a user does select a recipient.

As more data is collected, a determination can be made periodically as to whether a segmentation should occur. Such a determination can be based on whether greater accuracy can be achieved via the segmentation. The accuracy can be measured as a level of probability that a prediction can be made, which is described in more detail below. For example, if a recipient can be predicted with a higher level of probability for a sub-model than with the event model, then a segmentation may be performed. One or more other criteria can also be used to determine whether a sub-model should be created as part of segmentation process. For example, a criterion can be that a sub-model must have a statistically significant amount of input historical data before the sub-model is implemented. The requirement of the amount of data can provide greater stability to the sub-model, and ultimately greater accuracy as a model trained on a small amount of data can be inaccurate.

C. System for Suggesting Recipients Based on Triggering Event

FIG. 37_3 illustrates a simplified block diagram of a prediction system 37_300 for identifying a recipient and a corresponding action command based upon a triggering event and contextual information according to embodiments of the present invention. Prediction system 37_300 resides within the device that is identifying the application. Prediction system 37_300 may include hardware and software components.

Prediction system 37_300 includes a prediction engine 37_302 for identifying the suggested recipient(s). Prediction engine 37_302 can receive a triggering event. The prediction engine 37_302 may use information gathered from the triggering event 37_328 to identify a suggested recipient 37_304. As shown, the prediction engine 37_302 may receive contextual data 37_306 in addition to the triggering event 37_328. The prediction engine 37_302 may use information gathered from both the triggering event 37_328 and the contextual data 37_306 to identify a suggested recipient 37_304. In embodiments, based on received contextual data 37_306, prediction engine 37_302 uses different models to identify suggested recipients for different types of communications. For example, prediction engine 37_302 can use an email sub-model when contextual data 37_306 indicates an email application is being accessed or an email is being composed. The email sub-model can use such contextual data 37_306 in conjunction with historical email data from a historical events database 37_316 to predict email recipients. The email sub-model can be used to predict recipients of an email, and a separate calendar sub-model can be used to predict invitees for calendar events. Prediction engine 37_302 may also determine an action to be performed, e.g., how and when a user interface may be provided for a user to interact with a suggested recipient.

1. Contextual Information

Contextual information may be gathered from contextual data 37_306. In embodiments, contextual information may be received at any time. For instance, contextual information may be received before and/or after the triggering event 37_328 is detected. Additionally, contextual information may be received during detection of the triggering event 37_328. Contextual information may specify one or more properties of the device for a certain context. The context may be the surrounding environment (type of context) of the device when the triggering event 37_328 is detected. For instance, contextual information may be the time of day the triggering event 37_328 is detected. In another example, contextual information may be a certain location of the device when the triggering event 37_328 is detected. In yet another example, contextual information may be a certain day of year at the time the triggering event 37_328 is detected. Such contextual information may provide more meaningful information about the context of the device such that the prediction engine 37_302 may accurately suggest a recipient that is likely to be selected as a recipient by the user in that context. Accordingly, prediction engine 37_302 utilizing contextual information may more accurately suggest a recipient to a user than if no contextual information were utilized.

Contextual data 37_306 may be generated by contextual sources 37_308. Contextual sources 37_308 may be components of a mobile device that provide data relating to the current situation of the mobile device. For instance, contextual sources 37_308 may be hardware devices and/or software code that operate as an internal digital clock 37_310, GPS device 37_312, and a calendar 37_314 for providing information related to time of day, location of the device, and day of year, respectively. Other contextual sources may be used.

Gathering the contextual data 37_306 for the prediction engine 37_302 may be performed in a power efficient manner. For example, continuously polling the GPS 37_312 to determine the location of the device may be excessively power intensive, which may decrease battery life. To avoid decreasing battery life, prediction engine 37_302 may determine the location of the device by requesting the device's location from sources other than the GPS 37_312. Another source for locational information may be an application that has recently polled the GPS 37_312 for the device's location. For instance, if application A is the most recent application that has polled the GPS 37_312 for the device's location, the prediction engine 37_302 may request and receive locational data from application A rather than separately polling the GPS 37_312.

2. Historical Information

In addition to the contextual sources 37_308, a historical events database 37_316 may also be utilized by the prediction engine 37_302 in certain embodiments. The historical events database 37_316 may include historical information of prior interactions between the user and the mobile device after a triggering event is detected.

The historical events database 37_316 may keep a record of the number of times a user interacted with a recipient following a certain triggering event. For instance, the historical events database 37_316 may keep a record indicating that a user includes recipient B on an email or calendar invitation eight out of ten times when including recipient A. Accordingly, the prediction engine 37_302 may receive this information as historical interaction data 37_318 to determine whether recipient B should be identified for the user when recipient A is selected for an email or calendar communication.

The historical events database 37_316 may also keep a record of the number of times a recipient was interacted with under different contexts when the triggering event is detected. For example, the database 37_316 may keep a record indicating that a user interacts with recipient A nine out of ten times after the user accesses a personal email account when the user is at home, and one out of the ten times when the user is at a work location and using a work email account. Accordingly, the prediction engine 37_302 may receive this information as historical interaction data 37_318 and determine that recipient A should be suggested when the user accesses the personal email account at home, but not at work when accessing a work email account. It is to be appreciated that although examples discussed in this section refer to locations as "home" or "work," contextual data 37_306 representing "home" or "work" may be in the form of numerical coordinates such as, for example, geographic coordinates. One skilled in the art understands that time information relating to time of day, day of week, and day of year may be used instead of location in a similar manner to identify recipients.

Historical events database 37_316 may also keep a record of how often, and under what circumstances, the user decides not to select the identified recipient as a recipient for a communication. For instance, the historical events database 37_316 may keep a record indicating that the user did not select recipient B as a recipient for a phone call two out of ten times that person was suggested to the user when the user inserted a headset into the device at home. Accordingly, the prediction engine 37_302 may receive this information as historical interaction data 37_318 to adjust the probability of suggesting recipient B when the user inserts the headset into the device at home.

As described above, one aspect of the present technology is the gathering and use of data available from various sources to improve prediction of users that a user may be interested in communicating with. The present disclosure contemplates that in some instances, this gathered data may include personal information data that uniquely identifies or can be used to contact a specific person. Such personal information data can include location-based data, telephone numbers, email addresses, work addresses, home addresses, past interaction records, or any other identifying information.

The present disclosure recognizes that the use of such personal information data, in the present technology, can be used to the benefit of users. For example, the personal information data can be used to predict users that a user may want to communicate with at a certain time and place. Accordingly, use of such personal information data included in contextual information enables people centric prediction of people a user may want to interact with at a certain time and place.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of people centric prediction services, the present technology can be configured to allow users to select to "opt in" or "opt out" of participation in the collection of personal information data during registration for services. In another example, users can select not to provide location information for recipient suggestion services. In yet another example, users can select to not provide precise location information, but permit the transfer of location zone information.

D. User Interfaces

FIGS. 37_4 and 37_5 illustrate exemplary user interfaces for presenting lists of suggested recipients. In particular, FIG. 37_4 illustrates a user interface 37_400 for a device 37_402 that is associated with an already running email application. User interface 37_400 may be a user interface for a client email application, although other user interfaces for different applications are envisioned in this section as well. For example, user interface 37_400 can be a user interface for any application usable to interact with recipients such as an instant messaging application, a video conferencing application, and a calendar application. User interface 37_400 may be provided by a touch-screen display 37_404. Touch-screen display 37_404 may display an email interface 37_406 including a subject line 37_408. Subject line 37_408 may allow a user to enter a subject for an email message. A suggested recipients list 37_410 allows a user to select one or more suggested recipients. As shown, embodiments can present suggested recipients in suggested recipients list 37_410 based on the context of device 37_402 without any subject or title having been entered in subject line 37_408. Such a zero-keyword search can be performed by device 37_402 based on the current context of device 37_402. For instance, based on the current location of device 37_402, current time, as an email account identifier in use on device 37_402, and other contextual information, suggested email recipients can be determined and displayed in suggested recipients list 37_410 without relying on a complete or partial subject of an email message having been provided in subject line 37_408. In some embodiments, when a user enters a subject (or portion thereof) on subject line 37_408, the suggested recipients list 37_410 can be updated based on keywords in the subject line.

Portions of the user interface 37_400 may be hidden in some situations. For instance, if a suggestion center, such as the suggestion center 37_320 in FIG. 37_3, of the device 37_402 decides that another recipient (e.g., predicted recipient B shown in FIG. 37_4) has priority over a first suggested recipient (e.g., predicted recipient A shown in FIG. 37_4), the first recipient may be hidden and the other recipient may be displayed instead. The other recipient may then be displayed first in the suggested recipients list 37_410 on the display 37_404. Accordingly, the user may be made aware of, and given the opportunity to interact with, the recipient that is deemed to have higher priority. In the example embodiment of FIG. 37_4, no input regarding recipients have been provided by the user in interface 37_400. As shown, embodiments can present suggested recipients in suggested recipients list 37_410 based on the context of device 37_402 without any recipients (or partial recipient names) having been entered in interface 37_400. That is, suggested recipients can be identified and displayed in suggested recipients list 37_410 without using any auto-completion technique to predict a contact based on a partially entered contact name or email address. Such a zero-keyword search can be performed by device 37_402 based on the current context of device 37_402. For example, based on the current location of device 37_402, current time, and other contextual information, such as an email account in use on device 37_402 (e.g., a work or personal email account), suggested email recipients can be determined and displayed in suggested recipients list 37_410.

FIG. 37_5 illustrates a user interface 37_500 for a device 37_502 that is associated with an already running search application. User interface 37_500 may be provided by a touch-screen display 37_504. Touch-screen display 37_504 may display a search interface 37_506 including a search window 37_508. Search window 37_508 may allow a user to enter one or more search terms. A search results window 37_510 can present suggested recipients. In the example of FIG. 37_5, no keywords have been provided by a user in search window 37_508. As shown, embodiments can present suggested recipients in search results window 37_510 based on the context of device 37_502 without any search terms or keywords having been entered in search window 37_508. Such a zero-keyword search can be performed by device 37_502 based on the current context of device 37_502. For instance, based on the current location of the device, current time, and other contextual information, such as a user account identifier in use on device 37_502, suggested recipients can be determined and displayed in search results window 37_510. A user can then interact with the search results window 37_510 to select one or more suggested recipients. In embodiments, when the user enters a search term (or a portion thereof) in search window 37_508, suggested recipients in search results window 37_510 can be updated based on the search term.

In some embodiments, search results window 37_510 can be more than the example list of contacts shown in FIG. 37_5. For example, search results window 37_510 can include information indicating how the user may interact with the suggested recipients. Search results window 37_510 can also indicate a reason why the interaction should occur. For example, search results window 37_510 can suggest that the user initiate a video call to Recipient A on the recipient's personal account using the user's personal account because the user often does so around this time of day. The suggestion can go so far as to suggest a specific communications application to be used to contact Recipient A.

E. Method

FIG. 37_6 is a flowchart of a method 37_600 for suggesting one or more recipients to a user of a computing device based on an event according to embodiments of the present invention. Method 37_600 can be performed by a computing device (e.g., by a user device that is tracking user interactions with the user device). Method 37_600 can use a set of historical interactions including interactions having different sets of one or more properties of the computing device to suggest the recipients.

At block 37_602, the device detects an event at an input device. As shown, block 37_602 can include detecting a user input at a user device associated with the user. Examples of an input device are a touch screen, a microphone for providing voice commands, a camera, buttons, a mouse, a stylus, a keyboard, and the like. The event may be any action where the mobile device interacts with an external entity such as an external device or a user. The event can be of a type that recurs for the device. Thus, historical, statistical data can be obtained for different occurrences of the event. Models and sub-models can be trained using such historical data.

Block 37_602 can include receiving one or more properties of the user device. The one or more properties may be received by a recipient suggestion engine executing on the device. As mentioned in this section, the properties can correspond to time, location, a motion state, calendar events, and the like. Such one or more properties can correspond to contextual data that defines a particular context of the device. The one or more properties can be measured at a time around the detection of the event, e.g., within some time period. The time period can include a time before and after the detection of the event, a time period just before the detection of the event, or just a time after the detection of the event.

At block 37_604, it is determined that the user input corresponds to a trigger for providing a suggested recipient via a suggestion engine. For instance, if a user input is received for composing an email in an email application, block 37_604 can determine that a suggested recipient for the email should be provided. Also, for example, if a user input for initiating a search in a search application is received, block 37_604 can include determining that predicted contacts are to be included in search results.

At block 37_606, one or more tables corresponding to previous communications made using the user device are populated. In the example of FIG. 37_6, each of the one or more tables corresponds to a different sub-state of the user device and includes a plurality of contact measures of previous communications with different recipients. For instance, the previous communications can include previous interactions with other users such as, for example, previous emails, voice calls, text messages, instant messages, video calls, and calendar invitations.

At block 37_608, the one or more state variables are used to identify a first set of the one or more tables that corresponds to the one or more state variables. For example, if a location state variable indicates that the user device is at the user's home, block 37_608 can include identifying tables corresponding to previous communications associated with the user's home. That is, the tables corresponding to previous communications made using the user device can be filtered down to just tables corresponding to previous communications initiated or performed while the user was home. In this example, a set of tables for past emails composed, read, or edited while the user was home can be identified when the location state variable indicates the user device is at the user's home. Also, for example, if an account state variable indicates that the user is using a work email account, block 37_608 can include identifying a set of tables corresponding to past communications made using that work email account. Embodiments can use multiple state variables (e.g., a location state and an account state) to At block 37_610, the first set of tables are queried to obtain the contact measures for one or more potential recipients. The contact measures can include, for example, contact measures for recipients of calendar invitations for previous calendar events made using the user device, times when previous email messages were made (i.e., composed or sent), email account identifiers associated with the previous email messages, other recipients copied on the email messages, a number of email messages sent to each recipient. In one example, querying the first set of tables can be done to compute a total number of previous communications sent to each of one or more potential recipients. For instance, querying the first set of tables can include querying email tables to determine a cumulative number of email messages sent to and received from each of the potential recipients. Querying the first set of tables can also include querying calendar event tables to determine a total number of calendar invitations sent to and received from each of the potential recipients.

Block 37_610 can query tables based on individual interactions with a potential recipient as well as group interactions with groups of recipients. For instance, block 37_610 can predict a next email recipient where the context data from an email table indicates previous email interactions (e.g., a sent or received email message) between a user and a recipient. Block 37_610 can include ranking historical interactions that correspond to the current context. For example, a weight for an interaction can include a social element indicating a co-occurrence of multiple recipients. In this example, ranks for a user's historical interactions with a group of recipients can be increased based on whether the user previously interacted with the group in other past interactions. That is, a rankings boost can be given to members of a set of recipients based on that set of recipients having been included in common, past interactions (e.g., recipients repeatedly copied as a group on emails sent by the user). In this way, if a user previously selected two recipients for past emails and both recipients were copied on emails sent to a third recipient, that third recipient would get a ranking boost based on previously being included with the two recipients. But, if the user had another interaction where only one of these three recipients was included, that interaction would not get the same ranking boost.

At block 37_612, a total contact measure of previous communications and interactions using the obtained contact measures is computed for each of the one or more potential recipients. In one example, the total contact measure of previous communications is a cumulative total number of previous communications sent to each of the one or more potential recipients. In this example, a total number of emails, messages, calls, and calendar invitations sent to each of the potential recipients can be calculated by querying the one or more tables.

At block 37_614, the prediction engine is used to identify one or more predicted recipients to suggest to the user based on the total contact measures of the one or more potential recipients and using one or more criteria. In some embodiments, the criteria can include a minimum number of predicted recipients to suggest (e.g., the top N recipients), a percentage of predicted recipients to suggest (e.g., the top 25 percent), and/or a threshold confidence level for suggesting a predicted recipient. Block 37_614 can include using a hard cutoff as a criterion. For example, recipients may only be considered that had a minimum number of prior interactions with the user. In some embodiments, a social criterion is used to suggest recipients. For instance, predicted recipients may be suggested when they have co-occurrences with another suggested recipient that the user has previously interacted with. In some embodiments, recipients having similar characteristics to other predicted recipients can be suggested. For instance, recipients with the same email address domain and who are associated with the same location as a predicted recipient may be suggested as additional recipients for a communication.

Block 37_614 can include using a particular sub-model to identify one or more recipients to suggest to the user. The one or more recipients can have at least a threshold probability of at least one of the one or more recipients being interacted with by the user in association with the triggering event. Predicting one of the one or more recipients in the historical data can be identified as a correct prediction. The threshold probability can be measured in a variety of ways, and can use a probability distribution determined from the historical data, as is described in more detail below. For example, an average (mean) probability, a median probability, or a peak value of a probability distribution can be required to be above the threshold probability (e.g., above 0.5, equivalent to 37-60%). Thus, a confidence level can be an average value, median value, or a peak value of the probability distribution. Another example is that the area for the probability distribution above a specific value is greater than the threshold probability.

At block 37_616, the one or more predicted recipients are provided to the user. Block 37_614 can include providing a user interface to the user for communicating with the one or more recipients. For example, the device may display the identified recipients to the user via a list interface with which the user may interact to indicate whether the user would like to access the identified recipients. For instance, the user interface may include a touch-sensitive display that shows the user one or more of the identified recipients, and allows the user to communicate with one or more of the recipients identified by the device by interacting with the touch-sensitive display. The user interface can allow interactions on a display screen with fewer recipients than provided in a list of all of the user's recipients.

As an example, one or more suggested recipients can be provided in a recipients list on a search screen. The user can select a recipient and then select how the selected recipient is to be communicated with from the search screen, thereby making it easier for the user to interact with the selected recipient. For example, a user interface specific to a communication application (e.g., an email application) can appear after authenticating the user (e.g., via password or biometric).

In an email context, block 37_614 can provide the suggested recipients as potential recipients of an email message. In this context, the example email application interface of FIG. 37_4 can be used to provide suggested email recipients to a user. In a search context, block 37_614 can include providing the suggested recipients as search results in a search interface. For example, the search interface of FIG. 37_5 can be used to present the suggested recipients in a list of search results.

F. Example Models

In some embodiments, a model can select the top N recipients for a given set (or subset) of data. Since the N recipients have been picked most often in the past, it can be predicted that future behavior will mirror past behavior. N can be a predetermined number (e.g., 1, 2, or 3) or a percentage of recipients, which may be the number of recipients that were actual past recipients associated with the event. Such a model can select the top N recipients for providing to the user. Further analysis can be performed, e.g., to determine a probability (confidence) level for each of the N recipients to determine whether to provide them to the user, and how to provide them to the user (e.g., an action), which may depend on the confidence level.

In an example where N equals three, the model would return the top three most selected recipients when the event occurs with contextual information corresponding to the particular sub-model.

In other embodiments, a sub-model can use a composite signal, where some contextual information is used in determining the predicted recipient(s), as opposed to just using the contextual information to select the sub-model. For example, a neural network or a logistic regression model can use a location (or other features) and build sort of a linear weighted combination of those features to predict the recipient(s). Such more complex models may be more suitable when an amount of data for a sub-model is significantly large. Some embodiments could switch the type of sub-model used at a particular node (i.e., particular combination of contextual data) once more data is obtained for that node.

The accuracy of a model can be tested against the historical interactions data. For a given event, the historical interactions data can identify which recipient(s) the user interacted with in association with the event (e.g., just before or just after, such as within a minute of the event). For each event, the contextual data can be used to determine the particular model. Further, contextual data can be used as input features to the model.

In an example where the model (or sub-model) selects the top recipient, a number of historical data points where the top recipient actually was selected (i.e., sent a communication) can be determined as a correct count, and a number of historical data points where the top recipient was not selected can be determined as an incorrect count. In an embodiment where N is greater than one for a model that selects the top N recipients, the correct count can correspond to any historical data point where one of the top N recipients was chosen as a recipient of a communication.

Based on the first subset of historical interactions, the first sub-model can predict at least one recipient of a first group of one or more recipients that the user will interact with in association with the event with a first confidence level. The first sub-model can be created at least based on the first confidence level being greater than the initial confidence level at least a threshold amount, which may be 0 or more. This threshold amount can correspond to a difference threshold. In some implementations, the first sub-model can be created may not always be created when this criterion is satisfied, as further criteria may be used. If the confidence level is not greater than the initial confidence level, another property can be selected for testing. This comparison of the confidence levels can correspond to testing for information gain. The same process can be repeated for determining a second confidence level of a second sub-model (for a second property) of the first sub-model for predicting a second group of one or more recipients. A second subset of the historical interactions can be used for the second sub-model. A third property or more properties can be tested in a similar manner.

G. Regeneration of Decision Tree

Embodiments can generate a decision tree of the models periodically, e.g., daily. The generation can use the historical interactions data available at that time. Thus, the decision tree can change from one generation to another. In some embodiments, the decision tree is built without knowledge of previous decision trees. In other embodiments, a new decision tree can be built from such previous knowledge, e.g., knowing what sub-models are likely or by starting from the previous decision tree.

In some embodiments, all contexts are attempted (or a predetermined listed of contexts) to determined which sub-models provide a largest information gain. For example, if location provides the largest information gain for segmenting into sub-models, then sub-models for at least one specific location can be created. At each level of segmentation, contexts can be tested in such a greedy fashion to determine which contexts provide a highest increase in information gain.

IV. Determination of Action Based on Level of Probability

The prediction model can test not only for the selected recipient(s) but a specific action (e.g., copying the recipient(s) on an email based on previously added recipients). In some embodiments, once the probability of selecting a recipient is sufficiently accurate, a more aggressive action can be provided than just providing a suggested recipient. For example, when the recipient is provided, an email application can automatically launch with the recipient included as a recipient in a new email message.

When selecting a recipient is predicted with sufficient probability (e.g., confidence level is above a high threshold), then the prediction can begin testing actions. Thus, the testing is not just for prediction of a recipient, but testing whether a particular action can be predicted with sufficient accuracy. The different possible actions (including launching email, text messaging, calendar, or video conference applications) can be obtained from the historical interactions data.

Accordingly, embodiments can be more aggressive with the actions to be performed when there is greater confidence. The prediction model may provide a particular user interface for a communication application if a particular means of communication (e.g., email, text message, voice call, video call, and video conference) has a high probability of being used to communicate with a recipient. For example, an interface of an email application can be provided by the prediction model if there is a high probability that a user will send an email to a suggested recipient. Thus, in some embodiments, the higher the probability of use, more aggressive action can be taken, such as automatically providing an interface for interacting with a recipient using a corresponding communication application (e.g., email, calendar, instant message, text message, voice call, or video conference), as opposed to just providing suggested recipient.

For example, a base model can have a certain level of statistical significance (accuracy and confidence) that the action might be to suggest the recipient(s) on a search screen. As other examples, a higher level of statistical significance can cause the screen to light up (thereby brining attention to the recipients, just one recipient can be selected, or for a user interface (UI) of a particular application can be provided (e.g., a UI of an email application).

The action can depend on whether the model predicts just one recipient or a group of recipients. For example, if there is an opportunity to make three recipient recommendations instead of one, then that also would change the probability distribution, as a selection of any one of the three recipients would provide a correct prediction. A model that was not confident for recommendation of one recipient might be sufficiently confident for three. Embodiments can perform adding another recipient to a group of recipients being predicted by the model (e.g., a next most likely contact not already in the group), thereby making the model more confident. If the model is based on a prediction of more than one contact, the user interface provided would then provide for an interaction with more than contact, which can affect the form for the UI. For example, all of the contacts can be provided in a list, and one contact would not automatically be selected. In an embodiment, a prediction can include a top contact, and if that contact is selected, other contacts can be copied on the message (i.e., due to co-occurrences in the historical interactions data). In the example of FIG. 37_4, these other recipients can be listed in the CC/BCC portion of the email application interface 37_406.

There can also be multiple actions, and a suggestion for different actions. For example, there can be two playlists at the gym as part of the sub-model (e.g., one application is identified but two actions are identified in the model when the two actions have a similar likelihood of being selected). Together the two actions can have statistically significance, whereas separately they did not.

As an example, when the model for an event (e.g., composing an email) is first being trained, the model may not be confident enough to perform any actions. At an initial level of confidence, a recipient name, icon or other recipient identifier could be displayed. At a next higher level of confidence, a means of contacting the recipient may be displayed (e.g., an email address or phone number). At a further level of confidence, a user interface specific to a particular communication application can be displayed (e.g., controls for adding the predicted recipient as a recipient of a new email, instant message, phone call, or video call). These different levels could be for various values used to define a confidence level.

Other example actions can include changing a song now playing, providing a notification (which may be front and center on the screen). The action can occur after unlocking the device, e.g., a UI specific to the application can display after unlocking. The actions can be defined using deep links to start specific functionality of an application.

V. Data Flow and Modules

FIG. 37_7 is an example data flow diagram 37_700 for suggesting recipients to contact. Data flow diagram 37_700 provides recipient suggestions 37_702 to a variety of communications applications and interaction mechanisms 37_701. In the example of FIG. 37_7, the applications and interaction mechanisms 37_701 include calendar 37_704, mail 37_706, messages 37_708, phone 37_710, and video calling 37_712. As shown in FIG. 37_7, an example mail application 37_706 is an email application, and an example messages application 37_708 is an instant messaging application. As shown, phone application 37_710 can be used to initiate voice calls and to compose text messages. One example of a video calling application 37_712 is the FaceTime® application.

Data flow diagram 37_700 shows that recipient suggestions 37_702 can be based on data from variety of data sources 37_714. The data sources 37_714 can include information for past communications. The data sources can include events 37_716, searches 37_718, contacts found 37_720, recent activity 37_722, collection daemon 37_724, communication history 37_726, and contacts database 37_728. Data sources 37_714 can be populated with data from the communications applications and interaction mechanisms 37_701. For example, calendar 37_704 can provide calendar event data to events 37_716. Similarly, phone 37_710 and video calling 37_712 can provide a call history for voice and video calls, respectively, to communications history 37_726. In the example of FIG. 37_7, contacts found 37_720 can include contacts found in email messages and other types of messages (e.g., instant messages and text messages).

FIG. 37_8 is a block diagram of an example interaction module 37_810. As shown, interaction module 37_810 can be implemented as a daemon that includes a recording engine 37_814 and a suggestion engine 37_816. Interaction module 37_810 maintains the storage of interactions in an interaction database 37_818 and executes recipient suggestion algorithms using suggestion engine 37_816. Interaction module 37_810 includes an interaction storage service 37_817 for communicating with interaction database 37_818. Interaction module 37_810 can query interaction database 37_818 to retrieve information for past interactions. Interaction module 37_810 can also transmit interactions data to interaction database 37_818 in order to populate tables in interaction database 37_818. For instance, database tables in interaction database 37_818 corresponding to previous communications made using application 37_800 can be populated. In the example of FIG. 37_8, each of the tables in interaction database 37_818 corresponds to a different sub-state of a user device that application 37_800 executes on and includes contact measures of previous, recorded interactions with other users carried out using the device. For instance, a recorded interaction can include previous interactions with other users such as, for example, previous emails, voice calls, text messages, instant messages, video calls, and calendar invitations.

Interaction module 37_810 also includes an XPC service 37_813 for communicating with an application 37_800. Application 37_800 can be one of the communications applications or interaction mechanisms shown in FIG. 37_7. Application 37_800 includes a framework 37_820, which in turn comprises an interaction recorder 37_824 for recording interactions and communications performed using application 37_800. Framework 37_820 also includes an interaction advisor 37_826, which can be used to provide suggested recipients to application 37_800. Framework 37_820 can use interaction recorder 37_824 to provide an interface for recording interactions. The interaction recorder 37_824 and interaction advisor 37_826 interfaces communicate data to interaction module 37_810 via XPC service 37_822.

VI. Architecture

FIG. 37_9 shows an example architecture 37_900 for providing a user interface to the user for interacting with one or more recipients. Architecture 37_900 shows elements for detecting events and providing suggestions for recipients. Architecture 37_900 can also provide other suggestions, e.g., for suggesting a communication application. The suggestions for recipients can be provided in conjunction with a suggested application. For example, architecture 37_900 can provide suggested recipients and also recommend that the suggested recipients be contacted via a certain communications application. Architecture 37_900 can exist within a user device.

At the top are UI elements. As shown, there is a search interface 37_910, a search screen 37_920, and a voice interface 37_925. These are ways that a user interface can be provided to a user. Other UI elements can also be used.

At the bottom, are data sources for an application suggestion engine 37_940 and a recipient suggestion engine 37_950. An event manager 37_942 can detect events and provide information about the event to application suggestion engine 37_940. In some embodiments, event manager 37_942 can determine whether an event triggers a suggestion of an application. A list of predetermined events can be specified for triggering an application suggestion. Location unit 37_944 can provide a location of the user device. As examples, location unit 37_944 can include GPS sensor and motion sensors. Location unit 37_944 can also include other applications that can store a last location of the user, which can be sent to application suggestion engine 37_940. Other contextual data can be provided from other context unit 37_946.

Application suggestion engine 37_940 can identify one or more applications, and a corresponding action. At a same level as application suggestion engine 37_940, a recipient suggestion engine 37_950 can provide suggested recipients for presenting to a user. An event manager 37_952 can detect events related to recipients and provide information about the event to recipient suggestion engine 37_950. In some embodiments, event manager 37_952 can determine whether an event triggers a suggestion of recipients. A list of predetermined events can be specified for triggering a recipient suggestion. Interactions history 37_954 can provide data for prior interactions and communications with other users. For example, interactions history 37_954 can be a data source for information recorded from previous emails exchanged between a user of the device and other users. Location unit 37_956 can provide a location of the user device. For examples, location unit 37_956 can include GPS and motion sensors. Location unit 37_956 can also include other applications that can store a last location of the user device, which can be sent to recipient suggestion engine 37_950. Other contextual data can be provided from other context unit 37_958.

The suggested recipient(s) can be provided to a suggestion center 37_930, which can determine what to provide to a user. For example, suggestion center 37_930 can determine whether to provide a suggested application or a recipient. In other examples, both the application(s) and recipient(s) can be provided. Suggestion center can determine a best manner for providing to a user. The different suggestions to a user may use different UI elements. In this manner, suggestion center 37_930 can control the suggestions to a user, so that different engines do not interrupt suggestions provided by other engines. In various embodiments, engines can push suggestions (recommendations) to suggestion center 37_930 or receive a request for suggestions from suggestion center 37_930. Suggestion center 37_930 can store a suggestion for a certain amount of time, and then determine to delete that suggestion if the suggestion has not been provided to a user, or the user has not interacted with the user interface.

Suggestion center 37_930 can also identify what other actions are happening with the user device, so as to inform the device when to send the suggestion. For example, if the user is using an application, suggested recipients may be provided, but a suggestion for an application may not be provided. Suggestion center 37_930 can determine when to send suggestions based on a variety of factors, e.g., a motion state of the device, whether a lock screen is on, or whether authorized access has been provided, whether user is using the device at work, home, etc.

In some embodiments, the software components of device 100 (FIG. 1A) include a recipient suggestion/prediction module (or set of instructions). The recipient suggestion module, in some embodiments, can include various submodules or systems, e.g., as described above with reference to FIGS. 37_7-37_9. Recipient suggestion module may perform all or part of method 37_100 or 37_600.

Example Methods, Devices, and Computer-Readable Media for People-Centric Predictions Some embodiments provide systems and methods are provided for suggesting recipients. After detecting user input at a device corresponds to a trigger for providing suggested recipients, contextual information of the device representing a current state of the device is determined, where the current state is defined by state variables. Tables corresponding to previous communications made using the device are populated, each of the tables corresponding to a different substate of the device and including contact measures of previous communications with different recipients. The state variables can be used to identify a set of the tables corresponding to the state variables. Contact measures for potential recipients are obtained from the set of tables. A total contact measure of previous communications is computed for each potential recipient. Predicted recipients to suggest are identified based on the total contact measures of the potential recipients and using criteria, and the predicted recipients are provided to the user.

In some embodiments, a computer-implemented method of providing suggested recipients to contact with a user device of a user is provided, the method comprising, at the user device: detecting a user input at the user device; determining that the user input corresponds to a trigger for providing a suggested recipient via a suggestion engine; determining contextual information of the user device, the contextual information representing a current device state of the user device, wherein the current device state is defined by one or more state variables; populating one or more tables corresponding to previous communications made using the user device, each of the one or more tables corresponding to a different device sub-state of the user device and including a plurality of recipient measures of previous communications with different recipients; using the one or more state variables to identify a first set of the one or more tables that corresponds to the one or more state variables; obtaining, from the first set of tables, contact measures for one or more potential recipients; for each of the one or more potential recipients: compute a total contact measure of previous communications using the obtained contact measures; using the suggestion engine to identify one or more predicted recipients to suggest to the user based on the total contact measures of the one or more potential recipients and using one or more criteria; and providing the one or more predicted recipients to the user. In some embodiments, the contextual information includes one or more recipients of an open communication in a communication application executing on the user device, the current device state including a current application state, the current application state including the one or more recipients. In some embodiments, the contextual information includes an account identifier corresponding to a communication application executing on the user device, the current device state including a current application state, the current application state including the account identifier. In some embodiments, the method includes: determining a current location of the user device, wherein the contextual information includes the current location, the current device state including a current location state, the current location state including the current location. In some embodiments, the contextual information includes a current time and a current day, and wherein the one or more criteria includes a minimum number of predicted recipients to suggest. In some embodiments, the one or more criteria includes a threshold confidence level, the method further comprising, at the user device: determining how the one or more predicted recipients are to be provided to the user based on a respective confidence level of each of the one or more predicted recipients. In some embodiments, the contextual information includes a subject of an open communication in a communication application executing on the user device, the current device state including a current application state, the current application state including the subject. In some embodiments, the subject of the open communication is one or more of a subject of an email message, a subject of a calendar event, and a subject of a video conference. In some embodiments, contextual information includes a scheduled time of an open calendar event in a calendar application executing on the user device, the current device state including a current application state, the current application state including the scheduled time. In some embodiments, contextual information includes a location of an open calendar event in a calendar application executing on the user device, the current device state including a current application state, the current application state including the location. In some embodiments, one of the one or more tables is a calendar table corresponding to a calendar sub-state of the user device, the calendar table including contact measures for recipients of calendar invitations for previous calendar events made using the user device. In some embodiments, one of the one or more tables is an email table corresponding to an email sub-state of the user device, the email table including contact measures for recipients of previous email messages made using the user device, the contact measures including times when the previous email messages were made, email account identifiers associated with the previous email messages, other recipients copied on the previous email messages, and an a number of email messages sent to each recipient. In some embodiments, computing the total contact measure of previous communications includes querying the one or more tables to compute a total number of previous communications sent to each of the one or more potential recipients.

In some embodiments, a computer product comprising a non-transitory computer readable medium stories a plurality of instructions for providing suggested recipients to contact with a user device of a user, that when executed on one or more processors of the user device, perform operations comprising: detecting a user input at the user device; determining that the user input corresponds to a trigger for providing a suggested recipient via a suggestion engine; determining contextual information of the user device, the contextual information representing a current device state of the user device, wherein the current device state is defined by one or more state variables; populating one or more tables corresponding to previous communications made using the user device, each of the one or more tables corresponding to a different device sub-state of the user device and including a plurality of contact measures of previous communications with different recipients; using the one or more state variables to identify a first set of the one or more tables that corresponds to the one or more state variables; obtaining, from the first set of tables, contact measures for one or more potential recipients; for each of the one or more potential recipients: compute a total contact measure of previous communications using the obtained contact measures; using the suggestion engine to identify one or more predicted recipients to suggest to the user based on the total contact measures of the one or more potential recipients and using one or more criteria; and providing the one or more predicted recipients to the user. In some embodiments, the contextual information includes one or more recipients of an open communication in a communication application executing on the user device, the current device state including a current application state, the current application state including the one or more recipients. In some embodiments, the contextual information includes a current time and an account identifier corresponding to a communication application executing on the user device, the current device state including a current application state, the current application state including the current time and the account identifier.

In some embodiments, a user device for providing suggested recipients to contact with the user device is provided, the user device comprising: an input device; one or more processors configured to: detect, at the input device, a user input; determine that the user input corresponds to a trigger for providing a suggested recipient via a suggestion engine; determine contextual information of the user device, the contextual information representing a current device state of the user device, wherein the current device state is defined by one or more state variables; populate one or more tables corresponding to previous communications made using the user device, each of the one or more tables corresponding to a different device sub-state of the user device and including a plurality of contact measures of previous communications with different recipients; use the one or more state variables to identify a first set of the one or more tables that corresponds to the one or more state variables; obtain, from the first set of tables, contact measures for one or more potential recipients; for each of the one or more potential recipients: compute a total contact measure of previous communications using the obtained contact measures; use the suggestion engine to identify one or more predicted recipients to suggest to a user based on the total contact measures of the one or more potential recipients and using one or more criteria; and provide the one or more predicted recipients to the user. In some embodiments, the contextual information includes one or more recipients of an open communication in a communication application executing on the user device, the current device state including a current application state, the current application state including the one or more recipients. In some embodiments, one of the one or more tables is an email table corresponding to an email sub-state of the user device, the email table including contact measures for recipients of previous email messages made using the user device, the contact measures including times when the previous email messages were made, email account identifiers associated with the previous email messages, other recipients copied on the previous email messages, and an a number of email messages sent to each recipient. In some embodiments, the one or more criteria includes a threshold confidence level, the one or more processors are further configured to, at the user device: determining how the one or more predicted recipients are to be provided to the user based on a respective confidence level of each of the one or more predicted recipients.

Section 8: App Model for Proactive Assistant

The material in this section "App Model for Proactive Assistant" describes an application model for proactive assistant and details related to proactively providing recommendations to a user of a computing device, in accordance with some embodiments, and provides information that supplements the disclosure provided herein. For example, portions of this section describes predicting applications that the user may be interested in accessing, which supplements the disclosures provided herein, e.g., those related to populating predicted content within the predictions portion 930 of FIGS. 9B-9C and those related to the creation and detection of trigger conditions (FIGS. 4A-4B). In some embodiments, the details related to an application prediction engine and to predicting applications for inclusion in a search interface are also applicable to other methods described herein (e.g., to methods 600, 800, 1000, and 1200).

Summary for App Model for Proactive Assistant

The embodiments described in this section set forth techniques for identifying when a user activates a search application on his or her mobile computing device. Specifically, the technique involves presenting, prior to receiving an input of search parameters from the user, a prediction of one or more applications that the user may be interested in accessing, which can reduce the likelihood or necessity for a user to have to manually provide search parameters to the search application. According to some embodiments, the search application can be configured to interface with a prediction engine—referred to in this section as an "application prediction engine"—each time the search application is activated (e.g., displayed within a user interface of the mobile computing device). More specifically, when the search application interfaces with the application prediction engine, the search application can issue a request for a prediction of one or more applications that the user may be interested in accessing. In turn, the application prediction engine can analyze information associated with the applications installed on the mobile computing device to produce the prediction. The search application can then display the predicted one or more applications within a user interface of the search application for selection by the user.

One embodiment sets forth a method for providing predictions to a user of a mobile computing device. Specifically, the method is implemented by an application prediction engine executing on the mobile computing device, and includes the steps of (1) receiving, from a search application executing on the mobile computing device, a request to provide a prediction of one or more applications that are installed on the mobile computing device and that the user may be interested in activating, (2) identifying a list of applications that are installed on the mobile computing device, (3) for each application included in the list of applications: (i) generating a score for the application by performing one or more functions on one or more data signals that correspond to the application, and (ii) associating the score with the application, (4) filtering the list of applications in accordance with the generated scores to produce a filtered list of applications, (5) populating the prediction with the filtered list of applications, and (6) providing the prediction to the search application.

Another embodiment sets forth a method for presenting predictions to a user of a mobile computing device. Specifically, the method is implemented by a search application executing on the mobile computing device, and includes the steps of (1) detecting an activation of the search application, (2) issuing, to an application prediction engine, a request for a prediction of one or more applications that are installed on the mobile computing device and that the user may be interested in activating, (3) receiving the prediction from the application prediction engine, wherein the prediction includes a list of one or more applications, and each application is associated with a respective score, and (4) in accordance with the scores, display, within a user interface of the search application, a user interface entry for at least one application of the one or more applications.

Yet another embodiment sets forth a mobile computing device configured to present predictions to a user of the mobile computing device. Specifically, the mobile computing device includes a processor that is configured to execute a search application configured to carry out steps that include (1) detecting an activation of the search application, and (2) prior to receiving an input from the user within a user interface of the search application: (i) issuing, to an application prediction engine executing on the mobile computing device, a request for a list of one or more applications that are installed on the mobile computing device and that the user may be interested in activating, (ii) receiving the list from the application prediction engine, and (iii) displaying, within the user interface of the search application, a user interface entry for at least one application of the one or more applications included in the list. As indicated above, the processor also is configured to execute the application prediction engine, where the application prediction engine is configured to carry out steps that include (1) receiving, from the search application, the request for the list of one or more applications that the user may be interested in activating, (2) generating the list, and (3) providing the list to the search application.

Other embodiments include a non-transitory computer readable medium configured to store instructions that, when executed by a processor, cause the processor to implement any of the foregoing techniques set forth in this section.

This Summary is provided merely for purposes of summarizing some example embodiments so as to provide a basic understanding of some aspects of the subject matter described in this section. Accordingly, it will be appreciated that the above-described features are merely examples and should not be construed to narrow the scope or spirit of the subject matter described in this section in any way. Other features, aspects, and advantages of the subject matter described in this section will become apparent from the following Detailed Description, Figures, and Claims.

Other aspects and advantages of the embodiments described in this section will become apparent from the following detailed description taken in conjunction with the accompanying drawings which illustrate, by way of example, the principles of the described embodiments.

Detailed Description for App Model for Proactive Assistant

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The embodiments described in this section set forth techniques for identifying when a user activates a search application on his or her mobile computing device, and presenting, prior to receiving an input of search parameters from the user, a prediction of one or more applications that the user may be interested in accessing. According to some embodiments, the search application can be configured to interface with an application prediction engine each time the search application is activated (e.g., displayed within a user interface of the mobile computing device) and query the application prediction engine for a prediction of one or more applications that the user may be interested in accessing. In turn, the application prediction engine can analyze information associated with the applications installed on the mobile computing device to produce the prediction. This information can include, for example, application installation timestamps, application activation timestamps, application activation totals, application usage metrics, positions of application icons within a main user interface (e.g., on a home screen, within a folder, etc.), search parameters recently provided by the user, feedback gathered that indicates whether previous predictions were accurate, and the like, which can enable the application prediction engine to provide meaningful and relevant predictions to the search application. In turn, the search application can display the predicted one or more applications within a user interface of the search application for selection by the user. Notably, this technique can substantially reduce occurrences where the user undergoes the cumbersome process of entering search parameters each time he or she is seeking to access a particular application, which can provide a substantial improvement to the user's overall satisfaction with his or her mobile computing device.

Although the embodiments set forth in this section primarily involve application prediction engines that are configured to predict applications that a user may desire to access, it is noted that other prediction engines that serve to provide different kinds of predictions (e.g., people a user is likely to contact) can be implemented within the mobile computing device. More specifically, and according to some embodiments, each prediction engine can be configured to assign itself as an "expert" for a particular prediction category within the mobile computing device. For example, an application prediction engine can assign itself as an expert on an "application" prediction category to indicate that the application prediction engine specializes in predicting applications that a user of the mobile computing device might be interested in accessing. According to some embodiments, an application prediction engine can employ learning models that enable the application prediction engine to analyze data (e.g., the information described above) and provide predictions in accordance with the data. Although this disclosure primarily discusses an application prediction engine that is configured to implement learning models, it is noted that any technique for analyzing behavioral data and providing predictions can be employed by the application prediction engine described in this section. Moreover, it is noted that the application prediction engine can vary in functionality across different types of user devices (e.g., smartphones, tablets, watches, laptops, etc.) in order to provide specialized predictions for the different types of user devices. For example, a first type of application prediction engine can be assigned to smartphones, a second type of application prediction engine can be assigned to tablets, and so on.

As set forth above, each prediction engine implemented on the mobile computing device can assign itself as an expert on one or more prediction categories within the mobile computing device. Consequently, in some cases, two or more application prediction engines can assign themselves as experts on the "application" prediction category. In this scenario, when the search application described in this section issues a request for a prediction, each application prediction engine of the two or more application prediction engines will conduct its own analysis (e.g., in accordance with learning models employed by the application prediction engines) and generate a prediction in accordance with the request. In this scenario, at least two or more predictions are generated in response to the request for the prediction, which can establish redundancies and competing predictions that the search application may not be capable of interpreting.

Accordingly, the embodiments also set forth a "prediction center" that is configured to serve as a mediator between the application prediction engines and the search application. To provide this functionality, the prediction center can be configured to serve as a registrar for prediction engines (e.g., application prediction engines) when they initialize and seek to assign themselves as experts for one or more prediction categories (e.g., the "application" prediction category). Similarly, and according to some embodiments, the prediction center can also be configured to manage different types of prediction categories within the mobile computing device, such that consumer applications (e.g., the search application described in this section) can query the prediction center to identify categories of predictions that can be provided. In this manner, when a consumer application issues a request for a prediction for a particular prediction category, and two or more prediction engines respond with their respective prediction(s), the prediction center can be configured to receive and process the predictions prior to responding to the request issued by the consumer application. Processing the predictions can involve, for example, removing duplicate information that exists across the predictions, applying weights to the predictions in accordance with historical performance (i.e., accuracy) metrics associated with the prediction engines, sorting the predictions in accordance with scores advertised by the prediction engines when generating their predictions, and the like. In this manner, the prediction center can distill multiple predictions down into an optimized prediction and provide the optimized prediction to the consumer application. Accordingly, this design beneficially simplifies the operating requirements of the consumer applications (as they do not need to be capable of processing multiple predictions), consolidates the heavy lifting to the prediction center, and enables the consumer applications to obtain a prediction that represents the input of various prediction engines that have assigned themselves as experts on the prediction category of interest.

Accordingly, the different techniques set forth above enable the search application to interact with the prediction center to receive predictions that potentially can be used to enhance overall user experience. In some cases, it can be valuable for the search application to provide feedback to the prediction center/the application prediction engine to indicate whether a prediction was accurate. Such feedback can be beneficial, for example, when learning algorithms are implemented by the application prediction engines, as the feedback can be used to "train" the learning algorithms and improve the overall accuracy of their predictions. For example, when an application prediction engine generates a prediction that a particular application is most likely to be activated by a user (e.g., when displayed within the search application prior to receiving search input from the user), the search application can provide feedback that indicates the prediction held true (e.g., the particular application was selected and activated by the user). In turn, the application prediction engine can increase the scores that are advertised when similar and subsequent predictions are produced by the prediction engine.

In addition, it is noted that the architecture of the prediction center can be configured in a manner that enables the different entities described in this section—such as the application prediction engines—to function as modular components within the mobile computing device. In one architectural approach, each application prediction engine can be configured as a bundle whose format (e.g., a tree-like structure) is understood by the prediction center and enables the prediction center to function as a platform for implementing the functionality of the application prediction engine. According to this approach, the prediction center can be configured to, for example, parse different file system paths (e.g., when initializing) to identify different bundles that reside within the mobile computing device. In this manner, the bundles can be conveniently added to, updated within, and removed from the file system of the mobile computing device, thereby promoting a modular configuration that can efficiently evolve over time without requiring substantial updates (e.g., operating system upgrades) to the mobile computing device. For example, an application prediction engine can be configured in a manner that enables all or a portion of the logic implemented by the application prediction engine to be updated (e.g., through an over the air (OTA) update). It is noted that the foregoing architectures are exemplary, and that any architecture can be used that enables the various entities described in this section to communicate with one another and provide their different functionalities.

Additionally, the prediction center/application prediction engines can also be configured to implement one or more caches that can be used to reduce the amount of processing that takes place when generating predictions. According to some embodiments, a prediction, upon generation, can be accompanied by "validity parameters" that indicate when the prediction should be removed from the cache in which the prediction is stored. The validity parameters—also referred to in this section as "expiration information"—can define, for example, time-based expirations, event-based expirations, and the like. In this manner, when an application prediction engine frequently receives requests for a prediction from the search application, the application prediction engine can generate and cache the prediction in order to substantially reduce the amount of future processing that would otherwise occur when processing repeated requests for the prediction. It is noted that the prediction center/application prediction engines can be configured to cache predictions using a variety of approaches. For example, when available cache memory is limited, the prediction center/application prediction engines can be configured to generate predictions a threshold number of times (e.g., within a time window), and, when the threshold is satisfied, transition to caching the prediction and referencing the cache for subsequent requests for the prediction (so long as the expiration information indicates the prediction is valid).

Accordingly, the embodiments described in this section set forth techniques for identifying when a user activates a search application on his or her mobile computing device, and presenting, prior to receiving an input of search parameters from the user, a prediction of one or more applications that the user may be interested in accessing. A more detailed discussion of these techniques is set forth below and described in conjunction with FIGS. 38_1-38_4, which illustrate detailed diagrams of systems, methods, and user interfaces that can be used to implement these techniques.

FIG. 38_1 illustrates a block diagram of different components of a mobile computing device 38_100 that is configured to implement the various techniques described in this section, according to some embodiments. More specifically, FIG. 38_1 illustrates a high-level overview of the mobile computing device 38_100, which, as shown, is configured to implement a prediction center 38_102, an application prediction engine 38_104, and a search application 38_116. According to some embodiments, the prediction center 38_102, the application prediction engine 38_104, and the search application 38_116 can be implemented within an operation system (OS) (not illustrated in FIG. 38_1) that is configured to execute on the mobile computing device 38_100. As shown in FIG. 38_1, the prediction center 38_102 can be configured to serve as a mediator between the application prediction engine 38_104 and the search application 38_116. Although not illustrated in FIG. 38_1, the prediction center 38_102 can be configured to implement an aggregator that is configured to consolidate multiple predictions, e.g., when two or more application prediction engines 38_104 are implemented and two or more predictions are produced in response to a request issued by the search application 38_116. It is noted, however, that both the application prediction engine 38_104 and the search application 38_116 can be configured to communicate directly with one another to reduce or even eliminate the need for the prediction center 38_102 to be implemented within the mobile computing device 38_100. It is further noted that the application prediction engine 38_104 and the search application 38_116 are not required to be logically separated from one another, and that the different functionalities implemented by these entities can be combined to establish different architectural approaches that provide the same results.

As shown in FIG. 38_1, predictions 38_112 can be communicated between the application prediction engine 38_104 and the search application 38_116, e.g., the prediction center 38_102 can receive predictions 38_112 generated by the application prediction engine 38_104 and forward the predictions 38_112 to the search application 38_116. Feedback 38_114 can also be communicated between the application prediction engine 38_104 and the search application 38_116, e.g., the prediction center 38_102 can receive feedback 38_114 from the search application 38_116 and provide the feedback 38_114 to the application prediction engine 38_104 so that the application prediction engine 38_104 can increase predictions 38_112 accuracy over time.

Additionally, the prediction center 38_102 can be configured to implement a cache that enables the prediction center 38_102/the application prediction engine 38_104 to cache predictions 38_112 in attempt to increase processing and energy consumption efficiency at the mobile computing device 38_100. For example, the cache can include multiple entries, where each entry includes a prediction 38_112 as well as expiration information that indicates how long the prediction 38_112 is considered to be valid. The expiration information can include, for example, time-based expirations, event-based expirations, and the like. In this manner, when the application prediction engine 38_104 frequently receives requests for a prediction 38_112, the application prediction engine 38_104 can generate and cache the prediction 38_112 in order to substantially reduce the amount of processing that would otherwise occur at the mobile computing device 38_100, thereby enhancing performance.

As previously set forth in this section, the application prediction engine 38_104 can be implemented using a variety of architectural approaches, e.g., the application prediction engine 38_104 can be a standalone executable that is external to the prediction center 38_102 and communicates with the prediction center 38_102 via Application Programming Interface (API) commands that are supported by the prediction center 38_102 and utilized by the application prediction engine 38_104, the application prediction engine 38_104 can be a bundle that is stored within a file system of the mobile computing device 38_100 and that is interpreted and implemented by the prediction center 38_102, and the like. As shown in FIG. 38_1, the application prediction engine 38_104 can include configuration parameters 38_106 that dictate the manner in which the application prediction engine 38_104 generates predictions for the search application 38_116. In particular, the configuration parameters 38_106 can define the manner in which data signals 38_110—which correspond to installed application information 38_108 that is available to the application prediction engine 38_104 within the mobile computing device 38_100—are received by the application prediction engine 38_104 and processed by the application prediction engine 38_104. According to some embodiments, the data signals 38_110 can represent application installation timestamps (e.g., when each application was installed), application activation timestamps (e.g., the last time each application was activated), application activation totals (e.g., a total number of times an application has been activated), application usage metrics (e.g., a frequency at which the application is activated), and the like. The data signals 38_110 can also include positions of application icons within a main user interface (e.g., on a home screen, within a folder, etc.) of the mobile computing device 38_100, application search parameters recently provided by the user, feedback gathered that indicates whether previous predictions provided by the application prediction engine 38_104 were accurate, and the like.

Although not illustrated in FIG. 38_1, the application prediction engine 38_104 can be configured to implement learning models that enable the application prediction engine 38_104 to provide predictions 38_112 that evolve over time and remain relevant to the user of the mobile computing device 38_100. According to some embodiments, the learning models can represent algorithms that are configured to analyze information (e.g., the data signals 38_110) and generate predictions 38_112 that can enhance a user's overall experience when operating the mobile computing device 38_100. According to some embodiments, the information processed by the application prediction engine 38_104 can be gathered from various sources within the mobile computing device 38_100, e.g., file systems implemented on the mobile computing device 38_100, feedback information provided by the search application 38_116, information gathered by sensors of the mobile computing device 38_100 (e.g., Global Positioning System (GPS) sensors, microphone sensors, temperature sensors, accelerometer sensors, and so on), information provided by outside sources (e.g., other applications executing on the mobile computing device 38_100, OS kernels, etc.), and the like.

Additionally, and as shown in FIG. 38_1, the mobile computing device 38_100 can be configured to interface with one or more servers 38_120 (e.g., via an Internet connection) in order to receive over the air (OTA) updates 38_122 that can be used to partially or fully update one or more of the application prediction engine 38_104, the prediction center 38_102, and the search application 38_116. Accordingly, FIG. 38_1 provides a high-level overview of various components that can be used to implement the techniques set forth in this section.

FIG. 38_2 illustrates a method 38_200 that is implemented by the application prediction engine 38_104, according to some embodiments. Although the method 38_200 is described as the application prediction engine 38_104 and the search application 38_116 communicating directly between one another, it is noted that the prediction center 38_102 can serve as a mediator between the application prediction engine 38_104 and the search application 38_116 in accordance with the various functionalities provided by the prediction center 38_102 described in this section. As shown, the method 38_200 begins at step 38_202, where the application prediction engine 38_104 receives, from a search application 38_116, a request to provide a prediction 38_112 of one or more applications installed on the mobile computing device 38_100 that a user of the mobile computing device 38_100 may be interested in accessing. This request can be issued by the search application 38_116 in response to the search application activating on the mobile computing device 38_100, e.g., when a user of the mobile computing device 38_100 inputs a gesture to cause the search application to activate.

At step 38_204, the application prediction engine 38_104 identifies a list of applications that are installed on the mobile computing device 38_100. This information can be obtained, for example, by way of the installed application information 38_108 and the data signals 38_110. At step 38_206, the application prediction engine 38_104 sets a current application as a first application in the list of applications. At step 38_208, the application prediction engine 38_104 generates a score for the current application by performing one or more functions on one or more data signals 38_110 that correspond to the current application. According to some embodiments, performing a function on a data signal 38_110 can involve calculating a score for the data signal 38_110 and adjusting the score in accordance with a fixed weight that is associated with the data signal 38_110. For example, when the data signal 38_110 corresponds to an installation date of an application, the score can be based on an amount of time that has elapsed since the application was installed, e.g., a higher points for a more recent installation date. In some cases, the score can be adjusted in accordance with a decay value (e.g., a half-life), which can especially apply to data signals 38_110 that represent temporal information associated with applications (e.g., application installation timestamps, application activation timestamps, etc.). In turn, the fixed weight associated with the data signal 38_110 can be applied to the score to produce an updated form of the score. In this manner, and upon a completion of the one or more functions on the one or more data signals 38_110 that correspond to the current application, the prediction engine can produce a final form of the score (e.g., a summation of the individual scores) for the current application.

At step 38_210, the application prediction engine 38_104 determines whether additional applications are included in the list of applications. If, at step 38_210, the application prediction engine 38_104 determines that additional applications are included in the list of applications, then the method 38_200 proceeds to step 38_212. Otherwise, the method 38_200 proceeds to step 38_214, which is described below in greater detail. At step 38_212, the application prediction engine 38_104 sets the current application as a next application in the list of applications. At step 38_214, the application prediction engine 38_104 filters the list of applications in accordance with (1) the generated scores, and (2) the request received at step 38_202. For example, the request can indicate that only three application suggestions can be displayed within the user interface of the mobile computing device 38_100 (e.g., in accordance with a screen size or a resolution setting), which can cause the application prediction engine 38_104 to eliminate, from the list of applications, any applications whose scores are not in the top three positions of the list. At step 38_216, the application prediction engine 38_104 populates the prediction 38_112 with the filtered list of applications, and provides the prediction 38_112 to the search application 38_116.

FIG. 37_3 illustrates a method 38_300 that is implemented by the search application 38_116, according to some embodiments. As shown, the method 38_300 begins at step 38_302, where the search application 38_116 is activated. At step 38_304, the search application 38_116 issues a request for a prediction 38_112 of one or more applications that a user may be interested in accessing. At step 38_306, the search application 38_116 receives the prediction 38_112 in response to the request, where the prediction 38_112 includes a list of the one or more applications, and each application is associated with a respective score. At step 38_308, the search application 38_116, in accordance with the scores, displays, within a user interface of the search application 38_116, a user interface entry for at least one application of the one or more applications (e.g., as illustrated in FIG. 38_4 and described below). At step 38_310, the search application 38_116 receives a user input through the user interface.

At step 38_312, the search application 38_116 determines whether the user input corresponds to a user interface entry. If, at step 38_312, the search application 38_116 determines that the user input corresponds to a user interface entry, then the method 38_300 proceeds to step 38_314. Otherwise, the method 38_300 proceeds to step 38_318, which is described below in greater detail. At step 38_314, the search application 38_116 activates the application that corresponds to the user interface entry. At step 38_316, the search application 38_116 provides feedback that indicates the application was activated. Finally, at step 38_318, the search application 38_116 deactivates itself.

FIG. 38_4 illustrates a conceptual diagram 38_400 of an example user interface 38_402 of the search application 38_116 described in this section, according to some embodiments. As shown in FIG. 38_4, the user interface 38_402 can include a search field 38_404 that enables a user of the mobile computing device 38_100 to input search parameters (e.g., using a virtual keyboard 38_408 included in the user interface 38_402). Moreover, the user interface 38_402 can include a listing of multiple user interface entries 38_406-1, 38_406-2, through 38_406-N for applications that the user may be interested in activating, which can be obtained by way of predictions 38_112 produced by the application prediction engine 38_104 described in this section. In turn, when feedback is provided by the user-which can include, for example, cancelling the search, ignoring the suggested apps and inputting search parameters, or selecting one of the user interface entries 38_406—the feedback can be forwarded to the application prediction engine 38_104 for handling.

FIG. 1A above illustrates a detailed view of a computing device 100 that can be used to implement the various components described in this section, according to some embodiments. In particular, the detailed view illustrates various components that can be included in the mobile computing method 37_100 illustrated in FIG. 37_1.

Example Methods and Devices for App Model for Proactive Assistant

The embodiments described in this section set forth techniques for identifying when a user activates a search application on his or her mobile computing device, and presenting, prior to receiving an input of search parameters from the user, a prediction of one or more applications that the user may be interested in accessing. According to some embodiments, the search application can be configured to interface with an "application prediction engine" each time the search application is activated and query the application prediction engine for a prediction of one or more applications that the user may be interested in accessing. In turn, the application prediction engine can analyze information associated with the applications installed on the mobile computing device to produce the prediction. Using the prediction, the search application can display the predicted one or more applications within a user interface of the search application for selection by the user.

In some embodiments, a method for proactively providing predictions to a user of a mobile computing device is provided, the method comprising: at an application prediction engine executing on the mobile computing device: for each application included in a list of applications installed on the mobile computing device: performing at least one function on at least one data signal that corresponds to the application to establish a score for the application, wherein the score indicates a likelihood that the application will be activated by the user, and associating the score with the application; and providing a prediction to a search application executing on the mobile computing device, wherein the prediction includes the list of applications and their associated scores. In some embodiments, the method includes, prior to providing the prediction to the search application: receiving, from the search application, a request for the prediction, wherein the search application issues the request in response to an activation of the search application and prior to receiving a search input from the user. In some embodiments, the request indicates a specific number of applications that should be included in the list of applications included in the prediction. In some embodiments, the method includes: for each application included in the list of applications: adjusting the score in accordance with a weight that is associated with the at least one data signal. In some embodiments, when the at least one data signal corresponds to a temporal aspect of application access within the mobile computing device, performing the at least one function on the at least one data signal further comprises, prior to adjusting the score in accordance with the weight that is associated with the at least one data signal: adjusting the score for the at least one data signal in accordance with a decay factor that applies to the at least one data signal. In some embodiments, the at least one data signal is selected from one or more of application installation timestamps, application activation timestamps, application activation totals, application usage metrics, positions of application icons within a main user interface of the mobile computing device, search parameters recently provided by the user, and gathered feedback that indicates whether previous predictions were accurate. In some embodiments, a position of an application icon within the main user interface of the mobile computing device can indicate: a page number of the main user interface in which the application icon is included, and whether the application is included in a folder within the main user interface. In some embodiments, the method includes: subsequent to providing the prediction to the search application: receiving feedback from the search application, wherein the feedback indicates a behavior of the user subsequent to providing the prediction to the search application; and updating the gathered feedback to reflect the feedback received from the search application.

In some embodiments, a method for proactively presenting predictions to a user of a mobile computing device is provided, the method comprising: at search application executing on the mobile computing device: detecting an activation of the search application; issuing, to an application prediction engine, a request for a prediction of one or more applications that are installed on the mobile computing device and that the user may be interested in activating; receiving the prediction from the application prediction engine, wherein the prediction includes a list of one or more applications, and each application is associated with a respective score; and in accordance with the scores, display, within a user interface of the search application, a user interface entry for at least one application of the one or more applications. In some embodiments, the request is issued to the application prediction engine prior to receiving a search input via a search field included in the user interface of the search application. In some embodiments, the method includes: receiving a user input through the user interface of the search application; providing, in the form of feedback, information associated with the user input. In some embodiments, the feedback indicates whether the user selected the user interface entry for the at least one application or entered search parameters. In some embodiments, the request indicates a specific number of applications that should be included in the prediction, and the specific number of applications is based on a number of user interface entries for applications that are capable of being displayed to the user within the user interface of the search application.

In some embodiments, a mobile computing device configured to proactively present predictions to a user of the mobile computing device is provided, the mobile computing device comprising a processor that is configured to execute: a search application configured to carry out steps that include: detecting an activation of the search application, and prior to receiving an input from the user within a user interface of the search application: issuing, to an application prediction engine executing on the mobile computing device, a request for a list of one or more applications that are installed on the mobile computing device and that the user may be interested in activating, receiving the list from the application prediction engine, and displaying, within the user interface of the search application, a user interface entry for at least one application of the one or more applications included in the list; and the application prediction engine, wherein the application prediction engine is configured to carry out steps that include: receiving, from the search application, the request for the list of one or more applications that the user may be interested in activating, generating the list, and providing the list to the search application. In some embodiments, generating the list comprises: for each application installed on the mobile computing device: generating a score for the application by performing one or more functions on one or more data signals that correspond to the application, and associating the score with the application; and filtering the applications in accordance with the generated scores; and incorporating the applications as filtered into the list. In some embodiments, performing a function of the one or more functions on a data signal of the one or more data signals comprises: establishing a score for the data signal based on information associated with the data signal; and adjusting the score in accordance with a weight that is associated with the data signal. In some embodiments, the data signal corresponds to a temporal aspect of application access within the mobile computing device, performing the function on the data signal further comprises, prior to adjusting the score in accordance with the weight that is associated with the data signal: adjusting the score for the data signal in accordance with a decay factor that applies to the data signal. In some embodiments, the one or more data signals include application installation timestamps, application activation timestamps, application activation totals, application usage metrics, positions of application icons within a main user interface of the mobile computing device, search parameters recently provided by the user, and gathered feedback that indicates whether previous predictions were accurate. In some embodiments, a position of an application icon within the main user interface of the mobile computing device can indicate: a page number of the main user interface in which the application icon is included, and whether the application is included in a folder within the main user interface. In some embodiments, the application prediction engine is further configured to, subsequent to providing the list to the search application, carry out steps that include: receiving feedback from the search application, wherein the feedback indicates a behavior of the user subsequent to providing the list to the search application; and updating the gathered feedback to reflect the feedback received from the search application.

Section 9: Expert Center (Providing Predicted Content Items to Components of an Electronic Device)

The material in this section "Expert Center" describes an expert center and describes providing predicted content items to components of an electronic device (e.g., to any of the components of device 100, FIG. 1A), in accordance with some embodiments, and provides information that supplements the disclosure provided herein. For example, portions of this section describe the creation of prediction engines and prediction categories, which supplements the disclosures provided herein, e.g., those related to the creation/storage of trigger conditions (FIGS. 4A-4B), and those related to the retrieval and presentation of predicted content items in a search interface (e.g., methods 600, 800, 1000, and 1200) or as suggested items in a messaging application (e.g., methods 2200, 2900, 2280, 2400, 2600, and 2700). In some embodiments, the methods disclosed herein take advantage of or utilize the predictions engine described below in Section 9 in order to provide a variety of relevant content items at appropriate times to users (e.g., predicted applications, predicted people/contacts, predicted locations, information related to events/contacts/locations that is used to quickly add content to various types of applications, and other relevant content items discussed above in reference to any of the methods).

Summary for Expert Center

The embodiments described in this section set forth techniques for implementing various "prediction engines" that can be configured to provide different kinds of predictions within a mobile computing device. According to some embodiments, each prediction engine can assign itself as an "expert" on one or more "prediction categories" within the mobile computing device. When a consumer application issues a request for a prediction for a particular prediction category, and two or more prediction engines respectively respond with predictions, a "prediction center" can be configured to receive and process the predictions prior to responding to the request. Processing the predictions can involve removing duplicate information that exists across the predictions, sorting the predictions in accordance with confidence levels advertised by the prediction engines, and the like. In this manner, the prediction center can distill multiple predictions down into an optimized prediction and provide the optimized prediction to the consumer application.

One embodiment sets forth a method for synchronously providing a prediction to an application executing on a mobile computing device. Specifically, the method is implemented at a prediction center executing on the mobile computing device, and includes the steps of (1) receiving, from the application, a request to synchronously provide a prediction for a prediction category, (2) identifying one or more prediction engines that are associated with the prediction category, (3) receiving one or more predictions produced by the one or more prediction engines in accordance with the request, (4) aggregating the one or more predictions to produce the prediction requested by the application, and (5) providing the prediction to the application.

Another embodiment sets forth a method for asynchronously providing a prediction to an application executing on a mobile computing device. Specifically, the method is implemented at a prediction center executing on the mobile computing device, and includes the steps of (1) receiving, from the application, a request to asynchronously provide a prediction for a prediction category, (2) identifying one or more prediction engines that are associated with the prediction category, and (3) notifying each prediction engine of the one or more prediction engines to asynchronously provide one or more predictions in accordance with the request.

Yet another embodiment sets forth a mobile computing device configured to generate predictions in accordance with user behavior. Specifically, the mobile device is configured to implement (1) a prediction center configured serve as a mediator between one or more prediction engines and one or more applications, wherein the prediction center manages a plurality of prediction categories, (2) the one or more prediction engines, wherein each prediction engine of the one or more prediction engines serves as an expert on at least one prediction category of the plurality of prediction categories managed by the prediction center, and (3) the one or more applications, wherein each application of the one or more applications is configured to carry out steps that include (i) issuing, to the prediction center, a request for a prediction for a particular prediction category of the plurality of prediction categories, and (ii) receiving the prediction from the prediction center in accordance with the request, wherein the prediction is an aggregation of at least two predictions produced by the prediction engines that serve as an expert on the particular prediction category.

Other embodiments include a non-transitory computer readable medium configured to store instructions that, when executed by a processor, cause the processor to implement any of the foregoing techniques set forth in this section.

This Summary is provided merely for purposes of summarizing some example embodiments so as to provide a basic understanding of some aspects of the subject matter described in this section. Accordingly, it will be appreciated that the above-described features are merely examples and should not be construed to narrow the scope or spirit of the subject matter described in this section in any way. Other features, aspects, and advantages of the subject matter described in this section will become apparent from the following Detailed Description, Figures, and Claims.

Other aspects and advantages of the embodiments described in this section will become apparent from the following detailed description taken in conjunction with the accompanying drawings which illustrate, by way of example, the principles of the described embodiments.

Detailed Description for Expert Center

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The embodiments described in this section set forth techniques for gathering and organizing behavioral data in a manner that enables a mobile computing device to provide meaningful predictions to its end user. According to some embodiments, the mobile computing device can be configured to implement various "prediction engines" that each can be configured to provide different kinds of predictions within the mobile computing device. More specifically, and according to some embodiments, each prediction engine can assign itself as an "expert" on one or more "prediction categories" that can be used to enhance the overall operation of the mobile computing device. Examples of prediction categories can include applications (e.g., activations/deactivations), people (e.g., phone calls, chats, etc.), geodata (e.g., mobile computing device movement/locales), notifications (e.g., push notification arrivals), physical input (e.g., attaching headphones/power to the mobile computing device), and the like. It is noted that the foregoing prediction categories are merely exemplary and that the embodiments set forth in this section can employ any prediction category that the mobile computing device is capable of maintaining. According to some embodiments, a prediction engine can employ learning models that enable the prediction engine to analyze data (e.g., behavioral data associated with a user's operation of the mobile computing device) and provide predictions in accordance with the data. Although this disclosure primarily discusses prediction engines that are configured to implement learning models, it is noted that any technique for analyzing behavioral data and providing predictions can be employed by the prediction engines described in this section.

As previously set forth in this section, and according to some embodiments, a prediction engine can assign itself as an expert on one or more prediction categories within the mobile computing device. Consequently, in some cases, two or more prediction engines may assign themselves as experts for the same prediction category within the mobile computing device. Accordingly, when a requesting entity—referred to in this section as a "consumer application"—issues a request for a prediction for a prediction category on which two or more prediction engines have assigned themselves as an expert, each prediction engine of the two or more prediction engines will conduct its own analysis (e.g., in accordance with learning models employed by the prediction engine) and generate a prediction (or more) in accordance with the request. In this scenario, at least two or more predictions are generated in response to the request for the prediction, which can establish redundancies and competing predictions that the consumer application may not be capable of interpreting.

Accordingly, the embodiments also set forth a "prediction center" that is configured to serve as a mediator between prediction engines and consumer applications. According to some embodiments, the prediction center can be configured to serve as a registrar for prediction engines when they initialize and seek to assign themselves as experts for one or more prediction categories. Similarly, and according to some embodiments, the prediction center can also be configured to manage different types of prediction categories within the mobile computing device, such that consumer applications can query the prediction center to identify categories of predictions that can be provided. In this manner, when a consumer application issues a request for a prediction for a particular prediction category, and two or more prediction engines respond with their respective prediction(s), the prediction center can be configured to receive and process the predictions prior to responding to the request issued by the consumer application. Processing the predictions can involve, for example, removing duplicate information that exists across the predictions, applying weights to the predictions in accordance with historical performance (i.e., accuracy) metrics associated with the prediction engines, sorting the predictions in accordance with confidence levels advertised by the prediction engines when generating their predictions, and the like. In this manner, the prediction center can distill multiple predictions down into an optimized prediction and provide the optimized prediction to the consumer application. Accordingly, this design beneficially simplifies the operating requirements of the consumer applications (as they do not need to be capable of processing multiple predictions), consolidates the heavy lifting to the prediction center, and enables the consumer applications to obtain a prediction that represents the input of various prediction engines that have assigned themselves as experts on the prediction category of interest.

According to some embodiments, the prediction center can enable a consumer application to receive predictions in a "synchronous" manner. More specifically, a consumer application can be configured to issue, to the prediction center, a request that causes the prediction center to interact with one or more prediction engines and provide a somewhat immediate (i.e., synchronous) response/prediction to the consumer application. This synchronous configuration can be used, for example, when a consumer application—such as a chat application—is being launched and is seeking to preemptively identify a contact with whom a user of the mobile computing device is most likely to message (e.g., in accordance with a current time of the day). According to other embodiments, the prediction center can enable a consumer application to receive predictions in an "asynchronous" manner. More specifically, a consumer application can be configured to issue, to the prediction center, a request that causes the prediction center to notify/configure one or more prediction engines to provide predictions on an as-needed (i.e., asynchronous/triggered) basis. This asynchronous configuration can be used, for example, when a consumer application—such as an OS kernel configured to activate (i.e., launch) and deactivate (i.e., close) applications on the mobile computing device—is seeking to reactively load an application in response to a physical input occurring at the mobile computing device. For example, a prediction engine can determine that a particular music application is manually launched by a user a majority of the time that headphones are plugged into his or her mobile computing device. In turn, the prediction engine can indicate this particular music application to the OS kernel via a prediction when the headphones are connected to the mobile computing device. In turn, the OS kernel can preemptively load the appropriate music application (in accordance with the prediction), which can help improve the user's experience and enhance the performance of the mobile computing device.

Accordingly, the different techniques set forth above enable consumer applications to interact with the prediction center to receive predictions that potentially can be used to enhance overall user experience. In some cases, it can be valuable for a consumer application to provide feedback to the prediction center to indicate whether a prediction produced by a prediction engine was accurate. Such feedback can be beneficial, for example, when learning algorithms are implemented by the prediction engines, as the feedback can be used to "train" the learning algorithms and improve the overall accuracy of their predictions. For example, when a prediction engine generates a prediction that a particular action will be taken by a user, and a consumer application provides feedback that indicates the prediction held true (i.e., the particular action was taken by the user), the prediction engine can increase the confidence level that is advertised when similar and subsequent predictions are produced by the prediction engine. As the confidence level rises, the predictions produced by the prediction engine can take precedence over competing predictions that are produced by other prediction engines (if any). Alternatively, when a prediction engine predicts that the particular action will be taken by the user, and the consumer application provides feedback that indicates the prediction did not hold true (i.e., another action was taken by the user), the prediction engine can decrease the confidence level that is advertised when similar and subsequent predictions are produced by the prediction engine. As the confidence level falls, the predictions produced by the prediction engine can be outweighed by competing predictions that are produced by the other prediction engines (if any).

Additionally, and according to some embodiments, the prediction center/prediction engines can be configured to implement loggers that maintain records of the generated predictions and their corresponding feedback. These records can be beneficial in a variety of manners, e.g., a developer of a prediction engine can receive records from a large number of mobile computing devices, where the records indicate that indicate that the prediction engine is continuously generating inaccurate predictions. In turn, the developer of the prediction engine can revisit the configuration of the prediction engine in order to improve its accuracy. Prediction centers across different mobile computing devices can also be configured to exchange information with one another in order to identify high-level trends that are observed and that can be used to enhance overall user experience. For example, prediction centers can identify between one another that when a majority of mobile computing devices enter into a particular geographical area—e.g., a perimeter of a movie theatre—the users of the mobile computing devices manually place their mobile computing devices into a silent mode. In turn, this identification can be used to provide suggestions to users to place their mobile computing devices into the silent mode when entering within the particular geographical area. This identification also can be used to suggest that an automatic rule be set in place where the mobile computing device automatically enters into the silent mode when the mobile computing device enters into the particular geographical area, thereby eliminating the need for the user to have to access his or her mobile computing device and manually place the mobile computing device into the silent mode.

In addition to the foregoing techniques, the prediction center can also be configured to implement one or more "filters" that can be utilized to further enhance the manner in which predictions are generated within the mobile computing device. According to some embodiments, the filters can be used to provide additional layers of processing that help reduce or eliminate the occurrence of predictions that, despite being correct and reliable (within the scope of the prediction engines), are in fact impractical and ineffective in real-world scenarios. Consider, for example, a scenario in which a lock screen application on a mobile computing device represents a consumer application, where the lock screen application displays a static icon for a camera application and a dynamic icon for an application that is most likely to be accessed by the user (e.g., based on a current time of the day). In this example, the lock screen application can issue, to the prediction center, a request for a prediction associated with the "applications" prediction category when seeking to identify an application that should be associated with the dynamic icon displayed within the lock screen application. Consider further that, in this example, a single prediction engine is associated with the "applications" prediction category, where the single prediction engine determines that the camera application is most likely to be accessed by the user (as it so often is when the lock screen application is displayed). Notably, in this example, this prediction is somewhat meaningless, as it would be wasteful to display two different icons for the same camera application within the lock screen application. Accordingly, a filter can be used to help prevent these scenarios from occurring, e.g., the filter can be configured to remove the camera application from predictions associated with the "applications" prediction category any time the lock screen application is active on the mobile computing device.

Additionally, the prediction center/prediction engines can also be configured to implement one or more caches that can be used to reduce the amount of processing that takes place when generating predictions. According to some embodiments, a prediction, upon generation, can be accompanied by "validity parameters" that indicate when the prediction should be removed from the cache in which the prediction is stored. The validity parameters—also referred to in this section as expiration information—can define, for example, time-based expirations, event-based expirations, and the like. In this manner, when a prediction engine frequently receives requests for a prediction for a particular prediction category, the prediction engine can generate and cache the prediction in order to substantially reduce the amount of future processing that would otherwise occur when processing repeated requests for the prediction. It is noted that the prediction center/prediction engines can be configured to cache predictions using a variety of approaches. For example, when available cache memory is limited, the prediction center/prediction engines can be configured to generate predictions a threshold number of times (e.g., within a time window), and, when the threshold is satisfied, transition to caching the prediction and referencing the cache for subsequent requests for the prediction (so long as the expiration information indicates the prediction is valid).

In addition, it is noted that the architecture of the prediction center can be configured in a manner that enables the different entities described in this section—including prediction engines, prediction categories, filters, loggers, etc.—to function as modular components within the mobile computing device. In one architectural approach, each entity can be configured to implement a set of Application Programming Interface (API) function calls that enable the entity to communicate with the prediction center and provide the different functionalities described in this section. According to this architectural approach, for example, an entity can be configured as a self-contained executable that can operate externally to the prediction center and be capable of providing the various functionalities described in this section. In another architectural approach, each entity can be configured as a bundle whose format and contents are understood by the prediction center and enable the prediction center to function as a platform for implementing the functionality of the entity. According to this approach, the prediction center can be configured to, for example, parse different file system paths (e.g., when initializing) to identify different bundles that reside within the mobile computing device. In this manner, the bundles can be conveniently added to, updated within, and removed from the file system of the mobile computing device, thereby promoting a modular configuration that can efficiently evolve over time without requiring substantial updates (e.g., operating system upgrades) to the mobile computing device. It is noted that the foregoing architectures are exemplary, and that any architecture can be used that enables the various entities described in this section to communicate with one another and provide their different functionalities.

Accordingly, the embodiments set forth techniques for gathering and organizing behavioral data in a manner that enables a mobile computing device to provide meaningful predictions to its end user. A more detailed discussion of these techniques is set forth below and described in conjunction with FIGS. 39_1, 39_2, 39_3A-39_3C, 39_4A-39_4B, 39_5A-39_5C, and the mobile device 100 illustrated in FIG. 1A, which illustrate detailed diagrams of systems and methods that can be used to implement these techniques.

FIG. 39_1 illustrates a block diagram of different components of a mobile computing device 39_100 that is configured to implement the various techniques described in this section, according to some embodiments. More specifically, FIG. 39_1 illustrates a high-level overview of the mobile computing device 39_100, which, as shown, is configured to implement a prediction center 39_102 and various consumer applications 39_112. According to some embodiments, the prediction center 39_102 and the various consumer applications 39_112 can be implemented within an operation system (OS) (not illustrated in FIG. 39_1) that is configured to execute on the mobile computing device 39_100. As also shown in FIG. 39_1, the prediction center 39_102 can be configured to manage various loggers 39_105, various prediction categories 39_106-1, 39_110-2, through 39_110-N, various prediction engines 39_108-1, 39_108-2, through 39_108-N, and various filters 39_110-1, 39_110-2, through 39_110-N. The prediction center 39_102 can also implement a manager 39_104 that is configured to serve as a mediator between the prediction engines 39_108-1, 39_108-2, through 39_108-N and the consumer applications 39_112, e.g., the manager 39_104 can receive predictions (illustrated in FIG. 39_1 as predictions 39_114) generated by the prediction engines 39_108-1, 39_108-2, through 39_108-N and forward the predictions 39_114 to the consumer applications 39_112. The prediction center 39_102 can also be configured to receive feedback information 39_116 from consumer applications 39_112 and provide the feedback information 39_116 to the prediction engines 39_108-1, 39_108-2, through 39_108-N so that they can produce more accurate predictions 39_114 over time. Accordingly, FIG. 39_1 provides a high-level overview of various components that can be used to implement the techniques set forth in this section.

FIG. 39_2 illustrates a block diagram of a more detailed view 39_200 of particular components of the mobile computing device 39_100 of FIG. 39_1, according to one embodiment. As shown in FIG. 39_2, each prediction engine 39_108 can be configured to include one or more learning models 39_202, corresponding state 39_204, and a listing of prediction categories 39_106 on which the prediction engine 39_108 has assigned itself as an expert. According to some embodiments, the learning models 39_202 can represent algorithms that are configured to analyze information (e.g., state 39_204) and generate predictions that can enhance a user's overall experience when operating the mobile computing device 39_100. According to some embodiments, the state 39_204 can be gathered from various sources within the mobile computing device 39_100, e.g., feedback information 39_116 provided by consumer applications, information gathered by sensors of the mobile computing device 39_100 (e.g., Global Positioning System (GPS) sensors, microphone sensors, temperature sensors, accelerometer sensors, and so on), information provided by outside sources (e.g., applications executing on the mobile computing device 39_100, OS kernels, etc.), and the like.

As also shown in FIG. 39_2, the manager 39_104 can be configured to manage various loggers 39_105, various prediction categories 39_106, various prediction engines 39_108, and various filters 39_110. As previously set forth above, these entities can be implemented using a variety of architectural approaches, e.g., the entities can be standalone executables that are external to the prediction center 39_102 and communicate with the manager 39_104 via API commands, the entities can be bundles that are stored within a file system of the mobile computing device 39_100 and that are interpretable/implemented by the manager 39_104, and the like. As also shown in FIG. 39_2, the manager 39_104 can implement an aggregator 39_220 that is configured to consolidate multiple predictions 39_114 (e.g., when produced by different prediction engines 39_108). Moreover, as shown in FIG. 39_2, the manager 39_104 can be configured to maintain records of the consumer applications 39_112 that interact with the prediction center 39_102. As described in greater detail in this section, these records can function to associate prediction engines 39_108 with consumer applications 39_112 that register to asynchronously receive predictions from the prediction engines 39_108.

Additionally, and as shown in FIG. 39_2, the prediction center 39_102 can be configured to implement a cache 39_206 that enables the prediction center 39_102/prediction engines 39_108 to cache generated predictions 39_114 in attempt to increase processing and energy consumption efficiency at the mobile computing device 39_100. As shown in FIG. 39_2, the cache 39_206 can include entries 39_208, where each entry 39_208 includes a prediction 39_114 as well as expiration information 39_210 that indicates how long the prediction 39_114 is considered to be valid. The expiration information 39_210 can include, for example, time-based expirations, event-based expirations, and the like. In this manner, when a prediction engine 39_108 frequently receives requests for a prediction 39_114 for a particular prediction category 39_106, the prediction engine 39_108 can generate and cache the prediction 39_114 in order to substantially reduce the amount of processing that would otherwise occur at the mobile computing device 39_100, thereby enhancing performance.

FIG. 39_3A illustrates a method 39_300 for a high-level initialization and operation of a prediction engine 39_108, according to some embodiments. As shown in FIG. 39_3A, the method 39_300 begins at step 39_302, where the prediction engine 39_108 loads one or more learning models 39_202. At optional step 39_304, the prediction engine 39_108 loads previously established state 39_204 associated with the one or more learning models 39_202. According to some embodiments, the previously established state 39_204 can be retrieved from any storage resource that is available to the prediction engine 39_108, e.g., local non-volatile memory, cloud storage, and the like. At step 39_306, the prediction engine 39_108 issues, to the prediction center 39_102, a request to serve as an expert on (and provide predictions 39_114 for) at least one prediction category 39_106. At step 39_308, the prediction engine 39_108 receives a request to synchronously provide predictions 39_114 or asynchronously provide predictions 39_114 for the at least one prediction category 39_106. At step 39_310, the prediction engine 39_108 asynchronously and/or synchronously provides predictions in accordance with the one or more learning models 39_202, where each prediction 39_114 includes confidence level information. At step 39_312, prediction engine 39_108 receives feedback information that indicates an accuracy level associated with the provided predictions 39_114. Such feedback information 39_116 can be used to "train" the learning models 39_202 and improve the overall accuracy of their predictions 39_114. For example, when the prediction engine 39_108 generates a prediction 39_114 that a particular action will be taken by a user of the mobile computing device 39_100, and a consumer application 39_112 provides feedback that indicates the prediction 39_114 held true (i.e., the particular action was taken by the user), the prediction engine 39_108 can increase the confidence level that is advertised when similar and subsequent predictions 39_114 are produced by the prediction engine 39_108. At step 39_314, prediction engine 39_108 updates the one or more learning models 39_202 in accordance with the feedback information.

FIG. 39_3B illustrates a method 39_330 for synchronously providing a prediction 39_114 at a prediction engine 39_108, according to some embodiments. As shown in FIG. 39_3B, the method 39_330 begins at step 39_332, where the prediction engine 39_108 receives a request to synchronously provide a prediction 39_114 for a particular prediction category 39_106. According to some embodiments, the request can be generated by the prediction center 39_102 on behalf of a consumer application 39_112 that is requesting the prediction 39_114 for the particular prediction category 39_106. Alternatively, the request can be generated by the consumer application 39_112 and provided directly to prediction engine 39_108. In this manner, the overall involvement of the prediction center 39_102 can be reduced or even eliminated with respect to the prediction center 39_102 serving as a mediator between the prediction engine 39_108 and the consumer application 39_112. At step 39_334, the prediction engine 39_108 identifies at least one learning model 39_202 that is associated with the particular prediction category 39_106. At step 39_336, the prediction engine 39_108 generates, in accordance with the at least one learning model 39_202, the prediction 39_114 for the particular prediction category 39_106. At step 39_338, the prediction engine 39_108 associates the prediction 39_114 with confidence level information. At step 39_340, the prediction engine 39_108 provides the prediction 39_114. More specifically, and depending on the configuration (e.g., as described above in conjunction with step 39_332), the prediction engine 39_108 can provide the prediction 39_114 to the prediction center 39_102 or directly to the consumer application 39_112. In turn, the prediction 39_114 is aggregated (e.g., by the aggregator 39_220 when the prediction 39_114 is provided to the prediction center 39_102) with other predictions 39_114 (if any) when other prediction engines 39_108 provide similar predictions 39_114.

FIG. 39_3C illustrates a method 39_350 for asynchronously providing a prediction 39_114 at a prediction engine 39_108, according to some embodiments. As shown in FIG. 39_3C, the method 39_350 begins at step 39_352, where the prediction engine 39_108 receives a request to asynchronously provide a prediction 39_114 for a particular prediction category 39_106. At step 39_354, the prediction engine 39_108 identifies at least one learning model 39_202 associated with the particular prediction category 39_106. At step 39_356, the prediction engine 39_108 identifies at least one trigger associated with the particular prediction category 39_106 and/or the at least one learning model 39_202. At step 39_358, the prediction engine 39_108 determines whether the trigger is activated/occurs. If, at step 39_358, the prediction engine 39_108 determines that the trigger is activated, then the method 39_350 proceeds to step 39_360. Otherwise, the method 39_350 repeats at step 39_358 until the trigger is activated/occurs. At step 39_360, the prediction engine 39_108 generates, in accordance with the at least one learning model 39_202, the prediction 39_114 for the particular prediction category 39_106. At step 39_362, the prediction engine 39_108 associates the prediction 39_114 with confidence level information. At step 39_364, the prediction engine 39_108 provides the prediction 39_114 (e.g., to the prediction center 39_102 for aggregation).

FIG. 39_4A illustrates a method 39_400 for a consumer application 39_112 requesting to synchronously receive a prediction 39_114, according to some embodiments. As shown in FIG. 39_4A, the method 39_400 begins at step 39_402, where the consumer application 39_112 issues a request for a prediction 39_114 for a particular prediction category 39_106. According to some embodiments, the consumer application 39_112 can be configured to issue the request to the prediction center 39_102, where, in turn, the prediction center 39_102 interfaces with the prediction engines 39_108 that are registered as experts on the particular prediction category 39_106. Alternatively, the consumer application 39_112 can be configured to issue the request directly to a prediction engine 39_108, e.g., when the prediction engine 39_108 is the sole expert on the particular prediction category 39_106 within the mobile computing device 39_100. At step 39_404, the consumer application 39_112 synchronously receives a prediction 39_114 for the particular prediction category 39_106 in conjunction with the request issued at step 39_402. At step 39_406, the consumer application 39_112 observes behavior (e.g., user behavior) at the mobile computing device 39_100 to determine whether the prediction 39_114 is accurate. At step 39_408, the consumer application 39_112 provides feedback information 39_116 that indicates an accuracy level associated with the prediction 39_114.

FIG. 39_4B illustrates a method 39_450 for a consumer application 39_112 registering to asynchronously receive predictions 39_114, according to some embodiments. As shown in FIG. 39_4B, the method 39_450 begins at step 39_452, where the consumer application 39_112 issues a request to asynchronously receive predictions 39_114 for a particular prediction category 39_106. At step 39_454, the consumer application 39_112 asynchronously receives a prediction 39_114 for the particular prediction category 39_106. At step 39_456, the consumer application 39_112 observes behavior (e.g., user behavior) at the mobile computing device 39_100 to determine whether the prediction 39_114 is accurate. At step 39_458, the consumer application 39_112 provides feedback information 39_116 that indicates an accuracy level associated with the prediction 39_114.

FIG. 39_5A illustrates a method 39_500 for managing registrations of prediction engines 39_108 at the prediction center 39_102, according to some embodiments. As shown, the method 39_500 begins at step 39_502, where the manager 39_104 of the prediction center 39_102 receives, from a prediction engine 39_108, a request to serve as a prediction engine 39_108 and provide predictions 39_114 for at least one prediction category 39_106. At step 39_504, the manager 39_104 adds the prediction engine 39_108 to a list of prediction engines 39_108 assigned to provide predictions 39_114 for the at least one prediction category 39_106. At optional step 39_506, the manager 39_104 assigns a weight to the prediction engine 39_108 in accordance with a historical performance metric associated with the prediction engine 39_108. At optional step 39_508, the manager 39_104 initializes filters 39_110, if any, that are associated with the prediction engine 39_108 and/or the at least one prediction category 39_106. At step 39_510, the manager 39_104 updates a configuration of the prediction center 39_102 to enable consumer applications 39_112 to issue requests to synchronously and/or asynchronously receive predictions 39_114 associated with the at least one prediction category 39_106.

FIG. 39_5B illustrates a method 39_550 for synchronously providing predictions 39_114 to consumer applications 39_112 at the prediction center 39_102, according to some embodiments. As shown in FIG. 39_5B, the method 39_550 begins at step 39_552, where the manager 39_104 receives, from a consumer application 39_112, a request to synchronously provide a prediction 39_114 for a particular prediction category 39_106. One example scenario can involve a messaging application activating at the mobile computing device 39_100 and issuing a request for a prediction 39_114 for three contacts that are most likely to be addressed by a user operating the messaging application. At step 39_554, the manager 39_104 identifies a list of prediction engines 39_108 assigned to the particular prediction category 39_106. Continuing with the foregoing example scenario, consider further that the two different prediction engines 39_108 that have registered themselves as experts on the "people" prediction category 39_106. At step 39_556, the manager 39_104 queries each prediction engine 39_108 included in the list of prediction engines 39_108 for the prediction 39_114.

At step 39_558, the manager 39_104 receives, from each prediction engine 39_108 included in the list of prediction engines 39_108, a corresponding prediction 39_114 associated with confidence level information. Continuing the foregoing example scenario, consider further that two prediction engines 39_108 provide predictions 39_114 that each include a separate list of three contacts that are most likely to be contacted by the user. For example, a first list can include entries that read "Greg:0.7," "Amy:0.5," and "Mom: 0.3" (where the name (e.g., "Greg") represents a predicted individual who will be contacted and the number (e.g., 0.7) that follows the name represents corresponding confidence level that the predicted individual will be contacted), and a second list can include entries that read "Mom:0.7," "Greg: 0.4," and "Julie:0.2." At step 39_560, the manager 39_104 updates the confidence level information associated with the predictions 39_114 in accordance with weights (if any) assigned to the corresponding prediction engines 39_108. For example, if the prediction engine 39_108 that produces the first list has an assigned weight of 0.75 in accordance with consistently poor performance observed by the manager 39_104 (e.g., via feedback information 39_116), the confidence level information for each entry in the first list would be reduced by 0.75. At step 39_562, the manager 39_104 aggregates (e.g., using the aggregator 39_220) the predictions 39_114 in accordance with their associated confidence level information. Continuing with the foregoing example—and, assuming that weights are not applied at step 39_560—step 39_562 would involve the manager 39_104 establishing the following updated list: "Greg:1.1" (i.e., 0.7+0.4=1.1), "Mom:1.0" (i.e., 0.3+0.7=1.0), "Amy:0.5u" and "Julie:0.2," where the entry for "Julie:0.2" is removed as the messaging application desires to receive a prediction for only three contacts. At step 39_564, the manager 39_104 provides, to the consumer application 39_112, the prediction 39_114 in accordance with the aggregated predictions 39_114—which would include "Greg:1.1," "Mom:1.0," and "Amy:0.5."

FIG. 39_5C illustrates a method 39_570 for asynchronously providing predictions 39_114 to consumer applications 39_112 at the prediction center 39_102, according to some embodiments. As shown, the method 39_570 begins at step 39_572, where the manager 39_104 receives, from a consumer application 39_112, a request to asynchronously receive predictions 39_114 for a particular prediction category 39_106. At step 39_574, the manager 39_104 identifies a list of prediction engines 39_108 assigned to the particular prediction category 39_106. At step 39_576, the manager 39_104 notifies each prediction engine 39_108 included in the list of prediction engines 39_108 to asynchronously provide predictions 39_114 associated with the particular prediction category 39_106. At step 39_578, the manager 39_104 receives, from each prediction engine 39_108 included in the list of prediction engines 39_108, a corresponding prediction 39_114 associated with confidence level information. At step 39_580, the manager 39_104 updates the confidence level information associated with the predictions 39_114 in accordance with weights (if any) assigned to the corresponding prediction engines 39_108. At step 39_582, the manager 39_104 aggregates the predictions 39_114 in accordance with their associated confidence level information. At step 39_584, manager 39_104 provides, to the consumer application 39_112, the prediction 39_114 in accordance with the aggregated predictions 39_114.

Example Methods and Devices for Expert Center

The embodiments set forth techniques for implementing various "prediction engines" that can be configured to provide different kinds of predictions within a mobile computing device. According to some embodiments, each prediction engine can assign itself as an "expert" on one or more "prediction categories" within the mobile computing device. When a consumer application issues a request for a prediction for a particular category, and two or more prediction engines respond with their respective prediction(s), a "prediction center" can be configured to receive and process the predictions prior to responding to the request. Processing the predictions can involve removing duplicate information that exists across the predictions, sorting the predictions in accordance with confidence levels advertised by the prediction engines, and the like. In this manner, the prediction center can distill multiple predictions down into an optimized prediction and provide the optimized prediction to the consumer application.

In some embodiments, a method for synchronously providing a prediction to an application executing on a mobile computing device is provided, the method comprising: at a prediction center executing on the mobile computing device: receiving, from the application, a request to synchronously provide a prediction for a prediction category; identifying one or more prediction engines that are associated with the prediction category; receiving one or more predictions produced by the one or more prediction engines in accordance with the request; aggregating the one or more predictions to produce the prediction requested by the application; and providing the prediction to the application. In some embodiments, aggregating the one or more predictions comprises carrying out one or more operations selected from: removing duplicate predictions from the one or more predictions; filtering the one or more predictions in accordance with one or more filters implemented by the prediction center; for each prediction of the one or more predictions: adjusting a confidence level associated with the prediction in accordance with a weight that is assigned to the prediction engine that produces the prediction, wherein the confidence level associated with the prediction is generated by the prediction engine when producing the prediction; and sorting each prediction of the one or more predictions in accordance with the confidence level associated with the prediction. In some embodiments, the method includes: prior to receiving the request for the prediction: for each prediction engine of the one or more prediction engines: receiving, from the prediction engine, a request for the prediction engine to serve as an expert on the prediction category; and associating the prediction engine with the prediction category. In some embodiments, the method includes: subsequent to producing the prediction requested by the application: establishing validity parameters associated with the prediction; associating the validity parameters with the prediction; storing the prediction and the validity parameters into a cache. In some embodiments, the validity parameters define one or more of a time-based expiration or a trigger-based expiration. In some embodiments, the method includes: subsequent to storing the prediction and the validity parameters into the cache: receiving, from a second application, a second request to synchronously provide the prediction for the prediction category; locating the prediction within the cache; and when the validity parameters associated with the prediction indicate that the prediction is valid: providing the prediction to the second application. In some embodiments, the prediction category is included in a plurality of prediction categories that are managed by the prediction center, and each prediction category of the plurality of prediction categories is associated with: activations and deactivations of applications executing on the mobile computing device, contacts known to the mobile computing device, Global Positioning System (GPS) information available to the mobile computing device, notifications processed by the mobile computing device, or physical input made to the mobile computing device. In some embodiments, the method includes: subsequent to providing the prediction to the application: receiving, from the application, feedback information that indicates an accuracy of the prediction; and providing the feedback information to the one or more prediction engines, wherein the feedback information can be utilized by the one or more prediction engines to increase the accuracy of subsequent predictions that are produced by the one or more prediction engines.

In some embodiments, a method for asynchronously providing a prediction to an application executing on a mobile computing device is provided, the method comprising: at a prediction center executing on the mobile computing device: receiving, from the application, a request to asynchronously provide a prediction for a prediction category; identifying one or more prediction engines that are associated with the prediction category; and notifying each prediction engine of the one or more prediction engines to asynchronously provide one or more predictions in accordance with the request. In some embodiments, the method includes: subsequent to notifying each prediction engine of the one or more prediction engines: receiving the one or more predictions; aggregating the one or more predictions to produce the prediction requested by the application; and providing the prediction to the application. In some embodiments, the method includes: subsequent to producing the prediction requested by the application: establishing validity parameters associated with the prediction; associating the validity parameters with the prediction; storing the prediction and the validity parameters into a cache. In some embodiments, the validity parameters are provided by the one or more prediction engines and define one or more of a time-based expiration or a trigger-based expiration. In some embodiments, aggregating the one or more predictions comprises carrying out one or more operations selected from: removing duplicate predictions from the one or more predictions; filtering the one or more predictions in accordance with one or more filters implemented by the prediction center; for each prediction of the one or more predictions: adjusting a confidence level associated with the prediction in accordance with a weight that is assigned to the prediction engine that produces the prediction, wherein the confidence level associated with the prediction is generated by the prediction engine when producing the prediction; and sorting each prediction of the one or more predictions in accordance with the confidence level associated with the prediction. In some embodiments, the one or more prediction engines asynchronously provide the one or more predictions to the prediction center in response to a trigger-based event that occurs at the mobile computing device. In some embodiments, the method includes: prior to receiving the request for the prediction: for each prediction engine of the one or more prediction engines: receiving, from the prediction engine, a request for the prediction engine to serve as an expert on the prediction category; and associating the prediction engine with the prediction category. In some embodiments, the prediction category is included in a plurality of prediction categories that are managed by the prediction center, and each prediction category of the plurality of prediction categories is associated with: activations and deactivations of applications executing on the mobile computing device, contacts known to the mobile computing device, Global Positioning System (GPS) information available to the mobile computing device, notifications processed by the mobile computing device, or physical input made to the mobile computing device.

In some embodiments, a mobile computing device configured to generate predictions in accordance with user behavior is provided, the mobile computing device comprising a processor that is configured to execute: a prediction center configured serve as a mediator between one or more prediction engines and one or more applications, wherein the prediction center manages a plurality of prediction categories; the one or more prediction engines, wherein each prediction engine of the one or more prediction engines serves as an expert on at least one prediction category of the plurality of prediction categories managed by the prediction center; and the one or more applications, wherein each application of the one or more applications is configured to carry out steps that include: issuing, to the prediction center, a request for a prediction for a particular prediction category of the plurality of prediction categories, and receiving the prediction from the prediction center in accordance with the request, wherein the prediction is an aggregation of at least two predictions produced by the prediction engines that serve as an expert on the particular prediction category. In some embodiments, aggregating the at least two predictions comprises carrying out one or more operations selected from: removing duplicate predictions from the at least two predictions; filtering the at least two predictions in accordance with one or more filters implemented by the prediction center; for each prediction of the at least two predictions: adjusting a confidence level associated with the prediction in accordance with a weight that is assigned to the prediction engine that produces the prediction, wherein the confidence level associated with the prediction is generated by the prediction engine when producing the prediction; and sorting each prediction of the at least two predictions in accordance with the confidence level associated with the prediction. In some embodiments, the prediction center is configured to carry out steps that include, subsequent to providing the prediction to the application: receiving, from the application, feedback information that indicates an accuracy of the prediction; and providing the feedback information to the prediction engines that produced the at least two predictions, wherein the feedback information can be utilized by the prediction engines to increase an accuracy of subsequent predictions that are produced by the prediction engines. In some embodiments, each prediction category of the plurality of prediction categories is associated with: activations and deactivations of applications executing on the mobile computing device, contacts known to the mobile computing device, Global Positioning System (GPS) information available to the mobile computing device, notifications processed by the mobile computing device, or physical input made to the mobile computing device.

Section 10: Context Monitoring, Context Notifications, Context Prediction, and Efficient Context Monitoring The material in this section "Context Monitoring, Context Notifications, Context Prediction, and Efficient Context Monitoring" describes device context monitoring, context notifications, context prediction, and efficient context monitoring, in accordance with some embodiments, and provides information that supplements the disclosure provided herein. For example, portions of this section describe monitoring the operating context of a computing device, which supplements the disclosures provided herein, e.g., those related to the collection/storage of usage data (FIGS. 3A-3B), the creation/storage of trigger conditions (FIGS. 4A-4B), and the surfacing of relevant content for users based on the usage data and the trigger conditions (e.g., methods 600 and 800). In some embodiments, the context monitoring/prediction details discussed in this section are used to provide contextual information that is used to provide data to improve the presentation of search results and other suggested content for any of the methods discussed herein (e.g., in order to supplement methods 600, 800, 1000, 1200, 2200, 2280, 2900 or any of the other methods discussed herein that can benefit from the use of additional contextual information).

Brief Summary of Context Monitoring/Prediction

Disclosed are systems, methods, and non-transitory computer-readable storage media for monitoring the current context of a computing device. In some implementations, a context daemon can collect context information about the computing device. The context information can include current device hardware state information. The context information can include current software state information. The context can be derived or implied from a combination of hardware state information, software state information, or any other type of state information. For example, the derived context can be a user state (e.g., a user activity, sleeping, running, etc.) derived from or implied by hardware or software state information.

In some implementations, context information can be reported to the context daemon by context monitors. The context monitors can be specifically built for collecting context information monitored by the context daemon. The context monitors can be applications, utilities, tools, or the like that were built for other purposes, use or generate hardware or software state information, and report the state information to the context daemon. Once the context information has been collected, the context daemon can store the current context of the computing device in a central location so that context clients (e.g., software, applications, utilities, operating system, etc.) can obtain current context information from a single source. In some implementations, the context daemon can generate and/or collect historical context information. The historical context information can include the old or outdated context information. The historical context information can be derived from the context information. Thus, the context daemon can provide a central repository of context information that context clients (e.g., processes) can use to determine the current context of the computing device.

Disclosed are systems, methods, and non-transitory computer-readable storage media for notifying context clients of changes to the current context of a computing device. In some implementations, a context client can register to be called back when the context daemon detects specified context. For example, the context client can specify a context in which the context client is interested. When the context daemon detects that the current context of the computing device corresponds to the registered context, the context daemon can notify the context client that the current context matches the context in which the context client is interested. Thus, context clients do not require the programming necessary to independently obtain context updates and detect changes in context that are relevant or of interest to the context client.

Disclosed are systems, methods, and non-transitory computer-readable storage media for efficiently monitoring the operating context of a computing device. In some implementations, the context daemon and/or the context client can be terminated to conserve system resources. For example, if the context daemon and/or the context client are idle, they can be shutdown to conserve battery power or free other system resources (e.g., memory). When an event occurs (e.g., a change in current context) that requires the context daemon and/or the context client to be running, the context daemon and/or the context client can be restarted to handle the event. Thus, system resources can be conserved while still providing relevant context information collection and callback notification features.

Disclosed are systems, methods, and non-transitory computer-readable storage media for predicting a future context of a computing device. In some implementations, a context daemon can use historical context information to predict future events and/or context changes. For example, the context daemon can analyze historical context information to predict user sleep patterns, user exercise patterns, and/or other user activity. In some implementations, a context client can register a callback for a predicted future context. For example, the context client can request to be notified ten minutes in advance of a predicted event and/or context change. The context daemon can use the prediction to notify a context client in advance of the predicted event.

Detailed Description of Context Monitoring/Prediction

Determining the Current Context

FIG. 40_1 is a block diagram of an example system 40_100 for monitoring, predicting, and notifying context clients of changes in the operational context of a computing device. The computing device can be, for example, a desktop computer, laptop computer, smartphone, tablet computer, or any other type of computing device. System 40_100 can be configured to run on the computing device, for example. In some implementations, system 40_100 can include context daemon 40_102. For example, context daemon 40_102 can be a background process executing on the computing device. Context daemon 40_102 can be a process included in the operating system of the computing device, for example.

In some implementations, context daemon 40_102 can be configured to collect information about the current operating context of the computing device. For example, the context information can include information that describes the internal and/or external context of the computing device. In some implementations, internal context information can include hardware state information. For example, the hardware state information can identify hardware that is in use and how the hardware is being used. If the hardware is a wireless transceiver being used to communicate with another device, the hardware state information can identify the other device, when the connection was created, how much data has been transmitted, etc. In some implementations, the internal context information can include software state information. For example, the state information for a calendar application can include calendar events, meetings, names of contacts who will participate in the meetings, start and finish times for the meetings, etc.

In some implementations, the external context information can include a user activity. For example, the external context information can be derived from the hardware state information and/or the software state information. For example, context daemon 40_102 can derive user behavior (e.g., sleep patterns, work patterns, eating patterns, travel patterns, etc.) from the hardware and/or software state information, as described further below.

In some implementations, context daemon 40_102 can include monitor bundles 40_104 for collecting various types of context information. Each monitor bundle 40_106 in monitor bundles 40_104 can be configured to collect context information about corresponding context items. For example, monitor bundle 40_106 can be a process external to context daemon 40_102. Monitor bundle 40_106 can be a dynamically loaded software package that can be executed within context daemon 40_102.

In some implementations, monitor bundle 40_106 can include context monitor 40_108. For example, context monitor 40_108 can be configured to collect information about the current context of the computing device. In some implementations, monitor bundle 40_106 can include historical monitor 40_110. For example, historical monitor 40_110 can be configured to collect or determine the historical context for the computing device, as described further below.

In some implementations, each monitor bundle 40_106 in monitor bundles 40_104 can be configured to collect specific types of context information. For example, context daemon 40_102 can load many different monitor bundles 40_106. Each monitor bundle 40_106 can be configured to collect different context information from different sources 40_130 within the computing device. For example, one monitor bundle 40_106 can collect context information about a Bluetooth context item while another monitor bundle 40_106 can collect context information about a lock state context item.

In some implementations, monitor bundle 40_106 can be configured to collect device location context information from location API 40_132. For example, context monitor 40_108 can receive current global navigational satellite system (GNSS) location data received by a GNSS receiver from location API 40_132. Monitor bundle 40_106 can receive current cellular and/or WiFi derived location data from location API 40_132.

In some implementations, monitor bundle 40_106 can be configured to collect lock state context information from lock state API 40_134. For example, context monitor 40_108 can collect lock state context information that describes the current lock state (e.g., locked, unlocked, etc.) of the computing device. For example, a user of the computing device must unlock the computing device to use or interact with the computing device. When the device is locked, the device will not accept user input. When the device is unlocked, the device will accept user input. For handheld devices with touchscreen displays, when the device is unlocked, the display may be illuminated and can accept touch input from the user. When the touchscreen device is locked, the display may be dark and the touchscreen display will not accept touch input. Thus, the lock state of the computing device can provide evidence that the user has interacted with the computing device.

In some implementations, monitor bundle 40_106 can be configured to collect application context information from application manager API 40_136. For example, context monitor 40_108 can receive from application manager API 40_136 information describing which applications are currently running on the computing device, how long the applications have been running, when the applications were invoked, and/or which application is currently the focus application (e.g., in the foreground, visible on the display).

In some implementations, monitor bundle 40_106 can be configured to collect Bluetooth context information from Bluetooth API 40_138. For example, context monitor 40_108 can receive from Bluetooth API 40_138 information describing an active Bluetooth connection, including the identification and type of Bluetooth device connected to the computing device, when the connection was established, and the how long (e.g., duration) the computing device has been connected to the Bluetooth device.

In some implementations, monitor bundle 40_106 can be configured to collect headphone jack information from headphone API 40_140. For example, context monitor 40_108 can receive from headphone API 40-140 information that describes whether a wired headphone or headset (or other device) is currently connected to the headphone jack of the computing device. In some implementations, monitor bundle 40_106 can receive information about the type of device connected to the headphone jack from headphone API 40_140.

In some implementations, monitor bundle 40_106 can be configured to collect other context information from other device state APIs 40_142. For example, context monitor 40_108 can receive from other state APIs 40-142 information that describes WiFi connections, telephone connections, application usage, calendar events, photographs, media usage information, battery charging state, and/or any other state information that can be used to describe or infer the current internal and/or external context of the computing device.

In some implementations, monitor bundle 40_106 can be dynamically loaded into context daemon 40_102 as needed. For example, when location context information is needed (e.g., a client has requested location information) by context daemon 40_102, then context daemon 40_102 can load a location-specific monitor bundle 40_106 into monitor bundles 40_104. Once loaded, context monitor 40_108 of monitor bundle 40_106 will start collecting current location-specific context. By loading monitor bundles 40_106 as needed, context daemon 40_102 can conserve system resources of the computing device, such as memory and battery power. In some implementations, monitor bundle 40_106 can be an external process, such as reporting client 40_124. Context daemon 40_102 can invoke the external process monitor bundle 40_106 as needed to collect context information. For example, context daemon 40_102 can load or invoke monitor bundle 40_106 in response to receiving a callback request, as described below.

In some implementations, context daemon 40_102 can receive context information from reporting client 40_124. For example, reporting client 40_124 (context client) can be any software running on the computing device that generates or collects context information and reports the context information to context daemon 40_102. For example, a map application running on the computing device can obtain location information using location API 40_132 to determine how to route the user from a starting location to a destination location. In addition to determining the route, the map application can report the location information obtained from location API 40_132 to context daemon 40_102. Thus, while reporting client 40_124 is not built for the purpose of collecting and reporting context information like monitor bundle 40_106, reporting client 40_124 can be configured to report context information when reporting client 40_124 obtains the context information while performing its primary function.

In some implementations, context daemon 40_102 can include current context 40_112. For example, current context 40_112 can be an in-memory repository of context information received from monitor bundles 40_104 (e.g., monitor bundle 40_106) and/or reporting client 40_124. When monitor bundles 40_104 and/or reporting client 40_124 report context information to context daemon 40_102, context daemon 40_102 can update current context 40_112 with the newly received context information. Thus, current context 40_112 can include context information (e.g., context items) describing the current context of the computing device.

FIG. 40_2A and FIG. 40_2B illustrate example current contexts 40_200 and 40_250. FIG. 40_2A illustrates an example of context items that can make up current context 40_200. For example, current context 40_200 (e.g., current context 40_112) can include context information for the computing device at time T. For example, current context 40_200 can include a context item that represents the current locked state (false). Current context 40_200 can include a context item that represents the plugged in state of the headphone jack (false). Current context 40_200 can include a context item that represents the charging state of the battery (false). Current context 40_200 can include a context item that represents the connection state of the Bluetooth transceiver (false). Current context 40_200 can include a context item that identifies the application currently in focus on the computing device (social app). The context information shown in current context 40_200 can be received from monitor bundle 40_106 and/or from reporting client 40_124, for example.

FIG. 40_2B illustrates an example of a new context item being added to current context 40_250. Current context 40_250 (current context 40_112) can include context information for the computing device at some later time T. For example, current context 40_250 includes a new context item that identifies the current location of the computing device. The new location context item can be added when a new location monitor bundle 40_106 is loaded into context daemon 40_102 and starts reporting location context information to context daemon 40_102. For example, the new location monitor bundle 40_106 can be loaded in response to a request from a context client for location information.

Callback Requests

Referring to FIG. 40_1, in some implementations, context daemon 40_102 can expose an API that allows context client software running on the computing device to access (e.g., query, view, etc.) the information in current context 40_112. In some implementations, context daemon 40_102 can receive a request from requesting client 40_126 (context client) to callback requesting client 40_126 when a specific context is detected by context daemon 40_102. For example, requesting client 40_126 can send a callback request to context daemon 40_102. Callback daemon 40_102 can store the callback request information in callback registry 40_114. Callback registry 40_114 can be an in-memory repository of callback information. For example, the callback request can specify a predicate (e.g., a context condition) for notifying requesting client 40_126. The callback request can include a client identifier for requesting client 40_126.

In some implementations, when the callback request is received, callback registry 40_114 can generate a unique identifier for the callback request and store the callback request identifier, the client identifier, and callback predicate in callback predicate database 40_116. Context daemon 40_102 can return the callback request identifier to requesting client 40_126 in response to receiving the callback request. When the context information in current context 40_112 satisfies the predicate, context daemon 40_102 will notify requesting client 40_126. For example, the callback notification can include the callback request identifier so that requesting client 40_126 can determine the callback request corresponding to the notification. For example, requesting client 40_126 may register many callback requests with context daemon 40_102. When callback daemon 40_102 sends a callback notification to requesting client 40_126, requesting client 40_126 can use the callback request identifier to determine to which callback request the callback notification relates.

In some implementations, context daemon 40_102 can load monitor bundle 40_106 in response to receiving a callback request from requesting client 40_126. For example, context daemon 40_102 can support lazy initialization of monitor bundles 40_106. In other words, context daemon 40_102 can load and initialize monitor bundle 40_106 when needed to service a callback request. For example, if no client is interested in location information, then context daemon 40_102 may not load a location monitor bundle 40_106 so that system resources (e.g., battery, memory, etc.) are not wasted monitoring a context item that is not needed. However, upon receipt of a callback request for the location context item, content daemon 40_102 can load, initialize, or invoke the monitor bundle 40_106 associated with the location context item and start receiving context information regarding the location of the computing device.

In some implementations, monitor bundle 40_106 can be a software plugin for context daemon 40_102. For example, monitor bundle 40_106 can be software code (e.g., library, object code, java jar file, etc.) that can be dynamically loaded into context daemon 40_102 and executed to monitor context information. In some implementations, monitor bundle 40_106 can be a separate process external to context daemon 40_102. For example, monitor bundle 40_106 can be a standalone executable that context daemon 40_102 can invoke to monitor and report context information.

FIG. 40_3 illustrates an example callback predicate database 40_300. For example, predicate database 40_300 can correspond to predicate database 40_116 of FIG. 40_1. In some implementations, each entry 40_302-40_316 in predicate database 40_300 can include a callback request identifier. For example, when context daemon 40_102 receives a callback request from requesting client 40_126, context daemon 40_102 can generate a unique request identifier for the callback request. As described above, context daemon 40_102 can return the callback request identifier to requesting client 40_126 in response to the callback request. Context daemon 40_102 can associate the generated callback request identifier with the client identifier and the callback predicate in the callback database. When the context daemon 40_102 sends a callback notification to requesting client 40_126, context daemon 40_102 can include the callback identifier in the notification so that requesting client 40_126 can determine why context daemon 40_102 is sending the callback notification. For example, requesting client 40_126 may send multiple callback requests to context daemon 40_102. Requesting client 40_126 can determine for which callback request context daemon 40_102 is sending a notification based on the callback request identifier.

In some implementations, each entry 40_302-40_316 in predicate database 40_300 can include a client identifier and a callback predicate. The client identifier can correspond to the client that requested to be notified (e.g., called back) when the current context of the computing device satisfies the corresponding predicate specified by requesting client 40_126. In some implementations, the client identifier can be generated by a launch daemon configured to launch (e.g., execute, invoke, etc.) processes on the computing device, as describe further below. For example, entry 40_302 corresponds to a requesting client 40_126 having client identifier "Client_ID1" that requested to be notified when the current context of the computing device indicates that the device is locked and that the focus application is the music application. Stated differently, the context client (e.g., requesting client 40_126) corresponding to client identifier "Client_ID1" specified that the predicate for notifying (e.g., calling back) the context client is that the device is locked and the application currently being used by the user is the music application. For example, the predicate specified by requesting client 40_126 can identify one or more context conditions (e.g., hardware state values, software state values, derived context, etc.) separated by logical (e.g., Boolean) operators. When the current state of the computing device corresponds to the specified predicate, context daemon 40_102 will notify (e.g., call back) requesting client 40_126.

In some implementations, a predicate can include a time component. For example, the predicate can include "before" and/or "after" operators (terms) that allow a requesting client 40_126 to indicate an amount of time before or after some event (e.g., state change, context change, etc.) when the requesting client 40_126 should be notified. For example, context daemon 40_102 can receive calendar application state information that indicates that a meeting is scheduled at a specific time in the future. Requesting client 40_126 can register a predicate (e.g., entry 40_316) that specifies that context daemon 40_102 should notify requesting client 40_126 thirty minutes before the meeting. When the current time corresponds to thirty minutes before the meeting, context daemon 40_102 can send a notification to requesting client 40_126. Similarly, context daemon 40_102 can predict a future event (e.g., user sleep period, user arriving at home, user arriving at the office, user waking up, etc.) based on historical context information. For example, requesting client 40_126 can register a predicate (e.g., entry 40_306) that specifies that context daemon 40_102 should notify requesting client 40_126 thirty minutes before a predicted user sleep period. When the current time corresponds to thirty minutes before the predicted sleep period, context daemon 40_102 can send a notification to requesting client 40_126. Likewise, requesting client 40_126 can register a predicate (e.g., entry 40_310) that specifies that context daemon 40_102 should notify requesting client 40_126 five minutes after the user is predicted to wake up based on the predicted sleep period. For example, when the current time corresponds to five minutes after the user wakes up, context daemon 40_102 can send a notification to requesting client 40_126.

Event Streams

Referring to FIG. 40_1, in some implementations, context daemon 40_102 can include historical knowledge repository 40_118. For example, while current context 40_112 includes context information that reflects the current state of the computing device, as described above, historical knowledge 40_118 includes historical context information. Historical knowledge 40_118 can be an in-memory repository of historical context information. For example, historical knowledge 40_118 can include event streams that represent changes in context (e.g., state) over time. For example, each event or context item tracked in current context 40_112 has a corresponding value. When a context item in current context 40_112 changes value, the old value can be recorded in historical knowledge 40_118. By analyzing the state changes, a start time, an end time, and a duration can be calculated for each context item value.

FIG. 40_4 is a graph 40_400 that illustrates example value changes associated with context items over time. For example, graph 40_400 includes current context 40_402 that indicates the current values for locked, headphones, charging, Bluetooth, focus app, sleeping, and location context items. Graph 40_400 includes past (historical) values 40_404 for the same context items over time. By analyzing changes in context item values, context daemon 40_102 can determine start times, end times, and durations for each value associated with the context items, as illustrated by FIG. 40_5 below.

FIG. 40_5 is a graph 40_500 that illustrates example event streams associated with context items. In some implementations, each state change represented in graph 40_400 of FIG. 40_4 can be converted into a data object (e.g., object 40_502) that includes data describing the duration that a particular state existed within the system and metadata associated with the state. In some implementations, historical monitor 40_110 can be configured to convert current and/or historical context information into historical event stream objects. For example, when a value change is detected for a context item corresponding to a particular monitor bundle 40_106, historical monitor 40_110 can generate historical event stream objects based on the prior value of the context item. For example, some context monitors 40_106 can be configured to periodically report the state of a software and/or hardware component of the computing device. Context monitor 40_106 can be configured to periodically report Bluetooth state information, for example. The reported Bluetooth state information may include a sequence of identical state values followed by a state change. For example, context monitor 40_106 can report that the state of Bluetooth is "off, off, off, off, on." Historical monitor 40_110 can combine the series of "off" Bluetooth context item values, determine the start time and the end time of the "off" value, and calculate how long the Bluetooth component was in the "off" state.

In some implementations, historical monitor 40_110 can collect additional information (e.g., metadata) for event stream objects. For example, continuing the Bluetooth example above, historical monitor 40_110 can determine that the Bluetooth context item had an "on" value and request additional information from Bluetooth API 40_138. For example, historical monitor 40_110 can receive from Bluetooth API 40_138 information identifying the type of Bluetooth device connected to the computing device, the Bluetooth protocol used, the amount of data transmitted over the Bluetooth connection, and/or any other information relevant to the Bluetooth connection.

In another example, while context monitor 40_108 can be configured to collect current context information (e.g., call information) from a telephony API (e.g., telephone number called, time when call was initiated, time when call was terminated, etc.), historical monitor 40_110 can collect event stream metadata for a call from a contacts API (e.g., name of person called, etc.) or a call history API (e.g., name of person called, duration of call, etc.) and add this additional information to the event stream object for a telephony context item. Thus, historical monitor 40_110 can be configured to generate or collect additional data about a historical event to make the historical event (e.g., event stream, event stream object) more valuable for historical reference and for predicting future events. Once historical monitor 40_110 collects or generates the event stream metadata, historical monitor 40_110 can store the event stream metadata in historical knowledge repository 40_118. In some implementations, context daemon 40_102 and or historical monitor 40_110 can store event stream objects (e.g., including start time, stop time, duration, and/or metadata) in history database 40_120.

FIG. 40_6 illustrates an example historical event stream database 40_600. For example, historical event stream database can correspond to history database 40_120. The example historical event stream database 40_600 represents a conceptual depiction of the historical event stream data stored in history database 40_600 and may not reflect the actual implementation of history database 40_600. A skilled person will recognize that the historical event stream data in database 40_600 can be organized and stored in many different ways.

In some implementations, history database 40_600 can include event stream tables 40_602-40_614. For example, each event stream table 40_602-614 can correspond to a single event stream (e.g., context item). Each event stream table (e.g., table 40_602) can include records (e.g., 40_616, 40_618, etc.) corresponding to an event stream object in the event stream. For example, the "locked" event stream table 40_602 can include event stream object records 40_616, 40_618 that describe the locked (or unlocked) state of the "locked" event stream. The event stream object records can include a "start" field that has a timestamp (TS) value that indicates when the event began. The event stream object records can include a "duration" field that indicates the duration (D) of the event. The event stream object records can include state information (e.g., "locked:false" indicating that the device was not locked) that describes the state change corresponding to the event.

In some implementations, the event stream object records can include metadata that describes other data associated with the event. For example, when generating the historical event stream data, historical monitor 40_110 can collect and/or generate metadata that describes additional attributes of or circumstances surrounding the state of the system at the time of the event. For example, for the "charging" event stream 40_606, historical monitor 40_110 can collect information related to the state of battery charge (e.g., percent charge, charge level, etc.) at the beginning and/or ending of the charging event. For the Bluetooth event stream 40_608, historical monitor 40_110 can collect information related to the type of Bluetooth device connected to the computing device and/or the source of the media transmitted to the Bluetooth device. For the location event stream 40_612, historical monitor 40_110 can convert raw location data (e.g., grid coordinates, GNSS data, cell tower identification data, Wi-Fi network identifiers, etc.) into location terms that a human user can understand (e.g., home, work, school, grocery store, restaurant name, etc.).

In some implementations, historical monitor 40_110 can generate or obtain more accurate location information than context monitor 40_108. For example, context monitor 40_108 can provide current (e.g., instantaneous) location information without much, if any, processing. This initial location data can be inaccurate due to a variety of issues with location technologies (e.g., signal multipath issues, difficulty connecting to enough satellites, etc.). Given additional time and additional data, the location can be determined with greater accuracy. Since, historical monitor 40_110 processes historical data (rather than current or instantaneous data), historical monitor 40_110 can take the time to obtain more accurate location information from location API 40_132, for example. This additional metadata describing an event can be stored in the event stream records of history database 40_600.

In some implementations, historical monitor 40_110 can obtain historical information about a context item upon initialization monitor bundle 40_106. For example, if monitor bundle 40_106 is configured to monitor location context, then context daemon 40_102 can load, invoke, and/or initialize monitor bundle 40_106 as needed, as described above. When monitor bundle 40_106 is initialized, context monitor 40_108 will collect context information for the location context item. However, when monitor bundle 40_106 is initialized, there is no historical data for the location context item because the location context item was not previously monitored. Thus, in some implementations, historical monitor 40_110 can request location history data from location API 40_132 and generate historical context information (e.g., event streams, event stream objects, etc.) based on the location history data received from location API 40_132.

Event Stream Privacy

In some implementations, each event stream can have a corresponding privacy policy. In some implementations, the event streams can be configured with default privacy policies. In some implementations, an administrator user can provide input to the computing device to configure the privacy policies for each event stream (e.g., for each context item). For example, the privacy policy corresponding to respective event streams may change over time.

In some implementations, the event stream for a context item can have a privacy policy that prevents maintaining historical information for the context item. For example, an event stream corresponding to the location context item can have a policy that disallows maintaining a historical record of the location of the computing device. When this "no history" policy is configured for an event stream, historical monitor 40_110 will not generate historical context information (e.g., event stream objects) for the event stream.

In some implementations, the event stream for a context item can have a privacy policy that specifies an amount of time (e.g., time-to-live) that historical context information should be stored before being deleted. For example, an event stream corresponding to the "focus app" context item can have a time-to-live policy specifying that event stream data for the "focus app" context item that is older than a specified amount of time (e.g., 3 days, 1 month, etc.) should be deleted. Context daemon 40_102 can periodically perform maintenance on the event stream to delete event stream objects that are older than the amount of time specified in the time-to-live policy.

In some implementations, the event stream for a context item can have a timestamp de-resolution policy. For example, when the timestamp de-resolution policy is in effect, historical monitor 40_110 make the precise timestamps associated with events (e.g., state changes) in the event stream less precise. For example, a location change event can have a timestamp that is accurate down to the millisecond. When the de-resolution policy is applied to the event stream, historical monitor 40_110 can use a less accurate timestamp that is accurate down to the second or minute. For example, by using a less accurate timestamp for a location event stream, the system can protect a user's privacy by preventing context clients from determining the precise timing of a user's movements.

In some implementations, the event stream for a context item can have a storage location policy. For example, the computing device can be configured with different storage locations corresponding to the security state of the computing device. For example, the computing device can have an "A" class database that can only be accessed when the computing device is unlocked (e.g., the user has entered a passcode to unlock the device). The computing device can have a "B" class database that can be accessed after the first unlock (e.g., without requiring a subsequent unlock) after a reboot or startup of the computing device. The computing device can have a "C" class database that can be accessed anytime (e.g., regardless of passcode entry). The storage location privacy policy for the event stream can identify in which class of database to store the corresponding event stream data.

Efficient Context Monitoring

In some implementations, the computing device can be configured to terminate software running on the computing device when the software is not being used. For example, the operating system of the computing device can be configured to identify processes that are idle. The operating system can shutdown (e.g., terminate, kill) idle processes to free up memory or conserve battery resources for use by other components (e.g., software, hardware) of the system. However, if the operating system terminates an idle context daemon 40_102, context daemon 40_102 will no longer be able to monitor the current context of the system and will not be able to notify requesting clients 40_126 of context changes. Similarly, if the operating system terminates an idle requesting client 40_126, requesting client 40_126 will not be running to receive the callback notification from context daemon 40_102. The following paragraphs describe various mechanisms by which context daemon 40_102 and/or requesting client 40_126 can be restarted to handle context monitoring and/or callback operations.

FIG. 40_7 is a block diagram of an example system 40_700 for providing a context callback notification to a requesting client 40_126. For example, system 40_700 can correspond to system 40_100 of FIG. 40_1 above. In some implementations, system 40_700 can include launch daemon 40_702. For example, launch daemon 40_702 can be configured to launch (e.g., invoke, start, execute, initialize, etc.) applications, utilities, tools, and/or other processes on the computing device. Launch daemon 40_702 can be configured to monitor processes and terminate idle processes on the computing device.

In some implementations, launch daemon 40_702 can launch requesting client 40_126. For example, a process (e.g., operating system, user application, etc.) running on the computing device can invoke requesting client 40_126. Launch daemon 40_702 can receive a message corresponding to the invocation and can launch requesting client 40_126. Upon launching requesting client 40_126, launch daemon 40_702 can provide requesting client 40_126 a client identifier 40_704 that can be used to identify requesting client 40_126 within the computing device.

In some implementations, client identifier 40_704 can be token (e.g., encrypted data) generated by launch daemon 40_702 and assigned to requesting client 40_126 by launch daemon 40_702. Launch daemon 40_702 can store a mapping between the token and the software package corresponding to (e.g., defining) requesting client 40_126 in client identifier database 40_706. The token can be generated such that the token itself does not identify the corresponding requesting client 40_126. However, when launch daemon 40_702 later receives the token, launch daemon 40_702 can use the token to look up the corresponding requesting client 40_126 in client identifier database 40_706. Thus, the token can be used by launch daemon 40_702 as an index to identify the corresponding requesting client while the token is opaque to other software within the computing device.

In some implementations, client identifier 40_704 can be an instance identifier corresponding to a specific instance of requesting client 40_126. In some implementations, client identifier 40_704 can identify a software package (e.g., application, utility, tool, etc.) across all instances of requesting client 40_126. For example, when launch daemon 40_702 launches a first instance of requesting client 40_126, client identifier 40_704 can identify the first instance of requesting client 40_126. When requesting client 40_126 is terminated (e.g., because requesting client 40_126 has become idle), the same client identifier 40_704 can be used to identify subsequent instances of requesting client 40_126 that are launched by launch daemon 40_702. Launch daemon 40_702 can launch context daemon 40_102 using similar mechanisms as requesting client 40_126.

In some implementations, requesting client 40_126 can send callback request 40_708 to context daemon 40_102. For example, callback request 40_708 can include client identifier 40_704 and a callback predicate, as described above. Upon receipt of callback request 40_708, context daemon 40_102 can store client identifier 40_704 and the predicate in predicate database 40_116, as described above.

In some implementations, when requesting client 40_126 sends the callback request 40_708 to context daemon 40_102, requesting client establishes a communication session 40_709 between requesting client 40_126 and context daemon 40_102. In some implementations, system 40_700 can be configured such that the communication session between requesting client 40_126 and context daemon 40_102 can only be initiated by requesting client 40_126. For example, context daemon 40_102 may not be able to directly establish a communication session with requesting client 40_126. Thus, in some implementations, context daemon 40_102 can only communicate with (e.g., send a callback notification to) requesting client 40_126 while communication session 40_709 established by requesting client 40_126 is still open.

In some implementations, context daemon 40_102 can collect contextual information about events occurring on the computing device. For example, context daemon 40_102 can collect context information from monitor bundles 40_106 and reporting client 40_124, as described above. In some implementations, context daemon 40_102 can store the current context in context database 40_712. For example, context daemon 40_102 can store the current context in context database 40_712 to facilitate restoration of context information to context daemon 40_102. When context daemon 40_102 is terminated and restarted, context daemon 40_102 can restore the current context (e.g., now old context) from context database 40_712 while context daemon 40_102 is waiting for a context update from monitor bundles 40_106.

In some implementations, context daemon 40_102 can determine whether the current context corresponds to a predicate received from requesting client 40_126. For example, when new context data is obtained that updates the current context (e.g., changes the state of a context item), context daemon 40_102 can compare the callback predicates stored by context daemon 40_102 in callback registry 40_114 or predicate database 40_116 with the context items in current context 40_112 to determine whether the current context matches (corresponds to) the conditions specified by the predicates. When the current context matches a predicate registered by requesting client 40_126, context daemon 40_102 can send notification 40_701 to requesting client 40_126. For example, notification 40_710 can identify the callback request previously sent by requesting client 40_126 to context daemon 40_102, as described above. Thus, context daemon 40_102 can notify (e.g., call back) requesting client 40_126 when context daemon 40_102 detects a current context in which requesting client 40_126 is interested.

FIG. 40_8A and FIG. 40_8B are block diagrams of example system 40_700 illustrating restarting a requesting client that has been terminated. For example, in FIG. 8A, system 40_700 has determined that requesting client 40_126 is idle and has terminated requesting client 40_126 (e.g., dashed outline of requesting client 40_126 indicating termination). In FIG. 8A, context daemon 40_102 is still running. However, because requesting client 40_126 has been terminated, communication session 40_709 has also been terminated.

FIG. 40_8B is a block diagram illustrating an example mechanism for restarting requesting client 40_126 using system 40_700. Continuing the example of FIG. 8A, context daemon 40_102 can receive context information that matches a callback predicate registered by requesting client 40_126. In response to determining that the context information matches the callback predicate, context daemon 40_102 can attempt to notify requesting client 40_126. While attempting to notify requesting client 40_126, context daemon 40_102 can determine that communication session 40_709 between context daemon 40_102 and requesting client 40_126 has been terminated. In response to determining that communication session 40_709 is terminated, context daemon 40_102 can request that launch daemon 40_702 restart requesting client 40_126. For example, context daemon 40_102 can send client identifier 40_704 received from requesting client 40_126 to launch daemon 40_702 in a request to restart requesting client 40_126.

In some implementations, upon receipt of client identifier 40_704, launch daemon 40_702 can launch requesting client 40_126. For example, launch daemon 40_702 can determine that context daemon 40_102 is authorized to request that requesting client 40_126 be restarted based on the client identifier provided by context daemon 40_102. For example, context daemon 40_102 would not have client identifier 40_704 (e.g., token) if requesting client 40_126 did not previously request a callback from context daemon 40_102 and provide client identifier 40_704 to context daemon 40_102.

In some implementations, upon restarting, requesting client 40_126 can send callback request 40_708 to context daemon 40_102. For example, requesting client 40_126 can establish a new communication session 40_802 between requesting client 40_126 and context daemon 40_102 by sending callback request 40_708 to context daemon 40_102. Once communication session 40_802 is established, context daemon 40_102 can send notification 40_710 to requesting client 40_126 to notify requesting client 40_126 that the callback predicate provided by requesting client 40_126 has been satisfied by the current context.

FIG. 40_9A and FIG. 40_9B are block diagrams of example system 40_700 illustrating restarting a context daemon that has been terminated. For example, in FIG. 9A, system 40_700 has determined that context daemon 40_102 is idle and has terminated context daemon 40_102 (e.g., dashed outline of context daemon 40_102 indicating termination). In FIG. 9A, requesting client 40_126 is still running. However, because context daemon 40_102 has been terminated, communication session 40_709 has also been terminated.

FIG. 40_9B is a block diagram illustrating an example mechanism for restarting context daemon 40_102 using system 40_700. Continuing the example of FIG. 9A, system 40_700 can restart context daemon 40_102 in response to receiving a message from requesting client 40_126 that is directed to context daemon 40_102.

In some implementations, requesting client 40_126 can detect that communication session 40_709 between requesting client 40_126 and context daemon 40_102 has terminated. In response to detecting that communication session 40_709 has terminated, requesting client 40_126 can reestablish the communication session by sending a message to the terminated context daemon 40_102. In some implementations, requesting client can send the message to context daemon 40_102 using messaging system 40_902. Messaging system 40_902 of system 40_700 can determine that context daemon 40_102 is not running and send a message to launch daemon 40_702 to cause launch daemon 40_702 to restart context daemon 40_102. In response to receiving the message, launch daemon 40_702 can restart context daemon 40_102. Once context daemon 40_102 is running, messaging system 40_902 can send the message from requesting client 40_126 to context daemon 40_102, thereby reestablishing the communication channel between requesting client 40_126 and context daemon 40_102.

In some implementations, upon restarting, context daemon 40_102 can restore its callback registry 40_114 and current context 40_112. For example, callback registry 40_114 can be restored from predicate database 40_116. Current context 40_112 can be restored from context database 40_712. Upon restarting, context daemon 40_102 can load the monitor bundles 40_106 necessary for collecting context information to service the callback requests restored from predicate database 40_116. Context daemon 40_102 can update current context 40_112 with the context information reported by loaded monitor bundles 40_104 and notify requesting client 40_126 when the context items in current context 40_112 match a predicate registered by requesting client 40_126, as described above.

FIG. 40_10A and FIG. 40_10B are block diagrams of example system 40_700 illustrating restarting a context daemon and a requesting client that have been terminated. For example, in FIG. 40_10A, system 40_700 has determined that both context daemon 40_102 and requesting client 40_126 are idle and has terminated context daemon 40_102 and requesting client 40_126 (e.g., dashed outline indicating termination). In FIG. 40_10A, because both context daemon 40_102 and requesting client 40_126 are terminated, communication session 40_709 is terminated.

FIG. 40_10B is a block diagram illustrating an example mechanism for restarting context daemon 40_102 and requesting client 40_126 using system 40_700. Continuing the example of FIG. 40_10A, system 40_700 can restart context daemon 40_102 in response to receiving a message from intervening client 40_1002 that is directed to terminated context daemon 40_102. For example, similar to requesting client 40_126 in FIG. 40_9B, intervening client 40_1002 can send a message to the now terminated context daemon 40_102. Messaging system 40_902 can receive the message and determine that context daemon 40_102 is not running. In response to determining that context daemon 40_102 is not running, messaging system 40_902 can send a message to launch daemon 40_702 to cause launch daemon 40_702 to restart context daemon 40_102.

In some implementations, upon restarting, context daemon 40_102 can restore its callback registry 40_114 from predicate database 40_116. Upon restarting, context daemon 40_102 can restore its current context 40_112 from context database 40_712 and can start collecting updated context information, as described above. When context daemon 40_102 determines that a registered predicate matches the current context information, context daemon 40_102 can attempt to notify requesting client 40_126. When context daemon 40_102 determines that a communication session 40_709 does not exist between requesting client 40_126 and context daemon 40_102, context daemon 40_102 can request that launch daemon 40_702 restart requesting client 40_126 so that the communication session can be reestablished and context daemon 40_102 can callback requesting client 40_126, as described above with reference to FIG. 40_8B.

FIG. 40_11 is a block diagram of an example system 40_1100 configured to restart requesting client 40_126 and/or context daemon 40_102 based on device state information received by launch daemon 40_702. For example, system 40_1100 can correspond to system 40_700 and can perform similar functions as system 40_700, as described above.

In some implementations, launch daemon 40_702 can be configured to receive device state 40_1104. For example, device state 40_1104 can be low-level concrete state data generated by various hardware and/or software components of the computing device. For example, launch daemon 40_702 can receive device state 40_1104 that includes location data generated by a location services component (e.g., GPS receiver, Wi-Fi or cellular data component, etc.) of the computing device. In some implementations, device state 40_1104 can indicate a change in location but may not provide high-level location information (e.g., human-readable labels).

For example, requesting client 40_126 can send callback request 40_708 to context daemon 40_102 that has a location-based predicate. The predicate can specify that the requesting client 40_126 should be notified with the current location (e.g., current context) of the computing device is the user's home (e.g., location==home). To determine that the device location is the user's home, context daemon 40_102 and/or monitor bundle 40_106 can collect information from location API 40_132 (FIG. 40_1) and a contacts application running on the user's device that defines where "home" is located (e.g., that defines the geographic location associated with the "home" label). By comparing the location information from location API 40_132 (FIG. 40_1) to the definition of "home" in the contacts application, context daemon 40_102 can determine when the context item "location" is equal to "home". As demonstrated with this example, determining that the location predicate defined by requesting client 40_126 (e.g., "home") is satisfied depends on combining both current geographic location data (e.g., grid coordinates) with user data that correlates a label (e.g., "home") with a geographic location. Thus, the abstract location context "home" can be determined by analyzing concrete state data generated by the computing device's location services and contacts application.

In some implementations, when context daemon 40_102 receives callback request 40_708 from requesting client 40_126, context daemon 40_102 can send device state request 40_1102 to launch daemon 40_702 to register interest in state changes of specific components of the computing device. When device state 40_1104 is received by launch daemon 40_702, launch daemon 40_702 can determine that there has been state change with respect to the specified components and notify context daemon 40_102 and/or requesting client 40_126.

In some implementations, device state request 40_1102 can specify that launch daemon 40_702 should notify context daemon 40_102 when the specified state changes occur. For example, when requesting client 40_126 sends a callback request to context daemon 40_102 that specifies a location-based callback predicate, context daemon 40_102 can send device state request 40_1102 to launch daemon 40_702 requesting that launch daemon 40_702 notify context daemon 40_102 when a location component state change is detected by launch daemon 40_702.

In some implementations, device state request 40_1102 can specify that launch daemon 40_702 should notify requesting client 40_126 when the specified state changes occur. For example, when requesting client 40_126 sends a callback request to context daemon 40_102 that specifies a location-based callback predicate, context daemon 40_102 can send device state request 40_1102 to launch daemon 40_702 requesting that launch daemon 40_702 notify requesting client 40_126 when a location component state change is detected by launch daemon 40_702. In some implementations, device state request 40_1102 can include client identifier 40_704 corresponding to requesting client 40_126 so that launch daemon 40_702 can determine which requesting client 40_126 to notify.

FIG. 40_12A and FIG. 40_12B are block diagrams of an example system 40_1100 illustrating restarting a context daemon using a launch daemon. For example, in FIG. 40_12A, system 40_1100 has determined that both context daemon 40_102 and requesting client 40_126 are idle and has terminated context daemon 40_102 and requesting client 40_126 (e.g., dashed outline indicating termination). In FIG. 40_12A, because both context daemon 40_102 and requesting client 40_126 are terminated, communication session 40_709 is also terminated.

FIG. 40_12B is a block diagram illustrating an example mechanism for restarting context daemon 40_102 using launch daemon 40_702 of system 40_1100. As described above with reference to FIG. 40_11, context daemon 40_102 can receive a callback request from requesting client 40_126 that specifies a context predicate for sending notification 40_710 from context daemon 40_102 to requesting client 40_126. In response to receiving the predicate, context daemon 40_102 can send device state request 40_1102 (FIG. 40_11) to launch daemon 40_702 to register interest in device state changes associated with the predicate. For example, if requesting client 40_126 specifies a location-based callback predicate, context daemon 40_102 can ask launch daemon 40_702 to notify context daemon 40_102 when the location of the computing device changes. When launch daemon 40_702 receives device state 40_1104 that indicates a change in location, launch daemon 40_702 can attempt to notify context daemon 40_102. Continuing the example of FIG. 40_12A, since context daemon 40_102 is not running on the computing device, launch daemon 40_702 can determine that context daemon 40_102 is not running and launch (e.g., restart, initiate, invoke, execute, etc.) context daemon 40_102. Once context daemon 40_102 is restarted, context daemon 40_102 can request that launch daemon 40_702 restart requesting client 40_126, as described above with reference to FIG. 40_8B.

FIG. 40_13A and FIG. 40_13B are block diagrams of example system 40_1100 illustrating restarting a requesting client 40_126 using the launch daemon. For example, in FIG. 40_13A, system 40_1100 has determined that both context daemon 40_102 and requesting client 40_126 are idle and has terminated context daemon 40_102 and requesting client 40_126 (e.g., dashed outline indicating termination). In FIG. 40_13A, because both context daemon 40_102 and requesting client 40_126 are terminated, communication session 40_709 is also terminated.

FIG. 40_13B is a block diagram illustrating an example mechanism for restarting requesting client 40_126 using launch daemon 40_702 of system 40_1100. As described above with reference to FIG. 40_11, context daemon 40_102 can receive a callback request 40_706 from requesting client 40_126 that specifies a context predicate for sending callback notification 40_710 from context daemon 40_102 to requesting client 40_126. In response to receiving the predicate, context daemon 40_102 can send device state request 40_1102 to launch daemon 40_702 to register interest in device state changes associated with the predicate on behalf of requesting client 40_126. For example, context daemon 40_102 can provide client identifier 40_704 to launch daemon 40_702 when registering interest in device state changes associated with the predicate. For example, if requesting client 40_126 specifies a location-based callback predicate, context daemon 40_102 can ask launch daemon 40_702 to notify requesting client 40_126 when the location of the computing device changes. When launch daemon 40_702 receives device state 40_1104 that indicates a change in location, launch daemon 40_702 can attempt to notify requesting client 40_126 (e.g., identified by client identifier 40_704). Continuing from FIG. 40_13A, since requesting client 40_126 is not running on the computing device, launch daemon 40_702 can determine that requesting client 40_126 is not running and launch (e.g., restart, initiate, invoke, execute, etc.) requesting client 40_126. Once requesting client 40_126 is restarted, requesting client 40_126 can cause launch daemon 40_702 to restart context daemon 40_102 by sending a message to context daemon 40_102, as described above with reference to FIG. 40_9B.

Predicting Future Events

In some implementations, context daemon 40_102 can predict future events based on event stream information. For example, context daemon 40_102 can analyze historical context information (e.g., event streams, event stream objects, etc.) to determine historical user behavior patterns. Context daemon 40_102 can predict future user behavior based on these past behavior patterns. For example, predicable user behavior can include sleep patterns, working patterns, exercise patterns, eating patterns, and other repeating user behaviors. Context daemon 40_102 can determine when these user behaviors occur based on clues in the event streams that reflect how a user interacts with the computing device during these user activities.

For ease of explanation, the description that follows will describe an example sleep prediction implementation based on historical device locked state event stream data. However, the mechanisms used for sleep prediction can be used to predict other user behaviors as well by analyzing other event stream data. For example, context daemon 40_102 can use location data to infer user working patterns. Context daemon 40_102 can use accelerometer data to infer user exercise patterns. Context daemon 40_102 can use application data (e.g., checking in at a restaurant on a social media software application) to infer user eating patterns.

In some implementations, context daemon 40_102 can use device lock state event stream data to determine and/or predict user sleep patterns. For example, if the computing device (e.g., handheld device, smartphone, etc.) remains locked for a long period of time (e.g., 5 hours or more), then context daemon 40_102 can infer that the user is sleeping. In some implementations, other event stream information (e.g., accelerometer data, application usage data, etc.) can be used to confirm the sleep patterns and/or the sleep prediction. In some implementations, context daemon 40_102 can perform sleep prediction for the current day at some time after the user wakes up from the previous day's sleep and before the next predicted sleep period. For example, context daemon 40_102 can perform the calculations to predict the next sleep period upon detecting that the user has awakened from the current sleep period. For example, context daemon 40_102 can detect that the user is awake by determining that the current value for the "locked" context item is false (e.g., the user has unlocked the device) and that the current time is after the predicted sleep period ends.

Slot-Wise Prediction of Future Events

In some implementations, context daemon 40_102 can perform slot-wise averaging to predict future events. For example, to predict determine sleep user sleep patterns, context daemon 40_102 can analyze the locked state event stream described above. Context daemon 40_102 can analyze the locked state event stream by dividing the locked state event stream into consecutive 24-hour periods over the previous 40_28 days. Context daemon 40_102 can divide each 24-hour period into 96 15-minute slots. Context daemon 40_102 can determine the locked state for each 15-minute block in each 24-hour period. For example, if the computing device remained locked for the entire 15-minute slot, then the locked state for the slot can be true (e.g., 1). If the computing device was unlocked during the 15-minute slot, then the locked state for the slot can be false (e.g., 0). The locked state data for the 15-minute slots within each 24-hour period can be combined to generate 28 data vectors representing each of the previous 28 days. For example, each vector (e.g., having a length of 96) can include 96 locked state values corresponding to each of the 15-minute slots within a day. Context daemon 40_102 can then average each 15-minute slot over the 40_28-day period to determine the historical sleep pattern of the user.

FIG. 40_14 is a graph 40_1400 that illustrates an example of slot-wise averaging to predict future events. For example, graph 40_1400 illustrates using device locked state to determine sleep patterns and predict future sleep periods. For example, each horizontal line represents a locked state data vector for a 24-hour period. The 24-hour period can range from t-n to t+n, where 't' is some time corresponding to about the (e.g., presumed, typical, calculated, etc.) middle of the user's sleep cycle and 'n' can be 12. For example, if the typical person sleeps from 10 pm to 6 am, then the T can be 2 am. In graph 40_1400, 'C' represents the current day. Thus, C-1 is yesterday, C-2 is two days ago, C-7 is one week ago, and C-28 is four weeks ago. Each day has 96 corresponding 15-minute slots. For example, graph 40_1400 depicts the 15-minute slots corresponding to 3:30-3:45 am, 5:00-5:15 am, and 6:15-6:30 am. While only three 15-minute slots are shown on graph 40_1400 to reduce clutter on graph 40_1400, each vector has 96 15-minute slots and the operations described with reference to the three 15-minute slots on graph 40_1400 will be performed on each of the 96 slots in each 24-hour period.

With reference to vector C-1 on graph 40_1400, the value of one (e.g., 1, true) in the 3:30 slot and the 5:00 slot indicates that the computing device remained locked during the entire corresponding 15-minute slot. The value of zero (e.g., 0, false) during the 6:15 slot indicates that the computing device was unlocked sometime during the 15-minute period. For example, context daemon 40_102 can infer that the user must have been awake to unlock the computing device in the 6:15 slot. Context daemon 40_102 can infer that the user was asleep when the device remains locked for a threshold period of time (e.g., 5 hours), as described further below.

To determine the probability that the user will keep the computing device locked during each 15-minute slot (and therefore remained asleep) in the current day, context daemon 40_102 can average the values of each 15-minute slot over the previous 28 days to predict values for each 15-minute slot in the current 24-hour period. Context daemon 40_102 can use the average 15-minute slot values calculated for the current 24-hour period to identify a period of time in the current 24-hour period that exceeds a sleep threshold (e.g., 5 hours) where the device is likely to remain locked. For example, where the average value for a 15-minute slot is above some threshold value (e.g., 0.5, 50%, etc.), then context daemon 40_102 can determine that the computing device will remain locked within that 15-minute slot. Context daemon 40_102 can determine a contiguous (or mostly contiguous) series of 15-minute slots having values greater than the threshold value that, when combined, exceeds the sleep threshold period of time. Once the series of 15-minute slots is determined, context daemon 40_102 can identify the period of time covered by the series of 15-minute slots as the predicted sleep period.

In some implementations, context daemon 40_102 can perform weighted averaging across locked state data vectors. For example, each vector can be weighted such that older locked state data is less influential on the average than newer locked state data. In some implementations, context daemon 40_102 can perform short term averaging over a series of recent days (e.g., over each of the last 7 days) and/or long term averaging over a series of weeks (e.g., 7 days ago, 14 days ago, 21 days ago, 28 days ago). For example, short term averaging may be better for predicting daily patterns, while long term averaging may be better for predicting what the user does on a particular day of the week. For example, if today is Saturday, the user's activities on the previous Saturday may be a better predictor of the user's behavior today than the user's activities yesterday (e.g., on Friday), especially if the user works Monday-Friday.

Short-Term Averaging

In some implementations, the following short-term weighting averaging algorithm can be used by context daemon 40_102 to determine the probability (PS) that the device will remain locked within a 15-minute slot:

$$P_S = \frac{(\lambda_S V_1 + \lambda_S^2 V_2 \ldots + \lambda_S^7 V_7)}{(\lambda_S + \lambda_S^2 \ldots + \lambda_S^7)},$$

where V1 corresponds to C-1, V2 corresponds to C-2, etc., and V7 corresponds to C-7, and λ is an experimentally determined weight having a value between zero and one. For example, the short term weighting algorithm can be used to calculate a weighted average of each 15-minute over the previous seven days.

Long-Term Averaging

In some implementations, the following long-term weighted averaging algorithm can be used by context daemon 40_102 to determine the probability (PL) that the device will remain locked within a 15-minute slot:

$$P_L = \frac{(\lambda_L V_7 + \lambda_L^2 V_{14} + \lambda_L^3 V_{21} + \lambda_L^4 V_{28})}{(\lambda_L + \lambda_L^2 + \lambda_L^3 + \lambda_L^4)},$$

where V7 corresponds to C-7, V14 corresponds to C-14, V21 corresponds to C-21, and V28 corresponds to C-28, and 'λ' is an experimentally determined weight having a value between zero and one. For example, the long-term weighting algorithm can be used to calculate a weighted average of each 15-minute for the same day of the week over the last four weeks.

In some implementations, the short-term weighed averaging algorithm and the long-term weighted averaging algorithm can be combined to generate a combined (e.g., composite, overall, etc.) probability (P) that a 15-minute slot will remain locked within a 15-minute slot as follows:

$$P = \frac{P_S + rP_L}{1 + r},$$

where 'r' is an experimentally determined number (e.g., 0.5) that can be used to tune the influence that the long-term weighted average has on the probability calculation.

Proportional Slot Values

FIG. 40_15 minute depicts example graphs 40_1500 and 40_1550 illustrating calculating proportional slot values. For example, rather than assigning true (1) and false (0) values for each 15-minute slot within a 24-hour period C-n, as in the description above, context daemon 40_102 can determine during how much of each 15-minute slot the computing device was locked, or unlocked, and assign a proportional value to the slot representing the proportionate amount of time within the slot during which the device was locked.

Referring to graph 40_1500, the shaded region of each 15-minute timeslot can represent the time within the timeslot during which the device was locked. For example, the device was locked during the entirety of both 3:30-3:45 am and 5:00-5:15 am timeslots. Thus, the 3:30 and 5:00 timeslots can be assigned a value of one (1). However, the computing device was locked for only a portion of the 6:15-6:30 am timeslot. If the computing device was locked for the first 10 minutes of the 6:15 timeslot, then the 6:15 timeslot can be assigned a value of 10/15 or 0.67 representing the proportionate amount of the 15-minute slot during which the device was locked, as illustrated by graph 40_1550. If the computing device was locked and unlocked repeatedly (e.g., locked for 5 minutes, unlocked for 2 minutes, locked for 1 minute, unlocked for 5 minutes, etc.), the computing device can add up the locked time periods, add up the unlocked time periods, and calculate the proportion of the 15-minute slot during which the computing device was locked. In some implementations, a proportional value can be determined for each 15-minute timeslot within a 24-hour period (e.g., data vector). In some implementations, the proportional value for each 15-minute timeslot can be used when calculating the short-term and/or long-term probabilities described above.

Generating a Sleep Curve

FIG. 40_16A is a graph 40_1600 illustrating an example method for predicting a future context. For example, the method illustrated by graph 40_1600 can be used to predict a future sleep period for a user of the computing device. For example, each column (e.g., column 40_1602, column 40_1604) in graph 40_1600 can represent a 15-minute timeslot, as described above). The value of each 15-minute timeslot can be represented by the height of the column and can correspond to the combined weighted average probability (P) for the timeslot, as described above. For example, the probability (P) can range from zero (e.g., 0, 0%) to one (e.g., 1, 40_100%). The probability can represent, for example, the probability that the computing device will remain locked during the 15-minute slot, as described above. The probability can be calculated based on binary (e.g., 0, 1) 15-minute timeslot values. The probability can be calculated based on proportional 15-minute timeslot values.

In some implementations, context daemon 40_102 can convert the probability graph 40_1600 into a probability curve that represents the sleep cycle of a user of the computing device. For example, context daemon 40_102 can determine a sleep probability threshold value 40_1606 for determining which 15-minute slots correspond to the user's sleep period. In some implementations, the sleep probability threshold value 40_1606 can be dynamically determined. For example, given a minimum sleep period (e.g., 5 hours, 7 hours, etc.), context daemon 40_102 can determine a value (e.g., 0.65, 40_50%, etc.) for sleep probability threshold 40_1606 that results in a block of contiguous 15-minute slots that is at least as long as the minimum sleep period and that includes 15-minute slots having (e.g., probability, average) values that exceed sleep probability threshold 40_1606. Stated differently, context daemon 40_102 can adjust sleep probability threshold 40_1606 up and down until a series of 15-minute slots that when combined meet or exceed the minimum sleep period and have values above the sleep probability threshold.

In some implementations, once sleep probability threshold 40_1606 is determined, context daemon 40_102 can determine the user's sleep period 40_1608 based on the contiguous 15-minute slots. For example, sleep period 40_1608 can correspond to the time period covered by the contiguous 15-minute slots. Referring to FIG. 40_16A, the sleep period can correspond to the time period beginning at 11 pm and ending at 7 am.

FIG. 40_16B is a graph 40_1650 illustrating an example method for converting slot-wise probabilities into a probability curve. For example, to enable consistent prediction of the user's sleep cycle, it may be useful to generate a probability curve (e.g., similar to a bell curve) that monotonically increases (e.g., increasing probability that the device will remain locked) as the user falls asleep and monotonically decreases (e.g., decreasing probability that the device will remain locked) as the user wakes up.

In some implementations, to generate probability curve 40_1652, context daemon 40_102 can use the sleep probability threshold value determined above to convert the probabilities (e.g., averages) calculated for each 15-minute timeslot into binary (e.g., 1 or 0) values. For example, 15-minute timeslots within the sleep period (e.g., above sleep threshold value 40_1606) can be assigned a value of one (1) and 15-minute timeslots outside of the sleep period can be assigned a value of zero (0). Once binary values are assigned to each 15-minute timeslot, context daemon 40_102 can fit a curve (e.g., probability curve 40_1652) to the binary values. Once generated, context daemon 40_102 can use probability curve 40_1652 to estimate the probability that the user will be asleep at a particular time of day and/or for a particular period of time during a day. For example, context daemon 40_102 can use probability curve 40_1652 to predict when the user is likely to be asleep in the future. Referring to FIG. 40_16B, since the calculated sleep period represented by graph 40_1650 falls between 11 pm and 7 am, context daemon 40_102 can predict that the user will be asleep between 11 pm and 7 am in future. For example, if the sleep prediction is done on a daily basis (e.g., after the user wakes in the morning), context daemon 40_102 can predict that the user will sleep between 11 pm and 7 am later in the current day.

Handling Irregularities—Outliers and Missing Data

In some implementations, context daemon 40_102 can be configured to handle outlier data within the historical event stream data. In some implementations, context daemon 40_102 can be configured to handle outlier 15-minute slots within a block of time that would otherwise correspond to a sleep period. For example, a block of time (e.g., a block of contiguous 15-minute slots that have values exceeding the sleep threshold value and which combined exceed the minimum sleep period) that might be a candidate for a sleep period may include a 15-minute slot that does not exceed the sleep threshold value. For example, if the minimum sleep period is five hours, there are at least twenty 15-minute slots within the sleep period. When there are twenty 15-minute slots, there may be ten slots that exceed the sleep threshold value, followed by one (e.g., outlier) slot that does not exceed the sleep threshold value, followed by nine slots that exceed the sleep threshold value. An example of this scenario can be seen with reference to FIG. 40_16A where outlier slot 40_1608 does not exceed sleep probability threshold 40_1606 and is surrounded by slots (e.g., 40_1604) that do exceed sleep probability threshold 40_1606. When there is a small number (e.g., one, two) outlier 15-minute slot within a block of 15-minute slots that exceed the sleep threshold value, then context daemon 40_102 can treat the outlier 15-minute slot as if it exceeded the sleep threshold value so that the sleep period (e.g., sleep curve) can be generated, as described above. For example, when determining the block of contiguous 15-minute slots that correspond to the sleep period, context daemon 40_102 can ignore outlier 15-minute slots. When converting the 15-minute slots to binary values to generate the probability curve (as in FIG. 40_16B), context daemon 40_102 can assign the outlier 15-minute slot a value of one so that the probability curve can be generated.

In some implementations, context daemon 40_102 can be configured to handle outlier days (e.g., 24-hour periods, historical data vectors, etc.) within a historical event stream when predicting a sleep period. For example, before calculating short-term averages, context daemon 40_102 can compare the locked event data (e.g., historical context data) for the previous seven days. For example, context daemon 40_102 can perform a similarity analysis on the historical data vectors for each of the previous seven 24-hour periods. If the data for one of the seven days (e.g., an outlier day) is completely different than the other six days, then context daemon 40_102 can remove the outlier day from the short-term average calculation. For example, small day-to-day variations in historical device lock state data for a 15-minute slot may be normal. However, a shift in large block of lock data (e.g., corresponding to a user sleep period) is abnormal. Context daemon 40_102 can detect the outlier day by comparing day-to-day patterns in the historical data and detecting that the use patterns (e.g., user behavior) observed for one day do not correspond to the use patterns observed for other days in the week. For example, context daemon 40_102 can determine that a block of 15-minute slots in the outlier day (24-hour period) is unlocked when the same block of 15-minute slots is typically locked in other days. Once the outlier day is detected, context daemon 40_102 can omit the outlier day from the short-term averaging calculations described above.

Similarly, before calculating long-term averages, context daemon 40_102 can compare the locked event data (e.g., historical context data) for the same day of the week for the previous four weeks, for example. If the data for one of the days is significantly different than (e.g., an outlier day) the other four days, then context daemon 40_102 can remove the outlier day from the long-term average calculation. For example, week-to-week variations in historical device lock state data for a 15-minute slot may be normal. However, a shift in large block of lock data (e.g., corresponding to a user sleep period) is abnormal. Context daemon 40_102 can detect the outlier day by comparing week-to-week patterns in the historical data and detecting that the use patterns (e.g., user behavior) observed for one day do not correspond to the use patterns observed for the same day in previous weeks. Once the outlier day is detected, context daemon 40_102 can omit the outlier day from the long-term averaging calculations described above.

In some implementations, context daemon 40_102 can detect an outlier day based on a shift in user behavior patterns. For example, if a user normally sleeps between 11 pm and 7 am, the historical locked event data will indicate that the device remained (mostly) locked between 11 pm and 7 am. However, on an rare day, the user may stay up all night studying or working, thus the sleep period for that day may shift to another period of time (e.g., 6 am to 12 pm). In some implementations, context daemon 40_102 can detect this shift in sleep patterns based on the historical locked state data and remove this day from the averaging calculations.

In some implementations, context daemon 40_102 can detect an outlier day based on known or commonly accepted limits in human behavior. For example, the user may go on a weekend trip and accidently leave the computing device (e.g., smartphone) at home for the entire weekend. In this case, the device will remain locked for the whole weekend (e.g., two days) thereby generating a block of locked data that may be erroneously interpreted by context daemon 40_102 as a sleep period. Context daemon 40_102 can detect this situation by comparing the period of time (e.g., the sleep period) corresponding to the block of locked data to a maximum sleep period (e.g., 12 hours, 24 hours, etc.). For example, the maximum sleep period can be based on common knowledge (e.g., humans do not usually sleep for more than 24 hours) or determined based on observed data (e.g., the maximum observed sleep period for a user is 10 hours). If the block of time exceeds the maximum sleep period, then context daemon 40_102 can ignore the day or days corresponding to this block of time when performing the long-term and/or short-term calculations described above.

In some implementations, context daemon 40_102 can be configured to handle missing data in the historical event stream. For example, a user may turn off the computing device for a period of time or the device may lose battery power after being unplugged from an external power source for a long period of time. While the device is turned off, the device cannot collect context information and cannot generate a historical even stream. When the computing device is turned on again, context daemon 40_102 may attempt to predict future events (e.g., a future sleep period) based on the missing data corresponding to the period of time when the device was turned off. In this case, context daemon 40_102 can determine that no event (e.g., context item) data values exist for this period of time and ignore (e.g., omit) the day or days (e.g., historical data vector) corresponding to this period of time when performing the short-term and/or long-term averaging calculations described above.

Scheduling Activities Based on Predicted Events

FIG. 40_17 illustrates an example event stream 40_1700 that includes a predicted future event. For example, using the mechanisms described above, context daemon 40_102 can predict future sleep period 40_1702. In some implementations, the predicted future event can be used to schedule activities (e.g., context callbacks) within the computing device. Referring to FIG. 1, requesting client 40_126 can request a callback notification in advance of a predicted event. For example, requesting client 40_126 can send context daemon 40_102 a callback request that includes a predicate that specifies that context daemon 40_102 should notify requesting client 40_126 thirty minutes before the user falls asleep. When the callback request is received, context daemon 40_102 can schedule the notification for thirty minutes before the predicted sleep period begins. Similarly, requesting client can send context daemon 40_102 a callback request that includes a predicate that specifies that context daemon 40_102 should notify requesting client 40_126 one hour after the user falls asleep. When the callback request is received, context daemon 40_102 can schedule the notification for one hour after the predicted sleep period begins.

In some implementations, context daemon 40_102 can confirm the prediction of a future event based on the current context at the predicted time of the event. For example, if requesting client 40_126 requests that context daemon 40_102 notify requesting client 40_126 thirty minutes after the predicted sleep period begins, context daemon 40_102 can confirm that the user is actually asleep at that time by analyzing current context 40_112 (e.g., context item values) to determine whether the device is locked. If the device is unlocked (e.g., the user is not asleep) thirty minutes after the predicted sleep period began, context daemon 40_102 will not notify requesting client 40_126. In some implementations, other context information can be used to confirm a predicted sleep period. For example, accelerometer state can be used to confirm the sleep period. For example, most smartphone users will place the smartphone on a table or on the floor when going to sleep. Tables and floors are usually stationary objects. Thus, the smartphone will not generate much, if any, accelerometer data. If the smartphone is generating accelerometer data, the smartphone is most likely in the user's pocket while the user is moving. Thus, accelerometer data can indicate that the user is moving and not asleep during the predicted sleep period.

In some implementations, context daemon 40_102 can improve the prediction of future events by identifying precursor events. For example, context daemon 40_102 can analyze historical event stream data to identify relationships between user activities and predicted events. For example, a user may have a habit of checking an email application, a social networking application, a news application, or another application before going to sleep. Context daemon 40_102 can detect these patterns (e.g., using an alarm clock application, then going to sleep) and identify the precursor application or applications (e.g., clock application, news application, etc.). Once the precursor application (or applications) has been identified, context daemon 40_102 can use the precursor application to predict that the user is about to go to sleep. For example, context daemon 40_102 can determine based on historical event data that the user typically falls asleep 40_10 minutes after using an alarm clock application. If context daemon 40_102 has predicted that the user will go to sleep at 11 pm and the user is using the alarm clock application at 10 pm, context daemon 40_102 can adjust the start of the predicted sleep period from 11 pm to 10:10 pm based on the precursor alarm clock application activity. In some implementations, context daemon 40_102 can adjust the start of the predicted sleep period by adjusting the start and stop times of the predicted sleep period without adjusting the duration of the predicted sleep period. In some implementations, context daemon 40_102 can adjust the start of the predicted sleep period by adjusting the start time and not adjusting the stop time of the predicted sleep period thereby extending the duration of the predicted sleep period. Alternatively, when context daemon 40_102 detects that the user is using the precursor application (e.g., the current context indicates that the focus application is the precursor application), context daemon 40_102 can monitor the user's activity to determine when the user locks the computing device and begin the current sleep period once the device is locked.

Other Use Cases

In some implementations, context clients running on the computing device can use the sleep prediction described above to schedule background tasks while the user is asleep. For example, an operating system process (e.g., application updater) may need to schedule some system maintenance tasks (e.g., downloading and/or installing application updates) while the user is sleeping so that the user is not inconvenienced by the allocation of system resources to system maintenance. Context daemon 40_102 can analyze the state of various device components (e.g., hardware, software, etc.) to determine if the scheduled activity might interfere with any user activity, as described further below.

In some instances, the operating system process may need the user's passcode (e.g., password) to before performing system maintenance tasks. Since the user will be unable to provide the passcode while the user is asleep, the operating system process can request a callback notification from context daemon 40_102 some time (e.g., 10 minutes) before the predicted sleep period for the user. Upon receipt of the callback request, context daemon 40_102 can schedule the callback notification for 10 minutes before the predicted sleep period begins. When the scheduled time arrives (e.g., the current time equals the scheduled time), context daemon 40_102 can send the callback notification to the operating system process. When the operating system process receives the callback notification, the operating system process can prompt the user to enter the user's passcode so that the operating system process can perform the maintenance tasks while the user sleeps. For example, the operating system process can receive the passcode from the user and store the passcode for use during performance of the system maintenance tasks. Once the system maintenance tasks are completed and the passcode is no longer needed, the operating system process can delete the user's passcode from the computing device.

To initiate the maintenance tasks while the user is sleeping, the operating system process can request a callback notification some time (e.g., 30 minutes) after the predicted sleep period begins. Upon receipt of the callback request, context daemon 40_102 can schedule the callback notification for 45 minutes after the predicted sleep period begins. When the scheduled time arrives (e.g., the current time equals the scheduled time), context daemon 40_102 can verify that the user is not using and/or not about to use, the computing device before sending the callback notification to the operating system process.

In some implementations, context daemon 40_102 can verify that the user is not using the computing device by determining whether the computing device is servicing a user-initiated activity. For example, even though the computing device is locked (e.g., indicating that the user may be sleeping), the computing device can perform navigation related activities in service of a user navigation request. Thus, when context daemon 40_102 determines that navigation components (e.g., global navigational satellite system receivers) of the computing device are turned on, context daemon 40_102 can determine that user is using the computing device and cancel or delay sending the callback notification to the operating system process during the predicted sleep period. Similarly, when context daemon 40_102 determines that the computing device is providing a personal hotspot service, synchronizing data with another user device in response to a user request (e.g., in contrast to automatic background synchronizations), or providing some other user initiated service at the time when a callback notification is scheduled, context daemon 40_102 can cancel or delay sending the callback notification to the operating system process because the user is still using the computing device even though the device is locked.

In some implementations, context daemon 40_102 can verify that the user is not about to use the computing device by determining whether the computing device is about to initiate a user-visible activity. For example, various processes running on the computing device can notify the user or get the user's attention. A communication application (e.g., instant messaging, text messaging, email, telephone, etc.) can remind the user about a received message. For example, the communication application can be configured to remind the user to read or respond to a received message ten minutes after the message was received. A clock application can include an alarm clock function that is configured to notify (e.g., wake) the user at some future time. A calendar application can be configured to remind a user about a scheduled calendar event in the future. If the user is scheduled to attend a meeting, a navigation application can present a time-to-leave reminder to the user based on the amount of time it will take the user to travel from the user's current location to the meeting location. An exercise application can be configured to remind the user to stand up, walk around, go for a run, or do some other type of exercise. Each of these notifications, reminders, alerts, etc., is directed to the user and will prompt or cause the user to interact with the computing device. Context daemon 40_102 can determine whether one of these user-visible events is about to occur within a threshold period of time (e.g., one minute, ten minutes, an amount of time needed to complete a system maintenance task, etc.) and delay or cancel sending the callback notification to the operating system process because the user is about to start using the computing device.

Processes

FIG. 40_18 is a flow diagram of an example process 40_1800 for notifying clients of context changes on a computing device. For example, a computing device corresponding to system 40_100, described above, can perform process 40_1800.

At step 40_1802, the computing device can receive a context callback request. For example, context daemon 40_102 can receive a callback request from requesting client 40_126, as described above. The callback request can include an identifier for requesting client 40_126 and a predicate that defines the context (e.g., device state) conditions under which context daemon 40_102 should send requesting client 40_126 a callback notification. In some implementations, upon receiving the callback request, the context daemon 40_102 can generate a callback identifier that can be used by context daemon 40_102 and/or requesting client 40_126 to identify the callback request. For example, context daemon 40_102 can return the callback identifier to requesting client 40_126 in response to receiving the callback request from requesting client 40_126. Context daemon 40_102 can store the callback request in callback registry 40_114 and/or predicate database 40_116, for example.

At step 40_1804, the computing device can initialize a context monitor to service the callback request. For example, context daemon 40_102 can load a monitor bundle 40_106 (or bundles) corresponding to the context items specified in the callback request predicate, as described above.

At step 40_1806, the computing device can receive current context information from the monitor bundle 40_106 (context monitor 40_108). For example, each context monitor 40_108 can interface with various system components to obtain the state of the system components. The context monitors 40_108 can then report the state to context daemon 40_102. Alternatively, context daemon 40_102 can receive state information from reporting client 40_124. Context daemon 40_102 can generate current context 40_112 based on the received state information, as described above.

At step 40_1808, the computing device can determine that the current context matches the requested context. For example, context daemon 40_102 can compare the context request predicate to the current context to determine that the current context satisfies the conditions specified in the predicate.

At step 40_1810, the computing device can send a callback notification to the requesting client 40_126. For example, in response to determining that the current context matches the requested context, context daemon 40_102 can send a callback notification to requesting client 40_126 that identifies the callback request. The requesting client 40_126 can use the callback request identifier to determine which callback predicate triggered the callback (e.g., to determine the current operational context of the computing device). Requesting client 40_126 can then perform an action appropriate to the current context.

FIG. 40_19 is a flow diagram of an example process 40_1900 for restarting a context daemon to service a callback request. For example, processes running on a computing device may be terminated by a process manager service of the operating system when the process manager determines that the process has been idle for a period of time. When the process manager (or some other process) terminates context daemon 40_102, the computing device can perform process 40_1900 to restart context daemon 40_102 so that context daemon 40_102 can collect context information and send callback notifications to requesting client 40_126. For example, process 40_1900 can correspond to the context daemon restart mechanisms described with reference to FIGS. 7-13.

At step 40_1902, the computing device can initiate a communication session between context daemon 40_102 and requesting client 40_126. In some implementations, requesting client 40_126 can initiate a communication session with context daemon 40_102 by sending context daemon 40_102 a callback request, as described above. The callback request can include a client identifier and a callback predicate, as described above. In some implementations, context daemon 40_102 can only communicate (e.g., send a callback notification) with requesting client 40_126 using a communication session initiated by requesting client 40_126. In some implementations, context daemon 40_102 can store the callback request in a callback database (e.g., predicate database 40_116).

At step 40_1904, the computing device can determine that context daemon 40_102 is inactive. For example, when context daemon 40_102 does not receive any callback requests or context information updates for a period of time, the process manager can determine that context daemon 40_102 is idle or inactive.

At step 40_1906, the computing device can shutdown context daemon 40_102. For example, based on the determination that context daemon 40_102 is inactive, the process manager can shut down or terminate context daemon 40_102 to conserve system resources (e.g., battery power, memory, etc.). Upon shutting down context daemon 40_102, the communication session between requesting client 40_126 and context daemon 40_102 will also be terminated.

At step 40_1908, the computing device can detect an event associated with context daemon 40_102. For example, the event can be a context client (e.g., requesting client 40_126, reporting client 40_124, etc.) sending a message to context daemon 40_102. For example, the message can be a callback request from requesting client 40_126. The message can be a context information update received from reporting client 40_124. In some implementations, the event can be a device state update received by launch daemon 40_702 in which context daemon 40_102 has registered interest.

At step 40_1910, the computing device can restart context daemon 40_102. For example, when the context client sends a message to the terminated context daemon 40_102, the computing device can restart context daemon 40_102 so that context daemon 40_102 can receive and handle the message. When launch daemon 40_702 receives a device state update that corresponds to a request received from context daemon 40_102, launch daemon 40_702 can restart context daemon 40_102.

At step 40_1912, the computing device can restore registered callback requests to callback daemon 40_102. For example, once restarted, callback daemon 40_102 can restore the callback requests received before callback daemon 40_102 was terminated. For example, callback daemon 40_102 can restore the previously received callback from the callback database.

At step 40_1914, the computing device can initialize the event monitors required for servicing the restored callback requests. For example, context daemon 40_102 can load the event monitor bundles 40_106 necessary for collecting the context information needed to service the callback requests.

At step 40_1916, the computing device can reestablish the communication session between context daemon 40_102 and requesting client 40_126. For example, once context daemon 40_102 is running again, the requesting client 40_126 can send a message (e.g., callback request) to context daemon 40_102 to reestablish the communication session. Context daemon 40_102 can use the reestablished communication session to send callback notifications to the client according to the predicate specified in the callback request.

FIG. 40_20 is a flow diagram of an example process 40_2000 for restarting a callback client to receive a callback notification. For example, processes running on a computing device may be terminated by a process manager service of the operating system when the process manager determines that the process has been idle for a period of time. When the process manager (or some other process) terminates requesting client 40_126, the computing device can perform process 40_1900 to restart requesting client 40_126 so that requesting client 40_126 can receive callback notifications from context daemon 40_102. For example, process 40_1900 can correspond to the requesting client restart mechanisms described with reference to FIGS. 40_7-40_13.

At step 40_2002, the computing device can initiate a communication session between context daemon 40_102 and requesting client 40_126. In some implementations, requesting client 40_126 can initiate a communication session with context daemon 40_102 by sending context daemon 40_102 a callback request, as described above. The callback request can include a client identifier and a callback predicate, as described above. In some implementations, context daemon 40_102 can only communicate (e.g., send a callback notification) with requesting client 40_126 using a communication session initiated by requesting client 40_126. In some implementations, context daemon 40_102 can store the callback request in a callback database (e.g., predicate database 40_116).

At step 40_2004, the computing device can determine that requesting client 40_126 is inactive. For example, when requesting client 40_126 is not performing significant processing (e.g., CPU usage for requesting client 40_126 is below a threshold level) within the computing device, the process manager can determine that requesting client 40_126 is idle or inactive.

At step 40_2006, the computing device can shutdown requesting client 40_126. For example, based on the determination that requesting client 40_126 is inactive, the process manager can shut down or terminate requesting client 40_126 to conserve system resources (e.g., battery power, memory, etc.). Upon shutting down requesting client 40_126, the communication session between requesting client 40_126 and context daemon 40_102 will also be terminated. Thus, context daemon 40_102 will not have a communication channel by which to deliver callback notifications to requesting client 40_126.

At step 40_2008, the computing device can detect an event associated with requesting client 40_126. For example, context daemon 40_102 can detect a current context that matches the context callback predicate (e.g., corresponds to the conditions specified by the predicate). Launch daemon 40_702 can detect a device state that corresponds to a device state request received from context daemon 40_102 and associated with the client identifier of context client 40_126.

At step 40_2010, the computing device can restart requesting client 40_126. For example, when context daemon 40_102 detects that the current context matches the context callback predicate, context daemon 40_102 can attempt to send a callback notification to requesting client 40_126. However, because the communication session between context daemon 40_102 and requesting client 40_126 was terminated, context daemon 40_102 cannot send the callback notification to the requesting client 40_126. Thus, upon detecting that the communication channel with requesting client 40_126 has been terminated, context daemon 40_102 can send the client identifier received from requesting client 40_126 to launch daemon 40_702 in a request to restart requesting client 40_126. In some implementations, upon requesting launch daemon 40_702 restart requesting client 40_126, context daemon 40_102 can delete all callback request data (e.g., stored in callback registry 40_114 and/or predicate database 40_116) associated with the client identifier of requesting client 40_126. Upon receiving the client identifier, launch daemon 40_702 can restart requesting client 40_126. Alternatively, upon detecting a device state that corresponds to a device state request received from context daemon 40_102 and associated with the client identifier of context client 40_126, launch daemon 40_702 can restart requesting client 40_126.

At step 40_2012, the computing device can reestablish a communication session between context daemon 40_102 and requesting client 40_126. For example, upon restarting, requesting client 40_126 can send a new callback request to context daemon 40_102 to start a new communication session.

At step 40_2014, the computing device can receive a client callback request from the restarted requesting client 40_126. For example, context daemon 40_102 can receive the callback request from requesting client 40_126 that specifies the same callback predict corresponding to the current context as described at step 40_2008. Upon receipt of the callback request, context daemon 40_102 can determine that the callback request corresponds to the current context of the computing device.

At step 40_2016, the computing device can send a callback notification to requesting client 40_126. For example, upon determining that the current context matches the callback request, context daemon 40_102 can send a callback notification to requesting client 40_126 using the reestablished communication channel.

FIG. 40_21 is a flow diagram of an example process 40_2100 for predicting future events based on historical context information. For example, process 40_2100 can correspond to the event prediction mechanisms described with reference to FIGS. 40_14-40_17.

At step 40_2102, the computing device can obtain historical context data for a context item. For example, context daemon 40_102 (e.g., using historical monitor 40_110) can generate a historical event stream for each context item in current context 40_112 that indicates changes in device context (e.g., device state) over time. For example, historical monitor 40_110 can generate a historical event stream for the "locked" context item indicating when the device was locked or unlocked, as described above.

At step 40_2104, the computing device can generate historical context data vectors for the context item. For example, context daemon 40_102 can analyze the historical context data for a context item in 24-hour periods over the previous 28 days. For example, context daemon 40_102 can generate 28 data vectors for each of the 28 previous 24-hour periods. Each of the 28 data vectors can include 96 data entries (e.g., each vector can have a length of 96) corresponding to the 96 15-minute slots in each 24-hour period. Context daemon 40_102 can assign to each of the 96 15-minute slots a probability value that corresponds to the observed value of the context item (e.g., device state) recorded during each of the 28 previous 24-hour periods (e.g., previous 28 days). For example, context daemon 40_102 can assign to each of the 96 data slots in the 28 vectors a value (e.g., 0, 1, 0.45, etc.) that indicates the likelihood that the computing device will remain locked during each of the 96 15-minute slots in the previous 28 days.

At step 40_2106, the computing device can determine a short-term probability that a particular context value will be observed in each time slot. For example, the short-term probability can be calculated based on data collected over a previous number of days. For example, context daemon 40_102 can calculate the short-term probability (PS) that the device will remain locked by averaging the 15-minute slots over the previous seven days, as described above in the "Short-Term Averaging" section above.

At step 40_2108, the computing device can determine a long-term probability that a particular context value will be observed in each time slot. For example, the long-term probability can be calculated based on data collected on the same day of the week (e.g., Sunday, Wednesday, etc.) over a previous number of weeks. For example, context daemon 40_102 can calculate the long-term probability (PL) that the device will remain locked by averaging the 15-minute slots over the previous four weeks, as described above in the "Long-Term Averaging" section above.

At step 40_2110, the computing device can combine the short-term and long-term probabilities to generate a combined probability. For example, context daemon 40_102 can combine the short-term probability (PS) and the long-term probability (PL) to generate a combined probability (P), as described above. In some implementations, context daemon 40_102 can weigh the long-term probability (or short-term probability) to adjust the impact that the long-term probability has on the combined probability.

At step 40_2112, the computing device can generate a probability curve for the context item value. For example, context daemon 40_102 can convert the slot-wise probability values into a probability curve, as described in the "Generating a Sleep Curve" section above.

At step 40_2114, the computing device can predict the future occurrence of the particular device context. For example, once the probability curve is generated, context daemon 40_102 can predict the occurrence of the same context item value in the future based on the probability curve. For example, using the locked context example above, context daemon 40_102 can predict that the device will remained locked during the hours of 11 pm and 7 am. Based on this locked context item prediction, context daemon 40_102 can infer that the user will be asleep during this predicted time period.

FIG. 40_22 is a flow diagram of an example process 40_2200 for servicing a sleep context callback request. For example, process 40_2200 can correspond to the mechanisms described above. For example, requesting client 40_126 (e.g., an application, utilities, operating system tool, etc.) can send a callback request to context daemon 40_102 specifying that context daemon 40_102 should notify the processes when the user is sleeping. For example, requesting client 40_126 may be configured to schedule maintenance activities while the user sleeps so that the user is not inconvenienced by these maintenance activities while using the computing device.

At step 40_2202, the computing device can receive a sleep context callback request. For example, context daemon 40_102 can receive a callback request from requesting client 40_126 specifying that context daemon 40_102 should notify requesting client 40_126 ten minutes after the user goes to sleep.

At step 40_2204, the computing device can initialize a sleep context monitor to service the callback request. For example, the sleep context monitor can be a monitor bundle 40_106 that includes a context monitor 40_108 configured to monitor the locked state of the computing device. In some instances, context monitor 40_108 can be configured to monitor the locked state of the computing device and the state of other components associated with the sleep context. For example, context monitor 40_108 can monitor the state of navigation components, wireless networking components (e.g., personal hotspot, Bluetooth, etc.), device synchronization components, and/or device input/output components (e.g., headphones jack connector, etc.).

At step 40_2206, the computing device can receive sleep context information from the context monitor. For example, the context monitor 40_108 can report the locked state of the computing device and/or the state of the other monitored components to context daemon 40_102.

At step 40_2208, the computing device can predict a future sleep period. For example, context daemon 40_102 can predict a future sleep period as described above with reference to FIG. 40_21.

At step 40_2210, the computing device can schedule the sleep context callback. For example, if the predicted sleep period is from 11 pm to 7 am and the sleep context callback specifies that requesting client 40_126 should be called back ten minutes after the sleep period begins, then context daemon 40_102 can schedule the sleep callback for 11:10 pm.

At step 40_2212, the computing device can process the scheduled sleep context callback. For example, context daemon 40_102 can detect when the current time equals the scheduled 11:10 am time and determine whether to send a callback notification to requesting client 40_126.

At step 40_2214, the computing device can determine whether the user is sleeping. For example, context daemon 40_102 can analyze various context items (e.g., device state) to confirm that the user is sleeping. In some implementations, context daemon 40_102 can determine whether the current device locked state indicates that the device is locked. If the device is not locked, context daemon 40_102 can cancel or delay sending the sleep callback notification to requesting client 40_126.

In some implementations, context daemon 40_102 can determine whether the user is passively using the computing device. For example, the user can be using (e.g., relying upon) the device without providing user input or unlocking the device. If the user is passively using the computing device, context daemon 40_102 can cancel or delay sending the sleep callback notification to requesting client 40_126. For example, the user may be using the navigation features of the computing device while the device is locked. Thus, context daemon 40_102 can determine whether the navigational components (e.g., GNSS system, Wi-Fi and/or cellular data transceivers, etc.) are turned on. If the current context information indicates that these navigational components are powered, then context daemon 40_102 can determine that the user is passively using the computing device and is not asleep.

As another example of passive use, the user might be using personal hotspot functionality provided by the computing device while the computing device is locked. If the current context information indicates that the personal hotspot components are powered, then context daemon 40_102 can determine that the user is passively using the computing device and is not asleep.

As another example of passive use, the user might have initiated a synchronization operation with another device (e.g., a laptop, tablet computer, smart watch, etc.). The synchronization operation may be performed while the computing device is locked. If the current context information indicates that the computing device is performing a synchronization operation, then context daemon 40_102 can determine that the user is passively using the computing device and is not asleep.

At step 40_2216, the computing device can confirm that no imminent user activity is scheduled to occur. For example, the user may in fact be asleep but the computing device may have scheduled a user-visible notification to occur soon that will wake up the user and cause the user to use the computing device. For example, the computing device may have scheduled a reminder about an incoming communication (e.g., text message, instant message, email, telephone call, etc.) that is scheduled to happen soon after the sleep callback notification is scheduled. The computing device may have scheduled an alarm clock alarm that is scheduled to happen soon after the sleep callback notification is scheduled. The computing device may have scheduled a calendar reminder or alert that is scheduled to happen soon after the sleep callback notification is scheduled. The computing device may have scheduled a time-to-leave notification that is scheduled to happen soon after the sleep callback notification is scheduled. The computing device may have scheduled an exercise reminder that is scheduled to happen soon after the sleep callback notification is scheduled. If context daemon 40_102 determines that user activity is scheduled to occur within a threshold period of time (e.g., 1 minute, 5 minutes, etc.), then context daemon

40_102 can cancel or delay sending the sleep callback notification to requesting client 40_126.

In some implementations, the computing device can send the sleep callback notification to the client at step 40_2218. For example, when context daemon 40_102 confirms that the user is sleeping at step 40_2214 and confirms that there is no imminent user activity scheduled, context daemon 40_102 can send the sleep callback notification to requesting client 40_126.

Example System Architectures

FIG. 1A illustrates an example device 100 with a system architecture for implementing the systems and processes described in this section.

Example Methods for Context Monitoring/Prediction

In some embodiments a method of context monitoring includes: receiving, by a context daemon process executing on a computing device, values corresponding to one or more context items monitored by one or more context monitors; receiving, by the context daemon process from a context client process, a context information request corresponding to a first context item; determining, by the context daemon process, that the first context item is not currently monitored by the context monitors; and initializing, by the context daemon process, a new context monitor corresponding to the first context item. In some embodiments, initializing the new context monitor comprises dynamically loading a new software package corresponding to the new context monitor into the context daemon process. In some embodiments, initializing the new context monitor comprises invoking a new context monitor process separate from the context daemon, the new context monitor process corresponding to the new context monitor. In some embodiments, the one or more context item values describe a current state of one or more hardware components of the computing device. In some embodiments, the one or more context item values describe a current state of one or more software components of the computing device. In some embodiments, the method includes: generating, by the new context monitor process, a historical event stream corresponding to the first context item. In some embodiments, the new context monitor process generates historical event stream objects that identify a start time, a duration, and a context item value that describes an event in the historical event stream.

In some embodiments, a method of context notifications includes: generating, by a context daemon process executing on a computing device, information describing a current context of the computing device; receiving, by the context daemon process, a callback request from a context client process that specifies a predicate for sending a notification to the context client process, the predicate specifying context conditions for calling back the context client; detecting, by the context daemon process, that the current context corresponds to the predicate; and in response to the detecting, sending, by the context daemon process, a callback notification to the requesting client. In some embodiments, the context conditions specify values of one or more context items which when detected in the current context cause the context daemon to send the callback notification to the context client. In some embodiments, the callback request includes an identifier for the context client and the predicate; and further comprising: In some embodiments, the method includes: generating, by the context daemon, a unique identifier for the callback request; and sending, by the context daemon, the unique identifier to the requesting client. In some embodiments, the method includes: storing, by the context daemon, an association between the unique identifier, the context client identifier, and the predicate. In some embodiments, the storing includes storing the unique identifier, the context client identifier, and the predicate in memory associated with the context daemon. In some embodiments, the storing includes storing the unique identifier, the context client identifier, and the predicate in a predicate database. In some embodiments, the method includes: receiving, by the context daemon, device state information describing the current state of software and hardware components of the computing device; and generating, by the context daemon, the current context information based on the received device state information.

In some embodiments, a method of context prediction includes: obtaining, by the computing device, a historical event stream corresponding to a context item monitored by the computing device; calculating, by the computing device, a plurality of probabilities that a particular value of the context item will be observed within a respective time periods in the historical event stream; generating, by the computing device, a probability curve based on the calculated probabilities; and predicting, by the computing device, a future occurrence of the particular value of the context item based on the probability curve. In some embodiments, the method includes: predicting a future occurrence of a user activity based on the probability curve. In some embodiments, the predicted user activity corresponds to a predicted user sleep period. In some embodiments, the method includes: receiving, by a context daemon, a callback request from a requesting client requesting that the context daemon notify the callback client at a requested time in advance of the predicted future occurrence of the user activity; scheduling, by the context daemon, transmission of the notification at the requested time; and sending, by the context daemon, the notification to the requesting client at the requested time in advance of the predicted future occurrence of the user activity. In some embodiments, the method includes: receiving, by a context daemon, a callback request from a requesting client requesting that the context daemon notify the callback client at a requested time during the predicted user sleep period; scheduling, by the context daemon, transmission of the notification at the requested time during the predicted user sleep period; determining that the requested time corresponds to a current time; determining, by the context daemon, whether the user is asleep at the current time; and sending, by the context daemon, the notification to the requesting client when the context daemon determines that the user is asleep at the current time. In some embodiments, determining whether the user is asleep at the current time comprises: determining whether a user initiated operation is being performed by the computing device at the current time. In some embodiments, determining whether the user is asleep at the current time comprises: determining whether a user-visible operation is scheduled to be performed by the computing device within a threshold period of time relative to the current time.

In some embodiments, a method of efficient context monitoring includes: receiving, at a context daemon process executing on a computing device, a first context callback request from a context client, the context callback request initiating a first communication session between the context client and the context daemon; receiving, by the context daemon, current context information; determining that the current context information corresponds to the context callback request; in response to the determining, detecting, by the context daemon, that the first communication session with the context client has terminated; and in response to the detecting, sending, by the context daemon, a restart message to a launch daemon requesting that the launch daemon restart the context client. In some embodiments, the callback request includes a client identifier, and further comprising: sending, by the context daemon, the client identifier to the launch daemon in the message. In some embodiments, the current context information includes one or more context items that describe a current state of the computing device. In some embodiments, the context callback request specifies conditions for notifying the context client based on the current context information received by the context daemon. In some embodiments, the method includes: terminating the context client after the context daemon receives the first context callback request. In some embodiments, the method includes: upon receipt of the restart message, restarting, by the launch daemon, the context client; after the client has been restarted, receiving, by the context daemon, a second context callback request from the context client; comparing the second context callback request to the current context information; and in response to the comparing, notifying the context client that the current context information corresponds to the second context callback request. In some embodiments, the second context callback request establishes a second communication session between the context client and the context daemon and wherein the context daemon uses the second communicate session established by the context client to notify the context client.

Section 11: Client, Server, and Web Aspects of in-App Search

The material in this section "Client, Server, and Web Aspects of In-App Search" describes client, server, and web-based aspects of in-app searching, crowdsourcing application history searches, and application view indexing and searching, in accordance with some embodiments, and provides information that supplements the disclosure provided herein. For example, portions of this section describe a way to search application states, which supplements the disclosures provided herein, e.g., related to the creation and use of deep links (as discussed below in reference to methods 600 and 800).

Brief Summary for Client, Server, and Web Aspects of in-App Search

A method and apparatus of a device that performs a search using a plurality of application states is described. In an exemplary embodiment, the device receives a plurality of application states from a plurality of applications running on a device. The device further creates an index of the plurality of application states. In addition, the device receives a query to search for data stored on the device. Furthermore, the device searches the plurality of application states using the index and the query. The device additionally determines a match for the query of one of the plurality of the application states and returns the match for the matching application state.

In another embodiment, a device performs a query using a plurality of application states on the device. In this embodiment, the device performs performing the query using an index stored on the device. The device further receives a plurality of results matching the query. In addition, the device determines a subset of the plurality of results that correspond to an application state corresponding to a native application installed on the device. Furthermore, the device presents, for each of the results in the subset of the plurality of results, that result and a representation of the native application corresponding to the result.

In a further embodiment, a device selects an application state for use in a multi-device search. In this embodiment, the device detects, on the device, that the application state has been selected as a query result for a device-level search on that device. The device further transmits the application state to a server, wherein the application state is to be indexed with other application states from other devices.

In yet another embodiment, a device performs a search for a first device using an application state received from a second device. In this embodiment, the device receives a plurality of application states from a plurality of applications running on a plurality of devices. The device further creates an index of the plurality of application states. The device additionally receives a query to search for data stored on the device. In addition, the device searches the plurality of application states using the index and the search query and returns the match for the matching application state.

In a further embodiment, a device performs a search. In this embodiment, the device transmits a query to a server and receives a plurality of results matching the query. The device further determines a subset of the plurality of results that includes an application state generated on another device corresponding to a native application installed on the device. In addition, the device presents, for each of the results in the subset of the plurality of results, a link and a representation of the native application.

In another embodiment, a device indexes an application state in a search query index. In this embodiment, receiving the application state of the application from another device coupled to the server. The device further generates a view of the application corresponding to the application state, wherein the view is a representation of a user interface of the application corresponding to the application state. In addition, the device indexes the view in a search query index.

In a further embodiment, a device retrieves an application state having an associated view with a query result. In this embodiment, the device sends a query to a server. The device further receives a result to the query from the server, where the result includes the view of an application state of an application corresponding to the result and the view is a representation of a user interface of the application corresponding to the application state. The device additionally presents the result with an indication of the view.

Other methods and apparatuses are also described.

Detailed Description for Client, Server, Web Aspects of In-App Search

A method and apparatus of a device that performs a search using a plurality of application states is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that performs a search using a plurality of application states is described. As described above, it is useful to be able to search a history of a web browser because users have a digital routine using a web browser. This digital routine can further include accessing the same applications on a repeated basis and using these applications for the same types of operations. As mentioned above, smartphone users spend, on average, 86% of the time using non-web browser applications. However, being able to search a history of non-web browser applications can be difficult, as data for usage history of applications are difficult to access (if at all) and in proprietary formats. Thus, applications histories are difficult to search.

In one embodiment, a device generates and stores applications states of executing applications. The device further indexes these application states, so that a local search service running on the device can search the indexed application states to serve results for a query. In this embodiment, an application state is a snapshot in time of the application. An application state is analogous to a web browser history. In one embodiment, an application state is for a non-web browser application. In one embodiment, an application state for an application can include a title, a view, dated that is displayed in this view, associated metadata, and/or other state information for the state. For example and in one embodiment, the application can be a review type application that displays reviews of different business and services for a geographic area. In this example, each application state could be a set of reviews and associated information for a business or service (e.g., name, address, contact information, hours open, description of the business or service, a set of reviews submitted by visitors or users of the service or business, and/or any other type of information associated with that business or service). Each application state can be displayed on one user interface pages or across multiple user pages, where each pages is content organized for display (in some embodiments, each page is a window of the application at a particular point in time). In one embodiment, each of the executing applications exports one or more application states, where the device indexes the applications states in an application state index.

By indexing the application states, a user can search a history of the applications. This allows the user to search and find previous application states. With a found application state, the use can launch the corresponding application with this application state, which brings the application to point where the application was executing when the application exported the application state. A user can use the indexed application states to return the application to a previously used state via a common mechanism for multiple different applications. For example and in one embodiment, the application state could be of page of a transit application for a particular route of a transit system. In this example, a user may navigate in the transit application to particular route, such as a local bus route 7. By navigating to that particular route, the transit application would export an application state for that local bus route page to the application state index. With this application state indexed, a user may retrieve that application state via query. For example and in one embodiment, the user could input "bus route 7" in a query, and the application state for the local bus route 7 would appear as a query result. Upon selection of this application state, the transit application would be loaded with the application state for local bus route 7 and the page for local bus route 7 in this transit application would be displayed for the user. Thus, in this example, the transit application is taken to the same state as was executing previously.

In another embodiment, the device can export application states to a remote application state indexer that can be used to support queries from devices that did not generate these application states. In this embodiment, the device exports application states that have been engaged by a user, where an engaged application state is an application state has been returned as a query result in response to a query by the user on the device and that user has selected that application state. In addition, the device sanitizes the application state by removing private information prior to exporting the application state. The remote application state indexer receives this application state and indexes the application state if the remote application state indexer has received this application state a requisite number of times. In this embodiment, by indexing the application state after a requisite number of times, this application state has been crowd-sourced, such many different users and/or devices have engaged this applications state in a local search. In one embodiment, requiring a certain number of engagements for an application state increases the likelihood that this application state is useful to other users. Once indexed, a remote search service can search the remote application state index to determine if there are application states that match a query. For each match, the remote search service returns the matching application state(s) to a client. On the client, a user can select the application state, where the corresponding application is launched and brings the application to point where the application was executing when the application exported the application state.

In a further embodiment, a device generates application state views for different application states. In this embodiment, the application state view is a representation of a user interface of the application corresponding to that application state. For example and in one embodiment, a review type application that has access to content for thousands or millions of reviews for businesses and services can have a view for each of the thousands or millions of reviews. These views can be used to preview the application state and also the application in general. In one embodiment, these application state views can be used to preview and application state that is returned in a set of results for a query or can be used in general to preview application. In one embodiment, collecting a number of application state views for one application can be used to preview that application in an application store. For example and in one embodiment, a review type application may have dozens of application state views available for this application.

FIG. 41_1 is a block diagram of one embodiment of a system that indexes application states for use in a local device search index. In FIG. 41_1, device 41_100 includes multiple applications 41_102 that are coupled to the application state indexer 41_104. In one embodiment, the device 41_100 is any type of device that can communicate network data with another device (e.g., a personal computer, laptop, server, mobile device (e.g., phone, smartphone, smartwatch, personal gaming device, etc.), another network element, etc.). In one embodiment, the device 41_100 can be a virtual machine or can be a device that hosts one or more virtual machines. In one embodiment, the device 41_100 additionally includes an application state search index 41_108. In one embodiment, each of the applications 41_102 is an executing program that progresses through a series of states 41_112 while that application is running. For example and in one embodiment, an application 41_102 can be a word processing application, spreadsheet, contacts, mail, phone, web browser, media player, review application, classified advertisement application, social networking, productivity, utility, game, real estate, photo, video, e-commerce, storefront, coupon, operating system, and/or any other type of application that can run on the device.

As described above, each of the applications 41_102 progresses through a series of states while that application is executing. In one embodiment, one of these application states is a snapshot in time of the application. In one embodiment, an application state for an application 41_102 can include a title, a user interface state, data that is displayed in this user interface, associated metadata, and/or other state information for the state In a further embodiment, the application state includes information that describes how the state should render in search results. For example and in one embodiment, the application 41_102 can be a review type application that displays reviews of different business and services for a geographic area. In this example, each application state could be a set of reviews and associated information for a business or service (e.g., name, address, contact information, hours open, description of the business or service, a set of reviews submitted by visitors or users of the service or business, and/or any other type of information associated with that business or service). In one embodiment, the application state title is a title given for that application state, such as the name of that business or service, in the case of a review type application. A user interface state for an application state could be a representation of a user interface of the application 41_102 corresponding to that application state. In this embodiment, the user interface state can include the representation of the user interface, where that user interfaces scroll to or which component of the user interface is active, what mode the application may be in (e.g., the application 41_102 may have different modes that is used to present information to the user). In a further embodiment, the application may be small enough to include a title plus a Uniform Resource Locator or application identifier and version numbers of the application that are compatible with the state.

In one embodiment, each application state includes title, searchable data and/or metadata and application-specific opaque data. In this embodiment, the searchable data and/or metadata is data that is designated by the application 41_102 as data that is accessible by a search indexing service and/or a query search service where this searchable data and/or metadata can be used to index the application state and also be used to return application state as a result of the query. For example and in one embodiment, the searchable data and/or metadata can be the content in the application state (e.g., application state title, content that is displayed in the user interface state, media data, location data, time data, or any other type of data or metadata that can be used for search index). In one embodiment, the application-specific opaque data is application-specific data that is used to return the application to its previous state and may or may not be data that is searchable. In this embodiment, loading an application state by the corresponding application 41_102 returns that application to the application state. For example and in one embodiment, the application-specific opaque data may include a user interface state, the user-interface mode, and/or a reference to a resource. The user interface mode may be the type of mode user faces currently using. For example and in one embodiment, a word processing program can be a draft layout view or print layout view; and an image-editing program can be in the library mode, an image editing mode, or print mode. In one embodiment, the referenced resource can be filed that is being viewed or edited, a uniform resource locator to a resource that can be on the device or on another device, such as a server across a network. In one embodiment, the data that is part of the application state can be in a dictionary with (key, value) pairs.

In one embodiment, one or more of the applications 41_102 each export one or more application states to the application state indexer 41_104. In this embodiment, the applications 41_102 can each export the application states on a fixed or variable schedule. For example and in one embodiment, the applications 41_102 can export the application states on a fixed time basis, export and application state for each new user interface state, after one or more interactions with the user, or some other metric. As another example and in another embodiment, a review application may navigate to a new review or review search. In this example, by navigating to a new review or review search, a new view is generated and a new application state is created and exported to the application state indexer 41_104. The application state indexer receives the application states and adds the application state to the application state search index 41_108. By adding the application state to the index, the new application state is available to a local search service for matching queries received by the local search service. In another embodiment, the application state can be exported to a remote search application state search index 41_110, which is described in FIGS. 41_6-41_11 below.

FIG. 41_2 is a block diagram of one embodiment of a system that searches application states using an on device application state search index. In FIG. 41_2, device 41_200 includes an application 41_204 that is coupled to a local search service 41_208. The local search service 41_208, which includes an application state search module 41_210, is further coupled to an application state search index 41_212, a local search index 41_214 and, optionally, a remote application state search index 41_216. In one embodiment, the device 41_200 is a device as in FIG. 41_1. In one embodiment, the application 41_204 includes a search input field 41_206. In this embodiment, the search input field is used to input a query that can be used by the local search service to perform a search using this query. If a query is inputted to the search input 41_206, the application 41_204 sends this query to the local search service 41_208. The local search service 41_208 receives the query and produces ranked results by searching the local search index 41_214 and/or the application state search index 41_212 to determine a set of results for the query. In addition, the local search service 41_208 ranks the results and sends them back to the application 41_204.

In this embodiment, a search can include a search of the objects stored on the device 41_200. For example and in one embodiment, the objects can be documents, pictures, music, applications, email, calendar entries, and/or other objects stored in the local search index. In one embodiment, the search is based on an index that is maintained by the search module. In this embodiment, the index is an index of the metadata stored in objects of the device. In an alternative embodiment, the local search service 41_208 can also apply the query to the application state search index 41_212. In this embodiment, the local search service 41_208 applies to query to the application state search index 41_212 to determine if there any application states that match the query. For example and in one embodiment, the local search service 41_208 applies the query to the searchable data for each of the application states stored in the application state search index 41_212. In this example, if there is a match to the query for one or more application states in the application state search index 41_212, the local search service 41_208 returns a set of results to the application 41_204 that includes these one or more application states. The application 41_204 displays the ranked results. If one of the ranked results for display is an application state, the application can display an icon of the application, the application state title, and an application state summary. In one embodiment, upon selection of the displayed application state, the application corresponding to the application state is loaded with that application state. In this embodiment, by loading application with the application state, the application is loaded in an execution state that corresponds to the application state. For example in one embodiment, if the application state is a particular coupon (e.g., "50% weekend rental cars!") for a coupon application, the coupon application is loaded with this application state and the application state displays particular coupon as if the user had navigated to that coupon.

FIG. 41_3 is a block diagram of embodiments of user interfaces that display an application state query results among other query results. In FIG. 41_3, three different possible user interfaces 41_300A-C to display an application state on a device are illustrated. In one embodiment, user interface 41_300A includes a search input 41_302A, application state 41_314A, other actions 41_310A, and on-screen keyboard 41_312A. In one embodiment, the search input 41_302A is used to input a query by the user of the device. In this embodiment, a partial or whole query can be entered and sent to the local search service in order to determine one or more sets of query results. In one embodiment, results for the query are return as one or more characters of the search are entered. In addition, the application state 41_314A includes an application icon 41_304A, application state title 41_306A, and application state summary 41_308A. In one embodiment, the application icon 41_304A is an icon representing the application corresponding to the application state. In this embodiment, the application icon 41_304A may be part of the application state returned from the query or retrieved based on information stored in the application state. In one embodiment, the application state title 41_306A is a title for the application state that is stored in the application state. Furthermore, the application state summary 41_308A is a summary of the application state. For example and in one embodiment, the application state summary 41_308A includes a description of the application state, such as a description of the content of the application state. In this example, the application state summary 41_308A can give an indication to the user of the content that is associated with the application state.

In one embodiment, the user interface 41_300A can include other actions 41_310A, in addition to displaying a query result that includes an application state 41_314A. For example in one embodiment the other actions 41_310A can include a link to search the web with the query or to search an online encyclopedia with the query. The user interface 41_300A can also include an on-screen keyboard 41_312A that is used by a user to input a search query. Alternatively, the query can be entered via other means (e.g., via a microphone coupled to the device, by another device coupled to the device, such as a smart watch coupled to a portable device. In one embodiment, the icon 41_304A could be an image thumbnail specific to the app state provided by the app. In addition, the icon 41_304A can also be a video or a video preview. In a further embodiment, the application state summaries can include an "action" buttons, such Phone Call icons, Play, Directions, Purchase.

In one embodiment, there are many different types of application states that can be displayed as a query result. For example and in one embodiment, the application state could be of view of a transit application for a particular route of a transit system. In this example, a user may navigate in the transit application to particular route, such as a local bus route 7. By navigating to that particular route, the transit application would export an application state for that local bus route view to the application state index. With this application state indexed, a user may retrieve that application state via query. For example and in one embodiment, the user could input "bus route 7" in a query, and the application state for the local bus route 7 would appear as a query result. Upon selection of this application state, the transit application would be loaded with the application state for local bus route 7 and the user interface for local bus route 7 in this transit application would be displayed for the user. Thus, in this example, the transit application is taken to the same state as was viewed previously.

As another example and in another embodiment, a user may use a food delivery application and the user just wants to reorder one of their previous orders. In this example, the user may order pho soup from a local restaurant using application specific for that local restaurant. In this order, the local restaurant application would export an application state corresponding to the order of the pho soup. This application state would be indexed and accessible by the local search service. The user may later enter a query "pho soup," "Vietnamese restaurant," or the name of the local restaurant, and the application state corresponding to this order could be one of the results. This application state may also be the top hit for this result. Upon selection of this application state, the local restaurant application would be launched and display the previous order of pho soup sop that the user may complete the order for the soup.

In a further example and embodiment, the user may maintain a picture board to plan their next wilderness trip. In this example, the user uses a picture board application to link pictures and comments regarding this next trip. The user would come back to this particular picture board using the picture board application in order to add the links from the clipboard of the device. The picture board application would export this application state of the picture board for the wilderness trip in this application state would be available by the local search service. By searching for this application state, such as the name of the place of the trip, the user could quickly go to that wilderness trip picture board within the picture board application via a query instead of launching the picture board application and navigating to this particular picture board view.

In one embodiment, saving an application state can be used to quickly access particular views of a utility that may be difficult to navigate to. For example and in one embodiment, a device settings application may have a multitude of options that are many levels deep. In this example, the user may go to the battery usage page in the settings application to see which application is consuming the most of the battery. The battery usage page may be four or more levels deep and difficult to access. By exporting the application state for the better usage page of the settings application, the user may be able to enter a query "battery usage," "battery," "batter," or some other prefix of the word battery usage to get the application state of the battery usage page of the settings application to appear as a result for the query. This would provide a quick access to a possibly difficult to navigate to page in the settings application.

In another embodiment, an application state result for a query may be shown with other query results from other domains, such as the local search index as described in FIG. 41_2 above. In FIG. 41_3, user interface 41_300B displays an application state 41_314B along with other query results 41_310B. In this user interface 41_300B, the search input 41_302B is displayed along with the application state 41_314B, the other query results 41_310B, and an on-screen keyboard 41_312B. In one embodiment, the search input 41_302B and the on-screen keyboard 41_312B is the same as described above for user interface 41_300A. In addition, the application state 41_314B includes an application icon 41_304B, application state title 41_306B, and an application state summary 41_308B, which are the same as the application icon, application state title and application state summary as described above for user interface 41_300A. Furthermore, user interface 41_300B includes other query results 41_310B, which can be other query results from other domains or application states. For example and in one embodiment, the other query results 41_310B for the query "battery" could include objects index in the local search index matching the word "battery," other application states matching the word "battery," or other query results matching a local or remote search index (e.g., a web search index) matching the word "battery."

As described above, an application state may also be saved for utility application running on the device. For example in in one embodiment, these settings application for the device that is used to configure a device can also export application states. User interface 41_300C is an example of a query result that includes an application state for the settings application. In FIG. 41_3, the user interface 41_300C, the search input 41_302C is displayed along with the application state 41_314C, the other actions 41_310C, and an on-screen keyboard 41_312C. In one embodiment, the search input 41_302C and the on-screen keyboard 41_312C is the same as described above for user interface 41_300A. In addition, the application state 41_314C includes an application icon 41_304C, settings component 41_306C for the component of the settings application (battery usage, for example), and an application state settings summary 41_308C for the component of the settings application (battery usage).

As described above, in order for application states to be accessible by a local search service, the application states are added to an index that is accessible by the local search service. FIG. 41_4A is a flow diagram of one embodiment of a process 41_400 to index application states received from multiple different applications on a device. In one embodiment, process 41_400 is performed by an application state indexer, such as the application state indexer 41_104 as described above in FIG. 41_1. In FIG. 41_4A, process 41_400 begins by receiving multiple application states from multiple applications on a device at block 41_402. For example and in one embodiment, process 41_400 can receive application states from a variety of applications, such as a word processing application, spreadsheet, contacts, mail, phone, web browser, media player, review application, classified advertisement application, social networking, productivity, utility, game, real estate, photo, video, e-commerce, storefront, coupon, operating system, and/or any other type of application that can run on the device. In one embodiment, the applications can send the application state to process 41_400 concurrently, serially, and/or a combination thereof. At block 41_404, for each application state that process 41_400 receives, process 41_400 adds those application states to the application state index. In one embodiment, process 41_400 adds an application state to the application state index by adding an application state identifier, index-able text, application identifier, and/or insertion time to a search index data structure (e.g., the inverted index and completion tries).

By adding multiple application states to the application state index, these index application states are available for a query search by a local search service. FIG. 41_4B is a flow diagram of one embodiment of a process 41_450 to determine query results for a query using an application state index. In one embodiment, process 41_450 is performed by a local search service to determine query results for a query using an application state index, such as local search service 41_208 as described in FIG. 41_2 above. In FIG. 41_4B, process 41_450 begins by receiving a query at block 41_452. In one embodiment, the query is a search string that is input by a user in an application and sent to process 41_450. In one embodiment, the input can be entered by text, spoken word, automatically generated, and/or some other way to entry a query prefix. For example and in one embodiment, the user can enter a query in web browser or file browser. A block 41_454, process 41_450 determines a set of query results for the query using the local application state index. In one embodiment, process 41_450 uses the information in the query to determine matching application states in the local application state index. At block 41_456, process 41_450 ranks the set of query results. In one embodiment, the ranks are based on the scores for each of the application states that match the query. Process 41_450 returns the ranks set of query results at block 41_458. In one embodiment, process 41_450 sends the ranked set of query results back to the application that sent the query to process 41_450.

FIG. 41_5 is a flow diagram of one embodiment of a process 41_500 to receive and present an application state as part of a query result. In one embodiment, process 41_500 is performed by an application to receive and present an application state as part of the query result, such as application 41_204 described in FIG. 41_2 above. In FIG. 41_5, process 41_500 begins by sending a query to a local search service at block 41_502. In one embodiment, the query can be a search string that is input by user in the application and sent to the local search service. In this embodiment, the input can be entered by text, spoken word, automatically generated, received from a coupled device (e.g., a smart watch coupled to a portable device), and/or some other way to enter a search string. In another embodiment, a query could be suggested by the search system and the user could pick one query out of multiple selections. Alternatively, the query could be extracted from a context. For example and in one embodiment, the user is reading a text message and goes to search, the query is extracted by a data detection system and issued automatically, or suggested to user. Furthermore, a query could be issued by following a link from another application. At block 41_504, process 41_500 receives a set of results, where the results include an application state. In one embodiment, the set of results are ranked with the top-ranked result being a top hit. At block 41_506, process 41_500 presents the application state in a user interface. In this embodiment, the application state includes an application state title, summary and an indication of an icon corresponding to the application for this application state. In one embodiment, process 41_500 displays the application state as described in FIG. 41_3 above. In response to the application being selected, process 41_500 launches the corresponding application using the selected application state at block 41_508. For example and in one embodiment, if the application state is a review of a local restaurant for a review type application, process 41_500 launches the review type application with the local restaurant application state. In this example, the review type application would be launched such that the view presented to the user is the one of the local restaurant in the review type application. In one embodiment, if the application is not installed on the device, process 41_500 can download the application from a remote source, such as an application store, webpage, or other remote server. In this embodiment, process 41_500 would install the application and launch the application using the selected application state.

As described above, multiple applications can export application states that are indexed locally on the device executing these applications. In one embodiment, these application states can further be exported to a remote application state indexer and be used to support queries from devices that did not generate these application states. FIG. 41_6 is a block diagram of one embodiment of a system 41_618 that indexes application states for use in a remote search index. In FIG. 41_6, devices 41_600 are coupled to a remote application state indexer 41_610. In one embodiment, each of the devices 41_600 includes multiple applications 41_602 executing on that device 41_600, and each of the applications 41_602 are coupled to an application state module 41_604 on the device. In this embodiment, each of the applications 41_602 will export one or more application states 41_612 to the application state module 41_604. In this embodiment, the application state module 41_604 indexes the received application states in an application state search index 41_608 as described above in FIGS. 41_1-41_5. In another embodiment, these application states can be sent to a remote application state indexer 41_610. By sending the application states to a remote application state indexer 41_610, these application states can be made available to support queries from other devices not illustrated. Thus, in this embodiment, indexed application states from multiple applications running on multiple devices can be used for query results in response to queries sent by devices that did not generate these application states.

In one embodiment, each application state that is indexed locally may also be exported to the remote application state indexer 41_610. In this embodiment, thousands or millions of application states could be generated and sent to the remote application state indexer 41_610. However, with these many application states being exported and indexed, this may create an application state index that is too large and/or with many spurious entries that are not useful. In addition, one some or all of the application states exported may include private information that is not desirable to be included in the indexed application state 41_614.

In one embodiment, the application state module 41_604 exports application states to the remote application state indexer 41_610 if those application states have been engaged on the device. In this embodiment, in order to engage an application state, the application state module determines if that application state has been returned as a query result in response to a query by the user on the device and that user has selected that application state. In one embodiment, engaging an application state means that the user has sent a query to a local search service, the local search service has returned that application state in a set of query results, and the user has selected or viewed that application state. In one embodiment, engaging application state indicates to the application state module 41_604 that this particular application state could be more important than other application states generated by the device 41_600. For each engaged application state, the applications state module 41_604 exports that application state to the remote app state indexer 41_610.

In a further embodiment, prior to exporting the engaged application state to the remote application state indexer 41_610, the application state module 41_604 sanitizes the application state by removing any possible private information that may be in the application state. In one embodiment, the application state may include private information such as usernames, private contact information, location, time accessed, social security numbers, bank account numbers, and/or any other type of private information that may be in the application state. In one embodiment, the application that creates the application state may mark certain information as being private that is stored in the application state. In another embodiment, the device may add private information to that application state. Alternatively, the application state module 41_604 may know that certain information is private, regardless of whether the information is marked private or not. In either of these embodiments, the applications they module 41_604 would remove this private information.

The remote application state indexer 41_610, in one embodiment, receives the application states from the multiple devices 41_600. The remote application state indexer 41_610 can receive application states from a few devices or as to as many as thousands or millions of devices. In addition and in one embodiment, the remote application state indexer 41_610 maintains two sets of application states. One set of application states is the indexed application state 41_614. These are the set of application states that have been indexed and available for use by a searching service. The other set of application states are the unindexed application state 41_616. In one embodiment, the remote application state indexer 41_610 adds an application state to the index set of application states once the application state has been engaged by one or more devices a requisite number of times. For example and one embodiment, an application state is added to the indexed set of application states if that application state is engaged 50 times. In alternate embodiments, an application state can be added to the index set of application states if that application state has been engaged more or less times. In one embodiment, the number of requisite times and application state is to be engaged before being indexed in the application index can vary depending on the type of application state. For example and in one embodiment, an application state that includes geographically localized information (e.g., an application state for a regional coupon) may need to be engaged a fewer number of times as opposed to an application state that does not have the geographically localized information.

In this embodiment, indexing the application states after a requisite number of times that application state has been engaged increases the likelihood that this application state is useful for other users. For example in one embodiment, many different user on different devices use a local transit application and generate application states for the local bus route 7. In this example, this is popular route, so this application state is engaged by the users by accessing this application state via a local search service. This application state is indexed by the remote application state indexer 41_610 and is available to a remote search service.

In one embodiment, the remote application state indexer 41_610 determines if an application state has been sent before by computing a hash for that application state. If this hash matches other hashes stored by the remote application state indexer 41_610, the remote application state indexer 41_610 increments the number of times that application state has been received by the remote application indexer. If the requisite number of times has been received, the remote application state indexer 41_610 indexes that application state. Indexing an application state is further described in FIG. 41_8 below.

FIG. 41_7 is a block diagram of one embodiment of a system that searches application states using a remote application state search index. In FIG. 41_7, a device 41_702 is coupled to a remote application state search service 41_714. In one embodiment, the device 41_702 includes an application 41_704 that is coupled to a local search service 41_708. The local search service 41_708 is further coupled to an application state search index 41_716. In one embodiment, the device 41_702, application 41_704, local search service 41_708 (including application state search module 41_710), and application state search index 41_716 are the device, application, local search service, and application state search index as described in FIG. 41_2 above. In another embodiment, the local search service 41_708 can forward the query 41_706 to the remote application state search service 41_714, where the remote application state search service 41_714 determines if there is a set of results for the query. The remote application state search service 41_714 returns the set of results to the local search service 41_708, which in turn, returns the set of results to the application 41_704. Alternatively, the application 41_704 can send the query to the remote application state search service 41_714, which in turn sends the set of query results back to the application 41_704.

As described above, the remote application state search service 41_714 receives a query from the device 41_702 and returns a set of query results for that query back to the device 41_702. In one embodiment, the remote application state search service 41_714 receives the query, searches the index application states 41_712 for application states matching the received query, scores each of the matching application states, ranks this set of results, and returns the ranked results to the application. The application 41_704 displays the results with the application states. In one embodiment, the application 41_704 displays an icon of the application, the application state title, and an application state summary as described in FIG. 41_3 above. Upon selection of the displayed application state, the application is loaded with the application state. In one embodiment, the application is in the same state as the application would be as if the user had engaged this application state if this application state was locally stored on this device.

FIG. 41_8 is a flow diagram of one embodiment of a process 41_800 to add an application state to an application state index. In one embodiment, process 41_800 is performed by an application state exporter module to add an application state to an application state index, such as the application state exporter module 41_606 as described in FIG. 41_6 above. In FIG. 41_8, process 41_800 begins by receiving an application state at block 41_802. In one embodiment, the application state is received by process 41_800 from one or more applications are running on the device that is executing process 41_800. At block 41_804, process 41_800 determines if the application state has been engaged. In one embodiment, an application state is engaged if that application state is returned in a set of results matching the query and the user has selected that application state to load into an application. If the application state has not been engaged, execution proceeds to block 41_802 above. If the application state has been engaged, process 41_800 sanitizes the application state of block 41_806. In one embodiment, process 41_800 sanitizes the application state by removing private information associated with and/or stored in the application state as described above in FIG. 41_6. At block 41_808, process 41_800 sends the sanitized application state to a remote application state indexing service. In one embodiment, the remote application state indexing service possibly adds this application state to an application state index.

FIG. 41_9 is a flow diagram of one embodiment of a process 41_900 to index an application state by an application state indexing service. In one embodiment, process 41_900 is performed by a remote application state indexer to index and application state, such as the remote application state indexer 41_610 as described in FIG. 41_6 above. In FIG. 41_9, process 41_900 begins by receiving an indication application state from a device in block 41_902. In one embodiment, the application state indication is a hash of the application state. By receiving an application state hash instead of the full application state, process 41_900 does not receive the application state until the application state is common across multiple clients or has been engaged a requisite number of times. At block 41_904, process 41_900 increments the number of occurrences of this application state. In one embodiment, process 41_900 maintains a counter of this application state hash. If this is the first time process 41_900 has received this indication, the counter is 1. Process 41_900 determines if the number of occurrences is greater than a threshold at block 41_906. In one embodiment, an application state that has been received by process 41_900 the requisite number of times means that this application state has been engaged a number of times and is a candidate to be indexed and available to serve queries. For example and in one embodiment, an application state for particular coupon of a coupon application, may be made available to an application state index if this application state has been engaged 50 times. If the number of occurrences is greater than the threshold, process 41_900 sends a request at block 41_908 for the full application state to the device that sent the last application state indication. Process 41_900 receives the application state at block 41_910. Process 41_900 indexes the application state at block 41_912. By indexing the application state, process 41_900 is making this application state available to be part of a set of results for a query.

In another embodiment, instead requesting the full application state at the last receipt of the application state indication, process 41_900 starts to incrementally build the application state until process 41_900 receives the final piece of the application state and indexes the application state. For example and in one embodiment, process 41_900 asks the last M clients to send process 900 1/Mth of the application state. In this example, because the application state generates the same application state hash, this is the same application state. This means that these M pieces of the application state can be joined by process 41_900. This embodiment may provide additional privacy because parts of the application state are transmitted each time that allows process 41_900 to build the complete application state.

FIG. 41_10 is a flow chart of one embodiment of a process 41_1000 to perform a query search using an application state index. In one embodiment, process 41_1000 is performed by a remote application state search service to perform a query search using an application state index, such as the remote application state search service 41_714 as described above in FIG. 41_7. In FIG. 41_10, process 41_1000 begins by receiving a query from a client at block 41_1002. In one embodiment, a query is a search string that is input by user in the application and sent to the remote search service as described above. At block 41_1004, process 41_1000 searches the application state index using the query. In one embodiment, process 41_1000 determines if there are any application states that match the query. Process 41_1000 determines a set of results for the query at block of 41_1006. In one embodiment, the set of results includes one or more application states that match some or all of the text in the query. At block 41_1008, process 41_1000 ranks the set of results. In one embodiment, process 41_1000 ranks the set of results by determining the score for each of the results and ranking these results using those scores. At block 41_1010, process 41_1000 combines a set of results with results from other search domains. In one embodiment, if the search is a federated search, where the same query is used to search different indices, process 41_1000 combines results from other search domains with the set of results determined using the application state index. For example and in one embodiment, the query may be used to search the application state index, a general web search index, and/or different indices (e.g., media index, application store index, maps index, online encyclopedia index, and/or another type of index). At block 41_1012, process 41_1000 returns a set of ranked results, along with the other results generated in block 41_1010, to the client.

FIG. 41_11 is a flow diagram of one embodiment of a process 41_1100 to receive and present an application state as part of a query result. In one embodiment, process 41_1100 is performed by an application to receive and present an application state as part of the query result, such as application 41_704 described in FIG. 41_7 above. In FIG. 41_11, process 41_1100 begins by sending a query to a remote search service at block 41_1102. In one embodiment, the query can be a search string that is input by user in the application and sent to the remote search service. In this embodiment, the input can be entered by text, spoken word, automatically generated, received from a coupled device (e.g., a smart watch coupled to a portable device), and/or some other way to enter a search string. At block 41_1104, process 41_1100 receives a set of results, where the results include an application state. In this embodiment, the application state is sanitized application state that has been engaged by a user a requisite number of times as described in FIG. 41_6 above. In one embodiment, the set of results are ranked with the top-ranked result being a top hit. At block 41_1106, process 41_1100 presents the application state in a user interface. In this embodiment, the application state includes an application state title, summary, and an indication of an icon corresponding to the application for this application state. In one embodiment, process 41_1100 displays the application state as described in FIG. 41_2 above. In response to the application being selected, process 41_1100 launches at block 41_1108 the corresponding application using the selected application state. For example and in one embodiment, if the application state is a review of a local restaurant for a review type application, process 41_1100 launches the review type application with the local restaurant application state. In this example, the review type application would be launched such that the view presented to the user is the one of the local restaurant in the review type application. In one embodiment, if the application is not installed on the device, process 41_1100 can download the application from a remote source, such as an application store, webpage, or other remote server. In this embodiment, process 41_1100 would install the application and launch the application using the selected application state.

FIG. 41_12 is a block diagram of one embodiment of a system 41_1200 that indexes application state views for use in a remote search index. In FIG. 41_12, device 41_1202 is coupled to an application state storage 41_1208 and application state index 41_1209. In one embodiment, device 41_1202 retrieves the application states stored in the application state storage 41_1208, and for each of the application states, the device 41_1202 generates a view for each of these application states. In one embodiment, the view of an application state is a representation of a user interface of the application corresponding to that application state. For example in one embodiment, a user interface can include text, images, video, audio, animation, graphics, and/or other types of user interface components. In this example, the corresponding view is a two-dimensional representation of the user interface. In one embodiment, one application may have many different views generated based on the different application states that are associated with this application. For example and in one embodiment, a review type application that has access to content for thousands or millions of reviews for businesses and services can have a view for each of the thousands or millions of reviews. A view is further described in FIG. 41_13 below.

In one embodiment, the application states stored in the application state storage 41_1208 may be application states that have been engaged by user a requisite number of times as explained above in FIG. 41_6. Alternatively, the application state storage 41_1208 may also include unindexed application states. In addition, the application state index 41_1209 includes indexed application states that have views generated for those application states. In this embodiment, these views can be returned along with the application state as part of a set of results for a query. A search engine 41_1210 includes an application state search service 41_1212 that receives queries from the devices 41_1214. The application state search service 41_1212 receives queries from the devices 41_1214, searches the application state index using these queries, determines matching application states for the queries that have associated views, scores the matching application states, ranks the matching application states, and returns these matching application states as a set of results to the device that sent the original query.

As described above, an application state can have an associated view. FIG. 41_13 is a block diagram of one embodiment of an application state view 41_1302. In FIG.

41_13, a device 41_1300 has an application executing that is in a particular application state. The application in this application state displays the application state user interface 41_1302 (also referred to application state view 41_1302). The application state user interface 41_1302 can include a variety of components, such as an icon, text, image, video, audio, animation, graphics, and/or other types of user interface components. For example and in one embodiment, the application state user interface 41_1302 includes image 41_1304, text 41_1306, and icon 41_1308. In one embodiment, a view can be generated from this application state user interface 41_1302. In this environment, the view is a representation of the application state user interface 41_1302 that can be saved and indexed along with this application state in the application state index. For example and in one embodiment, the view for the application state user interface 41_1302 is a two-dimensional image, such as a GIF, JPEG, PNG, and/or another type of two-dimensional image. In this example, the two-dimensional image of the view can be stored with the application state in the application state index.

FIG. 41_14 is a flow chart of one embodiment of a process 41_1400 to generate an application state view using an application state. In one embodiment, process 41_1400 is performed by an application state view generator and indexer to generate an application state view using an application state, such as the application state view generator and indexer 41_1204 described in FIG. 41_12 above. In FIG. 41_14, process 41_1400 begins by receiving an application state at block 41_1402. In one embodiment, process 41_1400 receives the application state from an application state storage, such as the application state storage 41_1208 as described in FIG. 41_12 above. At block 41_1404, process 41_1400 generates the application state view using this application state. In one embodiment, process 41_1400 generates the application state view by simulating the application using that application state. In this embodiment, the application is executed in a simulator with this application state. Process 41_1400 can capture the application user interface for this application state using a private framework of the simulator. Alternatively, process 41_1400 could load the application onto a virtual platform or the device itself and use a mechanism to generate a view of that application state. At block 41_1406, process 41_1400 adds the application state view to the application state index for the corresponding application state.

By generating these application state views, process 41_1400 can generate a multitude of views for one or more applications. These views can be used to preview the application state and also the application in general. In one embodiment, these application state views can be used to preview and application state that is returned in a set of results for a query or can be used in general to preview application. Using the view with the query is further described in FIG. 41_15 below. In one embodiment, collecting a number of application state views for one application can be used to preview that application. For example and in one embodiment, a review type application may have dozens of application state views available for this application. For someone who is interested in this review type application, for example, viewing the application in application store, these application state views can be made available so that the user can preview the application before purchasing and/or downloading the application. In this example, the user may scrub through the dozens of views, forwards and backwards, to get an idea of what the application would look like.

FIG. 41_15 is a flow chart of one embodiment of a process 41_1500 to receive and present an application state that includes an application state view as part of a query result. In one embodiment, process 41_1500 is performed by a device to receive and present an application state view as part of the query result, such as device 41_1214 described in FIG. 41_12 above. In FIG. 41_15, process 41_1500 begins by sending a query to a remote search service at block 41_1502. In one embodiment, the query can be a search string that is input by user in the application and sent to the remote search service. In this embodiment, the input can be entered by text, spoken word, automatically generated, received from a coupled device (e.g., a smart watch coupled to a portable device), and/or some other way to enter a search string. At block 41_1504, process 41_1500 receives a set of results, where the results include an application state. In this embodiment, the application state is sanitized application state that has been engaged by a user a requisite number of times as described in FIG. 41_6 above. In one embodiment, the set of results are ranked with the top-ranked result being a top hit. At block 41_1506, process 41_1500 presents the application state in a user interface. In this embodiment, the application state includes an application state title, summary, an indication of an icon corresponding to the application for this application state, and an indication of an availability of a corresponding application view. In response to the application state view being selected, process 41_1500 retrieves and presents the application state view at block 41_1508. In one embodiment, by displaying the application state view, a user can get a preview of the application executing in this application state. This can be helpful to the user in deciding whether to select the application state. In another embodiment, preview the view maybe be faster than launching the application with this application state, even if the application is installed on the device. For example and in one embodiment, if the application state view is a review of a local restaurant for a review type application, process 41_1500 retrieves and displays the application state view.

Example Machine-Readable Media, Methods, and Systems for Client, Server, Web Aspects of In-App Search In one aspect, a method and apparatus of a device is provided that performs a search using a plurality of application states is described. In an exemplary embodiment, the device receives a plurality of application states from a plurality of applications running on a device. The device further creates an index of the plurality of application states. In addition, the device receives a query to search for data stored on the device. Furthermore, the device searches the plurality of application states using the index and the query. The device additionally determines a match for the query of one of the plurality of the application states and returns the match for the matching application state.

In some embodiments, a machine-readable medium is provided that has executable instructions to cause one or more processing units to perform a method to perform a search using a plurality of application states, the method comprising: receiving a plurality of application states from a plurality of applications running on a device; creating an index of the plurality of application states, the index stored on the device; receiving a query to search for data stored on the device; searching the plurality of application states using the index and the query; determining a match for the query of one of the plurality of the application states; and returning the match for the matching application state. In some embodiments, each of the plurality of application states includes data representing a snapshot in time of an application for that application state. In some embodiments, there are multiple application states for one of the plurality of applications. In some embodiments, the query is used to search files stored on the device in addition to the searching of the plurality of application states. In some embodiments, one of the plurality of application states includes user interface information that represents a view position of user interface data used by the corresponding one of the plurality of applications.

In some embodiments, a machine-readable medium is provided that has executable instructions to cause one or more processing units to perform a method to perform a query using a plurality of application states, the method comprising: performing the query on a device using an index stored on the device; receiving a plurality of results matching the query; determining a subset of the plurality of results that correspond to an application state corresponding to a native application installed on the device; and presenting, for each of the results in the subset of the plurality of results, that result and a representation of the native application corresponding to the result.

In another aspect, a method and apparatus of a device is provided that selects an application state for use in a multi-device search is described. In this embodiment, the device detects, on the device, that the application state has been selected as a query result for a device-level search on that device. The device further transmits the application state to a server, wherein the application state is to be indexed with other application states from other devices. In some embodiments, a machine-readable medium is provided that has executable instructions to cause one or more processing units to perform a method to select an application state for use in a multi-device search, the method comprising: detecting, on a device, that the application state has been selected as a query result for a device-level search on that device; and transmitting the application state to a server, wherein the application state is indexed with other application states from other devices.

In some embodiments, a machine-readable medium is provided that has executable instructions to cause one or more processing units to perform a method to perform a search for a first device using an application state received from a second device, the method comprising: receiving a plurality of application states from a plurality of applications running on a plurality of devices; creating an index of the plurality of application states; receiving a query to search for data stored on the device; searching the plurality of application states using the index and the search query; determining a match for the search query of one of the plurality of the application states; and returning the match for the matching application state. In some embodiments, the creating the index comprises: adding one of plurality of application states to the index if that application state is received a number of times meeting a threshold. In some embodiments, a machine-readable medium is provided that has executable instructions to cause one or more processing units to perform a method to perform a search, the method comprising: transmitting a query to a server from a device; receiving a plurality of results matching the query; determining a subset of the plurality of results that each includes an application state generated on another device corresponding to a native application installed on the device; and presenting, for each of the results in the subset of the plurality of results, a link and a representation of the native application.

In one more aspect, a method and apparatus of a device is provided that indexes an application state in a search query index. In this embodiment, receiving the application state of the application from another device coupled to the server. The device further generates a view of the application corresponding to the application state, wherein the view is a representation of a user interface of the application corresponding to the application state. In addition, the device indexes the view in a search query index. In some embodiments, a machine-readable medium is provided that has executable instructions to cause one or more processing units to perform a method to index an application state view in a search query index, the method comprising: receiving, with a server, the application state of the application from a device coupled to the server; generating a view of the application corresponding to the application state, wherein the view is a representation of a user interface of the application corresponding to the application state; and indexing the view in a search query index. In some embodiments, further comprising: linking the view to an index entry for the application state. In some embodiments, the index entry is part of an index, wherein the index includes a plurality of index entries of application states for a plurality of applications that originate from a plurality of devices coupled to the server. In some embodiments, the application state includes data representing a snapshot in time of an application for that application state. In some embodiments, the index entry includes information selected from the group of a title, searchable data, and application specific opaque data. In some embodiments, the view is an image. In some embodiments, the view is an image with multiple frames. In some embodiments, the generating comprises: executing the application on a virtual device; and capturing a screen image of a user interface of the application corresponding to the application state. In some embodiments, the generating comprises: simulating the application with the application state; and capturing a screen image of a user interface of the application corresponding to the application state.

In some embodiments, a machine-readable medium is provided that has executable instructions to cause one or more processing units to perform a method to retrieve an application state having an associated view with a query result, the method comprising: sending a query to a server; receiving a result to the query from the server, wherein the result includes the view of an application state of an application corresponding to the result and the view is a representation of a user interface of the application corresponding to the application state; and presenting the result with an indication of the view. In some embodiments, further comprising: presenting the view in response to a gesture by a user.

Functional Block Diagrams of Example Electronic Devices

Figure 42:
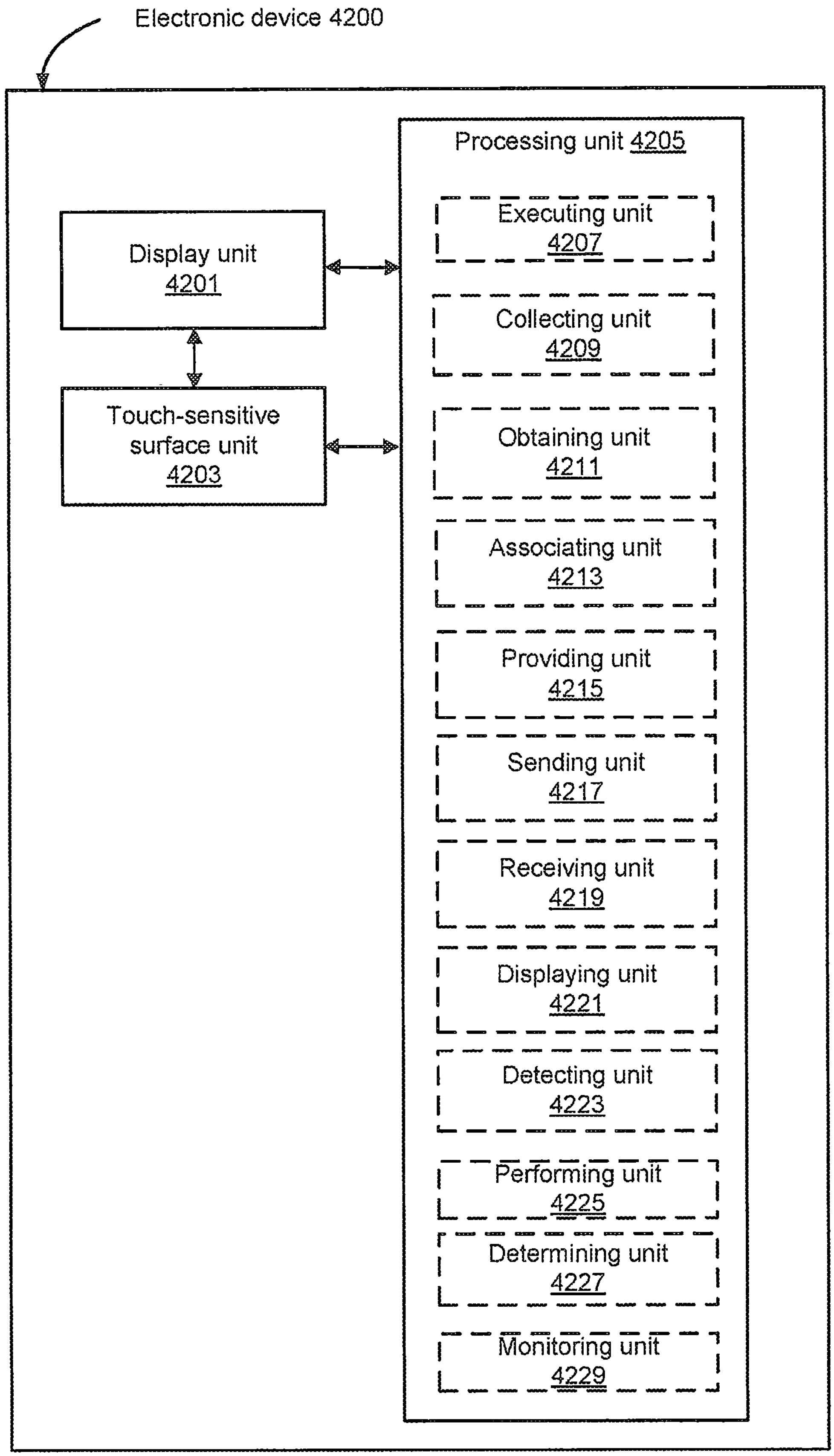

In accordance with some embodiments, FIG. 42 shows a functional block diagram of an electronic device 4200 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 42 are, optionally, combined or separated into sub-blocks to implement the principles of the various described embodiments. Therefore, the description herein optionally supports any possible combination or separation or further definition of the functional blocks described herein. For ease of discussion, the electronic device 4200 is implemented as a portable multifunction device 100 (FIGS. 1A-1B).

As shown in FIG. 42, the electronic device 4200, includes a display unit 4201 configured to display information (e.g., touch-sensitive display system 112 (also referred to as a touch screen and touch screen display), FIG. 1A), a touch-sensitive surface unit 4203 (e.g., display controller 156 and touch-sensitive display system 112, FIG. 1A) configured to receive contacts, gestures, and other user inputs on the touch screen display, and a processing unit 4205 coupled with the display unit 4201 and the touch-sensitive surface unit 4203. In some embodiments, the electronic device is configured in accordance with any one of the computing devices shown in FIG. 1E (e.g., Computing Devices A-D). For ease of illustration, FIG. 42 shows display unit 4201 and touch-sensitive surface unit 4203 as integrated with electronic device 4200, however, in some embodiments one or both of these units are in communication with the electronic device, although the units remain physically separate from the electronic device. In some embodiments, the processing unit includes an executing unit (e.g., executing unit 4207, FIG. 42), a collecting unit (e.g., collecting unit 4209, FIG. 42), an obtaining unit (e.g., obtaining unit 4211, FIG. 42), an associating unit (e.g., associating unit 4213, FIG. 42), a providing unit (e.g., providing unit 4215, FIG. 42), a sending unit (e.g., sending unit 4217, FIG. 42), a receiving unit (e.g., receiving unit 4219, FIG. 42), a displaying unit (e.g., displaying unit 4221, FIG. 42), a detecting unit (e.g., detecting unit 4223, FIG. 42), a performing unit (e.g., performing unit 4225, FIG. 42), a determining unit (e.g., determining unit 4227, FIG. 42), and a monitoring unit (e.g., monitoring unit 4229, FIG. 42).

In some embodiments, processing unit 4205 (or one or more components thereof, such as the units 1007-1029) is configured to: execute (e.g., with the executing unit 4207), on the electronic device, an application in response to an instruction from a user of the electronic device; while executing the application, collect usage data (e.g., with the collecting unit 4209), the usage data at least including one or more actions performed by the user within the application; automatically, without human intervention, obtain (e.g., with the obtaining unit 4211) at least one trigger condition based on the collected usage data; associate (e.g., with the associating unit 4213) the at least one trigger condition with a particular action of the one or more actions performed by the user within the application; and upon determining that the at least one trigger condition has been satisfied, provide (e.g., with the providing unit 4215) an indication to the user that the particular action associated with the trigger condition is available. In some embodiments of the electronic device 4200, the processing unit (or one or more components thereof, such as the units 4207-4229) is further configured to perform the method of any one of A2-A22 as described above in the "Summary" section.

Figure 43:
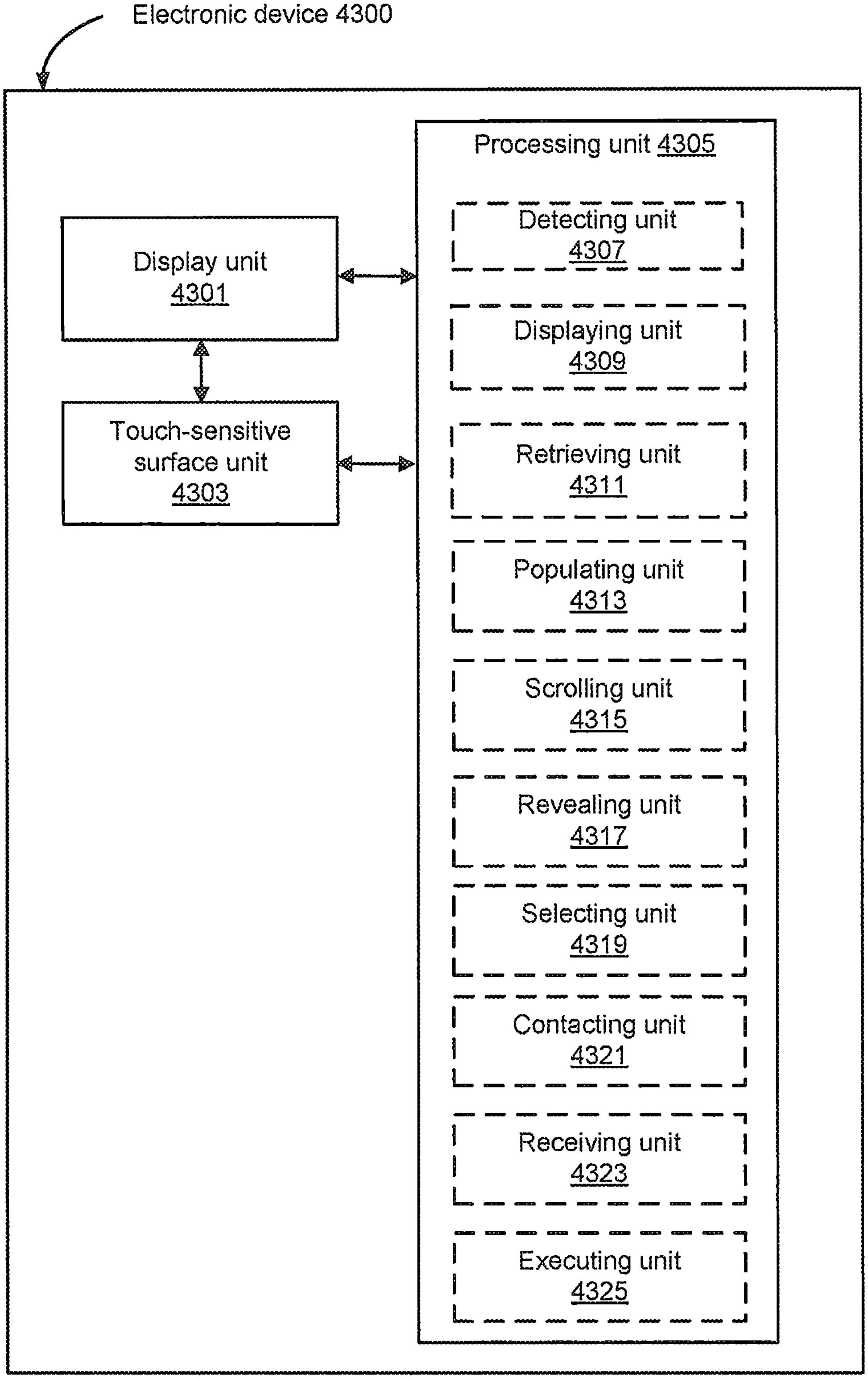

In accordance with some embodiments, FIG. 43 shows a functional block diagram of an electronic device 4300 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 43 are, optionally, combined or separated into sub-blocks to implement the principles of the various described embodiments. Therefore, the description herein optionally supports any possible combination or separation or further definition of the functional blocks described herein. For ease of discussion, the electronic device 4300 is implemented as a portable multifunction device 100 (FIGS. 1A-1B).

As shown in FIG. 43, the electronic device 4300, includes a display unit 4301 configured to display information (e.g., touch-sensitive display system 112 (also referred to as a touch screen and touch screen display), FIG. 1A), a touch-sensitive surface unit 4303 (e.g., display controller 156 and touch-sensitive display system 112, FIG. 1A) configured to receive contacts, gestures, and other user inputs on the touch screen display, and a processing unit 4305 coupled with the display unit 4301 and the touch-sensitive surface unit 4303. In some embodiments, the electronic device is configured in accordance with any one of the computing devices shown in FIG. 1E (e.g., Computing Devices A-D). For ease of illustration, FIG. 43 shows display unit 4301 and touch-sensitive surface unit 4303 as integrated with electronic device 4300, however, in some embodiments one or both of these units are in communication with the electronic device, although the units remain physically separate from the electronic device. In some embodiments, the processing unit includes a displaying unit (e.g., displaying unit 4309, FIG. 43), a detecting unit (e.g., detecting unit 4307, FIG. 43), a retrieving unit (e.g., retrieving unit 4311, FIG. 43), a populating unit (e.g., populating unit 4313, FIG. 43), a scrolling unit (e.g., scrolling unit 4315, FIG. 43), a revealing unit (e.g., revealing unit 4317, FIG. 43), a selecting unit (e.g., selecting unit 4319, FIG. 43), a contacting unit (e.g., contacting unit 4321, FIG. 43), a receiving unit (e.g., receiving unit 4323, FIG. 43), and an executing unit (e.g., executing unit 4325, FIG. 43).

In some embodiments, processing unit 4305 (or one or more components thereof, such as the units 4307-4329) is configured to: detect (e.g., with the detecting unit 4307 and/or the touch-sensitive surface unit 4303) a search activation gesture on the touch-sensitive display from a user of the electronic device; in response to detecting the search activation gesture, display (e.g., with the displaying unit 4309 and/or the display unit 4301) a search interface on the touch-sensitive display that includes: (i) a search entry portion; and (ii) a predictions portion that is displayed before receiving any user input at the search entry portion, the predictions portion populated with one or more of: (a) at least one affordance for contacting a person of a plurality of previously-contacted people, the person being automatically selected (e.g., by the selecting unit 4319) from the plurality of previously-contacted people based at least in part on a current time; and (b) at least one affordance for executing a predicted action within an application of a plurality of applications available on the electronic device, the predicted action being automatically selected (e.g., by the selecting unit 4319) based at least in part on an application usage history associated with the user of the electronic device. In some embodiments of the electronic device 4300, the processing unit (or one or more components thereof, such as the units 4307-4325) is further configured to perform the method of any one of C2-C18 as described above in the "Summary" section.

Figure 44:
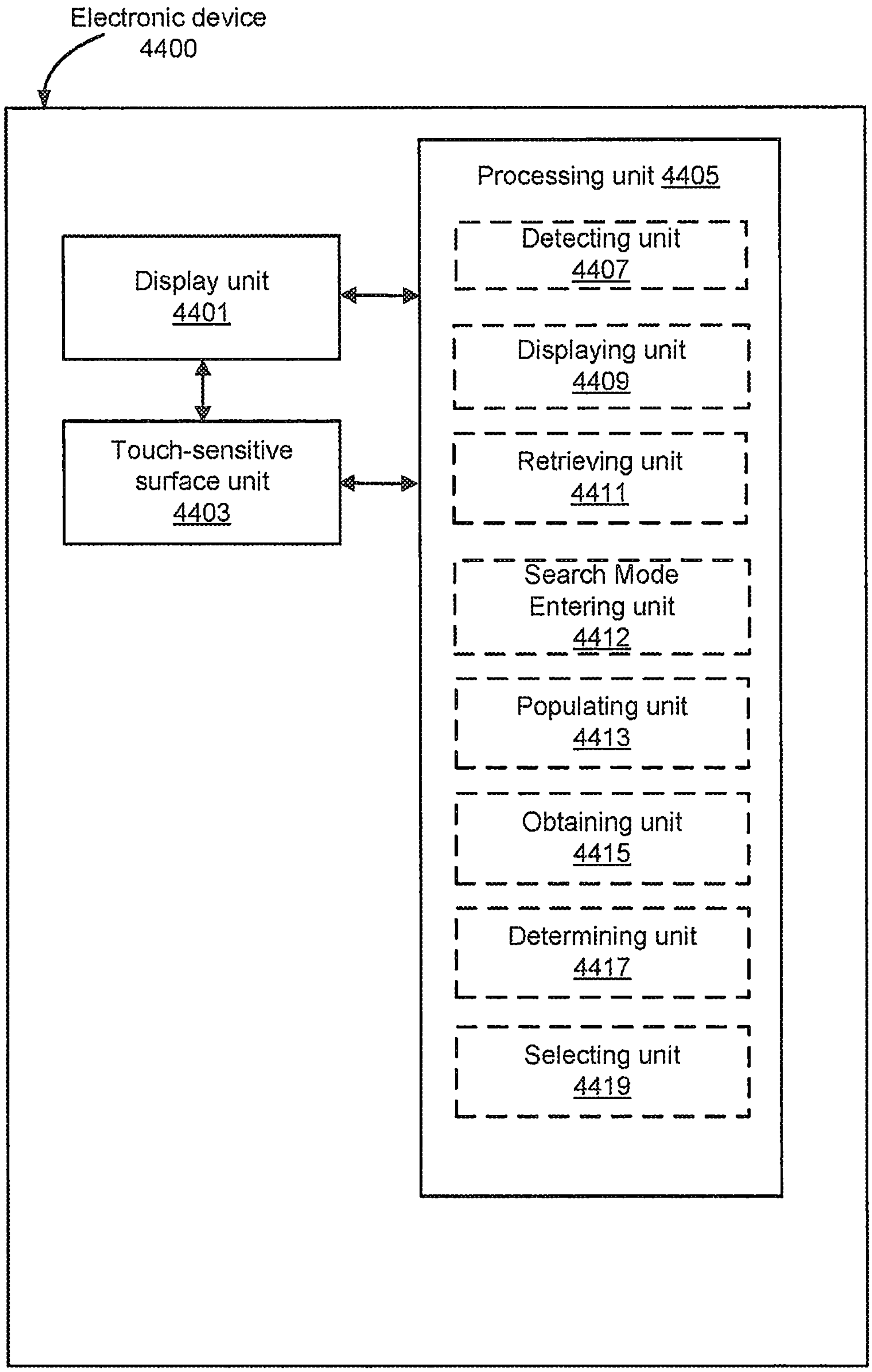

In accordance with some embodiments, FIG. 44 shows a functional block diagram of an electronic device 4400 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 44 are, optionally, combined or separated into sub-blocks to implement the principles of the various described embodiments. Therefore, the description herein optionally supports any possible combination or separation or further definition of the functional blocks described herein. For ease of discussion, the electronic device 4400 is implemented as a portable multifunction device 100 (FIGS. 1A-1B).

As shown in FIG. 44, the electronic device 4400, includes a display unit 4401 configured to display information (e.g., touch-sensitive display system 112 (also referred to as a touch screen and touch screen display), FIG. 1A), a touch-sensitive surface unit 4403 (e.g., display controller 156 and touch-sensitive display system 112, FIG. 1A) configured to receive contacts, gestures, and other user inputs on the touch screen display, and a processing unit 4405 coupled with the display unit 4401 and the touch-sensitive surface unit 4403. In some embodiments, the electronic device is configured in accordance with any one of the computing devices shown in FIG. 1E (e.g., Computing Devices A-D). For ease of illustration, FIG. 44 shows display unit 4401 and touch-sensitive surface unit 4403 as integrated with electronic device 4400, however, in some embodiments one or both of these units are in communication with the electronic device, although the units remain physically separate from the electronic device. In some embodiments, the processing unit includes a detecting unit (e.g., detecting unit 4407, FIG. 44), a displaying unit (e.g., displaying unit 4409, FIG. 44), a retrieving unit (e.g., retrieving unit 4411, FIG. 44), a search mode entering unit (e.g., the search mode entering unit 4412, FIG. 44), a populating unit (e.g., populating unit 4413, FIG. 44), a obtaining unit (e.g., obtaining unit 4415, FIG. 44), a determining unit (e.g., determining unit 4417, FIG. 44), and a selecting unit (e.g., selecting unit 4419, FIG. 44).

Processing unit 4405 (or one or more components thereof, such as the units 4407-4419) is configured to: display (e.g., with the displaying unit 4409 and/or the display unit 4401), on the display unit (e.g., the display unit 4401), content associated with an application that is executing on the electronic device; detect (e.g., with the detecting unit 4407 and/or the touch-sensitive surface unit 4403), via the touch-sensitive surface unit (e.g., the touch-sensitive surface unit 4403), a swipe gesture that, when detected, causes the electronic device to enter a search mode that is distinct from the application; in response to detecting the swipe gesture, enter the search mode (e.g., with the search mode entering unit 4412), the search mode including a search interface that is displayed on the display unit (e.g., the display unit 4401); in conjunction with entering the search mode, determine (e.g., with the determining unit 4417) at least one suggested search query based at least in part on information associated with the content; and before receiving any user input at the search interface, populate (e.g., with the populating unit 4413) the displayed search interface with the at least one suggested search query. In some embodiments of the electronic device 4400, the processing unit (or one or more components thereof, such as the units 4407-4419) is further configured to perform the method of any one of D2-D16 as described above in the "Summary" section.

Figure 45:
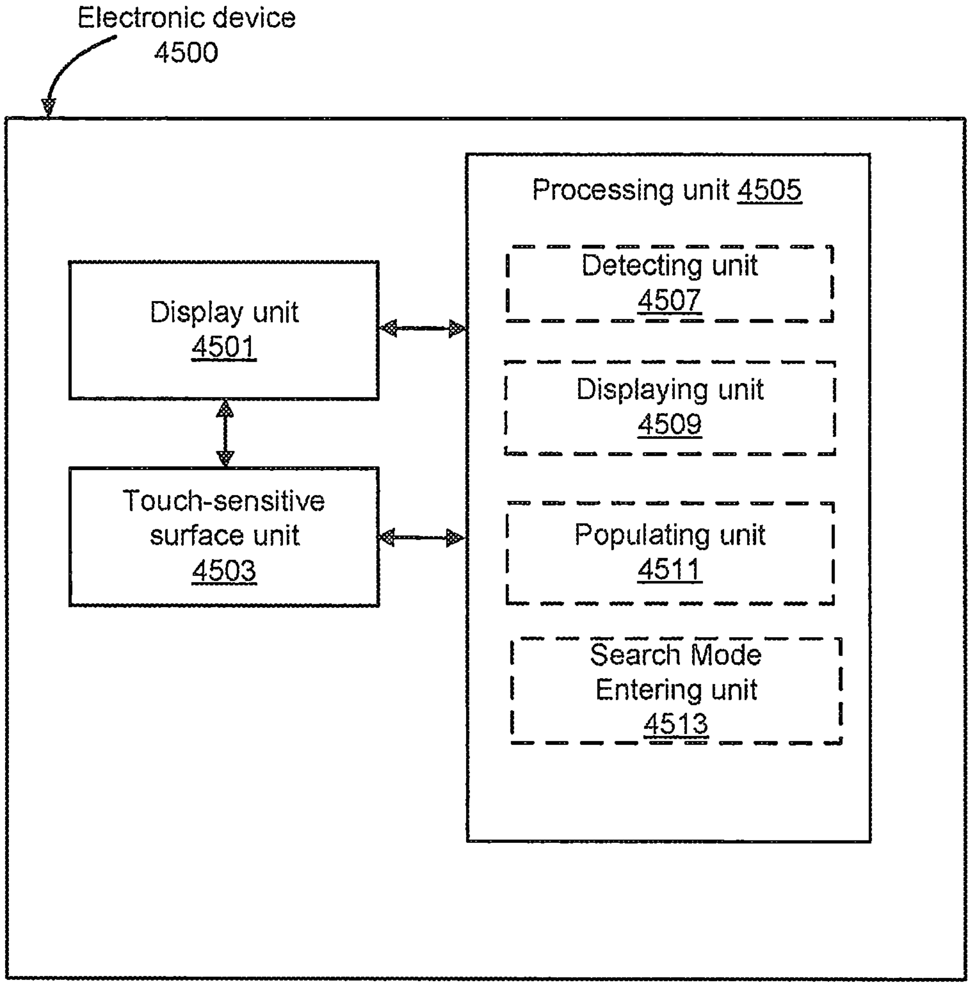

In accordance with some embodiments, FIG. 45 shows a functional block diagram of an electronic device 4500 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 45 are, optionally, combined or separated into sub-blocks to implement the principles of the various described embodiments. Therefore, the description herein optionally supports any possible combination or separation or further definition of the functional blocks described herein. For ease of discussion, the electronic device 4500 is implemented as a portable multifunction device 100 (FIGS. 1A-1B).

As shown in FIG. 45, the electronic device 4500, includes a display unit 4501 configured to display information (e.g., touch-sensitive display system 112 (also referred to as a touch screen and touch screen display), FIG. 1A), a touch-sensitive surface unit 4503 (e.g., display controller 156 and touch-sensitive display system 112, FIG. 1A) configured to receive contacts, gestures, and other user inputs on the touch screen display, and a processing unit 4505 coupled with the display unit 4501 and the touch-sensitive surface unit 4503. In some embodiments, the electronic device is configured in accordance with any one of the computing devices shown in FIG. 1E (e.g., Computing Devices A-D). For ease of illustration, FIG. 45 shows display unit 4501 and touch-sensitive surface unit 4503 as integrated with electronic device 4500, however, in some embodiments one or both of these units are in communication with the electronic device, although the units remain physically separate from the electronic device. In some embodiments, the processing unit includes a detecting unit (e.g., detecting unit 4507, FIG. 45), a displaying unit (e.g., displaying unit 4509, FIG. 45), a populating unit (e.g., populating unit 4511, FIG. 45), and a search mode entering unit (e.g., the search mode entering unit 4513, FIG. 45).

Processing unit 4505 (or one or more components thereof, such as the units 1007-1029) is configured to: detect (e.g., with the detecting unit 4507 and/or the touch-sensitive surface unit 4503), via the touch-sensitive surface unit (e.g., the touch-sensitive surface unit 4503), a swipe gesture over a user interface, wherein the swipe gesture, when detected, causes the electronic device to enter a search mode; and in response to detecting the swipe gesture, enter the search mode (e.g., with the search mode entering unit 4513), and entering the search mode includes populating (e.g., with the populating unit 4511 and/or the displaying unit 4509 and/or the display unit 4501) a search interface distinct from the user interface, before receiving any user input within the search interface, with a first content item. In some embodiments, in accordance with a determination that the user interface includes content that is associated with an application that is distinct from a home screen that includes selectable icons for invoking applications, populating the search interface with the first content item includes populating (e.g., with the populating unit 4511) the search interface with at least one suggested search query that is based at least in part on the content that is associated with the application; and in accordance with a determination that the user interface is associated with a page of the home screen, populating the search interface with the first content item includes populating (e.g., with the populating unit 4511) the search interface with an affordance that includes a selectable description of at least one point of interest that is within a threshold distance of a current location of the electronic device. In some embodiments of the electronic device 4500, the processing unit (or one or more components thereof, such as the units 4507-4513) is further configured to perform the method of E2 as described above in the "Summary" section.

Figure 46:
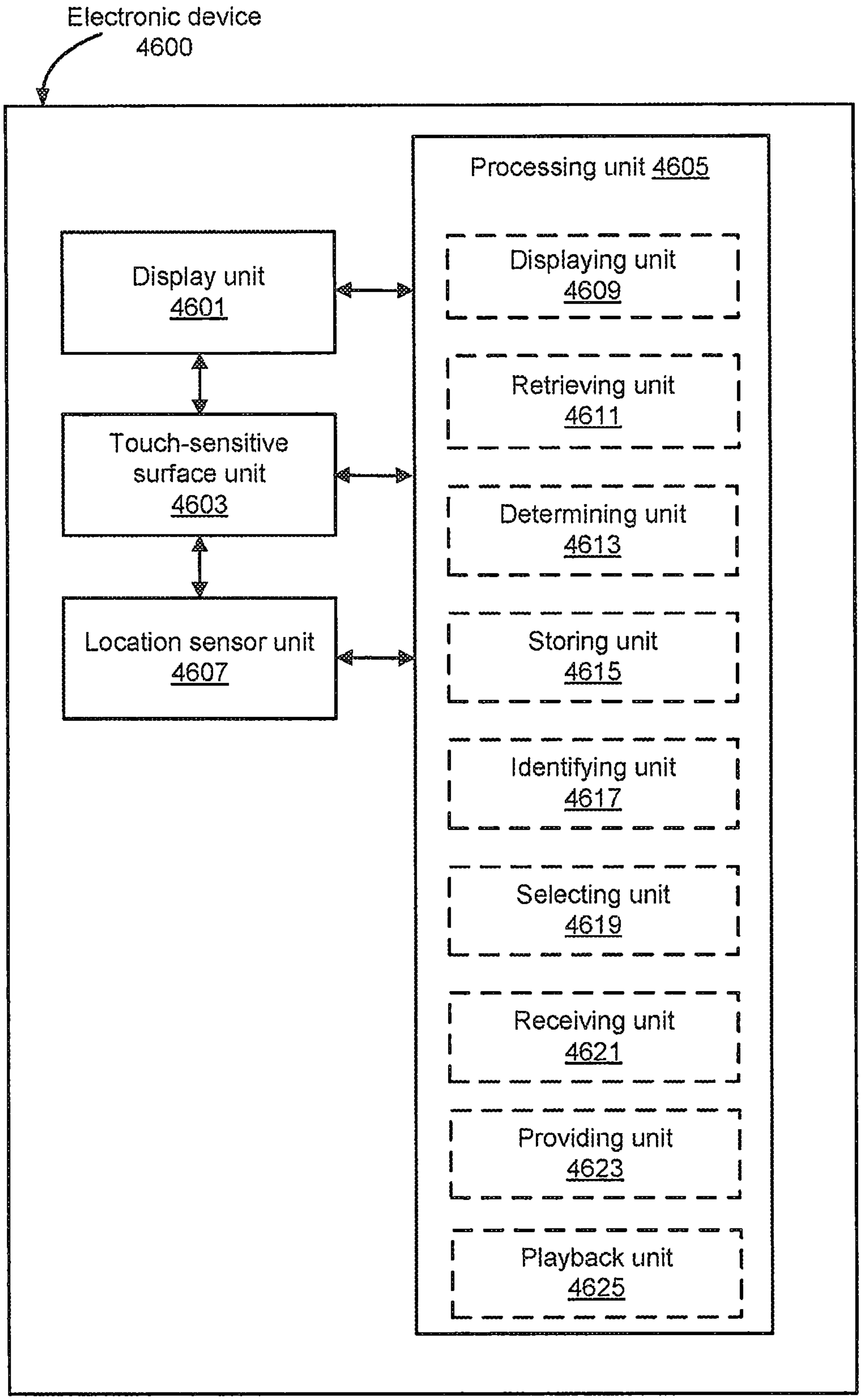

In accordance with some embodiments, FIG. 46 shows a functional block diagram of an electronic device 4600 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 46 are, optionally, combined or separated into sub-blocks to implement the principles of the various described embodiments. Therefore, the description herein optionally supports any possible combination or separation or further definition of the functional blocks described herein. For ease of discussion, the electronic device 4600 is implemented as a portable multifunction device 100 (FIGS. 1A-1B).

As shown in FIG. 46, the electronic device 4600, includes a display unit 4601 configured to display information (e.g., touch-sensitive display system 112 (also referred to as a touch screen and touch screen display), FIG. 1A), a touch-sensitive surface unit 4603 (e.g., display controller 156 and touch-sensitive display system 112, FIG. 1A) configured to receive contacts, gestures, and other user inputs on the touch screen display, a location sensor unit 4607 configured to obtain positioning information for the electronic device, and a processing unit 4605 coupled with the display unit 4601, the touch-sensitive surface unit 4603, and the location sensor unit 4607. In some embodiments, the electronic device is configured in accordance with any one of the computing devices shown in FIG. 1E (e.g., Computing Devices A-D). For ease of illustration, FIG. 46 shows display unit 4601 and touch-sensitive surface unit 4603 as integrated with electronic device 4600, however, in some embodiments one or both of these units are in communication with the electronic device, although the units remain physically separate from the electronic device. In some embodiments, the processing unit includes a displaying unit (e.g., displaying unit 4609, FIG. 46), a retrieving unit (e.g., retrieving unit 4611, FIG. 46), an determining unit (e.g., determining unit 4613, FIG. 46), a storing unit (e.g., storing unit 4615, FIG. 46), an identifying unit (e.g., identifying unit 4617, FIG. 46), a selecting unit (e.g., selecting unit 4619, FIG. 46), a receiving unit (e.g., receiving unit 4621, FIG. 46), a providing unit (e.g., providing unit 4623, FIG. 46), and a playback unit (e.g., playback unit 4625, FIG. 46).

Processing unit 4605 (or one or more components thereof, such as the units 4609-4625) is configured to: automatically, and without instructions from a user: determine (e.g., with the determining unit 4613) that a user of the electronic device is in a vehicle that has come to rest at a geographic location; upon determining that the user has left the vehicle at the geographic location, determine (e.g., with the determining unit 4613) whether positioning information, retrieved (e.g., with the retrieving unit 4621) from the location sensor unit (e.g., the location sensor unit 4607) to identify (e.g., with the identifying unit 4617) the geographic location, satisfies accuracy criteria; upon determining (e.g., with the determining unit 4613) that the positioning information does not satisfy the accuracy criteria, provide (e.g., with the providing unit 4623) a prompt to the user to input information about the geographic location; and in response to providing the prompt, receive (e.g., with the receiving unit 4621) information from the user about the geographic location and store (e.g., with the storing unit 4615) the information as vehicle location information. In some embodiments of the electronic device 4600, the processing unit (or one or more components thereof, such as the units 4609-4625) is further configured to perform the method of any one of F2-F16 as described above in the "Summary" section.

Figure 47:
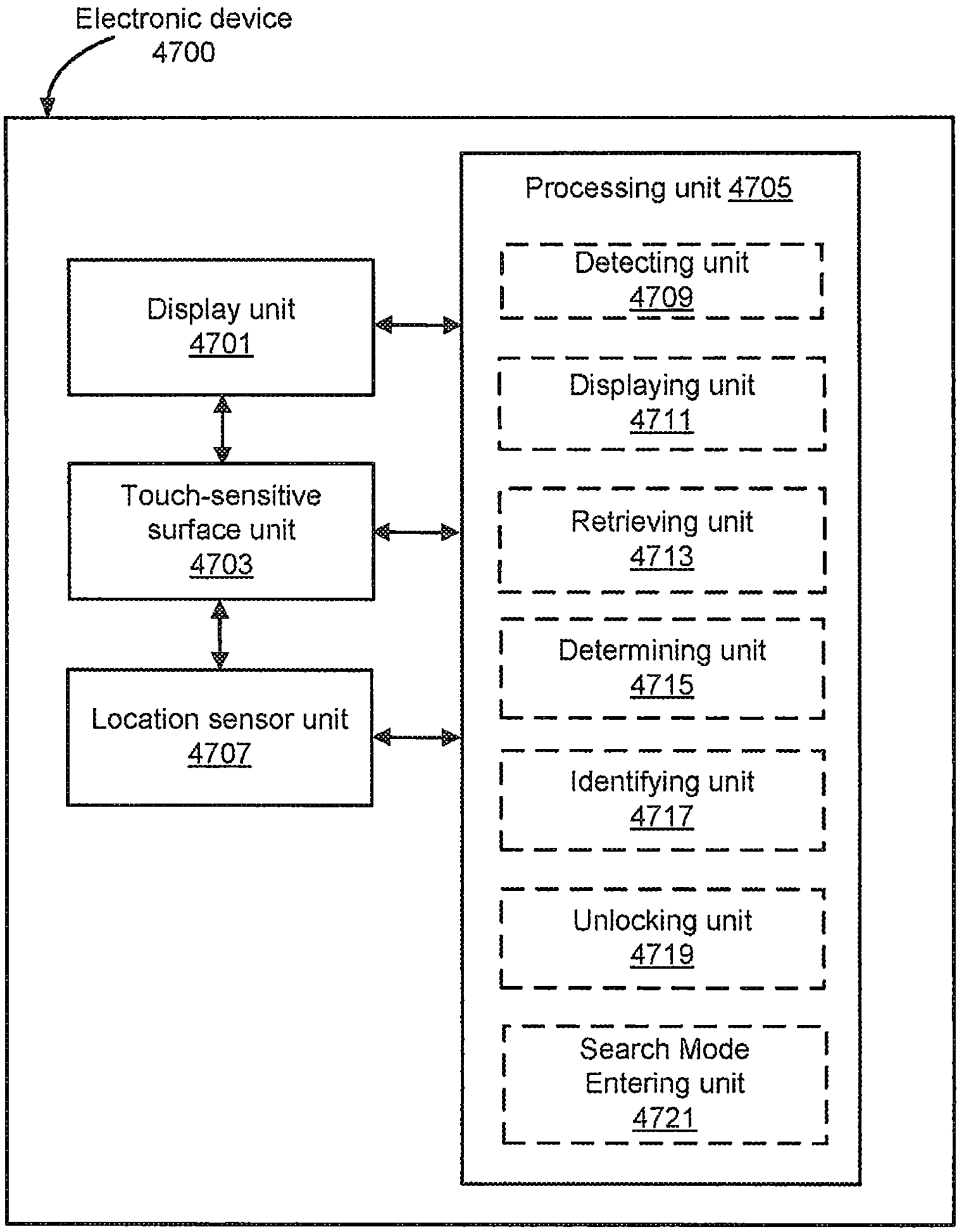

In accordance with some embodiments, FIG. 47 shows a functional block diagram of an electronic device 4700 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 47 are, optionally, combined or separated into sub-blocks to implement the principles of the various described embodiments. Therefore, the description herein optionally supports any possible combination or separation or further definition of the functional blocks described herein. For ease of discussion, the electronic device 4700 is implemented as a portable multifunction device 100 (FIGS. 1A-1B).

As shown in FIG. 47, the electronic device 4700, includes a display unit 4701 configured to display information (e.g., touch-sensitive display system 112 (also referred to as a touch screen and touch screen display), FIG. 1A), a touch-sensitive surface unit 4703 (e.g., display controller 156 and touch-sensitive display system 112, FIG. 1A) configured to receive contacts, gestures, and other user inputs on the touch screen display, a location sensor unit 4707 configured to obtain positioning information for the electronic device, and a processing unit 4705 coupled with the display unit 4701 and the touch-sensitive surface unit 4703. In some embodiments, the electronic device is configured in accordance with any one of the computing devices shown in FIG. 1E (e.g., Computing Devices A-D). For ease of illustration, FIG. 47 shows display unit 4701 and touch-sensitive surface unit 4703 as integrated with electronic device 4700, however, in some embodiments one or both of these units are in communication with the electronic device, although the units remain physically separate from the electronic device. In some embodiments, the processing unit includes a detecting unit (e.g., detecting unit 4709, FIG. 47), a displaying unit (e.g., displaying unit 4711, FIG. 47), a retrieving unit (e.g., retrieving unit 4713, FIG. 47), a determining unit (e.g., determining unit 4715, FIG. 47), an identifying unit (e.g., identifying unit 4717, FIG. 47), an unlocking unit (e.g., unlocking unit 4719, FIG. 47), and a search mode entering unit (e.g., search mode entering unit 4721, FIG. 47).

Processing unit 4705 (or one or more components thereof, such as the units 4709-4721) is configured to: without receiving any instructions from a user of the electronic device: monitor, using the location sensor unit (e.g., the location sensor unit 4707), a geographic position of the electronic device; determine (e.g., with the determining unit 4715), based on the monitored geographic position, that the electronic device is within a threshold distance of a point of interest of a predetermined type; in accordance with determining that the electronic device is within the threshold distance of the point of interest: identify (e.g., with the identifying unit 4717) at least one activity that is currently popular at the point of interest; retrieve (e.g., with the retrieving unit 4713) information about the point of interest, including retrieving information about at least one activity that is currently popular at the point of interest; detect (e.g., with the detecting unit 4709 and/or the touch-sensitive surface unit 4703), via the touch-sensitive surface unit (e.g., the touch-sensitive surface unit 4703), a first input that, when detected, causes the electronic device to enter a search mode; and in response to detecting the first input, enter the search mode (e.g., with the search mode entering unit 4721), and entering the search mode includes, before receiving any user input at the search interface, present (e.g., with the displaying unit 4711 and/or the display unit 4701), via the display unit (e.g., the display unit 4701), an affordance that includes (i) the information about the at least one activity and (ii) an indication that the at least one activity has been identified as currently popular at the point of interest. In some embodiments of the electronic device 4700, the processing unit (or one or more components thereof, such as the units 4709-4721) is further configured to perform the method of any one of G2-G10 as described above in the "Summary" section.

Figure 48:
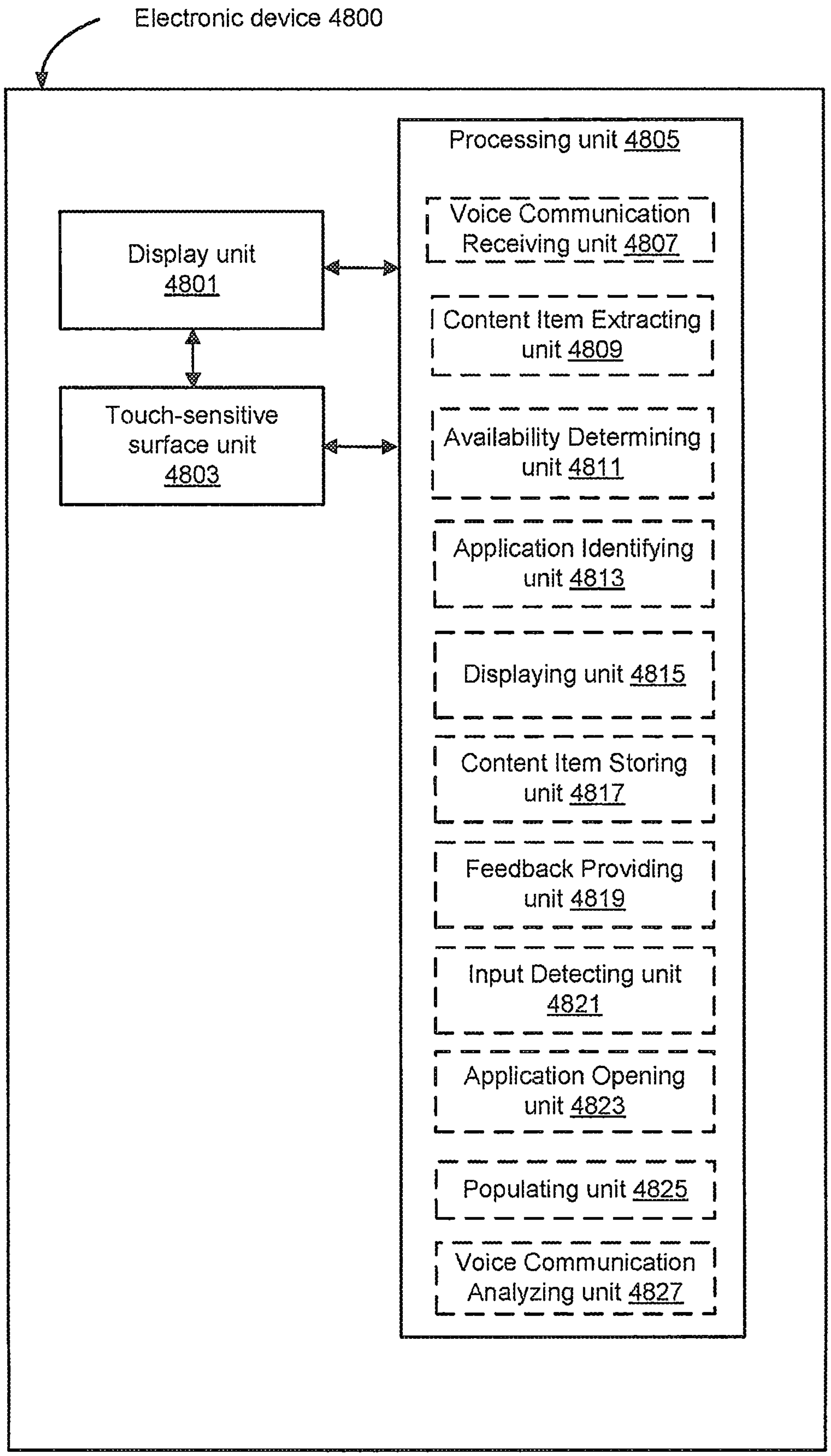

In accordance with some embodiments, FIG. 48 shows a functional block diagram of an electronic device 4800 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 48 are, optionally, combined or separated into sub-blocks to implement the principles of the various described embodiments. Therefore, the description herein optionally supports any possible combination or separation or further definition of the functional blocks described herein. For ease of discussion, the electronic device 4800 is implemented as a portable multifunction device 100 (FIGS. 1A-1B).

As shown in FIG. 48, the electronic device 4800, includes a display unit 4801 configured to display information (e.g., touch-sensitive display system 112 (also referred to as a touch screen and touch screen display), FIG. 1A), a touch-sensitive surface unit 4803 (e.g., display controller 156 and touch-sensitive display system 112, FIG. 1A) configured to receive contacts, gestures, and other user inputs on the touch screen display, and a processing unit 4805 coupled with the display unit 4801 and the touch-sensitive surface unit 4803. In some embodiments, the electronic device is configured in accordance with any one of the computing devices shown in FIG. 1E (e.g., Computing Devices A-D). For ease of illustration, FIG. 48 shows display unit 4801 and touch-sensitive surface unit 4803 as integrated with electronic device 4800, however, in some embodiments one or both of these units are in communication with the electronic device, although the units remain physically separate from the electronic device. The processing unit includes a voice communication receiving unit (e.g., voice communication receiving unit 4807, FIG. 48), a content item extracting unit (e.g., content item extracting unit 4809, FIG. 48), an availability determining unit (e.g., availability determining unit 4811, FIG. 48), an application identifying unit (e.g., application identifying unit 4813, FIG. 48), a displaying unit (e.g., displaying unit 4815, FIG. 48), a content item storing unit (e.g., content item storing unit 4817, FIG. 48), a feedback providing unit (e.g., feedback providing unit 4819, FIG. 48), an input detecting unit (e.g., input detecting unit 4821, FIG. 48), an application opening unit (e.g., receiving unit 4823, FIG. 48), a populating unit (e.g., populating unit 4825, FIG. 48), and a voice communication analyzing unit (e.g., voice communication analyzing unit 4827, FIG. 48).

In some embodiments, the processing unit (or one or more components thereof, such as the units 4807-4827) is configured to: receive at least a portion of a voice communication (e.g., with the voice communication receiving unit 4807), the portion of the voice communication including speech provided by a remote user of a remote device that is distinct from a user of the electronic device. The processing unit is further configured to: extract a content item (e.g., with the content item extracting unit 4809) based at least in part on the speech provided by the remote user of the remote device and determine whether the content item is currently available on the electronic device (e.g., with the availability determining unit 4811). In accordance with a determination that the content item is not currently available on the electronic device, the processing unit is further configured to: (i) identify an application that is associated with the content item (e.g., with the application identifying unit 4813) and (ii) display a selectable description of the content item on the display (e.g., with the displaying unit 4815 and/or the display unit 4801). In response to detecting a selection of the selectable description (e.g., with the input detecting unit 4821 and/or the touch-sensitive surface unit 4803), the processing unit is configured to: store the content item for presentation with the identified application (e.g., with the content item storing unit 4817).

In some embodiments of the electronic device 4800, the content item is a new event.

In some embodiments of the electronic device 4800, the content item is new event details for an event that is currently associated with a calendar application on the electronic device.

In some embodiments of the electronic device 4800, the content item is a new contact.

In some embodiments of the electronic device 4800, the content item is new contact information for an existing contact that is associated with a telephone application on the electronic device.

In some embodiments of the electronic device 4800, the voice communication is a live phone call.

In some embodiments of the electronic device 4800, the voice communication is a live FaceTime call.

In some embodiments of the electronic device 4800, the voice communication is a recorded voicemail.

In some embodiments of the electronic device 4800, displaying the selectable description includes displaying the selectable description within a user interface that includes recent calls made using a telephone application (e.g., with the displaying unit 4815 and/or the display unit 4801).

In some embodiments of the electronic device 4800, the selectable description is displayed with an indication that the content item is associated with the voice communication (e.g., using the displaying unit 4815 and/or the display unit 4801).

In some embodiments of the electronic device 4800, detecting the selection includes receiving the selection while the user interface that includes recent calls is displayed (e.g., using the input detecting unit 4821).

In some embodiments of the electronic device 4800, the processing unit is further configured to: in conjunction with displaying the selectable description of the content item, provide feedback (e.g., using the feedback providing unit 4819) to the user of the electronic device that the content item has been detected.

In some embodiments of the electronic device 4800, providing feedback includes sending information regarding detection of the content item to a different electronic device that is proximate to the electronic device (e.g., via the feedback providing unit 4819).

In some embodiments of the electronic device 4800, the processing unit is further configured to: determine that the voice communication includes information about a first physical location; detect an input (e.g., via the input detecting unit 4821); and, in response to detecting the input, open an application that is capable of accepting location data and populating the application with information about the first physical location (e.g., via the application opening unit 4823).

In some embodiments of the electronic device 4800, the application is a maps application and populating the maps application with information about the first physical location includes populating a map that is displayed within the maps application with a location identifier that corresponds to the first physical location.

In some embodiments of the electronic device 4800, the processing unit is further configured to: determine that the voice communication includes information about a first physical location; detecting an input (e.g., via the input detecting unit 4821) and, in response to detecting the input, populate a search interface with information about the first physical location (e.g., via the populating unit 4825).

In some embodiments of the electronic device 4800, extracting the content item includes analyzing the portion of the voice communication to detect content of a predetermined type, and the analyzing is performed while outputting the voice communication via an audio system in communication with the electronic device.

In some embodiments of the electronic device 4800, analyzing the voice communication includes (e.g., using the voice communication analyzing unit 4827): (i) converting the speech provided by the remote user of the remote device to text; (ii) applying a natural language processing algorithm to the text to determine whether the text includes one or more predefined keywords; and (iii) in accordance with a determination that the text includes a respective predefined keyword, determining that the voice communication includes speech that describes the content item.

In some embodiments of the electronic device 4800, receiving at least the portion of the voice communication includes receiving an indication (e.g., an instruction) from a user of the electronic device that the portion of the voice communication should be analyzed.

In some embodiments of the electronic device 4800, the indication corresponds to selection of a hardware button.

In some embodiments of the electronic device 4800, the indication corresponds to a command from a user of the electronic device that includes the words "hey Siri."

In some embodiments of the electronic device 4800, the processing unit is further configured to: receive a second portion of the voice communication, the second portion including speech provided by the remote user of the remote device and speech provided by the user of the electronic device (e.g., the voice communication is a live phone call and the second portion includes a discussion between the user and the remote user). The processing unit is also configured to: extract a second content item based at least in part on the speech provided by the remote user of the remote device and the speech provided by the user of the electronic device (e.g., with the content item extracting unit 4809); in accordance with a determination that the second content item is not currently available on the electronic device: (i) identify a second application that is associated with the second content item (e.g., with the application identifying unit 4813) and (ii) display a second selectable description of the second content item on the display (e.g., with the displaying unit 4815 and/or the display unit 4801). In response to detecting a selection of the second selectable description, the processing unit is configured to: store the second content item for presentation with the identified second application (e.g., with the content item storing unit 4817).

In some embodiments of the electronic device 4800, the selectable description and the second selectable description are displayed within a user interface that includes recent calls made using a telephone application.

Figure 49:
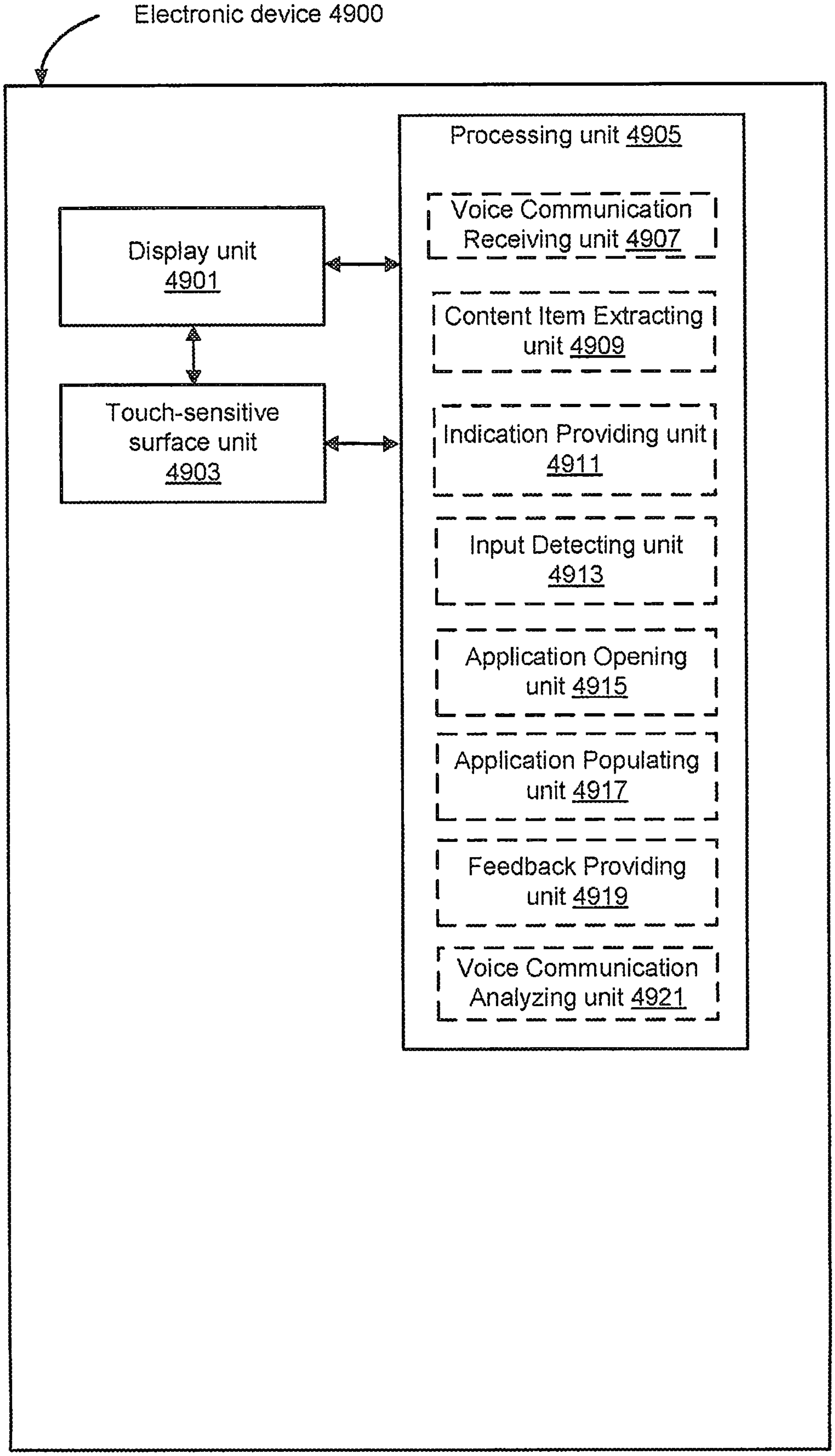

In accordance with some embodiments, FIG. 49 shows a functional block diagram of an electronic device 4900 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 49 are, optionally, combined or separated into sub-blocks to implement the principles of the various described embodiments. Therefore, the description herein optionally supports any possible combination or separation or further definition of the functional blocks described herein. For ease of discussion, the electronic device 4900 is implemented as a portable multifunction device 100 (FIGS. 1A-1B).

As shown in FIG. 49, the electronic device 4900, includes a display unit 4901 configured to display information (e.g., touch-sensitive display system 112 (also referred to as a touch screen and touch screen display), FIG. 1A), a touch-sensitive surface unit 4903 (e.g., display controller 156 and touch-sensitive display system 112, FIG. 1A) configured to receive contacts, gestures, and other user inputs on the touch screen display, and a processing unit 4905 coupled with the display unit 4901 and the touch-sensitive surface unit 4903. In some embodiments, the electronic device is configured in accordance with any one of the computing devices shown in FIG. 1E (e.g., Computing Devices A-D). For ease of illustration, FIG. 49 shows display unit 4901 and touch-sensitive surface unit 4903 as integrated with electronic device 4900, however, in some embodiments one or both of these units are in communication with the electronic device, although the units remain physically separate from the electronic device. The processing unit includes a voice communication receiving unit (e.g., voice communication receiving unit 4907, FIG. 49), a content item extracting unit (e.g., content item extracting unit 4909, FIG. 49), an indication providing unit (e.g., indication providing unit 4911, FIG. 49), an input detecting unit (e.g., input detecting unit 4913, FIG. 49), an application opening unit (e.g., application opening unit 4915, FIG. 49), an application populating unit (e.g., application populating unit 4917, FIG. 49), a feedback providing unit (e.g., feedback providing unit 4919, FIG. 49), and a voice communication analyzing unit (e.g., voice communication analyzing unit 4921, FIG. 49).

In some embodiments, the processing unit (or one or more components thereof, such as the units 4907-4921) is configured to: receive at least a portion of a voice communication, the portion of the voice communication including speech provided by a remote user of a remote device that is distinct from a user of the electronic device (e.g., with the voice communication receiving unit 4907). The processing unit is further configured to: determine that the voice communication includes speech that identifies a physical location (e.g., with the content item extracting unit 4909). In response to determining that the voice communication includes speech that identifies the physical location, the processing unit is configured to: provide an indication that information about the physical location has been detected (e.g., with the content item extracting unit 4909). The processing unit is also configured to: detect, via the touch-sensitive surface unit, an input (e.g., with the input detecting unit 4911). In response to detecting the input, the processing unit is configured to: (i) open an application that accepts geographic location data (e.g., with the application opening unit 4913) and (ii) populate the application with information about the physical location (e.g., with the application populating unit 4915).

In some embodiments of the electronic device 4900, the voice communication is a live phone call.

In some embodiments of the electronic device 4900, the voice communication is a live FaceTime call.

In some embodiments of the electronic device 4900, the voice communication is a recorded voicemail.

In some embodiments of the electronic device 4900, providing the indication includes displaying a selectable description of the physical location within a user interface that includes recent calls made using a telephone application.

In some embodiments of the electronic device 4900, the selectable description indicates that the content item is associated with the voice communication.

In some embodiments of the electronic device 4900, detecting the input includes detecting the input over the selectable description while the user interface that includes recent calls is displayed.

In some embodiments of the electronic device 4900, providing the indication includes providing haptic feedback to the user of the electronic device (e.g., with the feedback providing unit 4919).

In some embodiments of the electronic device 4900, providing the indication includes sending information regarding the physical location to a different electronic device that is proximate to the electronic device (e.g., with the feedback providing unit 4919).

In some embodiments of the electronic device 4900, determining that the voice communication includes speech that describes the physical location includes analyzing the portion of the voice communication to detect information about physical locations (e.g., using the voice communication analyzing unit 4921), and the analyzing is performed while outputting the voice communication via an audio system in communication with the electronic device.

In some embodiments of the electronic device 4900, receiving at least the portion of the voice communication includes receiving an instruction from a user of the electronic device that the portion of the voice communication should be analyzed.

In some embodiments of the electronic device 4900, the instruction corresponds to selection of a hardware button.

In some embodiments of the electronic device 4900, the instruction corresponds to a command from a user of the electronic device that includes the words "hey Siri."

Figure 50:
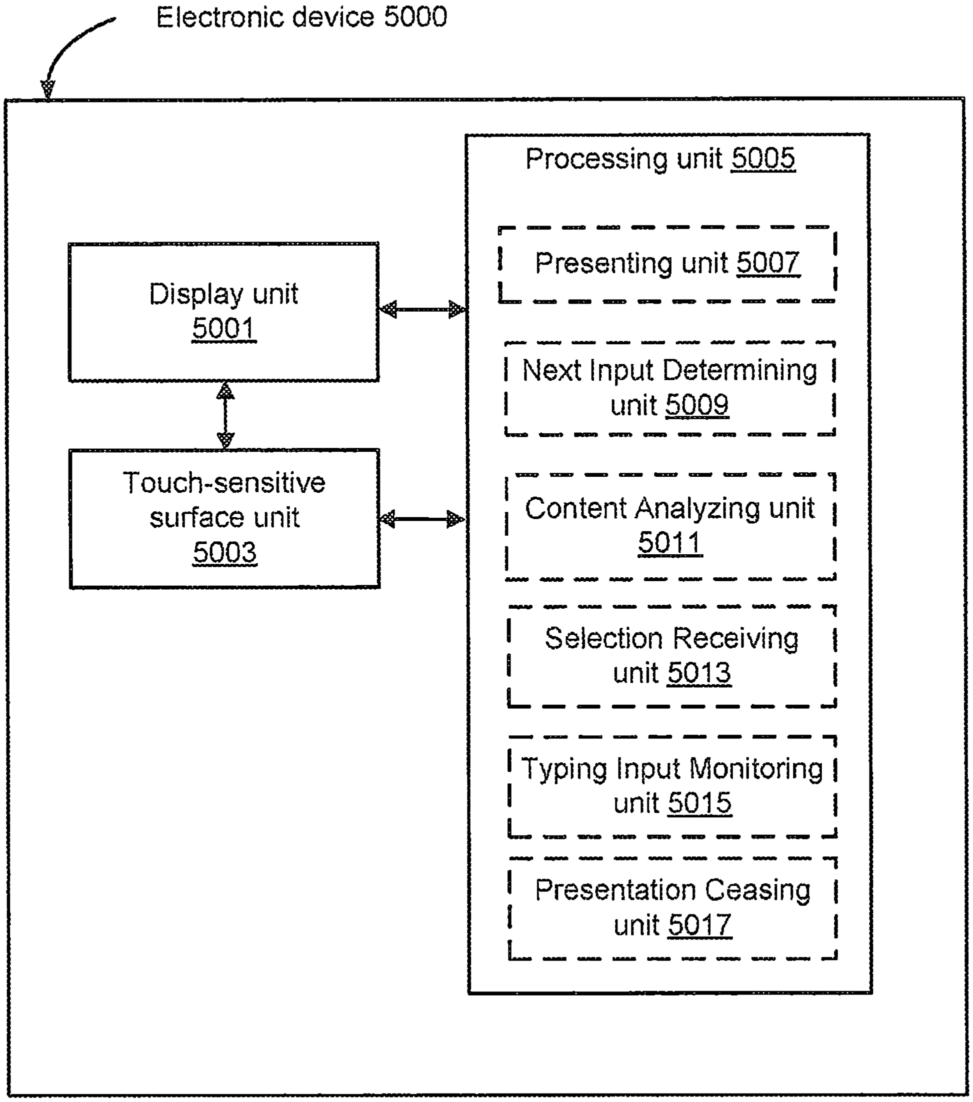

In accordance with some embodiments, FIG. 50 shows a functional block diagram of an electronic device 5000 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 50 are, optionally, combined or separated into sub-blocks to implement the principles of the various described embodiments. Therefore, the description herein optionally supports any possible combination or separation or further definition of the functional blocks described herein. For ease of discussion, the electronic device 5000 is implemented as a portable multifunction device 100 (FIGS. 1A-1B).

As shown in FIG. 50, the electronic device 5000, includes a display unit 5001 configured to display information (e.g., touch-sensitive display system 112 (also referred to as a touch screen and touch screen display), FIG. 1A), a touch-sensitive surface unit 5003 (e.g., display controller 156 and touch-sensitive display system 112, FIG. 1A) configured to receive contacts, gestures, and other user inputs on the touch screen display, and a processing unit 5005 coupled with the display unit 5001 and the touch-sensitive surface unit 5003. In some embodiments, the electronic device is configured in accordance with any one of the computing devices shown in FIG. 1E (e.g., Computing Devices A-D). For ease of illustration, FIG. 50 shows display unit 5001 and touch-sensitive surface unit 5003 as integrated with electronic device 5000, however, in some embodiments one or both of these units are in communication with the electronic device, although the units remain physically separate from the electronic device. The processing unit includes a presenting unit (e.g., presenting unit 5007, FIG. 50), a next input determining unit (e.g., next input determining unit 5009, FIG. 50), a content analyzing unit (e.g., content analyzing unit 5011, FIG. 50), a selection receiving unit (e.g., selection receiving unit 5013, FIG. 50), a typing input monitoring unit (e.g., typing input monitoring unit 5015, FIG. 50), and a presentation ceasing unit (e.g., presentation ceasing unit 5017, FIG. 50).

In some embodiments, the processing unit (or one or more components thereof, such as the units 5007-5017) is configured to: present, in a messaging application on the display, a text-input field and a conversation transcript (e.g., with the presenting unit 5007 and/or the display unit 5001). While the messaging application is presented on the display, the processing unit is also configured to: determine that the next likely input from a user of the electronic device is information about a physical location (e.g., with the next input determining unit 5009). The processing unit is additionally configured to: analyze content associated with the text-input field and the conversation transcript to determine, based at least in part on a portion of the analyzed content, a suggested physical location (e.g., with the content analyzing unit 5011); present, within the messaging application on the display, a selectable user interface element that identifies the suggested physical location (e.g., with the presenting unit 5007); receive a selection of the selectable user interface element (e.g., with the selection receiving unit 5013 and/or the touch-sensitive surface unit 5003); and in response to receiving the selection, present in the text-input field a representation of the suggested physical location (e.g., with the presenting unit 5007).

In some embodiments of the electronic device 5000, the messaging application includes a virtual keyboard and the selectable user interface element is displayed in a suggestions portion that is adjacent to and above the virtual keyboard.

In some embodiments of the electronic device 5000, determining that the next likely input from the user of the electronic device is information about a physical location includes processing the content associated with the text-input field and the conversation transcript to detect that the conversation transcription includes a question about the user's current location.

In some embodiments of the electronic device 5000, processing the content includes applying a natural language processing algorithm to detect one or more predefined keywords that form the question.

In some embodiments of the electronic device 5000, the question is included in a message that is received from a second user, distinct from the user.

In some embodiments of the electronic device 5000, determining that the next likely input from the user of the electronic device is information about a physical location includes monitoring typing inputs received from a user in the text-input portion of the messaging application (e.g., using the typing input monitoring unit 5015).

In some embodiments of the electronic device 5000, the processing unit is further configured to: in accordance with a determination that the user is typing and has not selected the selectable user interface element, cease to present the selectable user interface element (e.g., with the presentation ceasing unit 5017).

In some embodiments of the electronic device 5000, the processing unit is further configured to: in accordance with a determination that the user has provided additional input that indicates that the user will not select the selectable user interface element, cease to present the selectable user interface element (e.g., with the presentation ceasing unit 5017).

In some embodiments of the electronic device 5000, the representation of the suggested physical location includes information identifying a current geographic location of the electronic device.

In some embodiments of the electronic device 5000, the representation of the suggested physical location is an address.

In some embodiments of the electronic device 5000, the representation of the suggested physical location is a maps object that includes an identifier for the suggested physical location.

In some embodiments of the electronic device 5000, the suggested physical location corresponds to a location that the user recently viewed in an application other than the messaging application.

In some embodiments of the electronic device 5000, the messaging application is an email application.

In some embodiments of the electronic device 5000, the messaging application is a text-messaging application.

Figure 51:
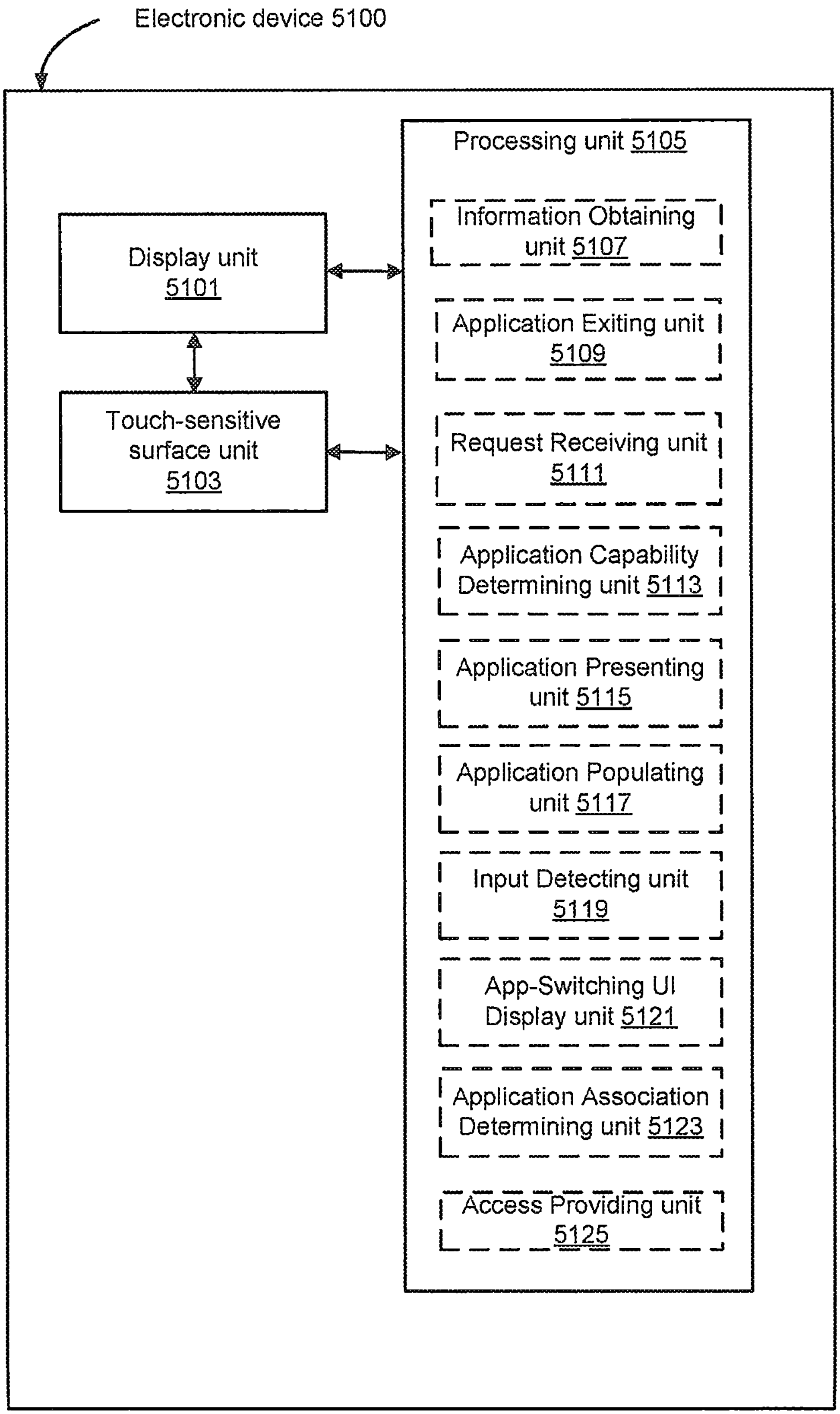

In accordance with some embodiments, FIG. 51 shows a functional block diagram of an electronic device 5100 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 51 are, optionally, combined or separated into sub-blocks to implement the principles of the various described embodiments. Therefore, the description herein optionally supports any possible combination or separation or further definition of the functional blocks described herein. For ease of discussion, the electronic device 5100 is implemented as a portable multifunction device 100 (FIGS. 1A-1B).

As shown in FIG. 51, the electronic device 5100, includes a display unit 5101 configured to display information (e.g., touch-sensitive display system 112 (also referred to as a touch screen and touch screen display), FIG. 1A), a touch-sensitive surface unit 5103 (e.g., display controller 156 and touch-sensitive display system 112, FIG. 1A) configured to receive contacts, gestures, and other user inputs on the touch screen display, and a processing unit 5105 coupled with the display unit 5101 and the touch-sensitive surface unit 5103. In some embodiments, the electronic device is configured in accordance with any one of the computing devices shown in FIG. 1E (e.g., Computing Devices A-D). For ease of illustration, FIG. 51 shows display unit 5101 and touch-sensitive surface unit 5103 as integrated with electronic device 5100, however, in some embodiments one or both of these units are in communication with the electronic device, although the units remain physically separate from the electronic device. The processing unit includes an information obtaining unit (e.g., information obtaining unit 5107, FIG. 51), an application exiting unit (e.g., application exiting unit 5109, FIG. 51), a request receiving unit (e.g., request receiving unit 5111, FIG. 51), an application capability determining unit (e.g., application capability determining unit 5113, FIG. 51), an application presenting unit (e.g., application presenting unit 5115, FIG. 51), an application populating unit (e.g., application populating unit 5117, FIG. 51), an input detecting unit (e.g., input detecting unit 5119, FIG. 51), an application-switching user interface displaying unit (e.g., application-switching user interface displaying unit 5121, FIG. 51), an application association determining unit (e.g., application association determining unit 5123, FIG. 51), and an access providing unit (e.g., access providing unit 5125, FIG. 51).

In some embodiments, the processing unit (or one or more components thereof, such as the units 5107-5125) is configured to: while displaying a first application, obtain information identifying a first physical location viewed by a user in the first application (e.g., with the information obtaining unit 5107). The processing unit is also configured to: exit the first application (e.g., with the application exiting unit 5109) and, after exiting the first application, receive a request from the user to open a second application that is distinct from the first application (e.g., with the request receiving unit 5111). In response to receiving the request and in accordance with a determination that the second application is capable of accepting geographic location information (e.g., a determination processed or conducted by the application capability determining unit 5113), present the second application (e.g., with the application presenting unit 5115), and presenting the second application includes populating the second application with information that is based at least in part on the information identifying the first physical location (e.g., with the application populating unit 5117).

In some embodiments of the electronic device 5100, receiving the request to open the second application includes, after exiting the first application, detecting an input over an affordance for the second application (e.g., with the input detecting unit 5119).

In some embodiments of the electronic device 5100, the affordance for the second application is an icon that is displayed within a home screen of the electronic device.

In some embodiments of the electronic device 5100, detecting the input includes: (i) detecting a double tap at a physical home button, (ii) in response to detecting the double tap, displaying an application-switching user interface (e.g., with the app-switching user interface display unit 5121), and (iii) detecting a selection of the affordance from within the application-switching user interface.

In some embodiments of the electronic device 5100, populating the second application includes displaying a user interface object that includes information that is based at least in part on the information identifying the first physical location.

In some embodiments of the electronic device 5100, the user interface object includes a textual description informing the user that the first physical location was recently viewed in the first application.

In some embodiments of the electronic device 5100, the user interface object is a map displayed within the second application and populating the second application includes populating the map to include an identifier of the first physical location.

In some embodiments of the electronic device 5100, the second application is presented with a virtual keyboard and the user interface object is displayed above the virtual keyboard.

In some embodiments of the electronic device 5100, obtaining the information includes obtaining information about a second physical location and displaying the user interface object includes displaying the user interface object with the information about the second physical location.

In some embodiments of the electronic device 5100, the determination that the second application is capable of accepting geographic location information includes one or more of (e.g., one or more determinations conducted by the application association determining unit 5123 and/or the application capability determining unit 5113): (i) determining that the second application includes an input-receiving field that is capable of accepting and processing geographic location data; (ii) determining that the second application is capable of displaying geographic location information on a map; (iii) determining that the second application is capable of using geographic location information to facilitate route guidance; and (iv) determining that the second application is capable of using geographic location information to locate and provide transportation services.

In some embodiments of the electronic device 5100, the determination that the second application is capable of accepting geographic location information includes determining that the second application includes an input-receiving field that is capable of accepting and processing geographic location data, and the input-receiving field is a search box that allows for searching within a map that is displayed within the second application.

In some embodiments of the electronic device 5100, the processing unit is further configured to: in response to receiving the request, determine, based on an application usage history for the user, whether the second application is associated with the first application (e.g., using the application association determining unit 5123). In some embodiments of the electronic device 5100, the processing unit is further configured to: before presenting the second application, provide access to the information identifying the first physical location to the second application (e.g., using the access providing unit 5125), and before being provided with the access the second application had no access to the information identifying the first physical location.

Figure 52:
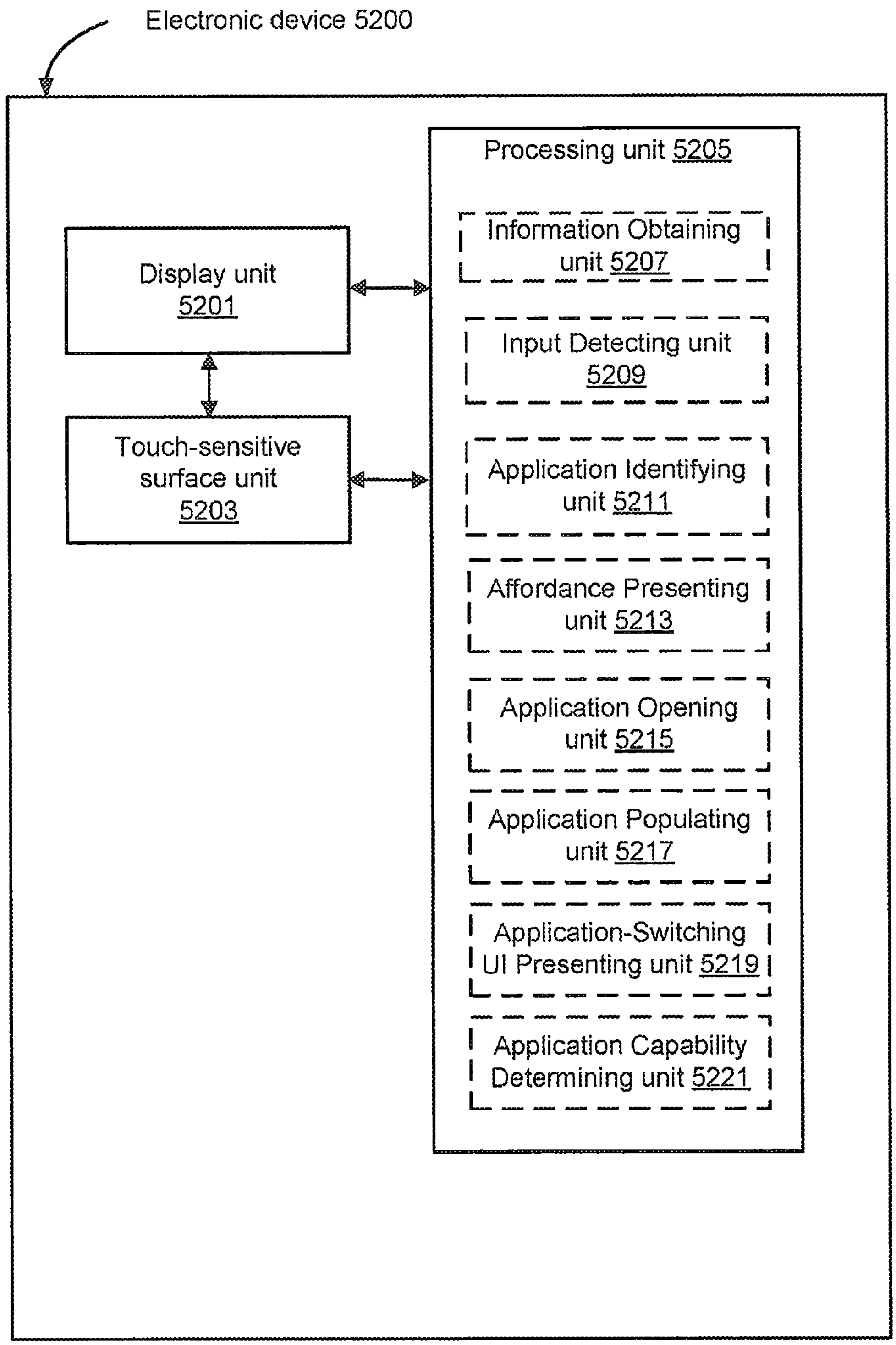

In accordance with some embodiments, FIG. 52 shows a functional block diagram of an electronic device 5200 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 52 are, optionally, combined or separated into sub-blocks to implement the principles of the various described embodiments. Therefore, the description herein optionally supports any possible combination or separation or further definition of the functional blocks described herein. For ease of discussion, the electronic device 5200 is implemented as a portable multifunction device 100 (FIGS. 1A-1B).

As shown in FIG. 52, the electronic device 5200, includes a display unit 5201 configured to display information (e.g., touch-sensitive display system 112 (also referred to as a touch screen and touch screen display), FIG. 1A), a touch-sensitive surface unit 5203 (e.g., display controller 156 and touch-sensitive display system 112, FIG. 1A) configured to receive contacts, gestures, and other user inputs on the touch screen display, and a processing unit 5205 coupled with the display unit 5201 and the touch-sensitive surface unit 5203. In some embodiments, the electronic device is configured in accordance with any one of the computing devices shown in FIG. 1E (e.g., Computing Devices A-D). For ease of illustration, FIG. 52 shows display unit 5201 and touch-sensitive surface unit 5203 as integrated with electronic device 5200, however, in some embodiments one or both of these units are in communication with the electronic device, although the units remain physically separate from the electronic device. The processing unit includes an information obtaining unit (e.g., information obtaining unit 5207, FIG. 52), an input detecting unit (e.g., input detecting unit 5209, FIG. 52), an application identifying unit (e.g., application identifying unit 5211, FIG. 52), an affordance presenting unit (e.g., affordance presenting unit 5213, FIG. 52), an application opening unit (e.g., application opening unit 5215, FIG. 52), an application populating unit (e.g., application populating unit 5217, FIG. 52), an application-switching user interface presenting unit (e.g., application-switching user interface presenting unit 5219, FIG. 52), and an application capability determining unit (e.g., application capability determining unit 5221, FIG. 52).

In some embodiments, the processing unit (or one or more components thereof, such as the units 5207-5221) is configured to: obtain information identifying a first physical location viewed by a user in a first application (e.g., with the information obtaining unit 5207) and detect a first input (e.g., with the input detecting unit 5209). In response to detecting the first input, the processing unit is configured to: (i) identify a second application that is capable of accepting geographic location information (e.g., with the application identifying unit 5209) and (ii) present, over at least a portion of the display, an affordance that is distinct from the first application with a suggestion to open the second application with information about the first physical location (e.g., with the affordance presenting unit 5213). The processing unit is also configured to: detect a second input at the affordance (e.g., with the input detecting unit 5209). In response to detecting the second input at the affordance, the processing unit is configured to: (i) open the second application (e.g., with the application opening unit 5215) and (ii) populate the second application to include information that is based at least in part on the information identifying the first physical location (e.g., with the application populating unit 5217).

In some embodiments of the electronic device 5200, the first input corresponds to a request to open an application-switching user interface (e.g., the first input is a double tap on a physical home button of the electronic device)

In some embodiments of the electronic device 5200, the affordance is presented within the application-switching user interface.

In some embodiments of the electronic device 5200, presenting the affordance includes: in conjunction with presenting the affordance, presenting within the application-switching user interface representations of applications that are executing on the electronic device (e.g., using the application-switching user interface presenting unit 5219); and presenting the affordance in a region of the display that is located below the representations of the applications.

In some embodiments of the electronic device 5200, the first input corresponds to a request to open a home screen of the electronic device (e.g., the first input is a single tap on a physical home button of the electronic device).

In some embodiments of the electronic device 5200, the affordance is presented over a portion of the home screen.

In some embodiments of the electronic device 5200, the suggestion includes a textual description that is specific to a type associated with the second application.

In some embodiments of the electronic device 5200, populating the second application includes displaying a user interface object that includes information that is based at least in part on the information identifying the first physical location.

In some embodiments of the electronic device 5200, the user interface object includes a textual description informing the user that the first physical location was recently viewed in the first application.

In some embodiments of the electronic device 5200, the user interface object is a map displayed within the second application and populating the second application includes populating the map to include an identifier of the first physical location.

In some embodiments of the electronic device 5200, the second application is presented with a virtual keyboard and the user interface object is displayed above the virtual keyboard.

In some embodiments of the electronic device 5200, identifying that the second application that is capable of accepting geographic location information includes one or more of (e.g., one or more determinations conducted using the application capability determining unit 5221): (i) determining that the second application includes an input-receiving field that is capable of accepting and processing geographic location data; (ii) determining that the second application is capable of displaying geographic location information on a map; (iii) determining that the second application is capable of using geographic location information to facilitate route guidance; and (iv) determining that the second application is capable of using geographic location information to locate and provide transportation services.

In some embodiments of the electronic device 5200, identifying that the second application is capable of accepting geographic location information includes determining that the second application includes an input-receiving field that is capable of accepting and processing geographic location data (e.g., using the application capability determining unit 5221), and the input-receiving field is a search box that allows for searching within a map that is displayed within the second application.

Figure 53:
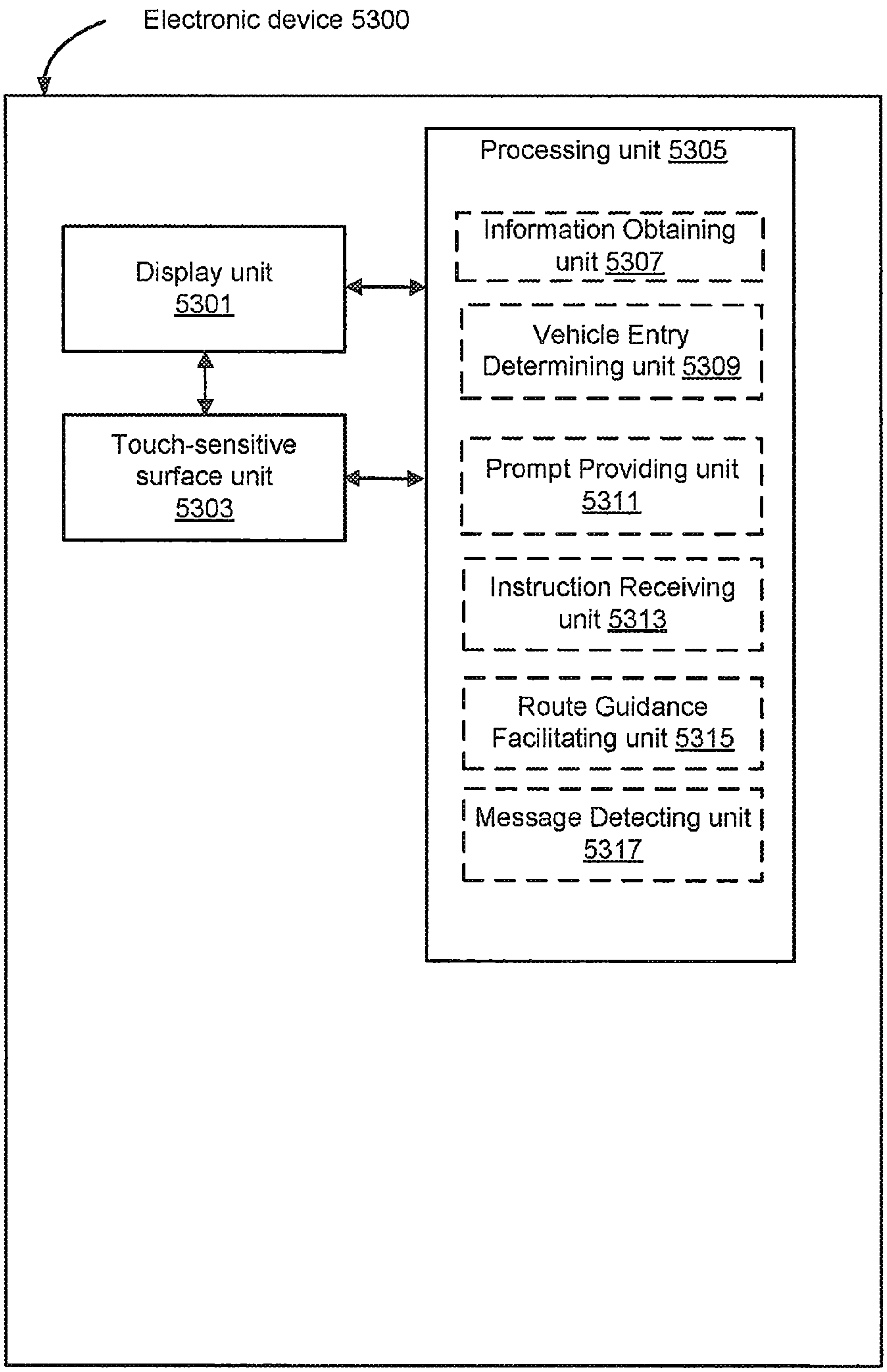

In accordance with some embodiments, FIG. 53 shows a functional block diagram of an electronic device 5300 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 53 are, optionally, combined or separated into sub-blocks to implement the principles of the various described embodiments. Therefore, the description herein optionally supports any possible combination or separation or further definition of the functional blocks described herein. For ease of discussion, the electronic device 5300 is implemented as a portable multifunction device 100 (FIGS. 1A-1B).

As shown in FIG. 53, the electronic device 5300, includes a display unit 5301 configured to display information (e.g., touch-sensitive display system 112 (also referred to as a touch screen and touch screen display), FIG. 1A), a touch-sensitive surface unit 5303 (e.g., display controller 156 and touch-sensitive display system 112, FIG. 1A) configured to receive contacts, gestures, and other user inputs on the touch screen display, and a processing unit 5305 coupled with the display unit 5301 and the touch-sensitive surface unit 5303. In some embodiments, the electronic device is configured in accordance with any one of the computing devices shown in FIG. 1E (e.g., Computing Devices A-D). For ease of illustration, FIG. 53 shows display unit 5301 and touch-sensitive surface unit 5303 as integrated with electronic device 5300, however, in some embodiments one or both of these units are in communication with the electronic device, although the units remain physically separate from the electronic device. The processing unit includes an information obtaining unit (e.g., information obtaining unit 5307, FIG. 53), a vehicle entry determining unit (e.g., vehicle entry determining unit 5309, FIG. 53), a prompt providing unit (e.g., prompt providing unit 5311, FIG. 53), an instruction receiving unit (e.g., instruction receiving unit 5313, FIG. 53), a route guidance facilitating unit (e.g., route guidance facilitating unit 5315, FIG. 53), and a message detecting unit (e.g., message detecting unit 5317, FIG. 53).

In some embodiments, the processing unit (or one or more components thereof, such as the units 5307-5317) is configured to: obtain information identifying a first physical location viewed by a user in a first application that is executing on the electronic device (e.g., with the information obtaining unit 5307). The processing unit is also configured to: determine that the user has entered a vehicle (e.g., with the vehicle entry determining unit 5309). In response to determining that the user has entered the vehicle, the processing unit is configured to: provide a prompt to the user to use the first physical location as a destination for route guidance (e.g., with the prompt providing unit 5311). In response to providing the prompt, receive from the user an instruction to use the first physical location as the destination for route guidance (e.g., with the instruction receiving unit 5313). The processing unit is additionally configured to: facilitate route guidance to the first physical location (e.g., with the route guidance facilitating unit 5307).

In some embodiments of the electronic device 5300, the processing unit is further configured to: detect that a message has been received by the electronic device, including detecting that the message includes information identifying a second physical location (e.g., via the message detecting unit 5317); and, in response to the detecting, provide a new prompt to the user to use the second physical location as a new destination for route guidance (e.g., via the prompt providing unit 5311).

In some embodiments of the electronic device 5300, the processing unit is further configured to: in response to receiving an instruction from the user to use the second physical location as the new destination, facilitate route guidance to the second physical location (e.g., via the route guidance facilitating unit 5315).

In some embodiments of the electronic device 5300, detecting that the message includes the information identifying the second physical location includes performing the detecting while a virtual assistant available on the electronic device is reading the message to the user via an audio system that is in communication with the electronic device.

In some embodiments of the electronic device 5300, determining that the user has entered the vehicle includes detecting that the electronic device has established a communications link with the vehicle.

In some embodiments of the electronic device 5300, facilitating the route guidance includes providing the route guidance via the display of the electronic device.

In some embodiments of the electronic device 5300, facilitating the route guidance includes sending, to the vehicle, the information identifying the first physical location.

In some embodiments of the electronic device 5300, facilitating the route guidance includes providing the route guidance via an audio system in communication with the electronic device (e.g., car's speakers or the device's own internal speakers).

Figure 54:
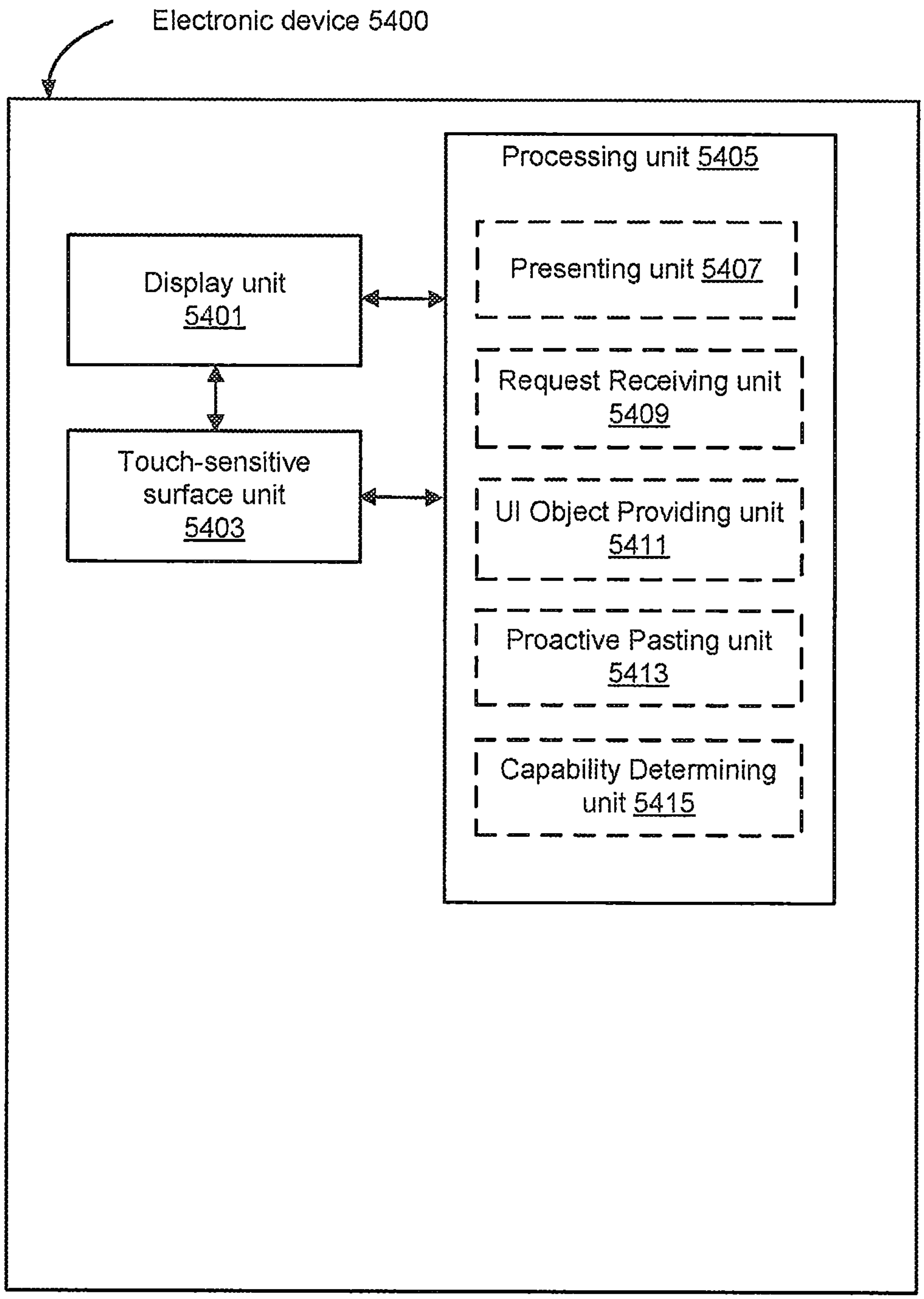

In accordance with some embodiments, FIG. 54 shows a functional block diagram of an electronic device 5400 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 54 are, optionally, combined or separated into sub-blocks to implement the principles of the various described embodiments. Therefore, the description herein optionally supports any possible combination or separation or further definition of the functional blocks described herein. For ease of discussion, the electronic device 5400 is implemented as a portable multifunction device 100 (FIGS. 1A-1B).

As shown in FIG. 54, the electronic device 5400, includes a display unit 5401 configured to display information (e.g., touch-sensitive display system 112 (also referred to as a touch screen and touch screen display), FIG. 1A), a touch-sensitive surface unit 5403 (e.g., display controller 156 and touch-sensitive display system 112, FIG. 1A) configured to receive contacts, gestures, and other user inputs on the touch screen display, and a processing unit 5405 coupled with the display unit 5401 and the touch-sensitive surface unit 5403. In some embodiments, the electronic device is configured in accordance with any one of the computing devices shown in FIG. 1E (e.g., Computing Devices A-D). For ease of illustration, FIG. 54 shows display unit 5401 and touch-sensitive surface unit 5403 as integrated with electronic device 5400, however, in some embodiments one or both of these units are in communication with the electronic device, although the units remain physically separate from the electronic device. The processing unit includes a presenting unit (e.g., presenting unit 5407, FIG. 54), a request receiving unit (e.g., request receiving unit 5409, FIG. 54), a user interface object providing unit (e.g., user interface object providing unit 5411, FIG. 54), a proactive pasting unit (e.g., proactive pasting unit 5413, FIG. 54), and a capability determining unit (e.g., capability determining unit 5415, FIG. 54).

In some embodiments, the processing unit (or one or more components thereof, such as the units 5407-5415) is configured to: present content in a first application (e.g., with the presenting unit 5407 and/or the display unit 5401); receive a request from the user to open a second application that is distinct from the first application (e.g., with the request receiving unit and/or the touch-sensitive surface unit 5403), the second application including an input-receiving field; in response to receiving the request, present the second application with the input-receiving field (e.g., with the presenting unit 5407 and/or the display unit 5401); before receiving any user input at the input-receiving field, provide a selectable user interface object to allow the user to paste at least a portion of the content into the input-receiving field (e.g., with the user interface object providing unit 5411 and/or the display unit 5401); and in response to detecting a selection of the selectable user interface object, paste the portion of the content into the input-receiving field (e.g., with the proactive pasting unit 5413).

In some embodiments of the electronic device 5400, before providing the selectable user interface object, the processing unit is further configured to: identify the input-receiving field as a field that is capable of accepting the portion of the content (e.g., with the capability determining unit 5415).

In some embodiments of the electronic device 5400, identifying the input-receiving field as a field that is capable of accepting the portion of the content is performed in response to detecting a selection of the input-receiving field.

In some embodiments of the electronic device 5400, the portion of the content corresponds to an image.

In some embodiments of the electronic device 5400, the portion of the content corresponds to textual content.

In some embodiments of the electronic device 5400, the portion of the content corresponds to textual content and an image.

In some embodiments of the electronic device 5400, the first application is a web browsing application and the second application is a messaging application.

In some embodiments of the electronic device 5400, the first application is a photo browsing application and the second application is a messaging application.

In some embodiments of the electronic device 5400, the processing unit is further configured to: before receiving the request to open to the second application, receive a request to copy at least the portion of the content.

In some embodiments of the electronic device 5400, the selectable user interface object is displayed with an indication that the portion of the content was recently viewed in the first application.

Figure 55:
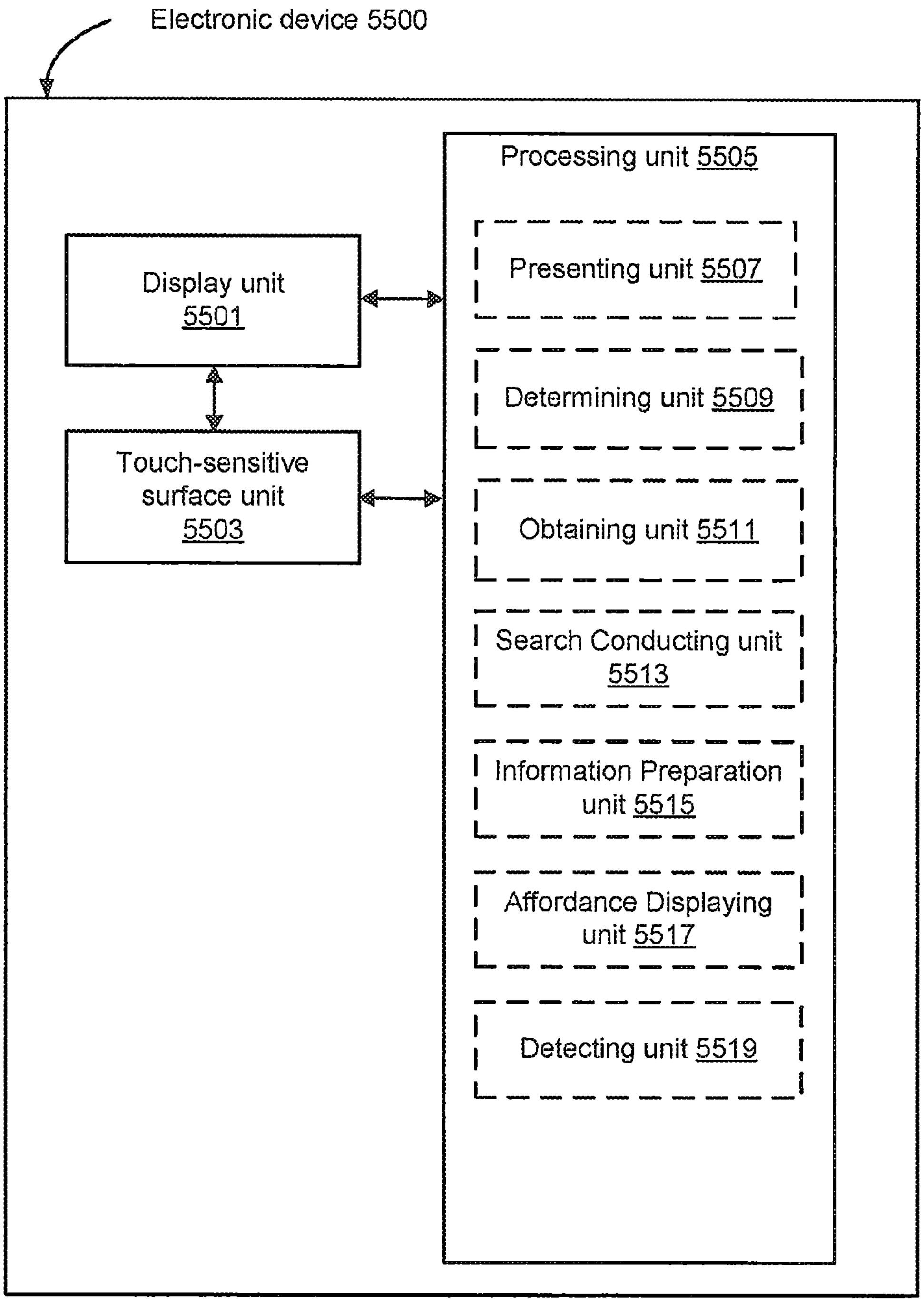

In accordance with some embodiments, FIG. 55 shows a functional block diagram of an electronic device 5500 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 55 are, optionally, combined or separated into sub-blocks to implement the principles of the various described embodiments. Therefore, the description herein optionally supports any possible combination or separation or further definition of the functional blocks described herein. For ease of discussion, the electronic device 5500 is implemented as a portable multifunction device 100 (FIGS. 1A-1B).

As shown in FIG. 55, the electronic device 5500, includes a display unit 5501 configured to display information (e.g., touch-sensitive display system 112 (also referred to as a touch screen and touch screen display), FIG. 1A), a touch-sensitive surface unit 5503 (e.g., display controller 156 and touch-sensitive display system 112, FIG. 1A) configured to receive contacts, gestures, and other user inputs on the touch screen display, and a processing unit 5505 coupled with the display unit 5501 and the touch-sensitive surface unit 5503. In some embodiments, the electronic device is configured in accordance with any one of the computing devices shown in FIG. 1E (e.g., Computing Devices A-D). For ease of illustration, FIG. 55 shows display unit 5501 and touch-sensitive surface unit 5503 as integrated with electronic device 5500, however, in some embodiments one or both of these units are in communication with the electronic device, although the units remain physically separate from the electronic device. The processing unit includes a presenting unit (e.g., presenting unit 5507, FIG. 55), a determining unit (e.g., determining unit 5509, FIG. 55), an obtaining unit (e.g., obtaining unit 5511, FIG. 55), a search conducting unit (e.g., search conducting unit 5513, FIG. 55), an information preparation unit (e.g., information preparation unit 5515, FIG. 55), an affordance displaying unit (e.g., affordance displaying unit 5517, FIG. 55), and a detecting unit (e.g., detecting unit 5519, FIG. 55).

In some embodiments, the processing unit (or one or more components thereof, such as the units 5507-5519) is configured to: present on the display, textual content that is associated with an application (e.g., with the presenting unit 5507 and/or the display unit 5501); determine that a portion of the textual content relates to: (i) a location, (ii) a contact, or (iii) an event (e.g., with the determining unit 5509); upon determining that the portion of the textual content relates to a location, obtain location information from a location sensor on the electronic device (e.g., with the obtaining unit 5511) and prepare the obtained location information for display as a predicted content item (e.g., with the information preparation unit 5515); upon determining that the portion of the textual content relates to a contact, conduct a search on the electronic device for contact information related to the portion of the textual content (e.g., with the search conducting unit 5513) and prepare information associated with at least one contact, retrieved via the search, for display as the predicted content item (e.g., with the information preparation unit 5515); upon determining that the portion of the textual content relates to an event, conduct a new search on the electronic device for event information related to the portion of the textual content (e.g., with the search conducting unit 5513) and prepare information that is based at least in part on at least one event, retrieved via the new search, for display as the predicted content item (e.g., with the information preparation unit 5515); display, within the application, an affordance that includes the predicted content item (e.g., with the affordance displaying unit 5517 and/or the display unit 5501); detect, via the touch-sensitive surface, a selection of the affordance (e.g., with the detecting unit 5519); and in response to detecting the selection, display information associated with the predicted content item on the display adjacent to the textual content (e.g., with the presenting unit 5507 and/or the display unit 5501).

In some embodiments of the electronic device 5500, the portion of the textual content corresponds to textual content that was most recently presented within the application.

In some embodiments of the electronic device 5500, the application is a messaging application and the portion of the textual content is a question received in the messaging application from a remote user of a remote device that is distinct from the electronic device.

In some embodiments of the electronic device 5500, the portion of the textual content is an input provided by the user of the electronic device at an input-receiving field within the application.

In some embodiments of the electronic device 5500, the portion of the textual content is identified in response to a user input selecting a user interface object that includes the portion of the textual content.

In some embodiments of the electronic device 5500, the application is a messaging application and the user interface object is a messaging bubble in a conversation displayed within the messaging application.

In some embodiments of the electronic device 5500, the processing unit is further configured to: detect a selection of a second user interface object; in response to detecting the selection: (i) cease to display the affordance with the predicted content item and (ii) determine that textual content associated with the second user interface object relates to a location, a contact, or an event; and in accordance with the determining, display a new predicted content item within the application.

In some embodiments of the electronic device 5500, the affordance is displayed adjacent to a virtual keyboard within the application.

In some embodiments of the electronic device 5500, the information associated with the predicted content item is displayed in an input-receiving field, wherein the input-receiving field is a field that displays typing inputs received at the virtual keyboard The operations in any of the information processing methods described above are, optionally implemented by running one or more functional modules in information processing apparatus such as general purpose processors (e.g., as described above with respect to FIGS. 1A and 3) or application-specific chips.

The operations described above with reference to FIGS. 6A-6B and 8A-8B are, optionally, implemented by components depicted in FIGS. 1A-1B or FIGS. 42-55. For example, execution operation 602 and detecting operation 802 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:

at an electronic device with a touch-sensitive display:

executing, on the electronic device, an application in response to an instruction from a user of the electronic device;

while executing the application, collecting usage data, wherein the usage data at least includes one or more actions performed by the user within the application;

automatically, without human intervention, obtaining at least one trigger condition based on the collected usage data including identifying a pattern of user behavior based on the collected usage data, the pattern of user behavior indicating that the user performs a particular action when a set of prerequisite conditions is present at the electronic device;

associating the at least one trigger condition with the particular action of the one or more actions performed by the user within the application; and upon determining that the at least one trigger condition has been satisfied, providing an indication to the user that the particular action associated with the trigger condition is available.

2. The method of claim 1, wherein providing the indication includes displaying, on a lock screen of the touch-sensitive display, a user interface object corresponding to the particular action associated with the trigger condition.

3. The method of claim 2, wherein the user interface object includes a description of the particular action associated with the trigger condition.

4. The method of claim 3, wherein the user interface object further includes an icon associated with the application.

5. The method of claim 3, further comprising:

detecting a first gesture at the user interface object; and in response to detecting the first gesture, displaying, on the touch-sensitive display, the application with information associated with the particular action.

6. The method of claim 5, wherein the first gesture is a swipe gesture over the user interface object.

7. The method of claim 5, wherein the first gesture is a single tap at a first predefined area of the user interface object.

8. The method of claim 7, wherein:

the user interface object also includes a second predefined area, distinct from the first predefined area, and a single tap within the second predefined area causes the electronic device to perform the particular action associated with the trigger condition while continuing to display the lock screen.

9. The method of claim 1, wherein:

collecting the usage data includes collecting data identifying a window of time during which the particular action is performed within the application, and determining that the at least one trigger condition has been satisfied includes determining that a current time of day is within a predetermined amount of time of the identified window of time.

10. The method of claim 1, wherein determining that the at least one trigger condition has been satisfied includes determining that the electronic device has been coupled with a second device, distinct from the electronic device.

11. The method of claim 1, wherein the pattern of user behavior is identified after the user has performed the particular action a predetermined number of times while the set of prerequisite conditions is present at the electronic device.

12. The method of claim 11, wherein the at least one trigger condition includes one or more of the prerequisite conditions in the set of prerequisite conditions.

13. The method of claim 11, wherein the at least one trigger condition includes all of the prerequisite conditions in the set of prerequisite conditions.

14. The method of claim 1, further comprising:

before collecting the usage data, receiving permission, from the user via the electronic device, to collect the usage data.

15. The method of claim 1, wherein determining that the at least one trigger condition has been satisfied includes determining that the electronic device has arrived at an address associated with the user.

16. The method of claim 15, wherein the address associated with the user is a previously-visited address corresponding to a home or work address of the user.

17. A non-transitory computer-readable storage medium storing executable instructions that, when executed by an electronic device with a touch-sensitive display, cause the electronic device to:

execute, on the electronic device, an application in response to an instruction from a user of the electronic device;

while executing the application, collect usage data, wherein the usage data at least includes one or more actions performed by the user within the application;

automatically, without human intervention, obtain at least one trigger condition based on the collected usage data including identifying a pattern of user behavior based on the collected usage data, the pattern of user behavior indicating that the user performs a particular action when a set of prerequisite conditions is present at the electronic device;

associate the at least one trigger condition with the particular action of the one or more actions performed by the user within the application; and upon determining that the at least one trigger condition has been satisfied, provide an indication to the user that the particular action associated with the trigger condition is available.

18. The storage medium of claim 17, wherein the executable instructions that cause the electronic device to provide the indication include executable instructions that cause the electronic device to display, on a lock screen of the touch-sensitive display, a user interface object corresponding to the particular action associated with the trigger condition.

19. The storage medium of claim 18, wherein the user interface object includes a description of the particular action associated with the trigger condition.

20. The storage medium of claim 19, wherein the user interface object further includes an icon associated with the application.

21. The storage medium of claim 19, further including instructions that, when executed by the electronic device with the touch-sensitive display, cause the electronic device to:

detect a first gesture at the user interface object; and in response to detecting the first gesture, display, on the touch-sensitive display, the application with information associated with the particular action.

22. The storage medium of claim 21, wherein the first gesture is a swipe gesture over the user interface object.

23. The storage medium of claim 21, wherein the first gesture is a single tap at a first predefined area of the user interface object.

24. The storage medium of claim 23, wherein:

the user interface object also includes a second predefined area, distinct from the first predefined area, and a single tap within the second predefined area causes the electronic device to perform the particular action associated with the trigger condition while continuing to display the lock screen.

25. The storage medium of claim 17, wherein:

the executable instructions that cause the electronic device to collect the usage data include executable instructions that cause the electronic device to collect data identifying a window of time during which the particular action is performed within the application, and the executable instructions that cause the electronic device to determine that the at least one trigger condition has been satisfied include executable instructions that cause the electronic device to determine that a current time of day is within a predetermined amount of time of the identified window of time.

26. The storage medium of claim 17, wherein the executable instructions that cause the electronic device to determine that the at least one trigger condition has been satisfied include executable instructions that cause the electronic device to determine that the electronic device has been coupled with a second device, distinct from the electronic device.

27. The storage medium of claim 17, wherein the pattern of user behavior is identified after the user has performed the particular action a predetermined number of times while the set of prerequisite conditions is present at the electronic device.

28. The storage medium of claim 27, wherein the at least one trigger condition includes one or more of the prerequisite conditions in the set of prerequisite conditions.

29. The storage medium of claim 27, wherein the at least one trigger condition includes all of the prerequisite conditions in the set of prerequisite conditions.

30. The storage medium of claim 17, further including instructions that, when executed by the electronic device with the touch-sensitive display, cause the electronic device to:

before collecting the usage data, receive permission, from the user via the electronic device, to collect the usage data.

31. The storage medium of claim 17, wherein the executable instructions that cause the electronic device to determine that the at least one trigger condition has been satisfied include executable instructions that cause the electronic device to determine that the electronic device has arrived at an address associated with the user.

32. The storage medium of claim 31, wherein the address associated with the user is a previously-visited address corresponding to a home or work address of the user.

33. An electronic device, comprising:

a touch-sensitive display;

one or more processors; and memory storing one or more programs which, when executed by the one or more processors, cause the electronic device to:

execute, on the electronic device, an application in response to an instruction from a user of the electronic device;

while executing the application, collect usage data, wherein the usage data at least includes one or more actions performed by the user within the application;

automatically, without human intervention, obtain at least one trigger condition based on the collected usage data including identifying a pattern of user behavior based on the collected usage data, the pattern of user behavior indicating that the user performs a particular action when a set of prerequisite conditions is present at the electronic device;

associate the at least one trigger condition with the particular action of the one or more actions performed by the user within the application; and upon determining that the at least one trigger condition has been satisfied, provide an indication to the user that the particular action associated with the trigger condition is available.

34. The electronic device of claim 33, wherein the one or more programs that cause the electronic device to provide the indication include one or more programs that cause the electronic device to display, on a lock screen of the touch-sensitive display, a user interface object corresponding to the particular action associated with the trigger condition.

35. The electronic device of claim 34, wherein the user interface object includes a description of the particular action associated with the trigger condition.

36. The electronic device of claim 35, wherein the user interface object further includes an icon associated with the application.

37. The electronic device of claim 35, wherein the one or more programs, when executed by the one or more processors, further cause the electronic device to:

detect a first gesture at the user interface object; and in response to detecting the first gesture, display, on the touch-sensitive display, the application with information associated with the particular action.

38. The electronic device of claim 37, wherein the first gesture is a swipe gesture over the user interface object.

39. The electronic device of claim 37, wherein the first gesture is a single tap at a first predefined area of the user interface object.

40. The electronic device of claim 39, wherein:

the user interface object also includes a second predefined area, distinct from the first predefined area, and a single tap within the second predefined area causes the electronic device to perform the particular action associated with the trigger condition while continuing to display the lock screen.

41. The electronic device of claim 33, wherein:

the one or more programs that cause the electronic device to collect the usage data include one or more programs that cause the electronic device to collect data identifying a window of time during which the particular action is performed within the application, and the one or more programs that cause the electronic device to determine that the at least one trigger condition has been satisfied include one or more programs that cause the electronic device to determine that a current time of day is within a predetermined amount of time of the identified window of time.

42. The electronic device of claim 33, wherein the one or more programs that cause the electronic device to determine that the at least one trigger condition has been satisfied include one or more programs that cause the electronic device to determine that the electronic device has been coupled with a second device, distinct from the electronic device.

43. The electronic device of claim 33, wherein the pattern of user behavior is identified after the user has performed the particular action a predetermined number of times while the set of prerequisite conditions is present at the electronic device.

44. The electronic device of claim 43, wherein the at least one trigger condition includes one or more of the prerequisite conditions in the set of prerequisite conditions.

45. The electronic device of claim 43, wherein the at least one trigger condition includes all of the prerequisite conditions in the set of prerequisite conditions.

46. The electronic device of claim 33, wherein the one or more programs, when executed by the one or more processors, further cause the electronic device to:

before collecting the usage data, receive permission, from the user via the electronic device, to collect the usage data.

47. The electronic device of claim 33, wherein the one or more programs that cause the electronic device to determine that the at least one trigger condition has been satisfied include one or more programs that cause the electronic device to determine that the electronic device has arrived at an address associated with the user.

48. The electronic device of claim 47, wherein the address associated with the user is a previously-visited address corresponding to a home or work address of the user.

* * * * *